US007644414B2

(12) United States Patent
Smith et al.

(10) Patent No.: US 7,644,414 B2
(45) **Date of Patent: *Jan. 5, 2010**

(54) APPLICATION PROGRAM INTERFACE FOR NETWORK SOFTWARE PLATFORM

(75) Inventors: Adam W. Smith, Redmond, WA (US); Anthony J. Moore, Seattle, WA (US); David S. Ebbo, Redmond, WA (US); Erik B. Christensen, Seattle, WA (US); Erik B. Olson, Sammamish, WA (US); Fabio A. Yeon, Mill Creek, WA (US); Jayanth V. Rajan, Bellevue, WA (US); Keith W. Ballinger, North Bend, WA (US); Manu Vasandani, Bellevue, WA (US); Mark T. Anders, Bellevue, WA (US); Mark A. Boulter, Redmond, WA (US); Nikhil Kothari, Sammamish, WA (US); Robert M. Howard, Snoqualmie, WA (US); Scott D. Guthrie, Bellevue, WA (US); Stephen J. Millet, Edmonds, WA (US); Stefan H. Pharies, Seattle, WA (US); Suzanne M. Cook, Redmond, WA (US); Susan M. Warren, Carnation, WA (US); Yann E. Christensen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/381,098

(22) Filed: May 1, 2006

(65) Prior Publication Data

US 2007/0100967 A1 May 3, 2007

Related U.S. Application Data

(63) Continuation of application No. 09/902,809, filed on Jul. 10, 2001, now Pat. No. 7,117,504.

(51) Int. Cl.
*G06F 15/16* (2006.01)
*G06F 15/173* (2006.01)
*G06F 15/177* (2006.01)

(52) U.S. Cl. ........................ 719/328; 709/227; 709/201

(58) Field of Classification Search ................. 719/328; 709/200–203, 217–228
See application file for complete search history.

(56) References Cited

U.S. PATENT DOCUMENTS 5,218,699 A 6/1993 Brandle et al.
5,430,876 A 7/1995 Schreiber et al.

(Continued)

OTHER PUBLICATIONS

"Java 2 Platform, Standard Edition, v1.2.2 API Specification", retrieved on Apr. 4, 2003 at <<http://java.sun.com/products/ jdk/1.2/docs/api/overview-summary.html>>, Sun Microsystems, v.1.2.2., 1993-1999, pp. 1-4.

(Continued)

*Primary Examiner*—Haresh N Patel
(74) *Attorney, Agent, or Firm*—Lee & Hayes, PLLC

(57) ABSTRACT

An application program interface (API) provides a set of functions for application developers who build Web applications on Microsoft Corporation's .NET™ platform.

30 Claims, 4 Drawing Sheets

U.S. PATENT DOCUMENTS

| | | | | |
|---|---|---|---|---|
| 5,689,700 | A | 11/1997 | Miller et al. | |
| 5,748,962 | A | 5/1998 | Brechtel et al. | |
| 5,761,494 | A | 6/1998 | Smedley et al. | |
| 5,822,580 | A | 10/1998 | Leung | |
| 5,903,753 | A | 5/1999 | Bramnick et al. | |
| 5,937,406 | A | 8/1999 | Balabine et al. | |
| 5,943,424 | A | 8/1999 | Berger et al. | |
| 5,956,509 | A | 9/1999 | Kevner | |
| 5,987,517 | A | 11/1999 | Firth et al. | |
| 6,061,743 | A | 5/2000 | Thatcher et al. | |
| 6,175,878 | B1 | 1/2001 | Seaman et al. | |
| 6,209,124 | B1 | 3/2001 | Vermeire et al. | |
| 6,256,678 | B1 | 7/2001 | Traughber et al. | |
| 6,275,871 | B1 | 8/2001 | Reinfelder et al. | |
| 6,282,581 | B1 | 8/2001 | Moore et al. | |
| 6,298,354 | B1 | 10/2001 | Saulpaugh et al. | |
| 6,349,343 | B1 | 2/2002 | Foody et al. | |
| 6,353,830 | B1 | 3/2002 | Yee et al. | |
| 6,360,230 | B1 | 3/2002 | Chan et al. | |
| 6,360,266 | B1 | 3/2002 | Pettus | |
| 6,381,632 | B1 | 4/2002 | Lowell | |
| 6,418,448 | B1 | 7/2002 | Sarkar | |
| 6,430,593 | B1 | 8/2002 | Lindsley | |
| 6,442,548 | B1 | 8/2002 | Balabine et al. | |
| 6,446,253 | B1 | 9/2002 | Mellmer | |
| 6,446,256 | B1 | 9/2002 | Hyman et al. | |
| 6,473,794 | B1 | 10/2002 | Guheen et al. | |
| 6,480,865 | B1 | 11/2002 | Lee et al. | |
| 6,487,578 | B2 | 11/2002 | Ranganathan | |
| 6,507,856 | B1 | 1/2003 | Chen et al. | |
| 6,519,571 | B1 | 2/2003 | Guheen et al. | |
| 6,536,037 | B1 | 3/2003 | Barrese et al. | |
| 6,598,093 | B1 | 7/2003 | Schmidt et al. | |
| 6,609,158 | B1 | 8/2003 | Nevarez et al. | |
| 6,615,166 | B1 | 9/2003 | Guheen et al. | |
| 6,643,652 | B2 | 11/2003 | Helgeson et al. | |
| 6,721,713 | B1 * | 4/2004 | Guheen et al. | 705/1 |
| 6,792,605 | B1 | 9/2004 | Roberts et al. | |
| 6,938,079 | B1 * | 8/2005 | Anderson et al. | 709/222 |
| 6,961,750 | B1 * | 11/2005 | Burd et al. | 709/203 |
| 6,968,503 | B1 | 11/2005 | Chang et al. | |
| 7,013,340 | B1 * | 3/2006 | Burd et al. | 709/229 |
| 7,228,350 | B2 * | 6/2007 | Hong et al. | 709/226 |
| 2002/0073236 | A1 | 6/2002 | Helgeson et al. | |
| 2002/0092004 | A1 | 7/2002 | Lee et al. | |
| 2002/0099687 | A1 | 7/2002 | Krishnaprasad et al. | |
| 2002/0112078 | A1 | 8/2002 | Yach | |
| 2002/0152244 | A1 | 10/2002 | Dean et al. | |
| 2002/0169679 | A1 | 11/2002 | Neumayer | |
| 2002/0184401 | A1 | 12/2002 | Kadel, Jr. et al. | |
| 2003/0005048 | A1 | 1/2003 | Risalvato | |
| 2003/0028685 | A1 | 2/2003 | Smith et al. | |
| 2003/0051236 | A1 | 3/2003 | Pace et al. | |
| 2003/0074206 | A1 | 4/2003 | Hoffman et al. | |
| 2003/0084120 | A1 | 5/2003 | Egli | |
| 2003/0120665 | A1 | 6/2003 | Fox et al. | |
| 2003/0149934 | A1 | 8/2003 | Worden | |
| 2003/0167277 | A1 | 9/2003 | Hejlsberg et al. | |
| 2003/0167355 | A1 | 9/2003 | Smith et al. | |
| 2003/0167356 | A1 | 9/2003 | Smith et al. | |
| 2003/0172196 | A1 | 9/2003 | Hejlsberg et al. | |
| 2003/0177282 | A1 | 9/2003 | Hejlsberg et al. | |
| 2004/0083463 | A1 | 4/2004 | Hawley | |
| 2004/0117759 | A1 | 6/2004 | Rippert, Jr. et al. | |
| 2004/0205694 | A1 | 10/2004 | James et al. | |
| 2006/0294500 | A1 | 12/2006 | Chiang | |

OTHER PUBLICATIONS

Wille, “Presenting C#”, Sams Publishing, Dec. 31, 2002, pp. 21-29, 164-167.

* cited by examiner

APPLICATION PROGRAM INTERFACE FOR NETWORK SOFTWARE PLATFORM

RELATED APPLICATIONS

The present application claims priority under 35 U.S.C. §120 as a continuation of U.S. patent application Ser. No. 09/902,809, now U.S. Pat. No. 7,117,504, filed Jul. 10, 2001, to Anders et al., and titled "Application Program Interface for Network Software Platform", the disclosure of which is hereby incorporated by reference in its entirety.

TECHNICAL FIELD

This invention relates to network software, such as Web applications, and to computer software development of such network software. More particularly, this invention relates to an application program interface (API) that facilitates use of a network software platform by application programs and computer hardware.

BACKGROUND

Very early on, computer software came to be categorized as "operating system" software or "application" software. Broadly speaking, an application is software meant to perform a specific task for the computer user such as solving a mathematical equation or supporting word processing. The operating system is the software that manages and controls the computer hardware. The goal of the operating system is to make the computer resources available to the application programmer while at the same time, hiding the complexity necessary to actually control the hardware.

The operating system makes the resources available via functions that are collectively known as the Application Program Interface or API. The term API is also used in reference to a single one of these functions. The functions are often grouped in terms of what resource or service they provide to the application programmer. Application software requests resources by calling individual API functions. API functions also serve as the means by which messages and information provided by the operating system are relayed back to the application software.

In addition to changes in hardware, another factor driving the evolution of operating system software has been the desire to simplify and speed application software development. Application software development can be a daunting task, sometimes requiring years of developer time to create a sophisticated program with millions of lines of code. For a popular operating system such as Microsoft Windows®, application software developers write thousands of different applications each year that utilize the operating system. A coherent and usable operating system base is required to support so many diverse application developers.

Often, development of application software can be made simpler by making the operating system more complex. That is, if a function may be useful to several different application programs, it may be better to write it once for inclusion in the operating system, than requiring dozens of software developers to write it dozens of times for inclusion in dozens of different applications. In this manner, if the operating system supports a wide range of common functionality required by a number of applications, significant savings in applications software development costs and time can be achieved.

Regardless of where the line between operating system and application software is drawn, it is clear that for a useful operating system, the API between the operating system and the computer hardware and application software is as important as efficient internal operation of the operating system itself.

Over the past few years, the universal adoption of the Internet, and networking technology in general, has changed the landscape for computer software developers. Traditionally, software developers focused on single-site software applications for standalone desktop computers, or LAN-based computers that were connected to a limited number of other computers via a local area network (LAN). Such software applications were typically referred to as "shrink wrapped" products because the software was marketed and sold in a shrink-wrapped package. The applications utilized well-defined APIs to access the underlying operating system of the computer.

As the Internet evolved and gained widespread acceptance, the industry began to recognize the power of hosting applications at various sites on the World Wide Web (or simply the "Web"). In the networked world, clients from anywhere could submit requests to server-based applications hosted at diverse locations and receive responses back in fractions of a second. These Web applications, however, were typically developed using the same operating system platform that was originally developed for standalone computing machines or locally networked computers. Unfortunately, in some instances, these applications do not adequately transfer to the distributed computing regime. The underlying platform was simply not constructed with the idea of supporting limitless numbers of interconnected computers.

To accommodate the shift to the distributed computing environment being ushered in by the Internet, Microsoft Corporation is developing a network software platform known as the ".NET" platform (read as "Dot Net"). The platform allows developers to create Web services that will execute over the Internet. Such a dynamic shift requires a new ground-up design of an entirely new API.

In response to this challenge, the inventors developed a unique set of API functions for Microsoft's .NET™ platform.

SUMMARY

An application program interface (API) provides a set of functions for application developers who build Web applications on a network platform, such as Microsoft Corporation's .NET™ platform.

BRIEF DESCRIPTION OF THE DRAWINGS

The same numbers are used throughout the drawings to reference like features.

BRIEF DESCRIPTION OF ACCOMPANYING COMPACT DISC

Accompanying this specification is a compact disc that stores a compiled HTML help file identifying the API (application program interface) for Microsoft's .NET™ network platform. The file is named "cpref.chm" and was created on Jun. 8, 2001. It is 30.81 Mbytes in size. The file can be executed on a Windows®-based computing device (e.g., IBM-PC, or equivalent) that executes a Windows®-brand operating system (e.g., Windows® NT, Windows® 98, Windows® 2000, etc.). The compiled HTML help file stored on the compact disk is hereby incorporated by reference.

Additionally, the APIs contained in the compiled HTML help file are also provided in approximately 100 separate text files named "NamespaceName.txt". The text files comply with the ASCII format.

The compact disc itself is a CD-ROM, and conforms to the ISO 9660 standard.

DETAILED DESCRIPTION

This disclosure addresses an application program interface (API) for a network platform upon which developers can build Web applications and services. More particularly, an exemplary API is described for the .NET™ platform created by Microsoft Corporation. The .NET™ platform is a software platform for Web services and Web applications implemented in the distributed computing environment. It represents the next generation of Internet computing, using open communication standards to communicate among loosely coupled Web services that are collaborating to perform a particular task.

In the described implementation, the .NET™ platform utilizes XML (extensible markup language), an open standard for describing data. XML is managed by the World Wide Web Consortium (W3C). XML is used for defining data elements on a Web page and business-to-business documents. XML uses a similar tag structure as HTML; however, whereas HTML defines how elements are displayed, XML defines what those elements contain. HTML uses predefined tags, but XML allows tags to be defined by the developer of the page. Thus, virtually any data items can be identified, allowing Web pages to function like database records. Through the use of XML and other open protocols, such as Simple Object Access Protocol (SOAP), the .NET™ platform allows integration of a wide range of services that can be tailored to the needs of the user. Although the embodiments described herein are described in conjunction with XML and other open standards, such are not required for the operation of the claimed invention. Other equally viable technologies will suffice to implement the inventions described herein.

As used herein, the phrase application program interface or API includes traditional interfaces that employ method or function calls, as well as remote calls (e.g., a proxy, stub relationship) and SOAP/XML invocations.

Exemplary Network Environment

Figure 1:
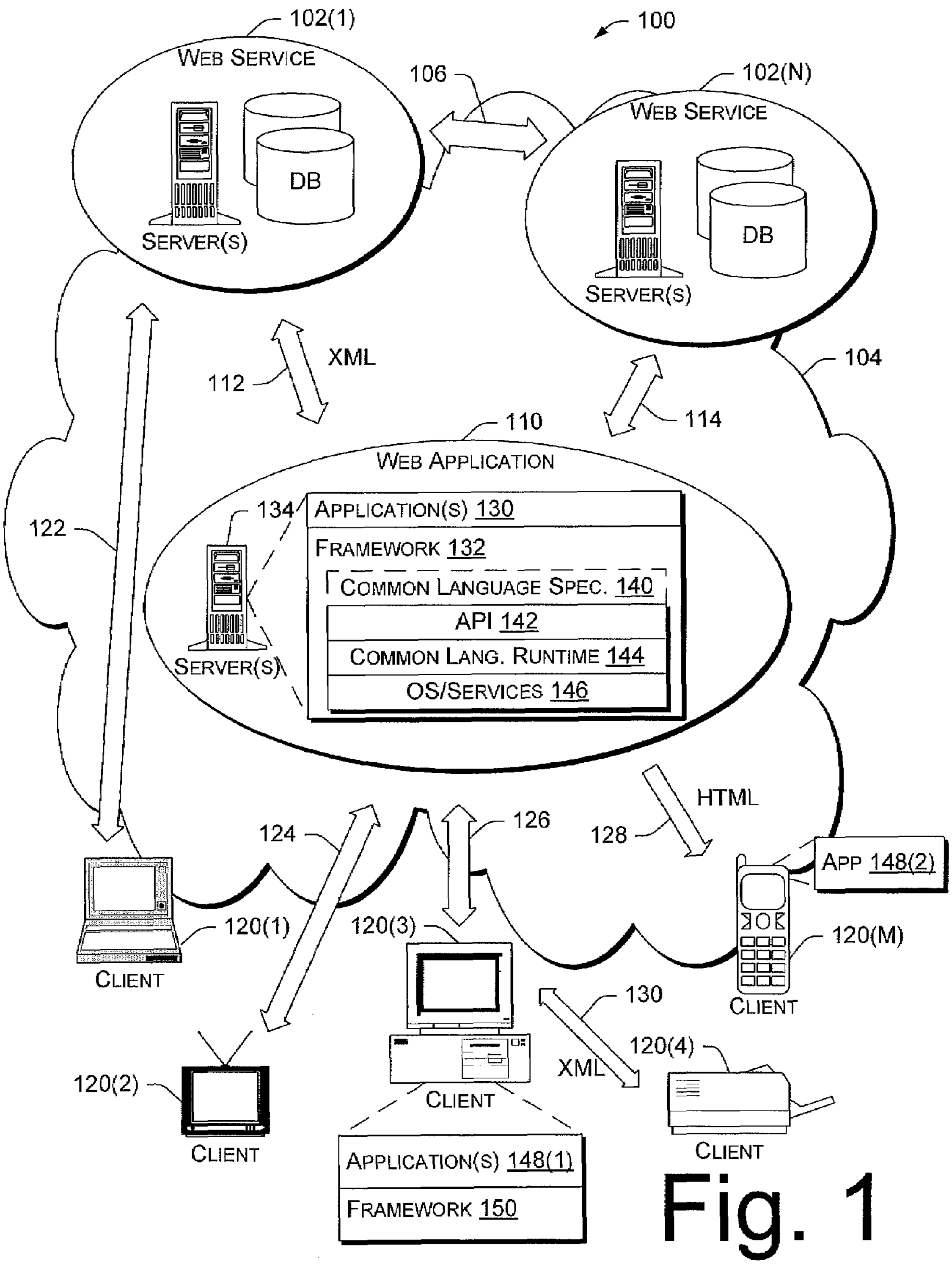
FIG. 1 illustrates a network architecture in which clients access Web services over the Internet using conventional protocols.

FIG. 1 shows a network environment 100 in which a network platform, such as the .NET™ platform, may be implemented. The network environment 100 includes representative Web services 102(1), . . . , 102(N), which provide services that can be accessed over a network 104 (e.g., Internet). The Web services, referenced generally as number 102, are programmable application components that are reusable and interact programmatically over the network 104, typically through industry standard Web protocols, such as XML, SOAP, WAP (wireless application protocol), HTTP (hypertext transport protocol), and SMTP (simple mail transfer protocol) although other means of interacting with the Web services over the network may also be used, such as Remote Procedure Call (RPC) or object broker type technology. A Web service can be self-describing and is often defined in terms of formats and ordering of messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Such services often maintain databases that store information to be served back to requesters. Web services may be configured to perform any one of a variety of different services. Examples of Web services include login verification, notification, database storage, stock quoting, location directories, mapping, music, electronic wallet, calendar/scheduler, telephone listings, news and information, games, ticketing, and so on. The Web services can be combined with each other and with other applications to build intelligent interactive experiences.

The network environment 100 also includes representative client devices 120(1), 120(2), 120(3), 120(4), . . . , 120(M) that utilize the Web services 102 (as represented by communication link 122) and/or the Web application 110 (as represented by communication links 124, 126, and 128). The clients may communicate with one another using standard protocols as well, as represented by an exemplary XML link 130 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing requests from clients 120. The Web application 110 is composed of one or more software applications 130 that run atop a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers that can be used to promote language interoperability. By adhering to the CLS, libraries written in one language can be directly accessible to code modules written in other languages to achieve seamless integration between code modules written in one language and code modules written in another language. One exemplary detailed implementation of a CLS is described in an ECMA standard created by participants in ECMA TC39/TG3. The reader is directed to the ECMA web site at www.ecma.ch.

The API layer 142 presents groups of functions that the applications 130 can call to access the resources and services provided by layer 146. By exposing the API functions for a network platform, application developers can create Web applications for distributed computing systems that make full use of the network resources and other Web services, without needing to understand the complex interworkings of how those network resources actually operate or are made available. Moreover, the Web applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely from the servers 134 that host the framework. Representative applications 148(1) and 148(2) residing on clients 120(3) and 120(M), respectively, can use the API functions by making calls directly, or indirectly, to the API layer 142 over the network 104.

The framework may also be implemented at the clients. Client 120(3) represents the situation where a framework 150 is implemented at the client. This framework may be identical to server-based framework 132, or modified for client purposes. Alternatively, the client-based framework may be condensed in the event that the client is a limited or dedicated function device, such as a cellular phone, personal digital assistant, handheld computer, or other communication/computing device.

Developers' Programming Framework

Figure 2:
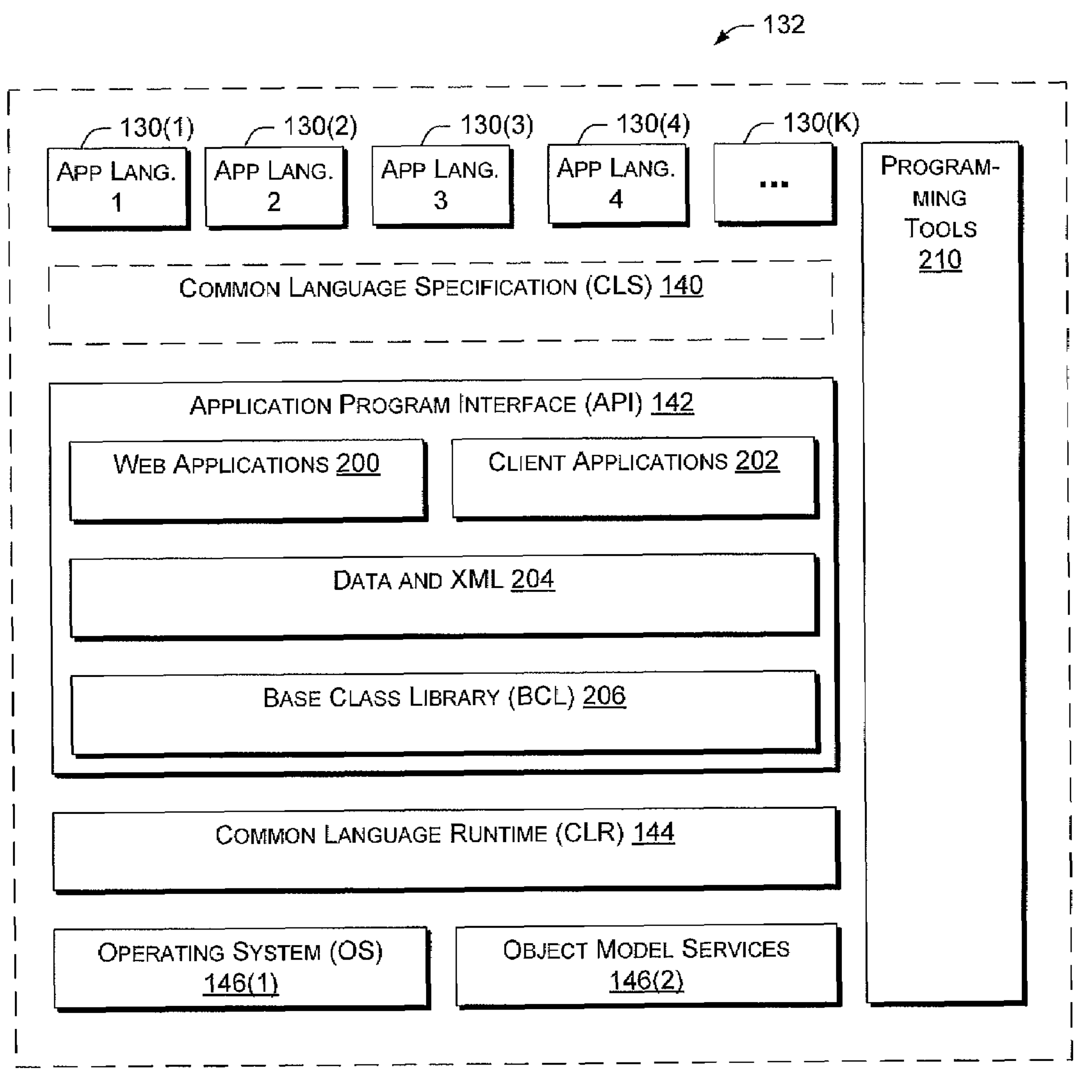
FIG. 2 is a block diagram of a software architecture for Microsoft's .NET™ platform, which includes an application program interface (API).

FIG. 2 shows the programming framework 132 in more detail. The common language specification (CLS) layer 140 supports applications written in a variety of languages 130(1), 130(2), 130(3), 130(4), . . . , 130(K). Such application languages include Visual Basic, C++, C#, COBOL, Jscript, Perl, Eiffel, Python, and so on. The common language specification 140 specifies a subset of features or rules about features that, if followed, allow the various languages to communicate. For example, some languages do not support a given type (e.g., an "int*" type) that might otherwise be supported by the common language runtime 144. In this case, the common language specification 140 does not include the type. On the other hand, types that are supported by all or most languages (e.g., the "int[ ]" type) is included in common language specification 140 so library developers are free to use it and are assured that the languages can handle it. This ability to communicate results in seamless integration between code modules written in one language and code modules written in another language. Since different languages are particularly well suited to particular tasks, the seamless integration between languages allows a developer to select a particular language for a particular code module with the ability to use that code module with modules written in different languages. The common language runtime 144 allow seamless multi-language development, with cross language inheritance, and provide a robust and secure execution environment for the multiple programming languages. For more information on the common language specification 140 and the common language runtime 144, the reader is directed to co-pending applications entitled "Method and System for Compiling Multiple Languages", filed Jun. 21, 2000 (Ser. No. 09/598,105) and "Unified Data Type System and Method" filed Jul. 10, 2000 (Ser. No. 09/613,289), which are incorporated by reference.

The framework 132 encapsulates the operating system 146(1) (e.g., Windows®-brand operating systems) and object model services 146(2) (e.g., Component Object Model (COM) or Distributed COM). The operating system 146(1) provides conventional functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented function pointer. An enumeration is a special kind of value type that represents named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type that exposes logically related functionality. In the exemplary implementation, the API 142 is organized into four root namespaces: a first namespace 200 for Web applications, a second namespace 202 for client applications, a third namespace 204 for data and XML, and a fourth namespace 206 for base class libraries (BCLs). Each group can then be assigned a name. For instance, types in the Web applications namespace 200 are assigned the name "Web", and types in the data and XML namespace 204 can be assigned names "Data" and "XML" respectively. The named groups can be organized under a single "global root" namespace for system level APIs, such as an overall System namespace. By selecting and prefixing a top level identifier, the types in each group can be easily referenced by a hierarchical name that includes the selected top level identifier prefixed to the name of the group containing the type. For instance, types in the Web applications namespace 200 can be referenced using the hierarchical name "System.Web". In this way, the individual namespaces 200, 202, 204, and 206 become major branches off of the System namespace and can carry a designation where the individual namespaces are prefixed with a designator, such as a "System." prefix.

The Web applications namespace 200 pertains to Web based functionality, such as dynamically generated Web pages (e.g., Microsoft's Active Server Pages (ASP)). It supplies types that enable browser/server communication. The client applications namespace 202 pertains to drawing and client side UI functionality. It supplies types that enable drawing of two-dimensional (2D), imaging, and printing, as well as the ability to construct window forms, menus, boxes, and so on.

The data and XML namespace 204 relates to connectivity to data sources and XML functionality. It supplies classes, interfaces, delegates, and enumerations that enable security, specify data types, and serialize objects into XML format documents or streams. The base class libraries (BCL) namespace 206 pertains to basic system and runtime functionality. It contains the fundamental types and base classes that define commonly-used value and reference data types, events and event handlers, interfaces, attributes, and processing exceptions.

In addition to the framework 132, programming tools 210 are provided to assist the developer in building Web services and/or applications. One example of the programming tools 200 is Visual Studio™, a multi-language suite of programming tools offered by Microsoft Corporation.

Root API Namespaces

Figure 3:
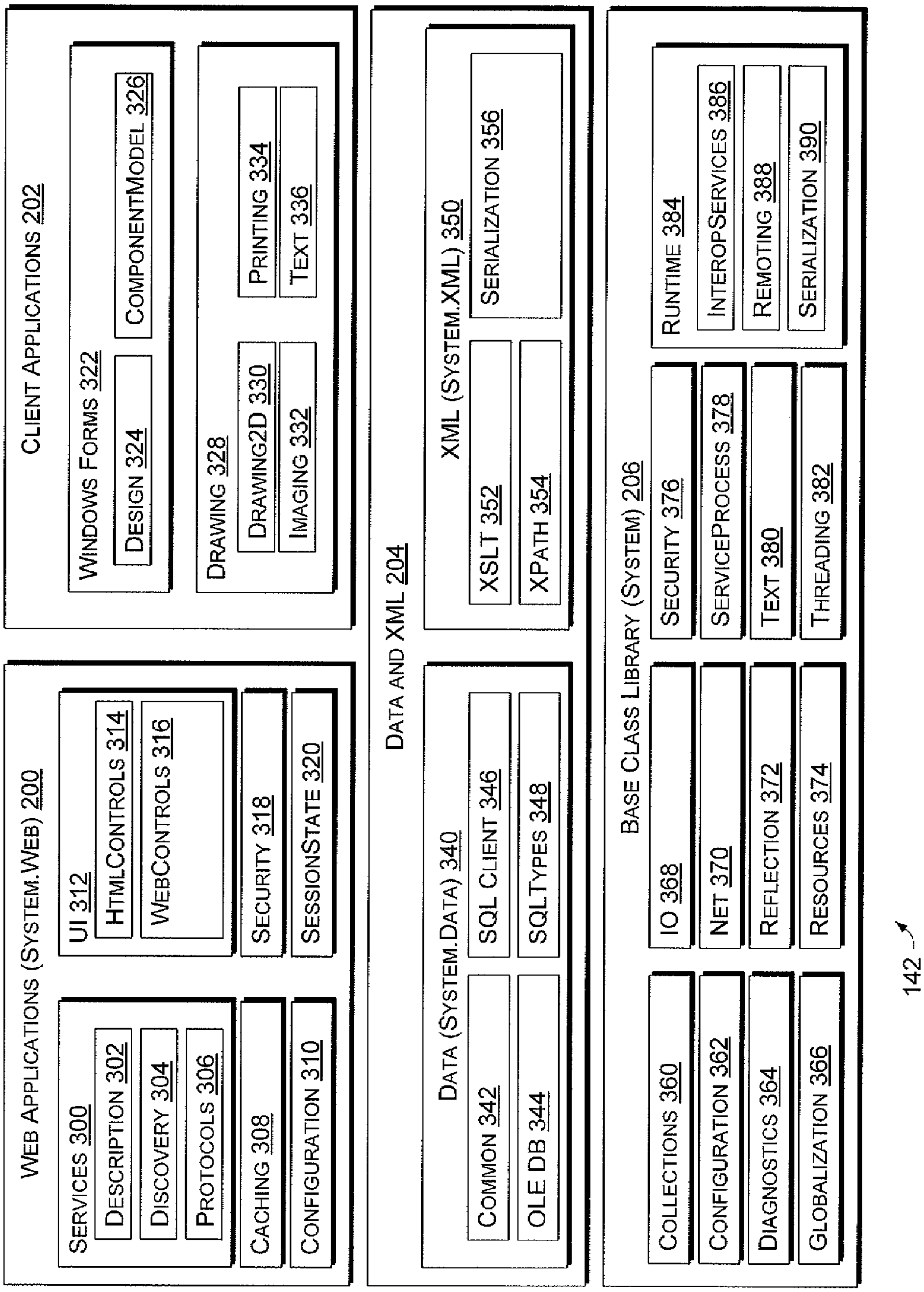
FIG. 3 is a block diagram of unique namespaces supported by the API, as well as function classes of the various API functions.

FIG. 3 shows the API 142 and its four root namespaces in more detail. In one embodiment, the namespaces are identified according to a hierarchical naming convention in which strings of names are concatenated with periods. For instance, the Web applications namespace 200 is identified by the root name "System.Web". Within the "Sytem.Web" namespace is another namespace for Web services, identified as "System.Web.Services", which further identifies another namespace for a description known as "System.Web.Services.Description". With this naming convention in mind, the following provides a general overview of selected namespaces of the API 142, although other naming conventions could be used with equal effect.

The Web applications namespace 200 ("System.Web") defines additional namespaces, including:

A services namespace 300 ("System.Web.Services") containing classes that enable a developer to build and use Web services. The services namespace 300 defines additional namespaces, including a description namespace 302 ("System.Web.Services.Description") containing classes that enable a developer to publicly describe a Web service via a service description language (such as WSDL, a specification available from the W3C), a discovery namespace 304 ("System.Web.Services.Discovery") containing classes that allow Web service consumers to locate available Web Services on a Web server, and a protocols namespace 306 ("System.Web.Services.Protocols") containing classes that define the protocols used to transmit data across a network during communication between Web service clients and the Web service itself.

A caching namespace 308 ("System.Web.Caching") containing classes that enable developers to decrease Web application response time through temporarily caching frequently used resources on the server. This includes ASP.NET pages, web services, and user controls. (ASP.NET is the updated version of Microsoft's ASP technology.) Additionally, a cache dictionary is available for developers to store frequently used resources, such as hash tables and other data structures.

A configuration namespace 310 ("System.Web.Configuration") containing classes that are used to read configuration data in for an application.

A UI namespace 312 ("System.Web.UI") containing types that allow developers to create controls and pages that will appear in Web applications as user interfaces on a Web page. This namespace includes the control class, which provides all web based controls, whether those encapsulating HTML elements, higher level Web controls, or even custom User controls, with a common set of functionality. Also provided are classes which provide the web forms server controls data binding functionality, the ability to save the view state of a given control or page, as well as parsing functionality for both programmable and literal controls. Within the UI namespace 312 are two additional namespaces: an HTML controls namespace 314 ("System.Web.UI.HtmlControls") containing classes that permit developers to interact with types that encapsulates html 3.2 elemtents create HTML controls, and a Web controls namespace 316 ("System.Web.UI.WeblControls") containing classes that allow developers to create higher level Web controls.

A security namespace 318 ("System.Web.Security") containing classes used to implement security in web server applications, such as basic authentication, challenge response authentication, and role based authentication.

A session state namespace 320 ("System.Web.SessionState") containing classes used to access session state values (i.e., data that lives across requests for the lifetime of the session) as well as session-level settings and lifetime management methods.

The client applications namespace 202 is composed of two namespaces:

A windows forms namespace 322 ("System.Windows.Forms") containing classes for creating Windows®-based client applications that take full advantage of the rich user interface features available in the Microsoft Windows® operating system, such as the ability to drag and drop screen elements. Such classes may include wrapped APIs available in the Microsoft Windows® operating system that are used in a windowing UI environment. Within this namespace are a design namespace 324 ("System.Windows.Forms.Design") that contains classes to extend design-time support for Windows forms and a component model namespace 326 ("System.Windows.Forms.ComponentModel") that contains the windows form implementation of the general component model defined in System.ComponentModel. This namespace contains designer tools, such as Visual Studio, which offer a rich experience for developers at design time.

A drawing namespace 328 ("System.Drawing") containing classes for graphics functionality. The drawing namespace 328 includes a 2D drawing namespace 330 ("System.Drawing.Drawing2D") that contains classes and enumerations to provide advanced 2-dimmensional and vector graphics functionality, an imaging namespace 332 ("System.Drawing.Imaging") that contains classes for advanced imaging functionality, a printing namespace 334 ("System.Drawing.Printing") that contains classes to permit developers to customize printing, and a text namespace 336 ("System.Drawing.Text") that contains classes for advanced typography functionality.

The data and XML namespace 204 is composed of two namespaces:

A data namespace 340 ("System.Data") containing classes that enable developers to build components that efficiently manage data from multiple data sources. It implements an architecture that, in a disconnected scenario (such as the Internet), provides tools to request, update, and reconcile data in multiple tier systems. The data namespace 340 includes a common namespace 342 that contains types shared by data providers. A data provider describes a collection of types used to access a data source, such as a database, in the managed space. The data namespace 340 also includes an OLE DB namespace 344 that contains types pertaining to data used in object-oriented databases (e.g., Microsoft's SQL Server), and a SQL client namespace 346 that contains types pertaining to data used by SQL clients. The data namespace also includes a SQL types namespace 348 ("System.Data.SqlTypes") that contains classes for native data types within Microsoft's SQL Server. The classes provide a safer, faster alternative to other data types. Using the objects within this namespace helps prevent type conversion errors caused in situations where loss of precision could occur. Because other data types are converted to and from SQL types behind the scenes, explicitly creating and using objects within this namespace results in faster code as well.

An XML namespace 350 ("System.XML") containing classes that provide standards-based support for processing XML. The supported standards include XML (e.g., version 1.0), XML Namespaces (both stream level and DOM), XML Schemas, XPath expressions, XSL/T transformations, DOM Level 2 Core, and SOAP (e.g., version 1.1). The XML namespace 350 includes an XSLT namespace 352 ("System.XML.Xsl") that contains classes and enumerations to support XSLT (Extensible Stylesheet Language Transformations), an Xpath namespace 354 ("System.XML.Xpath") that contains an XPath parser and evaluation engine, and a serialization namespace 356 ("System.XML.Serialization") that contains classes used to serialize objects into XML format documents or streams.

The base class library namespace 206 ("System") includes the following namespaces:

A collections namespace 360 ("System.Collections") containing interfaces and classes that define various collections of objects, such as lists, queues, arrays, hash tables and dictionaries.

A configuration namespace 362 ("System.Configuration") containing classes and interfaces that allow developers to programmatically access configuration settings and handle errors in configuration files.

A diagnostics namespace 364 ("System.Diagnostics") containing classes that are used to debug applications and to trace code execution. The namespace allows developers to start system processes, read and write to event logs, and monitor system performance using performance counters.

A globalization namespace 366 ("System.Globalization") containing classes that define culture-related information, including the language, the country/region, the calendars in use, the format patterns for dates, currency and numbers, and the sort order for strings.

An I/O namespace 368 ("System.IO") containing the infrastructure pieces to operate with the intput/output of data streams, files, and directories. This namespace includes a model for working with streams of bytes, higher level readers and writers which consume those bytes, various constructions or implementations of the streams (e.g., FileStream and MemoryStream) and, a set of utility classes for working with files and directories.

A net namespace 370 ("System.Net") providing an extensive set of classes for building network-enabled application, referred to as the Net Class Libraries (NCL). One element to the design of the Net Class Libraries is an extensible, layered approach to exposing networking functionality. The NCL stack contains three basic layers. A base layer (System.Net.Socket) provides access to an interface to TCP/IP, the communications protocol of UNIX networks and the Internet. One example of such an interface is the "WinSock API" from Microsoft Corporation. The next layer is the Transport Protocol classes, which support such transport protocols as TCP and UDP. Developers may write their own protocol classes to provide support for protocols such as IGMP and ICMP. The third layer is the Web request, which provides an abstract factory pattern for the creation of other protocol classes. The NCL provides implementations for Hyper Text Transport Protocol (HTTP).

A reflection namespace ("System.Reflection") 372 containing types that provide a managed view of loaded types, methods, and fields, with the ability to dynamically create and invoke types.

A resources namespace 374 ("System.Resources") containing classes and interfaces that allow developers to create, store and manage various culture-specific resources used in an application.

A security namespace 376 ("System.Security") supporting the underlying structure of the security system, including interfaces, attributes, exceptions, and base classes for permissions.

A service process namespace 378 ("System.ServiceProcess") containing classes that allow developers to install and run services. Services are long-running executables that run without a user interface. They can be installed to run under a system account that enables them to be started at computer reboot. Services whose implementation is derived from processing in one class can define specific behavior for start, stop, pause, and continue commands, as well as behavior to take when the system shuts down.

A text namespace 380 ("System.Text") containing classes representing various types of encodings (e.g., ASCII, Unicode, UIF-7, and UIF-8), abstract base classes for converting blocks of characters to and from blocks of bytes, and a helper class that manipulates and formats string objects without creating intermediate instances.

A threading namespace 382 ("System.Threading") containing classes and interfaces that enable multi-threaded programming. The threading namespace includes a ThreadPool class that manages groups of threads, a Timer class that enables a delegate to be called after a specified amount of time, and a Mutex class for synchronizing mutually-exclusive threads. This namespace also provides classes for thread scheduling, wait notification, and deadlock resolution.

A runtime namespace 384 ("System.Runtime") containing multiple namespaces concerning runtime features, including an interoperation services namespace 386 ("System.Runtime.InteropServices") that contains a collection of classes useful for accessing COM objects. The types in the InteropServices namespace fall into the following areas of functionality: attributes, exceptions, managed definitions of COM types, wrappers, type converters, and the Marshal class. The runtime namespace 384 further includes a remoting namespace 388 ("System.Runtime.Remoting") that contains classes and interfaces allowing developers to create and configure distributed applications. Another namespace within the runtime namespace 384 is a serialization namespace 390 ("System.Runtime.Serialization") that contains classes used for serializing and deserializing objects. Serialization is the process of converting an object or a graph of objects into a linear sequence of bytes for either storage or transmission to another location.

The web applications namespace 200 ("System.Web") defines several additional namespaces, including the services namespace 300 ("System.Web.Services"), a caching namespace 308 ("System.Web.Caching"), a configuration namespace 310 ("System.Web.Configuration"), a UI namespace 312 ("System.Web.UI"), a security namespace 318 ("System.Web.Security"), and a session state namespace 320 ("System.Web.SessionState"). In general, the web applications namespace 200 supplies tools that enable browser-server communication.

The services namespace 300 contains classes that allow developers to build and use various web services. The services namespace includes a web service class that defines a base class for web services and a web method attribute class that allows a method to be programmatically exposed over the web.

The UI namespace 312 contains classes that allow a user to create HTML server controls on a web page. These HTML server controls execute on the server and map to standard HTML tags. The UI namespace also contains classes that allow a user to create web server controls on a web page. These web server controls run on the web server and include form controls, such as buttons and text boxes.

The web applications namespace 200 also includes classes for manipulating cookies, transferring files, handling exception information, and controlling an output cache. Specific details regarding the System.Web namespace are provided below.

System.Web

Description

The System.Web namespace supplies classes and interfaces that enable browser/server communication. This namespace includes the HTTPRequest class that provides extensive information about the current HTTP request, the HTTPResponse class that manages HTTP output to the client, and the HTTPServerUtility object that provides access to server-side utilities and processes. System.Web also includes classes for cookie manipulation, file transfer, exception information, and output cache control.

BeginEventHandler delegate (System.Web)

Description

EndEventHandler delegate (System.Web)

Description

HttpWorkerRequest.EndOfSendNotification delegate (System.Web)

Description

HttpApplication class (System.Web)

Description

Defines the methods, properties, and events common to all application objects within an ASP.NET application.

Constructors:

HttpApplication

Example Syntax:

[C#] public HttpApplication( );

[C++] public: HttpApplication( );

[VB] Public Sub New( )

[JScript] public function HttpApplication( );

Properties:

Application

[C#] public HttpApplicationState Application {get;}

[C++] public: _property HttpApplicationState* get_Application( );

[VB] Public ReadOnly Property Application As HttpApplicationState

[JScript] public function get Application( ): HttpApplicationState;

Description

Gets a reference to an HTTPApplication state bag instance.

Context

[C#] public HttpContext Context {get;}

[C++] public: _property HttpContext* get_Context( );

[VB] Public ReadOnly Property Context As HttpContext

[JScript] public function get Context( ): HttpContext;

Description

Gets the HTTPRuntime—provided context object that provides access to additional pipeline-module exposed objects.

Events

[C#] protected EventHandlerList Events {get;}

[C++] protected: _property EventHandlerList* get_Events ( );

[VB] Protected ReadOnly Property Events As EventHandlerList

[JScript] protected function get Events( ): EventHandlerList;

Description

Modules

[C#] public HttpModuleCollection Modules {get;}

[C++] public: _property HttpModuleCollection* get_Modules( );

[VB] Public ReadOnly Property Modules As HttpModuleCollection

[JScript] public function get Modules( ): HttpModuleCollection;

Description

Gets the collection of HTTPModules configured for the current application.

Request

[C#] public HttpRequest Request {get;}

[C++] public: _property HttpRequest* get_Request( );

[VB] Public ReadOnly Property Request As HttpRequest

[JScript] public function get Request( ): HttpRequest;

Description

Gets the intrinsic object that provides access to incoming HttpRequest data.

Response

[C#] public HttpResponse Response {get;}

[C++] public: _property HttpResponse* get_Response( );

[VB] Public ReadOnly Property Response As HttpResponse

[JScript] public function get Response( ): HttpResponse;

Description

The intrinsic object that allows transmission of HttpResponse data to a client.

Server

[C#] public HttpServerUtility Server {get;}

[C++] public: _property HttpServerUtility* get_Server( );

[VB] Public ReadOnly Property Server As HttpServerUtility

[JScript] public function get Server( ): HttpServerUtility;

Description

Gets the intrinsic Server object.

Session

[C#] public HttpSessionState Session {get;}

[C++] public: _property HttpSessionState* get_Session( );

[VB] Public ReadOnly Property Session As HttpSessionState

[JScript] public function get Session( ): HttpSessionState;

Description

Gets the intrinsic Session object that provides access to session data.

Site

[C#] public ISite Site {get; set;}

[C++] public: _property ISite* get_Site( );public: _property void set_Site(ISite*);

[VB] Public Property Site As ISite

[JScript] public function get Site( ): ISite;public function set Site(ISite);

Description
User

[C#] public IPrincipal User {get;}

[C++] public: _property Iprincipal* get_User( );

[VB] Public ReadOnly Property User As IPrincipal

[JScript] public function get User( ): IPrincipal;

Description
Gets the User intrinsic object.

[C#] public event EventHandler AcquireRequestState;

[C++] public: _event EventHandler* AcquireRequesttate;

[VB] Public Event AcquireRequesttate As EventHandler

Description

[C#] public event EventHandler AuthenticateRequest;

[C++] public: _event EventHandler* AuthenticateRequest;

[VB] Public Event AuthenticateRequest As EventHandler

Description

[C#] public event EventHandler AuthorizeRequest;

[C++] public: _event EventHandler* AuthorizeRequest;

[VB] Public Event AuthorizeRequest As EventHandler

Description

[C#] public event EventHandler BeginRequest;

[C++] public: _event EventHandler* BeginRequest;

[VB] Public Event BeginRequest As EventHandler

Description

[C#] public event EventHandler Disposed;

[C++] public: _sealed _event EventHandler* Disposed;

[VB] NotOverridable Public Event Disposed As EventHandler

Description

[C#] public event EventHandler EndRequest;

[C++] public: _event EventHandler* EndRequest;

[VB] Public Event EndRequest As EventHandler

Description

[C#] public event EventHandler Error;

[C++] public: _event EventHandler* Error;

[VB] Public Event Error As EventHandler

Description

[C#] public event EventHandler PostRequestHandlerExecute;

[C++] public: _event EventHandler* PostRequestHandlerExecute;

[VB] Public Event PostRequestHandlerExecute As EventHandler

Description

[C#] public event EventHandler PreRequestHandlerExecute;

[C++] public: _event EventHandler* PreRequestHandlerExecute;

[VB] Public Event PreRequestHandlerExecute As EventHandler

Description

[C#] public event EventHandler PreSendRequestContent;

[C++] public: _event EventHandler* PreSendRequestContent;

[VB] Public Event PreSendRequestContent As EventHandler

Description

[C#] public event EventHandler PreSendRequestHeaders;

[C++] public: _event EventHandler* PreSendRequestHeaders;

[VB] Public Event PreSendRequestHeaders As EventHandler

Description

[C#] public event EventHandler ReleaseRequestState;

[C++] public: _event EventHandler* ReleaseRequestState;

[VB] Public Event ReleaseRequestState As EventHandler

Description

[C#] public event EventHandler ResolveRequestCache;

[C++] public: _event EventHandler* ResolveRequestCache;

[VB] Public Event ResolveRequestCache As EventHandler

Description

[C#] public event EventHandler UpdateRequestCache;

[C++] public: _event EventHandler* Up dateRequestC ache;

[VB] Public Event UpdateRequestCache As EventHandler

Description
Methods:
AddOnAcquireRequestStateAsync

[C#] public void AddOnAcquireRequestStateAsync(BeginEventHandler bh, EndEventHandler eh);

[C++] public: void AddOnAcquireRequestStateAsync(BeginEventHandler* bh, EndEventHandler* eh);

[VB] Public Sub AddOnAcquireRequestStateAsync(ByVal bh As BeginEventHandler, ByVal eh As EndEventHandler)

[JScript] public function AddOnAcquireRequestStateAsync (bh BeginEventHandler, eh EndEventHandler);

Description
AddOnAuthenticateRequestAsync

[C#] public void AddOnAuthenticateRequestAsync(BeginEventHandler bh, EndEventHandler eh);

[C++] public: void AddOnAuthenticateRequestAsync(BeginEventHandler* bh, EndEventHandler* eh);

[VB] Public Sub AddOnAuthenticateRequestAsync(ByVal bh As BeginEventHandler, ByVal eh As EndEventHandler)

[JScript] public function AddOnAuthenticateRequestAsync (bh BeginEventHandler, eh EndEventHandler);

Description
AddOnAuthorizeRequestAsync

[C#] public void AddOnAuthorizeRequestAsync(BeginEventHandler bh, EndEventHandler eh);

[C++] public: void AddOnAuthorizeRequestAsync(BeginEventHandler* bh, EndEventHandler* eh);

[VB] Public Sub AddOnAuthorizeRequestAsync(ByVal bh As BeginEventHandler, ByVal eh As EndEventHandler)

[JScript] public function AddOnAuthorizeRequestAsync(bh: BeginEventHandler, eh EndEventHandler);

Description
AddOnBeginRequestAsync

[C#] public void AddOnBeginRequestAsync(BeginEventHandler bh, EndEventHandler eh);

[C++] public: void AddOnBeginRequestAsync(BeginEventHandler* bh, EndEventHandler* eh);

[VB] Public Sub AddOnBeginRequestAsync(ByVal bh As BeginEventHandler, ByVal eh As EndEventHandler)

[JScript] public function AddOnBeginRequestAsync(bh: BeginEventHandler, eh: EndEventHandler);

Description
AddOnEndRequestAsync

[C#] public void AddOnEndRequestAsync(BeginEventHandler bh, EndEventHandler eh);

[C++] public: void AddOnEndRequestAsync(BeginEventHandler* bh, EndEventHandler* eh);

[VB] Public Sub AddOnEndRequestAsync(ByVal bh As BeginEventHandler, ByVal eh As EndEventHandler)

[JScript] public function AddOnEndRequestAsync(bh: BeginEventHandler, eh: EndEventHandler);

Description

AddOnPostRequestHandlerExecuteAsync

[C#] public void AddOnPostRequestHandlerExecuteAsync (BeginEventHandler bh, EndEventHandler eh);

[C++] public: void AddOnPostRequestHandlerExecuteAsync(BeginEventHandler* bh, EndEventHandler* eh);

[VB] Public Sub AddOnPostRequestHandlerExecuteAsync (ByVal bh As BeginEventHandler, ByVal eh As EndEventHandler)

[JScript] public function AddOnPostRequestHandlerExecuteAsync(bh BeginEventHandler, eh EndEventHandler);

Description

AddOnPreRequestHandlerExecuteAsync

[C#] public void AddOnPreRequestHandlerExecuteAsync (BeginEventHandler bh, EndEventHandler eh);

[C++] public: void AddOnPreRequestHandlerExecuteAsync (BeginEventHandler* bh, EndEventHandler* eh);

[VB] Public Sub AddOnPreRequestHandlerExecuteAsync (ByVal bh As BeginEventHandler, ByVal eh As EndEventHandler)

[JScript] public function AddOnPreRequestHandlerExecuteAsync(bh: BeginEventHandler, eh: EndEventHandler);

Description

AddOnReleaseRequestStateAsync

[C#] public void AddOnReleaseRequestStateAsync(BeginEventHandler bh, EndEventHandler eh);

[C++] public: void AddOnReleaseRequestStateAsync(BeginEventHandler* bh, EndEventHandler* eh);

[VB] Public Sub AddOnReleaseRequestStateAsync(ByVal bh As BeginEventHandler, ByVal eh As EndEventHandler)

[JScript] public function AddOnReleaseRequestStateAsync (bh: BeginEventHandler, eh: EndEventHandler);

Description

AddOnResolveRequestCacheAsync

[C#] public void AddOnResolveRequestCacheAsync(BeginEventHandler bh, EndEventHandler eh);

[C++] public: void AddOnResolveRequestCacheAsync(BeginEventHandler* bh, EndEventHandler* eh);

[VB] Public Sub AddOnResolveRequestCacheAsync(ByVal bh As BeginEventHandler, ByVal eh As EndEventHandler)

[JScript] public function AddOnResolveRequestCacheAsync(bh: BeginEventHandler, eh: EndEventHandler);

Description

AddOnUpdateRequestCacheAsync

[C#] public void AddOnUpdateRequestCacheAsync(BeginEventHandler bh, EndEventHandler eh);

[C++] public: void AddOnUpdateRequestCacheAsync(BeginEventHandler* bh, EndEventHandler* eh);

[VB] Public Sub AddOnUpdateRequestCacheAsync(ByVal bh As BeginEventHandler, ByVal eh As EndEventHandler)

[JScript] public function AddOnUpdateRequestCacheAsync (bh: BeginEventHandler, eh: EndEventHandler);

Description

CompleteRequest

[C#] public void CompleteRequest( );

[C++] public: void CompleteRequest( );

[VB] Public Sub CompleteRequest( )

[JScript] public function CompleteRequest( );

Description

Dispose

[C#] public virtual void Dispose( );

[C++] public: virtual void Dispose( );

[VB] Overridable Public Sub Dispose( )

[JScript] public function Dispose( );

Description

Cleans up the instance variables of an HttpModule.

The System.Web.HttpApplication.Request, System.Web.HttpApplication.Response, System.Web.HttpApplication.Session and System.Web.HttpApplication.Application properties are not available for use at the time System.Web.HttpApplication.Dispose is executed.

GetVaryByCustomString

[C#] public virtual string GetVaryByCustomString(HttpContext context, string custom);

[C++] public: virtual String* GetVaryByCustomString(HttpContext* context, String* custom);

[VB] Overridable Public Function GetVaryByCustomString (ByVal context As HttpContext, ByVal custom As String) As String

[JScript] public function GetVaryByCustomString(context: HttpContext, custom: String) String;

Description

Init

[C#] public virtual void Init( );

[C++] public: virtual void Init( );

[VB] Overridable Public Sub Init( )

[JScript] public function Init( );

Description

Initializes HttpModule instance variables and register event handlers with the hosting Application.

IHttpAsyncHandler.BeginProcessRequest

[C#] IAsyncResult IHttpAsyncHandler.BeginProcessRequest(HttpContext context, AsyncCallback cb, object extraData);

[C++] IAsyncResult* IHttpAsyncHandler::BeginProcessRequest(HttpContext* context, AsyncCallback* cb, Object* extraData);

[VB] Function BeginProcessRequest(ByVal context As HttpContext, ByVal cb As AsyncCallback, ByVal extraData As Object) As IAsyncResult Implements IHttpAsyncHandler.BeginProcessRequest

[JScript] function IHttpAsyncHandler.BeginProcessRequest (context: HttpContext, cb: AsyncCallback, extraData: Object): IAsyncResult;

IHttpAsyncHandler.EndProcessRequest

[C#] void IHttpAsyncHandler.EndProcessRequest(IAsyncResult result);

[C++] void IHttpAsyncHandler::EndProcessRequest(IAsyncResult* result);

[VB] Sub EndProcessRequest(ByVal result As IAsyncResult) Implements IHttpAsyncHandler.EndProcessRequest

[JScript] function IHttpAsyncHandler.EndProcessRequest (result: IAsyncResult);

IHttpHandler.ProcessRequest

[C#] void IHttpHandler.ProcessRequest(HttpContext context);

[C++] void IHttpHandler: ProcessRequest(HttpContext* context);

[VB] Sub ProcessRequest(ByVal context As HttpContext) Implements IHttpHandler.ProcessRequest

[JScript] function IHttpHandler.ProcessRequest(context: HttpContext);

HttpApplicationState class (System.Web)

ToString

Description

Enables sharing of global information across multiple sessions and requests within an ASP.NET application.

An ASP.NET application is the sum of all files, pages, handlers, modules, and code within the scope of a virtual directory and its subdirectories on a single web server.

AllKeys

ToString

[C#] public string[ ] AllKeys {get;}

[C++] public: property String* get AllKeys( );

[VB] Public ReadOnly Property AllKeys As String ( )

[JScript] public function get AllKeys( ): String[ ];

Description

Gets the access keys in the System.Web.HttpApplicationState collection.

Contents

ToString

[C#] public HttpApplicationState Contents {get;}

[C++] public: _property HttpApplicationState* get_Contents( );

[VB] Public ReadOnly Property Contents As HttpApplicationState

[JScript] public function get Contents( ): HttpApplicationState;

Description

Gets a reference to the System.Web.HttpApplicationState object.

This property provides compatibility with earlier versions of ASP.

Count

ToString

[C#] public override int Count {get;}

[C++] public: _property virtual int get_Count( );

[VB] Overrides Public ReadOnly Property Count As Integer

[JScript] public function get Count( ): int;

Description

Gets the number of objects in the System.Web.HttpApplicationState collection.

IsReadOnly

Item

ToString

System.Web.HttpApplicationState

Description

Gets the value of a single System.Web.HttpApplicationState object by name. The name of the object in the collection.

Item

ToString

[C#] public object this[int index] {get;}

[C++] public: _property Object* get_Item(int index);

[VB] Public Default ReadOnly Property Item(ByVal index As Integer) As Object

[JScript] returnValue =HttpApplicationStateObject.Item(index);

Description

Gets a single System.Web.HttpApplicationState object by index. The numerical index of the object in the collection.

Keys

StaticObjects

ToString

Description

Gets all objects declared via an tag within the ASP.NET application.

Application objects are defined in the Global.asax file.

Add

[C#] public void Add(string name, object value);

[C++] public: void Add(String* name, Object* value);

[VB] Public Sub Add(ByVal name As String, ByVal value As Object)

[JScript] public function Add(name: String, value: Object);

Description

Adds a new object to the System.Web.HttpApplicationState collection. The name of the object to be added to the collection. The value of the object.

Clear

[C#] public void Clear( );

[C++] public: void Clear( );

[VB] Public Sub Clear( )

[JScript] public function Clear( );

Description

Removes all objects from an System.Web.HttpApplicationState collection.

Get

[C#] public object Get(int index);

[C++] public: Object* Get(int index);

[VB] Public Function Get(ByVal index As Integer) As Object

[JScript] public function Get(index: int): Object;

Description

Gets an System.Web.HttpApplicationState object by numerical index.

Return Value: The object referenced by index. The index of the application state object.

Get

[C#] public object Get(string name);

[C++] public: Object* Get(String* name);

[VB] Public Function Get(ByVal name As String) As Object

[JScript] public function Get(name: String): Object; Gets an System.Web.HttpApplicationState object by name or index.

Description

Gets an System.Web.HttpApplicationState object by name.

Return Value: The object referenced by name.

The following example returns an object named MyAppVarl from the System.Web.HttpApplicationState collection of the intrinsic System.Web.HttpContext.Application object and copies it to a new object variable. The name of the object.

GetKey

[C#] public string GetKey(int index);

[C++] public: String* GetKey(int index);

[VB] Public Function GetKey(ByVal index As Integer) As String

[JScript] public function GetKey(index: int): String;

Description

Gets an System.Web.HttpApplicationState object name by index.

Return Value: The name under which the application state object was saved. The index of the application state object.

Lock

[C#] public void Lock( );

[C++] public: void Lock( );

[VB] Public Sub Lock( )

[JScript] public function Lock( );

Description

Locks access to an System.Web.HttpApplicationState variable to facilitate access synchronization.

Remove

[C#] public void Remove(string name);
[C++] public: void Remove(String* name);
[VB] Public Sub Remove(ByVal name As String)
[JScript] public function Remove(name: String);

Description

Removes the named object from an System.Web.HttpApplicationState collection. The name of the object to be removed from the collection.

RemoveAll

[C#] public void RemoveAll( );
[C++] public: void RemoveAll( );
[VB] Public Sub RemoveAll( )
[JScript] public function RemoveAll( );

Description

Removes all objects from an System.Web.HttpApplicationState collection.

System.Web.HttpApplicationState.RemoveAll is an internal call to System.Web.IHttpApplicationState.Clear.

RemoveAt

[C#] public void RemoveAt(int index);
[C++] public: void RemoveAt(int index);
[VB] Public Sub RemoveAt(ByVal index As Integer)
[JScript] public function RemoveAt(index: int); Removes an object from the application state collection by name.

Set

[C#] public void Set(string name, object value);
[C++] public: void Set(String* name, Object* value);
[VB] Public Sub Set(ByVal name As String, ByVal value As Object)
[JScript] public function Set(name: String, value: Object);

Description

Updates the value of an object in an System.Web.HttpApplicationState collection. The name of the object to be updated. The updated value of the object.

UnLock

[C#] public void UnLock( );
[C++] public: void UnLock( );
[VB] Public Sub UnLock( )
[JScript] public function UnLock( );

Description

Unlocks access to an System.Web.HttpApplicationState variable to facilitate access synchronization.

HttpBrowserCapabilities class (System.Web)

UnLock

Description

Enables the server to gather information on the capabilities of the browser that is running on the client.

System.Web.HttpBrowserCapabilities properties are accessible through the System.Web.HttpRequest.Browser property of ASP.NET's intrinsic System.Web.HttpContext.Request object.

HttpBrowserCapabilities

Example Syntax:

UnLock

[C#] public HttpBrowserCapabilities( );
[C++] public: HttpBrowserCapabilities( );
[VB] Public Sub New( )
[JScript] public function HttpBrowserCapabilities( );

ActiveXControls

UnLock

[C#] public bool ActiveXControls {get;}
[C++] public: _property bool get_ActiveXControls( );
[VB] Public ReadOnly Property ActiveXControls As Boolean
[JScript] public function get ActiveXControls( ): Boolean;

Description

Gets a value indicating whether the client browser supports ActiveX controls.

AOL

UnLock

[C#] public bool AOL {get;}
[C++] public: _property bool get_AOL( );
[VB] Public ReadOnly Property AOL As Boolean
[JScript] public function get AOL( ): Boolean;

Description

Gets a value indicating whether the client is an America Online (AOL) browser.

BackgroundSounds

UnLock

[C#] public bool BackgroundSounds {get;}
[C++] public: _property bool get_BackgroundSounds( );
[VB] Public ReadOnly Property BackgroundSounds As Boolean
[JScript] public function get BackgroundSounds( ): Boolean;

Description

Gets a value indicating whether the client browser supports background sounds.

Beta

UnLock

[C#] public bool Beta {get;}
[C++] public: _property bool get_Beta( );
[VB] Public ReadOnly Property Beta As Boolean
[JScript] public function get Beta( ): Boolean;

Description

Gets a value indicating whether the browser is a beta release.

Browser

UnLock

[C#] public string Browser {get;}
[C++] public: _property String* get_Browser( );
[VB] Public ReadOnly Property Browser As String
[JScript] public function get Browser( ): String;

Description

Gets the browser string (if any) that was transmitted in the User-Agent header.

CDF

UnLock

[C#] public bool CDF {get;}
[C++] public: _property bool get_CDF( );
[VB] Public ReadOnly Property CDF As Boolean
[JScript] public function get CDF( ): Boolean;

Description

Gets a value indicating whether the client browser supports Channel Definition Format (CDF) for webcasting.

ClrVersion

UnLock

[C#] public Version ClrVersion {get;}
[C++] public: _property Version* get_ClrVersion( );
[VB] Public ReadOnly Property ClrVersion As Version
[JScript] public function get ClrVersion( ): Version;

Description

Gets the version number of the NET common language runtime that the client browser supports.

If no common language runtime version is specified, the property value is 0, 0,−1,−1.

Cookies

UnLock

[C#] public bool Cookies {get;}

[C++] public: _property bool get_Cookies( );

[VB] Public ReadOnly Property Cookies As Boolean

[JScript] public function get Cookies( ): Boolean;

Description

Gets a value indicating whether the client browser supports cookies.

Crawler

UnLock

[C#] public bool Crawler {get;}

[C++] public: _property bool get_Crawler( );

[VB] Public ReadOnly Property Crawler As Boolean

[JScript] public function get Crawler( ): Boolean;

Description

Gets a value indicating whether the client browser is a Web crawler search engine.

EcmaScriptVersion

UnLock

[C#] public Version EcmaScriptVersion {get;}

[C++] public: _property Version* get_EcmaScriptVersion( );

[VB] Public ReadOnly Property EcmaScriptVersion As Version

[JScript] public function get EcmaScriptVersion( ): Version;

Description

Gets the version number of ECMA script that the client browser supports.

The European Computer Manufacturer's Association develops standards for information and communication systems. For more information, see ECMA's official Web site at http://www.ecma.ch.

Frames

UnLock

[C#] public bool Frames {get;}

[C++] public: _property bool get_Frames( );

[VB] Public ReadOnly Property Frames As Boolean

[JScript] public function get Frames( ): Boolean;

Description

Gets a value indicating whether the client browser supports HTML frames.

Item

JavaApplets

UnLock

Description

Gets a value indicating whether the client browser supports Java applets.

JavaScript

UnLock

[C#] public bool JavaScript {get;}

[C++] public: _property bool get_JavaScript( );

[VB] Public ReadOnly Property JavaScript As Boolean

[JScript] public function get JavaScript( ): Boolean;

Description

Gets a value indicating whether the client browser supports JavaScript.

MajorVersion

UnLock

[C#] public int MajorVersion {get;}

[C++] public: _property int get_MajorVersion( );

[VB] Public ReadOnly Property MajorVersion As Integer

[JScript] public function get MajorVersion( ): int;

Description

Gets the major (that is, integer) version number of the client browser.

MinorVersion

UnLock

[C#] public double MinorVersion {get;}

[C++] public: _property double get_MinorVersion( );

[VB] Public ReadOnly Property MinorVersion As Double

[JScript] public function get MinorVersion( ): double;

Description

Gets the minor (that is, decimal) version number of the client browser.

MSDomVersion

UnLock

[C#] public Version MSDomVersion {get;}

[C++] public: _property Version* get_MSDomVersion( );

[VB] Public ReadOnly Property MSDomVersion As Version

[JScript] public function get MSDomVersion( ): Version;

Description

Gets the version of Microsoft HTML (MSHTML) Document Object Model (DOM) that the client browser supports.

Platform

UnLock

[C#] public string Platform {get;}

[C++] public: _property String* get_Platform( );

[VB] Public ReadOnly Property Platform As String

[JScript] public function get Platform( ): String;

Description

Gets the name of the platform that the client uses.

Some possible Platform values are: Unknown, Win95, Win98, WinNT (which includes Windows 2000), Win16, WinCE, Mac68K, MacPPC, UNIX, and WebTV.

Tables

UnLock

[C#] public bool Tables {get;}

[C++] public: _property bool get_Tables( );

[VB] Public ReadOnly Property Tables As Boolean

[JScript] public function get Tables( ): Boolean;

Description

Gets a value indicating whether the client browser supports HTML tables.

TagWriter

UnLock

[C#] public Type TagWriter {get;}

[C++] public: _property Type* get_TagWriter( );

[VB] Public ReadOnly Property TagWriter As Type

[JScript] public function get TagWriter( ): Type;

Description

Type

UnLock

[C#] public string Type {get;}

[C++] public: _property String* get_Type( );

[VB] Public ReadOnly Property Type As String

[JScript] public function get Type( ): String;

Description

Gets the name and major (that is, integer) version number of the client browser.

VBScript

UnLock

[C#] public bool VBScript {get;}

[C++] public: _property bool get_VBScript( );

[VB] Public ReadOnly Property VBScript As Boolean

[JScript] public function get VBScript( ): Boolean;

Description

Gets a value indicating whether the client browser supports VBScript.

Version

UnLock

[C#] public string Version {get;}

[C++] public: _property String* get_Version( );

[VB] Public ReadOnly Property Version As String

[JScript] public function get Version( ): String;

Description

Gets the full (integer and decimal) version number of the client browser.

W3CDomVersion

UnLock

[C#] public Version W3CDomVersion {get;}

[C++] public: _property Version* get_W3CDomVersion( );

[VB] Public ReadOnly Property W3CDomVersion As Version

[JScript] public function get W3CDomVersion( ): Version;

Description

Gets the version of the World Wide Web Consortium (W3C) XML Document Object Model (DOM) that the client browser supports.

Win16

UnLock

[C#] public bool Win16 {get;}

[C++] public: _property bool get_Win16( );

[VB] Public ReadOnly Property Win16 As Boolean

[JScript] public function get Win16( ): Boolean;

Description

Gets a value indicating whether the client is a Win16-based machine.

Win32

UnLock

[C#] public bool Win32 {get;}

[C++] public: _property bool get_Win32( );

[VB] Public ReadOnly Property Win32 As Boolean

[JScript] public function get Win32( ): Boolean;

Description

Gets a value indicating whether the client is a Win32-based machine.

HttpCacheability enumeration (System.Web)

ToString

Description

Provides enumerated values that are used to set the Cache-Control HTTP header.

ToString

[C#] public const HttpCacheability NoCache;

[C++] public: const HttpCacheability NoCache;

[VB] Public Const NoCache As HttpCacheability

[JScript] public var NoCache: HttpCacheability;

Description

Sets the Cache-Control: no-cache header. Without a field name, the directive applies to the entire request and a shared (proxy server) cache must force a successful revalidation with the origin Web server before satisfying the request. With a field name, the directive applies only to the named field; the rest of the response may be supplied from a shared cache.

ToString

[C#] public const HttpCacheability Private;

[C++] public: const HttpCacheability Private;

[VB] Public Const Private As HttpCacheability

[JScript] public var Private: HttpCacheability;

Description

Default value. Sets Cache-Control: private to specify that the response is cacheable only on the client and not by shared (proxy server) caches.

ToString

[C#] public const HttpCacheability Public;

[C++]public: const HttpCacheability Public;

[VB] Public Const Public As HttpCacheability

[JScript] public var Public: HttpCacheability;

Description

Sets Cache-Control: public to specify that the response is cacheable by clients and shared (proxy) caches.

ToString

[C#] public const HttpCacheability Server;

[C++] public: const HttpCacheability Server;

[VB] Public Const Server As HttpCacheability

[JScript] public var Server: HttpCacheability;

Description

Specifies that the response is cached only at the origin server. Similar to the NoCache option. Clients receive a Cache-Control: no-cache directive but the document is cached on the origin server.

HttpCachePolicy class (System.Web)

ToString

Description

Contains methods for setting cache-specific HTTP headers and for controlling the ASP.NET page output cache.

For background information on HTTP headers and controlling caching, see the document RFC 2616: Hypertext Transfer Protocol—HTTP/1.1, available on the World Wide Web Consortium's site at http://www.w3c.org.

VaryByHeaders

ToString

[C#] public HttpCacheVaryByHeaders VaryByHeaders {get;}

[C++] public: _property HttpCacheVaryByHeaders* get_VaryByHeaders( );

[VB] Public ReadOnly Property VaryByHeaders As HttpCacheVaryByHeaders

[JScript] public function get VaryByHeaders( ): HttpCacheVaryByHeaders;

Description

Gets the list of all HTTP headers that will be used to vary cache output.

When a cached item has several vary headers, a separate version of the requested document is available from the cache for each HTTP header type.

VaryByParams

ToString

[C#] public HttpCacheVaryByParams VaryByParams {get;}

[C++] public: _property HttpCacheVaryByParams* get_VaryByParams( );

[VB] Public ReadOnly Property VaryByParams As HttpCacheVaryByParams

[JScript] public function get VaryByParams( ): HttpCacheVaryByParams;

Description

Gets the list of parameters received by a GET (querystring) or POST (in the body of the HTTP request) that affect caching.

For each named parameter in VaryByParams a separate version of the requested document is available from the cache, the version varying by the parameter's value.

AddValidationCallback

[C#] public void AddValidationCallback(HttpCacheValidateHandler handler, object data);

[C++] public: void AddValidationCallback(HttpCacheValidateHandler* handler, Object* data);

[VB] Public Sub AddValidationCallback(ByVal handler As HttpCacheValidateHandler, ByVal data As Object)

[JScript] public function AddValidationCallback(handler: HttpCacheValidateHandler, data: Object);

Description

Registers a validation callback for the current response.

AddValidationCallback provides a mechanism to programmatically check the validity of a item in the cache before the item is returned from the cache. The System.Web.HttpCacheValidateHandler value. The arbitrary user-supplied data that is passed back to the AddValidationCallback delegate.

AppendCacheExtension

[C#] public void AppendCacheExtension(string extension);

[C++] public: void AppendCacheExtension(String* extension);

[VB] Public Sub AppendCacheExtension(ByVal extension As String)

[JScript] public function AppendCacheExtension(extension: String);

Description

Appends the specified text to the Cache-Control HTTP header.

If the browser does not recognize cache control directives or extensions, the browser must ignore the unrecognized terms. For more information, see the document RFC 2616: Hypertext Transfer Protocol—HTTP/1.1, available on the World Wide Web Consortium's site at http://www.w3c.org. The text to append to the Cache-Control header.

SetCacheability

[C#] public void SetCacheability(HttpCacheability cacheability);

[C++] public: void SetCacheability(HttpCacheability cacheability);

[VB] Public Sub SetCacheability(ByVal cacheability As HttpCacheability)

[JScript] public function SetCacheability(cacheability: HttpCacheability); Sets the Cache-Control HTTP header. The Cache-Control HTTP header controls how documents are to be cached on the network.

Description

Sets the Cache-Control header to one of the values of System.Web.HttpCacheability. An System.Web.HttpCacheability enumeration value.

SetCacheability

[C#] public void SetCacheability(HttpCacheability cacheability, string field);

[C++] public: void SetCacheability(HttpCacheability cacheability, String* field);

[VB] Public Sub SetCacheability(ByVal cacheability As HttpCacheability, ByVal field As String)

[JScript] public function SetCacheability(cacheability: HttpCacheability, field: String);

Description

Sets the Cache-Control header to one of the values of System.Web.HttpCacheability and appends an extension to the directive.

The field name extension is valid only when used with the private or no-cache directives. For more information, see the document RFC 2616: Hypertext Transfer Protocol—HTTP/1.1, available on the World Wide Web Consortium's site at http://www.w3c.org. The System.Web.HttpCacheability enumeration value to set the header to. The cache control extension to add to the header.

SetETag

[C#] public void SetETag(string etag);

[C++] public: void SetETag(String* etag);

[VB] Public Sub SetETag(ByVal etag As String)

[JScript] public function SetETag(etag: String);

Description

Sets the ETag HTTP header to the specified string.

The ETag header is a unique identifier for a specific version of a document. Once an ETag header is set, subsequent attempts to set it will fail and an exception will be thrown. The text to use for the ETag header.

SetETagFromFileDependencies

[C#] public void SetETagFromFileDependencies( );

[C++] public: void SetETagFromFileDependencies( );

[VB] Public Sub SetETagFromFileDependencies( )

[JScript] public function SetETagFromFileDependencies( );

Description

Sets the ETag HTTP header based on the time stamps of the handler's file dependencies.

SetEtagFromFileDependencies sets the ETag header by retrieving the last modified time stamps of all files on which the handler is dependent, combining all file names and time stamps into a single string, then hashing that string into a single digest that is used as the ETag.

SetExpires

[C#] public void SetExpires(DateTime date);

[C++] public: Void SetExpires(DateTime date);

[VB] Public Sub SetExpires(ByVal date As DateTime)

[JScript] public function SetExpires(date: DateTime);

Description

Sets the Expires HTTP header to an absolute date and time.

This method will fail if the expiration date violates the principle of restrictiveness. The absolute System.DateTime value to set the Expiresheader to.

SetLastModified

[C#] public void SetLastModified(DateTime date);

[C++] public: void SetLastModified(DateTime date);

[VB] Public Sub SetLastModified(ByVal date As DateTime)

[JScript] public function SetLastModified(date: DateTime);

Description

Sets the Last-Modified HTTP header to the System.DateTime value supplied.

The Last-Modified HTTP header time stamps the document with the DateTime value indicating when the document was last modified. The new System.DateTime value for the Last-Modified header.

SetLastModifiedFromFileDependencies

[C#] public void SetLastModifiedFromFileDependencies( );

[C++] Public: void SetLastModifiedFromFileDependencies ( );

[VB] Public Sub SetLastModifiedFromFileDependencies( )

[JScript] public function SetLastModifiedFromFileDependencies( );

Description

Sets the Last-Modified HTTP header based on the time stamps of the handler's file dependencies.

SetMaxAge

[C#] public void SetMaxAge(TimeSpan delta);

[C++] public: void SetMaxAge(TimeSpan delta);

[VB] Public Sub SetMaxAge(ByVal delta As TimeSpan)

[JScript] public function SetMaxAge(delta: TimeSpan);

Description

Sets the Cache-Control: max-age HTTP header based on the specified time span.

Max-age is the maximum absolute time a document is allowed to exist before being considered stale. The time span used to set the Cache-Control: max-age header.

SetNoServerCaching

[C#] public void SetNoServerCaching( );

[C++] public: void SetNoServerCaching( );

[VB] Public Sub SetNoServerCaching( )

[JScript] public function SetNoServerCaching( );

Description

Stops all origin-server caching for the current response.

Explicitly denies caching of the document on the origin-server. Once set, all requests for the document are fully processed. When this method is invoked, caching cannot be reenabled for the current response.

SetNoStore

[C#] public void SetNoStore( );

[C++] public: void SetNoStore( );

[VB] Public Sub SetNoStore( )

[JScript] public function SetNoStore( );

Description

Sets the Cache-Control: no-store directive.

SetNoTransforms

[C#] public void SetNoTransforms( );

[C++] public: void SetNoTransforms( );

[VB] Public Sub SetNoTransforms( )

[JScript] public function SetNoTransforms( );

Description

Sets the CacheControl: no-transform directive.

The no-transform CacheControl setting instructs network caching applications to not modify the document.

SetProxyMaxAge

[C#] public void SetProxyMaxAge(TimeSpan delta);

[C++] public: void SetProxyMaxAge(TimeSpan delta);

[VB] Public Sub SetProxyMaxAge(ByVal delta As TimeSpan)

[JScript] public function SetProxyMaxAge(delta: TimeSpan);

Description

Sets the Cache-Control: s-maxage HTTP header based on the specified time span.

System.Web.HttpCachePolicy.SetProxyMaxAge(System.TimeSpan) does not use sliding expiration and will fail if the expiration date violates the principle of restrictiveness. The time span used to set the Cache-Control: s-maxage header.

SetRevalidation

[C#] public void SetRevalidation(HttpCacheRevalidation revalidation);

[C++] public: void SetRevalidation(HttpCacheRevalidation revalidation);

[VB] Public Sub SetRevalidation(ByVal revalidation As HttpCacheRevalidation)

[JScript] public function SetRevalidation(revalidation: HttpCacheRevalidation);

Description

Sets the Cache-Control HTTP header to either the must-revalidate or the proxy-revalidate directives based on the supplied enumeration value.

The default is to send neither directive in a header unless explicitly specified by this method. The System.Web.HttpCacheRevalidation enumeration value to set the Cache-Control header to.

SetSlidingExpiration

[C#] public void SetSlidingExpiration(bool slide);

[C++] public: void SetSlidingExpiration(bool slide);

[VB] Public Sub SetSlidingExpiration(ByVal slide As Boolean)

[JScript] public function SetSlidingExpiration(slide: Boolean);

Description

Sets cache expiration to sliding.

When cache expiration is set to sliding, the Cache-Control HTTP header will be renewed with each response. This expiration mode is identical to the IIS configuration option to add an expiration header to all output set relative to the current time. true or false.

SetValidUntilExpires

[C#] public void SetValidUntilExpires(bool validUntilExpires);

[C++] public: void SetValidUntilExpires(bool validUntilExpires);

[VB] Public Sub SetValidUntilExpires(ByVal validUntilExpires As Boolean)

[JScript] public function SetValidUntilExpires(validUntilExpires: Boolean);

Description

SetVaryByCustom

[C#] public void SetVaryByCustom(string custom);

[C++] public: void SetVaryByCustom(String* custom);

[VB] Public Sub SetVaryByCustom(ByVal custom As String)

[JScript] public function SetVaryByCustom(custom: String);

Description

Sets the Vary HTTP header to the specified text string. The text to set the Vary header to.

HttpCacheRevalidation enumeration (System.Web)

ToString

Description

Provides enumerated values that are used to set revalidation-specific Cache-Control HTTP headers.

ToString

[C#] public const HttpCacheRevalidation AllCaches;

[C++] public: const HttpCacheRevalidation AllCaches;

[VB] Public Const AllCaches As HttpCacheRevalidation

[JScript] public var AllCaches: HttpCacheRevalidation;

Description

Sets the Cache-Control: must-revalidate HTTP header.

ToString

[C#] public const HttpCacheRevalidation None;

[C++] public: const HttpCacheRevalidation None;

[VB] Public Const None As HttpCacheRevalidation

[JScript] public var None: HttpCacheRevalidation;

Description

Default value. If this value is set, no cache-revalidation directive is sent.

ToString

[C#] public const HttpCacheRevalidation ProxyCaches;

[C++] public: const HttpCacheRevalidation ProxyCaches;

[VB] Public Const ProxyCaches As HttpCacheRevalidation

[JScript] public var ProxyCaches: HttpCacheRevalidation;

Description

Sets the Cache-Control: proxy-revalidate HTTP header.

HttpCacheValidateHandler delegate (System.Web)

ToString

Description

Delegate method that is called when a cached item is validated. Cache items invalidated within the method are treated as cache misses. The System.Web.HttpContext object containing information about the current request. User-supplied data used to validate the cached item. A System.Web.HttpValidationStatus enumeration value.

If any handler invalidates the cached item, the item is evicted from the cache and the request is handled as a cache miss.

HttpCacheVaryByHeaders class (System.Web)

ToString

Description

Provides a type-safe way to set the Vary HTTP header.

The Vary header indicates the request-header fields that the server uses to determine which of multiple cached responses is sent in response to a client request.

AcceptTypes

ToString

[C#] public bool AcceptTypes {get; set;}

[C++] public: _property bool get_AcceptTypes( );public: _property void set_AcceptTypes(bool);

[VB] Public Property AcceptTypes As Boolean

[JScript] public function get AcceptTypes( ): Boolean;public function set AcceptTypes(Boolean);

Description

Gets or sets a value indicating whether the origin server adds the Accept field to the Vary HTTP header.

The Vary header indicates the request-header fields that the server uses to determine which of multiple cached responses is sent in response to a client request. The Accept field specifies that the server selects the response based on the media types acceptable to the client.

Item

ToString

[C#] public bool this[string header] {get; set;}

[C++] public: _property bool get_Item(String* header);public: _property void set_Item(String* header, bool);

[VB] Public Default Property Item(ByVal header As String) As Boolean

[JScript] returnValue=HttpCacheVaryByHeadersObject.Item (header);HttpCacheVaryByHeadersObject.Item(header)= returnValue;

Description

Gets or sets a value indicating whether the origin server should add a custom field to the Vary HTTP header.

The Vary header indicates the request-header fields that the server uses to determine which of multiple cached responses is sent in response to a client request. The name of the custom header.

UserAgent

ToString

[C#] public bool UserAgent {get; set;}

[C++] public: _property bool get_UserAgent( );public: _property void set_UserAgent(bool);

[VB] Public Property UserAgent As Boolean

[JScript] public function get UserAgent( ): Boolean;public function set UserAgent(Boolean);

Description

Gets or sets a value indicating whether the origin server adds the User-Agent field to the Vary HTTP header.

The Vary header indicates the request-header fields that the server uses to determine which of multiple cached responses is sent in response to a client request. The User-Agent field specifies that the server selects the response based on the type of client user-agent.

UserCharSet

ToString

[C#] public bool UserCharSet {get; set;}

[C++] public: _property bool get_UserCharSet( );public: _property void set_UserCharSet(bool);

[VB] Public Property UserCharSet As Boolean

[JScript] public function get UserCharSet( ): Boolean;public function set UserCharSet(Boolean);

Description

Gets or sets a value indicating whether the origin server should add the Accept-Charset field to the Vary HTTP header.

The Vary header indicates the request-header fields that the server uses to determine which of multiple cached responses is sent in response to a client request. The Accept-CharSet field specifies that the server selects the response based on the client's character set.

UserLanguage

ToString

[C#] public bool UserLanguage {get; set;}

[C++] public: _property bool get_UserLanguage( );public: _property void set_UserLanguage(bool);

[VB] Public Property UserLanguage As Boolean

[JScript] public function get UserLanguage( ): Boolean;public function set UserLanguage(Boolean);

Description

Gets or sets a value indicating whether the origin server adds the Accept-Language field to the Vary HTTP header.

The Vary header indicates the request-header fields that the server uses to determine which of multiple cached responses is sent in response to a client request. The Accept-Language field specifies that the server selects the response based on languages acceptable to the client.

VaryByUnspecifiedParameters

[C#] public void VaryByUnspecifiedParameters( );

[C++] public: void VaryByUnspecifiedParameters( );

[VB] Public Sub VaryByUnspecifiedParameters( )

[JScript] public function VaryByUnspecifiedParameters( );

Description

Sets the Vary HTTP header to the value * (an asterisk) and causes all other Vary header information to be dropped.

The Vary header indicates the request-header fields that the server uses to determine which of multiple cached responses is sent in response to a client request. The * field specifies that the server selects the response based on parameters not specified in request headers (for example, the network address of the client).

HttpCacheVaryByParams class (System.Web)

VaryByUnspecifiedParameters

Description

Indicates that a cache should contain multiple representations (cached responses) for a particular URI. This class is an encapsulation that provides a type-safe way to set the Vary HTTP header.

For more information on HTTP cache control headers, see RFC 2616: Hypertext Transfer Protocol—HTTP/1.1, available on the World Wide Web Consortium's Web site at http://www.w3c.org. See section 14, "Header Field Definitions", for complete details.

IgnoreParams

VaryByUnspecifiedParameters

[C#] public bool IgnoreParams {get; set;}

[C++] public: _property bool get_IgnoreParams( );public: _property void set_IgnoreParams(bool);
[VB] Public Property IgnoreParams As Boolean
[JScript] public function get IgnoreParams( ): Boolean;public function set IgnoreParams(Boolean);

Description

Gets or sets a value indicating whether HTTP header cache control parameters are ignored.

Item

VaryByUnspecifiedParameters

[C#] public bool this[string header] {get; set;}
[C++] public: _property bool get_Item(String* header);public: _property void set_Item(String* header, bool);
[VB] Public Default Property Item(ByVal header As String) As Boolean
[JScript] returnValue=HttpCacheVaryByParamsObject.Item(header);HttpCacheVaryByParamsObject.Item(header)=returnValue;

Description

Gets or sets the name of the cache-control header that is used to select one of several different cached responses. The name of the custom header.

HttpClientCertificate class (System.Web)

ToString

Description

The HttpClientCertificate collection retrieves the certification fields (specified in the X.509 standard) from a request issued by the Web browser.

AllKeys

BinaryIssuer

ToString

Description

CertEncoding

ToString

[C#] public int CertEncoding {get;}
[C++] public: _property int get_CertEncoding( );
[VB] Public ReadOnly Property CertEncoding As Integer
[JScript] public function get CertEncoding( ): int;

Description

Certificate

ToString

[C#] public byte[ ] Certificate {get;}
[C++] public: _property unsigned char get_Certificate( );
[VB] Public ReadOnly Property Certificate As Byte ( )
[JScript] public function get Certificate( ): Byte[ ];

Description

A string containing the binary stream of the entire certificate content in ASN.1 format.

Cookie

ToString

[C#] public string Cookie {get;}
[C++] public: _property String* get_Cookie( );
[VB] Public ReadOnly Property Cookie As String
[JScript] public function get Cookie( ): String;

Description

Count

Flags

ToString

Description

A set of flags that provide additional client certificate information.

IsPresent

ToString

[C#] public bool IsPresent {get;}
[C++] public: _property bool get_IsPresent( );
[VB] Public ReadOnly Property IsPresent As Boolean
[JScript] public function get IsPresent( ): Boolean;

Description

IsReadOnly

Issuer

ToString

Description

A string that contains a list of subfield values containing information about the certificate issuer.

IsValid

ToString

[C#] public bool IsValid {get;}
[C++] public: _property bool get_IsValid( );
[VB] Public ReadOnly Property IsValid As Boolean
[JScript] public function get IsValid( ): Boolean;

Description

Item

Item

Keys

KeySize

ToString

Description

PublicKey

ToString

[C#] public byte[ ] PublicKey {get;}
[C++] public: _property unsigned char get_PublicKey( );
[VB] Public ReadOnly Property PublicKey As Byte ( )
[JScript] public function get PublicKey( ): Byte[ ];

Description

SecretKeySize

ToString

[C#] public int SecretKeySize {get;}
[C++] public: _property int get_SecretKeySize( );
[VB] Public ReadOnly Property SecretKeySize As Integer
[JScript] public function get SecretKeySize( ): int;

Description

SerialNumber

ToString

[C#] public string SerialNumber {get;}
[C++] public: _property String* get_SerialNumber( );
[VB] Public ReadOnly Property SerialNumber As String
[JScript] public function get SerialNumber( ): String;

Description

A string that contains the certification serial number as an ASCII representation of hexadecimal bytes separated by hyphens (-). For example, 04-67-F3-02.

ServerIssuer

ToString

[C#] public string ServerIssuer {get;}
[C++] public: _property String* get_ServerIssuer( );
[VB] Public ReadOnly Property ServerIssuer As String
[JScript] public function get ServerIssuer( ): String;

Description

ServerSubject

ToString

[C#] public string ServerSubject {get;}
[C++] public: _property String* get_ServerSubject( );
[VB] Public ReadOnly Property ServerSubject As String
[JScript] public function get ServerSubject( ): String;

Description
Subject
ToString
[C#] public string Subject {get;}
[C++] public: _property String* get_Subject( );
[VB] Public ReadOnly Property Subject As String
[JScript] public function get Subject( ): String;

Description
A string that contains a list of subfield values that contain information about the subject of the certificate. If this value is specified without a SubField, the ClientCertificate collection returns a comma-separated list of subfields. For example, C=US, O=Msft, and so on.
ValidFrom
ToString
[C#] public DateTime ValidFrom {get;}
[C++] public: _property DateTime get_ValidFrom( );
[VB] Public ReadOnly Property ValidFrom As DateTime
[JScript] public function get ValidFrom( ): DateTime;

Description
A date specifying when the certificate becomes valid. This date varies with international settings.
ValidUntil
ToString
[C#] public DateTime ValidUntil {get;}
[C++] public: _property DateTime get_ValidUntil( );
[VB] Public ReadOnly Property ValidUntil As DateTime
[JScript] public function get ValidUntil( ): DateTime;

Description
A date specifying when the certificate expires. The year value is displayed as a four-digit number.
Get
[C#] public override string Get(string field);
[C++] public: String* Get(String* field);
[VB] Overrides Public Function Get(ByVal field As String) As String
[JScript] public override function Get(field: String): String;

Description
Allows access to individual items in the collection by name. The name of the item in the collection to retrieve.
HttpCompileException class (System.Web)
ToString Description
The exception that is thrown when a compiler error occurs.
HttpCompileException
Example Syntax:
ToString
[C#] public HttpCompileException(CompilerResults results, string sourceCode);
[C++] public: HttpCompileException(CompilerResults* results, String* sourceCode);
[VB] Public Sub New(ByVal results As CompilerResults, ByVal sourceCode As String)
[JScript] public function HttpCompileException(results: CompilerResults, sourceCode: String);

Description
Initializes a new instance of the System.Web.HttpCompileException class. A System.CodeDom.Compiler.CompilerResults containing compiler output and error information. The name of the file being compiled when the error occurs.
ErrorCode
HelpLink
HResult
InnerException
Message
Results
ToString Description
Gets compiler output and error information for the exception.
Source
SourceCode
ToString Description
Gets the name of the source file being compiled when the error occurs.
StackTrace
TargetSite
HttpContext class (System.Web)
ToString Description
Encapsulates all HTTP-specific information about an individual HTTP request.
Classes that inherit the System.Web.IHttpModule and System.Web.IHttpHandler interfaces are provided a reference to an HttpContext object for the current HTTP request. The object provides access to the intrinsic System.Web.HttpContext.Request, System.Web.HttpContext.Response, and System.Web.HttpContext.Server objects for the request.
HttpContext
Example Syntax:
ToString
[C#] public HttpContext(HttpWorkerRequest wr);
[C++] public: HttpContext(HttpWorkerRequest* wr);
[VB] Public Sub New(ByVal wr As HttpWorkerRequest)
[JScript] public function HttpContext(wr: HttpWorkerRequest);

Description
Initializes a new instance of the System.Web.HttpContext class. The System.Web.HttpWorkerRequest object for the current HTTP request.
HttpContext
Example Syntax:
ToString
[C#] public HttpContext(HttpRequest request, HttpResponse response);
[C++] public: HttpContext(HttpRequest* request, HttpResponse* response);
[VB] Public Sub New(ByVal request As HttpRequest, ByVal response As HttpResponse)
[JScript] public function HttpContext(request: HttpRequest, response: HttpResponse); Initializes a new instance of the System.Web.HttpContext class.

Description
Initializes a new instance of the System.Web.HttpContext class. The System.Web.HttpRequest object for the current HTTP request. The System.Web.HttpResponse object for the current HTTP request.
AllErrors
ToString
[C#] public Exception[ ] AllErrors {get;}
[C++] public: _property Exception* get_AllErrors( );
[VB] Public ReadOnly Property AllErrors As Exception ( )
[JScript] public function get AllErrors( ): Exception[ ];

Description
Gets an array of errors accumulated while processing an HTTP request.

Application

ToString

[C#] public HttpApplicationState Application {get;}

[C++] public: _property HttpApplicationState* get_Application( );

[VB] Public ReadOnly Property Application As HttpApplicationState

[JScript] public function get Application( ): HttpApplicationState;

Description

Gets the System.Web.HttpApplicationState object for the current HTTP request.

ApplicationInstance

ToString

[C#] public HttpApplication ApplicationInstance {get; set;}

[C++] public: _property HttpApplication* get_ApplicationInstance( );public: _property void set_ApplicationInstance (HttpApplication*);

[VB] Public Property ApplicationInstance As HttpApplication

[JScript] public function get ApplicationInstance( ): HttpApplication;public function set ApplicationInstance(HttpApplication);

Description

Gets or sets the System.Web.HttpApplicationState object for the current HTTP request.

Cache

ToString

[C#] public Cache Cache {get;}

[C++] public: _property Cache* get_Cache( );

[VB] Public ReadOnly Property Cache As Cache

[JScript] public function get Cache( ): Cache;

Description

Gets the System.Web.Caching.Cache object for the current HTTP request.

Current

ToString

[C#] public static HttpContext Current {get;}

[C++] public: _property static HttpContext* get_Current( );

[VB] Public Shared ReadOnly Property Current As HttpContext

[JScript] public static function get Current( ): HttpContext;

Description

Gets the System.Web.HttpContext object for the current HTTP request.

Error

ToString

[C#] public Exception Error {get;}

[C++] public: _property Exception* get_Error( );

[VB] Public ReadOnly Property Error As Exception

[JScript] public function get Error( ): Exception;

Description

Gets the first error (if any) accumulated during HTTP request processing.

Handler

ToString

[C#] public IHttpHandler Handler {get; set;}

[C++] public: _property IHttpHandler* get_Handler( );public: _property void set_Handler(IHttpHandler*);

[VB] Public Property Handler As IHttpHandler

[JScript] public function get Handler( ): IHttpHandler;public function set Handler(IHttpHandler);

Description

Gets or sets the System.Web.IHttpHandler object for the current HTTP request.

IsCustomErrorEnabled

ToString

[C#] public bool IsCustomErrorEnabled {get;}

[C++] public: _property bool get_IsCustomErrorEnabled( );

[VB] Public ReadOnly Property IsCustomErrorEnabled As Boolean

[JScript] public function get IsCustomErrorEnabled( ): Boolean;

Description

Gets a value indicating whether custom errors are enabled for the current HTTP request.

IsDebuggingEnabled

ToString

[C#] public bool IsDebuggingEnabled {get;}

[C++] public: _property bool get_IsDebuggingEnabled( );

[VB] Public ReadOnly Property IsDebuggingEnabled As Boolean

[JScript] public function get IsDebuggingEnabled( ): Boolean;

Description

Gets a value indicating whether the current HTTP request is in debug mode.

Items

ToString

[C#] public IDictionary Items {get;}

[C++] public: _property IDictionary* get_Items( );

[VB] Public ReadOnly Property Items As IDictionary

[JScript] public function get Items( ): IDictionary;

Description

Gets a key-value collection that can be used to organize and share data between an System.Web.IHttpModule and an System.Web.IHttpHandler during an HTTP request.

Request

ToString

[C#] public HttpRequest Request {get;}

[C++] public: _property HttpRequest* get_Request( );

[VB] Public ReadOnly Property Request As HttpRequest

[JScript] public function get Request( ): HttpRequest;

Description

Gets the System.Web.HttpRequest object for the current HTTP request.

Response

ToString

[C#] public HttpResponse Response {get;}

[C++] public: _property HttpResponse* get_Response( );

[VB] Public ReadOnly Property Response As HttpResponse

[JScript] public function get Response( ): HttpResponse;

Description

Gets the System.Web.HttpResponse object for the current HTTP response.

Server

ToString

[C#] public HttpServerUtility Server {get;}

[C++] public: _property HttpServerUtility* get_Server( );

[VB] Public ReadOnly Property Server As HttpServerUtility

[JScript] public function get Server( ): HttpServerUtility;

Description

Gets the System.Web.HttpServerUtility object that provides methods used in processing Web requests.

Session

ToString

[C#] public HttpSessionState Session {get;}

[C++] public: _property HttpSessionState* get_Session( );
[VB] Public ReadOnly Property Session As HttpSessionState
[JScript] public function get Session( ): HttpSessionState;

Description

Gets the System.Web.SessionState instance for the current HTTP request.

SkipAuthorization

ToString

[C#] public bool SkipAuthorization {get; set;}
[C++] public: _property bool get_SkipAuthorization( );public: _property void set SkipAuthorization(bool);
[VB] Public Property SkipAuthorization As Boolean
[JScript] public function get SkipAuthorization( ): Boolean; public function set SkipAuthorization(Boolean);

Description

Gets or sets a value that specifies whether the URLAuthorization module will skip the authorization check for the current request.

SkipAuthorization is for advanced use by authentication modules that need to redirect to an anonymous-allowed page. The Forms authentication module and Passport authentication module both set this property when redirecting to a configured login page. Setting this requires the ControlPrincipal flag to be set in System.Security.Permissions.SecurityPermission.Flags.

Timestamp

ToString

[C#] public DateTime Timestamp {get;}
[C++] public: _property DateTime get_Timestamp( );
[VB] Public ReadOnly Property Timestamp As DateTime
[JScript] public function get Timestamp( ): DateTime;

Description

Gets the initial timestamp of the current HTTP request.

Trace

ToString

[C#] public TraceContext Trace {get;}
[C++] public: _property TraceContext* get_Trace( );
[VB] Public ReadOnly Property Trace As TraceContext
[JScript] public function get Trace( ): TraceContext;

Description

Gets the System.Web.TraceContext object for the current HTTP response.

User

ToString

[C#] public IPrincipal User {get; set;}
[C++] public: _property Iprincipal* get_User( ); public: _property void set_User(IPrincipal*);
[VB] Public Property User As IPrincipal
[JScript] public function get User( ): IPrincipal;public function set User(IPrincipal);

Description

Gets or sets security information for the current HTTP request.

Setting this property requires the ControlPrincipal flag to be set in System.Security.Permissions.SecurityPermission.Flags.

AddError

[C#] public void AddError(Exception errorInfo);
[C++] public: void AddError(Exception* errorInfo);
[VB] Public Sub AddError(ByVal errorInfo As Exception)
[JScript] public function AddError(errorInfo: Exception);

Description

Adds an exception to the exception collection for the current HTTP request. The System.Exception object to add to the exception collection.

ClearError

[C#] public void ClearError( );
[C++] public: void ClearError( );
[VB] Public Sub ClearError( )
[JScript] public function ClearError( );

Description

Clears all errors for the current HTTP request.

GetAppConfig

[C#] public static object GetAppConfig(string name);
[C++] public: static Object* GetAppConfig(String* name);
[VB] Public Shared Function GetAppConfig(ByVal name As String) As Object
[JScript] public static function GetAppConfig(name: String): Object;

Description

Returns requested configuration information for the current application The application configuration tag that information is requested for.

GetConfig

[C#] public object GetConfig(string name);
[C++] public: Object* GetConfig(String* name);
[VB] Public Function GetConfig(ByVal name As String) As Object
[JScript] public function GetConfig(name: String): Object;

Returns requested configuration information for the current HTTP request.

Description

Returns requested configuration information for the current HTTP request. The configuration tag that information is requested for.

RewritePath

[C#] public void RewritePath(string path);
[C++] public: Void RewritePath(String* path);
[VB] Public Sub RewritePath(ByVal path As String)
[JScript] public function RewritePath(path: String);

Description

Assigns an internal rewrite path. The internal rewrite path.

IServiceProvider.GetService

[C#] object IServiceProvider.GetService(Type service);
[C++] Object* IServiceProvider::GetService(Type* service);
[VB] Function GetService(ByVal service As Type) As Object Implements IServiceProvider.GetService
[JScript] function IServiceProvider.GetService(service: Type): Object;

HttpCookie class (System.Web)

ToString

Description

Provides a type-safe way to create and manipulate individual HTTP cookies.

The System.Web.HttpCookie class gets and sets properties of individual cookies. The System.Web.HttpCookieCollection class provides methods to store, retrieve, and manage all the cookies for an entire Web application. ASP.NET code uses the intrinsic System.Web.HttpResponse.Cookies object to create cookies and add them to the cookie collection. When delivering a Web page to a client, the server sends the entire cookie collection with the Set-Cookie header.

HttpCookie

Example Syntax:

ToString

[C#] public HttpCookie(string name);
[C++] public: HttpCookle(String* name);
[VB] Public Sub New(ByVal name As String)
[JScript] public function HttpCookie(name: String); Initializes a new instance of the System.Web.HttpCookie class.

Description
Creates and names a new cookie. The name of the new cookie.
HttpCookie
Example Syntax:
ToString
[C#] public HttpCookie(string name, string value);
[C++] public: HttpCookle(String* name, String* value);
[VB] Public Sub New(ByVal name As String, ByVal value As String)
[JScript] public function HttpCookie(name: String, value: String);

Description
Creates, names, and assigns a value to a new cookie. The name of the new cookie. The value of the new cookie.
Domain
ToString
[C#] public string Domain {get; set;}
[C++] public: _property String* get_Domain( );public: _property void set_Domain(String*);
[VB] Public Property Domain As String
[JScript] public function get Domain( ): String;public function set Domain(String);

Description
Gets or sets the domain to associate the cookie with.
Setting the Domain attribute limits transmission of the cookie to clients requesting a resource from that domain.
Expires
ToString
[C#] public DateTime Expires {get; set;}
[C++] public: _property DateTime get_Expires( );
public: _property void set_Expires(DateTime);
[VB] Public Property Expires As DateTime
[JScript] public function get Expires( ): DateTime;public function set Expires(DateTime);

Description
Gets or sets the expiration date and time for the cookie.
HasKeys
ToString
[C#] public bool HasKeys {get;}
[C++] public: _property bool get_HasKeys( );
[VB] Public ReadOnly Property HasKeys As Boolean
[JScript] public function get HasKeys( ): Boolean;

Description
Gets a value indicating whether a cookie has subkeys.
Item
ToString
[C#] public string this[string key] {get; set;}
[C++] public: _property String* get_Item(String* key);public: _property void set_Item(String* key, String*);
[VB] Public Default Property Item(ByVal key As String) As String
[JScript] returnValue =HttpCookieObject.Item(key);HttpCookieObject.Item(key)=returnValue;

Description
Shortcut for HttpCookie.Values[key]. This property is provided for compatibility with previous versions of ASP. Key (index) of cookie value.
Name
ToString
[C#] public string Name {get; set;}
[C++] public: _property String* get_Name( );public: _property void set_Name(String*);
[VB] Public Property Name As String
[JScript] public function get Name( ): String;public function set Name(String);

Description
Gets or sets the name of a cookie.
Path
ToString
[C#] public string Path {get; set;}
[C++] public: _property String* get_Path( );public: _property void set_Path(String*);
[VB] Public Property Path As String
[JScript] public function get Path( ): String;public function set Path(String);

Description
Gets or sets the virtual path to transmit with the current cookie.
The Path property extends the Domain property to completely describe the specific URL that the cookie applies to. For example, in the URL http:/www.microsoft.com/asp, the domain is www.microsoft.com and the path is /asp.
Secure
ToString
[C#] public bool Secure {get; set;}
[C++] public: _property bool get_Secure( );public: _property void set_Secure(bool);
[VB] Public Property Secure As Boolean
[JScript] public function get Secure( ): Boolean;public function set Secure(Boolean);

Description
Gets or sets a value indicating whether to transmit the cookie securely (that is, over HTTPS only).
Value
ToString
[C#] public string Value {get; set;}
[C++] public: _property String* get_Value( );public: _property void set_Value(String*);
[VB] Public Property Value As String
[JScript] public function get Value( ): String;public function set Value(String);

Description
Gets or sets an individual cookie value.
Values
ToString
[C#] public NameValueCollection Values {get;}
[C++] public: _property NameValueCollection* get_Values ( );
[VB] Public ReadOnly Property Values As NameValueCollection
[JScript] public function get Values( ): NameValueCollection;

Description
Gets a collection of key-and-value value pairs that are contained within a single cookie object.
HttpCookieCollection class (System.Web)
ToString Description
Provides a type-safe way to manipulate HTTP cookies.
HttpCookieCollection
Example Syntax:
ToString

[C#] public HttpCookieCollection( );
[C++] public: HttpCookieCollection( );
[VB] Public Sub New( )
[JScript] public function HttpCookieCollection( );

Description

Initializes a new instance of the System.Web.HttpCookieCollection class.

ASP.NET includes two intrinsic cookie collections. The collection accessible through System.Web.HttpRequest. Cookies contains cookies transmitted by the client to the server in the Cookie header. The collection accessible through System.Web.HttpResponse.Cookies contains cookies generated on the server and transmitted to the client in the Set-Cookie header.

AllKeys

ToString

[C#] public string[ ] AllKeys {get;}
[C++] public: _property String* get_AllKeys( );
[VB] Public ReadOnly Property AllKeys As String ( )
[JScript] public function get AllKeys( ): String[ ];

Description

Gets a string array containing all the keys (cookie names) in the cookie collection.

Count

IsReadOnly

Item

ToString

Description

Gets the cookie with the specified numerical index from the cookie collection. The index of the cookie to retrieve from the collection.

Item

ToString

[C#] public HttpCookie this[string name] {get;}
[C++] public: _property HttpCookie* get_Item(String* name);
[VB] Public Default ReadOnly Property Item(ByVal name As String) As HttpCookie
[JScript] returnValue=HttpCookieCollectionObject.Item (name); Gets the cookie with the specified name from the cookie collection. This property is overloaded to allow retrieval of cookies by either name or numerical index.

Description

Gets the cookie with the specified name from the cookie collection. Name of cookie to retrieve.

Keys

Add

[C#] public void Add(HttpCookie cookie);
[C++] public: Void Add(HttpCookle* cookie);
[VB] Public Sub Add(ByVal cookie As HttpCookie)
[JScript] public function Add(cookie: HttpCookie);

Description

Adds the specified cookie to the cookie collection.

Any number of cookie collections can exist within an application, but only the collection referenced by the intrinsic System.Web.HttpResponse.Cookies object is sent to the client. The System.Web.HttpCookie to add to the collection.

Clear

[C#] public void Clear( );
[C++] public: void Clear( );
[VB] Public Sub Clear( )
[JScript] public function Clear( );

Description

Clears all cookies from the cookie collection.

CopyTo

[C#] public void CopyTo(Array dest, int index);
[C++] public: void CopyTo(Array* dest, int index);
[VB] Public Sub CopyTo(ByVal dest As Array, ByVal index As Integer)
[JScript] public function CopyTo(dest: Array, index: int);

Description

Copies members of the cookie collection to an System.Array beginning at the specified index of the array. The destination System.Array. The index of the destination array where copying starts.

Get

[C#] public HttpCookie Get(int index);
[C++] public: HttpCookie* Get(int index);
[VB] Public Function Get(ByVal index As Integer) As HttpCookie
[JScript] public function Get(index: int): HttpCookie;

Description

Returns the System.Web.HttpCookie item with the specified index from the cookie collection. The index of the cookie to return from the collection.

Get

[C#] public HttpCookie Get(string name);
[C++] public: HttpCookie* Get(String* name);
[VB] Public Function Get(ByVal name As String) As HttpCookie
[JScript] public function Get(name: String): HttpCookie; Returns an individual System.Web.HttpCookie object from the cookie collection. This property is overloaded to allow retrieval of cookies by either name or numerical index.

Description

Returns the System.Web.HttpCookie item with the specified name from the cookie collection.

If the named cookie does not exist, this method creates a new cookie with that name. The name of the cookie to retrieve from the collection.

GetKey

[C#] public string GetKey(int index);
[C++] public: String* GetKey(int index);
[VB] Public Function GetKey(ByVal index As Integer) As String
[JScript] public function GetKey(index: int): String;

Description

Returns the key (name) of the cookie at the specified numerical index. The index of the key to retrieve from the collection.

Remove

[C#] public void Remove(string name);
[C++] public: void Remove(String* name);
[VB] Public Sub Remove(ByVal name As String)
[JScript] public function Remove(name: String);

Description

Removes the cookie with the specified name from the collection. The name of the cookie to remove from the collection.

Set

[C#] public void Set(HttpCookie cookie);
[C++] public: void Set(HttpCookle* cookie);
[VB] Public Sub Set(ByVal cookie As HttpCookie)
[JScript] public function Set(cookie: HttpCookie);

Description

Updates the value of an existing cookie in a cookie collection. The System.Web.HttpCookie object to update.

HttpException class (System.Web)

ToString

Description

Provides a means of generating HTTP exceptions.

HttpException

Example Syntax:

ToString

[C#] public HttpException( );

[C++] public: HttpException( );

[VB] Public Sub New( )

[JScript] public function HttpException( ); Constructs a new System.Exception object.

Description

Constructs an empty Exception object.

When handling exceptions, it is sometimes useful to capture a series of related exceptions with the outer exceptions being thrown in response to an inner exceptions.

HttpException

Example Syntax:

ToString

[C#] public HttpException(string message);

[C++] public: HttpException(String* message);

[VB] Public Sub New(ByVal message As String)

[JScript] public function HttpException(message: String);

Description

Constructs an System.Exception using a supplied error message. The message displayed to the client when the exception is thrown.

HttpException

Example Syntax:

ToString

[C#] public HttpException(int httpCode, string message);

[C++] public: HttpException(int httpCode, String* message);

[VB] Public Sub New(ByVal httpCode As Integer, ByVal message As String)

[JScript] public function HttpException(httpCode: int, message: String);

Description

Constructs an System.Exception using an HTTP error code and an error message. The HTTP error code displayed on the client. The message displayed to the client when the exception is thrown.

HttpException

Example Syntax:

ToString

[C#] public HttpException(string message, Exception innerException);

[C++] public: HttpException(String* message, Exception* innerException);

[VB] Public Sub New(ByVal message As String, ByVal innerException As Exception)

[JScript] public function HttpException(message: String, innerException: Exception);

Description

Constructs an System.Exception using an error message and the System.Exception.InnerException property.

When handling exceptions, it is sometimes useful to capture a series of related exceptions with the outer exceptions being thrown in response to an inner exception. The message displayed to the client when the exception is thrown. The System.Exception.InnerException, if any, that threw the current exception.

HttpException

Example Syntax:

ToString

[C#] public HttpException(string message, int hr);

[C++] public: HttpException(String* message, int hr);

[VB] Public Sub New(ByVal message As String, ByVal hr As Integer)

[JScript] public function HttpException(message: String, hr: int);

Description

Constructs an System.Exception using error message and an exception code. The error message displayed to the client when the exception is thrown. The exception code that defines the error.

HttpException

Example Syntax:

ToString

[C#] public HttpException(int httpCode, string message, Exception innerException);

[C++] public: HttpException(int httpCode, String* message, Exception* innerException);

[VB] Public Sub New(ByVal httpCode As Integer, ByVal message As String, ByVal innerException As Exception)

[JScript] public function HttpException(httpCode: int, message: String, innerException Exception);

Description

Constructs an System.Exception using an HTTP error code, an error message, and the System.Exception.InnerException property.

When handling exceptions, it is sometimes useful to capture a series of related exceptions with the outer exceptions being thrown in response to an inner exceptions. The HTTP error code displayed to the client. The message displayed to the client. The InnerException, if any, that threw the current exception.

HttpException

Example Syntax:

ToString

[C#] public HttpException(int httpCode, string message, int hr);

[C++] public: HttpException(int httpCode, String* message, int hr);

[VB] Public Sub New(ByVal httpCode As Integer, ByVal message As String, ByVal hr As Integer)

[JScript] public function HttpException(httpCode: int, message: String, hr: int);

Description

Constructs an System.Exception using HTTP error code, an error message, and an exception code. The HTTP error code displayed on the client. The error message displayed to the client. The error code that defines the error.

ErrorCode

HelpLink

HResult

InnerException

Message

Source

StackTrace

TargetSite

CreateFromLastError

[C#] public static HttpException CreateFromLastError (string message);

[C++] public: static HttpException* CreateFromLastError (String* message);
[VB] Public Shared Function CreateFromLastError(ByVal message As String) As HttpException
[JScript] public static function CreateFromLastError(message: String): HttpException;

Description

Creates a new System.Exception based on the previous Exception.

Return Value: An Exception with the same error identification code as the previous Exception but with a new message. The message to be displayed to the client when the exception is thrown.

GetHtmlErrorMessage
[C#] public string GetHtmlErrorMessage( );
[C++] public: String* GetHtmlErrorMessage( );
[VB] Public Function GetHtmlErrorMessage( ) As String
[JScript] public function GetHtmlErrorMessage( ) String;

Description

Returns the HTTP error message to send back to the client.

Return Value: The HTTP error message.

GetHttpCode
[C#] public int GetHttpCode( );
[C++] public: int GetHttpCode( );
[VB] Public Function GetHttpCode( ) As Integer
[JScript] public function GetHttpCode( ): int;

Description

Returns the HTTP error code to send back to the client. If there is a nonzero HTTP code, it is returned. Otherwise, the System.Exception.InnerException code is returned. If neither an InnerException code nor a nonzero HTTP code is available, the HTTP error code 500 is returned.

Return Value: The HTTP code representing the exception.

HttpFileCollection class (System.Web)
ToString

Description

Provides access to and organizes files uploaded by a client.

Clients encode files and transmit them in the content body using multipart MIME format with an HTTP Content-Type header of multipart/form-data. ASP.NET extracts the encoded file(s) from the content body into individual members of an System.Web.HttpFileCollection. Methods and properties of the System.Web.HttpPostedFile class provide access to the contents and properties of each file.

AllKeys
ToString
[C#] public string[ ] AllKeys {get;}
[C++] public: _property String* get_AllKeys( );
[VB] Public ReadOnly Property AllKeys As String ( )
[JScript] public function get AllKeys( ): String[ ];

Description

Gets a string array containing the keys (names) of all members in the file collection.

Count
IsReadOnly
Item
ToString

Description

Gets the object with the specified numerical index from the System.Web.HttpFileCollection. The index of the item to get from the file collection.

Item
ToString
[C#] public HttpPostedFile this[string name] {get;}
[C++] public: _property HttpPostedFile* get_Item(String* name);
[VB] Public Default ReadOnly Property Item(ByVal name As String) As HttpPostedFile
[JScript] returnValue=HttpFileCollectionObject.Item (name); Gets an individual System.Web.HttpPostedFile object from the file collection. This property is overloaded to allow retrieval of objects by either name or numerical index.

Description

Gets the object with the specified name from the file collection. Name of item to be returned.

Keys
CopyTo
[C#] public void CopyTo(Array dest, int index);
[C++] public: void CopyTo(Array* dest, int index);
[VB] Public Sub CopyTo(ByVal dest As Array, ByVal index As Integer)
[JScript] public function CopyTo(dest: Array, index: int);

Description

Copies members of the file collection to an System.Array beginning at the specified index of the array. The destination System.Array. The index of the destination array where copying starts.

Get
[C#] public HttpPostedFile Get(int index);
[C++] public: HttpPostedFile* Get(int index);
[VB] Public Function Get(ByVal index As Integer) As HttpPostedFile
[JScript] public function Get(index: int): HttpPostedFile;

Description

Returns the System.Web.HttpPostedFile object with the specified numerical index from the file collection. The index of the object to be returned from the file collection.

Get
[C#] public HttpPostedFile Get(string name);
[C++] public: HttpPostedFile* Get(String* name);
[VB] Public Function Get(ByVal name As String) As HttpPostedFile
[JScript] public function Get(name: String): HttpPostedFile;
Returns an individual System.Web.HttpPostedFile object from a file collection. This property is overloaded to allow retrieval of objects by either name or numerical index.

Description

Returns the System.Web.HttpPostedFile object with the specified name from the file collection. The name of the object to be returned from a file collection.

GetKey
[C#] public string GetKey(int index);
[C++] public: String* GetKey(int index);
[VB] Public Function GetKey(ByVal index As Integer) As String
[JScript] public function GetKey(index: int): String;

Description

Returns the name of the System.Web.HttpFileCollection member with the specified numerical index. The index of the object name to be returned.

HttpModuleCollection class (System.Web)
ToString

Description

Provides a means of indexing and retrieving a collection of System.Web.IHttpModule objects.

AllKeys

ToString

[C#] public string[ ] AllKeys {get;}

[C++] public: _property String* get_AllKeys( );

[VB] Public ReadOnly Property AllKeys As String ( )

[JScript] public function get AllKeys( ): String[ ];

Description

Gets a string array containing all the keys (module names) in the System.Web.HttpModuleCollection.

Count

IsReadOnly

Item

ToString

Description

Gets the System.Web.IHttpModule object with the specified numerical index from the System.Web.HttpModuleCollection. The index of the System.Web.IHttpModule object to retrieve from the collection.

Item

ToString

[C#] public IHttpModule this[string name] {get;}

[C++] public: _property IHttpModule* get_Item(String* name);

[VB] Public Default ReadOnly Property Item(ByVal name As String) As IHttpModule

[JScript] returnValue=HttpModuleCollectionObject.Item (name); Gets the System.Web.IHttpModule object with the specified name from the System.Web.HttpModuleCollection. This property is overloaded to allow retrieval of modules by either name or numerical index.

Description

Gets the System.Web.IHttpModule object with the specified name from the System.Web.HttpModuleCollection. Key of the item to be retrieved.

Keys

CopyTo

[C#] public void CopyTo(Array dest, int index);

[C++] public: void CopyTo(Array * dest, int index);

[VB] Public Sub CopyTo(ByVal dest As Array, ByVal index As Integer)

[JScript] public function CopyTo(dest: Array, index: int);

Description

Copies members of the module collection to an System.Array beginning at the specified index of the array. The destination Array. The index of the destination Array where copying starts.

Get

[C#] public IHttpModule Get(int index);

[C++] public: IHttpModule* Get(int index);

[VB] Public Function Get(ByVal index As Integer) As IHttpModule

[JScript] public function Get(index: int): IHttpModule;

Description

Returns the System.Web.IHttpModule object with the specified index from the System.Web.HttpModuleCollection. Index of the System.Web.IHttpModule object to return from the collection.

Get

[C#] public IHttpModule Get(string name);

[C++] public: IHttpModule* Get(String* name);

[VB] Public Function Get(ByVal name As String) As IHttpModule

[JScript] public function Get(name: String): IHttpModule; Returns an individual System.Web.IHttpModule object from the System.Web.HttpModuleCollection. This property is overloaded to allow retrieval of modules by either name or numerical index.

Description

Returns the System.Web.IHttpModule object with the specified name from the System.Web.HttpModuleCollection. Key of the item to be retrieved.

GetKey

[C#] public string GetKey(int index);

[C++] public: String* GetKey(int index);

[VB] Public Function GetKey(ByVal index As Integer) As String

[JScript] public function GetKey(index: int): String;

Description

Returns the key (name) of the System.Web.IHttpModule object at the specified numerical index. Index of the key to retrieve from the collection.

HttpParseException class (System.Web)

ToString

Description

The exception that is thrown when a parse error occurs.

HttpParseException

Example Syntax:

ToString

[C#] public HttpParseException(string message, Exception innerException, string fileName, int line);

[C++] public: HttpParseException(String* message, Exception* innerException, String* filename, int line);

[VB] Public Sub New(ByVal message As String, ByVal innerException As Exception, ByVal fileName As String, ByVal line As Integer)

[JScript] public function HttpParseException(message: String, innerException: Exception, fileName: String, line: int);

Description

Initializes a new instance of the System.Web.HttpParseException class. The message displayed to the client when the exception is thrown. The System.Exception, if any, that threw the current exception. The name of the file being parsed when the error occurs. The number of the line being parsed when the error occurs.

ErrorCode

FileName

ToString

Description

Gets the name of the file being parsed when the error occurs.

HelpLink

HResult

InnerException

Line

ToString

Description

Gets the number of the line being parsed when the error occurs.

Message

Source

StackTrace

TargetSite

HttpPostedFile class (System.Web)

ToString

Description

Provides a way to access individual files that have been uploaded by a client.

The System.Web.HttpFileCollection class provides access to all the files uploaded from a client as a file collection.

ContentLength

ToString

[C#] public int ContentLength {get;}

[C++] public: _property int get_ContentLength( );

[VB] Public ReadOnly Property ContentLength As Integer

[JScript] public function get ContentLength( ): int;

Description

Gets the size in bytes of an uploaded file.

ContentType

ToString

[C#] public string ContentType {get;}

[C++] public: _property String* get_ContentType( );

[VB] Public ReadOnly Property ContentType As String

[JScript] public function get ContentType( ): String;

Description

Gets the MIME content type of a file sent by a client.

FileName

ToString

[C#] public string FileName {get;}

[C++] public: _property String* get_FileName( );

[VB] Public ReadOnly Property FileName As String

[JScript] public function get FileName( ): String;

Description

Gets the fully-qualified name of the file on the client's machine (for example "C:\MyFiles\Test.txt").

InputStream

ToString

[C#] public Stream InputStream {get;}

[C++] public: _property Stream* get_InputStream( );

[VB] Public ReadOnly Property InputStream As Stream

[JScript] public function get InputStream( ): Stream;

Description

Gets a System.IO.Stream object which points to an uploaded file to prepare for reading the contents of the file.

SaveAs

[C#] public void SaveAs(string filename);

[C++] public: Void SaveAs(String* filename);

[VB] Public Sub SaveAs(ByVal filename As String)

[JScript] public function SaveAs(filename: String);

Description

Saves an uploaded MIME message body to a file on the server. The name of the file.

HttpRequest class (System.Web)

ToString

Description

Enables ASP.NET to read the HTTP values sent by a client during a Web request.

HttpRequest

Example Syntax:

ToString

[C#] public HttpRequest(string filename, string url, string queryString);

[C++] public: HttpRequest(String* filename, String* url, String* queryString);

[VB] Public Sub New(ByVal filename As String, ByVal url As String, ByVal queryString As String)

[JScript] public function HttpRequest(filename: String, url: String, queryString: String);

Description

Initializes an System.Web.HttpRequest object. The name of the file associated with the request. Information regarding the URL of the current request. The entire query string sent with the request (everything after the '?').

AcceptTypes

ToString

[C#] public string[ ] AcceptTypes {get;}

[C++] public: _property String* get_AcceptTypes( );

[VB] Public ReadOnly Property AcceptTypes As String ( )

[JScript] public function get AcceptTypes( ): String[ ];

Description

Gets a string array of client-supported MIME accept types.

ApplicationPath

ToString

[C#] public string ApplicationPath {get;}

[C++] public: _property String* get_ApplicationPath( );

[VB] Public ReadOnly Property ApplicationPath As String

[JScript] public function get ApplicationPath( ): String;

Description

Gets the ASP.NET application's virtual application root path on the server.

Browser

ToString

[C#] public HttpBrowserCapabilities Browser {get; set;}

[C++] public: _property HttpBrowserCapabilities* get_Browser( );public: _property void set_Browser(HttpBrowserCapabilities*);

[VB] Public Property Browser As HttpBrowserCapabilities

[JScript] public function get Browser( ): HttpBrowserCapabilities;public function set Browser(HttpBrowserCapabilities);

Description

Gets information about the requesting client's browser capabilities.

ClientCertificate

ToString

[C#] public HttpClientCertificate ClientCertificate {get;}

[C++] public: _property HttpClientCertificate* get_ClientCertificate( );

[VB] Public ReadOnly Property ClientCertificate As HttpClientCertificate

[JScript] public function get ClientCertificate( ): HttpClientCertificate;

Description

Gets the current request's client security certificate.

ContentEncoding

ToString

[C#] public Encoding ContentEncoding {get;}

[C++] public: _property Encoding* get_ContentEncoding( );

[VB] Public ReadOnly Property ContentEncoding As Encoding

[JScript] public function get ContentEncoding( ): Encoding;

Description

Gets the character set of the entity-body.

Default ContentEncoding can be specified in an ASP.NET configuration file. If ContentEncoding is specified by the client, the default configuration settings are overridden.

ContentLength

ToString

[C#] public int ContentLength {get;}

[C++] public: _property int get_ContentLength( );

[VB] Public ReadOnly Property ContentLength As Integer

[JScript] public function get ContentLength( ): int;

Description

Specifies the length, in bytes, of content sent by the client.

ContentType

ToString

[C#] public string ContentType {get;}

[C++] public: _property String* get_ContentType( );

[VB] Public ReadOnly Property ContentType As String

[JScript] public function get ContentType( ): String;

Description

Gets the MIME content type of the incoming request.

Cookies

ToString

[C#] public HttpCookieCollection Cookies {get;}

[C++] public: _property HttpCookieCollection* get_Cookies( );

[VB] Public ReadOnly Property Cookies As HttpCookieCollection

[JScript] public function get Cookies( ): HttpCookieCollection;

Description

Gets a collection of cookies sent by the client.

ASP.NET includes two intrinsic cookie collections. The collection accessed through System.Web.HttpRequest.Cookies contains cookies transmitted by the client to the server in the Cookie header. The collection accessed through System.Web.HttpResponse.Cookies contains cookies generated on the server and transmitted to the client in the Set-Cookie header.

CurrentExecutionFilePath

ToString

[C#] public string CurrentExecutionFilePath {get;}

[C++] public: _property String* get_CurrentExecutionFilePath( );

[VB] Public ReadOnly Property CurrentExecutionFilePath As String

[JScript] public function get CurrentExecutionFilePath( ): String;

FilePath

ToString

[C#] public string FilePath {get;}

[C++] public: _property String* get_FilePath( );

[VB] Public ReadOnly Property FilePath As String

[JScript] public function get FilePath( ): String;

Description

Gets the virtual path of the current request.

The System.Web.HttpRequest.FilePath does not include the System.Web.HttpRequest.PathInfo trailer. For the URL Http://www.microsoft.com/virdir/page.html/tail, the FilePath is Http://www.microsoft.com/virdir/page.html.

Files

ToString

[C#] public HttpFileCollection Files {get;}

[C++] public: _property HttpFileCollection* get_Files( );

[VB] Public ReadOnly Property Files As HttpFileCollection

[JScript] public function get Files( ): HttpFileCollection;

Description

Gets the collection of client-uploaded files (Multipart MIME format).

The file collection is populated only when the HTTP request Content-Type is multipart/form-data.

Filter

ToString

[C#] public Stream Filter {get; set;}

[C++] public: _property Stream* get_Filter( );public: _property void set_Filter(Stream*);

[VB] Public Property Filter As Stream

[JScript] public function get Filter( ): Stream;public function set Filter(Stream);

Description

Gets or sets the filter to use when reading the current input stream.

Form

ToString

[C#] public NameValueCollection Form {get;}

[C++] public: _property NameValueCollection* get_Form( );

[VB] Public ReadOnly Property Form As NameValueCollection

[JScript] public function get Form( ): NameValueCollection;

Description

Gets a collection of form variables.

Populated when the HTTP request Content-Type is either application/x-www-form-urlencoded or multipart/form-data.

Headers

ToString

[C#] public NameValueCollection Headers {get;}

[C++] public: _property NameValueCollection* get_Headers( );

[VB] Public ReadOnly Property Headers As NameValueCollection

[JScript] public function get Headers( ): NameValueCollection;

Description

Gets a collection of HTTP headers.

HttpMethod

ToString

[C#] public string HttpMethod {get;}

[C++] public: _property String* get_HttpMethod( );

[VB] Public ReadOnly Property HttpMethod As String

[JScript] public function get HttpMethod( ): String;

Description

Gets the HTTP data transfer method (such as GET, POST, or HEAD) used by the client.

InputStream

ToString

[C#] public Stream InputStream {get;}

[C++] public: _property Stream* get_InputStream( );

[VB] Public ReadOnly Property InputStream As Stream

[JScript] public function get InputStream( ): Stream;

Description

Gets the contents of the incoming HTTP entity body.

IsAuthenticated

ToString

[C#] public bool IsAuthenticated {get;}

[C++] public: _property bool get_IsAuthenticated( );

[VB] Public ReadOnly Property IsAuthenticated As Boolean

[JScript] public function get IsAuthenticated( ): Boolean;

Description

Gets a value indicating whether the user has been authenticated.

IsSecureConnection

ToString

[C#] public bool IsSecureConnection {get;}

[C++] public: _property bool get_IsSecureConnection( );

[VB] Public ReadOnly Property IsSecureConnection As Boolean

[JScript] public function get IsSecureConnection( ): Boolean;

Description

Gets a value indicting whether the HTTP connection uses secure sockets (that is, HTTPS).

Item

ToString

[C#] public string this[string key] {get;}

[C++] public: _property String* get_Item(String* key);

[VB] Public Default ReadOnly Property Item(ByVal key As String) As String

[JScript] returnValue=HttpRequestObject.Item(key);

Description

Default HttpRequest indexed property that retrieves a QueryString, Form, Cookies, or ServerVariables collection. This property is read-only. Numerical index to collection members.

Params

ToString

[C#] public NameValueCollection Params {get;}

[C++] public: _property NameValueCollection* get_Params( );

[VB] Public ReadOnly Property Params As NameValueCollection

[JScript] public function get Params( ): NameValueCollection;

Description

Gets a combined collection of System.Web.HttpRequest.QueryString, System.Web.HttpRequest.Form, System.Web.HttpRequest.ServerVariables, and System.Web.HttpRequest.Cookies items.

Path

ToString

[C#] public string Path {get;}

[C++] public: _property String* get_Path( );

[VB] Public ReadOnly Property Path As String

[JScript] public function get Path( ): String;

Description

Gets the virtual path of the current request.

The System.Web.HttpRequest.FilePath does not include the System.Web.HttpRequest.PathInfo trailer. For the URL Http://www.microsoft.com/virdir/page.html/tail, the FilePath is Http://www.microsoft.com/virdir/page.html.

PathInfo

ToString

[C#] public string PathInfo {get;}

[C++] public: _property String* get_PathInfo( );

[VB] Public ReadOnly Property PathInfo As String

[JScript] public function get PathInfo( ): String;

Description

Gets additional path information for a resource with a URL extension.

For the URL Http://www.microsoft.com/virdir/page.html/tail, the PathInfo value is /tail.

PhysicalApplicationPath

ToString

[C#] public string PhysicalApplicationPath {get;}

[C++] public: _property String* get_PhysicalApplicationPath( );

[VB] Public ReadOnly Property PhysicalApplicationPath As String

[JScript] public function get PhysicalApplicationPath( ): String;

Description

Gets the physical file system path of the currently executing server application's root directory.

PhysicalPath

ToString

[C#] public string PhysicalPath {get;}

[C++] public: _property String* get_PhysicalPath( );

[VB] Public ReadOnly Property PhysicalPath As String

[JScript] public function get PhysicalPath( ): String;

Description

Gets the physical file system path corresponding to the requested URL.

QueryString

ToString

[C#] public NameValueCollection QueryString {get;}

[C++] public: _property NameValueCollection* get_QueryString( );

[VB] Public ReadOnly Property QueryString As NameValueCollection

[JScript] public function get QueryString( ): NameValueCollection;

Description

Gets the collection of HTTP query string variables.

RawUrl

ToString

[C#] public string RawUrl {get;}

[C++] public: _property String* get_RawUrl( );

[VB] Public ReadOnly Property RawUrl As String

[JScript] public function get RawUrl( ): String;

Description

Gets the raw URL of the current request.

The raw URL is defined as the part of the URL following the domain information. In the URL string http://www.microsoft.com/articles/recent.aspx, the raw URL is /articles/recent.aspx. The raw URL includes the query string, if present.

RequestType

ToString

[C#] public string RequestType {get; set;}

[C++] public: _property String* get_RequestType( ); public: _property void set_RequestType(String*);

[VB] Public Property RequestType As String

[JScript] public function get RequestType( ): String;public function set RequestType(String);

Description

Gets or sets the HTTP data transfer method (GET or POST) used by the client.

ServerVariables

ToString

[C#] public NameValueCollection ServerVariables {get;}

[C++] public: _property NameValueCollection* get_ServerVariables( );

[VB] Public ReadOnly Property ServerVariables As NameValueCollection

[JScript] public function get ServerVariables( ): NameValueCollection;

Description

Gets a collection of web server variables.

TotalBytes

ToString

[C#] public int TotalBytes {get;}

[C++] public: _property int get_TotalBytes( );

[VB] Public ReadOnly Property TotalBytes As Integer

[JScript] public function get TotalBytes( ): int;

Description

Gets the number of bytes in the current input stream.

Url

ToString

[C#] public Uri Url {get;}
[C++] public: _property Uri* get_Url( );
[VB] Public ReadOnly Property Url As Uri
[JScript] public function get Url( ): Uri;

Description

Gets Information about the URL of the current request.

UrlReferrer

ToString

[C#] public Uri UrlReferrer {get;}
[C++] public: _property Uri* get_UrlReferrer( );
[VB] Public ReadOnly Property UrlReferrer As Uri
[JScript] public function get UrlReferrer( ): Uri;

Description

Gets information about the URL of the client's previous request that linked to the current URL.

UserAgent

ToString

[C#] public string UserAgent {get;}
[C++] public: _property String* get_UserAgent( );
[VB] Public ReadOnly Property UserAgent As String
[JScript] public function get UserAgent( ): String;

Description

Gets the raw user agent string of the client browser.

UserHostAddress

ToString

[C#] public string UserHostAddress {get;}
[C++] public: _property String* get_UserHostAddress( );
[VB] Public ReadOnly Property UserHostAddress As String
[JScript] public function get UserHostAddress( ): String;

Description

Gets the IP host address of the remote client.

UserHostName

ToString

[C#] public string UserHostName {get;}
[C++] public: _property String* get_UserHostName( );
[VB] Public ReadOnly Property UserHostName As String
[JScript] public function get UserHostName( ): String;

Description

Gets the DNS name of the remote client.

UserLanguages

ToString

[C#] public string[ ] UserLanguages {get;}
[C++] public: _property String* get_UserLanguages( );
[VB] Public ReadOnly Property UserLanguages As String ( )
[JScript] public function get UserLanguages( ): String[ ];

Description

Gets a sorted string array of client language preferences.

BinaryRead

[C#] public byte[ ] BinaryRead(int count);
[C++] public: unsigned char BinaryRead(int count) _gc[ ];
[VB] Public Function BinaryRead(ByVal count As Integer) As Byte( )
[JScript] public function BinaryRead(count: int): Byte[ ];

Description

Performs a binary read of a specified number of bytes from the current input stream.

Return Value: A byte array.

The BinaryRead method is provided for compatibility with previous versions of ASP. Number of bytes to read.

MapImageCoordinates

[C#] public int[ ] MapImageCoordinates(string imageFieldName);
[C++] public: int MapImageCoordinates(String* imageFieldName) _gc[ ];
[VB] Public Function MapImageCoordinates(ByVal imageFieldName As String) As Integer( )
[JScript] public function MapImageCoordinates(imageFieldName: String): int[ ];

Description

Maps an incoming image-field form parameter to appropriate x/y coordinate values.

Return Value: A two-dimensional array of integers. A string reference to a form image map.

MapPath

[C#] public string MapPath(string virtualPath);
[C++]public: String* MapPath(String* virtualPath);
[VB] Public Function MapPath(ByVal virtualPath As String) As String
[JScript] public function MapPath(virtualPath: String): String; Maps the virtual path in the requested URL to a physical path on the server for the current request.

Description

Maps the specified virtual path to a physical path. The virtual path (absolute or relative) for the current request.

MapPath

[C#] public string MapPath(string virtualPath, string baseVirtualDir, bool allowCrossAppMapping);
[C++] public: String* MapPath(String* virtualPath, String* baseVirtualDir, bool allowCrossAppMapping);
[VB] Public Function MapPath(ByVal virtualPath As String, ByVal baseVirtualDir As String, ByVal allowCrossAppMapping As Boolean) As String
[JScript] public function MapPath(virtualPath: String, baseVirtualDir: String, allowCrossAppMapping: Boolean): String;

Description

Maps the specified virtual path to a physical path. The virtual path (absolute or relative) for the current request. The virtual base directory path used for relative resolution. If true, the virtualPath may belong to another application.

SaveAs

[C#] public void SaveAs(string filename, bool includeHeaders);
[C++] public: void SaveAs(String* filename, bool includeHeaders);
[VB] Public Sub SaveAs(ByVal filename As String, ByVal includeHeaders As Boolean)
[JScript] public function SaveAs(filename: String, includeHeaders: Boolean);

Description

Saves an HTTP request to disk.

Saving the request context to disk can be useful in debugging. A string reference to a physical drive path. A Boolean value specifying whether an HTTP header should be saved to disk.

HttpResponse class (System.Web)

ToString

Description

Encapsulates HTTP response information from an ASP.NET operation.

The methods and properties of the HttpResponse class are exposed through ASP.NET's intrinsic Response object.

HttpResponse

Example Syntax:

ToString

[C#] public HttpResponse(TextWriter writer);

[C++] public: HttpResponse(TextWriter* writer);
[VB] Public Sub New(ByVal writer As TextWriter)
[JScript] public function HttpResponse(writer: TextWriter);

Description

Initializes a new instance of the HttpResponse class. A TextWriter object enabling custom HTTP output.

Buffer

ToString

[C#] public bool Buffer {get; set;}
[C++] public: _property bool get_Buffer( );public: _property void set_Buffer(bool);
[VB] Public Property Buffer As Boolean
[JScript] public function get Buffer( ): Boolean;public function set Buffer(Boolean);

Description

Gets or sets a value indicating whether to buffer output and send it after the entire response is finished processing.

System.Web.HttpResponse.Buffer has been deprecated in favor of System.Web.HttpResponse.BufferOutput and is provided only for compatibility with previous versions of ASP. With ASP.NET, use System.Web.HttpResponse.BufferOutput.

BufferOutput

ToString

[C#] public bool BufferOutput {get; set;}
[C++] public: _property bool get_BufferOutput( );public: _property void set_BufferOutput(bool);
[VB] Public Property BufferOutput As Boolean
[JScript] public function get BufferOutput( ): Boolean;public function set BufferOutput(Boolean);

Description

Gets or sets a value indicating whether to buffer output and send it after the entire page is finished processing.

Cache

ToString

[C#] public HttpCachePolicy Cache {get;}
[C++] public: _property HttpCachePolicy* get_Cache( );
[VB] Public ReadOnly Property Cache As HttpCachePolicy
[JScript] public function get Cache( ): HttpCachePolicy;

Description

Gets the caching policy (expiration time, privacy, vary clauses) of a Web page.

CacheControl

ToString

[C#] public string CacheControl {get; set;}
[C++] public: _property String* get_CacheControl( ); public: _property void set_CacheControl(String*);
[VB] Public Property CacheControl As String
[JScript] public function get CacheControl( ): String;public function set CacheControl(String);

Description

Sets the Cache-Control HTTP header to Public or Private.

The values for Private and Public are strings and must be enclosed in quotation marks (" ").

Charset

ToString

[C#] public string Charset {get; set;}
[C++] public: _property String* get_Charset( ); public: _property void set_Charset(String*);
[VB] Public Property Charset As String
[JScript] public function get Charset( ): String;public function set Charset(String);

Description

Gets or sets the HTTP character set of the output stream.

Charset can be set to null to suppress the Content-Type header.

ContentEncoding

ToString

[C#] public Encoding ContentEncoding {get; set;}
[C++] public: _property Encoding* get_ContentEncoding ( );public: _property void set_ContentEncoding(Encoding*);
[VB] Public Property ContentEncoding As Encoding
[JScript] public function get ContentEncoding( ): Encoding; public function set ContentEncoding(Encoding);

Description

Gets or sets the HTTP character set of the output stream.

ContentType

ToString

[C#] public string ContentType {get; set;}
[C++] public: _property String* get_ContentType( ); public: _property void set_ContentType(String*);
[VB] Public Property ContentType As String
[JScript] public function get ContentType( ): String;public function set ContentType(String);

Description

Gets or sets the HTTP MIME type of the output stream.

The following example takes action if the content type of the output is not "Text/HTML".

Cookies

ToString

[C#] public HttpCookieCollection Cookies {get;}
[C++] public: _property HttpCookieCollection* get_Cookies( );
[VB] Public ReadOnly Property Cookies As HttpCookieCollection
[JScript] public function get Cookies( ): HttpCookieCollection;

Description

Gets the response cookie collection.

ASP.NET includes two intrinsic cookie collections. The collection accessed through Cookies contains cookies transmitted by the client to the server in the System.Web.HttpRequest.Cookies header. The collection accessed through System.Web.HttpResponse.Cookies contains cookies generated on the server and transmitted to the client in the Set-Cookie header.

Expires

ToString

[C#] public int Expires {get; set;}
[C++] public: _property int get_Expires( );public: _property void set_Expires(int);
[VB] Public Property Expires As Integer
[JScript] public function get Expires( ): int;public function set Expires(int);

Description

Gets or sets the number of minutes before a page cached on a browser expires. If the user returns to the same page before it expires, the cached version is displayed.

The Expires, System.Web.HttpResponse.ExpiresAbsolute and System.Web.HttpResponse.CacheControl properties have been deprecated in favor of the methods of the System.Web.HttpCachePolicy class available through the System.Web.HttpResponse.Cache intrinsic object to control the IIS output cache and client caches.

ExpiresAbsolute

ToString

[C#] public DateTime ExpiresAbsolute {get; set;}

[C++] public: _property DateTime get_ExpiresAbsolute ( );public: _property void set_ExpiresAbsolute(DateTime);

[VB] Public Property ExpiresAbsolute As DateTime

[JScript] public function get ExpiresAbsolute( ): DateTime; public function set ExpiresAbsolute(DateTime);

Description

Gets or sets the absolute date and time at which to remove cached information from the cache.

The ExpiresAbsolute, System.Web.HttpResponse.Expires and System.Web.HttpResponse.CacheControl properties have been deprecated in favor of the methods of the System.Web.HttpCachePolicy class available through the System.Web.HttpResponse.Cache intrinsic object to control the IIS output cache and client caches.

Filter

ToString

[C#] public Stream Filter {get; set;}

[C++] public: _property Stream* get_Filter( );public: _property void set_Filter(Stream*);

[VB] Public Property Filter As Stream

[JScript] public function get Filter( ): Stream;public function set Filter(Stream);

Description

Gets or sets a wrapping filter object used to modify the HTTP entity body before transmission.

When you create a Stream object and set the Response.Filter property to the Stream object, all HTTP output sent by Response.Write passes through the filter.

IsClientConnected

ToString

[C#] public bool IsClientConnected {get;}

[C++] public: _property bool get_IsClientConnected( );

[VB] Public ReadOnly Property IsClientConnected As Boolean

[JScript] public function get IsClientConnected( ): Boolean;

Description

Gets a value indicating whether the client is still connected to the server.

Output

ToString

[C#] public TextWriter Output {get;}

[C++] public: _property TextWriter* get_Output( );

[VB] Public ReadOnly Property Output As TextWriter

[JScript] public function get Output( ): TextWriter;

Description

Enables output of text to the outgoing HTTP response stream.

OutputStream

ToString

[C#] public Stream OutputStream {get;}

[C++] public: _property Stream* get_OutputStream( );

[VB] Public ReadOnly Property OutputStream As Stream

[JScript] public function get OutputStream( ): Stream;

Description

Enables binary output to the outgoing HTTP content body.

Status

ToString

[C#] public string Status {get; set;}

[C++] public: _property String* get_Status( );public: _property void set_Status(String*);

[VB] Public Property Status As String

[JScript] public function get Status( ): String;public function set Status(String);

Description

Sets the Status line that is returned to the client.

System.Web.HttpResponse.Status has been deprecated in favor of System.Web.HttpResponse.StatusDescription and is provided only for compatibility with previous versions of ASP. With ASP.NET, use System.Web.HttpResponse.StatusDescription instead.

StatusCode

ToString

[C#] public int StatusCode {get; set;}

[C++] public: _property int get_StatusCode( );public: _property void set_StatusCode(int);

[VB] Public Property StatusCode As Integer

[JScript] public function get StatusCode( ): int;public function set StatusCode(int);

Description

Gets or sets the HTTP status code of the output returned to the client.

StatusDescription

ToString

[C#] public string StatusDescription {get; set;}

[C++] public: _property String* get_StatusDescription ( );public: _property void set_StatusDescription(String*);

[VB] Public Property StatusDescription As String

[JScript] public function get StatusDescription( ): String; public function set StatusDescription(String);

Description

Gets or sets the HTTP status string of the output returned to the client.

SuppressContent

ToString

[C#] public bool SuppressContent {get; set;}

[C++] public: _property bool get_SuppressContent( ); public: _property void set_SuppressContent(bool);

[VB] Public Property SuppressContent As Boolean

[JScript] public function get SuppressContent( ): Boolean; public function set SuppressContent(Boolean);

Description

Gets or sets a value indicating whether to send HTTP content to the client.

AddCacheItemDependencies

[C#] public void AddCacheItemDependencies(ArrayList cacheKeys);

[C++] public: void AddCacheItemDependencies(ArrayList* cacheKeys);

[VB] Public Sub AddCacheItemDependencies(ByVal cacheKeys As ArrayList)

[JScript] public function AddCacheItemDependencies (cacheKeys: ArrayList);

AddCacheItemDependency

[C#] public void AddCacheItemDependency(string cacheKey);

[C++] public: void AddCacheItemDependency(String* cacheKey);

[VB] Public Sub AddCacheItemDependency(ByVal cacheKey As String)

[JScript] public function AddCacheItemDependency (cacheKey: String);

AddFileDependencies

[C#] public void AddFileDependencies(ArrayList filenames);

[C++] public: void AddFileDependencies(ArrayList* filenames);

[VB] Public Sub AddFileDependencies(ByVal filenames As ArrayList)

[JScript] public function AddFileDependencies(filenames: ArrayList);

Description

Adds a group of file names to the collection of file names on which the current response is dependent. The collection of files to add.

AddFileDependency

[C#] public void AddFileDependency(string filename);

[C++] public: void AddFileDependency(String* filename);

[VB] Public Sub AddFileDependency(ByVal filename As String)

[JScript] public function AddFileDependency(filename: String);

Description

Adds a single file name to the collection of file names on which the current response is dependent. The name of the file to add.

AddHeader

[C#] public void AddHeader(string name, string value);

[C++] public: void AddHeader(String* name, String* value);

[VB] Public Sub AddHeader(ByVal name As String, ByVal value As String)

[JScript] public function AddHeader(name: String, value: String);

Description

Adds an HTTP header to the output stream.

AddHeader is the same as System.Web.HttpResponse.AppendHeader(System.Web.HttpResponseHeader) and is provided only for compatibility with previous versions of ASP. With ASP.NET, use AppendHeader. The name of the HTTP header to add value to. The string to add to the header.

AppendCookie

[C#] public void AppendCookie(HttpCookie cookie);

[C++] public: void AppendCookie(HttpCookie* cookie);

[VB] Public Sub AppendCookie(ByVal cookie As HttpCookie)

[JScript] public function AppendCookie(cookie: HttpCookie);

Description

Adds an HTTP cookie to the intrinsic cookie collection. The cookie to add to the output stream.

AppendHeader

[C#] public void AppendHeader(string name, string value);

[C++] public: void AppendHeader(String* name, String* value);

[VB] Public Sub AppendHeader(ByVal name As String, ByVal value As String)

[JScript] public function AppendHeader(name: String, value: String);

Description

Adds an HTTP header to the output stream.

If you use the System.Web.HttpResponse.AppendHeader (System.Web.HttpResponseHeader) method to send cache-specific headers and at the same time use the cache object model ( System.Web.HttpResponse.Cache ) to set cache policy, HTTP response headers pertaining to caching (Cache-Control, Expires, Last-Modified, Pragma, and Vary) might be deleted when the cache object model is used. This behavior enables ASP.NET to maintain the most restrictive settings. For example, consider a page that includes user controls. If those controls have conflicting cache policies, the most restrictive cache policy will be used. If one user control sets the header "Cache-Control: Public" and another sets the more restrictive header "Cache-Control: Private" via calls to System.Web.HttpCachePolicy.SetCacheability(System.Web.HttpCacheability), then the "Cache-Control: Private" header will be sent with the response. The name of the HTTP header to add to the output stream. The string to append to the header.

AppendToLog

[C#] public void AppendToLog(string param);

[C++] public: void AppendToLog(String* param);

[VB] Public Sub AppendToLog(ByVal param As String)

[JScript] public function AppendToLog(param: String);

Description

Adds custom log information to the IIS log file. The text to add to the log file.

ApplyAppPathModifier

[C#] public string ApplyAppPathModifier(string virtualPath);

[C++] public: String* ApplyAppPathModifier(String* virtualPath);

[VB] Public Function ApplyAppPathModifier(ByVal virtualPath As String) As String

[JScript] public function ApplyAppPathModifier(virtualPath: String): String;

Description

BinaryWrite

[C#] public void BinaryWrite(byte[ ] buffer);

[C++] public: void BinaryWrite(unsigned char buffer _gc[ ]);

[VB] Public Sub BinaryWrite(ByVal buffers As Byte)

[JScript] public function BinaryWrite(buffer: Byte[ ]);

Description

Writes a string of binary characters to the HTTP output stream. The bytes to write to the output stream.

Clear

[C#] public void Clear( );

[C++] public: void Clear( );

[VB] Public Sub Clear( )

[JScript] public function Clear( );

Description

Clears all content output from the buffer stream.

ClearContent

[C#] public void ClearContent( );

[C++] public: void ClearContent( );

[VB] Public Sub ClearContent( )

[JScript] public function ClearContent( );

Description

Clears all content output from the buffer stream.

ClearHeaders

[C#] public void ClearHeaders( );

[C++] public: void ClearHeaders( );

[VB] Public Sub ClearHeaders( )

[JScript] public function ClearHeaders( );

Description

Clears all headers from the buffer stream.

Close

[C#] public void Close( );

[C++] public: void Close( );

[VB] Public Sub Close( )

[JScript] public function Close( );

Description

Closes the socket connection to a client.

End

[C#] public void End( );

[C++] public: void End( );

[VB] Public Sub End( )

[JScript] public function End( );

Description

Sends all currently buffered output to the client, stops execution of the page, and fires the Application_EndRequest event.

Flush

[C#] public void Flush( );

[C++] public: void Flush( );

[VB] Public Sub Flush( )

[JScript] public function Flush( );

Description

Sends all currently buffered output to the client.

Forces all currently buffered output to be sent to the client.

Pics

[C#] public void Pics(string value);

[C++] public: void Pics(String* value);

[VB] Public Sub Pics(ByVal value As String)

[JScript] public function Pics(value: String);

Description

Appends a PICS-Label HTTP header to the output stream.

Platform for Internet Content Selection (PICS) is a World Wide Web Consortium (W3C) standard for content labeling. PICS is essentially a language for creating a ratings system. The string to add to the PICS-Label header.

Redirect

[C#] public void Redirect(string url);

[C++] public: void Redirect(String* url);

[VB] Public Sub Redirect(ByVal url As String)

[JScript] public function Redirect(url: String);

Description

Redirects a client to a new URL. The target location.

Redirect

[C#] public void Redirect(string url, bool endResponse);

[C++] public: void Redirect(String* url, bool endResponse);

[VB] Public Sub Redirect(ByVal url As String, ByVal endResponse As Boolean)

[JScript] public function Redirect(url: String, endResponse: Boolean); Redirects a client to a new URL.

RemoveOutputCacheItem

[C#] public static void RemoveOutputCacheItem(string path);

[C++] public: static void RemoveOutputCacheItem(String* path);

[VB] Public Shared Sub RemoveOutputCacheItem(ByVal path As String)

[JScript] public static function RemoveOutputCacheItem (path: String);

SetCookie

[C#] public void SetCookie(HttpCookie cookie);

[C++] public: void SetCookie(HttpCookie* cookie);

[VB] Public Sub SetCookie(ByVal cookie As HttpCookie)

[JScript] public function SetCookie(cookie: HttpCookie);

Description

Updates an existing cookie in the cookie collection.

Write

[C#] public void Write(char ch);

[C++] public: void Write(_wchar_t ch);

[VB] Public Sub Write(ByVal ch As Char)

[JScript] public function Write(ch: Char);

Description

Writes a character to an HTTP output content stream. The character to write to the HTTP output stream.

Write

[C#] public void Write(object obj);

[C++] public: void Write(Object* obj);

[VB] Public Sub Write(ByVal obj As Object)

[JScript] public function Write(obj: Object);

Description

Writes an Object to an HTTP output content stream. The Object to write to the HTTP output stream.

Write

[C#] public void Write(string s);

[C++] public: void Write(String* s);

[VB] Public Sub Write(ByVal s As String)

[JScript] public function Write(s: String); Writes information to an HTTP output content stream.

Description

Writes a string to an HTTP output content stream. The string to write to the HTTP output stream.

Write

[C#] public void Write(char[ ] buffer, int index, int count);

[C++] public: void Write(_wchar_t buffer _gc[ ], mt index, int count);

[VB] Public Sub Write(ByVal buffers As Char, ByVal index As Integer, ByVal count As Integer)

[JScript] public function Write(buffer: Char[ ], index: int, count: int);

Description

Writes an array of characters to an HTTP output content stream. The character array to write. The position in the character array where writing starts. The number of characters to write, beginning at index.

WriteFile

[C#] public void WriteFile(string filename);

[C++] public: Void WriteFile(String* filename);

[VB] Public Sub WriteFile(ByVal filename As String)

[JScript] public function WriteFile(filename: String); Writes the specified file directly to an HTTP content output stream.

Description

Writes the specified file directly to an HTTP content output stream. The name of the file to write to the HTTP output.

WriteFile

[C#] public void WriteFile(string filename, bool readIntoMemory);

[C++] public: void WriteFile(String* filename, bool readIntoMemory);

[VB] Public Sub WriteFile(ByVal filename As String, ByVal readIntoMemory As Boolean)

[JScript] public function WriteFile(filename: String, readIntoMemory: Boolean);

Description

Writes the contents of the specified file into a memory block. The name of the file to write into a memory block. Indicates whether the file will be written into a memory block.

WriteFile

[C#] public void WriteFile(IntPtr fileHandle, long offset, long size);

[C++] public: void WriteFile(IntPtr fileHandle, _int64 offset, _int64 size);

[VB] Public Sub WriteFile(ByVal fileHandle As IntPtr, ByVal offset As Long, ByVal size As Long)

[JScript] public function WriteFile(fileHandle: IntPtr, offset: long, size: long);

Description

Writes the specified file directly to an HTTP content output stream. The file handle of the file to write to the HTTP output stream. The byte position in the file where writing will start. The number of bytes to write to the output stream.

WriteFile

[C#] public void WriteFile(string filename, long offset, long size);

[C++] public: void WriteFile(String* filename, _int64 offset, _int64 size);

[VB] Public Sub WriteFile(ByVal filename As String, ByVal offset As Long, ByVal size As Long)

[JScript] public function WriteFile(filename: String, offset: long, size: long);

Description

Writes the specified file directly to an HTTP content output stream. The name of the file to write to the HTTP output stream. The byte position in the file where writing will start. The number of bytes to write to the output stream.

HttpRuntime class (System.Web)

WriteFile

Description

Provides a set of ASP.NET runtime services.

HttpRuntime

Example Syntax:

WriteFile

[C#] public HttpRuntime( );

[C++] public: HttpRuntime( );

[VB] Public Sub New( )

[JScript] public function HttpRuntime( );

AppDomainAppId

WriteFile

[C#] public static string AppDomainAppId {get;}

[C++] public: _property static String* get_AppDomainAppId( );

[VB] Public Shared ReadOnly Property AppDomainAppId As String

[JScript] public static function get AppDomainAppId( ): String;

Description

AppDomainAppPath

WriteFile

[C#] public static string AppDomainAppPath {get;}

[C++] public: _property static String* get_AppDomainAppPath( );

[VB] Public Shared ReadOnly Property AppDomainAppPath As String

[JScript] public static function get AppDomainAppPath( ): String;

Description

AppDomainAppVirtualPath

WriteFile

[C#] public static string AppDomainAppVirtualPath {get;}

[C++] public: _property static String* get_AppDomainAppVirtualPath( );

[VB] Public Shared ReadOnly Property AppDomainAppVirtualPath As String

[JScript] public static function get AppDomainAppVirtualPath( ): String;

Description

AppDomainId

WriteFile

[C#] public static string AppDomainId {get;}

[C++] public: _property static String* get_AppDomainId( );

[VB] Public Shared ReadOnly Property AppDomainId As String

[JScript] public static function get AppDomainId( ): String;

Description

AspInstallDirectory

WriteFile

[C#] public static string AspInstallDirectory {get;}

[C++] public: _property static String* get_AspInstallDirectory( );

[VB] Public Shared ReadOnly Property AspInstallDirectory As String

[JScript] public static function get AspInstallDirectory( ): String;

Description

BinDirectory

WriteFile

[C#] public static string BinDirectory {get;}

[C++] public: _property static String* get_BinDirectory( );

[VB] Public Shared ReadOnly Property BinDirectory As String

[JScript] public static function get BinDirectory( ): String;

Description

Cache

WriteFile

[C#] public static Cache Cache {get;}

[C++] public: _property static Cache* get_Cache( );

[VB] Public Shared ReadOnly Property Cache As Cache

[JScript] public static function get Cache( ): Cache;

Description

Provides access to the cache.

ClrInstallDirectory

WriteFile

[C#] public static string ClrInstallDirectory {get;}

[C++] public: _property static String* get_ClrInstallDirectory( );

[VB] Public Shared ReadOnly Property ClrInstallDirectory As String

[JScript] public static function get ClrInstallDirectory( ): String;

Description

CodegenDir

WriteFile

[C#] public static string CodegenDir {get;}

[C++] public: _property static String* get_CodegenDir( );

[VB] Public Shared ReadOnly Property CodegenDir As String

[JScript] public static function get CodegenDir( ): String;

Description

IsOnUNCShare

WriteFile

[C#] public static bool IsOnUNCShare {get;}

[C++] public: _property static bool get_IsOnUNCShare( );

[VB] Public Shared ReadOnly Property IsOnUNCShare As Boolean

[JScript] public static function get IsOnUNCShare( ): Boolean;

Description

MachineConfigurationDirectory

WriteFile

[C#] public static string MachineConfigurationDirectory {get;}

[C++] public: _property static String* get_MachineConfigurationDirectory( );

[VB] Public Shared ReadOnly Property MachineConfigurationDirectory As String

[JScript] public static function get MachineConfigurationDirectory( ): String;

Description

Close

[C#] public static void Close( );

[C++] public: static void Close( );

[VB] Public Shared Sub Close( )

[JScript] public static function Close( );

Description

Removes all items from the cache and shuts down the runtime.

ProcessRequest

[C#] public static void ProcessRequest(HttpWorkerRequest wr);

[C++] public: static void ProcessRequest(HttpWorkerRequest* wr);

[VB] Public Shared Sub ProcessRequest(ByVal wr As HttpWorkerRequest)

[JScript] public static function ProcessRequest(wr: HttpWorkerRequest);

Description

The method that drives all ASP.NET Web processing execution. HttpWorkerRequest object HttpServerUtility class (System.Web)

ToString

Description

Provides helper methods for processing Web requests.

The methods and properties of the System.Web.HttpServerUtility class are exposed through ASP.NET's intrinsic System.Web.HttpContext.Server object.

MachineName

ToString

[C#] public string MachineName {get;}

[C++] public: _property String* get_MachineName( );

[VB] Public ReadOnly Property MachineName As String

[JScript] public function get MachineName( ): String;

Description

Gets the server machine name.

ScriptTimeout

ToString

[C#] public int ScriptTimeout {get; set;}

[C++] public: _property int get_ScriptTimeout( );public: _property void set_ScriptTimeout(int);

[VB] Public Property ScriptTimeout As Integer

[JScript] public function get ScriptTimeout( ): int;public function set ScriptTimeout(int);

Description

Gets and sets the request time-out in seconds.

ClearError

[C#] public void ClearError( );

[C++] public: void ClearError( );

[VB] Public Sub ClearError( )

[JScript] public function ClearError( );

Description

Clears the previous exception.

CreateObject

[C#] public object CreateObject(string progID);

[C++] public: Object* CreateObject(String* progID);

[VB] Public Function CreateObject(ByVal progID As String) As Object

[JScript] public function CreateObject(progID: String): Object;

Description

Creates a server instance of a COM object identified by the object's Programmatic Identifier (ProgID).

Return Value: The new object. The class or type of object to be instantiated.

CreateObject

[C#] public object CreateObject(Type type);

[C++] public: Object* CreateObject(Type* type);

[VB] Public Function CreateObject(ByVal type As Type) As Object

[JScript] public function CreateObject(type: Type): Object;

Description

Instantiates a classic COM object identified via a Type.

CreateObjectFromClsid

[C#] public object CreateObjectFromClsid(string clsid);

[C++] public: Object* CreateObjectFromClsid(String* clsid);

[VB] Public Function CreateObjectFromClsid(ByVal clsid As String) As Object

[JScript] public function CreateObjectFromClsid(clsid: String): Object;

Description

Creates a server instance of a COM object identified by the object's class identifier (CLSID).

Return Value: The new object. The class identifier of the object to be instantiated.

Execute

[C#] public void Execute(string path);

[C++] public: void Execute(String* path);

[VB] Public Sub Execute(ByVal path As String)

[JScript] public function Execute(path: String); Executes a request to another page.

Description

Executes a request to another page using the specified URL path to the page.

The System.Web.HttpServerUtility.Execute(System.String) method continues execution of the original page after execution of the new page is completed. The System.Web.HttpServerUtility.Transfer(System.String,System.Boolean) method unconditionally transfers execution to another page. The URL path of the new request.

Execute

[C#] public void Execute(string path, TextWriter writer);

[C++] public: void Execute(String* path, TextWriter* writer);

[VB] Public Sub Execute(ByVal path As String, ByVal writer As TextWriter)

[JScript] public function Execute(path: String, writer: TextWriter);

Description

Executes a request to another page using the specified URL path to the page. A System.IO.TextWriter captures output from the page.

The System.Web.HttpServerUtility.Execute(System.String) method continues execution of the original page after execution of the new page is completed. The System.Web.HttpServerUtility.Transfer(System.String,System.Boolean) method unconditionally transfers execution to another page. The URL path of the new request. The System.IO.TextWriter to capture the output.

GetLastError

[C#] public Exception GetLastError( );

[C++] public: Exception* GetLastError( );

[VB] Public Function GetLastError( ) As Exception

[JScript] public function GetLastError( ): Exception;

Description

Returns the previous exception.

Return Value: The previous exception that was thrown.

HtmlDecode

[C#] public string HtmlDecode(string s);

[C++] public: String* HtmlDecode(String* s);

[VB] Public Function HtmlDecode(ByVal s As String) As String

[JScript] public function HtmlDecode(s: String): String; Decodes a string that has been encoded to eliminate illegal HTML characters.

Description

Decodes an HTML-encoded string and returns the decoded string.

Return Value: The decoded text.

URL encoding ensures that all browsers will correctly transmitted text in URL strings. Characters such as “?”, “&”, “/”, and spaces may be truncated or corrupted by some browsers so those characters cannot cannot be used in ASP.NET pages in “ ” tags or in querystrings where the strings may be sent by a browser in a request string. The HTML string to decode.

HtmlDecode

[C#] public void HtmlDecode(string s, TextWriter output);

[C++] public: void HtmlDecode(String* s, TextWriter* output);

[VB] Public Sub HtmlDecode(ByVal s As String, ByVal output As TextWriter)

[JScript] public function HtmlDecode(s: String, output: TextWriter);

Description

Decodes an HTML-encoded string and sends the resulting output to a System.IO.TextWriter output stream.

URL encoding ensures that all browsers will correctly transmit text in URL strings. Characters such as “?”, “&”, “/”, and spaces may be truncated or corrupted by some browsers so those characters cannot be used in ASP.NET pages in “ ” tags or in querystrings where the strings may be sent by a browser in a request string. The HTML string to decode. The System.IO.TextWriter output stream containing the decoded string.

HtmlEncode

[C#] public string HtmlEncode(string s);

[C++] public: String* HtmlEncode(String* s);

[VB] Public Function HtmlEncode(ByVal s As String) As String

[JScript] public function HtmlEncode(s: String): String; Encodes a string to be displayed in a browser.

Description

HTML-encodes a string and returns the encoded string.

Return Value: The HTML-encoded text.

URL encoding ensures that all browsers will correctly transmitted text in URL strings. Characters such as “?”, “&”, “/”, and spaces may be truncated or corrupted by some browsers so those characters cannot be used in ASP.NET pages in “ ” tags or in querystrings where the strings may be sent by a browser in a request string. The text string to encode.

HtmlEncode

[C#] public void HtmlEncode(string s, TextWriter output);

[C++] public: void HtmlEncode(String* s, TextWriter* output);

[VB] Public Sub HtmlEncode(ByVal s As String, ByVal output As TextWriter)

[JScript] public function HtmlEncode(s: String, output: TextWriter);

Description

HTML-encodes a string and sends the resulting output to a System.IO.TextWriter output stream.

HTML encoding ensures that text will be correctly displayed in the browser, not interpreted by the browser as HTML. For example, if a text string contains “<” or “>” characters, the browser would interpret these characters as part of HTML tags. The HTML encoding of these two characters is “<” and “>”, respectively, which causes the browser to display the angle brackets correctly. The string to encode. The System.IO.TextWriter output stream containing the encoded string.

MapPath

[C#] public string MapPath(string path);

[C++] public: String* MapPath(String* path);

[VB] Public Function MapPath(ByVal path As String) As String

[JScript] public function MapPath(path: String): String;

Description

Returns the physical file path that corresponds to the specified virtual path on the Web server.

Return Value: The physical file path that corresponds to path. The virtual path on the Web server.

Transfer

[C#] public void Transfer(string path);

[C++] public: void Transfer(String* path);

[VB] Public Sub Transfer(ByVal path As String)

[JScript] public function Transfer(path: String);

Description

Terminates execution of the current page and begins execution of a new page using the specified URL path to the page. The URL path of the new page on the server to execute.

Transfer

[C#] public void Transfer(string path, bool preserveForm);

[C++] public: void Transfer(String* path, bool preserveForm);

[VB] Public Sub Transfer(ByVal path As String, ByVal preserveForm As Boolean)

[JScript] public function Transfer(path: String, preserveForm: Boolean); Terminates execution of the current page and begins execution of a new page.

Description

Terminates execution of the current page and begins execution of a new page using the specified URL path to the page. Specifies whether to clear the System.Web.HttpRequest.QueryString and System.Web.HttpRequest.Form collections. The URL path of the new page on the server to execute. If true, the QueryString and Form collections are preserved. If false, they are cleared. The default is false.

UrlDecode

[C#] public string UrlDecode(string s);

[C++] public: String* UrlDecode(String* s);

[VB] Public Function UrlDecode(ByVal s As String) As String

[JScript] public function UrlDecode(s: String): String; Decodes a string encoded for HTTP transmission and sent to the server in a URL.

Description

URL-decodes a string and returns the decoded string.

Return Value: The decoded text.

URL encoding ensures that all browsers will correctly transmitted text in URL strings. Characters such as "?", "&", "/", and spaces may be truncated or corrupted by some browsers so those characters cannot be used in ASP.NET pages in " " tags or in querystrings where the strings may be sent by a browser in a request string. The text string to decode.

UrlDecode

[C#] public void UrlDecode(string s, TextWriter output);

[C++] public: void UrlDecode(String* s, TextWriter* output);

[VB] Public Sub UrlDecode(ByVal s As String, ByVal output As TextWriter)

[JScript] public function UrlDecode(s: String, output: TextWriter);

Description

Decodes an HTML string received in a URL and sends the resulting output to a System.IO.TextWriter output stream. URL encoding ensures that all browsers will correctly transmitted text in URL strings. Characters such as "?", "&", "/", and spaces may be truncated or corrupted by some browsers so those characters cannot be used in ASP.NET pages in " " tags or in querystrings where the strings may be sent by a browser in a request string. The HTML string to decode. The System.IO.TextWriter output stream containing the decoded string.

UrlEncode

[C#] public string UrlEncode(string s);

[C++] public: String* UrlEncode(String* s);

[VB] Public Function UrlEncode(ByVal s As String) As String

[JScript] public function UrlEncode(s: String): String; Encodes a string for reliable HTTP transmission from the Web server to a client via the URL.

Description

URL-encodes a string and returns the encoded string.

Return Value: The URL encoded text.

URL encoding ensures that all browsers will correctly transmitted text in URL strings. Characters such as "?", "&", "/", and spaces may be truncated or corrupted by some browsers so those characters cannot be used in ASP.NET pages in " " tags or in querystrings where the strings may be sent by a browser in a request string. The text to URL-encode.

UrlEncode

[C#] public void UrlEncode(string s, TextWriter output);

[C++] public: void UrlEncode(String* s, TextWriter* output);

[VB] Public Sub UrlEncode(ByVal s As String, ByVal output As TextWriter)

[JScript] public function UrlEncode(s: String, output: TextWriter);

Description

URL encodes a string and sends the resulting output to a TextWriter output stream.

URL encoding ensures that all browsers will correctly transmitted text in URL strings. Characters such as "?", "&", "/", and spaces may be truncated or corrupted by some browsers so those characters cannot be used in ASP.NET pages in " " tags or in querystrings where the strings may be sent by a browser in a request string. The text string to encode. The System.IO.TextWriter output stream containing the encoded string.

UrlPathEncode

[C#] public string UrlPathEncode(string s);

[C++] public: String* UrlPathEncode(String* s);

[VB] Public Function UrlPathEncode(ByVal s As String) As String

[JScript] public function UrlPathEncode(s: String): String; Encodes the path portion of a URL string for reliable HTTP transmission from the Web server to a client via the URL.

Description

URL-encodes the path portion of a URL string and returns the encoded string.

Return Value: The URL encoded text.

URL encoding ensures that all browsers will correctly transmitted text in URL strings. Characters such as "?", "&", "/", and spaces may be truncated or corrupted by some browsers so those characters cannot cannot be used in ASP.NET pages in " " tags or in querystrings where the strings may be sent by a browser in a request string. The text to URL-encode.

HttpStaticObjectsCollection class (System.Web)

UrlPathEncode

Description

Provides a static objects collection for the System.Web.HttpApplicationState.StaticObjects property.

HttpStaticObjectsCollection

Example Syntax:

UrlPathEncode

[C#] public HttpStaticObjectsCollection( );

[C++] public: HttpStaticObjectsCollection( );

[VB] Public Sub New( )

[JScript] public function HttpStaticObjectsCollection( );

Count

UrlPathEncode

[C#] public int Count {get;}

[C++] public: _property int get_Count( );

[VB] Public ReadOnly Property Count As Integer

[JScript] public function get Count( ): int;

Description

Gets the number of objects in the collection.

IsReadOnly

UrlPathEncode

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the collection is read-only.

IsSynchronized

UrlPathEncode

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether the collection is synchronized (i.e.: thread-safe).

Item

UrlPathEncode

[C#] public object this[string name] {get;}

[C++] public: _property Object* get_Item(String* name);

[VB] Public Default ReadOnly Property Item(ByVal name As String) As Object

[JScript] returnValue=HttpStaticObjectsCollectionObject.Item (name);

Description

Gets the object with the specified name from the collection. The case-insensitive name of the object to get.

SyncRoot

UrlPathEncode

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets an object that can be used to synchronize access to the collection.

Program code should generally perform synchronized operations on the SyncRoot of a collection, not directly on the collection itself. This ensures proper operation of collections that are derived from other objects. Specifically, it maintains proper synchronization with other threads that might be simultaneously modifying the collection object.

CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies members of an HttpStaticObjectsCollection into an array. The array to copy the HttpStaticObjectsCollection into. The member of the collection where copying starts.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns a dictionary enumerator used for iterating through the key-and-value pairs contained in the collection.

Return Value: The enumerator for the collection.

GetObject

[C#] public object GetObject(string name);

[C++] public: Object* GetObject(String* name);

[VB] Public Function GetObject(ByVal name As String) As Object

[JScript] public function GetObject(name: String): Object;

Description

Returns the object with the specified name from the collection. This property is an alternative to the this accessor.

Return Value: An object from the collection. The case-insensitive name of the object to return.

HttpUnhandledException class (System.Web)

ToString

Description

The exception that is thrown when a generic exception occurs.

HttpUnhandledException

Example Syntax:

ToString

[C#] public HttpUnhandledException(string message, Exception innerException);

[C++] public: HttpUnhandledException(String* message, Exception* innerException);

[VB] Public Sub New(ByVal message As String, ByVal innerException As Exception)

[JScript] public function HttpUnhandledException(message: String, innerException: Exception); Initializes a new instance of the System.Web.HttpUnhandledException class.

Description

Initializes a new instance of the System.Web.HttpUnhandledException class with the specified error message and inner exception. The message displayed to the client when the exception is thrown. The System.Exception.InnerException, if any, that threw the current exception.

HttpUnhandledException

Example Syntax:

ToString

[C#] public HttpUnhandledException(string message, string postMessage, Exception innerException);

[C++] public: HttpUnhandledException(String* message, String* postMessage, Exception* innerException);

[VB] Public Sub New(ByVal message As String, ByVal postMessage As String, ByVal innerException As Exception)

[JScript] public function HttpUnhandledException(message: String, postMessage: String, innerException: Exception);

Description

Initializes a new instance of the HttpUnhandledException class with the specified error messages and inner exception. The message displayed to the client when the exception is thrown. An additional message displayed to the client when the exception is thrown. The System.Exception.InnerException, if any, that threw the current exception.

ErrorCode

HelpLink

HResult

InnerException

Message

Source

StackTrace

TargetSite

HttpUtility class (System.Web)

ToString

Description

Provides methods for encoding and decoding URLs when processing Web requests.

HttpUtility

Example Syntax:

ToString

[C#] public HttpUtility( );

[C++] public: HttpUtility( );

[VB] Public Sub New( )

[JScript] public function HttpUtility( );

HtmlAttributeEncode

[C#] public static string HtmlAttributeEncode(string s);

[C++] public: static String* HtmlAttributeEncode(String* s);

[VB] Public Shared Function HtmlAttributeEncode(ByVal s As String) As String

[JScript] public static function HtmlAttributeEncode(s: String): String; Minimally converts a string into an HTML-encoded string.

Description

Minimally converts a string to an HTML-encoded string.

Return Value: The encoded string.

HtmlAttributeEncode converts only quotes (") and ampersands (&) to equivalent character entities. It is considerably faster than the System.Web.HttpUtility.HtmlEncode(System.String) methods. The string to encode.

HtmlAttributeEncode

[C#] public static void HtmlAttributeEncode(string s, TextWriter output);

[C++] public: static void HtmlAttributeEncode(String* s, TextWriter* output);

[VB] Public Shared Sub HtmlAttributeEncode(ByVal s As String, ByVal output As TextWriter)

[JScript] public static function HtmlAttributeEncode(s: String, output : TextWriter);

Description

Minimally converts a string into an HTML-encoded string and sends the encoded string to a System.IO.TextWriter output stream.

HtmlAttributeEncode converts only quotes (") and ampersands (&) to equivalent character entities. It is considerably faster than the System.Web.HttpUtility.HtmlEncode(System.String) methods. The string to encode A System.IO.TextWriter output stream.

HtmlDecode

[C#] public static string HtmlDecode(string s);

[C++] public: static String* HtmlDecode(String* s);

[VB] Public Shared Function HtmlDecode(ByVal s As String) As String

[JScript] public static function HtmlDecode(s: String): String; Converts a string that has been HTML-encoded for HTTP transmission into a decoded string.

Description

Converts a string that has been HTML-encoded for HTTP transmission into a decoded string.

Return Value: The decoded string.

If characters such as blanks and punctuation are passed in an HTTP stream, they might be misinterpreted at the receiving end. HTML encoding converts characters that are not allowed in HTML into character-entity equivalents; HTML decoding reverses the encoding. For example, when embedded in a block of text, the characters < and >, are encoded as < and > for HTTP transmission. The string to decode.

HtmlDecode

[C#] public static void HtmlDecode(string s, TextWriter output);

[C++] public: static void HtmlDecode(String* s, TextWriter* output);

[VB] Public Shared Sub HtmlDecode(ByVal s As String, ByVal output As TextWriter)

[JScript] public static function HtmlDecode(s: String, output: TextWriter);

Description

Converts a string that has been HTML-encoded into a decoded string, and sends the decoded string to a System.IO.TextWriter output stream.

If characters such as blanks and punctuation are passed in an HTTP stream, they might be misinterpreted at the receiving end. HTML encoding converts characters that are not allowed in HTML into character-entity equivalents; HTML decoding reverses the encoding. For example, when embedded in a block of text, the characters < and >, are encoded as < and > for HTTP transmission. The string to decode. A System.IO.TextWriter stream of output.

HtmlEncode

[C#] public static string HtmlEncode(string s);

[C++] public: static String* HtmlEncode(String* s);

[VB] Public Shared Function HtmlEncode(ByVal s As String) As String

[JScript] public static function HtmlEncode(s: String): String; Converts a string into an HTML-encoded string for reliable HTTP transmission from the Web server to a client.

Description

Converts a string to an HTML-encoded string for reliable HTTP transmission from the Web server to a client.

Return Value: The encoded string.

If characters such as blanks and punctuation are passed in an HTTP stream, they might be misinterpreted at the receiving end. HTML encoding converts characters that are not allowed in HTML into character-entity equivalents; HTML decoding reverses the encoding. For example, when embedded in a block of text, the characters < and >, are encoded as < and > for HTTP transmission. The string to encode.

HtmlEncode

[C#] public static void HtmlEncode(string s, TextWriter output);

[C++] public: static void HtmlEncode(String* s, TextWriter* output);

[VB] Public Shared Sub HtmlEncode(ByVal s As String, ByVal output As TextWriter)

[JScript] public static function HtmlEncode(s: String, output: TextWriter);

Description

Converts a string into an HTML-encoded string, and returns the output as a TextWriter stream of output.

If characters such as blanks and punctuation are passed in an HTTP stream, they might be misinterpreted at the receiving end. HTML encoding converts characters that are not allowed in HTML into character-entity equivalents; HTML decoding reverses the encoding. For example, when embedded in a block of text, the characters < and >, are encoded as < and > for HTTP transmission. The string to encode A System.IO.TextWriter output stream.

UrlDecode

[C#] public static string UrlDecode(string str);

[C++] public: static String* UrlDecode(String* str);

[VB] Public Shared Function UrlDecode(ByVal str As String) As String

[JScript] public static function UrlDecode(str: String): String; Converts a string that has been encoded for transmission in a URL into a decoded string.

Description

Converts a string that has been encoded for transmission in a URL into a decoded string.

Return Value; The decoded string.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The string to decode.

UrlDecode

[C#] public static string UrlDecode(byte[ ] bytes, Encoding e);

[C++] public: static String* UrlDecode(unsigned char bytes_gc[ ], Encoding* e);

[VB] Public Shared Function UrlDecode(ByVal bytes( ) As Byte, ByVal e As Encoding) As String

[JScript] public static function UrlDecode(bytes: Byte[ ], e: Encoding): String;

Description

Converts a URL-encoded byte array into a decoded string, using the specified decoding method.

Return Value: The decoded string.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The byte array to decode. The System.Text.Encoding that specifies the decoding method.

UrlDecode

[C#] public static string UrlDecode(string str, Encoding e);

[C++] public: static String* UrlDecode(String* str, Encoding* e);

[VB] Public Shared Function UrlDecode(ByVal str As String, ByVal e As Encoding) As String

[JScript] public static function UrlDecode(str: String, e: Encoding): String;

Description

Converts a URL-encoded string into a decoded string, using the specified decoding method.

Return Value: The decoded string.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The string to decode. The System.Text.Encoding that specifies the decoding method.

UrlDecode

[C#] public static string UrlDecode(byte[ ] bytes, int offset, int count, Encoding e);

[C++] public: static String* UrlDecode(unsigned char bytes _gc[ ], int offset, int count, Encoding* e);

[VB] Public Shared Function UrlDecode(ByVal bytes( ) As Byte, ByVal offset As Integer, ByVal count As Integer, ByVal e As Encoding) As String

[JScript] public static function UrlDecode(bytes: Byte[ ], offset: int, count: int, e: Encoding) String;

Description

Converts a URL-encoded byte array into a decoded string, using the specified decoding method, starting at the specified position in the array, and continuing for the specified number of bytes.

Return Value: The decoded string.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The array of bytes to decode. The position in the byte to begin decoding. The number of bytes to decode starting at offset. The System.Text.Encoding object that specifies the decoding method.

UrlDecodeToBytes

[C#] public static byte[ ] UrlDecodeToBytes(byte[ ] bytes);

[C++] public: static unsigned char UrlDecodeToBytes(unsigned char bytes _gc[ ]) _gc[ ];

[VB] Public Shared Function UrlDecodeToBytes(ByVal bytes( ) As Byte) As Byte( )

[JScript] public static function UrlDecodeToBytes(bytes: Byte[ ]): Byte[ ];

Description

Converts a URL-encoded arrray of bytes into a decoded array of bytes.

Return Value: The decoded array of bytes.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The array of bytes to decode.

UrlDecodeToBytes

[C#] public static byte[ ] UrlDecodeToBytes(string str);

[C++] public: static unsigned char UrlDecodeToBytes (String* str) _gc[ ];

[VB] Public Shared Function UrlDecodeToBytes(ByVal str As String) As Byte( )

[JScript] public static function UrlDecodeToBytes(str: String): Byte[ ]; Converts a URL-encoded string or byte array into a decoded array of bytes.

Description

Converts a URL-encoded string into a decoded array of bytes.

Return Value: The decoded array of bytes.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The string to decode.

UrlDecodeToBytes

[C#] public static byte[ ] UrlDecodeToBytes(string str, Encoding e);

[C++] public: static unsigned char UrlDecodeToBytes (String* str, Encoding* e) _gc[ ];

[VB] Public Shared Function UrlDecodeToBytes(ByVal str As String, ByVal e As Encoding) As Byte( )

[JScript] public static function UrlDecodeToBytes(str: String, e: Encoding) : Byte[ ];

Description

Converts a URL-encoded string into a decoded array of bytes, using the specified decoding method.

Return Value: The decoded array of bytes.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The string to decode. The System.Text.Encoding object that specifies the decoding method.

UrlDecodeToBytes

[C#] public static byte[ ] UrlDecodeToBytes(byte[ ] bytes, int offset, int count);

[C++] public: static unsigned char UrlDecodeToBytes(unsigned char bytes _gc[ ], int offset, int count) _gc[ ];

[VB] Public Shared Function UrlDecodeToBytes(ByVal bytes( ) As Byte, ByVal offset As Integer, ByVal count As Integer) As Byte( )

[JScript] public static function UrlDecodeToBytes(bytes: Byte[ ], offset: int, count: int): Byte[ ];

Description

Converts a URL-encoded arrray of bytes into a decoded array of bytes, starting at the specified position in the array and continuing for the specified number of bytes.

Return Value: The decoded array of bytes.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The array of bytes to decode. The position in the byte array to begin decoding. The number of bytes to decode, starting at offset.

UrlEncode

[C#] public static string UrlEncode(byte[ ] bytes);

[C++] public: static String* UrlEncode(unsigned char bytes _gc[ ]);

[VB] Public Shared Function UrlEncode(ByVal bytes( ) As Byte) As String

[JScript] public static function UrlEncode(bytes: Byte[ ]): String;

Description

Converts a byte array into an encoded URL string for reliable HTTP transmission from the Web server to a client.

Return Value: The encoded string.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The byte array to encode.

UrlEncode

[C#] public static string UrlEncode(string str);

[C++] public: static String* UrlEncode(String* str);

[VB] Public Shared Function UrlEncode(ByVal str As String) As String

[JScript] public static function UrlEncode(str: String): String; Encodes a URL string for reliable HTTP transmission from the Web server to a client.

Description

Encodes a URL string for reliable HTTP transmission from the Web server to a client.

Return Value: The encoded string.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The text to encode.

UrlEncode

[C#] public static string UrlEncode(string str, Encoding e);

[C++] public: static String* UrlEncode(String* str, Encoding* e);

[VB] Public Shared Function UrlEncode(ByVal str As String, ByVal e As Encoding) As String

[JScript] public static function UrlEncode(str: String, e: Encoding): String;

Description

Encodes a URL string for reliable HTTP transmission from the Web server to a client, using the specified encoding method.

Return Value: The encoded string.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The text to encode. The System.Text.Encoding object that specifies the encoding scheme.

UrlEncode

[C#] public static string UrlEncode(byte[ ] bytes, int offset, int count);

[C++] public: static String* UrlEncode(unsigned char bytes _gc[ ], int offset, int count);

[VB] Public Shared Function UrlEncode(ByVal bytes( ) As Byte, ByVal offset As Integer, ByVal count As Integer) As String

[JScript] public static function UrlEncode(bytes: Byte[ ], offset: int, count: int): String;

Description

Converts a byte array into a URL-encoded string for reliable HTTP transmission from the Web server to a client, starting at the specified position in the array and continuing for the specified number of bytes.

Return Value: The encoded string.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The byte array to encode. The position in the byte array to begin encoding. The number of bytes to encode, starting at offset.

UrlEncodeToBytes

[C#] public static byte[ ] UrlEncodeToBytes(byte[ ] bytes);

[C++] public: static unsigned char UrlEncodeToBytes(unsigned char bytes _gc[ ]) _gc[ ];

[VB] Public Shared Function UrlEncodeToBytes(ByVal bytes( ) As Byte) As Byte( )

[JScript] public static function UrlEncodeToBytes(bytes: Byte[ ]): Byte[ ];

Description

Converts an array of bytes into a URL-encoded array of bytes.

Return Value: The encoded array of bytes.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The array of bytes to encode.

UrlEncodeToBytes

[C#] public static byte[ ] UrlEncodeToBytes(string str);

[C++] public: static unsigned char UrlEncodeToBytes (String* str) _gc[ ];

[VB] Public Shared Function UrlEncodeToBytes(ByVal str As String) As Byte( )

[JScript] public static function UrlEncodeToBytes(str: String): Byte[ ]; Converts a string or a byte array into an encoded array of bytes for reliable HTTP transmission from the Web server to a client.

Description

Converts a string into a URL-encoded array of bytes Return Value: The encoded array of bytes.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The string to encode.

UrlEncodeToBytes

[C#] public static byte[ ] UrlEncodeToBytes(string str, Encoding e);

[C++] public: static unsigned char UrlEncodeToBytes (String* str, Encoding* e) _gc[ ];

[VB] Public Shared Function UrlEncodeToBytes(ByVal str As String, ByVal e As Encoding) As Byte( )

[JScript] public static function UrlEncodeToBytes(str: String, e: Encoding) : Byte[ ];

Description

Converts a string into a URL-encoded array of bytes, using the specified encoding method.

Return Value: The encoded array of bytes.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The string to encode The System.Text.Encoding that specifies the encoding method.

UrlEncodeToBytes

[C#] public static byte[ ] UrlEncodeToBytes(byte[ ] bytes, int offset, int count);

[C++] public: static unsigned char UrlEncodeToBytes(unsigned char bytes _gc[ ], int offset, int count) _gc[ ];

[VB] Public Shared Function UrlEncodeToBytes(ByVal bytes( ) As Byte, ByVal offset As Integer, ByVal count As Integer) As Byte( )

[JScript] public static function UrlEncodeToBytes(bytes: Byte[ ], offset: int, count: int): Byte[ ];

Description

Converts an array of bytes into a URL-encoded array of bytes, starting at the specified position in the array and continuing for the specified number of bytes.

Return Value: The encoded array of bytes.

If characters such as blanks and punctuation are passed in an HTTP stream, they might be misinterpreted at the receiving end. URL encoding converts characters that are not allowed in a URL into character-entity equivalents; URL decoding reverses the encoding. For example, when embedded in a block of text to be transmitted in a URL, the characters < and > are encoded as %3c and %3d. The array of bytes to encode. The position in the byte array to begin encoding. The number of bytes to encode, starting at offset.

UrlEncodeUnicode

[C#] public static string UrlEncodeUnicode(string str);

[C++] public: static String* UrlEncodeUnicode(String* str);

[VB] Public Shared Function UrlEncodeUnicode(ByVal str As String) As String

[JScript] public static function UrlEncodeUnicode(str: String): String;

Description

Converts a string into a Unicode string.

Return Value: The Unicode string.

If characters such as blanks and punctuation are passed in an HTTP stream, they might be misinterpreted at the receiving end. URL encoding converts characters that are not legal in a URL to character-entity equivalents; URL decoding reverses the encoding. For example, when embedded in a block of text to be transmitted in a URL, the characters < and > are encoded as %3c and %3d. The string to convert.

UrlEncodeUnicodeToBytes

[C#] public static byte[ ] UrlEncodeUnicodeToBytes(string str);

[C++] public: static unsigned char UrlEncodeUnicodeToBytes(String* str) _gc[ ];

[VB] Public Shared Function UrlEncodeUnicodeToBytes (ByVal str As String) As Byte( )

[JScript] public static function UrlEncodeUnicodeToBytes (str: String): Byte[ ];

Description

Converts a string into a Unicode array of bytes.

Return Value: The Unicode byte array.

If characters such as blanks and punctuation are passed in an HTTP stream, they might be misinterpreted at the receiving end. URL encoding converts characters that are not legal in a URL to character-entity equivalents; URL decoding reverses the encoding. For example, when embedded in a block of text to be transmitted in a URL, the characters < and > are encoded as %3c and %3d. The string to convert.

HttpValidationStatus enumeration (System.Web)

UrlEncodeUnicodeToBytes

Description

Provides enumerated values that indicate cache validation status.

UrlEncodeUnicodeToBytes

[C#] public const HttpValidationStatus IgnoreThisRequest;

[C++] public: const HttpValidationStatus IgnoreThisRequest;

[VB] Public Const IgnoreThisRequest As HttpValidationStatus

[JScript] public var IgnoreThisRequest: HttpValidationStatus;

Description

Specifies not to validate the entity in the cache.

UrlEncodeUnicodeToBytes

[C#] public const HttpValidationStatus Invalid;

[+] public: const HttpValidationStatus Invalid;

[VB] Public Const Invalid As HttpValidationStatus

[JScript] public var Invalid: HttpValidationStatus;

Description

Indicates that the cache is invalid.

UrlEncodeUnicodeToBytes

[C#] public const HttpValidationStatus Valid;

[C++] public: const HttpValidationStatus Valid;

[VB] Public Const Valid As HttpValidationStatus
[JScript] public var Valid: HttpValidationStatus;

Description
Indicates that the cache is valid.
HttpWorkerRequest class (System.Web)
ToString Description
This abstract class defines the base worker methods and enumerations used by ASP.NET managed code for request processing.
ToString
[C#] public const int HeaderAccept;
[C++] public: const int HeaderAccept;
[VB] Public Const HeaderAccept As Integer
[JScript] public var HeaderAccept: int;

Description
ToString
[C#] public const int HeaderAcceptCharset;
[C++] public: const int HeaderAcceptCharset;
[VB] Public Const HeaderAcceptCharset As Integer
[JScript] public var HeaderAcceptCharset: int;

Description
ToString
[C#] public const int HeaderAcceptEncoding;
[C++] public: const int HeaderAcceptEncoding;
[VB] Public Const HeaderAcceptEncoding As Integer
[JScript] public var HeaderAcceptEncoding: int;

Description
ToString
[C#] public const int HeaderAcceptLanguage;
[C++] public: const int HeaderAcceptLanguage;
[VB] Public Const HeaderAcceptLanguage As Integer
[JScript] public var HeaderAcceptLanguage: int;

Description
ToString
[C#] public const int HeaderAcceptRanges;
[C++] public: const int HeaderAcceptRanges;
[VB] Public Const HeaderAcceptRanges As Integer
[JScript] public var HeaderAcceptRanges: int;

Description
ToString
[C#] public const int HeaderAge; [C++] public: const int HeaderAge;
[VB] Public Const HeaderAge As Integer
[JScript] public var HeaderAge: int;

Description
ToString
[C#] public const int HeaderAllow;
[C++] public: const int HeaderAllow;
[VB] Public Const HeaderAllow As Integer
[JScript] public var HeaderAllow: int;

Description
ToString
[C#] public const int HeaderAuthorization;
[C++] public: const int HeaderAuthorization;
[VB] Public Const HeaderAuthorization As Integer
[JScript] public var HeaderAuthorization: int;

Description
ToString
[C#] public const int HeaderCacheControl;
[C++] public: const int HeaderCacheControl;
[VB] Public Const HeaderCacheControl As Integer
[JScript] public var HeaderCacheControl: int;

Description
ToString
[C#] public const int HeaderConnection;
[C++] public: const int HeaderConnection;
[VB] Public Const HeaderConnection As Integer
[JScript] public var HeaderConnection: int;

Description
ToString
[C#] public const int HeaderContentEncoding;
[C++] public: const int HeaderContentEncoding;
[VB] Public Const HeaderContentEncoding As Integer
[JScript] public var HeaderContentEncoding: int;

Description
ToString
[C#] public const int HeaderContentLanguage;
[C++] public: const int HeaderContentLanguage;
[VB] Public Const HeaderContentLanguage As Integer
[JScript] public var HeaderContentLanguage: int;

Description
ToString
[C#] public const int HeaderContentLength;
[C++] public: const int HeaderContentLength;
[VB] Public Const HeaderContentLength As Integer
[JScript] public var HeaderContentLength: int;

Description
ToString
[C#] public const int HeaderContentLocation;
[C++] public: const int HeaderContentLocation;
[VB] Public Const HeaderContentLocation As Integer
[JScript] public var HeaderContentLocation: int;

Description
ToString
[C#] public const int HeaderContentMd5;
[C++] public: const int HeaderContentMd5;
[VB] Public Const HeaderContentMd5 As Integer
[JScript] public var HeaderContentMd5: int;

Description
ToString
[C#] public const int HeaderContentRange;
[C++] public: const int HeaderContentRange;
[VB] Public Const HeaderContentRange As Integer
[JScript] public var HeaderContentRange: int;

Description
ToString
[C#] public const int HeaderContentType;
[C++] public: const int HeaderContentType;
[VB] Public Const HeaderContentType As Integer
[JScript] public var HeaderContentType: int;

Description
ToString
[C#] public const int HeaderCookie;
[C++] public: const int HeaderCookie;
[VB] Public Const HeaderCookie As Integer
[JScript] public var HeaderCookie: int;

Description
ToString
[C#] public const int HeaderDate;
[C++] public: const int HeaderDate;
[VB] Public Const HeaderDate As Integer
[JScript] public var HeaderDate int;

Description
ToString
[C#] public const int HeaderEtag;
[C++] public: const int HeaderEtag;
[VB] Public Const HeaderEtag As Integer
[JScript] public var HeaderEtag: int;

Description
ToString
[C#] public const int HeaderExpect;
[C++] public: const int HeaderExpect;
[VB] Public Const HeaderExpect As Integer
[JScript] public var HeaderExpect: int;

Description
ToString
[C#] public const int HeaderExpires;
[C++] public: const int HeaderExpires;
[VB] Public Const HeaderExpires As Integer
[JScript] public var HeaderExpires: int;

Description
ToString
[C#] public const int HeaderFrom;
[C++#] public: const int HeaderFrom;
[VB] Public Const HeaderFrom As Integer
[JScript] public var HeaderFrom: int;

Description
ToString
[C#] public const int HeaderHost;
[C++] public: const int HeaderHost;
[VB] Public Const HeaderHost As Integer
[JScript] public var HeaderHost: int;

Description
ToString
[C#] public const int HeaderIfMatch;
[C++] public: const int HeaderIFMatch;
[VB] Public Const HeaderIMatch As Integer
[JScript] public var HeaderIfMatch: int;

Description
ToString
[C#] public const int HeaderIfModifiedSince;
[C++] public: const int HeaderIfModifiedSince;
[VB] Public Const HeaderIfModifiedSince As Integer
[JScript] public var HeaderIfModifiedSince: int;

Description
ToString
[C#] public const int HeaderIfNoneMatch;
[C++] public: const int HeaderIfNoneMatch;
[VB] Public Const HeaderIfNoneMatch As Integer
[JScript] public var HeaderIfNoneMatch: int;

Description
ToString
[C#] public const int HeaderIfRange;
[C++] public: const int HeaderIfRange;
[VB] Public Const HeaderIfRange As Integer
[JScript] public var HeaderIfRange: int;

Description
ToString
[C#] public const int HeaderIfUnmodifiedSince;
[+°] public: const int HeaderIfUnmodifiedSince;
[VB] Public Const HeaderIfUnmodifiedSince As Integer
[JScript] public var HeaderIfUnmodifiedSince: int;

Description
ToString
[C#] public const int HeaderKeepAlive;
[C++] public: const int HeaderKeepAlive;
[VB] Public Const HeaderKeepAlive As Integer
[JScript] public var HeaderKeepAlive: int;

Description
ToString
[C#] public const int HeaderLastModified;
[C++] public: const int HeaderLastModified;
[VB] Public Const HeaderLastModified As Integer
[JScript] public var HeaderLastModified: int;

Description
ToString
[C#] public const int HeaderLocation;
[C++] public: const int HeaderLocation;
[VB] Public Const HeaderLocation As Integer
[JScript] public var HeaderLocation: int;

Description
ToString
[C#] public const int HeaderMaxForwards;
[C++] public: const int HeaderMaxForwards;
[VB] Public Const HeaderMaxForwards As Integer
[JScript] public var HeaderMaxForwards: int;

Description
ToString
[C#] public const int HeaderPragma;
[C++] public: const int HeaderPragma;
[VB] Public Const HeaderPragma As Integer
[JScript] public var HeaderPragma: int;

Description
ToString
[C#] public const int HeaderProxyAuthenticate;
[C++] public: const int HeaderProxyAuthenticate;
[VB] Public Const HeaderProxyAuthenticate As Integer
[JScript] public var HeaderProxyAuthenticate: int;

Description
ToString
[C#] public const int HeaderProxyAuthorization;
[C++] public: const int HeaderProxyAuthorization;
[VB] Public Const HeaderProxyAuthorization As Integer
[JScript] public var HeaderProxyAuthorization: int;

Description
ToString
[C#] public const int HeaderRange;
[C++] public: const int HeaderRange;
[VB] Public Const HeaderRange As Integer
[JScript] public var HeaderRange: int;

Description
ToString
[C#] public const int HeaderReferer;
[C++] public: const int HeaderReferer;
[VB] Public Const HeaderReferer As Integer
[JScript] public var HeaderReferer: int;

Description
ToString
[C#] public const int HeaderRetryAfter;
[C++] public: const int HeaderRetryAfter;
[VB] Public Const HeaderRetryAfter As Integer
[JScript] public var HeaderRetryAfter: int;

Description
ToString
[C#] public const int HeaderServer;
[C++] public: const int HeaderServer;
[VB] Public Const HeaderServer As Integer
[JScript] public var HeaderServer: int;

Description
ToString
[C#] public const int HeaderSetCookie;
[C++] public: const int HeaderSetCookie;
[VB] Public Const HeaderSetCookie As Integer
[JScript] public var HeaderSetCookie: int;

Description
ToString
[C#] public const int HeaderTe;
[C++] public: const int HeaderTe;
[VB] Public Const HeaderTe As Integer
[JScript] public var HeaderTe int;

Description
ToString
[C#] public const int HeaderTrailer;
[C++] public: const Int HeaderTrailer;
[VB] Public Const HeaderTrailer As Integer
[JScript] public var HeaderTrailer: int;

Description
ToString
[C#] public const int HeaderTransferEncoding;
[C++] public: const int HeaderTransferEncoding;
[VB] Public Const HeaderTransferEncoding As Integer
[JScript] public var HeaderTransferEncoding: int;

Description
ToString
[C#] public const int HeaderUpgrade;
[C++] public: const int HeaderUpgrade;
[VB] Public Const HeaderUpgrade As Integer
[JScript] public var HeaderUpgrade: int;

Description
ToString
[C#] public const int HeaderUserAgent;
[C++] public: const int HeaderUserAgent;
[VB] Public Const HeaderUserAgent As Integer
[JScript] public var HeaderUserAgent: int;

Description
ToString
[C#] public const int HeaderVary;
[C++] public: const int HeaderVary;
[VB] Public Const HeaderVary As Integer
[JScript] public var HeaderVary: int;

Description
ToString
[C#] public const int HeaderVia;
[C++] public: const int HeaderVia;
[VB] Public Const HeaderVia As Integer
[JScript] public var HeaderVia: int;

Description
ToString
[C#] public const int HeaderWarning;
[C++] public: const int HeaderWarning;
[VB] Public Const HeaderWarning As Integer
[JScript] public var HeaderWarning: int;

Description
ToString
[C#] public const int HeaderWwwAuthenticate;
[C++] public: const int HeaderWwwAuthenticate;
[VB] Public Const HeaderWwwAuthenticate As Integer
[JScript] public var HeaderWwwAuthenticate: int;

Description
ToString
[C#] public const int ReasonCachePolicy;
[C++] public: const int ReasonCachePolicy;
[VB] Public Const ReasonCachePolicy As Integer
[JScript] public var ReasonCachePolicy: int;

Description
ToString
[C#] public const int ReasonCacheSecurity;
[C++] public: const int ReasonCacheSecurity;
[VB] Public Const ReasonCacheSecurity As Integer
[JScript] public var ReasonCacheSecurity: int;

Description
ToString
[C#] public const int ReasonClientDisconnect;
[C++] public: const it ReasonClientDisconnect;
[VB] Public Const ReasonClientDisconnect As Integer
[JScript] public var ReasonClientDisconnect: int;

Description
ToString
[C#] public const int ReasonDefault;
[C++] public: const int ReasonDefault;
[VB] Public Const ReasonDefault As Integer
[JScript] public var ReasonDefault: int;

Description
ToString
[C#] public const int ReasonFileHandleCacheMiss;
[C++] public: const int ReasonFileHandleCacheMiss;
[VB] Public Const ReasonFileHandleCacheMiss As Integer
[JScript] public var ReasonFileHandleCacheMiss: int;

Description
ToString
[C#] public const int ReasonResponseCacheMiss;
[C++] public: const int ReasonResponseCacheMiss;
[VB] Public Const ReasonResponseCacheMiss As Integer
[JScript] public var ReasonResponseCacheMiss: int;

Description
ToString
[C#] public const int RequestHeaderMaximum;
[C++] public: const int RequestHeaderMaximum;
[VB] Public Const RequestHeaderMaximum As Integer
[JScript] public var RequestHeaderMaximum: int;

Description
ToString
[C#] public const int ResponseHeaderMaximum;
[C++] public: const int ResponseHeaderMaximum;
[VB] Public Const ResponseHeaderMaximum As Integer
[JScript] public var ResponseHeaderMaximum: int;

Description
HttpWorkerRequest
Example Syntax:
ToString
[C#] protected HttpWorkerRequest( );
[C++] protected: HttpWorkerRequest( );
[VB] Protected Sub New( )
[JScript] protected function HttpWorkerRequest( );
MachineConfigPath
ToString

[C#] public virtual string MachineConfigPath {get;}
[C++] public: property virtual String* get MachineConfigPath( );
[VB] Overridable Public ReadOnly Property MachineConfigPath As String
[JScript] public function get MachineConfigPath( ): String;

Description
MachineInstallDirectory
ToString
[C#] public virtual string MachineInstallDirectory {get;}
[C++] public: property virtual String* get MachineInstallDirectory( );
[VB] Overridable Public ReadOnly Property MachineInstallDirectory As String
[JScript] public function get MachineInstallDirectory( ): String;

Description
CloseConnection
[C#] public virtual void CloseConnection( );
[C++] public: virtual void CloseConnection( );
[VB] Overridable Public Sub CloseConnection( )
[JScript] public function CloseConnection( );

Description
EndOfRequest
[C#] public abstract void EndOfRequest( );
[C++] public: virtual void EndOfRequest( )=0;
[VB] MustOverride Public Sub EndOfRequest( )
[JScript] public abstract function EndOfRequest( );

Description
FlushResponse
[C#] public abstract void FlushResponse(bool finalFlush);
[C++] public: virtual void FlushResponse(bool finalFlush)=0;
[VB] MustOverride Public Sub FlushResponse(ByVal finalFlush As Boolean)
[JScript] public abstract function FlushResponse(finalFlush: Boolean);

Description
GetAppPath
[C#] public virtual string GetAppPath( );
[C++] public: virtual String* GetAppPath( );
[VB] Overridable Public Function GetAppPath( ) As String
[JScript] public function GetAppPath( ): String;

Description
When overridden in a derived class, returns the virtual path to the currently executing server application.

Return Value: The virtual path of the current application.
GetAppPathTranslated
[C#] public virtual string GetAppPathTranslated( );
[C++] public: virtual String* GetAppPathTranslated( );
[VB] Overridable Public Function GetAppPathTranslated( ) As String
[JScript] public function GetAppPathTranslated( ): String;

Description
When overridden in a derived class, returns the UNC-translated path to the currently executing server application.

Return Value: The UNC physical path of the current application.
GetAppPoolID
[C#] public virtual string GetAppPoolID( );
[C++] public: virtual String* GetAppPoolID( );
[VB] Overridable Public Function GetAppPoolID( ) As String
[JScript] public function GetAppPoolID( ): String;

Description
When overridden in a derived class, returns the application pool ID for the current URL.

Return Value: Always returns null.
GetBytesRead
[C#] public virtual long GetBytesRead( );
[C++] public: virtual _int64 GetBytesRead( );
[VB] Overridable Public Function GetBytesRead( ) As Long
[JScript] public function GetBytesRead( ): long;

Description
GetClientCertificate
[C#] public virtual byte[ ] GetClientCertificate( );
[C++] public: virtual unsigned char GetClientCertificate( ) _gc[ ];
[VB] Overridable Public Function GetClientCertificate( ) As Byte( )
[JScript] public function GetClientCertificate( ): Byte[ ];

Description
Defines the base worker class used by ASP.NET managed code for request processing.
GetClientCertificateBinaryIssuer
[C#] public virtual byte[ ] GetClientCertificateBinary Issuer( );
[C++] public: virtual unsigned char GetClientCertificateBinaryIssuer( ) _gc[ ];
[VB] Overridable Public Function GetClientCertificateBinaryIssuer( ) As Byte( )
[JScript] public function GetClientCertificateBinaryIssuer( ): Byte[ ];

Description
GetClientCertificateEncoding
[C#] public virtual int GetClientCertificateEncoding( );
[C++] public: virtual int GetClientCertificateEncoding( );
[VB] Overridable Public Function GetClientCertificateEncoding( ) As Integer
[JScript] public function GetClientCertificateEncoding( ): int;

Description
GetClientCertificatePublicKey
[C#] public virtual byte[ ] GetClientCertificatePublicKey( );
[C++] public: virtual unsigned char GetClientCertificatePublicKey( ) _gc[ ];
[VB] Overridable Public Function GetClientCertificatePublicKey( ) As Byte( )
[JScript] public function GetClientCertificatePublicKey( ): Byte[ ];

Description
GetClientCertificateValidFrom
[C#] public virtual DateTime GetClientCertificateValidFrom ( );
[C++] Public: virtual DateTime GetClientCertificateValidFrom( );
[VB] Overridable Public Function GetClientCertificateValidFrom( ) As DateTime
[JScript] public function GetClientCertificateValidFrom( ): DateTime;

Description
GetClientCertificateValidUntil
[C#] public virtual DateTime GetClientCertificateValidUntil ( );

[C++] public: virtual DateTime GetClientCertificateValidUntil( );

[VB] Overridable Public Function GetClientCertificateValidUntil( ) As DateTime

[JScript] public function GetClientCertificateValidUntil( ): DateTime;

Description

GetConnectionID

[C#] public virtual long GetConnectionID( );

[C++] public: virtual _int64 GetConnectionID( );

[VB] Overridable Public Function GetConnectionID( ) As Long

[JScript] public function GetConnectionID( ): long;

Description

When overridden in a derived class, returns the ID of the current connection.

Return Value: Always returns 0.

GetFilePath

[C#] public virtual string GetFilePath( );

[C++] public: virtual String* GetFilePath( );

[VB] Overridable Public Function GetFilePath( ) As String

[JScript] public function GetFilePath( ): String;

Description

When overridden in a derived class, returns the physical path to the requested URI.

Return Value: The path to the URI.

GetFilePathTranslated

[C#] public virtual string GetFilePathTranslated( );

[C++] public: virtual String* GetFilePathTranslated( );

[VB] Overridable Public Function GetFilePathTranslated( ) As String

[JScript] public function GetFilePathTranslated( ): String;

Description

When overridden in a derived class, returns the translated file path to the requested URI (from virtual path to UNC path, ie "/proj1/page.aspx" to "c:\dir\page.aspx")

Return Value: The translated file path.

GetHttpVerbName

[C#] public abstract string GetHttpVerbName( );

[C++] public: virtual String* GetHttpVerbName( )=0;

[VB] MustOverride Public Function GetHttpVerbName( ) As String

[JScript] public abstract function GetHttpVerbName( ): String;

Description

Provides access to the specified member of the request header.

Return Value: The HTTP verb returned in the request header.

GetHttpVersion

[C#] public abstract string GetHttpVersion( );

[C++] public: virtual String* GetHttpVersion( )=0;

[VB] MustOverride Public Function GetHttpVersion( ) As String

[JScript] public abstract function GetHttpVersion( ): String;

Description

Provides access to the specified member of the request header.

Return Value: The HTTP version returned in the request header.

GetKnownRequestHeader

[C#] public virtual string GetKnownRequestHeader(int index);

[C++] public: virtual String* GetKnownRequestHeader(int index);

[VB] Overridable Public Function GetKnownRequestHeader (ByVal index As Integer) As String

[JScript] public function GetKnownRequestHeader(index: int): String;

Description

GetKnownRequestHeaderIndex

[C#] public static int GetKnownRequestHeaderIndex(string header);

[C++] public: static int GetKnownRequestHeaderIndex (String* header);

[VB] Public Shared Function GetKnownRequestHeaderIndex(ByVal header As String) As Integer

[JScript] public static function GetKnownRequestHeaderIndex(header: String) int;

Description

GetKnownRequestHeaderName

[C#] public static string GetKnownRequestHeaderName(int index);

[C++] public: static String* GetKnownRequestHeaderName (int index);

[VB] Public Shared Function GetKnownRequestHeaderName(ByVal index As Integer) As String

[JScript] public static function GetKnownRequestHeaderName(index: int) String;

Description

GetKnownResponseHeaderIndex

[C#] public static int GetKnownResponseHeaderIndex (string header);

[C++] public: static int GetKnownResponseHeaderIndex (String* header);

[VB] Public Shared Function GetKnownResponseHeaderIndex(ByVal header As String) As Integer

[JScript] public static function GetKnownResponseHeaderIndex(header: String) int;

Description

GetKnownResponseHeaderName

[C#] public static string GetKnownResponseHeaderName (int index);

[C++] public: static String* GetKnownResponseHeaderName(int index);

[VB] Public Shared Function GetKnownResponseHeaderName(ByVal index As Integer) As String

[JScript] public static function GetKnownResponseHeaderName(index: int) String;

Description

GetLocalAddress

[C#] public abstract string GetLocalAddress( );

[C++] public: virtual String* GetLocalAddress( )=0;

[VB] MustOverride Public Function GetLocalAddress( ) As String

[JScript] public abstract function GetLocalAddress( ): String;

Description

Provides access to the specified member of the request header.

Return Value: The server's IP address returned in the request header.

GetLocalPort

[C#] public abstract int GetLocalPort( );

[C++] public: virtual int GetLocalPort( )=0;

[VB] MustOverride Public Function GetLocalPort( ) As Integer
[JScript] public abstract function GetLocalPort( ): int;

Description

Provides access to the specified member of the request header.

Return Value: The server's port number returned in the request header.

GetPathInfo
[C#] public virtual string GetPathInfo( );
[C++]public: virtual String* GetPathInfo( );
[VB] Overridable Public Function GetPathInfo( ) As String
[JScript] public function GetPathInfo( ): String;

Description

When overridden in a derived class, returns additional path information for a resource with a URL extension. That is, for the URL /virdir/page.html/tail, the PathInfo value is /tail.

Return Value: Additional path information for a resource.

GetPreloadedEntityBody
[C#] public virtual byte[ ] GetPreloadedEntityBody( );
[C++] public: virtual unsigned char GetPreloadedEntityBody( ) _gc[ ];
[VB] Overridable Public Function GetPreloadedEntity Body( ) As Byte( )
[JScript] public function GetPreloadedEntityBody( ): Byte[ ];

Description

GetProtocol
[C#] public virtual string GetProtocol( );
[C++] public: virtual String* GetProtocol( );
[VB] Overridable Public Function GetProtocol( ) As String
[JScript] public function GetProtocol( ): String;

Description

When overridden in a derived class, returns the HTTP protocol (HTTP or HTTPS).

Return Value: HTTPS if IsSecure is true, otherwise false.

GetQueryString [C#] public abstract string GetQueryString( );
[C++] public: virtual String* GetQueryString( )=0;
[VB] MustOverride Public Function GetQueryString( ) As String
[JScript] public abstract function GetQueryString( ): String;

Description

Provides access to the specified member of the request header.

Return Value: The QueryString member of the request header.

GetQueryStringRawBytes
[C#] public virtual byte[ ] GetQueryStringRawBytes( );
[C++] public: virtual unsigned char GetQueryStringRawBytes( ) _gc[ ];
[VB] Overridable Public Function GetQueryStringRawBytes( ) As Byte( )
[JScript] public function GetQueryStringRawBytes( ): Byte[ ];

Description

When overridden in a derived class, returns the response query string as an array of bytes.

Return Value: An array of bytes containing the response.

GetRawUrl
[C#] public abstract string GetRawUrl( );
[C++] public: virtual String* GetRawUrl( )=0;
[VB] MustOverride Public Function GetRawUrl( ) As String
[JScript] public abstract function GetRawUrl( ): String;

Description

Provides access to the specified member of the request header.

Return Value: The raw url member of the request header.

GetRemoteAddress
[C#] public abstract string GetRemoteAddress( );
[C++] public: virtual String* GetRemoteAddress( )=0;
[VB] MustOverride Public Function GetRemoteAddress( ) As String
[JScript] public abstract function GetRemoteAddress( ): String;

Description

Provides access to the specified member of the request header.

Return Value: The client's IP address returned in the request header.

GetRemoteName
[C#] public virtual string GetRemoteName( );
[C++] public: virtual String* GetRemoteName( );
[VB] Overridable Public Function GetRemoteName( ) As String
[JScript] public function GetRemoteName( ): String;

Description

When overridden in a derived class, returns the client computer's name.

Return Value: The name of the client machine.

GetRemotePort
[C#] public abstract int GetRemotePort( );
[C++] public: virtual int GetRemotePort( )=0;
[VB] MustOverride Public Function GetRemotePort( ) As Integer
[JScript] public abstract function GetRemotePort( ): int;

Description

Provides access to the specified member of the request header.

Return Value: The client HTTP port number returned in the request header.

GetRequestReason
[C#] public virtual int GetRequestReason( );
[C++]public: virtual int GetRequestReason( );
[VB] Overridable Public Function GetRequestReason( ) As Integer
[JScript] public function GetRequestReason( ): int;

Description

When overridden in a derived class, returns the reason for the request. Return Value: Reason code. The default is ReasonResponseCacheMiss.

GetServerName
[C#] public virtual string GetServerName( );
[C++]public: virtual String* GetServerName( );
[VB] Overridable Public Function GetServerName( ) As String
[JScript] public function GetServerName( ): String;

Description

When overridden in a derived class, returns the name of the local server.

Return Value: The name of the server.

GetServerVariable
[C#] public virtual string GetServerVariable(string name);

[C++] public: virtual String* GetServerVariable(String* name);
[VB] Overridable Public Function GetServerVariable(ByVal name As String) As String
[JScript] public function GetServerVariable(name: String): String;

Description
GetStatusDescription
[C#] public static string GetStatusDescription(int code);
[C++] public: static String* GetStatusDescription(int code);
[VB] Public Shared Function GetStatusDescription(ByVal code As Integer) As String
[JScript] public static function GetStatusDescription(code: int): String;

Description
GetUnknownRequestHeader
[C#] public virtual string GetUnknownRequestHeader(string name);
[C++] public: virtual String* GetUnknownRequestHeader (String* name);
[VB] Overridable Public Function GetUnknownRequestHeader(ByVal name As String) As String
[JScript] public function GetUnknownRequestHeader(name: String): String;

Description
GetUnknownRequestHeaders
[C#] public virtual string[ ] [ ] GetUnknownRequest Headers( );
[C++] public: virtual String* GetUnknownRequest Headers( ) [ ];
[VB] Overridable Public Function GetUnknownRequestHeaders( ) As String( )( )
[JScript] public function GetUnknownRequestHeaders( ): String[ ][ ];

Description
GetUriPath
[C#] public abstract string GetUriPath( );
[C++] public: virtual String* GetUriPath( )=0;
[VB] MustOverride Public Function GetUriPath( ) As String
[JScript] public abstract function GetUriPath( ): String;

Description
Returns the physical path to the requested URI.

Return Value: The path of the requested URI.
GetUrlContextID
[C#] public virtual long GetUrlContextID( );
[C++] public: virtual _int64 GetUrlContextID( );
[VB] Overridable Public Function GetUrlContextID( ) As Long
[JScript] public function GetUrlContextID( ): long;

Description
When overridden in a derived class, returns the context ID of the current connection.

Return Value: Always returns 0.
GetUserToken
[C#] public virtual IntPtr GetUserToken( );
[C++] public: virtual IntPtr GetUserToken( );
[VB] Overridable Public Function GetUserToken( ) As IntPtr
[JScript] public function GetUserToken( ): IntPtr;

Description
When overridden in a derived class, returns the client's impersonation token.

Return Value: The value representing the impersonation token. The default is 0.
GetVirtualPathToken
[C#] public virtual IntPtr GetVirtualPathToken( );
[C++] public: virtual IntPtr GetVirtualPathToken( );
[VB] Overridable Public Function GetVirtualPathToken( ) As IntPtr
[JScript] public function GetVirtualPathToken( ): IntPtr;

Description
HasEntityBody
[C#] public bool HasEntityBody( );
[C++] public: bool HasEntityBody( );
[VB] Public Function HasEntityBody( ) As Boolean
[JScript] public function HasEntityBody( ): Boolean;

Description
HeadersSent
[C#] public virtual bool HeadersSent( );
[C++] public: virtual bool HeadersSent( );
[VB] Overridable Public Function HeadersSent( ) As Boolean
[JScript] public function HeadersSent( ): Boolean;

Description
IsClientConnected
[C#] public virtual bool IsClientConnected( );
[C++] public: virtual bool IsClientConnected( );
[VB] Overridable Public Function IsClientConnected( ) As Boolean
[JScript] public function IsClientConnected( ): Boolean;

Description
IsEntireEntityBodyIsPreloaded
[C#] public virtual bool IsEntireEntityBodyIsPreloaded( );
[C++] public: virtual bool IsEntireEntityBodyIsPreloaded( );
[VB] Overridable Public Function IsEntireEntityBodyIsPreloaded( ) As Boolean
[JScript] public function IsEntireEntityBodyIsPreloaded( ): Boolean;

Description
IsSecure
[C#] public virtual bool IsSecure( );
[C++] public: virtual bool IsSecure( );
[VB] Overridable Public Function IsSecure( ) As Boolean
[JScript] public function IsSecure( ): Boolean;

Description
When overridden in a derived class, returns a value indicating whether the connection is secure (using SSL).

Return Value: true if the connection is secure, otherwise false. The default is false.
MapPath
[C#] public virtual string MapPath(string virtualPath);
[C++] public: virtual String* MapPath(String* virtualPath);
[VB] Overridable Public Function MapPath(ByVal virtualPath As String) As String
[JScript] public function MapPath(virtualPath: String): String;

Description
ReadEntityBody
[C#] public virtual int ReadEntityBody(byte[ ] buffer, int size);
[C++] public: virtual int ReadEntityBody(unsigned char buffer _gc[ ], int size);
[VB] Overridable Public Function ReadEntityBody(ByVal buffer( ) As Byte, ByVal size As Integer) As Integer

[JScript] public function ReadEntityBody(buffer: Byte[ ], size: int): int;

Description

SendCalculatedContentLength

[C#] public virtual void SendCalculatedContentLength(int contentLength);

[C++] public: virtual void SendCalculatedContentLength(int contentLength);

[VB] Overridable Public Sub SendCalculatedContentLength (ByVal contentLength As Integer)

[JScript] public function SendCalculatedContentLength (contentLength: int);

Description

SendKnownResponseHeader

[C#] public abstract void SendKnownResponseHeader(int index, string value);

[C++] public: virtual void SendKnownResponseHeader(int index, String* value)=0;

[VB] MustOverride Public Sub SendKnownResponseHeader (ByVal index As Integer, ByVal value As String)

[JScript] public abstract function SendKnownResponseHeader(index: int, value String);

Description

SendResponseFromFile

[C#] public abstract void SendResponseFromFile(IntPtr handle, long offset, long length);

[C++] public: virtual void SendResponseFromFile(IntPtr handle, _int64 offset, _int64 length)=0;

[VB] MustOverride Public Sub SendResponseFromFile(ByVal handle As IntPtr, ByVal offset As Long, ByVal length As Long)

[JScript] public abstract function SendResponseFromFile (handle: IntPtr, offset: long, length: long);

Description

SendResponseFromFile

[C#] public abstract void SendResponseFromFile(string filename, long offset, long length);

[C++] public: virtual void SendResponseFromFile(String* filename, _int64 offset, _int64 length)=0;

[VB] MustOverride Public Sub SendResponseFromFile(ByVal filename As String, ByVal offset As Long, ByVal length As Long)

[JScript] public abstract function SendResponseFromFile (filename: String, offset: long, length: long);

Description

SendResponseFromMemory

[C#] public abstract void SendResponseFromMemory(byte[ ] data, int length);

[C++] public: virtual void SendResponseFromMemory(unsigned char data _gc[ ], int length)=0;

[VB] MustOverride Public Sub SendResponseFromMemory (ByVal data( ) As Byte, ByVal length As Integer)

[JScript] public abstract function SendResponseFromMemory(data: Byte[ ], length int);

Description

SendResponseFromMemory

[C#] public virtual void SendResponseFromMemory(IntPtr data, int length);

[C++] public: virtual void SendResponseFromMemory(IntPtr data, int length);

[VB] Overridable Public Sub SendResponseFromMemory (ByVal data As IntPtr, ByVal length As Integer)

[JScript] public function SendResponseFromMemory(data: IntPtr, length: int);

Description

SendStatus

[C#] public abstract void SendStatus(int statusCode, string statusDescription);

[C++] public: virtual void SendStatus(int statusCode, String* statusDescription)=0;

[VB] MustOverride Public Sub SendStatus(ByVal statusCode As Integer, ByVal statusDescription As String)

[JScript] public abstract function SendStatus(statusCode: int, statusDescription String);

Description

SendUnknownResponseHeader

[C#] public abstract void SendUnknownResponseHeader (string name, string value);

[C++] public: virtual void SendUnknownResponseHeader (String* name, String* value) 0;

[VB] MustOverride Public Sub SendUnknownResponseHeader(ByVal name As String, ByVal value As String)

[JScript] public abstract function SendUnknownResponseHeader(name: String, value String);

Description

SetEndOfSendNotification

[C#] public virtual void SetEndOfSendNotification(HttpWorkerRequest.EndOfSendNotification callback, object extraData);

[C++] public: virtual void SetEndOfSendNotification(HttpWorkerRequest.EndOfSendNotification* callback, Object* extraData);

[VB] Overridable Public Sub SetEndOfSendNotification (ByVal callback As HttpWorkerRequest.EndOfSendNotification, ByVal extraData As Object)

[JScript] public function SetEndOfSendNotification(callback HttpWorkerRequest.EndOfSendNotification, extraData: Object);

Description

HttpWriter class (System.Web)

ToString

Description

Provides a System.IO.TextWriter object that is accessed through the intrinsic System.Web.HttpResponse object.

The System.Web.HttpResponse.Write(System.String) methods of the intrinsic System.Web.HttpResponse object make internal calls to an HttpWriter object.

Encoding

ToString

Description

Gets an System.Text.Encoding object for the System.IO.TextWriter.

FormatProvider

NewLine

OutputStream

ToString

Description

Gets a System.IO.Stream object to enable HTTP output directly from the Stream

Close

[C#] public override void Close( );

[C++] public: void Close( );

[VB] Overrides Public Sub Close( )

[JScript] public override function Close( );

Description

Sends all buffered output to the HTTP output stream and closes the socket connection.

Flush

[C#] public override void Flush( );

[C++] public: void Flush( );

[VB] Overrides Public Sub Flush( )

[JScript] public override function Flush( );

Description

Sends all buffered output to the HTTP output stream.

Write

[C#] public override void Write(char ch);

[C++] public: void Write(_wchar_t ch);

[VB] Overrides Public Sub Write(ByVal ch As Char)

[JScript] public override function Write(ch: Char); Sends HTTP output to the client.

Description

Sends a single character to the HTTP output stream. The character to send to the HTTP output stream.

Write

[C#] public override void Write(object obj);

[C++] public: void Write(Object* obj);

[VB] Overrides Public Sub Write(ByVal obj As Object)

[JScript] public override function Write(obj: Object);

Description

Sends an Object to the HTTP output stream. The Object to send to the HTTP output stream.

Write

[C#] public override void Write(string s);

[C++] public: void Write(String* s);

[VB] Overrides Public Sub Write(ByVal s As String)

[JScript] public override function Write(s: String);

Description

Sends a string to the HTTP output stream. The string to send to the HTTP output stream.

Write

[C#] public override void Write(char[ ] buffer, int index, int count);

[C++] public: void Write(_wchar_t buffer _gc[ ], int index, int count);

[VB] Overrides Public Sub Write(ByVal buffer( ) As Char, ByVal index As Integer, ByVal count As Integer)

[JScript] public override function Write(buffer: Char[ ], index: int, count: int);

Description

Sends a stream of characters with the specified starting position and number of characters to the HTTP output stream. The memory buffer containing the characters to send to the HTTP output stream The buffer position of the first character to send. The number of characters to send beginning at the position specified by index.

WriteBytes

[C#] public void WriteBytes(byte[ ] buffer, int index, int count);

[C++] public: void WriteBytes(unsigned char buffer _gc[ ], int index, int count);

[VB] Public Sub WriteBytes(ByVal buffer( ) As Byte, ByVal index As Integer, ByVal count As Integer)

[JScript] public function WriteBytes(buffer: Byte[ ], index: int, count: int);

Description

Sends a stream of bytes with the specified starting position and number of bytes to the HTTP output stream. The memory buffer containing the bytes to send to the HTTP output stream. The buffer position of the first byte to send. The number of bytes to send, beginning at the byte position specified by index.

WriteLine

[C#] public override void WriteLine( );

[C++] public: void WriteLine( );

[VB] Overrides Public Sub WriteLine( )

[JScript] public override function WriteLine( );

Description

Sends a carriage return +line feed (CRLF) pair of characters to the HTTP output stream.

WriteString

[C#] public void WriteString(string s, int index, int count);

[C++] public: void WriteString(String* s, int index, int count);

[VB] Public Sub WriteString(ByVal s As String, ByVal index As Integer, ByVal count As Integer)

[JScript] public function WriteString(s: String, index: int, count: int);

Description

Sends a string or a sub-string to the client.

IHttpAsyncHandler interface (System.Web) WriteString

Description

When implemented by a class, defines the contract that HTTP asynchronous handler objects must implement.

BeginProcessRequest

[C#] IAsyncResult BeginProcessRequest(HttpContext context, AsyncCallback cb, object extraData);

[C++] IAsyncResult* BeginProcessRequest(HttpContext* context, AsyncCallback* cb, Object* extraData);

[VB] Function BeginProcessRequest(ByVal context As HttpContext, ByVal cb As AsyncCallback, ByVal extraData As Object) As IAsyncResult

[JScript] function BeginProcessRequest(context: HttpContext, cb AsyncCallback, extraData: Object): IAsyncResult;

Description

Initiates an asynchronous call to the HTTP handler. Return Value: An System.IAsyncResult that contains information about the status of the process. An System.Web.HttpContext object that provides references to intrinsic server objects (for example, Request, Response, Session, and Server) used to service HTTP requests. The System.AsyncCallback to call when the asynchronous method call is complete. If cb is a null reference (Nothing in Visual Basic), the delegate is not called. Any extra data needed to process the request.

EndProcessRequest

[C#] void EndProcessRequest(IAsyncResult result);

[C++] void EndProcessRequest(IAsyncResult* result);

[VB] Sub EndProcessRequest(ByVal result As IAsyncResult)

[JScript] function EndProcessRequest(result: IAsyncResult);

Description

Executes clean-up code when the process ends. An System.IAsyncResult that contains information about the status of the process.

IHttpHandler interface (System.Web) EndProcessRequest

Description

Defines the contract that ASP.NET implements to synchronously process HTTP Web requests using custom HTTP handlers.

You can write custom HTTP handlers to process specific, predefined types of HTTP requests in any Common Language Specification (CLS) compliant language. Executable code defined in the HttpHandler classes, rather than conventional ASP or ASP.NET Web pages, responds to these specific requests. HTTP handlers give you a means of interacting with the low-level request and response services of the IIS Web server and provide functionality much like ISAPI extensions but with a simpler programming model.

IsReusable

EndProcessRequest

[C#] bool IsReusable {get;}

[C++] bool get IsReusable( );

[VB] ReadOnly Property IsReusable As Boolean

[JScript] abstract function get IsReusable( ): Boolean;

Description

Gets a value indicating whether another request can use the System.Web.IIHttpHandler instance.

You explicitly set the IsReusable property to true or false by code you provide that overrides the IsReusable property accessor.

ProcessRequest

[C#] void ProcessRequest(HttpContext context);

[C++] void ProcessRequest(HttpContext* context);

[VB] Sub ProcessRequest(ByVal context As HttpContext)

[JScript] function ProcessRequest(context: HttpContext);

Description

Enables processing of HTTP Web requests by a custom HttpHandler that implements the System.Web.IIHttpHandler interface.

Place your custom HttpHandler code in the ProcessRequest virtual method as shown in the following example. An System.Web.HttpContext object that provides references to the intrinsic server objects (for example, Request, Response, Session, and Server) used to service HTTP requests.

IHttpHandlerFactory interface (System.Web)

ProcessRequest

Description

Defines the contract that class factories must implement to create new System.Web.IIHttpHandler objects.

A class that implements the IHttpHandlerFactory interface has no behavior except to dynamically manufacture new handler objects—that is, new instances of classes that implement the IHttpHandler interface.

GetHandler

[C#] IHttpHandler GetHandler(HttpContext context, string requestType, string url, string pathTranslated);

[C++] IHttpHandler* GetHandler(HttpContext* context, String* requestType, String* url, String* pathTranslated);

[VB] Function GetHandler(ByVal context As HttpContext, ByVal requestType As String, ByVal url As String, ByVal pathTranslated As String) As IHttpHandler

[JScript] function GetHandler(context: HttpContext, requestType: String, url: String, pathTranslated: String): IHttpHandler;

Description

Returns an instance of a class that implements the IHttpHandler interface. Return Value: A new IHttpHandler object that processes the request. An instance of the System.Web.HttpContext class that provides references to intrinsic server objects (For example, Request, Response, Session, and Server) used to service HTTP requests. The HTTP data transfer method (GET or POST) that the client uses. The System.Web.HttpRequest.RawUrl of the requested resource. The System.Web.HttpRequest.PhysicalApplicationPath to the requested resource.

ReleaseHandler

[C#] void ReleaseHandler(IHttpHandler handler);

[C++] void ReleaseHandler(IHttpHandler* handler);

[VB] Sub ReleaseHandler(ByVal handler As IHttpHandler)

[JScript] function ReleaseHandler(handler: IHttpHandler);

Description

Enables a factory to reuse an existing handler instance. The IHttpHandler object to reuse.

IHttpModule interface (System.Web)

ReleaseHandler

Description

Provides module initialization and disposal events to the inheriting class.

Dispose

[C#] void Dispose( );

[C++] void Dispose( );

[VB] Sub Dispose( )

[JScript] function Dispose( );

Description

Disposes of the resources (other than memory) used by the module that implements IHttpModule.

Dispose performs any final cleanup work prior to removal of the module from the execution pipeline.

Init

[C#] void Init(HttpApplication context);

[C++] void Init(HttpApplication* context);

[VB] Sub Init(ByVal context As HttpApplication)

[JScript] function Init(context: HttpApplication);

Description

Initializes a module and prepares it to handle requests.

ProcessInfo class (System.Web)

Init

Description

Provides information on processes currently executing.

ProcessInfo

Example Syntax:

Init

[C++] public: ProcessInfo( );

[VB] Public Sub New( )

[JScript] public function ProcessInfo( );

Description

Initializes a new instance of the System.Web.ProcessInfo class.

The default constructor initializes all fields to their default values.

ProcessInfo

Example Syntax:

Init

[C#] public ProcessInfo(DateTime startTime, TimeSpan age, int processID, int requestCount, ProcessStatus status, ProcessShutdownReason shutdownReason, int peakMemoryUsed);

[C++] public: ProcessInfo(DateTime startTime, TimeSpan age, int processID, int requestCount, ProcessStatus status, ProcessShutdownReason shutdownReason, int peakMemoryUsed);

[VB] Public Sub New(ByVal startTime As DateTime, ByVal age As TimeSpan, ByVal processID As Integer, ByVal requestCount As Integer, ByVal status As ProcessStatus, ByVal shutdownReason As ProcessShutdownReason, ByVal peakMemoryUsed As Integer)

[JScript] public function ProcessInfo(startTime: DateTime, age: TimeSpan, processID: int, requestCount: int, status: ProcessStatus, shutdownReason: ProcessShutdownReason, peakMemoryUsed: int); Initializes a new instance of the System.Web.ProcesInfo class.

Description

Initializes a new instance of the ProcessInfo class and sets internal information indicating the status of the process. A System.DateTime that indicates the time at which the process started. The System.TimeSpan that indicates the time elapsed since the process started. The ID number assigned to the process. The number of start requests for the process. One of the System.Web.ProcessStatus values that indicates the current status of the process. One of the System.Web.ProcessShutdownReason values. The maximum memory used (in bytes).

Age

Init

[C#] public TimeSpan Age {get;}

[C++] public: _property TimeSpan get_Age( );

[VB] Public ReadOnly Property Age As TimeSpan

[JScript] public function get Age( ): TimeSpan;

Description

Gets the length of time the process has been running.

PeakMemoryUsed

Init

[C#] public int PeakMemoryUsed {get;}

[C++] public: _property int get_PeakMemoryUsed( );

[VB] Public ReadOnly Property PeakMemoryUsed As Integer

[JScript] public function get PeakMemoryUsed( ): int;

Description

Gets the maximum amount of memory the process has used.

ProcessID

Init

[C#] public int ProcessID {get;}

[C++] public: _property int get_ProcessID( );

[VB] Public ReadOnly Property ProcessID As Integer

[JScript] public function get ProcessID( ): int;

Description

Gets the ID number assigned to the process.

RequestCount

Init

[C#] public int RequestCount {get;}

[C++] public: _property int get_RequestCount( );

[VB] Public ReadOnly Property RequestCount As Integer

[JScript] public function get RequestCount( ): int;

Description

Gets the number of start requests for the process.

ShutdownReason

Init

[C#] public ProcessShutdownReason ShutdownReason {get;}

[C++] public: _property ProcessShutdownReason get_ShutdownReason( );

[VB] Public ReadOnly Property ShutdownReason As ProcessShutdownReason

[JScript] public function get ShutdownReasono: ProcessShutdownReason;

Description

Gets a value that indicates why the process shut down.

StartTime

Init

[C#] public DateTime StartTime {get;}

[C++] public: _property DateTime get_StartTime( );

[VB] Public ReadOnly Property StartTime As DateTime

[JScript] public function get StartTime( ): DateTime;

Description

Gets the time at which the process started.

Status

Init

[C#] public ProcessStatus Status {get;}

[C++] public: _property ProcessStatus get_Status( );

[VB] Public ReadOnly Property Status As ProcessStatus

[JScript] public function get Status( ): ProcessStatus;

Description

Gets the current status of the process.

SetAll

[C#] public void SetAll(DateTime startTime, TimeSpan age, int processID, int requestCount, ProcessStatus status, ProcessShutdownReason shutdownReason, int peakMemoryUsed);

[C++] public: void SetAll(DateTime startTime, TimeSpan age, int processID, int requestCount, ProcessStatus status, ProcessShutdownReason shutdownReason, int peakMemoryUsed);

[VB] Public Sub SetAll(ByVal startTime As DateTime, ByVal age As TimeSpan, ByVal processID As Integer, ByVal requestCount As Integer, ByVal status As ProcessStatus, ByVal shutdownReason As ProcessShutdownReason, ByVal peakMemoryUsed As Integer)

[JScript] public function SetAll(startTime: DateTime, age: TimeSpan, processID: int, requestCount: int, status: ProcessStatus, shutdownReason ProcessShutdownReason, peakMemoryUsed int);

Description

Sets internal information indicating the status of the process. A System.DateTime that indicates the time at which the process started. A System.TimeSpan that indicates the time elapsed since the process started. The ID number assigned to the process. The number of start requests for the process. One of the System.Web.ProcessStatus values that indicates the time elapsed since tha process started. One of the System.Web.ProcessShutdownReason values. The maximum memory used (in bytes).

ProcessModelInfo class (System.Web)

ToString

ProcessModelInfo

Example Syntax:

ToString

GetCurrentProcessInfo

[C#] public static ProcessInfo GetCurrentProcessInfo( );

[C++] public: static ProcessInfo* GetCurrentProcessInfo( );

[VB] Public Shared Function GetCurrentProcessInfo( ) As ProcessInfo

[JScript] public static function GetCurrentProcessInfo( ): ProcessInfo;

GetHistory

[C#] public static ProcessInfo[ ] GetHistory(int numRecords);

[C++] public: static ProcessInfo* GetHistory(int numRecords) [ ];

[VB] Public Shared Function GetHistory(ByVal numRecords As Integer) As ProcessInfo( )

[JScript] public static function GetHistory(numRecords: int): ProcessInfo[ ];

ProcessShutdownReason enumeration (System.Web)

ToString

Description

Provides enumerated values that indicate why a process has shut down.

ToString

[C#] public const ProcessShutdownReason IdleTimeout;

[C++] public: const ProcessShutdownReason IdleTimeout;

[VB] Public Const IdleTimeout As ProcessShutdownReason

[JScript] public var IdleTimeout: ProcessShutdownReason;

Description

Indicates that the process exceeded the allowable idle time.

ToString

[C#] public const ProcessShutdownReason MemoryLimitExceeded;

[C++] public: const ProcessShutdownReason MemoryLimitExceeded;

[VB] Public Const MemoryLimitExceeded As ProcessShutdownReason

[JScript] public var MemoryLimitExceeded: ProcessShutdownReason;

Description

Indicates that the process exceeded the per-process memory limit.

ToString

[C#] public const ProcessShutdownReason None;

[C++] public: const ProcessShutdownReason None;

[VB] Public Const None As ProcessShutdownReason

[JScript] public var None: ProcessShutdownReason;

Description

Indicates that the process has not shut down.

ToString

[C#] public const ProcessShutdownReason PingFailed;

[C++] public: const Process ShutdownReason PingFailed;

[VB] Public Const PingFailed As ProcessShutdownReason

[JScript] public var PingFailed: ProcessShutdownReason;

Description

ToString

[C#] public const ProcessShutdownReason RequestQueueLimit;

[C++] public: const ProcessShutdownReason RequestQueueLimit;

[VB] Public Const RequestQueueLimit As ProcessShutdownReason

[JScript] public var RequestQueueLimit: ProcessShutdownReason;

Description

Indicates that the request for a process exceeded the allowable number of processes in the queue.

ToString

[C#] public const ProcessShutdownReason RequestsLimit;

[C++] public: const ProcessShutdownReason RequestsLimit;

[VB] Public Const RequestsLimit As ProcessShutdownReason

[JScript] public var RequestsLimit: ProcessShutdownReason;

Description

Indicates that the request for the process exceeded the allowable number of processes.

ToString

[C#] public const ProcessShutdownReason Timeout;

[C++] Public: const ProcessShutdownReason Timeout;

[VB] Public Const Timeout As ProcessShutdownReason

[JScript] public var Timeout: ProcessShutdownReason;

Description

Indicates that the process timed out.

ToString

[C#] public const ProcessShutdownReason Unexpected;

[C++] Public: const ProcessShutdownReason Unexpected;

[VB] Public Const Unexpected As ProcessShutdownReason

[JScript] public var Unexpected: ProcessShutdownReason;

Description

Indicates that the process shut down unexpectedly.

ProcessStatus enumeration (System.Web)

ToString

Description

Provides enumerated values that indicate the current status of a process.

ToString

[C#] public const ProcessStatus Alive;

[C++] public: const ProcessStatus Alive;

[VB] Public Const Alive As ProcessStatus

[JScript] public var Alive: ProcessStatus;

Description

Indicates that the process is running.

ToString

[C#] public const ProcessStatus ShutDown;

[C+++]public: const ProcessStatus ShutDown;

[VB] Public Const ShutDown As ProcessStatus

[JScript] public var ShutDown: ProcessStatus;

Description

Indicates that the process has shut down.

ToString

[C#] public const ProcessStatus ShuttingDown;

[C++] public: const ProcessStatus ShuttingDown;

[VB] Public Const ShuttingDown As ProcessStatus

[JScript] public var ShuttingDown: ProcessStatus;

Description

Indicates that the process has begun to shut down.

ToString

[C#] public const ProcessStatus Terminated;

[C++] public: const ProcessStatus Terminated;

[VB] Public Const Terminated As ProcessStatus

[JScript] public var Terminated: ProcessStatus;

Description

Indicates that the process has terminated.

TraceContext class (System.Web)

ToString

Description

Captures and presents execution details about a Web request. This class cannot be inherited.

You can use this class to append messages to specific trace categories. For example, if you are creating an instance of the System.Web.UI.WebControls.Calendar class for your application, you might include the trace message "Starting To Render" in a rendering procedure, and "Firing OnChange Event" in an event handling procedure.

TraceContext

Example Syntax:

ToString

[C#] public TraceContext(HttpContext context);

[C++] public: TraceContext(HttpContext* context);

[VB] Public Sub New(ByVal context As HttpContext)

[JScript] public function TraceContext(context: HttpContext);

Description

Initializes a new instance of the System.Web.TraceContext class. An System.Web.HttpContext that contains information about the current Web request.

IsEnabled

ToString

[C#] public bool IsEnabled {get; set;}

[C++] public: _property bool get_IsEnabled( );public: _property void set_IsEnabled(bool);

[VB] Public Property IsEnabled As Boolean

[JScript] public function get IsEnabled( ): Boolean;public function set IsEnabled(Boolean);

Description

Indicates whether tracing is enabled for the current Web request.

Use this flag to check whether your page or application should output tracing information before it writes anything to the trace log. You can set this property to true for a page by including a trace="true" attribute in the directive. To set the property to true for an entire application, set it in the application's Web.config file.

TraceMode

ToString

[C#] public TraceMode TraceMode {get; set;}

[C++] public: _property TraceMode get_TraceMode( );public: _property void set_TraceMode(TraceMode);

[VB] Public Property TraceMode As TraceMode

[JScript] public function get TraceMode( ): TraceMode;public function set TraceMode(TraceMode);

Description

Gets or sets the sorted order in which trace messages should be output to a requesting browser.

Trace messages can be sorted in the order they were processed, or alphabetically by user-defined category.

Warn

[C#] public void Warn(string message);

[C++] public: void Warn(String* message);

[VB] Public Sub Warn(ByVal message As String)

[JScript] public function Warn(message: String); Writes trace information to the trace log. Unlike System.Web.TraceContext.Write(System.String), all warnings appear in the log as red text.

Description

Writes a trace message to the trace log. All warnings appear as in the log as red text. The trace message to write to the log.

Warn

[C#] public void Warn(string category, string message);

[C++] public: void Warn(String* category, String* message);

[VB] Public Sub Warn(ByVal category As String, ByVal message As String)

[JScript] public function Warn(category: String, message: String); Writes trace information to the trace log. All warnings appear in the log as red text.

Description

Writes trace information to the trace log, including any user-defined categories and trace messages. All warnings appear in the log as red text. The trace category that receives the message. The trace message to write to the log.

Warn

[C#] public void Warn(string category, string message, Exception errorInfo);

[C++] public: void Warn(String* category, String* message, Exception* errorInfo);

[VB] Public Sub Warn(ByVal category As String, ByVal message As String, ByVal errorInfo As Exception)

[JScript] public function Warn(category: String, message: String, errorInfo Exception);

Description

Writes trace information to the trace log, including any user-defined categories,trace messages, and error information. All warnings appear in the log as red text. The trace category that receives the message. The trace message to write to the log. An System.Exception that contains information about the error.

Write

[C#] public void Write(string message);

[C++] public: void Write(String* message);

[VB] Public Sub Write(ByVal message As String)

[JScript] public function Write(message: String); Writes trace information to the trace log.

Description

Writes a trace message to the trace log. The trace message to write to the log.

Write

[C#] public void Write(string category, string message);

[C++] public: void Write(String* category, String* message);

[VB] Public Sub Write(ByVal category As String, ByVal message As String)

[JScript] public function Write(category: String, message: String); Writes trace information to the trace log.

Description

Writes trace information to the trace log, including a message and any user-defined categories. The trace category that receives the message. The trace message to write to the log.

Write

[C#] public void Write(string category, string message, Exception errorInfo);

[C++] public: void Write(String* category, String* message, Exception* errorInfo);

[VB] Public Sub Write(ByVal category As String, ByVal message As String, ByVal errorInfo As Exception)

[JScript] public function Write(category: String, message: String, errorInfo: Exception);

Description

Writes trace information to the trace log, including any user-defined categories,trace messages, and error information. The trace category that receives the message. The trace message to write to the log. An System.Exception that contains information about the error.

TraceMode enumeration (System.Web)

Write

Description

Specifies in what order trace messages are emitted into the HTML output of a page.

Write

[C#] public const TraceMode Default;

[C++] public: const TraceMode Default;

[VB] Public Const Default As TraceMode

[JScript] public var Default: TraceMode;

Description

Specifies the default value of the TraceMode enumeration, which is SortByTime.

System.Web.Caching

Description

The System.Web.Caching namespace provides classes for caching frequently used resources on the server. This includes ASP.NET pages, web services, and user controls. Additionally, a cache dictionary is available for you to store frequently used resources, such as hashtables and other data structures.

Cache class (System.Web.Caching)

Description

Implements the cache for a Web application.

One instance of this class is created per application domain, and it remains valid as long as the application domain remains active. Information about an instance of this class is available through the Cache property of the System.Web.HttpContext object. This class cannot be inherited.

[C#] public static readonly DateTime NoAbsoluteExpiration;

[C++] public: static DateTime NoAbsoluteExpiration;

[VB] Public Shared ReadOnly NoAbsoluteExpiration As DateTime

[JScript] public static var NoAbsoluteExpiration: DateTime;

Description

Used in the absoluteExpiration parameter in an System.Web.Caching.Cache.Insert(System.String,System.Object) method call to indicate the item should never expire. This field is read-only.

When used, this field sets the absoluteExpiration parameter equal to System.DateTime.MaxValue, which is a constant representing the largest possible DateTime value, 12/31/9999 11:59:59 PM.

[C#] public static readonly TimeSpan NoSlidingExpiration;

[C++] public: static TimeSpan NoSlidingExpiration;

[VB] Public Shared ReadOnly NoSlidingExpiration As TimeSpan

[JScript] public static var NoSlidingExpiration: TimeSpan;

Description

Used as the slidingExpiration parameter in an System.Web.Caching.Cache.Insert(System.String,System.Object) method call to disable sliding expirations. This field is read-only.

When used, this field sets the slidingExpiration parameter equal to the System.TimeSpan.Zero field, which has a constant value of zero. The cached item then expires in accordance with the absoluteExpiration parameter.

Constructors:

Cache

Example Syntax:

[C#] public Cache( );

[C++] public: Cache( );

[VB] Public Sub New( )

[JScript] public function Cache( );

Properties:

Count

[C#] public int Count {get;}

[C++] public: _property int get_Count( );

[VB] Public ReadOnly Property Count As Integer

[JScript] public function get Count( ): int;

Description

Gets the number of items stored in the cache.

This property can be useful when monitoring your application's performance or when using ASP.NET tracing functionality.

Item

[C#] public object this[string key] {get; set;}

[C++] public: _property Object* get_Item(String* key);public: _property void set_Item(String* key, Object*);

[VB] Public Default Property Item(ByVal key As String) As Object

[JScript] returnValue=CacheObject.Item(key);CacheObject.Item(key)=returnValue;

Description

Gets or sets the cache item at the specified key.

You can use this property to retrieve the value of a specified cache item, or to add an item and a key for it to the cache. A System.String object that represents the key for the cache item.

Methods:

Add

[C#] public object Add(string key, object value, CacheDependency dependencies, DateTime absoluteExpiration, TimeSpan slidingExpiration, CacheItemPriority priority, CacheItemRemovedCallback onRemoveCallback);

[C++] public: Object* Add(String* key, Object* value, CacheDependency* dependencies, DateTime absoluteExpiration, TimeSpan slidingExpiration, CacheItemPriority priority, CacheItemRemovedCallback* onRemoveCallback);

[VB] Public Function Add(ByVal key As String, ByVal value As Object, ByVal dependencies As CacheDependency, ByVal absoluteExpiration As DateTime, ByVal slidingExpiration As TimeSpan, ByVal priority As CacheItemPriority, ByVal onRemoveCallback As CacheItemRemovedCallback) As Object

[JScript] public function Add(key: String, value: Object, dependencies: CacheDependency, absoluteExpiration: DateTime, slidingExpiration: TimeSpan, priority: CacheItemPriority, onRemoveCallback: CacheItemRemovedCallback): Object;

Description

Adds the specified item to the System.Web.Caching.Cache object with dependencies, expiration and priority policies, and a delegate you can use to notify your application when the inserted item is removed from the Cache. Return Value: The System.Object item added to the Cache. The cache key used to reference the item. The item to be added to the cache. The file or cache key dependencies for the item. When any dependency changes, the object becomes invalid and is removed from the cache. If there are no dependencies, this paramter contains null. The time at which the added object expires and is removed from the cache. The interval between the time the added object was last accessed and when that object expires. If this value is the equivalent of 20 minutes, the object expires and is removed from the cache 20 minutes after it is last accessed. The relative cost of the object, as expressed by the System.Web.Caching.CacheItemPriority enumeration. The cache uses this value when it evicts objects; objects with a lower cost are removed from the cache before objects with a higher cost. A delegate that, if provided, is called when an object is removed from the cache. You can use this to notify applications when their objects are deleted from the cache.

Get

[C#] public object Get(string key);

[C++] public: Object* Get(String* key);

[VB] Public Function Get(ByVal key As String) As Object

[JScript] public function Get(key: String): Object;

Description

Retrieves the specified item from the System.Web.Caching.Cache object.

Return Value: The retrieved cache item, or null if the key is not found. The identifier for the cache item to retrieve.

GetEnumerator

[C#] public IDictionaryEnumerator GetEnumerator( );

[C++] public: IDictionaryEnumerator* GetEnumerator( );

[VB] Public Function GetEnumerator( ) As IDictionaryEnumerator

[JScript] public function GetEnumerator( ): IDictionaryEnumerator;

Description

Retrieves a dictionary enumerator used to iterate through the key settings and their values contained in the cache.

Return Value: An enumerator to iterate through the System.Web.Caching.Cache object.

Items can be added or removed from the cache while this method is enumerating through the items.

Insert

[C#] public void Insert(string key, object value);

[C++] public: void Insert(String* key, Object* value);

[VB] Public Sub Insert(ByVal key As String, ByVal value As Object)

[JScript] public function Insert(key: String, value: Object); Inserts an item into the System.Web.Caching.Cache object.

Description

Inserts an item into the System.Web.Caching.Cache object with a cache key to reference its location and using default values provided by the System.Web.Caching.CacheItemPriority and System.Web.Caching.CacheItemPriorityDecay enumerations. The cache key used to reference the item. The object to be inserted into the cache.

Insert

[C#] public void Insert(string key, object value, CacheDependency dependencies);

[C++] public: void Insert(String* key, Object* value, CacheDependency* dependencies);

[VB] Public Sub Insert(ByVal key As String, ByVal value As Object, ByVal dependencies As CacheDependency)

[JScript] public function Insert(key: String, value: Object, dependencies: CacheDependency);

Description

Inserts an object into the System.Web.Caching.Cache that has file or key dependencies. The cache key used to identify the item. The object to be inserted in the cache. The file or cache key dependencies for the inserted object. When any dependency changes, the object becomes invalid and is removed from the cache. If there are no dependencies, this parameter contains null.

Insert

[C#] public void Insert(string key, object value, CacheDependency dependencies, DateTime absoluteExpiration, TimeSpan slidingExpiration);

[C++] public: void Insert(String* key, Object* value, CacheDependency* dependencies, DateTime absoluteExpiration, TimeSpan slidingExpiration);

[VB] Public Sub Insert(ByVal key As String, ByVal value As Object, ByVal dependencies As CacheDependency, ByVal absoluteExpiration As DateTime, ByVal slidingExpiration As TimeSpan)

[JScript] public function Insert(key: String, value: Object, dependencies CacheDependency, absoluteExpiration: DateTime, slidingExpiration: TimeSpan);

Description

Inserts an object into the System.Web.Caching.Cache with dependencies and expiration policies.

If the slidingExpiration parameter is set to NoSlidingExpiration, sliding expiration is disabled. If you set the slidingExpiration parameter to greater than System.TimeSpan.Zero, the absoluteExpiration parameter is set to System.DateTime.Now plus the value contained in the slidingExpiration parameter. If the item is requested from the cache before the amount of time specified by the absoluteExpiration parameter, the item will be placed in the cache again, and absoluteExpiration will again be set to DateTime.Now plus the value contained in the slidingExpiration parameter. If the item is not requested from the cache before the date in the absoluteExpiration parameter, the item is removed from the cache. The cache key used to reference the object. The object to be inserted in the cache. The file or cache key dependencies for the inserted object. When any dependency changes, the object becomes invalid and is removed from the cache. If there are no dependencies, this parameter contains null. The time at which the inserted object expires and is removed from the cache. The interval between the time the inserted object is last accessed and when that object expires. If this value is the equivalent of 20 minutes, the object will expire and be removed from the cache 20 minutes after it was last accessed.

Insert

[C#] public void Insert(string key, object value, CacheDependency dependencies, DateTime absoluteExpiration, TimeSpan slidingExpiration, CacheItemPriority priority, CacheItemRemovedCallback onRemoveCallback);

[C++] public: void Insert(String* key, Object* value, CacheDependency* dependencies, DateTime absoluteExpiration, TimeSpan slidingExpiration, CacheItemPriority priority, CacheItemRemovedCallback* onRemoveCallback);

[VB] Public Sub Insert(ByVal key As String, ByVal value As Object, ByVal dependencies As CacheDependency, ByVal absoluteExpiration As DateTime, ByVal slidingExpiration As TimeSpan, ByVal priority As CacheItemPriority, ByVal onRemoveCallback As CacheItemRemovedCallback)

[JScript] public function Insert(key: String, value: Object, dependencies: CacheDependency, absoluteExpiration: DateTime, slidingExpiration: TimeSpan, priority: CacheItemPriority, onRemoveCallback: CacheItemRemovedCallback);

Description

Inserts an object into the System.Web.Caching.Cache object with dependencies, expiration and priority policies, and a delegate you can use to notify your application when the inserted item is removed from the Cache. The cache key used to reference the object. The object to be inserted in the cache. The file or cache key dependencies for the item. When any dependency changes, the object becomes invalid and is removed from the cache. If there are no dependencies, this parameter contains null. The time at which the inserted object expires and is removed from the cache. The interval between the time the inserted object was last accessed and when that object expires. If this value is the equivalent of 20 minutes, the object will expire and be removed from the cache 20 minutes after it was last accessed. The cost of the object relative to other items stored in the cache, as expressed by the System.Web.Caching.CacheItemPriority enumeration. This value is used by the cache when it evicts objects; objects with a lower cost are removed from the cache before objects with a higher cost. A delegate that, if provided, will be called when an object is removed from the cache. You can use this to notify applications when their objects are deleted from the cache.

Remove

[C#] public object Remove(string key);

[C++] public: Object* Remove(String* key);

[VB] Public Function Remove(ByVal key As String) As Object

[JScript] public function Remove(key: String): Object;

Description

Removes the specified item from the application's System.Web.Caching.Cache object.

Return Value: The item removed from the Cache. If the value in the key parameter is not found, returns null. A System.String identifier for the cache item to remove.

IEnumerable.GetEnumerator

[C#] IEnumerator IEnumerable.GetEnumerator( );

[C++] IEnumerator* IEnumerable::GetEnumerator( );

[VB] Function GetEnumerator( ) As IEnumerator Implements IEnumerable.GetEnumerator

[JScript] function IEnumerable.GetEnumerator( ): IEnumerator;

CacheDependency class (System.Web.Caching)

ToString

Description

Tracks cache dependencies, which can be files, directories, or keys to other objects in your application's System.Web.Caching.Cache. This class cannot be inherited.

You can add items with dependencies to your application's cache with the System.Web.Caching.Cache.Add(System.String,System.Object,System.Web. Caching.CacheDependency,System.DateTime,System.TimeSpan,System.Web.Caching.CacheItemPriority,System.Web.Caching.CacheItemRemovedCallback) and System.Web.Caching.Cache.Insert(System.String,System.Object) methods.

CacheDependency

Example Syntax:

ToString

[C#] public CacheDependency(string filename);

[C++] public: CacheDependency(String* filename);

[VB] Public Sub New(ByVal filename As String)

[JScript] public function CacheDependency(filename: String); Initializes a new instance of the System.Web.Caching.CacheDependency class.

Description

Initializes a new instance of the System.Web.Caching.CacheDependency class that monitors a file or directory for changes. The path to a file or directory that the cached object is dependent upon. When this resource changes, the cached object becomes obsolete and is removed from the cache.

CacheDependency

Example Syntax:

ToString

[C#] public CacheDependency(string[ ] filenames);

[C++] public: CacheDependency(String* filenames _gc[ ];

[VB] Public Sub New(ByVal filenames( ) As String)

[JScript] public function CacheDependency(filenames: String[ ]);

Description

Initializes a new instance of the System.Web.Caching.CacheDependency class that monitors an array of file paths (to files or directories) for changes.

If any of the files or directories in the array were to change or be removed from the array, the cached item becomes obsolete and is removed from the application's System.Web.Caching.Cache object. An array of file paths (to files or directories) that the cached object is dependent upon. When any of these resources change, the cached object becomes obsolete and is removed from the cache.

CacheDependency

Example Syntax:

ToString

[C#] public CacheDependency(string filename, DateTime start);

[C++] public: CacheDependency(String* filename, DateTime start);

[VB] Public Sub New(ByVal filename As String, ByVal start As DateTime)

[JScript] public function CacheDependency(filename: String, start: DateTime);

Description

Initializes a new instance of the System.Web.Caching.CacheDependency class that monitors a file or directory for changes and indicates when change tracking is to begin. The path to a file or directory that the cached object is dependent upon. When this resource changes, the cached object becomes obsolete and is removed from the cache. The time when change tracking begins.

CacheDependency

Example Syntax:

ToString

[C#] public CacheDependency(string[ ] filenames, DateTime start);

[C++] public: CacheDependency(String* filenames _gc[ ], DateTime start);

[VB] Public Sub New(ByVal filenames( ) As String, ByVal start As DateTime) [JScript] public function CacheDependency(filenames: String[ ], start DateTime);

Description

Initializes a new instance of the System.Web.Caching.CacheDependency class that monitors an array of file paths (to files or directories) for changes and specifies a time when change monitoring begins. An array of file paths (to files or directories) that the cached object is dependent upon. When any of these resources change, the cached object becomes obsolete and is removed from the cache. The time when change tracking begins.

CacheDependency

Example Syntax:

ToString

[C#] public CacheDependency(string[ ] filenames, string[ ] cachekeys); [C++] public: CacheDependency(String* filenames _gc[ ], String* cachekeys _gc[ ]; [VB] Public Sub New(ByVal filenames( ) As String, ByVal cachekeys( ) As String) [JScript] public function CacheDependency(filenames: String[ ], cachekeys: String[ ]);

Description

Initializes a new instance of the System.Web.Caching.CacheDependency class that monitors an array of file paths (to files or directories), an array of cache keys, or both for changes. An array of file paths (to files or directories) that the cached object is dependent upon. When any of these resources change, the cached object becomes obsolete and is removed from the cache. An array of cache keys that the new object monitors for changes. When any of these cache keys change, the cached object associated with this dependency object becomes obsolete and is removed from the cache.

CacheDependency

Example Syntax:

ToString

[C#] public CacheDependency(string[ ] filenames, string[ ] cachekeys, CacheDependency dependency);

[C++] public: CacheDependency(String* filenames _gc[ ], String* cachekeys _gc[ ], CacheDependency* dependency);

[VB] Public Sub New(ByVal filenames( ) As String, ByVal cachekeys( ) As String, ByVal dependency As CacheDependency)

[JScript] public function CacheDependency(filenames: String[ ], cachekeys: String[ ], dependency: CacheDependency);

Description

Initializes a new instance of the System.Web.Caching.CacheDependency class that monitors an array of file paths (to files or directories), an array of cache keys, or both for changes. It also makes itself dependent upon a separate instance of the CacheDependency class. An array of file paths (to files or directories) that the cached object is dependent upon. When any of these resources change, the cached object becomes obsolete and is removed from the cache. An array of cache keys that the new object monitors for changes. When any of these cache keys change, the cached object associated with this dependency object becomes obsolete and is removed from the cache. Another instance of the CacheDependency class that this instance is dependent upon.

CacheDependency

Example Syntax:

ToString

[C#] public CacheDependency(string[ ] filenames, string[ ] cachekeys, DateTime start);

[C++] public: CacheDependency(String* filenames _gc[ ], String* cachekeys _gc[ ], DateTime start);

[VB] Public Sub New(ByVal filenames( ) As String, ByVal cachekeys( ) As String, ByVal start As DateTime)

[JScript] public function CacheDependency(filenames: String[ ], cachekeys: String[ ], start: DateTime);

Description

Initializes a new instance of the System.Web.Caching. CacheDependency class that monitors an array of file paths (to files or directories), an array of cache keys, or both for changes. An array of file paths (to files or directories) that the cached object is dependent upon. When any of these resources change, the cached object becomes obsolete and is removed from the cache. An array of cache keys that the new object monitors for changes. When any of these cache keys change, the cached object associated with this dependency object becomes obsolete and is removed from the cache. The time when change tracking begins.

CacheDependency

Example Syntax:

ToString

[C#] public CacheDependency(string[ ] filenames, string[ ] cachekeys, CacheDependency dependency, DateTime start);

[C++] public: CacheDependency(String* filenames _gc[ ], String* cachekeys _gc[ ], CacheDependency* dependency, DateTime start);

[VB] Public Sub New(ByVal filenames( ) As String, ByVal cachekeys( ) As String, ByVal dependency As CacheDependency, ByVal start As DateTime)

[JScript] public function CacheDependency(filenames: String[ ], cachekeys: String[ ], dependency: CacheDependency, start: DateTime);

Description

Initializes a new instance of the System.Web.Caching. CacheDependency class that monitors an array of file paths (to files or directories), an array of cache keys, or both for changes. It also makes itself dependent upon another instance of the CacheDependency class and a time when the change monitoring begins. An array of file paths (to files or directories) that the cached object is dependent upon. When any of these resources change, the cached object becomes obsolete and is removed from the cache. An array of cache keys that the new object monitors for changes. When any of these cache keys change, the cached object associated with this dependency object becomes obsolete and is removed from the cache. Another instance of the CacheDependency class that this instance is dependent upon. The time when change tracking begins.

Dispose

[C#] public void Dispose( );

[C++] public: _sealed void Dispose( );

[VB] NotOverridable Public Sub Dispose( )

[JScript] public function Dispose( );

Description

Releases the resources used by the System.Web.Caching. CacheDependency object.

CacheItemPriority enumeration (System.Web.Caching)

ToString

Description

Specifies the relative priority of items stored in the System.Web.Caching.Cache.

When the Web server hosting an ASP.NET application runs low on memory, the Cache selectively purges items to free system memory. When an item is added to the cache, you can assign it a relative priority compared to the other items stored in the cache. Items you assign higher priority values to are less likely to be deleted from the cache when the server is processing a large number of requests, while items you assign lower priority values are more likely to be deleted. The default is Normal.

ToString

[C#] public const CacheItemPriority AboveNormal;

[C++] public: const CacheItemPriority AboveNormal;

[VB] Public Const AboveNormal As CacheItemPriority

[JScript] public var AboveNormal: CacheItemPriority;

Description

Cache items with this priority level are less likely to be deleted as the server frees system memory than those assigned a Normal priority.

ToString

[C#] public const CacheItemPriority BelowNormal;

[C++] public: const CacheItemPriority BelowNormal;

[VB] Public Const BelowNormal As CacheItemPriority

[JScript] public var BelowNormal: CacheItemPriority;

Description

Cache items with this priority level are more likely to be deleted from the cache as the server frees system memory than items assigned a Normal priority.

ToString

[C#] public const CacheItemPriority Default;

[C++] public: const CacheItemPriority Default;

[VB] Public Const Default As CacheItemPriority

[JScript] public var Default: CacheItemPriority;

Description

The default value for a cached item's priority is Normal.

ToString

[C#] public const CacheItemPriority High;

[C++] public: const CacheItemPriority High;

[VB] Public Const High As CacheItemPriority

[JScript] public var High: CacheItemPriority;

Description

Cache items with this priority level are the least likely to be deleted from the cache as the server frees system memory.

ToString

[C#] public const CacheItemPriority Low;

[C++] public: const CacheItemPriority Low;

[VB] Public Const Low As CacheItemPriority

[JScript] public var Low: CacheItemPriority;

Description

Cache items with this priority level are the most likely to be deleted from the cache as the server frees system memory.

ToString
[C#] public const CacheItemPriority Normal;
[C++] public: const CacheItemPriority Normal;
[VB] Public Const Normal As CacheItemPriority
[JScript] public var Normal: CacheItemPriority;

Description

Cache items with this priority level are likely to be deleted from the cache as the server frees system memory only after those items with Low or BelowNormal priority. This is the default.

ToString
[C#] public const CacheItemPriority NotRemovable;
[C++] public: const CacheItemPriority NotRemovable;
[VB] Public Const NotRemovable As CacheItemPriority
[JScript] public var NotRemovable: CacheItemPriority;

Description

The cache items with this priority level will not be deleted from the cache as the server frees system memory.

CacheItemRemovedCallback delegate (System.Web.Caching)

ToString

Description

Defines a callback method for notifying applications when a cached item is removed from the System.Web.Caching.Cache. The index location for the item removed from the cache. The System.Object item removed from the cache. The reason the item was removed from the cache, as specified by the System.Web.Caching.CacheItemRemovedReason enumeration.

CacheItemRemovedReason enumeration (System.Web.Caching)

ToString

Description

Specifies the reason an item was removed from the System.Web.Caching.Cache.

This enumeration works in concert with the System.Web.Caching.CacheItemRemovedCallback delegate to notify your ASP.NET applications when and why an object was removed from the System.Web.Caching.Cache.

ToString
[C#] public const CacheItemRemovedReason DependencyChanged;
[C++] public: const CacheItemRemovedReason DependencyChanged;
[VB] Public Const DependencyChanged As CacheItemRemovedReason
[JScript] public var DependencyChanged: CacheItemRemovedReason;

Description

The item is removed from the cache because a file or key dependency changed.

ToString
[C#] public const CacheItemRemovedReason Expired;
[C++] public: const CacheItemRemovedReason Expired;
[VB] Public Const Expired As CacheItemRemovedReason
[JScript] public var Expired: CacheItemRemovedReason;

Description

The item is removed from the cache because it expired.

ToString
[C#] public const CacheItemRemovedReason Removed;
[C++] public: const CacheItemRemovedReason Removed;
[VB] Public Const Removed As CacheItemRemovedReason
[JScript] public var Removed: CacheItemRemovedReason;

Description

The item is removed fro

System.Web.Configuration

Description

The System.Web.Configuration namespace contains classes that are used to set up ASP.NET configuration.

AuthenticationMode enumeration (System.Web.Configuration)

Description

Provides enumerated values that specify the authentication mode for an application.

[C#] public const AuthenticationMode Forms;
[C++] public: const AuthenticationMode Forms;
[VB] Public Const Forms As AuthenticationMode
[JScript] public var Forms: AuthenticationMode;

Description

Specifies ASP.NET forms-based authentication as the default authentication mode.

[C#] public const AuthenticationMode None;
[C++] public: const AuthenticationMode None;
[VB] Public Const None As AuthenticationMode
[JScript] public var None: AuthenticationMode;

Description

Specifies no authentication. Only anonymous users are expected. Also, applications can handle events to provide their own authentication.

[C#] public const AuthenticationMode Passport;
[C++] public: const AuthenticationMode Passport;
[VB] Public Const Passport As AuthenticationMode
[JScript] public var Passport: AuthenticationMode;

Description

Specifies Microsoft Passport authentication as the default authentication mode.

[C#] public const AuthenticationMode Windows;
[C++] public: const AuthenticationMode Windows;
[VB] Public Const Windows As AuthenticationMode
[JScript] public var Windows: AuthenticationMode;

Description

Specifies Windows authentication as the default authentication mode. Use this mode when using any form of Internet Information Services (IIS) authentication: Basic, Digest, Integrated Windows authentication (NTLM/Kerberos), or certificates.

Methods:

ClientTargetSectionHandler class (System.Web.Configuration)

ToString

Description

Constructors:

ClientTargetSectionHandler

Example Syntax:

ToString
[C#] public ClientTargetSectionHandler( );
[C++] public: ClientTargetSectionHandler( );
[VB] Public Sub New( )
[JScript] public function ClientTargetSectionHandler( );

Properties:

KeyAttributeName

ToString
[C#] protected override string KeyAttributeName {get;}
[C++] protected: property virtual String* get KeyAttributeName( );

[VB] Overrides Protected ReadOnly Property KeyAttributeName As String
[JScript] protected function get KeyAttributeName( ): String;

Description

Gets the name of the key attribute tag. This property is overidden by derived classes to change the name of the key attribute tag. The default is "key".

ValueAttributeName

ToString

[C#] protected override string ValueAttributeName {get;}
[C++] protected: property virtual String* get ValueAttributeName( );
[VB] Overrides Protected ReadOnly Property ValueAttributeName As String
[JScript] protected function get ValueAttributeName( ): String;

Description

Gets the name of the value tag. This property may be overidden by derived classes to change the name of the value tag. The default is "value".

FormsAuthPasswordFormat enumeration (System.Web.Configuration)

ToString

Description

Provides enumerated values that specify the encryption format for storing passwords.

ToString

[C#] public const FormsAuthPasswordFormat Clear;
[C++] public: const FormsAuthPasswordFormat Clear;
[VB] Public Const Clear As FormsAuthPasswordFormat
[JScript] public var Clear: FormsAuthPasswordFormat;

Description

Specifies that passwords are not encrypted.

ToString

[C#] public const FormsAuthPasswordFormat MD5;
[C++] public: const FormsAuthPasswordFormat MD5;
[VB] Public Const MD5 As FormsAuthPasswordFormat
[JScript] public var MD5: FormsAuthPasswordFormat;

Description

Specifies that passwords are encrypted using the MD5 hash algorithm.

ToString

[C#] public const FormsAuthPasswordFormat SHA1;
[C++] public: const FormsAuthPasswordFormat SHA1;
[VB] Public Const SHA1 As FormsAuthPasswordFormat
[JScript] public var SHA1: FormsAuthPasswordFormat;

Description

Specifies that passwords are encrypted using the SHA1 hash algorithm.

FormsProtectionEnum enumeration (System.Web.Configuration)

ToString

Description

Provides enumerated values that are used to specify the forms protection method.

ToString

[C#] public const FormsProtectionEnum All;
[C++] public: const FormsProtectionEnum All;
[VB] Public Const All As FormsProtectionEnum
[JScript] public var All: FormsProtectionEnum;

Description

Specifies that the application uses both data validation and encryption to protect the cookie. This option uses the configured data validation algorithm (based on the element). Triple-DES (3DES) is used for encryption, if it is available and if the key is at least 48 bytes longs.

ToString

[C#] public const FormsProtectionEnum Encryption;
[C++] public: const FormsProtectionEnum Encryption;
[VB] Public Const Encryption As FormsProtectionEnum
[JScript] public var Encryption: FormsProtectionEnum;

Description

Specifies that the cookie is encrypted using Triple-DES or DES, but data validation is not performed on the cookie. Cookies used this way might be subject to plain-text security attacks.

ToString

[C#] public const FormsProtectionEnum None;
[C++] public: const FormsProtectionEnum None;
[VB] Public Const None As FormsProtectionEnum
[JScript] public var None: FormsProtectionEnum;

Description

Specifies that both encryption and validation are disabled for sites that are using cookies only for personalization and have weaker security requirements. Using cookies in this manner is not recommended; however, it is the least resource-intensive way to enable personalization using the NET Framework.

ToString

[C#] public const FormsProtectionEnum Validation;
[C++] public: const FormsProtectionEnum Validation;
[VB] Public Const Validation As FormsProtectionEnum
[JScript] public var Validation: FormsProtectionEnum;

Description

Specifies that the application uses a validation scheme to verify that the contents of an encrypted cookie have not been altered in transit. The cookie is created by concatenating a validation key with the cookie data, computing a Message Authentication Code (MAC), and appending the MAC to the outgoing cookie.

HttpCapabilitiesBase class (System.Web.Configuration)

ToString

Description

Defines the base class for client browser capabilities.

HttpCapabilitiesBase

Example Syntax:

ToString

[C#] public HttpCapabilitiesBase( );
[C++] public: HttpCapabilitiesBase( );
[VB] Public Sub New( )
[JScript] public function HttpCapabilitiesBase( );

Item

ToString

[C#] public virtual string this[string key] {get;}
[C++] public: property virtual String* get Item(String* key);
[VB] Overridable Public Default ReadOnly Property Item (ByVal key As String) As String
[JScript] returnValue=HttpCapabilitiesBaseObject.Item (key);

Description

Allows access to individual dictionary values. The name of the dictionary value to retrieve.

GetConfigCapabilities

[C#] public static HttpCapabilitiesBase GetConfigCapabilities(string configKey, HttpRequest request);
[C++] public: static HttpCapabilitiesBase* GetConfigCapabilities(String* configKey, HttpRequest* request);

[VB] Public Shared Function GetConfigCapabilities(ByVal configKey As String, ByVal request As HttpRequest) As HttpCapabilitiesBase

[JScript] public static function GetConfigCapabilities(configKey: String, request: HttpRequest): HttpCapabilitiesBase;

Description

Returns individual browser capabilities for the current reqest. The name of the requested browser capability. The current System.Web.HttpContext.Request Init

[C#] protected virtual void Init( );

[C++] protected: virtual void Init( );

[VB] Overridable Protected Sub Init( )

System.Web.Hosting

Description

AppDomainFactory class (System.Web.Hosting)

Description

Constructors:

AppDomainFactory

Example Syntax:

[C#] public AppDomainFactory( );

[C++] public: AppDomainFactory( );

[VB] Public Sub New( )

[JScript] public function AppDomainFactory( );

Methods:

Create

[C#] public object Create(string module, string typeName, string appld, string appPath, string strUrlOfAppOrigin, int iZone);

[C++] public: _sealed Object* Create(String* module, String* typeName, String* appld, String* appPath, String* strUrlOfAppOrigin, int iZone);

[VB] NotOverridable Public Function Create(ByVal module As String, ByVal typeName As String, ByVal appld As String, ByVal appPath As String, ByVal strUrlOfAppOrigin As String, ByVal iZone As Integer) As Object

[JScript] public function Create(module: String, typeName: String, appld: String, appPath: String, strUrlOfAppOrigin: String, iZone: int): Object;

Description

ApplicationHost class (System.Web.Hosting)

ToString

Description

CreateApplicationHost

[C#] public static object CreateApplicationHost(Type hostType, string virtualDir, string physicalDir);

[C++] public: static Object* CreateApplicationHost(Type* hostType, String* virtualDir, String* physicalDir);

[VB] Public Shared Function CreateApplicationHost(ByVal hostType As Type, ByVal virtualDir As String, ByVal physicalDir As String) As Object

[JScript] public static function CreateApplicationHost(hostType: Type, virtualDir: String, physicalDir: String): Object;

Description

IAppDomainFactory interface (System.Web.Hosting)

ToString

Description

Create

[C#] object Create(in string module, in string typeName, in string appld, in string appPath, in string strUrlOfAppOrigin, in int iZone);

[C++] Object* Create(_in String* module, _in String* typeName, _in String* appld, _in String* appPath, _in String* strUrlOfAppOrigin, _in int iZone);

[VB] Function Create(ByVal module As String, ByVal typeName As String, ByVal appld As String, ByVal appPath As String, ByVal strUrlOfAppOrigin As String, ByVal iZone As Integer) As Object

[JScript] function Create(in module: String, in typeName: String, in appld: String, in appPath: String, in strUrlOfAppOrigin: String, in iZone: int): Object;

Description

IISAPIRuntime interface (System.Web.Hosting)

Create

Description

DoGCCollect

[C#] void DoGCCollect( );

[C++] void DoGCCollect( );

[VB] Sub DoGCCollect( )

[JScript] function DoGCCollect( );

Description

ProcessRequest

[C#] int ProcessRequest(in IntPtr ecb, in int useProcessModel);

[C++] int ProcessRequest(_in IntPtr ecb, _in int useProcessModel);

[VB] Function ProcessRequest(ByVal ecb As IntPtr, ByVal useProcessModel As Integer) As Integer

[JScript] function ProcessRequest(in ecb: IntPtr, in useProcessModel: int): int;

Description

StartProcessing

[C#] void StartProcessing( );

[C++] void StartProcessing( );

[VB] Sub StartProcessing( )

[JScript] function StartProcessing( );

Description

StopProcessing

[C#] void StopProcessing( );

[C++] void StopProcessing( );

[VB] Sub StopProcessing( )

[JScript] function StopProcessing( );

Description

ISAPIRuntime class (System.Web.Hosting)

StopProcessing

Description

ISAPIRuntime

Example Syntax:

StopProcessing

[C#] public ISAPIRuntime( );

[C++] public: ISAPIRuntime( );

[VB] Public Sub New( )

[JScript] public function ISAPIRuntime( );

DoGCCollect

[C#] public void DoGCCollect( );

[C++] public: _sealed void DoGCCollect( );

[VB] NotOverridable Public Sub DoGCCollect( )

[JScript] public function DoGCCollect( );

Description

ProcessRequest

[C#] public int ProcessRequest(IntPtr ecb, int iWRType);

[C++] public: _sealed int ProcessRequest(IntPtr ecb, int iWRType);

[VB] NotOverridable Public Function ProcessRequest(ByVal ecb As IntPtr, ByVal iWRType As Integer) As Integer

[JScript] public function ProcessRequest(ecb: IntPtr, iWRType: int): int;

Description

StartProcessing

[C#] public void StartProcessing( );

[C++] public: _sealed void StartProcessing( );

[VB] NotOverridable Public Sub StartProcessing( )

[JScript] public function StartProcessing( );

Description

StopProcessing

[C#] public void StopProcessing( );

[C++] public: _sealed void StopProcessing( );

[VB] NotOverridable Public Sub StopProcessing( )

[JScript] public function StopProcessing( );

Description

SimpleWorkerRequest class (System.Web.Hosting)

ToString

Description

SimpleWorkerRequest

Example Syntax:

ToString

[C#] public SimpleWorkerRequest(string page, string query, TextWriter output);

[C++] public: SimpleWorkerRequest(String* page, String* query, TextWriter* output);

[VB] Public Sub New(ByVal page As String, ByVal query As String, ByVal output As TextWriter)

[JScript] public function SimpleWorkerRequest(page: String, query: String, output: TextWriter);

Description

SimpleWorkerRequest

Example Syntax:

ToString

[C#] public SimpleWorkerRequest(string appVirtualDir, string appPhysicalDir, string page, string query, TextWriter output);

[C++] public: SimpleWorkerRequest(String* appVirtualDir, String* appPhysicalDir, String* page, String* query, TextWriter* output);

[VB] Public Sub New(ByVal appVirtualDir As String, ByVal appPhysicalDir As String, ByVal page As String, ByVal query As String, ByVal output As TextWriter)

[JScript] public function SimpleWorkerRequest(appVirtualDir: String, appPhysicalDir: String, page: String, query: String, output: TextWriter);

Description

Properties:

MachineConfigPath

ToString

[C#] public override string MachineConfigPath {get;}

[C++] public: _property virtual String* get_MachineConfigPath( );

[VB] Overrides Public ReadOnly Property MachineConfigPath As String

[JScript] public function get MachineConfigPath( ): String;

Description

MachineInstallDirectory

ToString

[C#] public override string MachineInstallDirectory {get;}

[C++] public: _property virtual String* get_MachineInstallDirectory( );

[VB] Overrides Public ReadOnly Property MachineInstallDirectory As String

[JScript] public function get MachineInstallDirectory( ): String;

Description

EndOfRequest

[C#] public override void EndOfRequest( );

[C++] public: void EndOfRequest( );

[VB] Overrides Public Sub EndOfRequest( )

[JScript] public override function EndOfRequest( );

Description

FlushResponse

[C#] public override void FlushResponse(bool finalFlush);

[C++] public: void FlushResponse(bool finalFlush);

[VB] Overrides Public Sub FlushResponse(ByVal finalFlush As Boolean)

[JScript] public override function FlushResponse(finalFlush: Boolean);

Description

GetAppPath

[C#] public override string GetAppPath( );

[C++] public: String* GetAppPath( );

[VB] Overrides Public Function GetAppPath( ) As String

[JScript] public override function GetAppPath( ): String;

Description

GetAppPathTranslated

[C#] public override string GetAppPathTranslated( );

[C++] public: String* GetAppPathTranslated( );

[VB] Overrides Public Function GetAppPathTranslated( ) As String

[JScript] public override function GetAppPathTranslated( ): String;

Description

GetFilePath

[C#] public override string GetFilePath( );

[C++] public: String* GetFilePath( );

[VB] Overrides Public Function GetFilePath( ) As String

[JScript] public override function GetFilePath( ): String;

Description

GetFilePathTranslated

[C#] public override string GetFilePathTranslated( );

[C++] public: String* GetFilePathTranslated( );

[VB] Overrides Public Function GetFilePathTranslated( ) As String

[JScript] public override function GetFilePathTranslated( ): String;

Description

GetHttpVerbName

[C#] public override string GetHttpVerbName( );

[C++] public: String* GetHttpVerbName( );

[VB] Overrides Public Function GetHttpVerbName( ) As String

[JScript] public override function GetHttpVerbName( ): String;

Description

GetHttpVersion

[C#] public override string GetHttpVersion( );

[C++] public: String* GetHttpVersion( );

[VB] Overrides Public Function GetHttpVersion( ) As String

[JScript] public override function GetHttpVersion( ): String;

Description
GetLocalAddress
[C#] public override string GetLocalAddress( );
[C++] public: String* GetLocalAddress( );
[VB] Overrides Public Function GetLocalAddress( ) As String
[JScript] public override function GetLocalAddress( ): String;

Description
GetLocalPort
[C#] public override int GetLocalPort( );
[C++] public: int GetLocalPort( );
[VB] Overrides Public Function GetLocalPort( ) As Integer
[JScript] public override function GetLocalPort( ): int;

Description
GetPathInfo
[C#] public override string GetPathInfo( );
[C++] public: String* GetPathInfo( );
[VB] Overrides Public Function GetPathInfo( ) As String
[JScript] public override function GetPathInfo( ): String;

Description
GetQueryString
[C#] public override string GetQueryString( );
[C++] public: String* GetQueryString( );
[VB] Overrides Public Function GetQueryString( ) As String
[JScript] public override function GetQueryString( ): String;

Description
GetRawUrl
[C#] public override string GetRawUrl( );
[C++] public: String* GetRawUrl( );
[VB] Overrides Public Function GetRawUrl( ) As String
[JScript] public override function GetRawUrl( ): String;

Description
GetRemoteAddress
[C#] public override string GetRemoteAddress( );
[C++] public: String* GetRemoteAddress( );
[VB] Overrides Public Function GetRemoteAddress( ) As String
[JScript] public override function GetRemoteAddress( ): String;

Description
GetRemotePort
[C#] public override int GetRemotePort( );
[C++] public: int GetRemotePort( );
[VB] Overrides Public Function GetRemotePort( ) As Integer
[JScript] public override function GetRemotePort( ): int;

Description
GetServerVariable
[C#] public override string GetServerVariable(string name);
[C++] public: String* GetServerVariable(String* name);
[VB] Overrides Public Function GetServerVariable(ByVal name As String) As String
[JScript] public override function GetServerVariable(name: String): String;

Description
GetUriPath
[C#] public override string GetUriPath( );
[C++] public: String* GetUriPath( );
[VB] Overrides Public Function GetUriPath( ) As String
[JScript] public override function GetUriPath( ): String;

Description
GetUserToken
[C#] public override IntPtr GetUserToken( );
[C++] public: IntPtr GetUserToken( );
[VB] Overrides Public Function GetUserToken( ) As IntPtr
[JScript] public override function GetUserToken( ): IntPtr;

Description
MapPath
[C#] public override string MapPath(string path);
[C++] public: String* MapPath(String* path);
[VB] Overrides Public Function MapPath(ByVal path As String) As String
[JScript] public override function MapPath(path: String): String;

Description
SendKnownResponseHeader
[C#] public override void SendKnownResponseHeader(int index, string value);
[C++] public: void SendKnownResponseHeader(int index, String* value);
[VB] Overrides Public Sub SendKnownResponseHeader (ByVal index As Integer, ByVal value As String)
[JScript] public override function SendKnownResponseHeader(index: int, value: String);

Description
SendResponseFromFile
[C#] public override void SendResponseFromFile(IntPtr handle, long offset, long length);
[C++] public: void SendResponseFromFile(IntPtr handle, _int64 offset, _int64 length);
[VB] Overrides Public Sub SendResponseFromFile(ByVal handle As IntPtr, ByVal offset As Long, ByVal length As Long)
[JScript] public override function SendResponseFromFile (handle: IntPtr, offset: long, length: long);

Description
SendResponseFromFile
[C#] public override void SendResponseFromFile(string filename, long offset, long length);
[C++] public: void SendResponseFromFile(String* filename, _int64 offset, _int64 length);
[VB] Overrides Public Sub SendResponseFromFile(ByVal filename As String, ByVal offset As Long, ByVal length As Long)
[JScript] public override function SendResponseFromFile (filename: String, offset: long, length: long);

Description
SendResponseFromMemory
[C#] public override void SendResponseFromMemory(byte[ ] data, int length);
[C++] public: void SendResponseFromMemory(unsigned char data _gc[ ], int length);
[VB] Overrides Public Sub SendResponseFromMemory(ByVal data( ) As Byte, ByVal length As Integer)
[JScript] public override function SendResponseFromMemory(data: Byte[ ], length: int);

Description
SendStatus
[C#] public override void SendStatus(int statusCode, string statusDescription);
[C++] public: void SendStatus(int statusCode, String* statusDescription);
[VB] Overrides Public Sub SendStatus(ByVal statusCode As Integer, ByVal statusDescription As String)

[JScript] public override function SendStatus(statusCode: int, statusDescription String);

System.Web.Mail

Description

The System.Web.Mail namespace contains classes that enable you to construct and send an email attachment using the SMTP mail service built into Microsoft Windows 2000.

MailAttachment class (System.Web.Mail)

Description

Provides properties and methods to construct an email attachment.

Constructors:

MailAttachment

Example Syntax:

[C#] public MailAttachment(string filename);

[C++] public: MailAttachment(String* filename);

[VB] Public Sub New(ByVal filename As String)

[JScript] public function MailAttachment(filename: String);

Constructs an email attachment object.

Description

Constructs a MailAttachment object and specifies the file name of the attachment. Sets the System.Text.Encoding property to be UUEncode by default. Name of the attached file.

MailAttachment

Example Syntax:

[C#] public MailAttachment(string filename, MailEncoding encoding);

[C++] public: MailAttachment(String* filename, MailEncoding encoding);

[VB] Public Sub New(ByVal filename As String, ByVal encoding As MailEncoding)

[JScript] public function MailAttachment(filename: String, encoding MailEncoding);

Description

Constructs an email attachment object and specifies the file name and encoding of the attachment. Name of the attached file. The type of System.Web.Mail.MailEncoding used by the attachment.

Properties:

Encoding

[C#] public MailEncoding Encoding {get;}

[C++] public: _property MailEncoding get_Encoding( );

[VB] Public ReadOnly Property Encoding As MailEncoding

[JScript] public function get Encoding( ): MailEncoding;

Description

Indicates the type of encoding used to encode the email attachment.

Filename

[C#] public string Filename {get;}

[C++] public: _property String* get_Filename( );

[VB] Public ReadOnly Property Filename As String

[JScript] public function get Filename( ): String;

Description

Indicates the name of the file to attach to the email.

Methods:

MailEncoding enumeration (System.Web.Mail)

ToString

Description

Provides enumered values for email encoding.

ToString

[C#] public const MailEncoding Base64;

[C++] public: const MailEncoding Base64;

[VB] Public Const Base64 As MailEncoding

[JScript] public var Base64: MailEncoding;

Description

Specifies that the email message uses Base64 encoding.

ToString

[C#] public const MailEncoding UUEncode;

[C++] public: const MailEncoding UUEncode;

[VB] Public Const UUEncode As MailEncoding

[JScript] public var UUEncode: MailEncoding;

Description

Specifies that the email message uses UUEncode encoding.

MailFormat enumeration (System.Web.Mail)

ToString

Description

Provides enumerated values for email format.

ToString

[C#] public const MailFormat Html;

[C++] public: const MailFormat Html;

[VB] Public Const Html As MailFormat

[JScript] public var Html: MailFormat;

Description

Specifies that email format is HTML.

ToString

[C#] public const MailFormat Text;

[C++] public: const MailFormat Text;

[VB] Public Const Text As MailFormat

[JScript] public var Text: MailFormat;

Description

Specifies that email format is plain text.

MailMessage class (System.Web.Mail)

ToString

Description

Provides properties and methods to construct an email message.

MailMessage

Example Syntax:

ToString

[C#] public MailMessage( );

[C++] public: MailMessage( );

[VB] Public Sub New( )

[JScript] public function MailMessage( );

Attachments

ToString

[C#] public IList Attachments {get;}

[C++] public: _property IList* get_Attachments( );

[VB] Public ReadOnly Property Attachments As IList

[JScript] public function get Attachments( ): IList;

Description

Specifies the list of attachments that is transmitted with the message.

Bcc

ToString

[C#] public string Bcc {get; set;}

[C++] public: _property String* get_Bcc( );public: _property void set_Bcc(String*);

[VB] Public Property Bcc As String

[JScript] public function get Bcc( ): String;public function set Bcc(String);

Description

Gets or sets a semicolon-delimited list of email addresses that receive a Blind Carbon Copy (BCC) copy of the email message.

The primary and carbon copy System.Web.Mail.MailMessage.Cc recipients do not see addresses included in the Bcc field.

Body

ToString

[C#] public string Body {get; set;}

[C++] public: _property String* get_Body( );public: _property void set_Body(String*);

[VB] Public Property Body As String

[JScript] public function get Body( ): String;public function set Body(String);

Description

Gets or sets the body of the email message.

BodyEncoding

ToString

[C#] public Encoding BodyEncoding {get; set;}

[C++] public: _property Encoding* get_Body Encoding( );public: _property void set_BodyEncoding (Encoding*);

[VB] Public Property BodyEncoding As Encoding

[JScript] public function get BodyEncoding( ): Encoding; public function set BodyEncoding(Encoding);

Description

Gets or sets the encoding type of the email body.

BodyFormat

ToString

[C#] public MailFormat BodyFormat {get; set;}

[C++] public: _property MailFormat get_Body Format( );public: _property void set_BodyFormat(MailFormat);

[VB] Public Property BodyFormat As MailFormat

[JScript] public function get BodyFormat( ): MailFormat; public function set BodyFormat(MailFormat);

Description

Gets or sets the content type of the email body.

Cc

ToString

[C#] public string Cc {get; set;}

[C++] public: _property String* get_Cc( );public: _property void set_Cc(String*);

[VB] Public Property Cc As String

[JScript] public function get Cc( ): String;public function set Cc(String);

Description

Gets or sets a semicolon-delimited list of email addresses that receive a Carbon Copy (CC) of the email message.

From

ToString

[C#] public string From {get; set;}

[C++] public: _property String* get_From( );public: _property void set_From(String*);

[VB] Public Property From As String

[JScript] public function get From( ): String;public function set From(String);

Description

Gets or sets the email address of the sender.

Headers

ToString

[C#] public IDictionary Headers {get;}

[C++] public: _property IDictionary* get_Headers( );

[VB] Public ReadOnly Property Headers As IDictionary

[JScript] public function get Headers( ): IDictionary;

Description

Specifies the custom headers that are transmitted with the email message.

Priority

ToString

[C#] public MailPriority Priority {get; set;}

[C++] public: _property MailPriority get_Priority( );public: _property void set_Priority(MailPriority);

[VB] Public Property Priority As MailPriority

[JScript] public function get Priority( ): MailPriority;public function set Priority(MailPriority);

Description

Gets or sets the priority of the email message.

Subject

ToString

[C#] public string Subject {get; set;}

[C++] public: _property String* get_Subject( );public: _property void set_Subject(String*);

[VB] Public Property Subject As String

[JScript] public function get Subject( ): String;public function set Subject(String);

Description

Gets or sets the subject line of the email message.

To

ToString

[C#] public string To {get; set;}

[C++] public: _property String* get_To( );public: _property void set_To(String*);

[VB] Public Property To As String

[JScript] public function get To( ): String;public function set To(String);

Description

Gets or sets the email address of the recipient.

UrlContentBase

ToString

[C#] public string UrlContentBase {get; set;}

[C++] public: _property String* get_UrlContentBase( );public: _property void set_UrlContentBase(String*);

[VB] Public Property UrlContentBase As String

[JScript] public function get UrlContentBase( ): String;public function set UrlContentBase(String);

Description

Gets or sets the URL base of all relative URLs used within the HTML encoded body.

UrlContentLocation

ToString

[C#] public string UrlContentLocation {get; set;}

[C++] public: _property String* get_UrlContent Location( );public: _property void set_UrlContentLocation(String*);

[VB] Public Property UrlContentLocation As String

[JScript] public function get UrlContentLocation( ): String; public function set UrlContentLocation(String);

Description

MailPriority enumeration (System.Web.Mail)

ToString

Description

Provides enumerated values for email priority.

ToString

[C#] public const MailPriority High;

[C++] public: const MailPriority High;

[VB] Public Const High As MailPriority

[JScript] public var High: MailPriority;

Description

Specifies that the email message has high priority.

ToString

[C#] public const MailPriority Low;

[C++] public: const MailPriority Low;

[VB] Public Const Low As MailPriority

[JScript] public var Low: MailPriority;

Description

Specifies that the email message has low priority.

ToString

[C#] public const MailPriority Normal;

[C++] public: const MailPriority Normal;

[VB] Public Const Normal As MailPriority

[JScript] public var Normal: MailPriority;

Description

Specifies that the email message has normal priority.

SmtpMail class (System.Web.Mail)

ToString

Description

Provides properties and methods to send an email attachment using the SMTP mail service built into Microsoft Windows 2000.

Mail is by default queued on a Windows 2000 system, ensuring that the calling program does not block network traffic.

SmtpMail

Example Syntax:

ToString

[C#] public SmtpMail( );

[C++] public: SmtpMail( );

[VB] Public Sub New( )

[JScript] public function SmtpMail( );

SmtpServer

ToString

[C#] public static string SmtpServer {get; set;}

[C++] public: _property static String* get_Smtp Server( );public: _property static void set_SmtpServer (String*);

[VB] Public Shared Property SmtpServer As String

[JScript] public static function get SmtpServer( ): String; public static function set SmtpServer(String);

Description

Gets or sets the name of the SMTP mail server to use to send email messages.

Send

[C#] public static void Send(MailMessage message);

[C++] public: static void Send(MailMessage* message);

[VB] Public Shared Sub Send(ByVal message As MailMessage)

[JScript] public static function Send(message: MailMessage);

Description

Sends a mail message using arguments supplied in the MailMessage properties. The System.Web.Mail.MailMessage object to send.

Send

[C#] public static void Send(string from, string to, string subject, string messageText);

[C++] public: static void Send(String* from, String* to, String* subject, String* messageText);

[VB] Public Shared Sub Send(ByVal from As String, ByVal to As String, ByVal subject As String, ByVal messageText As String)

[JScript] public static function Send(from: String, to: String, subject: String, messageText: String); Sends a mail message.

Description

Sends a mail message using the supplied destination arguments. The address of the email's sender. The address of the email's recipient. The subject line of the email message.

System.Web.Security

Description

This namespace contains classes that are used to implement ASP.NET security in Web server applications.

DefaultAuthenticationEventArgs class (System.Web.Security)

Description

Provides a wrapper around the default authentication services. This class cannot be inherited.

For more information about handling events, see.

Constructors:

DefaultAuthenticationEventArgs

Example Syntax:

[C#] public DefaultAuthenticationEventArgs(HttpContext context);

[C++] public: DefaultAuthenticationEventArgs(HttpContext* context);

[VB] Public Sub New(ByVal context As HttpContext)

[JScript] public function DefaultAuthenticationEventArgs (context: HttpContext);

Description

Initializes a new instance of the System.Web.Security.DefaultAuthenticationEventArgs class. The context for the event.

Properties:

Context

[C#] public HttpContext Context {get;}

[C++] public: _property HttpContext* get_Context( );

[VB] Public ReadOnly Property Context As HttpContext

[JScript] public function get Context( ): HttpContext;

Description

The HttpContext intrinsic provides access to Request, Response, and User objects.

Methods:

DefaultAuthenticationEventHandler delegate (System.Web.Security)

ToString

Description

Represents the method that handles the DefaultAuthentication_OnAuthenticate event of a DefaultAuthenticationModule. The object that raised the event. A DefaultAuthenticationEventArgs object that contains the event data.

When you create a System.Web.Security.DefaultAuthenticationEventHandler delegate, you identify the method to handle the event. To associate the event with your EventHandler, add an instance of the delegate to the event. The EventHandler is called whenever the event occurs, unless you remove the delegate. For more information about EventHandler delegates, see.

DefaultAuthenticationModule class (System.Web.Security)

ToString

Description

Insures that an Authentication object is present in the context. This class cannot be inherited.

DefaultAuthenticationModule

Example Syntax:

ToString

[C#] public DefaultAuthenticationModule( );

[C++] public: DefaultAuthenticationModule( );

[VB] Public Sub New( )

[JScript] public function DefaultAuthenticationModule( );

ToString

[C#] public event DefaultAuthenticationEventHandler Authenticate;

[C++] public: _event DefaultAuthenticationEventHandler* Authenticate;

[VB] Public Event Authenticate As DefaultAuthentication-EventHandler

Description

Defines the event raised by the DefaultAuthentication module. Used by the DefaultAuthentication_OnAuthenticate handler, if one exists.

When you create a System.Web.Security.DefaultAuthenticationModule delegate, you identify the method to handle the event. To associate the event with your EventHandler, add an instance of the delegate to the event. The EventHandler is called whenever the event occurs, unless you remove the delegate. For more information about EventHandler delegates, see.

Dispose

[C#] public void Dispose( );

[C++] public: _sealed void Dispose( );

[VB] NotOverridable Public Sub Dispose( )

[JScript] public function Dispose( );

Description

Called by the HTTP runtime to Dispose of the module (derived from IHttpModule).

Call System.Web.Security.DefaultAuthenticationModule.Dispose when you are finished using the System.Web.Security.DefaultAuthenticationModule. The System.Web.Security.DefaultAuthenticationModule.Dispose method leaves the System.Web.Security.DefaultAuthenticationModule in an unusable state. After calling System.Web.Security.DefaultAuthenticationModule.Dispose, you must release all references to the System.Web.Security.DefaultAuthenticationModule so the memory occupied can be reclaimed by garbage collection.

Init

[C#] public void Init(HttpApplication app);

[C++] public: _sealed void Init(HttpApplication* app);

[VB] NotOverridable Public Sub Init(ByVal app As HttpApplication)

[JScript] public function Init(app: HttpApplication);

Description

Initializes the module. The HTTP application.

FileAuthorizationModule class (System.Web.Security)

ToString

Description

Verifies that the remote user has NT permissions to access the file requested. This class cannot be inherited.

This module provides authorization services against file system ACLs. When the Windows authentication module is being used for the application, this module ensures (if in the pipeline) that the requesting user is allowed read access to the resource before executing it.

FileAuthorizationModule

Example Syntax:

ToString

[C#] public FileAuthorizationModule( );

[C++] public: FileAuthorizationModule( );

[VB] Public Sub New( )

[JScript] public function FileAuthorizationModule( );

Dispose

[C#] public void Dispose( );

[C++] public: _sealed void Dispose( );

[VB] NotOverridable Public Sub Dispose( )

[JScript] public function Dispose( );

Description

Disposes of the module dervied from IHttpModule when called by the HttpRuntime.

Call System.Web.Security.FileAuthorizationModule.Dispose when you are finished using the System.Web.Security.FileAuthorizationModule. The System.Web.Security.FileAuthorizationModule.Dispose method leaves the System.Web.Security.FileAuthorizationModule in an unusable state. After calling System.Web.Security.FileAuthorizationModule.Dispose, you must release all references to the System.Web.Security.FileAuthorizationModule so the memory occupied can be reclaimed by garbage collection.

Init

[C#] public void Init(HttpApplication app);

[C++] public: _sealed void Init(HttpApplication* app);

[VB] NotOverridable Public Sub Init(ByVal app As HttpApplication)

[JScript] public function Init(app: HttpApplication);

Description

Initializes the module. The HttpApplication module.

FormsAuthentication class (System.Web.Security)

ToString

Description

Provides static methods that supply helper utilities for manipulating authentication tickets. This class cannot be inherited.

FormsAuthentication

Example Syntax:

ToString

[C#] public FormsAuthentication( ); [C++] public: FormsAuthentication( ); [VB] Public Sub New( ) [JScript] public function FormsAuthentication( );

FormsCookieName

ToString

[C#] public static string FormsCookieName {get;}

[C++] public: _property static String* get_FormsCookieName( );

[VB] Public Shared ReadOnly Property FormsCookieName As String

[JScript] public static function get FormsCookieNameo: String;

Description

Returns the configured cookie name used for the current application.

Returns a String.

FormsCookiePath

ToString

[C#] public static string FormsCookiePath {get;}

[C++] public: _property static String* get_FormsCookiePath( );

[VB] Public Shared ReadOnly Property FormsCookiePath As String

[JScript] public static function get FormsCookiePath( ): String;

Description

Returns the configured cookie path used for the current application.

Authenticate

[C#] public static bool Authenticate(string name, string password);

[C++] public: static bool Authenticate(String* name, String* password);

[VB] Public Shared Function Authenticate(ByVal name As String, ByVal password As String) As Boolean

[JScript] public static function Authenticate(name: String, password: String) Boolean;

Description

Attempts to validate the credentials against those contained in the configured credential store, given the supplied credentials.

Return Value: Returns true if the credentials are valid, otherwise returns false. The user name The user password.

Decrypt

[C#] public static FormsAuthenticationTicket Decrypt(string strEncrypted);

[C++] public: static FormsAuthenticationTicket* Decrypt (String* strEncrypted);

[VB] Public Shared Function Decrypt(ByVal strEncrypted As String) As FormsAuthenticationTicket

[JScript] public static function Decrypt(strEncrypted: String) FormsAuthenticationTicket;

Description

Returns an instance of a FormsAuthenticationTicket class, given an encrypted authentication ticket obtained from an HTTP cookie.

Return Value: Returns a FormsAuthenticationTicket object.

Encrypt

[C#] public static string Encrypt(FormsAuthenticationTicket ticket);

[C++] public: static String* Encrypt(FormsAuthenticationTicket* ticket);

[VB] Public Shared Function Encrypt(ByVal ticket As FormsAuthenticationTicket) As String

[JScript] public static function Encrypt(ticket: FormsAuthenticationTicket): String;

Description

Produces a string containing an encrypted authentication ticket suitable for use in an HTTP cookie, given a FormsAuthenticationTicket.

Return Value: Returns a String containing an encrypted authentication ticket. An authentication ticket class.

GetAuthCookie

[C#] public static HttpCookie GetAuthCookie(string userName, bool createPersistentCookie);

[C++] public: static HttpCookie* GetAuthCookie(String* userName, bool createPersistentCookie);

[VB] Public Shared Function GetAuthCookie(ByVal userName As String, ByVal createPersistentCookie As Boolean) As HttpCookie

[JScript] public static function GetAuthCookie(userName: String, createPersistentCookie: Boolean): HttpCookie; Creates an authentication cookie for a given user name.

Description

Creates an authentication cookie for a given user name. This does not set the cookie as part of the outgoing response, so that an application can have more control over how the cookie is issued.

Return Value: Returns an HttpCookie. Name of the authenticated user. This does not have to map to a Windows account. Specifies whether or not a durable cookie (a cookie that is saved across browser sessions) should be issued. Cookie path defaults to'/'.

GetAuthCookie

[C#] public static HttpCookie GetAuthCookie(string userName, bool createPersistentCookie, string strCookiePath);

[C++] public: static HttpCookie* GetAuthCookie(String* userName, bool createPersistentCookie, String* strCookiePath);

[VB] Public Shared Function GetAuthCookie(ByVal userName As String, ByVal createPersistentCookie As Boolean, ByVal strCookiePath As String) As HttpCookie

[JScript] public static function GetAuthCookie(userName: String, createPersistentCookie: Boolean, strCookiePath: String): HttpCookie;

Description

Creates an authentication cookie for a given user name. This does not set the cookie as part of the outgoing response, so that an application can have more control over how the cookie is issued.

Return Value: Returns an HttpCookie. Name of the authenticated user. This does not have to map to a Windows account. Specifies whether or not a durable cookie (a cookie that is saved across browser sessions) should be issued. Specifies cookie path.

GetRedirectUrl

[C#] public static string GetRedirectUrl(string userName, bool createPersistentCookie);

[C++] public: static String* GetRedirectUrl(String* userName, bool createPersistentCookie);

[VB] Public Shared Function GetRedirectUrl(ByVal userName As String, ByVal createPersistentCookie As Boolean) As String

[JScript] public static function GetRedirectUrl(userName: String, createPersistentCookie: Boolean): String;

Description

Returns the redirect URL for the original request that caused the redirect to the logon page.

Return Value: Returns a String.

If there is no original URL, Default.aspx is used. If the redirect URL specifies a different server, this method also returns the authentication ticket as part of the query string. This method can be used by applications that need to do the redirect themselves instead of using RedirectFromLoginPage. Name of the authenticated user. This does not have to map to a Windows account. Specifies whether or not a durable cookie (a cookie that is saved across browser sessions) should be issued. Cookie path defaults to'/'.

HashPasswordForStoringInConfigFile

[C#] public static string HashPasswordForStoringInConfigFile(string password, string passwordFormat);

[C++] public: static String* HashPasswordForStoringInConfigFile(String* password, String* passwordFormat);

[VB] Public Shared Function HashPasswordForStoringInConfigFile(ByVal password As String, ByVal passwordFormat As String) As String

[JScript] public static function HashPasswordForStoringInConfigFile(password: String, passwordFormat: String): String;

Description

Given a password and a string identifying the hash type, this routine produces a hash password suitable for storing in a configuration file.

Return Value: Returns a String containing a hashed password.

Password algorithms supported are SHA1 and MD5. The pasword to hash. The hash algorithm to use. Choices are "sha1" or "md5".

Initialize

[C#] public static void Initialize( );

[C++] public: static void Initialize( );

[VB] Public Shared Sub Initialize( )

[JScript] public static function Initialize( );

Description

Initializes FormsAuthentication by reading the configuration and getting the cookie values and encryption keys for the given application.

RedirectFromLoginPage

[C#] public static void RedirectFromLoginPage(string userName, bool createPersistentCookie);

[C++] public: static void RedirectFromLoginPage(String* userName, bool createPersistentCookie);

[VB] Public Shared Sub RedirectFromLoginPage(ByVal userName As String, ByVal createPersistentCookie As Boolean)

[JScript] public static function RedirectFromLoginPage (userName: String, createPersistentCookie: Boolean); Redirects an authenticated user back to the originally requested URL.

Description

Redirects an authenticated user back to the originally requested URL.

Redirects, based on the contents of the ReturnURL key in the query string, or redirects to Default.aspx if the return key does not exist. It issues an authentication ticket and does a SetForms with the ticket, using the appropriately configured cookie name for the application as part of the redirect response. Name of the user for cookie authentication purposes. This does not need to map to an account name and will be used by URL Authorization. Specifies whether or not a durable cookie (one that is saved across browser sessions) should be issued.

RedirectFromLoginPage

[C#] public static void RedirectFromLoginPage(string userName, bool createPersistentCookie, string strCookiePath);

[C++] public: static void RedirectFromLoginPage(String* userName, bool createPersistentCookie, String* strCookiePath);

[VB] Public Shared Sub RedirectFromLoginPage(ByVal userName As String, ByVal createPersistentCookie As Boolean, ByVal strCookiePath As String)

[JScript] public static function RedirectFromLoginPage (userName: String, createPersistentCookie: Boolean, strCookiePath: String);

Description

Redirects an authenticated user back to the originally requested URL.

Redirects, based on the contents of the ReturnURL key in the query string, or redirects to Default.aspx if the return key does not exist. It issues an authentication ticket and does a SetForms with the ticket, using the appropriately configured cookie name for the application as part of the redirect response. Name of the user for cookie authentication purposes. This does not need to map to an account name and will be used by URL Authorization. Specifies whether or not a durable cookie (one that is saved across browser sessions) should be issued. Specifies cookie path.

RenewTicketIfOld

[C#] public static FormsAuthenticationTicket RenewTicketIfOld(FormsAuthenticationTicket tOld);

[C++] public: static FormsAuthenticationTicket* RenewTicketIfOld(FormsAuthenticationTicket* tOld);

[VB] Public Shared Function RenewTicketIfOld(ByVal tOld As FormsAuthenticationTicket) As FormsAuthenticationTicket

[JScript] public static function RenewTicketIfOld(tOld: FormsAuthenticationTicket): FormsAuthenticationTicket;

Description

Conditionally updates the sliding expiration on a FormsAuthenticationTicket.

Return Value: Returns the updated FormsAuthenticationTicket.

The ticket is updated with the IssueDate set to the current time and the expiration based on the difference between the previous expiration time and issue time. The test used to determine whether the ticket should be updated is (DateTime.Now â€" IssueDate)>(Expiration â€" DateTime.Now).

SetAuthCookie

[C#] public static void SetAuthCookie(string userName, bool createPersistentCookie);

[C++] public: static void SetAuthCookie(String* userName, bool createPersistentCookie);

[VB] Public Shared Sub SetAuthCookie(ByVal userName As String, ByVal createPersistentCookie As Boolean)

[JScript] public static function SetAuthCookie(userName: String, createPersistentCookie: Boolean); Creates an authentication ticket and attaches it to the cookie's collection of the outgoing response. It does not perform a redirect.

Description

Creates an authentication ticket for the given userName and createPersistentCookie and attaches it to the cookie's collection of the outgoing response. It does not perform a redirect.

This has the effect of creating an authenticated user. Applications can use this when they intend to manually redirect, or if they do not want to redirect. For example, you can use this for an embedded logon area on a page. The name of an authenticated user. This does not have to map to a Windows account. Specifies whether or not a durable cookie (one that is saved across browser sessions) should be issued.

SetAuthCookie

[C#] public static void SetAuthCookie(string userName, bool createPersistentCookie, string strCookiePath);

[C++] public: static void SetAuthCookie(String* userName, bool createPersistentCookie, String* strCookiePath);

[VB] Public Shared Sub SetAuthCookie(ByVal userName As String, ByVal createPersistentCookie As Boolean, ByVal strCookiePath As String)

[JScript] public static function SetAuthCookie(userName: String, createPersistentCookie: Boolean, strCookiePath: String);

Description

Creates an authentication ticket for the given userName, createPersistentCookie, and strCookiePath and attaches it to the cookie's collection of the outgoing response. It does not perform a redirect.

This has the effect of creating an authenticated user. Applications can use this when they intend to manually redirect, or if they do not want to redirect. For example, you can use this for an embedded logon area on a page. The name of an authenticated user. This does not have to map to a Windows account. Specifies whether or not a durable cookie (one that is saved across browser sessions) should be issued. Specifies cookie path.

SignOut

[C#] public static void SignOut( );

[C++] public: static void SignOut( );

[VB] Public Shared Sub SignOut( )

[JScript] public static function SignOut( );

Description

Removes the authentication ticket by doing a SetForms with an empty value, given an authenticated user. This removes either durable or session cookies.

FormsAuthenticationEventArgs class (System.Web.Security)

ToString

Description

Provides data for the FormsAuthentication_OnAuthenticate event. This class cannot be inherited.

For more information about handling events, see.

FormsAuthenticationEventArgs

Example Syntax:

ToString

[C#] public FormsAuthenticationEventArgs(HttpContext context);

[C++] public: FormsAuthenticationEventArgs(HttpContext* context);

[VB] Public Sub New(ByVal context As HttpContext)

[JScript] public function FormsAuthenticationEventArgs (context: HttpContext);

Description

Initializes a new instance of the System.Web.Security. FormsAuthenticationEventArgs class.

The following table shows initial property values for an instance of System.Web.Security.FormsAuthenticationEventArgs. The context for the event.

Context

ToString

[C#] public HttpContext Context {get;}

[C++] public: _property HttpContext* get_Context( );

[VB] Public ReadOnly Property Context As HttpContext

[JScript] public function get Context( ): HttpContext;

Description

Provides access to Request, Response, and User objects. This is the HttpContext intrinsic.

See the ASP.NET HttpRuntime documentation for more information.

User

ToString

[C#] public IPrincipal User {get; set;}

[C++] public: _property IPrincipal* get_User( );public: _property void set_User(IPrincipal*);

[VB] Public Property User As IPrincipal

[JScript] public function get User( ): IPrincipal;public function set User(IPrincipal);

Description

Indicates the IPrincipal object to be associated with the request.

The user object will be attached to the context. If User is non null and Context.User is null, the FormsAuthenticationModule will initialize Context.User with FormsAuthenticationEventArgs.User.

FormsAuthenticationEventHandler delegate (System.Web.Security)

ToString

Description

Represents the method that will handle the FormsAuthentication event of a FormsAuthenticationModule. The source of the event. A System.Web.Security.FormsAuthenticationEventArgs that contains the event data.

When you create a System.Web.Security.FormsAuthenticationEventHandler delegate, you identify the method that will handle the event. To associate the event with your event handler, add an instance of the delegate to the event. The event handler is called whenever the event occurs, unless you remove the delegate. For more information about event handler delegates, see This delegate defines the signature for the FormsAuthentication_OnAuthenticate event handler.

FormsAuthenticationModule class (System.Web.Security)

ToString

Description

Enables ASP.NET applications to use forms authentication. This class cannot be inherited.

FormsAuthenticationModule

Example Syntax:

ToString

[C#] public FormsAuthenticationModule( );

[C++] public: FormsAuthenticationModule( );

[VB] Public Sub New( )

[JScript] public function FormsAuthenticationModule( );

ToString

[C#] public event FormsAuthenticationEventHandler Authenticate;

[C++] public: _event FormsAuthenticationEventHandler* Authenticate;

[VB] Public Event Authenticate As FormsAuthenticationEventHandler

Description

Defines the event raised during authentication. This is a Global.asax event that must be named FormsAuthentication_OnAuthenticate. You can use this event to customize cookie authentication.

For more information about handling events, see.

Dispose

[C#] public void Dispose( );

[C++] public: _sealed void Dispose( );

[VB] NotOverridable Public Sub Dispose( )

[JScript] public function Dispose( );

Description

Disposes of the module derived from IHttpModule when called by the HttpRuntime.

Call System.Web.Security.FormsAuthenticationModule.Dispose when you are finished using the System.Web.Security.FormsAuthenticationModule. The System.Web.Security.FormsAuthenticationModule.Dispose method leaves the System.Web.Security.FormsAuthenticationModule in an unusable state. After calling System.Web.Security.FormsAuthenticationModule.Dispose, you must release all references to the System.Web.Security.FormsAuthenticationModule so the memory it was occupying can be reclaimed by garbage collection.

Init

[C#] public void Init(HttpApplication app);

[C++] public: _sealed void Init(HttpApplication* app);

[VB] NotOverridable Public Sub Init(ByVal app As HttpApplication)

[JScript] public function Init(app: HttpApplication);

Description

Initializes the module derived from IHttpModule when called by the HttpRuntime. The HttpApplication module.

OnEnter

[C#] public void OnEnter(object source, EventArgs eventArgs);

[C++] public: void OnEnter(Object* source, EventArgs* eventArgs);

[VB] Public Sub OnEnter(ByVal source As Object, ByVal eventArgs As EventArgs)

[JScript] public function OnEnter(source: Object, eventArgs: EventArgs);

Description

Called by the HttpRuntime. The source of the event. A System.Web.Security.FormsAuthenticationEventArgsthat contains the event data.

OnLeave

[C#] public void OnLeave(object source, EventArgs eventArgs);

[C++] public: void OnLeave(Object* source, EventArgs* eventArgs);

[VB] Public Sub OnLeave(ByVal source As Object, ByVal eventArgs As EventArgs)

[JScript] public function OnLeave(source: Object, eventArgs: EventArgs);

Description

Called by the HttpRuntime. The source of the event. A System.Web.Security.FormsAuthenticationEventArgsthat contains the event data.

FormsAuthenticationTicket class (System.Web.Security)

ToString

Description

Provides the information represented in an authentication cookie as used by FormsAuthenticationModule. This class cannot be inherited.

For more information about using attributes, see.

FormsAuthenticationTicket

Example Syntax:

ToString

[C#] public FormsAuthenticationTicket(string name, bool isPersistent, int timeout);

[C++] public: FormsAuthenticationTicket(String* name, bool isPersistent, int timeout);

[VB] Public Sub New(ByVal name As String, ByVal isPersistent As Boolean, ByVal timeout As Integer)

[JScript] public function FormsAuthenticationTicket(name: String, isPersistent: Boolean, timeout: int);

Description

Creates a FormsAuthenticationTicket instance with the specified name and cookie durability, and default values for the other settings (version set internally, dates set to current date, and expiration determined on durability of cookie).

The default settings include version number, dates that are set to the current date, and expiration as determined by the durability setting. User name associated with the ticket. If true, use a persistent cookie. Specifies the time in minutes (as an integer) for which the authentication ticket is valid.

FormsAuthenticationTicket

Example Syntax:

ToString

[C#] public FormsAuthenticationTicket(int version, string name, DateTime issueDate, DateTime expiration, bool isPersistent, string userData);

[C++] public: FormsAuthenticationTicket(int version, String* name, DateTime issueDate, DateTime expiration, bool isPersistent, String* userData);

[VB] Public Sub New(ByVal version As Integer, ByVal name As String, ByVal issueDate As DateTime, ByVal expiration As DateTime, ByVal isPersistent As Boolean, ByVal userData As String)

[JScript] public function FormsAuthenticationTicket(version: int, name: String, issueDate: DateTime, expiration: DateTime, isPersistent: Boolean, userData: String); Creates a FormsAuthenticationTicket instance.

Description

Creates a FormsAuthenticationTicket instance with explicit values. The version number. User name associated with the ticket. Time at which the cookie was issued. Set an expiration date for the cookie. True if the cookie is persistent. User-defined data to be stored in the cookie.

FormsAuthenticationTicket

Example Syntax:

ToString

[C#] public FormsAuthenticationTicket(int version, string name, DateTime issueDate, DateTime expiration, bool isPersistent, string userData, string cookiePath);

[C++] public: FormsAuthenticationTicket(int version, String* name, DateTime issueDate, DateTime expiration, bool isPersistent, String* userData, String* cookiePath);

[VB] Public Sub New(ByVal version As Integer, ByVal name As String, ByVal issueDate As DateTime, ByVal expiration As DateTime, ByVal isPersistent As Boolean, ByVal userData As String, ByVal cookiepath As String)

[JScript] public function FormsAuthenticationTicket(version: int, name: String, issueDate: DateTime, expiration: DateTime, isPersistent: Boolean, userData String, cookiePath: String);

Description

Creates a FormsAuthenticationTicket instance with explicit values. The version number. User name associated with the ticket. Time at which the cookie was issued. Set an expiration date for the cookie. True if the cookie is persistent. User-defined data to be stored in the cookie. THe path for the cookie.

CookiePath

ToString

[C#] public string CookiePath {get;}

[C++] public: _property String* get_CookiePath( );

[VB] Public ReadOnly Property CookiePath As String

[JScript] public function get CookiePath( ): String;

Description

Returns the Path for which the cookie was issued.

This is used when the cookie is refreshed.

Expiration

ToString

[C#] public DateTime Expiration {get;}

[C++] public: _property DateTime get_Expiration( );

[VB] Public ReadOnly Property Expiration As DateTime

[JScript] public function get Expiration( ): DateTime;

Description

Returns the date/time at which the cookie expires.

For durable cookies, this should be the maximum value. For session scoped cookies, this should be set to the time the cookie was issued. This can be used by custom application logic to implement more-advanced expiration semantics.

Expired

ToString

[C#] public bool Expired {get;}

[C++] public: _property bool get_Expired( );
[VB] Public ReadOnly Property Expired As Boolean
[JScript] public function get Expired( ): Boolean;

Description
Returns True if the cookie has expired.
IsPersistent
ToString
[C#] public bool IsPersistent {get;}
[C++] public: _property bool get_IsPersistent( );
[VB] Public ReadOnly Property IsPersistent As Boolean
[JScript] public function get IsPersistent( ): Boolean;

Description
Returns True if a durable cookie was issued. Otherwise, the authentication cookie is scoped to the browser lifetime.
IssueDate
ToString
[C#] public DateTime IssueDate {get;}
[C++] public: _property DateTime get_IssueDate( );
[VB] Public ReadOnly Property IssueDate As DateTime
[JScript] public function get IssueDate( ): DateTime;

Description
Returns the date/time at which the cookie was originally issued. This can be used for custom expiration schemes.
Name
ToString
[C#] public string Name {get;}
[C++] public: _property String* get_Name( );
[VB] Public ReadOnly Property Name As String
[JScript] public function get Name( ): String;

Description
Returns the user name associated with the authentication cookie.
This string is used for authorization purposes.
UserData
ToString
[C#] public string UserData {get;}
[C++] public: _property String* get_UserData( );
[VB] Public ReadOnly Property UserData As String
[JScript] public function get UserData( ): String;

Description
Returns an application-defined string that might have been stored in the cookie.
This field will be empty (" ") if no application-defined data was provided.
Version
ToString
[C#] public int Version {get;}
[C++] public: _property int get_Version( );
[VB] Public ReadOnly Property Version As Integer
[JScript] public function get Version( ): int;

Description
Returns a byte version number for future use.
The current version identifier is 1.
FormsIdentity class (System.Web.Security)
ToString Description
Provides an IIdentity-derived class to be used by FormsAuthenticationModule. It provides a way for an application to access the cookie authentication ticket. This class cannot be inherited.
FormsIdentity
Example Syntax:
ToString
[C#] public FormsIdentity(FormsAuthenticationTicket ticket);
[C++] public: FormsIdentity(FormsAuthenticationTicket* ticket);
[VB] Public Sub New(ByVal ticket As FormsAuthenticationTicket)
[JScript] public function FormsIdentity(ticket: FormsAuthenticationTicket);

Description
Initializes a new instance of the System.Web.Security.FormsIdentity class. The authentication ticket upon which this identity is based.
AuthenticationType
ToString
[C#] public string AuthenticationType {get;}
[C++] public: property String* get AuthenticationType( );
[VB] Public ReadOnly Property AuthenticationType As String
[JScript] public function get AuthenticationType( ): String;

Description
The type of the identity (in this case, "Forms").
IsAuthenticated
ToString
[C#] public bool IsAuthenticated {get;}
[C++] public: property bool get IsAuthenticated( );
[VB] Public ReadOnly Property IsAuthenticated As Boolean
[JScript] public function get IsAuthenticated( ): Boolean;

Description
Indicates whether authentication took place.
Name
ToString
[C#] public string Name {get;}
[C++] public: _property String* get_Name( );
[VB] Public ReadOnly Property Name As String
[JScript] public function get Name( ): String;

Description
The name of the identity (in this case, the user name).
Ticket
ToString
[C#] public FormsAuthenticationTicket Ticket {get;}
[C++] public: _property FormsAuthenticationTicket* get_Ticket( );
[VB] Public ReadOnly Property Ticket As FormsAuthenticationTicket
[JScript] public function get Ticket( ): FormsAuthenticationTicket;

Description
Returns the FormsAuthenticationTicket associated with the current request.
PassportAuthenticationEventArgs class (System.Web.Security)
ToString Description
The event argument passed to the PassportAuthentication_OnAuthenticate event by the PassportAuthentication module. Since there is already an identity at this point, this is useful mainly for attaching a custom IPrincipal object to the context using the supplied identity.
For more information about handling events, see.
PassportAuthenticationEventArgs
Example Syntax:
ToString
[C#] public PassportAuthenticationEventArgs(PassportIdentity identity, HttpContext context);

[C++] public: PassportAuthenticationEventArgs(PassportIdentity* identity, HttpContext* context);
[VB] Public Sub New(ByVal identity As PassportIdentity, ByVal context As HttpContext)
[JScript] public function PassportAuthenticationEventArgs (identity: PassportIdentity, context: HttpContext);

Description

Initializes a new instance of the System.Web.Security.PassportAuthenticationEventArgs class. The identity object The context for the event.

Context

ToString

[C#] public HttpContext Context {get;}
[C++] public: _property HttpContext* get_Context( );
[VB] Public ReadOnly Property Context As HttpContext
[JScript] public function get Context( ): HttpContext;

Description

The HttpContext intrinsic provides access to Request, Response, and User objects.

Identity

ToString

[C#] public PassportIdentity Identity {get;}
[C++] public: _property PassportIdentity* get_Identity( );
[VB] Public ReadOnly Property Identity As PassportIdentity
[JScript] public function get Identity( ): PassportIdentity;

Description

An authenticated Passport identity.

User

ToString

[C#] public IPrincipal User {get; set;}
[C++] public: _property IPrincipal* get_User( );public: _property void set_User(IPrincipal*);
[VB] Public Property User As IPrincipal
[JScript] public function get User( ): IPrincipal;public function set User(IPrincipal);

Description

Associates an IPrincipal object with the request.

The User object should be attached to the context. If User is non-null and Context.User is null, the PassportAuthenticationModule will initialize Context.User with PassportAuthenticationEventArgs.User.

PassportAuthenticationEventHandler delegate (System.Web.Security)

ToString

Description

Represents the method that handles the PassportAuthentication_OnAuthenticate event of a PassportAuthenticationModule. The object that raised the event. A PassportAuthenticationEventArgs object that contains the event data.

When you create a System.Web.Security.PassportAuthenticationEventHandler delegate, you identify the method to handle the event. To associate the event with your EventHandler, add an instance of the delegate to the event. The EventHandler is called whenever the event occurs, unless you remove the delegate. For more information about EventHandler delegates, see.

PassportAuthenticationModule class (System.Web.Security)

ToString

Description

Provides a wrapper around PassportAuthentication services. This class cannot be inherited.

Installation of the Passport SDK is still required, as is registration of the site with the Passport authority. The PassportAuthentication_OnAuthenticate event is raised for applications that are designed to attach a custom IPrincipal object to the context. The Passport service itself does the authentication, so that cannot be overridden.

PassportAuthenticationModule

Example Syntax:

ToString

[C#] public PassportAuthenticationModule( );
[C++] public: PassportAuthenticationModule( );
[VB] Public Sub New( )
[JScript] public function PassportAuthenticationModule( );

ToString

[C#] public event PassportAuthenticationEventHandler Authenticate;
[C++] public: _event PassportAuthenticationEventHandler* Authenticate;
[VB] Public Event Authenticate As PassportAuthenticationEventHandler Description Raised during authentication. This is a Global.asax event that must be named PassportAuthentication_OnAuthenticate event.

Advanced users use this event to attach a custom IPrinciple object to the context.

Dispose

[C#] public void Dispose( );
[C++] public: _sealed void Dispose( );
[VB] NotOverridable Public Sub Dispose( )
[JScript] public function Dispose( );

Description

Disposes of the module derived from IHttpModule when called by the HttpRuntime.

Call System.Web.Security.PassportAuthenticationModule.Dispose when you are finished using the System.Web.Security.PassportAuthenticationModule. The System.Web.Security.PassportAuthenticationModule.Dispose method leaves the System.Web.Security.PassportAuthenticationModule in an unusable state. After calling System.Web.Security.PassportAuthenticationModule.Dispose, you must release all references to the System.Web.Security.PassportAuthenticationModule so the memory it occupied can be reclaimed by garbage collection.

Init

[C#] public void Init(HttpApplication app);
[C++] public: _sealed void Init(HttpApplication* app);
[VB] NotOverridable Public Sub Init(ByVal app As HttpApplication)
[JScript] public function Init(app: HttpApplication);

Description

Initializes the module (derived from IHttpModule) when called by the HttpRuntime. The HttpApplication module PassportIdentity class (System.Web.Security)

ToString

Description

Provides access to the Passport profile information contained in the Passport profile cookies. This is an IIdentity-derived class. This class cannot be inherited.

ASP.NET Beta 2 requires the 1.4 version of the Passport SDK.

PassportIdentity

Example Syntax:

ToString

[C#] public PassportIdentity( );
[C++] public: PassportIdentity( );

[VB] Public Sub New( )
[JScript] public function PassportIdentity( );

Description

Creates a new instance of the PassportIdentity object.
AuthenticationType
ToString
[C#] public string AuthenticationType {get;}
[C++] public: _property String* get_AuthenticationType( );
[VB] Public ReadOnly Property AuthenticationType As String
[JScript] public function get AuthenticationType( ): String;

Description

The type of the identity. In this case, Passport.

See the Passport SDK documentation for more information about PassportIdentity.AuthenticationType.
Error
ToString
[C#] public int Error {get;}
[C++] public: _property int get_Error( );
[VB] Public ReadOnly Property Error As Integer
[JScript] public function get Error( ): int;

Description

Returns an error state associated with the current Passport ticket. For more information, see the error property in the Passport documentation.
GetFromNetworkServer
ToString
[C#] public bool GetFromNetworkServer {get;}
[C++] public: _property bool get_GetFromNetworkServer( );
[VB] Public ReadOnly Property GetFromNetworkServer As Boolean
[JScript] public function get GetFromNetworkServer( ): Boolean;

Description

Returns true if a connection is coming back from the Passport server (logon, update, or registration) and if the Passport data contained on the query string is valid.
HasSavedPassword
ToString
[C#] public bool HasSavedPassword {get;}
[C++] public: property bool get HasSavedPassword( );
[VB] Public ReadOnly Property HasSavedPassword As Boolean
[JScript] public function get HasSavedPassword( ): Boolean;

Description

Returns true if the Passport member's ticket indicates that the password was saved on the Passport logon page the last time the ticket was refreshed.

For more information, see the Passport SDK documentation.
HasTicket
ToString
[C#] public bool HasTicket {get;}
[C++] public: _property bool get_HasTicket( );
[VB] Public ReadOnly Property HasTicket As Boolean
[JScript] public function get HasTicketo: Boolean;

Description

Returns true if there is a Passport ticket as a cookie on the query string.

For more information, see the Passport SDK documentation.
IsAuthenticated
ToString
[C#] public bool IsAuthenticated {get;}
[C++] public: _property bool get_IsAuthenticated( );
[VB] Public ReadOnly Property IsAuthenticated As Boolean
[JScript] public function get IsAuthenticated( ): Boolean;

Description

Returns true if the user is authenticated by a Passport authority.

For more information, see the Passport SDK documentation.
Item
ToString
[C#] public string this[string strProfileName] {get;}
[C++] public: _property String* get_Item(String* strProfileName);
[VB] Public Default ReadOnly Property Item(ByVal strProfileName As String) As String
[JScript] returnValue=PassportIdentityObject.Item(strProfileName);

Description

Acceses Passport profile attributes. Calling this property is the equivalent of calling GetProfileObject or SetProfileObject.

For more information, see the Passport SDK documentation. The Passport profile attribute to query.
Name
ToString
[C#] public string Name {get;}
[C++] public: _property String* get_Name( );
[VB] Public ReadOnly Property Name As String
[JScript] public function get Name( ): String;

Description

Consists of the name of the identity. In this case, it is the value of the Passport PUID.

For more information, see the Passport SDK documentation.
TicketAge
ToString
[C#] public int TicketAge {get;}
[C++] public: _property int get_TicketAge( );
[VB] Public ReadOnly Property TicketAge As Integer
[JScript] public function get TicketAge( ): int;

Description

Consists of the time, in seconds, since the last ticket was issued or refreshed.

For more information, see the Passport SDK documentation.
TimeSinceSignIn
ToString
[C#] public int TimeSinceSignIn {get;}
[C++] public: _property int get_TimeSinceSignIn( );
[VB] Public ReadOnly Property TimeSinceSignIn As Integer
[JScript] public function get TimeSinceSignIn( ): int;

Description

Consists of the time, in seconds, since a member's log on to the Passport logon server.

For more information, see the Passport SDK documentation.
AuthUrl
[C#] public string AuthUrl( );
[C++] public: String* AuthUrl( );
[VB] Public Function AuthUrl( ) As String
[JScript] public function AuthUrl( ): String; There are two overloads for this method.

Description

Returns a string containing the login server URL for a member, along with the optional information sent to the login server in the query string.

AuthUrl

[C#] public string AuthUrl(string strReturnUrl, int iTimeWindow, bool fForceLogin, string strCoBrandedArgs, int iLangID, string strNameSpace, int iKPP, bool bUseSecureAuth);

[C++] public: String* AuthUrl(String* strReturnUrl, int iTimeWindow, bool fForceLogin, String* strCoBrandedArgs, int iLangID, String* strNameSpace, int iKPP, bool bUseSecureAuth);

[VB] Public Function AuthUrl(ByVal strReturnUrl As String, ByVal iTimeWindow As Integer, ByVal fForceLogin As Boolean, ByVal strCoBrandedArgs As String, ByVal iLangID As Integer, ByVal strNameSpace As String, ByVal iKPP As Integer, ByVal bUseSecureAuth As Boolean) As String

[JScript] public function AuthUrl(strReturnUrl: String, iTimeWindow: int, fForceLogin: Boolean, strCoBrandedArgs: String, iLangID: int, strNameSpace: String, iKPP: int, bUseSecureAuth: Boolean): String;

Description

Similar to AuthUrl( ). Returns the authentication server URL for a member.

For more information about the parameters for this method, see the Passport SDK documentation. Sets the URL of the location that the Login server should redirect to after sign-in is complete. Specifies the interval during which members must have last signed in. Determines how the iTimeWindow will be used. Specifies variables to be appended to the URL of the Co-branding Template script page that was specified at initial participant registration. Specifies the language in which the required domain authority page should be displayed. Specifies the domain in which the Passport should be created. Specifies data collection policies for purposes of COPPA compliance. Declares whether the actual sign-in UI should be served HTTPS from the Passport domain authority.

AuthUrl

[C#] public string AuthUrl(string strReturnUrl, int iTimeWindow, int iForceLogin, string strCoBrandedArgs, int iLangID, string strNameSpace, int iKPP, int iUseSecureAuth);

[C++] public: String* AuthUrl(String* strReturnUrl, int iTimeWindow, int iForceLogin, String* strCoBrandedArgs, int iLangID, String* strNameSpace, int iKPP, int iUseSecureAuth);

[VB] Public Function AuthUrl(ByVal strReturnUrl As String, ByVal iTimeWindow As Integer, ByVal iForceLogin As Integer, ByVal strCoBrandedArgs As String, ByVal iLangID As Integer, ByVal strNameSpace As String, ByVal iKPP As Integer, ByVal iUseSecureAuth As Integer) As String

[JScript] public function AuthUrl(strReturnUrl: String, iTimeWindow: int, iForceLogin: int, strCoBrandedArgs: String, iLangID: int, strNameSpace String, iKPP: int, iUseSecureAuth: int): String;

Description

AuthUrl2

[C#] public string AuthUrl2( );

[C++] public: String* AuthUrl2( );

[VB] Public Function AuthUrl2( ) As String

[JScript] public function AuthUrl2( ): String; Retrieves a String containing the logon server URL for a member, as well as the optional information sent to the logon server in the query string.

Description

Retrieves a String containing the logon server URL for a member, as well as the optional information sent to the logon server in the query string.

Return Value: The logon server URL for a member, as well as the optional information sent to the logon server in the query string.

This URL can be used to generate a link for a member who has not signed in previously or who has an expired ticket. For more details, see IPassportManager2::Authaurl2 in the Passport SDK documentation.

AuthUrl2

[C#] public string AuthUrl2(string strReturnUrl, int iTimeWindow, bool fForceLogin, string strCoBrandedArgs, int iLangID, string strNameSpace, int iKPP, bool bUseSecureAuth);

[C++] public: String* AuthUrl2(String* strReturnUrl, int iTimeWindow, bool fForceLogin, String* strCoBrandedArgs, int iLangID, String* strNameSpace, int iKPP, bool bUseSecureAuth);

[VB] Public Function AuthUrl2(ByVal strReturnUrl As String, ByVal iTimeWindow As Integer, ByVal fForceLogin As Boolean, ByVal strCoBrandedArgs As String, ByVal iLangID As Integer, ByVal strNameSpace As String, ByVal iKPP As Integer, ByVal bUseSecureAuth As Boolean) As String

[JScript] public function AuthUrl2(strReturnUrl: String, iTimeWindow: int, fForceLogin: Boolean, strCoBrandedArgs: String, iLangID: int, strNameSpace String, iKPP: int, bUseSecureAuth: Boolean): String;

Description

Retrieves a String containing the logon server URL for a member, as well as the optional information sent to the logon server in the query string.

Return Value: The logon server URL for a member, as well as the optional information sent to the logon server in the query string.

This URL can be used to generate a link for a member who has not signed in previously or who has an expired ticket. For more details, see IPassportManager2::AuthUrl2 in the Passport SDK documentation. See Passport documentation for IPassportManager2::AuthUrl2. See Passport documentation for IPassportManager2::AuthUrl2. See Passport documentation for IPassportManager2::AuthUrl2. See Passport documentation for IPassportManager2::AuthUrl2. See Passport documentation for IPassportManager2::AuthUrl2. See Passport documentation for IPassportManager2::AuthUrl2. See Passport documentation for IPassportManager2::AuthUrl2. See Passport documentation for IPassportManager2::AuthUrl2.

AuthUrl2

[C#] public string AuthUrl2(string strReturnUrl, int iTimeWindow, int iForceLogin, string strCoBrandedArgs, int iLangID, string strNameSpace, int iKPP, int iuseSecureAuth);

[C++] public: String* AuthUrl2(String* strReturnUrl, int iTimeWindow, int iForceLogin, String* strCoBrandedArgs, int iLangID, String* strNameSpace, int iKPP, int iuseSecureAuth);

[VB] Public Function AuthUrl2(ByVal strReturnUrl As String, ByVal iTimeWindow As Integer, ByVal iForceLogin As Integer, ByVal strCoBrandedArgs As String, ByVal iLangID As Integer, ByVal strNameSpace As String, ByVal iKPP As Integer, ByVal iUseSecureAuth As Integer) As String

[JScript] public function AuthUrl2(strReturnUrl: String, iTimeWindow: int, iForceLogin: int, strCoBrandedArgs: String, iLangID: int, strNameSpace String, iKPP: int, iUseSecureAuth: int): String;

Description

Retrieves a String containing the logon server URL for a member, as well as the optional information sent to the logon server in the query string.

Return Value: The logon server URL for a member, as well as the optional information sent to the logon server in the query string.

You can use this URL to generate a link for a member who has not previously signed in or who has an expired ticket. For more details, see IPassportManager2::AuthUrl2 in the Passport SDK documentation. See Passport documentation for IPassportManager2::AuthUrl2. See Passport documentation for IPassportManager2::AuthUrl2. See Passport documentation for IPassportManager2::AuthUrl2. See Passport documentation for IPassportManager2::AuthUrl2. See Passport documentation for IPassportManager2::AuthUrl2. See Passport documentation for IPassportManager2::AuthUrl2. See Passport documentation for IPassportManager2::AuthUrl2.

Compress

[C#] public static string Compress(string strData);

[C++] public: static String* Compress(String* strData);

[VB] Public Shared Function Compress(ByVal strData As String) As String

[JScript] public static function Compress(strData: String): String;

Description

Compresses data.

Return Value: Compressed data.

For more information about IPassportCrypt::Compress, see the Passport SDK documentation. Data to be compressed.

CryptIsValid

[C#] public static bool CryptIsValid( );

[C++] public: static bool CryptIsValid( );

[VB] Public Shared Function CryptIsValid( ) As Boolean

[JScript] public static function CryptIsValid( ): Boolean;

Description

Returns true if the key used for encryption and decryption is valid and if the Passport Manager object is in a valid state for encryption.

See the Passport SDK documentation for IPassportCrypt::get_IsValid.

CryptPutHost

[C#] public static int CryptPutHost(string strHost);

[C++] public: static int CryptPutHost(String* strHost);

[VB] Public Shared Function CryptPutHost(ByVal strHost As String) As Integer

[JScript] public static function CryptPutHost(strHost: String): int;

Description

Sets the key being used by the current Passport Crypt object by referring to the host name or IP address used by the desired installation.

See the Passport SDK documentation for IPassportCrypt::put_Host. Host name or IP address.

CryptPutSite

[C#] public static int CryptPutSite(string strSite);

[C++] public: static int CryptPutSite(String* strSite);

[VB] Public Shared Function CryptPutSite(ByVal strSite As String) As Integer

[JScript] public static function CryptPutSite(strSite: String): int;

Description

Sets the key being used by the current Passport Crypt object by referring to the site-name label assigned to that key when the key was first installed.

See the Passport SDK documentation for IPassportCrypt::put_Site.

Decompress

[C#] public static string Decompress(string strData);

[C++] public: static String* Decompress(String* strData);

[VB] Public Shared Function Decompress(ByVal strData As String) As String

[JScript] public static function Decompress(strData: String): String;

Description

Decompresses data that has been compressed by the Compress method.

Return Value: Decompressed data.

See the Passport SDK documentation for IPassportCrypt::Compress. Data to be decompressed.

Decrypt

[C#] public static string Decrypt(string strData);

[C++] public: static String* Decrypt(String* strData);

[VB] Public Shared Function Decrypt(ByVal strData As String) As String

[JScript] public static function Decrypt(strData: String): String;

Description

Decrypts data using the Passport participant key for the current site.

Return Value: Decrypted data.

See the Passport SDK documentation for IPassportCrypt::Decrypt. The data to be decrypted.

Encrypt

[C#] public static string Encrypt(string strData);

[C++] public: static String* Encrypt(String* strData);

[VB] Public Shared Function Encrypt(ByVal strData As String) As String

[JScript] public static function Encrypt(strData:String): String;

Description

Encrypts data using the Passport participant key for the current site. Maximum input size is 2045 characters.

Return Value: Encrypted data.

See the Passport SDK documentation for IPassportCrypt::Encrypt. The data to be encrypted.

Finalize

[C#] ~PassportIdentity( );

[C++] ~PassportIdentity( );

[VB] Overrides Protected Sub Finalize( )

[JScript] protected override function Finalize( );

Description

Calls Finalize method.

GetDomainAttribute

[C#] public string GetDomainAttribute(string strAttribute, int iLCID, string strDomain);

[C++] public: String* GetDomainAttribute(String* strAttribute, int iLCID, String* strDomain);

[VB] Public Function GetDomainAttribute(ByVal strAttribute As String, ByVal iLCID As Integer, ByVal strDomain As String) As String

[JScript] public function GetDomainAttribute(strAttribute: String, iLCID: int, strDomain: String): String;

Description

Provides information for a Passport domain by querying the Passport CCD for the requested DomainAttribute.

For more information, see the Passport SDK documentation. The name of the attribute value to retrieve. Specifies the language in which various Passport network pages should be displayed to the member. The domain authority name to query for an attribute.

GetDomainFromMemberName

[C#] public string GetDomainFromMemberName(string strMemberName);

[C++] public: String* GetDomainFromMemberName (String* strMemberName);

[VB] Public Function GetDomainFromMemberName(ByVal strMemberName As String) As String

[JScript] public function GetDomainFromMemberName (strMemberName: String): String;

Description

Returns the Passport domain from the member-name string. Name of the Passport member GetIsAuthenticated

[C#] public bool GetIsAuthenticated(int iTimeWindow, bool bForceLogin, bool bCheckSecure);

[C++] public: bool GetIsAuthenticated(int iTimeWindow, bool bForceLogin, bool bCheckSecure);

[VB] Public Function GetIsAuthenticated(ByVal iTimeWindow As Integer, ByVal bForceLogin As Boolean, ByVal bCheckSecure As Boolean) As Boolean

[JScript] public function GetIsAuthenticated(iTimeWindow: int, bForceLogin: Boolean, bCheckSecure: Boolean): Boolean; Returns true if the user is authenticated by a Passport authority.

Description

Returns true if the user is authenticated by a Passport authority.

Return Value: true if the user is authenticated by a Passport authority.

See passport documentation for IPassportManager::IsAuthenticated. Specifies the interval during which members must have last signed in to the calling domain. Determines how iTimeWindow is used. Enables checking for a secure logon.

GetIsAuthenticated

[C#] public bool GetIsAuthenticated(int iTimeWindow, int iForceLogin, int iCheckSecure);

[C++] public: bool GetIsAuthenticated(int iTimeWindow, int iForceLogin, int iCheckSecure);

[VB] Public Function GetIsAuthenticated(ByVal iTimeWindow As Integer, ByVal iForceLogin As Integer, ByVal iCheckSecure As Integer) As Boolean

[JScript] public function GetIsAuthenticated(iTimeWindow: int, iForceLogin: int, iCheckSecure: int): Boolean;

Description

Returns true if the user is authenticated by a Passport authority.

Return Value: true if the user is authenticated by a Passport authority.

See Passport documentation for IPassportManager::IsAuthenticated. Specifies the interval during which members must have last signed in to the calling domain. Determines how iTimeWindow is used. Enables checking for a secure logon.

GetProfileObject

[C#] public object GetProfileObject(string strProfileName);

[C++] public: Object* GetProfileObject(String* strProfileName);

[VB] Public Function GetProfileObject(ByVal strProfileName As String) As Object

[JScript] public function GetProfileObject(strProfileName: String): Object;

Description

Returns Passport profile information for the supplied profile attribute. The Passport profile attribute to query.

HasFlag

[C#] public bool HasFlag(int iFlagMask);

[C++] public: bool HasFlag(int iFlagMask);

[VB] Public Function HasFlag(ByVal iFlagMask As Integer) As Boolean

[JScript] public function HasFlag(iFlagMask: int): Boolean;

Description

Returns true if a given flag is set in this user's profile.

For more information, see the Passport SDK documentation. The Passport profile flag to query.

HasProfile

[C#] public bool HasProfile(string strProfile);

[C++] public: bool HasProfile(String* strProfile);

[VB] Public Function HasProfile(ByVal strProfile As String) As Boolean

[JScript] public function HasProfile(strProfile: String): Boolean;

Description

Returns true if a given profile attribute exists in this user's profile.

For more information, see the Passport SDK documentation. The Passport profile attribute to query.

HaveConsent

[C#] public bool HaveConsent(bool bNeedFullConsent, bool bNeedBirthdate);

[C++] public: bool HaveConsent(bool bNeedFullConsent, bool bNeedBirthdate);

[VB] Public Function HaveConsent(ByVal bNeedFullConsent As Boolean, ByVal bNeedBirthdate As Boolean) As Boolean

[JScript] public function HaveConsent(bNeedFullConsent: Boolean, bNeedBirthdate: Boolean): Boolean;

Description

Returns true if Full Consent is granted in this user's profile.

For more information, see the Passport SDK documentation. true if Full Consent is required for Passport Authentication.

LoginUser

[C#] public int LoginUser( );

[C++] public: int LoginUser( );

[VB] Public Function LoginUser( ) As Integer

[JScript] public function LoginUser( ): int;

Description

Logs the user on, either by generating a 302-redirect URL or initiating a Passport-aware client authentication exchange.

This method supports Passport-aware client applications. Note that there are some policy restrictions on the use of this method in certain scenarios. Note also that this method should not be called from a frameset, as suggested in the Passport documentation. Finally, this method requires that Msppfltr.dll be properly installed and running as an ISAPI filter at the global level of the participant Web site.

LoginUser

[C#] public int LoginUser(string szRetURL, int iTimeWindow, bool fForceLogin, string szCOBrandArgs, int iLangID, string strNameSpace, int iKPP, bool fUseSecureAuth, object oExtraParams);

[C++] public: int LoginUser(String* szRetURL, int iTimeWindow, bool fForceLogin, String* szCOBrandArgs, int iLangID, String* strNameSpace, int iKPP, bool fUseSecureAuth, Object* oExtraParams);

[VB] Public Function LoginUser(ByVal szRetURL As String, ByVal iTimeWindow As Integer, ByVal fForceLogin As Boolean, ByVal szCOBrandArgs As String, ByVal iLangID As Integer, ByVal strNameSpace As String, ByVal iKPP As Integer, ByVal fUseSecureAuth As Boolean, ByVal oExtraParams As Object) As Integer

[JScript] public function LoginUser(szRetURL: String, iTimeWindow: int, fForceLogin: Boolean, szCOBrandArgs: String, iLangID: int, strNameSpace: String, iKPP: int, fUseSecureAuth: Boolean, oExtraParams: Object): int; Logs the user on, either by generating a 302-redirect URL or initiating a Passport-aware client authentication exchange.

Description

Logs the user on, either by generating a 302-redirect URL or initiating a Passport-aware client authentication exchange.

This method supports Passport-aware client applications. Note that there are some policy restrictions on the use of this method in certain scenarios. Note also that this method should not be called from a frameset, as suggested in the Passport documentation. Finally, this method requires that Msppfltr.dll be properly installed and running as an ISAPI filter at the global level of the participant Web site. See Passport documentation for IPassportManager2::LoginUser. See Passport documentation for IPassportManager2::LoginUser. See Passport documentation for IPassportManager2::LoginUser. See Passport documentation for IPassportManager2::LoginUser. See Passport documentation for IPassportManager2::LoginUser. See Passport documentation for IPassportManager2::LoginUser. See Passport documentation for IPassportManager2::LoginUser.

LoginUser

[C#] public int LoginUser(string szRetURL, int iTimeWindow, int fForceLogin, string szCOBrandArgs, int iLangID, string strNameSpace, int iKPP, int iUseSecureAuth, object oExtraParams);

[C++] public: int LoginUser(String* szRetURL, int iTimeWindow, int fForceLogin, String* szCOBrandArgs, int iLangID, String* strNameSpace, int iKPP, int iUseSecureAuth, Object* oExtraParams);

[VB] Public Function LoginUser(ByVal szRetURL As String, ByVal iTimeWindow As Integer, ByVal fForceLogin As Integer, ByVal szCOBrandArgs As String, ByVal iLangID As Integer, ByVal strNameSpace As String, ByVal iKPP As Integer, ByVal iUseSecureAuth As Integer, ByVal oExtraParams As Object) As Integer

[JScript] public function LoginUser(szRetURL: String, iTimeWindow: int, fForceLogin: int, szCOBrandArgs: String, iLangID: int, strNameSpace: String, iKPP: int, iUseSecureAuth: int, oExtraParams: Object): int;

Description

Logs the user on, either by generating a 302-redirect URL or initiating a Passport-aware client authentication exchange.

This method supports Passport-aware client applications. Note that there are some policy restrictions on the use of this method in certain scenarios. Note also that this method should not be called from a frameset, as suggested in the Passport documentation. Finally, this method requires that Msppfltr.dll be properly installed and running as an ISAPI filter at the global level of the participant Web site. See Passport documentation for IPassportManager2::LoginUser. See Passport documentation for IPassportManager2::LoginUser. See Passport documentation for IPassportManager2::LoginUser. See Passport documentation for IPassportManager2::LoginUser. See Passport documentation for IPassportManager2::LoginUser. See Passport documentation for IPassportManager2::LoginUser. See Passport documentation for IPassportManager2::LoginUser.

LogoTag

[C#] public string LogoTag( );

[C++] public: String* LogoTag( );

[VB] Public Function LogoTag( ) As String

[JScript] public function LogoTag( ): String;

Description

Returns an HTML snippet containing an image tag for a Passport link. This is based on the current state of the identity (already signed in, and such).

LogoTag

[C#] public string LogoTag(string strReturnUrl, int iTimeWindow, bool fForceLogin, string strCoBrandedArgs, int iLangID, bool fSecure, string strNameSpace, int iKPP, bool bUseSecureAuth);

[C++] public: String* LogoTag(String* strReturnUrl, int iTimeWindow, bool fForceLogin, String* strCoBrandedArgs, int iLangID, bool fSecure, String* strNameSpace, int iKPP, bool bUseSecureAuth);

[VB] Public Function LogoTag(ByVal strReturnUrl As String, ByVal iTimeWindow As Integer, ByVal fForceLogin As Boolean, ByVal strCoBrandedArgs As String, ByVal iLangID As Integer, ByVal fSecure As Boolean, ByVal strNameSpace As String, ByVal iKPP As Integer, ByVal bUseSecureAuth As Boolean) As String

[JScript] public function LogoTag(strReturnUrl: String, iTimeWindow: int, fForceLogin: Boolean, strCoBrandedArgs: String, iLangID: int, fSecure: Boolean, strNameSpace: String, iKPP: int, bUseSecureAuth: Boolean): String;

Description

Similar to LogoTag( ), this method returns an HTML snippet for the Passport Logo for the current member For additional details on the parameters for this method, see the Passport SDK documentation. Sets the URL of the location that the Login server should redirect members to after sign-in is complete. Specifies the interval during which members must have last signed in. Determines how iTimeWindow gets used. Specifies variables to be appended as query string variables to the URL of the participant's Co-branding Template script page. Specifies the language to be used for the Login page that is displayed to the member. Declares whether this method is being called from an HTTPS (SSL) page. Specifies the domain in which the Passport should be created. Specifies data collection policies for purposes of COPPA compliance. Declares whether the actual sign-in UT should be served HTTPS from the Passport domain authority.

LogoTag

[C#] public string LogoTag(string strReturnUrl, int iTimeWindow, int iForceLogin, string strCoBrandedArgs, int iLangID, int iSecure, string strNameSpace, int iKPP, int iUseSecureAuth);

[C++] public: String* LogoTag(String* strReturnUrl, int iTimeWindow, int iForceLogin, String* strCoBrandedArgs, int iLangID, int iSecure, String* strNameSpace, int iKPP, int iUseSecureAuth);

[VB] Public Function LogoTag(ByVal strReturnUrl As String, ByVal iTimeWindow As Integer, ByVal iForceLogin As Integer, ByVal strCoBrandedArgs As String, ByVal iLangID As Integer, ByVal iSecure As Integer, ByVal strNameSpace As String, ByVal iKPP As Integer, ByVal iUseSecureAuth As Integer) As String

[JScript] public function LogoTag(strReturnUrl: String, iTimeWindow: int, iForceLogin: int, strCoBrandedArgs: String, iLangID: int, iSecure: int, strNameSpace: String, iKPP: int, iUseSecureAuth: int): String;

Description

LogoTag2

[C#] public string LogoTag2( );

[C++] public: String* LogoTag2( );

[VB] Public Function LogoTag2( ) As String

[JScript] public function LogoTag2( ): String; Returns an HTML fragment containing an <img> tag for a Passport link. This is based on the current state of the identity (already logged on, and so on).

Description

Returns an HTML fragment containing an <img> tag for a Passport link. This is based on the current state of the identity (already logged on, and so on).

The link image displays either Sign In if no valid ticket cookie is detected, or Sign Out if a valid cookie ticket is detected. For more details, see IPassportManager2::LogoTag2 in the Passport SDK documentation.

LogoTag2

[C#] public string LogoTag2(string strReturnUrl, int iTimeWindow, bool fForceLogin, string strCoBrandedArgs, int iLangID, bool fSecure, string strNameSpace, int iKPP, bool bUseSecureAuth);

[C++] public: String* LogoTag2(String* strReturnUrl, int iTimeWindow, bool fForceLogin, String* strCoBrandedArgs, int iLangID, bool fSecure, String* strNameSpace, int iKPP, bool bUseSecureAuth);

[VB] Public Function LogoTag2(ByVal strReturnUrl As String, ByVal iTimeWindow As Integer, ByVal fForceLogin As Boolean, ByVal strCoBrandedArgs As String, ByVal iLangID As Integer, ByVal fSecure As Boolean, ByVal strNameSpace As String, ByVal iKPP As Integer, ByVal bUseSecureAuth As Boolean) As String

[JScript] public function LogoTag2(strReturnUrl: String, iTimeWindow: int, fForceLogin: Boolean, strCoBrandedArgs: String, iLangID: int, fSecure: Boolean, strNameSpace: String, iKPP: int, bUseSecureAuth: Boolean): String;

Description

Returns an HTML fragment containing an <img> tag for a Passport link. This is based on the current state of the identity (already logged on, and so on).

The link image displays either Sign In if no valid ticket cookie is detected, or Sign Out if a valid cookie ticket is detected. For more details, see IPassportManager2::LogoTag2 in the Passport SDK documentation. See Passport documentation for IPassportManager2::LoginUser. See Passport documentation for IPassportManager2::LoginUser. See Passport documentation for IPassportManager2::LoginUser. See Passport documentation for IPassportManager2::LoginUser. See Passport documentation for IPassportManager2::LoginUser. See Passport documentation for IPassportManager2::LoginUser. See Passport documentation for IPassportManager2::LoginUser.

LogoTag2

[C#] public string LogoTag2(string strReturnUrl, int iTimeWindow, int iForceLogin, string strCoBrandedArgs, int iLangID, int iSecure, string strNameSpace, int iKPP, int iUseSecureAuth);

[C++] public: String* LogoTag2(String* strReturnUrl, int iTimeWindow, int iForceLogin, String* strCoBrandedArgs, int iLangID, int iSecure, String* strNameSpace, int iKPP, int iUseSecureAuth);

[VB] Public Function LogoTag2(ByVal strReturnUrl As String, ByVal iTimeWindow As Integer, ByVal iForceLogin As Integer, ByVal strCoBrandedArgs As String, ByVal iLangID As Integer, ByVal iSecure As Integer, ByVal strNameSpace As String, ByVal iKPP As Integer, ByVal iUseSecureAuth As Integer) As String

[JScript] public function LogoTag2(strReturnUrl: String, iTimeWindow: int, iForceLogin: int, strCoBrandedArgs: String, iLangID: int, iSecure: int, strNameSpace: String, iKPP: int, iUseSecureAuth: int): String;

Description

Returns an HTML fragment containing an <img> tag for a Passport link. This is based on the current state of the identity (already logged on, and so on).

The link image displays either Sign In if no valid ticket cookie is detected, or Sign Out if a valid cookie ticket is detected. For more details, see IPassportManager2::LogoTag2 in the Passport SDK documentation. See Passport documentation for IPassportManager2::LoginUser. See Passport documentation for IPassportManager2::LoginUser. See Passport documentation for IPassportManager2::LoginUser. See Passport documentation for IPassportManager2::LoginUser. See Passport documentation for IPassportManager2::LoginUser. See Passport documentation for IPassportManager2::LoginUser. See Passport documentation for IPassportManager2::LoginUser.

SignOut

[C#] public static void SignOut(string strSignOutDotGifFileName);

[C++] public: static void SignOut(String* strSignOutDotGifFileName);

[VB] Public Shared Sub SignOut(ByVal strSignOutDotGifFileName As String)

[JScript] public static function SignOut(strSignOutDotGifFileName: String);

Description

Logs off the given Passport member from the current session.

For more information, see the Passport SDK documentation. The SignOut image to be used.

UrlAuthorizationModule class (System.Web.Security)

ToString

Description

Provides URL-based authorization services for allowing or denying access to specified resources. This class cannot be inherited.

UrlAuthorizationModule

Example Syntax:

ToString

[C#] public UrlAuthorizationModule( );

[C++] public: UrlAuthorizationModule( );

[VB] Public Sub New( )

[JScript] public function UrlAuthorizationModule( );

Dispose

[C#] public void Dispose( );
[C++] public: _sealed void Dispose( );
[VB] NotOverridable Public Sub Dispose( )
[JScript] public function Dispose( );

Description

Called by the HTTP runtime to dispose of the module.

Call System.Web.Security.UrlAuthorizationModule.Dispose when you are finished using the System.Web.Security.UrlAuthorizationModule. The System.Web.Security.UrlAuthorizationModule.Dispose method leaves the System.Web.Security.UrlAuthorizationModule in an unusable state. After calling System.Web.Security.UrlAuthorizationModule.Dispose, you must release all references to the System.Web.Security.UrlAuthorizationModule so the memory it occupid can be reclaimed by garbage collection.

Init

[C#] public void Init(HttpApplication app);
[C++] public: _sealed void Init(HttpApplication* app);
[VB] NotOverridable Public Sub Init(ByVal app As HttpApplication)
[JScript] public function Init(app: HttpApplication);

Description

Initializes the module. The Http application.

WindowsAuthenticationEventArgs class (System.Web.Security)

ToString

Description

Provides data for the WindowsAuthentication event.

This is the event argument passed to the WindowsAuthentication_OnAuthenticate event handler. Contains a WindowsIdentity object and the IPrincipal object used for the context.

WindowsAuthenticationEventArgs

Example Syntax:

ToString

[C#] public WindowsAuthenticationEventArgs(WindowsIdentity identity, HttpContext context);
[C++] public: WindowsAuthenticationEventArgs(WindowsIdentity* identity, HttpContext* context);
[VB] Public Sub New(ByVal identity As WindowsIdentity, ByVal context As HttpContext)
[JScript] public function WindowsAuthenticationEventArgs (identity: WindowsIdentity, context: HttpContext);

Description

Initializes a newly created instance of the WindowsAuthenticationEventArgs Class. The windows identity object. The context for the event.

Context

ToString

[C#] public HttpContext Context {get;}
[C++] public: _property HttpContext* get_Context( );
[VB] Public ReadOnly Property Context As HttpContext
[JScript] public function get Context( ): HttpContext;

Description

The HttpContext intrinsic (provides access to Request, Response, and User objects).

Identity

ToString

[C#] public WindowsIdentity Identity {get;}
[C++] public: _property WindowsIdentity* get_Identity( );
[VB] Public ReadOnly Property Identity As WindowsIdentity
[JScript] public function get Identity( ): WindowsIdentity;

Description

An authenticated Windows identity.

User

ToString

[C#] public IPrincipal User {get; set;}
[C++] public: _property IPrincipal* get_User( );public: _property void set_User(IPrincipal*);
[VB] Public Property User As IPrincipal
[JScript] public function get User( ): IPrincipal;public function set User(IPrincipal);

Description

IPrincipal object to be associated with the request. The user object should be attached to the contextIf User is non null and Context.User is null, the WindowsAuthenticationModule will initialize Context.User with WindowsAuthenticationEventArgs.User.

WindowsAuthenticationEventHandler delegate (System.Web.Security)

ToString

Description

Represents the method that handles the WindowsAuthentication_OnAuthenticate event of a WindowsAuthenticationModule. The source of the event. A WindowsAuthenticationEventArg that contains the event data.

When you create a System.Web.Security.WindowsAuthenticationEventHandler delegate, you identify the method to handle the event. To associate the event with your EventHandler, add an instance of the delegate to the event. The EventHandler is called whenever the event occurs, unless you remove the delegate. For more information about EventHandler delegates, see.

WindowsAuthenticationModule class (System.Web.Security)

ToString

Description

Enables ASP.NET applications to use Windows/IIS authentication. This class cannot be inherited.

WindowsAuthenticationModule

Example Syntax:

ToString

[C#] public WindowsAuthenticationModule( );
[C++] public: WindowsAuthenticationModule( );
[VB] Public Sub New( )
[JScript] public function WindowsAuthenticationModule( );

ToString

[C#] public event WindowsAuthenticationEventHandler Authenticate;
[C++] public: _event WindowsAuthenticationEventHandler* Authenticate;
[VB] Public Event Authenticate As WindowsAuthenticationEventHandler Description Raised during authentication. This is a Global.asax event that must be named PassportAuthentication_OnAuthenticate event. It is used primarily to attach a custom IPrincipal object to the context.

For more information about handling events, see.

Dispose

[C#] public void Dispose( );
[C++] public: _sealed void Dispose( );
[VB] NotOverridable Public Sub Dispose( )
[JScript] public function Dispose( );

Description

Disposes of the module derived from IHttpModule when called by the HttpRuntime.

Call System.Web.Security.WindowsAuthenticationModule.Dispose when you are finished using the System.Web.Security.WindowsAuthenticationModule. The System.Web.Security.WindowsAuthenticationModule.Dispose method leaves the System.Web.Security.WindowsAuthenticationModule in an unusable state. After calling System.Web.Security.WindowsAuthenticationModule.Dispose, you must release all references to the System.Web.Security.WindowsAuthenticationModule so the memory it occupied can be reclaimed by garbage collection.

Init

[C#] public void Init(HttpApplication app);

[C++] public: _sealed void Init(HttpApplication* app);

[VB] NotOverridable Public Sub Init(ByVal app As HttpApplication)

[JScript] public function Init(app: HttpApplication);

Description

Initializes the module derived from IHttpModule when cal

System.Web.Services

Description

The System.Web.Services namespace consists of the classes that enable you to build and use Web Services. A Web Service is a programmable entity residing on a Web Server exposed via standard Internet protocols.

WebMethodAttribute class (System.Web.Services)

Description

Adding this attribute to a method within an ASP.NET Web Service makes the method callable from remote Web clients. This class cannot be inherited.

Methods within a class that have this attribute set are called Web Service methods. The method and class must be public and running inside an ASP.NET Web application.

Constructors:

WebMethodAttribute

Example Syntax:

[C#] public WebMethodAttribute( );

[C++] public: WebMethodAttribute( );

[VB] Public Sub New( )

[JScript] public function WebMethodAttribute( ); Initializes a new instance of the System.Web.Services.WebMethodAttribute class.

Description

Initializes a new instance of the System.Web.Services.WebMethodAttribute class.

WebMethodAttribute

Example Syntax:

[C#] public WebMethodAttribute(bool enableSession);

[C++] public: WebMethodAttribute(bool enableSession);

[VB] Public Sub New(ByVal enableSession As Boolean)

[JScript] public function WebMethodAttribute(enableSession: Boolean);

Description

Initializes a new instance of the System.Web.Services.WebMethodAttribute class. Initializes whether session state is enabled for the Web Service method.

WebMethodAttribute

Example Syntax:

[C#] public WebMethodAttribute(bool enableSession, TransactionOption transactionOption);

[C++] public: WebMethodAttribute(bool enableSession, TransactionOption transactionOption);

[VB] Public Sub New(ByVal enableSession As Boolean, ByVal transactionOption As TransactionOption)

[JScript] public function WebMethodAttribute(enableSession: Boolean, transactionOption: TransactionOption);

Description

Initializes a new instance of the System.Web.Services.WebMethodAttribute class. Initializes whether session state is enabled for the Web Service method. Initializes the transaction support of a Web Service method.

WebMethodAttribute

Example Syntax:

[C#] public WebMethodAttribute(bool enableSession, TransactionOption transactionOption, int cacheDuration);

[C++] public: WebMethodAttribute(bool enableSession, TransactionOption transactionOption, int cacheDuration);

[VB] Public Sub New(ByVal enableSession As Boolean, ByVal transactionOption As TransactionOption, ByVal cacheDuration As Integer)

[JScript] public function WebMethodAttribute(enableSession: Boolean, transactionOption: TransactionOption, cacheDuration: int);

Description

Initializes a new instance of the System.Web.Services.WebMethodAttribute class. Initializes whether session state is enabled for the Web Service method. Initializes the transaction support of a Web Service method. Initializes the number of seconds the response is cached.

WebMethodAttribute

Example Syntax:

[C#] public WebMethodAttribute(bool enableSession, TransactionOption transactionOption, int cacheDuration, bool bufferResponse);

[C++] public: WebMethodAttribute(bool enableSession, TransactionOption transactionOption, int cacheDuration, bool bufferResponse);

[VB] Public Sub New(ByVal enableSession As Boolean, ByVal transactionOption As TransactionOption, ByVal cacheDuration As Integer, ByVal bufferResponse As Boolean)

[JScript] public function WebMethodAttribute(enableSession: Boolean, transactionOption: TransactionOption, cacheDuration: int, bufferResponse Boolean);

Description

Initializes a new instance of the System.Web.Services.WebMethodAttribute class. Initializes whether session state is enabled for the Web Service method. Initializes the transaction support of a Web Service method. Initializes the number of seconds the response is cached. Initializes whether the response for this request is buffered.

Properties:

BufferResponse

[C#] public bool BufferResponse {get; set;}

[C++] public: _property bool get_BufferResponse( );public: _property void set_BufferResponse(bool);

[VB] Public Property BufferResponse As Boolean

[JScript] public function get BufferResponse( ): Boolean; public function set BufferResponse(Boolean);

Description

Gets or sets whether the response for this request is buffered.

Setting System.Web.Services.WebMethodAttribute.BufferResponse to true, serializes the response of the Web Service method into a memory buffer until either the response is completely serialized or the buffer is full. Once the response is buffered, it is returned to the Web Service client over the network. When System.Web.Services.WebMethodAttribute.BufferResponse is false, the response to the Web Service method is sent back to the client as it is serialized. In general, you only want to set System.Web.Services.WebMethodAttribute.BufferResponse to false, if it is known that a Web Service method returns large amounts of data to the client. For smaller amounts of data, Web Service performance is better with System.Web.Services.WebMethodAttribute.BufferResponse to true.

CacheDuration

[C#] public int CacheDuration {get; set;}

[C++] public: _property int get_CacheDuration( );public: _property void set_CacheDuration(int);

[VB] Public Property CacheDuration As Integer

[JScript] public function get CacheDuration( ): int;public function set CacheDuration(int);

Description

Gets or sets the number of seconds the response should be held in the cache.

When caching is enabled requests and responses are held in memory on the server for at least the cache duration so caution must be used if you expect requests or responses to be very large or you expect requests to vary widely.

Description

[C#] public string Description {get; set;}

[C++] public: _property String* get_Description( );public: _property void set_Description (String*);

[VB] Public Property Description As String

[JScript] public function get Description( ): String;public function set Description (String);

Description

A descriptive message describing the Web Service method.

The descriptive message is displayed to prospective consumers of the Web Service when description documents for the Web Service are generated, such as the Service Description and the Service help page.

EnableSession

[C#] public bool EnableSession {get; set;}

[C++] public: _property bool get_EnableSession( );
public: _property void set_EnableSession(bool);

[VB] Public Property EnableSession As Boolean

[JScript] public function get EnableSession( ): Boolean;public function set EnableSession(Boolean);

Description

Indicates whether session state is enabled for a Web Service method.

In order to store session state in the ASP.NET System.Web.SessionState.HttpSessionState object, the Web Service must inherit from System.Web.Services.WebService and a System.Web.Services.WebMethodAttribute applied to the Web Service method, setting the System.Web.Services.WebMethodAttribute.EnableSession property to true. If session state is not needed for a Web Service method, then disabling it may improve performance.

MessageName

[C#] public string MessageName {get; set;}

[C++] public: _property String* get_MessageName( );public: _property void set_MessageName(String*);

[VB] Public Property MessageName As String

[JScript] public function get MessageName( ): String;public function set MessageName(String);

Description

The name used for the Web Service method in the data passed to and returned from a Web Service method.

The System.Web.Services.WebMethodAttribute.MessageName property can be used to alias method or property names. The most common use of the System.Web.Services.WebMethodAttribute.MessageName property will be to uniquely identify polymorphic methods. By default, System.Web.Services.WebMethodAttribute.MessageName is set to the name of the Web Service method. Therefore, if a Web Service contains two or more Web Service methods with the same name, you can uniquely identify the individual Web Service methods by setting the System.Web.Services.WebMethodAttribute.MessageName to a name unique within the Web Service, without changing the name of the actual method name in code.

TransactionOption

[C#] public TransactionOption TransactionOption {get; set;}

[C++] public: _property TransactionOption get_TransactionOption( );public: _property void set_TransactionOption (TransactionOption);

[VB] Public Property TransactionOption As TransactionOption

[JScript] public function get TransactionOption( ): TransactionOption;public function set TransactionOption(TransactionOption);

Description

Indicates the transaction support of a Web Service method.

Web Service methods can only participate as the root object in a transaction, due to the stateless nature of the HTTP protocol. Web Service methods can invoke COM objects that participate in the same transaction as the Web Service method, if the COM object is marked to run within a transaction in the Component Services administrative tool. If a Web Service method, with a System.Web.Services.WebMethodAttribute.TransactionOption property of Required or RequiresNew invokes another Web Service method with a System.Web.Services.WebMethodAttribute.TransactionOption property of Required or RequiresNew, each Web Service method participates in their own transaction, because a Web Service method can only act as the root object in a transaction.

TypeId

Methods:

WebService class (System.Web.Services)

ToString

Description

Defines the optional base class for Web Services, which provides direct access to common ASP.NET objects, like those for application and session state.

If you don't need access to the common ASP.NET objects, you can still create a Web Service without deriving from System.Web.Services.WebService. Additional ASP.NET objects can be accessed through System.Web.Services.WebService.Context.

WebService

Example Syntax:

ToString

[C#] public WebService( );

[C++] public: WebService( );

[VB] Public Sub New( )

[JScript] public function WebService( );

Application

ToString

[C#] public HttpApplicationState Application {get;}

[C++] public: _property HttpApplicationState* get_Application( );

[VB] Public ReadOnly Property Application As HttpApplicationState

[JScript] public function get Application( ): HttpApplicationState;

Description

Gets the application object for the current HTTP request.

Web Services can utilize both application state and session state. Application state is maintained across all sessions accessing a Web Service regardless of whether session state is turned off for a method(by using the System.Web.Services.WebMethodAttribute.EnableSession property of the System.Web.Services.WebMethodAttribute).

Container

Context

ToString

Description

Gets the ASP.NET System.Web.HttpContext for the current request, which encapsulates all HTTP-specific context used by the HTTP server to process Web requests.

If a Web Service method is one-way, then the System.Web.Services.WebService.Context property is always null. A Web Service is one-way when a System.Web.Services.Protocols.SoapDocumentMethodAttribute or System.Web.Services.Protocols.SoapRpcMethodAttribute is applied to a Web Service method and the System.Web.Services.Protocols.SoapDocumentMethodAttribute.OneWay property is set to true.

DesignMode

Events

Server

ToString

Description

Gets the System.Web.HttpServerUtility for the current request.

The System.Web.HttpServerUtility class provides several methods that can be used in the processing of Web requests, including System.Web.HttpServerUtility.CreateObject(System.String) (for instantiating COM objects).

Session

ToString

[C#] public HttpSessionState Session {get;}

[C++] public: _property HttpSessionState* get_Session( );

[VB] Public ReadOnly Property Session As HttpSessionState

[JScript] public function get Session( ): HttpSessionState;

Description

Gets the System.Web.SessionState.HttpSessionState instance for the current request.

If a Web Service method is one-way, then the System.Web.Services.WebService.Session property is always null. A Web Service is one-way when a System.Web.Services.Protocols.SoapDocumentMethodAttribute or System.Web.Services.Protocols.SoapRpcMethodAttribute is applied to a Web Service method and the System.Web.Services.Protocols.SoapDocumentMethodAttribute.OneWay property is set to true Site User ToString Description Gets the ASP.NET server System.Web.HttpContext.User object. Can be used to authenticate whether a user is authorized to execute the request.

Both Internet Information Services (IIS) and the NET Framework need to be configured for authentication in order for the System.Web.Services.WebService.User property to be meaningful. Authentication is the process of accepting credentials from a user and validating those credentials against some authority. If the credentials are valid, you have an authenticated identity. Authentication in the .NET Framework is configured by placing entries in the web.config file. Placing the XML in the following code into a web.config file sets the authentication mode to Windows.

WebServiceAttribute class (System.Web.Services)

ToString

Description

Used to add additional information to a Web Service, such as a string describing its functionality.

The System.Web.Services.WebServiceAttribute is not required for a Web Service to be published and executed. You can use the WebServiceAttribute to specify a name for the Web Service that is not restricted by the rules for a Common Language Runtime identifier, which is used in the Service Description and the Service help page for the Web Service.

ToString

[C#] public const string DefaultNamespace;

[C++] public: const String* DefaultNamespace;

[VB] Public Const DefaultNamespace As String

[JScript] public var DefaultNamespace: String;

Description

The default value for the System.Web.Services.WebServiceAttribute.Namespace property. This field is constant.

WebServiceAttribute

Example Syntax:

ToString

[C#] public WebServiceAttribute( );

[C++] public: WebServiceAttribute( );

[VB] Public Sub New( )

[JScript] public function WebServiceAttribute( );

Description

Initializes a new instance of the System.Web.Services.WebServiceAttribute class.

Description

ToString

[C#] public string Description {get; set;}

[C++] public: _property String* get_Description( );public: _property void set_Description (String*);

[VB] Public Property Description As String

[JScript] public function get Description( ): String;public function set Description (String);

Description

A descriptive message for the Web Service.

The descriptive message is displayed to prospective consumers of the Web Service when description documents for the Web Service are generated, such as the Service Description and the Service help page.

Name

ToString

[C#] public string Name {get; set;}

[C++] public: _property String* get_Name( );public: _property void set_Name(String*);

[VB] Public Property Name As String

[JScript] public function get Name( ): String;public function set Name(String);

Description

Gets or sets the name of the ASP.NET Web Service.

The Service Description is generated when a user navigates to the URL for the Web Service and supplies a query string of ?WSDL. Within the Service Description, the System.Web.Services.WebServiceAttribute.Name property identifies the local part of the XML qualified name for the Web Service. The Name property is also used to display the name of the Web Service on the Service help page. The Service help page is displayed when a prospective consumer navigates to the .asmx page for the Web Service without specifying a Web Service method name and its parameters.

Namespace

ToString

[C#] public string Namespace {get; set;}

[C++] public: _property String* get_Namespace( );public: _property void set_Namespace(String*);

[VB] Public Property Namespace As String

[JScript] public function get Namespace( ): String;public function set Namespace(String);

Description

Gets or sets the default XML namespace to use for the Web Service.

XML namespaces offer a way to create names in an XML document that are identified by a Uniform Resource Identifier (URI). By using XML namespaces you can uniquely identify elements or attributes in a XML document. The Service Description for a Web Service is defined in XML, specifically in Web Service Description Language (WSDL).

TypeId

WebServiceBindingAttribute class (System.Web.Services)

ToString

Description

Declares the binding one or more Web Service methods implemented within the class implementing the Web Service. This class cannot be inherited.

A binding, as defined by Web Services Description Language(WSDL), is similar to an interface, in that it defines a concrete set of operations. Each Web Service method is an operation within a particular binding. Web Service methods are members of either the default binding for a Web Service or in a binding specified within a System.Web.Services.WebServiceBindingAttribute applied to a class implementing a Web Service. A Web Service can implement multiple bindings, by applying multiple System.Web.Services.WebServiceBindingAttribute attributes to a Web Service.

WebServiceBindingAttribute

Example Syntax:

ToString

[C#] public WebServiceBindingAttribute( );

[C++] public: WebServiceBindingAttribute( );

[VB] Public Sub New( )

[JScript] public function WebServiceBindingAttribute( ); Initializes a new instance of the System.Web.Services.WebServiceBindingAttribute class.

Description

Initializes a new instance of the System.Web.Services.WebServiceBindingAttribute class.

WebServiceBindingAttribute

Example Syntax:

ToString

[C#] public WebServiceBindingAttribute(string name);

[C++] public: WebServiceBindingAttribute(String* name);

[VB] Public Sub New(ByVal name As String)

[JScript] public function WebServiceBindingAttribute (name: String);

Description

Initializes a new instance of the System.Web.Services.WebServiceBindingAttribute class setting the name of the binding the Web Service method is implementing.

This constructor is used to specify a name for a binding defined in the Web Service it is applied to and is a member of the default namespace. The name of the binding a Web Service method is implementing an operation for. Sets the System.Web.Services.WebServiceBindingAttribute.Name property.

WebServiceBindingAttribute

Example Syntax:

ToString

[C#] public WebServiceBindingAttribute(string name, string ns);

[C++] public: WebServiceBindingAttribute(String* name, String* ns);

[VB] Public Sub New(ByVal name As String, ByVal ns As String)

[JScript] public function WebServiceBindingAttribute (name: String, ns: String);

Description

Initializes a new instance of the System.Web.Services.WebServiceBindingAttribute class.

This constructor is used to specify a name for a binding defined in the Web Service it is applied to that and is a member of the supplied namespace. The name of the binding a Web Service method is implementing an operation for. Sets the System.Web.Services.WebServiceBindingAttribute.Name property. The namespace associated with the binding. Sets the System.Web.Services.WebServiceBindingAttribute.Namespace property.

WebServiceBindingAttribute

Example Syntax:

ToString

[C#] public WebServiceBindingAttribute(string name, string ns, string location);

[C++] public: WebServiceBindingAttribute(String* name, String* ns, String* location);

[VB] Public Sub New(ByVal name As String, ByVal ns As String, ByVal location As String)

[JScript] public function WebServiceBindingAttribute (name: String, ns: String, location: String);

Description

Initializes a new instance of the System.Web.Services.WebServiceBindingAttribute class.

This constructor is used to specify a name for a binding not defined in the Web Service it is applied to that and is a member of the supplied namespace. The name of the binding a Web Service method is implementing an operation for. Sets the System.Web.Services.WebServiceBindingAttribute.Name property. The namespace associated with the binding. Sets the System.Web.Services.WebServiceBindingAttribute.Namespace property. The location where the binding is defined.

Location

ToString

[C#] public string Location {get; set;}

[C++] public: _property String* get_Location( );public: _property void set_Location(String*);

[VB] Public Property Location As String

[JScript] public function get Location( ); String;public function set Location(String);

Description

Gets or sets the location where the binding is defined.

Name

ToString

[C#] public string Name {get; set;}

[C++] public: _property String* get_Name( );pub

System.Web.Services.Configuration

Description

WebServicesConfigurationSectionHandler class (System.Web.Services.Configuration)

Description

The configuration section handler for the webServices section of the Config.Web configuration file. The section handler participates in the resolution of configuration settings within the webServices portion of a Config.Web.

Constructors:

WebServicesConfigurationSectionHandler

Example Syntax:

[C#] public WebServicesConfigurationSectionHandler( );

[C++] public: WebServicesConfigurationSectionHandler( );

[VB] Public Sub New( )

[JScript] public function WebServicesConfigurationSectionHandler( );

Methods:

Create

[C#] public object Create(object parent, object configContext, XmlNode section);

[C++] public: _sealed Object* Create(Object* parent, Object* configContext, XmlNode* section);

[VB] NotOverridable Public Function Create(ByVal parent As Object, ByVal configContext As Object, ByVal section As XmlNode) As Object

[JScript] public function Create(parent: Object, configContext: Object, section: XmlNode): Object;

Description

Parses the configuration settings for the webServices portion of a Web.config configuration file to populate the values of a WebServicesConfiguration object and returning it. Reference to the "default" value provided by the parent IConfigurationSectionHandler. Provides access to the raw XML contents within a configuration file. The virtual path for which the configuration section handler should compute values.

XmlFormatExtensionAttribute class (System.Web.Services.Configuration)

ToString

Description

XmlFormatExtensionAttribute

Example Syntax:

ToString

[C#] public XmlFormatExtensionAttribute( );

[C++] public: XmlFormatExtensionAttribute( );

[VB] Public Sub New( )

[JScript] public function XmlFormatExtensionAttribute( );

Description

XmlFormatExtensionAttribute

Example Syntax:

ToString

[C#] public XmlFormatExtensionAttribute(string elementName, string ns, Type extensionPoint1);

[C++] public: XmlFormatExtensionAttribute(String* elementName, String* ns, Type* extensionPoint1);

[VB] Public Sub New(ByVal elementName As String, ByVal ns As String, ByVal extensionPoint1 As Type)

[JScript] public function XmlFormatExtensionAttribute(elementName: String, ns: String, extensionPoint1: Type);

XmlFormatExtensionAttribute

Example Syntax:

ToString

[C#] public XmlFormatExtensionAttribute(string elementName, string ns, Type[ ] extensionPoints);

[C++] public: XmlFormatExtensionAttribute(String* elementName, String* ns, Type* extensionPoints[ ]);

[VB] Public Sub New(ByVal elementName As String, ByVal ns As String, ByVal extensionPoints( ) As Type)

[JScript] public function XmlFormatExtensionAttribute(elementName: String, ns: String, extensionPoints: Type[ ]);

Description

XmlFormatExtensionAttribute

Example Syntax:

ToString

[C#] public XmlFormatExtensionAttribute(string elementName, string ns, Type extensionPoint1, Type extensionPoint2);

[C++] public: XmlFormatExtensionAttribute(String* elementName, String* ns, Type* extensionPoint1, Type* extensionPoint2);

[VB] Public Sub New(ByVal elementName As String, ByVal ns As String, ByVal extensionPoint1 As Type, ByVal extensionPoint2 As Type)

[JScript] public function XmlFormatExtensionAttribute(elementName: String, ns: String, extensionPoint1: Type, extensionPoint2: Type);

XmlFormatExtensionAttribute

Example Syntax:

ToString

[C#] public XmlFormatExtensionAttribute(string elementName, string ns, Type extensionPoint1, Type extensionPoint2, Type extensionPoint3);

[C++] public: XmlFormatExtensionAttribute(String* elementName, String* ns, Type* extensionPoint1, Type* extensionPoint2, Type* extensionPoint3);

[VB] Public Sub New(ByVal elementName As String, ByVal ns As String, ByVal extensionPoint1 As Type, ByVal extensionPoint2 As Type, ByVal extensionPoint3 As Type)

[JScript] public function XmlFormatExtensionAttribute(elementName: String, ns: String, extensionPoint1: Type, extensionPoint2: Type, extensionPoint3: Type);

XmlFormatExtensionAttribute

Example Syntax:

ToString

[C#] public XmlFormatExtensionAttribute(string elementName, string ns, Type extensionPoint1, Type extensionPoint2, Type extensionPoint3, Type extensionPoint4);

[C++] public: XmlFormatExtensionAttribute(String* elementName, String* ns, Type* extensionPoint1, Type* extensionPoint2, Type* extensionPoint3, Type* extensionPoint4);

[VB] Public Sub New(ByVal elementName As String, ByVal ns As String, ByVal extensionPoint1 As Type, ByVal extensionPoint2 As Type, ByVal extensionPoint3 As Type, ByVal extensionPoint4 As Type)

[JScript] public function XmlFormatExtensionAttribute(elementName: String, ns: String, extensionPoint1: Type, extensionPoint2: Type, extensionPoint3: Type, extensionPoint4: Type);

Properties:

ElementName

ToString

[C#] public string ElementName {get; set;}

[C++] public: _property String* get_ElementName( ); public: _property void set_ElementName(String*);

[VB] Public Property ElementName As String

[JScript] public function get ElementName( ): String;public function set ElementName(String);

Description
ExtensionPoints
ToString
[C#] public Type[ ] ExtensionPoints {get; set;}
[C++] public: _property Type* get_ExtensionPoints( );public: _property void set_ExtensionPoints(Type*[ ]);
[VB] Public Property ExtensionPoints As Type( )
[JScript] public function get ExtensionPoints( ): Type[ ];public function set ExtensionPoints(Type[ ]);

Description
Namespace
ToString
[C#] public string Namespace {get; set;}
[C++] public: _property String* get_Namespace( );public: _property void set_Namespace(String*);
[VB] Public Property Namespace As String
[JScript] public function get Namespace( ): String;public function set Namespace(String);

Description
TypeId
XmlFormatExtensionPointAttribute class (System.Web.Services.Configuration)
ToString Description
XmlFormatExtensionPointAttribute
Example Syntax:
ToString
[C#] public XmlFormatExtensionPointAttribute(string memberName);
[C++] public: XmlFormatExtensionPointAttribute(String* memberName);
[VB] Public Sub New(ByVal memberName As String)
[JScript] public function XmlFormatExtensionPointAttribute(memberName: String);

Description
AllowElements
ToString
[C#] public bool AllowElements {get; set;}
[C++] public: _property bool get_AllowElements( );public: _property void set_AllowElements(bool);
[VB] Public Property AllowElements As Boolean
[JScript] public function get AllowElements( ): Boolean;public function set AllowElements(Boolean);

Description
MemberName
ToString
[C#] public string MemberName {get; set;}
[C++] public: _property String* get_MemberName( );public: _property void set_MemberName(String*);
[VB] Public Property MemberName As String
[JScript] public function get MemberName( ): String;public function set MemberName(String);

Description
TypeId
XmlFormatExtensionPrefixAttribute class (System.Web.Services.Configuration)
ToString Description
XmlFormatExtensionPrefixAttribute
Example Syntax:
ToString
[C#] public XmlFormatExtensionPrefixAttribute( );
[C++] public: XmlFormatExtensionPrefixAttribute( );
[VB] Public Sub New( )
[JScript] public function XmlFormatExtensionPrefixAttribute( );

Description
XmlFormatExtensionPrefixAttribute
Example Syntax:
ToString
[C#] public XmlFormatExtensionPrefixAttribute(string prefix, string ns);
[C++] public: XmlFormatExtensionPrefixAttribute(String* prefix, String* ns);
[VB] Public Sub New(ByVal prefix As String, ByVal ns As String)
[JScript] public function XmlFormatExtensionPrefixAttribute(prefix: String, ns: String);

Description
Namespace
ToString
[C#] public string Namespace {get; set;}
[C++] public: _property String* get_Namespace( );public: _property void set_Namespace(String*);
[VB] Public Property Namespace As String
[JScript] public function get Namespace( ): String;public function set Namespace(String);

Description
Prefix
ToString
[C#] public string Prefix {get; set;}[C++]

System.Web.Services.Description

Description
The System.Web.Services.Description namespace consists of the classes that enable you to publicly describe a Web Service by using the Web Service Description Language (WSDL). Each class in the System.Web.Services.Description namespace corresponds to a specific element in the WSDL specification, and the class hierarchy corresponds to the XML structure of a valid WSDL document. For more information about WSDL, see the specification at http://www.w3.org/TR/wsdl/.
Binding class (System.Web.Services.Description)

Description
Specifies the concrete data format and protocols used in the Web Service. This class cannot be inherited.
Constructors:
Binding
Example Syntax:
[C#] public Binding( );
[C++] public: Binding( );
[VB] Public Sub New( )
[JScript] public function Binding( );
Properties:
Documentation
Extensions Description
Gets the collection of extensibility elements used in the Web Service.
Name
[C#] public string Name {get; set;}
[C++] public: _property String* get_Name( );public: _property void set_Name(String*);
[VB] Public Property Name As String
[JScript] public function get Name( ): String;public function set Name(String);

Description

Gets or sets a string value containing the name of the System.Web.Services.Description.Binding.

Operations

[C#] public OperationBindingCollection Operations {get;}

[C++] public: _property OperationBindingCollection* get_Operations( );

[VB] Public ReadOnly Property Operations As OperationBindingCollection

[JScript] public function get Operations( ): OperationBindingCollection;

Description

Gets the collection of the specifications for data formats and message protocols used in the action supported by the Web Service.

ServiceDescription

[C#] public ServiceDescription ServiceDescription {get; }

[C++] public: _property ServiceDescription* get_ServiceDescription( );

[VB] Public ReadOnly Property ServiceDescription As ServiceDescription

[JScript] public function get ServiceDescription( ): ServiceDescription;

Description

Gets the System.Web.Services.Description. ServiceDescription instance of which the System.Web.Services.Description.Binding is a member.

Type

[C#] public XmlQualifiedName Type {get; set;}

[C++] public: _property XmlQualifiedName* get_Type( );public: _property void set Type(XmlQualifiedName*);

[VB] Public Property Type As XmlQualifiedName

[JScript] public function get Type( ): XmlQualifiedName; public function set Type(XmlQualifiedName);

Description

Gets or sets a value representing the XML datatype definitions used by the Web Service.

The default implementation is String.Empty.

Methods:

BindingCollection class (System.Web.Services.Description )

ToString

Description

Represents a collection of System.Web.Services.Description.Binding elements supported by the Web Service. This class cannot be inherited.

Count

InnerList

Item

ToString

System.Web.Services.Description.Binding

Description

Gets or sets the value of a System.Web.Services.Description.Binding at the specified zero-based index. The zero-based index of the System.Web.Services.Description. Binding whose value is modified or returned.

Item

ToString

[C#] public Binding this[string name] {get;}

[C++] public: _property Binding* get_Item(String* name);

[VB] Public Default ReadOnly Property Item(ByVal name As String) As Binding

[JScript] returnValue=BindingCollectionObject.Item (name);

Description

Gets a System.Web.Services.Description.Binding specified by its Name property. A string value representing the name of the Binding returned.

List

Table

Add

[C#] public int Add(Binding binding);

[C++] public: int Add(Binding* binding);

[VB] Public Function Add(ByVal binding As Binding) As Integer

[JScript] public function Add(binding: Binding): int;

Description

Adds the specified System.Web.Services.Description. Binding to the end of the System.Web.Services.Description. BindingCollection.

Return Value: Returns the zero-based index where binding has been added. The System.Web.Services.Description. Binding to be added to the collection.

Contains

[C#] public bool Contains(Binding binding);

[C++] public: bool Contains(Binding* binding);

[VB] Public Function Contains(ByVal binding As Binding) As Boolean

[JScript] public function Contains(binding: Binding): Boolean;

Description

Gets a value indicating whether the specified System.Web. Services.Description.Binding is a member of the System. Web.Services.Description.BindingCollection.

Return Value: true if binding is a member of the System.Web. Services.Description.BindingCollection; otherwise, false. A System.Web.Services.Description.Binding object.

CopyTo

[C#] public void CopyTo(Binding[ ] array, int index);

[C++] public: void CopyTo(Binding* array[ ], int index);

[VB] Public Sub CopyTo(ByVal array( ) As Binding, ByVal index As Integer)

[JScript] public function CopyTo(array: Binding[ ], index: int);

Description

Copies the entire System.Web.Services.Description. BindingCollection to a compatible one-dimensional array of type System.Web.Services.Description.Binding, starting at the specified zero-based index of the target array. An array of type System.Web.Services.Description.Binding serving as the destination for the copy action. The zero-based index at which to start placing the copied collection.

GetKey

[C#] protected override string GetKey(object value);

[C++] protected: String* GetKey(Object* value);

[VB] Overrides Protected Function GetKey(ByVal value As Object) As String

[JScript] protected override function GetKey(value: Object): String;

Description

Returns the name of the System.Web.Services.Description.Binding associated with the value passed by reference. An object for which to return the name of the key.

IndexOf

[C#] public int IndexOf(Binding binding);

[C++] public: int IndexOf(Binding* binding);

[VB] Public Function IndexOf(ByVal binding As Binding) As Integer

[JScript] public function IndexOf(binding: Binding): int;

Description

Searches for the specified System.Web.Services.Description.Binding and returns the zero-based index of the first occurrence within the collection.

Return Value: Returns a 32-bit signed integer. A System.Web.Services.Description.Binding object.

Insert

[C#] public void Insert(int index, Binding binding);

[C++] public: void Insert(int index, Binding* binding);

[VB] Public Sub Insert(ByVal index As Integer, ByVal binding As Binding)

[JScript] public function Insert(index: int, binding: Binding);

Description

Adds the specified System.Web.Services.Description.Binding to the System.Web.Services.Description. BindingCollection at the specified index.

If the number of items in the collection already equals the collection's capacity, the capacity is doubled by automatically reallocating the internal array before the new element is inserted. The zero-based index at which to insert binding. The System.Web.Services.Description.Binding to be added to the collection.

Remove

[C#] public void Remove(Binding binding);

[C++] public: void Remove(Binding* binding);

[VB] Public Sub Remove(ByVal binding As Binding)

[JScript] public function Remove(binding: Binding);

Description

Removes the first occurrence of the specified System.Web.Services.Description.Binding from the System.Web.Services.Description.BindingCollection.

This method performs a linear search; therefore, the average execution time is proportional to System.Web.Services.Description.BindingCollection.Count. A System.Web.Services.Description.Binding object.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent System.Web.Services.Description. ServiceDescription of a member of System.Web.Services.Description.BindingCollection. An object, of type System.Web.Services.Description.Binding, within the collection. The object, of type System.Web.Services.Description. ServiceDescription, to set as the parent.

DocumentableItem class (System.Web.Services.Description)

ToString

Description

Represents the abstract base class from which several classes in the System.Web.Services.Description namespace are derived.

Several classes are derived from this class, including: System.Web.Services.Description.BindingSystem.Web.Services.Description.ImportSystem.Web.Services.Description.Message System.Web.Services. Description.MessagePartSystem.Web.Services.Description. OperationSystem.Web.Services.Description.OperationBindingSystem.Web.Services.Description.OperationMessageSystem. Web.Services.Description. PortSystem.Web.Services.Description.PortTypeSystem.Web.Services.Description. ServiceSystem.Web.Services.Description.Types This base class contains only one property, the Documentation property. It represents the text documentation for a specific XML element.

DocumentableItem

Example Syntax:

ToString

[C#] protected DocumentableItem( );

[C++] protected: DocumentableItem( );

[VB] Protected Sub New( )

[JScript] protected function DocumentableItem( );

Documentation

ToString

[C#] public string Documentation {get; set;}

[C++] public: _property String* get_Documentation( );public: _property void set_Documentation(String*);

[VB] Public Property Documentation As String

[JScript] public function get Documentation( ): String;public function set Documentation(String);

Description

Gets or sets the documentation for the instance of the System.Web.Services.Description.DocumentableItem.

In a derived class, this property represents the text comments added to an element of the Web Service. The default implementation is String.Empty.

FaultBinding class (System.Web.Services.Description)

ToString

Description

Specifies the format for any error messages that might be output as a result of the operation. This class cannot be inherited.

FaultBinding

Example Syntax:

ToString

[C#] public FaultBinding( );

[C++] public: FaultBinding( );

[VB] Public Sub New( )

[JScript] public function FaultBinding( );

Documentation

Extensions

ToString

Description

Gets the collection of extensibility elements associated with the System.Web.Services.Description.FaultBinding.

Name

OperationBinding

FaultBindingCollection class (System.Web.Services.Description)

ToString

Description

Represents a collection of System.Web.Services.Description.FaultBinding instances. This class cannot be inherited.

Count

InnerList

Item

ToString

System.Web.Services.Description.FaultBinding

Description

Gets or sets the value of a System.Web.Services.Description.FaultBinding at the specified zero-based index. The zero-based index of the System.Web.Services.Description. FaultBinding whose value is modified or returned.

Item

ToString

[C#] public FaultBinding this[string name] {get;}

[C++] public: _property FaultBinding* get_Item(String* name);

[VB] Public Default ReadOnly Property Item(ByVal name As String) As FaultBinding

[JScript] returnValue=FaultBindingCollectionObject.Item (name);

Description

Gets a System.Web.Services.Description.FaultBinding specified by its System.Web.Services.Description. FaultBinding.Name property. The string value representing the name of the System.Web.Services.Description. FaultBinding returned.

List

Table

Add

[C#] public int Add(FaultBinding bindingOperationFault);

[C++] public: int Add(FaultBinding* bindingOperationFault);

[VB] Public Function Add(ByVal bindingOperationFault As FaultBinding) As Integer

[JScript] public function Add(bindingOperationFault: FaultBinding): int;

Description

Adds the specified System.Web.Services.Description-.FaultBinding to the end of the System.Web.Services.Description.FaultBindingCollection.

Return Value: Returns the index where bindingOperationFault has been added. The System.Web.Services.Description.FaultBinding to be added to the collection.

Contains

[C#] public bool Contains(FaultBinding bindingOperationFault);

[C++] public: bool Contains(FaultBinding* bindingOperationFault);

[VB] Public Function Contains(ByVal bindingOperationFault As FaultBinding) As Boolean

[JScript] public function Contains(bindingOperationFault: FaultBinding) Boolean;

Description

Gets a value indicating whether the specified System.Web. Services.Description.FaultBinding is a member of the FaultBindingCollection.

Return Value: true if bindingOperationFault is a member of the FaultBindingCollection; otherwise, false. A System.Web. Services.Description.FaultBinding object.

CopyTo

[C#] public void CopyTo(FaultBinding[ ] array, int index);

[C++] public: void CopyTo(FaultBinding* array[ ], int index);

[VB] Public Sub CopyTo(ByVal array( ) As FaultBinding, ByVal index As Integer)

[JScript] public function CopyTo(array: FaultBinding[ ], index: int);

Description

Copies the entire FaultBindingCollection to a compatible one-dimensional array of type System.Web.Services.Description.FaultBinding, starting at the specified zero-based index of the target array. An array of type System.Web.Services.Description.FaultBinding serving as the destination for the copy action. The zero-based index at which to start placing the copied collection.

GetKey

[C#] protected override string GetKey(object value);

[C++] protected: String* GetKey(Object* value);

[VB] Overrides Protected Function GetKey(ByVal value As Object) As String

[JScript] protected override function GetKey(value: Object): String;

Description

Returns the name of the System.Web.Services.Description.FaultBinding associated with the value passed by reference. An object for which to return the name.

IndexOf

[C#] public int IndexOf(FaultBinding bindingOperationFault);

[C++] public: int IndexOf(FaultBinding* bindingOperationFault);

[VB] Public Function IndexOf(ByVal bindingOperationFault As FaultBinding) As Integer

[JScript] public function IndexOf(bindingOperationFault: FaultBinding): int;

Description

Searches for the specified System.Web.Services.Description.FaultBinding and returns the zero-based index of the first occurrence within the collection.

Return Value: Returns a 32-bit signed integer. A System.Web. Services.Description.FaultBinding instance.

Insert

[C#] public void Insert(int index, FaultBinding bindingOperationFault);

[C++] public: void Insert(int index, FaultBinding* bindingOperationFault);

[VB] Public Sub Insert(ByVal index As Integer, ByVal bindingOperationFault As FaultBinding)

[JScript] public function Insert(index: int, bindingOperationFault: FaultBinding);

Description

Adds the specified System.Web.Services.Description. FaultBinding to the FaultBindingCollection at the specified zero-based index.

If the number of items in the collection already equals the collection's capacity, the capacity is doubled by automatically reallocating the internal array before the new element is inserted. The zero-based index at which to insert bindingOperationFault. The System.Web.Services.Description. FaultBinding to be added to the collection.

Remove

[C#] public void Remove(FaultBinding bindingOperationFault);

[C++] public: void Remove(FaultBinding* bindingOperationFault);

[VB] Public Sub Remove(ByVal bindingOperationFault As FaultBinding)

[JScript] public function Remove(bindingOperationFault: FaultBinding);

Description

Removes the first occurrence the specified System.Web. Services.Description.FaultBinding from the FaultBindingCollection.

This method performs a linear search; therefore, the average execution time is proportional to System.Web.Services. Description.FaultBindingCollection.Count. The System. Web.Services.Description.FaultBinding object to be removed from the collection.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent System.Web.Services.Description. OperationBinding of a member of the FaultBindingCollection instance. An object, of type System.Web.Services.Description.FaultBinding, within the FaultBindingCollection. The object, of type System.Web.Services.Description. OperationBinding, to set as the parent.

HttpAddressBinding class (System.Web.Services.Description)

ToString

Description

Represents an extensibility element added to a System. Web.Services.Description.Port within a Web Service. This class cannot be inherited.

This class, through its System.Web.Services.Description.HttpAddressBinding.Location property, specifies the base URI for the Web Service. For more information, see.

HttpAddressBinding

Example Syntax:

ToString

[C#] public HttpAddressBinding( );

[C++] public: HttpAddressBinding( );

[VB] Public Sub New( )

[JScript] public function HttpAddressBinding( );

Handled

Location

ToString

Description

Gets or sets a value representing the URL of the .asmx file containing the methods exposed by the Web Service.

Parent

Required

HttpBinding class (System.Web.Services.Description)

ToString

Description

Represents an extensibility element added to a System. Web.Services.Description.Binding within a Web Service. This class cannot be inherited.

This class specifies that information is to be passed by means of HTTP. For more information about specification of protocols for Web Services, see.

ToString

[C#] public const string Namespace;

[C++] public: const String* Namespace;

[VB] Public Const Namespace As String

[JScript] public var Namespace: String;

Description

Specifies the URI (http://schemas.xmlsoap.org/wsdl/http/) for the XML namespace of the HttpBinding class.

HttpBinding

Example Syntax:

ToString

[C#] public HttpBinding( );

[C++] public: HttpBinding( );

[VB] Public Sub New( )

[JScript] public function HttpBinding( );

Handled

Parent

Required

Verb

ToString

Description

Gets or sets a value indicating whether the Http request will be made using the "GET" or "POST" method.

HttpOperationBinding class (System.Web.Services.Description)

ToString

Description

Represents an extensibility element added to an System. Web.Services.Description.OperationBinding within a Web Service. This class cannot be inherited.

This class specifies how a Web Service passes information by means of HTTP. For more information, see.

HttpOperationBinding

Example Syntax:

ToString

[C#] public HttpOperationBinding( );

[C++] public: HttpOperationBinding( );

[VB] Public Sub New( )

[JScript] public function HttpOperationBinding( );

Handled

Location

ToString

Description

Gets or sets a value representing the relative URL, within the WSDL document, of the action supported by the HttpOperationBinding.

Parent

Required

HttpUrlEncodedBinding class (System.Web.Services.Description)

ToString

Description

Represents an extensibility element added to an System. Web.Services.Description.InputBinding within a Web Service. This class cannot be inherited.

This class specifies that the incoming data will be in the format "name=value&name value", encoded from an System.Web.UI.HtmlControls.HtmlForm, whether the value of the HtmlForm's System.Web.UI.HtmlControls.HtmlForm.Method property is POST or GET.

HttpUrlEncodedBinding

Example Syntax:

ToString

[C#] public HttpUrlEncodedBinding( );

[C++] public: HttpUrlEncodedBinding( );

[VB] Public Sub New( )

[JScript] public function HttpUrlEncodedBinding( );

Handled

Parent

Required

HttpUrlReplacementBinding class (System.Web.Services.Description)

ToString

Description

Represents an extensibility element added to an System.Web.Services.Description.InputBinding within a Web Service. It specifies the format for data transmission through HTTP. This class cannot be inherited.

This class allows users to specify a custom format for data transmission, rather than limiting them to the standard format, "name=value&name=value", used in HTTP query strings. For example, a developer may decide to use /name,value/name,value or some other custom format instead.

HttpUrlReplacementBinding

Example Syntax:

ToString

[C#] public HttpUrlReplacementBinding( );

[C++] public: HttpUrlReplacementBinding( );

[VB] Public Sub New( )

[JScript] public function HttpUrlReplacementBinding( );

Handled

Parent

Required

Import class (System.Web.Services.Description)

ToString

Description

Associates an XML namespace with a document location. This class cannot be inherited.

Many of the tags in the WSDL schema can contain the tag. It allows the separation of different elements of the Web Service into different documents, which can then be imported as needed.

Import

Example Syntax:

ToString

[C#] public Import( );

[C++] public: Import( );

[VB] Public Sub New( )

[JScript] public function Import( );

Documentation

Location

ToString

Description

Gets or sets a reference to the XML Location attribute of the System.Web.Services.Description.Import instance.

Namespace

ToString

[C#] public string Namespace {get; set;}

[C++] public: _property String* get_Namespace( );public: _property void set_Namespace(String*);

[VB] Public Property Namespace As String

[JScript] public function get Namespace( ): String;public function set Namespace(String);

Description

Gets or sets a reference to the XML Namespace of the System.Web.Services.Description.Import instance.

ServiceDescription

ToString

[C#] public ServiceDescription ServiceDescription {get;}

[C++] public: _property ServiceDescription* get_ServiceDescription( );

[VB] Public ReadOnly Property ServiceDescription As ServiceDescription

[JScript] public function get ServiceDescription( ): ServiceDescription;

Description

Gets a reference to the System.Web.Services.Description.ServiceDescription of which the Import instance is a member.

ImportCollection class (System.Web.Services.Description)

ToString

Description

Provides a collection of System.Web.Services.Description.Import instances representing documents to be imported into the Web Service. This class cannot be inherited.

Count

InnerList

Item

ToString

Description

Gets or sets the value of an System.Web.Services.Description.Import at the specified zero-based index. The zero-based index of the Import whose value is modified or returned.

List

Table

Add

[C#] public int Add(Import import);

[C++] public: int Add(Import* import);

[VB] Public Function Add(ByVal import As Import) As Integer

[JScript] public function Add(import: Import): int;

Description

Adds the specified System.Web.Services.Description.Import instance to the end of the System.Web.Services.Description.ImportCollection.

Return Value: Returns the index where import has been added. The System.Web.Services.Description.Import to be added to the collection.

Contains

[C#] public bool Contains(Import import);

[C++] public: bool Contains(Import* import);

[VB] Public Function Contains(ByVal import As Import) As Boolean

[JScript] public function Contains(import: Import): Boolean;

Description

Gets a value indicating whether the specified System.Web.Services.Description.Import instance is a member of the System.Web.Services.Description.ImportCollection.

Return Value: true if import is a member of the System.Web.Services.Description.ImportCollection; otherwise, false. An System.Web.Services.Description.Import object.

CopyTo

[C#] public void CopyTo(Import[ ] array, int index);

[C++] public: void CopyTo(Import* array[ ], int index);

[VB] Public Sub CopyTo(ByVal array( ) As Import, ByVal index As Integer)

[JScript] public function CopyTo(array: Import[ ], index: int);

Description

Copies the entire ImportCollection to a compatible one-dimensional array of type System.Web.Services.Description.Import, starting at the specified zero-based index of the target array. The destination array, of type System.Web.Services.Description.Import. The zero-based index at which to start placing the copied collection.

IndexOf

[C#] public int IndexOf(Import import);

[C++] public: int IndexOf(Import* import);

[VB] Public Function IndexOf(ByVal import As Import) As Integer

[JScript] public function IndexOf(import: Import): int;

Description

Searches for the specified System.Web.Services.Description.Import and returns the zero-based index of the first occurrence within the collection.

Return Value: Returns a 32-bit signed integer. An System.Web.Services.Description.Import object.

Insert

[C#] public void Insert(int index, Import import);

[C++] public: void Insert(int index, Import* import);

[VB] Public Sub Insert(ByVal index As Integer, ByVal import As Import)

[JScript] public function Insert(index: int, import: Import);

Description

Adds the specified System.Web.Services.Description.Import instance to the ImportCollection at the specified index.

If the number of items in the collection already equals the collection's capacity, the capacity is doubled by automatically reallocating the internal array before the new element is inserted. The zero-based index at which to insert import. The System.Web.Services.Description.Import to be added to the collection.

Remove

[C#] public void Remove(Import import);

[C++] public: void Remove(Import* import);

[VB] Public Sub Remove(ByVal import As Import)

[JScript] public function Remove(import: Import);

Description

Removes the first occurrence of the specified System.Web.Services.Description.Import from the ImportCollection.

This method performs a linear search; therefore, the average execution time is proportional to System.Web.Services.Description.ImportCollection.Count. An System.Web.Services.Description.Import object.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent System.Web.Services.Description.ServiceDescription of the specified System.Web.Services.Description.Import. An object, of type System.Web.Services.Description.Import, within the collection. The object, of type System.Web.Services.Description.ServiceDescription, to set as the parent.

InputBinding class (System.Web.Services.Description)

ToString

Description

Provides a set of specifications for data formats and protocols used by the Web Service for input messages. This class cannot be inherited.

InputBinding

Example Syntax:

ToString

[C#] public InputBinding( );

[C++] public: InputBinding( );

[VB] Public Sub New( )

[JScript] public function InputBinding( );

Documentation

Extensions

ToString

Description

Gets the System.Web.Services.Description. ServiceDescriptionFormatExtensionCollect ion associated with the InputBinding instance.

Name

OperationBinding

Message class (System.Web.Services.Description)

ToString

Description

Defines in the abstract the content, either document-oriented or procedure-oriented, of data passed by the Web Service. This class cannot be inherited.

Message

Example Syntax:

ToString

[C#] public Message( );

[C++] public: Message( );

[VB] Public Sub New( )

[JScript] public function Message( );

Documentation

Name

ToString

Description

Gets or sets the name of the Message instance.

Parts

ToString

[C#] public MessagePartCollection Parts {get;}

[C++] public: _property MessagePartCollection* get_Parts( );

[VB] Public ReadOnly Property Parts As MessagePartCollection

[JScript] public function get Parts( ): MessagePartCollection;

Description

Gets the collection of all the System.Web.Services.Description.MessagePart objects contained in the Message instance.

ServiceDescription

ToString

[C#] public ServiceDescription ServiceDescription {get;}

[C++] public: _property ServiceDescription* get_ServiceDescription( );

[VB] Public ReadOnly Property ServiceDescription As ServiceDescription

[JScript] public function get ServiceDescription( ): ServiceDescription;

Description

Gets the System.Web.Services.Description. ServiceDescription of which the Message instance is a member.

FindPartByName

[C#] public MessagePart FindPartByName(string partName);

[C++] public: MessagePart* FindPartByName(String* partName);

[VB] Public Function FindPartByName(ByVal partName As String) As MessagePart

[JScript] public function FindPartByName(partName: String): MessagePart;

Description

Searches the System.Web.Services.Description.MessagePartCollection returned by the System.Web.Services.Description.Message.Parts property, and returns the named System.Web.Services.Description.MessagePart. The string naming the System.Web.Services.Description.MessagePart to be returned.

FindPartsByName

[C#] public MessagePart[ ] FindPartsByName(string[ ] partNames);

[C++] public: MessagePart* FindPartsByName(String* partNames _gc[ ]) [ ];

[VB] Public Function FindPartsByName(ByVal part Names( ) As String) As MessagePart( )

[JScript] public function FindPartsByName(partNames: String[ ]): MessagePart[ ];

Description

Searches the System.Web.Services.Description.MessagePartCollection returned by the System.Web.Services.Description.Message.Parts property and returns an array of type System.Web.Services.Description.MessagePart containing the named instances.

Return Value: An array of type System.Web.Services.Description.MessagePart. An array of names of the System.Web.Services.Description.MessagePart instances to be returned.

MessageBinding class (System.Web.Services.Description)

ToString

Description

Describes how abstract content is mapped into a concrete format. This abstract class forms the base class for the following classes: System.Web.Services.Description. FaultBindingSystem.Web.Services.Description. InputBindingSystem.Web.Services.Description.OutputBinding MessageBinding Example Syntax:

ToString

[C#] protected MessageBinding( );

[C++] protected: MessageBinding( );

[VB] Protected Sub New( )

[JScript] protected function MessageBinding( );

Documentation

Extensions

ToString

Description

Gets the System.Web.Services.Description. ServiceDescriptionFormatExtensionCollect ion associated with the MessageBinding instance.

This property is intended to be overridden to provide the format extensions for Input, Output and Fault messages.

Name

ToString

[C#] public string Name {get; set;}

[C++] public: _property String* get_Name( );public: _property void set_Name(String*);

[VB] Public Property Name As String

[JScript] public function get Name( ): String;public function set Name(String);

Description

Gets or sets the name of the System.Web.Services.Description.MessageBinding.

OperationBinding

ToString

[C#] public OperationBinding OperationBinding {get;}

[C++] public: _property OperationBinding* get_OperationBinding( );

[VB] Public ReadOnly Property OperationBinding As OperationBinding

[JScript] public function get OperationBinding( ): OperationBinding;

Description

Gets the System.Web.Services.Description. OperationBinding of which the MessageBinding instance is a member.

MessageCollection class (System.Web.Services.Description)

ToString

Description

Represents a collection of System.Web.Services.Description.Message objects. This class cannot be inherited.

Count

InnerList

Item

ToString

System.Web.Services.Description.Message

Description

Gets or sets the value of a System.Web.Services.Description.Message at the specified zero-based index. The zero-based index of the Message whose value is modified or returned.

Item

ToString

[C#] public Message this[string name] {get;}

[C++] public: _property Message* get_Item(String* name);

[VB] Public Default ReadOnly Property Item(ByVal name As String) As Message

[JScript] returnValue=MessageCollectionObject.Item (name);

Description

Gets the Message by its System.Web.Services.Description.Message.Name property. The string value representing the name of the Message returned.

List

Table

Add

[C#] public int Add(Message message);

[C++] public: int Add(Message* message);

[VB] Public Function Add(ByVal message As Message) As Integer

[JScript] public function Add(message: Message): int;

Description

Adds the specified System.Web.Services.Description.Message instance to the end of the MessageCollection.

Return Value: Returns the zero-based index where message has been added. The System.Web.Services.Description.Message to be added to the MessageCollection.

Contains

[C#] public bool Contains(Message message);

[C++] public: bool Contains(Message* message);

[VB] Public Function Contains(ByVal message As Message) As Boolean

[JScript] public function Contains(message: Message): Boolean;

Description

Gets a value indicating whether the specified System.Web.Services.Description.Message instance is a member of the MessageCollection.

Return Value: true if message is a member of the MessageCollection; otherwise, false. A System.Web.Services.Description.Message object.

CopyTo

[C#] public void CopyTo(Message[ ] array, int index);

[C++] public: void CopyTo(Message* array[ ], int index);

[VB] Public Sub CopyTo(ByVal array( ) As Message, ByVal index As Integer)

[JScript] public function CopyTo(array: Message[ ], index: int);

Description

Copies the entire MessageCollection to a compatible one-dimensional array of type System.Web.Services.Description.Message, starting at the specified zero-based index of the target array. The array, of type System.Web.Services.Description.Message, serving as the destination of the copy action. The zero-based index at which to start placing the copied collection.

GetKey

[C#] protected override string GetKey(object value);

[C++] protected: String* GetKey(Object* value);

[VB] Overrides Protected Function GetKey(ByVal value As Object) As String

[JScript] protected override function GetKey(value: Object): String;

Description

Supplies the name of the System.Web.Services.Description.Message associated with the value passed by reference. A System.Web.Services.Description.Message instance for which to return the name.

IndexOf

[C#] public int IndexOf(Message message);

[C++] public: int IndexOf(Message* message);

[VB] Public Function IndexOf(ByVal message As Message) As Integer

[JScript] public function IndexOf(message: Message): int;

Description

Searches for the specified System.Web.Services.Description.Message instance and returns the zero-based index of the first occurrence within the collection.

Return Value: Returns a 32-bit signed integer. A System.Web.Services.Description.Message object for which to search the MessageCollection.

Insert

[C#] public void Insert(int index, Message message);

[C++] public: void Insert(int index, Message* message);

[VB] Public Sub Insert(ByVal index As Integer, ByVal message As Message)

[JScript] public function Insert(index: int, message: Message);

Description

Adds the specified System.Web.Services.Description.Message instance to the MessageCollection at the specified index.

If the number of items in the collection already equals the collection's capacity, the capacity is doubled by automatically reallocating the internal array before the new element is inserted. The zero-based index at which to insert message. The System.Web.Services.Description.Message instance to add to the collection.

Remove

[C#] public void Remove(Message message);

[C++] public: void Remove(Message* message);

[VB] Public Sub Remove(ByVal message As Message)

[JScript] public function Remove(message: Message);

Description

Removes the first occurrence of the specified System.Web.Services.Description.Message instance from the MessageCollection.

This method performs a linear search; therefore, the average execution time is proportional to System.Web.Services.Description.MessageCollection.Count. A System.Web.Services.Description.Message instance for which to search the collection.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent System.Web.Services.Description. ServiceDescription of a member of the MessageCollection. An object, of type System.Web.Services.Description.Message, within the collection. The object, of type System.Web.Services.Description.ServiceDescription, to be set as the parent.

MessagePart class (System.Web.Services.Description)

ToString

Description

Allows messages to be broken up into their logical units, with specific abstract information for each part. This class cannot be inherited.

MessagePart

Example Syntax:

ToString

[C#] public MessagePart( );

[C++] public: MessagePart( );

[VB] Public Sub New( )

[JScript] public function MessagePart( );

Documentation

Element

ToString

Description

Gets or sets the XML element name of the System.Web.Services.Description.MessagePart instance.

This property corresponds to the attribute of the tag for which the MessagePart class serves as a wrapper.

Message

ToString

[C#] public Message Message {get;}

[C++] public: _property Message* get_Message( );

[VB] Public ReadOnly Property Message As Message

[JScript] public function get Message( ): Message;

Description

Gets the System.Web.Services.Description.Message of which the MessagePart instance is a member.

Name

ToString

[C#] public string Name {get; set;}

[C++] public: _property String* get_Name( );public: _property void set_Name(String*);

[VB] Public Property Name As String

[JScript] public function get Name( ): String;public function set Name(String);

Description

Gets or sets the name of the System.Web.Services.Description.MessagePart instance.

Returns an empty string (" ") if the property value has not been assigned. This property corresponds to the attribute of the tag for which the MessagePart class serves as a wrapper.

Type

ToString

[C#] public XmlQualifiedName Type {get; set;}

[C++] public: _property XmlQualifiedName* get_Type( );public: _property void set Type(XmlQualifiedName*);

[VB] Public Property Type As XmlQualifiedName

[JScript] public function get Type( ): XmlQualifiedName; public function set Type(XmlQualifiedName);

Description

Gets or sets the XML datatype of the System.Web.Services.Description.MessagePart instance.

This property corresponds to the attribute of the tag for which the MessagePart class serves as a wrapper. In general it refers to an XSD datatype, but can also be extended as long as the XML namespace used is different from that of WSDL.

MessagePartCollection class (System.Web.Services.Description)

ToString

Description

Represents a collection of System.Web.Services.Description.MessagePart objects. This class cannot be inherited.

Count

InnerList

Item

ToString

System.Web.Services.Description.MessagePart

Description

Gets or sets the value of a System.Web.Services.Description.MessagePart at the specified zero-based index. The zero-based index of the MessagePart whose value is modified or returned.

Item

ToString

[C#] public MessagePart this[string name] {get;}

[C++] public: _property MessagePart* get_Item(String* name);

[VB] Public Default ReadOnly Property Item(ByVal name As String) As MessagePart

[JScript] returnValue=MessagePartCollectionObject.Item (name);

Description

Gets the MessagePart by its Name property. The string value representing the name of the System.Web.Services.Description.MessagePart returned.

List

Table

Add

[C#] public int Add(MessagePart messagePart);

[C++] public: int Add(MessagePart* messagePart);

[VB] Public Function Add(ByVal messagePart As MessagePart) As Integer

[JScript] public function Add(messagePart: MessagePart): int;

Description

Adds the specified System.Web.Services.Description.MessagePart to the end of the System.Web.Services.Description.MessagePartCollection.

Return Value: Returns the index where messagePart has been added. The System.Web.Services.Description.MessagePart to be added to the collection.

Contains

[C#] public bool Contains(MessagePart messagePart);

[C++] public: bool Contains(MessagePart* messagePart);

[VB] Public Function Contains(ByVal messagePart As MessagePart) As Boolean

[JScript] public function Contains(messagePart: MessagePart): Boolean;

Description

Gets a value indicating whether the specified System.Web.Services.Description.MessagePart is a member of the MessagePartCollection.

Return Value: true if messagePart is a member of the MessagePartCollection; otherwise, false. A System.Web.Services.Description.MessagePart object.

CopyTo

[C#] public void CopyTo(MessagePart[ ] array, int index);

[C++] public: void CopyTo(MessagePart* array[ ], int index);

[VB] Public Sub CopyTo(ByVal array( ) As MessagePart, ByVal index As Integer)

[JScript] public function CopyTo(array: MessagePart[ ], index: int);

Description

Copies the entire MessagePartCollection to a compatible one-dimensional array of type System.Web.Services.Description.MessagePart, starting at the specified zero-based index of the target array. An array of type System.Web.Services.Description.MessagePart serving as the destination of the copy action. The zero-based index at which to start placing the copied collection.

GetKey

[C#] protected override string GetKey(object value);

[C++] protected: String* GetKey(Object* value);

[VB] Overrides Protected Function GetKey(ByVal value As Object) As String

[JScript] protected override function GetKey(value: Object): String;

Description

Returns the name of the System.Web.Services.Description.MessagePart associated with the value passed by reference. An object for which to return the name.

IndexOf

[C#] public int IndexOf(MessagePart messagePart);

[C++] public: int IndexOf(MessagePart* messagePart);

[VB] Public Function IndexOf(ByVal messagePart As MessagePart) As Integer

[JScript] public function IndexOf(messagePart: MessagePart): int;

Description

Searches for the specified System.Web.Services.Description.MessagePart and returns the zero-based index of the first occurrence within the collection.

Return Value: Returns a 32-bit signed integer. A System.Web.Services.Description.MessagePart object.

Insert

[C#] public void Insert(int index, MessagePart messagePart);

[C++] public: void Insert(int index, MessagePart* messagePart);

[VB] Public Sub Insert(ByVal index As Integer, ByVal messagePart As MessagePart)

[JScript] public function Insert(index: int, messagePart: MessagePart);

Description

Adds the specified System.Web.Services.Description.MessagePart to the MessagePartCollection at the specified index.

If the number of items in the collection already equals the collection's capacity, the capacity is doubled by automatically reallocating the internal array before the new element is inserted. The zero-based index at which to insert messagePart. The System.Web.Services.Description.MessagePart to be added to the collection.

Remove

[C#] public void Remove(MessagePart messagePart);

[C++] public: void Remove(MessagePart* messagePart);

[VB] Public Sub Remove(ByVal messagePart As MessagePart)

[JScript] public function Remove(messagePart: MessagePart);

Description

Removes the first occurrence of the specified System.Web.Services.Description.MessagePart from the MessagePartCollection.

This method performs a linear search; therefore, the average execution time is proportional to System.Web.Services.Description.MessagePartCollection.Count. A System.Web.Services.Description.MessagePart object.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent System.Web.Services.Description.Message of a member of System.Web.Services.Description.MessagePartCollection. An object, of type System.Web.Services.Description.MessagePart, within the collection. The object, of type System.Web.Services.Description.Message, to set as the parent.

MimeContentBinding class (System.Web.Services.Description)

ToString

Description

Represents an extensibility element added to an System.Web.Services.Description.InputBinding or an System.Web.Services.Description.OutputBinding within a Web Service, specifying the MIME format for the body of the HTTP transmission. This class cannot be inherited.

ToString

[C#] public const string Namespace;

[C++] public: const String* Namespace;

[VB] Public Const Namespace As String

[JScript] public var Namespace: String;

Description

Specifies the URI for the XML namespace of the MimeContentBinding class. This field is constant.

MimeContentBinding

Example Syntax:

ToString

[C#] public MimeContentBinding( );

[C++] public: MimeContentBinding( );

[VB] Public Sub New( )

[JScript] public function MimeContentBinding( );

Handled

Parent

Part

ToString

Description

Gets or sets the name of the System.Web.Services.Description.MessagePart to which the MimeContentBinding applies.

Required

Type

ToString

Description

Gets or sets a value indicating the format of the body of the HTTP transmission.

The WSDL specification defines bindings for several MIME types, including text/xml, multipart/related, and application/x-www-form-urlencoded, although any MIME type may be used. The wildcard character (*) may also be used. For example, the string "text/*" would represent all text types. If the value of this property is not set, the MimeContentBinding specifies all MIME types.

MimeMultipartRelatedBinding class (System.Web.Services.Description)

ToString

Description

Represents an extensibility element added to an System.Web.Services.Description.InputBinding or an System.Web.Services.Description.OutputBinding, specifying the individual MIME formats for each System.Web.Services.Description.MessagePart within the HTTP transmission. This class cannot be inherited.

MimeMultipartRelatedBinding

Example Syntax:

ToString

[C#] public MimeMultipartRelatedBinding( );

[C++] public: MimeMultipartRelatedBinding( );

[VB] Public Sub New( )

[JScript] public function MimeMultipartRelatedBinding( );

Handled

Parent

Parts

ToString

Description

Gets the collection of extensibility elements added to the MimeMultipartRelatedBinding, which specify the MIME format for the corresponding System.Web.Services.Description.MessagePart instances.

Required

MimePart class (System.Web.Services.Description)

ToString

Description

Represents an extensibility element added to a System.Web.Services.Description.MimeMultipartRelatedBinding, specifying the concrete MIME type for the System.Web.Services.Description.MessagePart to which the MimePart applies. This class cannot be inherited.

MimePart

Example Syntax:

ToString

[C#] public MimePart( );

[C++] public: MimePart( );

[VB] Public Sub New( )

[JScript] public function MimePart( );

Extensions

ToString

[C#] public ServiceDescriptionFormatExtensionCollection Extensions {get;}

[C++] public: _property ServiceDescriptionFormatExtensionCollection* get_Extensions( );

[VB] Public ReadOnly Property Extensions As ServiceDescriptionFormatExtensionCollection

[JScript] public function get Extensions( ): ServiceDescriptionFormatExtensionCollection;

Description

Gets the collection of bindings for the System.Web.Services.Description.MimeMultipartRelatedBinding of which the MimePart is a member.

This collection must have at least one member. If it has more than one member, then the members are alternative MIME formats for a corresponding System.Web.Services.Description.MessagePart.

Handled

Parent

Required

MimePartCollection class (System.Web.Services.Description)

ToString

Description

Represents a collection of System.Web.Services.Description.MimePart objects. This class cannot be inherited.

MimePartCollection

Example Syntax:

ToString

[C#] public MimePartCollection( );

[C++] public: MimePartCollection( );

[VB] Public Sub New( )

[JScript] public function MimePartCollection( );

Count

InnerList

Item

ToString

Description

Gets or sets the value of a System.Web.Services.Description.MimePart at the specified zero-based index. The zero-based index of the MimePart whose value is modified or returned.

List

Add

[C#] public int Add(MimePart mimePart);

[C++] public: int Add(MimePart* mimePart);

[VB] Public Function Add(ByVal mimePart As MimePart) As Integer

[JScript] public function Add(mimePart: MimePart): int;

Description

Adds the specified System.Web.Services.Description.MimePart instance to the end of the MimePartCollection.

Return Value: Returns the zero-based index where mimePart has been added. The System.Web.Services.Description.MimePart to be added to the collection.

Contains

[C#] public bool Contains(MimePart mimePart);

[C++] public: bool Contains(MimePart* mimePart);

[VB] Public Function Contains(ByVal mimePart As MimePart) As Boolean

[JScript] public function Contains(mimePart: MimePart): Boolean;

Description

Gets a value indicating whether the specified System.Web.Services.Description.MimePart instance is a member of the MimePartCollection.

Return Value: true if mimePart is a member of the MimePartCollection; otherwise, false. A System.Web.Services.Description.MimePart instance.

CopyTo

[C#] public void CopyTo(MimePart[ ] array, int index);

[C++] public: void CopyTo(MimePart* array[ ], int index);

[VB] Public Sub CopyTo(ByVal array( ) As MimePart, ByVal index As Integer)

[JScript] public function CopyTo(array: MimePart[ ], index: int);

Description

Copies the entire MimePartCollection to a compatible one-dimensional array of type System.Web.Services.Description.MimePart, starting at the specified zero-based index of the target array. An array of type System.Web.Services.Description.MimePart serving as the destination of the copy action. The zero-based index at which to start placing the copied collection.

IndexOf

[C#] public int IndexOf(MimePart mimePart);

[C++] public: int IndexOf(MimePart* mimePart);

[VB] Public Function IndexOf(ByVal mimePart As MimePart) As Integer

[JScript] public function IndexOf(mimePart: MimePart): int;

Description

Searches for the specified System.Web.Services.Description.MimePart instance and returns the zero-based index of the first occurrence within the collection.

Return Value: Returns a 32-bit signed integer. A System.Web.Services.Description.MimePart object for which to search the MimePartCollection.

Insert

[C#] public void Insert(int index, MimePart mimePart);

[C++] public: void Insert(int index, MimePart* mimePart);

[VB] Public Sub Insert(ByVal index As Integer, ByVal mimePart As MimePart)

[JScript] public function Insert(index: int, mimePart: MimePart);

Description

Adds the specified System.Web.Services.Description.MimePart instance to the MimePartCollection at the specified index.

If the number of items in the collection already equals the collection's capacity, the capacity is doubled by automatically reallocating the internal array before the new element is inserted. The zero-based index at which to insert mimePart. The System.Web.Services.Description.MimePart to add to the collection.

Remove

[C#] public void Remove(MimePart mimePart);

[C++] public: void Remove(MimePart* mimePart);

[VB] Public Sub Remove(ByVal mimePart As MimePart)

[JScript] public function Remove(mimePart: MimePart);

Description

Removes the first occurrence of the specified System.Web.Services.Description.MimePart from the MimePartCollection.

This method performs a linear search; therefore, the average execution time is proportional to System.Web.Services.

Description.MimePartCollection.Count. A System.Web.Services.Description.MimePart instance for which to search the collection.

MimeTextBinding class (System.Web.Services.Description)

ToString

Description

Represents an extensibility element added to an System.Web.Services.Description.InputBinding, an System.Web.Services.Description.OutputBinding or a System.Web.Services.Description.MimePart, specifying the text patterns for which to search the HTTP transmission. This class cannot be inherited.

ToString

[C#] public const string Namespace;

[C++] public: const String* Namespace;

[VB] Public Const Namespace As String

[JScript] public var Namespace: String;

Description

Specifies the URI for the XML namespace of the MimeTextBinding class. This field is constant.

MimeTextBinding

Example Syntax:

ToString

[C#] public MimeTextBinding( );

[C++] public: MimeTextBinding( );

[VB] Public Sub New( )

[JScript] public function MimeTextBinding( );

Handled

Matches

ToString

Description

Gets the collection of MIME text patterns for which the HTTP transmission is searched.

Parent

Required

MimeTextMatch class (System.Web.Services.Description)

ToString

Description

Represents a text pattern for which the HTTP transmission is searched. This class cannot be inherited.

MimeTextMatch

Example Syntax:

ToString

[C#] public MimeTextMatch( );

[C++] public: MimeTextMatch( );

[VB] Public Sub New( )

[JScript] public function MimeTextMatch( );

Capture

ToString

[C#] public int Capture {get; set;}

[C++] public: _property int get_Capture( );public: _property void set_Capture(int);

[VB] Public Property Capture As Integer

[JScript] public function get Capture( ): int;public function set Capture(int);

Description

Returns a 32-bit signed integer. The default value is 0.

Group

ToString

[C#] public int Group {get; set;}

[C++] public: _property int get_Group( );public: _property void set_Group(int);

[VB] Public Property Group As Integer

[JScript] public function get Group( ): int;public function set Group(int);

Description

Gets or sets a value indicating the number of groups in which to place the results of the text search.

The value of this property should be less than or equal to the value of the System.Web.Services.Description. MimeTextMatch.Repeats property. It is recommended that developers use the default value.

IgnoreCase

ToString

[C#] public bool IgnoreCase {get; set;}

[C++] public: _property bool get_IgnoreCase( );public: _property void set_IgnoreCase(bool);

[VB] Public Property IgnoreCase As Boolean

[JScript] public function get IgnoreCase( ): Boolean;public function set IgnoreCase(Boolean);

Description

Gets or sets a value indicating whether the search should disregard the case of the text to be searched.

Matches

ToString

[C#] public MimeTextMatchCollection Matches {get;}

[C++] public: _property MimeTextMatchCollection* get_Matches( );

[VB] Public ReadOnly Property Matches As MimeTextMatchCollection

[JScript] public function get Matches( ): MimeTextMatchCollection;

Description

Name

ToString

[C#] public string Name {get; set;}

[C++] public: _property String* get_Name( );public: _property void set_Name(String*);

[VB] Public Property Name As String

[JScript] public function get Name( ): String;public function set Name(String);

Description

Gets or sets the name of the MimeTextMatch instance.

Pattern

ToString

[C#] public string Pattern {get; set;}

[C++] public: _property String* get_Pattern( );public: _property void set_Pattern(String*);

[VB] Public Property Pattern As String

[JScript] public function get Pattern( ): String;public function set Pattern(String);

Description

Gets or sets the text pattern for the search.

The value of this property can contain wildcard characters.

Repeats

ToString

[C#] public int Repeats {get; set;}

[C++] public: _property int get_Repeats( );public: _property void set_Repeats(int);

[VB] Public Property Repeats As Integer

[JScript] public function get Repeats( ): int;public function set Repeats(int);

Description

Gets or sets a value indicating the number of times the search is to be performed.

In a case where there is more than one possible match, a property value of 1 will return only the first match found.

RepeatsString

ToString

[C#] public string RepeatsString {get; set;}

[C++] public: _property String* get_RepeatsString( );

public: _property void set_RepeatsString(String*);

[VB] Public Property RepeatsString As String

[JScript] public function get RepeatsString( ): String;public function set Repeats String(String);

Description

Gets or sets a value indicating the number of times the search is to be performed.

This property returns the same information as the System.Web.Services.Description.MimeTextMatch.Repeats property, but as a string rather than a 32-bit signed integer. A value of "*" corresponds to System.Int32.MaxValue.

Type

ToString

[C#] public string Type {get; set;}

[C++] public: _property String* get_Type( );public: _property void set Type(String*);

[VB] Public Property Type As String

[JScript] public function get Type( ): String;public function set Type(String);

Description

Gets or sets a value indicating the MIME format of the text to be searched.

This property returns an empty string (" ") if its value has not been set.

MimeTextMatchCollection class (System.Web.Services.Description)

ToString

Description

Provides a collection of System.Web.Services.Description.MimeTextMatch instances. This class cannot be inherited.

MimeTextMatchCollection

Example Syntax:

ToString

[C#] public MimeTextMatchCollection( );

[C++] public: MimeTextMatchCollection( );

[VB] Public Sub New( )

[JScript] public function MimeTextMatchCollection( );

Count

InnerList

Item

ToString

Description

Gets or sets the value of a member of the MimeTextMatchCollection at the specified zero-based index. The zero-based index of the MimeTextMatch whose value is returned or modified.

List

Add

[C#] public int Add(MimeTextMatch match);

[C++] public: int Add(MimeTextMatch* match);

[VB] Public Function Add(ByVal match As MimeTextMatch) As Integer

[JScript] public function Add(match: MimeTextMatch): int;

Description

Adds the specified System.Web.Services.Description.MimeTextMatch instance to the end of the MimeTextMatchCollection.

Return Value: Returns the zero-based index where match has been added. The System.Web.Services.Description. MimeTextMatch to be added to the collection.

Contains

[C#] public bool Contains(MimeTextMatch match);

[C++] public: bool Contains(MimeTextMatch* match);

[VB] Public Function Contains(ByVal match As MimeTextMatch) As Boolean

[JScript] public function Contains(match: MimeTextMatch): Boolean;

Description

Gets a value indicating whether the specified System.Web.Services.Description.MimeTextMatch instance is a member of the MimeTextMatchCollection.

Return Value: true if match is a member of the MimeTextMatchCollection; otherwise, false. A System.Web.Services.Description.MimeTextMatch instance.

CopyTo

[C#] public void CopyTo(MimeTextMatch[ ] array, int index);

[C++] public: void CopyTo(MimeTextMatch* array[ ], int index);

[VB] Public Sub CopyTo(ByVal array( ) As MimeTextMatch, ByVal index As Integer)

[JScript] public function CopyTo(array: MimeTextMatch[ ], index: int);

Description

Copies the entire MimeTextMatchCollection to a compatible one-dimensional array of type System.Web.Services.Description.MimeTextMatch, starting at the specified zero-based index of the target array. An array of type System.Web.Services.Description.MimeTextMatch serving as the destination of the copy action. The zero-based index at which to start placing the copied collection.

IndexOf

[C#] public int IndexOf(MimeTextMatch match);

[C++] public: int IndexOf(MimeTextMatch* match);

[VB] Public Function IndexOf(ByVal match As MimeTextMatch) As Integer

[JScript] public function IndexOf(match: MimeTextMatch): int;

Description

Searches for the specified System.Web.Services.Description.MimeTextMatch instance and returns the zero-based index of the first occurrence within the collection.

Return Value: Returns a 32-bit signed integer. A System.Web.Services.Description.MimeTextMatch object for which to search the MimeTextMatchCollection.

Insert

[C#] public void Insert(int index, MimeTextMatch match);

[C++] public: void Insert(int index, MimeTextMatch* match);

[VB] Public Sub Insert(ByVal index As Integer, ByVal match As MimeTextMatch)

[JScript] public function Insert(index: int, match: MimeTextMatch);

Description

Adds the specified System.Web.Services.Description. MimeTextMatch instance to the MimeTextMatchCollection at the specified index.

If the number of items in the collection already equals the collection's capacity, the capacity is doubled by automatically reallocating the internal array before the new element is inserted. The zero-based index at which to insert match. The System.Web.Services.Description.MimeTextMatch to add to the collection.

Remove

[C#] public void Remove(MimeTextMatch match);

[C++] public: void Remove(MimeTextMatch* match);

[VB] Public Sub Remove(ByVal match As MimeTextMatch)

[JScript] public function Remove(match: MimeTextMatch);

Description

Removes the first occurrence of the specified System.Web. Services.Description.MimeTextMatch instance from the MimeTextMatchCollection.

This method performs a linear search; therefore, the average execution time is proportional to System.Web.Services. Description.MimeTextMatchCollection.Count. A System. Web.Services.Description.MimeTextMatch instance for which to search the collection.

MimeXmlBinding class (System.Web.Services.Description)

ToString

Description

Represents an extensibility element added to a System. Web.Services.Description.MimePart, an System.Web.Services.Description.InputBinding or an System.Web.Services. Description.OutputBinding. Specifies the schema for XML messages that are not SOAP compliant. This class cannot be inherited.

MimeXmlBinding

Example Syntax:

ToString

[C#] public MimeXmlBinding( );

[C++] public: MimeXmlBinding( );

[VB] Public Sub New( )

[JScript] public function MimeXmlBinding( );

Handled

Parent

Part

ToString

Description

Gets or sets the name of the System.Web.Services.Description.MessagePart to which the MimeXmlBinding applies.

Required

Operation class (System.Web.Services.Description)

ToString

Description

Provides an abstract definition of an action supported by the Web Service. This class cannot be inherited.

Exactly one instance of this class will be a member of the System.Web.Services.Description.Operation.Messages property of the parent System.Web.Services.Description. Operation.

Operation

Example Syntax:

ToString

[C#] public Operation( );

[C++] public: Operation( );

[VB] Public Sub New( )

[JScript] public function Operation( );

Documentation

Faults

ToString

Description

Gets the collection of faults, or error messages, defined by the System.Web.Services.Description.Operation instance.

Messages

ToString

[C#] public OperationMessageCollection Messages {get;}

[C++] public: _property OperationMessageCollection* get_Messages( );

[VB] Public ReadOnly Property Messages As OperationMessageCollection

[JScript] public function get Messages( ): OperationMessageCollection;

Description

Gets the collection of System.Web.Services.Description.Message instances defined by the System.Web.Services.Description.Operation instance.

Because an Operation instance is associated with exactly one System.Web.Services.Description.OperationInput and exactly one System.Web.Services.Description. OperationOutput, only one instance of each can be a member of this collection, and thus the collection can have a maximum of two members.

Name

ToString

[C#] public string Name {get; set;}

[C++] public: _property String* get_Name( );public: _property void set_Name(String*);

[VB] Public Property Name As String

[JScript] public function get Name( ): String;public function set Name(String);

Description

Gets or sets the name of the System.Web.Services.Description.Operation instance.

Returns an empty string (" ") if the property value has not been set.

ParameterOrder

ToString

[C#] public string[ ] ParameterOrder {get; set;}

[C++] public: _property String* get_ParameterOrder( );public: _property void set_ParameterOrder(String* _gc[ ]);

[VB] Public Property ParameterOrder As String( )

[JScript] public function get ParameterOrder( ):

String[ ];public function set ParameterOrder(String[ ]);

Description

Gets or sets an array of elements contained in the System. Web.Services.Description.Operation.ParameterOrderString.

Note that the elements of this array are identical to those of the System.Web.Services.Description. Operation.ParameterOrderString, but housed in an array rather than a space-delimited string.

ParameterOrderString

ToString

[C#] public string ParameterOrderString {get; set;}

[C++] public: _property String* get_ParameterOrder String( );public: _property void set ParameterOrderString (String*);

[VB] Public Property ParameterOrderString As String

[JScript] public function get ParameterOrderString( ): String; public function set ParameterOrderString(String);

Description

An optional RPC-signature ordering specification for request/response or solicit/response operations. The value is a list of names of System.Web.Services.Description.MessagePart instances separated by a single space.

The named System.Web.Services.Description.MessagePart instances must adhere to the following rules: The order of the named System.Web.Services.Description.MessagePart instances reflects the order of the parameters in the RPC signature.

PortType

ToString

[C#] public PortType PortType {get;}

[C++] public: _property PortType* get_PortType( );

[VB] Public ReadOnly Property PortType As PortType

[JScript] public function get PortType( ): PortType;

Description

Gets the System.Web.Services.Description.PortType of which the Operation is a member.

IsBoundBy

[C#] public bool IsBoundBy(OperationBinding operationBinding);

[C++] public: bool IsBoundBy(OperationBinding* operationBinding);

[VB] Public Function IsBoundBy(ByVal operationBinding As OperationBinding) As Boolean

[JScript] public function IsBoundBy(operationBinding: OperationBinding): Boolean;

Description

Gets a value indicating whether the specified System.Web.Services.Description.OperationBinding is used in the Operation instance.

Return Value: true if the Operation instance uses operationBinding; otherwise, false. An System.Web.Services.Description.OperationBinding instance to be checked to determine whether it is used by the Operation.

OperationBinding class (System.Web.Services.Description)

ToString

Description

Provides specifications for protocols and data formats for the messages used in the action supported by the Web Service. This class cannot be inherited.

This class contains all the System.Web.Services.Description.Binding elements required for the actions supported by the Web Service.

OperationBinding

Example Syntax:

ToString

[C#] public OperationBinding( );

[C++] public: OperationBinding( );

[VB] Public Sub New( )

[JScript] public function OperationBinding( );

Binding

ToString

[C#] public Binding Binding {get;}

[C++] public: _property Binding* get_Binding( );

[VB] Public ReadOnly Property Binding As Binding

[JScript] public function get Binding( ): Binding;

Description

The System.Web.Services.Description.Binding of which the System.Web.Services.Description.OperationBinding instance is a member.

Documentation

Extensions

ToString

Description

Gets the System.Web.Services.Description. ServiceDescriptionFormatExtensionCollection specific to the System. Web.Services.Description.OperationBinding instance.

Faults

ToString

[C#] public FaultBindingCollection Faults {get;}

[C++] public: _property FaultBindingCollection* get_Faults( );

[VB] Public ReadOnly Property Faults As FaultBindingCollection

[JScript] public function get Faults( ): FaultBindingCollection;

Description

Gets the System.Web.Services.Description. FaultBindingCollection associated with the System.Web. Services.Description.OperationBinding instance.

Input

ToString

[C#] public InputBinding Input {get; set;}

[C++] public: _property InputBinding* get_Input( );public: _property void
set_Input(InputBinding*);

[VB] Public Property Input As InputBinding

[JScript] public function get Input( ): InputBinding;public function set Input(InputBinding);

Description

Gets or sets the System.Web.Services.Description. InputBinding associated with the System.Web.Services.Description.OperationBinding instance.

An OperationBinding will be associated with exactly one System.Web.Services.Description.InputBinding.

Name

ToString

[C#] public string Name {get; set;}

[C++] public: _property String* get_Name( );public: _property void
set_Name(String*);

[VB] Public Property Name As String

[JScript] public function get Name( ): String;public function set Name(String);

Description

Gets or sets the name of the OperationBinding instance.

In WSDL format, this property is realized as the name attribute of the tag enclosed within the tags. Note that an empty string (" ") is returned if this property value has not been set.

Output

ToString

[C#] public OutputBinding Output {get; set;}

[C++] public: _property OutputBinding* get_Output( );public: _property void
set_Output(OutputBinding*);

[VB] Public Property Output As OutputBinding

[JScript] public function get Output( ): OutputBinding;public function set Output(OutputBinding);

Description

Gets or sets the System.Web.Services.Description. OutputBinding associated with the System.Web.Services. Description.OperationBinding instance.

An OperationBinding will be associated with exactly one System.Web.Services.Description.OutputBinding.

OperationBindingCollection class (System.Web.Services.Description)

ToString

Description

Represents a collection of System.Web.Services.Description.OperationBinding objects. This class cannot be inherited.

Count

InnerList

Item

ToString

Description

Gets or sets the value of a System.Web.Services.Description.OperationBinding at the specified zero-based index. The zero-based index of the System.Web.Services.Description.OperationBinding whose value is modified or returned.

List

Table

Add

[C#] public int Add(OperationBinding bindingOperation);

[C++] public: int Add(OperationBinding* bindingOperation);

[VB] Public Function Add(ByVal bindingOperation As OperationBinding) As Integer

[JScript] public function Add(bindingOperation: OperationBinding): int;

Description

Adds the specified System.Web.Services.Description.OperationBinding instance to the end of the OperationBindingCollection.

Return Value: Returns the zero-based index where bindingOperation has been added. The System.Web.Services.Description.OperationBinding to be added to the collection.

Contains

[C#] public bool Contains(OperationBinding bindingOperation);

[C++] public: bool Contains(OperationBinding* bindingOperation);

[VB] Public Function Contains(ByVal bindingOperation As OperationBinding) As Boolean

[JScript] public function Contains(bindingOperation: OperationBinding): Boolean;

Description

Gets a value indicating whether the specified System.Web.Services.Description.OperationBinding is a member of the OperationBindingCollection.

Return Value: true if bindingOperation is a member of the OperationBindingCollection; otherwise, false. An System.Web.Services.Description.OperationBinding object.

CopyTo

[C#] public void CopyTo(OperationBinding[ ] array, int index);

[C++] public: void CopyTo(OperationBinding* array[ ], int index);

[VB] Public Sub CopyTo(ByVal array( ) As OperationBinding, ByVal index As Integer)

[JScript] public function CopyTo(array: OperationBinding[ ], index: int);

Description

Copies the entire OperationBindingCollection to a compatible one-dimensional array of type System.Web.Services.Description.OperationBinding, starting at the specified zero-based index of the target array. An array of type System.Web.Services.Description.OperationBinding that serves as the destination for the copy action. The zero-based index at which to start placing the copied collection into the target array.

IndexOf

[C#] public int IndexOf(OperationBinding bindingOperation);

[C++] public: int IndexOf(OperationBinding* bindingOperation);

[VB] Public Function IndexOf(ByVal bindingOperation As OperationBinding) As Integer

[JScript] public function IndexOf(bindingOperation: OperationBinding): int;

Description

Searches for the specified System.Web.Services.Description.OperationBinding and returns the zero-based index of the first occurrence within the OperationBindingCollection.

Return Value: Returns a 32-bit signed integer. An System.Web.Services.Description.OperationBinding object.

Insert

[C#] public void Insert(int index, OperationBinding bindingOperation);

[C++] public: void Insert(int index, OperationBinding* bindingOperation);

[VB] Public Sub Insert(ByVal index As Integer, ByVal bindingOperation As OperationBinding)

[JScript] public function Insert(index: int, bindingOperation: OperationBinding);

Description

Adds the specified System.Web.Services.Description.OperationBinding instance to the OperationBindingCollection at the specified index.

If the number of items in the collection already equals the collection's capacity, the capacity is doubled by automatically reallocating the internal array before the new element is inserted. The zero-based index at which to insert bindingOperation. The System.Web.Services.Description. OperationBinding to be added to the collection.

Remove

[C#] public void Remove(OperationBinding bindingOperation);

[C++] public: void Remove(OperationBinding* bindingOperation);

[VB] Public Sub Remove(ByVal bindingOperation As OperationBinding)

[JScript] public function Remove(bindingOperation: OperationBinding);

Description

Removes the first occurrence of the specified System.Web.Services.Description.OperationBinding from the OperationBindingCollection.

This method performs a linear search; therefore, the average execution time is proportional to System.Web.Services.Description.OperationBindingCollection.Count. An System.Web.Services.Description.OperationBinding object.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent System.Web.Services.Description.Binding of a member of the OperationBindingCollection. An object, of type System.Web.Services.Description. OperationBinding, within the collection. The object, of type System.Web.Services.Description.Binding, to be set as the parent.

OperationCollection class (System.Web.Services.Description)

ToString

Description

Represents a collection of System.Web.Services.Description.Operation objects. This class cannot be inherited.

Count

InnerList

Item

ToString

Description

Gets or sets the value of a System.Web.Services.Description.Operation at the specified zero-based index. The zero-based index of the System.Web.Services.Description. Operation whose value is modified or returned.

List

Table

Add

[C#] public int Add(Operation operation);

[C++] public: int Add(Operation* operation);

[VB] Public Function Add(ByVal operation As Operation) As Integer

[JScript] public function Add(operation: Operation): int;

Description

Adds the specified System.Web.Services.Description. Operation to the end of the OperationCollection.

Return Value: Returns the zero-based index where operation has been added. The System.Web.Services.Description. Operation to be added to the OperationCollection.

Contains

[C#] public bool Contains(Operation operation);

[C++] public: bool Contains(Operation* operation);

[VB] Public Function Contains(ByVal operation As Operation) As Boolean

[JScript] public function Contains(operation: Operation): Boolean;

Description

Gets a value indicating whether the specified System.Web. Services.Description.Operation is a member of the OperationCollection.

Return Value: true if operation is a member of the OperationCollection; otherwise, false. An System.Web.Services.Description.Operation object.

CopyTo

[C#] public void CopyTo(Operation[ ] array, int index);

[C++] public: void CopyTo(Operation* array[ ], int index);

[VB] Public Sub CopyTo(ByVal array( ) As Operation, ByVal index As Integer)

[JScript] public function CopyTo(array: Operation[ ], index: int);

Description

Copies the entire OperationCollection to a compatible one-dimensional array of type System.Web.Services.Description. Operation, starting at the specified index of the target array. An array of type System.Web.Services.Description. Operation serving as the destination for the copy action. The zero-based index at which to start placing the copied collection.

IndexOf

[C#] public int IndexOf(Operation operation);

[C++] public: int IndexOf(Operation* operation);

[VB] Public Function IndexOf(ByVal operation As Operation) As Integer

[JScript] public function IndexOf(operation: Operation): int;

Description

Searches for the specified System.Web.Services.Description.Operation and returns the zero-based index of the first occurrence within the OperationCollection.

Return Value: Returns a 32-bit signed integer. An System. Web.Services.Description.Operation object.

Insert

[C#] public void Insert(int index, Operation operation);

[C++] public: void Insert(int index, Operation* operation);

[VB] Public Sub Insert(ByVal index As Integer, ByVal operation As Operation)

[JScript] public function Insert(index: int, operation: Operation);

Description

Adds the specified System.Web.Services.Description. Operation instance to the OperationCollection at the specified index.

If the number of items in the collection already equals the collection's capacity, the capacity is doubled by automatically reallocating the internal array before the new element is inserted. The zero-based index at which to insert operation. The System.Web.Services.Description.Operation to be added to the OperationCollection.

Remove

[C#] public void Remove(Operation operation);

[C++] public: void Remove(Operation* operation);

[VB] Public Sub Remove(ByVal operation As Operation)

[JScript] public function Remove(operation: Operation);

Description

Removes the first occurrence of the specified System.Web. Services.Description.Operation from the OperationCollection.

This method performs a linear search; therefore, the average execution time is proportional to System.Web.Services. Description.OperationCollection.Count. The System.Web. Services.Description.Operation object to be removed from the Collection.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent System.Web.Services.Description. PortType of a member of OperationCollection. An object, of type System.Web.Services.Description.Operation, within the OperationCollection. The object, of type System.Web.Services.Description.PortType, to set as the parent.

OperationFault class (System.Web.Services.Description)

ToString

Description

Defines the specifications for error messages returned by the Web Service. This class cannot be inherited.

Instances of this class will be members of the System.Web.Services.Description.Operation.Faults property of the parent Operation.

OperationFault

Example Syntax:

ToString

[C#] public OperationFault( );

[C++] public: OperationFault( );

[VB] Public Sub New( )

[JScript] public function OperationFault( );

Documentation

Message

Name

Operation

OperationFaultCollection class (System.Web.Services.Description)

ToString

Description

Represents a collection of System.Web.Services.Description.OperationFault objects. This class cannot be inherited.

Count

InnerList

Item

ToString

System.Web.Services.Description.OperationFault

Description

Gets or sets the value of a System.Web.Services.Description.OperationFault at the specified zero-based index. The zero-based index of the System.Web.Services.Description.OperationFault whose value is modified or returned.

Item

ToString

[C#] public OperationFault this[string name] {get;}

[C++] public: _property OperationFault* get_Item(String* name);

[VB] Public Default ReadOnly Property Item(ByVal name As String) As OperationFault

[JScript] returnValue=OperationFaultCollectionObject.Item (name);

Description

Gets an System.Web.Services.Description.OperationFault by its System.Web.Services.Description. OperationFault.Name property. The string value representing the name of the System.Web.Services.Description. OperationFault returned.

List

Table

Add

[C#] public int Add(OperationFault operationFaultMessage);

[C++] public: int Add(OperationFault* operationFaultMessage);

[VB] Public Function Add(ByVal operationFaultMessage As OperationFault) As Integer

[JScript] public function Add(operationFaultMessage: OperationFault): int;

Description

Adds the specified System.Web.Services.Description.OperationFault to the end of the OperationFaultCollection.

Return Value: Returns the zero-based index where operationFaultMessage has been added. The System.Web.Services.Description.OperationFault to be added to the OperationFaultCollection.

Contains

[C#] public bool Contains(OperationFault operationFaultMessage);

[C++] public: bool Contains(OperationFault* operationFaultMessage);

[VB] Public Function Contains(ByVal operationFaultMessage As OperationFault) As Boolean

[JScript] public function Contains(operationFaultMessage: OperationFault): Boolean;

Description

Gets a value indicating whether the specified System.Web.Services.Description.OperationFault is a member of the OperationFaultCollection.

Return Value: true if operationFaultMessage is a member of the OperationFaultCollection; otherwise, false. An System.Web.Services.Description.OperationFault object.

CopyTo

[C#] public void CopyTo(OperationFault[ ] array, int index);

[C++] public: void CopyTo(OperationFault* array[ ], int index);

[VB] Public Sub CopyTo(ByVal array( ) As OperationFault, ByVal index As Integer)

[JScript] public function CopyTo(array: OperationFault[ ], index: int);

Description

Copies the entire System.Web.Services.Description.OperationFaultCollection to a compatible one-dimensional array, starting at the specified zero-based index of the target array. An array of type System.Web.Services.Description.OperationFault serving as the destination of the copy action. The zero-based index at which to start placing the copied collection.

GetKey

[C#] protected override string GetKey(object value);

[C++] protected: String* GetKey(Object* value);

[VB] Overrides Protected Function GetKey(ByVal value As Object) As String

[JScript] protected override function GetKey(value: Object): String;

Description

Returns the name of the System.Web.Services.Description.OperationFault associated with the value passed by reference. An object for which to return the name.

IndexOf

[C#] public int IndexOf(OperationFault operationFaultMessage);

[C++] public: int IndexOf(OperationFault* operationFaultMessage);

[VB] Public Function IndexOf(ByVal operationFaultMessage As OperationFault) As Integer

[JScript] public function IndexOf(operationFaultMessage: OperationFault): int;

Description

Searches for the specified System.Web.Services.Description.OperationFault and returns the zero-based index of the first occurrence within the collection.

Return Value: Returns a 32-bit signed integer. An System.Web.Services.Description.OperationFault object.

Insert

[C#] public void Insert(int index, OperationFault operationFaultMessage);

[C++] public: void Insert(int index, OperationFault* operationFaultMessage);

[VB] Public Sub Insert(ByVal index As Integer, ByVal operationFaultMessage As OperationFault)

[JScript] public function Insert(index: int, operationFaultMessage: OperationFault);

Description

Adds the specified System.Web.Services.Description.OperationFault to the OperationFaultCollection at the specified zero-based index.

If the number of items in the collection already equals the collection's capacity, the capacity is doubled by automatically reallocating the internal array before the new element is inserted. The zero-based index at which to insert operationFaultMessage. The System.Web.Services.Description.OperationFault to be added to the Collection.

Remove

[C#] public void Remove(OperationFault operationFaultMessage);

[C++] public: void Remove(OperationFault* operationFaultMessage);

[VB] Public Sub Remove(ByVal operationFaultMessage As OperationFault)

[JScript] public function Remove(operationFaultMessage: OperationFault);

Description

Removes the first occurrence of the specified System.Web.Services.Description.OperationFault from the OperationFaultCollection.

This method performs a linear search; therefore, the average execution time is proportional to System.Web.Services.Description.OperationFaultCollection.Count. The System.Web.Services.Description.OperationFault object to be removed from the collection.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent System.Web.Services.Description. Operation of a member of the OperationFaultCollection. An object, of class System.Web.Services.Description. OperationFault, within the collection. The object, of class System.Web.Services.Description.Operation, to be set as the parent.

OperationFlow enumeration (System.Web.Services.Description)

ToString

Description

Specifies the type of transmission an endpoint of the Web Service can support.

Although Request-Response or Solicit-Response are logically correlated in the WSDL document, the concrete correlation information will be specified by a binding. For example, the request and response messages may be exchanged as part of one or two actual HTTP transmissions.

ToString

[C#] public const OperationFlow None;

[C++] public: const OperationFlow None;

[VB] Public Const None As OperationFlow

[JScript] public var None: OperationFlow;

Description

Indicates that the endpoint of the Web Service receives no transmissions.

ToString

[C#] public const OperationFlow Notification;

[C++] public: const OperationFlow Notification;

[VB] Public Const Notification As OperationFlow

[JScript] public var Notification: OperationFlow;

Description

Indicates that an endpoint of the Web Service sends a message.

ToString

[C#] public const OperationFlow OneWay;

[C++] public: const OperationFlow OneWay;

[VB] Public Const OneWay As OperationFlow

[JScript] public var OneWay: OperationFlow;

Description

Indicates that the endpoint of the Web Service receives a message.

ToString

[C#] public const OperationFlow RequestResponse;

[C++] public: const OperationFlow RequestResponse;

[VB] Public Const RequestResponse As OperationFlow

[JScript] public var RequestResponse: OperationFlow;

Description

Indicates that an endpoint of the Web Service receives a message, then sends a correlated message.

ToString

[C#] public const OperationFlow SolicitResponse;

[C++] public: const OperationFlow SolicitResponse;

[VB] Public Const SolicitResponse As OperationFlow

[JScript] public var SolicitResponse: OperationFlow;

Description

Indicates that an endpoint of the Web Service sends a message, then receives a correlated message.

OperationInput class (System.Web.Services.Description)

ToString

Description

Defines the specifications for input messages received by the Web Service. This class cannot be inherited.

Exactly one instance of this class will be a member of the System.Web.Services.Description.Operation.Messages property of the parent System.Web.Services.Description-.Operation OperationInput Example Syntax:

ToString

[C#] public OperationInput( );

[C++] public: OperationInput( );

[VB] Public Sub New( )

[JScript] public function OperationInput( );

Documentation

Message

Name

Operation

OperationMessage class (System.Web.Services.Description)

ToString

Description

Serves as the base class for the following classes: System.Web.Services.Description.OperationFaultSystem.Web.Services.Description.OperationInputSystem.Web.Services.Description.OperationOutput In its default implementation, an OperationMessage instance refers to any message type passed by the action of a service.

OperationMessage

Example Syntax:

ToString

[C#] protected OperationMessage( );

[C++] protected: OperationMessage( );
[VB] Protected Sub New( )
[JScript] protected function OperationMessage( );
Documentation
Message
ToString Description
Gets or sets an abstract, typed definition of the data being communicated.
Name
ToString
[C#] public string Name {get; set;}
[C++] public: _property String* get_Name( );public: _property void
set_Name(String*);
[VB] Public Property Name As String
[JScript] public function get Name( ): String;public function set Name(String);

Description
The name of the System.Web.Services.Description. OperationMessage instance.
Operation
ToString
[C#] public Operation Operation {get;}
[C++] public: _property Operation* get_Operation( );
[VB] Public ReadOnly Property Operation As Operation
[JScript] public function get Operation( ): Operation;

Description
Gets the System.Web.Services.Description.Operation of which the System.Web.Services.Description. OperationMessage instance is a member.
OperationMessageCollection class (System.Web.Services.Description)
ToString Description
Represents a collection of System.Web.Services.Description.OperationInput and System.Web.Services.Description. OperationOutput messages related to a Web Service. This class cannot be inherited.

An instance of this class will be returned by the System. Web.Services.Description.Operation.Messages property of the parent System.Web.Services.Description.Operation. As such, it can have exactly two members, one an System.Web. Services.Description.OperationInput and the other an System.Web.Services.Description.OperationOutput.
Count
Flow
ToString Description
Gets the type of transmission supported by the OperationMessageCollection.
InnerList
Input
ToString Description
Gets the first occurrence of an System.Web.Services.Description.OperationInput instance within the collection.
Th
Item
ToString
[C#] public OperationMessage this[int index] {get; set;}
[C++] public: _property OperationMessage* get_Item(int index);public:
_property void set_Item(int index, OperationMessage*);
[VB] Public Default Property Item(ByVal index As Integer) As OperationMessage
[JScript]
returnValue=OperationMessageCollectionObject.Item (index);OperationMessageCollectionObject.Item(index) =returnValue;

Description
Gets or sets the value of an System.Web.Services.Description.OperationMessage at the specified zero-based index. The zero-based index of the System.Web.Services.Description.OperationMessage whose value is modified or returned.
List
Output
ToString Description
Gets the first occurrence of an System.Web.Services.Description.OperationOutput within the collection.

The search is performed in index order; thus the property returns only the System.Web.Services.Description. OperationOutput with the lowest-numbered index.
Table
Add
[C#] public int Add(OperationMessage operationMessage);
[C++] public: int Add(OperationMessage* operationMessage);
[VB] Public Function Add(ByVal operationMessage As OperationMessage) As Integer
[JScript] public function Add(operationMessage: OperationMessage): int;

Description
Adds the specified System.Web.Services.Description. OperationMessage to the end of the OperationMessageCollection.

Return Value: Returns the zero-based index where operationMessage has been added. The System.Web.Services.Description.OperationMessage to be added to the collection.
Contains
[C#] public bool Contains(OperationMessage operationMessage);
[C++] public: bool Contains(OperationMessage* operationMessage);
[VB] Public Function Contains(ByVal operationMessage As OperationMessage) As Boolean
[JScript] public function Contains(operationMessage: OperationMessage): Boolean;

Description
Gets a value indicating whether the specified System.Web.Services.Description.OperationMessage instance is a member of the OperationMessageCollection.

Return Value: true if operationMessage is a member of the OperationMessageCollection; otherwise, false. An System. Web.Services.Description.OperationMessage object.
CopyTo
[C#] public void CopyTo(OperationMessage[ ] array, int index);
[C++] public: void CopyTo(OperationMessage* array[ ], int index);
[VB] Public Sub CopyTo(ByVal array( ) As OperationMessage, ByVal index As Integer)
[JScript] public function CopyTo(array: OperationMessage[ ], index: int);

Description

Copies the entire OperationMessageCollection to a compatible one-dimensional array of type System.Web.Services.Description.OperationMessage, starting at the specified zero-based index of the target array. An array of type System.Web.Services.Description.OperationMessage serving as the destination of the copy action. The zero-based index at which to start placing the copied collection.

IndexOf

[C#] public int IndexOf(OperationMessage operationMessage);

[C++] public: int IndexOf(OperationMessage* operationMessage);

[VB] Public Function IndexOf(ByVal operationMessage As OperationMessage) As Integer

[JScript] public function IndexOf(operationMessage: OperationMessage): int;

Description

Searches for the specified OperationMessage instance and returns the zero-based index of the first occurrence within the OperationMessageCollection.

Return Value: Returns a 32-bit signed integer. An System.Web.Services.Description.OperationMessage object.

Insert

[C#] public void Insert(int index, OperationMessage operationMessage);

[C++] public: void Insert(int index, OperationMessage* operationMessage);

[VB] Public Sub Insert(ByVal index As Integer, ByVal operationMessage As OperationMessage)

[JScript] public function Insert(index: int, operationMessage: OperationMessage);

Description

Adds the specified System.Web.Services.Description.OperationMessage to the OperationMessageCollection at the specified zero-based index.

If the number of items in the collection already equals the collection's capacity, the capacity is doubled by automatically reallocating the internal array before the new element is inserted. The zero-based index at which to insert operationMessage. The System.Web.Services.Description. OperationMessage to be added to the OperationMessageCollection.

OnInsert

[C#] protected override void OnInsert(int index, object value);

[C++] protected: void OnInsert(int index, Object* value);

[VB] Overrides Protected Sub OnInsert(ByVal index As Integer, ByVal value As Object)

[JScript] protected override function OnInsert(index: int, value: Object);

Description

Performs validation upon insertion of an System.Web.Services.Description.OperationMessage at the specified specified.

This method overrides the base method in order to limit the number of collection members to two (an System.Web.Services.Description.OperationInput and an System.Web.Services.Description.OperationOutput). The zero-based index at which to insert the specified System.Web.Services.Description.OperationMessage. The System.Web.Services.Description.OperationMessage to be added to the OperationMessageCollection.

OnSet

[C#] protected override void OnSet(int index, object oldValue, object newValue);

[C++] protected: void OnSet(int index, Object* oldValue, Object* newValue);

[VB] Overrides Protected Sub OnSet(ByVal index As Integer, ByVal oldValue As Object, ByVal newValue As Object)

[JScript] protected override function OnSet(index: int, oldValue: Object, newValue: Object);

Description

Performs validation upon replacement of the specified member of the OperationMessageCollection with a new OperationMessage at the specified zero-based index.

This method overrides the base method in order to assure that the value replacing the existing value is of the same class as that existing value. Thus an System.Web.Services.Description.OperationInput must be replaced by an OperationInput, and an System.Web.Services.Description.OperationOutput must be replaced by an OperationOutput. The zero-based index at which to change oldValue to newValue. The object value to be replaced by newValue. The object value with which to replace oldValue.

OnValidate

[C#] protected override void OnValidate(object value);

[C++] protected: void OnValidate(Object* value);

[VB] Overrides Protected Sub OnValidate(ByVal value As Object)

[JScript] protected override function OnValidate(value: Object);

Description

Performs a check on the type of the specified object when validating it.

This method overrides the base method in order to assure that the instance represented by the value parameter is either of type System.Web.Services.Description.OperationInput or System.Web.Services.Description.OperationOutput. The object to be validated.

Remove

[C#] public void Remove(OperationMessage operationMessage);

[C++] public: void Remove(OperationMessage* operationMessage);

[VB] Public Sub Remove(ByVal operationMessage As OperationMessage)

[JScript] public function Remove(operationMessage: OperationMessage);

Description

Removes the first occurrence of the specified System.Web.Services.Description.OperationMessage from the OperationMessageCollection.

This method performs a linear search; therefore, the average execution time is proportional to Count. An System.Web.Services.Description.OperationMessage object.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent System.Web.Services.Description. Operation of the OperationMessageCollection. An object, of type System.Web.Services.Description.OperationMessage or a derived type, within the collection. The object, of type System.Web.Services.Description.Operation, to be set as the parent.

OperationOutput class (System.Web.Services.Description)

ToString

Description

Defines the specifications for output messages returned by the Web Service. This class cannot be inherited.

Exactly one instance of this class will be a member of the System.Web.Services.Description.Operation.Messages property of the parent System.Web.Services.Description. Operation OperationOutput Example Syntax:

ToString

[C#] public OperationOutput( );

[C++] public: OperationOutput( );

[VB] Public Sub New( )

[JScript] public function OperationOutput( );

Documentation

Message

Name

Operation

OutputBinding class (System.Web.Services.Description)

ToString

Description

Provides a set of specifications for data formats and protocols used by the Web Service for output messages. This class cannot be inherited.

OutputBinding

Example Syntax:

ToString

[C#] public OutputBinding( );

[C++] public: OutputBinding( );

[VB] Public Sub New( )

[JScript] public function OutputBinding( );

Documentation

Extensions

ToString

Description

Gets the System.Web.Services.Description. ServiceDescriptionFormatExtensionCollection associated with the OutputBinding instance.

Name

OperationBinding

Port class (System.Web.Services.Description)

ToString

Description

Defines an individual endpoint contained in the Web Service. This class cannot be inherited.

This class specifies a single address (URI) for a binding, which defines message format and protocol details for operations and messages for a given System.Web.Services.Description.PortType. The System.Web.Services.Description. Port.Binding property gets or sets those values for the Port instance.

Port

Example Syntax:

ToString

[C#] public Port( );

[C++] public: Port( );

[VB] Public Sub New( )

[JScript] public function Port( );

Binding

ToString

[C#] public XmlQualifiedName Binding {get; set;}

[C++] public: _property XmlQualifiedName* get_Binding( );public: _property void set_Binding(XmlQualifiedName*);

[VB] Public Property Binding As XmlQualifiedName

[JScript] public function get Binding( ): XmlQualifiedName; public function set Binding(XmlQualifiedName);

Description

Gets or sets the value of the XML binding attribute of the Port.

A binding defines message format and protocol details for operations and messages for a given System.Web.Services. Description.PortType. This property gets or sets those values for a specific Port.

Documentation

Extensions

ToString

Description

Gets the collection of extensibility elements contained in the Port.

Name

ToString

[C#] public string Name {get; set;}

[C++] public: _property String* get_Name( );public: _property void set_Name(String*);

[VB] Public Property Name As String

[JScript] public function get Name( ): String;public function set Name(String);

Description

Gets or sets the Name of the Port

Service

ToString

[C#] public Service Service {get;}

[C++] public: _property Service* get_Service( );

[VB] Public ReadOnly Property Service As Service

[JScript] public function get Service( ): Service;

Description

Gets the System.Web.Services.Description.Service of which the Port instance is a member.

PortCollection class (System.Web.Services.Description)

ToString

Description

Represents the collection of all System.Web.Services.Description.Port objects contained within a System.Web.Services.Description.Service. This class cannot be inherited.

Count

InnerList

Item

ToString

System.Web.Services.Description.Port

Description

Gets or sets the value of a System.Web.Services.Description.Port at the specified zero-based index. The zero-based index of the System.Web.Services.Description.Port whose value is modified or returned.

Item

ToString

[C#] public Port this[string name] {get;}

[C++] public: _property Port* get_Item(String* name);

[VB] Public Default ReadOnly Property Item(ByVal name As String) As Port

[JScript] returnValue=PortCollectionObject.Item(name);

Description

Gets the specified System.Web.Services.Description.Port by its System.Web.Services.Description.Port.Name property. A string value representing the name of the System.Web.Services.Description.Port returned.

List

Table

Add

[C#] public int Add(Port port);

[C++] public: int Add(Port* port);

[VB] Public Function Add(ByVal port As Port) As Integer

[JScript] public function Add(port: Port): int;

Description

Adds the specified System.Web.Services.Description.Port instance to the end of the PortCollection.

Return Value: Returns the index where the specified System.Web.Services.Description.Port instance has been added. The System.Web.Services.Description.Port to be added to the PortCollection.

Contains

[C#] public bool Contains(Port port);

[C++] public: bool Contains(Port* port);

[VB] Public Function Contains(ByVal port As Port) As Boolean

[JScript] public function Contains(port: Port): Boolean;

Description

Gets a value indicating whether the specified System.Web.Services.Description.Port instance is a member of the PortCollection.

Return Value: true if the specified System.Web.Services.Description.Port is a member of the PortCollection; otherwise, false. A System.Web.Services.Description.Port object.

CopyTo

[C#] public void CopyTo(Port[ ] array, int index);

[C++] public: void CopyTo(Port* array[ ], int index);

[VB] Public Sub CopyTo(ByVal array( ) As Port, ByVal index As Integer)

[JScript] public function CopyTo(array: Port[ ], index: int);

Description

Copies the entire System.Web.Services.Description. PortCollection to a one-dimensional array of type System. Web. Services.Description.Port, starting at the specified zero-based index of the target array. An array of type System. Web.Services.Description.Port serving as the destination of the copy action. The zero-based index at which to start placing the copied PortCollection.

GetKey

[C#] protected override string GetKey(object value);

[C++] protected: String* GetKey(Object* value);

[VB] Overrides Protected Function GetKey(ByVal value As Object) As String

[JScript] protected override function GetKey(value: Object): String;

Description

Returns the name of the System.Web.Services.Description.Port instance associated with the value passed by reference. A System.Web.Services.Description.Port instance for which to return the name.

IndexOf

[C#] public int IndexOf(Port port);

[C++] public: int IndexOf(Port* port);

[VB] Public Function IndexOf(ByVal port As Port) As Integer

[JScript] public function IndexOf(port: Port): int;

Description

Searches for the specified System.Web.Services.Description.Port instance and returns the zero-based index of the first occurrence within the PortCollection.

Return Value: Returns a 32-bit signed integer. A System.Web.Services.Description.Port object.

Insert

[C#] public void Insert(int index, Port port);

[C++] public: void Insert(int index, Port* port);

[VB] Public Sub Insert(ByVal index As Integer, ByVal port As Port)

[JScript] public function Insert(index: int, port: Port);

Description

Adds the specified System.Web.Services.Description.Port instance to the PortCollection at the specified index.

If the number of items in the collection already equals the collection's capacity, the capacity is doubled by automatically reallocating the internal array before the new element is inserted. The zero-based index at which to insert port. The System.Web.Services.Description.Port to be added to the collection.

Remove

[C#] public void Remove(Port port);

[C++] public: void Remove(Port* port);

[VB] Public Sub Remove(ByVal port As Port)

[JScript] public function Remove(port: Port);

Description

Removes the first occurrence of the specified System.Web.Services.Description.Port from the PortCollection.

This method performs a linear search; therefore, the average execution time is proportional to Count. A System.Web.Services.Description.Port object.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent System.Web.Services.Description.Service of a member of the PortCollection. An object, of type System.Web.Services.Description.Port, within the collection. The object, of type System.Web.Services.Description. Service, to set as the parent.

PortType class (System.Web.Services.Description)

ToString

Description

Represents a named set of abstract operations and the corresponding abstract messages. This class cannot be inherited.

PortType

Example Syntax:

ToString

[C#] public PortType( );

[C++] public: PortType( );

[VB] Public Sub New( )

[JScript] public function PortType( );

Documentation

Name

ToString

Description

Gets or sets the name of the System.Web.Services.Description.PortType instance.

Returns an empty string (" ") if the property value has not been assigned.

Operations

ToString

[C#] public OperationCollection Operations {get;}

[C++] public: _property OperationCollection* get_Operations( );

[VB] Public ReadOnly Property Operations As OperationCollection

[JScript] public function get Operations( ): OperationCollection;

Description

Gets the collection of System.Web.Services.Description.Operation instances defined by the System.Web.Services.Description.PortType instance.

ServiceDescription

ToString

[C#] public ServiceDescription ServiceDescription {get;}

[C++] public: _property ServiceDescription* get_ServiceDescription( );

[VB] Public ReadOnly Property ServiceDescription As ServiceDescription

[JScript] public function get ServiceDescription( ): ServiceDescription;

Description

Gets the System.Web.Services.Description. ServiceDescription of which the System.Web.Services.Description.PortType instance is a member.

PortTypeCollection class (System.Web.Services.Description)

ToString

Description

Represents a collection of System.Web.Services.Description.PortType objects, that is, a collection of sets of operations supported by the Web Service. This class cannot be inherited.

Count

InnerList

Item

ToString

System.Web.Services.Description.PortType

Description

Gets or sets the value of a System.Web.Services.Description.PortType at the specified zero-based index. The zero-based index of the System.Web.Services.Description. PortType whose value is modified or returned.

Item

ToString

[C#] public PortType this[string name] {get;}

[C++] public: _property PortType* get_Item(String* name);

[VB] Public Default ReadOnly Property Item(ByVal name As String) As PortType

[JScript] returnValue=PortTypeCollectionObject.Item (name);

Description

Gets the specified System.Web.Services.Description. PortType by its System.Web.Services.Description. PortType. Name property.

This method performs a linear search; therefore, the average execution time is proportional to System.Web.Services. Description.PortTypeCollection.Count. The string value representing the name of the System.Web.Services.Description. PortType returned.

List

Table

Add

[C#] public int Add(PortType portType);

[C++] public: int Add(PortType* portType);

[VB] Public Function Add(ByVal portType As PortType) As Integer

[JScript] public function Add(portType: PortType): int;

Description

Adds the specified System.Web.Services.Description. PortType to the end of the PortTypeCollection.

Return Value: Returns the index where the System.Web.Services.Description.PortType instance specified by the portType parameter has been added. The System.Web.Services. Description.PortType to be added to the PortTypeCollection.

Contains

[C#] public bool Contains(PortType portType);

[C++] public: bool Contains(PortType* portType);

[VB] Public Function Contains(ByVal portType As PortType) As Boolean

[JScript] public function Contains(portType: PortType): Boolean;

Description

Gets a value indicating whether the specified System.Web. Services.Description.PortType instance is a member of the PortTypeCollection.

Return Value: true if the specified System.Web.Services.Description.PortType instance is a member of the PortTypeCollection; otherwise, false. A System.Web.Services.Description.PortType object.

CopyTo

[C#] public void CopyTo(PortType[ ] array, int index);

[C++] public: void CopyTo(PortType* array[ ], int index);

[VB] Public Sub CopyTo(ByVal array( ) As PortType, ByVal index As Integer)

[JScript] public function CopyTo(array: PortType[ ], index: int);

Description

Copies the entire System.Web.Services.Description. PortTypeCollection to a one-dimensional array of type PortType, starting at the specified zero-based index of the target array. An array of type System.Web.Services.Description. PortType serving as the destination of the copy action. The zero-based index at which to start placing the copied PortTypeCollection.

GetKey

[C#] protected override string GetKey(object value);

[C++] protected: String* GetKey(Object* value);

[VB] Overrides Protected Function GetKey(ByVal value As Object) As String

[JScript] protected override function GetKey(value: Object): String;

Description

Returns the name of the System.Web.Services.Description.PortType associated with the value passed by reference. An object for which to return the name.

IndexOf

[C#] public int IndexOf(PortType portType);

[C++] public: int IndexOf(PortType* portType);

[VB] Public Function IndexOf(ByVal portType As PortType) As Integer

[JScript] public function IndexOf(portType: PortType): int;

Description

Searches for the specified System.Web.Services.Description.PortType instance and returns the zero-based index of the first occurrence within the PortTypeCollection.

Return Value: Returns a 32-bit signed integer. A System.Web.Services.Description.PortType object.

Insert

[C#] public void Insert(int index, PortType portType);

[C++] public: void Insert(int index, PortType* portType);

[VB] Public Sub Insert(ByVal index As Integer, ByVal portType As PortType)

[JScript] public function Insert(index: int, portType: PortType);

Description

Adds the specified System.Web.Services.Description.PortType instance to the PortTypeCollection at the specified zero-based index.

If the number of items in the collection already equals the collection's capacity, the capacity is doubled by automatically reallocating the internal array before the new element is inserted. The zero-based index at which to insert the specified System.Web.Services.Description.PortType instance. The System.Web.Services.Description.PortType to be added to the PortTypeCollection.

Remove

[C#] public void Remove(PortType portType);

[C++] public: void Remove(PortType* portType);

[VB] Public Sub Remove(ByVal portType As PortType)

[JScript] public function Remove(portType: PortType);

Description

Removes the first occurrence of the specified System.Web.Services.Description.PortType from the PortTypeCollection.

This method performs a linear search; therefore, the average execution time is proportional to Count. A System.Web.Services.Description.PortType object.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent System.Web.Services.Description.ServiceDescription of a member of System.Web.Services.Description.PortTypeCollection. An object, of type System.Web.Services.Description.PortType, within the PortTypeCollection. The object, of type System.Web.Services.Description.ServiceDescription, to set as the parent.

ProtocolImporter class (System.Web.Services.Description)

ToString

Description

ProtocolImporter

Example Syntax:

ToString

[C#] protected ProtocolImporter( );

[C++] protected: ProtocolImporter( );

[VB] Protected Sub New( )

[JScript] protected function ProtocolImporter( );

AbstractSchemas

ToString

[C#] public XmlSchemas AbstractSchemas {get;}

[C++] public: _property XmlSchemas* get_AbstractSchemas( );

[VB] Public ReadOnly Property AbstractSchemas As XmlSchemas

[JScript] public function get AbstractSchemas( ): XmlSchemas;

Description

Binding

ToString

[C#] public Binding Binding {get;}

[C++] public: _property Binding* get_Binding( );

[VB] Public ReadOnly Property Binding As Binding

[JScript] public function get Binding( ): Binding;

Description

ClassName

ToString

[C#] public string ClassName {get;}

[C++] public: _property String* get_ClassName( );

[VB] Public ReadOnly Property ClassName As String

[JScript] public function get ClassName( ): String;

Description

ClassNames

ToString

[C#] public CodeIdentifiers ClassNames {get;}

[C++] public: _property CodeIdentifiers* get_ClassNames( );

[VB] Public ReadOnly Property ClassNames As CodeIdentifiers

[JScript] public function get ClassNames( ): CodeIdentifiers;

Description

CodeNamespace

ToString

[C#] public CodeNamespace CodeNamespace {get;}

[C++] public: _property CodeNamespace* get_CodeNamespace( );

[VB] Public ReadOnly Property CodeNamespace As CodeNamespace

[JScript] public function get CodeNamespace( ): CodeNamespace;

Description

CodeTypeDeclaration

ToString

[C#] public CodeTypeDeclaration CodeTypeDeclaration {get;}

[C++] public: _property CodeTypeDeclaration* get_CodeTypeDeclaration( );

[VB] Public ReadOnly Property CodeTypeDeclaration As CodeTypeDeclaration

[JScript] public function get CodeTypeDeclaration( ): CodeTypeDeclaration;

Description

ConcreteSchemas

ToString

[C#] public XmlSchemas ConcreteSchemas {get;}

[C++] public: _property XmlSchemas* get_ConcreteSchemas( );

[VB] Public ReadOnly Property ConcreteSchemas As XmlSchemas

[JScript] public function get ConcreteSchemas( ): XmlSchemas;

Description
InputMessage
ToString
[C#] public Message InputMessage {get;}
[C++] public: _property Message* get_InputMessage( );
[VB] Public ReadOnly Property InputMessage As Message
[JScript] public function get InputMessage( ): Message;

Description
MethodName
ToString
[C#] public string MethodName {get;}
[C++] public: _property String* get_MethodName( );
[VB] Public ReadOnly Property MethodName As String
[JScript] public function get MethodName( ): String;

Description
Operation
ToString
[C#] public Operation Operation {get;}
[C++] public: _property Operation* get_Operation( );
[VB] Public ReadOnly Property Operation As Operation
[JScript] public function get Operation( ): Operation;

Description
OperationBinding
ToString
[C#] public OperationBinding OperationBinding {get;}
[C++] public: _property OperationBinding* get_Operation-Binding( );
[VB] Public ReadOnly Property OperationBinding As OperationBinding
[JScript] public function get OperationBinding( ): Operation-Binding;

Description
OutputMessage
ToString
[C#] public Message OutputMessage {get;}
[C++] public: _property Message* get_OutputMessage( );
[VB] Public ReadOnly Property OutputMessage As Message
[JScript] public function get OutputMessage( ): Message;

Description
Port
ToString
[C#] public Port Port {get;}
[C++] public: _property Port* get_Port( );
[VB] Public ReadOnly Property Port As Port
[JScript] public function get Port( ): Port;

Description
PortType
ToString
[C#] public PortType PortType {get;}
[C++] public: _property PortType* get_PortType( );
[VB] Public ReadOnly Property PortType As PortType
[JScript] public function get PortType( ): PortType;

Description
ProtocolName
ToString
[C#] public abstract string ProtocolName {get;}
[C++] public: _property virtual String* get_Protocol Name( )=0;
[VB] MustOverride Public ReadOnly Property Protocol-Name As String
[JScript] public abstract function get ProtocolName( ): String;

Description
Schemas
ToString
[C#] public XmlSchemas Schemas {get;}
[C++] public: _property XmlSchemas* get_Schemas( );
[VB] Public ReadOnly Property Schemas As XmlSchemas
[JScript] public function get Schemas( ): XmlSchemas;

Description
Service
ToString
[C#] public Service Service {get;}
[C++] public: _property Service* get_Service( );
[VB] Public ReadOnly Property Service As Service
[JScript] public function get Service( ): Service;

Description
ServiceDescriptions
ToString
[C#] public ServiceDescription Collection ServiceDescrip-tions {get;}
[C++] public: _property ServiceDescription Collection* get_ServiceDescription so;
[VB] Public ReadOnly Property ServiceDescriptions As Ser-viceDescription Collection
[JScript] public function get ServiceDescriptions( ): Service-Description Collection;

Description
Style
ToString
[C#] public ServiceDescriptionImportStyle Style {get;}
[C++] public: _property ServiceDescriptionImportStyle get_Style( );
[VB] Public ReadOnly Property Style As ServiceDescrip-tionImportStyle
[JScript] public function get Style( ): ServiceDescriptionIm-portStyle;

Description
Warnings
ToString
[C#] public ServiceDescriptionImportWarnings Warnings {get; set;}
[C++] public: _property ServiceDescriptionImportWarnings get_Warnings( );public: _property void set_Warnings(Ser-viceDescriptionImportWarnings);
[VB] Public Property Warnings As ServiceDescriptionIm-portWarnings
[JScript] public function get Warnings( ):
ServiceDescriptionImportWarnings;public function set Warnings(ServiceDescriptionImportWarnings);

Description
AddExtensionWarningComments
[C#] public void AddExtensionWarningComments(Co-deCommentStatementCollection comments, ServiceDe-scriptionFormatExtensionCollection extensions);
[C++] public: void
AddExtensionWarningComments(CodeCommentState-mentCollection* comments, ServiceDescriptionForma-tExtensionCollection* extensions);
[VB] Public Sub AddExtensionWarningComments(ByVal comments As CodeCommentStatementCollection, ByVal extensions As
ServiceDescriptionFormatExtensionCollection)
[JScript] public function AddExtensionWarningComments (comments
CodeCommentStatementCollection, extensions
ServiceDescriptionFormatExtensionCollection);

Description
BeginClass
[C#] protected abstract CodeTypeDeclaration BeginClass( );
[C++] protected: virtual CodeTypeDeclaration* BeginClass( )=0;
[VB] MustOverride Protected Function BeginClass( ) As CodeTypeDeclaration
[JScript] protected abstract function BeginClass( ): CodeTypeDeclaration;

Description
BeginNamespace
[C#] protected virtual void BeginNamespace( );
[C++] protected: virtual void BeginNamespace( );
[VB] Overridable Protected Sub BeginNamespace( )
[JScript] protected function BeginNamespace( );

Description
EndClass
[C#] protected virtual void EndClass( );
[C++] protected: virtual void EndClass( );
[VB] Overridable Protected Sub EndClass( )
[JScript] protected function EndClass( );

Description
EndNamespace
[C#] protected virtual void EndNamespace( );
[C++] protected: virtual void EndNamespace( );
[VB] Overridable Protected Sub EndNamespace( )
[JScript] protected function EndNamespace( );

Description
GenerateMethod
[C#] protected abstract CodeMemberMethod GenerateMethod( );
[C++] protected: virtual CodeMemberMethod* GenerateMethod( )=0;
[VB] MustOverride Protected Function GenerateMethod( ) As CodeMemberMethod
[JScript] protected abstract function GenerateMethod( ): CodeMemberMethod;

Description
IsBindingSupported
[C#] protected abstract bool IsBindingSupported( );
[C++] protected: virtual bool IsBindingSupported( )=0;
[VB] MustOverride Protected Function IsBindingSupported( ) As Boolean
[JScript] protected abstract function IsBindingSupported( ): Boolean;

Description
IsOperationFlowSupported
[C#] protected abstract bool IsOperationFlowSupported(OperationFlow flow);
[C++] protected: virtual bool IsOperationFlowSupported (OperationFlow flow)=0;
[VB] MustOverride Protected Function IsOperationFlowSupported(ByVal flow As OperationFlow) As Boolean
[JScript] protected abstract function IsOperationFlowSupported(flow: OperationFlow): Boolean;

Description
OperationBindingSyntaxException
[C#] public Exception OperationBindingSyntaxException (string text);
[C++] public: Exception* OperationBindingSyntaxException(String* text);
[VB] Public Function OperationBindingSyntaxException (ByVal text As String) As Exception
[JScript] public function OperationBindingSyntaxException (text: String) Exception;

Description
OperationSyntaxException
[C#] public Exception OperationSyntaxException(string text);
[C++] public: Exception* OperationSyntaxException (String* text);
[VB] Public Function OperationSyntaxException(ByVal text As String) As Exception [JScript] public function OperationSyntaxException(text: String): Exception;

Description
UnsupportedBindingWarning
[C#] public void UnsupportedBindingWarning(string text);
[C++] public: void UnsupportedBindingWarning(String* text);
[VB] Public Sub UnsupportedBindingWarning(ByVal text As String)
[JScript] public function UnsupportedBindingWarning(text: String);

Description
UnsupportedOperationBindingWarning
[C#] public void UnsupportedOperationBindingWarning (string text);
[C++] public: void UnsupportedOperationBindingWarning (String* text);
[VB] Public Sub UnsupportedOperationBindingWarning (ByVal text As String)
[JScript] public function UnsupportedOperationBindingWarning(text: String);

Description
UnsupportedOperationWarning
[C#] public void UnsupportedOperationWarning(string text);
[C++] public: void UnsupportedOperationWarning(String* text);
[VB] Public Sub UnsupportedOperationWarning(ByVal text As String)
[JScript] public function UnsupportedOperationWarning (text: String);

Description
ProtocolReflector class (System.Web.Services.Description)
UnsupportedOperationWarning Description
ProtocolReflector
Example Syntax:
UnsupportedOperationWarning
[C#] protected ProtocolReflector( );
[C++] protected: ProtocolReflector( );
[VB] Protected Sub New( )
[JScript] protected function ProtocolReflector( );
Binding
UnsupportedOperationWarning
[C#] public Binding Binding {get;}
[C++] public: _property Binding* get_Binding( );
[VB] Public ReadOnly Property Binding As Binding
[JScript] public function get Binding( ): Binding;

Description
DefaultNamespace
UnsupportedOperationWarning
[C#] public string DefaultNamespace {get;}
[C++] public: _property String* get_DefaultNamespace( );

[VB] Public ReadOnly Property DefaultNamespace As String
[JScript] public function get DefaultNamespace( ): String;

Description
HeaderMessages
UnsupportedOperationWarning
[C#] public MessageCollection HeaderMessages {get;}
[C++] public: _property MessageCollection* get_HeaderMessages( );
[VB] Public ReadOnly Property HeaderMessages As MessageCollection
[JScript] public function get HeaderMessages( ): MessageCollection;

Description
InputMessage
UnsupportedOperationWarning
[C#] public Message InputMessage {get;}
[C++] public: _property Message* get_InputMessage( );
[VB] Public ReadOnly Property InputMessage As Message
[JScript] public function get InputMessage( ): Message;

Description
Method
UnsupportedOperationWarning
[C#] public LogicalMethodInfo Method {get;}
[C++] public: _property LogicalMethodInfo* get_Method( );
[VB] Public ReadOnly Property Method As LogicalMethodInfo
[JScript] public function get Method( ): LogicalMethodInfo;

Description
MethodAttribute
UnsupportedOperationWarning
[C#] public WebMethodAttribute MethodAttribute {get;}
[C++] public: _property WebMethodAttribute* get_MethodAttribute( );
[VB] Public ReadOnly Property MethodAttribute As WebMethodAttribute
[JScript] public function get MethodAttribute( ): WebMethodAttribute;

Description
Methods
UnsupportedOperationWarning
[C#] public LogicalMethodInfo[ ] Methods {get;}
[C++] public: _property LogicalMethodInfo* get_Methods( );
[VB] Public ReadOnly Property Methods As LogicalMethodInfo( )
[JScript] public function get Methods( ): LogicalMethod Info[ ];

Description
Operation
UnsupportedOperationWarning
[C#] public Operation Operation {get;}
[C++] public: _property Operation* get_Operation( );
[VB] Public ReadOnly Property Operation As Operation
[JScript] public function get Operation( ): Operation;

Description
OperationBinding
UnsupportedOperationWarning
[C#] public OperationBinding OperationBinding {get;}
[C++] public: _property OperationBinding* get_OperationBinding( );
[VB] Public ReadOnly Property OperationBinding As OperationBinding
[JScript] public function get OperationBinding( ): OperationBinding;

Description
OutputMessage
UnsupportedOperationWarning
[C#] public Message OutputMessage {get;}
[C++] public: _property Message* get_OutputMessage( );
[VB] Public ReadOnly Property OutputMessage As Message
[JScript] public function get OutputMessage( ): Message;

Description
Port
UnsupportedOperationWarning
[C#] public Port Port {get;}
[C++] public: _property Port* get_Port( );
[VB] Public ReadOnly Property Port As Port
[JScript] public function get Port( ): Port;

Description
PortType
UnsupportedOperationWarning
[C#] public PortType PortType {get;}
[C++] public: _property PortType* get_PortType( );
[VB] Public ReadOnly Property PortType As PortType
[JScript] public function get PortType( ): PortType;

Description
ProtocolName
UnsupportedOperationWarning
[C#] public abstract string ProtocolName {get;}
[C++] public: _property virtual String* get_Protocol Name( )=0;
[VB] MustOverride Public ReadOnly Property ProtocolName As String
[JScript] public abstract function get ProtocolName( ): String;

Description
ReflectionImporter
UnsupportedOperationWarning
[C#] public XmlReflectionImporter ReflectionImporter {get;}
[C++] public: _property XmlReflectionImporter* get_ReflectionImporter( );
[VB] Public ReadOnly Property ReflectionImporter As XmlReflectionImporter
[JScript] public function get ReflectionImporter( ): XmlReflectionImporter;

Description
SchemaExporter
UnsupportedOperationWarning
[C#] public XmlSchemaExporter SchemaExporter {get;}
[C++] public: _property XmlSchemaExporter* get_SchemaExporter( );
[VB] Public ReadOnly Property SchemaExporter As XmlSchemaExporter
[JScript] public function get SchemaExporter( ): XmlSchemaExporter;

Description
Schemas
UnsupportedOperationWarning
[C#] public XmlSchemas Schemas {get;}
[C++] public: _property XmlSchemas* get_Schemas( );
[VB] Public ReadOnly Property Schemas As XmlSchemas
[JScript] public function get Schemas( ): XmlSchemas;

Description
Service
UnsupportedOperationWarning
[C#] public Service Service {get;}
[C++] public: _property Service* get_Service( );
[VB] Public ReadOnly Property Service As Service
[JScript] public function get Service( ): Service;

Description
ServiceDescription
UnsupportedOperationWarning
[C#] public ServiceDescription ServiceDescription {get;}
[C++] public: _property ServiceDescription* get_ServiceDescription( );
[VB] Public ReadOnly Property ServiceDescription As ServiceDescription
[JScript] public function get ServiceDescription( ): ServiceDescription;

Description
ServiceDescriptions
UnsupportedOperationWarning
[C#] public ServiceDescription Collection ServiceDescriptions {get;}
[C++] public: _property ServiceDescription Collection* get_ServiceDescriptions( );
[VB] Public ReadOnly Property ServiceDescriptions As ServiceDescription Collection
[JScript] public function get ServiceDescriptions( ): ServiceDescription Collection;

Description
ServiceType
UnsupportedOperationWarning
[C#] public Type ServiceType {get;}
[C++] public: _property Type* get_ServiceType( );
[VB] Public ReadOnly Property ServiceType As Type
[JScript] public function get ServiceType( ): Type;

Description
ServiceUrl
UnsupportedOperationWarning
[C#] public string ServiceUrl {get;}
[C++] public: _property String* get_ServiceUrl( );
[VB] Public ReadOnly Property ServiceUrl As String
[JScript] public function get ServiceUrl( ): String;

Description
BeginClass
[C#] protected virtual void BeginClass( );
[C++] protected: virtual void BeginClass( );
[VB] Overridable Protected Sub BeginClass( )
[JScript] protected function BeginClass( );

Description
EndClass
[C#] protected virtual void EndClass( );
[C++] protected: virtual void EndClass( );
[VB] Overridable Protected Sub EndClass( )
[JScript] protected function EndClass( );

Description
GetServiceDescription
[C#] public ServiceDescription GetServiceDescription (string ns);
[C++] public: ServiceDescription* GetServiceDescription (String* ns);
[VB] Public Function GetServiceDescription (ByVal ns As String) As ServiceDescription
[JScript] public function GetServiceDescription (ns: String): ServiceDescription;

Description
ReflectMethod
[C#] protected abstract bool ReflectMethod( );
[C++] protected: virtual bool ReflectMethod( )=0;
[VB] MustOverride Protected Function ReflectMethod( ) As Boolean
[JScript] protected abstract function ReflectMethod( ): Boolean;

Description
ReflectMethodBinding
[C#] protected virtual string ReflectMethodBinding( );
[C++] protected: virtual String* ReflectMethodBinding( );
[VB] Overridable Protected Function ReflectMethodBinding ( ) As String
[JScript] protected function ReflectMethodBinding( ): String;

Description
Service class (System.Web.Services.Description)
ToString

Description
Groups together a set of related System.Web.Services.Description.Port instances associated with a Web Service. This class cannot be inherited.
Service
Example Syntax:
ToString
[C#] public Service( );
[C++] public: Service( );
[VB] Public Sub New( )
[JScript] public function Service( );
Documentation
Extensions
ToString Description
Gets the collection of extensibility elements contained in the System.Web.Services.Description.Service instance.
This property will generally only be populated with members if the members of the System.Web.Services.Description.Service.Ports property lack extensibility elements.
Name
ToString
[C#] public string Name {get; set;}
[C++] public: _property String* get_Name( );public: _property void
set_Name(String*);
[VB] Public Property Name As String
[JScript] public function get Name( ): String;public function set Name(String);

Description
Gets or sets the name of the System.Web.Services.Description.Service instance.
Ports
ToString
[C#] public PortCollection Ports {get;}
[C++] public: _property PortCollection* get_Ports( );
[VB] Public ReadOnly Property Ports As PortCollection
[JScript] public function get Ports( ): PortCollection;

Description
Gets the collection of System.Web.Services.Description.Port instances contained in the System.Web.Services.Description.Service instance.

ServiceDescription

ToString

[C#] public ServiceDescription ServiceDescription {get;}

[C++] public: _property ServiceDescription* get_ServiceDescription( );

[VB] Public ReadOnly Property ServiceDescription As ServiceDescription

[JScript] public function get ServiceDescription( ): ServiceDescription;

Description

Gets the System.Web.Services.Description. ServiceDescription of which the Service instance is a member.

ServiceCollection class (System.Web.Services.Description)

ToString

Description

Represents a collection of System.Web.Services.Description.Service objects. This class cannot be inherited.

Count

InnerList

Item

ToString

System.Web.Services.Description.Service

Description

Gets or sets the value of a System.Web.Services.Description.Service at the specified zero-based index. The zero-based index of the Service to be modified or returned.

Item

ToString

[C#] public Service this[string name] {get;}

[C++] public: _property Service* get_Item(String* name);

[VB] Public Default ReadOnly Property Item(ByVal name As String) As Service

[JScript] returnValue=ServiceCollectionObject.Item(name);

Description

Gets the Service instance by the value of its System.Web.Services.Description.Service.Name property. The string value representing the name of the System.Web.Services.Description.Service returned.

List

Table

Add

[C#] public int Add(Service service);

[C++] public: int Add(Service* service);

[VB] Public Function Add(ByVal service As Service) As Integer

[JScript] public function Add(service: Service): int;

Description

Adds the specified System.Web.Services.Description. Service instance to the end of the ServiceCollection.

Return Value: Returns the zero-based index where service has been added. The System.Web.Services.Description.Service instance to be added to the ServiceCollection.

Contains

[C#] public bool Contains(Service service);

[C++] public: bool Contains(Service* service);

[VB] Public Function Contains(ByVal service As Service) As Boolean

[JScript] public function Contains(service: Service): Boolean;

Description

Gets a value indicating whether the specified System.Web.Services.Description.Service instance is a member of the ServiceCollection.

Return Value: true if the specified System.Web.Services.Description.Service instance is a member of the ServiceCollection; otherwise, false. A System.Web.Services.Description.Service object.

CopyTo

[C#] public void CopyTo(Service[ ] array, int index);

[C++] public: void CopyTo(Service* array[ ], int index);

[VB] Public Sub CopyTo(ByVal array( ) As Service, ByVal index As Integer)

[JScript] public function CopyTo(array: Service[ ], index: int);

Description

Copies the entire ServiceCollection to a one-dimensional array of type System.Web.Services.Description.Service, starting at the specified zero-based index of the target array. An array of type System.Web.Services.Description.Service serving as the destination of the copy action. The zero-based index at which to start placing the copied ServiceCollection.

GetKey

[C#] protected override string GetKey(object value);

[C++] protected: String* GetKey(Object* value);

[VB] Overrides Protected Function GetKey(ByVal value As Object) As String

[JScript] protected override function GetKey(value: Object): String;

Description

Returns the name of the System.Web.Services.Description.Service associated with the value passed by reference. An object for which to return the name.

IndexOf

[C#] public int IndexOf(Service service);

[C++] public: int IndexOf(Service* service);

[VB] Public Function IndexOf(ByVal service As Service) As Integer

[JScript] public function IndexOf(service: Service): int;

Description

Searches for the specified System.Web.Services.Description.Service instance and returns the zero-based index of the first occurrence within the ServiceCollection.

Return Value: Returns a 32-bit signed integer. A System.Web.Services.Description.Service object.

Insert

[C#] public void Insert(int index, Service service);

[C++] public: void Insert(int index, Service* service);

[VB] Public Sub Insert(ByVal index As Integer, ByVal service As Service)

[JScript] public function Insert(index: int, service: Service);

Description

Adds the specified System.Web.Services.Description. Service instance to the ServiceCollection at the specified zero-based index.

If the number of items in the collection already equals the collection's capacity, the capacity is doubled by automatically reallocating the internal array before the new element is inserted. The zero-based index at which to insert the specified System.Web.Services.Description.Service. The System.Web.Services.Description.Service instance to be added to the ServiceCollection.

Remove

[C#] public void Remove(Service service);

[C++] public: void Remove(Service* service);

[VB] Public Sub Remove(ByVal service As Service)

[JScript] public function Remove(service: Service);

Description

Removes the first occurrence of the specified System.Web.Services.Description.Service from the ServiceCollection.

This method performs a linear search; therefore, the average execution time is proportional to System.Web.Services.Description.ServiceCollection.Count. A System.Web.Services.Description.Service object.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent System.Web.Services.Description.ServiceDescription of a member of System.Web.Services.Description.ServiceCollection. An object, of type System.Web.Services.Description.Service, within the ServiceCollection. The object, of type System.Web.Services.Description.ServiceDescription, to be set as the parent.

ServiceDescription class (System.Web.Services.Description)

ToString

Description

Provides a means of creating and formatting a valid WSDL (XML) document file, complete with appropriate namespaces, elements and attributes, for describing a Web Service. This class cannot be inherited.

Instances of this class can be created with either the new keyword or the static System.Web.Services.Description.ServiceDescription.Read(System.IO.TextReader) method, which parses a WSDL (Web Service Description Language) file and assigns its values to appropriate members of the class.

ToString

[C#] public const string Namespace;

[C++] public: const String* Namespace;

[VB] Public Const Namespace As String

[JScript] public var Namespace: String;

Description

The XML namespace in which the ServiceDescription class is defined ("http://schemas.xmlsoap.org/wsdl/"). This field is constant.

ServiceDescription

Example Syntax:

ToString

[C#] public ServiceDescription( );

[C++] public: ServiceDescription( );

[VB] Public Sub New( )

[JScript] public function ServiceDescription( );

Bindings

ToString

[C#] public BindingCollection Bindings {get;}

[C++] public: _property BindingCollection* get_Bindings( );

[VB] Public ReadOnly Property Bindings As BindingCollection

[JScript] public function get Bindings( ): BindingCollection;

Description

Represents the collection of System.Web.Services.Description.Binding elements that the System.Web.Services.Description.ServiceDescription contains.

Documentation

Extensions

ToString

Description

Gets the collection of extensibility elements that the System.Web.Services.Description.ServiceDescription contains.

Imports

ToString

[C#] public ImportCollection Imports {get;}

[C++] public: _property ImportCollection* get_Imports( );

[VB] Public ReadOnly Property Imports As ImportCollection

[JScript] public function get Imports( ): ImportCollection;

Description

Gets the collection of System.Web.Services.Description.Import elements that the System.Web.Services.Description.ServiceDescription contains.

Messages

ToString

[C#] public MessageCollection Messages {get;}

[C++] public: _property MessageCollection* get_Messages( );

[VB] Public ReadOnly Property Messages As MessageCollection

[JScript] public function get Messages( ): MessageCollection;

Description

The collection of System.Web.Services.Description.Message elements the System.Web.Services.Description.ServiceDescription contains.

Name

ToString

[C#] public string Name {get; set;}

[C++] public: _property String* get_Name( );public: _property void set_Name(String*);

[VB] Public Property Name As String

[JScript] public function get Name( ): String;public function set Name(String);

Description

Gets or sets the XML Name attribute of the Descriptions tag enclosing the WSDL file.

Returns an empty string (" ") if this property value has not been assigned.

PortTypes

ToString

[C#] public PortTypeCollection PortTypes {get;}

[C++] public: _property PortTypeCollection* get_PortTypes( );

[VB] Public ReadOnly Property PortTypes As PortTypeCollection

[JScript] public function get PortTypes( ): PortTypeCollection;

Description

The collection of System.Web.Services.Description.PortType elements the System.Web.Services.Description.ServiceDescription contains.

RetrievalUrl

ToString

[C#] public string RetrievalUrl {get; set;}

[C++] public: _property String* get_RetrievalUrl( );public: _property void set_RetrievalUrl(String*);

[VB] Public Property RetrievalUrl As String

[JScript] public function get RetrievalUrl( ): String;public function set RetrievalUrl(String);

Serializer

ToString

[C#] public static XmlSerializer Serializer {get;}

[C++] public: _property static XmlSerializer* get_Serializer( );

[VB] Public Shared ReadOnly Property Serializer As XmlSerializer

[JScript] public static function get Serializer( ): XmlSerializer; Returns the serializer for processing web service calls. The serializer is customized according to settings in config.web.

ServiceDescriptions

ToString

[C#] public ServiceDescription Collection ServiceDescriptions {get;}

[C++] public: _property ServiceDescription Collection* get_ServiceDescriptions( );

[VB] Public ReadOnly Property ServiceDescriptions As ServiceDescription Collection

[JScript] public function get ServiceDescriptions( ): ServiceDescription Collection;

Description

The System.Web.Services.Description. ServiceDescription Collection instance of which the System.Web.Services. Description.ServiceDescription is a member.

This property is read-only.

Services

ToString

[C#] public ServiceCollection Services {get;}

[C++] public: _property ServiceCollection* get_Services( );

[VB] Public ReadOnly Property Services As ServiceCollection

[JScript] public function get Services( ): ServiceCollection;

Description

Gets the collection of System.Web.Services.Description. Service instances that the System.Web.Services.Description. ServiceDescription contains.

TargetNamespace

ToString

[C#] public string TargetNamespace {get; set;}

[C++] public: _property String* get_TargetName space( );public: _property void set_TargetNamespace(String*);

[VB] Public Property TargetNamespace As String

[JScript] public function get TargetNamespace( ): String;public function set TargetNamespace(String);

Description

Gets or sets the XML targetNamespace attribute of the Descriptions tag enclosing a WSDL file.

Types

ToString

[C#] public Types Types {get; set;}

[C++] public: _property Types* get_Types( );public: _property void set_Types(Types*);

[VB] Public Property Types As Types

[JScript] public function get Types( ): Types;public function set Types(Types);

Description

Gets or sets the System.Web.Services.Description.Types contained by the ServiceDescription instance.

CanRead

[C#] public static bool CanRead(XmlReader reader);

[C++] public: static bool CanRead(XmlReader* reader);

[VB] Public Shared Function CanRead(ByVal reader As XmlReader) As Boolean

[JScript] public static function CanRead(reader: XmlReader): Boolean;

Description

Gets a value indicating whether an System.Xml.XmlReader represents a valid WSDL file that can be parsed.

Return Value: True if the System.Xml.Serialization.XmlSerializer can recognize the node on which the System.Xml.XmlReader is positioned; otherwise false. An System.Xml.XmlReader Read

[C#] public static ServiceDescription Read(Stream stream);

[C++] public: static ServiceDescription* Read(Stream* stream);

[VB] Public Shared Function Read(ByVal stream As Stream) As ServiceDescription

[JScript] public static function Read(stream: Stream): ServiceDescription;

Description

Initializes an instance of a System.Web.Services.Description.ServiceDescription object by directly loading the XML from a System.IO.Stream instance.

Return Value: Returns a System.Web.Services.Description. ServiceDescription object. A System.IO.Stream object, passed by reference, that contains the bytes to be read in.

Read

[C#] public static ServiceDescription Read(string fileName);

[C++] public: static ServiceDescription* Read(String* fileName);

[VB] Public Shared Function Read(ByVal fileName As String) As ServiceDescription

[JScript] public static function Read(fileName: String): ServiceDescription;

Description

Initializes an instance of a System.Web.Services.Description.ServiceDescription object by directly loading the XML from the specified file.

Return Value: Returns a System.Web.Services.Description. ServiceDescription object. A string representing the path to the file to be read in.

Read

[C#] public static ServiceDescription Read(TextReader textReader);

[C++] public: static ServiceDescription* Read(TextReader* textReader);

[VB] Public Shared Function Read(ByVal textReader As TextReader) As ServiceDescription

[JScript] public static function Read(textReader: TextReader): ServiceDescription; Initializes an instance of a System.Web.Services.Description.ServiceDescription object by directly loading the XML.

Description

Initializes an instance of a System.Web.Services.Description.ServiceDescription object by directly loading the XML from a System.IO.TextReader instance.

Return Value: Returns a System.Web.Services.Description. ServiceDescription object. A System.IO.TextReader object, passed by reference, that contains the text to be read in.

Read

[C#] public static ServiceDescription Read(XmlReader reader);

[C++] public: static ServiceDescription* Read(XmlReader* reader);

[VB] Public Shared Function Read(ByVal reader As XmlReader) As ServiceDescription

[JScript] public static function Read(reader: XmlReader): ServiceDescription;

Description

Initializes an instance of a System.Web.Services.Description.ServiceDescription object by directly loading the XML from an System.Xml.XmlReader instance.

Return Value: Returns a System.Web.Services.Description. ServiceDescription object. An System.Xml.XmlReader instance, passed by reference, that contains the XML data to be read in.

Write

[C#] public void Write(Stream stream);

[C++] public: void Write(Stream* stream);

[VB] Public Sub Write(ByVal stream As Stream)

[JScript] public function Write(stream: Stream);

Description

Writes out the System.Web.Services.Description. ServiceDescription to the specified System.IO.Stream instance. A System.IO.Stream, passed by reference, that contains the WSDL file produced.

Write

[C#] public void Write(string filename);

[C++] public: void Write(String* fileName);

[VB] Public Sub Write(ByVal fileName As String)

[JScript] public function Write(fileName: String); Writes out the System.Web.Services.Description.ServiceDescription as a WSDL file.

Description

Writes out the System.Web.Services.Description. ServiceDescription as a WSDL file to the specified path. A string representing the physical path to which the WSDL file is written.

Write

[C#] public void Write(TextWriter writer);

[C++] public: void Write(TextWriter* writer);

[VB] Public Sub Write(ByVal writer As TextWriter)

[JScript] public function Write(writer: TextWriter);

Description

Writes out the System.Web.Services.Description. ServiceDescription to the System.IO.TextWriter instance. A System.IO.TextWriter instance.

Write

[C#] public void Write(XmlWriter writer);

[C++] public: void Write(XmlWriter* writer);

[VB] Public Sub Write(ByVal writer As XmlWriter)

[JScript] public function Write(writer: XmlWriter);

Description

Writes out the System.Web.Services.Description. ServiceDescription to the System.Xml.XmlWriter as a WSDL file. An System.Xml.XmlWriter, passed by reference, that contains the WSDL file produced.

ServiceDescription BaseCollection class (System.Web. Services.Description)

Write

Description

Forms the basis for the strongly typed collections that are members of the System.Web.Services.Description namespace.

Count

InnerList

List

Table

Write

Description

Gets an interface that implements the association of the keys and values in the System.Web.Services.Description. ServiceDescription BaseCollection instance.

The default implementation returns a System.Collections.Hashtable to associate the keys and values. This protected method is accessible only through this class or a derived class.

GetKey

[C#] protected virtual string GetKey(object value);

[C++] protected: virtual String* GetKey(Object* value);

[VB] Overridable Protected Function GetKey(ByVal value As Object) As String

[JScript] protected function GetKey(value: Object): String;

Description

Returns the name of the key associated with the value passed by reference.

The default implementation of this method is intended to be overridden by a derived class to return the name of the key associated with value. Note that the default implementation returns null ( Nothing in Visual Basic). This protected method is accessible only through this class or a derived class. An object for which to return the name of the key.

OnClear

[C#] protected override void OnClear( );

[C++] protected: void OnClear( );

[VB] Overrides Protected Sub OnClear( )

[JScript] protected override function OnClear( );

Description

Clears the contents of the System.Web.Services.Description.ServiceDescription BaseCollection instance.

This method is intended to be overridden to perform additional processes when clearing the contents of a derived Collection. This protected method is accessible only through this class or a derived class.

OnInsertComplete

[C#] protected override void OnInsertComplete(int index, object value);

[C++] protected: void OnInsertComplete(int index, Object* value);

[VB] Overrides Protected Sub OnInsertComplete(ByVal index As Integer, ByVal value As Object)

[JScript] protected override function OnInsertComplete(index: int, value: Object);

Description

Performs additional custom processes when inserting a new element into the System.Web.Services.Description. ServiceDescription BaseCollection instance.

The default implementation of this method is intended to be overridden by a derived class to perform some action when the specified element is inserted. The zero-based index at which to insert the object represented by the value parameter. The new value of the element at the specified zero-based index.

OnRemove

[C#] protected override void OnRemove(int index, object value);

[C++] protected: void OnRemove(int index, Object* value);

[VB] Overrides Protected Sub OnRemove(ByVal index As Integer, ByVal value As Object)

[JScript] protected override function OnRemove(index: int, value: Object);

Description

Removes an element from the System.Web.Services.Description.ServiceDescription BaseCollection instance.

This method is intended to be overridden to perform additional processes when an element is removed from the ServiceDescription BaseCollection instance. The zero-based index at which the object represented by the value parameter can be found. The object to remove from the collection.

OnSet

[C#] protected override void OnSet(int index, object oldValue, object newValue);

[C++] protected: void OnSet(int index, Object* oldValue, Object* newValue);

[VB] Overrides Protected Sub OnSet(ByVal index As Integer, ByVal oldValue As Object, ByVal newValue As Object)

[JScript] protected override function OnSet(index: int, oldValue: Object, newValue: Object);

Description

Replaces one value with another within the System.Web.Services.Description.ServiceDescription BaseCollection instance.

The default implementation of this method is intended to be overridden to perform additional processes when setting the value of an element in the ServiceDescription BaseCollection instance. This protected method is accessible only through this class or a derived class. The zero-based index where the object represented by the oldValue parameter can be found. The object to replace with the object represented by the new Value parameter. The object that replaces the object represented by the oldValue parameter.

SetParent

[C#] protected virtual void SetParent(object value, object parent);

[C++] protected: virtual void SetParent(Object* value, Object* parent);

[VB] Overridable Protected Sub SetParent(ByVal value As Object, ByVal parent As Object)

[JScript] protected function SetParent(value: Object, parent: Object);

Description

Sets the Parent property of the System.Web.Services.Description.ServiceDescription BaseCollection instance.

The default implementation of this method is intended to be overridden by a derived class to set a parent of an appropriate class. Note also that the default implementation performs no action. This protected method is accessible only through this class or a derived class. The object for which to set the parent object. The object to set as the parent.

ServiceDescription Collection class (System.Web.Services.Description)

ToString

Description

Represents a collection of System.Web.Services.Description.ServiceDescription instances. This class cannot be inherited.

ServiceDescription Collection

Example Syntax:

ToString

[C#] public ServiceDescription Collection( );

[C++] public: ServiceDescription Collection( );

[VB] Public Sub New( )

[JScript] public function ServiceDescription Collection( );

Description

Initializes a new instance of the System.Web.Services.Description.ServiceDescription Collection class.

Count

InnerList

Item

ToString

System.Web.Services.Description.ServiceDescription

Description

Gets or sets the value of a System.Web.Services.Description.ServiceDescription at the specified zero-based index. The zero-based index of the System.Web.Services.Description.ServiceDescription whose value is modified or returned.

Item

ToString

[C#] public ServiceDescription this[string ns] {get;}

[C++] public: _property ServiceDescription* get_Item (String* ns);

[VB] Public Default ReadOnly Property Item(ByVal ns As String) As ServiceDescription

[JScript] returnValue=ServiceDescriptionCollectionObject.Item (ns);

Description

Gets a System.Web.Services.Description. ServiceDescription specified by its System.Web.Services.Description. ServiceDescription.TargetNamespace property. The namespace of the System.Web.Services.Description.ServiceDescription to be returned.

List

Table

Add

[C#] public int Add(ServiceDescription serviceDescription);

[C++] public: int Add(ServiceDescription* serviceDescription);

[VB] Public Function Add(ByVal serviceDescription As ServiceDescription) As Integer

[JScript] public function Add(serviceDescription: ServiceDescription): int;

Description

Adds the specified System.Web.Services.Description. ServiceDescription to the end of the ServiceDescription Collection.

Return Value: Returns the zero-based index where the specified System.Web.Services.Description.ServiceDescription instance has been added. The System.Web.Services.Description.ServiceDescription to be added to the collection.

Contains

[C#] public bool Contains(ServiceDescription serviceDescription);

[C++] public: bool Contains(ServiceDescription* serviceDescription);

[VB] Public Function Contains(ByVal serviceDescription As ServiceDescription) As Boolean

[JScript] public function Contains(serviceDescription: ServiceDescription): Boolean;

Description

Gets a value indicating whether the specified System.Web.Services.Description.ServiceDescription instance is a member of the collection.

Return Value: true if the specified ServiceDescription instance is a member of the ServiceDescription Collection; otherwise false. A System.Web.Services.Description. ServiceDescription object.

CopyTo

[C#] public void CopyTo(ServiceDescription[ ] array, int index);

[C++] public: void CopyTo(ServiceDescription* array[ ], int index);

[VB] Public Sub CopyTo(ByVal array( ) As ServiceDescription, ByVal index As Integer)

[JScript] public function CopyTo(array: ServiceDescription[ ], index: int);

Description

Copies the entire ServiceDescription Collection to a one-dimensional array of type System.Web.Services.Description.ServiceDescription, starting at the specified zero-based index of the target array. An array of type System.Web.Services.Description.ServiceDescription serving as the destination of the copy action. The zero-based index at which to start placing the copied collection.

GetBinding

[C#] public Binding GetBinding(XmlQualifiedName name);

[C++] public: Binding* GetBinding(XmlQualifiedName* name);

[VB] Public Function GetBinding(ByVal name As XmlQualifiedName) As Binding

[JScript] public function GetBinding(name: XmlQualifiedName): Binding;

Description

Searches the ServiceDescription Collection and returns the System.Web.Services.Description.Binding instance with the specified name that is a member of one of the System.Web.Services.Description.ServiceDescription instances contained in the collection.

Return Value: A Binding object. The System.Xml.XmlQualifledName, passed by reference, whose Name property is shared by the System.Web.Services.Description.Binding returned.

GetKey

[C#] protected override string GetKey(object value);

[C++] protected: String* GetKey(Object* value);

[VB] Overrides Protected Function GetKey(ByVal value As Object) As String

[JScript] protected override function GetKey(value: Object): String;

Description

Returns the System.Web.Services.Description. ServiceDescription.TargetNamespace property of the System.Web.Services.Description.ServiceDescription associated with the value passed by reference. The object for which to return the TargetNamespace.

GetMessage

[C#] public Message GetMessage(XmlQualifiedName name);

[C++] public: Message* GetMessage(XmlQualifiedName* name);

[VB] Public Function GetMessage(ByVal name As XmlQualifiedName) As Message

[JScript] public function GetMessage(name: XmlQualifiedName): Message;

Description

Searches the ServiceDescription Collection and returns the System.Web.Services.Description.Message instance with the specified name that is a member of one of the System.Web.Services.Description.ServiceDescription instances contained in the collection.

Return Value: A System.Web.Services.Description.Message object. The System.Xml.XmlQualifledName, passed by reference, whose Name property is shared by the System.Web.Services.Description.Message returned.

GetPortType

[C#] public PortType GetPortType(XmlQualifiedName name);

[C++] public: PortType* GetPortType(XmlQualifiedName* name);

[VB] Public Function GetPortType(ByVal name As XmlQualifiedName) As PortType

[JScript] public function GetPortType(name: XmlQualifiedName): PortType;

Description

Searches the ServiceDescription Collection and returns the System.Web.Services.Description.PortType instance with the specified name that is a member of one of the System.Web.Services.Description.ServiceDescription instances contained in the collection.

Return Value: A System.Web.Services.Description.PortType object. The System.Xml.XmlQualifledName, passed by reference, whose Name property is shared by the System.Web.Services.Description.PortType returned.

GetService

[C#] public Service GetService(XmlQualifiedName name);

[C++] public: Service* GetService(XmlQualifiedName* name);

[VB] Public Function GetService(ByVal name As XmlQualifiedName) As Service

[JScript] public function GetService(name: XmlQualifiedName): Service;

Description

Searches the ServiceDescription Collection and returns the System.Web.Services.Description.Service instance with the specified name that is a member of one of the System.Web.Services.Description.ServiceDescription instances contained in the collection.

Return Value: A System.Web.Services.Description.Service object. The System.Xml.XmlQualifledName, passed by reference, whose Name property is shared by the System.Web.Services.Description.Service returned.

IndexOf

[C#] public int IndexOf(ServiceDescription serviceDescription);

[C++] public: int IndexOf(ServiceDescription* serviceDescription);

[VB] Public Function IndexOf(ByVal serviceDescription As ServiceDescription) As Integer

[JScript] public function IndexOf(serviceDescription: ServiceDescription): int;

Description

Searches for the specified System.Web.Services.Description.ServiceDescription instance and returns the zero-based index of the first occurrence within the ServiceDescription Collection Return Value: Returns a 32-bit signed integer. A System.Web.Services.Description.ServiceDescription object.

Insert

[C#] public void Insert(int index, ServiceDescription serviceDescription);

[C++] public: void Insert(int index, ServiceDescription* serviceDescription);

[VB] Public Sub Insert(ByVal index As Integer, ByVal serviceDescription As ServiceDescription)

[JScript] public function Insert(index: int, serviceDescription: ServiceDescription);

Description

Adds the specified System.Web.Services.Description. ServiceDescription instance to the ServiceDescription Collection at the specified index. The zero-based index at which to insert the specified System.Web.Services.Description. ServiceDescription. The System.Web.Services.Description. ServiceDescription to add to the collection.

Remove

[C#] public void Remove(ServiceDescription serviceDescription);

[C++] public: void Remove(ServiceDescription* serviceDescription);

[VB] Public Sub Remove(ByVal serviceDescription As ServiceDescription)

[JScript] public function Remove(serviceDescription: ServiceDescription);

Description

Removes the first occurrence of a System.Web.Services. Description.ServiceDescription instance specified by the serviceDescription parameter from the ServiceDescription Collection.

This method performs a linear search; therefore, the average execution time is proportional to Count. The System. Web.Services.Description.ServiceDescription to be removed from the collection.

ServiceDescriptionFormatExtension class (System.Web. Services.Description)

ToString

Description

Represents an extensibility element added to a Web Service.

In a derived class, the ServiceDescriptionFormatExtension class allows users to define extensibility elements in addition to those defined in the WSDL specification. Note that extensibility elements can be added to a ServiceDescription at any of several levels. Thus multiple classes derived from the System.Web.Services.Description.DocumentableItem class (including the System.Web.Services.Description. ServiceDescription class) have an Extensions property, which returns a System.Web.Services.Description. ServiceDescriptionFormatExtensionCollection.

ServiceDescriptionFormatExtension

Example Syntax:

ToString

[C#] protected ServiceDescriptionFormatExtension( );

[C++] protected: ServiceDescriptionFormatExtension( );

[VB] Protected Sub New( )

[JScript] protected function ServiceDescriptionFormatExtension( );

Handled

ToString

[C#] public bool Handled {get; set;}

[C++] public: _property bool get_Handled( );public: _property void set_Handled(bool);

[VB] Public Property Handled As Boolean

[JScript] public function get Handled( ): Boolean;public function set Handled(Boolean);

Description

Gets or sets a value indicating whether the System.Web. Services.Description.ServiceDescriptionFormatExtension is handled by the action to which it refers.

Parent

ToString

[C#] public object Parent {get;}

[C++] public: _property Object* get_Parent( );

[VB] Public ReadOnly Property Parent As Object

[JScript] public function get Parent( ): Object;

Description

Gets the parent object of the System.Web.Services.Description.ServiceDescriptionFormatExtension When overridden in a derived class, the class returned by this property will be a derived class rather than the base System.Object class.

Required

ToString

[C#] public bool Required {get; set;}

[C++] public: _property bool get_Required( );public: _property void set_Required(bool);

[VB] Public Property Required As Boolean

[JScript] public function get Required( ): Boolean;public function set Required(Boolean);

Description

Gets or sets a value indicating whether the System.Web. Services.Description.ServiceDescriptionFormatExtension is necessary for the action to which it refers.

ServiceDescriptionFormatExtensionCollection class (System.Web.Services.Description)

ToString

Description

Represents the collection of extensibility elements used by the Web Service. This class cannot be inherited.

ServiceDescriptionFormatExtensionCollection

Example Syntax:

ToString

[C#] public ServiceDescriptionFormatExtensionCollection (object parent);

[C++] public: ServiceDescriptionFormatExtensionCollection(Object* parent);

[VB] Public Sub New(ByVal parent As Object)

[JScript] public function ServiceDescriptionFormatExtensionCollection(parent: Object);

Description

Initializes a new instance of the System.Web.Services.Description.ServiceDescriptionFormatExtensionCollect ion class. The System.Web.Services.Description. ServiceDescription of which this collection is a member.

Count

InnerList

Item

ToString

Description

Gets or sets the value of a member of the System.Web.Services.Description.ServiceDescriptionFormatExtensionCollect ion. The zero-based index of the member in question.

List

Table

Add

[C#] public int Add(object extension);

[C++] public: int Add(Object* extension);

[VB] Public Function Add(ByVal extension As Object) As Integer

[JScript] public function Add(extension: Object): int;

Description

Adds extension to the System.Web.Services.Description. ServiceDescriptionFormatExtensionCollect ion.

Return Value: Returns the index value of the member added. The System.Web.Services.Description. ServiceDescription- FormatExtension, passed by reference, to be added to the System.Web.Services.Description. ServiceDescriptionFormatExtensionCollect ion.

Contains

[C#] public bool Contains(object extension);

[C++] public: bool Contains(Object* extension);

[VB] Public Function Contains(ByVal extension As Object) As Boolean

[JScript] public function Contains(extension: Object): Boolean;

Description

Gets a value indicating whether extension is a member of the System.Web.Services.Description. ServiceDescriptionFormatExtensionCollect ion.

Return Value: true if the object is a member of the collection; otherwise, false. The object that is to be checked whether it is a member of the System.Web.Services.Description. ServiceDescriptionFormatExtensionCollect ion.

CopyTo

[C#] public void CopyTo(object[ ] array, int index);

[C++] public: void CopyTo(Object* array _gc[ ], int index)

[VB] Public Sub CopyTo(ByVal array( ) As Object, ByVal index As Integer)

[JScript] public function CopyTo(array: Object[ ], index: int);

Description

Copies the elements in the System.Web.Services.Description.ServiceDescriptionFormatExtensionCollect ion into array, starting at index. The destination of the copy action The zero-based index at which to place the first copied element Find

[C#] public object Find(Type type);

[C++] public: Object* Find(Type* type);

[VB] Public Function Find(ByVal type As Type) As Object

[JScript] public function Find(type: Type): Object; This method searches the System.Web.Services.Description. ServiceDescriptionFormatExtensionCollect ion and returns the first member of the collection specified by the parameter passed in.

Description

This method searches the System.Web.Services.Description.ServiceDescriptionFormatExtensionCollect ion and returns the first instance of type that it discovers.

Return Value: Returns an object of the specified System.Type if its search was successful; null otherwise.

Note that this method searches the collection in index order, and returns only the type with the lowest-numbered index. A System.Type for which to search the collection.

Find

[C#] public XmlElement Find(string name, string ns);

[C++] public: XmlElement* Find(String* name, String* ns);

[VB] Public Function Find(ByVal name As String, ByVal ns As String) As XmlElement

[JScript] public function Find(name: String, ns: String): XmlElement;

Description

This method searches the System.Web.Services.Description.ServiceDescriptionFormatExtensionCollect ion for a member with name name and namespace URI ns.

Return Value: Returns an System.Xml.XmlElement if the search is successful; otherwise null.

Note that this method searches the collection in index order, and will return the first System.Xml.XmlElement that meets the criteria of the two parameters. A string representing the name of the System.Xml.XmlElement to be found. A string representing the XML namespace URI of the System.Xml.XmlElement to be found.

FindAll

[C#] public object[ ] FindAll(Type type);

[C++] public: Object* FindAll(Type* type) _gc[ ];

[VB] Public Function FindAll(ByVal type As Type) As Object( )

[JScript] public function FindAll(type: Type): Object[ ]; This method searches the System.Web.Services.Description. ServiceDescriptionFormatExtensionCollect ion for all members of the collection specified by the parameter passed in.

Description

This method searches the System.Web.Services.Description.ServiceDescriptionFormatExtensionCollect ion and returns an array of object instances of System.Typetype that it discovers.

Return Value: Returns an array of System.Object instances.

The array returned will be empty if the search is unsuccessful. A System.Type for which to search the collection.

FindAll

[C#] public XmlElement[ ] FindAll(string name, string ns);

[C++] public: XmlElement* FindAll(String* name, String* ns)[ ];

[VB] Public Function FindAll(ByVal name As String, ByVal ns As String) As XmlElement( )

[JScript] public function FindAll(name: String, ns: String): XmlElement[ ];

Description

This method searches the System.Web.Services.Description.ServiceDescriptionFormatExtensionCollect ion for members with name name and namespace URI ns.

Return Value: Returns an array of System.Xml.XmlElement objects.

The array returned will be empty if the search is unsuccessful. A string representing the name attribute of the System.Xml.XmlElement objects to be found. A string representing the XML namespace URI attribute of the System.Xml.XmlElement objects to be found.

IndexOf

[C#] public int IndexOf(object extension);

[C++] public: int IndexOf(Object* extension);

[VB] Public Function IndexOf(ByVal extension As Object) As Integer

[JScript] public function IndexOf(extension: Object): int;

Description

Gets the zero-based index value of extension, the specified member of the System.Web.Services.Description. ServiceDescriptionFormatExtensionCollect ion.

Return Value: Returns a 32-bit signed integer. The object for which to return the index value.

Insert

[C#] public void Insert(int index, object extension);

[C++] public: void Insert(int index, Object* extension);

[VB] Public Sub Insert(ByVal index As Integer, ByVal extension As Object)

[JScript] public function Insert(index: int, extension: Object);

Description

Adds extension to the System.Web.Services.Description. ServiceDescriptionFormatExtensionCollect ion at the specified index. The zero-based index at which to add the new member. The object to add to the System.Web.Services.Description.ServiceDescriptionFormatExtensionCollection.

IsHandled

[C#] public bool IsHandled(object item);

[C++] public: bool IsHandled(Object* item);

[VB] Public Function IsHandled(ByVal item As Object) As Boolean

[JScript] public function IsHandled(item: Object): Boolean;

Description

Gets a value indicating whether item is handled.

Return Value: true if item is handled; otherwise false. An object, either of type System.Xml.XmlElement or System.Web.Services.Description.ServiceDescriptionFormatExtension.

IsRequired

[C#] public bool IsRequired(object item);

[C++] public: bool IsRequired(Object* item);

[VB] Public Function IsRequired(ByVal item As Object) As Boolean

[JScript] public function IsRequired(item: Object): Boolean;

Description

Gets a value indicating whether item is required.

Return Value: true if item is required; otherwise false. An object, either of type System.Xml.XmlElement or System.Web.Services.Description.ServiceDescriptionFormatExtension.

OnValidate

[C#] protected override void OnValidate(object value);

[C++] protected: void OnValidate(Object* value);

[VB] Overrides Protected Sub OnValidate(ByVal value As Object)

[JScript] protected override function OnValidate(value: Object);

Description

Performs a check on the System.Type of value when validating it.

This method overrides the base method in order to determine that value is one of the two valid classes, System.Xml.XmlElement or System.Web.Services.Description. ServiceDescriptionFormatExtension. The object to be validated.

Remove

[C#] public void Remove(object extension);

[C++] public: void Remove(Object* extension);

[VB] Public Sub Remove(ByVal extension As Object)

[JScript] public function Remove(extension: Object);

Description

Removes the first occurrence of extension from the System.Web.Services.Description.ServiceDescriptionFormatExtensionCollection. The object to be removed from the System.Web.Services.Description. ServiceDescriptionFormatExtensionCollection.

SetParent

[C#] protected override void SetParent(object value, object parent);

[C++] protected: void SetParent(Object* value, Object* parent);

[VB] Overrides Protected Sub SetParent(ByVal value As Object, ByVal parent As Object)

[JScript] protected override function SetParent(value: Object, parent: Object);

Description

Sets the parent object of a member of the System.Web.Services.Description.ServiceDescription FormatExtensionCollection.

This method overrides the base method in order to determine that value is of type System.Web.Services.Description. ServiceDescriptionFormatExtension. A child object for which to set the parent. The object to be set as parent.

ServiceDescriptionImporter class (System.Web.Services. Description)

ToString

Description

This class exposes methods for generating client proxy classes for Web Services.

ServiceDescriptionImporter

Example Syntax:

ToString

[C#] public ServiceDescriptionImporter( );

[C++] public: ServiceDescriptionImporter( );

[VB] Public Sub New( )

[JScript] public function ServiceDescriptionImporter( );

Description

Initializes a new instance of the System.Web.Services.Description.ServiceDescriptionImporter class.

ProtocolName

ToString

[C#] public string ProtocolName {get; set;}

[C++] public: _property String* get_ProtocolName( );public: _property void set_ProtocolName(String*);

[VB] Public Property ProtocolName As String

[JScript] public function get ProtocolName( ): String;public function set ProtocolName(String);

Description

Gets or sets the name of the protocol to be imported.

Schemas

ToString

[C#] public XmlSchemas Schemas {get;}

[C++] public: _property XmlSchemas* get_Schemas( );

[VB] Public ReadOnly Property Schemas As XmlSchemas

[JScript] public function get Schemas( ): XmlSchemas;

Description

Gets the System.Xml.Serialization.XmlSchemas Collection contained in the Web Service to be imported. This property is read-only.

ServiceDescriptions

ToString

[C#] public ServiceDescription Collection ServiceDescriptions {get;}

[C++] public: _property ServiceDescription Collection* get_ServiceDescription so;

[VB] Public ReadOnly Property ServiceDescriptions As ServiceDescription Collection

[JScript] public function get ServiceDescriptions( ): ServiceDescription Collection;

Description

Gets the System.Web.Services.Description. ServiceDescription Collection being imported by the ServiceDescriptionImporter.

As with any collection that forms a read-only property, members can be added to the collection, removed from the collection, or modified using the methods exposed by the collection. However, it is recommended that the developer use the System.Web.Services.Description. ServiceDescriptionImporter.AddServiceDescription(System.Web.Services. Description.ServiceDescription,System. String,System. String) method to add members to this collection.

Style

ToString

[C#] public ServiceDescriptionImportStyle Style {get; set;}

[C++] public: _property ServiceDescriptionImportStyle get_Style( );public: _property void set_Style(ServiceDescriptionImportStyle);

[VB] Public Property Style As ServiceDescriptionImportStyle

[JScript] public function get Style( ): ServiceDescriptionImportStyle;public function set Style(ServiceDescriptionImportStyle);

Description

Gets or sets the System.Web.Services.Description. ServiceDescriptionImportStyle associated with the System. Web.Services.Description.ServiceDescriptionImporter instance.

AddServiceDescription

[C#] public void AddServiceDescription (ServiceDescription serviceDescription, string appSettingUrlKey, string appSettingBaseUrl);

[C++] public: void AddServiceDescription (ServiceDescription * serviceDescription, String* appSettingUrlKey, String* appSettingBaseUrl);

[VB] Public Sub AddServiceDescription (ByVal serviceDescription As ServiceDescription, ByVal appSettingUrlKey As String, ByVal appSettingBaseUrl As String)

[JScript] public function AddServiceDescription (serviceDescription: ServiceDescription, appSettingUrlKey: String, appSettingBaseUrl: String);

Description

Adds the specified System.Web.Services.Description. ServiceDescription to the System.Web.Services.Description. ServiceDescriptionImporter.ServiceDescriptions collection. It also sets the System.Web.Services.Description. ServiceDescription.AppSettingUrlKey and System.Web. Services.Description.ServiceDescription.AppSettingBaseUrl properties of the System.Web.Services.Description.ServiceDescription to be added.

The two string parameters, appSettingUrlKey and appSettingBaseUrl, specify how the Url property of the Web Service proxy to be generated from the imported serviceDescription should be constructed. The System.Web.Services.Description.ServiceDescription instance to add to the collection Sets the initial value of the Url property of the proxy class to be generated from the instance represented by the serviceDescription parameter. Specifies that it should be generated from the web.config file's section. Sets the initial value of the Url property of the proxy class to be generated from the instance represented by the serviceDescription parameter. Specifies that it should be constructed from a combination of the value of this parameter and the URL specified by the location attribute in the WSDL document.

Import

[C#] public ServiceDescriptionImportWarnings Import (CodeNamespace codeNamespace, CodeCompileUnit codeCompileUnit);

[C++] public: ServiceDescriptionImportWamings Import (CodeNamespace* codeNamespace, CodeCompileUnit* codeCompileUnit);

[VB] Public Function Import(ByVal codeNamespace As CodeNamespace, ByVal codeCompileUnit As CodeCompileUnit) As ServiceDescriptionImportWarnings

[JScript] public function Import(codeNamespace: CodeNamespace, codeCompileUnit: CodeCompileUnit): ServiceDescriptionImportWarnings;

Description

Imports a System.Web.Services.Description. ServiceDescription from the specified namespace, and generates code for client proxy classes.

Return Value: One of the System.Web.Services.Description. ServiceDescriptionImportWarnings values.

This method actually does the work of importing System. Web.Services.Description.ServiceDescriptions and System.Xml.Schema.XmlSchemas. A System.CodeDom.CodeNamespace instance that determines the namespace of the System.Web.Services.Description.ServiceDescription to be imported. A System.CodeDom.CodeCompileUnit instance that will add references to the appropriate assemblies.

ServiceDescriptionImportStyle enumeration (System. Web.Services.Description)

ToString

Description

Specifies whether the Import is made to the server or the client machine.

ToString

[C#] public const ServiceDescriptionImportStyle Client;

[C++] public: const ServiceDescriptionImportStyle Client;

[VB] Public Const Client As ServiceDescriptionImportStyle

[JScript] public var Client: ServiceDescriptionImportStyle;

Description

Specifies that the Import should be made to the client machine.

ToString

[C#] public const ServiceDescriptionImportStyle Server;

[C++] public: const ServiceDescriptionImportStyle Server;

[VB] Public Const Server As ServiceDescriptionImportStyle

[JScript] public var Server: ServiceDescriptionImportStyle;

Description

Specifies that the Import should be made to the server.

ServiceDescriptionImportWarnings enumeration (System.Web.Services.Description)

ToString

Description

Specifies the type of warnings produced by System.Web. Services.Description.ServiceDescriptionImporter.Import (System.CodeDom.CodeNamespace,System.CodeDom.CodeCompileUnit).

ToString

[C#] public const ServiceDescriptionImportWarnings NoCodeGenerated;

[C++] public: const ServiceDescriptionImportWarnings NoCodeGenerated;

[VB] Public Const NoCodeGenerated As ServiceDescriptionImportWarnings

[JScript] public var NoCodeGenerated: ServiceDescriptionImportWarnings;

Description

Specifies that no proxy class was generated by the System. Web.Services.Description.ServiceDescriptionImporter.Import(System.CodeDom.CodeNamespace,System.CodeDom.CodeCompileUnit) method.

ToString

[C#] public const ServiceDescriptionImportWarnings NoMethodsGenerated;

[C++] public: const ServiceDescriptionImportWarnings NoMethodsGenerated;

[VB] Public Const NoMethodsGenerated As ServiceDescriptionImportWarnings

[JScript] public var NoMethodsGenerated: ServiceDescriptionImportWarnings;

Description

Specifies that the proxy class generated by the System.Web.Services.Description.ServiceDescriptionImporter.Import(System.CodeDom.CodeNamespace,System.CodeDom.CodeCompileUnit) method includes no methods.

ToString

[C#] public const ServiceDescriptionImportWarnings OptionalExtensionsIgnored;

[C++] public: const ServiceDescriptionImportWarnings OptionalExtensionsIgnored;

[VB] Public Const OptionalExtensionsIgnored As ServiceDescriptionImportWarnings

[JScript] public var OptionalExtensionsIgnored: ServiceDescriptionImportWarnings;

Description

Specifies that at least one optional System.Web.Services.Description.ServiceDescriptionFormatExtension for the System.Web.Services.Description.ServiceDescription to be imported has been ignored.

ToString

[C#] public const ServiceDescriptionImportWarnings RequiredExtensionsIgnored;

[C++] public: const ServiceDescriptionImportWarnings RequiredExtensionsIgnored;

[VB] Public Const RequiredExtensionsIgnored As ServiceDescriptionImportWarnings

[JScript] public var RequiredExtensionsIgnored: ServiceDescriptionImportWarnings;

Description

Specifies that at least one necessary System.Web.Services.Description.ServiceDescriptionFormatExtension for the System.Web.Services.Description.ServiceDescription to be imported has been ignored.

ToString

[C#] public const ServiceDescriptionImportWarnings UnsupportedBindingsIgnored;

[C++] public: const ServiceDescriptionImportWarnings UnsupportedBindingsIgnored;

[VB] Public Const UnsupportedBindingsIgnored As ServiceDescriptionImportWarnings

[JScript] public var UnsupportedBindingsIgnored: ServiceDescriptionImportWarnings;

Description

Specifies that at least one System.Web.Services.Description.Binding for the System.Web.Services.Description.ServiceDescription to be imported is of an unsupported type and has been ignored.

ToString

[C#] public const ServiceDescriptionImportWarnings UnsupportedOperationsIgnored;

[C++] public: const ServiceDescriptionImportWarnings UnsupportedOperationsIgnored;

[VB] Public Const UnsupportedOperationsIgnored As ServiceDescriptionImportWarnings

[JScript] public var UnsupportedOperationsIgnored: ServiceDescriptionImportWarnings;

Description

Specifies that at least one System.Web.Services.Description.Operation for the System.Web.Services.Description.ServiceDescription to be imported is of an unsupported type and has been ignored.

ServiceDescriptionReflector class (System.Web.Services.Description)

ToString

Description

ServiceDescriptionReflector

Example Syntax:

ToString

[C#] public ServiceDescriptionReflector( );

[C++] public: ServiceDescriptionReflector( );

[VB] Public Sub New( )

[JScript] public function ServiceDescriptionReflector( );

Description

Schemas

ToString

[C#] public XmlSchemas Schemas {get;}

[C++] public: _property XmlSchemas* get_Schemas( );

[VB] Public ReadOnly Property Schemas As XmlSchemas

[JScript] public function get Schemas( ): XmlSchemas;

Description

ServiceDescriptions

ToString

[C#] public ServiceDescriptionCollection ServiceDescriptions {get;}

[C++] public: _property ServiceDescriptionCollection* get_ServiceDescriptions( );

[VB] Public ReadOnly Property ServiceDescriptions As ServiceDescriptionCollection

[JScript] public function get ServiceDescriptions( ): ServiceDescriptionCollection;

Description

Reflect

[C#] public void Reflect(Type type, string url);

[C++] public: void Reflect(Type* type, String* url);

[VB] Public Sub Reflect(ByVal type As Type, ByVal url As String)

[JScript] public function Reflect(type: Type, url: String);

Description

SoapAddressBinding class (System.Web.Services.Description)

ToString

Description

Represents an extensibility element added to a System.Web.Services.Description.Port within a Web Service. This class cannot be inherited.

SoapAddressBinding

Example Syntax:

ToString

[C#] public SoapAddressBinding( );

[C++] public: SoapAddressBinding( );

[VB] Public Sub New( )

[JScript] public function SoapAddressBinding( );

Handled

Location

ToString

Description

Gets or sets a value representing the URI for the System.Web.Services.Description.Port to which the SoapAddressBinding applies.

Parent

Required

SoapBinding class (System.Web.Services.Description)

ToString

Description

Represents an extension added to a System.Web.Services.Description.Binding within a Web Service. It specifies that the data transmission will use SOAP (Simple Object Access Protocol). This class cannot be inherited.

ToString

[C#] public const string HttpTransport;

[C++] public: const String* HttpTransport;

[VB] Public Const HttpTransport As String

[JScript] public var HttpTransport: String;

Description

ToString

[C#] public const string Namespace;

[C++] public: const String* Namespace;

[VB] Public Const Namespace As String

[JScript] public var Namespace: String;

Description

Gets the URI (http://schemas.xmlsoap.org/wsdl/soap/) for the XML namespace of the SoapBinding class. This field is constant.

SoapBinding

Example Syntax:

ToString

[C#] public SoapBinding( );

[C++] public: SoapBinding( );

[VB] Public Sub New( )

[JScript] public function SoapBinding( );

Handled

Parent

Required

Style

ToString

Description

Specifies the type of SOAP binding used by the SoapBinding instance.

Transport

ToString

[C#] public string Transport {get; set;}

[C++] public: _property String* get_Transport( );public: _property void set_Transport(String*);

[VB] Public Property Transport As String

[JScript] public function get Transport( ): String;public function set Transport(String);

Description

Gets or sets the URI for the specification for HTTP transmission of SOAP data.

In general usage, this required property value will be the same as that of the System.Web.Services.Description. SoapBinding.HttpTransport field. However, this property value may be any URI for data-transmission specifications, such as SMTP, FTP, etc.

SoapBindingStyle enumeration (System.Web.Services. Description)

ToString

Description

Specifies the type of action that occurs in the Web Service at the level to which this enumeration is applied.

This enumeration allows the user to specify whether the message being transmitted is procedure- or document-oriented. Procedure-oriented messages contain parameters and return values, while document-oriented messages contain documents.

ToString

[C#] public const SoapBindingStyle Default;

[C++] public: const SoapBindingStyle Default;

[VB] Public Const Default As SoapBindingStyle

[JScript] public var Default: SoapBindingStyle;

Description

This value specifies that the action should use the default value appropriate to that level of the WSDL file.

ToString

[C#] public const SoapBindingStyle Document;

[C++] public: const SoapBindingStyle Document;

[VB] Public Const Document As SoapBindingStyle

[JScript] public var Document: SoapBindingStyle;

Description

Specifies that the message to be transmitted contains documents.

ToString

[C#] public const SoapBindingStyle Rpc;

[C++] public: const SoapBindingStyle Rpc;

[VB] Public Const Rpc As SoapBindingStyle

[JScript] public var Rpc: SoapBindingStyle;

Description

Specifies that the message to be transmitted contains a call to a procedure. RPC is an acronym for "remote procedure call."

SoapBindingUse enumeration (System.Web.Services.Description)

ToString

Description

Specifies whether the message parts are encoded using given rules, or define a concrete schema for the message.

ToString

[C#] public const SoapBindingUse Default;

[C++] public: const SoapBindingUse Default;

[VB] Public Const Default As SoapBindingUse

[JScript] public var Default: SoapBindingUse;

Description

Specifies an empty string (" ") value for the corresponding XML attribute.

ToString

[C#] public const SoapBindingUse Encoded;

[C++] public: const SoapBindingUse Encoded;

[VB] Public Const Encoded As SoapBindingUse

[JScript] public var Encoded: SoapBindingUse;

Description

Specifies that the message parts are encoded using given encoding rules.

ToString

[C#] public const SoapBindingUse Literal;

[C++] public: const SoapBindingUse Literal;

[VB] Public Const Literal As SoapBindingUse

[JScript] public var Literal: SoapBindingUse;

Description

Specifies that the message parts represent a concrete schema.

SoapBodyBinding class (System.Web.Services.Description)

ToString

Description

Represents an extensibility element added to an System.Web.Services.Description.InputBinding or an System.Web.Services.Description.OutputBinding. It specifies how messages, either abstract type definitions or concrete schema definitions, appear within the SOAP body element of the transmission. This class cannot be inherited.

SoapBodyBinding

Example Syntax:

ToString

[C#] public SoapBodyBinding( );
[C++] public: SoapBodyBinding( );
[VB] Public Sub New( )
[JScript] public function SoapBodyBinding( );
Encoding
ToString
[C#] public string Encoding {get; set;}
[C++] public: _property String* get_Encoding( );public: _property void set_Encoding(String*);
[VB] Public Property Encoding As String
[JScript] public function get Encoding( ): String;public function set Encoding(String);

Description

Supplies a list of space-delimited URIs representing the encoding style (or styles) to be used to encode the messages within the SOAP body.

The value of this property should be set only if the value of the System.Web.Services.Description. SoapBodyBinding.Use property is Encoded.

Handled
Namespace
ToString

Description

Get or sets the URI for encoding of content not specifically defined by the System.Web.Services.Description. SoapBodyBinding.Encoding property.

This property will return an empty string (" ") if the property value has not been set. The value should only be set if the value of the System.Web.Services.Description. SoapBodyBinding.Use property is Encoded.

Parent
Parts
ToString

Description

Indicates which parts of the transmitted message appear somewhere within the SOAP body portion of that transmission.

Some parts of the transmitted message can appear in portions other than the SOAP body, such as when SOAP is used with a System.Web.Services.Description. MimeMultipartRelatedBinding.

PartsString
ToString
[C#] public string PartsString {get; set;}
[C++] public: _property String* get_PartsString( );public: _property void set_PartsString(String*);
[VB] Public Property PartsString As String
[JScript] public function get PartsString( ): String;public function set PartsString(String);

Description

Indicates which parts of the transmitted message appear somewhere within the SOAP body portion of that transmission.

Some parts of the transmitted message can appear in portions other than the SOAP body, such as when SOAP is used with a System.Web.Services.Description. MimeMultipartRelatedBinding.

Required
Use
ToString

Description

Indicates whether the message parts are encoded based on specified encoding rules, or define the concrete schema of the message.

The System.Web.Services.Description. SoapBodyBinding.Namespace and System.Web.Services.Description. SoapBodyBinding.Encoding properties depend on the value of this property. Their values should be set only if the value of this property is Encoded.

SoapExtensionImporter class (System.Web.Services.Description)

ToString

Description

SoapExtensionImporter
Example Syntax:
ToString
[C#] protected SoapExtensionImporter( );
[C++] protected: SoapExtensionImporter( );
[VB] Protected Sub New( )
[JScript] protected function SoapExtensionImporter( );
ImportContext
ToString
[C#] public SoapProtocolImporter ImportContext {get; set;}
[C++] public: _property SoapProtocolImporter* get_ImportContext( );public: _property void set_ImportContext (SoapProtocolImporter*);
[VB] Public Property ImportContext As SoapProtocolImporter
[JScript] public function get ImportContext( ): SoapProtocolImporter;public function set ImportContext(SoapProtocolImporter);

Description

ImportMethod
[C#] public abstract void ImportMethod(CodeAttributeDeclarationCollection metadata);
[C++] public: virtual void ImportMethod(CodeAttributeDeclarationCollection* metadata)=0;
[VB] MustOverride Public Sub ImportMethod(ByVal metadata As CodeAttributeDeclarationCollection)
[JScript] public abstract function ImportMethod(metadata: CodeAttributeDeclarationCollection);

Description

SoapExtensionReflector class (System.Web.Services.Description)

ToString

Description

SoapExtensionReflector
Example Syntax:
ToString
[C#] protected SoapExtensionReflector( );
[C++] protected: SoapExtensionReflector( );
[VB] Protected Sub New( )
[JScript] protected function SoapExtensionReflector( );
ReflectionContext
ToString
[C#] public ProtocolReflector ReflectionContext {get; set;}
[C++] public: _property ProtocolReflector* get_ReflectionContext( );public: _property void set_ReflectionContext (ProtocolReflector*);
[VB] Public Property ReflectionContext As ProtocolReflector
[JScript] public function get ReflectionContext( ): ProtocolReflector;public function set ReflectionContext(ProtocolReflector);

Description

ReflectMethod
[C#] public abstract void ReflectMethodo;
[C++] public: virtual void ReflectMethod( )=0;

[VB] MustOverride Public Sub ReflectMethod( )
[JScript] public abstract function ReflectMethod( );

Description

SoapFaultBinding class (System.Web.Services.Description)

ToString

Description

Represents an extensibility element added to a System.Web.Services.Description.FaultBinding within a Web Service. It specifies the contents of any SOAP fault message returned. This class cannot be inherited.

SoapFaultBinding

Example Syntax:

ToString

[C#] public SoapFaultBinding( );
[C++] public: SoapFaultBinding( );
[VB] Public Sub New( )
[JScript] public function SoapFaultBinding( );

Encoding

ToString

[C#] public string Encoding {get; set;}
[C++] public: _property String* get_Encoding( );public: property void set_Encoding(String*);
[VB] Public Property Encoding As String
[JScript] public function get Encoding( ): String;public function set Encoding(String);

Description

Gets or sets a URI representing the encoding style used to encode the SOAP fault message.

The value of this property should be set only if the value of the System.Web.Services.Description. SoapFaultBinding.Use property is Encoded.

Handled

Namespace

ToString

Description

Get or sets the URI for encoding of content not specifically defined by the System.Web.Services.Description. SoapFaultBinding.Encoding property.

This property will return an empty string (" ") if the property value has not been set. The value should only be set if the value of the System.Web.Services.Description. SoapFaultBinding.Use property is Encoded.

Parent

Required

Use

ToString

Description

Specifies whether the fault message is encoded using encoding rules specified by the System.Web.Services.Description.SoapFaultBinding.Encoding property, or is encapsulated within a concrete schema.

SoapHeaderBinding class (System.Web.Services.Description)

ToString

Description

Represents an extensibility element added to an System.Web.Services.Description.InputBinding or an System.Web.Services.Description.OutputBinding within a Web Service. This class cannot be inherited.

SoapHeaderBinding

Example Syntax:

ToString

[C#] public SoapHeaderBinding( );
[C++] public: SoapHeaderBinding( );
[VB] Public Sub New( )
[JScript] public function SoapHeaderBinding( );

Encoding

ToString

[C#] public string Encoding {get; set;}
[C++] public: _property String* get_Encoding( );public: _property void set_Encoding(String*);
[VB] Public Property Encoding As String
[JScript] public function get Encoding( ): String;public function set Encoding(String);

Description

Gets or sets a URI representing the encoding style used to encode the SOAP header.

The value of this property should be set only if the value of the System.Web.Services.Description. SoapHeaderBinding.Use property is Encoded.

Handled

MapToProperty

ToString

Description

Message

ToString

[C#] public XmlQualifiedName Message {get; set;}
[C++] public: _property XmlQualifiedName* get_Message( );public: _property void set_Message(XmlQualifiedName*);
[VB] Public Property Message As XmlQualifiedName
[JScript] public function get Message( ): XmlQualifiedName;public function set Message(XmlQualifiedName);

Description

Gets or sets a value specifying the name of the System.Web.Services.Description.Message within the Web Service to which the SoapHeaderBinding applies.

The default value of this property is an empty string (" ").

Namespace

ToString

[C#] public string Namespace {get; set;}
[C++] public: _property String* get_Namespace( );public: _property void set_Namespace(String*);
[VB] Public Property Namespace As String
[JScript] public function get Namespace( ): String;public function set Namespace(String);

Description

Get or sets the URI for encoding of content not specifically defined by the System.Web.Services.Description. SoapHeaderBinding.Encoding property.

This property will return an empty string (" ") if the property value has not been set. The value should only be set if the value of the System.Web.Services.Description. SoapHeaderBinding.Use property is Encoded.

Parent

Part

ToString

Description

Gets or sets a value indicating which System.Web.Services.Description.MessagePart within the Web Service the SoapHeaderBinding applies to.

Required

Use

ToString

Description

Specifies whether the header is encoded using encoding rules specified by the System.Web.Services.Description. SoapHeaderBinding.Encoding property, or is encapsulated within a concrete schema.

SoapHeaderFaultBinding class (System.Web.Services. Description)

ToString

Description

Represents an extensibility element added to an System. Web.Services.Description.InputBinding or an System.Web. Services.Description.OutputBinding within the WebService. It specifies the SOAP header types used to transmit error information within the SOAP header. This class cannot be inherited.

SoapHeaderFaultBinding

Example Syntax:

ToString

[C#] public SoapHeaderFaultBinding( );

[C++] public: SoapHeaderFaultBinding( );

[VB] Public Sub New( )

[JScript] public function SoapHeaderFaultBinding( );

Encoding

ToString

[C#] public string Encoding {get; set;}

[C++] public: _property String* get_Encoding( );public: _property void set_Encoding(String*);

[VB] Public Property Encoding As String

[JScript] public function get Encoding( ): String;public function set Encoding(String);

Description

Gets or sets a URI representing the encoding style used to encode the error message for the SOAP header.

The value of this property should be set only if the value of the System.Web.Services.Description. SoapHeaderFaultBinding.Use property is Encoded.

Handled

Message

ToString

Description

Gets or sets a value specifying the name of the System. Web.Services.Description.Message within the Web Service to which the SoapHeaderFaultBinding applies.

The default value of this property is an empty string (" ").

Namespace

ToString

[C#] public string Namespace {get; set;}

[C++] public: _property String* get_Namespace( );public: _property void set_Namespace(String*);

[VB] Public Property Namespace As String

[JScript] public function get Namespace( ): String;public function set Namespace(String);

Description

Get or sets the URI for encoding of content not specifically defined by the System.Web.Services.Description. SoapHeaderFaultBinding.Encoding property.

This property will return an empty string (" ") if the property value has not been set. The value should only be set if the value of the System.Web.Services.Description. SoapHeaderBinding.Use property is Encoded.

Parent

Part

ToString

Description

Gets or sets a value indicating which System.Web.Services.Description.MessagePart within the Web Service the SoapHeaderFaultBinding applies to.

Required

Use

ToString

Description

Specifies whether the header is encoded using encoding rules specified by the System.Web.Services.Description. SoapHeaderBinding.Encoding property, or is encapsulated within a concrete schema.

SoapOperationBinding class (System.Web.Services.Description)

ToString

Description

Represents an extension added to an System.Web.Services.Description.OperationBinding within a Web Service. Specifies that the message transmission will be in SOAP format. This class cannot be inherited.

SoapOperationBinding

Example Syntax:

ToString

[C#] public SoapOperationBinding( );

[C++] public: SoapOperationBinding( );

[VB] Public Sub New( )

[JScript] public function SoapOperationBinding( );

Handled

Parent

Required

SoapAction

ToString

Description

Specifies the URI for the SOAP header.

This property is required for HTTP protocol binding of SOAP.

Style

ToString

[C#] public SoapBindingStyle Style {get; set;}

[C++] public: _property SoapBindingStyle get_Style( );public: _property void set_Style(SoapBindingStyle);

[VB] Public Property Style As SoapBindingStyle

[JScript] public function get Style( ): SoapBindingStyle;public function set Style(SoapBindingStyle);

Description

One of the System.Web.Services.Description. SoapBindingStyle values. The default is Document.

SoapProtocolImporter class (System.Web.Services.Description)

ToString

Description

SoapProtocolImporter

Example Syntax:

ToString

[C#] public SoapProtocolImporter( );

[C++] public: SoapProtocolImporter( );

[VB] Public Sub New( )

[JScript] public function SoapProtocolImporter( );

Abstract Schemas

Binding

ClassName

ClassNames

CodeNamespace

CodeTypeDeclaration

ConcreteSchemas

InputMessage
MethodName
Operation
OperationBinding
OutputMessage
Port
PortType
ProtocolName
ToString Description
Schemas
Service
ServiceDescriptions
SoapBinding
ToString Description
SoapExporter
ToString

[C#] public SoapCodeExporter SoapExporter {get;}

[C++] public: _property SoapCodeExporter* get_SoapExporter( );

[VB] Public ReadOnly Property SoapExporter As SoapCodeExporter

[JScript] public function get SoapExporter( ): SoapCodeExporter;

Description
SoapImporter
ToString

[C#] public SoapSchemaImporter SoapImporter {get;}

[C++] public: _property SoapSchemaImporter* get_SoapImporter( );

[VB] Public ReadOnly Property SoapImporter As SoapSchemaImporter

[JScript] public function get SoapImporter( ): SoapSchemaImporter;

Description
Style
Warnings
XmlExporter
ToString

Description
XmlImporter
ToString

[C#] public XmlSchemaImporter XmlImporter {get;}

[C++] public: _property XmlSchemaImporter* get_XmlImporter( );

[VB] Public ReadOnly Property XmlImporter As XmlSchemaImporter

[JScript] public function get XmlImporter( ): XmlSchemaImporter;

Description
BeginClass

[C#] protected override CodeTypeDeclaration BeginClass( );

[C++] protected: CodeTypeDeclaration* BeginClass( );

[VB] Overrides Protected Function BeginClass( ) As CodeTypeDeclaration

[JScript] protected override function BeginClass( ): CodeTypeDeclaration;

Description
BeginNamespace

[C#] protected override void BeginNamespace( );

[C++] protected: void BeginNamespace( );

[VB] Overrides Protected Sub BeginNamespace( ) [JScript] protected override function BeginNamespace( );

Description
EndClass

[C#] protected override void EndClass( );

[C++] protected: void EndClass( );

[VB] Overrides Protected Sub EndClass( )

[JScript] protected override function EndClass( );

Description
EndNamespace

[C#] protected override void EndNamespace( );

[C++] protected: void EndNamespace( );

[VB] Overrides Protected Sub EndNamespace( )

[JScript] protected override function EndNamespace( );

Description
GenerateMethod

[C#] protected override CodeMemberMethod GenerateMethod( );

[C++] protected: CodeMemberMethod* GenerateMethod( );

[VB] Overrides Protected Function GenerateMethod( ) As CodeMemberMethod

[JScript] protected override function GenerateMethod( ): CodeMemberMethod;

Description
IsBindingSupported

[C#] protected override bool IsBindingSupported( );

[C++] protected: bool IsBindingSupported( );

[VB] Overrides Protected Function IsBindingSupported( ) As Boolean

[JScript] protected override function IsBindingSupported( ): Boolean;

Description
IsOperationFlowSupported

[C#] protected override bool IsOperationFlowSupported(OperationFlow flow);

[C++] protected: bool IsOperationFlowSupported(OperationFlow flow);

[VB] Overrides Protected Function IsOperationFlowSupported(ByVal flow As OperationFlow) As Boolean

[JScript] protected override function IsOperationFlowSupported(flow: OperationFlow): Boolean;

Description
SoapTransportImporter class (System.Web.Services.Description)
UnsupportedOperationWarning Description
SoapTransportImporter
Example Syntax:
UnsupportedOperationWarning

[C#] protected SoapTransportImporter( );

[C++] protected: Soap TransportImporter( );

[VB] Protected Sub New( )

[JScript] protected function SoapTransportImporter( );

ImportContext
UnsupportedOperationWarning

[C#] public SoapProtocolImporter ImportContext {get; set;}

[C++] public: _property SoapProtocolImporter* get_ImportContext( );public: _property void set_ImportContext (SoapProtocolImporter*);

[VB] Public Property ImportContext As SoapProtocolImporter

[JScript] public function get ImportContext( ): SoapProtocolImporter;public function set ImportContext(SoapProtocolImporter);

Description

ImportClass

[C#] public abstract void ImportClass( );

[C++] public: virtual void ImportClass( )=0;

[VB] MustOverride Public Sub ImportClass( )

[JScript] public abstract function ImportClass( );

Description

IsSupportedTransport

[C#] public abstract bool IsSupportedTransport(string transport);

[C++] public: virtual bool IsSupportedTransport(String* transport)=0;

[VB] MustOverride Public Function IsSupportedTransport (ByVal transport As String) As Boolean

[JScript] public abstract function IsSupportedTransport (transport: String): Boolean;

Description

Types class (System.Web.Services.Description)

ToString

Description

Derived from the System.Web.Services.Description. DocumentableItem class, this class describes data type definitions relevant to exchanged messages. This class cannot be inherited.

This class is a container for datatype definitions for the Web Service. Note especially that this class does NOT represent a collection of System.Type objects, as its name might imply.

Types

Example Syntax:

ToString

[C#] public Types( );

[C++] public: Types( );

[VB] Public Sub New( )

[JScript] public function Types( );

Documentation

Extensions

ToString

Description

Gets the collection of ServiceDescriptionFormatExtension elements incuded in the Web Service. This property is read-only.

In the default implementation of the

System.Web.Services.Discovery

Description

The System.Web.Services.Discovery namespace consists of the classes that allows Web Service consumers to locate the available Web Services on a Web server through a process called Web Services Discovery.

ContractReference class (System.Web.Services.Discovery)

Description

Represents a reference in a discovery document to a Service Description.

Web Services discovery involves discovering the available Web Services given an URL. The URL usually points to a discovery document, which typically has a .disco file extension. Within a discovery document are references to information about the existance of Web Services. These references can refer to Service Descriptions, XML Schema Definition language (XSD) schemas or other discovery documents. This class represents a reference to a Service Description.

[C#] public const string Namespace;

[C++] public: const String* Namespace;

[VB] Public Const Namespace As String

[JScript] public var Namespace: String;

Description

XML namespace for Service Description references in discovery documents.

Within a discovery document, a reference to a Service Description is contained within a contractRef XML element, which is a part of the XML namespace specified in the System.Web.Services.Discovery.ContractReference.Namespace constant.

Constructors:

ContractReference

Example Syntax:

[C#] public ContractReference( );

[C++] public: ContractReference( );

[VB] Public Sub New( )

[JScript] public function ContractReference( ); Initializes a new instance of the System.Web.Services.Discovery. ContractReference class.

Description

Initializes a new instance of the System.Web.Services.Discovery.ContractReference class using default values.

Use this constructor to create and initialize a new instance of the System.Web.Services.Discovery.ContractReference class using default values.

ContractReference

Example Syntax:

[C#] public ContractReference(string href);

[C++] public: ContractReference(String* href);

[VB] Public Sub New(ByVal href As String)

[JScript] public function ContractReference(href: String);

Description

Initializes a new instance of the System.Web.Services.Discovery.ContractReference class using the supplied reference to a Service Description.

Use this constructor to create and initialize a new instance of the System.Web.Services.Discovery.ContractReference class using the specified reference name. The URL for a Sevice Descritpion. Initializes the System.Web.Services.Discovery.ContractReference.Ref property value.

ContractReference

Example Syntax:

[C#] public ContractReference(string href string docRef);

[C++] public: ContractReference(string* href, String* docref);

[VB] Public Sub New(ByVal href As String, ByVal docref As String)

[JScript] public function ContractReference(href: String, docref: String);

Description

Initializes a new instance of the System.Web.Services.Discovery.ContractReference class using the supplied reference to a Service Description and a Web Service implementing the Service Description.

Use this constructor to create and initialize a new instance of the System.Web.Services.Discovery.ContractReference class using the specified reference name and docref. The URL for a Service Description. Initializes the System.Web.Services.Discovery.ContractReference.Ref property value. The URL for a Web Service implementing the Service Description at href. Initializes the System.Web.Services.Discovery. ContractReference.DocRef property value.

Properties:

ClientProtocol

Contract

Description

Gets a System.Web.Services.Description. ServiceDescription object representing the Service Description.

DefaultFilename

[C#] public override string DefaultFilename {get;}

[C++] public: _property virtual String* get_DefaultFilename( );

[VB] Overrides Public ReadOnly Property DefaultFilename As String

[JScript] public function get DefaultFilename( ): String;

Description

Gets the name of the file to use by default when saving the referenced Service Description.

DocRef

[C#] public string DocRef {get; set;}

[C++] public: _property String* get_DocRef( );public: _property void set_DocRef(String*);

[VB] Public Property DocRef As String

[JScript] public function get DocRef( ): String;public function set DocRef(String);

Description

Gets and sets the URL for a Web Service implementing the Service Description referenced in the System.Web.Services. Discovery.ContractReference.Ref property.

Within a discovery document, a reference to a Service Description is contained within a contractRef XML element. The contractRef XML element has two attributes described in the following table.

Ref

[C#] public string Ref {get; set;}

[C++] public: _property String* get_Ref( );public: _property void set_Ref(String*);

[VB] Public Property Ref As String

[JScript] public function get Ref( ): String;public function set Ref(String);

Description

Gets or sets the URL to the referenced Service Description.

Within a discovery document, a reference to a Service Description is contained within a contractRef XML element. The contractRef XML element has two attributes described in the following table.

Url

[C#] public override string Url {get; set;}

[C++] public: _property virtual String* get_Url( );public: _property virtual void set_Url(String*);

[VB] Overrides Public Property Url As String

[JScript] public function get Url( ): String;public function set Url(String);

Description

Gets or sets the URL for the referenced Service Description.

For the System.Web.Services.Discovery. ContractReference class, the System.Web.Services.Discovery. ContractReference.Url property returns the value of the System.Web. Services.Discovery.ContractReference.Ref property.

Methods:

ReadDocument

[C#] public override object ReadDocument(Stream stream);

[C++] public: Object* ReadDocument(Stream* stream);

[VB] Overrides Public Function ReadDocument(ByVal stream As Stream) As Object

[JScript] public override function ReadDocument(stream: Stream): Object;

Description

Reads the Service Description from the passed System.IO.Stream and returns the Service Description.

Return Value: A System.Web.Services.Description. ServiceDescription containing the contents of the referenced Service Description. System.IO.Stream containing the Service Description.

Resolve

[C#] protected internal override void Resolve(string contentType, Stream stream);

[C++] protected public: void Resolve(String* contentType, Stream* stream);

[VB] Overrides Protected Friend Dim Sub Resolve(ByVal contentType As String, ByVal stream As Stream)

[JScript] package override function Resolve(contentType: String, stream Stream);

Description

Resolves whether the the referenced document is valid.

If the MIME type is text/xml and the contents of stream is a Service Description, then the contents of stream are added to the System.Web.Services.Discovery. DiscoveryClientProtocol.References and System.Web.Services.Discovery. DiscoveryClientProtocol.Documents properties of System. Web.Services.Discovery. DiscoveryReference.ClientProtocol. The MIME content type of stream. The System.IO.Stream containing the referenced document.

WriteDocument

[C#] public override void WriteDocument(object document, Stream stream);

[C++] public: void WriteDocument(Object* document, Stream* stream);

[VB] Overrides Public Sub WriteDocument(ByVal document As Object, ByVal stream As Stream)

[JScript] public override function WriteDocument(document: Object, stream: Stream);

Description

Writes the passed-in Service Description into the passed-in System.IO.Stream. The System.Web.Services.Description. ServiceDescription to write into stream. The System.IO.Stream into which the serialized System.Web.Services.Description.ServiceDescription is written.

ContractSearchPattern class (System.Web.Services.Discovery)

WriteDocument

Description

Represents a contract search pattern. This class cannot be inherited.

ContractSearchPattern

Example Syntax:

WriteDocument

[C#] public ContractSearchPattern( );

[C++] public: ContractSearchPattern( );

[VB] Public Sub New( )

[JScript] public function ContractSearchPattern( );

Pattern

WriteDocument

[C#] public override string Pattern {get;}

[C++] public: _property virtual String* get_Pattern( );

[VB] Overrides Public ReadOnly Property Pattern As String

[JScript] public function get Pattern( ): String;

Description

Overrides the base implementation to return the literal string, "*.asmx".

GetDiscoveryReference

[C#] public override DiscoveryReference GetDiscoveryReference(string filename);

[C++] public: DiscoveryReference* GetDiscoveryReference (String* filename);

[VB] Overrides Public Function GetDiscoveryReference (ByVal filename As String) As DiscoveryReference

[JScript] public override function GetDiscoveryReference (filename: String): DiscoveryReference;

Description

Overrides the base implementation to create a System. Web.Services.Discovery.ContractReference object with the specified filename.

Return Value: A System.Web.Services.Discovery. ContractReference object with the specified filename. A string that represents a filename.

DiscoveryClientDocumentCollection class (System.Web. Services.Discovery)

ToString

Description

Represents a collection of documents discovered during Web Services discovery that have been downloaded to the client. This class cannot be inherited.

The System.Web.Services.Discovery. DiscoveryClientProtocol.Documents property of System. Web.Services.Discovery.DiscoveryClientProtocol is of type System.Web.Services.Discovery. DiscoveryClientDocumentCollection.

DiscoveryClientDocumentCollection

Example Syntax:

ToString

[C#] public DiscoveryClientDocumentCollection( );

[C++] public: DiscoveryClientDocumentCollection( );

[VB] Public Sub New( )

[JScript] public function DiscoveryClientDocumentCollection( );

Count

Dictionary

InnerHashtable

Item

ToString

Description

Gets or sets a client discovery document object from the System.Web.Services.Discovery. DiscoveryClientDocumentCollection with the specified URL. The URL of the discovery document to get or set from the System.Web.Services.Discovery. DiscoveryClientDocumentCollection.

Keys

ToString

[C#] public ICollection Keys {get;}

[C++] public: _property ICollection* get_Keys( );

[VB] Public ReadOnly Property Keys As ICollection

[JScript] public function get Keys*( ): ICollection;

Description

Gets an System.Collections.ICollection object with all of the keys in the System.Web.Services.Discovery. DiscoveryClientDocumentCollection.

Values

ToString

[C#] public ICollection Values {get;}

[C++] public: _property ICollection* get_Values( );

[VB] Public ReadOnly Property Values As ICollection

[JScript] public function get Values( ): ICollection;

Description

Gets an System.Collections.ICollection object with all of the values in the System.Web.Services.Discovery. DiscoveryClientDocumentCollection.

Add

[C#] public void Add(string url, object value);

[C++] public: void Add(String* url, Object* value);

[VB] Public Sub Add(ByVal url As String, ByVal value As Object)

[JScript] public function Add(url: String, value: Object);

Description

Adds an object with the specified URL to the System.Web. Services.Discovery.DiscoveryClientDocumentCollection. The URL for the document to add to the System.Web.Services.Discovery.DiscoveryClientDocumentCollection. A discovered document to add to the System.Web.Services.Discovery.DiscoveryClientDocumentCollection.

Contains

[C#] public bool Contains(string url);

[C++] public: bool Contains(String* url);

[VB] Public Function Contains(ByVal url As String) As Boolean

[JScript] public function Contains(url: String): Boolean;

Description

Determines if the System.Web.Services.Discovery. DiscoveryClientDocumentCollection contains an object with the specified URL.

Return Value: true if the System.Web.Services.Discovery. DiscoveryClientDocumentCollection contains an object with the specified URL; otherwise, false. The URL for the document to locate within the System.Web.Services.Discovery. DiscoveryClientDocumentCollection.

Remove

[C#] public void Remove(string url);

[C++] public: void Remove(String* uri);

[VB] Public Sub Remove(ByVal url As String)

[JScript] public function Remove(url: String);

Description

Removes an object with the specified URL from the System.Web.Services.Discovery.DiscoveryClientDocumentCollection. The URL for the discovered document to remove from the System.Web.Services.Discovery. DiscoveryClientDocumentCollection.

DiscoveryClientProtocol class (System.Web.Services. Discovery)

ToString

Description

Provides support for programmatically invoking Web Services discovery.

Web Service discovery is the process of locating, or discovering, one or more related documents that describe available Web Services. It is through Web Services discovery that Web Service clients learn about the available Web Services at a given URL and how to use them. Web Services discovery works from the premise that you have already obtained the URL to a discovery document, possibly through a directory service, such as http://uddi.microsoft.com, however, you do not have the details about the Web Services offered. Through Web Services discovery, you can discover the details about the Web Services listed in a System.Web.Services.Discovery. DiscoveryDocument at a specific URL.

DiscoveryClientProtocol

Example Syntax:

ToString

[C#] public DiscoveryClientProtocol( );

[C++] public: DiscoveryClientProtocol( );

[VB] Public Sub New( )

[JScript] public function DiscoveryClientProtocol( );

Description

Initializes a new instance of the System.Web.Services.Discovery.DiscoveryClientProtocol class.

AdditionalInformation

ToString

[C#] public IList AdditionalInformation {get;}

[C++] public: _property IList* get_AdditionalInformation( );

[VB] Public ReadOnly Property AdditionalInformation As IList

[JScript] public function get AdditionalInformation( ): IList;

Description

Gets information in addition to references found in the discovery document.

The System.Web.Services.Discovery. DiscoveryClientProtocol.AdditionalInformation property primarily contains SOAP bindings, represented by the System.Web.Services-.Discovery.SoapBinding class, defined in the discovery document.

AllowAutoRedirect

ClientCertificates

ConnectionGroupName

Container

CookieContainer

Credentials

DesignMode

Documents

ToString

Description

Gets a collection of discovery documents.

The System.Web.Services.Discovery. DiscoveryClientProtocol.Documents collection is populated during invocations to the System.Web.Services.Discovery. DiscoveryClientProtocol.Discover(System.String), System.Web.Services.Discovery.DiscoveryClientProtocol.DiscoverAny(System.String), System.Web.Services.Discovery. DiscoveryClientProtocol.ResolveAll and System.Web.Services.Discovery. DiscoveryClientProtocol.ResolveOneLevel methods. During invocations to the System.Web.Services.Discovery.DiscoveryClientProtocol.Discover(System.String) and System.Web.Services.Discovery. DiscoveryClientProtocol. DiscoverAny(System.String) methods, if the supplied URL is a valid discovery document, that document is added to the System.Web.Services.Discovery. DiscoveryClientProtocol.Documents collection. During invocations to the System.Web.Services.Discovery. DiscoveryClientProtocol-.ResolveAll and System.Web.Services. Discovery.DiscoveryClientProtocol.ResolveOneLevel methods, valid discovery document references in the System.Web.Services.Discovery.DiscoveryClientProtocol.References collection are added to the System.Web.Services.Discovery. DiscoveryClientProtocol.Documents collection.

Errors

ToString

[C#] public DiscoveryExceptionDictionary Errors {get;}

[C++] public: _property DiscoveryExceptionDictionary* get_Errors( );

[VB] Public ReadOnly Property Errors As DiscoveryExceptionDictionary

[JScript] public function get Errors( ): DiscoveryExceptionDictionary;

Description

Gets a collection of exceptions that occurred during invocation of method from this class.

The System.Web.Services.Discovery. DiscoveryClientProtocol.Errors collection is populated with exceptions that occurred during invocations to the System. Web.Services. Discovery.DiscoveryClientProtocol.Discover(System.String), System.Web.Services.Discovery. DiscoveryClientProtocol.DiscoverAny(System.String), System.Web.Services.Discovery.DiscoveryClientProtocol.ResolveAll, and System.Web.Services.Discovery. DiscoveryClientProtocol.ResolveOneLevel methods. The System.Web.Services.Discovery. DiscoveryExceptionDictionary is cleared on invocation of these methods.

Events

PreAuthenticate

Proxy

References

ToString

Description

A collection of references founds in resolved discovery documents.

The System.Web.Services.Discovery. DiscoveryClientProtocol.References collection is populated during invocations to the System.Web.Services.Discovery. DiscoveryClientProtocol.Discover(System.String), System.Web.Services.Discovery.DiscoveryClientProtocol.DiscoverAny(System.String), System.Web.Services.Discovery.DiscoveryClientProtocol.ResolveAll and System.Web.Services.Discovery. DiscoveryClientProtocol.ResolveOneLevel methods. During invocations to the System.Web.Services.Discovery. DiscoveryClientProtocol.Discover(System.String) and System.Web.Services.Discovery. DiscoveryClientProtocol.DiscoverAny(System.String) methods, if the supplied URL is a valid discovery document, that document is added to the System.Web.Services.Discovery. DiscoveryClientProtocol.References collection together with references found in the discovery document. References added during invocations to the System.Web.Services.Discovery. DiscoveryClientProtocol.Discover(System.String) and System.Web.Services.Discovery.DiscoveryClientProtocol.DiscoverAny(System.String) methods are not necessarily valid discovery documents. During invocations to System.Web.Services.Discovery. DiscoveryClientProtocol.ResolveAll and System.Web.Services.Discovery. DiscoveryClientProtocol.ResolveOneLevel references within the System.Web.Services.Discovery. DiscoveryClientProtocol.References collection are verified as being valid discovery documents. If they are valid and contain references, they are also added to the System.Web.Services.Discovery. DiscoveryClientProtocol.References collection.

RequestEncoding

Site

Timeout

Url

UserAgent

Discover

[C#] public DiscoveryDocument Discover(string url);

[C++] public: DiscoveryDocument* Discover(String* url);

[VB] Public Function Discover(ByVal url As String) As DiscoveryDocument

[JScript] public function Discover(url: String): DiscoveryDocument;

Description

Discovers the supplied URL to determine if it is a discovery document.

Return Value: A System.Web.Services.Discovery. DiscoveryDocument containing the results of Web Services discovery at the supplied URL.

The System.Web.Services.Discovery. DiscoveryClientProtocol.Discover(System.String) method expects that the supplied URL is a discovery document. If the URL refers to a Service Description or an XML schema an exception is thrown. To discover an XML schema or a Service Description invoke the System.Web.Services.Discovery. DiscoveryClientProtocol.DiscoverAny(System.String) method. The URL where Web Services discovery begins.

DiscoverAny

[C#] public DiscoveryDocument DiscoverAny(string url);

[C++] public: DiscoveryDocument* DiscoverAny(String* uri);

[VB] Public Function DiscoverAny(ByVal url As String) As DiscoveryDocument

[JScript] public function DiscoverAny(url: String): DiscoveryDocument;

Description

Discovers the supplied URL to determine if it is a discovery document, Service Description or an XML Schema Definition (XSD) schema.

Return Value: A System.Web.Services.Discovery. DiscoveryDocument containing the results of Web Services discovery at the supplied URL. If the url parameter refers to a Service Description or an XSD Schema, a System.Web.Services.Discovery.DiscoveryDocument is created in memory for it.

The System.Web.Services.Discovery. DiscoveryClientProtocol.DiscoverAny(System.String) method discovers whether the supplied URL is a discovery document, Service Description or XSD schema. If it is known that the URL only refers to a discovery document, the System.Web.Services. Discovery.DiscoveryClientProtocol.Discover(System. String) method might be invoked. The URL where Web Services discovery begins.

Download

[C#] public Stream Download(ref string url);

[C++] public: Stream* Download(String** uri);

[VB] Public Function Download(ByRef url As String) As Stream

[JScript] public function Download(url: String): Stream; Downloads the discovery document at the supplied URL into a System.IO.Stream object.

Description

Downloads the discovery document at the supplied URL into a System.IO.Stream object.

Return Value: A System.IO.Stream containing the document at the supplied URL. The URL of the discovery document to download.

Download

[C#] public Stream Download(ref string url, ref string contentType);

[C++] public: Stream* Download(String url, String contentType);

[VB] Public Function Download(ByRef url As String, ByRef contentType As String) As Stream

[JScript] public function Download(url: String, contentType: String): Stream;

Description

Downloads the discovery document at the supplied URL into a System.IO.Stream object, setting the conten(Type parameter to the MIME encoding of the discovery document.

Return Value: A System.IO.Stream containing the document at the supplied URL. The URL of the discovery document to download. The MIME encoding of the downloaded discovery document.

ReadAll

[C#] public DiscoveryClientResultCollection ReadAll(string topLevelFilename);

[C++] public: DiscoveryClientResultCollection* ReadAll (String* topLevelFilename);

[VB] Public Function ReadAll(ByVal topLevelFilename As String) As DiscoveryClientResultCollection

[JScript] public function ReadAll(topLevelFilename: String): DiscoveryClientResultCollection;

Description

Reads in a file containing a map of saved discovery documents populating the System.Web.Services.Discovery. DiscoveryClientProtocol.Documents and System.Web.Services.Discovery.DiscoveryClientProtocol.References properties, with discovery documents, XML Schema Definition (XSD) schemas, and Service Descriptions referenced in the file.

Return Value: A

System.Web.Services.Discovery. DiscoveryClientResultCollection containing the results found in the file with the map of saved discovery documents. The file format is a System.Web.Services.Discovery. DiscoveryClientProtocol.DiscoveryClientRes ultsFile class serialized into XML; however, one would typically create the file using only the System. Web.Services.Discovery. DiscoveryClientProtocol. WriteAll (System.String,System. String) method or Disco.exe.

A file containing a map of saved discovery documents can be created by the System.Web.Services.Discovery. DiscoveryClientProtocol.WriteAll(System.String,System. String) method or Disco.exe. Name of file to read in, containing the map of saved discovery documents.

ResolveAll

[C#] public void ResolveAll( );

[C++] public: void ResolveAll( );

[VB] Public Sub ResolveAll( )

[JScript] public function ResolveAll( );

Description

Resolves all references to discovery documents, XML Schema Definition (XSD) schemas, and Service Descriptions in the System.Web.Services.Discovery. DiscoveryClientProtocol.References property, as well as references found in referring discovery documents.

System.Web.Services.Discovery. DiscoveryClientProtocol.ResolveAll resolves all valid references it finds and places them in the System.Web.Services. Discovery.DiscoveryClientProtocol.Documents property. Both System.Web.Services.Discovery.DiscoveryClientProtocol.ResolveAll and System.Web.Services.Discovery.DiscoveryClientProtocol. ResolveOneLevel download and verify XSD schemas and Service Descriptions in the System.Web.Services.Discovery. DiscoveryClientProtocol.References property. However, the two methods differ in how they handle discovery documents.

ResolveOneLevel

[C#] public void ResolveOneLevel( );

[C++] public: void ResolveoneLevel( );

[VB] Public Sub ResolveOneLevel( )
[JScript] public function ResolveoneLevel( );

Description

Resolves all references to discovery documents, XML Schema Definition (XSD) schemas and Service Descriptions in System.Web.Services.Discovery. DiscoveryClientProtocol.References, as well as references found in those discovery documents.

System.Web.Services.Discovery. DiscoveryClientProtocol.ResolveOneLevel resolves all valid references it finds and places them in the System.Web. Services.Discovery.DiscoveryClientProtocol.Documents property. Both System.Web. Services.Discovery. DiscoveryClientProtocol.ResolveAll and System.Web.Services.Discovery. DiscoveryClientProtocol.ResolveOneLevel download and verify XSD schemas and Service Descriptions in the System. Web.Services.Discovery.DiscoveryClientProtocol.References property. However, the two methods differ in how they handle discovery documents.

WriteAll

[C#] public DiscoveryClientResultCollection WriteAll (string directory, string topLevelFilename);
[C++] public: DiscoveryClientResultCollection* WriteAll (String* directory, String* topLevelFilename);
[VB] Public Function WriteAll(ByVal directory As String, ByVal topLevelFilename As String) As DiscoveryClientResultCollection
[JScript] public function WriteAll(directory: String, topLevelFilename: String): DiscoveryClientResultCollection;

Description

Writes all discovery documents, XML Schema Definition (XSD) schemas, and Service Descriptions in the System. Web.Services.Discovery.DiscoveryClientProtocol.Documents property to the supplied directory and creates a file in that directory.

Return Value: A System.Web.Services.Discovery. DiscoveryClientResultCollection containing the results of all files saved.

The file created with the name of the topLevelFilename parameter in the directory specified by the directory parameter contains a map of saved discovery documents, XML Schema Definition (XSD) schemas and Service Descriptions. This file can be read in using the System.Web.Services.Discovery.DiscoveryClientProtocol.ReadAll(System.String) method to populate the System.Web.Services.Discovery. DiscoveryClientProtocol.References and System.Web.Services.Discovery.DiscoveryClientProtocol.Documents properties. The format of the file is XML containing an serialized version of the System.Web.Services.Discovery. DiscoveryClientProtocol.DiscoveryClientResultsfile class. The directory in which to save all documents currently in the System. Web.Services.Discovery. DiscoveryClientProtocol.Documents property. The name of the file to create or overwrite containing a map of all documents saved.

DiscoveryClientReferenceCollection class (System.Web. Services.Discovery)

WriteAll

Description

Represents a collection of System.Web.Services.Discovery.DiscoveryReference objects. This class cannot be inherited.

The System.Web.Services.Discovery. DiscoveryClientProtocol.References property of System. Web.Services.Discovery.DiscoveryClientProtocol is of type System.Web.Services.Discovery.DiscoveryClientReferenceCollection.

DiscoveryClientReferenceCollection

Example Syntax:

WriteAll

[C#] public DiscoveryClientReferenceCollection( );
[C++] public: DiscoveryClientReferenceCollection( );
[VB] Public Sub New( )
[JScript] public function DiscoveryClientReferenceCollection( );

Count

Dictionary

InnerHashtable

Item

WriteAll

Description

Gets or sets a System.Web.Services.Discovery. DiscoveryReference object from the System.Web.Services. Discovery. DiscoveryClientReferenceCollection with the specified URL. The URL for the DiscoveryReference to get or set from the System.Web.Services.Discovery. DiscoveryClientReferenceCollection.

Keys

WriteAll

[C#] public ICollection Keys {get;}
[C++] public: _property ICollection* get_Keys( );
[VB] Public ReadOnly Property Keys As ICollection
[JScript] public function get Keys( ): ICollection;

Description

Gets an System.Collections.ICollection object with all of the keys in the System.Web.Services.Discovery. DiscoveryClientReferenceCollection.

Values

WriteAll

[C#] public ICollection Values {get;}
[C++] public: _property ICollection* get_Values( );
[VB] Public ReadOnly Property Values As ICollection
[JScript] public function get Values( ): ICollection;

Description

Gets an System.Collections.ICollection object with all of the values in the System.Web.Services.Discovery. DiscoveryClientReferenceCollection.

Add

[C#] public void Add(DiscoveryReference value);
[C++] public: void Add(DiscoveryReference* value);
[VB] Public Sub Add(ByVal value As DiscoveryReference)
[JScript] public function Add(value: DiscoveryReference);

Adds a System.Web.Services.Discovery. DiscoveryReference to the System.Web.Services.Discovery. DiscoveryClientReferenceCollection.

Description

Adds a System.Web.Services.Discovery. DiscoveryReference to the System.Web.Services.Discovery. DiscoveryClientReferenceCollection. The System.Web.Services.Discovery.DiscoveryReference to add to the System.Web.Services.Discovery. DiscoveryClientReferenceCollection.

Add

[C#] public void Add(string url, DiscoveryReference value);
[C++] public: void Add(String* url, DiscoveryReference* value);
[VB] Public Sub Add(ByVal url As String, ByVal value As DiscoveryReference)
[JScript] public function Add(url: String, value: DiscoveryReference);

Description

Adds a System.Web.Services.Discovery. DiscoveryReference with the specified URL and value to the System.Web. Services.Discovery. DiscoveryClientReferenceCollection. The URL for the reference to add to the System.Web.Services.Discovery. DiscoveryClientReferenceCollection. The DiscoveryReference to add to the System.Web.Services.Discovery.DiscoveryClientReferenceCollection.

Contains

[C#] public bool Contains(string url);

[C++] public: bool Contains(String* url);

[VB] Public Function Contains(ByVal url As String) As Boolean

[JScript] public function Contains(url: String): Boolean;

Description

Determines if the System.Web.Services.Discovery. DiscoveryClientReferenceCollection contains a System. Web. Services.Discovery.DiscoveryReference with the specified URL.

Return Value: true if the System.Web.Services.Discovery. DiscoveryClientReferenceCollection contains a System. Web.Services.Discovery.DiscoveryReference with the specified URL; otherwise, false. The URL for the System. Web. Services.Discovery.DiscoveryReference to locate within the System.Web.Services.Discovery. DiscoveryClientReferenceCollection.

Remove

[C#] public void Remove(string url);

[C++] public: void Remove(String* uri);

[VB] Public Sub Remove(ByVal url As String)

[JScript] public function Remove(url: String);

Description

Removes a System.Web.Services.Discovery. DiscoveryReference with the specified URL from the System.Web.Services.Discovery.DiscoveryClientReferenceCollection. A string that represents the URL for the object to remove from the System.Web.Services.Discovery. DiscoveryClientReferenceCollection.

DiscoveryClientResult class (System.Web.Services.Discovery)

ToString

Description

Represents the details of a discovery reference without the actual contents of the referenced document. This class cannot be inherited.

Using the System.Web.Services.Discovery. DiscoveryClientProtocol.WriteAll(System.String,System. String) method of System.Web.Services.Discovery. DiscoveryClientProtocol, all valid referenced documents and a file containing a map of all save documents can be written to disk. The file containing a map of all saved documents contains the details of each document as summarized by the properties of System.Web.Services.Discovery. DiscoveryClientResult.

DiscoveryClientResult

Example Syntax:

ToString

[C#] public DiscoveryClientResult( );

[C++] public: DiscoveryClientResult( );

[VB] Public Sub New( )

[JScript] public function DiscoveryClientResult( ); Initializes a new instance of the System.Web.Services.Discovery. DiscoveryClientResult class.

Description

Initializes a new instance of the System.Web.Services.Discovery.DiscoveryClientResult class.

DiscoveryClientResult

Example Syntax:

ToString

[C#] public DiscoveryClientResult(Type referenceType, string url, string filename);

[C++] public: DiscoveryClientResult(Type* referenceType, String* url, String* filename);

[VB] Public Sub New(ByVal referenceType As Type, ByVal url As String, ByVal filename As String)

[JScript] public function DiscoveryClientResult(referenceType: Type, url: String, filename: String);

Description

Initializes a new instance of the System.Web.Services.Discovery.DiscoveryClientResult class and sets the System. Web.Services.Discovery.DiscoveryClientResult.ReferenceTypeName property to referenceType, the System.Web.Services.Discovery. DiscoveryClientResult.Url property to url and the System. Web.Services.Discovery.DiscoveryClientResult.Filename property to filename. Name of the type for a reference in the discovery document. Sets the System.Web.Services.Discovery.DiscoveryClientResult.ReferenceTypeName property. URL for the reference. Sets the System.Web.Services.Discovery.DiscoveryClientResult.Urt property. Name of the file in which the reference was saved. Sets the System.Web.Services.Discovery.DiscoveryClientResult.Filename property.

Filename

ToString

[C#] public string Filename {get; set;}

[C++] public: _property String* get Filename( );public: _property void set_Filename(String*);

[VB] Public Property Filename As String

[JScript] public function get Filename( ): String;public function set Filename(String);

Description

Gets or sets the name of the file in which the reference is saved.

The name of the file is the name of the file saved on the local machine based on the contents of the file. For instance, if the referenced file is a discovery document, the saved file will have a .disco extension on a Windows operating system.

ReferenceTypeName

ToString

[C#] public string ReferenceTypeName {get; set;}

[C++] public: _property String* get_ReferenceType Name( );public: _property void set_ReferenceTypeName (String*);

[VB] Public Property ReferenceTypeName As String

[JScript] public function get ReferenceTypeName( ): String; public function set ReferenceTypeName(String);

Description

Name of the type for a reference in the discovery document.

A reference within a discovery document can contain references to Service Descriptions, XSD schemas, or other discovery documents. Therefore, System.Web.Services.Discovery.DiscoveryClientResult.ReferenceTypeName can have the following values: System.Web.Services.Description. ServiceDescription, System.Xml.Schema.XmlSchema, and System.Web.Services.Discovery.DiscoveryDocument.

Url

ToString

[C#] public string Url {get; set;}

[C++] public: _property String* get Url( );public: _property void set_Url(String*);
[VB] Public Property Url As String
[JScript] public function get Url( ): String;public function set Url(String);

Description

Gets or sets the URL for the reference.

The URL can refer to a discovery document, XML Schema Definition (XSD) schema, or a Service Description.

DiscoveryClientResultCollection class (System.Web.Services.Discovery)

ToString

Description

Contains a collection of System.Web.Services.Discovery. DiscoveryClientResult objects. This class cannot be inherited.

DiscoveryClientResultCollection

Example Syntax:

ToString

[C#] public DiscoveryClientResultCollection( );
[C++] public: DiscoveryClientResultCollection( );
[VB] Public Sub New( )
[JScript] public function DiscoveryClientResult Collection( );

Count

InnerList

Item

ToString

Description

Gets or sets the System.Web.Services.Discovery. DiscoveryClientResult at position i of the System.Web.Services. Discovery.DiscoveryClientResultCollection.

This property provides the ability to access a specific element in the collection by using the following syntax: myCollection[index]. The zero-based index of the System.Web. Services.Discovery.DiscoveryClientResult to get or set.

List

Add

[C#] public int Add(DiscoveryClientResult value);
[C++] public: mnt Add(DiscoveryClientResult* value);
[VB] Public Function Add(ByVal value As DiscoveryClientResult) As Integer
[JScript] public function Add(value: DiscoveryClientResult): int;

Description

Adds a System.Web.Services.Discovery. DiscoveryClientResult to the System.Web.Services.Discovery. DiscoveryClientResultCollection.

Return Value: The position into which the System.Web.Services.Discovery.DiscoveryClientResult was inserted. The System.Web.Services.Discovery.DiscoveryClientResult to add to the System.Web.Services.Discovery. DiscoveryClientResultCollection.

Contains

[C#] public bool Contains(DiscoveryClientResult value);
[C++] public: bool Contains(DiscoveryClientResult* value);
[VB] Public Function Contains(ByVal value As DiscoveryClientResult) As Boolean
[JScript] public function Contains(value: DiscoveryClientResult): Boolean;

Description

Determines whether the System.Web.Services.Discovery. DiscoveryClientResultCollection contains a specific System. Web.Services.Discovery.DiscoveryClientResult.

Return Value: true if the System.Web.Services.Discovery. DiscoveryClientResult is found in the System.Web.Services.Discovery.DiscoveryClientResultCollection; otherwise, false. The System.Web.Services.Discovery. DiscoveryClientResult to locate in the System.Web.Services.Discovery. DiscoveryClientResultCollection.

Remove

[C#] public void Remove(DiscoveryClientResult value);
[C++] public: void Remove(DiscoveryClientResult* value);
[VB] Public Sub Remove(ByVal value As DiscoveryClientResult)
[JScript] public function Remove(value: DiscoveryClientResult);

Description

Removes the first occurrence of a specific System.Web. Services.Discovery.DiscoveryClientResult from the System. Web.Services.Discovery.DiscoveryClientResultCollection The System.Web.Services.Discovery. DiscoveryClientResult elements that follow the removed System.Web.Services.Discovery.DiscoveryClientResult move up to occupy the vacated spot. The System.Web.Services.Discovery. DiscoveryClientResult to remove from the System.Web.Services. Discovery.DiscoveryClientResultCollection.

DiscoveryClientProtocol.DiscoveryClientResultsFile class (System.Web.Services.Discovery)

ToString

Description

Represents the root element of an XML document containing the results of all files written when the System.Web.Services.Discovery.DiscoveryClientProtocol.WriteAll(System. String,System.String) method is invoked.

When you invoke the System.Web.Services.Discovery. DiscoveryClientProtocol.WriteAll(System.String,System. String) method, all resolved discovery documents and a file containing a map of all those files are saved to a directory. The map file is described in XML with the root element being System.Web.Services.Discovery. DiscoveryClientProtocol. DiscoveryClientResultsfile; this class is passed to the System.Xml.Serialization.XmlSerializer class to serialize the results.

DiscoveryClientProtocol.DiscoveryClientResultsFile

Example Syntax:

ToString

[C#] public DiscoveryClientProtocol.DiscoveryClientResultsFile( );
[C++] public: DiscoveryClientResultsFile( );
[VB] Public Sub New( )
[JScript] public function DiscoveryClientProtocol.DiscoveryClientResultsFile( );

Results

ToString

[C#] public DiscoveryClientResultCollection Results {get;}
[C++] public: _property DiscoveryClientResultCollection* get_Results( );
[VB] Public ReadOnly Property Results As DiscoveryClientResultCollection
[JScript] public function get Results( ): DiscoveryClientResultCollection;

Description

Gets a collection of System.Web.Services.Discovery. DiscoveryClientResult objects.

DiscoveryDocument class (System.Web.Services.Discovery)

ToString

Description

Represents a discovery document. This class cannot be inherited.

Web Services discovery involves discovering the available Web Services given an URL. The URL typically points to a discovery document, which usually has a .disco file extension. The discovery document, which is an XML document, contains references to information about the existance of Web Services, such as a Service Description, XML Schema Definition language (XSD) schema, or another discovery document. This class represents the contents of the discovery document; where the System.Web.Services.Discovery. DiscoveryDocument.References property contains a list of the references contained within the discovery document.

ToString

[C#] public const string Namespace;

[C++] public: const String* Namespace;

[VB] Public Const Namespace As String

[JScript] public var Namespace: String;

Description

Namespace of the discovery XML element of a discovery document.

A discovery document contains references to documents describing Web Services. These references are XML elements contained within a discovery XML element. That discovery XML element is a member of the XML namespace specified by the System.Web.Services.Discovery. DiscoveryDocument.Namespace constant.

DiscoveryDocument

Example Syntax:

ToString

[C#] public DiscoveryDocument( );

[C++] public: DiscoveryDocument( );

[VB] Public Sub New( )

[JScript] public function DiscoveryDocument( );

Description

Initializes a new instance of the System.Web.Services.Discovery.DiscoveryDocument class.

References

ToString

[C#] public IList References {get;}

[C++] public: _property IList* get_References( );

[VB] Public ReadOnly Property References As IList

[JScript] public function get References( ): IList;

Description

A list of references contained within the discovery document.

A discovery document contains references to information about the existence of Web Services. These references can refer to Service Descriptions, XSD schemas, or other discovery documents. The System.Web.Services.Discovery. DiscoveryDocument.References property contains a list of those references.

CanRead

[C#] public static bool CanRead(XmlReader xmlReader);

[C++] public: static bool CanRead(XmlReader* xmlReader);

[VB] Public Shared Function CanRead(ByVal xmlReader As XmlReader) As Boolean

[JScript] public static function CanRead(xmlReader: XmlReader): Boolean;

Description

Returns a value indicating whether the passed System.Xml.XmlReader can be deserialized into a System.Web.Services.Discovery.DiscoveryDocument Return Value: true if System.Xml.XmlReader can be deserialized into a System.Web.Services.Discovery. DiscoveryDocument; otherwise, false. The System.Xml.XmlReader to determine whether it can be deserialized into a System.Web. Services.Discovery.DiscoveryDocument.

Read

[C#] public static DiscoveryDocument Read(Stream stream);

[C++] public: static DiscoveryDocument* Read(Stream* stream);

[VB] Public Shared Function Read(ByVal stream As Stream) As DiscoveryDocument

[JScript] public static function Read(stream: Stream): DiscoveryDocument; Reads and returns a System.Web.Services.Discovery.DiscoveryDocument from the passed object.

Description

Reads and returns a System.Web.Services.Discovery. DiscoveryDocument from the passed System.IO.Stream.

Return Value: A System.Web.Services.Discovery. DiscoveryDocument containing the contents of a discovery document from the passed System.IO.Stream. The System.IO.Stream from which to read the System.Web.Services.Discovery.DiscoveryDocument.

Read

[C#] public static DiscoveryDocument Read(TextReader reader);

[C++] public: static DiscoveryDocument* Read(TextReader* reader);

[VB] Public Shared Function Read(ByVal reader As TextReader) As DiscoveryDocument

[JScript] public static function Read(reader: TextReader): DiscoveryDocument;

Description

Reads and returns a System.Web.Services.Discovery. DiscoveryDocument from the passed System.IO.TextReader.

Return Value: A System.Web.Services.Discovery. DiscoveryDocument containing the contents of a discovery document from the passed System.IO.TextReader. The System.IO.TextReader from which to read the System.Web.Services.Discovery.DiscoveryDocument.

Read

[C#] public static DiscoveryDocument Read(XmlReader xmlReader);

[C++] public: static DiscoveryDocument* Read(XmlReader* xmlReader);

[VB] Public Shared Function Read(ByVal xmlReader As XmlReader) As DiscoveryDocument

[JScript] public static function Read(xmlReader: XmlReader): DiscoveryDocument;

Description

Reads and returns a System.Web.Services.Discovery. DiscoveryDocument from the passed System.Xml.XmlReader.

Return Value: A System.Web.Services.Discovery. DiscoveryDocument containing the contents of a discovery document from the passed System.Xml.XmlReader. The System.Xml.XmlReader from which to read the System. Web.Services.Discovery.DiscoveryDocument.

Write

[C#] public void Write(Stream stream);

[C++] public: void Write(Stream* stream);

[VB] Public Sub Write(ByVal stream As Stream)

[JScript] public function Write(stream: Stream);

Description

Writes this System.Web.Services.Discovery. DiscoveryDocument into the passed System.IO.Stream. The System.IO.Stream into which this System.Web.Services.Discovery.DiscoveryDocument is written.

Write

[C#] public void Write(TextWriter writer);

[C++] public: void Write(TextWriter* writer);

[VB] Public Sub Write(ByVal writer As TextWriter)

[JScript] public function Write(writer: TextWriter); Writes this System.Web.Services.Discovery.DiscoveryDocument into the passed object.

Description

Writes this System.Web.Services.Discovery. DiscoveryDocument into the passed System.IO.TextWriter. The System.IO.TextWriter into which this System.Web.Services.Discovery.DiscoveryDocument is written.

Write

[C#] public void Write(XmlWriter writer);

[C++] public: void Write(XmlWriter* writer);

[VB] Public Sub Write(ByVal writer As XmlWriter)

[JScript] public function Write(writer: XmlWriter);

Description

Writes this System.Web.Services.Discovery. DiscoveryDocument into the passed System.Xml.XmlWriter. The System.Xml.XmlWriter into which this System. Web.Services. Discovery.DiscoveryDocument is written.

DiscoveryDocumentLinksPattern class (System.Web.Services.Discovery)

Write

Description

DiscoveryDocumentLinksPattern

Example Syntax:

Write

[C#] public DiscoveryDocumentLinksPattern( );

[C++] public: DiscoveryDocumentLinksPattern( );

[VB] Public Sub New( )

[JScript] public function DiscoveryDocumentLinks Pattern( );

Pattern

Write

[C#] public override string Pattern {get;}

[C++] public: _property virtual String* get_Pattern( );

[VB] Overrides Public ReadOnly Property Pattern As String

[JScript] public function get Pattern( ): String;

Description

GetDiscoveryReference

[C#] public override DiscoveryReference GetDiscoveryReference(string filename);

[C++] public: DiscoveryReference* GetDiscoveryReference (String* filename);

[VB] Overrides Public Function GetDiscoveryReference (ByVal filename As String) As DiscoveryReference

[JScript] public override function GetDiscoveryReference (filename: String): DiscoveryReference;

Description

DiscoveryDocumentReference class (System.Web.Services.Discovery)

ToString

Description

Represents a reference to a discovery document. This class cannot be inherited.

Web Services discovery involves discovering the available Web Services given an URL. The URL typically points to a discovery document, which usually has a .disco file extension. The discovery document contains references to information about the existance of Web Services, such as Service Descriptions, XML Schema Definition language (XSD) schemas, or other discovery documents. This class represents a reference to a discovery document.

DiscoveryDocumentReference

Example Syntax:

ToString

[C#] public DiscoveryDocumentReference( );

[C++] public: DiscoveryDocumentReference( );

[VB] Public Sub New( )

[JScript] public function DiscoveryDocumentReference( ); Initializes a new instance of the System.Web.Services.Discovery.DiscoveryDocumentReference class.

Description

Initializes a new instance of the System.Web.Services.Discovery.DiscoveryDocumentReference class.

DiscoveryDocumentReference

Example Syntax:

ToString

[C#] public DiscoveryDocumentReference(string href);

[C++] public: DiscoveryDocumentReference(String* href);

[VB] Public Sub New(ByVal href As String)

[JScript] public function DiscoveryDocumentReference (href: String);

Description

Initializes a new instance of the System.Web.Services.Discovery.DiscoveryDocumentReference class, setting the System.Web.Services.Discovery.DiscoveryDocumentReference.Ref property to href. Reference to a discovery document.

ClientProtocol

DefaultFilename

ToString

Description

Gets the name of the default file to use when saving the referenced discovery document.

Document

ToString

[C#] public DiscoveryDocument Document {get;}

[C++] public: _property DiscoveryDocument* get_Document( );

[VB] Public ReadOnly Property Document As DiscoveryDocument

[JScript] public function get Document( ): DiscoveryDocument;

Description

Gets the contents of the referenced discovery document as a System.Web.Services.Discovery.DiscoveryDocument object.

If the discovery document has not been downloaded and added to the System.Web.Services.Discovery. DiscoveryClientProtocol.Documents property of System.Web.Services. Discovery.DiscoveryReference.ClientProtocol, an attempt to download and resolve the document is made.

Ref

ToString

[C#] public string Ref {get; set;}

[C++] public: _property String* get Ref);public: _property void set_Ref(String*);

[VB] Public Property Ref As String

[JScript] public function get Ref( ): String;public function set Ref(String);

Description

Gets or sets the reference to a discovery document.

For most references, the System.Web.Services.Discovery. DiscoveryDocumentReference.Ref property is a URL, such as http://www.contoso.com/MyWebService.disco.

Url

ToString

[C#] public override string Url {get; set;}

[C++] public: _property virtual String* get_Url( );

public: _property virtual void set_Url(String*);

[VB] Overrides Public Property Url As String

[JScript] public function get Url( ): String;public function set Url(String);

Description

Gets or sets the URL of the referenced discovery document.

Returns the value of the System.Web.Services.Discovery. DiscoveryDocumentReference.Ref property.

ReadDocument

[C#] public override object ReadDocument(Stream stream);

[C++] public: Object* ReadDocument(Stream* stream);

[VB] Overrides Public Function ReadDocument(ByVal stream As Stream) As Object

[JScript] public override function ReadDocument(stream: Stream): Object;

Description

Reads and returns the discovery document from the passed System.IO.Stream.

Return Value: A System.Web.Services.Discovery. DiscoveryDocument containing the contents of the referenced discovery document. System.IO.Stream containing the discovery document.

Resolve

[C#] protected internal override void Resolve(string contentType, Stream stream);

[C++] protected public: void Resolve(String* contentType, Stream* stream);

[VB] Overrides Protected Friend Dim Sub Resolve(ByVal contentType As String, ByVal stream As Stream)

[JScript] package override function Resolve(contentType: String, stream: Stream);

Description

Resolves whether the referenced document is valid.

If the MIME type is text/xml and the contents of stream is a discovery document, then the contents of stream are added to the System.Web.Services.Discovery. DiscoveryClientProtocol.References and System.Web.Services.Discovery. DiscoveryClientProtocol.Documents properties of System. Web.Services.Discovery. DiscoveryReference.ClientProtocol. The MIME type of stream. The System.IO.Stream containing the referenced document.

ResolveAll

[C#] public void ResolveAll( );

[C++] public: void ResolveAll( );

[VB] Public Sub ResolveAll( )

[JScript] public function ResolveAll( );

Description

Verifies that all referenced documents within the discovery document are valid.

Unless you specifically need to resolve the individual references of a System.Web.Services.Discovery. DiscoveryDocumentReference object, you should invoke the System. Web.Services.Discovery. DiscoveryClientProtocol.ResolveAll or System.Web.Services.Discovery. DiscoveryClientProtocol.ResolveOneLevel methods of System.Web.Services.Discovery. DiscoveryClientProtocol.

WriteDocument

[C#] public override void WriteDocument(object document, Stream stream);

[C++] public: void WriteDocument(Object* document, Stream* stream);

[VB] Overrides Public Sub WriteDocument(ByVal document As Object, ByVal stream As Stream)

[JScript] public override function WriteDocument(document: Object, stream: Stream);

Description

Writes the passed System.Web.Services.Discovery. DiscoveryDocument into the passed System.IO.Stream. The System.Web.Services.Discovery.DiscoveryDocument to write into stream. The System.IO.Stream into which the serialized discovery document is written.

DiscoveryDocumentSearchPattern class (System.Web. Services.Discovery)

WriteDocument

Description

DiscoveryDocumentSearchPattern

Example Syntax:

WriteDocument

[C#] public DiscoveryDocumentSearchPattern( );

[C++] public: DiscoveryDocumentSearchPattern( );

[VB] Public Sub New( )

[JScript] public function DiscoveryDocumentSearch Pattern( );

Pattern

WriteDocument

[C#] public override string Pattern {get;}

[C++] public: _property virtual String* get_Pattern( );

[VB] Overrides Public ReadOnly Property Pattern As String

[JScript] public function get Pattern( ): String;

Description

GetDiscoveryReference

[C#] public override DiscoveryReference GetDiscoveryReference(string filename);

[C++] public: DiscoveryReference* GetDiscoveryReference (String* filename);

[VB] Overrides Public Function GetDiscoveryReference (ByVal filename As String) As DiscoveryReference

[JScript] public override function GetDiscoveryReference (filename: String): DiscoveryReference;

Description

DiscoveryExceptionDictionary class (System.Web.Services.Discovery)

ToString

Description

Collects exceptions that occurred during Web Services discovery. This class cannot be inherited.

The System.Web.Services.Discovery. DiscoveryClientProtocol.Errors property of System.Web.Services.Discovery.DiscoveryClientProtocol is of type System.Web.Services.Discovery.DiscoveryExceptionDictionary.

DiscoveryExceptionDictionary

Example Syntax:

ToString

[C#] public DiscoveryExceptionDictionary( );

[C++] public: DiscoveryExceptionDictionary( );

[VB] Public Sub New( )

[JScript] public function DiscoveryExceptionDictionary( );

Count

Dictionary
InnerHashtable
Item
ToString

Description

Gets or sets the System.Exception that occurred while discovering the specified URL from the System.Web.Services.Discovery.DiscoveryExceptionDictionary. The URL of the discovery document that caused an exception to be thrown during Web Services discovery.

Keys
ToString
[C#] public ICollection Keys {get;}
[C++] public: _property ICollection* get_Keys( );
[VB] Public ReadOnly Property Keys As ICollection
[JScript] public function get Keys( ): ICollection;

Description

Gets a System.Collections.ICollection object with all of the keys in the System.Web.Services.Discovery-.DiscoveryExceptionDictionary.

Values
ToString
[C#] public ICollection Values {get;}
[C++] public: _property ICollection* get_Values( );
[VB] Public ReadOnly Property Values As ICollection
[JScript] public function get Values( ): ICollection;

Description

Gets a System.Collections.ICollection object containing all of the values in the System.Web.Services.Discovery. DiscoveryExceptionDictionary.

Add
[C#] public void Add(string url, Exception value);
[C++] public: void Add(String* url, Exception* value);
[VB] Public Sub Add(ByVal url As String, ByVal value As Exception)
[JScript] public function Add(url: String, value: Exception);

Description

Adds an System.Exception with a key of url to the System. Web.Services.Discovery.DiscoveryExceptionDictionary. The URL that caused an exception during Web Services discovery. The System.Exception that occurred during Web Services discovery.

Contains
[C#] public bool Contains(string url);
[C++] public: bool Contains(String* url);
[VB] Public Function Contains(ByVal url As String) As Boolean
[JScript] public function Contains(url: String): Boolean;

Description

Determines whether the System.Web.Services.Discovery. DiscoveryExceptionDictionary contains an System.Exception with the specified URL.

Return Value: true if the System.Web.Services.Discovery. DiscoveryExceptionDictionary contains an System.Exception with the specified URL; otherwise, false. The URL of the System.Exception to locate within the System.Web.Services.Discovery.DiscoveryExceptionDictionary.

Remove
[C#] public void Remove(string url);
[C++] public: void Remove(String* url);
[VB] Public Sub Remove(ByVal url As String)
[JScript] public function Remove(url: String);

Description

Removes an System.Exception with the specified URL from the System.Web.Services.Discovery. DiscoveryExceptionDictionary. The URL of the System.Exception to remove from the System.Web.Services.Discovery. DiscoveryExceptionDictionary.

DiscoveryReference class (System.Web.Services.Discovery)
ToString

Description

The base class for discoverable references using Web Services discovery.

System.Web.Services.Discovery.ContractReference, System.Web.Services.Discovery.SchemaReference, and System.Web.Services.Discovery.DiscoveryDocumentReference all inherit from System.Web.Services.Discovery. DiscoveryReference, and represent the three types of documents disoverable through Web Services discovery: Service Descriptions, XML Schema Definition (XSD) schemas, and discovery documents, respectively.

DiscoveryReference
Example Syntax:
ToString
[C#] protected DiscoveryReference( );
[C++] protected: DiscoveryReference( );
[VB] Protected Sub New( )
[JScript] protected function DiscoveryReference( );
ClientProtocol
ToString
[C#] public DiscoveryClientProtocol ClientProtocol {get; set;}
[C++] public: _property DiscoveryClientProtocol* get_ClientProtocol( );public: _property void set_ClientProtocol (DiscoveryClientProtocol*);
[VB] Public Property ClientProtocol As DiscoveryClientProtocol
[JScript] public function get ClientProtocol( ): DiscoveryClientProtocol;public function set ClientProtocol(DiscoveryClientProtocol);

Description

Gets or sets the instance of System.Web.Services.Discovery.DiscoveryClientProtocol used in a discovery process.

DefaultFilename
ToString
[C#] public virtual string DefaultFilename {get;}
[C++] public: _property virtual String* get_DefaultFilename( );
[VB] Overridable Public ReadOnly Property DefaultFilename As String
[JScript] public function get DefaultFilename( ): String;

Description

Gets the name of the default file to use when saving the referenced discovery document, XSD schema, or Service Description.

Url
ToString
[C#] public abstract string Url {get; set;}
[C++] public: _property virtual String* get_Url( )=0; public: _property virtual void set Url(String*)=0;
[VB] MustOverride Public Property Url As String
[JScript] public abstract function get Url( ): String;public abstract function set Url(String);

Description

Gets or sets the URL of the referenced document.

FilenameFromUrl
[C#] protected static string FilenameFromUrl(string url);

[C++] protected: static String* FilenameFromUrl(String* url);

[VB] Protected Shared Function FilenameFromUrl(ByVal url As String) As String

[JScript] protected static function FilenameFromUrl(url: String): String;

Description

Returns a file name based on the passed URL.

Return Value: Name of the file based on the passed URL. The URL on which the name of the file is based.

ReadDocument

[C#] public abstract object ReadDocument(Stream stream);

[C++] public: virtual Object* ReadDocument(Stream* stream)=0;

[VB] MustOverride Public Function ReadDocument(ByVal stream As Stream) As Object

[JScript] public abstract function ReadDocument(stream: Stream): Object;

Description

Reads the passed System.IO.Stream and returns an instance of the class representing the type of referenced document.

Return Value: An System.Object with an underlying type matching the type of referenced document.

The return value is always an System.Object. However, the underlying type varies, depending on the type of document referenced. For instance, a System.IO.Stream passed into System.Web.Services.Discovery. SchemaReference.ReadDocument(System.IO.Stream) returns an instance of System.Xml.Schema.XmlSchema. System.IO.Streamcontaining the reference document.

Resolve

[C#] public void Resolve( );

[C++] public: void Resolve( );

[VB] Public Sub Resolve( )

[JScript] public function Resolve( ); Resolves whether the referenced document is valid.

Description

Downloads the referenced document at System.Web.Services.Discovery.DiscoveryReference.Url to resolve whether the referenced document is valid.

Downloads the referenced document and then invokes the overloaded System.Web.Services.Discovery. DiscoveryReference.Resolve member that takes a contentType and a System.IO.Stream. If the MIME type and the contents of stream match those expected by the reference type, then the contents of stream are added to the System. Web.Services.Discovery. DiscoveryClientProtocol.References and System.Web.Services. Discovery.DiscoveryClientProtocol.Documents properties of System.Web.Services.Discovery. DiscoveryReference. ClientProtocol.

Resolve

[C#] protected internal abstract void Resolve(string contentType, Stream stream);

[C++] protected public: virtual void Resolve(String* contentType, Stream* stream)=0;

[VB] MustOverride Protected Friend Dim Sub Resolve(ByVal contentType As String, ByVal stream As Stream)

[JScript] package abstract function Resolve(contentType: String, stream: Stream);

Description

Resolves whether the referenced document is valid.

If the MIME type and the contents of stream match those expected by the reference type, then the contents of stream are added to the System.Web.Services.Discovery. DiscoveryClientProtocol.References and System.Web.Services.Discovery.DiscoveryClientProtocol.Documents properties of System.Web.Services.Discovery.DiscoveryReference.Client Protocol. The MIME type of stream. The System.IO.Stream containing the referenced document.

WriteDocument

[C#] public abstract void WriteDocument(object document, Stream stream);

[C++] public: virtual void WriteDocument(Object* document, Stream* stream)=0;

[VB] MustOverride Public Sub WriteDocument(ByVal document As Object, ByVal stream As Stream)

[JScript] public abstract function WriteDocument(document: Object, stream Stream);

Description

When overridden in a derived class, writes the document into a System.IO.Stream. The document to write into a System.IO.Stream. The System.IO.Stream into which the document is written.

DiscoveryReferenceCollection class (System.Web.Services.Discovery)

WriteDocument

Description

A collection of discovery references. This class cannot be inherited.

DiscoveryReferenceCollection

Example Syntax:

WriteDocument

[C#] public DiscoveryReferenceCollection( );

[C++] public: DiscoveryReferenceCollection( );

[VB] Public Sub New( )

[JScript] public function DiscoveryReferenceCollection( );

Count

InnerList

Item

WriteDocument

Description

Gets or sets the System.Web.Services.Discovery. DiscoveryReference at the specified index. The zero-based index of the System.Web.Services.Discovery.DiscoveryReference to get or set.

List

Add

[C#] public int Add(DiscoveryReference value);

[C++] public: mnt Add(DiscoveryReference* value);

[VB] Public Function Add(ByVal value As DiscoveryReference) As Integer

[JScript] public function Add(value: DiscoveryReference): int;

Description

Adds a System.Web.Services.Discovery. DiscoveryReference to the System.Web.Services.Discovery. DiscoveryReferenceCollection Return Value: The position into which the System.Web.Services.Discovery.DiscoveryReference was inserted into the System.Web.Services.Discovery. DiscoveryReferenceCollection. The System.Web.Services.Discovery. DiscoveryReference to add to the System.Web.Services.Discovery. DiscoveryReferenceCollection.

Contains

[C#] public bool Contains(DiscoveryReference value);

[C++] public: bool Contains(DiscoveryReference* value);

[VB] Public Function Contains(ByVal value As DiscoveryReference) As Boolean
[JScript] public function Contains(value: DiscoveryReference): Boolean;

Description

Determines whether the System.Web.Services.Discovery.DiscoveryReferenceCollection contains a specific System.Web.Services.Discovery.DiscoveryReference.

Return Value: true if the System.Web.Services.Discovery.DiscoveryReferenceCollection contains the System.Web.Services.Discovery.DiscoveryReference; otherwise, false. The System.Web.Services.Discovery.DiscoveryReference to locate within the System.Web.Services.Discovery. DiscoveryReferenceCollection.

Remove

[C#] public void Remove(DiscoveryReference value);
[C++] public: void Remove(DiscoveryReference* value);
[VB] Public Sub Remove(ByVal value As DiscoveryReference)
[JScript] public function Remove(value: DiscoveryReference);

Description

Removes a System.Web.Services.Discovery. DiscoveryReference from the System.Web.Services.Discovery. DiscoveryReferenceCollection. The System.Web.Services. Discovery.DiscoveryReference to remove from the System.Web.Services.Discovery. DiscoveryReferenceCollection.

DiscoveryRequestHandler class (System.Web.Services.Discovery)

ToString

Description

DiscoveryRequestHandler

Example Syntax:

ToString

[C#] public DiscoveryRequestHandler( );
[C+h] public: DiscoveryRequestHandler( );
[VB] Public Sub New( )
[JScript] public function DiscoveryRequestHandler( );

IsReusable

ToString

[C#] public bool IsReusable {get;}
[C++] public: _property bool get_IsReusable( );
[VB] Public ReadOnly Property IsReusable As Boolean
[JScript] public function get IsReusable( ): Boolean;

Description

ProcessRequest

[C#] public void ProcessRequest(HttpContext context);
[C++] public: _sealed void ProcessRequest(HttpContext* context);
[VB] NotOverridable Public Sub ProcessRequest(ByVal context As HttpContext)
[JScript] public function ProcessRequest(context: HttpContext);

Description

DiscoverySearchPattern class (System.Web.Services.Discovery)

ToString

Description

DiscoverySearchPattern

Example Syntax:

ToString

[C#] protected DiscoverySearchPattern( );
[C++] protected: DiscoverySearchPattern( );
[VB] Protected Sub New( )
[JScript] protected function DiscoverySearchPattern( );

Pattern

ToString

[C#] public abstract string Pattern {get;}
[C++] public: property virtual String* get Pattern( )=0;
[VB] MustOverride Public ReadOnly Property Pattern As String
[JScript] public abstract function get Pattern( ): String;

Description

GetDiscoveryReference

[C#] public abstract DiscoveryReference GetDiscoveryReference(string filename);
[C++] public: virtual DiscoveryReference* GetDiscoveryReference(String* filename)=0;
[VB] MustOverride Public Function GetDiscoveryReference (ByVal filename As String) As DiscoveryReference
[JScript] public abstract function GetDiscoveryReference (filename: String): DiscoveryReference;

Description

DynamicDiscoveryDocument class (System.Web.Services.Discovery)

ToString

Description

This represents a discovery file.

ToString

[C#] public const string Namespace;
[C++] public: const String* Namespace;
[VB] Public Const Namespace As String
[JScript] public var Namespace: String;

Description

DynamicDiscoveryDocument

Example Syntax:

ToString

[C#] public DynamicDiscoveryDocument( );
[C++] public: DynamicDiscoveryDocument( );
[VB] Public Sub New( )
[JScript] public function DynamicDiscoveryDocument( );

Description

Default constructor.

ExcludePaths

ToString

[C#] public ExcludePathInfo[ ] ExcludePaths {get; set;}
[C++] public: _property ExcludePathInfo* get_ExcludePaths( );public: _property void set_ExcludePaths(ExcludePathInfo*[ ]);
[VB] Public Property ExcludePaths As ExcludePathInf( )
[JScript] public function get ExcludePaths( ): ExcludePathInfo[ ];public function set ExcludePaths(ExcludePathInfo[ ]);

Description

Load

[C#] public static DynamicDiscoveryDocument Load (Stream stream);
[C++] public: static DynamicDiscoveryDocument* Load (Stream* stream);
[VB] Public Shared Function Load(ByVal stream As Stream) As DynamicDiscoveryDocument
[JScript] public static function Load(stream: Stream): DynamicDiscoveryDocument;

Description

Read an instance of WebMethodsFile from a stream.

Write

[C#] public void Write(Stream stream);

[C++] public: void Write(Stream* stream);

[VB] Public Sub Write(ByVal stream As Stream)

[JScript] public function Write(stream: Stream);

Description

Write this instance to a stream.

ExcludePathInfo class (System.Web.Services.Discovery)

Write

Description

ExcludePathInfo

Example Syntax:

Write

[C#] public ExcludePathInfo( );

[C++] public: ExcludePathInfo( );

[VB] Public Sub New( )

[JScript] public function ExcludePathInfo( );

Description

ExcludePathInfo

Example Syntax:

Write

[C#] public ExcludePathInfo(string path);

[C++] public: ExcludePathInfo(String* path);

[VB] Public Sub New(ByVal path As String)

[JScript] public function ExcludePathInfo(path: String);

Description

Path

Write

[C#] public string Path {get; set;}

[C++] public: _property String* get_Path( );public: _property void set_Path(String*);

[VB] Public Property Path As String

[JScript] public function get Path( ): String;public function set Path(String);

Description

SchemaReference class (System.Web.Services.Discovery)

ToString

Description

Represents a reference in a discovery document to an XML Schema Definition language (XSD) schema. This class cannot be inherited.

Web Services discovery involves discovering the available Web Services given an URL. A The URL typically points to a discovery document, that usually has a .disco file extension. The discovery document contains references to information about the existance of Web Services. These references can refer to Service Descriptions, XSD schemas, or other discovery documents. This class represents a reference to an XSD schema.

ToString

[C#] public const string Namespace;

[C++] public: const String* Namespace;

[VB] Public Const Namespace As String

[JScript] public var Namespace: String;

Description

XML namespace for XSD schema references in discovery documents.

Within a discovery document, a reference to an XSD schema is contained within a schemaRef XML element, which is a part of the XML namespace specified in the System.Web.Services.Discovery.SchemaReference.Namespace constant.

SchemaReference

Example Syntax:

ToString

[C#] public SchemaReference( );

[C++] public: SchemaReference( );

[VB] Public Sub New( )

[JScript] public function SchemaReference( ); Initializes a new instance of the System.Web.Services.Discovery. SchemaReference class.

Description

Initializes a new instance of the System.Web.Services.Discovery.SchemaReference class using default values.

SchemaReference

Example Syntax:

ToString

[C#] public SchemaReference(string url);

[C++] public: SchemaReference(String* url);

[VB] Public Sub New(ByVal url As String)

[JScript] public function SchemaReference(url: String);

Description

Initializes a new instance of the System.Web.Services.Discovery.SchemaReference class using the supplied URL as the XSD schema reference. The URL for the XSD schema. Initializes the System.Web.Services.Discovery. SchemaReference.Ref property.

ClientProtocol

DefaultFilename

ToString

Description

Gets the name of the default file to use when saving the referenced XSD schema.

Ref

ToString

[C#] public string Ref {get; set;}

[C++] public: _property String* get Ref( );public: _property void set_Ref(String*);

[VB] Public Property Ref As String

[JScript] public function get Ref( ): String;public function set Ref(String);

Description

Gets or sets the URL to the referenced XSD schema.

In a discovery document, a reference to an XSD schema is contained within a schemaRef XML element. The schemaRef XML element has a ref attribute, which is the URL for the referenced XSD schema. The System.Web.Services.Discovery.ContractReference.Ref property represents the value of the ref attribute.

Schema

ToString

[C#] public XmlSchema Schema {get;}

[C++] public: _property XmlSchema* get_Schema( );

[VB] Public ReadOnly Property Schema As XmlSchema

[JScript] public function get Schema( ): XmlSchema;

Description

Gets an System.Xml.Schema.XmlSchema object representing the XSD schema.

If the XSD schema has not been downloaded and added to the System.Web.Services.Discovery. DiscoveryClientProtocol.Documents property of System. Web.Services.Discovery.DiscoveryReference.ClientProtocol, an attempt to download and resolve the document is made.

TargetNamespace
ToString
[C#] public string TargetNamespace {get; set;}
[C++] public: _property String* get TargetNamespace( );public: _property void set_TargetNamespace(String*);
[VB] Public Property TargetNamespace As String
[JScript] public function get TargetNamespace( ): String;public function set TargetNamespace(String);

Description
Gets or sets the targetNamespace XML attribute of the XSD schema.
Url
ToString
[C#] public override string Url {get; set;}
[C++] public: _property virtual String* get_Url( );public: _property virtual void set_Url(String*);
[VB] Overrides Public Property Url As String
[JScript] public function get Url( ): String;public function set Url(String);

Description
Gets or sets the URL for the schema reference.
For the System.Web.Services.Discovery.SchemaReference class, the System.Web.Services.Discovery.SchemaReference.Url property returns the value of the System.Web.Services.Discovery.SchemaReference.Ref property.
ReadDocument
[C#] public override object ReadDocument(Stream stream);
[C++] public: Object* ReadDocument(Stream* stream);
[VB] Overrides Public Function ReadDocument(ByVal stream As Stream) As Object
[JScript] public override function ReadDocument(stream: Stream): Object;

Description
Reads and returns the XSD schema from the passed System.IO.Stream.

Return Value: An System.Xml.Schema.XmlSchema containing the contents of the referenced XSD schema. System.IO.Stream containing the XSD schema.
Resolve
[C#] protected internal override void Resolve(string contentType, Stream stream);
[C++] protected public: void Resolve(String* contentType, Stream* stream);
[VB] Overrides Protected Friend Dim Sub Resolve(ByVal contentType As String, ByVal stream As Stream)
[JScript] package override function Resolve(contentType: String, stream: Stream);

Description
Resolves whether the the referenced document is valid.
If the MIME type is text/xml and the contents of stream are an XSD schema, then the contents of stream are added to the System.Web.Services.Discovery. DiscoveryClientProtocol.References and System.Web.Services.Discovery. DiscoveryClientProtocol.Documents properties of System. Web.Services.Discovery.DiscoveryReference.ClientProtocol. The MIME content type of stream. The System.IO.Stream containing the referenced document.
WriteDocument
[C#] public override void WriteDocument(object document, Stream stream);
[C++] public: void WriteDocument(Object* document, Stream* stream);
[VB] Overrides Public Sub WriteDocument(ByVal document As Object, ByVal stream As Stream)
[JScript] public override function WriteDocument(document: Object, stream: Stream);

Description
Writes the passed XSD schema into the passed System.IO.Stream. The System.Xml.Schema.XmlSchema to write into stream. The System.IO.Stream into which the serialized XSD schema is written.
SoapBinding class (System.Web.Services.Discovery)
WriteDocument Description
Represents a SOAP binding in a discovery document. This class cannot be inherited.
A SOAP binding is similar to an interface for Web Services and useful for versioning and when a developer is looking for a Web Service implementing a specific SOAP binding. For instance, a discovery document may contain optional information about SOAP Bindings, which specify the SOAP bindings implemented by referenced Web Servcies. SOAP bindings are specified within a discovery document by adding a soap XML element with an XML namespace equal to the System.Web.Services.Discovery.SoapBinding.Namespace constant. The System.Web.Services.Discovery. SoapBinding.Address property specifies the URL to the Web Service and the System.Web.Services.Discovery. SoapBinding.Binding property specifies the SOAP binding implemented by that Web Service.
WriteDocument
[C#] public const string Namespace;
[C++] public: const String* Namespace;
[VB] Public Const Namespace As String
[JScript] public var Namespace: String;

Description
The XML namespace of the element that specifies a SOAP binding within a discovery document.
SOAP bindings within a discovery document reside within a soap XML element that is a member of the XML namespace specifed by the System.Web.Services.Discovery. SoapBinding.Namespace constant.
SoapBinding
Example Syntax:
WriteDocument
[C#] public SoapBinding( );
[C++] public: SoapBinding( );
[VB] Public Sub New( )
[JScript] public function SoapBinding( );
Address
WriteDocument
[C#] public string Address {get; set;}
[C++] public: _property String* get_Address( );public: _property void set_Address(String*);
[VB] Public Property Address As String
[JScript] public function get Address( ): String;public function set Address(String);

Description
Gets or sets the URL of the Web Service implementing the SOAP binding.
Binding
WriteDocument
[C#] public XmlQualifiedName Binding {get; set;}
[C++] public: _property XmlQualifiedName* get_Binding( );public: _property void set_Binding(XmlQualifiedName*);
[VB] Public Property Binding As XmlQualifiedName

[JScript] public function get Binding( ): XmlQualifiedName; public function set Binding(XmlQualifiedName);

Description

Gets or sets the XML qualified name of the SOAP binding implemented by the Web Service.

XmlSchemaSearchPattern class (System.Web.Services.Discovery)

ToString

Description

XmlSchemaSearchPattern

Example Syntax:

ToString

[C#] public XmlSchemaSearchPattern( );

[C++] public: XmlSchemaSearchPattern( );

[VB] Public Sub New( )

[JScript] public function XmlSchemaSearchPattern( );

Pattern

ToString

[C#] public override string Pattern {get;}

[C++] public: property virtual String* get Pattern( );

[VB] Overrides Public ReadOnly Property Pattern As String

[JScript] public function get Pattern( ): String;

Description

System.Web.Services.Protocols

Description

The System.Web.Services.Protocols namespace consists of the classes that define the protocols used to transmit data across the wire during the communication between ASP.NET Web Service clients and Web Services.

AnyReturnReader class (System.Web.Services.Protocols)

Description

Constructors:

AnyReturnReader

Example Syntax:

[C#] public AnyReturnReader( );

[C++] public: AnyReturnReader( );

[VB] Public Sub New( )

[JScript] public function AnyReturnReader( );

Methods:

GetInitializer

[C#] public override object GetInitializer(LogicalMethodInfo methodInfo);

[C++] public: Object* GetInitializer(LogicalMethodInfo* methodInfo);

[VB] Overrides Public Function GetInitializer(ByVal methodInfo As LogicalMethodInfo) As Object

[JScript] public override function GetInitializer(methodInfo: LogicalMethodInfo): Object;

Description

Initialize

[C#] public override void Initialize(object o);

[C++] public: void Initialize(Object* o);

[VB] Overrides Public Sub Initialize(ByVal o As Object)

[JScript] public override function Initialize( ): Object);

Description

Read

[C#] public override object Read(WebResponse response, Stream responseStream);

[C++] public: Object* Read(WebResponse* response, Stream* responseStream);

[VB] Overrides Public Function Read(ByVal response As WebResponse, ByVal responseStream As Stream) As Object

[JScript] public override function Read(response: WebResponse, responseStream: Stream): Object;

Description

HtmlFormParameterReader class (System.Web.Services.Protocols)

ToString

Description

HtmlFormParameterReader

Example Syntax:

ToString

[C#] public HtmlFormParameterReader( );

[C++] public: HtmlFormParameterReader( );

[VB] Public Sub New( )

[JScript] public function HtmlFormParameterReader( );

Read

[C#] public override object[ ] Read(HttpRequest request);

[C++] public: Object* Read(HttpRequest* request) _gc[ ];

[VB] Overrides Public Function Read(ByVal request As HttpRequest) As Object( )

[JScript] public override function Read(request: HttpRequest): Object[ ];

Description

HtmlFormParameterWriter class (System.Web.Services.Protocols)

ToString

Description

HtmlFormParameterWriter

Example Syntax:

ToString

[C#] public HtmlFormParameterWriter( );

[C++] public: HtmlFormParameterWriter( );

[VB] Public Sub New( )

[JScript] public function HtmlFormParameterWriter( );

Properties:

RequestEncoding

UsesWriteRequest

ToString

Description

InitializeRequest

[C#] public override void InitializeRequest(WebRequest request, object[ ] values);

[C++] public: void InitializeRequest(WebRequest* request, Object* values _gc[ ]);

[VB] Overrides Public Sub InitializeRequest(ByVal request As WebRequest, ByVal values( ) As Object)

[JScript] public override function InitializeRequest(request: WebRequest, values: Object[ ]);

Description

WriteRequest

[C#] public override void WriteRequest(Stream requestStream, object[ ] values);

[C++] public: void WriteRequest(Stream* requestStream, Object* values _gc[ ]);

[VB] Overrides Public Sub WriteRequest(ByVal requestStream As Stream, ByVal values( ) As Object)

[JScript] public override function WriteRequest(requestStream: Stream, values: Object[ ]);

Description

HttpGetClientProtocol class (System.Web.Services.Protocols)

WriteRequest

Description

Specifies the class for ASP.NET Web Service client proxies that use the HTTP-GET protocol.

ASP.NET incorporates two distinct Web Services functionalities: Building ASP.NET Web Services and Building Web Services clients. If you are building a Web Service client using ASP.NET, then a proxy class deriving indirectly or directly from System.Web.Services.Protocols.WebClientProtocol needs to be created for the Web Service you want to call. When the Web Service client calls the Web Service using HTTP, derive the proxy class from System.Web.Services.Protocols.HttpSimpleClientProtocol, which in turn derives from System.Web.Services.Protocols.WebClientProtocol.

HttpGetClientProtocol

Example Syntax:

WriteRequest

[C#] public HttpGetClientProtocol( );

[C++] public: HttpGetClientProtocol( );

[VB] Public Sub New( )

[JScript] public function HttpGetClientProtocol( );

Description

Initializes a new instance of the System.Web.Services.Protocols.HttpGetClientProtocol class.

AllowAutoRedirect

ClientCertificates

ConnectionGroupName

Container

CookieContainer

Credentials

DesignMode

Events

PreAuthenticate

Proxy

RequestEncoding

Site

Timeout

Url

UserAgent

GetWebRequest

[C#] protected override WebRequest GetWebRequest(Uri uri);

[C++] protected: WebRequest* GetWebRequest(Uri* uri);

[VB] Overrides Protected Function GetWebRequest(ByVal urn As Uri) As WebRequest

[JScript] protected override function GetWebRequest(uri: Uri): WebRequest;

Description

Creates a System.Net.WebRequest instance for the specified URI.

Return Value: The System.Net.WebRequest instance.

This method overrides the base version of System.Web.Services.Protocols.WebClientProtocol.GetWebRequest (System.Uri) to specify that the HTTP request to the Web Service is made using HTTP-GET. By overriding this method, additional customizations can be made to the System.Net.WebRequest object before the Web Service request is made. For example you could add a custom header to the request. The System.Uri to use when creating theSystem.Net.WebRequest.

HttpMethodAttribute class (System.Web.Services.Protocols)

ToString

Description

Applying this attribute to a Web Service client using HTTP-GET or HTTP-POST, sets the types that serialize the parameters sent to a Web Service method and read the response from the Web Service method. This class cannot be inherited.

If a Web Service client invokes a Web Service method using HTTP-GET, System.Web.Services.Protocols.HttpMethodAttribute.ReturnFormatter must be set to XmlReturnReader and System.Web.Services.Protocols.HttpMethodAttribute.ParameterFormatter set to UrlParameterWriter. Web Service clients invoking a Web Service using HTTP-POST must set System.Web.Services.Protocols.HttpMethodAttribute.ReturnFormatter to XmlReturnReader and System.Web.Services.Protocols.HttpMethodAttribute.ParameterFormatter to HtmlFormParameterWriter.

HttpMethodAttribute

Example Syntax:

ToString

[C#] public HttpMethodAttribute( );

[C++] public: HttpMethodAttribute( );

[VB] Public Sub New( )

[JScript] public function HttpMethodAttribute( ); Initializes a new instance of the System.Web.Services.Protocols.HttpMethodAttribute class.

Description

Initializes a new instance of the System.Web.Services.Protocols.HttpMethodAttribute class.

HttpMethodAttribute

Example Syntax:

ToString

[C#] public HttpMethodAttribute(Type returnFormatter, Type parameterFormatter);

[C++] public: HttpMethodAttribute(Type* returnFormatter, Type* parameterFormatter);

[VB] Public Sub New(ByVal returnFormatter As Type, ByVal parameterFormatter As Type)

[JScript] public function HttpMethodAttribute(returnFormatter: Type, parameterFormatter: Type);

Description

Initializes a new instance of the System.Web.Services.Protocols.HttpMethodAttribute. Initializes the System.Web.Services.Protocols.HttpMethodAttribute.ReturnFormatter property to a System.Type that deserializes the response from a Web Service method. Initializes the System.Web.Services.Protocols.HttpMethodAttribute.ParameterFormatter property to a System.Type that serializes parameters sent from a Web Service client to a Web Service method.

ParameterFormatter

ToString

[C#] public Type ParameterFormatter {get; set;}

[C++] public: _property Type* get_Parameter Formatter( );public: _property void set_ParameterFormatter(Type*);

[VB] Public Property ParameterFormatter As Type

[JScript] public function get ParameterFormatter( ): Type; public function set ParameterFormatter(Type);

Description

Gets or sets a System.Type that serializes parameters sent from a Web Service client to the Web Service method.

If the Web Service client is invoking a Web Service method using HTTP-GET or HTTP-POST, System.Web.Services.Protocols.HttpMethodAttribute.ParameterFormatter must be XMLReturnReader.

ReturnFormatter

ToString

[C#] public Type ReturnFormatter {get; set;}

[C++] public: _property Type* get_ReturnFormatter( );public: _property void set_ReturnFormatter(Type*);

[VB] Public Property ReturnFormatter As Type

[JScript] public function get RetumFormatter( ): Type;public function set ReturnFormatter(Type);

Description

Gets or sets a System.Type that deserializes the response from a Web Service method.

If the Web Service client is invoking a Web Service method using HTTP-GET, System.Web.Services.Protocols.HttpMethodAttribute.ReturnFormatter must be UrlParameterWriter, whereas a client using HTTP-POST must set System.Web.Services.Protocols.HttpMethodAttribute.ReturnFormatter to HtmlFormParameterWriter.

TypeId

HttpPostClientProtocol class (System.Web.Services.Protocols)

ToString

Description

Specifies the class for ASP.NET Web Service client proxies that use the HTTP-POST protocol.

ASP.NET incorporates two distinct Web Services functionalities: Building ASP.NET Web Services and Building Web Services clients. If you are building a Web Service client using ASP.NET, then a proxy class deriving indirectly or directly from System.Web.Services.Protocols.WebClientProtocol needs to be created for the Web Service you want to call. When the Web Service client is calling using HTTP, the proxy class should derive from System.Web.Services.Protocols.HttpSimpleClientProtocol, which derives from System.Web.Services.Protocols.WebClientProtocol.

HttpPostClientProtocol

Example Syntax:

ToString

[C#] public HttpPostClientProtocol( );

[C++] public: HttpPostClientProtocol( );

[VB] Public Sub New( )

[JScript] public function HttpPostClientProtocol( );

Description

Initializes a new instance of the System.Web.Services.Protocols.HttpPostClientProtocol class.

AllowAutoRedirect

ClientCertificates

ConnectionGroupName

Container

CookieContainer

Credentials

DesignMode

Events

PreAuthenticate

Proxy

RequestEncoding

Site

Timeout

Url

UserAgent

GetWebRequest

[C#] protected override WebRequest GetWebRequest(Uri uri);

[C++] protected: WebRequest* GetWebRequest(Url* uri);

[VB] Overrides Protected Function GetWebRequest(ByVal urn As Uri) As WebRequest

[JScript] protected override function GetWebRequest(uri: Uri): WebRequest;

Description

Creates a System.Net.WebRequest instance for the specified URI.

Return Value: The System.Net.WebRequest instance.

This method overrides the base version of System.Web.Services.Protocols.WebClientProtocol.GetWebRequest (System. Uri) to specify that the HTTP request to the Web Service is made using HTTP-POST. By overriding this method, you can customize the System.Net.WebRequest object before the Web Service request is made. For example, you can add a custom header to the request. The System.Uri to use when creating the System.Net.WebRequest.

HttpSimpleClientProtocol class (System.Web.Services.Protocols)

ToString

Description

The base class for communicating with an Web Service using HTTP-GET and HTTP-POST.

Specifies most of the implementation for communicating with an Web Service over HTTP.

HttpSimpleClientProtocol

Example Syntax:

ToString

[C#] protected HttpSimpleClientProtocol( );

[C++] protected: HttpSimpleClientProtocol( );

[VB] Protected Sub New( )

[JScript] protected function HttpSimpleClientProtocol( );

Description

Initializes a new instance of the System.Web.Services.Protocols.HttpSimpleClientProtocol class.

AllowAutoRedirect

ClientCertificates

ConnectionGroupName

Container

CookieContainer

Credentials

DesignMode

Events

PreAuthenticate

Proxy

RequestEncoding

Site

Timeout

Url

UserAgent

BeginInvoke

[C#] protected IAsyncResult BeginInvoke(string methodName, string requestUrl, object[ ] parameters, AsyncCallback callback, object asyncState);

[C++] protected: IAsyncResult* BeginInvoke(String* methodName, String* requestUrl, Object* parameters _gc[ ], AsyncCallback* callback, Object* asyncState);

[VB] Protected Function BeginInvoke(ByVal methodName As String, ByVal requestUrl As String, ByVal parameters( ) As Object, ByVal callback As AsyncCallback, ByVal asyncState As Object) As IAsyncResult

[JScript] protected function BeginInvoke(methodName: String, requestUrl: String, parameters: Object[ ], callback: AsyncCallback, asyncState: Object): IAsyncResult;

Description

Starts an asynchronous invocation of a method of a HTTP Web service.

Return Value: An System.IAsyncResult which can be passed to System.Web.Services.Protocols.HttpSimpleClientProtocol.EndInvoke(System.IAsyncResult) to obtain the return values from the Web Service method.

The methodName parameter is used to find the types of the parameters and return values of the method that is invoking System.Web.Services.Protocols.HttpSimpleClientProtocol.BeginInvoke(System.String,System.String,System.Object[ ],System.AsyncCallback,System.Object). It is also used to find custom attributes which may have been added to the method. The name of the Web Service method. The url to use when creating theSystem.Net.WebRequest. An array of objects containing the parameters to pass to the Web Service method. The order of the values in the array correspond to the order of the parameters in the calling method of the derived class. The delegate to call when the asynchronous method call is complete. If callback is null, the delegate is not called. Additional information supplied by a client.

EndInvoke

[C#] protected object EndInvoke(IAsyncResult asyncResult);

[C++] protected: Object* EndInvoke(IAsyncResult* asyncresult);

[VB] Protected Function EndInvoke(ByVal asyncResult As IAsyncResult) As Object

[JScript] protected function EndInvoke(asyncResult: IAsyncResult): Object;

Description

Completes asynchronous invocation of a Web Service method using HTTP.

Return Value: An array of objects containing the return value and any by reference or out parameters for the Web Service method. The System.IAsyncResult returned from System.Web.Services.Protocols.HttpSimpleClientProtocol.BeginInvoke(System.String,System.String,System.Object[ ],System.AsyncCallback,System.Object).

Invoke

[C#] protected object Invoke(string methodName, string requestUrl, object[ ] parameters);

[C++] protected: Object* Invoke(String* methodName, String* requestUrl, Object* parameters _gc[ ]);

[VB] Protected Function Invoke(ByVal methodName As String, ByVal requestUrl As String, ByVal parameters( ) As Object) As Object

[JScript] protected function Invoke(methodName: String, requestUrl: String, parameters: Object[ ]): Object;

Description

Invokes a Web Service method using HTTP.

Return Value: An array of objects containing the return value and any by-reference or out parameters of the derived class method.

The methodName is used to find the types of the parameters and return values of the method that is invoking System.Web.Services.Protocols.HttpSimpleClientProtocol.Invoke(System.String,System.String,System.Object[ ]). It is also used to find custom attributes which may have been added to the method. The name of the Web Service method in the derived class that is invoking System.Web.Services.Protocols.HttpSimpleClientProtocol.Invoke(System.String,System.String,System.Object[ ]). The URL of the Web Service method the client is requesting. An array of objects containing the parameters to pass to the remote Web service. The order of the values in the array correspond to the order of the parameters in the calling method of the derived class.

HttpWebClientProtocol class (System.Web.Services.Protocols)

ToString

Description

When overridden in a derived class, provides support for client proxies invoking Web Services using HTTP.

ASP.NET incorporates two distinct functionalities of Web Services: building ASP.NET Web Services and building Web Service clients. If you build a Web Service client using ASP.NET, you must create a proxy class deriving indirectly or directly from System.Web.Services.Protocols.HttpWebClientProtocol for the Web Service you want to call.

HttpWebClientProtocol

Example Syntax:

ToString

[C#] protected HttpWebClientProtocol( );

[C++] protected: HttpWebClientProtocol( );

[VB] Protected Sub New( )

[JScript] protected function HttpWebClientProtocol( );

Description

Initializes a new instance of the System.Web.Services.Protocols.HttpWebClientProtocol class.

AllowAutoRedirect

ToString

[C#] public bool AllowAutoRedirect {get; set;}

[C++] public: _property bool get_AllowAutoRedirect( );public: _property void set_AllowAutoRedirect(bool);

[VB] Public Property AllowAutoRedirect As Boolean

[JScript] public function get AllowAutoRedirect( ): Boolean; public function set AllowAutoRedirect(Boolean);

Description

Gets or sets whether the client automatically follows server redirects.

If a client sends authentification information, such as a user name and password, you do not want to enable the server to redirect, because this can compromise security.

ClientCertificates

ToString

[C#] public X509CertificateCollection ClientCertificates {get;}

[C++] public: _property X509CertificateCollection* get_ClientCertificates( );

[VB] Public ReadOnly Property ClientCertificates As X509CertificateCollection

[JScript] public function get ClientCertificates( ): X509CertificateCollection;

Description

Gets the collection of client certificates.

Allows a client to pass one or more client certificates, also known as Authenticode X.509 v.3 certificates, when calling a Web Service method. If the Web Service method has been configured to use client certificates, a client certificate can be used as one mechanism for authenticating a client. For details on setting up client certificates, see the Internet Information Server (IIS) documentation.

ConnectionGroupName

Container

CookieContainer

ToString

Description

Gets or sets the collection of cookies.

If a Web Service method uses session state, then a cookie is passed back to the Web Service client that uniquely identifies the session for that Web Service client. In order for the Web Service client to receive that cookie, a new instance of System.Net.CookieContainer must be created and assigned to the System.Web.Services.Protocols.HttpWebClientProtocol.CookieContainer property before calling the Web Service method.

Credentials

DesignMode

Events

PreAuthenticate

Proxy

ToString

Description

Gets or sets proxy information for making a Web Service request through a firewall.

Use the System.Web.Services.Protocols.HttpWebClientProtocol.Proxy property if a client needs to use different proxy settings than those in the system settings. You can use the System.Net.WebProxy class to set the proxy settings, because it implements System.Net.IWebProxy.

RequestEncoding

Site

Timeout

Url

UserAgent

ToString

Description

Gets or sets the value for the user agent header that is sent with each request.

The user agent string allows a Web server to identify the client.

GetWebRequest

[C#] protected override WebRequest GetWebRequest(Uri uri);

[C++] protected: WebRequest* GetWebRequest(Url* uri);

[VB] Overrides Protected Function GetWebRequest(ByVal urn As Uri) As WebRequest

[JScript] protected override function GetWebRequest(uri: Uri): WebRequest;

Description

Creates a System.Net.WebRequest instance for the specified URI.

Return Value: The System.Net.WebRequest instance. The System.Uri for creating the System.Net.WebRequest.

GetWebResponse

[C#] protected override WebResponse GetWebResponse (WebRequest request);

[C++] protected: WebResponse* GetWebResponse(WebRequest* request);

[VB] Overrides Protected Function GetWebResponse(ByVal request As WebRequest) As WebResponse

[JScript] protected override function GetWebResponse(request: WebRequest) WebResponse; Returns a response from a request to a Web Service method.

Description

Returns a response from a synchronous request to a Web Service method.

Return Value: The System.Net.WebResponse instance. The System.Net.WebRequest to get the response from.

GetWebResponse

[C#] protected override WebResponse GetWebResponse (WebRequest request, IAsyncResult result);

[C++] protected: WebResponse* GetWebResponse(WebRequest* request, IAsyncResult* result);

[VB] Overrides Protected Function GetWebResponse(ByVal request As WebRequest, ByVal result As IAsyncResult) As WebResponse

[JScript] protected override function GetWebResponse(request: WebRequest, result: IAsyncResult): WebResponse;

Description

Returns a response from an asynchronous request to a Web Service method.

Return Value: The System.Net.WebResponse instance. The System.Net.WebRequest to get the response from. The System.IAsyncResult to pass to System.Net.HttpwebRequest.EndGetResponse(System.IAsyncResult). when the response has completed.

LogicalMethodInfo class (System.Web.Services.Protocols)

ToString

Description

Represents the attributes and metadata for a Web Service method. This class cannot be inherited.

System.Web.Services.Protocols.LogicalMethodInfo is used primarily by a SOAP extension to interrogate the details of the Web Service method an SOAP extension is configured to run with. Depending on how the SOAP extension is configured to run, the SOAP extension can find out details about the Web Service method in the System.Web.Services.Protocols.SoapExtension.GetInitializer(System.Web.Services.Protocols.LogicalMethodInfo,System.Web.Services.Protocols.SoapExtensionAttribute) method of System.Web.Services.Protocols.SoapExtension that takes an System.Web.Services.Protocols.LogicalMethodInfo. The System.Web.Services.Protocols.LogicalMethodInfo provides details such as the Web Service method's parameters by accessing the System.Web.Services.Protocols.LogicalMethodInfo.Parameters property and any custom attributes applied to the Web Service method using the System.Web.Services.Protocols.LogicalMethodInfo.GetCustomAttributes(System.Type) property.

LogicalMethodInfo

Example Syntax:

ToString

[C#] public LogicalMethodInfo(MethodInfo methodInfo);

[C++] public: LogicalMethodInfo(MethodInfo* methodInfo);

[VB] Public Sub New(ByVal methodInfo As MethodInfo)

[JScript] public function LogicalMethodInfo(methodInfo: MethodInfo); Initializes a new instance of the System.Web.Services.Protocols.LogicalMethodInfo class.

Description

Initializes a new instance of the System.Web.Services.Protocols.LogicalMethodInfo class with the System.Reflection.MethodInfo object passed. A System.Reflection.MethodInfo to initialize the properties of System.Web.Services.Protocols.LogicalMethodInfo common to System.Reflection.MethodInfo.

AsyncCallbackParameter

ToString

[C#] public ParameterInfo AsyncCallbackParameter {get;}

[C++] public: _property ParameterInfo* get_AsyncCallbackParameter( );

[VB] Public ReadOnly Property AsyncCallbackParameter As ParameterInfo

[JScript] public function get AsyncCallbackParameter( ): ParameterInfo;

Description

Gets the parameter information for the AsyncCallback parameter of a Begin method in an asynchronous invocation.

The asynchronous design pattern in the common language runtime involves calling a Begin method to start the asynchronous method invocation and an End method to complete the invocation. The Begin method takes two additional parameters besides the parameters defined by the method: one for a delegate and one for any state information that needs to be passed on to the delegate. This property represents the parameter for the delegate with a parameter name of AsyncCallback.

AsyncResultParameter

ToString

[C#] public ParameterInfo AsyncResultParameter {get;}

[C++] public: property ParameterInfo* get AsyncResultParameter( );

[VB] Public ReadOnly Property AsyncResultParameter As ParameterInfo

[JScript] public function get AsyncResultParameter( ): ParameterInfo;

Description

Gets the return value of a Begin asynchronous method invocation.

The asynchronous design pattern in the common language runtime involves calling a Begin method to start the asynchronous method invocation and an End method to complete the invocation. The Begin method typically returns immediately with an object implementing the System.IAsyncResult interface, which can then be passed to the End method at a later time to complete the asynchronous method invocation. The returned object implementing the System.IAsyncResult interface is represented by this property.

AsyncStateParameter

ToString

[C#] public ParameterInfo AsyncStateParameter {get;}

[C++] public: property ParameterInfo* get AsyncStateParameter( );

[VB] Public ReadOnly Property AsyncStateParameter As ParameterInfo

[JScript] public function get AsyncStateParameter( ): ParameterInfo;

Description

Gets the parameter information for the AsyncState parameter of a Begin method in an asynchronous invocation.

The asynchronous design pattern in the common language runtime involves calling a Begin method to start the asynchronous method invocation and an End method to complete the invocation. The Begin method takes two additional parameters besides the parameters defined by the method: one for a delegate and one for any state information that needs to be passed on to the delegate. This property represents the state information that needs to be passed into the delegate.

BeginMethodInfo

ToString

[C#] public MethodInfo BeginMethodInfo {get;}

[C++] public: _property MethodInfo* get_BeginMethodInfo( );

[VB] Public ReadOnly Property BeginMethodInfo As MethodInfo

[JScript] public function get BeginMethodInfo( ): MethodInfo;

Description

Gets the attributes and metadata for a Begin method of an asynchronous invocation to a method.

CustomAttributeProvider

ToString

[C#] public ICustomAttributeProvider CustomAttributeProvider {get;}

[C++] public: _property ICustomAttributeProvider* get_CustomAttributeProvider( );

[VB] Public ReadOnly Property CustomAttributeProvider As ICustomAttributeProvider

[JScript] public function get CustomAttributeProvider( ) ICustomAttributeProvider;

Description

Gets the custom attributes applied to the method.

DeclaringType

ToString

[C#] public Type DeclaringType {get;}

[C++] public: _property Type* get_DeclaringType( );

[VB] Public ReadOnly Property DeclaringType As Type

[JScript] public function get DeclaringType( ): Type;

Description

Gets the class that declares the method represented by the instance of System.Web.Services.Protocols.LogicalMethodInfo.

The System.Web.Services.Protocols.LogicalMethodInfo.DeclaringType property retrieves a reference to a System.Type for the type that declares this member. A member of a class (or interface) is either declared or inherited from a base class (or interface). The returned System.Type might not be the same as the System.Type of the class implementing the Web Service (if that class derives from a base class and the method represented by this class is declared in that base class then the System.Type returned is the base class).

EndMethodInfo

ToString

[C#] public MethodInfo EndMethodInfo {get;}

[C++] public: _property MethodInfo* get_EndMethodInfo( );

[VB] Public ReadOnly Property EndMethodInfo As MethodInfo

[JScript] public function get EndMethodInfo( ): MethodInfo;

Description

Gets the attributes and metadata for an End method of an asynchronous invocation to a method.

InParameters

ToString

[C#] public ParameterInfo[ ] InParameters {get;}

[C++] public: _property ParameterInfo* get_InParameters( );

[VB] Public ReadOnly Property InParameters As ParameterInfo( )

[JScript] public function get InParameters( ): ParameterInfo[ ];

Description

Gets the parameters passed into the method represented by the instance of System.Web.Services.Protocols.LogicalMethodInfo.

Use an instance of System.Reflection.ParameterInfo to obtain information about the parameter's data type, default value, and so on.

IsAsync

ToString

[C#] public bool IsAsync {get;}

[C++] public: _property bool get_IsAsync( );

[VB] Public ReadOnly Property IsAsync As Boolean

[JScript] public function get IsAsync( ): Boolean;

Description

Gets a value indicating whether the method represented by the instance of System.Web.Services.Protocols.LogicalMethodInfo is invoked asynchronously.

IsVoid

ToString

[C#] public bool IsVoid {get;}

[C++] public: _property bool get_IsVoid( );

[VB] Public ReadOnly Property IsVoid As Boolean

[JScript] public function get IsVoid( ): Boolean;

Description

Gets a value indicating whether the return type for the method represented by the instance of System.Web.Services.Protocols.LogicalMethodInfo is void.

MethodInfo

ToString

[C#] public MethodInfo MethodInfo {get;}

[C++] public: _property MethodInfo* get_MethodInfo( );

[VB] Public ReadOnly Property MethodInfo As MethodInfo

[JScript] public function get MethodInfo( ): MethodInfo;

Description

Gets the attributes and metadata for a synchronous method.

Name

ToString

[C#] public string Name {get;}

[C++] public: _property String* get_Name( );

[VB] Public ReadOnly Property Name As String

[JScript] public function get Name( ): String;

Description

Gets the name of the method represented by this instance.

OutParameters

ToString

[C#] public ParameterInfo[ ] OutParameters {get;}

[C++] public: _property ParameterInfo* get_Out Parameters( );

[VB] Public ReadOnly Property OutParameters As ParameterInfo( )

[JScript] public function get OutParameters( ): ParameterInfo[ ];

Description

Gets the out parameters for the method.

Use an instance of System.Reflection.ParameterInfo to obtain information about the parameter's data type, default value, and so on.

Parameters

ToString

[C#] public ParameterInfo[ ] Parameters {get;}

[C++] public: _property ParameterInfo* get_Parameters( );

[VB] Public ReadOnly Property Parameters As ParameterInfo( )

[JScript] public function get Parameters( ): ParameterInfo[ ];

Description

Gets the parameters for the method.

Use an instance of System.Reflection.ParameterInfo to obtain information about the parameter's data type, default value, and so on.

ReturnType

ToString

[C#] public Type ReturnType {get;}

[C++] public: _property Type* get_ReturnType( );

[VB] Public ReadOnly Property ReturnType As Type

[JScript] public function get ReturnType( ): Type;

Description

Gets the return type of this method.

ReturnTypeCustomAttributeProvider

ToString

[C#] public ICustomAttributeProvider ReturnTypeCustomAttributeProvider {get;}

[C++] public: _property ICustomAttributeProvider* get_ReturnTypeCustomAttributeProvider( );

[VB] Public ReadOnly Property ReturnTypeCustomAttributeProvider As ICustomAttributeProvider

[JScript] public function get ReturnTypeCustomAttributeProvider( ) ICustomAttributeProvider;

Description

Gets the custom attributes for the return type.

BeginInvoke

[C#] public IAsyncResult BeginInvoke(object target, object[ ] values, AsyncCallback callback, object asyncState);

[C++] public: IAsyncResult* BeginInvoke(Object* target, Object* values _gc[ ], AsyncCallback* callback, Object* asyncState);

[VB] Public Function BeginInvoke(ByVal target As Object, ByVal values( ) As Object, ByVal callback As AsyncCallback, ByVal asyncState As Object) As IAsyncResult

[JScript] public function BeginInvoke(target: Object, values: Object[ ], callback: AsyncCallback, asyncState: Object): IAsyncResult;

Description

Begins an asynchronous invocation of the method represented by this System.Web.Services.Protocols.LogicalMethodInfo instance.

Return Value: An System.IAsyncResult which is passed to System.Web.Services.Protocols.LogicalMethodInfo.EndInvoke(System.Object,System.IAsyncResult) to obtain the return values from the remote method call. The instance of the object to invoke the method on. An argument list for the invoked method. This is an array of objects with the same number, order, and type as the parameters of the method. If the method does not require any parameters, values should be null. The delegate to call when the asynchronous invoke is complete. If callback is null, the delegate is not called. State information that is passed on to the delegate.

Create

[C#] public static LogicalMethodInfo[ ] Create(Method Info[ ] methodInfos);

[C++] public: static LogicalMethodInfo* Create(MethodInfo* methodInfos[ ]) [ ];

[VB] Public Shared Function Create(ByVal methodInfos( ) As MethodInfo) As LogicalMethodInfo( )

[JScript] public static function Create(methodInfos: MethodInfo[ ]) LogicalMethodInfo[ ]; Creates an array of System.Web.Services.Protocols.LogicalMethodInfo, given an array of System.Reflection.MethodInfo.

Description

Creates an array of System.Web.Services.Protocols.LogicalMethodInfo, given an array of System.Reflection.MethodInfo that can contain information about both asynchronous and synchronous methods.

Return Value: An array of System.Web.Services.Protocols.LogicalMethodInfo, representing the methods within methodInfos. An array of System.Reflection.MethodInfo representing the asynchronous and synchronous methods to create System.Web.Services.Protocols.LogicalMethodInfo objects for.

Create

[C#] public static LogicalMethodInfo[ ] Create(MethodInfo[ ] methodInfos, LogicalMethodTypes types);

[C++] public: static LogicalMethodInfo* Create(MethodInfo* methodInfos[ ], LogicalMethodTypes types) [ ];

[VB] Public Shared Function Create(ByVal methodInfos( ) As MethodInfo, ByVal types As LogicalMethodTypes) As LogicalMethodInfo( )

[JScript] public static function Create(methodInfos: MethodInfo[ ], types: LogicalMethodTypes): LogicalMethod Info[ ];

Description

Creates an array of System.Web.Services.Protocols.LogicalMethodInfo, given an array of System.Reflection.MethodInfo, where the returned array of System.Web.Services.Protocols.LogicalMethodInfo can be restricted to only asynchronous or synchronous methods.

Return Value: An array of System.Web.Services.Protocols.LogicalMethodInfo representing the methods within methodInfos, filtered by the value of types. An array of System.Reflection.MethodInfo representing the asynchronous and synchronous methods to create System.Web.Services.Protocols.LogicalMethodInfo objects for. A bitwise combination of the System.Web.Services.Protocols.LogicalMethodTypes values. Determines whether just asynchronous or synchronous methods or both are included in the returned array of System.Web.Services.Protocols.LogicalMethodInfo.

EndInvoke

[C#] public object[ ] EndInvoke(object target, IAsyncResult asyncResult);

[C++] public: Object* EndInvoke(Object* target, IAsyncResult* asyncResult) _gc[ ];

[VB] Public Function EndInvoke(ByVal target As Object, ByVal asyncResult As IAsyncResult) As Object( )

[JScript] public function EndInvoke(target: Object, asyncResult: IAsyncResult): Object[ ];

Description

Ends an asynchronous invocation of the method represented by this System.Web.Services.Protocols.LogicalMethodInfo instance.

Return Value: An array of objects containing the return value and any by-reference or out parameters of the derived class method. The instance of the object to invoke the method on. The System.IAsyncResult returned from System.Web.Services.Protocols.LogicalMethodInfo.BeginInvoke(System.Object,System.Object[ ],System.AsyncCallback,System.Object).

GetCustomAttribute

[C#] public object GetCustomAttribute(Type type);

[C++] public: Object* GetCustomAttribute(Type* type);

[VB] Public Function GetCustomAttribute(ByVal type As Type) As Object

[JScript] public function GetCustomAttribute(type: Type): Object;

Description

Returns the first custom attribute applied to the type, if there are custom attributes applied to the type.

Return Value: An System.Object containing the first custom attribute applied to type. The System.Type that the custom attributes are applied to.

GetCustomAttributes

[C#] public object[ ] GetCustomAttributes(Type type);

[C++] public: Object* GetCustotributes(Type* type) _gc[ ];

[VB] Public Function GetCustomAttributes(ByVal type As Type) As Object( )

[JScript] public function GetCustomAttributes(type: Type): Object[ ];

Description

Returns the custom attributes applied to the specified type.

Return Value: An array of System.Object containing the custom attributes applied to type. The System.Type to get the custom attributes applied to.

Invoke

[C#] public object[ ] Invoke(object target, object[ ] values);

[C++] public: Object* Invoke(Object* target, Object* values _gc[ ])_gc[ ];

[VB] Public Function Invoke(ByVal target As Object, ByVal values( ) As Object) As Object( )

[JScript] public function Invoke(target: Object, values: Object[ ]): Object[ ];

Description

Invokes the method represented by this System.Web.Services.Protocols.LogicalMethodInfo instance.

Return Value: An array of type System.Object representing the return value and out parameters of the invoked method. The instance of the object to invoke the method on. An argument list for the invoked method. This is an array of objects with the same number, order, and type as the parameters of the method. If the method does not require any parameters, values should be null.

IsBeginMethod

[C#] public static bool IsBeginMethod(MethoInfo methodInfo);

[C++] public: static bool IsBeginMethod(MethodInfo* methodInfo);

[VB] Public Shared Function IsBeginMethod(ByVal methodInfo As MethodInfo) As Boolean

[JScript] public static function IsBeginMethod(methodInfo: MethodInfo): Boolean;

Description

Returns a value indicating whether the method passed in represents a begin method of an asynchronous invocation.

Return Value: true if methodInfo is a begin method of an asynchronous invocation; otherwise, false. The System.Reflection.MethodInfo to determine if it is a begin method of an asynchronous invocation.

IsEndMethod

[C#] public static bool IsEndMethod(MethodInfo methodInfo);

[C++] public: static bool IsEndMethod(MethodInfo* methodInfo);

[VB] Public Shared Function IsEndMethod(ByVal methodInfo As MethodInfo) As Boolean

[JScript] public static function IsEndMethod(methodInfo: MethodInfo): Boolean;

Description

Returns a value indicating whether the method passed in represents a end method of an asynchronous invocation.

Return Value: true if methodInfo is a end method of an asynchronous invocation; otherwise, false. The System.Reflection.MethodInfo to determine if it is a end method of an asynchronous invocation.

ToString

[C#] public override string ToString( );

[C++] public: String* ToString( );

[VB] Overrides Public Function ToString( ) As String

[JScript] public override function ToString( ): String;

Description

Returns a System.String that represents the current System.Web.Services.Protocols.LogicalMethodInfo.

Return Value: A System.String that represents the current System.Web.Services.Protocols.LogicalMethodInfo.

LogicalMethodTypes enumeration (System.Web.Services.Protocols)

ToString

Description

Specifies how the Web Service method was invoked.

ToString

[C#] public const LogicalMethodTypes Async;

[C++] public: const LogicalMethodTypes Async;

[VB] Public Const Async As LogicalMethodTypes

[JScript] public var Async: LogicalMethodTypes;

Description

Specifies the Web Service method is invoked asynchronously.

ToString

[C#] public const LogicalMethodTypes Sync;

[C++] public: const LogicalMethodTypes Sync;

[VB] Public Const Sync As LogicalMethodTypes

[JScript] public var Sync: LogicalMethodTypes;

Description

Specifies the Web Service method is invoked synchronously.

MatchAttribute class (System.Web.Services.Protocols)

ToString

Description

Represents the attributes of a match made using text pattern matching. This class cannot be inherited.

Text pattern matching allows a Web Service to leverage existing HTML content by parsing it using regular expressions. A Web Service specifies the content it wants to parse in a Service Description using match elements. These match elements specify several items: the regular expression for parsing the contents of an existing HTML page, whether the parsing must case-insensitive, and how many instances of content that matches the regular expression should be returned. When a client builds a proxy class using the Wsdl.exe tool, methods on the proxy class include a System.Web.Services.Protocols.MatchAttribute detailing the match elements found in the Service Description.

MatchAttribute

Example Syntax:

ToString

[C#] public MatchAttribute(string pattern);

[C++] public: MatchAttribute(String* pattern);

[VB] Public Sub New(ByVal pattern As String)

[JScript] public function MatchAttribute(pattern: String);

Description

Initializes a new instance of the System.Web.Services.Protocols.MatchAttribute class with the specified pattern.

Use this constructor to create and initialize a new instance of the System.Web.Services.Protocols.MatchAttribute class using the specified pattern. A string that represents the pattern to match.

Capture

ToString

[C#] public int Capture {get; set;}

[C++] public: _property int get_Capture( );public: _property void set_Capture(int);

[VB] Public Property Capture As Integer

[JScript] public function get Capture( ): int;public function set Capture(int);

Description

Gets or sets a value that represents the index of a match within a grouping.

Group

ToString

[C#] public int Group {get; set;}

[C++] public: _property int get_Group( );public: _property void set_Group(int);

[VB] Public Property Group As Integer

[JScript] public function get Group( ): int;public function set Group(int);

Description

Gets or sets a value that represents a grouping of related matches.

Use the System.Web.Services.Protocols. MatchAttribute. Group property to specify a group that a match belongs to.

IgnoreCase

ToString

[C#] public bool IgnoreCase {get; set;}

[C++] public: _property bool get_IgnoreCase( );public: _property void set_IgnoreCase(bool);

[VB] Public Property IgnoreCase As Boolean

[JScript] public function get IgnoreCase( ): Boolean;public function set IgnoreCase(Boolean);

Description

Gets or sets a value that indicates whether the pattern to match is case insensitive.

MaxRepeats

ToString

[C#] public int MaxRepeats {get; set;}

[C+] public: _property int get_MaxRepeats( );public: _property void set_MaxRepeats(int);

[VB] Public Property MaxRepeats As Integer

[JScript] public function get MaxRepeats( ): int;public function set MaxRepeats(int);

Description

Gets or sets the maximum number of values to return from the match.

A value of 1 returns only the first match. A value of −1 returns all matches. Additionally, a value of −1 equates to an '*' in a regular expression.

Pattern

ToString

[C#] public string Pattern {get; set;}

[C++] public: _property String* get_Pattern( );public: _property void set_Pattern(String*);

[VB] Public Property Pattern As String

[JScript] public function get Pattern( ): String;public function set Pattern(String);

Description

Gets or sets a regular expression that represents the pattern to match.

Use the System.Web.Services.Protocols. MatchAttribute. Pattern property to specify a regular expression that represents the value to match.

TypeId

MimeFormatter class (System.Web.Services.Protocols)

ToString

Description

MimeFormatter

Example Syntax:

ToString

[C#] protected MimeFormatter( );

[C++] protected: MimeFormatter( );

[VB] Protected Sub New( )

[JScript] protected function MimeFormatter( );

CreateInstance

[C#] public static MimeFormatter CreateInstance(Type type, object initializer);

[C++] public: static MimeFormatter* CreateInstance(Type* type, Object* initializer);

[VB] Public Shared Function CreateInstance(ByVal type As Type, ByVal initializer As Object) As MimeFormatter

[JScript] public static function CreateInstance(type: Type, initializer: Object): MimeFormatter;

Description

GetInitializer

[C#] public abstract object GetInitializer(LogicalMethodInfo methodInfo);

[C++] public: virtual Object* GetInitializer(LogicalMethodInfo* methodInfo)=0;

[VB] MustOverride Public Function GetInitializer(ByVal methodInfo As LogicalMethodInfo) As Object

[JScript] public abstract function GetInitializer(methodInfo: LogicalMethodInfo) Object;

Description

GetInitializer

[C#] public static object GetInitializer(Type type, LogicalMethodInfo methodInfo);

[C++] public: static Object* GetInitializer(Type* type, LogicalMethodInfo* methodInfo);

[VB] Public Shared Function GetInitializer(ByVal type As Type, ByVal methodInfo As LogicalMethodInfo) As Object

[JScript] public static function GetInitializer(type: Type, methodInfo: LogicalMethodInfo): Object;

Description

GetInitializers

[C#] public virtual object[ ] GetInitializers(LogicalMethodInfo[ ] methodInfos);

[C++] public: virtual Object* GetInitializers(LogicalMethodInfo* methodInfos[ ]) _gc[ ];

[VB] Overridable Public Function GetInitializers(ByVal methodInfos( ) As LogicalMethodInfo) As Object( )

[JScript] public function GetInitializers(methodInfos: LogicalMethodInfo[ ]) Object[ ];

Description

GetInitializers

[C#] public static object[ ] GetInitializers(Type type, LogicalMethodInfo[ ] methodInfos);

[C++] public: static Object* GetInitializers(Type* type, LogicalMethodInfo* methodInfos[ ]) _gc[ ];

[VB] Public Shared Function GetInitializers(ByVal type As Type, ByVal methodInfos( ) As LogicalMethodInfo) As Object( )

[JScript] public static function GetInitializers(type: Type, methodInfos: LogicalMethodInfo[ ]): Object[ ];

Description

Initialize

[C#] public abstract void Initialize(object initializer);

[C++] public: virtual void Initialize(Object* initializer)=0;

[VB] MustOverride Public Sub Initialize(ByVal initializer As Object)

[JScript] public abstract function Initialize(initializer: Object);

Description

MimeParameterReader class (System.Web.Services.Protocols)

ToString

Description

MimeParameterReader

Example Syntax:

ToString

[C#] protected MimeParameterReader( );

[C++] protected: MimeParameterReader( );

[VB] Protected Sub New( )

[JScript] protected function MimeParameterReader( );

Read

[C#] public abstract object[ ] Read(HttpRequest request);

[C++] public: virtual Object* Read(HttpRequest* request) _gc[ ]=0;

[VB] MustOverride Public Function Read(ByVal request As HttpRequest) As Object( )

[JScript] public abstract function Read(request: HttpRequest): Object[ ];

Description

MimeParameterWriter class (System.Web.Services.Protocols)

ToString

Description

MimeParameterWriter

Example Syntax:

ToString

[C#] protected MimeParameterWriter( );

[C++] protected: MimeParameterWriter( );

[VB] Protected Sub New( )

[JScript] protected function MimeParameterWriter( );

RequestEncoding

ToString

[C#] public virtual Encoding RequestEncoding {get; set;}

[C++] public: _property virtual Encoding* get_RequestEncoding( );public: _property virtual void set_RequestEncoding(Encoding*);

[VB] Overridable Public Property RequestEncoding As Encoding

[JScript] public function get RequestEncoding( ): Encoding; public function set RequestEncoding(Encoding);

Description

UsesWriteRequest

ToString

[C#] public virtual bool UsesWriteRequest {get;}

[C++] public: _property virtual bool get_UsesWrite Request( );

[VB] Overridable Public ReadOnly Property UsesWriteRequest As Boolean

[JScript] public function get UsesWriteRequest( ): Boolean;

Description

GetRequestUrl

[C#] public virtual string GetRequestUrl(string url, object[ ] parameters);
[C++] public: virtual String* GetRequestUrl(String* url, Object* parameters _gc[ ]);
[VB] Overridable Public Function GetRequestUrl(ByVal url As String, ByVal parameters( ) As Object) As String
[JScript] public function GetRequestUrl(url: String, parameters: Object[ ]): String;

Description
InitializeRequest
[C#] public virtual void InitializeRequest(WebRequest request, object[ ] values);
[C++] public: virtual void InitializeRequest(WebRequest* request, Object* values _gc[ ]);
[VB] Overridable Public Sub InitializeRequest(ByVal request As WebRequest, ByVal values( ) As Object)
[JScript] public function InitializeRequest(request: WebRequest, values: Object[ ]);

Description
WriteRequest
[C#] public virtual void WriteRequest(Stream requestStream, object[ ] values);
[C++] public: virtual void WriteRequest(Stream* requeststream, Object* values _gc[ ]);
[VB] Overridable Public Sub WriteRequest(ByVal requestStream As Stream, ByVal values( ) As Object)
[JScript] public function WriteRequest(requestStream: Stream, values: Object[ ]);

Description
MimeReturnReader class (System.Web.Services.Protocols)
WriteRequest

Description
MimeReturnReader
Example Syntax:
WriteRequest
[C#] protected MimeReturnReader( );
[C++] protected: MimeReturnReader( );
[VB] Protected Sub New( )
[JScript] protected function MimeReturnReader( );
Read
[C#] public abstract object Read(WebResponse response, Stream responseStream);
[C++] public: virtual Object* Read(WebResponse* response, Stream* responseStream)=0;
[VB] MustOverride Public Function Read(ByVal response As WebResponse, ByVal responseStream As Stream) As Object
[JScript] public abstract function Read(response: WebResponse, responseStream: Stream): Object;

Description
NopReturnReader class (System.Web.Services.Protocols)
ToString

Description
NopReturnReader
Example Syntax:
ToString
[C#] public NopReturnReader( );
[C++] public: NopReturnReader( );
[VB] Public Sub New( )
[JScript] public function NopReturnReader( );
GetInitializer
[C#] public override object GetInitializer(LogicalMethodInfo methodInfo);
[C++] public: Object* GetInitializer(LogicalMethodInfo* methodInfo);
[VB] Overrides Public Function GetInitializer(ByVal methodInfo As LogicalMethodInfo) As Object
[JScript] public override function GetInitializer(methodInfo: LogicalMethodInfo): Object;

Description
Initialize
[C#] public override void Initialize(object initializer);
[C++] public: void Initialize(Object* initializer);
[VB] Overrides Public Sub Initialize(ByVal initializer As Object)
[JScript] public override function Initialize(initializer: Object);

Description
Read
[C#] public override object Read(WebResponse response, Stream responseStream);
[C++] public: Object* Read(WebResponse* response, Stream* responseStream);
[VB] Overrides Public Function Read(ByVal response As WebResponse, ByVal responseStream As Stream) As Object
[JScript] public override function Read(response: WebResponse, responseStream: Stream): Object;

Description
PatternMatcher class (System.Web.Services.Protocols)
ToString

Description
PatternMatcher
Example Syntax:
ToString
[C#] public PatternMatcher(Type type);
[C++] public: PatternMatcher(Type* type);
[VB] Public Sub New(ByVal type As Type)
[JScript] public function PatternMatcher(type: Type);

Description
Match
[C#] public object Match(string text);
[C++] public: Object* Match(String* text);
[VB] Public Function Match(ByVal text As String) As Object
[JScript] public function Match(text: String): Object;

Description
SoapClientMessage class (System.Web.Services.Protocols)
ToString

Description
Represents the data in a SOAP request sent or a SOAP response received by a Web Service client at a specific System.Web.Services.Protocols.SoapMessageStage for a Web Service method.
Action
ToString
[C#] public override string Action {get;}
[C++] public: _property virtual String* get_Action( );
[VB] Overrides Public ReadOnly Property Action As String
[JScript] public function get Action( ): String;

Description
Gets the SOAPAction HTTP request header field for the SOAP request or SOAP response.
The System.Web.Services.Protocols. SoapClientMessage.Action property is availavable in any System.Web.Services.Protocols.SoapMessageStage.

Client
ToString
[C#] public SoapHttpClientProtocol Client {get;}
[C++] public: _property SoapHttpClientProtocol* get_Client( );
[VB] Public ReadOnly Property Client As SoapHttpClientProtocol
[JScript] public function get Client( ): SoapHttpClientProtocol;

Description

Gets an instance of the client proxy class, which derives from System.Web.Services.Protocols. SoapHttpClientProtocol.

The System.Web.Services.Protocols. SoapClientMessage.Client property can be accessed during any System. Web.Services.Protocols.SoapMessageStage ContentType
Exception
Headers
MethodInfo
ToString Description Gets a representation of the method prototype for the Web Service method for which the SOAP request is intended.

Although the System.Web.Services.Protocols. SoapClientMessage.MethodInfo property can be accessed during any stage, the method information is only available during System.Web.Services.Protocols.SoapMessageStage.AfterDeserialize and System.Web.Services.Protocols.SoapMessageStage.BeforeSerialize.

OneWay
ToString
[C#] public override bool OneWay {get;}
[C++] public: _property virtual bool get_OneWay( );
[VB] Overrides Public ReadOnly Property OneWay As Boolean
[JScript] public function get OneWay( ): Boolean;

Description

Gets a value indicating whether the client waits for the server to finish processing a Web Service method.

A System.Web.Services.Protocols. SoapDocumentMethodAttribute or System.Web.Services.Protocols. SoapRpcMethodAttribute applied to a Web Service method or Web Service client can specify whether the Web Service method is one way or not by setting the System.Web.Services.Protocols.SoapDocumentMethodAttribute.OneWay property of the attribute.

Stage
Stream
Url
ToString

Description

Gets the URL of the Web Service.

The System.Web.Services.Protocols. SoapClientMessage.Url property can be accessed during any System.Web. Services.Protocols.SoapMessageStage EnsureInStage
[C#] protected override void EnsureInStage( );
[C++] protected: void EnsureInStage( );
[VB] Overrides Protected Sub EnsureInStage( )
[JScript] protected override function EnsureInStage( );

Description

Asserts that the current System.Web.Services.Protocols. SoapMessageStage stage is a stage where in parameters are available. If not, an exception is thrown.

For Web Service clients, the in parameters are available prior to the SOAP request serialization process in the System.Web.Services.Protocols.SoapMessageStage.BeforeSerialize stage. The System.InvalidOperationException is thrown if System.Web.Services.Protocols. SoapClientMessage.EnsureInStage method is invoked in any other System.Web.Services.Protocols.SoapMessageStage.

EnsureOutStage
[C#] protected override void EnsureOutStage( );
[C++] protected: void EnsureOutStage( );
[VB] Overrides Protected Sub EnsureOutStage( )
[JScript] protected override function EnsureOutStage( );

Description

Asserts that the current System.Web.Services.Protocols. SoapMessageStage stage is a stage where out parameters are available. If not, an exception is thrown.

For Web Service clients, the out parameters are available after the SOAP response deserialization process in the System.Web.Services.Protocols.SoapMessageStage.AfterDeserialize stage. The System.InvalidOperationException is thrown if System.Web.Services.Protocols. SoapClientMessage.EnsureOutStage method is invoked in any other System.Web. Services.Protocols.SoapMessageStage.

SoapDocumentMethodAttribute class (System.Web.Services.Protocols)
ToString

Description

Applying the optional System.Web.Services.Protocols. SoapDocumentMethodAttribute to a Web Service method alters the format of the SOAP request or response sent to and from a Web Service method.

Web Services Description Language (WSDL) defines two styles for how a Web Service method, which it calls an operation, can be encoded in a SOAP request or a SOAP response: RPC and Document. The Document style refers to encoding the Web Service method as described in an XSD schema. If Document style is used, the Service Description for the Web Service, which is in WSDL, defines XSD schemas for both SOAP requests and SOAP responses to the Web Service method. A Web Service set to the Document encoding style expects clients to pass the XML just as it is defined in these XSD schemas.

SoapDocumentMethodAttribute
Example Syntax:
ToString
[C#] public SoapDocumentMethodAttribute( );
[C++] public: SoapDocumentMethodAttribute( );
[VB] Public Sub New( )
[JScript] public function SoapDocumentMethodAttribute( );
Initializes a new instance of the System.Web.Services.Protocols.SoapDocumentMethodAttribute class.

Description

Initializes a new instance of the System.Web.Services.Protocols.SoapDocumentMethodAttribute class.

SoapDocumentMethodAttribute
Example Syntax:
ToString
[C#] public SoapDocumentMethodAttribute(string action);
[C++] public: SoapDocumentMethodAttribute(String* action);
[VB] Public Sub New(ByVal action As String)
[JScript] public function SoapDocumentMethodAttribute (action: String);

Description

Initializes a new instance of the System.Web.Services.Protocols.SoapDocumentMethodAttribute class setting the System.Web.Services.Protocols.SoapDocumentMethodAttribute.Action property to action. The intent of the SOAP request. Sets the System.Web.Services.Protocols.SoapDocumentMethodAttribute.Action property.

Action

ToString

[C#] public string Action {get; set;}

[C++] public: _property String* get_Action( );public: _property void set_Action(String*);

[VB] Public Property Action As String

[JScript] public function get Action( ): String;public function set Action(String);

Description

Gets or sets the intent of the SOAP request.

The System.Web.Services.Protocols. SoapDocumentMethodAttribute.Action property forms the SOAPAction HTTP Header Field for the HTTP Request.

Binding

ToString

[C#] public string Binding {get; set;}

[C++] public: _property String* get_Binding( ); public: _property void set_Binding(String*);

[VB] Public Property Binding As String

[JScript] public function get Binding( ): String;public function set Binding(String);

Description

Gets or sets the binding a Web Service method is implementing a operation for.

A binding, as defined by Web Services Description Language(WSDL), is similar to an interface, in that it defines a concrete set of operations. With respect to ASP.NET Web Services, each Web Service method is an operation within a binding. Web Service methods are members of either the default binding for a Web Service or in a binding specified within a System.Web.Services.WebServiceBindingAttribute applied to a Web Service. A Web Service can implement multiple bindings, by applying multiple System.Web.Services.WebServiceBindingAttribute attributes to a Web Service.

OneWay

ToString

[C#] public bool OneWay {get; set;}

[C++] public: _property bool get_OneWay( );public: _property void set_OneWay(bool);

[VB] Public Property OneWay As Boolean

[JScript] public function get OneWay( ): Boolean;public function set OneWay(Boolean);

Description

Gets or sets whether a Web Service client waits for the Web server to finish processing a Web Service method.

When a Web Service method sets the System.Web.Services.Protocols.SoapDocumentMethodAttribute.OneWay property to true, the Web Service client does not have to wait for the Web server to finish processing the Web Service method. As soon as the Web server has deserialized the System.Web.Services.Protocols.SoapServerMessage, but before invoking the Web Service method, the server returns an HTTP 202 status code. A HTTP 202 status code indicates to the client that the Web server has started processing of the message. Therefore, a Web Service client receives no acknowledgment that the Web server successfully processed the message.

ParameterStyle

ToString

[C#] public SoapParameterStyle ParameterStyle {get; set;}

[C++] public: _property SoapParameterStyle get_ParameterStyle( );public: _property void set_ParameterStyle(SoapParameterStyle);

[VB] Public Property ParameterStyle As SoapParameterStyle

[JScript] public function get ParameterStyle( ): SoapParameterStyle;public function set ParameterStyle(SoapParameterStyle);

Description

Gets or sets whether parameters are wrapped within a single element beneath the Body element in the XML portion of a SOAP message.

RequestElementName

ToString

[C#] public string RequestElementName {get; set;}

[C++] public: _property String* get_RequestElementName( );public: _property void set_RequestElementName (String*);

[VB] Public Property RequestElementName As String

[JScript] public function get RequestElementName( ): String;public function set RequestElementName(String);

Description

Gets or sets the XML element associated with the SOAP request for a Web Service method.

The System.Web.Services.Protocols. SoapDocumentMethodAttribute.RequestElementName defines the XML element used to wrap the parameters beneath the Body element of the SOAP request when System.Web.Services.Protocols.SoapDocumentMethodAttribute.ParameterStyle is System.Web. Services.Protocols.SoapParameterStyle.Wrapped. This is reflected in the XSD schema representing the SOAP request to the Web Service method within the Web Service's Service Description.

RequestNamespace

ToString

[C#] public string RequestNamespace {get; set;}

[C++] public: _property String* get_RequestNamespace( );public: _property void set_RequestNamespace(String*);

[VB] Public Property RequestNamespace As String

[JScript] public function get RequestNamespace( ): String; public function set RequestNamespace(String);

Description

Gets or sets the namespace associated with the SOAP request for a Web Service method.

System.Web.Services.Protocols. SoapDocumentMethodAttribute.RequestNamespace is used in the XSD schema for the Web Service method within its Service Description.

ResponseElementName

ToString

[C#] public string ResponseElementName {get; set;}

[C++] public: _property String* get_ResponseElementName( );public: _property void set_ResponseElementName(String*);

[VB] Public Property ResponseElementName As String

[JScript] public function get ResponseElementName( ): String;public function set ResponseElementName (String);

Description

Gets or sets the XML element associated with the SOAP response for a Web Service method.

The System.Web.Services.Protocols. SoapDocumentMethodAttribute.ResponseElementName defines the XML element used to wrap the parameters beneath the Body element of the SOAP response when System.Web.Services.Protocols.SoapDocumentMethodAttribute.ParameterStyle is System.Web.Services.Protocols. SoapParameterStyle. Wrapped. This is reflected in the XSD schema representing the SOAP response to the Web Service method within the Web Service's Service Description.

ResponseNamespace

ToString

[C#] public string ResponseNamespace {get; set;}

[C++] public: _property String* get_ResponseName space( );public: _property void set_ResponseNamespace (String*);

[VB] Public Property ResponseNamespace As String

[JScript] public function get ResponseNamespace( ): String; public function set ResponseNamespace(String);

Description

Gets or sets the XML namespace associated with the SOAP response for a Web Service method.

The System.Web.Services.Protocols. SoapDocumentMethodAttribute.ResponseNamespace property is used in the XSD schema for the Web Service method in its Service Description.

TypeId

Use

ToString

Description

Gets or sets the parameter encoding for a Web Service method within the XML portion of a SOAP message.

The Web Services Description Language (WSDL) defines two parameter encoding styles: System.Web.Services.Description.SoapBindingUse.Encoded and System.Web.Services.Description.SoapBindingUse.Literal.

SoapDocumentServiceAttribute class (System.Web.Services.Protocols)

ToString

Description

Applying the optional System.Web.Services.Protocols. SoapDocumentServiceAttribute to a Web Service sets the default format of SOAP requests and responses sent to and from Web Service methods within the Web Service.

The System.Web.Services.Protocols. SoapDocumentServiceAttribute allows you to set the default encoding styles for Web Service methods within a Web Service. If an individual Web Service method needs to change these defaults, apply a System.Web.Services.Protocols. SoapDocumentMethodAttribute to that Web Service method.

SoapDocumentServiceAttribute

Example Syntax:

ToString

[C#] public SoapDocumentServiceAttribute( );

[C++] public: SoapDocumentServiceAttribute( );

[VB] Public Sub New( )

[JScript] public function SoapDocumentServiceAttribute( );

Initializes a new instance of the System.Web.Services.Protocols.SoapDocumentServiceAttribute class.

Description

Initializes a new instance of the System.Web.Services.Protocols.SoapDocumentServiceAttribute class setting all properties to their defaults.

SoapDocumentServiceAttribute

Example Syntax:

ToString

[C#] public SoapDocumentServiceAttribute(SoapBindingUse use);

[C++] public: SoapDocumentServiceAttribute(SoapBindingUse use);

[VB] Public Sub New(ByVal use As SoapBindingUse)

[JScript] public function SoapDocumentServiceAttribute (use: SoapBindingUse);

Description

Initializes a new instance of the System.Web.Services.Protocols.SoapDocumentServiceAttribute class setting the parameter encoding. The parameter encoding of the Web Service. Sets the System.Web.Services.Protocols. SoapDocumentServiceAttribute.Use property.

SoapDocumentServiceAttribute

Example Syntax:

ToString

[C#] public SoapDocumentServiceAttribute(SoapBindingUse use, SoapParameterStyle paramStyle);

[C++] public: SoapDocumentServiceAttribute(SoapBindingUse use, SoapParameterStyle paramStyle);

[VB] Public Sub New(ByVal use As SoapBindingUse, ByVal paramStyle As SoapParameterStyle)

[JScript] public function SoapDocumentServiceAttribute (use: SoapBindingUse, paramStyle: SoapParameterStyle);

Description

Initializes a new instance of the System.Web.Services.Protocols.SoapDocumentServiceAttribute class setting the parameter encoding and whether parameters are wrapped within a single element under the Body element within the XML portion of SOAP requests and responses. The parameter encoding style. Sets the System.Web.Services.Protocols. SoapDocumentServiceAttribute.Use property. Sets whether parameters are wrapped withn a single XML element under the Body element within the XML portion of SOAP requests and responses to Web Service methods within the Web Service. Sets the System.Web.Services.Protocols. SoapDocumentServiceAttribute.ParameterStyle property.

ParameterStyle

ToString

[C#] public SoapParameterStyle ParameterStyle {get; set;}

[C++] public: _property SoapParameterStyle get_ParameterStyle( );public: _property void set_ParameterStyle(SoapParameterStyle);

[VB] Public Property ParameterStyle As SoapParameterStyle

[JScript] public function get ParameterStyle( ): SoapParameterStyle;public function set ParameterStyle(SoapParameterStyle);

Description

Gets or sets the default for Web Service methods within the Web Service whether parameters are wrapped within a single element beneath the Body element in the XML portion of a SOAP message.

RoutingStyle

ToString

[C#] public SoapServiceRoutingStyle RoutingStyle {get; set;}

[C++] public: _property SoapServiceRoutingStyle get_RoutingStyle( );public: _property void set_RoutingStyle (SoapServiceRoutingStyle);

[VB] Public Property RoutingStyle As SoapServiceRoutingStyle

[JScript] public function get RoutingStyle( ): SoapServiceRoutingStyle;public function set RoutingStyle(SoapServiceRoutingStyle);

Description

TypeId

Use

ToString

Description

Gets or sets the default parameter encoding for a Web Service.

The Web Services Description Language (WSDL) defines two parameter encoding styles: System.Web.Services.Description.SoapBindingUse.Encoded and System.Web.Services.Description.SoapBindingUse.Literal.

SoapException class (System.Web.Services.Protocols)

ToString

Description

The exception that is thrown when a Web Service method is called over Simple Object Access Protocol (SOAP) and an exception occurs.

The System.Web.Services.Protocols.SoapException can either be thrown by the common language runtime or by a Web Service method. The common language runtime can throw a System.Web.Services.Protocols.SoapException if a response to a request is not formatted correctly. Web Service methods can generate a System.Web.Services.Protocols.SoapException by simply throwing an exception within the Web Service method. If the client accessed the method over SOAP, the exception is caught on the server and wrapped inside a new System.Web.Services.Protocols. SoapException. The SoapException thrown has the following property values: Property Value System.Exception.Message The System.Exception.Message property of the original exception.

ToString

[C#] public static readonly XmlQualifiedName ClientFaultCode;

[C++] public: static XmlQualifiedName* ClientFaultCode;

[VB] Public Shared ReadOnly ClientFaultCode As XmlQualifiedName

[JScript] public static var ClientFaultCode: XmlQualifiedName;

Description

Specifies a SOAP fault code representing a client call was not formatted correctly or did not contain the appropriate information.

An example of when a System.Web.Services.Protocols.SoapException.ClientFaultCode can be generated, is when a client call lacks proper authentication or payment information. It is generally an indication that the client call should not be resent without change.

ToString

[C#] public static readonly XmlQualifiedName DetailElementName;

[C++] public: static XmlQualifiedName* DetailElementName;

[VB] Public Shared ReadOnly DetailElementName As XmlQualifiedName

[JScript] public static var DetailElementName: XmlQualifiedName;

Description

Gets an System.Xml.XmlQualifiedName representing the System.Web.Services.Protocols.SoapException.Detail element of a SOAP Fault code.

In building an System.Xml.XmlNode for the System.Web.Services.Protocols.SoapException.Detail property, the System.Xml.XmlQualifiedName.Name and System.Xml.XmlQualifiedName.Namespace properties of System.Web.Services.Protocols.SoapException.DetailElementName can be used to ensure consistancy with the SOAP specification.

ToString

[C#] public static readonly XmlQualifiedName MustUnderstandFaultCode;

[C++] public: static XmlQualifiedName* MustUnderstandFaultCode;

[VB] Public Shared ReadOnly MustUnderstandFaultCode As XmlQualifiedName

[JScript] public static var MustUnderstandFaultCode: XmlQualifiedName;

Description

A SOAP Fault Code representing a SOAP element marked with the MustUnderstand attribute was not processed.

Not all SOAP elements require processing by the server. However, if a SOAP element is marked with the MustUnderstand attribute equal to 1, processing is required. Failure to process the element, generates a System.Web.Services.Protocols.SoapException with a System.Web.Services.Protocols.SoapException.MustUnderstandFaultCode.

ToString

[C#] public static readonly XmlQualifiedName ServerFaultCode;

[C++] public: static XmlQualifiedName* ServetFaultCode;

[VB] Public Shared ReadOnly ServerFaultCode As XmlQualifiedName

[JScript] public static var ServerFaultCode: XmlQualifiedName;

Description

Specifies a SOAP fault code representing an error occurred during the processing of a client call on the server, where the problem was not due to the message contents.

A System.Web.Services.Protocols. SoapException.ServerFaultCode might occur for example, if a server being called, couldn't respond to a request due to network problems. Typically, with this type of exception, the client call may succeed later.

ToString

[C#] public static readonly XmlQualifiedName VersionMismatchFaultCode;

[C++] public: static XmlQualifiedName* VersionMismatchFaultCode;

[VB] Public Shared ReadOnly VersionMismatchFaultCode As XmlQualifiedName

[JScript] public static var VersionMismatchFaultCode: XmlQualifiedName;

Description

A SOAP fault code representing an invalid namespace for a SOAP Envelope was found during the processing of the SOAP message.

A SOAP Envelope is the top-level element of a XML document representing a SOAP message.

SoapException

Example Syntax:

ToString

[C#] public SoapException(string message, XmlQualifiedName code);

[C++] public: SoapException(String* message, XmlQualifiedName* code);

[VB] Public Sub New(ByVal message As String, ByVal code As XmlQualifiedName)

[JScript] public function SoapException(message: String, code: XmlQualifiedName);

Description

Initializes a new instance of the System.Web.Services.Protocols.SoapException class that sets the exception message and exception code. A message that identifies the reason the exception occurred. Sets the System.Exception.Message property. The type of error that occurred. Sets the System.Web.Services.Protocols.SoapException.Code property.

SoapException

Example Syntax:

ToString

[C#] public SoapException(string message, XmlQualifiedName code, Exception innerException);

[C++] public: SoapException(String* message, XmlQualifiedName* code, Exception* innerException);

[VB] Public Sub New(ByVal message As String, ByVal code As XmlQualifiedName, ByVal innerException As Exception)

[JScript] public function SoapException(message: String, code: XmlQualifiedName, innerException: Exception);

Description

Initializes a new instance of the System.Web.Services.Protocols.SoapException class that sets the exception message, exception code and a reference to the root cause of the exception. A message that identifies the reason the exception occurred. Sets the System.Exception.Message property. The type of error that occurred. Sets the System.Web.Services.Protocols.SoapException.Code property. A reference to the root cause of the exception. Sets the System.Exception.InnerException property.

SoapException

Example Syntax:

ToString

[C#] public SoapException(string message, XmlQualifiedName code, string actor);

[C++] public: SoapException(String* message, XmlQualifiedName* code, String* actor);

[VB] Public Sub New(ByVal message As String, ByVal code As XmlQualifiedName, ByVal actor As String)

[JScript] public function SoapException(message: String, code: XmlQualifiedName, actor: String); Initializes a new instance of the System.Web.Services.Protocols. SoapException class.

Description

Initializes a new instance of the System.Web.Services.Protocols.SoapException class that sets the exception message, exception code and the piece of code that caused the exception. A message that identifies the reason the exception occurred. Sets the System.Exception.Message property. The type of error that occurred. Sets the System.Web.Services.Protocols.SoapException.Code property. The piece of code that caused the exception. Typically, a URL to a Web Service method. Sets the System.Web.Services.Protocols. SoapException.Actor property.

SoapException

Example Syntax:

ToString

[C#] public SoapException(string message, XmlQualifiedName code, string actor, Exception innerException);

[C++] public: SoapException(String* message, XmlQualifiedName* code, String* actor, Exception* innerException);

[VB] Public Sub New(ByVal message As String, ByVal code As XmlQualifiedName, ByVal actor As String, ByVal innerException As Exception)

[JScript] public function SoapException(message: String, code: XmlQualifiedName, actor: String, innerException: Exception);

Description

Initializes a new instance of the System.Web.Services.Protocols.SoapException class that sets the exception message, exception code, the piece of code that casued the exception and a reference to the root cause of the exception. A message that identifies the reason the exception occurred. Sets the System.Exception.Message property. The type of error that occurred. Sets the System.Web.Services.Protocols. SoapException.Code property. The piece of code that caused the exception. Typically, a URL to a Web Service method. Sets the System.Web.Services.Protocols.SoapException.Actor property. A reference to the root cause of an exception. Sets the System.Exception.InnerException property.

SoapException

Example Syntax:

ToString

[C#] public SoapException(string message, XmlQualifiedName code, string actor, XmlNode detail);

[C++] public: SoapException(String* message, XmlQualifiedName* code, String* actor, XmlNode* detail);

[VB] Public Sub New(ByVal message As String, ByVal code As XmlQualifiedName, ByVal actor As String, ByVal detail As XmlNode)

[JScript] public function SoapException(message: String, code: XmlQualifiedName, actor: String, detail: XmlNode);

Description

Initializes a new instance of the System.Web.Services.Protocols.SoapException class that sets the exception message, exception code, piece of code that caused the exception and application specific exception information. A message that identifies the reason the exception occurred. Sets the System.Exception.Message property. The type of error that occurred. Sets the System.Web.Services.Protocols. SoapException.Code property. The piece of code that caused the exception. Typically, a URL to a Web Service method. Sets the System.Web.Services.Protocols.SoapException.Actor property. The application specific exception information. Sets the System.Web.Services.Protocols. SoapException. Detail property.

SoapException

Example Syntax:

ToString

[C#] public SoapException(string message, XmlQualifiedName code, string actor, XmlNode detail, Exception innerException);

[C++] public: SoapException(String* message, XmlQualifiedName* code, String* actor, XmlNode* detail, Exception* innerException);

[VB] Public Sub New(ByVal message As String, ByVal code As XmlQualifiedName, ByVal actor As String, ByVal detail As XmlNode, ByVal innerException As Exception)

[JScript] public function SoapException(message: String, code: XmlQualifiedName, actor: String, detail: XmlNode, innerException: Exception);

Description

Initializes a new instance of the System.Web.Services.Protocols.SoapException class that sets the exception message, exception code, piece of code that caused the exception, application specific exception information and a reference to the root cause of the exception. A message that identifies the reason the exception occurred. Sets the System.Exception.

Message property. The type of error that occurred. Sets the System.Web.Services.Protocols.SoapException.Code property. The piece of code that caused the exception. Typically, a URL to a Web Service method. Sets the System.Web.Services.Protocols.SoapException.Actor property. The application specific exception information. Sets the System.Web.Services.Protocols.SoapException.Detail property. A reference to the root cause of the exception. Sets the System.Exception.InnerException property.

SoapException

Example Syntax:

ToString

[C#] public SoapException(string message, XmlQualifiedName code, string actor, XmlNode detail, XmlNode[ ] otherElements);

[C++] public: SoapException(String* message, XmlQualifiedName* code, String* actor, XmlNode* detail, XmlNode* otherElements[ ]);

[VB] Public Sub New(ByVal message As String, ByVal code As XmlQualifiedName, ByVal actor As String, ByVal detail As XmlNode, ByVal otherElements( ) As XmlNode)

[JScript] public function SoapException(message: String, code: XmlQualifiedName, actor: String, detail: XmlNode, otherElements: XmlNode[ ]);

Description

Initializes a new instance of the System.Web.Services.Protocols.SoapException class that sets the exception message, exception code, piece of code that caused the exception, application specific exception information and optional exception information. A message that identifies the reason the exception occurred. Sets the System.Exception.Message property. The type of error that occurred. Sets the System.Web.Services.Protocols.SoapException.Code property. The piece of code that caused the exception. Typically, a URL to a Web Service method. Sets the System.Web.Services.Protocols.SoapException.Actor property. The application specific exception information. Sets the System.Web.Services.Protocols.SoapException.Detail property. Optional exception information. Sets the System.Web.Services.Protocols.SoapException.OtherElements property.

SoapException

Example Syntax:

ToString

[C#] public SoapException(string message, XmlQualifiedName code, string actor, XmlNode detail, XmlNode[ ] otherElements, Exception innerException);

[C++] public: SoapException(String* message, XmlQualifiedName* code, String* actor, XmlNode* detail, XmlNode* otherElements[ ], Exception* innerException);

[VB] Public Sub New(ByVal message As String, ByVal code As XmlQualifiedName, ByVal actor As String, ByVal detail As XmlNode, ByVal otherElements( ) As XmlNode, ByVal innerException As Exception)

[JScript] public function SoapException(message: String, code: XmlQualifiedName, actor: String, detail: XmlNode, otherElements: XmlNode[ ], innerException: Exception);

Description

Initializes a new instance of the System.Web.Services.Protocols.SoapException class that sets the exception message, exception code, piece of code that caused the exception, application specific exception information, optional exception information, and a reference to the root cause of the exception. A message that identifies the reason the exception occurred. Sets the System.Exception.Message property. The type of error that occurred. Sets the System.Web.Services.Protocols.SoapException.Code property. The piece of code that caused the exception. Typically, a URL to a Web Service method. Sets the System.Web.Services.Protocols. SoapException.Actor property. The application specific exception information. Sets the System.Web.Services.Protocols.SoapException.Detail property. Optional exception information. Sets the System.Web.Services.Protocols. SoapException.OtherElements property. A reference to the root cause of the exception. Sets the System.Exception.InnerException property.

Actor

ToString

[C#] public string Actor {get;}

[C++] public: _property String* get_Actor( );

[VB] Public ReadOnly Property Actor As String

[JScript] public function get Actor( ): String;

Description

Gets the piece of code that caused the exception.

System.Web.Services.Protocols.SoapException.Actor can only be set using one of the constructors that accept an System.Web.Services.Protocols.SoapException.Actor argument.

Code

ToString

[C#] public XmlQualifiedName Code {get;}

[C++] public: _property XmlQualifiedName* get_Code( );

[VB] Public ReadOnly Property Code As XmlQualifiedName

[JScript] public function get Code( ): XmlQualifiedName;

Description

Gets the type of SOAP fault code.

System.Web.Services.Protocols.SoapException.Code can only be set when creating a new instance of the System.Web.Services.Protocols.SoapException class.

Detail

ToString

[C#] public XmlNode Detail {get;}

[C++] public: _property XmlNode* get_Detail( );

[VB] Public ReadOnly Property Detail As XmlNode

[JScript] public function get Detail( ): XmlNode;

Description

Gets an System.Xml.XmlNode representing the application specific error information.

System.Web.Services.Protocols.SoapException.Detail can be set using one of the class constructors that accept a System.Web.Services.Protocols.SoapException.Detail value.

HelpLink

HResult

InnerException

Message

OtherElements

ToString

Description

Gets an array of System.Xml.XmlNode with the optional error information.

System.Web.Services.Protocols. SoapException.OtherElements can be set using one of the class constructors that accept an argument for System.Web. Services.Protocols. SoapException.OtherElements.

Source

StackTrace

TargetSite

SoapExtension class (System.Web.Services.Protocols)

ToString

Description

Represents the ase class for SOAP extensions in ASP.NET Web Services.

ASP.NET Web Services allows a SOAP-related infrastructure to be built by means of an extensibility mechanism. The ASP.NET SOAP extension architecture revolves around an extension that can inspect or modify a message at specific stages in message processing on either the client or the server.

SoapExtension

Example Syntax:

ToString

[C#] protected SoapExtension( );

[C++] protected: SoapExtension( );

[VB] Protected Sub New( )

[JScript] protected function SoapExtension( );

ChainStream

[C#] public virtual Stream ChainStream(Stream stream);

[C++] public: virtual Stream* ChainStream(Stream* stream);

[VB] Overridable Public Function ChainStream(ByVal stream As Stream) As Stream

[JScript] public function ChainStream(stream: Stream): Stream;

Description

When overridden in a derived class, allows a SOAP extension access to the memory buffer containing the SOAP request or response.

Return Value: A System.IO.Stream representing a new memory buffer that this SOAP extension can modify.

System.Web.Services.Protocols. SoapExtension.ChainStream(System.IO.Stream) ensures that SOAP extensions with the highest priority can modify the actual data closest to the SOAP message sent or returned over the wire. For instance, you probably would not want a compression SOAP extension to compress the data prior to an encryption SOAP extension encrypted the data. Doing so might lead to an inefficiently compressed data packet sent over the wire. A memory buffer containing the SOAP request or response.

GetInitializer

[C#] public abstract object GetInitializer(Type serviceType);

[C++] public: virtual Object* GetInitializer(Type* serviceType)=0;

[VB] MustOverride Public Function GetInitializer(ByVal serviceType As Type) As Object

[JScript] public abstract function GetInitializer(serviceType: Type): Object;

Description

When overridden in a derived class, allows a SOAP extension to initialize data specific to a class implementing a Web Service at a one-time performance cost.

Return Value: The System.Object that the SOAP extension initializes to be cached.

The overload of System.Web.Services.Protocols-.SoapExtension.GetIntializer that gets called by the ASP.NET Web Services infrastructure depends on how the SOAP extension was specified. There are two methods for specifying a SOAP extension: apply a custom attribute, deriving from System.Web.Services.Protocols. SoapExtensionAttribute, to the individual Web Service method or add a reference in either the web.config or app.config configuration files. If you add a reference to one of the configuration files, the SOAP extension runs for all Web Services within the scope of that configuration file. The ASP.NET Web Services infrastructure invokes the System.Web.Services.Protocols.GetInitializer overload that passes in a System.Type; otherwise the ASP.NET Web Services infrastructure invokes the System.Web.Services.Protocols.SoapExtension.GetInitializer (System.Web.Services.Protocols.LogicalMethodInfo,System.Web.Services.Protocols.SoapExtensionAttribute) that passes in a System.Web.Services.Protocols.LogicalMethodInfo and a System.Web.Services.Protocols.SoapExtensionAttribute. The type of the class implementing the Web Service that a SOAP extension is applied to.

GetInitializer

[C#] public abstract object GetInitializer(LogicalMethodInfo methodInfo, SoapExtensionAttribute attribute);

[C++] public: virtual Object* GetInitializer(LogicalMethodInfo* methodInfo, SoapExtensionAttribute* attribute)=0;

[VB] MustOverride Public Function GetInitializer(ByVal methodInfo As LogicalMethodInfo, ByVal attribute As SoapExtensionAttribute) As Object

[JScript] public abstract function GetInitializer(methodInfo: LogicalMethodInfo, attribute: SoapExtensionAttribute): Object; When overridden in a derived class, allows a SOAP extension to initialize data specific to a Web Service method at a one-time performance cost.

Description

When overridden in a derived class, allows a SOAP extension to initialize data specific to a Web Service method using an attribute applied to the Web Service method at a one-time performance cost.

Return Value: The System.Object that the SOAP extension initializes to be cached.

If the SOAP extension is configured using a configuration file see the System.Web.Services.Protocols-.SoapExtension.GetInitialzier overload that accepts a System.Type. A System.Web.Services.Protocols.LogicalMethodInfo object representing the specific function prototype for the Web Service method the SOAP extension is applied to. The instance of the System.Web.Services.Protocols.SoapExtensionAttribute applied to the Web Service method.

Initialize

[C#] public abstract void Initialize(object initializer);

[C++] public: virtual void Initialize(Object* initializer)=0;

[VB] MustOverride Public Sub Initialize(ByVal initializer As Object)

[JScript] public abstract function Initialize(initializer: Object);

Description

When overridden in a derived class, allows a SOAP extension to initialize itself using the data cached in the System-.Web.Services.Protocols.SoapExtension.GetInitializer(System.Web.Services.Protocols.LogicalMethodInfo, System.Web.Services.Protocols.SoapExtensionAttribute) method.

A SOAP extension has three opportunities to initialize data and they all have different purposes: Class constructor—The class constructor is called every time a SOAP extension is instantiated and is typically used to initialize member variables. The System.Object returned from System.Web.Services.Protocols.SoapExtension.GetInitializer(System.Web.Services.Protocols.LogicalMethodInfo,System.Web.Services.Protocols.SoapExtensionAttribute) cached by ASP.NET Web Services.

ProcessMessage

[C#] public abstract void ProcessMessage(SoapMessage message);

[C++] public: virtual void ProcessMessage(SoapMessage* message)=0;

[VB] MustOverride Public Sub ProcessMessage(ByVal message As SoapMessage)

[JScript] public abstract function ProcessMessage(message: SoapMessage);

Description

When overridden in a derived class, allows a SOAP extension to receive a System.Web.Services.Protocols. SoapMessage to process at each System.Web.Services.Protocols. SoapMessageStage.

System.Web.Services.Protocols. SoapExtension.ProcessMessage(System.Web.Services.Protocols.SoapMessage) is called at all System.Web.Services.Protocols. SoapMessageStage stages for SOAP extensions applied to both ASP.NET Web Service clients and ASP.NET Web Services. At each System.Web.Services.Protocols.SoapMessageStage, an instance of a class deriving from System.Web.Services.Protocols.SoapMessage is passed to System.Web.Services.Protocols.SoapExtension.ProcessMessage(System.Web.Services.Protocols.SoapMessage). If the SOAP extension is running on the Web Service client, then a System.Web.Services.Protocols.SoapClientMessage object is passed into System.Web.Services.Protocols. SoapExtension.ProcessMessage(System.Web.Services.Protocols.SoapMessage); otherwise a System.Web.Services.Protocols. SoapServerMessage object is passed in. The System.Web.Services.Protocols.SoapMessage to process.

SoapExtensionAttribute class (System.Web.Services.Protocols)

ToString

Description

When overridden in a derived class, specifies the SOAP extension should be applied to a Web Service method.

ASP.NET Web Services enables applying SOAP extensions to a Web Service method by applying an attribute. When a custom extension attribute is added to a Web Service method or a proxy class client, ASP.NET Web Services invokes the associated extension at the appropriate time. An extension attribute is a custom attribute class deriving from System.Web.Services.Protocols.SoapExtensionAttribute. Derived attributes must override the System.Web.Services.Protocols.SoapExtensionAttribute.ExtensionType property to return the type of extension that is associated with the attribute.

SoapExtensionAttribute

Example Syntax:

ToString

[C#] protected SoapExtensionAttribute( );

[C++] protected: SoapExtensionAttribute( );

[VB] Protected Sub New( )

[JScript] protected function SoapExtensionAttribute( );

ExtensionType

ToString

[C#] public abstract Type ExtensionType {get;}

[C++] public: _property virtual Type* get_Extension Type( )=0;

[VB] MustOverride Public ReadOnly Property ExtensionType As Type

[JScript] public abstract function get ExtensionType( ): Type;

Description

When overridden in a derived class, gets the System.Type of the SOAP extension.

Derived classes must override the System.Web.Services.Protocols.SoapExtensionAttribute.ExtensionType property to return the System.Type of SOAP extension.

Priority

ToString

[C#] public abstract int Priority {get; set;}

[C++] public: _property virtual int get_Priority( )=0;public: _property virtual void set Priority(int)=0;

[VB] MustOverride Public Property Priority As Integer

[JScript] public abstract function get Priority( ): int;public abstract function set Priority(int);

Description

When overridden in a derived class, gets or set the priority of the SOAP extension.

TypeId

SoapHeader class (System.Web.Services.Protocols)

ToString

Description

When overridden in a derived class, represents the content of a SOAP header.

SOAP headers offer a method for passing data to and from a Web Service method not directly related to a Web Service method's primary functionality. For instance, a Web Service may contain several Web Service methods that each require a custom authentication scheme. Instead of adding parameters to each Web Service method for the custom authentication scheme, a System.Web.Services.Protocols. SoapHeaderAttribute, referring to a class deriving from System.Web.Services.Protocols.SoapHeader, can be applied to each Web Service method. The implementation for the class deriving from System.Web.Services.Protocols.SoapHeader handles the custom authentication scheme. In this manner, the Web Service method implements only the functionality specific to it and adds additional functionality through the use of a SOAP header.

SoapHeader

Example Syntax:

ToString

[C#] protected SoapHeader( );

[C++] protected: SoapHeader( );

[VB] Protected Sub New( )

[JScript] protected function SoapHeader( );

Actor

ToString

[C#] public string Actor {get; set;}

[C++] public: _property String* get_Actor( );public: _property void set_Actor(String*);

[VB] Public Property Actor As String

[JScript] public function get Actor( ): String;public function set Actor(String);

Description

Gets or sets the recipient of the SOAP header.

According to the SOAP specification, the recipient (commonly called the SOAP actor attribute) does not have to be the same for the Header and Body elements of a SOAP message. For a Web Service method, the required Body element of a SOAP message represents the parameters and return values of the Web Service method. If a Header element exists in the SOAP message, it represents additional data that can be sent to and from the Web Service method. The recipient of that data, known as the Actor, can be a different URI than the URI for the Web Service method.

DidUnderstand

ToString

[C#] public bool DidUnderstand {get; set;}

[C++] public: _property bool get_DidUnderstand( ); public: _property void set_DidUnderstand(bool);

[VB] Public Property DidUnderstand As Boolean

[JScript] public function get DidUnderstand( ): Boolean;public function set DidUnderstand(Boolean);

Description

Gets or sets a value indicating whether a Web Service method properly processed a SOAP header.

For SOAP headers defined by a Web Service, ASP.NET Web Services assumes the Web Service method properly processed the SOAP header by setting the initial value of System.Web.Services.Protocols. SoapHeader.DidUnderstand to true. For SOAP headers not defined by the Web Service, the initial value is false. If ASP.NET Web Services detects SOAP headers passed to a Web Service method with System.Web.Services.Protocols. SoapHeader.DidUnderstand set to false after the method returns, a System.Web.Services.Protocols.SoapHeaderException is thrown back to the Web Service client instead of the results from the Web Service method.

EncodedMustUnderstand

ToString

[C#] public string EncodedMustUnderstand {get; set;}

[C++] public: _property String* get_EncodedMustUnderstand( );public: _property void set_EncodedMustUnderstand(String*);

[VB] Public Property EncodedMustUnderstand As String

[JScript] public function get EncodedMustUnderstand( ): String;public function set EncodedMustUnderstand (String);

Description

Gets or sets the value of the mustUnderstand attribute for the SOAP header.

Valid values for the System.Web.Services.Protocols. SoapHeader.EncodedMustUnderstand property are 0 and 1, whereas setting the property to false or true equates to setting the property to 0 or 1, respectively.

MustUnderstand

ToString

[C#] public bool MustUnderstand {get; set;}

[C++] public: _property bool get_MustUnderstand( );
public: _ property void set_MustUnderstand(bool);

[VB] Public Property MustUnderstand As Boolean

[JScript] public function get MustUnderstand( ): Boolean; public function set MustUnderstand(Boolean);

Description

Gets or sets a value indicating whether the System.Web.Services.Protocols.SoapHeader must be understood.

When a Web Service client adds a SOAP header to a Web Service method call with the System.Web.Services.Protocols.SoapHeader.MustUnderstand property set to true, the Web Service method must set the System.Web.Services.Protocols.SoapHeader.DidUnderstand property to true; otherwise, a System.Web.Services.Protocols.SoapHeaderException is thrown back to the Web Service client by ASP.NET Web Services.

SoapHeaderAttribute class (System.Web.Services.Protocols)

ToString

Description

This attribute is applied to a Web Service or a Web Service client to specify a SOAP Header the Web Service or Web Service client wants to process. This class cannot be inherited.

The basic steps to receiving and processing a SOAP header are: Create a class deriving from System.Web.Services.Protocols.SoapHeader representing the data passed in the SOAP header.

SoapHeaderAttribute

Example Syntax:

ToString

[C#] public SoapHeaderAttribute(string memberName);

[C++] public: SoapHeaderAttribute(String* memberName);

[VB] Public Sub New(ByVal memberName As String)

[JScript] public function SoapHeaderAttribute(memberName: String);

Description

Initializes a new instance of the System.Web.Services.Protocols.SoapHeaderAttribute class setting the member of the Web Service class representing the SOAP header contents.

A Web Service client or Web Service can specify the SOAP headers it wants to process for specific Web Service methods by applying a System.Web.Services.Protocols. SoapHeaderAttribute to the Web Service method in the Web Service class or the corresponding method in the proxy class. In order for the Web Service method to receive the contents of the SOAP header, a member is added to the Web Service class of a System.Type derived from System.Web.Services.Protocols. SoapHeader. Likewise, a Web Service client adds a member to the proxy class deriving from System.Web.Services.Protocols.SoapHeader. That System.Type deriving from System. Web.Services.Protocols.SoapHeader represents the contents of the SOAP header and is created by the developer of the Web Service or Web Service client that wants to receive the SOAP header. Once the class is created, a System.Web.Services.Protocols.SoapHeaderAttribute can be applied to the Web Service method or corresponding method in the Web Service client proxy class specifing the member to receive the SOAP header contents with the memberName parameter to this constructor or the System.Web.Services.Protocols. SoapHeaderAttribute.MemberName property. Member of the Web Service class representing the SOAP header contents. Sets the System.Web.Services.Protocols. SoapHeaderAttribute.MemberName property.

Direction

ToString

[C#] public SoapHeaderDirection Direction {get; set;}

[C++] public: _property SoapHeaderDirection get_Direction( );public: _property void set_Direction(SoapHeaderDirection);

[VB] Public Property Direction As SoapHeaderDirection

[JScript] public function get Direction( ): SoapHeaderDirection;public function set Direction(SoapHeaderDirection);

Description

Gets or sets whether the SOAP header is intended for the Web Service or the Web Service client or both.

MemberName

ToString

[C#] public string MemberName {get; set;}

[C++] public: _property String* get_MemberName( );public: _property void set_MemberName(String*);

[VB] Public Property MemberName As String

[JScript] public function get MemberName( ): String;public function set MemberName(String);

Description

Gets or sets the member of the Web Service class representing the SOAP header contents.

A Web Service client or Web Service can specify the SOAP headers it wants to process for specific Web Service methods by applying a System.Web.Services.Protocols. SoapHeaderAttribute to the Web Service method in the Web Service class or the corresponding method in the proxy class. In order for the Web Service method to receive the contents of the SOAP header, a member is added to the Web Service class of a System.Type derived from System.Web.Services.Protocols. SoapHeader. Likewise, a Web Service client adds a member to the proxy class deriving from System.Web.Services.Protocols.SoapHeader. That System.Type deriving from System. Web.Services.Protocols.SoapHeader represents the contents of the SOAP header and is created by the developer of the Web Service or Web Service client that wants to receive the SOAP header. Once the class is created, a System.Web.Services.Protocols.SoapHeaderAttribute can be applied to the Web Service method or corresponding method in the Web Service client proxy class specifing the member to receive the SOAP header contents with the System.Web.Services.Protocols. SoapHeaderAttribute.MemberName property.

Required

ToString

[C#] public bool Required {get; set;}

[C++] public: _property bool get_Required( );public: _property void set_Required(bool);

[VB] Public Property Required As Boolean

[JScript] public function get Required( ): Boolean;public function set Required(Boolean);

Description

Gets or sets a value indicating whether the SOAP header must be understood and processed by the recipient Web Service or Web Service client.

When the System.Type of the member (represented by the System.Web.Services.Protocols. SoapHeaderAttribute. MemberName property) is either System.Web.Services.Protocols.SoapHeader or System.Web.Services.Protocols. SoapUnknownHeader, the System.Web.Services.Protocols. SoapHeaderAttribute.Required property must be false. For types that derive from System.Web.Services.Protocols. SoapHeader, it is fine for the System.Web.Services.Protocols. SoapHeaderAttribute.Required property to be true or false.

TypeId

SoapHeaderCollection class (System.Web.Services.Protocols)

ToString

Description

Contains a collection of System.Web.Services.Protocols. SoapHeader objects.

SoapHeaderCollection

Example Syntax:

ToString

[C#] public SoapHeaderCollection( );

[C++] public: SoapHeaderCollection( );

[VB] Public Sub New( )

[JScript] public function SoapHeaderCollection( );

Count

InnerList

Item

ToString

Description

Gets or sets the System.Web.Services.Protocols. SoapHeader at position index of the System.Web.Services.Protocols.SoapHeaderCollection.

This property provides the ability to access a specific element in the collection by using the following syntax: myCollection[index]. The zero-based index of the System.Web. Services.Protocols.SoapHeader to get or set.

List

Add

[C#] public int Add(SoapHeader header);

[C++] public: int Add(SoapHeader* header);

[VB] Public Function Add(ByVal header As SoapHeader) As Integer

[JScript] public function Add(header: SoapHeader): int;

Description

Adds a System.Web.Services.Protocols.SoapHeader to the System.Web.Services.Protocols.SoapHeaderCollection.

Return Value: The position into which the System.Web.Services.Protocols.SoapHeader was inserted. The System.Web. Services.Protocols.SoapHeader to add to the System.Web. Services.Protocols.SoapHeaderCollection.

Contains

[C#] public bool Contains(SoapHeader header);

[C++] public: bool Contains(SoapHeader* header);

[VB] Public Function Contains(ByVal header As SoapHeader) As Boolean

[JScript] public function Contains(header: SoapHeader): Boolean;

Description

Determines whether the System.Web.Services.Protocols. SoapHeaderCollection contains a specific System.Web.Services.Protocols.SoapHeader.

Return Value: true if the System.Web.Services.Protocols. SoapHeader is found in the System.Web.Services.Protocols. SoapHeaderCollection; otherwise, false. The System.Web. Services.Protocols.SoapHeader to locate in the System. Web. Services.Protocols.SoapHeaderCollection.

CopyTo

[C#] public void CopyTo(SoapHeader[ ] array, int index);

[C++] public: void CopyTo(SoapHeader* array[ ], int index);

[VB] Public Sub CopyTo(ByVal array( ) As SoapHeader, ByVal index As Integer)

[JScript] public function CopyTo(array: SoapHeader[ ], index: int);

Description

Copies the elements of the System.Web.Services.Protocols.SoapHeaderCollection to an System.Array, starting at a particular System.Array index. The one-dimensional System.Array that is the destination of the elements copied from System.Web.Services.Protocols.SoapHeaderCollection. The System.Array must have zero-based indexing. The zero-based index in array at which copying begins.

IndexOf

[C#] public int IndexOf(SoapHeader header);

[C++] public: mnt IndexOf(SoapHeader* header);

[VB] Public Function IndexOf(ByVal header As SoapHeader) As Integer

[JScript] public function IndexOf(header: SoapHeader): int;

Description

Determines the index of the SoapHeader in the SoapHeaderCollection.

Return Value: The index of header if found in the System. Web.Services.Protocols.SoapHeaderCollection; otherwise, −1. The System.Web.Services.Protocols.SoapHeaderto locate in the System.Web.Services.Protocols. SoapHeaderCollection.

Insert

[C#] public void Insert(int index, SoapHeader header);

[C++] public: void Insert(int index, SoapHeader* header);

[VB] Public Sub Insert(ByVal index As Integer, ByVal header As SoapHeader)

[JScript] public function Insert(index: int, header: SoapHeader);

Description

Inserts a System.Web.Services.Protocols.SoapHeader into the System.Web.Services.Protocols.SoapHeaderCollection at the specified index.

If index equals the number of items in the collection, then the System.Web.Services.Protocols.SoapHeader is appended to the end. The zero-based index at which the System.Web.Services.Protocols.SoapHeader is inserted into the System.Web.Services.Protocols.SoapHeaderCollection. The System.Web.Services.Protocols.SoapHeader inserted into the System.Web.Services.Protocols.SoapHeaderCollection.

Remove

[C#] public void Remove(SoapHeader header);

[C++] public: void Remove(SoapHeader* header);

[VB] Public Sub Remove(ByVal header As SoapHeader)

[JScript] public function Remove(header: SoapHeader);

Description

Removes the first occurrence of a specific System.Web.Services.Protocols.SoapHeader from the System.Web.Services.Protocols.SoapHeaderCollection.

The System.Web.Services.Protocols.SoapHeader elements that follow the removed System.Web.Services.Protocols.SoapHeader move up to occupy the vacated spot. The System.Web.Services.Protocols.SoapHeader to remove from the System.Web.Services.Protocols.SoapHeaderCollection.

SoapHeaderDirection enumeration (System.Web.Services.Protocols)

ToString

Description

Specifies whether the recipient of the System.Web.Services.Protocols.SoapHeader is the Web Service, the Web Service client or both.

A System.Web.Services.Protocols.SoapHeaderAttribute can be applied to either a Web Service method or a method on a proxy class to a Web Service. In either case, the recipient is specified by the System.Web.Services.Protocols. SoapHeaderAttribute.Direction property of System.Web. Services.Protocols.SoapHeaderAttribute.

ToString

[C#] public const SoapHeaderDirection In;

[C++] public: const SoapHeaderDirection In;

[VB] Public Const In As SoapHeaderDirection

[JScript] public var In: SoapHeaderDirection;

Description

Specifies the System.Web.Services.Protocols.SoapHeader is sent to the Web Service.

ToString

[C#] public const SoapHeaderDirection InOut;

[C++] public: const SoapHeaderDirection InOut;

[VB] Public Const InOut As SoapHeaderDirection

[JScript] public var InOut: SoapHeaderDirection;

Description

Specifies the System.Web.Services.Protocols.SoapHeader is sent to both the Web Service and the Web Service client.

ToString

[C#] public const SoapHeaderDirection Out;

[C++] public: const SoapHeaderDirection Out;

[VB] Public Const Out As SoapHeaderDirection

[JScript] public var Out: SoapHeaderDirection;

Description

Specifies the System.Web.Services.Protocols.SoapHeader is sent to the Web Service client.

SoapHeaderException class (System.Web.Services.Protocols)

ToString

Description

The exception that is thrown when a Web Service method is called over Simple Object Access Protocol (SOAP) and an exception occurs processing the SOAP header.

When a Web Service client adds a SOAP header to a Web Service method call with the System.Web.Services.Protocols.SoapHeader.MustUnderstand property set to true, the Web Service method must set the System.Web.Services.Protocols.SoapHeader.DidUnderstand property to true;otherwise a System.Web.Services.Protocols. SoapHeaderException is thrown.

SoapHeaderException

Example Syntax:

ToString

[C#] public SoapHeaderException(string message, XmlQualifiedName code);

[C++] public: SoapHeaderException(String* message, XmlQualifiedName* code);

[VB] Public Sub New(ByVal message As String, ByVal code As XmlQualifiedName)

[JScript] public function SoapHeaderException(message: String, code: XmlQualifiedName);

Description

Initializes a new instance of the System.Web.Services.Protocols.SoapHeaderException class. A message that identifies the reason the exception occurred. Sets the System.Exception.Message property. The type of error that occurred. Sets the System.Web.Services.Protocols.SoapException.Code property.

SoapHeaderException

Example Syntax:

ToString

[C#] public SoapHeaderException(string message, XmlQualifiedName code, Exception innerException);

[C++] public: SoapHeaderException(String* message, XmlQualifiedName* code, Exception* innerException);

[VB] Public Sub New(ByVal message As String, ByVal code As XmlQualifiedName, ByVal innerException As Exception)

[JScript] public function SoapHeaderException(message: String, code: XmlQualifiedName, innerException: Exception);

Description

Initializes a new instance of the System.Web.Services.Protocols.SoapHeaderException class. A message that identifies the reason the exception occurred. Sets the System.Exception.Message property. The type of error that occurred. Sets the System.Web.Services.Protocols.SoapException.Code property. A reference to the root cause of an exception. Sets the System.Exception.InnerException property.

SoapHeaderException

Example Syntax:

ToString

[C#] public SoapHeaderException(string message, XmlQualifiedName code, string actor);

[C++] public: SoapHeaderException(String* message, XmlQualifiedName* code, String* actor);

[VB] Public Sub New(ByVal message As String, ByVal code As XmlQualifiedName, ByVal actor As String)

[JScript] public function SoapHeaderException(message: String, code: XmlQualifiedName, actor: String);

Description

Initializes a new instance of the System.Web.Services.Protocols.SoapHeaderException class. A message that identifies the reason the exception occurred. Sets the System.Exception.Message property. The type of error that occurred. Sets the System.Web.Services.Protocols.SoapException.Code property. The piece of code that caused the exception. Typically, a URL to a Web Service method. Sets the System.Web.Services.Protocols.SoapException.Actor property.

SoapHeaderException

Example Syntax:

ToString

[C#] public SoapHeaderException(string message, XmlQualifiedName code, string actor, Exception innerException);

[C++] public: SoapHeaderException(String* message, XmlQualifiedName* code, String* actor, Exception* innerException);

[VB] Public Sub New(ByVal message As String, ByVal code As XmlQualifiedName, ByVal actor As String, ByVal innerException As Exception)

[JScript] public function SoapHeaderException(message: String, code: XmlQualifiedName, actor: String, innerException: Exception);

Description

Initializes a new instance of the System.Web.Services.Protocols.SoapHeaderException class. A message that identifies the reason the exception occurred. Sets the System.Exception.Message property. The type of error that occurred. Sets the System.Web.Services.Protocols.SoapException.Code property. The piece of code that caused the exception. Typically, a URL to a Web Service method. Sets the System.Web.Services.Protocols.SoapException.Actor property. A reference to the root cause of an exception. Sets the System.Exception.InnerException property.

SoapHeaderException

Example Syntax:

ToString

[C#] public SoapHeaderException(string message, XmlQualifiedName code, string actor, XmlNode[ ] otherElements);

[C++] public: SoapHeaderException(String* message, XmlQualifiedName* code, String* actor, XmlNode* otherElements[ ]);

[VB] Public Sub New(ByVal message As String, ByVal code As XmlQualifiedName, ByVal actor As String, ByVal otherElements( ) As XmlNode)

[JScript] public function SoapHeaderException(message: String, code: XmlQualifiedName, actor: String, otherElements: XmlNode[ ]);

Description

Initializes a new instance of the System.Web.Services.Protocols.SoapHeaderException class. A message that identifies the reason the exception occurred. Sets the System.Exception.Message property. The type of error that occurred. Sets the System.Web.Services.Protocols.SoapException.Code property. The piece of code that caused the exception. Typically, a URL to a Web Service method. Sets the System.Web.Services.Protocols.SoapException.Actor property. Optional exception information. Sets the System.Web.Services.Protocols.SoapException.OtherElements property.

SoapHeaderException

Example Syntax:

ToString

[C#] public SoapHeaderException(string message, XmlQualifiedName code, string actor, XmlNode[ ] otherElements, Exception innerException);

[C++] public: SoapHeaderException(String* message, XmlQualifiedName* code, String* actor, XmlNode* otherElements[ ], Exception* innerException);

[VB] Public Sub New(ByVal message As String, ByVal code As XmlQualifiedName, ByVal actor As String, ByVal otherElements( ) As XmlNode, ByVal innerException As Exception)

[JScript] public function SoapHeaderException(message: String, code: XmlQualifiedName, actor: String, otherElements: XmlNode[ ], innerException: Exception);

Description

Initializes a new instance of the System.Web.Services.Protocols.SoapHeaderException class. A message that identifies the reason the exception occurred. Sets the System.Exception.Message property. The type of error that occurred. Sets the System.Web.Services.Protocols.SoapException.Code property. The piece of code that caused the exception. Typically, a URL to a Web Service method. Sets the System.Web.Services.Protocols.SoapException.Actor property. Optional exception information. Sets the System.Web.Services.Protocols.SoapException.OtherElements property. A reference to the root cause of an exception. Sets the System.Exception.InnerException property.

Actor

Code

Detail

HelpLink

HResult

InnerException

Message

OtherElements

Source

StackTrace

TargetSite

SoapHttpClientProtocol class (System.Web.Services.Protocols)

ToString

Description

Specifies the class ASP.NET Web Service client proxies derive from when using Simple Object Access Protocol (SOAP).

ASP.NET incorporates two distinct Web Services functionalities: Building ASP.NET Web Services and Building Web Services clients. If you are building a Web Service client using ASP.NET, then a proxy class deriving indirectly or directly from System.Web.Services.Protocols.WebClientProtocol needs to be created for the Web Service you want to call. When the Web Service client is calling via SOAP, the proxy class should derive from System.Web.Services.Protocols.SoapHttpClientProtocol, which derives from System.Web.Services.Protocols.HttpWebClientProtocol.

SoapHttpClientProtocol

Example Syntax:

ToString

[C#] public SoapHttpClientProtocol( );

[C++] public: SoapHttpClientProtocol( );

[VB] Public Sub New( )

[JScript] public function SoapHttpClientProtocol( );

Description

Initializes a new instance of the System.Web.Services.Protocols.SoapHttpClientProtocol class.

AllowAutoRedirect

ClientCertificates

ConnectionGroupName

Container

CookieContainer
Credentials
DesignMode
Events
PreAuthenticate
Proxy
RequestEncoding
Site
Timeout
Url
UserAgent
BeginInvoke

[C#] protected IAsyncResult BeginInvoke(string methodName, object[ ] parameters, AsyncCallback callback, object asyncState);

[C++] protected: IAsyncResult* BeginInvoke(String* methodName, Object* parameters _gc[ ], AsyncCallback* callback, Object* asyncState);

[VB] Protected Function BeginInvoke(ByVal methodName As String, ByVal parameters( ) As Object, ByVal callback As AsyncCallback, ByVal asyncState As Object) As IAsyncResult

[JScript] protected function BeginInvoke(methodName: String, parameters Object[ ], callback: AsyncCallback, asyncState: Object): IAsyncResult;

Description

Starts an asynchronous invocation of a Web Service method using Simple Object Access Protocol(SOAP).

Return Value: An System.IAsyncResult which is passed to System.Web.Services.Protocols. SoapHttpClientProtocol.EndInvoke(System.IAsyncResult) to obtain the return values from the remote method call.

Typically, you would not call the System.Web.Services.Protocols.SoapHttpClientProtocol.BeginInvoke(System. String,System.Object[ ] ,System.AsyncCallback,System.Object) method directly, unless you were building your own proxy class for a Web Service. The name of the Web Service method in the derived class that is invoking System. Web.Services.Protocols.SoapHttpClientProtocol.BeginInvoke(System.String,System. Object[ ] ,System.AsyncCallback,System.Object). An array of objects containing the parameters to pass to the remote web service. The order of the values in the array correspond to the order of the parameters in the calling method of the derived class. The delegate to call when the asynchronous invoke is complete. If callback is null, the delegate is not called. Extra information supplied by the caller.

Discover

[C#] public void Discover( );

[C++] public: void Discover( );

[VB] Public Sub Discover( )

[JScript] public function Discover( );

Description

Dynamically binds to a Web Service described in the discovery document at System.Web.Services.Protocols.WebClientProtocol.Url.

A Web Service client can dynamically bind to a Web Service other than the one referenced in the proxy class using the System.Web.Services.Protocols. SoapHttpClientProtocol.Discover method. Typically, the System.Web.Services.Protocols.WebClientProtocol.Url property refers to the base address of the Web Service, however prior to invoking the System.Web.Services.Protocols. SoapHttpClientProtocol.Discover method, set the System. Web.Services.Protocols.WebClientProtocol.Url property to a URL of a discovery document. Invoking the System.Web. Services.Protocols.SoapHttpClientProtocol.Discover method attempts to find a match in the discovery document to the binding defined in the proxy class and then dynamically bind to it. If successful, future method invocations are directed to the Web Service described in the discovery document.

EndInvoke

[C#] protected object[ ] EndInvoke(IAsyncResult asyncResult);

[C++] protected: Object* EndInvoke(IAsyncResult* asyncResult) _gc[ ];

[VB] Protected Function EndInvoke(ByVal asyncResult As IAsyncResult) As Object( )

[JScript] protected function EndInvoke(asyncResult: IAsyncResult): Object[ ];

Description

Ends an asynchronous invocation of a Web Service method using Simple Object Access Protocol(SOAP).

Return Value: An array of objects containing the return value and any by-reference or out parameters of the derived class method.

Typically, you would not call the System.Web.Services.Protocols.SoapHttpClientProtocol.EndInvoke(System.IAsyncResult) method directly, unless you were building your own proxy class for a Web Service. The System.IAsyncResult returned from System.Web.Services.Protocols. SoapHttpClientProtocol.BeginInvoke(System.String,System.Object[ ] , System.AsyncCallback,System.Object).

GetWebRequest

[C#] protected override WebRequest GetWebRequest(Uri uri);

[C++] protected: WebRequest* GetWebRequest(Uri* uri);

[VB] Overrides Protected Function GetWebRequest(ByVal uri As Uri) As WebRequest

[JScript] protected override function GetWebRequest(uri: Uri): WebRequest;

Description

Creates a System.Net.WebRequest instance for the specified url.

Return Value: The System.Net.WebRequest instance.

This method can be overridden to customize the System. Net.WebRequest object before the Web Service request is made. For example you could add a custom header to the request. The System.Uri to use when creating the System. Net.WebRequest.

Invoke

[C#] protected object[ ] Invoke(string methodName, object[ ] parameters);

[C++] protected: Object* Invoke(String* methodName, Object* parameters _gc[ ]) _gc[ ];

[VB] Protected Function Invoke(ByVal methodName As String, ByVal parameters( ) As Object) As Object( )

[JScript] protected function Invoke(methodName: String, parameters: Object[ ]) Object[ ];

Description

Invokes a Web Service method synchronously using SOAP.

Return Value: An array of objects containing the return value and any by reference or out parameters of the derived class method.

Typically, you would not call the System.Web.Services.Protocols.SoapHttpClientProtocol.Invoke(System.String, System.Object[ ]) method directly, unless you were building your own proxy class for a Web Service. The name of the Web Service method. An array of objects containing the parameters to pass to the remote web service. The order of the values in the array correspond to the order of the parameters in the calling method of the derived class.

SoapMessage class (System.Web.Services.Protocols)

ToString

Description

Represents the data in a SOAP request or SOAP response at a specific System.Web.Services.Protocols. SoapMessageStage.

The System.Web.Services.Protocols.SoapMessage class is primary used for SOAP extensions to represent the data in a SOAP request or SOAP response at the System.Web.Services.Protocols.SoapMessageStage in the System.Web.Services.Protocols.SoapMessage.Stage property. A SOAP extension, which is a class deriving from System.Web.Services.Protocols.SoapExtension, receives a System.Web.Services.Protocols.SoapMessage at each System.Web.Services.Protocols.SoapMessageStage when the System.Web.Services.Protocols. SoapExtension.ProcessMessage(System.Web.Services.Protocols.SoapMessage) method is called. It is up to the particular SOAP extension to decide how to process the System.Web.Services.Protocols. SoapMessage, but a couple of common SOAP extensions might include encryption and compression.

Action

ToString

[C#] public abstract string Action {get;}

[C++] public: _property virtual String* get_Action( )=0;

[VB] MustOverride Public ReadOnly Property Action As String

[JScript] public abstract function get Action( ): String;

Description

When overridden in a derived class, gets the SOAPAction HTTP request header field for the SOAP request or SOAP response.

The System.Web.Services.Protocols. SoapMessage.Action property can be accessed during any System.Web.Services.Protocols.SoapMessageStage.

ContentType

ToString

[C#] public string ContentType {get; set;}

[C++] public: _property String* get ContentType( );
public: _property void set_ContentType(String*);

[VB] Public Property ContentType As String

[JScript] public function get ContentType( ): String;public function set ContentType(String);

Description

Gets or sets the HTTP Content-Type of the SOAP request or SOAP response.

The System.Web.Services.Protocols. SoapMessage.ContentType property can only be accessed in the System.Web.Services.Protocols. SoapMessageStage.BeforeSerialize and System.Web.Services.Protocols. SoapMessageStage.BeforeDeserialize stages; otherwise an System.InvalidOperationException is thrown.

Exception

ToString

[C#] public SoapException Exception {get;}

[C++] public: _property SoapException* get_Exception( );

[VB] Public ReadOnly Property Exception As SoapException

[JScript] public function get Exception( ): SoapException;

Description

Gets the System.Web.Services.Protocols.SoapException from the call to the Web Service method.

The System.Web.Services.Protocols. SoapMessage.Exception property can be accessed during any System.Web.Services.Protocols.SoapMessageStage Headers ToString

[C#] public SoapHeaderCollection Headers {get;}

[C++] public: _property SoapHeaderCollection* get_Headers( );

[VB] Public ReadOnly Property Headers As SoapHeaderCollection

[JScript] public function get Headers( ): SoapHeaderCollection;

Description

A collection of the SOAP headers applied to the current SOAP request or SOAP response.

SOAP headers are an optional portion of a SOAP request or SOAP response. For more details on using SOAP headers in ASP.NET Web Services and ASP.NET clients, see the System.Web.Services.Protocols.SoapHeader class.

MethodInfo

ToString

[C#] public abstract LogicalMethodInfo MethodInfo {get;}

[C++] public: _property virtual LogicalMethodInfo* get_MethodInfo( )=0;

[VB] MustOverride Public ReadOnly Property MethodInfo As LogicalMethodInfo

[JScript] public abstract function get MethodInfo( ): LogicalMethodInfo;

Description

When overridden in a derived class, gets a representation of the method prototype for the Web Service method for which the SOAP request is intended.

Although the System.Web.Services.Protocols. SoapMessage.MethodInfo can be accessed during any System.Web.Services.Protocols.SoapMessageStage, it only has data during System.Web.Services.Protocols. SoapMessageStage.AfterDeserialize and System.Web.Services.Protocols.SoapMessageStage.BeforeSerialize.

OneWay

ToString

[C#] public abstract bool OneWay {get;}

[C++] public: _property virtual bool get_OneWay( )=0;

[VB] MustOverride Public ReadOnly Property OneWay As Boolean

[JScript] public abstract function get OneWay( ): Boolean;

Description

Gets a value indicating the System.Web.Services.Protocols.SoapDocumentMethodAttribute.OneWay property of either the System.Web.Services.Protocols. SoapDocumentMethodAttribute or System.Web.Services.Protocols. SoapRpcMethodAttribute applied to the Web Service method.

See the System.Web.Services.Protocols. SoapDocumentMethodAttribute.OneWay property of System.Web.Services.Protocols.SoapDocumentMethodAttribute or System.Web.Services.Protocols.SoapRpcMethodAttribute for details about one-way Web Service methods.

Stage

ToString

[C#] public SoapMessageStage Stage {get;}

[C++] public: _property SoapMessageStage get_Stage( );

[VB] Public ReadOnly Property Stage As SoapMessageStage

[JScript] public function get Stage( ): SoapMessageStage;

Description

Gets the System.Web.Services.Protocols. SoapMessageStage of the System.Web.Services.Protocols. SoapMessage.

The System.Web.Services.Protocols.SoapMessage.Stage property can be accessed at any System.Web.Services.Protocols.SoapMessageStage.

Stream

ToString

[C#] public Stream Stream {get;}

[C++] public: _property Stream* get_Stream( );

[VB] Public ReadOnly Property Stream As Stream

[JScript] public function get Stream( ): Stream;

Description

Gets the data representing the SOAP request or SOAP response in the form of a System.IO.Stream object.

SOAP extensions that inspect the data representing a SOAP request or SOAP response, such as a logging SOAP extension, can use the System.IO.Stream property to view the data at each System.Web.Services.Protocols. SoapMessageStage.

Url

ToString

[C#] public abstract string Url {get;}

[C++] public: _property virtual String* get Url( )=0;

[VB] MustOverride Public ReadOnly Property Url As String

[JScript] public abstract function get Url( ): String;

Description

When overridden in a derived class, gets the base URL of the Web Service.

The System.Web.Services.Protocols.SoapMessage.Url property can be accessed during any System.Web.Services.Protocols.SoapMessageStage.

EnsureInStage

[C#] protected abstract void EnsureInStage( );

[C++] protected: virtual void EnsureInStage( )=0;

[VB] MustOverride Protected Sub EnsureInStage( )

[JScript] protected abstract function EnsureInStage( );

Description

When overridden in a derived class, asserts that the current System.Web.Services.Protocols.SoapMessageStage stage is a stage where in parameters are available.

The asserted stage is different for Web Service clients and Web Service methods. A Web Service method's in parameters are available after the SOAP request is deserialized in the System.Web.Services.Protocols. SoapMessageStage.AfterDeserialize stage. For a Web Service client, the in parameters are available prior to the SOAP request serialization process in the System.Web.Services.Protocols. SoapMessageStage. BeforeSerialize stage.

EnsureOutStage

[C#] protected abstract void EnsureOutStage( );

[C++] protected: virtual void EnsureOutStage( )=0;

[VB] MustOverride Protected Sub EnsureOutStage( )

[JScript] protected abstract function EnsureOutStage( );

Description

When overridden in a derived class, asserts that the current System.Web.Services.Protocols.SoapMessageStage stage is a stage where out parameters are available.

The asserted stage is different for Web Service clients and Web Service methods. A Web Service method's out parameters are available prior to the SOAP response serialization process in the System.Web.Services.Protocols.SoapMessageStage.BeforeSerialize stage. For a Web Service client, the out parameters are available after the SOAP response deserialization process in the System.Web.Services.Protocols.SoapMessageStage.AfterDeserialize stage.

EnsureStage

[C#] protected void EnsureStage(SoapMessageStage stage);

[C++] protected: void EnsureStage(SoapMessageStage stage);

[VB] Protected Sub EnsureStage(ByVal stage As SoapMessageStage)

[JScript] protected function EnsureStage(stage: SoapMessageStage);

Description

Ensures that the System.Web.Services.Protocols. SoapMessageStage of the call to the Web Service method is the stage or stages passed in. If the current processing stage is not one of the stages passed in, an exception is thrown.

Multiple stages can be asserted by performing a bitwise OR operation on multiple System.Web.Services.Protocols. SoapMessageStage stages. The System.Web.Services.Protocols.SoapMessageStage asserted.

GetInParameterValue

[C#] public object GetInParameterValue(int index);

[C++] public: Object* GetInParameterValue(int index);

[VB] Public Function GetInParameterValue(ByVal index As Integer) As Object

[JScript] public function GetInParameterValue(index: int): Object;

Description

Gets the parameter passed into the Web Service method at the specified index.

Return Value: An System.Object representing the parameter at index in the array of parameters.

The System.Web.Services.Protocols. SoapMessage.GetInParameterValue(System.I nt32) property is only accessible when in parameters are available. ASP.NET Web Services throws System.InvalidOperationException when accessing the System.Web.Services.Protocols.SoapMessage.GetInParameterValue(System.I nt32) property if in parameters are not available. The zero-based index of the parameter in the array of parameters.

GetOutParameterValue

[C#] public object GetOutParameterValue(int index);

[C++] public: Object* GetOutParameterValue(int index);

[VB] Public Function GetOutParameterValue(ByVal index As Integer) As Object

[JScript] public function GetOutParameterValue(index: int): Object;

Description

Gets the out parameter passed into the Web Service method at the specified index.

Return Value: An System.Object representing the parameter at index in the array of parameters.

The System.Web.Services.Protocols. SoapMessage.GetInParameterValue(System.Int32) property is only accessible when out parameters are available. ASP.NET Web Services throws System.InvalidOperationException when accessing the System.Web.Services.Protocols. SoapMessage.GetOutParameterValue(System.Int32) property if out parameters are not available. The zero-based index of the parameter in the array of parameters.

GetReturnValue

[C#] public object GetReturnValue( );

[C++] public: Object* GetReturnValue( );

[VB] Public Function GetReturnValue( ) As Object

[JScript] public function GetReturnValue( ): Object;

Description

Gets the return value of a Web Service method.

Return Value: An System.Object representing the return value of the Web Service method.

The System.Web.Services.Protocols. SoapMessage.GetReturnValue property is only accessible when a return value is available. ASP.NET Web Services throws System.InvalidOperationException when accessing the System.Web.Services.Protocols.SoapMessage.GetReturnValue property and the return value is not available.

SoapMessageStage enumeration (System.Web.Services.Protocols)

ToString

Description

Specifies the processing stage of a SOAP message.

ASP.NET Web Services provides an extensibility mechanism for calling Web Services using SOAP. The extensibility mechanism revolves around a System.Web.Services.Protocols.SoapExtension that is allowed to inspect or modify a message at specific stages in message processing on either the client or the server. This enum specifies the processing stage of a System.Web.Services.Protocols.SoapMessage.

ToString

[C#] public const SoapMessageStage AfterDeserialize;

[C++] public: const SoapMessageStage AfterDeserialize;

[VB] Public Const AfterDeserialize As SoapMessageStage

[JScript] public var AfterDeserialize: SoapMessageStage;

Description

The stage just after a System.Web.Services.Protocols. SoapMessage is deserialized from a SOAP message into a object.

ToString

[C#] public const SoapMessageStage AfterSerialize;

[C++] public: const SoapMessageStage AfterSerialize;

[VB] Public Const AfterSerialize As SoapMessageStage

[JScript] public var AfterSerialize: SoapMessageStage;

Description

The stage just after a System.Web.Services.Protocols. SoapMessage is serialized, but before the SOAP message is sent over the wire.

ToString

[C#] public const SoapMessageStage BeforeDeserialize;

[C++] public: const SoapMessageStage BeforeDeserialize;

[VB] Public Const BeforeDeserialize As SoapMessageStage

[JScript] public var BeforeDeserialize: SoapMessageStage;

Description

The stage just before a System.Web.Services.Protocols.SoapMessage is deserialized from the SOAP message sent across the network into a object.

ToString

[C#] public const SoapMessageStage BeforeSerialize;

[C++] public: const SoapMessageStage BeforeSerialize;

[VB] Public Const BeforeSerialize As SoapMessageStage

[JScript] public var BeforeSerialize: SoapMessageStage;

Description

The stage just prior to a System.Web.Services.Protocols. SoapMessage being serialized.

SoapParameterStyle enumeration (System.Web.Services.Protocols)

ToString

Description

Specifies how parameters are encoded in the XML portion of a SOAP message.

System.Web.Services.Protocols.SoapParameterStyle can be set when applying a System.Web.Services.Protocols. SoapDocumentMethodAttribute or System.Web.Services.Protocols.SoapDocumentServiceAttribute attribute to a Web Service method or a method of a client proxy class and the class implementing a Web Service respectively.

ToString

[C#] public const SoapParameterStyle Bare;

[C++] public: const SoapParameterStyle Bare;

[VB] Public Const Bare As SoapParameterStyle

[JScript] public var Bare: SoapParameterStyle;

Description

Specifies the Web Service method parameters are elements directly beneath the Body element of the XML portion of a SOAP request or SOAP response.

ToString

[C#] public const SoapParameterStyle Default;

[C++] public: const SoapParameterStyle Default;

[VB] Public Const Default As SoapParameterStyle

[JScript] public var Default: SoapParameterStyle;

Description

Specifies using the default SoapParameterStyle for the Web Service. The default can for a Web Service by applying a SoapDocumentServiceAttribute to the class implementing the Web Service. If a System.Web.Services.Protocols. SoapDocumentServiceAttribute is not applied to the class implementing the Web Service the default is System.Web. Services.Protocols.SoapParameterStyle.Wrapped.

ToString

[C#] public const SoapParameterStyle Wrapped;

[C++] public: const SoapParameterStyle Wrapped;

[VB] Public Const Wrapped As SoapParameterStyle

[JScript] public var Wrapped: SoapParameterStyle;

Description

Specifies the Web Service method parameters are wrapped within a single element beneath the Body element of the XML portion of a SOAP request or SOAP response.

SoapRpcMethodAttribute class (System.Web.Services.Protocols)

ToString

Description

Applying the optional System.Web.Services.Protocols. SoapRpcMethodAttribute to a Web Service method alters the format of the SOAP request or response sent to and from a Web Service method.

Web Services Description Language (WSDL) defines two styles for how a Web Service method, which it calls an operation, can be encoded in a SOAP request or a SOAP response: RPC and Document. The RPC style refers to encoding the Web Service method according to the SOAP specification for using SOAP for RPC; otherwise known as Section 7 of the SOAP specification. This style states that all parameters are wrapped within a single element named after the Web Service method and that each element within that element represent a parameter named after their respective parameter name.

SoapRpcMethodAttribute

Example Syntax:

ToString

[C#] public SoapRpcMethodAttribute( );

[C++] public: SoapRpcMethodAttribute( );

[VB] Public Sub New( )

[JScript] public function SoapRpcMethodAttribute( ); Initializes a new instance of the System.Web.Services.Protocols.SoapRpcMethodAttribute class.

Description

Initializes a new instance of the System.Web.Services.Protocols.SoapRpcMethodAttribute class setting all properties to their defaults.

SoapRpcMethodAttribute

Example Syntax:

ToString

[C#] public SoapRpcMethodAttribute(string action);

[C++] public: SoapRpcMethodAttribute(String* action);

[VB] Public Sub New(ByVal action As String)

[JScript] public function SoapRpcMethodAttribute(action: String);

Description

Initializes a new instance of the System.Web.Services.Protocols.SoapRpcMethodAttribute class setting the System.Web.Services.Protocols.SoapRpcMethodAttribute.Action property to action. The intent of the SOAP request. Sets the System.Web.Services.Protocols. SoapRpcMethodAttribute.Action property.

Action

ToString

[C#] public string Action {get; set;}

[C++] public: _property String* get_Action( );public: _property void set_Action(String*);

[VB] Public Property Action As String

[JScript] public function get Action( ): String;public function set Action(String);

Description

Gets or sets the intent of the SOAP request.

The System.Web.Services.Protocols.SoapRpcMethodAttribute.Action property forms the SOAPAction HTTP Header Field for the HTTP Request.

Binding

ToString

[C#] public string Binding {get; set;}

[C++] public: _property String* get_Binding( );public: _property void set_Binding(String*);

[VB] Public Property Binding As String

[JScript] public function get Binding( ): String;public function set Binding(String);

Description

Gets or sets the binding a Web Service method is implementing a operation for.

A binding, as defined by Web Services Description Language(WSDL), is similar to an interface, in that it defines a concrete set of operations. With respect to ASP.NET Web Services, each Web Service method is an operation within a binding. Web Service methods are members of either the default binding for a Web Service or in a binding specified within a System.Web.Services.WebServiceBindingAttribute applied to a Web Service. A Web Service can implement multiple bindings, by applying multiple System.Web.Services.WebServiceBindingAttribute attributes to a Web Service.

OneWay

ToString

[C#] public bool OneWay {get; set;}

[C++] public: _property bool get_OneWay( );public: _property void set_OneWay(bool);

[VB] Public Property OneWay As Boolean

[JScript] public function get OneWay( ): Boolean;public function set OneWay(Boolean);

Description

Gets or sets whether a Web Service client waits for the Web server to finish processing a Web Service method.

When a Web Service method sets the System.Web.Services.Protocols.SoapRpcMethodAttribute.OneWay property to true, the Web Service client does not have to wait for the Web server to finish processing the Web Service method. As soon as the Web server has deserialized the System.Web.Services.Protocols.SoapServerMessage, but before invoking the Web Service method, the server returns an HTTP 202 status code. A HTTP 202 status code indicates to the client that the Web server has started processing of the message. Therefore, a Web Service client receives no acknowledgment that the Web server successfully processed the message.

RequestElementName

ToString

[C#] public string RequestElementName {get; set;}

[C++] public: _property String* get_RequestElementName( );public: _property void set_RequestElementName(String*);

[VB] Public Property RequestElementName As String

[JScript] public function get RequestElementName( ): String;public function set RequestElementName(String);

Description

Gets or sets the XML element associated with the SOAP request for a Web Service method.

The System.Web.Services.Protocols. SoapRpcMethodAttribute.RequestElementName defines the XML element used to wrap the parameters beneath the Body element of the SOAP request.

RequestNamespace

ToString

[C#] public string RequestNamespace {get; set;}

[C++] public: _property String* get_RequestNamespace( );public: _property void set_RequestNamespace(String*);

[VB] Public Property RequestNamespace As String

[JScript] public function get RequestNamespace( ): String;public function set RequestNamespace(String);

Description

Gets or sets the XML namespace associated with the SOAP request for a Web Service method.

ResponseElementName

ToString

[C#] public string ResponseElementName {get; set;}

[C++] public: _property String* get_ResponseElementName( );public: _property void set_ResponseElementName(String*);

[VB] Public Property ResponseElementName As String

[JScript] public function get ResponseElementName( ): String;public function set ResponseElementName(String);

Description

Gets or sets the XML element associated with the SOAP response for a Web Service method.

The System.Web.Services.Protocols. SoapRpcMethodAttribute.ResponseElement Name defines the XML element used to wrap the parameters beneath the Body element of the SOAP response.

ResponseNamespace

ToString

[C#] public string ResponseNamespace {get; set;}

[C++] public: _property String* get_ResponseNamespace( );public: _property void set_ResponseNamespace(String*);

[VB] Public Property ResponseNamespace As String

[JScript] public function get ResponseNamespace( ): String; public function set ResponseNamespace(String);

Description

Gets or sets the XML namespace associated with the SOAP response for a Web Service method.

The System.Web.Services.Protocols. SoapRpcMethodAttribute.ResponseNamespace property is used in the XSD schema for the Web Service method in its Service Description.

TypeId

SoapRpcServiceAttribute class (System.Web.Services.Protocols)

ToString

Description

Applying the optional System.Web.Services.Protocols. SoapRpcServiceAttribute to a Web Service sets the default format of SOAP requests and responses sent to and from Web Service methods within the Web Service.

The System.Web.Services.Protocols. SoapRpcServiceAttribute allows you to set the default encoding styles for Web Service methods within a Web Service to use RPC method encoding and System.Web.Services.Description. SoapBindingUse.Encoded parameter encoding.

SoapRpcServiceAttribute

Example Syntax:

ToString

[C#] public SoapRpcServiceAttribute( );

[C++] public: SoapRpcServiceAttribute( );

[VB] Public Sub New( )

[JScript] public function SoapRpcServiceAttribute( );

Description

Initializes a new instance of the System.Web.Services.Protocols.SoapRpcServiceAttribute class.

RoutingStyle

ToString

[C#] public SoapServiceRoutingStyle RoutingStyle {get; set;}

[C++] public: _property SoapServiceRoutingStyle get_RoutingStyle( );public: _property void set_RoutingStyle (SoapServiceRoutingStyle);

[VB] Public Property RoutingStyle As SoapServiceRoutingStyle

[JScript] public function get RoutingStyle( ): SoapServiceRoutingStyle;public function set RoutingStyle(SoapServiceRoutingStyle);

Description

TypeId

SoapServerMessage class (System.Web.Services.Protocols)

ToString

Description

Represents the data in a SOAP request received or a SOAP response sent by a Web Service method at a specific System. Web.Services.Protocols.SoapMessageStage.

Action

ToString

[C#] public override string Action {get;}

[C++] public: _property virtual String* get_Action( );

[VB] Overrides Public ReadOnly Property Action As String

[JScript] public function get Action( ): String;

Description

Gets the SOAPAction HTTP request header field for the SOAP request or SOAP response.

The System.Web.Services.Protocols. SoapServerMessage.Action property can be accessed during any System. Web.Services.Protocols.SoapMessageStage.

ContentType

Exception

Headers

MethodInfo

ToString

Description

Gets a representation of the method prototype for the Web Service method for which the SOAP request is intended.

Although the System.Web.Services.Protocols. SoapServerMessage.MethodInfo property can be accessed during any stage, the method information is only available during System.Web.Services.Protocols. SoapMessageStage.AfterDeserialize and System.Web.Services.Protocols. SoapMessageStage.BeforeSerialize.

OneWay

ToString

[C#] public override bool OneWay {get;}

[C++] public: _property virtual bool get_OneWay( );

[VB] Overrides Public ReadOnly Property OneWay As Boolean

[JScript] public function get OneWay( ): Boolean;

Description

Gets a value indicating whether the client waits for the server to finish processing a Web Service method.

A System.Web.Services.Protocols. SoapDocumentMethodAttribute or System.Web.Services.Protocols. SoapRpcMethodAttribute applied to a Web Service method or Web Service client can specify whether the Web Service method is one way or not by setting the System. Web.Services.Protocols.SoapDocumentMethodAttribute.OneWay property of the attribute.

Server

ToString

[C#] public object Server {get;}

[C++] public: _property Object* get_Server( );

[VB] Public ReadOnly Property Server As Object

[JScript] public function get Server( ): Object;

Description

Gets the instance of the class handling the method invocation on the Web server System.Web.Services.Protocols. SoapMessageStage is not System.Web.Services.Protocols. SoapMessageStage.AfterDeserialize or System.Web.Services.Protocols. SoapMessageStage.BeforeSerialize.

The System.Web.Services.Protocols. SoapServerMessage.Server property is an instance of the class implementing the Web Service. If a SOAP extension knew ahead of time the type of the class, it could cast System.Web.Services.Protocols.SoapServerMessage.Server to that type and access properties and methods of the class implementing the Web Service.

Stage

Stream

Url

ToString

Description

Gets the base url of the Web Service.

The System.Web.Services.Protocols.SoapServerMessage.Url property can be accessed during any System.Web.Services.Protocols.SoapMessageStage EnsureInStage

[C#] protected override void EnsureInStage( );

[C++] protected: void EnsureInStage( );

[VB] Overrides Protected Sub EnsureInStage( )
[JScript] protected override function EnsureInStage( );

Description

Asserts that the current System.Web.Services.Protocols.SoapMessageStage stage is a stage where in parameters are available. If not, an exception is thrown. For Web Service methods, the in parameters are available after the SOAP request in the deserialization process in the System.Web.Services.Protocols.SoapMessageStage.AfterDeserialize stage. The System.InvalidOperationException is thrown if System.Web.Services.Protocols.SoapServerMessage.EnsureInStage method is invoked in any other System.Web.Services.Protocols.SoapMessageStage.

EnsureOutStage
[C#] protected override void EnsureOutStage( );
[C++] protected: void EnsureOutStage( );
[VB] Overrides Protected Sub EnsureOutStage( )
[JScript] protected override function EnsureOutStage( );

Description

Asserts that the current System.Web.Services.Protocols.SoapMessageStage stage is a stage where out parameters are available. If not, an exception is thrown.

For Web Service methods, the out parameters are available prior to the SOAP response serialization process in the System.Web.Services.Protocols.SoapMessageStage.BeforeSerialize stage. The System.InvalidOperationException is thrown if System.Web.Services.Protocols. SoapServerMessage.EnsureOutStage method is invoked in any other System.Web.Services.Protocols. SoapMessageStage.

SoapServiceRoutingStyle enumeration (System.Web.Services.Protocols)
ToString
ToString
ToString
SoapUnknownHeader class (System.Web.Services.Protocols)
ToString Description Represents the data received from a SOAP header that was not understood by the recipient Web Service or Web Service client. This class cannot be inherited.

A SOAP client may invoke a Web Service with additional data beyond just the required parameters in the form of a SOAP header. An ASP.NET Web Service or Web Service client can view any SOAP headers it did not know about at the time the Web Service was written by applying a System.Web.Services.Protocols.SoapHeaderAttribute with a System.Web.Services.Protocols.SoapHeaderAttribute.MemberName property of either an array of System.Web.Services.Protocols.SoapHeader, System.Web.Services.Protocols.SoapHeader, System.Web.Services.Protocols.SoapUnknownHeader or an array of System.Web.Services.Protocols. SoapUnknownHeader to the Web Service method. Specifiying a System.Type of System.Web.Services.Protocols. SoapUnknownHeader, allows the Web Service to view the contents of the SOAP header and attempt to understand the semantics of the SOAP header, in the form of an System.Xml.XmlElement.

SoapUnknownHeader
Example Syntax:
ToString
[C#] public SoapUnknownHeader( );
[C++] public: SoapUnknownHeader( );
[VB] Public Sub New( )
[JScript] public function SoapUnknownHeader( );
Actor
DidUnderstand
Element
ToString Description Gets or sets the XML Header element for a SOAP request or response.

If a Web Service method wants to process SOAP headers it doesn't know about at the time the Web Service is written, a Web Service method can process an System.Xml.XmlElement class representing the raw XML of the SOAP header.

EncodedMustUnderstand
MustUnderstand
TextReturnReader class (System.Web.Services.Protocols)
ToString Description TextReturnReader
Example Syntax:
ToString
[C#] public TextReturnReader( );
[C++] public: TextReturnReader( );
[VB] Public Sub New( )
[JScript] public function TextReturnReader( );
GetInitializer
[C#] public override object GetInitializer(LogicalMethodInfo methodInfo);
[C++] public: Object* GetInitializer(LogicalMethodInfo* methodInfo);
[VB] Overrides Public Function GetInitializer(ByVal methodInfo As LogicalMethodInfo) As Object
[JScript] public override function GetInitializer(methodInfo: LogicalMethodInfo): Object;

Description

Initialize
[C#] public override void Initialize(object o);
[C++] public: void Initialize(Object* o);
[VB] Overrides Public Sub Initialize(ByVal o As Object)
[JScript] public override function Initialize(o: Object);

Description

Read
[C#] public override object Read(WebResponse response, Stream responseStream);
[C++] public: Object* Read(WebResponse* response, Stream* responseStream);
[VB] Overrides Public Function Read(ByVal response As WebResponse, ByVal responseStream As Stream) As Object
[JScript] public override function Read(response: WebResponse, responseStream Stream): Object;

Description

UrlEncodedParameterWriter class (System.Web.Services.Protocols)
ToString

Description

UrlEncodedParameterWriter
Example Syntax:
ToString
[C#] protected UrlEncodedParameterWriter( );
[C++] protected: UrlEncodedParameterWriter( );
[VB] Protected Sub New( )
[JScript] protected function UrlEncodedParameterWriter( );
RequestEncoding
ToString

[C#] public override Encoding RequestEncoding {get; set;}

[C++] public: _property virtual Encoding* get_RequestEncoding( );public: _property virtual void set_RequestEncoding(Encoding*);

[VB] Overrides Public Property RequestEncoding As Encoding

[JScript] public function get RequestEncoding( ): Encoding; public function set RequestEncoding(Encoding);

Description

UsesWriteRequest

Encode

[C#] protected void Encode(TextWriter writer, object[ ] values);

[C++] protected: void Encode(TextWriter* writer, Object* values _gc[ ])

[VB] Protected Sub Encode(ByVal writer As TextWriter, ByVal values( ) As Object)

[JScript] protected function Encode(writer: TextWriter, values: Object[ ]);

Description

Encode

[C#] protected void Encode(TextWriter writer, string name, object value);

[C++] protected: void Encode(TextWriter* writer, String* name, Object* value);

[VB] Protected Sub Encode(ByVal writer As TextWriter, ByVal name As String, ByVal value As Object)

[JScript] protected function Encode(writer: TextWriter, name: String, value: Object);

Description

GetInitializer

[C#] public override object GetInitializer(LogicalMethodInfo methodInfo);

[C++] public: Object* GetInitializer(LogicalMethodInfo* methodInfo);

[VB] Overrides Public Function GetInitializer(ByVal methodInfo As LogicalMethodInfo) As Object

[JScript] public override function GetInitializer(methodInfo: LogicalMethodInfo): Object;

Description

Initialize

[C#] public override void Initialize(object initializer);

[C++] public: void Initialize(Object* initializer);

[VB] Overrides Public Sub Initialize(ByVal initializer As Object)

[JScript] public override function Initialize(initializer: Object);

Description

UrlParameterReader class (System.Web.Services.Protocols)

WriteRequest

Description

UrlParameterReader

Example Syntax:

WriteRequest

[C#] public UrlParameterReader( );

[C++] public: UrlParameterReader( );

[VB] Public Sub New( )

[JScript] public function UrlParameterReader( );

Read

[C#] public override object[ ] Read(HttpRequest request);

[C++] public: Object* Read(HttpRequest* request) _gc[ ];

[VB] Overrides Public Function Read(ByVal request As HttpRequest) As Object( )

[JScript] public override function Read(request: HttpRequest): Object[ ];

Description

UrlParameterWriter class (System.Web.Services.Protocols)

ToString

Description

UrlParameterWriter

Example Syntax:

ToString

[C#] public UrlParameterWriter( );

[C++] public: UrlParameterWriter( );

[VB] Public Sub New( )

[JScript] public function UrlParameterWriter( );

RequestEncoding

UsesWriteRequest

GetRequestUrl

[C#] public override string GetRequestUrl(string url, object[ ] parameters);

[C++] public: String* GetRequestUrl(String* url, Object* parameters _gc[ ]);

[VB] Overrides Public Function GetRequestUrl(ByVal url As String, ByVal parameters( ) As Object) As String

[JScript] public override function GetRequestUrl(url: String, parameters: Object[ ]): String;

Description

ValueCollectionParameterReader class (System.Web.Services.Protocols)

WriteRequest

Description

ValueCollectionParameterReader

Example Syntax:

WriteRequest

[C#] protected ValueCollectionParameterReader( );

[C++] protected: ValueCollectionParameterReader( );

[VB] Protected Sub New( )

[JScript] protected function ValueCollectionParameterReader( );

GetInitializer

[C#] public override object GetInitializer(LogicalMethodInfo methodInfo);

[C++] public: Object* GetInitializer(LogicalMethodInfo* methodInfo);

[VB] Overrides Public Function GetInitializer(ByVal methodInfo As LogicalMethodInfo) As Object

[JScript] public override function GetInitializer(methodInfo: LogicalMethodInfo): Object;

Description

Initialize

[C#] public override void Initialize(object o);

[C++] public: void Initialize(Object* o);

[VB] Overrides Public Sub Initialize(ByVal o As Object)

[JScript] public override function Initialize(o: Object);

Description

IsSupported

[C#] public static bool IsSupported(LogicalMethodInfo methodInfo);

[C++] public: static bool IsSupported(LogicalMethodInfo* methodInfo);

[VB] Public Shared Function IsSupported(ByVal methodInfo As LogicalMethodInfo) As Boolean

[JScript] public static function IsSupported(methodInfo: LogicalMethodInfo): Boolean;

Description

IsSupported

[C#] public static bool IsSupported(ParameterInfo paramInfo);

[C++] public: static bool IsSupported(ParameterInfo* paramInfo);

[VB] Public Shared Function IsSupported(ByVal paramInfo As ParameterInfo) As Boolean

[JScript] public static function IsSupported(paramInfo: ParameterInfo): Boolean;

Description

Read

[C#] protected object[ ] Read(NameValueCollection collection);

[C++] protected: Object* Read(NameValueCollection* collection) _gc[ ]

[VB] Protected Function Read(ByVal collection As NameValueCollection) As Object( )

[JScript] protected function Read(collection: NameValueCollection): Object[ ];

Description

WebClientAsyncResult class (System.Web.Services.Protocols)

ToString

Description

AsyncState

ToString

[C#] public object AsyncState {get;}

[C++] public: _property Object* get AsyncState( );

[VB] Public ReadOnly Property AsyncState As Object

[JScript] public function get AsyncState( ): Object;

Description

AsyncWaitHandle

ToString

[C#] public WaitHandle AsyncWaitHandle {get;}

[C++] public: _property WaitHandle* get AsyncWait Handle( );

[VB] Public ReadOnly Property AsyncWaitHandle As WaitHandle

[JScript] public function get AsyncWaitHandle( ): WaitHandle;

Description

CompletedSynchronously

ToString

[C#] public bool CompletedSynchronously {get;}

[C++] public: _property bool get_Completed Synchronously( );

[VB] Public ReadOnly Property CompletedSynchronously As Boolean

[JScript] public function get CompletedSynchronously( ): Boolean;

Description

Gets a value indicating whether the invocation of the Web Service method completed synchronously.

IsCompleted

ToString

[C#] public bool IsCompleted {get;}

[C++] public: _property bool get IsCompleted( );

[VB] Public ReadOnly Property IsCompleted As Boolean

[JScript] public function get IsCompleted( ): Boolean;

Description

Gets a value indicating whether the asynchronous request has completed.

Abort

[C#] public void Abort( );

[C++] public: void Abort( );

[VB] Public Sub Abort( )

[JScript] public function Abort( );

Description

WebClientProtocol class (System.Web.Services.Protocols)

ToString

Description

Specifies the base class for all ASP.NET Web Service client proxies.

ASP.NET incorporates two distinct functionalities of Web Services: building ASP.NET Web Services and building Web Service clients. If you are building a Web Service client using ASP.NET, you must create a proxy class deriving indirectly or directly from System.Web.Services.Protocols.WebClientProtocol for the Web Service you want to call.

WebClientProtocol

Example Syntax:

ToString

[C#] protected WebClientProtocol( );

[C++] protected: WebClientProtocol( );

[VB] Protected Sub New( )

[JScript] protected function WebClientProtocol( );

Description

Initializes a new instance of the System.Web.Services.Protocols.WebClientProtocol class.

ConnectionGroupName

ToString

[C#] public string ConnectionGroupName {get; set;}

[C++] public: _property String* get_ConnectionGroupName( );public: _property void set_ConnectionGroupName(String*);

[VB] Public Property ConnectionGroupName As String

[JScript] public function get ConnectionGroupName( ): String;public function set ConnectionGroupName (String);

Description

Gets or sets the name of the connection group for the request.

The System.Web.Services.Protocols.WebClientProtocol.ConnectionGroupName property enables you to associate a request to a connection group. For more details, see System.Net.HttpWebRequest.ConnectionGroupName.

Container

Credentials

ToString

Description

Gets or sets security credentials for Web Service client authentication.

When using the Credentials property, a Web Service client must instantiate a class implementing System.Net.ICredentials, such as System.Net.NetworkCredential, and then set the client credentials specific to the authentication mechanism. The System.Net.NetworkCredential class can be used to set authentication credentials using the basic, digest, NTLM and Kerberos authentication mechanisms.

DesignMode

Events

PreAuthenticate

ToString

Description

Gets or sets whether pre-authentication is enabled.

When System.Web.Services.Protocols.WebClientProtocol.PreAuthenticate is true, the WWW-authenticate header is sent with each request back to the server, otherwise standard authentication procedures are used. When System.Web.Services.Protocols.WebClientProtocol.PreAuthenticate is false, the authentication headers are sent only on the first request.

RequestEncoding

ToString

[C#] public Encoding RequestEncoding {get; set;}

[C++] public: _property Encoding* get_Request Encoding( );public: _property void set_RequestEncoding (Encoding*);

[VB] Public Property RequestEncoding As Encoding

[JScript] public function get RequestEncoding( ): Encoding; public function set RequestEncoding(Encoding);

Description

The System.Text.Encoding used to make the client request to the Web Service.

The System.Web.Services.Protocols.WebClientProtocol.RequestEncoding determines the encoding for the request message. The System.Net.WebRequest.ContentType of the request will be annotated with the encoding value.

Site

Timeout

ToString

Description

Indicates the time a Web Service client waits for a synchronous Web Service request to complete (in milliseconds).

Even though a Web Service client can set the System.Web.Services.Protocols.WebClientProtocol.Timeout property to infinity with a value of −1, the Web Server can still cause the request to time out on the server side.

Url

ToString

[C#] public string Url {get; set;}

[C++] public: _property String* get_Url( );public: _property void set_Url(String*);

[VB] Public Property Url As String

[JScript] public function get Url( ): String;public function set Url(String);

Description

Gets or sets the base URL of the Web Service the client is requesting.

Proxy classes generated using Wsdl.exe will set a default System.Web.Services.Protocols.WebClientProtocol.Url property for the client to use. The default System.Web.Services.Protocols.WebClientProtocol.Url is determined by the location attribute found in the Service Description from which the proxy class was generated.

Abort

[C#] public virtual void Abort( );

[C++] public: virtual void Abort( );

[VB] Overridable Public Sub Abort( )

[JScript] public function Abort( );

Description

Cancels a request to a Internet resource.

Return Value: System.Web.Services.Protocols.WebClientProtocol.Abort cancels a reqeust to a resource made using the System.Web.Services.Protocols.WebClientProtocol.GetWebRequest(System.Uri) method. After the request is canceled, invoking System.Web.Services.Protocols.WebClientProtocol.GetWebResponse(System.Net.WebRequest) will cause a System.Net.WebException.

AddToCache

[C#] protected static void AddToCache(Type type, object value);

[C++] protected: static void AddToCache(Type* type, Object* value);

[VB] Protected Shared Sub AddToCache(ByVal type As Type, ByVal value As Object)

[JScript] protected static function AddToCache(type: Type, value: Object);

Description

Add an instance of the client protocol handler to the cache.

GetFromCache

[C#] protected static object GetFromCache(Type type);

[C++] protected: static Object* GetFromCache(Type* type);

[VB] Protected Shared Function GetFromCache(ByVal type As Type) As Object

[JScript] protected static function GetFromCache(type: Type): Object;

Description

Gets an instance of a client protocol handler from the cache.

GetWebRequest

[C#] protected virtual WebRequest GetWebRequest(Uri uri);

[C++] protected: virtual WebRequest* GetWebRequest(Uri* uri);

[VB] Overridable Protected Function GetWebRequest(ByVal uri As Uri) As WebRequest

[JScript] protected function GetWebRequest(uri: Uri): WebRequest;

Description

Creates a System.Net.WebRequest instance for the specified url.

Return Value: The System.Net.WebRequest instance.

This method can be overridden to customize the System.Net.WebRequest object before the Web Service request is made. For example you could add a custom header to the request. The System.Uri to use when creating the System.Net.WebRequest.

GetWebResponse

[C#] protected virtual WebResponse GetWebResponse(WebRequest request);

[C++] protected: virtual WebResponse* GetWebResponse (WebRequest* request);

[VB] Overridable Protected Function GetWebResponse(ByVal request As WebRequest) As WebResponse

[JScript] protected function GetWebResponse(request: WebRequest): WebResponse; Returns a response from a request to a Web Service method.

Description

Returns a response from a synchronous request to a Web Service method.

Return Value: A System.Net.WebResponse. The System.Net.WebRequest to get the response from.

GetWebResponse

[C#] protected virtual WebResponse GetWebResponse(WebRequest request, IAsyncResult result);

[C++] protected: virtual WebResponse* GetWebResponse (WebRequest* request, IAsyncResult* result);

[VB] Overridable Protected Function GetWebResponse(ByVal request As WebRequest, ByVal result As IAsyncResult) As WebResponse

[JScript] protected function GetWebResponse(request: WebRequest, result: IAsyncResult): WebResponse;

Description

Returns a response from an asynchronous request to a Web Service method.

Return Value: The System.Net.WebResponse instance. The System.Net.WebRequest to get the response from. The System.IAsyncResult to pass to System.Net.HttpWebRequest.EndGetResponse(System.IAsyncResult). when the response has completed.

WebServiceHandlerFactory class (System.Web.Services.Protocols)

ToString

Description

WebServiceHandlerFactory

Example Syntax:

ToString

[C#] public WebServiceHandlerFactory( );

[C++] public: WebServiceHandlerFactory( );

[VB] Public Sub New( )

[JScript] public function WebServiceHandlerFactory( );

GetHandler

[C#] public IHttpHandler GetHandler(HttpContext context, string verb, string url, string filePath);

[C++] public: _sealed IHttpHandler* GetHandler(HttpContext* context, String* verb, String* url, String* filePath);

[VB] NotOverridable Public Function GetHandler(ByVal context As HttpContext, ByVal verb As String, ByVal url As String, ByVal filePath As String) As IHttpHandler

[JScript] public function GetHandler(context: HttpContext, verb: String, url: String, filePath: String): IHttpHandler;

Description

ReleaseHandler

[C#] public void ReleaseHandler(IHttpHandler handler);

[C++] public: _sealed void ReleaseHandler(IHttpHandler* handler);

[VB] NotOverridable Public Sub ReleaseHandler(ByVal handler As IHttpHandler)

[JScript] public function ReleaseHandler(handler: IHttpHandler);

Description

XmlReturnReader class (System.Web.Services.Protocols)

ToString

Description

XmlReturnReader

Example Syntax:

ToString

[C#] public XmlReturnReader( );

[C++] public: XmlReturnReader( );

[VB] Public Sub New( )

[JScript] public function XmlReturnReader( );

GetInitializer

[C#] public override object GetInitializer(LogicalMethodInfo methodInfo);

[C++] public: Object* GetInitializer(LogicalMethodInfo* methodInfo);

[VB] Overrides Public Function GetInitializer(ByVal methodInfo As LogicalMethodInfo) As Object

[JScript] public override function GetInitializer(methodInfo: LogicalMethodInfo) Object;

Description

GetInitializers

[C#] public override object[ ] GetInitializers(LogicalMethodInfo[ ] methodInfos);

[C++] public: Object* GetInitializers(LogicalMethodInfo* methodInfos[ ]) _gc[ ];

[VB] Overrides Public Function GetInitializers(ByVal methodInfos( ) As LogicalMethodInfo) As Object( )

[JScript] public override function GetInitializers(methodInfos: LogicalMethodInfo[ ]): Object[ ];

Description

Initialize

[C#] public override void Initialize(object o);

[C++] public: void Initialize(Object* o);

[VB] Overrides Public Sub Initialize(ByVal o As Object)

[JScript] public override function Initialize(o: Object);

Description

Read

[C#] public override object Read(WebResponse response, Stream responseStream);

System.Web.SessionState

Description

HttpSessionState class (System.Web.SessionState)

Description

Provides access to session state values as well as session-level settings and lifetime management methods.

Properties:

CodePage

[C#] public int CodePage {get; set;}

[C++] public: _property int get_CodePage( );public: _property void set_CodePage(int);

[VB] Public Property CodePage As Integer

[JScript] public function get_CodePage( ): int;public function set CodePage(int);

Description

Gets or sets the code page identifier for the current session.

Contents

[C#] public HttpSessionState Contents {get;}

[C++] public: property HttpSessionState* get_Contents( );

[VB] Public ReadOnly Property Contents As HttpSessionState

[JScript] public function get Contents( ): HttpSessionState;

Description

Gets a reference to the current session state object.

Contents is provided for legacy ASP compatibility.

Count

[C#] public int Count {get;}

[C++] public: _property int get_Count( );

[VB] Public ReadOnly Property Count As Integer

[JScript] public function get Count( ): int;

Description

Gets the number of items in the session state collection.

IsCookieless

[C#] public bool IsCookieless {get;}

[C++] public: property bool get IsCookieless( );

[VB] Public ReadOnly Property IsCookieless As Boolean

[JScript] public function get IsCookieless( ): Boolean;

Description

Gets a value indicating whether the session is managed using cookieless session.

IsNewSession

[C#] public bool IsNewSession {get;}

[C++] public: _property bool get_IsNewSession( );

[VB] Public ReadOnly Property IsNewSession As Boolean

[JScript] public function get IsNewSession( ): Boolean;

Description

Gets a value indicating whether the session has been created with the current request.

IsReadOnly

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the session is read-only.

IsSynchronized

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether access to the collection of session state values is read-only (thread-safe).

Item

[C#] public object this[string name] {get; set;}

[C++] public: _property Object* get_Item(String* name); public: _property void set_Item(String* name, Object*);

[VB] Public Default Property Item(ByVal name As String) As Object

[JScript] returnValue=HttpSessionStateObject.Item(name); HttpSessionStateObject.Item(name)=returnValue; Gets or sets individual session values.

Description

Gets or sets a session value by name. The key name of the session value.

Item

[C#] public object this[int index] {get; set;}

[C++] public: _property Object* get_Item(int index); public: _property void set_Item(int index, Object*);

[VB] Public Default Property Item(ByVal index As Integer) As Object

[JScript] returnValue=HttpSessionStateObject.Item(index); HttpSessionStateObject.Item(index)=returnValue;

Description

Gets or sets a session value by numerical index. The numerical index of the session value.

Keys

[C#] public NameObjectCollectionBase.KeysCollection Keys {get;}

[C++] public: _property NameObjectCollectionBase.KeysCollection* get_Keys( );

[VB] Public ReadOnly Property Keys As NameObjectCollectionBase.KeysCollection

[JScript] public function get Keys( ): NameObjectCollectionBase.KeysCollection;

Description

Gets a collection of all session keys.

LCID

[C#] public int LCID {get; set;}

[C++] public: _property int get_LCID( );public: _property void set_LCID(int);

[VB] Public Property LCID As Integer

[JScript] public function get LCID( ): int;public function set LCID(int);

Description

Gets or sets the locale identifier (LCID) of the current session.

Mode

[C#] public SessionStateMode Mode {get;}

[C++] public: _property SessionStateMode get_Mode( );

[VB] Public ReadOnly Property Mode As SessionStateMode

[JScript] public function get Mode( ): SessionStateMode;

Description

Gets the current session state mode.

SessionID

[C#] public string SessionID {get;}

[C++] public: _property String* get_SessionID( );

[VB] Public ReadOnly Property SessionID As String

[JScript] public function get SessionID( ): String;

Description

Gets the unique session ID used to identify a session.

StaticObjects

[C#] public HttpStaticObjectsCollection StaticObjects {get;}

[C++] public: _property HttpStaticObjectsCollection* get_StaticObjects( );

[VB] Public ReadOnly Property StaticObjects As HttpStaticObjectsCollection

[JScript] public function get StaticObjects( ): HttpStaticObjectsCollection;

Description

Gets a collection of objects declared by

System.Web.UI

Description

The System.Web.UI namespace provides classes and interfaces that allow you to create controls and pages that will appear in your Web applications as user interface on a Web page. This namespace includes the Control class, which provides all controls, whether HTML, Web, or User controls, with a common set of functionality. It also includes the Page control, which is generated automatically whenever a request is made for a page in your Web application. Also provided are classes which provide the Web Forms Server Controls data binding functionality, the ability to save the view state of a given control or page, as well as parsing functionality for both programmable and literal controls.

AttributeCollection class (System.Web.UI)

Description

Provides object-model access to all attributes declared in the opening tag of an ASP.NET server control element. This class cannot be inherited.

Attributes are case-insensitive strings. They return a System.String object as their value. If there are no attributes in the collection, they return null.

Constructors:

AttributeCollection

Example Syntax:

[C#] public AttributeCollection(StateBag bag);

[C++] public: AttributeCollection(StateBag* bag);

[VB] Public Sub New(ByVal bag As StateBag)

[JScript] public function AttributeCollection(bag: StateBag);

Description

Initializes a new instance of the System.Web.UI.AttributeCollection class. A System.Web.UI.StateBag object that contains the attribute keys and their values that are in the opening tag of the server control.

Properties:

Count

[C#] public int Count {get;}

[C++] public: _property int get_Count( );

[VB] Public ReadOnly Property Count As Integer

[JScript] public function get Count( ): int;

Description

Gets the number of attributes in the System.Web.UI.AttributeCollection object.

CssStyle

[C#] public CssStyleCollection CssStyle {get;}

[C++] public: _property CssStyleCollection* get_CssStyle( );

[VB] Public ReadOnly Property CssStyle As CssStyleCollection

[JScript] public function get CssStyle( ): CssStyleCollection;

Description

Gets a collection of styles for the ASP.NET server control to which the current System.Web.UI.AttributeCollection object belongs.

Any style declared for a particular HTML server control is added to the CssStyleCollection object when the containing Web Forms page is parsed. You can use this property to add, remove and iterate through the styles declared for the server control.

Item

[C#] public string this[string key] {get; set;}

[C++] public: _property String* get_Item(String* key);public: _property void set_Item(String* key, String*);

[VB] Public Default Property Item(ByVal key As String) As String

[JScript] returnValue=AttributeCollectionObject.Item(key); AttributeCollectionObject.Item(key)=returnValue;

Description

Gets or sets a specified attribute value for a server control. The location of the attribute within the collection.

Keys

[C#] public ICollection Keys {get;}

[C++] public: _property ICollection* get_Keys( );

[VB] Public ReadOnly Property Keys As ICollection

[JScript] public function get Keys( ): ICollection;

Description

Gets a collection of keys to all attributes in the server control's System.Web.UI.AttributeCollection object.

Methods:

Add

[C#] public void Add(string key, string value);

[C++] public: void Add(String* key, String* value);

[VB] Public Sub Add(ByVal key As String, ByVal value As String)

[JScript] public function Add(key: String, value: String);

Description

Adds an attribute to a server contol's System.Web.UI.AttributeCollection object. The index assigned to the new attribute in the collection. The attribute to store in the collection.

AddAttributes

[C#] public void AddAttributes(HtmlTextWriter writer);

[C++] public: void AddAttributes(HtmlTextWriter* writer);

[VB] Public Sub AddAttributes(ByVal writer As HtmlTextWriter)

[JScript] public function AddAttributes(writer: HtmlTextWriter);

Description

Adds attributes from the AttributeCollection class to the System.Web.UI.HtmlTextWriter object that is responsible for rendering the attributes as HTML to an ASP.NET server control.

This method copies all of the server control's attributes to an System.Web.UI.HtmlTextWriter object so they can be rendered by the next call to the System.Web.UI.HtmlTextWriter.RenderBeginTag(System.String) method. An System.Web.UI.HtmlTextWriter that writes the added attribute to the opening tag of an ASP.NET server control.

Clear

[C#] public void Clear( );

[C++] public: void Clear( );

[VB] Public Sub Clear( )

[JScript] public function Clear( );

Description

Removes all attributes from a server control's System.Web.UI.AttributeCollection object.

Remove

[C#] public void Remove(string key);

[C++] public: void Remove(String* key);

[VB] Public Sub Remove(ByVal key As String)

[JScript] public function Remove(key: String);

Description

Removes an attribute from a server control's System.Web.UI.AttributeCollection object. The index of the attribute to remove.

Render

[C#] public void Render(HtmlTextWriter writer);

[C++] public: void Render(HtmlTextWriter* writer);

[VB] Public Sub Render(ByVal writer As HtmlTextWriter)

[JScript] public function Render(writer: HtmlTextWriter);

Description

Writes the collection of attributes to the specified System.Web.UI.HtmlTextWriter output stream. In turn, the output stream writes the collection to the Web Forms page. An System.Web.UI.HtmlTextWriter object that writes the attribute collection to the opening HTML tag.

AutomaticHandlerMethodInfos class (System.Web.UI)

ToString

Description

AutomaticHandlerMethodInfos

Example Syntax:

ToString

[C#] public AutomaticHandlerMethodInfos( );

[C++] public: AutomaticHandlerMethodInfos( );

[VB] Public Sub New( )

[JScript] public function AutomaticHandlerMethodInfos( );

BaseParser class (System.Web.UI)

ToString

Description

Provides a base set of functionality for all parsers involved in parsing ASP.NET page requests. This includes parsing of all ASP.NET server controls, including pages and user controls.

BaseParser

Example Syntax:

ToString

[C#] public BaseParser( );

[C++] public: BaseParser( );

[VB] Public Sub New( )

[JScript] public function BaseParser( );

BasePartialCachingControl class (System.Web.UI)

ToString

Description

Provides a base set of functionality for the System.Web.UI.StaticPartialCachingControl and the System.Web.UI.PartialCachingControl classes.

BasePartialCachingControl

Example Syntax:

ToString

[C#] protected BasePartialCachingControl( );

[C++] protected: BasePartialCachingControl( );

[VB] Protected Sub New( )

[JScript] protected function BasePartialCachingControl( );

ChildControlsCreated

ClientID

Context

Controls

Dependency

ToString

Description

Gets or sets an instance of the System.Web.Caching.CacheDependency class associated with the cached server control output.

EnableViewState

Events

HasChildViewState

ID

IsTrackingViewState

NamingContainer

Page

Parent

Site

TemplateSourceDirectory

UniqueID

ViewState

ViewStateIgnoresCase

Visible

Dispose

[C#] public override void Dispose( );

[C++] public: void Dispose( );

[VB] Overrides Public Sub Dispose( )

[JScript] public override function Dispose( );

Description

OnInit

[C#] protected override void OnInit(EventArgs e);

[C++] protected: void OnInit(EventArgs* e);

[VB] Overrides Protected Sub OnInit(ByVal e As EventArgs)

[JScript] protected override function OnInit(e: EventArgs);

Description

Raises the Init event for the server control to be output cached.

This method checks the cache for the content associated with the server control. If it is not there, the server control is created and added to the parent control's System.Web.UI.ControlCollection object. An System.EventArgs object that contains the event data.

Render

[C#] protected override void Render(HtmlTextWriter output);

[C++] protected: void Render(HtmlTextWriter* output);

[VB] Overrides Protected Sub Render(ByVal output As HtmlTextWriter)

[JScript] protected override function Render(output: HtmlTextWriter);

Description

Outputs the server control's content to the System.Web.UI.HtmlTextWriter output stream. The System.Web.UI.HtmlTextWriter object that writes the cached control to the page.

BuildMethod delegate (System.Web.UI)

TrackViewState

Description

Represents the method that is used to build a System.Web.UI.Control.

This delegate passes the information necessary to build ASP.NET server controls as defined by the TemplateControl class, or one of the classes that inherit from TemplateControl, Page and UserControl.

BuildTemplateMethod delegate (System.Web.UI)

TrackViewState

Description

CompiledTemplateBuilder class (System.Web.UI)

TrackViewState

Description

CompiledTemplateBuilder

Example Syntax:

TrackViewState

[C#] public CompiledTemplateBuilder(BuildTemplateMethod buildTemplateMethod);

[C++] public: CompiledTemplateBuilder(BuildTemplateMethod* buildTemplateMethod);

[VB] Public Sub New(ByVal buildTemplateMethod As BuildTemplateMethod)

[JScript] public function CompiledTemplateBuilder(buildTemplateMethod: BuildTemplateMethod);

Description

InstantiateIn

[C#] public void InstantiateIn(Control container);

[C++] public: _sealed void InstantiateIn(Control* container);

[VB] NotOverridable Public Sub InstantiateIn(ByVal container As Control)

[JScript] public function InstantiateIn(container: Control);

Description

ConstructorNeedsTagAttribute class (System.Web.UI)

ToString

Description

Specifies that a server control needs a tag name in its constructor.

ConstructorNeedsTagAttribute

Example Syntax:

ToString

[C#] public ConstructorNeedsTagAttribute( );

[C++] public: ConstirictorNeedsTagAttribute( );

[VB] Public Sub New( )

[JScript] public function ConstructorNeedsTagAttribute( );

Initializes a new instance of the System.Web.UI.ConstructorNeedsTagAttribute class.

Description

Initializes a new instance of the System.Web.UI.ConstructorNeedsTagAttribute class.

ConstructorNeedsTagAttribute

Example Syntax:

ToString

[C#] public ConstructorNeedsTagAttribute(bool needsTag);

[C++] public: ConstructorNeedsTagAttribute(bool needsTag);

[VB] Public Sub New(ByVal needsTag As Boolean)

[JScript] public function ConstructorNeedsTagAttribute (needsTag: Boolean);

Description

Initializes a new instance of the System.Web.UI.ConstructorNeedsTagAttribute class. true to add a tag to a control; otherwise, false.

NeedsTag

ToString

[C#] public bool NeedsTag {get;}

[C++] public: _property bool get_NeedsTag( );

[VB] Public ReadOnly Property NeedsTag As Boolean

[JScript] public function get NeedsTag( ): Boolean;

Description

Indicates whether a control needs a tag in its contstructor. This property is read-only.

TypeId

Control class (System.Web.UI)

ToString

Description

Defines the properties, methods, and events that are shared by all ASP.NET server controls.

This is the primary class that you derive from when you develop custom ASP.NET server controls.

Control

Example Syntax:

ToString

[C#] public Control( );

[C++] public: Control( );

[VB] Public Sub New( )

[JScript] public function Control( );

Description

Initializes a new instance of the System.Web.UI.Control class.

ChildControlsCreated

ToString

[C#] protected bool ChildControlsCreated {get; set;}

[C++] protected: _property bool get_ChildControlsCreated( );protected: _property void set_ChildControlsCreated(bool);

[VB] Protected Property ChildControlsCreated As Boolean

[JScript] protected function get ChildControlsCreated( ): Boolean;protected function set ChildControlsCreated (Boolean);

Description

Gets a value that indicates whether the server control's child controls have been created.

ClientID

ToString

[C#] public virtual string ClientID {get;}

[C++] public: _property virtual String* get_ClientID( );

[VB] Overridable Public ReadOnly Property ClientID As String

[JScript] public function get ClientID( ): String;

Description

Gets the server control identifier generated by ASP.NET.

ASP.NET automatically generates a ClientID for a server control regardless of whether you have specified an ID property for it or not. A ClilentID is assigned to all System.Web.UI.LiteralControl objects (text and HTML that is not processed on the server) on a page when it is requested. You can view the ClientID s of each control in a page's control hierarchy by enabling tracing for the page or application. The format for automatically generated ClientID s is Ctrl0 for the first control on a page, Ctrl1 for the next control, Ctrl2 for the third control, and so on until all controls for the page are given a ClientID value.

Context

ToString

[C#] protected virtual HttpContext Context {get;}

[C++] protected: _property virtual HttpContext* get_Context( );

[VB] Overridable Protected ReadOnly Property Context As HttpContext

[JScript] protected function get Context( ): HttpContext;

Description

Gets the System.Web.HttpContext object associated with the server control for the current Web request.

This property gives you access to the Context object for the current Web request. The object provides properties that access the Application, Session, Request, Response, and other objects that contain information about the current HTTP request. It also provides methods that allow you to obtain configuration information and set or clear errors for the request.

Controls

ToString

[C#] public virtual ControlCollection Controls {get;}

[C++] public: _property virtual ControlCollection* get_Controls( );

[VB] Overridable Public ReadOnly Property Controls As ControlCollection

[JScript] public function get Controls( ): ControlCollection;

Description

Gets a System.Web.UI.ControlCollection object that represents the child controls for a specified server control in the UI hierarchy.

On an ASP.NET page, when controls are added declaratively between the opening and closing tags of a server control, ASP.NET automatically adds the controls to the containing server control's System.Web.UI.ControlCollection. Any HTML tags or text strings that are not processed on the server are compiled into System.Web.UI.LiteralControl objects. These are added to the collection like other server controls.

EnableViewState

ToString

[C#] public virtual bool EnableViewState {get; set;}

[C++] public: _property virtual bool get_EnableViewState( );public: _property virtual void set_EnableViewState(bool);

[VB] Overridable Public Property EnableViewState As Boolean

[JScript] public function get EnableViewState( ): Boolean; public function set EnableViewState(Boolean);

Description

Gets or sets a value indicating whether the server control maintains its view state, and the view state of any child controls it contains, when the current page request ends.

You must enable view state for the server control to maintain its state across HTTP requests.

Events

ToString

[C#] protected EventHandlerList Events {get;}

[C++] protected: _property EventHandlerList* get_Events( );

[VB] Protected ReadOnly Property Events As EventHandlerList

[JScript] protected function get Events( ): EventHandlerList;

Description

Gets a list of event handler delegates for the control. This property is read-only.

This property is of type System.ComponentModel.EventHandlerList, which uses a linear search algorithm to find entries in the list of delegates. A linear search algorithm is inefficient when working with a large number of entries. Therefore, when you have a large list, finding entries with this property will be slow.

HasChildViewState

ToString

[C#] protected bool HasChildViewState {get;}

[C++] protected: _property bool get_HasChildViewState( );

[VB] Protected ReadOnly Property HasChildViewState As Boolean

[JScript] protected function get HasChildViewState( ): Boolean;

Description

Gets a value indicating whether the current server control's child controls have any saved view-state settings.

You can avoid unnecessary calls to the System.Web.UI.Control.ClearChildViewState method by using this property to verify that any child controls of the server control are storing view-state information.

ID

ToString

[C#] public virtual string ID {get; set;}

[C++] public: _property virtual String* get_ID( );public: _property virtual void set_ID(String*);

[VB] Overridable Public Property ID As String

[JScript] public function get ID( ): String;public function set ID(String);

Description

Gets or sets the programmatic identifier assigned to the server control.

Setting this property on a server control provides you with programmatic access to the server control's properties, events, and methods. This property can be set by Web developers by declaring an id attribute in the opening tag of an ASP.NET server control.

IsTrackingViewState

ToString

[C#] protected bool IsTrackingViewState {get;}

[C++] protected: _property bool get_IsTrackingViewState( );

[VB] Protected ReadOnly Property IsTrackingViewState As Boolean

[JScript] protected function get IsTrackingViewState( ): Boolean;

Description

Gets a value that indicates whether the server control is saving changes to its view state.

For a sample custom server control that uses this property, see.

NamingContainer

ToString

[C#] public virtual Control NamingContainer {get;}

[C++] public: _property virtual Control* get_NamingContainer( );

[VB] Overridable Public ReadOnly Property NamingContainer As Control

[JScript] public function get NamingContainer( ): Control;

Description

Gets a reference to the server control's naming container, which creates a unique namespace for differentiating between server controls with the same System.Web.UI.Control.ID property value.

Each page in an ASP.NET Web application contains a hierarchy of controls. This hierarchy is not dependent on whether a control generates UI visible to the user. The naming container for a given control is the parent control above it in the hierarchy that implements the INamingContainer interface. A server control that implements this interface creates a unique namespace for the ID property values of its child server controls.

Page

ToString

[C#] public virtual Page Page {get; set;}

[C++] public: _property virtual Page* get_Page( );public: _property virtual void set_Page(Page*);

[VB] Overridable Public Property Page As Page

[JScript] public function get Page( ): Page;public function set Page(Page);

Description

Gets a reference to the System.Web.UI.Page instance that contains the server control.

This property reflects the name of the .aspx file associated with the current Web request. In the control hierarchy, name of the page is _PAGE by default. It is assigned to a type defined by the name of the .aspx file.

Parent

ToString

[C#] public virtual Control Parent {get;}

[C++] public: _property virtual Control* get_Parent( );

[VB] Overridable Public ReadOnly Property Parent As Control

[JScript] public function get Parent( ): Control;

Description

Gets a reference to the server control's parent control in the page UI hierarchy.

Whenever a page is requested, a hierarchy of server controls on that page is built. This property allows you to determine the parent control of the current server control in that hierarchy, and to program against it.

Site

ToString

[C#] public ISite Site {get; set;}

[C++] public: _property ISite* get_Site( );public: _property void set_Site(ISite*);

[VB] Public Property Site As ISite

[JScript] public function get Site( ): ISite;public function set Site(ISite);

Description

Gets information about the Web site to which the server control belongs.

Sites bind a Component to a Container and enable communication between them. They also provide a way for the container to manage its components.

TemplateSourceDirectory

ToString

[C#] public virtual string TemplateSourceDirectory {get;}

[C++] public: _property virtual String* get_TemplateSourceDirectory( );

[VB] Overridable Public ReadOnly Property TemplateSourceDirectory As String

[JScript] public function get TemplateSourceDirectory( ): String;

Description

Gets the virtual directory of the System.Web.UI.Page or System.Web.UI.UserControl that contains the current server control.

UniqueID

ToString

[C#] public virtual string UniqueID {get;}

[C++] public: _property virtual String* get_UniqueID( );

[VB] Overridable Public ReadOnly Property UniqueID As String

[JScript] public function get UniqueID( ): String;

Description

Gets the unique, hierarchically-qualified identifier for the server control.

This property differs from the ID property, in that the UniqueID property includes the identifier for the server control's naming container. This identifier is generated automatically when a page request is processed.

ViewState

ToString

[C#] protected virtual StateBag ViewState {get;}

[C++] protected: _property virtual StateBag* get_View State( );

[VB] Overridable Protected ReadOnly Property ViewState As StateBag

[JScript] protected function get ViewState( ): StateBag;

Description

Gets a dictionary of state information that allows you to save and restore the view state of a server control across multiple requests for the same page.

A server control's view state is the accumulation of all its property values. In order to preserve these values across HTTP requests, ASP.NET server controls use this property, which is an instance of the StateBag class, to store the property values. The values are then passed as a variable to a hidden field when subsequent requests are processed. For more information about view state, see. For more information about saving server control view state, see.

ViewStateIgnoresCase

ToString

[C#] protected virtual bool ViewStateIgnoresCase {get;}

[C++] protected: _property virtual bool get_ViewStateIgnoresCase( );

[VB] Overridable Protected ReadOnly Property ViewStateIgnoresCase As Boolean

[JScript] protected function get ViewStateIgnoresCase( ): Boolean;

Description

Gets a value that indicates whether the System.Web.UI.StateBag object is case-insensitive.

Visible

ToString

[C#] public virtual bool Visible {get; set;}

[C++] public: _property virtual bool get_Visible( );public: _property virtual void set_Visible(bool);

[VB] Overridable Public Property Visible As Boolean

[JScript] public function get Visible( ): Boolean;public function set Visible(Boolean);

Description

Gets or sets a value that indicates whether a server control is rendered as UI on the page.

Server controls that are not visible take up no space on a Web Forms page when it is displayed.

ToString

[C#] public event EventHandler DataBinding;

[C++] public: _event EventHandler* DataBinding;

[VB] Public Event DataBinding As EventHandler

Description

Occurs when the server control binds to a data source.

This event notifies the server control to perform any data binding logic that has been written for it.

ToString

[C#] public event EventHandler Disposed;

[C++] public: _sealed _event EventHandler* Disposed;

[VB] NotOverridable Public Event Disposed As EventHandler

Description

Occurs when a server control is released from memory, which is the last stage of the server control lifecycle when an ASP.NET page is requested.

Resources that require significant processor time, such as database connections, should be released with this event.

ToString

[C#] public event EventHandler Init;

[C++] public: _event EventHandler* Init;

[VB] Public Event Init As EventHandler

Description

Occurs when the server control is initialized, which is the first step in the its lifecycle.

Server controls should perform any initialization steps that are required to create and set up an instance. You cannot use view-state information within this event; it is not populated yet. You should not access another server control during this event, regardless of whether it is a child or parent to this control. Other server controls are not certain to be created and ready for access.

ToString

[C#] public event EventHandler Load;

[C++] public: _event EventHandler* Load;

[VB] Public Event Load As EventHandler

Description

Occurs when the server control is loaded into the System.Web.UI.Page object.

Notifies the server control to perform any processing steps that are set to occur on each page request. You can use view state information with this event. You can also access other server controls within the page's control hierarchy.

ToString

[C#] public event EventHandler PreRender;

[C++] public: _event EventHandler* PreRender;

[VB] Public Event PreRender As EventHandler

Description

Occurs when the server control is about to render to its containing System.Web.UI.Page object.

Use this event to perform any updates before the output the server control is rendered to the page. Any changes in the view state of the server control can be saved during this event. Such changes made in the rendering phase will not be saved.

ToString

[C#] public event EventHandler Unload;

[C++] public: _event EventHandler* Unload;

[VB] Public Event Unload As EventHandler

Description

Occurs when the server control is unloaded from memory.

Server controls must perform any final clean-up, such as closing files, database connections and discarding objects, during this stage of the control lifecycle before the instance is unloaded.

AddedControl

[C#] protected internal virtual void AddedControl(Control control, int index);

[C++] protected public: virtual void AddedControl(Control* control, int index);

[VB] Overridable Protected Friend Dim Sub AddedControl (ByVal control As Control, ByVal index As Integer)

[JScript] package function AddedControl(control: Control, index: int);

Description

AddParsedSubObject

[C#] protected virtual void AddParsedSubObject(object obj);

[C++] protected: virtual void AddParsedSubObject(Object* obj);

[VB] Overridable Protected Sub AddParsedSubObject(ByVal obj As Object)

[JScript] protected function AddParsedSubObject(obj: Object);

Description

Notifies the server control that an element, either XML or HTML, was parsed, and adds the element to the server control's System.Web.UI.ControlCollection object.

Unless you override it, this method automatically adds System.Web.UI.LiteralControl objects to the server control's ControlCollection object. This collection is accessible through System.Web.UI.Control.Controls property. An System.Object that represents the parsed element.

BuildProfileTree

[C#] protected void BuildProfileTree(string parentId, bool calcViewState);

[C++] protected: void BuildProfileTree(String* parentId, bool calcViewState);

[VB] Protected Sub BuildProfileTree(ByVal parentId As String, ByVal calcViewState As Boolean)

[JScript] protected function BuildProfileTree(parentId: String, calcViewState: Boolean);

Description

Gathers information about the server control and delivers it to the System.Web.UI.Page.Trace property to be displayed when tracing is enabled for the page.

This property gathers the information necessary about a page's UI hierarchy and passes it to the page's Trace property. When you enable tracing, either for a page or for your application, this information is displayed in the Control Tree section of the trace output. Trace output for a page is appended to the end of the page; while trace output for an application can be viewed from the trace viewer (trace.axd file) which is stored in the application's root directory. For more information about tracing, see. The identifier of the control's parent. A Boolean that indicates whether the view-state size is calculated.

ClearChildViewState

[C#] protected void ClearChildViewState( );

[C++] protected: void ClearChildViewState( );

[VB] Protected Sub ClearChildViewState( )

[JScript] protected function ClearChildViewState( );

Description

Deletes the view-state information for all of the server control's child controls.

This method is commonly used when you override the System.Web.UI.Control.DataBind method when developing templated data-bound server controls. If you do not call this method, child control view-state information can be written to a parent server control, only to be overridden when data binding occurs.

CreateChildControls

[C#] protected virtual void CreateChildControls( );

[C++] protected: virtual void CreateChildControls( );

[VB] Overridable Protected Sub CreateChildControls( )

[JScript] protected function CreateChildControls( );

Description

Notifies server controls that use composition-based implementation to create any child controls they contain in preparation for posting back or rendering.

When you develop a composite or templated server control, you must override this method. For more information, see and.

CreateControlCollection

[C#] protected virtual ControlCollection CreateControlCollection( );

[C++] protected: virtual ControlCollection* CreateControlCollection( );

[VB] Overridable Protected Function CreateControlCollection( ) As ControlCollection

[JScript] protected function CreateControlCollection( ): ControlCollection;

Description

Creates a new System.Web.UI.ControlCollection object to hold the child controls (both literal and server) of the server control.

Return Value: A ControlCollection object that contains the current server control's child server controls.

DataBind

[C#] public virtual void DataBind( );

[C++] public: virtual void DataBind( );

[VB] Overridable Public Sub DataBind( )

[JScript] public function DataBind( );

Description

Binds a data source to the invoked server control and all of its child controls.

Use this method to bind data from a source to a server control. This method is commonly used after retrieving a data set through a database query.

Dispose

[C#] public virtual void Dispose( );

[C++] public: virtual void Dispose( );

[VB] Overridable Public Sub Dispose( )

[JScript] public function Dispose( );

Description

Enables a server control to perform final clean up before it is released from memory.

Call Dispose when you are finished using the System.Web.UI.Control. The Dispose method leaves the Control in an unusable state. After calling this method, you must release all references to the control so the memory it was occupying can be reclaimed by garbage collection.

EnsureChildControls

[C#] protected virtual void EnsureChildControls( );

[C++] protected: virtual void EnsureChildControls( );

[VB] Overridable Protected Sub EnsureChildControls( )

[JScript] protected function EnsureChildControls( );

Description

Checks if the server control contains child controls. If it does not, it creates child controls.

If the server control contains nothing but literal content or HTML that is parsed and compiled as a System.Web.UI.LiteralControl object, it adds that object to the server control's System.Web.UI.ControlCollection object. The instance of the LiteralControl then becomes a child of the server control.

FindControl

[C#] public virtual Control FindControl(string id);

[C++] public: virtual Control* FindControl(String* id);

[VB] Overridable Public Function FindControl(ByVal id As String) As Control

[JScript] public function FindControl(id: String): Control; Searches the current naming container for the specified server control.

Description

Searches the current naming container for a server control with the specified id parameter.

Return Value: The specified control, or 0 if the specified control does not exist. The identifier for the control to be found.

FindControl

[C#] protected virtual Control FindControl(string id, int pathOffset);

[C++] protected: virtual Control* FindControl(String* id, int pathOffset);

[VB] Overridable Protected Function FindControl(ByVal id As String, ByVal pathOffset As Integer) As Control

[JScript] protected function FindControl(id: String, pathOffset: int): Control;

Description

Searches the current naming container for a server control with the specified id and an integer, specified in the pathOffset parameter, that aids in the search.

Return Value: The specified control, or 0 if the specified control does not exist. The identifier for the control to be found. The number of controls up the page control hierarchy needed to reach a naming container.

HasControls

[C#] public virtual bool HasControls( );

[C++] public: virtual bool HasControls( );

[VB] Overridable Public Function HasControls( ) As Boolean

[JScript] public function HasControls( ): Boolean;

Description

Determines if the server control contains any child controls.

Return Value: true if the control contains other controls; otherwise, false.

Since this method simply determines if any child controls exist, it can enhance performance by allowing you to avoid an unnecessary call to the Count property on the server control's System.Web.UI.ControlCollection object. The ControlCollection is available on the control through the System.Web.UI.Control.Controls property.

IsLiteralContent

[C#] protected bool IsLiteralContent( );

[C++] protected: bool IsLiteralContent( );

[VB] Protected Function IsLiteralContent( ) As Boolean

[JScript] protected function IsLiteralContent( ): Boolean;

Description

Determines if the server control holds only literal content.

Return Value: true if the server control is comprised of literal content; otherwise false.

When this method returns true, the server control's collection holds a single literal control. The content is then passed to the requesting browser as HTML.

LoadViewState

[C#] protected virtual void LoadViewState(object savedState);

[C++] protected: virtual void LoadViewState(Object* savedState);

[VB] Overridable Protected Sub LoadViewState(ByVal savedState As Object)

[JScript] protected function LoadViewState(savedState: Object);

Description

Restores view-state information from a previous page request that was saved by the System.Web.UI.Control.SaveViewState method.

Override this method when you need to customize how a custom server control restores its view state. For more information, see. An System.Object that represents the control state to be restored.

MapPathSecure

[C#] protected string MapPathSecure(string virtualPath);

[C++] protected: String* MapPathSecure(String* virtualPath);

[VB] Protected Function MapPathSecure(ByVal virtualPath As String) As String

[JScript] protected function MapPathSecure(virtualPath: String): String;

Description

Retrieves a mapped physical file path relative to the source file, if the requesting server control has sufficient security permissions to read the mapped result.

Return Value: The physical path to the requested file.

This method can only be used by server controls that have permissions to read files and which are part of fully trusted .dll files, such as System.Web.dll. This helps prevent security breaches. A relative or root relative URL.

OnBubbleEvent

[C#] protected virtual bool OnBubbleEvent(object source, EventArgs args);

[C++] protected: virtual bool OnBubbleEvent(Object* source, EventArgs* args);

[VB] Overridable Protected Function OnBubbleEvent(ByVal source As Object, ByVal args As EventArgs) As Boolean

[JScript] protected function OnBubbleEvent(source: Object, args: EventArgs): Boolean;

Description

Determines whether the event for the server control is passed up the page's UI server control hierarchy.

Return Value: true if the event has been cancelled; otherwise, false. The default is false.

ASP.NET server controls such as the System.Web.UI.WebControls.Repeater, System.Web.UI.WebControls.DataList and System.Web.UI.WebControls.DataGrid Web controls can contain child controls that raise events. For example, each row in a DataGrid control can contain one or more buttons created dynamically by templates. The source of the event. An System.EventArgs object that contains the event data.

OnDataBinding

[C#] protected virtual void OnDataBinding(EventArgs e);

[C++] protected: virtual void OnDataBinding(EventArgs* e);

[VB] Overridable Protected Sub OnDataBinding(ByVal e As EventArgs)

[JScript] protected function OnDataBinding(e: EventArgs);

Description

Raises the DataBinding event.

This method notifies a server control to perform any data binding logic that is associated with it. An EventArgs object that contains the event data.

OnInit

[C#] protected virtual void OnInit(EventArgs e);

[C+] protected: virtual void OnInit(EventArgs* e);

[VB] Overridable Protected Sub OnInit(ByVal e As EventArgs)

[JScript] protected function OnInit(e: EventArgs);

Description

Raises the Init event.

When notified by this method, server controls must perform any initialization steps that are required to create and set up an instance. In this stage of the server control's lifecycle, the control's view state has yet to be populated. Additionally, you can not access other server controls when this method is called either, regardless of whether it is a child or parent to this control. Other server controls are not certain to be created and ready for access. An System.EventArgs object that contains the event data.

OnLoad

[C#] protected virtual void OnLoad(EventArgs e);

[C++] protected: virtual void OnLoad(EventArgs* e);

[VB] Overridable Protected Sub OnLoad(ByVal e As EventArgs)

[JScript] protected function OnLoad(e: EventArgs);

Description

Raises the Load event.

This method notifies the server control that it should perform actions common to each HTTP request for the page it is associated with, such as setting up a database query. At this stage in the page lifecycle, server controls in the hierarchy are created and initialized, view state is restored, and form controls reflect client-side data. The System.EventArgs object that contains the event data.

OnPreRender

[C#] protected virtual void OnPreRender(EventArgs e);

[C++] protected: virtual void OnPreRender(EventArgs* e);

[VB] Overridable Protected Sub OnPreRender(ByVal e As EventArgs)

[JScript] protected function OnPreRender(e: EventArgs);

Description

Raises the System.Web.UI.Control.PreRender event, which notifies the server control that This method notifies the server control to perform any necessary prerendering steps prior to saving view state and rendering content. An System.EventArgs object that contains the event data.

OnUnload

[C#] protected virtual void OnUnload(EventArgs e);

[C++] protected: virtual void OnUnload(EventArgs* e);

[VB] Overridable Protected Sub OnUnload(ByVal e As EventArgs)

[JScript] protected function OnUnload(e: EventArgs);

Description

Raises the Unload event. An System.EventArgs object that contains event data.

RaiseBubbleEvent

[C#] protected void RaiseBubbleEvent(object source, EventArgs args);

[C++] protected: void RaiseBubbleEvent(Object* source, EventArgs* args);

[VB] Protected Sub RaiseBubbleEvent(ByVal source As Object, ByVal args As EventArgs)

[JScript] protected function RaiseBubbleEvent(source: Object, args: EventArgs);

Description

Assigns any sources of the event and its information to the control's parent.

ASP.NET server controls such as the System.Web.UI.WebControls.Repeater, System.Web.UI.WebControls.DataList and System.Web.UI.WebControls.DataGrid Web controls can contain child controls that raise events. For example, each row in a DataGrid control can contain one or more buttons created dynamically by templates. The source of the event. An System.EventArgs object that contains the event data.

RemovedControl

[C#] protected internal virtual void RemovedControl(Control control);

[C++] protected public: virtual void RemovedControl(Control* control);

[VB] Overridable Protected Friend Dim Sub RemovedControl(ByVal control As Control)

[JScript] package function RemovedControl(control: Control);

Description

Render

[C#] protected virtual void Render(HtmlTextWriter writer);

[C++] protected: virtual void Render(HtmlTextWriter* writer);

[VB] Overridable Protected Sub Render(ByVal writer As HtmlTextWriter)

[JScript] protected function Render(writer: HtmlTextWriter);

Description

Sends server control content to a provided System.Web.UI.HtmlTextWriter object, which writes the content to be rendered on the client.

When developing custom server controls, you can override this method to generate content for an ASP.NET page. For more information, see. The HtmlTextWriter object that receives the server control content.

RenderChildren

[C#] protected virtual void RenderChildren(HtmlTextWriter writer);

[C++] protected: virtual void RenderChildren(HtmlTextWriter* writer);

[VB] Overridable Protected Sub RenderChildren(ByVal writer As HtmlTextWriter)

[JScript] protected function RenderChildren(writer: HtmlTextWriter);

Description

Outputs the content of a server control's children to a provided System.Web.UI.HtmlTextWriter object, which writes the content to be rendered on the client.

This method uses the delegate specified in the System.Web.UI.Control.SetRenderMethodDelegate(System.Web.UI.RenderMethod) method to render any Active Server Pages (ASP) code on the page. If no ASP code exists on the page, this method renders any child controls for the server control. The HtmlTextWriter object that receives the child controls.

RenderControl

[C#] public void RenderControl(HtmlTextWriter writer);

[C++] public: void RenderControl(HtmlTextWriter* writer);

[VB] Public Sub RenderControl(ByVal writer As HtmlTextWriter)

[JScript] public function RenderControl(writer: HtmlTextWriter);

Description

Outputs server control content to a provided System.Web.UI.HtmlTextWriter object, then checks if tracing is enabled for the containing page and retrieves trace information about the server control.

If a server control's System.Web.UI.Control.Visible property is set to true, this method checks to see if tracing is enabled for the page, and renders the server control content to the page. The HtmlTextWriter object that receives the control content.

ResolveUrl

[C#] public string ResolveUrl(string relativeUrl);

[C++] public: String* ResolveUrl( String* relativeUrl);

[VB] Public Function ResolveUrl(ByVal relativeUrl As String) As String

[JScript] public function ResolveUrl(relativeUrl: String): String;

Description

Resolves a relative URL to the absolute URL where the page or user control associated with this request resides.

Return Value: The absolute URL.

This method uses the System.Web.UI.Control.TemplateSourceDirectory property to resolve to the absolute URL. The returned URL is for client use, and contains the session cookie if appropriate. The relative URL associated with the HTTP request.

SaveViewState

[C#] protected virtual object SaveViewState( );

[C++] protected: virtual Object* SaveViewState( );

[VB] Overridable Protected Function SaveViewState( ) As Object

[JScript] protected function SaveViewState( ): Object;

Description

Saves any server control view-state changes that have occurred since the time the page was posted back to the server.

Return Value: Returns the server control's current view state. If there is no view state associated with the control, this method returns null.

View state is the accumulation of the values of a server control's properties. These values are automatically placed in the server control's System.Web.UI.Control.ViewState property, which is an instance of the System.Web.UI.StateBag class. This property's value is then persisted to a string object after the save state stage of the server control life cycle. For more information, see.

SetRenderMethodDelegate

[C#] public void SetRenderMethodDelegate(RenderMethod renderMethod);

[C++] public: void SetRenderMethodDelegate(RenderMethod* renderMethod);

[VB] Public Sub SetRenderMethodDelegate(ByVal renderMethod As RenderMethod)

[JScript] public function SetRenderMethodDelegate(renderMethod: RenderMethod);

Description

Assigns an event handler delegate to render the server control and its content into its parent control.

This method is supplied for implementation purposes only; you should never call it directly. The information necessary to pass to the delegate so that it can render the server control.

IParserAccessor.AddParsedSubObject

[C#] void IParserAccessor.AddParsedSubObject(object obj);

[C++] void IParserAccessor::AddParsedSubObject(Object* obj);

[VB] Sub AddParsedSubObject(ByVal obj As Object) Implements IParserAccessor.AddParsedSubObject

[JScript] function IParserAccessor.AddParsedSubObject (obj: Object);

TrackViewState

[C#] protected virtual void TrackViewState( );

[C++] protected: virtual void TrackViewState( );

[VB] Overridable Protected Sub TrackViewState( )

[JScript] protected function TrackViewState( );

Description

Causes tracking of view-state changes to the server control so they can be stored in the server control's System.Web.UI.StateBag object. This object is accessible through the System.Web.UI.Control.ViewState property.

Invoke this method when you develop templated data-bound controls. This method alerts ASP.NET to monitor changes to a server control's view state, which is required when you override the System.Web.UI.Control.DataBind method. For more information, see.

ControlBuilder class (System.Web.UI)

TrackViewState

Description

Supports the parser to build a control and the child controls it contains.

By default every control in a page is associated with a default ControlBuilder class. This class adds a child control to the Controls collection for every nested control that it encounters within custom control tags. Additionally, it adds literal controls for text between nested control tags. You can override this default behavior by defining your own custom control builder class. This is done by applying a control builder attribute to your control builder class as follows:

[ControlBuilderAttribute(typeof(ControlBuilderType))]

ControlBuilder

Example Syntax:

TrackViewState

[C#] public ControlBuilder( );

[C++] public: ControlBuilder( );

[VB] Public Sub New( )

[JScript] public function ControlBuilder( );

ControlType

TrackViewState

[C#] public Type ControlType {get;}

[C++] public: _property Type* get_ControlType( );

[VB] Public ReadOnly Property ControlType As Type

[JScript] public function get ControlType( ): Type;

Description

Gets the type for the control to be created. This can be a class type, an interface type, a value type and so on.

FChildrenAsProperties

TrackViewState

[C#] protected bool FChildrenAsProperties {get;}

[C++] protected: _property bool get_FChildrenAs Properties( );

[VB] Protected ReadOnly Property FChildrenAsProperties As Boolean

[JScript] protected function get FChildrenAsProperties( ): Boolean;

Description

Checks if there are children controls to be parsed.

true if there are children controls to be parsed, false otherwise.

FIsNonParserAccessor

TrackViewState

[C#] protected bool FIsNonParserAccessor {get;}

[C++] protected: _property bool get_FIsNonParser Accessor( );

[VB] Protected ReadOnly Property FIsNonParserAccessor As Boolean

[JScript] protected function get FIsNonParserAccessor( ): Boolean;

Description

Checks if the control implements the System.Web.UI.IParseAccessor interface.

This is a read only property. It is true if the controls implements the System.Web.UI.IParseAccessor interface, otherwise it returns false.

HasAspCode

TrackViewState

[C#] public bool HasAspCode {get;}

[C++] public: _property bool get_HasAspCode( );

[VB] Public ReadOnly Property HasAspCode As Boolean

[JScript] public function get HasAspCode( ): Boolean;

Description

Gets a value indicating whether the control contains any Active Server Pages (ASP) code.

ID

TrackViewState

[C#] public string ID {get; set;}

[C++] public: _property String* getID( );public: _property void set_ID(String*);

[VB] Public Property ID As String

[JScript] public function get ID( ): String;public function set ID(String);

Description

Gets or sets the ID property for the control to be built.

InDesigner

TrackViewState

[C#] protected bool InDesigner {get;}

[C++] protected: _property bool get_InDesigner( );

[VB] Protected ReadOnly Property InDesigner As Boolean

[JScript] protected function get InDesigner( ): Boolean;

Description

Allows to change the behavior of control builders.

NamingContainerType

TrackViewState

[C#] public Type NamingContainerType {get;}

[C++] public: _property Type* get_NamingContainer Type( );

[VB] Public ReadOnly Property NamingContainerType As Type

[JScript] public function get NamingContainerType( ): Type;

Description

Gets the type assigned to the control's naming container.

Parser

TrackViewState

[C#] protected TemplateParser Parser {get;}

[C++] protected: _property TemplateParser* get_Parser( );

[VB] Protected ReadOnly Property Parser As TemplateParser

[JScript] protected function get Parser( ): TemplateParser;

Description

Gets the control builder parser.

TagName

TrackViewState

[C#] public string TagName {get;}

[C++] public: _property String* get_TagName( );

[VB] Public ReadOnly Property TagName As String

[JScript] public function get TagName( ): String;

Description

Gets the tag name for the control to be built.

AllowWhitespaceLiterals

[C#] public virtual bool AllowWhitespaceLiterals( );

[C++] public: virtual bool AllowWhitespaceLiterals( );

[VB] Overridable Public Function AllowWhitespace Literals( ) As Boolean

[JScript] public function AllowWhitespaceLiterals( ): Boolean;

Description

Allows spaces within a control to be created as a LiteralControl object. If you create a custom control builder, you can override this method Return Value: true in all cases.

AppendLiteralString

[C#] public virtual void AppendLiteralString(string s);

[C++] public: virtual void AppendLiteralString(String* s);

[VB] Overridable Public Sub AppendLiteralString(ByVal s As String)

[JScript] public function AppendLiteralString(s: String);

Description

Adds literal content to a control. Literal content is any text that is passed through to the browser without being processed on the server. For example, any HTML elements and text between their opening and closing tags are literal content. The content to add to the control.

AppendSubBuilder

[C#] public virtual void AppendSubBuilder(ControlBuilder subBuilder);

[C++] public: virtual void AppendSubBuilder(ControlBuilder* subBuilder);

[VB] Overridable Public Sub AppendSubBuilder(ByVal subBuilder As ControlBuilder)

[JScript] public function AppendSubBuilder(subBuilder: ControlBuilder);

Description

Adds builders to the System.Web.UI.ControlBuilder object for any child controls that belong to the control. The ControlBuilder object assigned to the child control.

CloseControl

[C#] public virtual void CloseControl( );

[C++] public: virtual void CloseControl( );

[VB] Overridable Public Sub CloseControl( )

[JScript] public function CloseControl( );

Description

Inserts the closing tag for the control.

CreateBuilderFromType

[C#] public static ControlBuilder CreateBuilderFromType (TemplateParser parser, ControlBuilder parentBuilder, Type type, string tagName, string id, IDictionary attribs, int line, string sourceFileName);

[C++] public: static ControlBuilder* CreateBuilderFromType(TemplateParser* parser, ControlBuilder* parentBuilder, Type* type, String* tagName, String* id, IDictionary* attribs, int line, String* sourceFileName);

[VB] Public Shared Function CreateBuilderFromType(ByVal parser As TemplateParser, ByVal parentBuilder As ControlBuilder, ByVal type As Type, ByVal tagName As String, ByVal id As String, ByVal attribs As IDictionary, ByVal line As Integer, ByVal sourceFileName As String) As ControlBuilder

[JScript] public static function CreateBuilderFromType(parser: TemplateParser, parentBuilder: ControlBuilder, type: Type, tagName: String, id: String, attribs: IDictionary, line: int, sourceFileName: String): ControlBuilder;

Description

Creates a System.Web.UI.ControlBuilder object for the specified tag.

Return Value: The builder that is responsible for creating the control. The System.Web.UI.TemplateParser object responsible for parsing the control. The System.Web.UI.ControlBuilder object responsible for building the control. The type assigned to the control that the builder will create. The name of the tag to be built. This allows the builder to support multiple tag types. The ID attribute assigned to the control. The System.Collections.IDictionary object that holds all of the specified tags attributes. The source file line number for the specified control. The name of the source file from which the control is to be created.

GetChildControlType

[C#] public virtual Type GetChildControlType(string tagName, IDictionary attribs);

[C++] public: virtual Type* GetChildControlType(String* tagName, IDictionary* attribs);

[VB] Overridable Public Function GetChildControlType (ByVal tagName As String, ByVal attribs As IDictionary) As Type

[JScript] public function GetChildControlType(tagName: String, attribs: IDictionary): Type;

Description

Obtains the Type for the current control's children.

Return Value: If a default property exists, this method returns the default property builder. If the type is a collection, a collection builder; if the type is a template, a template builder. If none of the above, this method returns the type of the property, or null if there are no properties. The name of the current control's tag. An array of attributes contained in the current control.

HasBody

[C#] public virtual bool HasBody( );

[C++] public: virtual bool HasBody( );

[VB] Overridable Public Function HasBody( ) As Boolean

[JScript] public function HasBody( ): Boolean;

Description

Determines if a control has both an opening and closing tag.

Return Value: true if the control has an opening and closing tag; otherwise, false.

HtmlDecodeLiterals

[C#] public virtual bool HtmlDecodeLiterals( );

[C++] public: virtual bool HtmlDecodeLiterals( );

[VB] Overridable Public Function HtmlDecodeLiterals( ) As Boolean

[JScript] public function HtmlDecodeLiterals( ): Boolean;

Description

Checks if the literal string of an HTML control must be decoded.

Return Value: true if the HTML control literal string is to be decoded, false otherwise.

Init

[C#] public virtual void Init(TemplateParser parser, ControlBuilder parentBuilder, Type type, string tagName, string id, IDictionary attribs);

[C++] public: virtual void Init(TemplateParser* parser, ControlBuilder* parentBuilder, Type* type, String* tagName, String* id, IDictionary* attribs);

[VB] Overridable Public Sub Init(ByVal parser As TemplateParser, ByVal parentBuilder As ControlBuilder, ByVal type As Type, ByVal tagName As String, ByVal id As String, ByVal attribs As IDictionary)

[JScript] public function Init(parser: TemplateParser, parentBuilder: ControlBuilder, type: Type, tagName: String, id: String, attribs: IDictionary);

Description

Initializes the control builder when a Web request is made. The System.Web.UI.TemplateParser object responsible for parsing the control. The System.Web.UI.ControlBuilder object responsible for building the control. The type assigned to the control that the builder will create. The name of the tag to be built. This allows the builder to support multiple tag types. The ID attribute assigned to the control. The System.Collections.IDictionary object that holds all of the specified tags attributes.

NeedsTagInnerText

[C#] public virtual bool NeedsTagInnerText( );

[C++] public: virtual bool NeedsTagInnerText( );

[VB] Overridable Public Function NeedsTagInnerText( ) As Boolean

[JScript] public function NeedsTagInnerText( ): Boolean;

Description

Determines if a control tag needs inner text. If so, the System.Web.UI.ControlBuilder.SetTagInnerText(System.String) method must be called.

Return Value: true if the control tag does not have any inner text; otherwise, false. The default is false.

OnAppendToParentBuilder

[C#] public virtual void OnAppendToParentBuilder(ControlBuilder parentBuilder);

[C++] public: virtual void OnAppendToParentBuilder(ControlBuilder* parentBuilder);

[VB] Overridable Public Sub OnAppendToParentBuilder (ByVal parentBuilder As ControlBuilder)

[JScript] public function OnAppendToParentBuilder(parentBuilder: ControlBuilder);

Description

Notifies the current control builder that it is being added to a parent control builder. The ControlBuilder object to which the current builder is added.

SetTagInnerText

[C#] public virtual void SetTagInnerText(string text);

[C++] public: virtual void SetTagInnerText(String* text);

[VB] Overridable Public Sub SetTagInnerText(ByVal text As String)

[JScript] public function SetTagInnerText(text: String);

Description

Provides the builder with the inner text of the control tag. The text to be provided.

ControlBuilderAttribute class (System.Web.UI)

ToString

Description

Specifies a custom System.Web.UI.ControlBuilder object for building a control within the ASP.NET parser. This class cannot be inherited.

This attribute prefixes the class to be used by the control builder at to create a custom control at run time.

ToString

[C#] public static readonly ControlBuilderAttribute Default;

[C++] public: static ControlBuilderAttribute* Default;

[VB] Public Shared ReadOnly Default As ControlBuilderAttribute

[JScript] public static var Default: ControlBuilderAttribute;

Description

Specifies the new System.Web.UI.ControlBuilderAttribute object. By default, the new object is set to null. This field is read-only.

ControlBuilderAttribute

Example Syntax:

ToString

[C#] public ControlBuilderAttribute(Type builderType);

[C++] public: ControlBuilderAttribute(Type* buildertype);

[VB] Public Sub New(ByVal builderType As Type)

[JScript] public function ControlBuilderAttribute(builderType: Type);

Description

Specifies the control builder for a custom control.

The association of the control builder type with a custom control is obtained by preeceding the custom control builder class with the following attribute definition: [ControlBuilderAttribute(typeof(controlbuildertype))] control builder type BuilderType ToString

[C#] public Type BuilderType {get;}

[C++] public: _property Type* get_BuilderType( );

[VB] Public ReadOnly Property BuilderType As Type

[JScript] public function get BuilderType( ): Type;

Description

Gets the type assigned to the control. This property is read-only.

TypeId

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Determines the control builder type for the specified control.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for the control object.

Return Value: int representing the control object hash code

IsDefaultAttribute

[C#] public override bool IsDefaultAttribute( );

[C++] public: bool IsDefaultAttribute( );

[VB] Overrides Public Function IsDefaultAttribute( ) As Boolean

[JScript] public override function IsDefaultAttribute( ): Boolean;

Description

Determines the current is the default control builder.

Return Value: true if the current is the default control builder.

ControlCollection class (System.Web.UI)

ToString

Description

Provides a collection container that enables ASP.NET server controls to maintain a list of their child controls.

You can access any of the properties and methods of the ControlCollection class through the System.Web.UI.Control.Controls property. Since the Control class is the base class for all ASP.NET server controls, all server controls inherit this property.

ControlCollection

Example Syntax:

ToString

[C#] public ControlCollection(Control owner);

[C++] public: ControlCollection(Control* owner);

[VB] Public Sub New(ByVal owner As Control)

[JScript] public function ControlCollection(owner: Control);

Description

Initializes a new instance of the System.Web.UI.ControlCollection class for the parent server control specified in the owner parameter. The ASP.NET server control that the control collection is created for.

Count

ToString

[C#] public int Count {get;}

[C++] public: _property int get_Count( );

[VB] Public ReadOnly Property Count As Integer

[JScript] public function get Count( ): int;

Description

Gets the number of server controls in the ControlCollection object for the specified ASP.NET server control.

IsReadOnly

ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the ControlCollection object is read-only.

IsSynchronized

ToString

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether the ControlCollection is synchronized.

Item

ToString

[C#] public virtual Control this[int index] {get;}

[C++] public: _property virtual Control* get_Item(int index);

[VB] Overridable Public Default ReadOnly Property Item (ByVal index As Integer) As Control

[JScript] returnValue=ControlCollectionObject.Item(index);

Description

Gets a reference to the server control at the specified index location in the ControlCollection object. The location of the server control in the ControlCollection.

Owner

ToString

[C#] protected Control Owner {get;}

[C++] protected: _property Control* get_Owner( );

[VB] Protected ReadOnly Property Owner As Control

[JScript] protected function get Owner( ): Control;

Description

Gets the ASP.NET server control to which the System.Web.UI.ControlCollection object belongs.

SyncRoot

ToString

[C#] public object SyncRoot {get;}
[C++] public: _property Object* get_SyncRoot( );
[VB] Public ReadOnly Property SyncRoot As Object
[JScript] public function get SyncRoot( ): Object;

Description

Gets an object that can be used to synchronize access to the collection of controls.

Add

[C#] public virtual void Add(Control child);
[C++] public: virtual void Add(Control* child);
[VB] Overridable Public Sub Add(ByVal child As Control)
[JScript] public function Add(child: Control);

Description

Adds the specified System.Web.UI.Control object to the collection.

The new control is added to the end of an ordinal index array. The control can be an instance of any ASP.NET server control, a custom server control you create, or a literal control. The Control object to add to the collection.

AddAt

[C#] public virtual void AddAt(int index, Control child);
[C++] public: virtual void AddAt(int index, Control* child);
[VB] Overridable Public Sub AddAt(ByVal index As Integer, ByVal child As Control)
[JScript] public function AddAt(index: int, child: Control);

Description

Adds the specified System.Web.UI.Control object to the collection at the specified index location.

The added control can be an instance of any ASP.NET server control, a custom server control you create, or a literal control. The location in the array to add the child control. The Control object to add to the collection.

Clear

[C#] public virtual void Clear( );
[C++] public: virtual void Clear( );
[VB] Overridable Public Sub Clear( )
[JScript] public function Clear( );

Description

Removes all controls from the current server control's System.Web.UI.ControlCollection object.

Use this method to empty a custom control's ControlCollection when you override the System.Web.UI.Control.CreateChildControls and System.Web.UI.Control.DataBind methods. Do this when you develop composite, templated controls or templated data bound controls. For more information, see.

Contains

[C#] public virtual bool Contains(Control c);
[C++] public: virtual bool Contains(Control* c);
[VB] Overridable Public Function Contains(ByVal c As Control) As Boolean
[JScript] public function Contains(c: Control): Boolean;

Description

Determines whether the specified server control is in the parent server control's System.Web.UI.ControlCollection object.

Return Value: true if the specified server control exists in the collection; otherwise, false. The server control to search for in the collection.

CopyTo

[C#] public void CopyTo(Array array, int index);
[C++] public: _sealed void CopyTo(Array* array, Int index);
[VB] NotOverridable Public Sub CopyTo(ByVal array As Array, ByVal index As Integer)
[JScript] public function CopyTo(array: Array, index: int);

Description

Copies the child controls stored in the System.Web.UI.ControlCollection object to an System.Array object, beginning at the specified index location in the Array. The Array to copy the child controls to. The zero-based relative index in array where copying begins.

GetEnumerator

[C#] public IEnumerator GetEnumerator( );
[C++] public: _sealed IEnumerator* GetEnumerator( );
[VB] NotOverridable Public Function GetEnumerator( ) As IEnumerator
[JScript] public function GetEnumerator( ): IEnumerator;

Description

Retrieves an enumerator that can iterate through the ControlCollection object.

Return Value: The enumerator to iterate through the collection.

IndexOf

[C#] public virtual int IndexOf(Control value);
[C++] public: virtual int IndexOf(Control* value);
[VB] Overridable Public Function IndexOf(ByVal value As Control) As Integer
[JScript] public function IndexOf(value: Control): int;

Description

Retrieves the index of a specified System.Web.UI.Control object in the collection.

Return Value: The index of the specified server control. If the server control is not currently a member of the collection, it returns −1.

Use this method to determine the index location of the specified server control in the ControlCollection object. The Control object for which the index is returned.

Remove

[C#] public virtual void Remove(Control value);
[C++] public: virtual void Remove(Control* value);
[VB] Overridable Public Sub Remove(ByVal value As Control)
[JScript] public function Remove(value: Control);

Description

Removes the specified server control from the parent server control's System.Web.UI.ControlCollection object.

To remove a control from an index location, use the System.Web.UI.ControlCollection.RemoveAt(System.Int32) method. The server control to be removed.

RemoveAt

[C#] public virtual void RemoveAt(int index);
[C++] public: virtual void RemoveAt(int index);
[VB] Overridable Public Sub RemoveAt(ByVal index As Integer)
[JScript] public function RemoveAt(index: int);

Description

Removes a child control, at the specified index location, from the System.Web.UI.ControlCollection object.

To remove a control from the collection based on its value, use the System.Web.UI.ControlCollection.Remove(System.Web.UI.Control) method. The ordinal index of the server control to be removed from the collection.

CssStyleCollection class (System.Web.UI)

ToString

Description

Contains the HTML cascading-style sheets (CSS) inline style attributes for a specified HTML server control. This class cannot be inherited.

Any style declared for a particular HTML server control is added to the collection when the containing Web Forms page is parsed. It automatically parses and exposes CSS properties through a dictionary pattern API. You can manipulate any CSS property on a server control through the System.Web.UI.HtmlControls.HtmlControl.Style property. Simply use the CSS property's key and value in the indexed collection.

Count

ToString

[C#] public int Count {get;}

[C++] public: _property int get_Count( );

[VB] Public ReadOnly Property Count As Integer

[JScript] public function get Count( ): int;

Description

Gets the number of items in the CssStyleCollection object.

Item

ToString

[C#] public string this[string key] {get; set;}

[C++] public: _property String* get_Item(String* key);public: _property void set_Item(String* key, String*);

[VB] Public Default Property Item(ByVal key As String) As String

[JScript] returnValue=CssStyleCollectionObject.Item(key); CssStyleCollectionObject.Item(key)=returnValue;

Description

Gets or sets a specified CSS value for the specified HTML server control. The index to the CSS attribute.

Keys

ToString

[C#] public ICollection Keys {get;}

[C++] public: _property ICollection* get_Keys( );

[VB] Public ReadOnly Property Keys As ICollection

[JScript] public function get Keys( ): ICollection;

Description

Gets a collection of keys to all the styles in the CssStyleCollection object for a specific HTML server control.

Add

[C#] public void Add(string key, string value);

[C++] public: void Add(String* key, String* value);

[VB] Public Sub Add(ByVal key As String, ByVal value As String)

[JScript] public function Add(key: String, value: String);

Description

Adds a style item to the CssStyleCollection object. The index assigned to the new style in the collection. The style to store in the collection.

Clear

[C#] public void Clear( );

[C++] public: void Clear( );

[VB] Public Sub Clear( )

[JScript] public function Clear( );

Description

Removes all style items from the CssStyleCollection object.

Remove

[C#] public void Remove(string key);

[C++] public: void Remove(String* key);

[VB] Public Sub Remove(ByVal key As String)

[JScript] public function Remove(key: String);

Description

Removes a style item from the CssStyleCollection object. The index of the style item to remove.

DataBinder class (System.Web.UI)

ToString

Description

Provides design-time support for RAD designers to generate and parse. This class cannot be inherited.

You can use the overloaded System.Web.UI.DataBinder.Eval(System.Object,System.String) method of this class in Web Forms page data-binding syntax. This provides an easier syntax to remember than standard data binding, but because DataBinder.Eval provides automatic type conversion, can result in slower server response times.

DataBinder

Example Syntax:

ToString

[C#] public DataBinder( );

[C++] public: DataBinder( );

[VB] Public Sub New( )

[JScript] public function DataBinder( );

Eval

[C#] public static object Eval(object container, string expression);

[C++] public: static Object* Eval(Object* container, String* expression);

[VB] Public Shared Function Eval(ByVal container As Object, ByVal expression As String) As Object

[JScript] public static function Eval(container: Object, expression: String): Object; Uses reflection to parse and evaluate a data-binding expression against an object at runtime. This method allows RAD designers, such as Visual Studio.NET, to easily generate and parse data-binding syntax. This method can also be used declaratively on a Web Forms page to simplify casting to text that can be displayed in a browser.

Description

Evaluates data binding expressions at runtime.

Return Value: An System.Object that results from the evaluation of the data-binding expression.

While this method is automatically called when you create data bindings in a RAD designer, you can also use it declaratively if you want to simplify the casting to a text string to be displayed on a browser. To do so, you must place the tags, which are also used in standard ASP.NET data binding, around the data-binding expression. The object reference against which the expression is evaluated. This must be a valild object identifier in the page's specified language. The navigation path from the container to the property value to be placed in the bound control property. This must be a string type of property or field names separated by dots, such as Table.DefaultView.Price.

Eval

[C#] public static string Eval(object container, string expression, string format);

[C++] public: static String* Eval(Object* container, String* expression, String* format);

[VB] Public Shared Function Eval(ByVal container As Object, ByVal expression As String, ByVal format As String) As String

[JScript] public static function Eval(container: Object, expression: String, format: String): String;

Description

Evaluates data binding expressions at runtime and formats the output as text to be displayed in the requesting browser.

Return Value: A System.String that results from the evaluation of the data binding expression and conversion to a string type. This will be displayed by the requesting browser.

To learn more about format strings in the .NET Framework, see. The object reference against which the expression is evaluated. This must be a valild object identifier in the page's specified language. The navigation path from the container to the property value to be placed in the bound control property. This must be a string of property or field names separated by dots, such as Table.DefaultView.Price. A .NET Framework format string that converts the System.Object (which results from the evaluation of the data binding expression) to a System.String that can be displayed by the requesting browser.

GetIndexedPropertyValue

[C#] public static object GetIndexedPropertyValue(object container, string expr);

[C++] public: static Object* GetIndexedPropertyValue(Object* container, String* expr);

[VB] Public Shared Function GetIndexedPropertyValue(ByVal container As Object, ByVal expr As String) As Object

[JScript] public static function GetIndexedPropertyValue (container: Object, expr: String): Object;

Description

GetIndexedPropertyValue

[C#] public static string GetIndexedPropertyValue(object container, string propName, string format);

[C++] public: static String* GetIndexedPropertyValue(Object* container, String* propName, String* format);

[VB] Public Shared Function GetIndexedPropertyValue(ByVal container As Object, ByVal propName As String, ByVal format As String) As String

[JScript] public static function GetIndexedPropertyValue (container: Object, propName: String, format: String): String;

Description

GetPropertyValue

[C#] public static object GetPropertyValue(object container, string propName);

[C++] public: static Object* GetPropertyValue(Object* container, String* propName);

[VB] Public Shared Function GetPropertyValue(ByVal container As Object, ByVal propName As String) As Object

[JScript] public static function GetPropertyValue(container: Object, propName: String): Object;

Description

GetPropertyValue

[C#] public static string GetPropertyValue(object container, string propName, string format);

[C++] public: static String* GetPropertyValue(Object* container, String* propName, String* format);

[VB] Public Shared Function GetPropertyValue(ByVal container As Object, ByVal propName As String, ByVal format As String) As String

[JScript] public static function GetPropertyValue(container: Object, propName: String, format: String): String;

Description

DataBinding class (System.Web.UI)

ToString

Description

Contains information about a single data-binding expression in an ASP.NET server control, which allows rapid-application development (RAD) designers, such as Visual Studio . NET, to create data-binding expressions at design time. This class cannot be inherited.

Each data-binding expression in a server control is represented at design time by an instance of the DataBinding class. Any server control that contains one or more data-binding expressions has a System.Web.UI.DataBindingCollection object that contains the DataBinding objects. This collection is accessible by implementing the System.Web.UI.IDataBindingsAccessor interface. Any DataBinding or DataBindingCollection objects associated with a server control exist only at design time. They do not exist at runtime and, therefore, are not accessible then.

DataBinding

Example Syntax:

ToString

[C#] public DataBinding(string propertyName, Type propertyType, string expression);

[C++] public: DataBinding(String* propertyName, Type* propertyType, String* expression);

[VB] Public Sub New(ByVal propertyName As String, ByVal propertyType As Type, ByVal expression As String)

[JScript] public function DataBinding(propertyName: String, propertyType: Type, expression: String);

Description

Initializes a new instance of the System.Web.UI.DataBinding class. The property to data bind to. The .NET Framework type of the property to data bind to. The data-binding expression to be evaluated.

Expression

ToString

[C#] public string Expression {get; set;}

[C++] public: _property String* get_Expression( );public: _property void set_Expression(String*);

[VB] Public Property Expression As String

[JScript] public function get Expression( ): String;public function set Expression(String);

Description

Gets or sets the data-binding expression to be evaluated.

Whether or not you bind data to a server control property, data-binding expressions take the following form:

PropertyName

ToString

[C#] public string PropertyName {get;}

[C++] public: _property String* get_PropertyName( );

[VB] Public ReadOnly Property PropertyName As String

[JScript] public function get PropertyName( ): String;

Description

Gets the name of the ASP.NET server control property to be data bound against.

PropertyType

ToString

[C#] public Type PropertyType {get;}

[C++] public: _property Type* get_PropertyType( );

[VB] Public ReadOnly Property PropertyType As Type

[JScript] public function get PropertyType( ): Type;

Description

Gets the .NET Framework type of the data-bound ASP-.NET server control property.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Determines whether the specified object is the same instance of the System.Web.UI.DataBinding class as the current object.

Return Value: true if the data binding property names match; otherwise, false. The object to compare against the current DataBinding object.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Retrieves the hash code for an instance of the System.Web.UI.DataBinding object.

Return Value: A 32-bit signed integer hash code.

DataBinding objects are placed in a System.Web.UI.DataBindingCollection object, accessible at design time through the server control's System.Web.UI.Control.DataBindings property, which is a hash table that represents the bindings on a control. There can only be one binding per property, so the hashcode computation should match the System.Web.UI.DataBinding.Equals(System.Object) implementation and only take the property name into account.

DataBindingCollection class (System.Web.UI)

ToString

Description

Provides a collection of System.Web.UI.DataBinding objects for an ASP.NET server control. This class cannot be inherited.

This collection is a hash table containing all of the System.Web.UI.DataBinding objects on an ASP.NET server control. You can access the objects contained in this collection by implementing the System.Web.UI.IDataBindingsAccessor interface. Any DataBinding or DataBindingCollection objects associated with a server control exist only at design time. They do not exist at runtime and, therefore, are not accessible then.

DataBindingCollection

Example Syntax:

ToString

[C#] public DataBindingCollection( );

[C++] public: DataBindingCollection( );

[VB] Public Sub New( )

[JScript] public function DataBindingCollection( );

Description

Initializes a new instance of the System.Web.UI.DataBindingCollection class.

Count

ToString

[C#] public int Count {get;}

[C++] public: _property int get_Count( );

[VB] Public ReadOnly Property Count As Integer

[JScript] public function get Count( ): int;

Description

Gets the number of System.Web.UI.DataBinding objects in the System.Web.UI.DataBindingCollection object.

IsReadOnly

ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the System.Web.UI.DataBindingCollection is read-only.

IsSynchronized

ToString

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether the System.Web.UI.DataBindingCollection is synchronized (thread-safe).

Item

ToString

[C#] public DataBinding this[string propertyName] {get;}

[C++] public: _property DataBinding* get_Item(String* propertyName);

[VB] Public Default ReadOnly Property Item(ByVal propertyName As String) As DataBinding

[JScript] returnValue=DataBindingCollectionObject.Item (propertyName);

Description

Gets the System.Web.UI.DataBinding object with the specified property name. The name of the property to be found.

RemovedBindings

ToString

[C#] public string[ ] RemovedBindings {get;}

[C++] public: _property String* get_RemovedBindings( );

[VB] Public ReadOnly Property RemovedBindings As String ( )

[JScript] public function get RemovedBindings( ): String[ ];

Description

Gets an array of the names of the System.Web.UI.DataBinding objects removed from the collection.

SyncRoot

ToString

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets an object that can be used to synchronize access to the System.Web.UI.DataBindingCollection.

Add

[C#] public void Add(DataBinding binding);

[C++] public: void Add(DataBinding* binding);

[VB] Public Sub Add(ByVal binding As DataBinding)

[JScript] public function Add(binding: DataBinding);

Description

Adds the specified System.Web.UI.DataBinding object to the System.Web.UI.DataBindingCollection. The data binding object to add.

Clear

[C#] public void Clear( );

[C++] public: void Clear( );

[VB] Public Sub Clear( )

[JScript] public function Clear( );

Description

Removes all System.Web.UI.DataBinding objects from the System.Web.UI.DataBindingCollection.

CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies the DataBindingCollection values to a one-dimensional System.Array, beginning at the Array object's specified index. The one-dimensional System.Array object that is the destination of the values copied from DataBindingCollection. The index in the array, specified by the array parameter, where copying begins.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator to iterate through the System.Web.UI.DataBindingCollection object.

Return Value: An System.Collections.IEnumerator that contains the collection's members.

Remove

[C#] public void Remove(DataBinding binding);

[C++] public: void Remove(DataBinding* binding);

[VB] Public Sub Remove(ByVal binding As DataBinding)

[JScript] public function Remove(binding: DataBinding);

Description

Removes the specified System.Web.UI.DataBinding object from the System.Web.UI.DataBindingCollection. The System.Web.UI.DataBinding object to be removed from the System.Web.UI.DataBindingCollection.

Remove

[C#] public void Remove(string propertyName);

[C++] public: void Remove(String* propertyName);

[VB] Public Sub Remove(ByVal propertyName As String)

[JScript] public function Remove(propertyName: String);

Removes a System.Web.UI.DataBinding object from the

System.Web.UI.DataBindingCollection

Description Removes the System.Web.UI.DataBinding object associated with the specified property name from the System.Web.UI.DataBindingCollection. The property name associated with the System.Web.UI.DataBinding object to be removed.

Remove

[C#] public void Remove(string propertyName, bool addToRemovedList);

[C++] public: void Remove(String* propertyName, bool addToRemovedList);

[VB] Public Sub Remove(ByVal propertyName As String, ByVal addToRemovedList As Boolean)

[JScript] public function Remove(propertyName: String, addToRemovedList: Boolean);

Description

Removes the System.Web.UI.DataBinding object, associated with the specified property name, from the System.Web.UI.DataBindingCollection and instructs the collection not to add the removed DataBinding object to the System.Web.UI.DataBindingCollection.RemovedBindings list. The property associated with the DataBinding object to be removed. A Boolean that indicates whether to add the property name to the RemovedBindings list.

DataBindingHandlerAttribute class (System.Web.UI)

ToString

Description

Specifies a design-time class that performs databinding of controls within a designer.

ToString

[C#] public static readonly DataBindingHandlerAttribute Default;

[C++] public: static DataBindingHandlerAttribute* Default;

[VB] Public Shared ReadOnly Default As DataBindingHandlerAttribute

[JScript] public static var Default: DataBindingHandlerAttribute;

Description

Defines the default constructor for the System.Web.UI.DataBindingHandlerAttribute class. This field is read-only.

DataBindingHandlerAttribute

Example Syntax:

ToString

[C#] public DataBindingHandlerAttribute( );

[C++] public: DataBindingHandlerAttribute( );

[VB] Public Sub New( )

[JScript] public function DataBindingHandlerAttribute( );

Initializes a new instance of the System.Web.UI.DataBindingHandlerAttribute class.

Description

Initializes a new instance of the System.Web.UI.DataBindingHandlerAttribute class using no parameters. This is the default constructor.

DataBindingHandlerAttribute

Example Syntax:

ToString

[C#] public DataBindingHandlerAttribute(string typeName);

[C++] public: DataBindingHandlerAttribute(String* typeName);

[VB] Public Sub New(ByVal typeName As String)

[JScript] public function DataBindingHandlerAttribute (typeName: String);

Description

Initializes a new instance of the System.Web.UI.DataBindingHandlerAttribute class with the specified type name.

The syntax for this attribute is: [DataBindingHandlerAttribute typeof((dataBindingHandlerType))] The name of the data binding handler's type.

DataBindingHandlerAttribute

Example Syntax:

ToString

[C#] public DataBindingHandlerAttribute(Type type);

[C++] public: DataBindingHandlerAttribute(Type* type);

[VB] Public Sub New(ByVal type As Type)

[JScript] public function DataBindingHandlerAttribute(type: Type);

Description

Initializes a new instance of the System.Web.UI.DataBindingHandlerAttribute class of the specified Type. The type name for this constructor is the fully-qualified name of the type, including the assembly name from which it was loaded. The Type assigned to the data binding handler.

HandlerTypeName

ToString

[C#] public string HandlerTypeName {get;}

[C++] public: _property String* get_HandlerTypeName( );

[VB] Public ReadOnly Property HandlerTypeName As String

[JScript] public function get HandlerTypeName( ): String;

Description

Gets the type name of the data binding handler. If the type name is null, this property returns an empty string.

TypeId

DataBoundLiteralControl class (System.Web.UI)

ToString

Description

Creates a control for HTML text that does not contain code processed on the server, but persists the value of its System.Web.UI.DataBoundLiteralControl.Text property to view state. This class cannot be inherited.

This class allows the data binding syntax to be implemented.

DataBoundLiteralControl

Example Syntax:

ToString

[C#] public DataBoundLiteralControl(int staticLiteralsCount, int dataBoundLiteralCount);

[C++] public: DataBoundLiteralControl(int staticLiteralsCount, int dataBoundLiteralCount);

[VB] Public Sub New(ByVal staticLiteralsCount As Integer, ByVal dataBoundLiteralCount As Integer)

[JScript] public function DataBoundLiteralControl(staticLiteralsCount: int, dataBoundLiteralCount: int);

Description

ChildControlsCreated

ClientID

Context

Controls

EnableViewState

Events

HasChildViewState

ID

IsTrackingViewState

NamingContainer

Page

Parent

Site

TemplateSourceDirectory

Text

ToString

Description

Gets or sets the text content of the System.Web.UI.DataBoundLiteralControl object.

UniqueID

ViewState

ViewStateIgnoresCase

Visible

CreateControlCollection

[C#] protected override ControlCollection CreateControlCollection( );

[C++] protected: ControlCollection* CreateControlCollection( );

[VB] Overrides Protected Function CreateControlCollection( ) As ControlCollection

[JScript] protected override function CreateControlCollection( ): ControlCollection;

Description

Creates an System.Web.UI.EmptyCollectionControl object for the current instance of the System.Web.UI.DataBoundLiteralControl.

Return Value: The EmptyCollectionControl object for the current control.

LoadViewState

[C#] protected override void LoadViewState(object savedState);

[C++] protected: void LoadViewState(Object* savedState);

[VB] Overrides Protected Sub LoadViewState(ByVal savedState As Object)

[JScript] protected override function LoadViewState(savedState: Object);

Description

Loads the previously saved view state. You can override this method to synchronize System.Web.UI.DataBoundLiteralControl.Text property with new literal content. The previously saved view state.

Render

[C#] protected override void Render(HtmlTextWriter output);

[C++] protected: void Render(HtmlTextWriter* output);

[VB] Overrides Protected Sub Render(ByVal output As HtmlTextWriter)

[JScript] protected override function Render(output: HtmlTextWriter);

Description

Writes the content of the System.Web.UI.DataBoundLiteralControl object to an output stream. The output stream that renders HTML content to the client.

SaveViewState

[C#] protected override object SaveViewState( );

[C++] protected: Object* SaveViewState( );

[VB] Overrides Protected Function SaveViewState( ) As Object

[JScript] protected override function SaveViewState( ): Object;

Description

Saves any view state modified after the control began monitoring state changes.

Return Value: An System.Object that contains the savied view state values.

SetDataBoundString

[C#] public void SetDataBoundString(int index, string s);

[C++] public: void SetDataBoundString(int index, String* s);

[VB] Public Sub SetDataBoundString(ByVal index As Integer, ByVal s As String)

[JScript] public function SetDataBoundString(index: int, s: String);

Description

SetStaticString

[C#] public void SetStaticString(int index, string s);

[C++] public: void SetStaticString(int index, String* s);

[VB] Public Sub SetStaticString(ByVal index As Integer, ByVal s As String)

[JScript] public function SetStaticString(index: int, s: String);

Description

DesignerDataBoundLiteralControl class (System.Web.UI)

TrackViewState

Description

Simpler version of DataBoundLiteralControlBuilder, used at design time.

DesignerDataBoundLiteralControl

Example Syntax:

TrackViewState

[C#] public DesignerDataBoundLiteralControl( );

[C++] public: DesignerDataBoundLiteralControl( );

[VB] Public Sub New( )

[JScript] public function DesignerDataBoundLiteral Control( );

Description

ChildControlsCreated

ClientID

Context

Controls

EnableViewState

Events

HasChildViewState

ID

IsTrackingViewState

NamingContainer

Page

Parent

Site

TemplateSourceDirectory

Text

TrackViewState

Description

Gets or sets the text content of the data-bound literal control.

UniqueID

ViewState

ViewStateIgnoresCase

Visible

CreateControlCollection

[C#] protected override ControlCollection CreateControlCollection( );

[C++] protected: ControlCollection* CreateControlCollection( );

[VB] Overrides Protected Function CreateControlCollection( ) As ControlCollection

[JScript] protected override function CreateControlCollection( ): ControlCollection;

Description

LoadViewState

[C#] protected override void LoadViewState(object savedState);

[C++] protected: void LoadViewState(Object* savedState);

[VB] Overrides Protected Sub LoadViewState(ByVal savedState As Object)

[JScript] protected override function LoadViewState(savedState: Object);

Description

Loads the previously saved state. Overridden to synchronize Text property with LiteralContent.

Render

[C#] protected override void Render(HtmlTextWriter output);

[C++] protected: void Render(HtmlTextWriter* output);

[VB] Overrides Protected Sub Render(ByVal output As HtmlTextWriter)

[JScript] protected override function Render(output: HtmlTextWriter);

Description

Saves any state that was modified after the control began monitoring state changes.

SaveViewState

[C#] protected override object SaveViewState( );

[C++] protected: Object* SaveViewState( );

[VB] Overrides Protected Function SaveViewState( ) As Object

[JScript] protected override function SaveViewState( ): Object;

Description

The object that contains the state changes.

DesignTimeParseData class (System.Web.UI)

TrackViewState

DesignTimeParseData

Example Syntax:

TrackViewState

DataBindingHandler

TrackViewState

DesignerHost

TrackViewState

DocumentUrl

TrackViewState

ParseText

TrackViewState

DesignTimeTemplateParser class (System.Web.UI)

ToString

ParseControl

[C#] public static Control ParseControl(DesignTimeParseData data);

[C++] public: static Control* ParseControl(DesignTimeParseData* data);

[VB] Public Shared Function ParseControl(ByVal data As DesignTimeParseData) As Control

[JScript] public static function ParseControl(data: DesignTimeParseData): Control;

ParseTemplate

[C#] public static ITemplate ParseTemplate(DesignTimeParseData data);

[C++] public: static ITemplate* ParseTemplate(DesignTimeParseData* data);

[VB] Public Shared Function ParseTemplate(ByVal data As DesignTimeParseData) As ITemplate

[JScript] public static function ParseTemplate(data: DesignTimeParseData): ITemplate;

EmptyControlCollection class (System.Web.UI)

ToString

Description

Provides standard support for a ControlCollection that is always empty.

This class is used when you want to define a custom control that does not allow child controls.

EmptyControlCollection

Example Syntax:

ToString

[C#] public EmptyControlCollection(Control owner);

[C++] public: EmptyControlCollection(Control* owner);

[VB] Public Sub New(ByVal owner As Control)

[JScript] public function EmptyControlCollection(owner: Control);

Description

Instantiates an empty control collection.

Count

IsReadOnly

IsSynchronized

Item
Owner
SyncRoot
Add

[C#] public override void Add(Control child);
[C++] public: void Add(Control* child);
[VB] Overrides Public Sub Add(ByVal child As Control)
[JScript] public override function Add(child: Control);

Description

Denies the addition of the specified System.Web.UI.Control object to the collection.

AddAt

[C#] public override void AddAt(int index, Control child);
[C++] public: void AddAt(int index, Control* child);
[VB] Overrides Public Sub AddAt(ByVal index As Integer, ByVal child As Control)
[JScript] public override function AddAt(index: int, child: Control);

Description

Denies the addition of the specified System.Web.UI.Control object to the collection, at the specified index position.

Html32TextWriter class (System.Web.UI)
ToString

Description

Provides a text writer for ASP.NET server controls that render content to downlevel clients only.

Html32TextWriter
Example Syntax:
ToString
System.Web.UI.Html32TextWriter

Description

Initializes a new instance of the System.Web.UI.Html32TextWriter class that uses the System.Web.UI.HtmlTextWriter.DefaultTabString constant when indentation of a line is necessary. The System.IO.TextWriter object to render the HMTL content.

Html32TextWriter
Example Syntax:
ToString

[C#] public Html32TextWriter(TextWriter writer, string tabString);
[C++] public: Html32TextWriter(TextWriter* writer, String* tabString);
[VB] Public Sub New(ByVal writer As TextWriter, ByVal tabString As String)
[JScript] public function Html32TextWriter(writer: TextWriter, tabString: String);

Description

Initializes a new instance of the System.Web.UI.Html32TextWriter class using the specified tab spacing. The System.IO.TextWriter object to render the HMTL content. A System.String that represents the number of spaces defined in the System.Web.UI.HtmlTextWriter.Indent property.

Encoding
FontStack
ToString

Description

Gets a collection of font information for the HTML to render.

FormatProvider
Indent
InnerWriter
NewLine
TagKey
TagName
GetTagName

[C#] protected override string GetTagName(HtmlTextWriterTag tagKey);
[C++] protected: String* GetTagName(HtmlTextWriterTag tagKey);
[VB] Overrides Protected Function GetTagName(ByVal tagKey As HtmlTextWriterTag) As String
[JScript] protected override function GetTagName(tagKey: HtmlTextWriterTag): String;

Description

Obtains the HTML element associated with the specified System.Web.UI.HtmlTextWriterTag enumeration value. Return Value: The HTML element.

If HtmlTextWriterTag.Div is passed in the tagKey parameter, this method returns the HTML element. The HtmlTextWriterTag value to obtain the HTML element for.

OnStyleAttributeRender

[C#] protected override bool OnStyleAttributeRender(string name, string value, HtmlTextWriterStyle key);
[C++] protected: bool OnStyleAttributeRender(String* name, String* value, HtmlTextWriterStyle key);
[VB] Overrides Protected Function OnStyleAttributeRender (ByVal name As String, ByVal value As String, ByVal key As HtmlTextWriterStyle) As Boolean
[JScript] protected override function OnStyleAttributeRender(name: String, value: String, key: HtmlTextWriterStyle): Boolean;

Description

Determines whether the specified HTML style attribute and its value have been rendered to the requesting page.

Return Value: true if the HTML style attribute and its value have been rendered to the requesting page; otherwise, false.

This method supports a smaller number of HTML style attributes than the of the System.Web.UI.HtmlTextwriter.OnStyleAttributeRender(System.String,System.String,System.Web.UI.HtmlTextWriterStyle) method which it overrides. The HTML style attribute to render to the client. The value associated with the HTML style attribute. The System.Web.UI.HtmlTextWriterStyle enumeration value associated with the HTML style attribute.

OnTagRender

[C#] protected override bool OnTagRender(string name, HtmlTextWriterTag key);
[C++] protected: bool OnTagRender(String* name, HtmlTextWriterTag key);
[VB] Overrides Protected Function OnTagRender(ByVal name As String, ByVal key As HtmlTextWriterTag) As Boolean
[JScript] protected override function OnTagRender(name: String, key: HtmlTextWriterTag): Boolean;

Description

Determines whether the specified HTML element has been rendered to the requesting page.

Return Value: true if the HTML element has been rendered to the requesting page; otherwise false.

This method associates the element with an HTML table to simplify page layout for browsers that do not support this element. The HTML element to render. The System.Web.UI.HtmlTextWriterTag enumeration value associated with the HTML element.

RenderAfterContent

[C#] protected override string RenderAfterContent( );

[C++] protected: String* RenderAfterContent( );

[VB] Overrides Protected Function RenderAfterContent( ) As String

[JScript] protected override function RenderAfterContent( ): String;

Description

Writes any text or spacing that occurs after the content of the HTML element to the System.Web.UI.HtmlTextWriter output stream.

Return Value: The spacing or text to write prior to the content of the HTML element. If there is no such information to render, this method returns null.

RenderAfterTag

[C#] protected override string RenderAfterTag( );

[C++] protected: String* RenderAfterTag( );

[VB] Overrides Protected Function RenderAfterTag( ) As String

[JScript] protected override function RenderAfterTag( ): String;

Description

Writes any spacing or text that occurs after an HTML element's closing tag.

Return Value: The spacing or text to write after the closing tag of the HTML element. If there is no such information to render, this method returns null.

RenderBeforeContent

[C#] protected override string RenderBeforeContent( );

[C++] protected: String* RenderBeforeContent( );

[VB] Overrides Protected Function RenderBeforeContent( ) As String

[JScript] protected override function RenderBeforeContent( ): String;

Description

Writes any tab spacing or font information that appears before the content contained in an HTML element.

Return Value: The font information or spacing to write prior to the content of the HTML element. If there is no such information to render, this method returns null.

RenderBeforeTag

[C#] protected override string RenderBeforeTag( );

[C++] protected: String* RenderBeforeTag( );

[VB] Overrides Protected Function RenderBeforeTag( ) As String

[JScript] protected override function RenderBeforeTag( ): String;

Description

Writes any text or tab spacing that occurs before the opening tag of an HTML element to the System.Web.UI.HtmlTextWriter output stream. Return Value: Any HTML font and spacing information to render before the tag; if there is no such information to render, this method returns null.

RenderBeginTag

[C#] public override void RenderBeginTag(HtmlTextWriterTag tagKey);

[C++] public: void RenderBeginTag(HtmlTextWriterTag tagKey);

[VB] Overrides Public Sub RenderBeginTag(ByVal tagKey As HtmlTextWriterTag)

[JScript] public override function RenderBeginTag(tagKey: HtmlTextWriterTag);

Description

Writes the opening tag of the specified HTML element to the System.Web.UI.HtmlTextWriter output stream.

If the element is specified, this method performs basic HTML formatting to present the HTML content. The System.Web.UI.HtmlTextWriterTag enumeration value that indicates the HTML element to write.

RenderEndTag

[C#] public override void RenderEndTag( );

[C++] public: void RenderEndTag( );

[VB] Overrides Public Sub RenderEndTag( )

[JScript] public override function RenderEndTag( );

Description

Writes the end tag of an HTML element to the System.Web.UI.HtmlTextWriter output stream along with any font information that is associated with the element.

HtmlTextWriter class (System.Web.UI)

WriteStyleAttribute

Description

Represents a writer that writes a sequential series of HTML-specific characters and text. This class provides formatting capabilities that ASP.NET server controls use when rendering HTML content to clients.

This class is commonly used to render HTML to a Web Forms page. Use it as an output stream when you override the System.Web.UI.Control.Render(System.Web.UI.HtmlTextwriter), System.Web.UI.LiteralControl.Render(System.Web.UI.HtmlTextwriter), and other ASP.NET server control methods that write content to a Web page.

WriteStyleAttribute

Description

Represents the characters that make up the default tab.

WriteStyleAttribute

[C#] public const char DoubleQuoteChar;

[C++] public: const _wchar_t DoubleQuoteChar;

[VB] Public Const DoubleQuoteChar As Char

[JScript] public var DoubleQuoteChar: Char;

Description

Represents a double-quote character.

WriteStyleAttribute

[C#] public const string EndTagLeftChars;

[C++] public: const String* EndTagLeftChars;

[VB] Public Const EndTagLeftChars As String

[JScript] public var EndTagLeftChars: String;

Description

Represents the left angle bracket and closing forward slash for a closing tag of an HTML element.

WriteStyleAttribute

[C#] public const char EqualsChar;

[C++] public: const _wchar_t EqualsChar;

[VB] Public Const EqualsChar As Char

[JScript] public var EqualsChar: Char;

Description

Represents the equal sign character.

WriteStyleAttribute

[C#] public const string EqualsDoubleQuoteString;

[C++] Public: const String* EqualsDoubleQuoteString;

[VB] Public Const EqualsDoubleQuoteString As String

[JScript] public var EqualsDoubleQuoteString: String;

Description

Represents an equal sign, a forward slash, and a double quote character together in a System.String.

WriteStyleAttribute

[C#] public const string SelfClosingChars;

[C++] public: const String* SelfClosingChars;

[VB] Public Const SelfClosingChars As String

[JScript] public var SelfClosingChars: String;

Description

Represents the self-closing forward slash character of an HTML tag.

This charcter is used in HTML elements that are self-closed. For example,.

WriteStyleAttribute

[C#] public const string SelfClosingTagEnd;

[C++] public: const String* SelfClosingTagEnd;

[VB] Public Const SelfClosingTagEnd As String

[JScript] public var SelfClosingTagEnd: String;

Description

Represents the closing forward slash and right angle bracket of a self-closing HTML element.

WriteStyleAttribute

[C#] public const char SemicolonChar;

[C++] public: const __wchar_t SemicolonChar;

[VB] Public Const SemicolonChar As Char

[JScript] public var SemicolonChar: Char;

Description

Represents the semicolon character.

WriteStyleAttribute

[C#] public const char SingleQuoteChar;

[C++] public: const _wchar_t SingleQuoteChar;

[VB] Public Const SingleQuoteChar As Char

[JScript] public var SingleQuoteChar: Char;

Description

Represents a single quote character.

WriteStyleAttribute

[C#] public const char SlashChar;

[C++] public: const _wchar_t SlashChar;

[VB] Public Const SlashChar As Char

[JScript] public var SlashChar: Char;

Description

Represents the backslash character.

WriteStyleAttribute

[C#] public const char SpaceChar;

[C++] public: const _wchar_t SpaceChar;

[VB] Public Const SpaceChar As Char

[JScript] public var SpaceChar: Char;

Description

Represents a space character.

WriteStyleAttribute

[C#] public const char StyleEqualsChar;

[C++] public: const _wchar_t StyleEqualsChar;

[VB] Public Const StyleEqualsChar As Char

[JScript] public var StyleEqualsChar: Char;

Description

Represents the colon character.

WriteStyleAttribute

[C#] public const char TagLeftChar;

[C++] public: const _wchar_t TagLeftChar;

[VB] Public Const TagLeftChar As Char

[JScript] public var TagLeftChar: Char;

Description

Represents the opening angle-bracket character of an HTML tag.

WriteStyleAttribute

[C#] public const char TagRightChar;

[C++] public: const _wchar_t TagRightChar;

[VB] Public Const TagRightChar As Char

[JScript] public var TagRightChar: Char;

Description

Represents the closing angle-bracket character of an HTML tag.

HtmlTextWriter

Example Syntax:

WriteStyleAttribute

[C#] public HtmlTextWriter(TextWriter writer);

[C++] public: HtmlTextWriter(TextWriter* writer);

[VB] Public Sub New(ByVal writer As TextWriter)

[JScript] public function HtmlTextWriter(writer: TextWriter); Initializes a new instance of the System.Web.UI.HtmlTextWriter class.

Description

Initializes a new instance of the System.Web.UI.HtmlTextWriter class that uses the System.Web.UI.HtmlTextWriter.DefaultTabString constant when indentation of a line is necessary. The System.IO.TextWriter object to render the HMTL content.

HtmlTextWriter

Example Syntax:

WriteStyleAttribute

[C#] public HtmlTextWriter(TextWriter writer, string tabString);

[C++] public: HtmlTextWriter(TextWriter* writer, String* tab String);

[VB] Public Sub New(ByVal writer As TextWriter, ByVal tabString As String)

[JScript] public function HtmlTextWriter(writer: TextWriter, tabString: String);

Description

Initializes a new instance of the System.Web.UI.HtmlTextWriter class with the line indenation as specified in the tabString parameter. The System.IO.TextWriter object to render the HMTL content. A System.String that represents the number of spaces defined in the System.Web.UI.HtmlTextWriter.Indent property.

Encoding

WriteStyleAttribute

[C#] public override Encoding Encoding {get;}

[C++] public: _property virtual Encoding* get_Encoding( );

[VB] Overrides Public ReadOnly Property Encoding As Encoding

[JScript] public function get Encoding( ): Encoding;

Description

Gets the System.Text.Encoding that the System.Web.UI.HtmlTextWriter object uses to write content to the page.

FormatProvider

Indent

WriteStyleAttribute

Description

Gets or sets the number of spaces to indent at the beginning of a line.

InnerWriter

WriteStyleAttribute

[C#] public TextWriter InnerWriter {get; set;}

[C++] public: _property TextWriter* get_InnerWriter( );public: _property void set_InnerWriter(TextWriter*);

[VB] Public Property InnerWriter As TextWriter

[JScript] public function get InnerWriter( ): TextWriter;public function set InnerWriter(TextWriter);

Description

Gets the text writer that writes the inner content of the HTML element.

NewLine

WriteStyleAttribute

[C#] public override string NewLine {get; set;}

[C++] public: _property virtual String* get_NewLine( );public: _property virtual void set_NewLine(String*);

[VB] Overrides Public Property NewLine As String

[JScript] public function get NewLine( ): String;public function set NewLine(String);

Description

Gets or sets the line terminator string used by the current System.Web.UI.HtmlTextWriter.

The default line terminator string is a carriage return followed by a line feed ("\r\n").

TagKey

WriteStyleAttribute

[C#] protected HtmlTextWriterTag TagKey {get; set;}

[C++] protected: _property HtmlTextWriterTag get_TagKey( );protected: _property void set_TagKey(HtmlTextWriterTag);

[VB] Protected Property TagKey As HtmlTextWriterTag

[JScript] protected function get TagKey( ): HtmlTextWriterTag;protected function set TagKey(HtmlTextWriterTag);

Description

Gets or sets the System.Web.UI.HtmlTextWriterTag value for the specified HTML element.

TagName

WriteStyleAttribute

[C#] protected string TagName {get; set;}

[C++] protected: _property String* get_TagName( );protected: _property void set_TagName(String*);

[VB] Protected Property TagName As String

[JScript] protected function get TagName( ): String;protected function set TagName(String);

Description

Gets or sets the name of the HTML element to be written to the rendered page.

AddAttribute

[C#] public virtual void AddAttribute(HtmlTextWriterAttribute key, string value);

[C++] public: virtual void AddAttribute(HtmlTextWriterAttribute key, String* value);

[VB] Overridable Public Sub AddAttribute(ByVal key As HtmlTextWriterAttribute, ByVal value As String)

[JScript] public function AddAttribute(key: HtmlTextWriterAttribute, value: String);

Description

Adds the HTML attribute associated with the specified System.Web.UI.HtmlTextWriterAttribute key and the specified value to the System.Web.UI.HtmlTextWriter output stream. An HtmlTextWriterAttribute value that represents the HTML attribute. The value to assign to the HTML attribute.

AddAttribute

[C#] public virtual void AddAttribute(string name, string value);

[C++] public: virtual void AddAttribute(String* name, String* value);

[VB] Overridable Public Sub AddAttribute(ByVal name As String, ByVal value As String)

[JScript] public function AddAttribute(name: String, value: String); Adds an HTML attribute and its value to an System.Web.UI.HtmlTextWriter output stream to be rendered on a client.

Description

Adds the specified HTML attribute and value to the HtmlTextWriter output stream. The HTML attribute to add. The value to assign to the HTML attribute.

AddAttribute

[C#] public virtual void AddAttribute(HtmlTextWriterAttribute key, string value, bool fEncode);

[C++] public: virtual void AddAttribute(HtmlTextWriterAttribute key, String* value, bool fEncode);

[VB] Overridable Public Sub AddAttribute(ByVal key As HtmlTextWriterAttribute, ByVal value As String, ByVal fEncode As Boolean)

[JScript] public function AddAttribute(key: HtmlTextWriterAttribute, value: String, fEncode: Boolean);

Description

Adds the HTML attribute associated with the System.Web.UI.HtmlTextWriterAttribute value specified by the key parameter, the specified attribute value, and a value that indicates if the attribute and value should be HTML encoded to the System.Web.UI.HtmlTextWriter output stream. An HtmlTextWriterAttribute value that represents the HTML attribute. The value to assign to the HTML attribute. true to HTML encode the attribute and its value; otherwise, false.

AddAttribute

[C#] public virtual void AddAttribute(string name, string value, bool fEndode);

[C++] public: virtual void AddAttribute(String* name, String* value, bool fEndode);

[VB] Overridable Public Sub AddAttribute(ByVal name As String, ByVal value As String, ByVal fEndode As Boolean)

[JScript] public function AddAttribute(name: String, value: String, fEndode: Boolean);

Description

Adds the specified HTML attribute and value to the HtmlTextWriter output stream, with a value that indicates if the attribute and value should be HTML encoded. The HTML attribute to add. The value to assign to the HTML attribute. true to HTML encode the attribute and its value; otherwise, false.

AddAttribute

[C#] protected virtual void AddAttribute(string name, string value, HtmlTextWriterAttribute key);

[C++] protected: virtual void AddAttribute(String* name, String* value, HtmlTextWriterAttribute key);

[VB] Overridable Protected Sub AddAttribute(ByVal name As String, ByVal value As String, ByVal key As HtmlTextWriterAttribute)

[JScript] protected function AddAttribute(name: String, value: String, key: HtmlTextWriterAttribute);

Description

Adds the specified HTML attribute and its value, along with an System.Web.UI.HtmlTextWriterAttribute value, to the HtmlTextWriter output stream. The HTML attribute to add. The value to assign to the HTML attribute. An HtmlTextWriterAttribute value that represents the HTML attribute.

AddStyleAttribute

[C#] public virtual void AddStyleAttribute(HtmlTextWriterStyle key, string value);

[C++] public: virtual void AddStyleAttribute(HtmlTextWriterStyle key, String* value);

[VB] Overridable Public Sub AddStyleAttribute(ByVal key As HtmlTextWriterStyle, ByVal value As String)

[JScript] public function AddStyleAttribute(key: HtmlTextWriterStyle, value: String);

Description

Adds the HTML style attribute associated with the System.Web.UI.HtmlTextWriterStyle value specified by the key parameter and the attribute's value to the System.Web.UI.HtmlTextWriter output stream. An HtmlTextWriterStyle value that represents the HTML style attribute to add. The value to assign to the HTML attribute.

AddStyleAttribute

[C#] public virtual void AddStyleAttribute(string name, string value);

[C++] public: virtual void AddStyleAttribute(String* name, String* value);

[VB] Overridable Public Sub AddStyleAttribute(ByVal name As String, ByVal value As String)

[JScript] public function AddStyleAttribute(name: String, value: String); Adds an HTML style attribute to the to the System.Web.UI.HtmlTextWriter output stream.

Description

Adds the specified HTML style attribute and its value to the System.Web.UI.HtmlTextWriter output stream. The HTML style attribute to add. The value assigned to the HTML style attribute.

AddStyleAttribute

[C#] protected virtual void AddStyleAttribute(string name, string value, HtmlTextWriterStyle key);

[C++] protected: virtual void AddStyleAttribute(String* name, String* value, HtmlTextWriterStyle key);

[VB] Overridable Protected Sub AddStyleAttribute(ByVal name As String, ByVal value As String, ByVal key As HtmlTextWriterStyle)

[JScript] protected function AddStyleAttribute(name: String, value: String, key: HtmlTextWriterStyle);

Description

Adds the specified HTML style attribute, along with its value, to the System.Web.UI.HtmlTextWriter output stream. The HTML style attribute to add to the output stream. The value to assign to the HTML attribute. An System.Web.UI.HtmlTextWriterStyle value that represents the HTML style attribute to add.

Close

[C#] public override void Close( );

[C++] public: void Close( );

[VB] Overrides Public Sub Close( )

[JScript] public override function Close( );

Description

Closes the current System.Web.UI.HtmlTextWriter and releases any system resources associated with it.

This implementation of Close calls the System.IO.TextWriter method passing a true value.

EncodeAttributeValue

[C#] protected virtual string EncodeAttributeValue(HtmlTextWriterAttribute attrKey, string value);

[C++] protected: virtual String* EncodeAttributeValue(HtmlTextWriterAttribute attrKey, String* value);

[VB] Overridable Protected Function EncodeAttributeValue (ByVal attrKey As HtmlTextWriterAttribute, ByVal value As String) As String

[JScript] protected function EncodeAttributeValue(attrKey: HtmlTextWriterAttribute, value: String): String;

Description

HTML encodes the specified HTML attribute's value.

Return Value: The encoded attribute value. An System.Web.UI.HtmlTextWriterAttribute value representing the HTML attribute to which the value parameter is assigned. The value assigned to the specified HTML attribute.

EncodeAttributeValue

[C#] protected string EncodeAttributeValue(string value, bool fEncode);

[C++] protected: String* EncodeAttributeValue(String* value, bool fEncode);

[VB] Protected Function EncodeAttributeValue(ByVal value As String, ByVal fEncode As Boolean) As String

[JScript] protected function EncodeAttributeValue(value: String, fEncode: Boolean): String; HTML encodes the specified HTML attribute's value.

Description

HTML encodes the specified HTML attribute's value.

Return Value: The HTML-encoded attribute value, null if the value parameter is empty, or the unencoded attribute value if fEncode is false. The attribute value to encode. true to HTML encode the attribute value; otherwise, false.

EncodeUrl

[C#] protected string EncodeUrl(string url);

[C++] protected: String* EncodeUrl(String* url);

[VB] Protected Function EncodeUrl(ByVal url As String) As String

[JScript] protected function EncodeUrl(url: String): String;

Description

Performs minimal URL encoding by converting spaces passed in the url parameter to "%20".

Return Value: The encoded URL. The URL to be encoded.

FilterAttributes

[C#] protected virtual void FilterAttributes( );

[C++] protected: virtual void FilterAttributes( );

[VB] Overridable Protected Sub FilterAttributes( )

[JScript] protected function FilterAttributes( );

Description

Renders all HTML attributes and style attributes by calling System.Web.UI.HtmlTextwriter.OnAttributeRender(System.String,System.String,System.Web.UI.HtmlTextWriterAttribute) and System.Web.UI.HtmlTextwriter.OnStyleAttributeRender(System.String,System.String, System.Web.UI.HtmlTextWriterStyle)on all properties of the page or ASP.NET server control.

Flush

[C#] public override void Flush( );

[C++] public: void Flush( );

[VB] Overrides Public Sub Flush( )

[JScript] public override function Flush( );

Description

Clears all buffers for the current System.Web.UI.HtmlTextWriter and causes any buffered data to be written to the text stream.

GetAttributeKey

[C#] protected HtmlTextWriterAttribute GetAttributeKey (string attrName);

[C++] protected: HtmlTextWriterAttribute GetAttributeKey (String* attrName);

[VB] Protected Function GetAttributeKey(ByVal attrName As String) As HtmlTextWriterAttribute

[JScript] protected function GetAttributeKey(attrName: String): HtmlTextWriterAttribute;

Description

Obtains the corresponding System.Web.UI.HtmlTextWriterAttribute enumeration value for the specified HTML attribute.

Return Value: The HtmlTextWriterAttribute enumeration value for the specified HTML attribute. The HTML attribute to obtain the HtmlTextWriterAttribute value for.

GetAttributeName

[C#] protected string GetAttributeName(HtmlTextWriterAttribute attrKey);

[C++] protected: String* GetAttributeName(HtmlTextWriterAttribute attrKey);

[VB] Protected Function GetAttributeName(ByVal attrKey As HtmlTextWriterAttribute) As String

[JScript] protected function GetAttributeName(attrKey: HtmlTextWriterAttribute): String;

Description

Obtains the name of the HTML attribute associated with the specified System.Web.UI.HtmlTextWriterAttribute value.

Return Value: The name of the HTML attribute. The HtmlTextWriterAttribute to obtain the HTML attribute name for.

GetStyleKey

[C#] protected HtmlTextWriterStyle GetStyleKey(string styleName);

[C++] protected: HtmlTextWriterStyle GetStyleKey(String* styleName);

[VB] Protected Function GetStyleKey(ByVal styleName As String) As HtmlTextWriterStyle

[JScript] protected function GetStyleKey(styleName: String): HtmlTextWriterStyle;

Description

Obtains the System.Web.UI.HtmlTextWriterStyle enumeration value for the specified HMTL style.

Return Value: The HtmlTextWriterStyle value. The HTML style attribute to obtain the HtmlTextWriterStyle value for.

GetStyleName

[C#] protected string GetStyleName(HtmlTextWriterStyle styleKey);

[C++] protected: String* GetStyleName(HtmlTextWriterStyle styleKey);

[VB] Protected Function GetStyleName(ByVal styleKey As HtmlTextWriterStyle) As String

[JScript] protected function GetStyleName(styleKey: HtmlTextWriterStyle): String;

Description

Obtains the HTML style attribute associated with the specified System.Web.UI.HtmlTextWriterStyle enumeration value.

Return Value: The HTML style attribute. The HtmlTextWriterStyle value to obtain the HTML style attribute for.

GetTagKey

[C#] protected virtual HtmlTextWriterTag GetTagKey(string tagName);

[C++] protected: virtual HtmlTextWriterTag GetTagKey (String* tagName);

[VB] Overridable Protected Function GetTagKey(ByVal tagName As String) As HtmlTextWriterTag

[JScript] protected function GetTagKey(tagName: String): HtmlTextWriterTag;

Description

Obtains the System.Web.UI.HtmlTextWriterTag enumeration value associated with the specified HTML element.

Return Value: The HtmlTextWriterTag value; if the tagName parameter is not associated with a specific HtmlTextWriterTag value, HtmlTextWriterTag.Unknown is returned. The HTML element to obtain the HtmlTextWriterTag value for.

GetTagName

[C#] protected virtual string GetTagName(HtmlTextWriterTag tagKey);

[C++] protected: virtual String* GetTagName(HtmlTextWriterTag tagKey);

[VB] Overridable Protected Function GetTagName(ByVal tagKey As HtmlTextWriterTag) As String

[JScript] protected function GetTagName(tagKey: HtmlTextWriterTag): String;

Description

Obtains the HTML element associated with the specified System.Web.UI.HtmlTextWriterTag enumeration value.

Return Value: The HTML element. The HtmlTextWriterTag value to obtain the HTML element for.

IsAttributeDefined

[C#] protected bool IsAttributeDefined(HtmlTextWriterAttribute key);

[C++] protected: bool IsAttributeDefined(HtmlTextWriterAttribute key);

[VB] Protected Function IsAttributeDefined(ByVal key As HtmlTextWriterAttribute) As Boolean

[JScript] protected function IsAttributeDefined(key: HtmlTextWriterAttribute): Boolean; Determines whether an HTML attribute is recognized as one of the System.Web.UI.HtmlTextWriterAttribute values.

Description

Determines whether the specified HTML attribute is recognized.

Return Value: true if the HTML attribute is associated with one of the HtmlTextWriterAttribute values; otherwise, false. The System.Web.UI.HtmlTextWriterAttribute associated with the HTML attribute.

IsAttributeDefined

[C#] protected bool IsAttributeDefined(HtmlTextWriterAttribute key, out string value);

[C++] protected: bool IsAttributeDefined(HtmlTextWriterAttribute key, String** value);

[VB] Protected Function IsAttributeDefined(ByVal key As HtmlTextWriterAttribute, ByRef value As String) As Boolean

[JScript] protected function IsAttributeDefined(key: HtmlTextWriterAttribute, value: String): Boolean;

Description

Determines whether the specified HTML attribute is recognized.

Return Value: true if the HTML attribute is associated with one of the HtmlTextWriterAttribute values; otherwise, false. The System.Web.UI.HtmlTextWriterAttribute associated with the HTML attribute. The value assigned to the HTML attribute.

IsStyleAttributeDefined

[C#] protected bool IsStyleAttributeDefined(HtmlTextWriterStyle key);

[C++] protected: bool IsStyleAttributeDefined(HtmlTextWriterStyle key);

[VB] Protected Function IsStyleAttributeDefined(ByVal key As HtmlTextWriterStyle) As Boolean

[JScript] protected function IsStyleAttributeDefined(key: HtmlTextWriterStyle): Boolean; Determines whether an HTML style attribute is recognized as one of the System.Web.UI.HtmlTextWriterStyle values.

Description

Determines whether the specified HTML style attribute is recognized.

Return Value: true if the HTML attribute is associated with one of the HtmlTextWriterStyle values; otherwise, false. The System.Web.UI.HtmlTextWriterStyle value associated with the HTML attribute.

IsStyleAttributeDefined

[C#] protected bool IsStyleAttributeDefined(HtmlTextWriterStyle key, out string value);

[C++] protected: bool IsStyleAttributeDefined(HtmlTextWriterStyle key, String** value);

[VB] Protected Function IsStyleAttributeDefined(ByVal key As HtmlTextWriterStyle, ByRef value As String) As Boolean

[JScript] protected function IsStyleAttributeDefined(key: HtmlTextWriterStyle, value: String): Boolean;

Description

Determines whether the specified HTML style attribute is recognized.

Return Value: true if the HTML attribute is associated with one of the HtmlTextWriterStyle values; otherwise, false. The System.Web.UI.HtmlTextWriterStyle value associated with the HTML attribute. The value assigned to the HTML style attribute.

OnAttributeRender

[C#] protected virtual bool OnAttributeRender(string name, string value, HtmlTextWriterAttribute key);

[C++] protected: virtual bool OnAttributeRender(String* name, String* value, HtmlTextWriterAttribute key);

[VB] Overridable Protected Function OnAttributeRender (ByVal name As String, ByVal value As String, ByVal key As HtmlTextWriterAttribute) As Boolean

[JScript] protected function OnAttributeRender(name: String, value: String, key: HtmlTextWriterAttribute): Boolean;

Description

Determines whether the specified HTML attribute and its value have been rendered to the requesting page.

Return Value: true if the attribute has been rendered to the page; otherwise, false. The HTML attribute to render. The value that is assigned to the HTML attribute. The System.Web.UI.HtmlTextWriterAttribute enumeration value associated with the HTML attribute.

OnStyleAttributeRender

[C#] protected virtual bool OnStyleAttributeRender(string name, string value, HtmlTextWriterStyle key);

[C++] protected: virtual bool OnStyleAttributeRender (String* name, String* value, HtmlTextWriterStyle key);

[VB] Overridable Protected Function OnStyleAttributeRender(ByVal name As String, ByVal value As String, ByVal key As HtmlTextWriterStyle) As Boolean

[JScript] protected function OnStyleAttributeRender(name: String, value: String, key: HtmlTextWriterStyle): Boolean;

Description

Determines whether the specified HTML style attribute and its value have been rendered to the requesting page.

Return Value: true if the HTML style attribute has been rendered to the page; otherwise, false. The HTML style attribute to render. The value that is assigned to the HTML style attribute. The System.Web.UI.HtmlTextWriterStyle enumeration value associated with the HTML style attribute.

OnTagRender

[C#] protected virtual bool OnTagRender(string name, HtmlTextWriterTag key);

[C++] protected: virtual bool OnTagRender(String* name, HtmlTextWriterTag key);

[VB] Overridable Protected Function OnTagRender(ByVal name As String, ByVal key As HtmlTextWriterTag) As Boolean

[JScript] protected function OnTagRender(name: String, key: HtmlTextWriterTag): Boolean;

Description

Determines whether the specified HTML element has been rendered to the requesting page.

Return Value: true if the HTML element has been rendered to the page; otherwise, false. The HTML element to render. The System.Web.UI.HtmlTextWriterTag enumeration value associated with the HTML element.

OutputTabs

[C#] protected virtual void OutputTabs( );

[C++] protected: virtual void OutputTabs( );

[VB] Overridable Protected Sub OutputTabs( )

[JScript] protected function OutputTabs( );

Description

Writes a series of blank characters that represent the tab spacing for a line of HTML characters.

This method uses the integer passed to the System.Web.UI.HtmlTextWriter.Indent property to determine how many spaces to write for the tab spacing.

PopEndTag

[C#] protected string PopEndTag( );

[C++] protected: String* PopEndTag( );

[VB] Protected Function PopEndTag( ) As String

[JScript] protected function PopEndTag( ): String;

Description

Retrieves the appropriate closing tag for the HTML element to render to the page.

Return Value: The appropriate closing tag for the HTML element.

PushEndTag

[C#] protected void PushEndTag(string endTag);

[C++] protected: void PushEndTag(String* endTag);

[VB] Protected Sub PushEndTag(ByVal endTag As String)

[JScript] protected function PushEndTag(endTag: String);

Description

Associates the specified closing tag of an HTML element with the appropriate HTML text. The closing tag to be associated.

RegisterAttribute

[C#] protected static void RegisterAttribute(string name, HtmlTextWriterAttribute key);

[C++] protected: static void RegisterAttribute(String* name, HtmlTextWriterAttribute key);

[VB] Protected Shared Sub RegisterAttribute(ByVal name As String, ByVal key As HtmlTextWriterAttribute)

[JScript] protected static function RegisterAttribute(name: String, key: HtmlTextWriterAttribute);

Description

Registers HTML attributes, whether literals or dynamically generated, from the source file so that they can be properly rendered to the requesting client. The HTML attribute to be registered. An System.Web.UI.HtmlTextWriterAttribute value that corresponds to the attribute name.

RegisterStyle

[C#] protected static void RegisterStyle(string name, HtmlTextWriterStyle key);

[C++] protected: static void RegisterStyle(String* name, HtmlTextWriterStyle key);

[VB] Protected Shared Sub RegisterStyle(ByVal name As String, ByVal key As HtmlTextWriterStyle)

[JScript] protected static function RegisterStyle(name: String, key: HtmlTextWriterStyle);

Description

Registers HTML style properties, whether literals or dynamically generated, from the source file so that they can be properly rendered to the requesting client. The System.String passed from the source file specifying the style name. The System.Web.UI.HtmlTextWriterStyle value that corresponds to the specified style.

RegisterTag

[C#] protected static void RegisterTag(string name, HtmlTextWriterTag key);

[C++] protected: static void RegisterTag(String* name, HtmlTextWriterTag key);

[VB] Protected Shared Sub RegisterTag(ByVal name As String, ByVal key As HtmlTextWriterTag)

[JScript] protected static function RegisterTag(name: String, key: HtmlTextWriterTag);

Description

Registers HTML tags, whether literals or dynamically generated, from the source file so that they can be properly rendered to the requesting client. A System.String that contains the HTML tag. An System.Web.UI.HtmlTextWriterTag value that specifies which element is to be rendered.

RenderAfterContent

[C#] protected virtual string RenderAfterContent( );

[C++] protected: virtual String* RenderAfterContent( );

[VB] Overridable Protected Function RenderAfterContent( ) As String

[JScript] protected function RenderAfterContent( ): String;

Description

Writes any text or spacing that occurs after the content of the HTML element to the System.Web.UI.HtmlTextWriter output stream.

Return Value: The spacing or text to write prior to the content of the HTML element. If not overridden, this method returns null.

RenderAfterTag

[C#] protected virtual string RenderAfterTag( );

[C++] protected: virtual String* RenderAfterTag( );

[VB] Overridable Protected Function RenderAfterTag( ) As String

[JScript] protected function RenderAfterTag( ): String;

Description

Writes any spacing or text that occurs after an HTML element's closing tag.

Return Value: The spacing or text to write after the closing tag of the HTML element. If not overridden, this method returns null.

RenderBeforeContent

[C#] protected virtual string RenderBeforeContent( );

[C++] protected: virtual String* RenderBeforeContent( );

[VB] Overridable Protected Function RenderBeforeContent( ) As String

[JScript] protected function RenderBeforeContent( ): String;

Description

Writes any tab spacing before the content contained in an HTML element.

Return Value: The spacing to write prior to the content of the HTML element. If not overridden, this method returns null.

RenderBeforeTag

[C#] protected virtual string RenderBeforeTag( );

[C++] protected: virtual String* RenderBeforeTag( );

[VB] Overridable Protected Function RenderBeforeTag( ) As String

[JScript] protected function RenderBeforeTag( ): String;

Description

Writes any text or tab spacing that occurs before the opening tag of an HTML element to the System.Web.UI.HtmlTextWriter output stream.

Return Value: The text or tab spacing to write to the output stream. If not overridden, this method returns null.

RenderBeginTag

[C#] public virtual void RenderBeginTag(HtmlTextWriterTag tagKey);

[C++] public: virtual void RenderBeginTag(HtmlTextWriterTag tagKey);

[VB] Overridable Public Sub RenderBeginTag(ByVal tagKey As HtmlTextWriterTag)

[JScript] public function RenderBeginTag(tagKey: HtmlTextWriterTag);

Description

Writes the opening tag of the HTML element associated with the specified System.Web.UI.HtmlTextWriterTag enumeration value to the output stream. An HtmlTextWriterTag value that defines the opening tag of the HTML element to render.

RenderBeginTag

[C#] public virtual void RenderBeginTag(string tagName);

[C++] public: virtual void RenderBeginTag(String* tagName);

[VB] Overridable Public Sub RenderBeginTag(ByVal tagName As String)

[JScript] public function RenderBeginTag(tagName: String);

Writes the opening tag of an HTML element to the System.Web.UI.HtmlTextWriter output stream.

Description

Writes the opening tag of the specified HTML element to the output stream. The HTML element to render the opening tag for.

RenderEndTag

[C#] public virtual void RenderEndTag( );

[C++] public: virtual void RenderEndTag( );

[VB] Overridable Public Sub RenderEndTag( )

[JScript] public function RenderEndTag( );

Description

Writes the end tag of an HTML element to the System.Web.UI.HtmlTextWriter output stream.

Write

[C#] public override void Write(bool value);

[C++] public: void Write(bool value);

[VB] Overrides Public Sub Write(ByVal value As Boolean)

[JScript] public override function Write(value: Boolean);

Description

Writes the text representation of a Boolean value to the text stream, along with any specified tab spacing. The Boolean value to be written to the text stream.

Write

[C#] public override void Write(char value);

[C++] public: void Write(_wchar_t value);
[VB] Overrides Public Sub Write(ByVal value As Char)
[JScript] public override function Write(value: Char);

Description

Writes a unicode character to the text stream, along with any specified tab spacing. The unicode character to write to the text stream.

Write
[C#] public override void Write(char[ ] buffer);
[C++] public: void Write(_wchar_t buffer _gc[ ]);
[VB] Overrides Public Sub Write(ByVal buffer( ) As Char)
[JScript] public override function Write(buffer: Char[ ]);

Description

Writes a character array to the text stream, along with any specified tab spacing. The character array to write to the text stream.

Write
[C#] public override void Write(double value);
[C++] public: void Write(double value);
[VB] Overrides Public Sub Write(ByVal value As Double)
[JScript] public override function Write(value: double);

Description

Writes the text representation of a double-precision floating point number to the HTML text stream, along with any specified tab spacing. The double-precision floating point number to write to the text stream.

Write
[C#] public override void Write(int value);
[C++] public: void Write(int value);
[VB] Overrides Public Sub Write(ByVal value As Integer)
[JScript] public override function Write(value: int);

Description

Writes the text representation of a 32-byte signed integer to the text stream, along with any specified tab spacing. The 32-byte signed integer to write to the text stream.

Write
[C#] public override void Write(long value);
[C++] public: void Write(_int64 value);
[VB] Overrides Public Sub Write(ByVal value As Long)
[JScript] public override function Write(value: long);

Description

Writes the text representation of an 64-byte signed integer to the text stream, along with any specified tab spacing. The 64-byte signed integer to write to the text stream.

Write
[C#] public override void Write(object value);
[C++] public: void Write(Object* value);
[VB] Overrides Public Sub Write(ByVal value As Object)
[JScript] public override function Write(value: Object);

Description

Writes the text representation of an System.Object to the text stream, along with any specified tab spacing. The Object to write to the text stream.

Write
[C#] public override void Write(float value);
[C++] public: void Write(float value);
[VB] Overrides Public Sub Write(ByVal value As Single)
[JScript] public override function Write(value: float);

Description

Writes the text representation of a single-precision floating point number to the HTML text stream, along with any specified tab spacing. The single-precision floating point number to write to the text stream.

Write
[C#] public override void Write(string s);
[C++] public: void Write(String* s);
[VB] Overrides Public Sub Write(ByVal s As String)
[JScript] public override function Write(s: String); Writes the given data type to an HTML text stream to be rendered to an ASP.NET page.

Description

Writes the specified string to the text stream, along with any specified tab spacing. A System.String to be written to the text stream.

Write
[C#] public override void Write(string format, object arg0);
[C++] public: void Write(String* format, Object* arg0);
[VB] Overrides Public Sub Write(ByVal format As String, ByVal arg0 As Object)
[JScript] public override function Write(format: String, arg0: Object);

Description

Writes a tab string and a formatted string to the HTML text stream, using the same semantics as System.String.Format (System.String,System.Object). The formatting string. An object to write into the formatted string.

Write
[C#] public override void Write(string format, params object[ ] arg);
[C++] public: void Write(String* format, Object* arg _gc[ ]);
[VB] Overrides Public Sub Write(ByVal format As String, ByVal ParamArray arg( ) As Object)
[JScript] public override function Write(format: String, arg: Object[ ]);

Description

Writes a tab string and a formatted string to the HTML text stream, using the same semantics as System.String.Format (System.String,System.Object). The formatting string. The object array to write into the formatted string.

Write
[C#] public override void Write(char[ ] buffer, int index, int count);
[C++] public: void Write(_wchar_t buffer _gc[ ], int index, int count);
[VB] Overrides Public Sub Write(ByVal buffer( ) As Char, ByVal index As Integer, ByVal count As Integer)
[JScript] public override function Write(buffer: Char[ ], index: int, count: int);

Description

Writes a subarray of characters to the text stream, along with any specified tab spacing. The array of characters from which the subarray is written to the text stream. The index location in the array where writing begins. The number of characters to be written to the text stream.

Write
[C#] public override void Write(string format, object arg0, object arg1);
[C++] public: void Write(String* format, Object* arg0, Object* arg1);
[VB] Overrides Public Sub Write(ByVal format As String, ByVal arg0 As Object, ByVal arg1 As Object)
[JScript] public override function Write(format: String, arg0: Object, arg1: Object);

Description

Writes a tab string and a formatted string to the HTML text stream, using the same semantics as System.String.Format (System.String,System.Object). The formatting string. An object to write into the formatted string. An object to write into the formatted string.

WriteAttribute

[C#] public virtual void WriteAttribute(string name, string value);

[C++] public: virtual void WriteAttribute(String* name, String* value);

[VB] Overridable Public Sub WriteAttribute(ByVal name As String, ByVal value As String)

[JScript] public function WriteAttribute(name: String, value: String); Writes an HTML attribute and its value to the System.Web.UI.HtmlTextWriter output stream.

Description

Writes the specified HTML attribute and value to the System.Web.UI.HtmlTextWriter output stream. The HTML attribute to write to the output stream. The value assigned to the HTML attribute.

WriteAttribute

[C#] public virtual void WriteAttribute(string name, string value, bool fEncode);

[C++] public: virtual void WriteAttribute(String* name, String* value, bool fEncode);

[VB] Overridable Public Sub WriteAttribute(ByVal name As String, ByVal value As String, ByVal fEncode As Boolean)

[JScript] public function WriteAttribute(name: String, value: String, fEncode: Boolean);

Description

Writes the specified HTML attribute and value to the System.Web.UI.HtmlTextWriter output stream and HTML encodes them if specified in the fEncode parameter. The HTML attribute to write to the output stream. The value assigned to the HTML attribute. true to HTML encode the attribute and its assigned value; otherwise, false.

WriteBeginTag

[C#] public virtual void WriteBeginTag(string tagName);

[C++] public: virtual void WriteBeginTag(String* tagName);

[VB] Overridable Public Sub WriteBeginTag(ByVal tagName As String)

[JScript] public function WriteBeginTag(tagName: String);

Description

Writes any tab spacing and the opening tag of the specified HTML element to the System.Web.UI.HtmlTextWriter output stream.

This method does not write the closing character (>) of the HTML element's opening tag. Use this method with the System.Web.UI.HtmlTextWriter.SelfClosingTagEnd constant when you write HTML elements that are self closing. The HTML element to write the opening tag of.

WriteEndTag

[C#] public virtual void WriteEndTag(string tagName);

[C++] public: virtual void WriteEndTag(String* tagName);

[VB] Overridable Public Sub WriteEndTag(ByVal tagName As String)

[JScript] public function WriteEndTag(tagName: String);

Description

Writes any tab spacing and the closing tag of the specified HTML element. The HTML element to write the closing tag for.

WriteFullBeginTag

[C#] public virtual void WriteFullBeginTag(string tagName);

[C++] public: virtual void WriteFullBeginTag(String* tagName);

[VB] Overridable Public Sub WriteFullBeginTag(ByVal tagName As String)

[JScript] public function WriteFullBeginTag(tagName: String);

Description

Writes any tab spacing and the opening tag of the specified HTML element to the System.Web.UI.HtmlTextWriter output stream.

This method automatically writes the closing character (>) of the opening tag of the HTML element. The HTML element to write.

WriteLine

[C#] public override void WriteLine( );

[C++] public: void WriteLine( );

[VB] Overrides Public Sub WriteLine( )

[JScript] public override function WriteLine( );

Description

Writes a line terminator to the HTML text stream.

WriteLine

[C#] public override void WriteLine(bool value);

[C++] public: void WriteLine(bool value);

[VB] Overrides Public Sub WriteLine(ByVal value As Boolean)

[JScript] public override function WriteLine(value: Boolean);

Description

Writes a tab string and the text representation of a Boolean followed by a line terminator to the HTML text stream. The Boolean to be written to the text stream.

WriteLine

[C#] public override void WriteLine(char value);

[C++] public: void WriteLine(_wchar_t value);

[VB] Overrides Public Sub WriteLine(ByVal value As Char)

[JScript] public override function WriteLine(value: Char);

Description

Writes a tab string and a character followed by a line terminator to the HTML text stream. The character to be written to the text stream.

WriteLine

[C#] public override void WriteLine(char[ ] buffer);

[C++] public: void WriteLine(_wchar_t buffer _gc[ ]);

[VB] Overrides Public Sub WriteLine(ByVal buffers As Char)

[JScript] public override function WriteLine(buffer: Char[ ]);

Description

Writes a tab string and a character array followed by a line terminator to the HTML text stream. The character array to be written to the text stream.

WriteLine

[C#] public override void WriteLine(double value);

[C++] public: void WriteLine(double value);

[VB] Overrides Public Sub WriteLine(ByVal value As Double)

[JScript] public override function WriteLine(value: double);

Description

Writes a tab string and the text representation of an 8-byte floating-point value, followed by a line terminator, to the HTML text stream. The 8-byte floating-point value to write to the text stream.

WriteLine

[C#] public override void WriteLine(int value);

[C++] public: void WriteLine(int value);

[VB] Overrides Public Sub WriteLine(ByVal value As Integer)

[JScript] public override function WriteLine(value: int);

Description

Writes a tab string and the text representation of an 32-byte signed integer, followed by a line terminator, to the HTML text stream. The 32-byte signed integer to write to the text stream.

WriteLine

[C#] public override void WriteLine(long value);

[C++] public: void WriteLine(_int64 value);

[VB] Overrides Public Sub WriteLine(ByVal value As Long)

[JScript] public override function WriteLine(value: long);

Description

Writes a tab string and the text representation of an 64-byte signed integer, followed by a line terminator, to the HTML text stream. The 64-byte signed integer to write to the text stream.

WriteLine

[C#] public override void WriteLine(object value);

[C++] public: Void WriteLine(Object* value);

[VB] Overrides Public Sub WriteLine(ByVal value As Object)

[JScript] public override function WriteLine(value: Object);

Description

Writes any tab strings and the text representation of an System.Object, followed by a line terminator, to the HTML text stream. The Object to write to the text stream.

WriteLine

[C#] public override void WriteLine(float value);

[C++] public: void WriteLine(float value);

[VB] Overrides Public Sub WriteLine(ByVal value As Single)

[JScript] public override function WriteLine(value: float);

Description

Writes a tab string and the text representation of a single-precision floating point number, followed by a line terminator, to the HTML text stream. The single-precision floating point number to write to the text string.

WriteLine

[C#] public override void WriteLine(string s);

[C++] public: void WriteLine(String* s);

[VB] Overrides Public Sub WriteLine(ByVal s As String)

[JScript] public override function WriteLine(s: String); Writes some data to an HTML text stream as specified by the overloaded parameters, followed by a line terminator. All instances of this method write tab strings to the text stream.

Description

Writes a tab string and a System.String followed by a line terminator to an HTML text stream. The String to write to the text stream.

WriteLine

[C#] public override void WriteLine(uint value);

[C++] public: void WriteLine(unsigned int value);

[VB] Overrides Public Sub WriteLine(ByVal value As UInt32)

[JScript] public override function WriteLine(value: UInt32);

Description

Writes any tab strings and the text representation of a 4-byte unsigned integer followed by a line terminator to the HTML text stream. The 4-byte unsigned integer to write.

WriteLine

[C#] public override void WriteLine(string format, object arg0);

[C++] public: void WriteLine(String* format, Object* arg0);

[VB] Overrides Public Sub WriteLine(ByVal format As String, ByVal arg0 As Object)

[JScript] public override function WriteLine(format: String, arg0: Object);

Description

Writes any tab strings and a formatted string, followed by a line terminator, to the HTML text stream. The method uses the same semantics as System.String.Format(System.String, System.Object). The formatting string. The object to write into the formatted string.

WriteLine

[C#] public override void WriteLine(string format, params object[ ] arg);

[C++] public: void WriteLine(String* format, Object* arg _gc[ ]);

[VB] Overrides Public Sub WriteLine(ByVal format As String, ByVal ParamArray arg( ) As Object)

[JScript] public override function WriteLine(format: String, arg: Object[ ]);

Description

Writes any tab strings and a formatted string, followed by a line terminator, to the HTML text stream. The method uses the same semantics as System.String.Format(System.String, System.Object). The formatting string. The array of objects to write into the formatted string.

WriteLine

[C#] public override void WriteLine(char[ ] buffer, int index, int count);

[C++] public: void WriteLine(_wchar_t buffer _gc[ ], int index, int count);

[VB] Overrides Public Sub WriteLine(ByVal buffers As Char, ByVal index As Integer, ByVal count As Integer)

[JScript] public override function WriteLine(buffer: Char[ ], index: int, count: int);

Description

Writes a tab string and a subarray of characters followed by a line terminator to the HTML text stream. The character array from which to write to the text stream. The location in the character array where writing begins. The number of characters in the array to write to the text stream.

WriteLine

[C#] public override void WriteLine(string format, object arg0, object arg1);

[C++] public: void WriteLine(String* format, Object* arg0, Object* arg1);

[VB] Overrides Public Sub WriteLine(ByVal format As String, ByVal arg0 As Object, ByVal arg1 As Object)

[JScript] public override function WriteLine(format: String, arg0: Object, arg1: Object);

Description

Writes any tab strings and a formatted string, followed by a line terminator, to the HTML text stream. The method uses the same semantics as System.String.Format(System.String, System.Object). The formatting string. An object to write into the formatted string. An object to write into the formatted string.

WriteLineNoTabs

[C#] public void WriteLineNoTabs(string s);

[C++] public: Void WriteLineNoTabs(String* s);

[VB] Public Sub WriteLineNoTabs(ByVal s As String)

[JScript] public function WriteLineNoTabs(s: String);

Description

Writes a System.String followed by a line terminator to an HTML text stream. This method ignores any specified tab spacing. The String to write to the HTML text stream.

WriteStyleAttribute

[C#] public virtual void WriteStyleAttribute(string name, string value);

[C++] public: virtual void WriteStyleAttribute(String* name, String* value);

[VB] Overridable Public Sub WriteStyleAttribute(ByVal name As String, ByVal value As String)

[JScript] public function WriteStyleAttribute(name: String, value: String); Writes an HTML style attribute and its value to the System.Web.UI.HtmlTextWriter output stream.

Description

Writes the specified HTML style attribute to the System.Web.UI.HtmlTextWriter output stream. The HTML style attribute to write to the output stream. The value assigned to the HTML style attribute.

WriteStyleAttribute

[C#] public virtual void WriteStyleAttribute(string name, string value, bool fEncode);

[C++] public: virtual void WriteStyleAttribute(String* name, String* value, bool fEncode);

[VB] Overridable Public Sub WriteStyleAttribute(ByVal name As String, ByVal value As String, ByVal fEncode As Boolean)

[JScript] public function WriteStyleAttribute(name: String, value: String, fEncode: Boolean);

Description

Writes the specified HTML attribute and value to the System.Web.UI.HtmlTextWriter output stream and HTML encodes them if specified in the fEncode parameter. The HTML style attribute to write to the output stream. The value assigned to the HTML style attribute. true to HTML encode the style attribute and its assigned value; otherwise, false.

HtmlTextWriterAttribute enumeration (System.Web.UI)

WriteStyleAttribute

Description

Specifies the HTML attributes that an System.Web.UI.HtmlTextWriter or System.Web.UI.Html32TextWriter object writes to the opening tag of an HTML element when a Web request is processed.

WriteStyleAttribute

[C#] public const HtmlTextWriterAttribute Accesskey;

[C++] public: const HtmlTextWriterAttribute Accesskey;

[VB] Public Const Accesskey As HtmlTextWriterAttribute

[JScript] public var Accesskey: HtmlTextWriterAttribute;

Description

Specifies that the HTML acesskey attribute should be written to the tag.

WriteStyleAttribute

[C#] public const HtmlTextWriterAttribute Align;

[C++] public: const HtmlTextWriterAttribute Align;

[VB] Public Const Align As HtmlTextWriterAttribute

[JScript] public var Align: HtmlTextWriterAttribute;

Description

Specifies that the HTML align attribute should be written to the tag.

WriteStyleAttribute

[C#] public const HtmlTextWriterAttribute Alt;

[C++] public: const HtmlTextWriterAttribute Alt;

[VB] Public Const Alt As HtmlTextWriterAttribute

[JScript] public var Alt: HtmlTextWriterAttribute;

Description

Specifies that the HTML alt attribute should be written to the tag.

WriteStyleAttribute

[C#] public const HtmlTextWriterAttribute Background;

[C++] public: const HtmlTextWriterAttribute Background;

[VB] Public Const Background As HtmlTextWriterAttribute

[JScript] public var Background: HtmlTextWriterAttribute;

Description

Specifies that the HTML background attribute should be written to the tag.

WriteStyleAttribute

[C#] public const HtmlTextWriterAttribute Bgcolor;

[C++] public: const HtmlTextWriterAttribute Bgcolor;

[VB] Public Const Bgcolor As HtmlTextWriterAttribute

[JScript] public var Bgcolor: HtmlTextWriterAttribute;

Description

Specifies that the HTML bgcolor attribute should be written to the tag.

WriteStyleAttribute

[C#] public const HtmlTextWriterAttribute Border;

[C++] Public: const HtmlTextWriterAttribute Border;

[VB] Public Const Border As HtmlTextWriterAttribute

[JScript] public var Border: HtmlTextWriterAttribute;

Description

Specifies that the HTML border attribute should be written to the tag.

WriteStyleAttribute

[C#] public const HtmlTextWriterAttribute Bordercolor;

[C++] public: const HtmlTextWriterAttribute Bordercolor;

[VB] Public Const Bordercolor As HtmlTextWriterAttribute

[JScript] public var Bordercolor: HtmlTextWriterAttribute;

Description

Specifies that the HTML bordercolor attribute should be written to the tag.

WriteStyleAttribute

[C#] public const HtmlTextWriterAttribute Cellpadding;

[C++] public: const HtmlTextWriterAttribute Cellpadding;

[VB] public const Cellpadding As HtmlTextWriterAttribute;

[JScript] public var Cellpadding: HtmlTextWriterAttribute;

Description

Specifies that the HTML cellpadding attribute should be written to the tag.

WriteStyleAttribute

[C#] public const HtmlTextWriterAttribute Cellspacing;

[C++] public: const HtmlTextWriterAttribute Cellspacing;

[VB] Public Const Cellspacing As HtmlTextWriterAttribute

[JScript] public var Cellspacing: HtmlTextWriterAttribute;

Description

Specifies that the HTML cellspacing attribute should be written to the tag.

WriteStyleAttribute

[C#] public const HtmlTextWriterAttribute Checked;

[C++] public: const HtmlTextWriterAttribute Checked;

[VB] Public Const Checked As HtmlTextWriterAttribute

[JScript] public var Checked: HtmlTextWriterAttribute;

Description

Specifies that the HTML checked attribute should be written to the tag.

WriteStyleAttribute

[C#] public const HtmlTextWriterAttribute Class;

[C++] public: const HtmlTextWriterAttribute Class;

[VB] Public Const Class As HtmlTextWriterAttribute
[JScript] public var Class: HtmlTextWriterAttribute;

Description

Specifies that the HTML class attribute should be written to the tag.

WriteStyleAttribute
[C#] public const HtmlTextWriterAttribute Cols;
[C++] public: const HtmlTextWriterAttribute Cols;
[VB] Public Const Cols As HtmlTextWriterAttribute
[JScript] public var Cols: HtmlTextWriterAttribute;

Description

Specifies that the HTML cots attribute should be written to the tag.

WriteStyleAttribute
[C#] public const HtmlTextWriterAttribute Colspan;
[C++] public: const HtmlTextWriterAttribute Colspan;
[VB] Public Const Colspan As HtmlTextWriterAttribute
[JScript] public var Colspan: HtmlTextWriterAttribute;

Description

Specifies that the HTML colspan attribute should be written to the tag.

WriteStyleAttribute
[C#] public const HtmlTextWriterAttribute Disabled;
[C++] public: const HtmlTextWriterAttribute Disabled;
[VB] Public Const Disabled As HtmlTextWriterAttribute
[JScript] public var Disabled: HtmlTextWriterAttribute;

Description

Specifies that the HTML disabled attribute should be written to the tag.

WriteStyleAttribute
[C#] public const HtmlTextWriterAttribute For;
[C++] public: const HtmlTextWriterAttribute For;
[VB] Public Const For As HtmlTextWriterAttribute
[JScript] public var For: HtmlTextWriterAttribute;

Description

Specifies that the HTML for attribute should be written to the tag.

WriteStyleAttribute
[C#] public const HtmlTextWriterAttribute Height;
[C++] public: const HtmlTextWriterAttribute Height;
[VB] Public Const Height As HtmlTextWriterAttribute
[JScript] public var Height: HtmlTextWriterAttribute;

Description

Specifies that the HTML height attribute should be written to the tag.

WriteStyleAttribute
[C#] public const HtmlTextWriterAttribute Href,
[C++] public: const HtmlTextWriterAttribute Href,
[VB] Public Const Href As HtmlTextWriterAttribute
[JScript] public var Href: HtmlTextWriterAttribute;

Description

Specifies that the HTML href attribute should be written to the tag.

WriteStyleAttribute
[C#] public const HtmlTextWriterAttribute Id;
[C++] public: const HtmlTextWriterAttribute Id;
[VB] Public Const Id As HtmlTextWriterAttribute
[JScript] public var Id: HtmlTextWriterAttribute;

Description

Specifies that the HTML id attribute should be written to the tag.

WriteStyleAttribute
[C#] public const HtmlTextWriterAttribute Maxlength;
[C++] public: const HtmlTextWriterAttribute Maxlength;
[VB] Public Const Maxlength As HtmlTextWriterAttribute
[JScript] public var Maxlength: HtmlTextWriterAttribute;

Description

Specifies that the HTML maxlength attribute should be written to the tag.

WriteStyleAttribute
[C#] public const HtmlTextWriterAttribute Multiple;
[C++] Public: const HtmlTextWriterAttribute Multiple;
[VB] Public Const Multiple As HtmlTextWriterAttribute
[JScript] public var Multiple: HtmlTextWriterAttribute;

Description

Specifies that the HTML multiple attribute should be written to the tag.

WriteStyleAttribute
[C#] public const HtmlTextWriterAttribute Name;
[C++] Public: const HtmlTextWriterAttribute Name;
[VB] Public Const Name As HtmlTextWriterAttribute
[JScript] public var Name: HtmlTextWriterAttribute;

Description

Specifies that the HTML name attribute should be written to the tag.

WriteStyleAttribute
[C#] public const HtmlTextWriterAttribute Nowrap;
[C++] public: const HtmlTextWriterAttribute Nowrap;
[VB] Public Const Nowrap As HtmlTextWriterAttribute
[JScript] public var Nowrap: HtmlTextWriterAttribute;

Description

Specifies that the HTML nowrap attribute should be written to the tag.

WriteStyleAttribute
[C#] public const HtmlTextWriterAttribute Onchange;
[C++] public: const HtmlTextWriterAttribute Onchange;
[VB] Public Const Onchange As HtmlTextWriterAttribute
[JScript] public var Onchange: HtmlTextWriterAttribute;

Description

Specifies that the HTML onchange attribute should be written to the tag.

WriteStyleAttribute
[C#] public const HtmlTextWriterAttribute Onclick;
[C++] public: const HtmlTextWriterAttribute Onclick;
[VB] Public Const Onclick As HtmlTextWriterAttribute
[JScript] public var Onclick: HtmlTextWriterAttribute;

Description

Specifies that the HTML onclick attribute should be written to the tag.

WriteStyleAttribute
[C#] public const HtmlTextWriterAttribute ReadOnly;
[C++] public: const HtmlTextWriterAttribute ReadOnly;
[VB] Public Const ReadOnly As HtmlTextWriterAttribute
[JScript] public var ReadOnly: HtmlTextWriterAttribute;

Description

Specifies that the HTML readonly attribute should be written to the tag.

WriteStyleAttribute
[C#] public const HtmlTextWriterAttribute Rows;
[C++] public: const HtmlTextWriterAttribute Rows;
[VB] Public Const Rows As HtmlTextWriterAttribute
[JScript] public var Rows: HtmlTextWriterAttribute;

Description

Specifies that the HTML rows attribute should be written to the tag.

WriteStyleAttribute

[C#] public const HtmlTextWriterAttribute Rowspan;
[C++] public: const HtmlTextWriterAttribute Rowspan;
[VB] Public Const Rowspan As HtmlTextWriterAttribute
[JScript] public var Rowspan: HtmlTextWriterAttribute;

Description

Specifies that the HTML rowspan attribute should be written to the tag.

WriteStyleAttribute

[C#] public const HtmlTextWriterAttribute Rules;
[C++] public: const HtmlTextWriterAttribute Rules;
[VB] Public Const Rules As HtmlTextWriterAttribute
[JScript] public var Rules: HtmlTextWriterAttribute;

Description

Specifies that the HTML rules attribute should be written to the tag.

WriteStyleAttribute

[C#] public const HtmlTextWriterAttribute Selected;
[C++] public: const HtmlTextWriterAttribute Selected;
[VB] Public Const Selected As HtmlTextWriterAttribute
[JScript] public var Selected: HtmlTextWriterAttribute;

Description

Specifies that the HTML selected attribute should be written to the tag.

WriteStyleAttribute

[C#] public const HtmlTextWriterAttribute Size;
[C++] public: const HtmlTextWriterAttribute Size;
[VB] Public Const Size As HtmlTextWriterAttribute
[JScript] public var Size: HtmlTextWriterAttribute;

Description

Specifies that the HTML size attribute should be written to the tag.

WriteStyleAttribute

[C#] public const HtmlTextWriterAttribute Src;
[C++] public: const HtmlTextWriterAttribute Src;
[VB] Public Const Src As HtmlTextWriterAttribute
[JScript] public var Src: HtmlTextWriterAttribute;

Description

Specifies that the HTML src attribute should be written to the tag.

WriteStyleAttribute

[C#] public const HtmlTextWriterAttribute Style;
[C++] Public: const HtmlTextWriterAttribute Style;
[VB] Public Const Style As HtmlTextWriterAttribute
[JScript] public var Style: HtmlTextWriterAttribute;

Description

Specifies that the HTML style attribute should be written to the tag.

WriteStyleAttribute

[C#] public const HtmlTextWriterAttribute Tabindex;
[C++] Public: const HtmlTextWriterAttribute Tabindex;
[VB] Public Const Tabindex As HtmlTextWriterAttribute
[JScript] public var Tabindex: HtmlTextWriterAttribute;

Description

Specifies that the HTML tabindex attribute should be written to the tag.

WriteStyleAttribute

[C#] public const HtmlTextWriterAttribute Target;
[C++] public: const HtmlTextWriterAttribute Target;
[VB] Public Const Target As HtmlTextWriterAttribute
[JScript] public var Target: HtmlTextWriterAttribute;

Description

Specifies that the HTML target attribute should be written to the tag.

WriteStyleAttribute

[C#] public const HtmlTextWriterAttribute Title;
[C++] public: const HtmlTextWriterAttribute Title;
[VB] Public Const Title As HtmlTextWriterAttribute
[JScript] public var Title: HtmlTextWriterAttribute;

Description

Specifies that the HTML title attribute should be written to the tag.

WriteStyleAttribute

[C#] public const HtmlTextWriterAttribute Type;
[C++] public: const HtmlTextWriterAttribute Type;
[VB] Public Const Type As HtmlTextWriterAttribute
[JScript] public var Type: HtmlTextWriterAttribute;

Description

Specifies that the HTML type attribute should be written to the tag.

WriteStyleAttribute

[C#] public const HtmlTextWriterAttribute Valign;
[C++] public: const HtmlTextWriterAttribute Valign;
[VB] Public Const Valign As HtmlTextWriterAttribute
[JScript] public var Valign: HtmlTextWriterAttribute;

Description

Specifies that the HTML valign attribute should be written to the tag.

WriteStyleAttribute

[C#] public const HtmlTextWriterAttribute Value;
[C++] public: const HtmlTextWriterAttribute Value;
[VB] Public Const Value As HtmlTextWriterAttribute
[JScript] public var Value: HtmlTextWriterAttribute;

Description

Specifies that the HTML value attribute should be written to the tag.

WriteStyleAttribute

[C#] public const HtmlTextWriterAttribute Width;
[C++] public: const HtmlTextWriterAttribute Width;
[VB] Public Const Width As HtmlTextWriterAttribute
[JScript] public var Width: HtmlTextWriterAttribute;

Description

Specifies that the HTML width attribute should be written to the tag.

WriteStyleAttribute

[C#] public const HtmlTextWriterAttribute Wrap;
[C++] public: const HtmlTextWriterAttribute Wrap;
[VB] Public Const Wrap As HtmlTextWriterAttribute
[JScript] public var Wrap: HtmlTextWriterAttribute;

Description

Specifies that the HTML wrap attribute should be written to the tag.

HtmlTextWriterStyle enumeration (System.Web.UI)

ToString

Description

Specifies the HTML styles available to an System.Web.UI.HtmlTextWriter or System.Web.UI.Html32TextWriter object output stream.

HtmlTextWriter and Html32TextWriter objects use these enumeration values to register HTML strings to the proper HTML style.

ToString

[C#] public const HtmlTextWriterStyle BackgroundColor;
[C++] public: const HtmlTextWriterStyle BackgroundColor;
[VB] Public Const BackgroundColor As HtmlTextWriterStyle
[JScript] public var BackgroundColor: HtmlTextWriterStyle;

Description
Specifies the HTML backgroundcolor style.
ToString
[C#] public const HtmlTextWriterStyle BackgroundImage;
[C++] public: const HtmlTextWriterStyle BackgroundImage;
[VB] Public Const BackgroundImage As HtmlTextWriterStyle
[JScript] public var BackgroundImage: HtmlTextWriterStyle;

Description
Specifies the HTML backgroundimage style.
ToString
[C#] public const HtmlTextWriterStyle BorderCollapse;
[C++] public: Const HtmlTextWriterStyle BorderCollapse;
[VB] Public Const BorderCollapse As HtmlTextWriterStyle
[JScript] public var BorderCollapse HtmlTextWriterStyle;

Description
Specifies the HTML bordercollapse style.
ToString
[C#] public const HtmlTextWriterStyle BorderColor;
[C++] public: const HtmlTextWriterStyle BorderColor;
[VB] Public Const BorderColor As HtmlTextWriterStyle
[JScript] public var BorderColor: HtmlTextWriterStyle;

Description
Specifies the HTML bordercolor style.
ToString
[C#] public const HtmlTextWriterStyle BorderStyle;
[C++] public: const HtmlTextWriterStyle BorderStyle;
[VB] Public Const BorderStyle As HtmlTextWriterStyle
[JScript] public var BorderStyle: HtmlTextWriterStyle;

Description
Specifies the HTML borderstyle style.
ToString
[C#] public const HtmlTextWriterStyle BorderWidth;
[C++] public: const HtmlTextWriterStyle BorderWidth;
[VB] Public Const BorderWidth As HtmlTextWriterStyle
[JScript] public var BorderWidth: HtmlTextWriterStyle;

Description
Specifies the HTML borderwidth style.
ToString
[C#] public const HtmlTextWriterStyle Color;
[C++] public: const HtmlTextWriterStyle Color;
[VB] Public Const Color As HtmlTextWriterStyle
[JScript] public var Color: HtmlTextWriterStyle;

Description
Specifies the HTML color style.
ToString
[C#] public const HtmlTextWriterStyle FontFamily;
[C++] public: const HtmlTextWriterStyle FontFamily;
[VB] Public Const FontFamily As HtmlTextWriterStyle
[JScript] public var FontFamily: HtmlTextWriterStyle;

Description
Specifies the HTML fontfamily style.
ToString
[C#] public const HtmlTextWriterStyle FontSize;
[C++] public: const HtmlTextWriterStyle FontSize;
[VB] Public Const FontSize As HtmlTextWriterStyle
[JScript] public var FontSize: HtmlTextWriterStyle;

Description
Specifies the HTML fontsize style.
ToString
[C#] public const HtmlTextWriterStyle FontStyle;
[C++] public: const HtmlTextWriterStyle FontStyle;
[VB] Public Const FontStyle As HtmlTextWriterStyle
[JScript] public var FontStyle: HtmlTextWriterStyle;

Description
Specifies the HTML fontstyle style.
ToString
[C#] public const HtmlTextWriterStyle FontWeight;
[C++] public: const HtmlTextWriterStyle FontWeight;
[VB] Public Const FontWeight As HtmlTextWriterStyle
[JScript] public var FontWeight: HtmlTextWriterStyle;

Description
Specifies the HTML fontweight style.
ToString
[C#] public const HtmlTextWriterStyle Height;
[C++] public: const HtmlTextWriterStyle Height;
[VB] Public Const Height As HtmlTextWriterStyle
[JScript] public var Height: HtmlTextWriterStyle;

Description
Specifies the HTML height style.
ToString
[C#] public const HtmlTextWriterStyle TextDecoration;
[C++] public: const HtmlTextWriterStyle TextDecoration;
[VB] Public Const TextDecoration As HtmlTextWriterStyle
[JScript] public var TextDecoration: HtmlTextWriterStyle;

Description
Specifies the HTML textdecoration style.
ToString
[C#] public const HtmlTextWriterStyle Width;
[C++] public: const HtmlTextWriterStyle Width;
[VB] Public Const Width As HtmlTextWriterStyle
[JScript] public var Width: HtmlTextWriterStyle;

Description
Specifies the HTML width style.
HtmlTextWriterTag enumeration (System.Web.UI)
ToString Description
Specifies the HTML tags that can be passed to an System.Web.UI.HtmlTextWriter or System.Web.UI.Html32TextWriter object output stream.
This enumeration allows the output stream to write HTML mark up, along with HTML server controls, in response to a Web request.
ToString
[C#] public const HtmlTextWriterTag A;
[C++] public: const HtmlTextWriterTag A;
[VB] Public Const A As HtmlTextWriterTag
[JScript] public var A: HtmlTextWriterTag;

Description
Specifies the HTML a element.
ToString
[C#] public const HtmlTextWriterTag Acronym;
[C++] public: const HtmlTextWriterTag Acronym;
[VB] Public Const Acronym As HtmlTextWriterTag
[JScript] public var Acronym: HtmlTextWriterTag;

Description
Specifies the HTML acronym element.
ToString
[C#] public const HtmlTextWriterTag Address;
[C++] public: const HtmlTextWriterTag Address;
[VB] Public Const Address As HtmlTextWriterTag
[JScript] public var Address: HtmlTextWriterTag;

Description
Specifies the HTML address element.
ToString
[C#] public const HtmlTextWriterTag Area;
[C++] public: const HtmlTextWriterTag Area;
[VB] Public Const Area As HtmlTextWriterTag
[JScript] public var Area: HtmlTextWriterTag;

Description
Specifies the HTML area element.
ToString
[C#] public const HtmlTextWriterTag B;
[C++] public: const HtmlTextWriterTag B;
[VB] Public Const B As HtmlTextWriterTag
[JScript] public var B: HtmlTextWriterTag;

Description
Specifies the HTML b element.
ToString
[C#] public const HtmlTextWriterTag Base;
[C++] public: const HtmlTextWriterTag Base;
[VB] Public Const Base As HtmlTextWriterTag
[JScript] public var Base: HtmlTextWriterTag;

Description
Specifies the HTML base element.
ToString
[C#] public const HtmlTextWriterTag Basefont;
[C++] public: const HtmlTextWriterTag Basefont;
[VB] Public Const Basefont As HtmlTextWriterTag
[JScript] public var Basefont: HtmlTextWriterTag;

Description
Specifies the HTML basefont element.
ToString
[C#] public const HtmlTextWriterTag Bdo;
[C++] public: const HtmlTextWriterTag Bdo;
[VB] Public Const Bdo As HtmlTextWriterTag
[JScript] public var Bdo: HtmlTextWriterTag;

Description
Specifies the HTML bdo element.
ToString
[C#] public const HtmlTextWriterTag Bgsound;
[C++] public: const HtmlTextWriterTag Bgsound;
[VB] Public Const Bgsound As HtmlTextWriterTag
[JScript] public var Bgsound: HtmlTextWriterTag;

Description
Specifies the HTML bgsound element.
ToString
[C#] public const HtmlTextWriterTag Big;
[C++] public: const HtmlTextWriterTag Big;
[VB] Public Const Big As HtmlTextWriterTag
[JScript] public var Big: HtmlTextWriterTag;

Description
Specifies the HTML big element.
ToString
[C#] public const HtmlTextWriterTag Blockquote;
[C++] public: const HtmlTextWriterTag Blockquote;
[VB] Public Const Blockquote As HtmlTextWriterTag
[JScript] public var Blockquote: HtmlTextWriterTag;

Description
Specifies the HTML blockquote element.
ToString
[C#] public const HtmlTextWriterTag Body;
[C++] public: const HtmlTextWriterTag Body;
[VB] Public Const Body As HtmlTextWriterTag
[JScript] public var Body: HtmlTextWriterTag;

Description
Specifies the HTML body element.
ToString
[C#] public const HtmlTextWriterTag Br;
[C++] public: const HtmlTextWriterTag Br;
[VB] Public Const Br As HtmlTextWriterTag
[JScript] public var Br: HtmlTextWriterTag;

Description
Specifies the HTML br element.
ToString
[C#] public const HtmlTextWriterTag Button;
[C++] public: const HtmlTextWriterTag Button;
[VB] Public Const Button As HtmlTextWriterTag
[JScript] public var Button: HtmlTextWriterTag;

Description
Specifies the HTML button element.
ToString
[C#] public const HtmlTextWriterTag Caption;
[C++] public: const HtmlTextWriterTag Caption;
[VB] Public Const Caption As HtmlTextWriterTag
[JScript] public var Caption: HtmlTextWriterTag;

Description
Specifies the HTML caption element.
ToString
[C#] public const HtmlTextWriterTag Center;
[C++] public: const HtmlTextWriterTag Center;
[VB] Public Const Center As HtmlTextWriterTag
[JScript] public var Center: HtmlTextWriterTag;

Description
Specifies the HTML center element.
ToString
[C#] public const HtmlTextWriterTag Cite;
[C++] public: const HtmlTextWriterTag Cite;
[VB] Public Const Cite As HtmlTextWriterTag
[JScript] public var Cite: HtmlTextWriterTag;

Description
Specifies the HTML cite element.
ToString
[C#] public const HtmlTextWriterTag Code;
[C++] public: const HtmlTextWriterTag Code;
[VB] Public Const Code As HtmlTextWriterTag
[JScript] public var Code: HtmlTextWriterTag;

Description
Specifies the HTML code element.
ToString
[C#] public const HtmlTextWriterTag Col;
[C++] public: const HtmlTextWriterTag Col;
[VB] Public Const Col As HtmlTextWriterTag
[JScript] public var Col: HtmlTextWriterTag;

Description
Specifies the HTML col element.
ToString
[C#] public const HtmlTextWriterTag Colgroup;
[C++] public: const HtmlTextWriterTag Colgroup;
[VB] Public Const Colgroup As HtmlTextWriterTag
[JScript] public var Colgroup: HtmlTextWriterTag;

Description
Specifies the HTML colgroup element.
ToString
[C#] public const HtmlTextWriterTag Dd;
[C++] public: const HtmlTextWriterTag Dd;
[VB] Public Const Dd As HtmlTextWriterTag
[JScript] public var Dd: HtmlTextWriterTag;

Description
Specifies the HTML dd element.
ToString
[C#] public const HtmlTextWriterTag Del;
[C++] public: const HtmlTextWriterTag Del;
[VB] Public Const Del As HtmlTextWriterTag
[JScript] public var Del: HtmlTextWriterTag;

Description
Specifies the HTML cel element.
ToString
[C#] public const HtmlTextWriterTag Dfn;
[C++] public: const HtmlTextWriterTag Dfn;
[VB] Public Const Dfn As HtmlTextWriterTag
[JScript] public var Dfn: HtmlTextWriterTag;

Description
Specifies the HTML dfn element.
ToString
[C#] public const HtmlTextWriterTag Dir;
[C++] public: const HtmlTextWriterTag Dir;
[VB] Public Const Dir As HtmlTextWriterTag
[JScript] public var Dir: HtmlTextWriterTag;

Description
Specifies the HTML dir element.
ToString
[C#] public const HtmlTextWriterTag Div;
[C++] public: const HtmlTextWriterTag Div;
[VB] Public Const Div As HtmlTextWriterTag
[JScript] public var Div: HtmlTextWriterTag;

Description
Specifies the HTML div element.
ToString
[C#] public const HtmlTextWriterTag D1;
[C++] public: const HtmlTextWriterTag D1;
[VB] Public Const D1 As HtmlTextWriterTag
[JScript] public var D1: HtmlTextWriterTag;

Description
Specifies the HTML d1 element.
ToString
[C#] public const HtmlTextWriterTag Dt;
[C++] public: const HtmlTextWriterTag Dt;
[VB] Public Const Dt As HtmlTextWriterTag
[JScript] public var Dt: HtmlTextWriterTag;

Description
Specifies the HTML dt element.
ToString
[C#] public const HtmlTextWriterTag Em;
[C++] public: const HtmlTextWriterTag Em;
[VB] Public Const Em As HtmlTextWriterTag
[JScript] public var Em: HtmlTextWriterTag;

Description
Specifies the HTML em element.
ToString
[C#] public const HtmlTextWriterTag Embed;
[C++] public: const HtmlTextWriterTag Embed;
[VB] Public Const Embed As HtmlTextWriterTag
[JScript] public var Embed: HtmlTextWriterTag;

Description
Specifies the HTML embed element.
ToString
[C#] public const HtmlTextWriterTag Fieldset;
[C++] public: const HtmlTextWriterTag Fieldset;
[VB] Public Const Fieldset As HtmlTextWriterTag
[JScript] public var Fieldset: HtmlTextWriterTag;

Description
Specifies the HTML fieldset element.
ToString
[C#] public const HtmlTextWriterTag Font;
[C++] public: const HtmlTextWriterTag Font;
[VB] Public Const Font As HtmlTextWriterTag
[JScript] public var Font: HtmlTextWriterTag;

Description
Specifies the HTML font element.
ToString
[C#] public const HtmlTextWriterTag Form;
[C++] public: const HtmlTextWriterTag Form;
[VB] Public Const Form As HtmlTextWriterTag
[JScript] public var Form: HtmlTextWriterTag;

Description
Specifies the HTML form element.
ToString
[C#] public const HtmlTextWriterTag Frame;
[C++] public: const HtmlTextWriterTag Frame;
[VB] Public Const Frame As HtmlTextWriterTag
[JScript] public var Frame: HtmlTextWriterTag;

Description
Specifies the HTML frame element.
ToString
[C#] public const HtmlTextWriterTag Frameset;
[C++] public: const HtmlTextWriterTag Frameset;
[VB] Public Const Frameset As HtmlTextWriterTag
[JScript] public var Frameset: HtmlTextWriterTag;

Description
Specifies the HTML frameset element.
ToString
[C#] public const HtmlTextWriterTag H1;
[C++] public: const HtmlTextWriterTag H1;
[VB] Public Const H1 As HtmlTextWriterTag
[JScript] public var H1: HtmlTextWriterTag;

Description
Specifies the HTML H1 element.
ToString
[C#] public const HtmlTextWriterTag H2;
[C++] public: const HtmlTextWriterTag H2;
[VB] Public Const H2 As HtmlTextWriterTag
[JScript] public var H2: HtmlTextWriterTag;

Description
Specifies the HTML H2 element.
ToString
[C#] public const HtmlTextWriterTag H3;
[C++] public: const HtmlTextWriterTag H3;
[VB] Public Const H3 As HtmlTextWriterTag
[JScript] public var H3: HtmlTextWriterTag;

Description
Specifies the HTML H3 element.
ToString
[C#] public const HtmlTextWriterTag H4;
[C++] public: const HtmlTextWriterTag H4;
[VB] Public Const H4 As HtmlTextWriterTag
[JScript] public var H4: HtmlTextWriterTag;

Description
Specifies the HTML H4 element.
ToString
[C#] public const HtmlTextWriterTag H5;
[C++] public: const HtmlTextWriterTag H5;
[VB] Public Const H5 As HtmlTextWriterTag
[JScript] public var H5: HtmlTextWriterTag;

Description
Specifies the HTML H5 element.
ToString
[C#] public const HtmlTextWriterTag H6;
[C++] public: const HtmlTextWriterTag H6;
[VB] Public Const H6 As HtmlTextWriterTag
[JScript] public var H6: HtmlTextWriterTag;

Description
Specifies the HTML H6 element.
ToString
[C#] public const HtmlTextWriterTag Head;
[C++] public: const HtmlTextWriterTag Head;
[VB] Public Const Head As HtmlTextWriterTag
[JScript] public var Head: HtmlTextWriterTag;

Description
Specifies the HTML head element.
ToString
[C#] public const HtmlTextWriterTag Hr;
[C++] public: const HtmlTextWriterTag Hr;
[VB] Public Const Hr As HtmlTextWriterTag
[JScript] public var Hr: HtmlTextWriterTag;

Description
Specifies the HTML hr element.
ToString
[C#] public const HtmlTextWriterTag Html;
[C++] public: const HtmlTextWriterTag Html;
[VB] Public Const Html As HtmlTextWriterTag
[JScript] public var Html: HtmlTextWriterTag;

Description
Specifies the HTML html element.
ToString
[C#] public const HtmlTextWriterTag I;
[C++] public: const HtmlTextWriterTag I;
[VB] Public Const I As HtmlTextWriterTag
[JScript] public var I: HtmlTextWriterTag;

Description
Specifies the HTML i element.
ToString
[C#] public const HtmlTextWriterTag Iframe;
[C++] public: const HtmlTextWriterTag Iframe;
[VB] Public Const Iframe As HtmlTextWriterTag
[JScript] public var Iframe: HtmlTextWriterTag;

Description
Specifies the HTML iframe element.
ToString
[C#] public const HtmlTextWriterTag Img;
[C++] public: const HtmlTextWriterTag Img;
[VB] Public Const Img As HtmlTextWriterTag
[JScript] public var Img: HtmlTextWriterTag;

Description
Specifies the HTML img element.
ToString
[C#] public const HtmlTextWriterTag Input;
[C++] public: const HtmlTextWriterTag Input;
[VB] Public Const Input As HtmlTextWriterTag
[JScript] public var Input: HtmlTextWriterTag;

Description
Specifies the HTML input element.
ToString
[C#] public const HtmlTextWriterTag Ins;
[C++] public: const HtmlTextWriterTag Ins;
[VB] Public Const Ins As HtmlTextWriterTag
[JScript] public var Ins: HtmlTextWriterTag;

Description
Specifies the HTML ins element.
ToString
[C#] public const HtmlTextWriterTag Isindex;
[C++] public: const HtmlTextWriterTag Isindex;
[VB] Public Const Isindex As HtmlTextWriterTag
[JScript] public var Isindex: HtmlTextWriterTag;

Description
Specifies the HTML isindex element.
ToString
[C#] public const HtmlTextWriterTag Kbd;
[C++] public: const HtmlTextWriterTag Kbd;
[VB] Public Const Kbd As HtmlTextWriterTag
[JScript] public var Kbd: HtmlTextWriterTag;

Description
Specifies the HTML kbd element.
ToString
[C#] public const HtmlTextWriterTag Label;
[C++] public: const HtmlTextWriterTag Label;
[VB] Public Const Label As HtmlTextWriterTag
[JScript] public var Label: HtmlTextWriterTag;

Description
Specifies the HTML label element.
ToString
[C#] public const HtmlTextWriterTag Legend;
[C++] public: const HtmlTextWriterTag Legend;
[VB] Public Const Legend As HtmlTextWriterTag
[JScript] public var Legend: HtmlTextWriterTag;

Description
Specifies the HTML legend element.
ToString
[C#] public const HtmlTextWriterTag Li;
[C++] public: const HtmlTextWriterTag Li;
[VB] Public Const Li As HtmlTextWriterTag
[JScript] public var Li: HtmlTextWriterTag;

Description
Specifies the HTML li element.
ToString
[C#] public const HtmlTextWriterTag Link;
[C++] public: const HtmlTextWriterTag Link;
[VB] Public Const Link As HtmlTextWriterTag
[JScript] public var Link: HtmlTextWriterTag;

Description
Specifies the HTML link element.
ToString
[C#] public const HtmlTextWriterTag Map;
[C++] public: const HtmlTextWriterTag Map;
[VB] Public Const Map As HtmlTextWriterTag
[JScript] public var Map: HtmlTextWriterTag;

Description
Specifies the HTML map element.
ToString
[C#] public const HtmlTextWriterTag Marquee;
[C++] public: const HtmlTextWriterTag Marquee;
[VB] Public Const Marquee As HtmlTextWriterTag
[JScript] public var Marquee: HtmlTextWriterTag;

Description
Specifies the HTML marquee element.
ToString
[C#] public const HtmlTextWriterTag Menu;
[C++] public: const HtmlTextWriterTag Menu;
[VB] Public Const Menu As HtmlTextWriterTag
[JScript] public var Menu: HtmlTextWriterTag;

Description

Specifies the HTML menu element.

ToString

[C#] public const HtmlTextWriterTag Meta;

[C++] public: const HtmlTextWriterTag Meta;

[VB] Public Const Meta As HtmlTextWriterTag

[JScript] public var Meta: HtmlTextWriterTag;

Description

Specifies the HTML meta element.

ToString

[C#] public const HtmlTextWriterTag Nobr;

[C++] public: const HtmlTextWriterTag Nobr;

[VB] Public Const Nobr As HtmlTextWriterTag

[JScript] public var Nobr: HtmlTextWriterTag;

Description

Specifies the HTML nobr element.

ToString

[C#] public const HtmlTextWriterTag Noframes;

[C++] public: const HtmlTextWriterTag Noframes;

[VB] Public Const Noframes As HtmlTextWriterTag

[JScript] public var Noframes: HtmlTextWriterTag;

Description

Specifies the HTML noframes element.

ToString

[C#] public const HtmlTextWriterTag Noscript;

[C++] public: const HtmlTextWriterTag Noscript;

[VB] Public Const Noscript As HtmlTextWriterTag

[JScript] public var Noscript: HtmlTextWriterTag;

Description

Specifies the HTML noscript element.

ToString

[C#] public const HtmlTextWriterTag Object;

[C++] public: const HtmlTextWriterTag Object;

[VB] Public Const Object As HtmlTextWriterTag

[JScript] public var Object: HtmlTextWriterTag;

Description

Specifies the HTML object element.

ToString

[C#] public const HtmlTextWriterTag O1;

[C++] public: const HtmlTextWriterTag O1;

[VB] Public Const O1 As HtmlTextWriterTag

[JScript] public var O1: HtmlTextWriterTag;

Description

Specifies the HTML o1 element.

ToString

[C#] public const HtmlTextWriterTag Option;

[C++] public: const HtmlTextWriterTag Option;

[VB] Public Const Option As HtmlTextWriterTag

[JScript] public var Option: HtmlTextWriterTag;

Description

Specifies the HTML option element.

ToString

[C#] public const HtmlTextWriterTag P;

[C++] public: const HtmlTextWriterTag P;

[VB] Public Const P As HtmlTextWriterTag

[JScript] public var P: HtmlTextWriterTag;

Description

Specifies the HTML p element.

ToString

[C#] public const HtmlTextWriterTag Param;

[C++] public: const HtmlTextWriterTag Param;

[VB] Public Const Param As HtmlTextWriterTag

[JScript] public var Param: HtmlTextWriterTag;

Description

Specifies the HTML param element.

ToString

[C#] public const HtmlTextWriterTag Pre;

[C++] public: const HtmlTextWriterTag Pre;

[VB] Public Const Pre As HtmlTextWriterTag

[JScript] public var Pre: HtmlTextWriterTag;

Description

Specifies the HTML pre element.

ToString

[C#] public const HtmlTextWriterTag Q;

[C++] public: const HtmlTextWriterTag Q;

[VB] Public Const Q As HtmlTextWriterTag

[JScript] public var Q: HtmlTextWriterTag;

Description

Specifies the HTML q element.

ToString

[C#] public const HtmlTextWriterTag Rt;

[C++] public: const HtmlTextWriterTag Rt;

[VB] Public Const Rt As HtmlTextWriterTag

[JScript] public var Rt: HtmlTextWriterTag;

Description

Specifies the HTML rt element.

ToString

[C#] public const HtmlTextWriterTag Ruby;

[C++] public: const HtmlTextWriterTag Ruby;

[VB] Public Const Ruby As HtmlTextWriterTag

[JScript] public var Ruby: HtmlTextWriterTag;

Description

Specifies the HTML ruby element.

ToString

[C#] public const HtmlTextWriterTag S;

[C++] public: const HtmlTextWriterTag S;

[VB] Public Const S As HtmlTextWriterTag

[JScript] public var S: HtmlTextWriterTag;

Description

Specifies the HTML s element.

ToString

[C#] public const HtmlTextWriterTag Samp;

[C++] public: const HtmlTextWriterTag Samp;

[VB] Public Const Samp As HtmlTextWriterTag

[JScript] public var Samp: HtmlTextWriterTag;

Description

Specifies the HTML samp element.

ToString

[C#] public const HtmlTextWriterTag Script;

[C++] public: const HtmlTextWriterTag Script;

[VB] Public Const Script As HtmlTextWriterTag

[JScript] public var Script: HtmlTextWriterTag;

Description

Specifies the HTML script element.

ToString

[C#] public const HtmlTextWriterTag Select;

[C++] public: const HtmlTextWriterTag Select;

[VB] Public Const Select As HtmlTextWriterTag

[JScript] public var Select: HtmlTextWriterTag;

Description

Specifies the HTML select element.

ToString

[C#] public const HtmlTextWriterTag Small;

[C++] public: const HtmlTextWriterTag Small;

[VB] Public Const Small As HtmlTextWriterTag

[JScript] public var Small: HtmlTextWriterTag;

Description

Specifies the HTML small element.

ToString

[C#] public const HtmlTextWriterTag Span;
[C++] public: const HtmlTextWriterTag Span;
[VB] Public Const Span As HtmlTextWriterTag
[JScript] public var Span: HtmlTextWriterTag;

Description

Specifies the HTML span element.

ToString

[C#] public const HtmlTextWriterTag Strike;
[C++] public: const HtmlTextWriterTag Strike;
[VB] Public Const Strike As HtmlTextWriterTag
[JScript] public var Strike: HtmlTextWriterTag;

Description

Specifies the HTML strike element.

ToString

[C#] public const HtmlTextWriterTag Strong;
[C++] public: const HtmlTextWriterTag Strong;
[VB] Public Const Strong As HtmlTextWriterTag
[JScript] public var Strong: HtmlTextWriterTag;

Description

Specifies the HTML strong element.

ToString

[C#] public const HtmlTextWriterTag Style;
[C++] public: const HtmlTextWriterTag Style;
[VB] Public Const Style As HtmlTextWriterTag
[JScript] public var Style: HtmlTextWriterTag;

Description

Specifies the HTML style element.

ToString

[C#] public const HtmlTextWriterTag Sub;
[C++] public: const HtmlTextWriterTag Sub;
[VB] Public Const Sub As HtmlTextWriterTag
[JScript] public var Sub: HtmlTextWriterTag;

Description

Specifies the HTML sub element.

ToString

[C#] public const HtmlTextWriterTag Sup;
[C++] public: const HtmlTextWriterTag Sup;
[VB] Public Const Sup As HtmlTextWriterTag
[JScript] public var Sup: HtmlTextWriterTag;

Description

Specifies the HTML sup element.

ToString

[C#] public const HtmlTextWriterTag Table;
[C++] public: const HtmlTextWriterTag Table;
[VB] Public Const Table As HtmlTextWriterTag
[JScript] public var Table: HtmlTextWriterTag;

Description

Specifies the HTML table element.

ToString

[C#] public const HtmlTextWriterTag Tbody;
[C++] public: const HtmlTextWriterTag Tbody;
[VB] Public Const Tbody As HtmlTextWriterTag
[JScript] public var Tbody: HtmlTextWriterTag;

Description

Specifies the HTML tbody element.

ToString

[C#] public const HtmlTextWriterTag Td;
[C++] public: const HtmlTextWriterTag Td;
[VB] Public Const Td As HtmlTextWriterTag
[JScript] public var Td: HtmlTextWriterTag;

Description

Specifies the HTML td element.

ToString

[C#] public const HtmlTextWriterTag Textarea;
[C++] public: const HtmlTextWriterTag Textarea;
[VB] Public Const Textarea As HtmlTextWriterTag
[JScript] public var Textarea: HtmlTextWriterTag;

Description

Specifies the HTML textarea element.

ToString

[C#] public const HtmlTextWriterTag Tfoot;
[C++] public: const HtmlTextWriterTag Tfoot;
[VB] Public Const Tfoot As HtmlTextWriterTag
[JScript] public var Tfoot: HtmlTextWriterTag;

Description

Specifies the HTML tfoot element.

ToString

[C#] public const HtmlTextWriterTag Th;
[C++] public: const HtmlTextWriterTag Th;
[VB] Public Const Th As HtmlTextWriterTag
[JScript] public var Th: HtmlTextWriterTag;

Description

Specifies the HTML th element.

ToString

[C#] public const HtmlTextWriterTag Thead;
[C#] public: const HtmlTextWriterTag Thead;
[VB] Public Const Thead As HtmlTextWriterTag
[JScript] public var Thead: HtmlTextWriterTag;

Description

Specifies the HTML thead element.

ToString

[C#] public const HtmlTextWriterTag Title;
[C++] public: const HtmlTextWriterTag Title;
[VB] Public Const Title As HtmlTextWriterTag
[JScript] public var Title: HtmlTextWriterTag;

Description

Specifies the HTML title element.

ToString

[C#] public const HtmlTextWriterTag Tr;
[C++] public: const HtmlTextWriterTag Tr;
[VB] Public Const Tr As HtmlTextWriterTag
[JScript] public var Tr: HtmlTextWriterTag;

Description

Specifies the HTML tr element.

ToString

[C#] public const HtmlTextWriterTag Tt;
[C++] public: const HtmlTextWriterTag Tt;
[VB] Public Const Tt As HtmlTextWriterTag
[JScript] public var Tt: HtmlTextWriterTag;

Description

Specifies the HTML tt element.

ToString

[C#] public const HtmlTextWriterTag U;
[C++] public: const HtmlTextWriterTag U;
[VB] Public Const U As HtmlTextWriterTag
[JScript] public var U: HtmlTextWriterTag;

Description

Specifies the HTML u element.

ToString

[C#] public const HtmlTextWriterTag Ul;
[C++] public: const HtmlTextWriterTag Ul;
[VB] Public Const Ul As HtmlTextWriterTag
[JScript] public var Ul: HtmlTextWriterTag;

Description

Specifies the HTML ul element.

ToString

[C#] public const HtmlTextWriterTag Unknown;

[C++] public: const HtmlTextWriterTag Unknown;

[VB] Public Const Unknown As HtmlTextWriterTag

[JScript] public var Unknown: HtmlTextWriterTag;

Description

The System.String passed as an HTML tag is not recognized.

ToString

[C#] public const HtmlTextWriterTag Var;

[C++] public: const HtmlTextWriterTag Var;

[VB] Public Const Var As HtmlTextWriterTag

[JScript] public var Var: HtmlTextWriterTag;

Description

Specifies the HTML var element.

ToString

[C#] public const HtmlTextWriterTag Wbr;

[C++] public: const HtmlTextWriterTag Wbr;

[VB] Public Const Wbr As HtmlTextWriterTag

[JScript] public var Wbr: HtmlTextWriterTag;

Description

Specifies the HTML wbr element.

ToString

[C#] public const HtmlTextWriterTag Xml;

[C++] public: const HtmlTextWriterTag Xml;

[VB] Public Const Xml As HtmlTextWriterTag

[JScript] public var Xml: HtmlTextWriterTag;

Description

Specifies the HTML xml element.

IAttributeAccessor interface (System.Web.UI)

ToString

Description

Defines methods used by ASP.NET server controls to provide programmatic access to any attribute declared in the opening tag of a server control.

If you author a custom server control that inherits from the System.Web.UI.WebControls.WebControl, System.Web.UI.HtmlControls.HtmlControl, or System.Web.UI.WebControls.ListItem class, the .NET Framework automatically provides programmatic access to attributes since each of these classes implement the IAttributeAccessor interface.

GetAttribute

[C#] string GetAttribute(string key);

[C++] String* GetAttribute(String* key);

[VB] Function GetAttribute(ByVal key As String) As String

[JScript] function GetAttribute(key: String): String;

Description

When implemented by a class, retrieves the specified attribute property from the server control.

Return Value: The value of the specified attribute. A System.String object that represents the name of the server control attribute.

SetAttribute

[C#] void SetAttribute(string key, string value);

[C++] void SetAttribute(String* key, String* value);

[VB] Sub SetAttribute(ByVal key As String, ByVal value As String)

[JScript] function SetAttribute(key: String, value: String);

Description

When implemented by a class, designates an attribute and its value to assign to the ASP.NET server control. The name of the attribute to be set. The value assigned to the attribute.

IDataBindingsAccessor interface (System.Web.UI)

SetAttribute

Description

Allows access to the collection of databinding expressions on a control at design time.

DataBindings

SetAttribute

[C#] DataBindingCollection DataBindings {get;}

[C++] DataBindingCollection* get_DataBindings( );

[VB] ReadOnly Property DataBindings As DataBindingCollection

[JScript] abstract function get DataBindings( ): DataBindingCollection;

Description

Indicates a collection of all data bindings on the control. This property is read-only.

HasDataBindings

SetAttribute

[C#] bool HasDataBindings {get;}

[C++] bool get_HasDataBindings( );

[VB] ReadOnly Property HasDataBindings As Boolean

[JScript] abstract function get HasDataBindings( ): Boolean;

Description

Returns whether the control contains any data binding logic. This method is only accessed by RAD designers.

Return Value: true if the control contains data binding logic; otherwise, false.

ImageClickEventArgs class (System.Web.UI)

SetAttribute

Description

Provides data for any events that occur when a user clicks on a image-based ASP.NET server control, such as the System.Web.UI.HtmlControls.HtmlInputImage or System.Web.UI.WebControls.Image server controls. This class cannot be inherited.

This class passes the location where a user clicked on an HtmlInputImage server control or an Image Web server control. Clicking an HtmlInputImage server control causes a ServerClick event to fire, while clicking an Image server control causes a Click event to occur. You can then use event handlers to programmatically respond to the event based on the value of these coordinates.

SetAttribute

[C#] public int X;

[C++] public: int X;

[VB] Public X As Integer

[JScript] public var X: int;

Description

An integer that represents the x-coordinate where a user clicked on an image-based ASP.NET server control.

SetAttribute

[C#] public int Y;

[C++] public: int Y;

[VB] Public Y As Integer

[JScript] public var Y: int;

Description

An integer that represents the y-coordinate where a user clicked on an image-based ASP.NET server control.

ImageClickEventArgs

Example Syntax:

SetAttribute

[C#] public ImageClickEventArgs(int x, int y);

[C++] public: ImageClickEventArgs(int x, int y);

[VB] Public Sub New(ByVal x As Integer, ByVal y As Integer)

[JScript] public function ImageClickEventArgs(x: int, y: int);

Description

Initializes a new instance of the System.Web.UI.ImageClickEventArgs class. The x-coordinate where the user clicked on an image-based ASP.NET server control. The y-coordinate where the user clicked on an image-based ASP.NET server control.

ImageClickEventHandler delegate (System.Web.UI)

ToString

Description

Represents the method that will handle any events that are raised when a user clicks on an image-based ASP.NET server control. The server control that is the source of the event. An System.Web.UI.ImageClickEventArgs object that contains event data.

This delegate defines the required signature for all click events raised when a user clicks on an image-based ASP.NET server control. You must use the signature defined by this delegate for any OnServerClick event handlers that you create for an System.Web.UI.HtmlControls.HtmlInputImage server control or any OnClick event handlers that you create for an System.Web.UI.WebControls.ImageButton Web server control.

INamingContainer interface (System.Web.UI)

ToString

Description

Identifies a container control that creates a new ID namespace within a System.Web.UI.Page object's control hierarchy. This is a marker interface only.

Any control that implements this interface creates a new namespace in which all child control ID attributes are guaranteed to be unique within an entire application. The marker provided by this interface allows unique naming of the dynamically generated server control instances within the Web server controls that support data binding. These controls include the System.Web.UI.WebControls.Repeater control, the System.Web.UI.WebControls.DataGrid control, or the System.Web.UI.WebControls.RadioButtonList control.

IParserAccessor interface (System.Web.UI)

ToString

Description

Defines the method that ASP.NET server controls must implement to recognize when elements, either HTML or XML, are parsed.

When elements are parsed, they are recoginized as children of the server control that implements this interface. As such, they are added to the control's System.Web.UI.Control.Controls property. These elements, generally speaking, are added as System.Web.UI.LiteralControl objects to the System.Web.UI.ControlCollection object associated with Controls property.

AddParsedSubObject

[C#] void AddParsedSubObject(object obj);

[C++] void AddParsedSubObject(Object* obj);

[VB] Sub AddParsedSubObject(ByVal obj As Object)

[JScript] function AddParsedSubObject(obj: Object);

Description

When implemented by an ASP.NET server control, notifies the server control that an element, either XML or HTML, was parsed, and adds the element to the server control's System.Web.UI.ControlCollection object. The System.Object instance to add to the parent control.

IPostBackDataHandler interface (System.Web.UI)

AddParsedSubObject

Description

Defines methods that ASP.NET server controls must implement to automatically load post back data.

If you want a server control you design to examine form data that is posted back to the server by the client, you must implement the IPostBackDataHandler interface. The contract that this interface defines allows a server control to determine whether its state should be altered as a result of the post back, and to raise the appropriate events.

LoadPostData

[C#] bool LoadPostData(string postDataKey, NameValueCollection postCollection);

[C++] bool LoadPostData(String* postDataKey, NameValueCollection* postCollection);

[VB] Function LoadPostData(ByVal postDataKey As String, ByVal postCollection As NameValueCollection) As Boolean

[JScript] function LoadPostData(postDataKey: String, postCollection: NameValueCollection): Boolean;

Description

When implemented by a class, processes post back data for an ASP.NET server control.

Return Value: true if the server control's state changes as a result of the post back; otherwise false.

The Web Forms page framework tracks all of the server control's that return true to this method call, then invokes the System.Web.UI.IPostBackDataHandler.RaisePostDataChangedEvent on those controls. The key identifier for the control. The collection of all incoming name values.

RaisePostDataChangedEvent

[C#] void RaisePostDataChangedEvent( );

[C++] void RaisePostDataChangedEvent( );

[VB] Sub RaisePostDataChangedEvent( )

[JScript] function RaisePostDataChangedEvent( );

Description

When implemented by a class, signals the server control object to notify the ASP.NET application that the state of the control has changed.

Change events for the server control that implements this interface, if any, are raised from this method.

IPostBackEventHandler interface (System.Web.UI)

RaisePostDataChangedEvent

Description

Defines the method ASP.NET server controls must implement to handle post back events.

To create a server control that captures form submit information from the browser, you must implement this interface. For more information on how to use this interface, see.

RaisePostBackEvent

[C#] void RaisePostBackEvent(string eventArgument);

[C++] void RaisePostBackEvent(String* eventArgument);

[VB] Sub RaisePostBackEvent(ByVal eventArgument As String)

[JScript] function RaisePostBackEvent(eventArgument: String);

Description

When implemented by a class, enables a server control to process an event raised when a form is posted to the server.

This method provides the functionality for many events implemented by HTML and Web server controls. A System. String that represents an optional event argument to be passed to the event handler.

IStateManager interface (System.Web.UI)

RaisePostBackEvent

Description

Defines the properties and methods any class must implement to support view state management for a server control.

A server control's view state comprises the cumulative values of the control's properties. This interface includes methods that save and load a server control's view state values, as well as a method that instructs the control to track any changes to its view state.

IsTrackingViewState

RaisePostBackEvent

[C#] bool IsTrackingViewState {get;}

[C++] bool get_IsTrackingViewState( );

[VB] ReadOnly Property IsTrackingViewState As Boolean

[JScript] abstract function get IsTrackingViewState( ): Boolean;

Description

When implemented by a class, gets a value indicating whether a server control is tracking its view state changes.

LoadViewState

[C#] void LoadViewState(object state);

[C++] void LoadViewState(Object* state);

[VB] Sub LoadViewState(ByVal state As Object)

[JScript] function LoadViewState(state: Object);

Description

When implemented by a class, loads the server control's previously saved view state to the control. An System.Object that contains the saved view state values for the control.

SaveViewState

[C#] object SaveViewState( );

[C++] Object* SaveViewState( );

[VB] Function SaveViewState( ) As Object

[JScript] function SaveViewState( ): Object;

Description

When implemented by a class, saves the changes to a server control's view state to an System.Object.

Return Value: The Object that contains the view state changes.

TrackViewState

[C#] void TrackViewState( );

[C++] void TrackViewState( );

[VB] Sub TrackViewState( )

[JScript] function TrackViewState( );

Description

When implemented by a class, instructs the server control to track changes to its view state.

Once this method has been called on a server control, the System.Web.UI.IStateManager.IsTrackingViewState property will return true ITagNameToTypeMapper interface (System.Web.UI)

TrackViewState

Description

Maps a sequence of text characters to a .NET Framework type when an .aspx file is processed on the server.

Classes that implement this interface strongly type any string in an .aspx file to the appropriate class. HTML and literal text strings are mapped to the type System.Web.UI.LiteralControl, HTML anchor tags with a runat="server" attribute/value pair are mapped to the type System.Web.UI.HtmlControls.HtmlAnchor, while tags are mapped to the type System.Web.UI.WebControls.Button.

GetControlType

[C#] Type GetControlType(string tagName, IDictionary attribs);

[C++] Type* GetControlType(String* tagName, IDictionary* attribs);

[VB] Function GetControlType(ByVal tagName As String, ByVal attribs As IDictionary) As Type

[JScript] function GetControlType(tagName: String, attribs: IDictionary): Type;

Description

Retrieves the .NET Framework type that processes the control declared in the .aspx file.

Return Value: The .NET Framework type that is assigned to the control. The element name of the control sent from the .aspx file. A collection of the attributes on the control in the .aspx file.

ITemplate interface (System.Web.UI)

GetControlType

Description

Defines the method to implement for populating an ASP.NET server control with child controls when using a the control with inline templates when declared in an .aspx file.

InstantiateIn

[C#] void InstantiateIn(Control container);

[C++] void InstantiateIn(Control* container);

[VB] Sub InstantiateIn(ByVal container As Control)

[JScript] function InstantiateIn(container: Control);

Description

When implemented by a class, defines the System.Web.UI.Control object that child controls and templates belong to. These child controls are in turn defined within an inline template.

When developing templated server controls you do not need to implement this method, the .NET Framework provides the implementation for you. The Control object to contain the instantiated controls from the inline template.

IValidator interface (System.Web.UI)

InstantiateIn

Description

Defines the properties and methods that objects that participate in validation must implement.

Classes that implement this interface represent a posssible user input error. When the System.Web.UI.IValidator.Validate method is called, the class updates its System.Web.UI.IValidator.IsValid property to signify whether the error occurred. The System.Web.UI.IValidator.ErrorMessage property contains a text description of the error condition that you can display when the error occurs.

ErrorMessage

InstantiateIn

[C#] string ErrorMessage {get; set;}

[C++] String* get_ErrorMessage( );void set_ErrorMessage (String*);

[VB] Property ErrorMessage As String

[JScript] abstract function get ErrorMessage( ): String;public abstract function set ErrorMessage(String);

Description

When implemented by a class, gets or sets the error message text generated when the condition being validated fails.

Web Forms page developers access this property declaratively in the opening tag of a validation server control. For more information, see.

IsValid

InstantiateIn

[C#] bool IsValid {get; set;}

[C++] bool get_IsValid( );void set_IsValid(bool);

[VB] Property IsValid As Boolean

[JScript] abstract function get IsValid( ): Boolean;public abstract function set IsValid(Boolean);

Description

When implemented by a class, gets or sets a value indicating whether the user-entered content in the specified control passes validation.

Validate

[C#] void Validate( );

[C++] void Validate( );

[VB] Sub Validate( )

[JScript] function Validate( );

Description

When implemented by a class, evaluates the condition it checks and upates the System.Web.UI.IValidator.IsValid property.

LiteralControl class (System.Web.UI)

Validate

Description

Represents HTML elements, text, and any other strings in an ASP.NET page that do not require processing on the server.

ASP.NET compiles all HTML elements and readable text that do not require server-side processing into instances of this class. For example, an HTML element that does not contain a runat="server" attribute/value pair in its opening tag is compiled into a LiteralControl object.

LiteralControl

Example Syntax:

Validate

[C#] public LiteralControl( );

[C++] public: LiteralControl( );

[VB] Public Sub New( )

[JScript] public function LiteralControl( ); Initializes a new instance of the System.Web.UI.LiteralControl class.

Description

Initializes a new instance of the System.Web.UI.LiteralControl class that contains a literal string to be rendered on the requested ASP.NET page.

LiteralControl

Example Syntax:

Validate

[C#] public LiteralControl(string text);

[C++] public: LiteralControl(String* text);

[VB] Public Sub New(ByVal text As String)

[JScript] public function LiteralControl(text: String);

Description

Initializes a new instance of the System.Web.UI.LiteralControl class with the specified text. The text to be rendered on the requested Web page.

ChildControlsCreated

ClientID

Context

Controls

EnableViewState

Events

HasChildViewState

ID

IsTrackingViewState

NamingContainer

Page

Parent

Site

TemplateSourceDirectory

Text

Validate

Description

Gets or sets the text content of the System.Web.UI.LiteralControl object.

UniqueID

ViewState

ViewStateIgnoresCase

Visible

CreateControlCollection

[C#] protected override ControlCollection CreateControlCollection( );

[C++] protected: ControlCollection* CreateControlCollection( );

[VB] Overrides Protected Function CreateControlCollection( ) As ControlCollection

[JScript] protected override function CreateControlCollection( ): ControlCollection;

Description

Creates an System.Web.UI.EmptyControlCollection object for the current instance of the System.Web.UI.LiteralControl.

Return Value: The EmptyControlCollection object for the current control.

By default, LiteralControl objects contain only text and no child server controls. If you want to change this behavior, you must override this method.

Render

[C#] protected override void Render(HtmlTextWriter output);

[C++] protected: void Render(HtmlTextWriter* output);

[VB] Overrides Protected Sub Render(ByVal output As HtmlTextWriter)

[JScript] protected override function Render(output: HtmlTextWriter);

Description

Writes the content of the System.Web.UI.LiteralControl object to the ASP.NET page.

When you create a custom server control and want to render specific HTML or text to a client, you can improve the performance of the control by passing the value of the System.Web.UI.LiteralControl.Text property to the System.Web.UI.Control.Render(System.Web.UI.HtmlTextWriter) method rather than calling the LiteralControl.Render method. An System.Web.UI.HtmlTextWriter object that renders the content of the LiteralControl object to the requesting client.

LosFormatter class (System.Web.UI)

TrackViewState

Description

Serializes the view state for a Web Forms page. The limited object serialization (LOS) formatter is designed for highly compact ASCII format serialization. This class supports serializing any object graph, but is optimized for those containing strings, arrays, and hashtables. It offers second order optimization for many of the .NET primitive types.

This is a private format, and only needs to remain consistent for the lifetime of a Web request. You are not allowed to persist objects serialized with this formatter for any significant length of time.

LosFormatter

Example Syntax:

TrackViewState

[C#] public LosFormatter( );

[C++] public: LosFormatter( );

[VB] Public Sub New( )

[JScript] public function LosFormatter( );

Deserialize

[C#] public object Deserialize(Stream stream);

[C++] public: Object* Deserialize(Stream* stream);

[VB] Public Function Deserialize(ByVal stream As Stream) As Object

[JScript] public function Deserialize(stream: Stream): Object; Deserializes an LOS-formatted object.

Description

Deserializes a LOS-formatted object from a System.IO.Stream object.

Return Value: Returns the deserialized object. The source of the object to be deserialized.

Deserialize

[C#] public object Deserialize(string input);

[C++] public: Object* Deserialize(String* input);

[VB] Public Function Deserialize(ByVal input As String) As Object

[JScript] public function Deserialize(input: String): Object;

Description

Deserializes a LOS formatted object from a string.

Return Value: Returns the deserialized object. The source of the object to be deserialized.

Deserialize

[C#] public object Deserialize(TextReader input);

[C++] public: Object* Deserialize(TextReader* input);

[VB] Public Function Deserialize(ByVal input As TextReader) As Object

[JScript] public function Deserialize(input: TextReader): Object;

Description

Deserializes a LOS-formatted object from a System.IO.TextReader object.

Return Value: Returns the deserialized object. The source of the object to be deserialized.

Serialize

[C#] public void Serialize(Stream stream, object value);

[C++] public: void Serialize(Stream* stream, Object* value);

[VB] Public Sub Serialize(ByVal stream As Stream, ByVal value As Object)

[JScript] public function Serialize(stream: Stream, value: Object); Serializes the Web Forms view state value.

Description

Serializes the Web Forms view state value into a System.IO.Stream object. The object to serialize into. The view state information to pass.

Serialize

[C#] public void Serialize(TextWriter output, object value);

[C++] public: void Serialize(TextWriter* output, Object* value); [VB] Public Sub Serialize(ByVal output As TextWriter, ByVal value As Object)

[JScript] public function Serialize(output: TextWriter, value: Object);

Description

Serializes the view state value into a System.IO.TextWriter object. The object to serialize into. The view state information to pass.

ObjectConverter class (System.Web.UI)

ToString

Description

ObjectConverter

Example Syntax:

ToString

[C#] public ObjectConverter( );

[C++] public: ObjectConverter( );

[VB] Public Sub New( )

[JScript] public function ObjectConverter( );

ConvertValue

[C#] public static object ConvertValue(object value, Type toType, string formatString);

[C++] public: static Object* ConvertValue(Object* value, Type* toType, String* formatString);

[VB] Public Shared Function ConvertValue(ByVal value As Object, ByVal toType As Type, ByVal formatString As String) As Object

[JScript] public static function ConvertValue(value: Object, toType: Type, formatString: String): Object;

Description

ObjectTagBuilder class (System.Web.UI)

ToString

Description

ObjectTagBuilder

Example Syntax:

ToString

[C#] public ObjectTagBuilder( );

[C++] public: ObjectTagBuilder( );

[VB] Public Sub New( )

[JScript] public function ObjectTagBuilder( );

ControlType

FChildrenAsProperties

FIsNonParserAccessor

HasAspCode

ID

InDesigner

NamingContainerType

Parser tagName

AppendLiteralString

[C#] public override void AppendLiteralString(string s);

[C++] public: void AppendLiteralString(String* s);

[VB] Overrides Public Sub AppendLiteralString(ByVal s As String)

[JScript] public override function AppendLiteralString(s: String);

Description

AppendSubBuilder

[C#] public override void AppendSubBuilder(ControlBuilder subBuilder);

[C++] public: void AppendSubBuilder(ControlBuilder* subBuilder);

[VB] Overrides Public Sub AppendSubBuilder(ByVal subBuilder As ControlBuilder)

[JScript] public override function AppendSubBuilder(subBuilder: ControlBuilder);

Description

Init

[C#] public override void Init(TemplateParser parser, ControlBuilder parentBuilder, Type type, string tagName, string id, IDictionary attribs);

[C++] public: void Init(TemplateParser* parser, ControlBuilder* parentBuilder, Type* type, String* tagName, String* id, IDictionary* attribs);

[VB] Overrides Public Sub Init(ByVal parser As TemplateParser, ByVal parentBuilder As ControlBuilder, ByVal type As Type, ByVal tagName As String, ByVal id As String, ByVal attribs As IDictionary)

[JScript] public override function Init(parser: TemplateParser, parentBuilder: ControlBuilder, type: Type, tagName: String, id: String, attribs: IDictionary);

Description

OutputCacheLocation enumeration (System.Web.UI)

ToString

Description

Specifies the valid values for the location of the output cache.

The values specified by this enumeration are used when you include an @ OutputCache directive in a .aspx file. These values set the cacheability of page output. For more information, see.

ToString

[C#] public const OutputCacheLocation Any;

[C++] public: const OutputCacheLocation Any;

[VB] Public Const Any As OutputCacheLocation

[JScript] public var Any: OutputCacheLocation;

Description

The output cache can be located on the browser client where the request originated, on a proxy server (or any other server) participating in the request, or on the server where the request was processed.

ToString

[C#] public const OutputCacheLocation Client;

[C++] public: const OutputCacheLocation Client;

[VB] Public Const Client As OutputCacheLocation

[JScript] public var Client: OutputCacheLocation;

Description

The output cache is located on the browser client where the request originated.

ToString

[C#] public const OutputCacheLocation Downstream;

[C++] public: const OutputCacheLocation Downstream;

[VB] Public Const Downstream As OutputCacheLocation

[JScript] public var Downstream: OutputCacheLocation;

Description

The output cache can be stored in any HTTP 1.1 cache-capable devices other than the origin server. This include proxy servers and the clietn that made the request.

ToString

[C#] public const OutputCacheLocation None;

[C++] public: const OutputCacheLocation None;

[VB] Public Const None As OutputCacheLocation

[JScript] public var None: OutputCacheLocation;

Description

The output cache is disabled for the requested page.

ToString

[C#] public const OutputCacheLocation Server;

[C++] public: const OutputCacheLocation Server;

[VB] Public Const Server As OutputCacheLocation

[JScript] public var Server: OutputCacheLocation;

Description

The output cache is located on the Web server where the request was processed.

Page class (System.Web.UI)

ToString

Description

Represents an .aspx file requested from a server that hosts an ASP.NET Web application.

The Page class is associated with files that have an .aspx extension. These files are compiled at runtime as a Page object and cached in server memory.

ToString

[C#] protected const string postEventArgumentID;

[C++] protected: const String* postEventArgumentID;

[VB] Protected Const postEventArgumentID As String

[JScript] protected var postEventArgumentID: String;

Description

ToString

[C#] protected const string postEventSourceID;

[C++] protected: const String* postEventSourceID;

[VB] Protected Const postEventSourceID As String

[JScript] protected var postEventSourceID: String;

Description

Page

Example Syntax:

ToString

[C#] public Page( );

[C++] public: Page( );

[VB] Public Sub New( )

[JScript] public function Page( );

Description

Initializes a new instance of the System.Web.UI.Page class.

The default constructor initializes all fields to their default values.

Application

ToString

[C#] public HttpApplicationState Application {get;}

[C++] public: _property HttpApplicationState* get_Application( );

[VB] Public ReadOnly Property Application As HttpApplicationState

[JScript] public function get Application( ): HttpApplicationState;

Description

Gets the Application object for the current Web request.

AspCompatMode

ToString

[C#] bool AspCompatMode {set;}

[C++] protected: _property void set_AspCompatMode (bool);

[VB] Property AspCompatMode As Boolean

[JScript] protected function set AspCompatMode(Boolean);

Description

Sets a value indicating whether the page can be executed on a single-threaded apartment (STA) thread.

When set to true, this allows the page to be executed on a single-threaded apartment (STA) thread. This allows the page to call STA components, such as components developed with Visual Basic 6.0. Setting this to true also allows the page to call COM+1.0 components that require access to the unmanaged ASP built-in objects. These are accessible through the ASP ObjectContext object or the OnStartPage method.

AutoHandlers
Buffer
ToString

Description

Sets a value indicating whether the page output is buffered.

In most circumstances, do not set this property in code. Set the buffer attribute to true using the directive in the .aspx file. When the page is requested, the dynamically generated class sets the property.

Cache
ToString

[C#] public Cache Cache {get;}

[C++] public: _property Cache* get_Cache( );

[VB] Public ReadOnly Property Cache As Cache

[JScript] public function get Cache( ): Cache;

Description

Gets the System.Web.Caching.Cache object associated with the application in which the page resides.

An application's Cache object allows you to store and retrieve arbitrary data on subsequent requests. The cache is not specifically associated with a page or user session. It is used primarily to enhance application performance. For more information, see.

ChildControlsCreated
ClientID
ClientTarget
ToString

Description

Gets or sets a value that allows you to override automatic detection of browser capabilities and to specify how a page renders for particular browser clients.

If you do not set this property, the System.Web.HttpBrowserCapabilities object associated with the System.Web.UI.Page.Request property reflects the capabilities of the client browser.

CodePage
ToString

[C#] int CodePage {set;}

[C++] protected: _property void set_CodePage(int);

[VB] Property CodePage As Integer

[JScript] protected function set CodePage(int);

Description

Sets the code page identifier for the current System.Web.UI.Page.

In most circumstances, do not set this property in code. Set the CodePage attribute to the value you want using the directive in the .aspx file. When the page is requested, the dynamically generated class sets the property.

ContentType
ToString

[C#] string ContentType {set;}

[C++] protected: _property void set_ContentType(String*);

[VB] Property ContentType As String

[JScript] protected function set ContentType(String);

Description

Sets the HTTP MIME type for the System.Web.HttpResponse object associated with the page.

In most circumstances, do not set this property in code. Set the ContentType attribute using the directive in the .aspx file. When the page is requested, the dynamically generated class sets the property.

Context
ToString

[C#] protected override HttpContext Context {get;}

[C++] protected: _property virtual HttpContext* get_Context( );

[VB] Overrides Protected ReadOnly Property Context As HttpContext

[JScript] protected function get Context( ): HttpContext;

Description

Gets the System.Web.HttpContext object associated with the page.

This property provides programmatic access to the context the page runs in, including information about the request, response, session and application.

Controls
Culture
ToString

Description

Sets the culture ID for the System.Threading.Thread object associated with the page.

In most circumstances, do not set this property in code. Set the Culture attribute in the directive in the .aspx file. When the page is requested, the dynamically generated class sets the property.

EnableViewState
ToString

[C#] public override bool EnableViewState {get; set;}

[C++] public: _property virtual bool get_EnableViewState( );public: _property virtual void set_EnableViewState(bool);

[VB] Overrides Public Property EnableViewState As Boolean

[JScript] public function get EnableViewState( ): Boolean; public function set EnableViewState(Boolean);

Description

Gets or sets a value indicating whether the page maintains its view state, and the view state of any server controls it contains, when the current page request ends.

EnableViewStateMac
ToString

[C#] protected bool EnableViewStateMac {get; set;}

[C++] protected: _property bool get_EnableViewStateMac( );protected: _property void set_EnableViewStateMac(bool);

[VB] Protected Property EnableViewStateMac As Boolean

[JScript] protected function get EnableViewStateMac( ): Boolean;protected function set EnableViewStateMac (Boolean);

Description

Gets or sets a value indicating whether ASP.NET should run a machine authentication check (MAC) on the page's view state when the page is posted back from the client.

In most circumstances, do not set this property in code. Set the EnableViewStateMac attribute to true using the directive in the .aspx file. When the page is requested, the dynamically generated class sets the property.

ErrorPage
ToString

[C#] public string ErrorPage {get; set;}

[C++] public: _property String* get_ErrorPage( );public: property void set_ErrorPage(String*);

[VB] Public Property ErrorPage As String

[JScript] public function get ErrorPage( ): String;public function set ErrorPage(String);

Description

Gets or sets the error page to which the requesting browser should be redirected in the event of an unhandled page exception.

Events

FileDependencies

ToString

Description

Sets an array of files that the current System.Web.HttpResponse object is dependent upon.

In most circumstances, do not set this property in code. Set the FileDependencies attribute to true using the directive in the .aspx file. When the page is requested, the dynamically generated class sets the property.

HasChildViewState

ID

ToString

Description

Gets or sets an identifier for a particular instance of the System.Web.UI.Page class.

IsPostBack

ToString

[C#] public bool IsPostBack {get;}

[C++] public: _property bool get_IsPostBack( );

[VB] Public ReadOnly Property IsPostBack As Boolean

[JScript] public function get IsPostBack( ): Boolean;

Description

Gets a value indicating whether the page is being loaded in response to a client postback, or if it is being loaded and accessed for the first time.

IsReusable

ToString

[C#] public bool IsReusable {get;}

[C++] public: _property bool get_IsReusable( );

[VB] Public ReadOnly Property IsReusable As Boolean

[JScript] public function get IsReusable( ): Boolean;

Description

Page class can be cached/reused

IsTrackingViewState

IsValid

ToString

Description

Gets a value indicating whether page validation succeeded.

For this property to return true, all validation server controls in the System.Web.UI.Page.Validators property must validate successfully.

LCID

ToString

[C#] int LCID {set;}

[C++] protected: _property void set_LCID(int);

[VB] Property LCID As Integer

[JScript] protected function set LCID(int);

Description

Sets the locale identifier for the System.Threading.Thread object associated with the page.

In most circumstances, do not set this property in code. Set the LCID attribute in the directive in the .aspx file. When the page is requested, the dynamically generated class sets the property.

NamingContainer

Page

Parent

Request

ToString

Description

Gets the System.Web.HttpRequest object for the requested page.

The Request object contains information about current incoming HTTP request.

Response

ToString

[C#] public HttpResponse Response {get;}

[C++] public: _property HttpResponse* get_Response( );

[VB] Public ReadOnly Property Response As HttpResponse

[JScript] public function get Response( ): HttpResponse;

Description

Gets the System.Web.HttpResponse object associated with the System.Web.UI.Page. This object allows you to send HTTP response data to a client, and contains information about that response.

ResponseEncoding

ToString

[C#] string ResponseEncoding {set;}

[C++] protected: _property void set_ResponseEncoding (String*);

[VB] Property ResponseEncoding As String

[JScript] protected function set ResponseEncoding(String);

Description

Sets the encoding language for the current System.Web.HttpResponse object.

In most circumstances, do not set this property in code. Set the ResponseEncoding attribute to the value you want using the directive in the .aspx file. When the page is requested, the dynamically generated class sets the property.

Server

ToString

[C#] public HttpServerUtility Server {get;}

[C++] public: _property HttpServerUtility* get_Server( );

[VB] Public ReadOnly Property Server As HttpServerUtility

[JScript] public function get Server( ): HttpServerUtility;

Description

Gets the Server object, which is an instance of the System.Web.HttpServerUtility class.

This property provides access to the frequently used System.Web.HttpServerUtility.HtmlEncode(System.String) and System.Web.HttpServerUtility.MapPath(System.String) methods, among others.

Session

ToString

[C#] public virtual HttpSessionState Session {get;}

[C++] public: _property virtual HttpSessionState* get_Session( );

[VB] Overridable Public ReadOnly Property Session As HttpSessionState

[JScript] public function get Session( ): HttpSessionState;

Description

Gets the current Session object provided by ASP.NET.

This property provides information about the current request's session. A Session object is maintained for each user that requests a page or document from an ASP.NET application. Variables stored in the Session object are not discarded when the user moves from page to page in the application; instead, these variables persist as long as the user is accessing pages in your application. For more information about session state, see.

Site

SmartNavigation

ToString

Description

Gets or sets a value indicating whether smart navigation is enabled.

In most circumstances, do not set this property in code. Set the SmartNavigation attribute to true in the directive in the .aspx file. When the page is requested, the dynamically generated class sets this property.

SupportAutoEvents

TemplateSourceDirectory

Trace

ToString

Description

Gets the System.Web.TraceContext object for the current Web request.

Tracing tracks and presents the execution details about a Web request. For trace data to be visible in a rendered page, you must enable tracing at the page or application level.

TraceEnabled

ToString

[C#] bool TraceEnabled {set;}

[C++] protected: _property void set_TraceEnabled(bool);

[VB] Property TraceEnabled As Boolean

[JScript] protected function set TraceEnabled(Boolean);

Description

Sets a value indicating whether tracing is enabled for the System.Web.UI.Page.

In most circumstances, do not set this property in code. Set the Trace attribute to true in the directive in the .aspx file. When the page is requested, the dynamically generated class sets the property.

TraceModeValue

ToString

[C#] TraceMode TraceModeValue {set;}

[C++] protected: _property void set_TraceModeValue (TraceMode);

[VB] Property TraceModeValue As TraceMode

[JScript] protected function set TraceModeValue(TraceMode);

Description

Sets the mode in which trace statements are displayed on the page.

In most circumstances, do not set this property in code. Set the TraceMode attribute in the directive in the .aspx file. When the page is requested, the dynamically generated class sets the property.

TransactionMode

ToString

[C#] int TransactionMode {set;}

[C++] protected: _property void set_TransactionMode(int);

[VB] Property TransactionMode As Integer

[JScript] protected function set TransactionMode(int);

Description

Sets the level of transaction support for the page.

In most circumstances, do not set this property in code. Set the Transaction attribute in the directive in the .aspx file. When the page is requested, the dynamically generated class sets the property.

UICulture

ToString

[C#] string UICulture {set;}

[C++] protected: _property void set_UICulture(String*);

[VB] Property UICulture As String

[JScript] protected function set UICulture(String);

Description

Sets the UT ID for the System.Threading.Thread object associated with the page.

This property is a shortcut for System.Threading.Thread.CurrentThread. The culture is a property of the executing thread UniqueID User ToString Description Gets information about the user making the page request.

An Iprincipal object represents the security context of the user on whose behalf the code is running, including that user's identity and any roles to which they belong.

Validators

ToString

[C#] public ValidatorCollection Validators {get;}

[C++] public: _property ValidatorCollection* get_Validators( );

[VB] Public ReadOnly Property Validators As ValidatorCollection

[JScript] public function get Validators( ): ValidatorCollection;

Description

Gets a collection of all validation controls contained on the requested page.

ViewState

ViewStateIgnoresCase

Visible

ToString

Description

Gets or sets a value indicating whether the System.Web.UI.Page object should be rendered.

AspCompatBeginProcessRequest

[C#] protected IAsyncResult AspCompatBeginProcessRequest(HttpContext context, AsyncCallback cb, object extraData);

[C++] protected: IAsyncResult* AspCompatBeginProcessRequest(HttpContext* context, AsyncCallback* cb, Object* extraData);

[VB] Protected Function AspCompatBeginProcessRequest (ByVal context As HttpContext, ByVal cb As AsyncCallback, ByVal extraData As Object) As IAsyncResult

[JScript] protected function AspCompatBeginProcessRequest(context: HttpContext, cb: AsyncCallback, extraData: Object): IAsyncResult;

Description

Initiates a request for Active Server Page (ASP) resources. This method is provided for compatibility with legacy ASP applications.

Do not call this method. An System.Web.HttpContext object with information about the current request. The callback method. Any extra data needed to process the request in the same manner as an ASP request.

AspCompatEndProcessRequest

[C#] protected void AspCompatEndProcessRequest(IAsyncResult result);

[C++] protected: void AspCompatEndProcessRequest (IAsyncResult* result);

[VB] Protected Sub AspCompatEndProcessRequest(ByVal result As IAsyncResult)

[JScript] protected function AspCompatEndProcessRequest (result: IAsyncResult);

Description

Terminates a request for Active Server Page (ASP) resources. This method is provided for compatibility with legacy ASP applications.

Do not call this method. The ASP page generated by the request.

CreateHtmlTextWriter

[C#] protected virtual HtmlTextWriter CreateHtmlTextWriter(TextWriter tw);

[C++] protected: virtual HtmlTextWriter* CreateHtmlTextWriter(TextWriter* tw);

[VB] Overridable Protected Function CreateHtmlTextWriter (ByVal tw As TextWriter) As HtmlTextWriter

[JScript] protected function CreateHtmlTextWriter(tw: TextWriter): HtmlTextWriter;

Description

Creates an System.Web.UI.HtmlTextWriter object to render the page's content.

Return Value: The specified System.Web.UI.HtmlTextWriter or System.Web.UI.Html32TextWriter object.

The object created is based on information from the System.Web.HttpBrowserCapabilities object associated with the page request. Usually, this object is an System.Web.UI.HtmlTextWriter or System.Web.UI.Html32TextWriter object. For derived pages, you can override this method to create a custom text writer Creates an System.Web.UI.HtmlTextWriter object to render the page's content. If the IsUplevel property is set to false, an Html32TextWriter object is created to render requests originating from downlevel browsers. For derived pages, you can override this method to create a custom text writer. The text writer to create.

DesignerInitialize

[C#] public void DesignerInitialize( );

[C++] public: void DesignerInitialize( );

[VB] Public Sub DesignerInitialize( )

[JScript] public function DesignerInitialize( );

Description

Performs any initialization of the instance of the System.Web.UI.Page class that is required by RAD designers. This method is only used at design time.

DeterminePostBackMode

[C#] protected virtual NameValueCollection DeterminePostBackMode( );

[C++] protected: virtual NameValueCollection* DeterminePostBackMode( );

[VB] Overridable Protected Function DeterminePostBackMode( ) As NameValueCollection

[JScript] protected function DeterminePostBackMode( ): NameValueCollection;

Description

Determines the type of request made for the Page class. This information is based on whether the page was posted back, and whether the GET or POST HTTP method was used for the request.

Return Value: If the postback used the POST method, the Form information is returned from the Context object. If the postback used the GET method, the query string information is returned. If the page is being requested for the first time, null is returned.

GetPostBackClientEvent

[C#] public string GetPostBackClientEvent(Control control, string argument);

[C++] public: String* GetPostBackClientEvent(Control* control, String* argument);

[VB] Public Function GetPostBackClientEvent(ByVal control As Control, ByVal argument As String) As String

[JScript] public function GetPostBackClientEvent(control: Control, argument: String): String;

Description

Obtains a reference to a client-side script function that causes, when invoked, a server postback to the form.

Return Value: The String that represents the client event. The server control that receives the client event postback. A System.String argument that is passed to the System.Web.UI.IPostBackEventHandler.RaisePostBackEvent(System.String) method.

GetPostBackClientHyperlink

[C#] public string GetPostBackClientHyperlink(Control control, string argument);

[C++] public: String* GetPostBackClientHyperlink(Control* control, String* argument);

[VB] Public Function GetPostBackClientHyperlink(ByVal control As Control, ByVal argument As String) As String

[JScript] public function GetPostBackClientHyperlink(control: Control, argument: String): String;

Description

Appends javascript: to the beginning of the return from a System.Web.UI.Page.GetPostBackEventReference(System.Web.UI.Control) call to allow hyperlink post back processing on the server.

Return Value: The name of the client-side function and the ID of the server control that processed the function and argument passed to the control. The server control to process the postback. The parameter passed to the server control.

GetPostBackEventReference

[C#] public string GetPostBackEventReference(Control control);

[C++] public: String* GetPostBackEventReference(Control* control);

[VB] Public Function GetPostBackEventReference(ByVal control As Control) As String

[JScript] public function GetPostBackEventReference(control: Control): String; Obtains a reference to a client-side script function that causes, when invoked, the server to postback to the page.

Description

Obtains a reference to a client-side script function that causes, when invoked, the server to postback to the page.

Return Value: The text of the client-side function call that can be inserted into a client-side event handler. The server control to process the postback on the server.

GetPostBackEventReference

[C#] public string GetPostBackEventReference(Control control, string argument); [C++] public: String* GetPostBackEventReference(Control* control, String* argument); [VB] Public Function GetPostBackEventReference(ByVal control As Control, ByVal argument As String) As String [JScript] public function GetPostBackEventReference(control: Control, argument: String): String;

Description

Obtains a reference to a client-side script function that causes, when invoked, the server to postback to the page. It also passes a parameter to the server control that performs the postback processing on the server.

Return Value: The text of the client-side function call that can be inserted into a client-side event handler. The server control to process the postback. The parameter passed to the server control.

GetTypeHashCode

[C#] public virtual int GetTypeHashCode( ); [C++] public: virtual int GetTypeHashCode( ); [VB] Overridable Public Function GetTypeHashCode( ) As Integer [JScript] public function GetTypeHashCode( ): int;

Description

Retrieves a hash code that is generated by Page objects that are generated at run time. This hash code is unique to the Page object's control hierarchy.

Return Value: The hash code generated at run time. The default is 0.

InitOutputCache

[C#] protected virtual void InitOutputCache(int duration, string varyByHeader, string varyByCustom, OutputCacheLocation location, string varyByParam); [C++] protected: virtual void InitOutputCache(int duration, String* varyByHeader, String* varyByCustom, OutputCacheLocation location, String* varyByParam); [VB] Overridable Protected Sub InitOutputCache(ByVal duration As Integer, ByVal varyByHeader As String, ByVal varyByCustom As String, ByVal location As OutputCacheLocation, ByVal varyByParam As String) [JScript] protected function InitOutputCache(duration: int, varyByHeader: String, varyByCustom: String, location: OutputCacheLocation, varyByParam: String);

Description

Initializes the output cache for the current page request.

You should not call this method. To enable and manipulate output caching for a page, use either the directive in the .aspx file, or the methods and properties of the System.Web.HttpCachePolicy class. The latter are accessible through Response.Cache syntax in the page's code-declaration block or code-behind file. For more information, see. An integer representing the amount of time that objects stored in the output cache are valid. A semi-colon separated list of headers that content from the output cache will vary by. A string that represents the Vary HTTP header. The location of the output cache as specified by the System.Web.UI.OutputCacheLocation enumeration. A semi-colon separated list of parameters, received by a GET or POST method, that content from the output cache will vary by.

IsClientScriptBlockRegistered

[C#] public bool IsClientScriptBlockRegistered(string key); [C++] public: bool IsClientScriptBlockRegistered(String* key); [VB] Public Function IsClientScriptBlockRegistered (ByVal key As String) As Boolean [JScript] public function IsClientScriptBlockRegistered(key: String): Boolean;

Description

Determines if the client script block is registered with the page.

Return Value: Returns true if the script block is registered; otherwise, false.

Call this method before calling System.Web.UI.Page.RegisterClientScriptBlock(System.String,System.String) to avoid unnecessarily assembling the client-side script. This particularly important if the script requires a large amount of server resources to create. The string key of the client script to search for.

IsStartupScriptRegistered

[C#] public bool IsStartupScriptRegistered(string key); [C++] public: bool IsStartupScriptRegistered(String* key); [VB] Public Function IsStartupScriptRegistered(ByVal key As String) As Boolean [JScript] public function IsStartupScriptRegistered(key: String): Boolean;

Description

Determines if the client startup script is registered with the System.Web.UI.Page object.

Return Value: true if the startup script is registered; otherwise, false.

Call this method before calling System.Web.UI.Page.RegisterStartupScript(System.String,System.String) to avoid unnecessarily assembling the client-side script. This particularly important if the script requires a large amount of server resources to create. The string key of the startup script to search for.

LoadPageStateFromPersistenceMedium

[C#] protected virtual object LoadPageStateFromPersistenceMedium( );

[C++] protected: virtual Object* LoadPageStateFromPersistenceMedium( );

[VB] Overridable Protected Function LoadPageStateFromPersistenceMedium( ) As Object

[JScript] protected function LoadPageStateFromPersistenceMedium( ): Object;

Description

Loads any saved view-state information to the System.Web.UI.Page object. Override this method if you want to load the Page view state in anything other than a hidden field.

Return Value: The saved view state.

If you want to specify something other than hidden fields to save view state when using this method, you must also override the SaveStateToPersistenceMedium method.

MapPath

[C#] public string MapPath(string virtualPath);

[C++] public: String* MapPath( String* virtualPath);

[VB] Public Function MapPath(ByVal virtualPath As String) As String

[JScript] public function MapPath(virtualPath: String): String;

Description

Retrieves the physical path that a virtual path, either absolute or relative, maps to.

Return Value: The physical path associated with the virtual path. A System.String that represents the virtual path.

ProcessRequest

[C#] public void ProcessRequest(HttpContext context);

[C++] public: _sealed void ProcessRequest(HttpContext* context);

[VB] NotOverridable Public Sub ProcessRequest(ByVal context As HttpContext)

[JScript] public function ProcessRequest(context: HttpContext);

Description

RaisePostBackEvent

[C#] protected virtual void RaisePostBackEvent(IPostBackEventHandler sourceControl, string eventArgument);

[C++] protected: virtual void RaisePostBackEvent(IPostBackEventHandler* sourceControl, String* eventArgument);

[VB] Overridable Protected Sub RaisePostBackEvent(ByVal sourceControl As IPostBackEventHandler, ByVal eventArgument As String)

[JScript] protected function RaisePostBackEvent(sourceControl: IPostBackEventHandler, eventArgument: String);

Description

Notifies the server control that caused postback that it should handle an incoming postback event.

The Page calls this when a post back occurs. This occurs in the page lifecycle after loading and change notification have completed, but before prerendering occurs. The ASP.NET server control that caused postback. This control must implement the IPostBackEventHandler interface. The post back argument.

RegisterArrayDeclaration

[C#] public void RegisterArrayDeclaration(string arrayName, string arrayValue);

[C++] public: void RegisterArrayDeclaration(String* arrayName, String* arrayValue);

[VB] Public Sub RegisterArrayDeclaration(ByVal arrayName As String, ByVal arrayValue As String)

[JScript] public function RegisterArrayDeclaration(arrayName: String, arrayValue: String);

Description

Declares a value that will be declared as an ECMAScript array declaration when the page renders. This can be used by script-based controls to declare themselves within an array so that a client script library can work with all the controls of the same type. The name of the array in which to declare the value. The value to place in the array.

RegisterClientScriptBlock

[C#] public virtual void RegisterClientScriptBlock(string key, string script);

[C++] public: virtual void RegisterClientScriptBlock(String* key, String* script);

[VB] Overridable Public Sub RegisterClientScriptBlock(ByVal key As String, ByVal script As String)

[JScript] public function RegisterClientScriptBlock(key: String, script: String);

Description

Allows ASP.NET server controls to emit client-side script blocks into the System.Web.UI.Page.

The client-side script is emitted jut after the opening tag of the Page object's Top of Form element. The script block is emitted as you define to the output stream, so you must include both tags of the Bottom of Form System.Web.UI.Design Description The System.Web.UI.Design namespace contains classes that can be used to extend design-time support for Web Forms.

CalendarDataBindingHandler class (System.Web.UI.Design)

Description

Provides a data binding handler for calendar data.

Constructors:

CalendarDataBindingHandler

Example Syntax:

[C#] public CalendarDataBindingHandler( );

[C++] public: CalendarDataBindingHandler( );

[VB] Public Sub New( )

[JScript] public function CalendarDataBindingHandler( );

Methods:

DataBindControl

[C#] public override void DataBindControl(IDesignerHost designerHost, Control control);

[C++] public: void DataBindControl(IDesignerHost* designerHost, Control* control);

[VB] Overrides Public Sub DataBindControl(ByVal designerHost As IDesignerHost, ByVal control As Control)

[JScript] public override function DataBindControl(designerHost: IDesignerHost, control: Control);

Description

Adds this data binding to the specified control. The designer host for the document that contains the control. The control to add this data binding to.

ColorBuilder class (System.Web.UI.Design)

ToString

Description

Launches a color editor that allows a user to select a color.

The System.Web.UI.Design.ColorBuilder.BuildColor (System.ComponentModel.IComponent,System.Windows.Forms.Control,System.String) method launches a user interface for selecting a color value.

BuildColor

[C#] public static string BuildColor(IComponent component, Control owner, string initialColor);

[C++] public: static String* BuildColor(IComponent* component, Control* owner, String* initialColor);

[VB] Public Shared Function BuildColor(ByVal component As IComponent, ByVal owner As Control, ByVal initialColor As String) As String

[JScript] public static function BuildColor(component: IComponent, owner: Control, initialColor: String): String;

Description

Launches a color editor to build a color.

Return Value: The color value, represented as a string in an HTML color format, or null if the builder service could not be retrieved.

The returned string, if other than null, indicates a color in a valid HTML color format. Valid formats include named colors and color codes in RGB format (#RRGGBB). The component whose site is to be used to access design-time services. The control used to parent the picker window. The initial color to be shown in the picker window.

ControlDesigner class (System.Web.UI.Design)

ToString

Description

Provides a base class for Web server control designers.

ControlDesigner

Example Syntax:

ToString

[C#] public ControlDesigner( );

[C++] public: ControlDesigner( );

[VB] Public Sub New( )

[JScript] public function ControlDesigner( );

Properties:

AllowResize

ToString

[C#] public virtual bool AllowResize {get;}

[C++] public: _property virtual bool get_AllowResize( );

[VB] Overridable Public ReadOnly Property AllowResize As Boolean

[JScript] public function get AllowResize( ): Boolean;

Description

Gets a value indicating whether or not the control can be resized.

AssociatedComponents
Behavior
Component
DataBindings
DesignTimeElement
DesignTimeElementView
ToString Description Gets the designer view control object for the designer.

DesignTimeHtmlRequiresLoadComplete
ToString

[C#] public virtual bool DesignTimeHtmlRequiresLoadComplete {get;}

[C++] public: _property virtual bool get_DesignTimeHtmlRequiresLoadComplete( );

[VB] Overridable Public ReadOnly Property DesignTimeHtmlRequiresLoadComplete As Boolean

[JScript] public function get DesignTimeHtmlRequiresLoadComplete( ): Boolean;

Description

Gets a value indicating whether the designer must have completed loading before the design time HTML can be used.

The default implementation returns false.

ID
ToString

[C#] public virtual string ID {get; set;}

[C++] public: _property virtual String* get_ID( );
public: _property virtual void set_ID(String*);

[VB] Overridable Public Property ID As String

[JScript] public function get ID( ): String;public function set ID(String);

Description

Gets or sets the ID for the control designer.

InheritanceAttribute
Inherited
IsDirty
ToString

Description

Gets or sets a value indicating whether the Web server control has been marked as changed.

ReadOnly
ToString

[C#] public bool ReadOnly {get; set;}

[C++] public: _property bool get ReadOnly( );public: _property void set_ReadOnly(bool);

[VB] Public Property ReadOnly As Boolean

[JScript] public function get ReadOnly( ): Boolean;public function set ReadOnly(Boolean);

Description

Gets or sets a value indicating whether the control's associated design surface is set to read-only.

ShadowProperties
ShouldCodeSerialize
Verbs
CreatePlaceHolderDesignTimeHtml

[C#] protected string CreatePlaceHolderDesignTimeHtml( );

[C++] protected: String* CreatePlaceHolderDesignTimeHtml( );

[VB] Protected Function CreatePlaceHolderDesignTimeHtml( ) As String

[JScript] protected function CreatePlaceHolderDesignTimeHtml( ): String; Creates a simple HTML section for the control that can be used to display information related to the control at design-time when there is not enough information to display a meaningful representation of the control.

Description

Creates a simple HTML section for the control that can be used to display information related to the control at design-time when there is not enough information to display a meaningful representation of the control.

Return Value: A string containing place-holder design-time HTML.

This method returns a string containing HTML in a standard place-holder style that an empty control can display at design-time to provide some basic information about the control. The string that is returned contains the type of the control and its ID.

CreatePlaceHolderDesignTimeHtml

[C#] protected string CreatePlaceHolderDesignTimeHtml (string instruction);

[C++] protected: String* CreatePlaceHolderDesignTimeHtml(String* instruction);

[VB] Protected Function CreatePlaceHolderDesignTimeHtml(ByVal instruction As String) As String

[JScript] protected function CreatePlaceHolderDesignTimeHtml(instruction: String): String;

Description

Creates a simple HTML section for the control, using the specified additional information, that can be used to display information related to the control at design-time when there is not enough information to display a meaningful representation of the control.

Return Value: A string containing place holder design-time HTML and the specified string.

This method returns a string containing HTML in a standard place-holder style that an empty control can display at design-time to provide some basic information about the control. The string that is returned contains the type of the control and its ID. A string conatining information to add to the HTML section.

GetDesignTimeHtml

[C#] public virtual string GetDesignTimeHtml( );

[C++] public: virtual String* GetDesignTimeHtml( );

[VB] Overridable Public Function GetDesignTimeHtml( ) As String

[JScript] public function GetDesignTimeHtml( ): String;

Description

Gets the HTML to be used for the design-time representation of the control.

Return Value: The design-time HTML for the control.

GetEmptyDesignTimeHtml

[C#] protected virtual string GetEmptyDesignTimeHtml( );

[C++] protected: virtual String* GetEmptyDesignTime Html( );

[VB] Overridable Protected Function GetEmptyDesignTimeHtml( ) As String

[JScript] protected function GetEmptyDesignTimeHtml( ): String;

Description

Gets the HTML to be used for the design-time representation of a blank control.

Return Value: The HTML used for the design-time representation of a blank control. This is the name of the component, by default.

The default behavior is to return a string containing the name of the component. This method is called by System.Web.UI.Design.ControlDesigner.GetDesignTimeHtml when there is no design-time HTML.

GetErrorDesignTimeHtml

[C#] protected virtual string GetErrorDesignTimeHtml(Exception e);

[C++] protected: virtual String* GetErrorDesignTimeHtml (Exception* e);

[VB] Overridable Protected Function GetErrorDesignTimeHtml(ByVal e As Exception) As String

[JScript] protected function GetErrorDesignTimeHtml(e: Exception): String;

Description

Gets the HTML to be used for the design-time representation of the control after an error has been encountered.

Return Value: The HTML for the specified exception. The exception that occurred.

GetPersistInnerHtml

[C#] public virtual string GetPersistInnerHtml( );

[C++] public: virtual String* GetPersistInnerHtml( );

[VB] Overridable Public Function GetPersistInnerHtml( ) As String

[JScript] public function GetPersistInnerHtml( ): String;

Description

Gets the persistable inner HTML.

Return Value: The persistable inner HTML.

Initialize

[C#] public override void Initialize(IComponent component);

[C++] public: void Initialize(IComponent* component);

[VB] Overrides Public Sub Initialize(ByVal component As IComponent)

[JScript] public override function Initialize(component: IComponent);

Description

Initializes the designer with the specified component.

This method is called by the designer host to establish the component being designed. The control element being designed.

IsPropertyBound

[C#] public bool IsPropertyBound(string propName);

[C++] public: bool IsPropertyBound(String* propName);

[VB] Public Function IsPropertyBound(ByVal propName As String) As Boolean

[JScript] public function IsPropertyBound(propName: String): Boolean;

Description

Gets a value indicating whether the specified property is data-bound.

Return Value: true if the property is data bound; othwerise, false. The property to check for data binding.

OnBehaviorAttached

[C#] protected override void OnBehaviorAttached( );

[C++] protected: void OnBehaviorAttached( );

[VB] Overrides Protected Sub OnBehaviorAttached( )

[JScript] protected override function OnBehaviorAttached( );

Description

Called when the designer is attached to the behavior.

OnBindingsCollectionChanged

[C#] protected override void OnBindingsCollectionChanged (string propName);

[C++] protected: void OnBindingsCollectionChanged (String* propName);

[VB] Overrides Protected Sub OnBindingsCollectionChanged(ByVal propName As String)

[JScript] protected override function OnBindingsCollectionChanged(propName: String);

Description

Called when the data bindings collection changes.

This method is called when the bindings collection has been changed by an external caller. In Visual Studio.NET, this method is called by the WebFormDataTab. The property to test for changes in its bindings collection.

OnComponentChanged

[C#] public virtual void OnComponentChanged(object sender, ComponentChangedEventArgs ce);

[C++] public: virtual void OnComponentChanged(Object* sender, ComponentChangedEventArgs* ce);

[VB] Overridable Public Sub OnComponentChanged(ByVal sender As Object, ByVal ce As ComponentChangedEventArgs)

[JScript] public function OnComponentChanged(sender: Object, ce: ComponentChangedEventArgs);

Description

Called when the component changes.

This method is called when a property is changed. It allows the implementer to do any processing that may be needed after a property change. The object that is the source of the event. A System.ComponentModel.Design.ComponentChangedEventArgs object that provides data about the event.

OnControlResize

[C#] protected virtual void OnControlResize( );

[C++] protected: virtual void OnControlResize( );

[VB] Overridable Protected Sub OnControlResize( )

[JScript] protected function OnControlResize( );

Description

Called when the design-time control has been resized.

This method is typically only called by the design-time environment when a user action causes the control to be resized. This method may be called several times during a resize process to display the updated size of the control before the resize process is completed. The width and height properties of the control are updated before this method is called.

PreFilterProperties

[C#] protected override void PreFilterProperties (IDictionary properties);

[C++] protected: void PreFilterProperties(IDictionary* properties);

[VB] Overrides Protected Sub PreFilterProperties(ByVal properties As IDictionary)

[JScript] protected override function PreFilterProperties (properties: IDictionary);

RaiseResizeEvent

[C#] public void RaiseResizeEvent( );

[C++] public: void RaiseResizeEvent( );

[VB] Public Sub RaiseResizeEvent( )

[JScript] public function RaiseResizeEvent( );

Description

Raises the System.Web.UI.Design.ControlDesigner.OnControtResize event.

UpdateDesignTimeHtml

[C#] public virtual void UpdateDesignTimeHtml( );

[C++] public: virtual void UpdateDesignTimeHtml( );

[VB] Overridable Public Sub UpdateDesignTimeHtml( )

[JScript] public function UpdateDesignTimeHtml( );

Description

Updates the design-time HTML.

ControlParser class (System.Web.UI.Design)

UpdateDesignTimeHtml

Description

Provides methods for parsing the code for a control.

ParseControl

[C#] public static Control ParseControl(IDesignerHost designerHost, string controlText);

[C++] public: static Control* ParseControl(IDesignerHost* designerHost, String* controlText);

[VB] Public Shared Function ParseControl(ByVal designerHost As IDesignerHost, ByVal controlText As String) As Control

[JScript] public static function ParseControl(designerHost: IDesignerHost, controlText: String): Control; Initializes a new instance of the System.Web.UI.Design.ControlParser class using the specified designer host and control text.

Description

Initializes a new instance of the System.Web.UI.Design.ControlParser class using the specified designer host and control text.

Return Value: The Control that the specified text represents, or null if the parser could not build the control. The designer host for the document. The text of the code for the control.

ParseControl

[C#] public static Control ParseControl(IDesignerHost designerHost, string controlText, string directives);

[C++] public: static Control* ParseControl(IDesignerHost* designerHost, String* controlText, String* directives);

[VB] Public Shared Function ParseControl(ByVal designerHost As IDesignerHost, ByVal controlText As String, ByVal directives As String) As Control

[JScript] public static function ParseControl(designerHost: IDesignerHost, controlText: String, directives: String): Control;

Description

Initializes a new instance of the System.Web.UI.Design.ControlParser class using the specified designer host, control text and directives.

Return Value: The Control that the specified text represents, or null if the parser could not build the control. The designer host of the document. The text of the code for the control. The directives to include in the code for the control.

ParseTemplate

[C#] public static ITemplate ParseTemplate(IDesignerHost designerHost, string templateText);

[C++] public: static ITemplate* ParseTemplate(IDesignerHost* designerHost, String* templateText);

[VB] Public Shared Function ParseTemplate(ByVal designerHost As IDesignerHost, ByVal templateText As String) As ITemplate

[JScript] public static function ParseTemplate(designerHost: IDesignerHost, templateText: String): ITemplate; Parses the specified text of a template.

Description

Parses the specified text of a template.

Return Value: A new template based on the specified text. The designer host of the document. The text of the code for a template.

ParseTemplate

[C#] public static ITemplate ParseTemplate(IDesignerHost designerHost, string templateText, string directives);

[C++] public: static ITemplate* ParseTemplate(IDesignerHost* designerHost, String* templateText, String* directives);

[VB] Public Shared Function ParseTemplate(ByVal designerHost As IDesignerHost, ByVal templateText As String, ByVal directives As String) As ITemplate

[JScript] public static function ParseTemplate(designerHost: IDesignerHost, templateText: String, directives: String): ITemplate;

Description

Parses the specified text of a template.

Return Value: A new template based on the specified text. The designer host of the document. The text of the code for a template. Any directives to add to the beginning of the code for the template.

ControlPersister class (System.Web.UI.Design)

ToString

Description

Provides helper functions for persisting Web server controls.

PersistControl

[C#] public static string PersistControl(Control control);

[C++] public: static String* PersistControl(Control* control);

[VB] Public Shared Function PersistControl(ByVal control As Control) As String

[JScript] public static function PersistControl(control: Control): String; Gets a string of persistence data that can persist a control.

Description

Gets a string of persistence data that can persist a control.

Return Value: A string that contains the information to persist about the control. The System.Web.UI.Control to persist.

PersistControl

[C#] public static string PersistControl(Control control, IDesignerHost host);

[C++] public: static String* PersistControl(Control* control, IDesignerHost* host);

[VB] Public Shared Function PersistControl(ByVal control As Control, ByVal host As IDesignerHost) As String

[JScript] public static function PersistControl(control: Control, host: IDesignerHost): String;

Description

Gets a string of persistence data that can persist a control.

Return Value: A string that contains the information to persist about the control. The System.Web.UI.Control to persist. The designer host for the control.

PersistControl

[C#] public static void PersistControl(TextWriter sw, Control control);

[C++] public: static void PersistControl(TextWriter* sw, Control* control);

[VB] Public Shared Sub PersistControl(ByVal sw As TextWriter, ByVal control As Control)

[JScript] public static function PersistControl(sw: TextWriter, control: Control);

Description

Persists a control using the specified text writer. The System.IO.TextWriter to use. The System.Web.UI.Control to persist.

PersistControl

[C#] public static void PersistControl(TextWriter sw, Control control, IDesignerHost host);

[C++] public: static void PersistControl(TextWriter* sw, Control* control, IDesignerHost* host);

[VB] Public Shared Sub PersistControl(ByVal sw As TextWriter, ByVal control As Control, ByVal host As IDesignerHost)

[JScript] public static function PersistControl(sw: TextWriter, control: Control, host: IDesignerHost);

Description

Persists a control using the specified text writer. The System.IO.TextWriter to use. The System.Web.UI.Control to persist. The designer host for the control.

PersistInnerProperties

[C#] public static string PersistInnerProperties(object component, IDesignerHost host);

[C++] public: static String* PersistInnerProperties(Object* component, IDesignerHost* host);

[VB] Public Shared Function PersistInnerProperties(ByVal component As Object, ByVal host As IDesignerHost) As String

[JScript] public static function PersistInnerProperties(component: Object, host: IDesignerHost): String; Gets a string of persistance data that can persist the inner properties of a control.

Description

Gets a string of persistance data that can persist the inner properties of a control.

Return Value: A string that contains the information to persist about the inner properties of the control. The System.Web.UI. Control to persist. The designer host of the control.

PersistInnerProperties

[C#] public static void PersistInnerProperties(TextWriter sw, object component, IDesignerHost host);

[C++] public: static void PersistInnerProperties(TextWriter* sw, Object* component, IDesignerHost* host);

[VB] Public Shared Sub PersistInnerProperties(ByVal sw As TextWriter, ByVal component As Object, ByVal host As IDesignerHost)

[JScript] public static function PersistInnerProperties(sw: TextWriter, component: Object, host: IDesignerHost);

Description

Persists the inner properties of the control using the specified text writer. The System.IO.TextWriter to use. The System.Web.UI.Control to persist. The designer host of the control.

DataBindingCollectionConverter class (System.Web.UI.Design)

ToString

Description

Provides a type converter to convert data binding collections to various other representations.

DataBindingCollectionConverter

Example Syntax:

ToString

[C#] public DataBindingCollectionConverter( );

[C++] public: DataBindingCollectionConverter( );

[VB] Public Sub New( )

[JScript] public function DataBindingCollectionConverter( );

ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object;

Description

Converts a data binding collection to the specified type.

Return Value: The object produced by the type conversion. An System.ComponentModel.ITypeDescriptorContext that indicates the component or control the data binding collection belongs to. A System.Globalization.CultureInfo that can be used to provide additional culture information. The object to convert. The type to convert to.

DataBindingCollectionEditor class (System.Web.UI.Design)

ToString

Description

Provides user interface for editing a collection of data bindings.

DataBindingCollectionEditor

Example Syntax:

ToString

[C#] public DataBindingCollectionEditor( );

[C++] public: DataBindingCollectionEditor( );

[VB] Public Sub New( )

[JScript] public function DataBindingCollectionEditor( );

EditValue

[C#] public override object EditValue(ITypeDescriptorContext context, IServiceProvider provider, object value);

[C++] public: Object* EditValue(ITypeDescriptorContext* context, IServiceProvider* provider, Object* value);

[VB] Overrides Public Function EditValue(ByVal context As ITypeDescriptorContext, ByVal provider As IServiceProvider, ByVal value As Object) As Object

[JScript] public override function EditValue(context: ITypeDescriptorContext, provider: IServiceProvider, value: Object): Object;

Description

Edits the value of the specified data binding collection using the specified service provider and context.

Return Value: The new collection. An System.ComponentModel.ITypeDescriptorContext that identifies the component or control the collection belongs to. The System.IServiceProvider to use. The collection to edit.

GetEditStyle

[C#] public override UITypeEditorEditStyle GetEditStyle (ITypeDescriptorContext context);

[C++] public: UITypeEditorEditStyle GetEditStyle(ITypeDescriptorContext* context);

[VB] Overrides Public Function GetEditStyle(ByVal context As ITypeDescriptorContext) As UITypeEditorEditStyle

[JScript] public override function GetEditStyle(context: ITypeDescriptorContext) UITypeEditorEditStyle;

Description

Gets the editor stytle used by the System.Web.UI.Design.DataBindingCollectionEditor.EditValue(System.ComponentModel.ITypeDescriptorContext,System.IServiceProvider,System.Object) method.

Return Value: A System.Drawing.Design.UITypeEditorEditStyle that specifies the editor edit style of the component or control. An System.ComponentModel.ITypeDescriptorContext that identifies the component or control to retrieve the edit style for.

DataBindingHandler class (System.Web.UI.Design)

ToString

Description

Provides a base class for a data binding handler.

DataBindingHandler

Example Syntax:

ToString

[C#] protected DataBindingHandler( );

[C++] protected: DataBindingHandler( );

[VB] Protected Sub New( )

[JScript] protected function DataBindingHandler( );

DataBindControl

[C#] public abstract void DataBindControl(IDesignerHost designerHost, Control control);

[C++] public: virtual void DataBindControl(IDesignerHost* designerHost, Control* control)=0;

[VB] MustOverride Public Sub DataBindControl(ByVal designerHost As IDesignerHost, ByVal control As Control)

[JScript] public abstract function DataBindControl(designerHost: IDesignerHost, control: Control);

Description

Adds this data binding to the specified control. The designer host of the document. The control to data bind to.

DataBindingValueUIHandler class (System.Web.UI.Design)

ToString

Description

Provides a UI handler for data binding values.

DataBindingValueUIHandler

Example Syntax:

ToString

[C#] public DataBindingValueUIHandler( );

[C++] public: DataBindingValueUIHandler( );

[VB] Public Sub New( )

[JScript] public function DataBindingValueUIHandler( );

OnGetUIValueItem

[C#] public void OnGetUIValueItem(ITypeDescriptorContext context, PropertyDescriptor propDesc, ArrayList valueUIItemList);

[C++] public: void OnGetUIValueItem(ITypeDescriptorContext* context, PropertyDescriptor* propDesc, ArrayList* valueUIItemList);

[VB] Public Sub OnGetUIValueItem(ByVal context As ITypeDescriptorContext, ByVal propDesc As PropertyDescriptor, ByVal valueUIItemList As ArrayList)

[JScript] public function OnGetUIValueItem(context: ITypeDescriptorContext, propDesc: PropertyDescriptor, valueUIItemList: ArrayList);

Description

Adds a data binding for the specified property and the specified value item list if the current control has data bindings and the current object does not already have a binding. An System.ComponentModel.ITypeDescriptorContext object that can provide additional context information. A System.ComponentModel.PropertyDescriptor that represents the property to add a data binding for. A list of items that have data bindings.

DataFieldConverter class (System.Web.UI.Design)

ToString

Description

Provides a type converter that can retrieve a list of data fields that are accessible through the current component's selected data source, and convert a data field name to string.

System.Web.UI.Design.DataFieldConverter provides methods that can be used to do the following: Convert a data field name string to string.

DataFieldConverter

Example Syntax:

ToString

[C#] public DataFieldConverter( );

[C++] public: DataFieldConverter( );

[VB] Public Sub New( )

[JScript] public function DataFieldConverter( );

Description

Initializes a new instance of the System.Web.UI.Design.DataFieldConverter class.

CanConvertFrom

[C#] public override bool CanConvertFrom(ITypeDescriptorContext context, Type sourceType);

[C++] public: bool CanConvertFrom(ITypeDescriptorContext* context, Type* sourceType);

[VB] Overrides Public Function CanConvertFrom(ByVal context As ITypeDescriptorContext, ByVal sourceType As Type) As Boolean

[JScript] public override function CanConvertFrom(context: ITypeDescriptorContext, sourceType: Type): Boolean;

Description

Gets a value indicating whether the converter can convert an object of the specified source type to the native type of the converter.

Return Value: true if the converter can perform the conversion; otherwise, false.

This method returns true if the source type is a string. Otherwise, this method always returns false. An System.ComponentModel.ITypeDescriptorContext that can be used to gain additional context information. A System.Type that represents the type you wish to convert from.

ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: ITypeDescriptorContext, culture: CultureInfo, value: Object): Object;

Description

Converts the specified object to the native type of the converter.

Return Value: An System.Object that represents the specified object after conversion.

Override this method to provide your own conversion requirements. An System.ComponentModel.ITypeDescriptorContext that can be used to gain additional context information. A System.Globalization.CultureInfo that can be used to support localization features. The System.Object to convert.

GetStandardValues

[C#] public override StandardValuesCollection GetStandardValues(ITypeDescriptorContext context);

[C++] public: StandardValuesCollection* GetStandardValues(ITypeDescriptorContext* context);

[VB] Overrides Public Function GetStandardValues(ByVal context As ITypeDescriptorContext) As StandardValuesCollection

[JScript] public override function GetStandardValues(context: ITypeDescriptorContext): StandardValuesCollection;

Description

Gets the data fields present within the selected data source if information about them is available.

Return Value: A System.ComponentModel.TypeConverter.StandardValuesCollection listing the standard accessible data sources. An System.ComponentModel.ITypeDescriptorContext indicating the component or control to get values for.

GetStandardValuesExclusive

[C#] public override bool GetStandardValuesExclusive(ITypeDescriptorContext context);

[C++] public: bool GetStandardValuesExclusive(ITypeDescriptorContext* context);

[VB] Overrides Public Function GetStandardValuesExclusive(ByVal context As ITypeDescriptorContext) As Boolean

[JScript] public override function GetStandardValuesExclusive(context: ITypeDescriptorContext): Boolean;

Description

Gets a value indicating whether the collection of standard values returned from System.ComponentModel.TypeConverter.GetStandardValues is an exclusive list of all possible values.

Return Value: true if the System.ComponentModel.TypeConverter.StandardValuesCollection returned from System.ComponentModel.TypeConverter.GetStandardValues is an all exclusive list of all possible values; false if other values are possible.

If the list is exclusive, such as in an enumeration data type, then no other values are valid. If the list is not exclusive, then there are other valid values besides the list of standard values that System.ComponentModel.TypeConverter.GetStandardValues provides. An System.ComponentModel.ITypeDescriptorContext that can be used to gain additional context information.

GetStandardValuesSupported

[C#] public override bool GetStandardValuesSupported(ITypeDescriptorContext context);

[C++] public: bool GetStandardValuesSupported(ITypeDescriptorContext* context);

[VB] Overrides Public Function GetStandardValuesSupported(ByVal context As ITypeDescriptorContext) As Boolean

[JScript] public override function GetStandardValuesSupported(context: ITypeDescriptorContext): Boolean; Gets a value indicating whether the converter supports a standard set of values that can be picked from a list.

Description

Gets a value indicating whether the converter supports a standard set of values that can be picked from a list.

Return Value: true if System.ComponentModel.TypeConverter.GetStandardValues can be called to find a common set of values the object supports; otherwise, false. An System.ComponentModel.ITypeDescriptorContext that can be used to gain additional context information.

DataMemberConverter class (System.Web.UI.Design)

ToString

Description

Provides a type converter that can retrieve a list of data members that are accessible through the current component's selected data source, and convert a data member name to string.

System.Web.UI.Design.DataMemberConverter provides methods that can do the following: Convert a data member name string to string.

DataMemberConverter

Example Syntax:

ToString

[C#] public DataMemberConverter( );

[C++] public: DataMemberConverter( );

[VB] Public Sub New( )

[JScript] public function DataMemberConverter( );

Description

Initializes a new instance of the System.Web.UI.Design.DataFieldConverter class.

CanConvertFrom

[C#] public override bool CanConvertFrom(ITypeDescriptorContext context, Type sourceType);

[C++] public: bool CanConvertFrom(ITypeDescriptorContext* context, Type* sourceType);

[VB] Overrides Public Function CanConvertFrom(ByVal context As ITypeDescriptorContext, ByVal sourceType As Type) As Boolean

[JScript] public override function CanConvertFrom(context: ITypeDescriptorContext, sourceType: Type): Boolean;

Description

Gets a value indicating whether the converter can convert an object of the specified source type to the native type of the converter.

Return Value: true if the converter can perform the conversion; otherwise, false.

Override this method to provide your own conversion requirements. An System.ComponentModel.ITypeDescriptorContext that can be used to gain additional context information. A System.Type that represents the type you wish to convert from.

ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: ITypeDescriptorContext, culture: CultureInfo, value: Object): Object;

Description

Converts the specified object to the native type of the converter.

Return Value: An System.Object that represents the specified object after conversion.

Override this method to provide your own conversion requirements. An System.ComponentModel.ITypeDescriptorContext that can be used to gain additional context information. A System.Globalization.CultureInfo that can be used to support localization features. The System.Object to convert.

GetStandardValues

[C#] public override StandardValuesCollection GetStandardValues(ITypeDescriptorContext context);

[C++] public: StandardValuesCollection* GetStandardValues(ITypeDescriptorContext* context);

[VB] Overrides Public Function GetStandardValues(ByVal context As ITypeDescriptorContext) As StandardValuesCollection

[JScript] public override function GetStandardValues(context: ITypeDescriptorContext): StandardValuesCollection;

Description

Gets the data members present within the selected data source, if information about them is available.

Return Value: A System.ComponentModel.TypeConverter.StandardValuesCollection listing the standard accessible data sources. An System.ComponentModel.ITypeDescriptorContext indicating the component or control to get values for.

GetStandardValuesExclusive

[C#] public override bool GetStandardValuesExclusive(ITypeDescriptorContext context);

[C++] public: bool GetStandardValuesExclusive(ITypeDescriptorContext* context);

[VB] Overrides Public Function GetStandardValuesExclusive(ByVal context As ITypeDescriptorContext) As Boolean

[JScript] public override function GetStandardValuesExclusive(context: ITypeDescriptorContext): Boolean;

Description

Gets a value indicating whether the collection of standard values returned from System.ComponentModel.TypeConverter.GetStandardValues is an exclusive list of all possible values.

Return Value: true if the System.ComponentModel.TypeConverter.StandardValuesCollection returned from System.ComponentModel.TypeConverter.GetStandardValues is an exclusive list of possible values; false if other values are possible.

If the list is exclusive, such as in an enumeration data type, then no other values are valid. If the list is not exclusive, then there are other valid values besides the list of standard values that System.ComponentModel.TypeConverter.GetStandardValues provides. An System.ComponentModel.ITypeDescriptorContext that provides a format context.

GetStandardValuesSupported

[C#] public override bool GetStandardValuesSupported(ITypeDescriptorContext context);

[C++] public: bool GetStandardValuesSupported(ITypeDescriptorContext* context);

[VB] Overrides Public Function GetStandardValuesSupported(ByVal context As ITypeDescriptorContext) As Boolean

[JScript] public override function GetStandardValuesSupported(context: ITypeDescriptorContext): Boolean; Gets a value indicating whether the converter supports a standard set of values that can be picked from a list.

Description

Gets a value indicating whether the converter supports a standard set of values that can be picked from a list.

Return Value: true if System.ComponentModel.TypeConverter.GetStandardValues should be called to find a common set of values the object supports; otherwise, false. An System.ComponentModel.ITypeDescriptorContext that can be used to gain additional context information.

DataSourceConverter class (System.Web.UI.Design)

ToString

Description

Provides a type converter that can retrieve a list of data sources accessible to the current component, and convert a data source name to string.

System.Web.UI.Design.DataSourceConverter provides methods that can be used to do the following: Convert a data source name string to string.

DataSourceConverter

Example Syntax:

ToString

[C#] public DataSourceConverter( );

[C++] public: DataSourceConverter( );

[VB] Public Sub New( )

[JScript] public function DataSourceConverter( );

Description

Initializes a new instance of the System.Web.UI.Design.DataSourceConverter class.

CanConvertFrom

[C#] public override bool CanConvertFrom(ITypeDescriptorContext context, Type sourceType);

[C++] public: bool CanConvertFrom(ITypeDescriptorContext* context, Type* sourceType);

[VB] Overrides Public Function CanConvertFrom(ByVal context As ITypeDescriptorContext, ByVal sourceType As Type) As Boolean

[JScript] public override function CanConvertFrom(context: ITypeDescriptorContext, sourceType: Type): Boolean;

Description

Gets a value indicating whether the converter can convert an object of the specified source type to the native type of the converter.

Return Value: true if the converter can perform the conversion; otherwise, false.

Override this method to provide your own conversion requirements. An System.ComponentModel.ITypeDescriptorContext that can be used to gain additional context information. A System.Type that represents the type you wish to convert from.

ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: ITypeDescriptorContext, culture: CultureInfo, value: Object): Object;

Description

Converts the specified object to the native type of the converter.

Return Value: An System.Object that represents the specified object after conversion.

Override this method to provide your own conversion requirements. An System.ComponentModel.ITypeDescriptorContext that can be used to gain additional context information. The System.Globalization.CultureInfo that can be used to support localization features. The System.Object to convert.

GetStandardValues

[C#] public override StandardValuesCollection GetStandardValues(ITypeDescriptorContext context);

[C++] public: StandardValuesCollection* GetStandardValues(ITypeDescriptorContext* context);

[VB] Overrides Public Function GetStandardValues(ByVal context As ITypeDescriptorContext) As StandardValuesCollection

[JScript] public override function GetStandardValues(context: ITypeDescriptorContext): StandardValuesCollection;

Description

Gets the standard data sources accessible to the control.

Return Value: A System.ComponentModel.TypeConverter.StandardValuesCollection listing the standard accessible data sources. An System.ComponentModel.ITypeDescriptorContext indicating the component or control to get values for.

GetStandardValuesExclusive

[C#] public override bool GetStandardValuesExclusive(ITypeDescriptorContext context);

[C++] public: bool GetStandardValuesExclusive(ITypeDescriptorContext* context);

[VB] Overrides Public Function GetStandardValuesExclusive(ByVal context As ITypeDescriptorContext) As Boolean

[JScript] public override function GetStandardValuesExclusive(context: ITypeDescriptorContext): Boolean;

Description

Gets a value indicating whether the collection of standard values returned from System.ComponentModel.TypeConverter.GetStandardValues is an exclusive list of all possible values.

Return Value: true if the System.ComponentModel.TypeConverter.StandardValuesCollection returned from System.ComponentModel.TypeConverter.GetStandardValues is an exclusive list of all possible values; false if other values are possible.

If the list is exclusive, such as in an enumeration data type, then no other values are valid. If the list is not exclusive, then there are other valid values besides the list of standard values that System.ComponentModel.TypeConverter.GetStandardValues provides. An System.ComponentModel.ITypeDescriptorContext that can be used to gain additional context information.

GetStandardValuesSupported

[C#] public override bool GetStandardValuesSupported(ITypeDescriptorContext context);

[C++] public: bool GetStandardValuesSupported(ITypeDescriptorContext* context);

[VB] Overrides Public Function GetStandardValuesSupported(ByVal context As ITypeDescriptorContext) As Boolean

[JScript] public override function GetStandardValuesSupported(context: ITypeDescriptorContext): Boolean; Gets a value indicating whether the converter supports a standard set of values that can be picked from a list.

Description

Gets a value indicating whether the converter supports a standard set of values that can be picked from a list.

Return Value: true if System.ComponentModel.TypeConverter.GetStandardValues should be called to find a common set of values the object supports; otherwise, false. An System.ComponentModel.ITypeDescriptorContext that can be used to gain A additional context information.

DesignTimeData class (System.Web.UI.Design)

ToString

Description

Provides helper methods that can be used by control designers to generate sample data for use in design time databinding.

ToString

[C#] public static readonly EventHandler DataBindingHandler;

[C++] public: static EventHandler* DataBindingHandler;

[VB] Public Shared ReadOnly DataBindingHandler As EventHandler

[JScript] public static var DataBindingHandler: EventHandler;

CreateDummyDataTable

[C#] public static DataTable CreateDummyDataTable( );

[C++] public: static DataTable* CreateDummyDataTable( );

[VB] Public Shared Function CreateDummyDataTable( ) As DataTable

[JScript] public static function CreateDummyDataTable( ): DataTable;

Description

Creates a datatable that contains sample data.

Return Value: A new System.Data.DataTable that contains 3 columns of type string.

CreateSampleDataTable

[C#] public static DataTable CreateSampleDataTable(IEnumerable referenceData);

[C++] public: static DataTable* CreateSampleDataTable(IEnumerable* referenceData);

[VB] Public Shared Function CreateSampleDataTable(ByVal referenceData As IEnumerable) As DataTable

[JScript] public static function CreateSampleDataTable(referenceData: IEnumerable): DataTable;

Description

Creates a sample datatable with the same schema as the supplied datasource.

Return Value: A sample data table that contains dummy data in the format of the specified data source, or a default dummy data table if the specified data source contained no data columns. A data source with the schema to use as the format for the sample datatable.

GetDataFields

[C#] public static PropertyDescriptorCollection GetDataFields(IEnumerable dataSource);

[C++] public: static PropertyDescriptorCollection* GetDataFields(IEnumerable* dataSource);

[VB] Public Shared Function GetDataFields(ByVal dataSource As IEnumerable) As PropertyDescriptorCollection

[JScript] public static function GetDataFields(dataSource: IEnumerable): PropertyDescriptorCollection;

Description

Gets the data fields of the specified data source.

Return Value: A System.ComponentModel.PropertyDescriptorCollection that represents the data fields of the speciifed data source. The data source to retrieve the data fields of.

GetDataMember

[C#] public static IEnumerable GetDataMember(IListSource dataSource, string dataMember);

[C++] public: static IEnumerable* GetDataMember(IListSource* dataSource, String* dataMember);

[VB] Public Shared Function GetDataMember(ByVal dataSource As IListSource, ByVal dataMember As String) As IEnumerable

[JScript] public static function GetDataMember(dataSource: IListSource, dataMember: String): IEnumerable;

Description

Gets the specified data member from the specified data source.

Return Value: The specified data member from the specified data source, if it exists.

This method searches the specified data source for the specified data member. If the dataMember property is null, the first item in the specified data source is returned. The data source that contains the member to retrieve. The data member to retrieve.

GetDataMembers

[C#] public static string[ ] GetDataMembers(object dataSource);

[C++] public: static String* GetDataMembers(Object* dataSource) _gc[ ];

[VB] Public Shared Function GetDataMembers(ByVal dataSource As Object) As String( )

[JScript] public static function GetDataMembers(dataSource: Object): String[ ];

Description

Gets the data members of the specified data source.

Return Value: A string array that represents the data members of the specified data source. The data source to retrieve the members of.

GetDesignTimeDataSource

[C#] public static IEnumerable GetDesignTimeDataSource (DataTable dataTable, int minimumRows);

[C++] public: static IEnumerable* GetDesignTimeDataSource(DataTable* dataTable, int minimumRows);

[VB] Public Shared Function GetDesignTimeDataSource (ByVal dataTable As DataTable, ByVal minimumRows As Integer) As IEnumerable

[JScript] public static function GetDesignTimeDataSource (dataTable: DataTable, minimumRows: int): IEnumerable;

Description

Adds sample rows to the specified data table and returns the updated table.

Return Value: A live data source for use at design time. The table that defines the shape of the data source. Sample rows are added to this table. The minimum number of rows of sample data that the data source will contain.

GetSelectedDataSource

[C#] public static object GetSelectedDataSource(IComponent component, string dataSource);

[C++] public: static Object* GetSelectedDataSource(IComponent* component, String* dataSource);

[VB] Public Shared Function GetSelectedDataSource(ByVal component As IComponent, ByVal dataSource As String) As Object

[JScript] public static function GetSelectedDataSource(component: IComponent, dataSource: String): Object; Gets the specified data source.

Description

Gets the specified data source.

Return Value: The data source object, or null if the data source, specified component's site, or the container of the data source could not be accessed. The component that contains the data source. The data source to retrieve.

GetSelectedDataSource

[C#] public static IEnumerable GetSelectedDataSource (IComponent component, string dataSource, string dataMember);

[C++] public: static IEnumerable* GetSelectedDataSource (IComponent* component, String* dataSource, String* dataMember);

[VB] Public Shared Function GetSelectedDataSource(ByVal component As IComponent, ByVal dataSource As String, ByVal dataMember As String) As IEnumerable

[JScript] public static function GetSelectedDataSource(component: IComponent, dataSource: String, dataMember: String): IEnumerable;

Description

Gets the specified data member of the specified data source.

Return Value: The data member, or null if the data source could not be accessed. The component that contains the data source. The data source to retrieve. The data member to retrieve.

HtmlControlDesigner class (System.Web.UI.Design)

ToString

Description

Provides basic design-time functionality for ASP.NET server controls.

HtmlControlDesigner

Example Syntax:

ToString

[C#] public HtmlControlDesigner( );

[C++] public: HtmlControlDesigner( );

[VB] Public Sub New( )

[JScript] public function HtmlControlDesigner( );

Description

Initializes a new instance of the System.Web.UI.Design.HtmlControlDesigner class.

AssociatedComponents

Behavior

ToString

Description

Gets or sets the DHTML behavior associated with the designer instance.

Component

DataBindings

ToString

Description

Gets or sets the data bindings for the current control.

DesignTimeElement

ToString

[C#] protected object DesignTimeElement {get;}

[C++] protected: _property Object* get_DesignTimeElement( );

[VB] Protected ReadOnly Property DesignTimeElement As Object

[JScript] protected function get DesignTimeElement( ): Object;

Description

Gets the base Web Forms designer associated to the ASPX document.

InheritanceAttribute

Inherited

ShadowProperties

ShouldCodeSerialize

ToString

Description

Indicates whether a field declaration for the control should be created in the code-behind file for the current design document.

Verbs

Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Releases the unmanaged resources used by the System. Web.UI.Design.HtmlControlDesigner and optionally releases the managed resources.

This method is called by the public Dispose( ) method and the System.Object.Finalize method. true to release both managed and unmanaged resources; false to release only unmanaged resources.

Description

Initializes the designer and sets the component for design.

System.Web.UI.Design.ControlDesigner.Initialize(System.ComponentModel.IComponent) should be called by the designer host to initialize the designer. The control element for design.

OnBehaviorAttached

[C#] protected virtual void OnBehaviorAttached( );

[C++] protected: virtual void OnBehaviorAttached( );

[VB] Overridable Protected Sub OnBehaviorAttached( )

[JScript] protected function OnBehaviorAttached( );

Description

Notification that is called when a behavior is attached to the designer.

OnBehaviorDetaching

[C#] protected virtual void OnBehaviorDetaching( );

[C++] protected: virtual void OnBehaviorDetaching( );

[VB] Overridable Protected Sub OnBehaviorDetaching( )

[JScript] protected function OnBehaviorDetaching( );

Description

Notification that is called when a behavior is detatched from the designer.

OnBindingsCollectionChanged

[C#] protected virtual void OnBindingsCollectionChanged (string propName);

[C++] protected: virtual void OnBindingsCollectionChanged (String* propName);

[VB] Overridable Protected Sub OnBindingsCollectionChanged(ByVal propName As String)

[JScript] protected function OnBindingsCollectionChanged (propName: String);

Description

Provides a method that can be used to indicate when a data binding has been changed.

This method should be called by a control designer after it has made a change to the data bindings for the control. The name of the property that has been changed.

OnSetParent

[C#] public virtual void OnSetParent( );

[C++] public: virtual void OnSetParent( );

[VB] Overridable Public Sub OnSetParent( )

[JScript] public function OnSetParent( );

Description

Notification that is called when the associated control is parented.

PreFilterEvents

[C#] protected override void PreFilterEvents(IDictionary events);

[C++] protected: void PreFilterEvents(IDictionary* events);

[VB] Overrides Protected Sub PreFilterEvents(ByVal events As IDictionary)

[JScript] protected override function PreFilterEvents(events: IDictionary);

Description

Allows a designer to filter the set of member events that the component it is designing will expose through a System.ComponentModel.TypeDescriptor object.

If you are overriding this method you should call the base implementation before you perform your own filtering. When overriding this method, it should return the augmented set of attributes. If the method does not modify any attributes, it may just return a reference to its input parameter. If you do make a change to the attributes, you must create a new array. The set of events for the component.

PreFilterProperties

[C#] protected override void PreFilterProperties (IDictionary properties);

[C++] protected: void PreFilterProperties(IDictionary* properties);

[VB] Overrides Protected Sub PreFilterProperties(ByVal properties As IDictionary)

[JScript] protected override function PreFilterProperties (properties: IDictionary);

Description

Allows a designer to filter the set of member attributes that the component it is designing will expose through a System.ComponentModel.TypeDescriptor object.

If you are overriding this method you should call the base implementation before you perform your own filtering. When overriding this method, it should return the augmented set of attributes. If the method does not modify any attributes, it may just return a reference to its input parameter. If you do make a change to the attributes, you must create a new array. The set of properties to filter for the component.

HtmlIntrinsicControlDesigner class (System.Web.UI.Design)

ToString

Description

Provides a base designer for all intrinsic HTML controls.

Intrinsic HTML controls are defined within, or derived from classes defined within, the System.Web.UI.HtmlControls.HtmlControl namespace.

HtmlIntrinsicControlDesigner

Example Syntax:

ToString

[C#] public HtmlIntrinsicControlDesigner( );

[C++] public: HtmlIntrinsicControlDesigner( );

[VB] Public Sub New( )

[JScript] public function HtmlIntrinsicControlDesigner( );

AssociatedComponents

Behavior

Component

DataBindings

DesignTimeElement

InheritanceAttribute

Inherited

ShadowProperties

ShouldCodeSerialize

Verbs

HyperLinkDataBindingHandler class (System.Web.UI.Design)

ToString

Description

Provides a data binding handler for a hyperlink property.

HyperLinkDataBindingHandler

Example Syntax:

ToString

[C#] public HyperLinkDataBindingHandler( );

[C++] public: HyperLinkDataBindingHandler( );

[VB] Public Sub New( )

[JScript] public function HyperLinkDataBindingHandler( );

DataBindControl

[C#] public override void DataBindControl(IDesignerHost designerHost, Control control);

[C++] public: void DataBindControl(IDesignerHost* designerHost, Control* control);

[VB] Overrides Public Sub DataBindControl(ByVal designerHost As IDesignerHost, ByVal control As Control)

[JScript] public override function DataBindControl(designerHost: IDesignerHost, control: Control);

Description

Adds this data binding to the specified control. The designer host for the document that contains the control. The control to add this data binding to.

IControlDesignerBehavior interface (System.Web.UI.Design)

ToString

Description

Provides an interface to provide a behavior for a control designer.

DesignTimeElementView

ToString

[C#] object DesignTimeElementView {get;}

[C++] Object* get DesignTimeElementView( );

[VB] ReadOnly Property DesignTimeElementView As Object

[JScript] abstract function get DesignTimeElementView( ): Object;

Description

Gets or sets the design-time view control object for the designer.

DesignTimeHtml

ToString

[C#] string DesignTimeHtml {get; set;}

[C++] String* get DesignTimeHtml( );void set DesignTimeHtml(String*);

[VB] Property DesignTimeHtml As String

[JScript] abstract function get DesignTimeHtml( ): String; public abstract function set DesignTimeHtml(String);

Description

Gets or sets the design-time HTML for the designer's control.

OnTemplateModeChanged

[C#] void OnTemplateModeChanged( );

[C++] void OnTemplateModeChanged( );

[VB] Sub OnTemplateModeChanged( )

[JScript] function OnTemplateModeChanged( );

Description

Raises the TemplateModeChanged event.

Raising an event invokes the event handler through a delegate. For more information, see.

IDataSourceProvider interface (System.Web.UI.Design)

OnTemplateModeChanged

Description

Provides an interface that enables access to a data source.

A class that can provide a data source can implement this interface to enable access to its data source by objects that use the System.Web.UI.Design.IDataSourceProvider interface.

GetResolvedSelectedDataSource

[C#] IEnumerable GetResolvedSelectedDataSource( );

[C++] IEnumerable* GetResolvedSelectedDataSource( );

[VB] Function GetResolvedSelectedDataSource( ) As IEnumerable

[JScript] function GetResolvedSelectedDataSource( ): IEnumerable;

Description

When implemented in a derived class, gets the selected data member from the selected data source.

Return Value: The selected data member from the selected data source.

GetSelectedDataSource

[C#] object GetSelectedDataSource( );

[C++] Object* GetSelectedDataSource( );

[VB] Function GetSelectedDataSource( ) As Object

[JScript] function GetSelectedDataSource( ): Object;

Description

When implemented in a derived class, gets a reference to the data source that this data source provider provides.

Return Value: The data source that this data source provider provides.

IHtmlControlDesignerBehavior interface (System.Web.UI.Design)

GetSelectedDataSource

Description

Provides an interface to provide a behavior for an Interactive HTML control designer.

Designer

GetSelectedDataSource

[C#] HtmlControlDesigner Designer {get; set;}

[C++] HtmlControlDesigner* get_Designer( );void set_Designer(HtmlControlDesigner*);

[VB] Property Designer As HtmlControlDesigner

[JScript] abstract function get Designer( ): HtmlControlDesigner;public abstract function set Designer(HtmlControlDesigner);

Description

Gets or sets the designer that this behavior is associated with.

DesignTimeElement

GetSelectedDataSource

[C#] object DesignTimeElement {get;}

[C++] Object* get DesignTimeElement( );

[VB] ReadOnly Property DesignTimeElement As Object

[JScript] abstract function get DesignTimeElement( ): Object;

Description

Gets the element that this designer is designing.

GetAttribute

[C#] object GetAttribute(string attribute, bool ignoreCase);

[C++] Object* GetAttribute(String* attribute, bool ignoreCase);

[VB] Function GetAttribute(ByVal attribute As String, ByVal ignoreCase As Boolean) As Object

[JScript] function GetAttribute(attribute: String, ignoreCase: Boolean): Object;

Description

Gets the specified attribute.

Return Value: The attribute that was retrieved. The attribute to retrieve. true if the attribute syntax is case-insensitive; otherwise, false.

GetStyleAttribute

[C#] object GetStyleAttribute(string attribute, bool designTimeOnly, bool ignoreCase);

[C++] Object* GetStyleAttribute(String* attribute, bool designTimeOnly, bool ignoreCase);

[VB] Function GetStyleAttribute(ByVal attribute As String, ByVal designTimeOnly As Boolean, ByVal ignoreCase As Boolean) As Object

[JScript] function GetStyleAttribute(attribute: String, designTimeOnly: Boolean, ignoreCase: Boolean): Object;

Description

Gets the specified style attribute.

Return Value: The style attribute that was retrieved. The style attribute to retrieve. true if the attribute is a design-time only attribute; otherwise, false. true if the attribute syntax is case-insensitive; otherwise, false.

RemoveAttribute

[C#] void RemoveAttribute(string attribute, bool ignoreCase);

[C++] void RemoveAttribute(String* attribute, bool ignoreCase);

[VB] Sub RemoveAttribute(ByVal attribute As String, ByVal ignoreCase As Boolean)

[JScript] function RemoveAttribute(attribute: String, ignoreCase: Boolean);

Description

Removes the specified attribute. The attribute to remove. true if the attribute syntax is case-insensitive; otherwise, false.

RemoveStyleAttribute

[C#] void RemoveStyleAttribute(string attribute, bool designTimeOnly, bool ignoreCase);

[C++] void RemoveStyleAttribute(String* attribute, bool designTimeOnly, bool ignoreCase);

[VB] Sub RemoveStyleAttribute(ByVal attribute As String, ByVal designTimeOnly As Boolean, ByVal ignoreCase As Boolean)

[JScript] function RemoveStyleAttribute(attribute: String, designTimeOnly: Boolean, ignoreCase: Boolean);

Description

Removes the specified style attribute. The style attribute to remove. true if the attribute is a design-time only attribute; otherwise, false. true if the attribute syntax is case-insensitive; otherwise, false.

SetAttribute

[C#] void SetAttribute(string attribute, object value, bool ignoreCase);

[C++] void SetAttribute(String* attribute, Object* value, bool ignoreCase);

[VB] Sub SetAttribute(ByVal attribute As String, ByVal value As Object, ByVal ignoreCase As Boolean)

[JScript] function SetAttribute(attribute: String, value: Object, ignoreCase: Boolean);

Description

Sets the specified attribute to the specified object. The attribute to set. The object on which to set the attribute. true if the attribute syntax is case-insensitive; otherwise, false.

SetStyleAttribute

[C#] void SetStyleAttribute(string attribute, bool designTimeOnly, object value, bool ignoreCase);

[C++] void SetStyleAttribute(String* attribute, bool designTimeOnly, Object* value, bool ignoreCase);

[VB] Sub SetStyleAttribute(ByVal attribute As String, ByVal designTimeOnly As Boolean, ByVal value As Object, ByVal ignoreCase As Boolean)

[JScript] function SetStyleAttribute(attribute: String, designTimeOnly: Boolean, value: Object, ignoreCase: Boolean);

Description

Sets the specified style attribute to the specified object. The attribute to set. true if the attribute is a design-time only attribute; otherwise, false. The object to set the attribute on. true if the attribute syntax is case-insensitive; otherwise, false.

ImageUrlEditor class (System.Web.UI.Design)

SetStyleAttribute

Description

Provides a user interface for selecting a URL.

This class extends System.Web.UI.Design.UrlEditor and provides a caption and filter property.

ImageUrlEditor

Example Syntax:

SetStyleAttribute

[C#] public ImageUrlEditor( );

[C++] public: ImageUrlEditor( );

[VB] Public Sub New( )

[JScript] public function ImageUrlEditor( );

Caption

SetStyleAttribute

[C#] protected override string Caption {get;}

[C++] protected: property virtual String* get Caption( );

[VB] Overrides Protected ReadOnly Property Caption As String

[JScript] protected function get Caption( ): String;

Description

Gets the caption for the editor.

Filter

SetStyleAttribute

[C#] protected override string Filter {get;}

[C++] protected: _property virtual String* get_Filter( );

[VB] Overrides Protected ReadOnly Property Filter As String

[JScript] protected function get Filter( ): String;

Description

Gets the filter to use for filtering the file list.

Options

ITemplateEditingFrame interface (System.Web.UI.Design)

ToString

Description

Provides an interface to manage a template editing area.

ControlStyle

ToString

[C#] Style ControlStyle {get;}

[C++] Style* get_ControlStyle( );

[VB] ReadOnly Property ControlStyle As Style

[JScript] abstract function get ControlStyle( ): Style;

Description

Gets or sets the style for the editing frame.

InitialHeight

ToString

[C#] int InitialHeight {get; set;}

[C++] int get_InitialHeight( );void set_InitialHeight(int);

[VB] Property InitialHeight As Integer

[JScript] abstract function get InitialHeight( ): int;public abstract function set InitialHeight(int);

Description

Gets or sets the initial height for the control.

InitialWidth

ToString

[C#] int InitialWidth {get; set;}

[C++] int get_InitialWidth( );void set_InitialWidth(int);

[VB] Property InitialWidth As Integer

[JScript] abstract function get InitialWidth( ): int;public abstract function set InitialWidth(int);

Description

Gets or sets the initial width for the control.

Name

ToString

[C#] string Name {get;}

[C++] String* get_Name( );

[VB] ReadOnly Property Name As String

[JScript] abstract function get Name( ): String;

Description

Gets or sets the name for this editing frame.

TemplateNames

ToString

[C#] string[ ] TemplateNames {get;}

[C++] String* get_TemplateNames( );

[VB] ReadOnly Property TemplateNames As String ( )

[JScript] abstract function get TemplateNames( ): String[ ];

Description

Gets or sets a set of names of templates to use.

TemplateStyles

ToString

[C#] Style[ ] TemplateStyles {get;}

[C++] Style* get_TemplateStyles( );

[VB] ReadOnly Property TemplateStyles As Style ( )

[JScript] abstract function get TemplateStyles( ): Style[ ];

Description

Gets or sets the template styles for this control.

Verb

ToString

[C#] TemplateEditingVerb Verb {get; set;}

[C++] TemplateEditingVerb* get_Verb( );void set_Verb (TemplateEditingVerb*);

[VB] Property Verb As TemplateEditingVerb

[JScript] abstract function get Verb( ): TemplateEditingVerb; public abstract function set Verb(TemplateEditingVerb);

Description

Gets or sets the verb to invoke when editing the template.

Close

[C#] void Close(bool saveChanges);

[C++] void Close(bool saveChanges);

[VB] Sub Close(ByVal saveChanges As Boolean)

[JScript] function Close(saveChanges: Boolean);

Description

Closes the control and saves any changes to the control if the specified value is true. true if any changes to the document should be changed; otherwise, false.

Open

[C#] void Open( );

[C++] void Open( );

[VB] Sub Open( )

[JScript] function Open( );

Description

Opens and displays the control.

Resize

[C#] void Resize(int width, int height);

[C++] void Resize(int width, int height);

[VB] Sub Resize(ByVal width As Integer, ByVal height As Integer)

[JScript] function Resize(width: int, height: int);

Description

Resizes the control to the specified width and height. The new width for the control. The new height for the control.

Save

[C#] void Save( );

[C++] void Save( );

[VB] Sub Save( )

[JScript] function Save( );

Description

Saves any changes to the document.

UpdateControlName

[C#] void UpdateControlName(string newName);

[C++] void UpdateControlName(String* newName);

[VB] Sub UpdateControlName(ByVal newName As String)

[JScript] function UpdateControlName(newName: String);

Description

Changes the name for the control to the specified name. The new name for the control.

ITemplateEditingService interface (System.Web.UI.Design)

UpdateControlName

Description

Provides services for editing templated control templates at design-time.

SupportsNestedTemplateEditing

UpdateControlName

[C#] bool SupportsNestedTemplateEditing {get;}

[C++] bool get_SupportsNestedTemplateEditing( );

[VB] ReadOnly Property SupportsNestedTemplateEditing As Boolean

[JScript] abstract function get SupportsNestedTemplateEditing( ): Boolean;

Description

Indicates whether the service supports nested template editing.

This property indicates whether a template editor can be invoked from a parent template editor for a component of the parent template editor's templated control. This is called nested template editing, because a template editor is launched for a component of a control for which a template editor is already operating.

CreateFrame

[C#] ITemplateEditingFrame CreateFrame(TemplatedControlDesigner designer, string frameName, string[ ] templateNames);

[C++] ITemplateEditingFrame* CreateFrame(TemplatedControlDesigner* designer, String* frameName, String* templateNames _gc[ ]);

[VB] Function CreateFrame(ByVal designer As TemplatedControlDesigner, ByVal frameName As String, ByVal templateNames( ) As String) As ITemplateEditingFrame

[JScript] function CreateFrame(designer: TemplatedControlDesigner, frameName: String, templateNames: String[ ]): ITemplateEditingFrame; Creates a new template editing frame.

Description

Creates a new template editing frame for the specified System.Web.UI.Design.TemplatedControlDesigner, using the specified name and templates.

Return Value: The new System.Web.UI.Design.ITemplateEditingFrame. The designer that will use the template editing frame. The name of the editing frame that will be displayed on the frame. Typically this is the same as the System.ComponentModel.Design.DesignerVerb.Text property used as the menu text for the System.Web.UI.Design.TemplateEditingVerb that is invoked to create the frame. The names of the templates that the template editing frame will contain.

CreateFrame

[C#] ITemplateEditingFrame CreateFrame(TemplatedControlDesigner designer, string frameName, string[ ] templateNames, Style controlStyle, Style[ ] templateStyles);

[C++] ITemplateEditingFrame* CreateFrame(TemplatedControlDesigner* designer, String* frameName, String* templateNames _gc[ ], Style* controlStyle, Style* templateStyles[ ]);

[VB] Function CreateFrame(ByVal designer As TemplatedControlDesigner, ByVal frameName As String, ByVal templateNames( ) As String, ByVal controlStyle As Style, ByVal templateStyles( ) As Style) As ITemplateEditingFrame

[JScript] function CreateFrame(designer: TemplatedControlDesigner, frameName: String, templateNames: String[ ], controlStyle: Style, templateStyles: Style[ ]) ITemplateEditingFrame;

Description

Creates a new template editing frame for the specified System.Web.UI.Design.TemplatedControlDesigner, using the specified name, template names, control style, and template styles.

Return Value: The new System.Web.UI.Design.ITemplateEditingFrame. The designer that will use the template editing frame. The name of the editing frame that will be displayed on the frame. Typically this is the same as the System.ComponentModel.Design.DesignerVerb.Text property used as the menu text for the System.Web.UI.Design.TemplateEditingVerb that is invoked to create the frame. The names of the templates that the template editing frame will contain. The control style for the editing frame. The template styles for the editing frame.

GetContainingTemplateName

[C#] string GetContainingTemplateName(Control control);

[C++] String* GetContainingTemplateName(Control* control);

[VB] Function GetContainingTemplateName(ByVal control As Control) As String

[JScript] function GetContainingTemplateName(control: Control): String;

Description

Gets the name of the parent template.

Return Value: The name of the parent template. The control to get the name of the parent template of.

IWebFormReferenceManager interface (System.Web.UI.Design)

GetContainingTemplateName

Description

Provides an interface that can be used to manage references stored by a Web Form.

GetObjectType

[C#] Type GetObjectType(string tagPrefix, string typeName);

[C++] Type* GetObjectType(String* tagPrefix, String* typeName);

[VB] Function GetObjectType(ByVal tagPrefix As String, ByVal typeName As String) As Type

[JScript] function GetObjectType(tagPrefix: String, typeName: String): Type;

Description

Gets the type of the specified object.

Return Value: The System.Type of the object, if it could be resolved. The tag prefix for the type. The name of the type.

GetRegisterDirectives

[C#] string GetRegisterDirectives( );

[C++] String* GetRegisterDirectives( );

[VB] Function GetRegisterDirectives( ) As String

[JScript] function GetRegisterDirectives( ): String;

Description

Gets the register directives.

Return Value: The register directives for the project.

GetTagPrefix

[C#] string GetTagPrefix(Type objectType);

[C++] String* GetTagPrefix(Type* objectType);

[VB] Function GetTagPrefix(ByVal objectType As Type) As String

[JScript] function GetTagPrefix(objectType: Type): String;

Description

Gets the tag prefix.

Return Value: The tag prefix for the specified object type, if it could be located. The type of the object.

IWebFormsBuilderUIService interface (System.Web.UI.Design)

GetTagPrefix

Description

Provides methods to launch specific user interfaces for building properties at design-time.

BuildColor

[C#] string BuildColor(Control owner, string initialColor);

[C++] String* BuildColor(Control* owner, String* initialColor);

[VB] Function BuildColor(ByVal owner As Control, ByVal initialColor As String) As String

[JScript] function BuildColor(owner: Control, initialColor: String): String;

Description

Launches an editor to build a color property.

Return Value: A string that represents the color that was selected. The control that contains the property to build. The initial color for the editor to pre-select.

BuildUrl

[C#] string BuildUrl(Control owner, string initialUrl, string baseUrl, string caption, string filter, UrlBuilderOptions options);

[C++] String* BuildUrl(Control* owner, String* initialUrl, String* baseUrl, String* caption, String* filter, UrlBuilderOptions options);

[VB] Function BuildUrl(ByVal owner As Control, ByVal initialUrl As String, ByVal baseUrl As String, ByVal caption As String, ByVal filter As String, ByVal options As UrlBuilderOptions) As String

[JScript] function BuildUrl(owner: Control, initialUrl: String, baseUrl: String, caption: String, filter: String, options: UrlBuilderOptions): String;

Description

Launches an editor to build a URL property.

Return Value: A string that contains the URL returned by the System.Web.UI.Design.UrlBuilder. The control that contains the property to build. The initial URL to display in the selection interface. The base URL to display in the selection interface. A caption that presents a message in the selection interface. A filter for the types of files listed in the selection interface. The options for the System.Web.UI.Design.UrlBuilder to use.

IWebFormsDocumentService interface (System.Web.UI.Design)

BuildUrl

Description

Provides methods to access services for tracking the loading state of a web forms document, handling events at load time, accessing a document's location, managing a document's undo service, and setting a new selection within the document.

DocumentUrl

BuildUrl

[C#] string DocumentUrl {get;}

[C++] String* get_DocumentUrl( );

[VB] ReadOnly Property DocumentUrl As String

[JScript] abstract function get DocumentUrl( ): String;

Description

Gets or sets the URL at which the document is located.

IsLoading

BuildUrl

[C#] bool IsLoading {get;}

[C++] bool get_IsLoading( );

[VB] ReadOnly Property IsLoading As Boolean

[JScript] abstract function get IsLoading( ): Boolean;

Description

Indicates whether the document service is currently loading.

BuildUrl

[C#] event EventHandler LoadComplete;

[C++] _event EventHandler* LoadComplete;

[VB] Event LoadComplete As EventHandler

Description

Occurs when the service has finished loading.

This event provides an opportunity to perform operations immediately after loading has completed. Events that should occur at load time can be registered as event handlers for this event.

CreateDiscardableUndoUnit

[C#] object CreateDiscardableUndoUnit( );

[C++] Object* CreateDiscardableUndoUnit( );

[VB] Function CreateDiscardableUndoUnit( ) As Object

[JScript] function CreateDiscardableUndoUnit( ): Object;

Description

Creates a discardable undo unit.

Return Value: The new discardable undo unit.

DiscardUndoUnit

[C#] void DiscardUndoUnit(object discardableUndoUnit);

[C++] void DiscardUndoUnit(Object* discardableUndoUnit);

[VB] Sub DiscardUndoUnit(ByVal discardableUndoUnit As Object)

[JScript] function DiscardUndoUnit(discardableUndoUnit: Object);

Description

Discards the specified undo unit. The undo unit to discard.

EnableUndo

[C#] void EnableUndo(bool enable);

[C++] void EnableUndo(bool enable);

[VB] Sub EnableUndo(ByVal enable As Boolean)

[JScript] function EnableUndo(enable: Boolean);

Description

Enables the ability to undo actions that occur within undoable action units or transactions. true if actions should be undoable; otherwise, false.

UpdateSelection

[C#] void UpdateSelection( );

[C++] void UpdateSelection( );

[VB] Sub UpdateSelection( )

[JScript] function UpdateSelection( );

Description

When implemented in a derived class, updates the current selection.

When implemented in a derived class, this method updates the current selection.

ReadWriteControlDesigner class (System.Web.UI.Design)

UpdateSelection

Description

Provides design-time functionality for read/write server controls.

ReadWriteControlDesigner

Example Syntax:

UpdateSelection

[C#] public ReadWriteControlDesigner( );

[C++] public: ReadWriteControlDesigner( );

[VB] Public Sub New( )

[JScript] public function ReadWriteControlDesigner( );

Description

Initializes an instance of the System.Web.UI.Design.ReadWriteControlDesigner class.

AllowResize

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

MapPropertyToStyle

[C#] protected virtual void MapPropertyToStyle(string propName, object varPropValue);

[C++] protected: virtual void MapPropertyToStyle(String* propName, Object* varPropValue);

[VB] Overridable Protected Sub MapPropertyToStyle(ByVal propName As String, ByVal varPropValue As Object)

[JScript] protected function MapPropertyToStyle(propName: String, varPropValue: Object);

Description

Maps a property, including description and value, to an Interactive HTML style.

Return Value: This method must be overridden in a derived class to implement the designer. The name of the property to map. The value of the property.

OnBehaviorAttached

[C#] protected override void OnBehaviorAttached( );

[C++] protected: void OnBehaviorAttached( );

[VB] Overrides Protected Sub OnBehaviorAttached( )

[JScript] protected override function OnBehaviorAttached( );

Description

Provides notification that is raised upon a behavior being attached to the designer.

OnComponentChanged

[C#] public override void OnComponentChanged(object sender, ComponentChangedEventArgs ce);

[C++] public: void OnComponentChanged(Object* sender, ComponentChangedEventArgs* ce);

[VB] Overrides Public Sub OnComponentChanged(ByVal sender As Object, ByVal ce As ComponentChangedEventArgs)

[JScript] public override function OnComponentChanged (sender: Object, ce: ComponentChangedEventArgs);

Description

Represents the method that will handle the System.ComponentModel.Design.IComponentChangeService.ComponentChanged event of the System.ComponentModel.Design.IComponentChangeService.

The System.ComponentModel.Design.IComponentChangeService.ComponentChanged event occurs after a property has been changed. This delegate allows implementors to do any post-processing that may be needed after a property change. The object sending the event. The event object used when raising a System.ComponentModel.Design.IComponentChangeService.ComponentChanged event notification.

TemplatedControlDesigner class (System.Web.UI.Design)

UpdateDesignTimeHtml

Description

Provides design-time functionality for template-based server controls.

TemplatedControlDesigner

Example Syntax:

UpdateDesignTimeHtml

[C#] public TemplatedControlDesigner( );

[C++] public: TemplatedControlDesigner( );

[VB] Public Sub New( )

[JScript] public function TemplatedControlDesigner( );

Description

Initializes a new instance of the System.Web.UI.Design.TemplatedControlDesigner class.

ActiveTemplateEditingFrame

UpdateDesignTimeHtml

[C#] public ITemplateEditingFrame ActiveTemplateEditingFrame {get;}

[C++] public: _property ITemplateEditingFrame* get_ActiveTemplateEditingFrame( );

[VB] Public ReadOnly Property ActiveTemplateEditingFrame As ITemplateEditingFrame

[JScript] public function get ActiveTemplateEditingFrame( ) ITemplateEditingFrame;

Description

Gets the active template editing frame.

AllowResize

AssociatedComponents

Behavior

CanEnterTemplateMode

UpdateDesignTimeHtml

Description

Indicates whether or not this designer will allow the viewing or editing of templates. This property is read-only.

Component

DataBindings

DesignTimeElement

DesignTimeElementView

DesignTimeHtmlRequiresLoadComplete

HidePropertiesInTemplateMode

UpdateDesignTimeHtml

Description

Indicates whether the properties of the control will be hidden when the control is placed into template editing mode.

The System.Web.UI.Design.ControlDesigner.ID property is never hidden.

ID

InheritanceAttribute

Inherited

InTemplateMode

UpdateDesignTimeHtml

Description

Indicates whether or not the designer document is in template mode.

A document is in template mode when a template is currently being viewed or edited in the forms designer.

IsDirty

ReadOnly

ShadowProperties

ShouldCodeSerialize

Verbs

CreateTemplateEditingFrame

[C#] protected abstract ITemplateEditingFrame CreateTemplateEditingFrame(TemplateEditingVerb verb);

[C++] protected: virtual ITemplateEditingFrame* CreateTemplateEditingFrame(TemplateEditingVerb* verb) =0;

[VB] MustOverride Protected Function CreateTemplateEditingFrame(ByVal verb As TemplateEditingVerb) As ITemplateEditingFrame

[JScript] protected abstract function CreateTemplateEditingFrame(verb: TemplateEditingVerb): ITemplateEditingFrame;

Description

Creates a template editing frame for the specified verb.

Return Value: The new template editing frame. The template editing verb to create a template editing frame for.

Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Releases the unmanaged resources used by the System.Web.UI.Design.TemplatedControlDesigner and optionally releases the managed resources.

This method is called by the public Dispose( ) method and the System.Object.Finalize method. true to release both managed and unmanaged resources; false to release only unmanaged resources.

EnterTemplateMode

[C#] public void EnterTemplateMode(ITemplateEditingFrame newTemplateEditingFrame);

[C++] public: void EnterTemplateMode(ITemplateEditingFrame* newTemplateEditingFrame);

[VB] Public Sub EnterTemplateMode(ByVal newTemplateEditingFrame As ITemplateEditingFrame)

[JScript] public function EnterTemplateMode(newTemplateEditingFrame: ITemplateEditingFrame);

Description

Opens a particular template frame object for editing in the designer.

If already in template mode and editing a different template frame, this method calls System.Web.UI.Design.TemplatedControlDesigner.ExitTemplateMode(System.Boolean,System.Boolean,System.Boolean) to save all its templates and close that frame. The template editing frame object to open in the designer.

ExitTemplateMode

[C#] public void ExitTemplateMode(bool fSwitchingTemplates, bool fNested, bool fSave);

[C++] public: void ExitTemplateMode(bool fSwitchingTemplates, bool fNested, bool fSave);

[VB] Public Sub ExitTemplateMode(ByVal fSwitchingTemplates As Boolean, ByVal fNested As Boolean, ByVal fSave As Boolean)

[JScript] public function ExitTemplateMode(fSwitchingTemplates: Boolean, fNested: Boolean, fSave: Boolean);

Description

Closes the currently active template editing frame after saving any relevant changes. true when switching from one template editing frame to another, otherwise false. true if this designer is nested (one or more levels) within another control whose designer is also in template editing mode; otherwise false. true if templates should be saved on exit; otherwise, false.

GetCachedTemplateEditingVerbs

[C#] protected abstract TemplateEditingVerb[ ] GetCachedTemplateEditingVerbs( );

[C++] protected: virtual TemplateEditingVerb* GetCachedTemplateEditingVerbs( ) [ ]=0;

[VB] MustOverride Protected Function GetCachedTemplateEditingVerbs( ) As TemplateEditingVerb( )

[JScript] protected abstract function GetCachedTemplateEditingVerbs( ): TemplateEditingVerb[ ];

Description

Gets the cached template editing verbs.

Return Value: An array of System.Web.UI.Design.TemplateEditingVerb objects, if any.

GetPersistInnerHtml

[C#] public override string GetPersistInnerHtml( );

[C++] public: String* GetPersistInnerHtml( );

[VB] Overrides Public Function GetPersistInnerHtml( ) As String

[JScript] public override function GetPersistInnerHtml( ): String;

Description

Gets the HTML to be persisted for the content present within the associated server control runtime.

Return Value: The persistable inner HTML.

GetTemplateContainerDataItemProperty

[C#] public virtual string GetTemplateContainerDataItemProperty(string templateName);

[C++] public: virtual String* GetTemplateContainerDataItemProperty(String* templateName);

[VB] Overridable Public Function GetTemplateContainerDataItemProperty(ByVal templateName As String) As String

[JScript] public function GetTemplateContainerDataItemProperty(templateName: String): String;

Description

Gets the data item property of the template's container.

Return Value: A string representing the data. The name of the template.

GetTemplateContainerDataSource

[C#] public virtual IEnumerable GetTemplateContainerDataSource(string templateName);

[C++] public: virtual IEnumerable* GetTemplateContainerDataSource(String* templateName);

[VB] Overridable Public Function GetTemplateContainerDataSource(ByVal templateName As String) As IEnumerable

[JScript] public function GetTemplateContainerDataSource (templateName: String): IEnumerable;

Description

Gets the data source of the template's container.

Return Value: The data source of the container of the specified template. The name of the template.

GetTemplateContent

[C#] public abstract string GetTemplateContent(ITemplateEditingFrame editingFrame, string templateName, out bool allowEditing);

[C++] public: virtual String* GetTemplateContent(ITemplateEditingFrame* editingFrame, String* templateName, bool* allowEditing)=0;

[VB] MustOverride Public Function GetTemplateContent (ByVal editingFrame As ITemplateEditingFrame, ByVal templateName As String, ByRef allowEditing As Boolean) As String

[JScript] public abstract function GetTemplateContent(editingFrame: ITemplateEditingFrame, templateName: String, allowEditing: Boolean): String;

Description

Gets the template's content.

Return Value: The content of the template. The template editing frame to retrieve the content of. The name of the template. A boolean variable that will be set to true if the template's content can be edited, or false if the content is read-only.

GetTemplateEditingVerbs

[C#] public TemplateEditingVerb[ ] GetTemplateEditingVerbs( );

[C++] public: TemplateEditingVerb* GetTemplateEditingVerbs( )[ ];

[VB] Public Function GetTemplateEditingVerbs( ) As TemplateEditingVerb( )

[JScript] public function GetTemplateEditingVerbs( ): TemplateEditingVerb[ ];

Description

Gets the template editing verbs available to the designer.

Return Value: The template editing verbs available to the designer.

GetTemplateFromText

[C#] protected ITemplate GetTemplateFromText(string text);

[C++] protected: ITemplate* GetTemplateFromText(String* text);

[VB] Protected Function GetTemplateFromText(ByVal text As String) As ITemplate

[JScript] protected function GetTemplateFromText(text: String): ITemplate;

Description

Creates a template from the specified text.

Return Value: An System.Web.UI.ITemplate from the specified text. The text to retrieve a template from.

GetTemplatePropertyParentType

[C#] public virtual Type GetTemplatePropertyParentType (string templateName);

[C++] public: virtual Type* GetTemplatePropertyParentType (String * templateName);

[VB] Overridable Public Function GetTemplatePropertyParentType(ByVal templateName As String) As Type

[JScript] public function GetTemplatePropertyParentType (templateName: String): Type;

Description

Gets the type of the parent of the template property.

Return Value: The type of the object that has the template property. The name of the template to return the type of the parent for.

GetTextFromTemplate

[C#] protected string GetTextFromTemplate(ITemplate template);

[C++] protected: String* GetTextFromTemplate(ITemplate* template);

[VB] Protected Function GetTextFromTemplate(ByVal template As ITemplate) As String

[JScript] protected function GetTextFromTemplate(template: ITemplate): String;

Description

Gets a string of text that represents the specified template.

Return Value: A string that represents the specified template. The System.Web.UI.ITemplate to convert to text.

OnBehaviorAttached

[C#] protected override void OnBehaviorAttached( );

[C++] protected: void OnBehaviorAttached( );

[VB] Overrides Protected Sub OnBehaviorAttached)( )

[JScript] protected override function OnBehaviorAttached( );

Description

Notification that is called when the behavior is attached to the designer.

OnComponentChanged

[C#] public override void OnComponentChanged(object sender, ComponentChangedEventArgs ce);

[C++] public: void OnComponentChanged(Object* sender, ComponentChangedEventArgs* ce);

[VB] Overrides Public Sub OnComponentChanged(ByVal sender As Object, ByVal ce As ComponentChangedEventArgs)

[JScript] public override function OnComponentChanged (sender: Object, ce: ComponentChangedEventArgs);

Description

Delegate to handle the component changed event.

This is called after a property has been changed. It allows the implementor to do any post-processing that may be needed after a property change. The object sending the event. A System.ComponentModel.Design. ComponentChangedEventArgs that provides data for the event.

OnSetParent

[C#] public override void OnSetParent( );

[C++] public: void OnSetParent( );

[VB] Overrides Public Sub OnSetParent( )

[JScript] public override function OnSetParent( );

Description

Notification that is called when the associated control is parented.

OnTemplateModeChanged

[C#] protected virtual void OnTemplateModeChanged( );

[C++] protected: virtual void OnTemplateModeChanged( );

[VB] Overridable Protected Sub OnTemplateMode Changed( )

[JScript] protected function OnTemplateModeChanged( );

Description

Provides notification and handles processing that should occur when the template mode is changed.

PreFilterProperties

[C#] protected override void PreFilterProperties (IDictionary properties);

[C++] protected: void PreFilterProperties(IDictionary* properties);

[VB] Overrides Protected Sub PreFilterProperties(ByVal properties As IDictionary)

[JScript] protected override function PreFilterProperties (properties: IDictionary);

Description

Allows a designer to filter the set of member attributes the component it is designing will expose through a System. ComponentModel.TypeDescriptor object.

Return Value: The augmented set of attributes. If the method does not modify any attributes, it may just return a reference to its input parameter. If you do make a change to the attributes, you must create a new array.

This method is called immediately before its corresponding "Post" method. If you are overriding this method you should call the base implementation before you perform your own filtering. The member attributes for component.

SaveActiveTemplateEditingFrame

[C#] protected void SaveActiveTemplateEditingFrame( );

[C++] protected: void SaveActiveTemplateEditingFrame( );

[VB] Protected Sub SaveActiveTemplateEditingFrame( )

[JScript] protected function SaveActiveTemplateEditingFrame( );

Description

Saves the active template editing frame.

SetTemplateContent

[C#] public abstract void SetTemplateContent(ITemplateEditingFrame editingFrame, string templateName, string templateContent);

[C++] public: virtual void SetTemplateContent(ITemplateEditingFrame* editingFrame, String* templateName, String* templateContent)=0;

[VB] MustOverride Public Sub SetTemplateContent(ByVal editingFrame As ITemplateEditingFrame, ByVal templateName As String, ByVal templateContent As String)

[JScript] public abstract function SetTemplateContent(editingFrame: ITemplateEditingFrame, templateName: String, templateContent: String);

Description

Sets the specified template's content to the specified content. The template editing frame to provide content for. The name of the template. The content to set for the template.

UpdateDesignTimeHtml

[C#] public override void UpdateDesignTimeHtml( );

[C++] public: void UpdateDesignTimeHtml( );

[VB] Overrides Public Sub UpdateDesignTimeHtml( )

[JScript] public override function UpdateDesignTime Html( );

Description

Updates the design-time HTML.

This method should be called to refresh the design-time display if the template frames have been changed without calling methods that update the design-time HTML automatically.

TemplateEditingService class (System.Web.UI.Design)

UpdateDesignTimeHtml

TemplateEditingService

Example Syntax:

UpdateDesignTimeHtml

SupportsNestedTemplateEditing

UpdateDesignTimeHtml

CreateFrame

[C#] public ITemplateEditingFrame CreateFrame(TemplatedControlDesigner designer, string frameName, string[ ] templateNames);

[C++] public: _sealed ITemplateEditingFrame* CreateFrame(TemplatedControlDesigner* designer, String* frameName, String* templateNames _gc[ ]);

[VB] NotOverridable Public Function CreateFrame(ByVal designer As TemplatedControlDesigner, ByVal frameName As String, ByVal templateNames( ) As String) As ITemplateEditingFrame

[JScript] public function CreateFrame(designer: TemplatedControlDesigner, frameName: String, templateNames: String[ ]): ITemplateEditingFrame;

CreateFrame

[C#] public ITemplateEditingFrame CreateFrame(TemplatedControlDesigner designer, string frameName, string[ ] templateNames, Style controlStyle, Style[ ] templateStyles);

[C++] public: _sealed ITemplateEditingFrame* CreateFrame(TemplatedControlDesigner* designer, String* frameName, String* templateNames _c[ ], Style* controlStyle, Style* templateStyles[ ]);

[VB] NotOverridable Public Function CreateFrame(ByVal designer As TemplatedControlDesigner, ByVal frameName As String, ByVal templateNames( ) As String, ByVal controlStyle As Style, ByVal templateStyles( ) As Style) As ITemplateEditingFrame

[JScript] public function CreateFrame(designer: TemplatedControlDesigner, frameName: String, templateNames: String[ ], controlStyle: Style, templateStyles Style[ ]): ITemplateEditingFrame;

Dispose

[C#] public void Dispose( );

[C++] public: _sealed void Dispose( );

[VB] NotOverridable Public Sub Dispose( )

[JScript] public function Dispose( );

Finalize

[C#] TemplateEditingService( );

[C++] TemplateEditingService( );

[VB] Overrides Protected Sub Finalize( )

[JScript] protected override function Finalize( );

GetContainingTemplateName

[C#] public string GetContainingTemplateName(Control control);

[C++] public: _sealed String* GetContainingTemplateName (Control* control);

[VB] NotOverridable Public Function GetContainingTemplateName(ByVal control As Control) As String

[JScript] public function GetContainingTemplateName(control: Control): String;

TemplateEditingVerb class (System.Web.UI.Design)

ToString

Description

Represents a designer verb that creates a template editing frame, and can only be invoked by a template editor.

TemplateEditingVerb

Example Syntax:

ToString

[C#] public TemplateEditingVerb(string text, int index, TemplatedControlDesigner designer);

[C++] public: TemplateEditingVerb(String* text, int index, TemplatedControlDesigner* designer);

[VB] Public Sub New(ByVal text As String, ByVal index As Integer, ByVal designer As TemplatedControlDesigner)

[JScript] public function TemplateEditingVerb(text: String, index: int, designer: TemplatedControlDesigner);

Description

Initializes a new instance of the System.Web.UI.Design.TemplateEditingVerb class. The text to show for this verb on a menu. An optional integer value that can be used by a designer; typically to indicate the index of the verb within a set of verbs. The designer that can use this verb.

Checked

CommandID

Enabled

Index

ToString

Description

Gets or sets the index, or other user data, for this verb.

This property is sometimes used to store the index of each verb in a set of verbs. When implementing a custom designer, this property can be used to store integer data in a custom defined manner.

OleStatus

Supported

Text

Visible

Dispose

[C#] public void Dispose( );

[C++] public: _sealed void Dispose( );

[VB] NotOverridable Public Sub Dispose( )

[JScript] public function Dispose( ); Releases all resources used by the System.Web.UI.Design.TemplateEditingVerb.

Description

Releases all resources used by the System.Web.UI.Design.TemplateEditingVerb.

Calling System.Web.UI.Design.TemplateEditingVerb.Dispose allows the resources used by the System.Web.UI.Design.TemplateEditingVerb to be reallocated for other purposes. For more information about System.Web.UI.Design.TemplateEditingVerb.Dispose, see.

Dispose

[C#] protected virtual void Dispose(bool disposing);

[C++] protected: virtual void Dispose(bool disposing);

[VB] Overridable Protected Sub Dispose(ByVal disposing As Boolean)

[JScript] protected function Dispose(disposing: Boolean);

Description

Releases the unmanaged resources used by the System.Web.UI.Design.TemplateEditingVerb and optionally releases the managed resources.

This method is called by the public Dispose( ) method and the System.Object.Finalize method. true to release both managed and unmanaged resources; false to release only unmanaged resources.

Finalize

[C#] ~TemplateEditingVerb( );

[C++] ~TemplateEditingVerb( );

[VB] Overrides Protected Sub Finalize( )

[JScript] protected override function Finalize( );

TextControlDesigner class (System.Web.UI.Design)

ToString

Description

Provides design-time support for the ASP.NET System.Web.UI.WebControls.Label and System.Windows.Forms.HyperLink server controls.

TextControlDesigner

Example Syntax:

ToString

[C#] public TextControlDesigner( );

[C++] public: TextControlDesigner( );

[VB] Public Sub New( )

[JScript] public function TextControlDesigner( );

AllowResize

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

GetDesignTimeHtml

[C#] public override string GetDesignTimeHtml( );

[C++] public: String* GetDesignTimeHtml( );

[VB] Overrides Public Function GetDesignTimeHtml( ) As String

[JScript] public override function GetDesignTimeHtml( ): String;

Description

Gets the HTML that is used to represent the associated control at design time.

Return Value: The HTML used to represent the control at design-time.

GetPersistInnerHtml

[C#] public override string GetPersistInnerHtml( );

[C++] public: String* GetPersistInnerHtml( );

[VB] Overrides Public Function GetPersistInnerHtml( ) As String

[JScript] public override function GetPersistInnerHtml( ): String;

Description

Gets the HTML to persist for the inner tags of the control.

Return Value: The HTML for the tags of the control.

Initialize

[C#] public override void Initialize(IComponent component);

[C++] public: void Initialize(IComponent* component);

[VB] Overrides Public Sub Initialize(ByVal component As IComponent)

[JScript] public override function Initialize(component: IComponent);

Description

Initializes this designer with the specified component. The component for this designer to design.

TextDataBindingHandler class (System.Web.UI.Design)

UpdateDesignTimeHtml

Description

Provides a data binding handler for a text property of a control.

TextDataBindingHandler

Example Syntax:

UpdateDesignTimeHtml

[C#] public TextDataBindingHandler( );

[C++] public: TextDataBindingHandler( );

[VB] Public Sub New( )

[JScript] public function TextDataBindingHandler( );

DataBindControl

[C#] public override void DataBindControl(IDesignerHost designerHost, Control control);

[C++] public: void DataBindControl(IDesignerHost* designerHost, Control* control);

[VB] Overrides Public Sub DataBindControl(ByVal designerHost As IDesignerHost, ByVal control As Control)

[JScript] public override function DataBindControl(designerHost: IDesignerHost, control: Control);

Description

Adds this data binding to the specified control. The designer host for the document that contains the control. The control to add this data binding to.

UrlBuilder class (System.Web.UI.Design)

ToString

Description

Launches a URL editor that allows a user to select a URL.

The System.Web.UI.Design.UrlBuilder.BuildUrl(System.ComponentModel.IComponent,System.Windows.Forms.Control,System.String,System.String,System.String) method launches a user interface for selecting a URL.

BuildUrl

[C#] public static string BuildUrl(IComponent component, Control owner, string initialUrl, string caption, string filter);

[C++] public: static String* BuildUrl(IComponent* component, Control* owner, String* initialUrl, String* caption, String* filter);

[VB] Public Shared Function BuildUrl(ByVal component As IComponent, ByVal owner As Control, ByVal initialUrl As String, ByVal caption As String, ByVal filter As String) As String

[JScript] public static function BuildUrl(component: IComponent, owner: Control, initialUrl: String, caption: String, filter: String): String; Launches the Url Picker to build a Url property.

Description

Launches the Url Picker to build a Url property.

Return Value: The Url returned from the Url Picker. The component whose site is to be used to access design-time services. The control used to parent the picker window. The initial Url to be shown in the picker window. The caption of the picker window. The filter for selecting files in the picker window.

BuildUrl

[C#] public static string BuildUrl(IComponent component, Control owner, string initialUrl, string caption, string filter, UrlBuilderOptions options);

[C++] public: static String* BuildUrl(IComponent* component, Control* owner, String* initialUrl, String* caption, String* filter, UrlBuilderOptions options);

[VB] Public Shared Function BuildUrl(ByVal component As IComponent, ByVal owner As Control, ByVal initialUrl As String, ByVal caption As String, ByVal filter As String, ByVal options As UrlBuilderOptions) As String

[JScript] public static function BuildUrl(component: IComponent, owner: Control, initialUrl: String, caption: String, filter: String, options UrlBuilderOptions): String;

Description

Launches the Url Picker to build a Url property using the specified System.Web.UI.Design.UrlBuilderOptions.

Return Value: The Url returned from the Url Picker. The component whose site is to be used to access design-time services. The control used to parent the picker window. The initial Url to be shown in the picker window. The caption of the picker window. The filter for selecting files in the picker window. A System.Web.UI.Design.UrlBuilderOptions indicating the options for Url selection.

UrlBuilderOptions enumeration (System.Web.UI.Design)

ToString

Description

Defines identifiers for settings for a System.Web.UI.Design.UrlBuilder.

ToString

[C#] public const UrlBuilderOptions NoAbsolute;

[C++] public: const UrlBuilderOptions NoAbsolute;

[VB] Public Const NoAbsolute As UrlBuilderOptions

[JScript] public var NoAbsolute: UrlBuilderOptions;

Description

Build a URL that references a path relative to the current path, rather than one that consists of a fully qualified, absolute path reference URL.

ToString

[C#] public const UrlBuilderOptions None;

[C++] public: const UrlBuilderOptions None;

[VB] Public Const None As UrlBuilderOptions

[JScript] public var None: UrlBuilderOptions;

Description

Use no additional options for the System.Web.UI.Design.UrlBuilder.

UrlEditor class (System.Web.UI.Design)

ToString

Description

Provides a user interface for selecting a URL.

UrlEditor

Example Syntax:

ToString

[C#] public UrlEditor( );

[C++] public: UrlEditor( );

[VB] Public Sub New( )

[JScript] public function UrlEditor( );

Caption

ToString

[C#] protected virtual string Caption {get;}

[C++] _protected: property virtual String* get_Caption( );

[VB] Overridable Protected ReadOnly Property Caption As String

[JScript] protected function get Caption( ): String;

Description

Gets the caption for the URL.

Filter

ToString

[C#] protected virtual string Filter {get;}

[C++] protected: _property virtual String* get Filter( );

[VB] Overridable Protected ReadOnly Property Filter As String

[JScript] protected function get Filter( ): String;

Description

Gets or sets the file extensions to filter the file list for.

Options

ToString

[C#] protected virtual UrlBuilderOptions Options {get;}

[C++] protected: _property virtual UrlBuilderOptions get Options( );

[VB] Overridable Protected ReadOnly Property Options As UrlBuilderOptions

[JScript] protected function get Options( ): UrlBuilderOptions;

Description

Gets the options for a URL builder to use.

EditValue

[C#] public override object EditValue(ITypeDescriptorContext context, IServiceProvider provider, object value);

[C++] public: Object* EditValue(ITypeDescriptorContext* context, IServiceProvider* provider, Object* value);

[VB] Overrides Public Function EditValue(ByVal context As ITypeDescriptorContext, ByVal provider As IServiceProvider, ByVal value As Object) As Object

[JScript] public override function EditValue(context: ITypeDescriptorContext, provider: IServiceProvider, value: Object): Object;

Description

Edits the value of the specified object using the editor style provided by the System.Web.UI.Design.UrlEditor. GetEditStyle(System.ComponentModel.ITypeDescriptorContext) method.

Return Value: The new value of the object. If the value of the object hasn't changed, this should return the same object it was passed.

A service provider is provided so that any required editing services can be obtained. An System.ComponentModel.ITypeDescriptorContext that can be used to gain additional context information. A service provider object through which editing services may be obtained. An instance of the value being edited.

GetEditStyle

[C#] public override UITypeEditorEditStyle GetEditStyle (ITypeDescriptorContext context);

[C++] public: UITypeEditorEditStyle GetEditStyle(ITypeDescriptorContext* context);

[VB] Overrides Public Function GetEditStyle(ByVal context As ITypeDescriptorContext) As UITypeEditorEditStyle

[JScript] public override function GetEditStyle(context: ITypeDescriptorContext): UITypeEditorEditStyle;

Description

Gets the editing style of the System.Web.UI.Design.UrlEditor.EditValue(System.ComponentModel.ITypeDescriptorContext,System.IServiceProvider,System.Object) method.

Return Value: One of the System.Drawing.Design.UITypeEditorEditStyle values indicating the provided editing style. If the method is not supported, this will return System.Drawing.Design.UITypeEditorEditStyle.None. An System.ComponentModel.ITypeDescriptorContext that can be used to gain additional context information.

UserControlDesigner class (System.Web.UI.Design)

ToString

Description

Provides design-time support for web user controls.

UserControlDesigner

Example Syntax:

ToString

[C#] public UserControlDesigner( );

[C++] public: UserControlDesigner( );

[VB] Public Sub New( )

[JScript] public function UserControlDesigner( );

Description

Initializes a new instance of the System.Web.UI.Design.UserControlDesigner class.

AllowResize

ToString

[C#] public override bool AllowResize {get;}

[C++] public: _property virtual bool get_AllowResize( );

[VB] Overrides Public ReadOnly Property AllowResize As Boolean

[JScript] public function get AllowResize( ): Boolean;

Description

Indicates whether all user controls are resizable.

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

ToString

Description

Indicates whether this designer should add a field declaration for the control in the code-behind file for the current design document.

Verbs

GetDesignTimeHtml

[C#] public override string GetDesignTimeHtml( );

[C++] public: String* GetDesignTimeHtml( );

[VB] Overrides Public Function GetDesignTimeHtml( ) As String

[JScript] public override function GetDesignTimeHtml( ): String;

Description

Gets the HTML that is used to represent the control at design time.

Return Value: The HTML that is used to represent the control at design time.

GetPersistInnerHtml

[C#] public override string GetPersistInnerHtml( );

[C++] public: String* GetPersistInnerHtml( );

[VB] Overrides Public Function GetPersistInnerHtml( ) As String

[JScript] public override function GetPersistInnerHtml: String;

Description

Gets the inner HTML that is persisted for the control.

Return Value: The content to be persisted from within the control's tags.

WebControlToolboxItem class (System.Web.UI.Design)

UpdateDesignTimeHtml

Description

Provides a base class for a Web server control System.Drawing.Design.ToolboxItem.

WebControlToolboxItem

Example Syntax:

UpdateDesignTimeHtml

[C#] public WebControlToolboxItem( );

[C++] public: WebControlToolboxItem( );

[VB] Public Sub New( )

[JScript] public function WebControlToolboxItem( ); Initializes a new instance of the System.Web.UI.Design.WebControlToolboxItem class.

Description

Initializes a new instance of the System.Web.UI.Design.WebControlToolboxItem class.

The display name will be a short version of the type name.

WebControlToolboxItem

Example Syntax:

UpdateDesignTimeHtml

[C#] public WebControlToolboxItem(Type type);

[C++] public: WebControlToolboxItem(Type* type);

[VB] Public Sub New(ByVal type As Type)

[JScript] public function WebControlToolboxItem(type: Type);

Description

Initializes a new instance of the System.Web.UI.Design.WebControlToolboxItem class. The fully qualified type name of the tool for this toolbox item AssemblyName Bitmap DisplayName Filter Locked TypeName CreateComponentsCore

[C#] protected override IComponent[ ] CreateComponentsCore(IDesignerHost host);

[C++] protected: IComponent* CreateComponentsCore (IDesignerHost* host) [ ];

[VB] Overrides Protected Function CreateComponentsCore (ByVal host As IDesignerHost) As IComponent( )

[JScript] protected override function CreateComponentsCore(host: IDesignerHost): IComponent[ ];

Description

Creates objects from each Type contained in this System.Drawing.Design.ToolboxItem, and adds them to the specified designer.

Return Value: An array of created System.ComponentModel.IComponent objects.

You can override this method to alter the way components are created. The System.ComponentModel.Design.IDesignerHost to use to create the components.

Deserialize

[C#] protected override void Deserialize(SerializationInfo info, StreamingContext context);

[C++] protected: void Deserialize(SerializationInfo* info, StreamingContext context);

[VB] Overrides Protected Sub Deserialize(ByVal info As SerializationInfo, ByVal context As StreamingContext)

[JScript] protected override function Deserialize(info: SerializationInfo, context StreamingContext);

Description

GetToolAttributeValue

[C#] public object GetToolAttributeValue(IDesignerHost host, Type attributeType);

[C++] public: Object* GetToolAttributeValue(IDesignerHost* host, Type* attributeType);

[VB] Public Function GetToolAttributeValue(ByVal host As IDesignerHost, ByVal attributeType As Type) As Object

[JScript] public function GetToolAttributeValue(host: IDesignerHost, attributeType: Type): Object;

Description

Gets the value of the attribute of the specified type of the toolbox item.

Return Value: The value of the specified type of attribute.

The default implementation will throw an ArgumentException if the attributeType parameter is anything other than a PersistChildrenAttribute. The designer host for the current design document. The type of attribute to retrieve the value of.

GetToolHtml

[C#] public string GetToolHtml(IDesignerHost host);

[C++] public: String* GetToolHtml(IDesignerHost* host);

[VB] Public Function GetToolHtml(ByVal host As IDesignerHost) As String

[JScript] public function GetToolHtml(host: IDesignerHost): String;

Description

Gets the HTML associated with the tool.

Return Value: The HTML associated with the tool. The designer host for the current design document.

GetToolType

[C#] public Type GetToolType(IDesignerHost host);

[C++] public: Type* GetToolType(IDesignerHost* host);

[VB] Public Function GetToolType(ByVal host As IDesignerHost) As Type

[JScript] public function GetToolType(host: IDesignerHost): Type;

Description

Gets the type of this toolbox item.

Return Value: The type of this toolbox item. The designer host for the current design document.

Initialize

[C#] public override void Initialize(Type type);

[C++] public: void Initialize(Type* type);

[VB] Overrides Public Sub Initialize(ByVal type As Type)

[JScript] public override function Initialize(type: Type);

Description

Initializes this toolbox item. The type of this Web server control toolbox item.

Serialize

[C#] protected override void Serialize(SerializationInfo info, StreamingContext context);

[C++] protected: void Serialize(SerializationInfo* info, StreamingContext context);

[VB] Overrides Protected Sub Serialize(ByVal info As SerializationInfo, ByVal context As StreamingContext)

[JScript] protected override function Serialize(info: SerializationInfo, context StreamingContext);

Description

XmlFileEditor class (System.Web.UI.Design)

ToString

Description

Provides a user interface for selecting an XML File.

XmlFileEditor

Example Syntax:

ToString

[C#] public XmlFileEditor( );

[C++] public: XmlFileEditor( );

[VB] Public Sub New( )

[JScript] public function XmlFileEditor( );

EditValue

[C#] public override object EditValue(ITypeDescriptorContext context, IServiceProvider provider, object value);

[C++] public: Object* EditValue(ITypeDescriptorContext* context, IServiceProvider* provider, Object* value);

[VB] Overrides Public Function EditValue(ByVal context As ITypeDescriptorContext, ByVal provider As IServiceProvider, ByVal value As Object) As Object

[JScript] public override function EditValue(context: ITypeDescriptorContext, provider: IServiceProvider, value: Object): Object;

Description

Edits the value of the specified object using the specified service provider and context.

Return Value: The new value of the object. If the value of the object hasn't changed, this method should return the same object it was passed.

A service provider is provided so that any required editing services can be obtained. An System.ComponentModel.ITypeDescriptorContext that can be used to gain additional context information. A service provider object through which editing services may be obtained. An instance of the value being edited.

GetEditStyle

[C#] public override UITypeEditorEditStyle GetEditStyle (ITypeDescriptorContext context);

[C++] public: UItypeEditorEditStyle GetEditStyle(ITypeDescriptorContext* context);

[VB] Overrides Public Function GetEditStyle(ByVal context As ITypeDescriptorContext) As UItypeEditorEditStyle

[JScript] public override function GetEditStyle(context: ITypeDescriptorContext): UItypeEditorEditStyle;

Description

Gets the editor style used by the System.Web.UI.Design.XmlFileEditor.EditValue(System.ComponentModel.ITypeDescriptorContext,System.IServiceProvider, System.Object) method.

Return Value: An value indicating the provided editing style. An System.ComponentModel.ITypeDescriptorContext that can be used to gain additional context information.

XmlUrlEditor class (System.Web.UI.Design)

ToString

Description

Provides a user interface for editing an URL embedded in XML.

XmlUrlEditor

Example Syntax:

ToString

[C#] public XmlUrlEditor( );

[C++] public: XmlUrlEditor( );

[VB] Public Sub New( )

[JScript] public function XmlUrlEditor( );

Caption

ToString

[C#] protected override string Caption {get;}

[C++] protected: _property virtual String* get_Caption( );

[VB] Overrides Protected ReadOnly Property Caption As String

[JScript] protected function get Caption( ): String;

Description

Gets or sets the caption for the URL.

Filter

ToString

[C#] protected override string Filter {get;}

[C++] protected: _property virtual String* get_Filter( );

[VB] Overrides Protected ReadOnly Property Filter As String

[JScript] protected function get Filter( ): String;

Description

Gets or sets the file extensions to filter the file list for.

Options

ToString

[C#] protected override UrlBuilderOptions Options {get;}

[C++] protected: _property virtual UrlBuilderOptions get_Options( );

[VB] Overrides Protected ReadOnly Property Options As UrlBuilderOptions

[JScript] protected function get Options( ): UrlBuilderOptions;

Description

Gets the options for a URL builder to use.

XslUrlEditor class (System.Web.UI.Design)

ToString

Description

Provides a user interface for selecting an XSL file.

XslUrlEditor

Example Syntax:

ToString

[C#] public XslUrlEditor( );

[C++] public: XslUrlEditor( );

[VB] Public Sub New( )

[JScript] public function XslUrlEditor( );

Caption

ToString

[C#] protected override string Caption {get;}

[C++] protected: _property virtual String* get_Caption( );

[VB] Overrides Protected ReadOnly Property Caption As String

[JScript] protected function get Caption( ): String;

Description

Gets or sets the caption for the URL.

Filter

ToString

[C#] protected override string Filter {get;}

[C++] protected: _property virtual String* get_Filter( );

[VB] Overrides Protected ReadOnly Property Filter As String

[JScript] protected function get Filter( ): String;

Description

System.Web.UI.Design.WebControls

Description

The System.Web.UI.Design.WebControls namespace contains classes that can be used to extend design-time support for Web server controls.

AdRotatorDesigner class (System.Web.UI.Design.WebControls)

Description

Provides design-time support for the System.Web.UI.WebControls.AdRotator Web server control.

Constructors:

AdRotatorDesigner

Example Syntax:

[C#] public AdRotatorDesigner( );

[C++] public: AdRotatorDesigner( );

[VB] Public Sub New( )

[JScript] public function AdRotatorDesigner( );

Properties:

AllowResize

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

Methods:

GetDesignTimeHtml

[C#] public override string GetDesignTimeHtml( );

[C++] public: String* GetDesignTimeHtml( );

[VB] Overrides Public Function GetDesignTimeHtml( ) As String

[JScript] public override function GetDesignTimeHtml( ): String;

Description

Gets the HTML that is used to represent the control at design time.

Return Value: The HTML that is used to represent the control at design time.

BaseDataListComponentEditor class (System.Web.UI.Design.WebControls)

UpdateDesignTimeHtml

Description

Provides a base component editor class for the Web Forms System.Web.UI.WebControls.DataGrid and System.Web.UI.WebControls.DataList Web server controls.

BaseDataListComponentEditor

Example Syntax:

UpdateDesignTimeHtml

[C#] public BaseDataListComponentEditor(int initialPage);

[C++] public: BaseDataListComponentEditor(int initialPage);

[VB] Public Sub New(ByVal initialPage As Integer)

[JScript] public function BaseDataListComponentEditor(initialPage: int);

Description

Initializes a new instance of the System.Web.UI.Design.WebControls.BaseDataListComponentEditor class. The index of the initial page to display.

EditComponent

[C#] public override bool EditComponent(ITypeDescriptorContext context, object obj, IWin32Window parent);

[C++] public: bool EditComponent(ITypeDescriptorContext* context, Object* obj, IWin32Window* parent);

[VB] Overrides Public Function EditComponent(ByVal context As ITypeDescriptorContext, ByVal obj As Object, ByVal parent As IWin32Window) As Boolean

[JScript] public override function EditComponent(context: ITypeDescriptorContext, obj: Object, parent: IWin32Window): Boolean;

Description

Edits the specified component using the specified context descriptor and parent window.

Return Value: true if editing the component succeeded; otherwise, false. An System.ComponentModel.ITypeDescriptorContext that can be used to gain additional context information. The component to edit. The parent window.

GetInitialComponentEditorPageIndex

[C#] protected override int GetInitialComponentEditorPageIndex( );

[C++] protected: int GetInitialComponentEditorPage Index( );

[VB] Overrides Protected Function GetInitialComponentEditorPageIndex( ) As Integer

[JScript] protected override function GetInitialComponentEditorPageIndex( ): int;

Description

Gets the index of the initial component editor page.

Return Value: The index of the initial page.

BaseDataListDesigner class (System.Web.UI.Design.WebControls)

ToString

Description

Provides a base designer class for the System.Web.UI.WebControls.DataList Web server control.

BaseDataListDesigner

Example Syntax:

ToString

[C#] public BaseDataListDesigner( );

[C++] public: BaseDataListDesigner( );

[VB] Public Sub New( )

[JScript] public function BaseDataListDesigner( );

Description

Initializes a new instance of the System.Web.UI.Design.WebControls.BaseDataListDesigner class.

ActiveTemplateEditingFrame

AllowResize

AssociatedComponents

Behavior

CanEnterTemplateMode

Component

DataBindings

DataKeyField

ToString

Description

Gets or sets the value of the control's data key field.

The System.Web.UI.Design.WebControls. BaseDataListDesigner.DataKeyField property of this designer gets or sets the System.Web.UI.WebControls.DataList.DataKeyField property of the System.Web.UI.WebControls.DataList control that this designer is editing.

DataMember

ToString

[C#] public string DataMember {get; set;}

[C++] public: _property String* get_DataMember( );

public: _property void set_DataMember(String*);

[VB] Public Property DataMember As String

[JScript] public function get DataMember( ): String;public function set DataMember(String);

Description

Gets or sets the value of the control's data member field.

The System.Web.UI.Design.WebControls. BaseDataListDesigner.DataMember property of this designer gets or sets the System.Web.UI.WebControls.DataList.DataMember property of the System.Web.UI.WebControls.DataList control that this designer is editing.

DataSource

ToString

[C#] public string DataSource {get; set;}

[C++] public: _property String* get DataSource( );

public: _property void set_DataSource(String*);

[VB] Public Property DataSource As String

[JScript] public function get DataSource( ): String;public function set DataSource(String);

Description

Gets or sets the value of the control's data source property.

The System.Web.UI.Design.WebControls. BaseDataListDesigner.DataSource property of this designer gets or sets the System.Web.UI.WebControls.DataList.DataSource property of the System.Web.UI.WebControls.DataList control that this designer is editing.

DesignTimeElement

DesignTimeElementView

DesignTimeHtmlRequiresLoadComplete

ToString

Description

Indicates whether loading must have completed to display the design-time HTML.

If this property is set to true, the control will not be displayed until the entire load has completed.

HidePropertiesInTemplateMode

ID

InheritanceAttribute

Inherited

InTemplateMode

IsDirty

I ReadOnly

ShadowProperties

ShouldCodeSerialize

Verbs

ToString

Description

Gets or sets the collection of verbs available to this designer.

Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Releases the unmanaged resources used by the System.Web.UI.Design.WebControls.BaseDataListDesigner and optionally releases the managed resources.

This method is called by the public Dispose( ) method and the System.Object.Finalize method. true to release both managed and unmanaged resources; false to release only unmanaged resources.

GetDesignTimeDataSource

[C#] protected IEnumerable GetDesignTimeDataSource(int minimumRows, out bool dummyDataSource);

[C++] protected: IEnumerable* GetDesignTimeDataSource (int minimumRows, bool* dummyDataSource);

[VB] Protected Function GetDesignTimeDataSource(ByVal minimumRows As Integer, ByRef dummyDataSource As Boolean) As IEnumerable

[JScript] protected function GetDesignTimeDataSource(minimumRows: int, dummyDataSource: Boolean): IEnumerable; Gets a set of sample data that matches the schema of the selected data source.

Description

Gets a set of sample data that matching the schema of the selected data source.

Return Value: A live data source for use at design-time. The minimum rows of sample data that the data source data should contain. A boolean variable that will be set to true if the returned data source contains dummy data, or false if the data source was populated with data from an actual data source.

GetDesignTimeDataSource

[C#] protected IEnumerable GetDesignTimeDataSource(IEnumerable selectedDataSource, int minimumRows, out bool dummyDataSource);

[C++] protected: IEnumerable* GetDesignTimeDataSource (IEnumerable* selectedDataSource, int minimumRows, bool* dummyDataSource);

[VB] Protected Function GetDesignTimeDataSource(ByVal selectedDataSource As IEnumerable, ByVal minimumRows As Integer, ByRef dummyDataSource As Boolean) As IEnumerable

[JScript] protected function GetDesignTimeDataSource(selectedDataSource IEnumerable, minimumRows: int, dummyDataSource: Boolean): IEnumerable;

Description

Gets a set of sample data that matches the schema of the selected data source.

Return Value: A live data source for use at design-time. The data source that will be used as a template for the format of the data. The minimum number of rows of sample data that the data source data should contain. A boolean variable that will be set to true if the returned data source contains dummy data, or false if the data source was populated with data from an actual data source.

GetResolvedSelectedDataSource

[C#] public IEnumerable GetResolvedSelectedData Source( );

[C++] public: _sealed IEnumerable* GetResolvedSelectedDataSource( );

[VB] NotOverridable Public Function GetResolvedSelectedDataSource( ) As IEnumerable

[JScript] public function GetResolvedSelectedData Source( ): IEnumerable;

Description

Gets the data member that is currently selected within the data source currently bound to the control.

Return Value: The currently selected data member, or null if the control was not bound to a data source, or the data source, site of the designer's component, or the container of the data source could not be accessed.

GetSelectedDataSource

[C#] public object GetSelectedDataSource( );

[C++] public: _sealed Object* GetSelectedDataSource( );

[VB] NotOverridable Public Function GetSelectedDataSource( ) As Object

[JScript] public function GetSelectedDataSource( ): Object;

Description

Gets the selected data source component from the component's container.

Return Value: The selected data source, or null if a data source is not found, or if a data source with the same name does not exist.

GetTemplateContainerDataSource

[C#] public override IEnumerable GetTemplateContainerDataSource(string templateName);

[C++] public: IEnumerable* GetTemplateContainerDataSource(String* templateName);

[VB] Overrides Public Function GetTemplateContainerDataSource(ByVal templateName As String) As IEnumerable

[JScript] public override function GetTemplateContainerDataSource(templateName: String): IEnumerable;

Description

Gets the template's container's data source.

Return Value: An object that implements System.Collections.IEnumerable and contains the data source or data sources available to the template's container. The name of the template to retrieve the data source for.

Initialize

[C#] public override void Initialize(IComponent component);

[C++] public: void Initialize(IComponent* component);

[VB] Overrides Public Sub Initialize(ByVal component As IComponent)

[JScript] public override function Initialize(component: IComponent);

Description

Initializes the designer with the System.Web.UI.WebControls.DataGrid control that this instance of the designer is associated with. The associated System.Web.UI.WebControls.DataGrid control.

InvokePropertyBuilder

[C#] protected internal void InvokePropertyBuilder(int initialPage);

[C++] protected public: void InvokePropertyBuilder(int initialPage);

[VB] Protected Friend Dim Sub InvokePropertyBuilder(ByVal initialPage As Integer)

[JScript] package function InvokePropertyBuilder(initialPage: int);

Description

Invokes the property builder beginning with the specified page. The page to begin with.

OnAutoFormat

[C#] protected void OnAutoFormat(object sender, EventArgs e);

[C++] protected: void OnAutoFormat(Object* sender, EventArgs* e);

[VB] Protected Sub OnAutoFormat(ByVal sender As Object, ByVal e As EventArgs)

[JScript] protected function OnAutoFormat(sender: Object, e: EventArgs);

Description

Represents the method that will handle the AutoFormat event. The source of the event. An System.EventArgs object that provides data about the event.

OnComponentChanged

[C#] public override void OnComponentChanged(object sender, ComponentChangedEventArgs e);

[C++] public: void OnComponentChanged(Object* sender, ComponentChangedEventArgs* e);

[VB] Overrides Public Sub OnComponentChanged(ByVal sender As Object, ByVal e As ComponentChangedEventArgs)

[JScript] public override function OnComponentChanged (sender: Object, e: ComponentChangedEventArgs);

Description

Represents the method that will handle the component change event. The source of the event. The System.ComponentModel.Design.ComponentChangedEventArgs that provides data about the event.

OnDataSourceChanged

[C#] protected internal virtual void OnDataSource Changed( );

[C++] protected public: virtual void OnDataSource Changed( );

[VB] Overridable Protected Friend Dim Sub OnDataSourceChanged( )

[JScript] package function OnDataSourceChanged( );

Description

Raises the DataSourceChanged event.

OnPropertyBuilder

[C#] protected void OnPropertyBuilder(object sender, EventArgs e);

[C++] protected: void OnPropertyBuilder(Object* sender, EventArgs* e);

[VB] Protected Sub OnPropertyBuilder(ByVal sender As Object, ByVal e As EventArgs)

[JScript] protected function OnPropertyBuilder(sender: Object, e: EventArgs);

Description

Represents the method that will handle the property builder event. The source of the event. An System.EventArgs object that provides data about the event.

OnStylesChanged

[C#] protected internal void OnStylesChanged( );

[C++] protected public: void OnStylesChanged( );

[VB] Protected Friend Dim Sub OnStylesChanged( )

[JScript] package function OnStylesChanged( );

Description

Provides a method that can be overrriden to implement functionality that should occur when a style of the control has been changed.

This method can serve as notification that a style of the control has changed.

OnTemplateEditingVerbsChanged

[C#] protected abstract void OnTemplateEditingVerbsChanged( );

[C++] protected: virtual void OnTemplateEditingVerbsChanged( )=0;

[VB] MustOverride Protected Sub OnTemplateEditingVerbsChanged( )

[JScript] protected abstract function OnTemplateEditingVerbsChanged( );

Description

Provides a method that can be overrriden to implement functionality that should occur when the designer's template editing verbs have changed.

This method can serve as notification that the designer's template editing verbs have changed.

PreFilterProperties

[C#] protected override void PreFilterProperties(IDictionary properties);

[C++] protected: void PreFilterProperties(IDictionary* properties);

[VB] Overrides Protected Sub PreFilterProperties(ByVal properties As IDictionary)

[JScript] protected override function PreFilterProperties (properties: IDictionary);

Description

Filters the properties exposed through a System.ComponentModel.TypeDescriptor and replaces the runtime DataSource property descriptor with a design-time data source. The set of properties to filter.

BaseValidatorDesigner class (System.Web.UI.Design.WebControls)

UpdateDesignTimeHtml

Description

Provides design-time support for controls that derive from System.Web.UI.WebControls.BaseValidator.

BaseValidatorDesigner

Example Syntax:

UpdateDesignTimeHtml

[C#] public BaseValidatorDesigner( );

[C++] public: BaseValidatorDesigner( );

[VB] Public Sub New( )

[JScript] public function BaseValidatorDesigner( );

AllowResize

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

GetDesignTimeHtml

[C#] public override string GetDesignTimeHtml( );

[C++] public: String* GetDesignTimeHtml( );

[VB] Overrides Public Function GetDesignTimeHtml( ) As String

[JScript] public override function GetDesignTimeHtml( ): String;

Description

Gets the HTML that is used to represent the control at design time.

Return Value: The HTML that is used to represent the control at design time.

ButtonDesigner class (System.Web.UI.Design.WebControls)

UpdateDesignTimeHtml

Description

Provides design-time support for the System.Web.UI.WebControls.Button Web server control.

ButtonDesigner

Example Syntax:

UpdateDesignTimeHtml

[C#] public ButtonDesigner( );

[C++] public: ButtonDesigner( );

[VB] Public Sub New( )

[JScript] public function ButtonDesigner( );

AllowResize

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

GetDesignTimeHtml

[C#] public override string GetDesignTimeHtml( );

[C++] public: String* GetDesignTimeHtml( );

[VB] Overrides Public Function GetDesignTimeHtml( ) As String

[JScript] public override function GetDesignTimeHtml( ): String;

Description

Gets the HTML that is used to represent the control at design time.

Return Value: The HTML that is used to represent the control at design time.

CalendarAutoFormatDialog class (System.Web.UI.Design.WebControls)

UpdateDesignTimeHtml

Description

Provides an AutoFormat page for a System.Web.UI.WebControls.Calendar Web server control.

CalendarAutoFormatDialog

Example Syntax:

UpdateDesignTimeHtml

[C#] public CalendarAutoFormatDialog(Calendar calendar);

[C++] public: CalendarAutoFormnatDialog(Calendar* calendar);

[VB] Public Sub New(ByVal calendar As Calendar)

[JScript] public function CalendarAutoFormatDialog(calendar: Calendar);

Description

Create a new AutoFormatPage instance Create a new AutoFormatPage instance

AcceptButton

AccessibilityObject

AccessibleDefaultActionDescription

AccessibleDescription

AccessibleName

AccessibleRole

ActiveControl

ActiveMdiChild

AllowDrop

AllowTransparency

Anchor

AutoScale

AutoScaleBaseSize

AutoScroll

AutoScrollMargin

AutoScrollMinSize

AutoScrollPosition

BackColor

BackgroundImage

BindingContext

Bottom

Bounds

CancelButton

CanFocus

CanSelect

Capture

CausesValidation

ClientRectangle

ClientSize

CompanyName

Container

ContainsFocus

ContextMenu

ControlBox

Controls

Created

CreateParams

Cursor

DataBindings

DefaultImeMode

DefaultSize

DesignMode

DesktopBounds

DesktopLocation

DialogResult

DisplayRectangle

Disposing

Dock

DockPadding

Enabled

Events

Focused

Font

FontHeight

ForeColor

FormBorderStyle

Handle

HasChildren

Height

HelpButton

HScroll

Icon

ImeMode

InvokeRequired

IsAccessible

IsDisposed

IsHandleCreated

IsMdiChild

IsMdiContainer

IsRestrictedWindow

KeyPreview

Left

Location

MaximizeBox

MaximizedBounds

MaximumSize

MdiChildren
MdiParent
Menu
MergedMenu
MinimizeBox
MinimumSize
Modal
Name
Opacity
OwnedForms
Owner
Parent
ParentForm
ProductName
ProductVersion
RecreatingHandle
Region
RenderRightToLeft
ResizeRedraw
Right
RightToLeft
ShowFocusCues
ShowInTaskbar
ShowKeyboardCues
Site
Size
SizeGripStyle
StartPosition
TabIndex
TabStop
Tag
Text
Top
TopLevel
TopLevelControl
TopMost
TransparencyKey
Visible
VScroll
Width
WindowState
WindowTarget
DoDelayLoadActions

[C#] protected void DoDelayLoadActions( );
[C++] protected: void DoDelayLoadActions( );
[VB] Protected Sub DoDelayLoadActions( )
[JScript] protected function DoDelayLoadActions( );

Description

Executes any initialization that was delayed until the first idle time Executes any initialization that was delayed until the first idle time OnActivated

[C#] protected void OnActivated(object source, EventArgs e);
[C++] protected: void OnActivated(Object* source, EventArgs* e);
[VB] Protected Sub OnActivated(ByVal source As Object, ByVal e As EventArgs)
[JScript] protected function OnActivated(source: Object, e: EventArgs);

Description

Handles the activated event of the System.Web.UI.WebControls.Calendar AutoFormat dialog.

This method provides an opportunity to perform operations after a Calendar AutoFormat dialog has been activated. The source of the event. An System.EventArgs that provides information about the event.

OnOKClicked

[C#] protected void OnOKClicked(object source, EventArgs e);
[C++] protected: void OnOKClicked(Object* source, EventArgs* e);
[VB] Protected Sub OnOKClicked(ByVal source As Object, ByVal e As EventArgs)
[JScript] protected function OnOKClicked(source: Object, e: EventArgs);

Description

Handle changes in the pre-defined schema choices Handle changes in the pre-defined schema choices OnSelChangedScheme

[C#] protected void OnSelChangedScheme(object source, EventArgs e);
[C++] protected: void OnSelChangedScheme(Object* source, EventArgs* e);
[VB] Protected Sub OnSelChangedScheme(ByVal source As Object, ByVal e As EventArgs)
[JScript] protected function OnSelChangedScheme(source: Object, e: EventArgs);

Description

Handle changes in the pre-defined schema choices Handle changes in the pre-defined schema choices SaveComponent

[C#] protected void SaveComponent( );
[C++] protected: void SaveComponent( );
[VB] Protected Sub SaveComponent( )
[JScript] protected function SaveComponent( );

Description

Save any changes into the component Save any changes into the component CalendarDesigner class (System.Web.UI.Design.WebControls)

WndProc

Description

Provides design-time support for the System.Web.UI.WebControls.Calendar Web server control.

CalendarDesigner

Example Syntax:

WndProc

[C#] public CalendarDesigner( );
[C++] public: CalendarDesigner( );
[VB] Public Sub New( )
[JScript] public function CalendarDesigner( );

AllowResize
AssociatedComponents
Behavior
Component
DataBindings
DesignTimeElement
DesignTimeElementView
DesignTimeHtmlRequiresLoadComplete
ID
InheritanceAttribute
Inherited
IsDirty
ReadOnly
ShadowProperties
ShouldCodeSerialize
Verbs
WndProc Description Gets the set of verbs available to this designer.

Initialize

[C#] public override void Initialize(IComponent component);

[C++] public: void Initialize(IComponent* component);

[VB] Overrides Public Sub Initialize(ByVal component As IComponent)

[JScript] public override function Initialize(component: IComponent);

Description

Initializes the designer with the component for design.

The designer host calls System.Web.UI.Design.WebControls.CalendarDesigner.Initialize(System.ComponentModel.IComponent) to establish the component for design. The control element for design.

OnAutoFormat

[C#] protected void OnAutoFormat(object sender, EventArgs e);

[C++] protected: void OnAutoFormat(Object* sender, EventArgs* e);

[VB] Protected Sub OnAutoFormat(ByVal sender As Object, ByVal e As EventArgs)

[JScript] protected function OnAutoFormat(sender: Object, e: EventArgs);

Description

Delegate to handle the the AutoFormat verb that displays a new System.Web.UI.Design.WebControls.CalendarAutoFormatDialog. The source of the event. The System.EventArgs object that provides data about the event.

CheckBoxDesigner class (System.Web.UI.Design.WebControls)

UpdateDesignTimeHtml

Description

Provides design-time support for the System.Web.UI.WebControls.CheckBox Web server control.

CheckBoxDesigner

Example Syntax:

UpdateDesignTimeHtml

[C#] public CheckBoxDesigner( );

[C++] public: CheckBoxDesigner( );

[VB] Public Sub New( )

[JScript] public function CheckBoxDesigner( );

AllowResize

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

GetDesignTimeHtml

[C#] public override string GetDesignTimeHtml( );

[C++] public: String* GetDesignTimeHtml( );

[VB] Overrides Public Function GetDesignTimeHtml( ) As String

[JScript] public override function GetDesignTimeHtml( ): String;

Description

Gets the HTML that is used to represent the control at design time.

Return Value: The HTML that is used to represent the control at design time.

DataGridColumnCollectionEditor class (System.Web.UI.Design.WebControls)

UpdateDesignTimeHtml

Description

Provides a collection editing user interface for a column collection of a System.Web.UI.WebControls.DataGrid Web server control.

DataGridColumnCollectionEditor

Example Syntax:

UpdateDesignTimeHtml

[C#] public DataGridColumnCollectionEditor( );

[C++] public: DataGridColumnCollectionEditor( );

[VB] Public Sub New( )

[JScript] public function DataGridColumnCollection Editor( );

EditValue

[C#] public override object EditValue(ITypeDescriptorContext context, IServiceProvider provider, object value);

[C++] public: Object* EditValue(ITypeDescriptorContext* context, IServiceProvider* provider, Object* value);

[VB] Overrides Public Function EditValue(ByVal context As ITypeDescriptorContext, ByVal provider As IServiceProvider, ByVal value As Object) As Object

[JScript] public override function EditValue(context: ITypeDescriptorContext, provider: IServiceProvider, value: Object): Object;

Description

Edits the specified value using the specified context descriptor and service provider.

Return Value: The new value. An System.ComponentModel.ITypeDescriptorContext that indicates the context of the object to edit the value of. An System.IServiceProvider. The object to edit.

GetEditStyle

[C#] public override UItypeEditorEditStyle GetEditStyle (ITypeDescriptorContext context);

[C++] public: UItypeEditorEditStyle GetEditStyle(ITypeDescriptorContext* context);

[VB] Overrides Public Function GetEditStyle(ByVal context As ITypeDescriptorContext) As UItypeEditorEditStyle

[JScript] public override function GetEditStyle(context: ITypeDescriptorContext): UItypeEditorEditStyle;

Description

Gets the edit style used by the System.Web.UI.Design.WebControls.DataGridColumnCollectionEditor.EditValue (System.ComponentModel.ITypeDescriptorContext,System. IServiceProvider,System.Object) method.

Return Value: A System.Drawing.Design.UItypeEditorEditStyle that represents the editor style that this editor uses. An System.ComponentModel.ITypeDescriptorContext that indicates the context of the object to edit the value of.

DataGridComponentEditor class (System.Web.UI.Design.WebControls)

ToString

Description

Provides a component editor for a Web Forms System.Web.UI.WebControls.DataGrid Web server control.

DataGridComponentEditor

Example Syntax:

ToString

[C#] public DataGridComponentEditor( );

[C++] public: DataGridComponentEditor( );

[VB] Public Sub New( )

[JScript] public function DataGridComponentEditor( ); Initializes a new instance of the System.Web.UI.Design.WebControls.DataGridComponentEditor class.

Description

Initializes a new instance of the System.Web.UI.Design.WebControls.DataGridComponentEditor class.

DataGridComponentEditor

Example Syntax:

ToString

[C#] public DataGridComponentEditor(int initialPage);

[C++] public: DataGridComponentEditor(int initialPage);

[VB] Public Sub New(ByVal initialPage As Integer)

[JScript] public function DataGridComponentEditor(initialPage: int);

Description

Initializes a new instance of the System.Web.UI.Design.WebControls.DataGridComponentEditor class. The index of the initial page.

GetComponentEditorPages

[C#] protected override Type[ ] GetComponentEditorPages( );

[C++] protected: Type* GetComponentEditorPages( ) C ;

[VB] Overrides Protected Function GetComponentEditorPages( ) As Type( )

[JScript] protected override function GetComponentEditorPages( ): Type[ ];

Description

Gets the set of all pages in the System.Web.UI.WebControls.DataGrid control.

Return Value: An array consisting of the set of component editor pages.

This method can be overridden to change the set of pages to show.

DataGridDesigner class (System.Web.UI.Design.WebControls)

ToString

Description

Provides design-time support for the System.Web.UI.WebControls.DataGrid Web server control.

DataGridDesigner

Example Syntax:

ToString

[C#] public DataGridDesigner( );

[C++] public: DataGridDesigner( );

[VB] Public Sub New( )

[JScript] public function DataGridDesigner( );

Description

Initializes a new instance of the System.Web.UI.Design.WebControls.DataGridDesigner class.

ActiveTemplateEditingFrame

AllowResize

AssociatedComponents

Behavior

CanEnterTemplateMode

Component

DataBindings

DataKeyField

DataMember

DataSource

DesignTimeElement

DesignTimeElementView

DesignTimeHtmlRequiresLoadComplete

HidePropertiesInTemplateMode

ID

InheritanceAttribute

Inherited

InTemplateMode

IsDirty

ReadOnly

ShadowProperties

ShouldCodeSerialize

Verbs

CreateTemplateEditingFrame

[C#] protected override ITemplateEditingFrame CreateTemplateEditingFrame(TemplateEditingVerb verb);

[C++] protected: ITemplateEditingFrame* CreateTemplateEditingFrame(TemplateEditingVerb* verb);

[VB] Overrides Protected Function CreateTemplateEditingFrame(ByVal verb As TemplateEditingVerb) As ITemplateEditingFrame

[JScript] protected override function CreateTemplateEditingFrame(verb TemplateEditingVerb): ITemplateEditingFrame;

Description

Creates a template editing frame using the specified verb.

Return Value: The new template editing frame. The verb to create the template editing frame for.

Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Releases the unmanaged resources used by the System.Web.UI.Design.WebControls.DataGridDesigner and optionally releases the managed resources.

This method is called by the public Dispose( ) method and the System.Object.Finalize method. true to release both managed and unmanaged resources; false to release only unmanaged resources.

GetCachedTemplateEditingVerbs

[C#] protected override TemplateEditingVerb[ ] GetCachedTemplateEditingVerbs( );

[C++] protected: TemplateEditingVerb* GetCachedTemplateEditingVerbs( ) [ ];

[VB] Overrides Protected Function GetCachedTemplateEditingVerbs( ) As TemplateEditingVerb( )

[JScript] protected override function GetCachedTemplateEditingVerbs( ) TemplateEditingVerb[ ];

Description

Gets the cached template editing verbs.

Return Value: An array containing the cached template editing verbs.

GetDesignTimeHtml

[C#] public override string GetDesignTimeHtml( );

[C++] public: String* GetDesignTimeHtml( );

[VB] Overrides Public Function GetDesignTimeHtml( ) As String

[JScript] public override function GetDesignTimeHtml( ): String;

Description

Gets the HTML that is used to represent the control at design time.

Return Value: The HTML that is used to represent the control at design time.

GetEmptyDesignTimeHtml

[C#] protected override string GetEmptyDesignTimeHtml( );

[C++] protected: String* GetEmptyDesignTimeHtml( );

[VB] Overrides Protected Function GetEmptyDesignTimeHtml( ) As String

[JScript] protected override function GetEmptyDesignTimeHtml( ): String;

Description

Gets the HTML used to represent an empty template-based control at design time.

Return Value: The HTML used to represent an empty template-based control at design time.

GetErrorDesignTimeHtml

[C#] protected override string GetErrorDesignTimeHtml (Exception e);

[C++] protected: String* GetErrorDesignTimeHtml(Exception* e);

[VB] Overrides Protected Function GetErrorDesignTimeHtml(ByVal e As Exception) As String

[JScript] protected override function GetErrorDesignTimeHtml(e: Exception): String;

Description

Gets the HTML displayed at design-time for the specified exception when an error has been encountered while rendering the control.

Return Value: The HTML displayed at design-time for the specified exception. The exception to display an error message for.

GetTemplateContainerDataItemProperty

[C#] public override string GetTemplateContainerDataItemProperty(string templateName);

[C++] public: String* GetTemplateContainerDataItemProperty(String* templateName);

[VB] Overrides Public Function GetTemplateContainerDataItemProperty(ByVal templateName As String) As String

[JScript] public override function GetTemplateContainerDataItemProperty(templateName: String): String;

Description

Gets the template's container's data item property.

Return Value: The template's container's data item property. The name of the template.

GetTemplateContent

[C#] public override string GetTemplateContent(ITemplateEditingFrame editingFrame, string templateName, out bool allowEditing);

[C++] public: String* GetTemplateContent(ITemplateEditingFrame* editingFrame, String* templateName, bool* allowEditing);

[VB] Overrides Public Function GetTemplateContent(ByVal editingFrame As ITemplateEditingFrame, ByVal templateName As String, ByRef allowEditing As Boolean) As String

[JScript] public override function GetTemplateContent(editingFrame ITemplateEditingFrame, templateName: String, allowEditing: Boolean): String;

Description

Gets the template's content.

Return Value: The template's content. The template frame to retrieve content for. The name of the template. A boolean variable that will be set to true if the template's content can be edited, or false if the content is read-only.

GetTemplatePropertyParentType

[C#] public override Type GetTemplatePropertyParentType (string templateName);

[C++] public: Type* GetTemplatePropertyParentType (String* templateName);

[VB] Overrides Public Function GetTemplatePropertyParentType(ByVal templateName As String) As Type

[JScript] public override function GetTemplatePropertyParentType(templateName String): Type;

Description

Gets the type of the parent of the template property.

Return Value: The type of the object that has the template property. The name of the template to return the type of the parent for.

Initialize

[C#] public override void Initialize(IComponent component);

[C++] public: void Initialize(IComponent* component);

[VB] Overrides Public Sub Initialize(ByVal component As IComponent)

[JScript] public override function Initialize(component: IComponent);

Description

Initializes the designer with the System.Web.UI.WebControls.DataGrid control that this instance of the designer is associated with. The associated System.Web.UI.WebControls.DataGrid control.

OnColumnsChanged

[C#] public virtual void OnColumnsChanged( );

[C++] public: virtual void OnColumnsChanged( );

[VB] Overridable Public Sub OnColumnsChanged( )

[JScript] public function OnColumnsChanged( );

Description

Notification that is called when the columns changed event occurs.

OnTemplateEditingVerbsChanged

[C#] protected override void OnTemplateEditingVerbsChanged( );

[C++] protected: void OnTemplateEditingVerbsChanged( );

[VB] Overrides Protected Sub OnTemplateEditingVerbsChanged( )

[JScript] protected override function OnTemplateEditingVerbsChanged( );

Description

Provides an opportunity to do processing or other actions when a change has been made to the template editing verbs.

SetTemplateContent

[C#] public override void SetTemplateContent(ITemplateEditingFrame editingFrame, string templateName, string templateContent);

[C++] public: void SetTemplateContent(ITemplateEditingFrame* editingFrame, String* templateName, String* templateContent);

[VB] Overrides Public Sub SetTemplateContent(ByVal editingFrame As ITemplateEditingFrame, ByVal templateName As String, ByVal templateContent As String)

[JScript] public override function SetTemplateContent(editingFrame: ITemplateEditingFrame, templateName: String, templateContent: String);

Description

Sets the content for the specified template and frame. The template frame to set the content for. The name of the template. The content to set.

DataListComponentEditor class (System.Web.UI.Design.WebControls)

UpdateDesignTimeHtml

Description

Provides a component editor for a Web Forms System.Web.UI.WebControls.DataList control.

DataListComponentEditor

Example Syntax:

UpdateDesignTimeHtml

[C#] public DataListComponentEditor( );

[C++] public: DataListComponentEditor( );

[VB] Public Sub New( )

[JScript] public function DataListComponentEditor( ); Initializes a new instance of System.Web.UI.Design.WebControls.DataListComponentEditor.

Description

Initializes a new instance of System.Web.UI.Design.WebControls.DataListComponentEditor.

DataListComponentEditor

Example Syntax:

UpdateDesignTimeHtml

[C#] public DataListComponentEditor(int initialPage);

[C++] public: DataListComponentEditor(int initialPage);

[VB] Public Sub New(ByVal initialPage As Integer)

[JScript] public function DataListComponentEditor(initialPage: int);

Description

Initializes a new instance of System.Web.UI.Design.WebControls.DataListComponentEditor. The index of the initial page to display.

GetComponentEditorPages

[C#] protected override Type[ ] GetComponentEditor Pages( );

[C++] protected: Type* GetComponentEditorPages( ) [ ];

[VB] Overrides Protected Function GetComponentEditorPages( ) As Type( )

[JScript] protected override function GetComponentEditorPages( ): Type[ ];

Description

Gets the set of component editor pages owned by the designer.

Return Value: The pages owned by the designer.

DataListDesigner class (System.Web.UI.Design.WebControls)

ToString

Description

Provides design-time support for the System.Web.UI.WebControls.DataList Web server control.

DataListDesigner

Example Syntax:

ToString

[C#] public DataListDesigner( );

[C++] public: DataListDesigner( );

[VB] Public Sub New( )

[JScript] public function DataListDesigner( );

Description

Initializes a new instance of the System.Web.UI.Design.WebControls.DataListDesigner class.

ActiveTemplateEditingFrame

AllowResize

ToString

Description

Indicates whether the data list can be resized.

AssociatedComponents

Behavior

CanEnterTemplateMode

Component

DataBindings

DataKeyField

DataMember

DataSource

DesignTimeElement

DesignTimeElementView

DesignTimeHtmlRequiresLoadComplete

HidePropertiesInTemplateMode

ID

InheritanceAttribute

Inherited

InTemplateMode

IsDirty

ReadOnly

ShadowProperties

ShouldCodeSerialize

TemplatesExist

ToString

Description

Indicates whether templates associated to the designer currently exist.

Verbs

CreateTemplateEditingFrame

[C#] protected override ITemplateEditingFrame CreateTemplateEditingFrame(TemplateEditingVerb verb);

[C++] protected: ITemplateEditingFrame* CreateTemplateEditingFrame(TemplateEditingVerb* verb);

[VB] Overrides Protected Function CreateTemplateEditingFrame(ByVal verb As TemplateEditingVerb) As ITemplateEditingFrame

[JScript] protected override function CreateTemplateEditingFrame(verb: TemplateEditingVerb): ITemplateEditingFrame;

Description

Creates a template editing frame using the specified verb.

Return Value: An System.Web.UI.Design.ITemplateEditingFrame. The verb that was invoked to create a template editing frame.

Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Releases the unmanaged resources used by the System.Web.UI.Design.WebControls.DataListDesigner and optionally releases the managed resources.

This method is called by the public Dispose( ) method and the System.Object.Finalize method. true to release both managed and unmanaged resources; false to release only unmanaged resources.

GetCachedTemplateEditingVerbs

[C#] protected override TemplateEditingVerb[ ] GetCachedTemplateEditingVerbs( );

[C++] protected: TemplateEditingVerb* GetCachedTemplateEditingVerbs( ) [ ];

[VB] Overrides Protected Function GetCachedTemplateEditingVerbs( ) As TemplateEditingVerb( )

[JScript] protected override function GetCachedTemplateEditingVerbs( ) TemplateEditingVerb[ ];

Description

Gets the cached template editing verbs available to this designer.

Return Value: The cached template editing verbs available to this designer.

GetDesignTimeHtml

[C#] public override string GetDesignTimeHtml( );

[C++] public: String* GetDesignTimeHtml( );

[VB] Overrides Public Function GetDesignTimeHtml( ) As String

[JScript] public override function GetDesignTimeHtml( ): String;

Description

Gets the HTML that is used to represent the control at design time.

Return Value: The HTML that is used to represent the control at design time.

GetEmptyDesignTimeHtml

[C#] protected override string GetEmptyDesignTimeHtml( );

[C++] protected: String* GetEmptyDesignTimeHtml( );

[VB] Overrides Protected Function GetEmptyDesignTimeHtml( ) As String

[JScript] protected override function GetEmptyDesignTimeHtml( ): String;

Description

Gets the HTML used to represent an empty template-based control at design time.

Return Value: The HTML used to represent an empty template-based control at design time.

GetErrorDesignTimeHtml

[C#] protected override string GetErrorDesignTimeHtml (Exception e);

[C++] protected: String* GetErrorDesignTimeHtml(Exception* e);

[VB] Overrides Protected Function GetErrorDesignTimeHtml(ByVal e As Exception) As String

[JScript] protected override function GetErrorDesignTimeHtml(e: Exception): String;

Description

Gets the HTML to display at design-time for the specified exception when an error has been encountered while rendering the control.

Return Value: The HTML displayed at design-time for the specified exception. The exception to display the error message for.

GetTemplateContainerDataItemProperty

[C#] public override string GetTemplateContainerDataItemProperty(string templateName);

[C++] public: String* GetTemplateContainerDataItemProperty(String* templateName);

[VB] Overrides Public Function GetTemplateContainerDataItemProperty(ByVal templateName As String) As String

[JScript] public override function GetTemplateContainerDataItemProperty(templateName: String): String;

Description

Gets the template's container's data item property.

Return Value: The data item property of the container of the template. The name of the template.

GetTemplateContent

[C#] public override string GetTemplateContent(ITemplateEditingFrame editingFrame, string templateName, out bool allowEditing);

[C++] public: String* GetTemplateContent(ITemplateEditingFrame* editingFrame, String* templateName, bool* allowEditing);

[VB] Overrides Public Function GetTemplateContent(ByVal editingFrame As ITemplateEditingFrame, ByVal templateName As String, ByRef allowEditing As Boolean) As String

[JScript] public override function GetTemplateContent(editingFrame: ITemplateEditingFrame, templateName: String, allowEditing: Boolean): String;

Description

Gets the template's content.

Return Value: The template's content. The template frame to get content from. The name of the template. A boolean variable that will be set to true if the template's content can be edited, or false if the content is read-only.

Initialize

[C#] public override void Initialize(IComponent component);

[C++] public: void Initialize(IComponent* component);

[VB] Overrides Public Sub Initialize(ByVal component As IComponent)

[JScript] public override function Initialize(component: IComponent);

Description

Initializes the designer with the System.Web.UI.WebControls.DataList control that this instance of the designer is associated with. The associated System.Web.UI.WebControls.DataList control.

OnTemplateEditingVerbsChanged

[C#] protected override void OnTemplateEditingverbsChanged( );

[C++] protected: void OnTemplateEditingverbsChanged( );

[VB] Overrides Protected Sub OnTemplateEditingVerbsChanged( )

[JScript] protected override function OnTemplateEditingVerbsChanged( );

Description

Provides an opportunity to do processing or other actions when a change has been made to the template editing verbs.

SetTemplateContent

[C#] public override void SetTemplateContent(ITemplateEditingFrame editingFrame, string templateName, string templateContent);

[C++] public: void SetTemplateContent(ITemplateEditingFrame* editingFrame, String* templateName, String* templateContent);

[VB] Overrides Public Sub SetTemplateContent(ByVal editingFrame As ITemplateEditingFrame, ByVal templateName As String, ByVal templateContent As String)

[JScript] public override function SetTemplateContent(editingFrame: ITemplateEditingFrame, templateName: String, templateContent: String);

Description

Sets the template's content. The template frame to set content for. The name of the template. The content to set.

HyperLinkDesigner class (System.Web.UI.Design.WebControls)

UpdateDesignTimeHtml

Description

Provides design-time support for the System.Web.UI.WebControls.HyperLink Web server control.

HyperLinkDesigner

Example Syntax:

UpdateDesignTimeHtml

[C#] public HyperLinkDesigner( );

[C++] public: HyperLinkDesigner( );

[VB] Public Sub New( )

[JScript] public function HyperLinkDesigner( );

AllowResize

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

GetDesignTimeHtml

[C#] public override string GetDesignTimeHtml( );

[C++] public: String* GetDesignTimeHtml( );

[VB] Overrides Public Function GetDesignTimeHtml( ) As String

[JScript] public override function GetDesignTimeHtml( ): String;

Description

Gets the HTML that is used to represent the control at design time.

Return Value: The HTML that is used to represent the control at design time.

LabelDesigner class (System.Web.UI.Design.WebControls)

UpdateDesignTimeHtml

Description

Provides design-time support for the System.Web.UI.WebControls.Label Web server control.

LabelDesigner

Example Syntax:

UpdateDesignTimeHtml

[C#] public LabelDesigner( );

[C++] public: LabelDesigner( );

[VB] Public Sub New( )

[JScript] public function LabelDesigner( );

AllowResize

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

LinkButtonDesigner class (System.Web.UI.Design.WebControls)

UpdateDesignTimeHtml

Description

Provides design-time support for the System.Web.UI.WebControls.LinkButton Web server control.

LinkButtonDesigner

Example Syntax:

UpdateDesignTimeHtml

[C#] public LinkButtonDesigner( );

[C++] public: LinkButtonDesigner( );

[VB] Public Sub New( )

[JScript] public function LinkButtonDesigner( );

AllowResize

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

ListControlDataBindingHandler class (System.Web.UI.Design.WebControls)

UpdateDesignTimeHtml

Description

Provides a data binding handler for a System.Web.UI.WebControls.ListControl.

ListControlDataBindingHandler

Example Syntax:

UpdateDesignTimeHtml

[C#] public ListControlDataBindingHandler( );

[C++] public: ListControlDataBindingHandler( );

[VB] Public Sub New( )

[JScript] public function ListControlDataBindingHandler( );

DataBindControl

[C#] public override void DataBindControl(IDesignerHost designerHost, Control control);

[C++] public: void DataBindControl(IDesignerHost* designerHost, Control* control);

[VB] Overrides Public Sub DataBindControl(ByVal designerHost As IDesignerHost, ByVal control As Control)

[JScript] public override function DataBindControl(designerHost: IDesignerHost, control: Control);

Description

Adds a data binding to the specified control. The designer host for the document that contains the control. The control to add this data binding to.

ListControlDesigner class (System.Web.UI.Design.WebControls)

ToString

Description

Provides design-time support for System.Web.UI.WebControls.ListControl Web server controls.

ListControlDesigner

Example Syntax:

ToString

[C#] public ListControlDesigner( );

[C++] public: ListControlDesigner( );

[VB] Public Sub New( )

[JScript] public function ListControlDesigner( );

Description

Initializes a new instance of the System.Web.UI.Design.WebControls.ListControlDesigner class.

AllowResize

AssociatedComponents

Behavior

Component

DataBindings

DataMember

ToString

Description

Gets or sets the data member for the control.

DataSource

ToString

[C#] public string DataSource {get; set;}

[C++] public: _property String* get_DataSource( ); public: _property void set_DataSource(String*);

[VB] Public Property DataSource As String

[JScript] public function get DataSource( ): String;public function set DataSource(String);

Description

Gets or sets the data source property of the control.

DataTextField

ToString

[C#] public string DataTextField {get; set;}

[C++] public: _property String* get_DataTextField( ); public: _property void set_DataTextField(String*);

[VB] Public Property DataTextField As String

[JScript] public function get DataTextField( ): String;public function set DataTextField(String);

Description

Gets or sets the data text field of the control.

DataValueField

ToString

[C#] public string DataValueField {get; set;}

[C++] public: _property String* get_DataValueField( );public: _property void set_DataValueField(String*);

[VB] Public Property DataValueField As String

[JScript] public function get DataValueField( ): String;public function set DataValueField(String);

Description

Gets or sets the data value field of the control.

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

GetDesignTimeHtml

[C#] public override string GetDesignTimeHtml( );

[C++] public: String* GetDesignTimeHtml( );

[VB] Overrides Public Function GetDesignTimeHtml( ) As String

[JScript] public override function GetDesignTimeHtml( ): String;

Description

Gets the HTML that is used to represent the control at design time.

Return Value: The HTML that is used to represent the control at design time.

GetResolvedSelectedDataSource

[C#] public IEnumerable GetResolvedSelectedDataSource( );

[C++] public: _sealed IEnumerable* GetResolvedSelectedDataSource( );

[VB] NotOverridable Public Function GetResolvedSelectedDataSource( ) As IEnumerable

[JScript] public function GetResolvedSelectedData Source( ): IEnumerable;

Description

Gets the data member that is currently selected within the data source currently bound to the control.

Return Value: The currently selected data member, or null if the control was not bound to a data source, or the data source, site of the designer's component, or the container of the data source could not be accessed.

GetSelectedDataSource

[C#] public object GetSelectedDataSource( );

[C++] public: _sealed Object* GetSelectedDataSource( );

[VB] NotOverridable Public Function GetSelectedDataSource( ) As Object

[JScript] public function GetSelectedDataSource( ): Object;

Description

Gets the selected data source component from the component's container.

Return Value: The selected data source, or null if a data source is not found or if a data source with the same name does not exist.

Initialize

[C#] public override void Initialize(IComponent component);

[C++] public: void Initialize(IComponent* component);

[VB] Overrides Public Sub Initialize(ByVal component As IComponent)

[JScript] public override function Initialize(component: IComponent);

Description

Initializes the component for design.

This method is called to initialize the designer with the component to design. The control that is being designed.

OnComponentChanged

[C#] public override void OnComponentChanged(object source, ComponentChangedEventArgs ce);

[C++] public: void OnComponentChanged(Object* source, ComponentChangedEventArgs* ce);

[VB] Overrides Public Sub OnComponentChanged(ByVal source As Object, ByVal ce As ComponentChangedEventArgs)

[JScript] public override function OnComponentChanged (source: Object, ce: ComponentChangedEventArgs);

Description

Raises the ComponentChanged event.

Handles changes made to the component. This includes changes made in the Properties window. The source of the event. A System.ComponentModel.Design. ComponentChangedEventArgs that provides data about the event.

OnDataSourceChanged

[C#] public virtual void OnDataSourceChanged( );

[C++] public: virtual void OnDataSourceChanged( );

[VB] Overridable Public Sub OnDataSourceChanged( )

[JScript] public function OnDataSourceChanged( );

Description

Raises the DataSource event.

Handles changes made to the data source.

PreFilterProperties

[C#] protected override void PreFilterProperties(IDictionary properties);

[C++] protected: void PreFilterProperties(IDictionary* properties);

[VB] Overrides Protected Sub PreFilterProperties(ByVal properties As IDictionary)

[JScript] protected override function PreFilterProperties (properties: IDictionary);

Description

Filters the properties exposed through a System.ComponentModel.TypeDescriptor and replaces the property descriptor for the DataSource property, which contains the value used at runtime, with a property descriptor that contains a value indicating a design-time data source. The properties of the control.

ListItemsCollectionEditor class (System.Web.UI.Design. WebControls)

UpdateDesignTimeHtml

Description

Provides a user interface for editing the items collection of a list.

ListItemsCollectionEditor

Example Syntax:

UpdateDesignTimeHtml

[C#] public ListItemsCollectionEditor(Type type);

[C++] public: ListItemsCollectionEditor(Type* type);

[VB] Public Sub New(ByVal type As Type)

[JScript] public function ListItemsCollectionEditor(type: Type);

Description

Initializes a new instance of the System.Web.UI.Design. WebControls.ListItemsCollectionEditor class. The type of the collection to edit.

CollectionItemType

CollectionType

Context

HelpTopic

NewItemTypes

CanSelectMultipleInstances

[C#] protected override bool CanSelectMultipleInstances( );

[C++] protected: bool CanSelectMultipleInstances( );

[VB] Overrides Protected Function CanSelectMultipleInstances( ) As Boolean

[JScript] protected override function CanSelectMultipleInstances( ): Boolean;

Description

Indicates whether multiple items in the list can be selected at the same time.

Return Value: true if multiple items can be selected at the same time; otherwise, false.

PanelDesigner class (System.Web.UI.Design.WebControls)

ToString

Description

Provides design-time support for the System.Web.UI.WebControls.Panel Web server control.

PanelDesigner

Example Syntax:

ToString

[C#] public PanelDesigner( );

[C++] public: PanelDesigner( );

[VB] Public Sub New( )

[JScript] public function PanelDesigner( );

AllowResize

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

MapPropertyToStyle

[C#] protected override void MapPropertyToStyle(string propName, object varPropValue);

[C++] protected: void MapPropertyToStyle(String* propName, Object* varPropValue);

[VB] Overrides Protected Sub MapPropertyToStyle(ByVal propName As String, ByVal varPropValue As Object)

[JScript] protected override function MapPropertyToStyle (propName: String, varPropValue: Object);

Description

Maps a specified property and value to a specified HTML style. The property name. The property value.

OnBehaviorAttached

[C#] protected override void OnBehaviorAttached( );

[C++] protected: void OnBehaviorAttached( );

[VB] Overrides Protected Sub OnBehaviorAttached( )

[JScript] protected override function OnBehaviorAttached( );

Description

Provides notification when a behavior is attached to the designer.

RegexEditorDialog class (System.Web.UI.Design.WebControls)

UpdateDesignTimeHtml

Description

Provides a dialog for editing regular expressions used by the System.Web.UI.WebControls.RegularExpressionValidator.

RegexEditorDialog

Example Syntax:
UpdateDesignTimeHtml
[C#] public RegexEditorDialog(ISite site);
[C++] public: RegexEditorDialog(ISite* site);
[VB] Public Sub New(ByVal site As ISite)
[JScript] public function RegexEditorDialog(site: ISite);

Description

Initializes a new instance of the System.Web.UI.Design.WebControls.RegexEditorDialog class. The site for this dialog.

AcceptButton
AccessibilityObject
AccessibleDefaultActionDescription
AccessibleDescription
AccessibleName
AccessibleRole
ActiveControl
ActiveMdiChild
AllowDrop
AllowTransparency
Anchor
AutoScale
AutoScaleBaseSize
AutoScroll
AutoScrollMargin
AutoScrollMinSize
AutoScrollPosition
BackColor
BackgroundImage
BindingContext
Bottom
Bounds
CancelButton
CanFocus
CanSelect
Capture
CausesValidation
ClientRectangle
ClientSize
CompanyName
Container
ContainsFocus
ContextMenu
ControlBox
Controls
Created
CreateParams
Cursor
DataBindings
DefaultImeMode
DefaultSize
DesignMode
DesktopBounds
DesktopLocation
DialogResult
DisplayRectangle
Disposing
Dock
DockPadding
Enabled
Events
Focused
Font
FontHeight
ForeColor
FormBorderStyle
Handle
HasChildren
Height
HelpButton
HScroll
Icon
ImeMode
InvokeRequired
IsAccessible
IsDisposed
IsHandleCreated
IsMdiChild
IsMdiContainer
IsRestrictedWindow
KeyPreview
Left
Location
MaximizeBox
MaximizedBounds
MaximumSize
MdiChildren
MdiParent
Menu
MergedMenu
MinimizeBox
MinimumSize
Modal
Name
Opacity
OwnedForms
Owner
Parent
ParentForm
ProductName
ProductVersion
RecreatingHandle
Region
RegularExpression
UpdateDesignTimeHtml Description Gets or sets the name of the regular expression to edit.

RenderRightToLeft
ResizeRedraw
Right
RightToLeft
ShowFocusCues
ShowInTaskbar
ShowKeyboardCues
Site
Size
SizeGripStyle
StartPosition
TabIndex
TabStop
Tag
Text
Top
TopLevel
TopLevelControl
TopMost
TransparencyKey
Visible
VScroll
Width
WindowState WindowTarget cmdHelp_Click

[C#] protected void cmdHelp_Click(object sender, EventArgs e);

[C++] protected: void cmdHelp_Click(Object* sender, EventArgs* e);

[VB] Protected Sub cmdHelp_Click(ByVal sender As Object, ByVal e As EventArgs)

[JScript] protected function cmdHelp_Click(sender: Object, e: EventArgs);

Description

Represents the method that will handle the Help event of the dialog. The source of the event. An EventArgs that provides data for the event.

cmdOK_Click

[C#] protected void cmdOK_Click(object sender, EventArgs e);

[C++] protected: void cmdOK_Click(Object* sender, EventArgs* e);

[VB] Protected Sub cmdOK_Click(ByVal sender As Object, ByVal e As EventArgs)

[JScript] protected function cmdOK_Click(sender: Object, e: EventArgs);

Description

Represents the method that will handle the OK event of the dialog. The source of the event. An EventArgs that provides data for the event.

cmdTestValidate_Click

[C#] protected void cmdTestValidate_Click(object sender, EventArgs args);

[C++] protected: void cmdTestValidate_Click(Object* sender, EventArgs* args);

[VB] Protected Sub cmdTestValidate_Click(ByVal sender As Object, ByVal args As EventArgs)

[JScript] protected function cmdTestValidate_Click(sender: Object, args: EventArgs);

Description

Represents the method that will handle the XXX event of a XXX. The source of the event. An EventArgs that provides data for the event.

Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Releases the unmanaged resources used by the System.Web.UI.Design.WebControls.RegexEditorDialog and optionally releases the managed resources.

This method is called by the public Dispose( ) method and the System.Object.Finalize method.

1stStandardExpressions_SelectedIndexChanged

[C#] protected void 1stStandardExpressions_SelectedIndexChanged(object sender, EventArgs e);

[C++] protected: void 1stStandardExpressions_SelectedIndexChanged(Object* sender, EventArgs* e);

[VB] Protected Sub 1stStandardExpressions_SelectedIndexChanged(ByVal sender As Object, ByVal e As EventArgs)

[JScript] protected function 1stStandardExpressions_SelectedIndexChanged(sender: Object, e: EventArgs);

Description

Represents the method that will handle the XXX event of a XXX. The source of the event. An EventArgs that provides data for the event.

RegexTypeEditor_Activated

[C#] protected void RegexTypeEditor_Activated(object sender, EventArgs e);

[C++] protected: void RegexTypeEditor_Activated(Object* sender, EventArgs* )e;

[VB] Protected Sub RegexTypeEditor-Activated(ByVal sender As Object, ByVal e As EventArgs)

[JScript] protected function RegexTypeEditor-Activated (sender: Object, e: EventArgs);

Description

Represents the method that will handle the XXX event of a XXX. The source of the event. An EventArgs that provides data for the event.

txtExpression_TextChanged

[C#] protected void txtExpression_TextChanged(object sender, EventArgs e);

[C++] protected: void txtExpression_TextChanged(Object* sender, EventArgs* e);

[VB] Protected Sub txtExpression_TextChanged(ByVal sender As Object, ByVal e As EventArgs)

[JScript] protected function txtExpression_TextChanged (sender: Object, e: EventArgs);

Description

Represents the method that will handle the XXX event of a XXX. The source of the event. An EventArgs that provides data for the event.

RegexTypeEditor class (System.Web.UI.Design.WebControls)

WndProc

Description

Provides a user interface for editing regular expressions.

RegexTypeEditor

Example Syntax:

WndProc

[C#] public RegexTypeEditor( );

[C++] public: RegexTypeEditor( );

[VB] Public Sub New( )

[JScript] public function RegexTypeEditor( );

EditValue

[C#] public override object EditValue(ITypeDescriptorContext context, IServiceProvider provider, object value);

[C++] public: Object* EditValue(ITypeDescriptorContext* context, IServiceProvider* provider, Object* value);

[VB] Overrides Public Function EditValue(ByVal context As ITypeDescriptorContext, ByVal provider As IServiceProvider, ByVal value As Object) As Object

[JScript] public override function EditValue(context: ITypeDescriptorContext, provider: IServiceProvider, value: Object): Object;

Description

Edits the value of the specified object using the specified service provider and context.

Return Value: The new value of the object. If the value of the object hasn't changed, this should return the same object it was passed. An System.ComponentModel.ITypeDescriptorContext that can provide additional context information. A service provider. The object to edit the value of.

GetEditStyle

[C#] public override UItypeEditorEditStyle GetEditStyle (ITypeDescriptorContext context);

[C++] public: UItypeEditorEditStyle GetEditStyle(ITypeDescriptorContext* context);

[VB] Overrides Public Function GetEditStyle(ByVal context As ITypeDescriptorContext) As UItypeEditorEditStyle

[JScript] public override function GetEditStyle(context: ITypeDescriptorContext): UItypeEditorEditStyle;

Description

Gets the editor style used by the System.Web.UI.Design.WebControls.RegexTypeEditor.EditValue(System.ComponentModel.ITypeDescriptorContext,System.IServiceProvider,System.Object) method.

Return Value: A System.Drawing.Design.UItypeEditorEditStyle that indicates the editor style. An System.ComponentModel.ITypeDescriptorContext that may be used to gain additional context information.

RepeaterDesigner class (System.Web.UI.Design.WebControls)

ToString

Description

Provides a designer for the System.Web.UI.WebControls.Repeater control.

RepeaterDesigner

Example Syntax:

ToString

[C#] public RepeaterDesigner( );

[C++] public: RepeaterDesigner( );

[VB] Public Sub New( )

[JScript] public function RepeaterDesigner( );

Description

Initializes a new instance of the System.Web.UI.Design.WebControls.RepeaterDesigner class.

AllowResize

AssociatedComponents

Behavior

Component

DataBindings

DataMember

ToString

Description

DataSource

ToString

[C#] public string DataSource {get; set;}

[C++] public: _property String* get_DataSource( );

public: _property void set_DataSource(String*);

[VB] Public Property DataSource As String

[JScript] public function get DataSource( ): String;public function set DataSource(String);

Description

Designer implementation of DataSource property that operates on the DataSource property in the control's binding collection.

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

TemplatesExist

ToString

Description

Verbs

Dispose

[C#] protected override void Dispose (bool disposing);

[C++] protected: void Dispose(bool disposing);

[VB] Overrides Protected Sub Dispose(ByVal disposing As Boolean)

[JScript] protected override function Dispose(disposing: Boolean);

Description

Performs the cleanup of the designer class.

GetDesignTimeDataSource

[C#] protected IEnumerable GetDesignTimeDataSource(int minimumRows);

[C++] protected: IEnumerable* GetDesignTimeDataSource (int minimumRows);

[VB] Protected Function GetDesignTimeDataSource(ByVal minimumRows As Integer) As IEnumerable

[JScript] protected function GetDesignTimeDataSource(minimumRows: int):

IEnumerable;

Description

Returns a sample data matching the schema of the selected datasource.

Return Value: A live datasource for use at design-time. The minimum rows of sample data the datasource should contain.

GetDesignTimeDataSource

[C#] protected IEnumerable GetDesignTimeDataSource(IEnumerable selectedDataSource, int minimumRows);

[C++] protected: IEnumerable* GetDesignTimeDataSource (IEnumerable* selectedDataSource, int minimumRows);

[VB] Protected Function GetDesignTimeDataSource(ByVal selectedDataSource As IEnumerable, ByVal minimumRows As Integer) As IEnumerable

[JScript] protected function GetDesignTimeDataSource(selectedDataSource: IEnumerable, minimumRows: int): IEnumerable;

Description

Returns a sample data matching the schema of the selected datasource.

Return Value: A live datasource for use at design-time. The selected datasource to be used as a reference for the shape of the data. The minimum rows of sample data the datasource should contain.

GetDesignTimeHtml

[C#] public override string GetDesignTimeHtml( );

[C++] public: String* GetDesignTimeHtml( );

[VB] Overrides Public Function GetDesignTimeHtml( ) As String

[JScript] public override function GetDesignTimeHtml( ): String;

Description

Retrieves the HTML to be used for the design-time representation of the control.

Return Value: Design Time HTML.

GetEmptyDesignTimeHtml

[C#] protected override string GetEmptyDesignTimeHtml( );

[C++] protected: String* GetEmptyDesignTimeHtml( );

[VB] Overrides Protected Function GetEmptyDesignTimeHtml( ) As String

[JScript] protected override function GetEmptyDesignTimeHtml( ): String;

Description

GetErrorDesignTimeHtml

[C#] protected override string GetErrorDesignTimeHtml (Exception e);

[C++] protected: String* GetErrorDesignTimneHtmnl(Exception* e);

[VB] Overrides Protected Function GetErrorDesignTimeHtml(ByVal e As Exception) As String

[JScript] protected override function GetErrorDesignTimeHtml(e: Exception): String;

Description

GetResolvedSelectedDataSource

[C#] public IEnumerable GetResolvedSelectedData Source( );

[C++] public: -_sealed IEnumerable* GetResolvedSelectedDataSource( );

[VB] NotOverridable Public Function GetResolvedSelectedDataSource( ) As IEnumerable

[JScript] public function GetResolvedSelectedData Source( ): IEnumerable;

Description

GetSelectedDataSource

[C#] public object GetSelectedDataSource( );

[C++] public: -_sealed Object* GetSelectedDataSource( );

[VB] NotOverridable Public Function GetSelectedDataSource( ) As Object

[JScript] public function GetSelectedDataSource( ): Object;

Description

Retrieves the selected datasource component from the component's container.

Return Value: The selected datasource; null if a datasource is not found, or a datasource with the same name does not exist.

Initialize

[C#] public override void Initialize(IComponent component);

[C++] public: void Initialize(IComponent* component);

[VB] Overrides Public Sub Initialize(ByVal component As IComponent)

[JScript] public override function Initialize(component: IComponent);

Description

Initializes the designer with the Repeater control that this instance of the designer is associated with. The associated Repeater control.

OnComponentChanged

[C#] public override void OnComponentChanged(object source, ComponentChangedEventArgs ce);

[C++] public: void OnComponentChanged(Object* source, ComponentChangedEventArgs* ce);

[VB] Overrides Public Sub OnComponentChanged(ByVal source As Object, ByVal ce As ComponentChangedEventArgs)

[JScript] public override function OnComponentChanged (source: Object, ce: ComponentChangedEventArgs);

Description

Handles changes made to the component. This includes changes made in the Properties window.

OnDataSourceChanged

[C#] public virtual void OnDataSourceChanged( );

[C++] public: virtual void OnDataSourceChanged( );

[VB] Overridable Public Sub OnDataSourceChanged( )

[JScript] public function OnDataSourceChanged( );

Description

Handles changes made to the data source Handles changes made to the data source

PreFilterProperties

[C#] protected override void PreFilterProperties(IDictionary properties);

[C++] protected: void PreFilterProperties(IDictionary* properties);

[VB] Overrides Protected Sub PreFilterProperties(ByVal properties As IDictionary)

[JScript] protected override function PreFilterProperties (properties: IDictionary);

Description

Filter the properties to replace the runtime DataSource property descriptor with the designer's.

TableCellsCollectionEditor class (System.Web.UI.Design.WebControls)

UpdateDesignTimeHtml

Description

Provides a user interface for editing cells in a table.

TableCellsCollectionEditor

Example Syntax:

UpdateDesignTimeHtml

[C#] public TableCellsCollectionEditor(Type type);

[C++] public: TableCellsCollectionEditor(Type* type);

[VB] Public Sub New(ByVal type As Type)

[JScript] public function TableCellsCollectionEditor(type: Type);

Description

Initializes a new instance of the System.Web.UI.Design.WebControls.TableCellsCollectionEditor class. The type of the collection to edit.

CollectionItemType

CollectionType

Context

HelpTopic

NewItemTypes

CanSelectMultipleInstances

[C#] protected override bool CanSelectMultipleInstances( );

[C++] protected: bool CanSelectMultipleInstances( );

[VB] Overrides Protected Function CanSelectMultipleInstances( ) As Boolean

[JScript] protected override function CanSelectMultipleInstances( ): Boolean;

Description

Indicates whether multiple table cells can be selected at the same time. Return Value: true if multiple cells can be selected at the same time; otherwise, false.

CreateInstance

[C#] protected override object CreateInstance(Type itemType);

[C++] protected: Object* CreateInstance(Type* itemType);

[VB] Overrides Protected Function CreateInstance(ByVal itemType As Type) As Object

[JScript] protected override function CreateInstance(itemType: Type): Object;

Description

Creates an instance of the editor for use with the specified type.

Return Value: An object of the specified type. The type to create an instance of.

TableDesigner class (System.Web.UI.Design.WebControls)

ToString

Description

Provides design-time support for the System.Web.UI.WebControls.Table Web server control.

TableDesigner

Example Syntax:

ToString

[C#] public TableDesigner( );

[C++] public: TableDesigner( );

[VB] Public Sub New( )

[JScript] public function TableDesigner( );

AllowResize

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

GetDesignTimeHtml

[C#] public override string GetDesignTimeHtml( );

[C++] public: String* GetDesignTimeHtml( );

[VB] Overrides Public Function GetDesignTimeHtml( ) As String

[JScript] public override function GetDesignTimeHtml( ): String;

Description

Gets the HTML that is used to represent the control at design time. Return Value: The HTML that is used to represent the control at design time.

TableRowsCollectionEditor class (System.Web.UI.Design.WebControls)

UpdateDesignTimeHtml

Description

Provides a user interface for editing rows of a table.

TableRowsCollectionEditor

Example Syntax:

UpdateDesignTimeHtml

[C#] public TableRowsCollectionEditor(Type type);

[C++] public: TableRowsCollectionEditor(Type * type);

[VB] Public Sub New(ByVal type As Type)

[JScript] public function TableRowsCollectionEditor(type: Type);

Description

Initializes a new instance of the System.Web.UI.Design.WebControls.TableRowsCollectionEditor class. The type of the collection to edit.

CollectionItemType

CollectionType

Context

HelpTopic

NewItemTypes

CanSelectMultipleInstances

[C#] protected override bool CanSelectMultipleInstances( );

[C++] protected: bool CanSelectMultipleInstances( );

[VB] Overrides Protected Function CanSelectMultipleInstances( ) As Boolean

[JScript] protected override function CanSelectMultipleInstances( ): Boolean;

Description

Indicates whether multiple instances may be selected.

Return Value: true if multiple items can be selected at once; otherwise, false. This implementation always returns false.

CreateInstance

[C#] protected override object CreateInstance(Type itemType);

[C++] protected: Object* CreateInstance(Type* itemType);

[VB] Overrides Protected Function CreateInstance(ByVal itemType As Type) As Object

[JScript] protected override function CreateInstance(itemType: Type): Object;

Description

Creates an instance of the specified type.

Return Value: An object of the specified type. The type to create an instance of.

XmlDesigner class (System.Web.UI.Design.WebControls)

ToString

Description

Provides a designer for the System.Web.UI.WebControls.Xml Web server control.

XmlDesigner

Example Syntax:

ToString

[C#] public XmlDesigner( );

[C++] public: XmlDesigner( );

[VB] Public Sub New( )

[JScript] public function XmlDesigner( );

Description

Initializes a new instance of the System.Web.UI.Design.WebControls.XmlDesigner class.

AllowResize

AssociatedComponents

Behavior

Component

DataBindings

DesignTimeElement

DesignTimeElementView

DesignTimeHtmlRequiresLoadComplete

ID

InheritanceAttribute

Inherited

IsDirty

ReadOnly

ShadowProperties

ShouldCodeSerialize

Verbs

Dispose

[C#] protected override void Dispose (bool disposing);

[C++] protected: void Dispose(bool disposing);

[VB] Overrides Protected Sub Dispose(ByVal disposing As Boolean)

[JScript] protected override function Dispose(disposing: Boolean);

Description

Performs the cleanup of the designer class.

GetDesignTimeHtml

[C#] public override string GetDesignTimeHtml( );

[C++] public: String* GetDesignTimeHtml( );

[VB] Overrides Public Function GetDesignTimeHtml( ) As String
[JScript] public override function GetDesignTimeHtml( ): String;

Description

Gets the HTML that is used to represent the control at design time.

Return Value: The HTML that is used to represent the control at design time.

GetEmptyDesignTimeHtml

[C#] protected override string GetEmptyDesignTimeHtml( );
[C++] protected: String* GetEmptyDesignTimeHtml( );
[VB] Overrides Protected Function GetEmptyDesignTimeHtml( ) As String
[JScript] protected override function GetEmptyDesignTimeHtml( ): String;

Description

Gets the HTML that is used to fill an empty control.

Return Value: The HTML used to fill an empty control.

Initialize

[C#] public

System.Web.UI.HtmlControls

Description

The System.Web.UI.HtmlControls namespace is a collection of classes that allow you to create HTML server controls on a Web page. HTML server controls run on the server and map directly to standard HTML tags supported by all browsers. This allows you to programmatically control the HTML elements on the Web page.

HtmlAnchor class (System.Web.UI.HtmlControls)

Description

Defines the methods, properties, and events for the System.Web.UI.HtmlControls.Html;Anchor control. This class allows programmatic access to the HTML tag on the server.

There are two ways to use the System.Web.UI.HtmlControls.HtmlAnchor class. The first is for navigation: using the System.Web.UI.HtmlControls.HtmlAnchor.HRef property to define the location of the page to link to. The second is for postback events: using the System.Web.UI.HtmlControls.HtmlAnchor.ServerClick event to programmatically handle the user's click on a link.

Constructors:

HtmlAnchor

Example Syntax:

[C#] public HtmlAnchor( );
[C++] public: HtmlAnchor( );
[VB] Public Sub New( )
[JScript] public function HtmlAnchor( );

Description

Initializes a new instance of the System.Web.UI.HtmlControls.HtmlAnchor class.

Properties:

Attributes

ChildControlsCreated

ClientID

Context

Controls

Disabled

EnableViewState

Events

HasChildViewState

HRef

Description

Gets or sets the URL target of the link specified in the System.Web.UI.HtmlControls.HtmlAnchor server control.

Use this property to specify the URL to link to when the System.Web.UI.HtmlControls.HtmlAnchor is clicked.

ID

InnerHtml

InnerText

IsTrackingViewState

Name

Description

Gets or sets the bookmark name defined in the System.Web.UI.HtmlControls.HtmlAnchor server control.

Use this property to mark sections on a Web page with a name. This allows you to link to this section from anywhere on the same page. For example, you can provide a table of contents at the top of a page that will link directly to topics on the page.

NamingContainer

Page

Parent

Site

Style

TagName

Target

Description

Gets or sets the target window or frame to load Web page content into.

Use this property to specify the frame or window that displays the Web page linked to.

TemplateSourceDirectoly

Title

Description

Gets or sets the title that the browser displays for a Web page.

Use this property to specify a custom title when the browser identifies the page you link to. This property also may be used to provide a custom tool tip for the System.Web.UI.HtmlControls.HtmlAnchor control.

UniqueID

ViewState

ViewStateIgnoresCase

Visible

Description

Occurs on the server when a user clicks the System.Web.UI.HtmlControls.HtmlAnchor control on the browser.

This event is raised when the System.Web.UI.HtmlControls.HtmlAnchor is clicked.

Methods:

OnServerClick

[C#] protected virtual void OnServerClick(EventArgs e);
[C++] protected: virtual void OnServerClick(EventArgs* e);
[VB] Overridable Protected Sub OnServerClick(ByVal e As EventArgs)
[JScript] protected function OnServerClick(e: EventArgs);

Description

Raises the System.Web.UI.HtmlControls.HtmlAnchor.ServerClick event. This allows you to handle the event directly.

This server event causes a roundtrip to occur from the client to the server and back. An System.EventArgs that contains event data.

RenderAttributes

[C#] protected override void RenderAttributes(HtmlTextWriter writer);

[C++] protected: void RenderAttributes(HltmlTextWriter* writer);

[VB] Overrides Protected Sub RenderAttributes(ByVal writer As HtmlTextWriter)

[JScript] protected override function RenderAttributes (writer: HtmlTextWriter);

Description

IpostBackEventHandler.RaisePostBackEvent

[C#] void IPostBackEventHandler.RaisePostBackEvent (string eventArgument);

[C++] void IPostBackEventHandler::RaisePostBackEvent (String* eventArgument);

[VB] Sub RaisePostBackEvent(ByVal eventArgument As String) Implements IPostBackEventHandler.RaisePostBackEvent

[JScript] function IPostBackEventHandler.RaisePostBackEvent(eventArgument: String);

HtmlButton class (System.Web.UI.HtmlControls)

TrackViewState

Description

Defines the methods, properties, and events for the System.Web.UI.HtmlControls.HtmlButton control. This class allows programmatic access to the HTML tag on the server.

The element allows Web developers to create UI form buttons that can be composed of embedded HTML elements, including other server controls.

HtmlButton

Example Syntax:

TrackViewState

[C#] public HtmlButton( );

[C++] public: HtmlButton( );

[VB] Public Sub New( )

[JScript] public function HtmlButton( );

Description

Initializes a new instance of the System.Web.UI.HtmlControls.HtmlButton class.

Attributes

CausesValidation

TrackViewState

Description

Gets or sets a value indicating whether validation is performed when the System.Web.UI.HtmlControls.HtmlButton control is clicked.

By default, page validation is performed when an System.Web.UI.HtmlControls.HtmlButton control is clicked. Page validation determines whether the input controls associated with a validation control on the page all pass the validation rules specified by the validation control.

ChildControlsCreated

ClientID

Context

Controls

Disabled

EnableViewState

Events

HasChildViewState

ID

InnerHtml

InnerText

IsTrackingViewState

NamingContainer

Page

Parent

Site

Style

TagName

TemplateSourceDirectory

UniqueID

ViewState

ViewStateIgnoresCase

Visible

TrackViewState

Description

Occurs when the user clicks an System.Web.UI.HtmlControls.HtmlButton control on the client Web page.

This event is raised when the System.Web.UI.HtmlControls.HtmlButton is clicked.

OnServerClick

[C#] protected virtual void OnServerClick(EventArgs e);

[C++] protected: virtual void OnServerClick(EventArgs* e);

[VB] Overridable Protected Sub OnServerClick(ByVal e As EventArgs)

[JScript] protected function OnServerClick(e: EventArgs);

Description

Raises the System.Web.UI.HtmlControls.HtmlButton.ServerClick event. This allows you to handle the event directly.

This event causes a roundtrip to occur from the client to the server and back. It is deliberately different from the client-side OnClick event. In the event that a conflict exists between code run with a System.Web.UI.HtmlControls.HtmlButton.ServerClick event and code run by a client-side OnClick event, the server-side event instructions will override the client-side code. An System.EventArgs that contains the event data.

RenderAttributes

[C#] protected override void RenderAttributes(HtmlTextWriter writer);

[C++] protected: void RenderAttributes(HtmlTextWriter* writer);

[VB] Overrides Protected Sub RenderAttributes(ByVal writer As HtmlTextWriter)

[JScript] protected override function RenderAttributes (writer: HtmlTextWriter);

Description

IPostBackEventHandler.RaisePostBackEvent

[C#] void IPostBackEventHandler.RaisePostBackEvent (string eventArgument);

[C++] void IPostBackEventHandler::RaisePostBackEvent (String* eventArgument);

[VB] Sub RaisePostBackEvent(ByVal eventArgument As String) Implements IPostBackEventHandler.RaisePostBackEvent

[JScript] function IPostBackEventHandler.RaisePostBackEvent(eventArgument: String);

HtmlContainerControl class (System.Web.UI.HtmlControls)

TrackViewState

Description

Defines the methods, properties, and events available to all HTML server controls that must have a closing tag.

The most common controls with a closing tag are the

Top of Form

,,

,, and elements.

HtmlContainerControl

Example Syntax:
TrackViewState
[C#] public HtmlContainerControl( );
[C++] public: HtmlContainerControl( );
[VB] Public Sub New( )
[JScript] public function HtmlContainerControl( ); Initializes a new instance of the System.Web.UI.HtmlControls.HtmlContainerControl class.

Description
Initializes a new instance of the System.Web.UI.HtmlControls.HtmlContainerControl class using default values.
Use this constructor to create and initialize a new instance of the System.Web.UI.HtmlControls.HtmlContainerControl class using default values.
HtmlContainerControl
Example Syntax:
TrackViewState
[C#] public HtmlContainerControl(string tag);
[C++] public: HtmlContainerControl(String* tag);
[VB] Public Sub New(ByVal tag As String)
[JScript] public function HtmlContainerControl(tag: String);

Description
Initializes a new instance of the System.Web.UI.HtmlControls.HtmlContainerControl class using the specified tag name.
Use this constructor to create and initialize a new instance of the System.Web.UI.HtmlControls.HtmlContainerControl class using the specified tag. A string that specifies the tag name of the control.
Attributes
ChildControlsCreated
ClientID
Context
Controls
Disabled
EnableViewState
Events
HasChildViewState
ID
InnerHtml
TrackViewState Description
Gets or sets the content found between the opening and closing tags of the specified HTML server control.
Use the System.Web.UI.HtmlControls.HtmlContainerControl.InnerHtml property to programmatically modify the contents within the opening and closing tags of an HTML server control.
InnerText
TrackViewState
[C#] public virtual string InnerText {get; set;}
[C++] public: _property virtual String* get_InnerText( );public: _property virtual void set_InnerText(String*);
[VB] Overridable Public Property InnerText As String
[JScript] public function get InnerText( ): String;public function set InnerText(String);

Description
Gets or sets the text between the opening and closing tags of the specified HTML server control.
Use the System.Web.UI.HtmlControls.HtmlContainerControl.InnerText property to programmatically modify the contents between the opening and closing tags of an HTML server control.
IsTrackingViewState
NamingContainer
Page
Parent
Site
Style
TagName
TemplateSourceDirectory
UniqueID
ViewState
ViewStateIgnoresCase
Visible
CreateControlCollection
[C#] protected override ControlCollection CreateControlCollection( );
[C++] protected: ControlCollection* CreateControlCollection( );
[VB] Overrides Protected Function CreateControlCollection( ) As ControlCollection
[JScript] protected override function CreateControlCollection( ): ControlCollection;
LoadViewState
[C#] protected override void LoadViewState(object savedState);
[C++] protected: void LoadViewState(Object* savedState);
[VB] Overrides Protected Sub LoadViewState(ByVal savedState As Object)
[JScript] protected override function LoadViewState(savedState: Object);

Description
Render
[C#] protected override void Render(HtmlTextWriter writer);
[C++] protected: void Render(HtmlTextWriter* writer);
[VB] Overrides Protected Sub Render(ByVal writer As HtmlTextWriter)
[JScript] protected override function Render(writer: HtmlTextWriter);

Description
RenderAttributes
[C#] protected override void RenderAttributes(HtmlTextWriter writer);
[C++] protected: void RenderAttributes(HtmlTextWriter* writer);
[VB] Overrides Protected Sub RenderAttributes(ByVal writer As HtmlTextWriter)
[JScript] protected override function RenderAttributes (writer: HtmlTextWriter);

Description
RenderEndTag
[C#] protected virtual void RenderEndTag(HtmlTextWriter writer);
[C++] protected: virtual void RenderEndTag(HtmlTextWriter* writer);
[VB] Overridable Protected Sub RenderEndTag(ByVal writer As HtmlTextWriter)
[JScript] protected function RenderEndTag(writer: HtmlTextWriter);

Description
HtmlControl class (System.Web.UI.HtmlControls)
TrackViewState

Description
Defines the methods, properties, and events common to all HTML server controls in the Web Forms page framework.
The System.Web.UI.HtmlControls.HtmlControl class provides common properties inherited by all HTML server control classes. It is not instantiated directly.

HtmlControl

Example Syntax:

TrackViewState

[C#] public HtmlControl( );

[C++] public: HtmlControl( );

[VB] Public Sub New( )

[JScript] public function HtmlControl( ); Initializes a new instance of the System.Web.UI.HtmlControls.HtmlControl class.

Description

Initializes a new instance of the System.Web.UI.HtmlControls.HtmlControl class using default values.

This constructor is used to create and initialize a new instance of the System.Web.UI.HtmlControls.HtmlControl class using default values.

HtmlControl

Example Syntax:

TrackViewState

[C#] public HtmlControl(string tag);

[C++] public: HtmlControl(String* tag);

[VB] Public Sub New(ByVal tag As String)

[JScript] public function HtmlControl(tag: String);

Description

Initializes a new instance of the System.Web.UI.HtmlControls.HtmlControl class using the specified tag.

This constructor is used to create and initialize a new instance of the System.Web.UI.HtmlControls.HtmlControl class using the specified tag. A string that specifies the tag name of the control.

Attributes

TrackViewState

[C#] public AttributeCollection Attributes {get;}

[C++] public: _property AttributeCollection* get_Attributes( );

[VB] Public ReadOnly Property Attributes As AttributeCollection

[JScript] public function get Attributes( ): AttributeCollection;

Description

Gets a collection of all attribute name and value pairs expressed on a server control tag within the .aspx file.

Use this property to programmatically access the attributes of the HTML server control. All Html server controls store their attributes in the System.Web.UI.Control.ViewState.

ChildControlsCreated

ClientID

Context

Controls

Disabled

TrackViewState

Description

Gets or sets a value indicating whether the HTML server control is disabled.

On the browser, a disabled element or control is read-only, with the following added restrictions: its value is not submitted with the form, the element or control cannot receive focus, and the element or control is skipped when navigating the document by tabbing.

EnableViewState

Events

HasChildViewState

ID

IsTrackingViewState

NamingContainer

Page

Parent

Site

Style

TrackViewState

Description

Gets a collection of all cascading style sheet (CSS) properties applied to a specified HTML server control in the .aspx file.

Use this property to programmatically access the style properties of the HTML server control.

TagName

TrackViewState

[C#] public virtual string TagName {get;}

[C++] public: _property virtual String* get_TagName( );

[VB] Overridable Public ReadOnly Property TagName As String

[JScript] public function get TagName( ): String;

Description

Gets the element name of a tag that contains a runat=server attribute and value pair.

Use this property to programmatically determine the element name of the HTML server control.

TemplateSourceDirectory

UniqueID

ViewState

ViewStateIgnoresCase

TrackViewState

Description

Visible

CreateControlCollection

[C#] protected override ControlCollection CreateControlCollection( );

[C++] protected: ControlCollection* CreateControlCollection( );

[VB] Overrides Protected Function CreateControlCollection( ) As ControlCollection

[JScript] protected override function CreateControlCollection( ): ControlCollection;

Render

[C#] protected override void Render(HtmlTextWriter writer);

[C++] protected: void Render(HtmlTextWriter* writer);

[VB] Overrides Protected Sub Render(ByVal writer As HtmlTextWriter)

[JScript] protected override function Render(writer: HtmlTextWriter);

Description

RenderAttributes

[C#] protected virtual void RenderAttributes(HtmlTextWriter writer);

[C++] protected: virtual void RenderAttributes(HtmlTextWriter* writer);

[VB] Overridable Protected Sub RenderAttributes(ByVal writer As HtmlTextWriter)

[JScript] protected function RenderAttributes(writer: HtmlTextWriter);

Description

RenderBeginTag

[C#] protected virtual void RenderBeginTag(HtmlTextWriter writer);

[C++] protected: virtual void RenderBeginTag(HtmlTextWriter* writer);

[VB] Overridable Protected Sub RenderBeginTag(ByVal writer As HtmlTextWriter)

[JScript] protected function RenderBeginTag(writer: HtmlTextWriter);

Description

IAttributeAccessor.GetAttribute

[C#] string IAttributeAccessor.GetAttribute(string name);

[C++] String* IAttributeAccessor::GetAttribute(String* name);

[VB] Function GetAttribute(ByVal name As String) As String Implements IAttributeAccessor. GetAttribute

[JScript] function IAttributeAccessor.GetAttribute(name: String): String;

IAttributeAccessor. SetAttribute

[C#] void IAttributeAccessor. SetAttribute(string name, string value);

[C++] void IAttributeAccessor::SetAttribute(String* name, String * value);

[VB] Sub SetAttribute(ByVal name As String, ByVal value As String) Implements IAttributeAccessor.SetAttribute

[JScript] function IAttributeAccessor.SetAttribute(name: String, value: String);

HtmlForm class (System.Web.UI.HtmlControls)

TrackViewState

Description

Provides programmatic access to the HTML

Top of Form element on the server.

The System.Web.UI.HtmlControls.HtmlForm control is used as a container for server controls on a Web page. All server controls that post back to the server must be placed between the opening and closing tags of an System.Web.UI.HtmlControls.HtmlForm control.

HtmlForm

Example Syntax:

TrackViewState

[C#] public HtmlForm( );

[C++] public: HtmlForm( );

[VB] Public Sub New( )

[JScript] public function HtmlForm( );

Description

Initializes a new instance of the System.Web.UI.HtmlControls.HtmlForm class.

Use this constructor to create and initialize a new instance of the System.Web.UI.HtmlControls.HtmlForm class.

Attributes

ChildControlsCreated

ClientID

Context

Controls

Disabled

EnableViewState

Enctype

TrackViewState

Description

Gets or sets the encoding type browsers use when posting the form's data to the server.

Use this property to specify the encoding type browsers use to post data back to the server.

Events

HasChildViewState

ID

InnerHtml

InnerText

IsTrackingViewState

Method

TrackViewState

Description

Gets or sets a value that indicates how a browser posts form data to the server for processing.

Use this property to specify how the browser sends form data to the server for processing. The two common methods supported by all browsers are GET and POST.

Name

TrackViewState

[C#] public virtual string Name {get; set;}

[C++] public: _property virtual String* get_Name( ); public: _property virtual void set_Name(String*);

[VB] Overridable Public Property Name As String

[JScript] public function get Name( ): String;public function set Name(String);

Description

Gets the identifier name for the System.Web.UI.HtmlControls.HtmlForm control.

Use this property to identify a specific System.Web.UI.HtmlControls.HtmlForm control.

NamingContainer

Page

Parent

Site

Style

TagName

Target

TrackViewState

Description

Gets or sets the frame or window to render the results of information posted to the server.

Use this property to display the results of information posted to the server in another browser window or frame.

TemplateSourceDirectory

UniqueID

ViewState

ViewStateIgnoresCase

Visible

OnInit

[C#] protected override void OnInit(EventArgs e);

[C++] protected: void OnInit(EventArgs* e);

[VB] Overrides Protected Sub OnInit(ByVal e As EventArgs)

[JScript] protected override function OnInit(e: EventArgs);

Description

Call RegisterViewStateHandler( ).

Render

[C#] protected override void Render(HtmlTextWriter output);

[C++] protected: void Render(HtmlTextWriter* output);

[VB] Overrides Protected Sub Render(ByVal output As HtmlTextWriter)

[JScript] protected override function Render(output: HtmlTextWriter);

Description

RenderAttributes

[C#] protected override void RenderAttributes(HtmlTextWriter writer);

[C++] protected: void RenderAttributes(HtmlTextWriter* writer);

[VB] Overrides Protected Sub RenderAttributes(ByVal writer As HtmlTextWriter)

[JScript] protected override function RenderAttributes (writer: HtmlTextWriter);

Description

RenderChildren

[C#] protected override void RenderChildren(HtmlTextWriter writer);

[C++] protected: void RenderChildren(HtmlTextWriter* writer);

[VB] Overrides Protected Sub RenderChildren(ByVal writer As HtmlTextWriter)

[JScript] protected override function RenderChildren(writer: HtmlTextWriter);

Description

HtmlGenericControl class (System.Web.UI.HtmlControls)

TrackViewState

Description

Defines the methods, properties, and events for all HTML server control tags not represented by a specific .NET Framework class.

Use this class to represent an HTML server control tag not directly represented by a .NET Framework class, such as,

,

,and.

HtmlGenericControl

Example Syntax:

TrackViewState

[C#] public HtmlGenericControl( );

[C++] public: HtmlGenericControl( );

[VB] Public Sub New( )

[JScript] public function HtmlGenericControl( ); Initializes a new instance of the System.Web.UI.HtmlControls.HtmlGenericControl class.

Description

Initializes a new instance of the System.Web.UI.HtmlControls.HtmlGenericControl class with default values.

The following table shows initial property values for an instance of System.Web.UI.HtmlControls.HtmlGenericControl.

HtmlGenericControl

Example Syntax:

TrackViewState

[C#] public HtmlGenericControl(string tag);

[C++] public: HtmlGenericControl(String* tag);

[VB] Public Sub New(ByVal tag As String)

[JScript] public function HtmlGenericControl(tag: String);

Description

Initializes a new instance of the System.Web.UI.HtmlControls.HtmlGenericControl class with the specified tag.

The following table shows initial property values for an instance of System.Web.UI.HtmlControls.HtmlGenericControl. The name of the element for which the instance of this class is created.

Attributes

ChildControlsCreated

ClientID

Context

Controls

Disabled

EnableViewState

Events

HasChildViewState

ID

InnerHtml

InnerText

IsTrackingViewState

NamingContainer

Page

Parent

Site

Style

TagName

TrackViewState

Description

Gets or sets the tag name of an element that contains a runat="server" attribute.

Use this property to dynamically change the tag name of a generic control on the Web page.

TemplateSourceDirectory

UniqueID

ViewState

ViewStateIgnoresCase

Visible

HtmlImage class (System.Web.UI.HtmlControls)

TrackViewState

Description

Provides programmatic access for the HTML

element on the server.

Use this control to display an image on a Web page. The System.Web.UI.HtmlControls.HtmlImage control can be programmatically manipulated to change the image displayed, the image size, and the alignment of the image relative to other page elements.

HtmlImage

Example Syntax:

TrackViewState

[C#] public HtmlImage( );

[C++]public: HtmlImage( );

[VB] Public Sub New( )

[JScript] public function HtmlImage( );

Description

Initializes a new instance of the System.Web.UI.HtmlControls.HtmlImage class.

Use this constructor to create and initialize a new instance of the System.Web.UI.HtmlControls.HtmlImage class.

Align

TrackViewState

[C#] public string Align {get; set;}

[C++] public: _property String* get_Align( );public: _property void set_Align(String*);

[VB] Public Property Align As String

[JScript] public function get Align( ): String;public function set Align(String);

Description

Gets or sets the alignment of the image relative to other Web page elements.

Use this property to specify the alignment of the image with respect to other elements on the Web page.

Alt

TrackViewState

[C#] public string Alt {get; set;}

[C++] public: _property String* get_Alt( );public: _property void set_Alt(String*);

[VB] Public Property Alt As String

[JScript] public function get Alto: String;public function set Alt(String);

Description

Gets or sets the alternative caption the browser displays if an image is unavailable or currently downloading and not yet finished.

Use this property to specify the caption displayed when the image specified by the System.Web.UI.HtmlControls.HtmlImage.Src property is unavailable. On newer browsers, this caption also appears as a ToolTip.

Attributes

Border

TrackViewState

Description

Gets or sets the width of a frame for an image.

Use this property to create a frame with the specified width (in pixels) for an image.

ChildControlsCreated

ClientID

Context

Controls

Disabled

EnableViewState

Events

HasChildViewState

Height

TrackViewState

Description

Gets or sets the height of the image.

The System.Web.UI.HtmlControls.HtmlImage.Height and System.Web.UI.HtmlControls.HtmlImage.Width properties can be used two ways. You can use the System.Web.UI.HtmlControls.HtmlImage.Height and System.Web.UI.HtmlControls.HtmlImage.Width properties to send image size specifications to the browser. This displays the Web page faster because the browser does not need to recalculate the positions of elements on the page when the image loads.

ID

IsTrackingViewState

NamingContainer

Page

Parent

Site

Src

TrackViewState

Description

Gets or sets the source of the image file to display.

Use this property to specify the path to the image file to display. If the image file is in the same directory as the Web page source file that uses it, you can just specify the file name. Otherwise, you must also include the path to the file. The path can be absolute or relative to the directory that contains the Web page source file.

Style

TagName

TemplateSourceDirectory

UniqueID

ViewState

ViewStateIgnoresCase

Visible

Width

TrackViewState

Description

Gets or sets the width of the image.

The System.Web.UI.HtmlControls.HtmlImage.Height and System.Web.UI.HtmlControls.HtmlImage.Width properties can be used two ways. You can use the System.Web.UI.HtmlControls.HtmlImage.Height and System.Web.UI.HtmlControls.HtmlImage.Width properties to send the image size specifications to the browser. This displays the Web page faster because the browser does not need to recalculate the positions of elements on the page when the image loads.

RenderAttributes

[C#] protected override void RenderAttributes(HtmlTextWriter writer);

[C++] protected: void RenderAttributes(HtmlTextWriter* writer);

[VB] Overrides Protected Sub RenderAttributes(ByVal writer As HtmlTextWriter)

[JScript] protected override function RenderAttributes (writer: HtmlTextWriter);

Description

HtmlInputButton class (System.Web.UI.HtmlControls)

TrackViewState

Description

Allows programmatic access to the HTML,

Submit, and Reset, elements on the server.

Use this class to create button controls on a Web page.

HtmlInputButton

Example Syntax:

TrackViewState

[C#] public HtmlInputButton( );

[C++] public: HtmlInputButton( );

[VB] Public Sub New( )

[JScript] public function HtmlInputButton( ); Initializes a new instance of an System.Web.UI.HtmlControls.HtmlInputButton class.

Description

Initializes a new instance of an System.Web.UI.HtmlControls.HtmlInputButton class using default values.

The following table shows the initial property value for an instance of System.Web.UI.HtmlControls.HtmlInputButton.

HtmlInputButton

Example Syntax:

TrackViewState

[C#] public HtmlInputButton(string type);

[C++] public: HtmlInputButton(String* type);

[VB] Public Sub New(ByVal type As String)

[JScript] public function HtmlInputButton(type: String);

Description

Initializes a new instance of an System.Web.UI.HtmlControls.HtmlInputButton class using the specified button type.

The following table shows the initial property value for an instance of System.Web.UI.HtmlControls.HtmlInputButton. The input button type.

Attributes

CausesValidation

TrackViewState

Description

Gets or sets a value indicating whether validation is performed when the System.Web.UI.HtmlControls.HtmlInputButton control is clicked.

By default, page validation is performed when an System.Web.UI.HtmlControls.HtmlInputButton control is clicked. Page validation determines whether the input controls associated with a validation control on the page all pass the validation rules specified by the validation control.

ChildControlsCreated
ClientID
Context
Controls
Disabled
EnableViewState
Events
HasChildViewState
ID
IsTrackingViewState
Name
NamingContainer
Page
Parent
Site
Style
TagName
TemplateSourceDirectory
Type
UniqueID
Value
ViewState
ViewStateIgnoresCase
Visible
TrackViewState Description Occurs when an System.Web.UI.HtmlControls.HtmlInputButton control is clicked on the Web page.

This event is raised when an System.Web.UI.HtmlControls.HtmlInputButton control is clicked.

OnServerClick

[C#] protected virtual void OnServerClick(EventArgs e);

[C++] protected: virtual void OnServerClick(EventArgs* e);

[VB] Overridable Protected Sub OnServerClick(ByVal e As EventArgs)

[JScript] protected function OnServerClick(e: EventArgs);

Description

Raises the System.Web.UI.HtmlControls.HtmlInputButton.ServerClick event. This allows you to handle the event directly.

The System.Web.UI.HtmlControls.HtmlInputButton.ServerClick event is raised when an System.Web.UI.HtmlControls.HtmlInputButton control is clicked. A System.EventArgs that contains the event data.

RenderAttributes

[C#] protected override void RenderAttributes(HtmlTextWriter writer);

[C++] protected: void RenderAttributes(HtmlTextWriter* writer);

[VB] Overrides Protected Sub RenderAttributes(ByVal writer As HtmlTextWriter)

[JScript] protected override function RenderAttributes (writer: HtmlTextWriter);

Description

IPostBackEventHandler.RaisePostBackEvent

[C#] void IPostBackEventHandler.RaisePostBackEvent (string eventArgument);

[C++] void IPostBackEventHandler::RaisePostBackEvent (String* eventArgument);

[VB] Sub RaisePostBackEvent(ByVal eventArgument As String) Implements IPostBackEventHandler.RaisePostBackEvent

[JScript] function IPostBackEventHandler.RaisePostBackEvent(eventArgument String);

HtmlInputCheckBox class (System.Web.UI.HtmlControls)

TrackViewState

Description

Allows programmatic access to the HTML element on the server.

Use the System.Web.UI.HtmlControls.HtmlInputCheckBox control to allow the user to select a true or false state.

HtmlInputCheckBox

Example Syntax:

TrackViewState

| | | | |
|---|---|---|---|
| [C#] | | public | HtmlInputCheckBox( ); |
| [C++] | | public: | HtmlInputCheckBox( ); |
| [VB] | Public | Sub | New( ) |
| [JScript] | public | function | HtmlInputCheckBox( ); |

Description

Initializes a new instance of an System.Web.UI.HtmlControls.HtmlInputCheckBox class.

Use this constructor to create and initialize a new instance of the System.Web.UI.HtmlControls.HtmlInputCheckBox class.

Attributes
Checked
TrackViewState

Description

Gets or sets a value indicating whether the System.Web.UI.HtmlControls.HtmlInputCheckBox is checked.

Use this property to determine whether the System.Web.UI.HtmlControls.HtmlInputCheckBox control is checked. This property can also be used to programmatically set the state of the System.Web.UI.HtmlControls.HtmlInputCheckBox control.

ChildControlsCreated
ClientID
Context
Controls
Disabled
EnableViewState
Events
HasChildViewState
ID
IsTrackingViewState
Name
NamingContainer
Page
Parent
Site
Style
TagName
TemplateSourceDirectory
Type
UniqueID Value
ViewState
ViewStateIgnoresCase
Visible
TrackViewState Description Occurs when the Web page is submitted to the server and the System.Web.UI.HtmlControls.HtmlInputCheckBox control changes state from the previous post.

This event is raised when the Web page is submitted to the server and the state of the System.Web.UI.HtmlControls.HtmlInputCheckBox control changes state from the previous post.

OnPreRender

[C#] protected override void OnPreRender(EventArgs e);

[C++] protected: void OnPreRender(EventArgs* e);

[VB] Overrides Protected Sub OnPreRender(ByVal e As EventArgs)

[JScript] protected override function OnPreRender(e: EventArgs);

Description

OnServerChange

[C#] protected virtual void OnServerChange(EventArgs e);

[C++] protected: virtual void OnServerChange(EventArgs* e);

[VB] Overridable Protected Sub OnServerChange(ByVal e As EventArgs)

[JScript] protected function OnServerChange(e: EventArgs);

Description

Raises the System.Web.UI.HtmlControls.HtmlInputCheckBox.ServerChange event. This method allows you to handle the event directly.

This event is raised when the Web page is submitted to the server and the state of the System.Web.UI.HtmlControls.HtmlInputCheckBox control changes state from the previous post. This method allows you to override the base implementation and provide a custom handler for the event. A System.EventArgs that contains event information.

IPostBackDataHandler.LoadPostData

[C#] bool IPostBackDataHandler.LoadPostData(string postDataKey, NameValueCollection postCollection);

[C++] bool IPostBackDataHandler::LoadPostData(String* postDataKey, NameValueCollection* postCollection);

[VB] Function LoadPostData(ByVal postDataKey As String, ByVal postCollection As NameValueCollection) As Boolean Implements IPostBackDataHandler.LoadPostData

[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );

[C++] void IPostBackDataHandler::RaisePostDataChangedEvent( );

[VB] Sub RaisePostDataChangedEvent( ) Implements IPostBackDataHandler.RaisePostDataChangedEvent

[JScript] function IPostBackDataHandler.RaisePostDataChangedEvent( );

HtmlInputControl class (System.Web.UI.HtmlControls)

TrackViewState

Description

Serves as the abstract base class that defines the methods, properties, and events common to all HTML input controls, such as the,

and elements.

The System.Web.UI.HtmlControls.HtmlInputControl class cannot be instantiated directly. Instead, this class is inherited by other classes, such as the System.Web.UI.HtmlControls.HtmlInputText, System.Web.UI.HtmlControls.HtmlInputButton, System.Web.UI.HtmlControls.HtmlInputRadioButton, System.Web.UI.HtmlControls.HtmlInputCheckBox, System.Web.UI.HtmlControls.HtmlInputImage, System.Web.UI.HtmlControls.HtmlInputHidden, and System.Web.UI.HtmlControls.HtmlInputFile classes, to provide common basic functionality.

HtmlInputControl

Example Syntax:

TrackViewState

| | |
|---|---|
| [C#] | public HtmlInputControl(string type); |
| [C++] | public: HtmlInputControl(String* type); |
| [VB] | Public Sub New(ByVal type As String) |
| [JScript] | public function HtmlInputControl(type : String); |

Description

Initializes a new instance of the System.Web.UI.HtmlControls.HtmlInputControl class.

The following table shows initial property values for an instance of System.Web.UI.HtmlControls.HtmlInputControl. The type of input control.

Attributes
ChildControlsCreated
ClientID
Context
Controls
Disabled
EnableViewState
Events
HasChildViewState
ID
IsTrackingViewState
Name
TrackViewState Description Gets or sets the unique identifier name for the System.Web.UI.HtmlControls.HtmlInputControl.

Use the System.Web.UI.HtmlControls.HtmlInputControl.Name property to determine the unique identifier name for an System.Web.UI.HtmlControls.HtmlInputControl. In this implementation, the get accessor returns the value of the System.Web.UI.Control.UniqueID property. However, the set accessor does not assign a value to this property.

NamingContainer
Page
Parent
Site
Style
TagName
TemplateSourceDirectory

Type
TrackViewState

Description

Gets the type of an System.Web.UI.HtmlControls.HtmlInputControl.

Use this property get the type of an System.Web.UI.HtmlControls.HtmlInputControl.

UniqueID
Value
TrackViewState

Description

Gets or sets the contents of an System.Web.UI.HtmlControls.HtmlInputControl.

Use this property to determine the contents of an System.Web.UI.HtmlControls.HtmlInputControl. This property can also be used to programmatically set the contents of an System.Web.UI.HtmlControls.HtmlInputControl.

ViewState
ViewStateIgnoresCase
Visible
RenderAttributes

[C#] protected override void RenderAttributes(HtmlTextWriter writer);
[C++] protected: void RenderAttributes(HtmlTextWriter* writer);
[VB] Overrides Protected Sub RenderAttributes(ByVal writer As HtmlTextWriter)
[JScript] protected override function RenderAttributes (writer: HtmlTextWriter);

Description

HtmlInputFile class (System.Web.UI.HtmlControls)
TrackViewState

Description

Allows programmatic access to the HTML element on the server.

Use the System.Web.UI.HtmlControls.HtmlInputFile server control to handle uploading binary or text files from a browser client to the server. File upload works with Microsoft Internet Explorer version 3.02 or later.

HtmlInputFile
Example Syntax:
TrackViewState

[C#] public HtmlInputFile( );
[C++] public: HtmlInputFile( );
[VB] Public Sub New( )
[JScript] public function HtmlInputFile( );

Description

Initializes a new instance of the System.Web.UI.HtmlControls.HtmlInputFile class.

Use this constructor to create and initialize a new instance of the System.Web.UI.HtmlControls.HtmlInputFile class.

Accept
TrackViewState

[C#] public string Accept {get; set;}
[C++] public: _property String* get_Accept( );public: _property void set-Accept(String*);
[VB] Public Property Accept As String
[JScript] public function get Accept( ): String;public function set Accept(String);

Description

Gets or sets a comma-separated list of MIME encodings used to constrain the file types the user can select.

Use this property to specify the file type that can be uploaded to the server. For example, to restrict the selection to images, set this property to "image/*".

Attributes
ChildControlsCreated
ClientID
Context
Controls
Disabled
EnableViewState
Events
HasChildViewState
ID
IsTrackingViewState
MaxLength
TrackViewState Description Gets or sets the maximum length of the file path for the file to upload from the client machine.

Use this property to specify a limit for the number of characters that can be entered for the path to the file to upload.

Name
NamingContainer
Page
Parent
PostedFile
TrackViewState

Description

Gets access to the uploaded file specified by a client.

Browser security restrictions prevent this value from being maintained across multiple requests.

Site
Size
TrackViewState

Description

Gets or sets the width of the text box in which the file path is entered.

Use this property to specify the width of the text box in which to enter the file path.

Style
TagName
TemplateSourceDirectory
Type
UniqueID
Value
ViewState
ViewStateIgnoresCase
Visible
IPostBackDataHandler.LoadPostData

[C#] bool IPostBackDataHandler.LoadPostData(string postDataKey, NameValueCollection postCollection);
[C++] bool IPostBackDataHandler::LoadPostData(String* postDataKey, NameValueCollection* postCollection);
[VB] Function LoadPostData(ByVal postDataKey As String, ByVal postCollection As NameValueCollection) As Boolean Implements IPostBackDataHandler.LoadPostData
[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );
[C++] void IPostBackDataHandler::RaisePostDataChangedEvent( );

[VB] Sub RaisePostDataChangedEvent( ) Implements IPostBackDataHandler.RaisePostDataChangedEvent
[JScript] function IPostBackDataHandler.RaisePostDataChangedEvent( );
HtmlInputHidden class (System.Web.UI.HtmlControls)
TrackViewState Description
Allows programmatic access to the HTML element on the server.
You can use the System.Web.UI.HtmlControls.HtmlInputHidden control to embed non-visible information within a
Top of Form
element. This information is sent when the Web page is posted back to the server.
HtmlInputHidden
Example Syntax:
TrackViewState
[C#] public HtmlInputHidden( );
[C++] public: HtmlInputHidden( );
[VB] Public Sub New( )
[JScript] public function HtmlInputHidden( );

Description
Initializes a new instance of the System.Web.UI.HtmlControls.HtmlInputHidden class.
Attributes
ChildControlsCreated
ClientID
Context
Controls
Disabled
EnableViewState
Events
HasChildViewState
ID
IsTrackingViewState
Name
NamingContainer
Page
Parent
Site
Style
TagName
TemplateSourceDirectory
Type
UniqueID
Value
ViewState
ViewStateIgnoresCase
Visible
TrackViewState Description
Occurs when the System.Web.UI.HtmlControls.HtmlInputControl.Value property is changed on the server.
The System.Web.UI.HtmlControls.HtmlInputHidden.ServerChange event is raised when the System.Web.UI.HtmlControls.HtmlInputControl.Value property is changed on the server.
OnPreRender
[C#] protected override void OnPreRender(EventArgs e);
[C++] protected: void OnPreRender(EventArgs* e);
[VB] Overrides Protected Sub OnPreRender(ByVal e As EventArgs)
[JScript] protected override function OnPreRender(e: EventArgs);

Description
OnServerChange
[C#] protected virtual void OnServerChange(EventArgs e);
[C++] protected: virtual void OnServerChange(EventArgs* e);
[VB] Overridable Protected Sub OnServerChange(ByVal e As EventArgs)
[JScript] protected function OnServerChange(e: EventArgs);

Description
Raises the System.Web.UI.HtmlControls.HtmlInputHidden.ServerChange event.
The System.Web.UI.HtmlControls.HtmlInputHidden.ServerChange event is raised when the System.Web.UI.HtmlControls.HtmlInputControl.Value property is changed on the server. A System.EventArgs that contains event data.
IPostBackDataHandler.LoadPostData
[C#] bool IPostBackDataHandler.LoadPostData(string postDataKey, NameValueCollection postCollection);
[C++] bool IPostBackDataHandler::LoadPostData(String* postDataKey, NameValueCollection* postCollection);
[VB] Function LoadPostData(ByVal postDataKey As String, ByVal postCollection As NameValueCollection) As Boolean Implements IPostBackDataHandler.LoadPostData
[JScript] function IPostBackDataHandler.LoadPostData (postDataKey: String, postCollection: NameValueCollection): Boolean;
IPostBackDataHandler.RaisePostDataChangedEvent
[C#] void IPostBackDataHandler.RaisePostDataChangedEvent( );
[C++] void IPostBackDataHandler::RaisePostDataChangedEvent( );
[VB] Sub RaisePostDataChangedEvent( ) Implements IPostBackDataHandler.RaisePostDataChangedEvent
[JScript] function IPostBackDataHandler.RaisePostDataChangedEvent( );
HtmlInputImage class (System.Web.UI.HtmlControls)
TrackViewState Description
Allows programmatic access to the HTML

element on the server.
Use the System.Web.UI.HtmlControls.HtmlInputImage control to create a button that displays an image. You can programmatically control the action associated with the System.Web.UI.HtmlControls.HtmlInputImage control by providing an event handler for the System.Web.UI.HtmlControls.HtmlInputImage.ServerClick event.
HtmlInputImage
Example Syntax:
TrackViewState
[C#] public HtmlInputImage( );
[C++] public: HtmlInputImage( );
[VB] Public Sub New( )
[JScript] public function HtmlInputImage( );

Description
Initializes a new instance of the System.Web.UI.HtmlControls.HtmlInputImage class.
Align
TrackViewState

[C#] public string Align {get; set;}
[C++] public: _property String* get_Align( );public: _property void set_Align(String*);
[VB] Public Property Align As String
[JScript] public function get Align( ): String;public function set Align(String);

Description

Gets or sets the alignment of the System.Web.UI.HtmlControls.HtmlInputImage control in relation to other elements on the Web page.

Use the System.Web.UI.HtmlControls.HtmlInputImage.Align property to specify the alignment of the System.Web.UI.HtmlControls.HtmlInputImage control in relation to the other elements on the Web page. The following table lists the possible values for this property.

Alt
TrackViewState
[C#] public string Alt {get; set;}
[C++] public: _property String* get_Alt( );public: _property void set_Alt(String*);
[VB] Public Property Alt As String
[JScript] public function get Alt( ): String;public function set Alt(String);

Description

Gets or sets the alternative text that the browser displays if the image is unavailable or has not been downloaded.

Use the System.Web.UI.HtmlControls.HtmlInputImage.Alt property to specify the text to display when the specified image is not available or has not been downloaded. You can also use this property to programmatically determine the specified alternative text.

Attributes
Border
TrackViewState

Description

Gets or sets the border width for the System.Web.UI.HtmlControls.HtmlInputImage control.

Use the System.Web.UI.HtmlControls.HtmlInputImage.Border property to specify the border width for the System.Web.UI.HtmlControls.HtmlInputImage control.

CausesValidation
TrackViewState
[C#] public bool CausesValidation {get; set;}
[C++] public: _property bool get_CausesValidation( );public: _property void set_CausesValidation(bool);
[VB] Public Property CausesValidation As Boolean
[JScript] public function get CausesValidation( ): Boolean; public function set CausesValidation(Boolean);

Description

Gets or sets a value indicating whether validation is performed when the System.Web.UI.HtmlControls.HtmlInputImage control is clicked.

By default, page validation is performed when an System.Web.UI.HtmlControls.HtmlInputImage control is clicked. Page validation determines whether the input controls associated with a validation control on the page all pass the validation rules specified by the validation control.

ChildControlsCreated
ClientID
Context
Controls
Disabled
EnableViewState
Events
HasChildViewState
ID
IsTrackingViewState
Name
NamingContainer
Page
Parent
Site
Src
TrackViewState Description Gets or sets the location of the image file.

Use the System.Web.UI.HtmlControls.HtmlInputImage.Src property to specify the location of the image to display in the System.Web.UI.HtmlControls.HtmlInputImage control. If the image is not available, the text specified in the System.Web.UI.HtmlControls.HtmlInputImage.Alt property is displayed.

Style
TagName
TemplateSourceDirectory
Type
UniqueID
Value
ViewState
ViewStateIgnoresCase
Visible
TrackViewState Description Occurs on the server when the user clicks an System.Web.UI.HtmlControls.HtmlInputImage control.

The System.Web.UI.HtmlControls.HtmlInputImage.ServerClick event is raised when the user clicks an System.Web.UI.HtmlControls.HtmlInputImage control.

OnPreRender
[C#] protected override void OnPreRender(EventArgs e);
[C++] protected: void OnPreRender(EventArgs* e);
[VB] Overrides Protected Sub OnPreRender(ByVal e As EventArgs)
[JScript] protected override function OnPreRender(e: EventArgs);

Description

OnServerClick
[C#] protected virtual void OnServerClick(ImageClickEventArgs e);
[C++] protected: virtual void OnServerClick(ImageClickEventArgs* e);
[VB] Overridable Protected Sub OnServerClick(ByVal e As ImageClickEventArgs)
[JScript] protected function OnServerClick(e: ImageClickEventArgs);

Description

Raises the System.Web.UI.HtmlControls.HtmlInputImage.ServerClick event.

The System.Web.UI.HtmlControls.HtmlInputImage.ServerClick event is raised when the user clicks an System.Web.UI.HtmlControls.HtmlInputImage control. A System.Web.UI.ImageClickEventArgs that contains event data.

RenderAttributes
[C#] protected override void RenderAttributes(HtmlTextWriter writer);
[C++] protected: void RenderAttributes(HtmlTextWriter* writer);
[VB] Overrides Protected Sub RenderAttributes(ByVal writer As HtmlTextWriter)

[JScript] protected override function RenderAttributes (writer: HtmlTextWriter);

Description

IPostBackDataHandler.LoadPostData

[C#] bool IPostBackDataHandler.LoadPostData(string postDataKey, NameValueCollection postCollection);

[C++] bool IPostBackDataHandler::LoadPostData(String* postDataKey, NameValueCollection* postCollection);

[VB] Function LoadPostData(ByVal postDataKey As String, ByVal postCollection As NameValueCollection) As Boolean Implements IPostBackDataHandler.LoadPostData

[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );

[C++] void IPostBackDataHandler::RaisePostDataChangedEvent( );

[VB] Sub RaisePostDataChangedEvent( ) Implements IPostBackDataHandler.RaisePostDataChangedEvent

[JScript] function IPostBackDataHandler.RaisePostDataChangedEvent( );

IPostBackEventHandler.RaisePostBackEvent

[C#] void IPostBackEventHandler.RaisePostBackEvent (string eventArgument);

[C++]void IPostBackEventHandler::RaisePostBackEvent (String* eventArgument);

[VB] Sub RaisePostBackEvent(ByVal eventArgument As String) Implements IPostBackEventHandler.RaisePostBackEvent

[JScript] function IPostBackEventHandler.RaisePostBackEvent(eventArgument String);

HtmlInputRadioButton class (System.Web.UI.HtmlControls)

TrackViewState

Description

Allows programmatic access to the HTML element on the server.

Use the System.Web.UI.HtmlControls.HtmlInputRadioButton control to create a radio button on a Web page. The System.Web.UI.HtmlControls.HtmlInputRadioButton control does not provide built-in functionality to display a caption for the radio button. To create a caption, use literal text in the Web page at the desired location. This allows you to control where the caption is displayed relative to the radio button. For example, if you want to display the caption on the right side of the radio button, declare an System.Web.UI.HtmlControls.HtmlInputRadioButton control followed by the caption text.

HtmlInputRadioButton

Example Syntax:

TrackViewState

[C#] public HtmlInputRadioButton( );

[C++] public: HtmlInputRadioButton( );

[VB] Public Sub New( )

[JScript] public function HtmlInputRadioButton( );

Description

Initializes a new instance of the System.Web.UI.HtmlControls.HtmlInputRadioButton class.

Use this constructor to create and initialize a new instance of the System.Web.UI.HtmlControls.HtmlInputRadioButton class.

Attributes

Checked

TrackViewState

Description

Gets or sets a value indicating whether the System.Web.UI.HtmlControls.HtmlInputRadioButton control is selected.

Use the System.Web.UI.HtmlControls.HtmlInputRadioButton.Checked property to determine whether the System.Web.UI.HtmlControls.HtmlInputRadioButton control is selected. You can also use this property to programmatically specify whether the control is selected. If you have a group of System.Web.UI.HtmlControls.HtmlInputRadioButton controls, you need to iterate through each control and test the System.Web.UI.HtmlControls.HtmlInputRadioButton.Checked property of each control individually.

ChildControlsCreated

ClientID

Context

Controls

Disabled

EnableViewState

Events

HasChildViewState

ID

IsTrackingViewState

Name

TrackViewState

Description

Gets or sets the name of the group that the current instance of the System.Web.UI.HtmlControls.HtmlInputRadioButton class is associated with.

Group multiple System.Web.UI.HtmlControls.HtmlInputRadioButton controls together by specifying a common value for the System.Web.UI.HtmlControls.HtmlInputControl.Name property of each radio button you want to include in the group. When you group System.Web.UI.HtmlControls.HtmlInputRadioButton controls together, only one radio button in the group can be selected at a time. The System.Web.UI.HtmlControls.HtmlInputRadioButton.Checked property of the selected control is set to true, while the same property is set to false for all other check boxes in the group.

NamingContainer

Page

Parent

Site

Style

TagName

TemplateSourceDirectory

Type

UniqueID

Value

TrackViewState

Description

Gets or sets the quantity associated with the System.Web.UI.HtmlControls.HtmlInputRadioButton control.

Use the System.Web.UI.HtmlControls.HtmlInputRadioButton.Value property to associate a quantity with the System.Web.UI.HtmlControls.HtmlInputRadioButton control. The quantity is not restricted to a numeric value and can be any valid string. This is useful when you have multiple radio buttons and need perform a calculation based on the selection. For example, you can have radio buttons that represent different shipping methods. You can store the shipping cost in the System.Web.UI.HtmlControls.HtmlInputRadioButton.Value property. When the user selects the shipping method, you add the appropriate amount to the sales total.

ViewState

ViewStateIgnoresCase

Visible

TrackViewState

Description

Occurs when the value of the System.Web.UI.HtmlControls.HtmlInputRadioButton.Checked property of the System.Web.UI.HtmlControls.HtmlInputRadioButton control changes between posts to the server.

The System.Web.UI.HtmlControls.HtmlInputRadioButton.ServerChange event is raised when the System.Web.UI.HtmlControls.HtmlInputRadioButton.Checked property of the System.Web.UI.HtmlControls.HtmlInputRadioButton control changes value between posts to the server. This allows you to create a custom event handler that performs a specific set of instructions (such as data validation) when the event is raised.

OnPreRender

[C#] protected override void OnPreRender(EventArgs e);

[C++] protected: void OnPreRender(EventArgs* e);

[VB] Overrides Protected Sub OnPreRender(ByVal e As EventArgs)

[JScript] protected override function OnPreRender(e: EventArgs);

Description

OnServerChange

[C#] protected virtual void OnServerChange(EventArgs e);

[C++] protected: virtual void OnServerChange(EventArgs* e);

[VB] Overridable Protected Sub OnServerChange(ByVal e As EventArgs)

[JScript] protected function OnServerChange(e: EventArgs);

Description

Raises the System.Web.UI.HtmlControls.HtmlInputRadioButton.ServerChange event. This allows you to create a custom event handler when the event is raised.

The System.Web.UI.HtmlControls.HtmlInputRadioButton.ServerChange event is raised when the System.Web.UI.HtmlControls.HtmlInputRadioButton.Checked property of the System.Web.UI.HtmlControls.HtmlInputRadioButton control changes values between posts to the server. This allows you to create a custom event handler that performs a specific set of instructions (such as data validation)when the event is raised. A System.EventArgs that contains the event data.

RenderAttributes

[C#] protected override void RenderAttributes(HtmlTextWriter writer);

[C++] protected: void RenderAttributes(HtmlTextWriter* writer);

[VB] Overrides Protected Sub RenderAttributes(ByVal writer As HtmlTextWriter)

[JScript] protected override function RenderAttributes (writer: HtmlTextWriter);

Description

IPostBackDataHandler.LoadPostData

[C#] bool IPostBackDataHandler.LoadPostData(string postDataKey, NameValueCollection postCollection);

[C++] bool IPostBackDataHandler::LoadPostData(String* postDataKey, NameValueCollection* postCollection);

[VB] Function LoadPostData(ByVal postDataKey As String, ByVal postCollection As NameValueCollection) As Boolean Implements IPostBackDataHandler.LoadPostData

[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );

[C++] void IPostBackDataHandler::RaisePostDataChangedEvent( );

[VB] Sub RaisePostDataChangedEvent( ) Implements IPostBackDataHandler.RaisePostDataChangedEvent

[JScript] function IPostBackDataHandler.RaisePostDataChangedEvent( );

HtmlInputText class (System.Web.UI.HtmlControls)

TrackViewState

Description

Allows programmatic access to the HTML

 and 

elements on the server.

Use the System.Web.UI.HtmlControls.HtmlInputText control to create a single line text box that allows the user to enter text or a password. Use the System.Web.UI.HtmlControls.HtmlInputText.MaxLength property to specify the maximum number of characters that can be entered in the text box. The System.Web.UI.HtmlControls.HtmlInputText.Size property allows you to specify the width of the text box.

HtmlInputText

Example Syntax:

TrackViewState

[C#] public HtmlInputText( );

[C++] public: HtmlInputText( );

[VB] Public Sub New( )

[JScript] public function HtmlInputText( ); Initializes a new instance of the System.Web.UI.HtmlControls.HtmlInputText class.

Description

Initializes a new instance of the System.Web.UI.HtmlControls.HtmlInputText class using default values.

This constructor creates a text type text box control.

HtmlInputText

Example Syntax:

TrackViewState

[C#] public HtmlInputText(string type);

[C++] public: HtmlInputText(String* type);

[VB] Public Sub New(ByVal type As String)

[JScript] public function HtmlInputText(type: String);

Description

Initializes a new instance of the System.Web.UI.HtmlControls.HtmlInputText class using the specified input control type.

This constructor allows you to create a specific type of text box control, such as password. Only the password or text type is currently supported. This constructor is designed to allow you to create other text box types if they become available. The type of input control.

Attributes

ChildControlsCreated

ClientID

Context
Controls
Disabled
EnableViewState
Events
HasChildViewState
ID
IsTrackingViewState
MaxLength
TrackViewState Description Gets or sets the maximum number of characters that can be entered in the text box.

Use the System.Web.UI.HtmlControls.HtmlInputText.MaxLength property to specify or determine the maximum number of characters that can be entered in the text box.

Name
NamingContainer
Page
Parent
Site
Size
TrackViewState

Description

Gets or sets the width of the text box.

Use the System.Web.UI.HtmlControls.HtmlInputText.Size property to specify or determine the width of the textbox, in characters.

Style
TagName
TemplateSourceDirectory
Type
UniqueID
Value
TrackViewState

Description

Gets or sets the contents of the text box.

Use the System.Web.UI.HtmlControls.HtmlInputText.Value property to programmatically determine the text entered by the user into the text box. You can also use this property to provide default text for the text box.

ViewState
ViewStateIgnoresCase
Visible
TrackViewState

Description

Occurs when the System.Web.UI.HtmlControls.HtmlInputText.Value property is changed on the server.

The System.Web.UI.HtmlControls.HtmlInputText.ServerChange event is raised when the System.Web.UI.HtmlControls.HtmlInputText.Value property is changed on the server.

OnPreRender

[C#] protected override void OnPreRender(EventArgs e);

[C++] protected: void OnPreRender(EventArgs* e);

[VB] Overrides Protected Sub OnPreRender(ByVal e As EventArgs)

[JScript] protected override function OnPreRender(e: EventArgs);

Description

OnServerChange

[C#] protected virtual void OnServerChange(EventArgs e);

[C++] protected: virtual void OnServerChange(EventArgs* e);

[VB] Overridable Protected Sub OnServerChange(ByVal e As EventArgs)

[JScript] protected function OnServerChange(e: EventArgs);

Description

Raises the System.Web.UI.HtmlControls.HtmlInputText.ServerChange event.

The System.Web.UI.HtmlControls.HtmlInputText.ServerChange event is raised when the System.Web.UI.HtmlControls.HtmlInputText.Value property is changed on the server. A System.EventArgs that contains event data.

RenderAttributes

[C#] protected override void RenderAttributes(HtmlTextWriter writer);

[C++] protected: void RenderAttributes(HtmlTextWriter* writer);

[VB] Overrides Protected Sub RenderAttributes(ByVal writer As HtmlTextWriter)

[JScript] protected override function RenderAttributes (writer: HtmlTextWriter);

Description

IPostBackDataHandler.LoadPostData

[C#] bool IPostBackDataHandler.LoadPostData(string postDataKey, NameValueCollection postCollection);

[C++] bool IPostBackDataHandler::LoadPostData(String* postDataKey, NameValueCollection* postCollection);

[VB] Function LoadPostData(ByVal postDataKey As String, ByVal postCollection As NameValueCollection) As Boolean Implements IPostBackDataHandler.LoadPostData

[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );

[C++] void IPostBackDataHandler::RaisePostDataChangedEvent( );

[VB] Sub RaisePostDataChangedEvent( ) Implements IPostBackDataHandler.RaisePostDataChangedEvent

[JScript] function IPostBackDataHandler.RaisePostDataChangedEvent( );

HtmlSelect class (System.Web.UI.HtmlControls)

TrackViewState

Description

Allows programmatic access to the HTML

System.Web.UI.WebControls

Description

The System.Web.UI.WebControls namespace is a collection of classes that allow you to create Web server controls on a Web page. Web controls run on the server and include form controls such as buttons and text boxes, as well as special purpose controls such as a calendar. This allows you to programmatically control these elements on a Web page. Web controls are more abstract than HTML controls. Their object model does not necessarily reflect HTML syntax.

AdCreatedEventArgs class (System.Web.UI.WebControls)

Description

Provides data for the System.Web.UI.WebControls.AdRotator.AdCreated event of the System.Web.UI.WebControls.AdRotator control. This class cannot be inherited.

The System.Web.UI.WebControls.AdRotator.AdCreated event is raised when the System.Web.UI.WebControls.AdRotator displays an advertisement on the page.

Constructors:

AdCreatedEventArgs

Example Syntax:

[C#] public AdCreatedEventArgs(IDictionary adProperties);

[C++] public: AdCreatedEventArgs(IDictionary* adProperties);

[VB] Public Sub New(ByVal adProperties As IDictionary)

[JScript] public function AdCreatedEventArgs(adProperties: IDictionary);

Description

Initializes a new instance of the System.Web.UI.WebControls.AdCreatedEventArgs class.

Use this constructor to create and initialize a new instance of the System.Web.UI.WebControls.AdCreatedEventArgs class. A System.Collections.IDictionary containing the advertisement properties from the XML file.

Properties:

AdProperties

[C#] public IDictionary AdProperties {get;}

[C++] public: _property IDictionary* get_AdProperties( );

[VB] Public ReadOnly Property AdProperties As IDictionary

[JScript] public function get AdProperties( ): IDictionary;

Description

Gets a System.Collections.IDictionary object that contains all the advertisement properties for the currently displayed advertisement.

Use the System.Web.UI.WebControls.AdCreatedEventArgs.AdProperties property to get a System.Collections.IDictionary object that contains the advertisement properties for the currently displayed advertisement. The keys and values of the System.Collections.IDictionary object are of type System.String.

AlternateText

[C#] public string AlternateText {get; set;}

[C++] public: _property String* get_AlternateText( );public: _property void set_AlternateText(String*);

[VB] Public Property AlternateText As String

[JScript] public function get AlternateText( ): String;public function set AlternateText(String);

Description

Gets or sets the alternate text displayed in the System.Web.UI.WebControls.AdRotator control when the advertisement image unavailable. Browsers that support the ToolTips feature display this text as a ToolTip for the advertisement.

Use the System.Web.UI.WebControls.AdCreatedEventArgs.AlternateText property to specify the text to display if the image specified in the System.Web.UI.WebControls.AdCreatedEventArgs.ImageUrl property is not available. In browsers that support the ToolTips feature, this text also displays as a ToolTip for the advertisement.

ImageUrl

[C#] public string ImageUrl {get; set;}

[C++] public: _property String* get_ImageUrl( );
public: _property void set_ImageUrl(String*);

[VB] Public Property ImageUrl As String

[JScript] public function get ImageUrl( ): String;public function set ImageUrl(String);

Description

Gets or sets the URL of an image to display in the System.Web.UI.WebControls.AdRotator control.

Use the System.Web.UI.WebControls.AdCreatedEventArgs.ImageUrl property to specify the URL of an image to display for an advertisement in the System.Web.UI.WebControls.AdRotator control. You can use a relative or an absolute URL. A relative URL relates the location of the image to the location of the Web page without specifying a complete path on the server. The path is relative to the location of the Web page. This makes it easier to move the entire site to another directory on the server without updating the path to the image in code. An absolute URL provides the complete path, so moving the site to another directory requires updating the code.

NavigateUrl

[C#] public string NavigateUrl {get; set;}

[C++] public: _property String* get NavigateUrl( );
public: _property void set_NavigateUrl(String*);

[VB] Public Property NavigateUrl As String

[JScript] public function get NavigateUrl( ): String;public function set NavigateUrl(String);

Description

Gets or sets the Web page to display when the System.Web.UI.WebControls.AdRotator control is clicked.

Use the System.Web.UI.WebControls.AdCreatedEventArgs.NavigateUrl property to specify the Web page to display when the System.Web.UI.WebControls.AdRotator control is clicked.

Methods:

AdCreatedEventHandler delegate (System.Web.UI.WebControls)

ToString

Description

Represents the method that will handle the System.Web.UI.WebControls.AdRotator.AdCreated event of an System.Web.UI.WebControls.AdRotator control. The source of the event. An System.Web.UI.WebControls.AdCreatedEventArgs that contains the event data.

The System.Web.UI.WebControls.AdRotator.AdCreated event is raised when the System.Web.UI.WebControls.AdRotator displays an advertisement on the page.

AdRotator class (System.Web.UI.WebControls)

ToString

Description

Displays an advertisement banner on a Web page.

Use the System.Web.UI.WebControls.AdRotator control to display a randomly selected advertisement banner on the Web page. The displayed advertisement can change whenever the page refreshes.

AdRotator

Example Syntax:

ToString

[C#] public AdRotator( );

[C++] public: AdRotator( );

[VB] Public Sub New( )

[JScript] public function AdRotator( );

Description

Initializes a new instance of the System.Web.UI.WebControls.AdRotator class.

Use this constructor to create and initialize a new instance of the System.Web.UI.WebControls.AdRotator class.

AccessKey

AdvertisementFile

ToString

Description

Gets or sets the path to an XML file that contains advertisement information.

Use the System.Web.UI.WebControls.AdRotator.AdvertisementFile property to specify the location of an XML file that contains advertisement information. The XML file must reside within the same web site. For deployment and security purposes, you should place the file in the same web application. It is only possible to access an XML file that is located in a different application on the same site if the application has sufficient trust.

Attributes
BackColor
BorderColor
BorderStyle
BorderWidth
ChildControlsCreated
ClientID
Context
Controls
ControlStyle
ControlStyleCreated
CssClass
Enabled
EnableViewState
Events
Font
ToString Description Font property. Has no effect on this control, so hide it.

ForeColor
HasChildViewState
Height
ID
IsTrackingViewState
KeywordFilter
ToString Description Gets or sets a category keyword to filter for specific types of advertisements in the XML advertisement file.

Each advertisement in the XML advertisement file can be assigned a category keyword. Use the System.Web.UI.WebControls.AdRotator.KeywordFilter property to filter the advertisements for the specified keyword. Only advertisements containing the keyword will be selected for the System.Web.UI.WebControls.AdRotator control. The System.Web.UI.WebControls.AdRotator.KeywordFilter property can be programmatically set to match the profile of the user.

NamingContainer
Page
Parent
Site
Style
TabIndex
TagKey
TagName
Target
ToString

Description

Gets or sets the name of the browser window or frame that displays the contents of the Web page linked to when the System.Web.UI.WebControls.AdRotator control is clicked.

Use the System.Web.UI.WebControls.AdRotator.Target property to specify the target window or frame that displays the contents of the Web page linked to when the System.Web.UI.WebControls.AdRotator control is clicked. Values must begin with a letter in the range of a to z (case insensitive), except for the following special values, which begin with an underscore: _blank Renders the content in a new, unframed window.

TemplateSourceDirectory
ToolTip
UniqueID
ViewState
ViewStateIgnoresCase
Visible
Width
ToString Description Occurs once per round trip to the server after the creation of the control, but before the page is rendered.

This event is raised once per round trip to the server after the creation of the control, but before the page is rendered.

CreateControlCollection

[C#] protected override ControlCollection CreateControlCollection( );

[C++] protected: ControlCollection* CreateControlCollection( );

[VB] Overrides Protected Function CreateControlCollection( ) As ControlCollection

[JScript] protected override function CreateControlCollection( ) ControlCollection;

Description

OnAdCreated

[C#] protected virtual void OnAdCreated(AdCreatedEventArgs e);

[C++] protected: virtual void OnAdCreated(AdCreatedEventArgs* e);

[VB] Overridable Protected Sub OnAdCreated(ByVal e As AdCreatedEventArgs)

[JScript] protected function OnAdCreated(e: AdCreatedEventArgs);

Description

Raises the System.Web.UI.WebControls.AdRotator.AdCreated event for the System.Web.UI.WebControls.AdRotator control.

The System.Web.UI.WebControls.AdRotator.AdCreated event is raised on the server after the System.Web.UI.WebControls.AdRotator control is created, but before the page is rendered. If the System.Web.UI.WebControls.AdRotator.AdvertisementFile property is set, the System.Web.UI.WebControls.AdRotator.AdCreated event is raised after an advertisement has been selected by the System.Web.UI.WebControls.AdRotator control. An System.Web.UI.WebControls.AdCreatedEventArgs that contains event data.

OnPreRender

[C#] protected override void OnPreRender(EventArgs e);

[C++] protected: void OnPreRender(EventArgs* e);

[VB] Overrides Protected Sub OnPreRender(ByVal e As EventArgs)

[JScript] protected override function OnPreRender(e: EventArgs);

Description

Gets the advertisement information for rendering by looking up the file data and/or calling the user event.

Randomly picks an advertisement based on the impression (weight) value of the advertisement.

Render

[C#] protected override void Render(HtmlTextWriter writer);

[C++] protected: void Render(HtmlTextWriter* writer);

[VB] Overrides Protected Sub Render(ByVal writer As HtmlTextWriter)

[JScript] protected override function Render(writer: HtmlTextWriter);

Description

Displays the System.Web.UI.WebControls.AdRotator on the client.

Displays an image obtained from the ad chosen in System.Web.UI.WebControls.AdRotator.OnPreRender(System.EventArgs). A System.Web.UI.HtmlTextWriter that contains the output stream to render on the client.

BaseCompareValidator class (System.Web.UI.WebControls)

TrackViewState

Description

Serves as the abstract base class for validation controls that perform comparisons.

The System.Web.UI.WebControls.BaseCompareValidator class is inherited by validation controls that compare values, such as the System.Web.UI.WebControls.CompareValidator and System.Web.UI.WebControls.RangeValidator controls.

BaseCompareValidator

Example Syntax:

TrackViewState

[C#] protected BaseCompareValidator( );

[C++] protected: BaseCompareValidator( );

[VB] Protected Sub New( )

[JScript] protected function BaseCompareValidator( );

AccessKey

Attributes

BackColor

BorderColor

BorderStyle

BorderWidth

ChildControlsCreated

ClientID

Context

Controls

ControlStyle

ControlStyleCreated

ControlToValidate

CssClass

CutoffYear

TrackViewState

Description

Gets the maximum year that can be represented by a two-digit year.

Use the System.Web.UI.WebControls.BaseCompareValidator.CutoffYear property to determine the maximum year that can be represented by a two-digit year in a 100 year range. For example, if this property contains the value 2029, you can represent the years 1930 to 2029 by using a two-digit year. The two-digit year 30 is interpreted as 1930, while 29 is interpreted as 2029. You cannot change the value of this property directly, however you can change the maximum year that can be represented by a two-digit year by setting the System.Globalization.Calendar.TwoDigitYearMax property.

Display

EnableClientScript

Enabled

EnableViewState

ErrorMessage

Events

Font

ForeColor

HasChildViewState

Height

ID

IsTrackingViewState

IsValid

NamingContainer

Page

Parent

PropertiesValid

RenderUplevel

Site

Style

TabIndex

TagKey

TagName

TemplateSourceDirectory

Text

ToolTip

Type

TrackViewState

Description

Gets or sets the data type of the values being compared.

Use the System.Web.UI.WebControls.BaseCompareValidator.Type property to specify the data type of the two values being compared. Both values are converted to the specified data type before any comparison is performed.

UniqueID

ViewState

ViewStateIgnoresCase

Visible

Width

AddAttributesToRender

[C#] protected override void AddAttributesToRender(HtmlTextWriter writer);

[C++] protected: void AddAttributesToRender(HtmlTextWriter* writer);

[VB] Overrides Protected Sub AddAttributesToRender(ByVal writer As HtmlTextWriter)

[JScript] protected override function AddAttributesToRender (writer HtmlTextWriter);

Description

AddAttributesToRender method AddAttributesToRender method

CanConvert

[C#] public static bool CanConvert(string text, ValidationDataType type);

[C++] public: static bool CanConvert(String* text, ValidationDataType type);

[VB] Public Shared Function CanConvert(ByVal text As String, ByVal type As ValidationDataType) As Boolean

[JScript] public static function CanConvert(text: String, type: ValidationDataType): Boolean;

Description

Determines whether the specified string can be converted to the specified data type.

Return Value: true if the specified data string is convertible to the specified data type; otherwise, false.

Use the System.Web.UI.WebControls.BaseCompareValidator.CanConvert(System.String,System.Web.UI.WebControls.ValidationDataType) method to determine whether the specified string can be converted to the specified data type. This method is commonly used to test whether a string can be converted to a compatible data type before performing an operation that depends on that data type. The string to test whether the specified data type conversion is possible. One of the System.Web.UI.WebControls.ValidationDataType enumeration values.

Compare

[C#] protected static bool Compare(string leftText, string rightText, ValidationCompareOperator op, ValidationDataType type);

[C++] protected: static bool Compare(String* leftText, String* rightText, ValidationCompareOperator op, ValidationDataType type);

[VB] Protected Shared Function Compare(ByVal leftText As String, ByVal rightText As String, ByVal op As ValidationCompareOperator, ByVal type As ValidationDataType) As Boolean

[JScript] protected static function Compare(leftText: String, rightText: String, op: ValidationCompareOperator, type: ValidationDataType): Boolean;

Description

Compares two strings using the specified operator and validation data type.

Return Value: true if the conversion is successful; otherwise false. The string value on the left side of the operator. The string value on the right side of the operator. A System.Web.UI.WebControls.ValidationCompareOperator object that represents the comparison operation to perform. A System.Web.UI.WebControls.ValidationDataType object that represents the data type of the operands.

Convert

[C#] protected static bool Convert(string text, ValidationDataType type, out object value);

[C++] protected: static bool Convert(String* text, ValidationDataType type, Object** value);

[VB] Protected Shared Function Convert(ByVal text As String, ByVal type As ValidationDataType, ByRef value As Object) As Boolean

[JScript] protected static function Convert(text: String, type: ValidationDataType, value: Object): Boolean;

Description

Converts the specified text into an object with specified validation data type.

Return Value: true if the conversion is successful; otherwise false. The source text to convert from. A System.Web.UI.WebControls.ValidationDataType object that represents the data type to convert the text into. A System.Object that contains the conversion result.

DetermineRenderUplevel

[C#] protected override bool DetermineRenderUplevel( );

[C++] protected: bool DetermineRenderUplevel( );

[VB] Overrides Protected Function DetermineRenderUplevel( ) As Boolean

[JScript] protected override function DetermineRenderUplevel( ): Boolean;

Description

Determines whether the validation control can be rendered for an uplevel browser.

Return Value: true if the validation control can be rendered for an uplevel browser; otherwise, false.

GetDateElementOrder

[C#] protected static string GetDateElementOrder( );

[C++] protected: static String* GetDateElementOrder( );

[VB] Protected Shared Function GetDateElementOrder( ) As String

[JScript] protected static function GetDateElementOrder( ): String;

Description

Return the order of date elements for the current culture

Return the order of date elements for the current culture

GetFullYear

[C#] protected static int GetFullYear(int shortYear);

[C++] protected: static int GetFullYear(int shortYear);

[VB] Protected Shared Function GetFullYear(ByVal shortYear As Integer) As Integer

[JScript] protected static function GetFullYear(shortYear: int): int;

Description

Generates the four-digit year representation of the specified two-digit year.

Return Value: The four-digit year representation of the specified two-digit year.

Use the System.Web.UI.WebControls.BaseCompareValidator.GetFullYear(System.In t32) method to generate the four-digit year representation of the specified two-digit year. The four-digit year representation depends on the value of the System.Globalization.BaseCompareValidator.CutoffYear property, which contains the maximum year that can be represented by a two-digit year in a 100 year range. For example, if the System.Globalization.BaseCompareValidator.CutoffYear property contains the value 2029, the System.Web.UI.WebControls.BaseCompareValidator.GetFullYear(System.In t32) method returns a year between 1930 to 2029. The two-digit year 30 is interpreted as 1930, while 29 is interpreted as 2029. You can change the maximum year that can be represented by a two-digit year by setting the System.Globalization.Calendar.TwoDigitYearMax property. A two-digit year.

BaseDataList class (System.Web.UI.WebControls)

Validate

Description

Serves as the abstract base class for data list controls, such as the System.Web.UI.WebControls.DataList and System.Web.UI.WebControls.DataGrid controls. This class provides methods and properties that are common to all data list controls.

The System.Web.UI.WebControls.BaseDataList class provides the common functionality for all data list controls, such as the System.Web.UI.WebControls.DataList and System.Web.UI.WebControls.DataGrid controls. An instance of this class is not created directly. Instead, data list controls inherit the methods and properties common to all data list controls from this class.

BaseDataList

Example Syntax:

Validate

[C#] public BaseDataList( );

[C++] public: BaseDataList( );

[VB] Public Sub New( )

[JScript] public function BaseDataList( );

Description

Initializes a new instance of the System.Web.UI.WebControls.BaseDataList class.

A System.Web.UI.WebControls.BaseDataList object is not created directly. This constructor is commonly called in the constructor of a derived class to initialize the properties defined in the System.Web.UI.WebControls.BaseDataList class.

AccessKey

Attributes

BackColor

BorderColor

BorderStyle
BorderWidth
CellPadding
Validate

Description

Gets or sets the amount of space between the contents of a cell and the cell's border.

Use the System.Web.UI.WebControls.BaseDataList.CellPadding property to control the spacing between the contents of a cell and the cell's border. The padding amount specified is added to all four sides of a cell. All cells in the same column of the list control share the same cell width. Therefore, if the content of one cell is longer than the content other cells in the same column, the padding amount is applied to the width of longest cell. All other cells in the column will also share the same cell width. The same is true for all cells in the same row. The padding amount is applied to the tallest cell in the row, with all cells in the same row sharing the same cell height. Individual cell sizes cannot be specified.

CellSpacing
Validate

[C#] public virtual int CellSpacing {get; set;}

[C++] public: _property virtual int get_CellSpacing( );
public: _property virtual void set_CellSpacing(int);

[VB] Overridable Public Property CellSpacing As Integer

[JScript] public function get CellSpacing( ): int;public function set CellSpacing(int);

Description

Gets or sets the amount of space between cells.

Use the System.Web.UI.WebControls.BaseDataList.CellSpacing property to control the spacing between adjacent cells in the list control. This spacing is applied both vertically and horizontally.

ChildControlsCreated
ClientID
Context
Controls
Validate

Description

ControlStyle
ControlStyleCreated
CssClass
DataKeyField
Validate

Description

Gets or sets the primary key field in the data source referenced by System.Web.UI.WebControls.BaseDataList.DataSource.

DataKeys
Validate

[C#] public DataKeyCollection DataKeys {get;}

[C++] public: _property DataKeyCollection* get_DataKeys( );

[VB] Public ReadOnly Property DataKeys As DataKeyCollection

[JScript] public function get DataKeys( ): DataKeyCollection;

Description

Gets a collection that stores the primary key values of each record (displayed as a row) in the list control.

Use the System.Web.UI.WebControls.BaseDataList.DataKeyCollection to access the primary key values of each record (displayed as a row) in the list control. This property is commonly used to include the primary key field with the list control without displaying it in the control. The collection is filled with the values from the field specified by the System.Web.UI.WebControls.BaseDataList.DataKeyField property.

DataKeysArray
Validate

[C#] protected ArrayList DataKeysArray {get;}

[C++] protected: _property ArrayList* get_DataKeysArray( );

[VB] Protected ReadOnly Property DataKeysArray As ArrayList

[JScript] protected function get DataKeysArray( ): ArrayList;

Description

Gets a list of key fields in the data source.

DataMember
Validate

[C#] public string DataMember {get; set;}

[C++] public: _property String* get_DataMember( );
public: _property void set_DataMember(String*);

[VB] Public Property DataMember As String

[JScript] public function get DataMember( ): String;public function set DataMember(String);

Description

Gets or sets the specific data member in a multi member System.Web.UI.WebControls.BaseDataList.DataSource to bind to the list control.

Use the System.Web.UI.WebControls.BaseDataList.DataMember property to specify a member from a multi member System.Web.UI.WebControls.BaseDataList.DataSource to bind to the list control. For example, if you had a System.Web.UI.WebControls.BaseDataList.DataSource that contains multiple tables, you can use the System.Web.UI.WebControls.BaseDataList.DataMember property to specify the table to bind to the list control.

DataSource
Validate

[C#] public virtual object DataSource {get; set;}

[C++] public: _property virtual Object* get_DataSource( );public: _property virtual void set_DataSource(Object*);

[VB] Overridable Public Property DataSource As Object

[JScript] public function get DataSource( ): Object;public function set DataSource(Object);

Description

Gets or sets the source to a list of values used to populate the items within the control.

Lists derived from ICollection can also be used as a DataSource.

Enabled
EnableViewState
Events
Font
ForeColor
GridLines
Validate

Description

Gets or sets a value that specifies the grid line style.

HasChildViewState
Height
HorizontalAlign
Validate

Description

Gets or sets the horizontal alignment of the control within its container.

ID

IsTrackingViewState

NamingContainer

Page

Parent

Site

Style

TabIndex

TagKey

TagName

TemplateSourceDirectory

ToolTip

UniqueID

ViewState

ViewStateIgnoresCase

Visible

Width

Validate

Description

Occurs when an item on the list is selected.

AddParsedSubObject

[C#] protected override void AddParsedSubObject(object obj);

[C++] protected: void AddParsedSubObject(Object* obj);

[VB] Overrides Protected Sub AddParsedSubObject(ByVal obj As Object)

[JScript] protected override function AddParsedSubObject (obj: Object);

Description

Overridden. The object to add.

CreateChildControls

[C#] protected override void CreateChildControls( );

[C++] protected: void CreateChildControls( );

[VB] Overrides Protected Sub CreateChildControls( )

[JScript] protected override function CreateChildControls( );

Description

Creates a child control using the view state.

CreateControlHierarchy

[C#] protected abstract void CreateControlHierarchy(bool useDataSource);

[C++] protected: virtual void CreateControlHierarchy(bool useDataSource)=0;

[VB] MustOverride Protected Sub CreateControlHierarchy (ByVal useDataSource As Boolean)

[JScript] protected abstract function CreateControlHierarchy (useDataSource Boolean);

Description

Overridden. true to use the System.Web.UI.WebControls. BaseDataList.DataSource; otherwise, false.

DataBind

[C#] public override void DataBind( );

[C++] public: void DataBind( );

[VB] Overrides Public Sub DataBind( )

[JScript] public override function DataBind( );

Description

Binds the control and all of its child controls to the data source specified by the System.Web.UI.WebControls.BaseDataList.DataSource property.

IsBindableType

[C#] public static bool IsBindableType(Type type);

[C++] public: static bool IsBindableType(Type* type);

[VB] Public Shared Function IsBindableType(ByVal type As Type) As Boolean

[JScript] public static function IsBindableType(type: Type): Boolean;

Description

Determines whether the specified data type is bindable to a list control that derives from the System.Web.UI.WebControls.BaseDataList class.

Return Value: true if the specified data type is bindable to a list control that derives from the System.Web.UI.WebControls. BaseDataList class; otherwise, false.

Use the System.Web.UI.WebControls.BaseDataList.IsBindableType(System.Type) static method to determine whether the specified data type is bindable to a list control that inherits from the System.Web.UI.WebControls. BaseDataList class. The supported data types are System. Boolean, System.Byte, System.SByte, System.Int16, System.UInt16, System.Int32, System.UInt32 , System.Int64, System.UInt64, System.Char, System.Double, System. Single, System.DateTime, System.Decimal, and string. A System.Type object that contains the data type to test.

OnDataBinding

[C#] protected override void OnDataBinding(EventArgs e);

[C++] protected: void OnDataBinding(EventArgs* e);

[VB] Overrides Protected Sub OnDataBinding(ByVal e As EventArgs)

[JScript] protected override function OnDataBinding(e: EventArgs);

Description

Raises the DataBinding event of a System.Web.UI.WebControls.BaseDataList.

The event is raised when data is bound to the control. An System.EventArgs that contains the event data.

OnSelectedIndexChanged

[C#] protected virtual void OnSelectedIndexChanged(EventArgs e);

[C++] protected: virtual void OnSelectedIndexChanged(EventArgs* e);

[VB] Overridable Protected Sub OnSelectedIndexChanged (ByVal e As EventArgs)

[JScript] protected function OnSelectedIndexChanged(e: EventArgs);

Description

Raises the System.Web.UI.WebControls.BaseDataList.SelectedIndexChanged event of a System.Web.UI. WebControls.BaseDataList. An System.EventArgs that contains the event data.

PrepareControlHierarchy

[C#] protected abstract void PrepareControlHierarchy( );

[C++] protected: virtual void PrepareControlHierarchy( )=0;

[VB] MustOverride Protected Sub PrepareControlHierarchy( )

[JScript] protected abstract function PrepareControlHierarchy( );

Description

Overridden.

Render

[C#] protected override void Render(HtmlTextWriter writer);

[C++] protected: void Render(HtmlTextWriter* writer);

[VB] Overrides Protected Sub Render(ByVal writer As HtmlTextWriter)

[JScript] protected override function Render(writer: HtmlTextWriter);

Description

Displays the control on the client. An System.Web.UI.HtmlTextWriter that contains the output stream to render on the client.

BaseValidator class (System.Web.UI.WebControls)

TrackViewState

Description

Serves as the abstract base class for validation controls.

The System.Web.UI.WebControls.BaseValidator class provides the core implementation for all validation controls.

BaseValidator

Example Syntax:

TrackViewState

[C#] protected BaseValidator( );

[C++] protected: BaseValidator( );

[VB] Protected Sub New( )

[JScript] protected function BaseValidator( );

Description

Initializes a new instance of the System.Web.UI.WebControls.BaseValidator class.

This constructor is not called directly. Validation controls that inherit from this class can call this constructor from their own constructors to initialize the base properties.

AccessKey

Attributes

BackColor

Border Color

BorderStyle

BorderWidth

ChildControlsCreated

ClientID

Context

Controls

ControlStyle

ControlStyleCreated

ControlToValidate

TrackViewState

Description

Gets or sets the input control to validate.

Use the System.Web.UI.WebControls. BaseValidator-.ControlToValidate property to specify the input control to validate. This property must be set to the ID of an input control for all validation controls except for the System.Web.UI.WebControls.CustomValidator control, which can be left blank. If you do not specify a valid input control, an exception will be thrown when the page is rendered. The ID must refer to a control within the same container as the validation control. It must be in the same page or user control, or it must be in the same template of a templated control.

CssClass

Display

TrackViewState

Description

Gets or sets the display behavior of the error message in a validation control.

Use the System.Web.UI.WebControls. BaseValidator.Display property to specify the display behavior of the error message in the validation control. The following table lists the different values that can be used.

EnableClientScript

TrackViewState

[C#] public bool EnableClientScript {get; set;}

[C++] public: _property bool get_EnableClientScript( );public: _property void set_EnableClientScript(bool);

[VB] Public Property EnableClientScript As Boolean

[JScript] public function get EnableClientScript( ): Boolean; public function set EnableClientScript(Boolean);

Description

Gets or sets a value indicating whether client-side validation is enabled.

Use the System.Web.UI.WebControls. BaseValidator.EnableClientScript property to specify whether client-side validation is enabled.

Enabled

TrackViewState

[C#] public override bool Enabled {get; set;}

[C++] public: _property virtual bool get_Enabled( );
public: _property virtual void set Enabled(bool);

[VB] Overrides Public Property Enabled As Boolean

[JScript] public function get Enabled( ): Boolean;public function set Enabled(Boolean);

Description

Gets or sets a value that indicates whether the validation control is enabled.

Use the System.Web.UI.WebControls. BaseValidator.Enabled property to specify whether the validation control is enabled. You can programmatically disable the validation control by setting this property to false.

EnableViewState

ErrorMessage

TrackViewState

Description

Gets or sets the text for the error message.

Use the System.Web.UI.WebControls. BaseValidator.ErrorMessage property to specify the text to display in the validation control when validation fails. This text is also included in the System.Web.UI.WebControls. ValidationSummary control, if one is placed on the Web page.

Events

Font

ForeColor

TrackViewState

Description

Gets or sets the color of the message displayed when validation fails.

Use the System.Web.UI.WebControls. BaseValidator. ForeColor property to specify a custom text color for the message displayed when validation fails.

HasChildViewState

Height

ID

IsTrackingViewState

IsValid

TrackViewState

Description

Gets or sets a value that indicates whether the associated input control passes validation.

Use the System.Web.UI.WebControls. BaseValidator.IsValid property to determine whether the associated input control passes validation.

NamingContainer

Page

Parent

PropertiesValid

TrackViewState

Description

Gets a value that indicates whether the control specified by the System.Web.UI.WebControls. BaseValidator.ControlToValidate property is a valid control.

Use the System.Web.UI.WebControls. BaseValidator. PropertiesValid property to determine whether the System. Web.UI.WebControls. BaseValidator.ControlToValidate property contains a valid input control. To be a valid input control, the System.Web.UI. WebControls.BaseValidator. ControlToValidate property must set to a control on the page.

RenderUplevel

TrackViewState

[C#] protected bool RenderUplevel {get;}

[C++] protected: _property bool get_RenderUplevel( );

[VB] Protected ReadOnly Property RenderUplevel As Boolean

[JScript] protected function get RenderUplevel( ): Boolean;

Description

Gets a value that indicates whether the client's browser supports uplevel rendering.

Use the System.Web.UI.WebControls. BaseValidator.RenderUplevel property to determine whether the client's browser supports uplevel rendering. For a browser to support uplevel rendering, it must support Microsoft XML Document Object Model (DOM) version 4 or higher and any version of ECMAScript.

Site

Style

TabIndex

TagKey

TagName

TemplateSourceDirectory

Text

ToolTip

UniqueID

ViewState

ViewStateIgnoresCase

Visible

Width

AddAttributesToRender

[C#] protected override void AddAttributesToRender(HtmlTextWriter writer);

[C++] protected: void AddAttributesToRender(HtmlTextWriter* writer);

[VB] Overrides Protected Sub AddAttributesToRender(ByVal writer As HtmlTextWriter)

[JScript] protected override function AddAttributesToRender (writer: HtmlTextWriter);

Description

Adds the attributes of this control to the output stream for rendering on the client. An System.Web.UI.HtmlTextWriter that contains the output stream to render on the client.

CheckControlValidationProperty

[C#] protected void CheckControlValidationProperty(string name, string propertyName);

[C++] protected: void CheckControlValidationProperty (String* name, String* propertyName);

[VB] Protected Sub CheckControlValidationProperty(ByVal name As String, ByVal propertyName As String)

[JScript] protected function CheckControlValidationProperty(name: String, propertyName: String);

Description

Helper function that verifies whether the specified control is on the page and contains validation properties.

The System.Web.UI.WebControls. BaseValidator.CheckControlValidationProperty(System. String,System.String) method is a helper function primarily used by the System. Web.UI.WebControls. BaseValidator.ControlPropertiesValid method to verify whether the specified control is on the page and contains validation properties. This method does not return a value to report the result. Instead, it throws an exception when verification fails. The control to verify. The property that contains the control name.

ControlPropertiesValid

[C#] protected virtual bool ControlPropertiesValid( );

[C++] protected: virtual bool ControlPropertiesValid( );

[VB] Overridable Protected Function ControlPropertiesValid( ) As Boolean

[JScript] protected function ControlPropertiesValid( ): Boolean;

Description

Helper function that determines whether the control specified by the System.Web.UI.WebControls. BaseValidator.ControlToValidate property is a valid control.

Return Value: true if the control specified by the System.Web.UI.WebControls.BaseValidator.ControlToValidate property is a valid control; otherwise, false.

The System.Web.UI.WebControls. BaseValidator.ControlPropertiesValid method is a helper function primarily used by the System.Web.UI.WebControls. BaseValidator. PropertiesValid property to determine whether the System. Web.UI.WebControls. BaseValidator.ControlToValidate property contains a valid input control. To be a valid input control, the System.Web.UI. WebControls.BaseValidator. ControlToValidate property must be set to some value and that value must be a control on the page.

DetermineRenderUplevel

[C#] protected virtual bool DetermineRenderUplevel( );

[C++] protected: virtual bool DetermineRenderUplevel( );

[VB] Overridable Protected Function DetermineRenderUplevel( ) As Boolean

[JScript] protected function DetermineRenderUplevel( ): Boolean;

Description

Helper function that determines whether the validator control can be rendered for an uplevel browser.

Return Value: true if the validator control can be rendered for an uplevel browser; otherwise, false.

The System.Web.UI.WebControls. BaseValidator.DetermineRenderUplevel method is a helper function used primarily by the System.Web.UI.WebControls. BaseValidator.RenderUplevel property to determine whether the client's browser supports uplevel rendering. For a browser to support uplevel rendering, it must support Microsoft XML Document Object Model (DOM) version 4 or higher and any version of ECMAScript.

EvaluateIsValid

[C#] protected abstract bool EvaluateIsValid( );

[C++] protected: virtual bool EvaluateIsValid( )=0;

[VB] MustOverride Protected Function EvaluateIsValid( ) As Boolean

[JScript] protected abstract function EvaluateIsValid( ): Boolean;

Description

When overridden in a derived class, this method contains the code to determine whether the value in the input control is valid.

Return Value: true if the value in the input control is valid; otherwise, false.

Use the System.Web.UI.WebControls. BaseValidator. EvaluateIsValid method to determine whether the value in the input control specified by the System.Web.UI. WebControls.BaseValidator.ControlToValidate property is valid.

GetControlRenderID

[C#] protected string GetControlRenderID(string name);

[C++] protected: String* GetControlRenderID(String* name);

[VB] Protected Function GetControlRenderID(ByVal name As String) As String

[JScript] protected function GetControlRenderID(name: String): String;

Description

Gets the client ID of the specified control.

Return Value: The client ID of the specified control.

Use the System.Web.UI.WebControls. BaseValidator.GetControlRenderID(System.String) method to get the client ID of the specified control. The name of the control to get the client ID.

GetControlValidationValue

[C#] protected string GetControlValidationValue(string name);

[C++] protected: String* GetControlValidationValue(String* name);

[VB] Protected Function GetControlValidationValue(ByVal name As String) As String

[JScript] protected function GetControlValidationValue (name: String): String;

Description

Gets the value associated with the specified input control.

Return Value: The value associated with the specified input control.

Use the System.Web.UI.WebControls. BaseValidator.GetControlValidationValue(System.String) method to get the value associated with the specified input control, regardless of the control type. For example, you can use this method to get the value in a System.Web.UI.WebControls.TextBox control, as well as the value of the selected item from a System.Web.UI.WebControls.ListBox control. The name of the input control to get the value from.

GetValidationProperty

[C#] public static PropertyDescriptor GetValidationProperty (object component);

[C++] public: static PropertyDescriptor* GetValidationProperty(Object* component);

[VB] Public Shared Function GetValidationProperty(ByVal component As Object) As PropertyDescriptor

[JScript] public static function GetValidationProperty(component: Object) PropertyDescriptor;

Description

Helper function to get the validation property of a control (if it exists).

Return Value: A System.ComponentModel.PropertyDescriptor that contains the validation property of the control.

The System.Web.UI.WebControls. BaseValidator. GetValidationProperty(System.Object) method is a helper function that gets the validation property of the specified input control. An System.Object that represents the control to get the validation property of.

OnInit

[C#] protected override void OnInit(EventArgs e);

[C++] protected: void OnInit(EventArgs* e);

[VB] Overrides Protected Sub OnInit(ByVal e As EventArgs)

[JScript] protected override function OnInit(e: EventArgs);

Description

Registers the validator on the page. An System.EventArgs that contains the event data.

OnPreRender

[C#] protected override void OnPreRender(EventArgs e);

[C++] protected: void OnPreRender(EventArgs* e);

[VB] Overrides Protected Sub OnPreRender(ByVal e As EventArgs)

[JScript] protected override function OnPreRender(e: EventArgs);

Description

Checks the client brower and configures the validator for compatibility prior to rendering.

OnUnload

[C#] protected override void OnUnload(EventArgs e);

[C++] protected: void OnUnload(EventArgs* e);

[VB] Overrides Protected Sub OnUnload(ByVal e As EventArgs)

[JScript] protected override function OnUnload(e: EventArgs);

Description

Un-registers the validator on the page.

RegisterValidatorCommonScript

[C#] protected void RegisterValidatorCommonScript( );

[C++] protected: void RegisterValidatorCommonScript( );

[VB] Protected Sub RegisterValidatorCommonScript( )

[JScript] protected function RegisterValidatorCommonScript( );

Description

Registers code on the page for client-side validation.

Use the System.Web.UI.WebControls. BaseValidator.RegisterValidatorCommonScript method to register code on the page to perform client-side validation.

RegisterValidatorDeclaration

[C#] protected virtual void RegisterValidatorDeclaration( );

[C++] protected: virtual void RegisterValidator Declaration( );

[VB] Overridable Protected Sub RegisterValidatorDeclaration( )

[JScript] protected function RegisterValidatorDeclaration( );

Registers an ECMAScript array declaration used on the page by client-side code.

Description

Registers an ECMAScript array declaration using the array name, Page_Validators.

Use the System.Web.UI.WebControls. BaseValidator.RegisterValidatorDeclaration method to register an ECMAScript array declaration using the array name, Page_Validators.

Render

[C#] protected override void Render(HtmlTextWriter writer);

[C++] protected: void Render(HtmlTextWriter* writer);

[VB] Overrides Protected Sub Render(ByVal writer As HtmlTextWriter)

[JScript] protected override function Render(writer: HtmlTextWriter);

Description

Displays the control on the client. An System.Web.UI.HtmlTextWriter that contains the output stream for rendering on the client.

Validate

[C#] public void Validate( );

[C++] public: _sealed void Validate( );

[VB] NotOverridable Public Sub Validate( )

[JScript] public function Validate( );

Description

Performs validation on the associated input control and updates the System.Web.UI.WebControls. BaseValidator.IsValid property.

Use the System.Web.UI.WebControls. BaseValidator.Validate method to perform validation on the associated input control. This method allows you to programmatically perform validation on the input control. The System.Web.UI-.WebControls.BaseValidator.IsValid property is automatically updated with the validation results.

BorderStyle enumeration (System.Web.UI.WebControls)

Validate

Description

Specifies the border style of a control.

The System.Web.UI.WebControls.BorderStyle enumeration represents the different border style options for a control.

Validate

[C#] public const BorderStyle Dashed;
[C++] public: const BorderStyle Dashed;
[VB] Public Const Dashed As BorderStyle
[JScript] public var Dashed: BorderStyle;

Description

A dashed line border.

Validate

[C#] public const BorderStyle Dotted;
[C++] public: const BorderStyle Dotted;
[VB] Public Const Dotted As BorderStyle
[JScript] public var Dotted: BorderStyle;

Description

A dotted line border.

Validate

[C#] public const BorderStyle Double;
[C++] public: const BorderStyle Double;
[VB] Public Const Double As BorderStyle
[JScript] public var Double: BorderStyle;

Description

A double solid line border.

Validate

[C#] public const BorderStyle Groove;
[C++] public: const BorderStyle Groove;
[VB] Public Const Groove As BorderStyle
[JScript] public var Groove: BorderStyle;

Description

A grooved border for a sunken border appearance.

Validate

[C#] public const BorderStyle Inset;
[C++] public: const BorderStyle Inset;
[VB] Public Const Inset As BorderStyle
[JScript] public var Inset: BorderStyle;

Description

An inset border for a sunken control appearance.

Validate

[C#] public const BorderStyle None;
[C++] public: const BorderStyle None;
[VB] Public Const None As BorderStyle
[JScript] public var None: BorderStyle;

Description

No border.

Validate

[C#] public const BorderStyle NotSet;
[C++] public: const BorderStyle NotSet;
[VB] Public Const NotSet As BorderStyle
[JScript] public var NotSet: BorderStyle;

Description

No set border style.

Validate

[C#] public const BorderStyle Outset;
[C++] public: const BorderStyle Outset;
[VB] Public Const Outset As BorderStyle
[JScript] public var Outset: BorderStyle;

Description

An outset border for a raised control appearance.

Validate

[C#] public const BorderStyle Ridge;
[C++] public: const BorderStyle Ridge;
[VB] Public Const Ridge As BorderStyle
[JScript] public var Ridge: BorderStyle;

Description

A ridged border for a raised border appearance.

Validate

[C#] public const BorderStyle Solid;
[C++] public: const BorderStyle Solid;
[VB] Public Const Solid As BorderStyle
[JScript] public var Solid: BorderStyle;

Description

A solid line border.

BoundColumn class (System.Web.UI.WebControls)

ToString

Description

A column type for the System.Web.UI.WebControls.DataGrid control that is bound to a field in a data source.

Use the System.Web.UI.WebControls.BoundColumn column type in a System.Web.UI.WebControls.DataGrid control to display the contents of a field in the data source in a single column. The field is linked to the System.Web.UI.WebControls.BoundColumn, so any updates in the data source are reflected in the corresponding cells of the System.Web.UI.WebControls.DataGrid control.

ToString

[C#] public static readonly string thisExpr;
[C++] public: static String* thisExpr;
[VB] Public Shared ReadOnly thisExpr As String
[JScript] public static var thisExpr: String;

Description Represents the string "!". This field is read-only.

Use the System.Web.UI.WebControls.BoundColumn.thisExpr field to represent the "!" string.

BoundColumn

Example Syntax:

ToString

[C#] public BoundColumn( );
[C++] public: BoundColumn( );
[VB] Public Sub New( )
[JScript] public function BoundColumn( );

Description

Initializes a new instance of the System.Web.UI.WebControls.BoundColumn class.

Use this constructor to create and initialize a new instance of the System.Web.UI.WebControls.BoundColumn class.

DataField

ToString

[C#] public virtual string DataField {get; set;}
[C++] public: _property virtual String* get_DataField( );public: _property virtual void set_DataField(String*);
[VB] Overridable Public Property DataField As String
[JScript] public function get DataField( ): String;public function set DataField(String);

Description

Gets or sets the field name from the data source to bind to the System.Web.UI.WebControls.BoundColumn.

Use the System.Web.UI.WebControls.BoundColumn.DataField property to specify the field to bind to the System.Web.UI.WebControls.BoundColumn.

DataFormatString

ToString

[C#] public virtual string DataFormatString {get; set;}

[C++] public: _property virtual String* get_DataFormatString( );public: _property virtual void set_DataFormatString(String*);

[VB] Overridable Public Property DataFormatString As String

[JScript] public function get DataFormatString( ): String; public function set DataFormatString(String);

Description

Gets or sets the string that specifies the display format for items in the column.

Use the System.Web.UI.WebControls.BoundColumn.DataFormatString property to provide a custom format for the items in the column.

DesignMode

FooterStyle

FooterText

HeaderImageUrl

HeaderStyle

HeaderText

IsTrackingViewState

ItemStyle

Owner

ReadOnly

ToString

Description

Gets or sets a value that indicates whether the items in the System.Web.UI.WebControls.BoundColumn can be edited.

Use the System.Web.UI.WebControls.BoundColumn.ReadOnly property to specify whether the items in the System.Web.UI.WebControls.BoundColumn can be edited. This property can also be used to programmatically determine whether the column is read-only.

SortExpression

ViewState

Visible

FormatDataValue

[C#] protected virtual string FormatDataValue(object dataValue);

[C++] protected: virtual String* FormatDataValue(Object* dataValue);

[VB] Overridable Protected Function FormatDataValue(ByVal dataValue As Object) As String

[JScript] protected function FormatDataValue(dataValue: Object): String;

Description

Converts the specified value to the format indicated by the System.Web.UI.WebControls.BoundColumn.DataFormatString property.

Return Value: The specified value converted to the format indicated by the System.Web.UI.WebControls.BoundColumn.DataFormatString property.

Use the System.Web.UI.WebControls.BoundColumn.FormatDataValue(System.Object) method to convert the specified value to the format indicated by the System.Web.UI.WebControls.BoundColumn.DataFormatString property. The value to format.

Initialize

[C#] public override void Initialize( );

[C++] public: void Initialize( );

[VB] Overrides Public Sub Initialize( )

[JScript] public override function Initialize( );

Description

Resets the System.Web.UI.WebControls.BoundColumn to its initial state.

Use the System.Web.UI.WebControls.BoundColumn.Initialize method to reset the System.Web.UI.WebControls.BoundColumn to its initial state.

InitializeCell

[C#] public override void InitializeCell(TableCell cell, int columnIndex, ListItemType itemType);

[C++] public: void InitializeCell(TableCell* cell, int columnIndex, ListItemType itemType);

[VB] Overrides Public Sub InitializeCell(ByVal cell As TableCell, ByVal columnIndex As Integer, ByVal itemType As ListItemType)

[JScript] public override function InitializeCell(cell: TableCell, columnIndex: int, itemType: ListItemType);

Description

Resets the specified cell in the System.Web.UI.WebControls.BoundColumn to its initial state.

The System.Web.UI.WebControls.BoundColumn.InitializeCell(System.Web.UI.WebControls.TableCell,System.Int32,System.Web.UI.WebControls.ListItemType) method resets the specified cell in the System.Web.UI.WebControls.BoundColumn to its initial state. A System.Web.UI.WebControls.TableCell object that represents the cell to reset. The column number where the cell is located. One of the System.Web.UI.WebControls.ListItemType values.

Button class (System.Web.UI.WebControls)

TrackViewState

Description

Displays a push button control on the Web page.

Use the System.Web.UI.WebControls.Button control to create a push button on the Web page. You can create either a submit button or a command button.

Button

Example Syntax:

TrackViewState

[C#] public Button( );

[C++] public: Button( );

[VB] Public Sub New( )

[JScript] public function Button( );

Description

Initializes a new instance of the System.Web.UI.WebControls.Button class.

Use this constructor to create and initialize a new instance of the System.Web.UI.WebControls.Button class.

AccessKey

Attributes

BackColor

BorderColor

BorderStyle

BorderWidth

CausesValidation

TrackViewState

Description

Gets or sets a value indicating whether validation is performed when the System.Web.UI.WebControls.Button control is clicked.

By default, page validation is performed when a System.Web.UI.WebControls.Button control is clicked. Page validation determines whether the input controls associated with a validation control on the page all pass the validation rules specified by the validation control.

ChildControlsCreated

ClientID

CommandArgument

TrackViewState

Description

Gets or sets an optional parameter passed to the System.Web.UI.WebControls.Button.Command event along with the associated System.Web.UI.WebControls.Button. CommandName.

Use the System.Web.UI.WebControls.Button. CommandArgument property to specify an parameter that compliments the System.Web.UI.WebControls.Button. CommandName property.

CommandName

TrackViewState

[C#] public string CommandName {get; set;}

[C++] public: _property String* get_CommandName( );public: _property void set_CommandName(String*);

[VB] Public Property CommandName As String

[JScript] public function get CommandName( ): String;public function set CommandName(String);

Description

Gets or sets the command name associated with the System.Web.UI.WebControls.Button control that is passed to the System.Web.UI.WebControls.Button.Command event.

When you have multiple System.Web.UI.WebControls.Button controls on a Web page, use the System.Web.UI.WebControls.Button.CommandName property to specify or determine the command name associated with each System.Web.UI.WebControls.Button control. You can set the System.Web.UI.WebControls.Button.CommandName property with any string that identifies the command to perform. You can then programmatically determine the command name of the System.Web.UI.WebControls.Button control and perform the appropriate actions.

Context

Controls

ControlStyle

ControlStyleCreated

CssClass

Enabled

EnableViewState

Events

Font

ForeColor

HasChildViewState

Height

ID

IsTrackingViewState

NamingContainer

Page

Parent

Site

Style

TabIndex

TagKey

TagName

TemplateSourceDirectory

Text

TrackViewState

Description

Gets or sets the text caption displayed in the System.Web.UI.WebControls.Button control.

Use the System.Web.UI.WebControls.Button.Text property to specify or determine the caption to display in the System.Web.UI.WebControls.Button control.

ToolTip

UniqueID

ViewState

ViewStateIgnoresCase

Visible

Width

TrackViewState

Description

Occurs when the System.Web.UI.WebControls.Button control is clicked.

The System.Web.UI.WebControls.Button.Click event is raised when the System.Web.UI.WebControls.Button control is clicked. This event is commonly used when no command name is associated with the System.Web.UI.WebControls.Button control (for instance, with a submit button).

TrackViewState

[C#] public event CommandEventHandler Command;

[C++] public: _event CommandEventHandler* Command;

[VB] Public Event Command As CommandEventHandler

Description

Occurs when the System.Web.UI.WebControls.Button control is clicked.

The System.Web.UI.WebControls.Button.Command event is raised when the System.Web.UI.WebControls.Button control is clicked. This event is commonly used when a command name, such as Sort, is associated with the System.Web.UI.WebControls.Button control. This allows you to create multiple System.Web.UI.WebControls.Button controls on a Web page and programmatically determine which System.Web.UI.WebControls.Button control is clicked.

AddAttributesToRender

[C#] protected override void AddAttributesToRender(HtmlTextWriter writer);

[C++] protected: void AddAttributesToRender(HtmlTextWriter* writer);

[VB] Overrides Protected Sub AddAttributesToRender(ByVal writer As HtmlTextWriter)

[JScript] protected override function AddAttributesToRender (writer HtmlTextWriter);

Description

Adds the attributes of the System.Web.UI.WebControls.Button control to the output stream for rendering on the client. An System.Web.UI.HtmlTextWriter that contains the output stream to render on the client.

OnClick

[C#] protected virtual void OnClick(EventArgs e);

[C++] protected: virtual void OnClick(EventArgs* e);

[VB] Overridable Protected Sub OnClick(ByVal e As EventArgs)

[JScript] protected function OnClick(e: EventArgs);

Description

Raises the System.Web.UI.WebControls.Button.Click event of the System.Web.UI.WebControls.Button control.

The System.Web.UI.WebControls.Button.Click event is raised when the System.Web.UI.WebControls.Button control is clicked. This event is commonly used when no command name is associated with the System.Web.UI.WebControls.Button control (for instance, with a submit button). A System.EventArgs that contains the event data.

OnCommand

[C#] protected virtual void OnCommand(CommandEventArgs e);

[C++] protected: virtual void OnCommand(CommandEventArgs* e);

[VB] Overridable Protected Sub OnCommand(ByVal e As CommandEventArgs)

[JScript] protected function OnCommand(e: CommandEventArgs);

Description

Raises the System.Web.UI.WebControls.Button. Command event of the System.Web.UI.WebControls.Button control.

The System.Web.UI.WebControls.Button.Command event is raised when the System.Web.UI.WebControls.Button control is clicked. This event is commonly used when a command name, such as Sort, is associated with the System.Web.UI.WebControls.Button control. This allows you to create multiple System.Web.UI.WebControls.Button controls on a Web page and programmatically determine which System.Web.UI.WebControls.Button control is clicked. A System.Web.UI.WebControls.CommandEventArgs that contains the event data.

RenderContents

[C#] protected override void RenderContents(HtmlTextWriter writer);

[C++] protected: void RenderContents(HtmlTextWriter* writer);

[VB] Overrides Protected Sub RenderContents(ByVal writer As HtmlTextWriter)

[JScript] protected override function RenderContents(writer: HtmlTextWriter);

Description

IPostBackEventHandler.RaisePostBackEvent

[C#] void IPostBackEventHandler.RaisePostBackEvent (string eventArgument);

[C++] void IPostBackEventHandler::RaisePostBackEvent (String* eventArgument);

[VB] Sub RaisePostBackEvent(ByVal eventArgument As String) Implements IPostBackEventHandler.RaisePostBackEvent

[JScript] function IPostBackEventHandler.RaisePostBackEvent(eventArgument: String);

ButtonColumn class (System.Web.UI.WebControls)

TrackViewState

Description

A column type for the System.Web.UI.WebControls.DataGrid control that contains a user-defined command button, such as Add or Remove, that corresponds with each row in the column.

Use the System.Web.UI.WebControls.ButtonColumn column type in a System.Web.UI.WebControls.DataGrid control to create a command button that corresponds with each row in the System.Web.UI.WebControls.DataGrid control. Specify the caption displayed in the command buttons by setting the System.Web.UI.WebControls.ButtonColumn.Text property.

ButtonColumn

Example Syntax:

TrackViewState

[C#] public ButtonColumn( );

[C++] public: ButtonColumn( );

[VB] Public Sub New( )

[JScript] public function ButtonColumn( );

Description

Initializes a new instance of the System.Web.UI.WebControls.ButtonColumn class.

Use this constructor to create and initialize a new instance of the System.Web.UI.WebControls.ButtonColumn class.

ButtonType

TrackViewState

[C#] public virtual ButtonColumnType ButtonType {get; set;}

[C++] public: _property virtual ButtonColumnType get_ButtonType( );public: _property virtual void set_ButtonType (ButtonColumnType);

[VB] Overridable Public Property ButtonType As ButtonColumnType

[JScript] public function get ButtonType( ): ButtonColumnType;public function set ButtonType(ButtonColumnType);

Description

Gets or sets the type of button to display in the System.Web.UI.WebControls.ButtonColumn column.

Use this property to specify whether the buttons in the column are displayed as link or push buttons. Clicking on the command buttons in the column raises the System.Web.UI.WebControls.DataGrid.ItemCommand event. You can programmatically control the action performed when the command button is clicked by providing an event handler for the System.Web.UI.WebControls.DataGrid.ItemCommand event.

CommandName

TrackViewState

[C#] public virtual string CommandName {get; set;}

[C++] public: _property virtual String* get_CommandName( );public: _property virtual void set_CommandName(String*);

[VB] Overridable Public Property CommandName As String

[JScript] public function get CommandName( ): String;public function set CommandName(String);

Description

Gets or sets a string that represents the command to perform when a button in the System.Web.UI.WebControls.ButtonColumn is clicked.

Use the System.Web.UI.WebControls.ButtonColumn.CommandName property to associate a command name, such as Add or Remove, with a button. You can set the System.Web.UI.WebControls.ButtonColumn.CommandName property to any string that identifies the action to perform when the command button is clicked. You can then programmatically determine the command name in the event handler for the System.Web.UI.WebControls.DataGrid.ItemCommand event and perform the appropriate actions.

DataTextField

TrackViewState

[C#] public virtual string DataTextField {get; set;}

[C++] public: _property virtual String* get_DataTextField( );public: _property virtual void set_DataTextField (String*);

[VB] Overridable Public Property DataTextField As String

[JScript] public function get DataTextField( ): String;public function set DataTextField(String);

Description

Gets or sets the field name from a data source to bind to the System.Web.UI.WebControls.ButtonColumn.

Use the System.Web.UI.WebControls.ButtonColumn.DataTextField property to specify the field name from the data source to bind to the System.Web.UI.WebControls.ButtonColumn.Text property of the buttons in the System.Web.UI.WebControls.ButtonColumn.

DataTextFormatString

TrackViewState

[C#] public virtual string DataTextFormatString {get; set;}

[C++] public: _property virtual String* get_DataTextFormatString( );public: _property virtual void set_DataTextFormatString(String*);

[VB] Overridable Public Property DataTextFormatString As String

[JScript] public function get DataTextFormatString( ): String;public function set DataTextFormatString(String);

Description

Gets or sets the string that specifies the display format for the caption in each command button.

Use the System.Web.UI.WebControls.ButtonColumn.DataTextFormatString property to provide a custom display format for the caption of the command buttons in the column.

DesignMode

FooterStyle

FooterText

HeaderImageUrl

HeaderStyle

HeaderText

IsTrackingViewState

ItemStyle

Owner

SortExpression

Text

TrackViewState

Description

Gets or sets the caption displayed in the command buttons of the System.Web.UI.WebControls.ButtonColumn.

Use the System.Web.UI.WebControls.ButtonColumn.Text property to specify or determine the caption displayed in the command buttons of the System.Web.UI.WebControls.ButtonColumn.

ViewState

Visible

FormatDataTextValue

[C#] protected virtual string FormatDataTextValue(object dataTextValue);

[C++] protected: virtual String* FormatDataTextValue(Object* dataTextValue);

[VB] Overridable Protected Function FormatDataTextValue (ByVal dataTextValue As Object) As String

[JScript] protected function FormatDataTextValue(dataTextValue: Object) String;

Description

Converts the specified value to the format indicated by the System.Web.UI.WebControls.ButtonColumn.DataTextFormatString property.

Return Value: The specified value converted to the format indicated by the System.Web.UI.WebControls.ButtonColumn.DataTextFormatString property.

Use the System.Web.UI.WebControls.ButtonColumn.FormatDataTextValue(System. Object) method to convert the specified value to the format indicated by the System.Web.UI.WebControls.ButtonColumn.DataTextFormatString property. The value to format.

Initialize

[C#] public override void Initialize( );

[C++] public: void Initialize( );

[VB] Overrides Public Sub Initialize( )

[JScript] public override function Initialize( );

Description

Resets the System.Web.UI.WebControls.ButtonColumn to its initial state.

Use the System.Web.UI.WebControls.ButtonColumn.Initialize method to reset the System.Web.UI.WebControls.ButtonColumn to its initial state.

InitializeCell

[C#] public override void InitializeCell(TableCell cell, int columnIndex, ListItemType itemType);

[C++] public: void InitializeCell(TableCell* cell, int columnIndex, ListItemType itemType);

[VB] Overrides Public Sub InitializeCell(ByVal cell As TableCell, ByVal columnIndex As Integer, ByVal itemType As ListItemType)

[JScript] public override function InitializeCell(cell: TableCell, columnIndex: int, itemType: ListItemType);

Description

Initializes a cell in the System.Web.UI.WebControls.ButtonColumn to its initial state.

The System.Web.UI.WebControls.ButtonColumn.InitializeCell(System.Web.UI.WebControls.TableCell,System.Int32,System.Web.UI.WebControls.ListItemType) method resets the specified cell in the System.Web.UI.WebControls.ButtonColumn to its initial state. A System.Web.UI.WebControls.TableCell object that represents the cell to reset. The column number where the cell is located. One of the System.Web.UI.WebControls.ListItemType values.

ButtonColumnType enumeration (System.Web.UI.WebControls)

TrackViewState

Description

Specifies the button type for the System.Web.UI.WebControls.ButtonColumn object.

The System.Web.UI.WebControls.ButtonColumnType enumeration represents the button styles for the System.Web.UI.WebControls.ButtonColumn object.

TrackViewState

[C#] public const ButtonColumnType LinkButton;

[C++] public: const ButtonColumnType LinkButton;

[VB] Public Const LinkButton As ButtonColumnType

[JScript] public var LinkButton: ButtonColumnType;

Description

A column of hyperlink style buttons.

TrackViewState

[C#] public const ButtonColumnType PushButton;

[C++] public: const ButtonColumnType PushButton;

[VB] Public Const PushButton As ButtonColumnType

[JScript] public var PushButton: ButtonColumnType;

Description

A column of push buttons.

Calendar class (System.Web.UI.WebControls)

ToString

Description

Displays a single month calendar that allows the user to select dates and move to the next or previous month.

Use the System.Web.UI.WebControls.Calendar control to display a single month of a calendar on a Web page. The control allows you to select dates and move to the next or previous month. The System.Web.UI.WebControls.Calendar control supports all of the System.Globalization.Calendar types in the System.Globalization namespace. Apart from the Gregorian calendar, this also includes calendars that use different year and month systems, such as the Hjiri calendar.

Calendar

Example Syntax:

ToString

[C#] public Calendar( );

[C++] public: Calendar( );

[VB] Public Sub New( )

[JScript] public function Calendar( );

Description

Initializes a new instance of the System.Web.UI.WebControls.Calendar class.

Use this constructor to create and initialize a new instance of the System.Web.UI.WebControls.Calendar class.

AccessKey

Attributes

BackColor

BorderColor

BorderStyle

BorderWidth

CellPadding

ToString

Description

Gets or sets the amount of space between the contents of a cell and the cell's border.

Use this property to control the spacing between the contents of a cell and the cell's border. The padding amount specified is added to all four sides of a cell. Individual cell sizes cannot be specified.

CellSpacing

ToString

[C#] public int CellSpacing {get; set;}

[C++] public: _property int get_CellSpacing( ); public: _property void set_CellSpacing(int);

[VB] Public Property CellSpacing As Integer

[JScript] public function get CellSpacing( ): int;public function set CellSpacing(int);

Description

Gets or sets the amount of space between cells.

Use this property to control the spacing between individual cells in the calendar. This spacing is applied both vertically and horizontally.

ChildControlsCreated

ClientID

Context

Controls

ControlStyle

ControlStyleCreated

CssClass

DayHeaderStyle

ToString

Description

Gets the style properties for the section that displays the day of the week.

Use this property to specify the style for the section that displays the days of the week. For additional information on the different style properties that can be controlled, see System.Web.UI.WebControls.TableItemStyle.

DayNameFormat

ToString

[C#] public DayNameFormat DayNameFormat {get; set;}

[C++] public: _property DayNameFormat get_DayNameFormat( );public: _property void set_DayNameFormat (DayNameFormat);

[VB] Public Property DayNameFormat As DayNameFormat

[JScript] public function get DayNameFormat( ): DayNameFormat;public function set DayNameFormat(DayNameFormat);

Description

Gets or sets the name format of days of the week.

Use the System.Web.UI.WebControls.Calendar.DayNameFormat property to specify the name format for the days of the week. This property is set with one of the System.Web.UI.WebControls.DayNameFormat enumeration values. You can specify whether the days of the week are displayed as the full name, short (abbreviated) name, first letter of the day, or first two letters of the day.

DayStyle

ToString

[C#] public TableItemStyle DayStyle {get;}

[C++] public: _property TableItemStyle* get_DayStyle( );

[VB] Public ReadOnly Property DayStyle As TableItemStyle

[JScript] public function get DayStyle( ): TableItemStyle;

Description

Gets the style properties for the days in the displayed month.

Use this property to specify the style for the days in the displayed month.

Enabled

EnableViewState

Events

FirstDayOfWeek

ToString

Description

Gets or sets the day of the week to display in the first day column of the System.Web.UI.WebControls.Calendar control.

Use the System.Web.UI.WebControls.Calendar.FirstDayOfWeek property to specify the day of the week to display in the first day column of the System.Web.UI.WebControls.Calendar control. This property is set with one of the System.Web.UI.WebControls.FirstDayOfWeek enumeration values. You can specify any day of the week or FirstDayOfWeek.Default, which indicates that the date is determined by the system settings.

Font

ForeColor

HasChildViewState

Height

ID

IsTrackingViewState

NamingContainer

NextMonthText

ToString

Description

Gets or sets the text displayed for the next month navigation control.

Use the System.Web.UI.WebControls.Calendar.NextMonthText property to provide custom text for the next month navigation control. This property is commonly used along with the System.Web.UI.WebControls.Calendar.PrevMonthText property to provide a custom set of navigation controls.

NextPrevFormat

ToString

[C#] public NextPrevFormat NextPrevFormat {get; set;}

[C++] public: _property NextPrevFormat get_NextPrevFormat( );public: _property void set_NextPrevFormat(NextPrevFormat);

[VB] Public Property NextPrevFormat As NextPrevFormat

[JScript] public function get NextPrevFormat( ): NextPrevFormat;public function set NextPrevFormat(NextPrevFormat);

Description

Gets or sets the format of the next and previous month navigation elements in the title section of the System.Web.UI.WebControls.Calendar control.

Use the System.Web.UI.WebControls.Calendar.NextPrevFormat property to specify the format for the next and previous month navigation elements on the System.Web.UI.WebControls.Calendar control. This property is set with one of the System.Web.UI.WebControls.NextPrevFormat enumeration values. You can specify whether the text for the navigation controls is displayed as the full month name, the short (abbreviated) month name, or custom text.

NextPrevStyle

ToString

[C#] public TableItemStyle NextPrevStyle {get;}

[C++] public: _property TableItemStyle* get_NextPrevStyle( );

[VB] Public ReadOnly Property NextPrevStyle As TableItemStyle

[JScript] public function get NextPrevStyle( ): TableItemStyle;

Description

Gets the style properties for the next and previous month navigation elements.

Use this property to specify the style for the next and previous month navigation elements. For additional information on the different style properties that can be controlled, see System.Web.UI.WebControls.TableItemStyle.

OtherMonthDayStyle

ToString

[C#] public TableItemStyle OtherMonthDayStyle {get;}

[C++] public: _property TableItemStyle* get_OtherMonthDayStyle( );

[VB] Public ReadOnly Property OtherMonthDayStyle As TableItemStyle

[JScript] public function get OtherMonthDayStyle( ): TableItemStyle;

Description

Gets the style properties for the days on the System.Web.UI.WebControls.Calendar control that are not in the displayed month.

Use this property to specify the style for the days on the System.Web.UI.WebControls.Calendar control that are not in the displayed month. If the System.Web.UI.WebControls.Calendar.OtherMonthDayStyle property is not set, the style specified in the System.Web.UI.WebControls.Calendar.DayStyle property is used.

Page

Parent

PrevMonthText

ToString

Description

Gets or sets the text displayed for the previous month navigation control.

Use the System.Web.UI.WebControls.Calendar.PrevMonthText property to provide custom text for the previous month navigation control. This property is commonly used along with the System.Web.UI.WebControls.Calendar.NextMonthText property to provide a custom set of navigation controls.

SelectedDate

ToString

[C#] public DateTime SelectedDate {get; set;}

[C++] public: _property DateTime get_SelectedDate( );public: _property void set_SelectedDate(DateTime);

[VB] Public Property SelectedDate As DateTime

[JScript] public function get SelectedDate( ): DateTime;public function set SelectedDate(DateTime);

Description

Gets or sets the selected date.

Use the System.Web.UI.WebControls.Calendar.SelectedDate property to determine the selected date on the System.Web.UI.WebControls.Calendar control. The System.Web.UI.WebControls.Calendar.SelectedDate property is typically used when the System.Web.UI.WebControls.Calendar.SelectionMode property is set to CalendarSelectionMode.Day. This setting only allows a single date selection from the System.Web.UI.WebControls.Calendar control.

SelectedDates

ToString

[C#] public SelectedDatesCollection SelectedDates {get;}

[C++] public: _property SelectedDatesCollection* get_SelectedDates( );

[VB] Public ReadOnly Property SelectedDates As SelectedDatesCollection

[JScript] public function get SelectedDates( ): SelectedDatesCollection;

Description

Gets a collection of System.DateTime objects that represent the selected dates on the System.Web.UI.WebControls.Calendar control.

Use the System.Web.UI.WebControls.Calendar.SelectedDates collection to determine the currently selected dates on the System.Web.UI.WebControls.Calendar control. This property is typically used when the System.Web.UI.WebControls.Calendar.SelectionMode property is set to CalendarSelectionMode.DayWeek or CalendarSelectionMode.DayWeekMonth. These settings allow you to select multiple dates from the System.Web.UI.WebControls.Calendar control by week or month.

SelectedDayStyle

ToString

[C#] public TableItemStyle SelectedDayStyle {get;}

[C++] public: _property TableItemStyle* get_SelectedDayStyle( );

[VB] Public ReadOnly Property SelectedDayStyle As TableItemStyle

[JScript] public function get SelectedDayStyle( ): TableItemStyle;

Description

Gets the style properties for the selected dates.

Use this property to specify the style for the selected dates on the System.Web.UI.WebControls.Calendar control. If the System.Web.UI.WebControls.Calendar.SelectedDayStyle property is not set, the style specified in the System.Web.UI.WebControls.Calendar.DayStyle property is used.

SelectionMode

ToString

[C#] public CalendarSelectionMode SelectionMode {get; set;}

[C++] public: _property CalendarSelectionMode get_SelectionMode( );public: _property void set_SelectionMode (CalendarSelectionMode);

[VB] Public Property SelectionMode As CalendarSelectionMode

[JScript] public function get SelectionMode( ): CalendarSelectionMode;public function set SelectionMode(CalendarSelectionMode);

Description

Gets or sets the date selection mode on the System.Web.UI.WebControls.Calendar control that specifies whether the user can select a single day, a week, or an entire month.

Use the System.Web.UI.WebControls.Calendar.SelectionMode property to specify the date selection mode on the System.Web.UI.WebControls.Calendar control. This property is set with one of the System.Web.UI.WebControls.CalendarSelectionMode enumeration values. You can specify whether the user can select a single day, a week, or an entire month, or you can disable date selection capability entirely.

SelectMonthText

ToString

[C#] public string SelectMonthText {get; set;}

[C++] public: _property String* get_SelectMonthText( );public: _property void set_SelectMonthText (String*);

[VB] Public Property SelectMonthText As String

[JScript] public function get SelectMonthText( ): String;public function set SelectMonthText(String);

Description

Gets or sets the text displayed for the month selection element in the selector column.

Use the System.Web.UI.WebControls.Calendar.SelectMonthText property to provide custom text for the month selection element in the selector column.

SelectorStyle

ToString

[C#] public TableItemStyle SelectorStyle {get;}

[C++] public: _property TableItemStyle* get_SelectorStyle( );

[VB] Public ReadOnly Property SelectorStyle As TableItemStyle

[JScript] public function get SelectorStyle( ): TableItemStyle;

Description

Gets the style properties for the week and month selector column.

Use this property to specify the style for the week and month selector column. For additional information on the different style properties that can be controlled, see System.Web.UI.WebControls.TableItemStyle.

SelectWeekText

ToString

[C#] public string SelectWeekText {get; set;}

[C++] public: _property String* get_SelectWeekText( );public: _property void set_SelectWeekText(String*);

[VB] Public Property SelectWeekText As String

[JScript] public function get SelectWeekText( ): String;public function set SelectWeekText(String);

Description

Gets or sets the text displayed for the week selection element in the selector column.

Use the System.Web.UI.WebControls.Calendar.SelectWeekText property to provide custom text for the week selection element in the selector column.

ShowDayHeader

ToString

[C#] public bool ShowDayHeader {get; set;}

[C++] public: _property bool get_ShowDayHeader( ); public: _property void set_ShowDayHeader(bool);

[VB] Public Property ShowDayHeader As Boolean

[JScript] public function get_ShowDayHeader( ): Boolean; public function set ShowDayHeader(Boolean);

Description

Gets or sets a value indicating whether the heading for the days of the week is displayed.

Use the System.Web.UI.WebControls.Calendar.ShowDayHeader property to specify whether the heading for the days of the week is displayed.

ShowGridLines

ToString

[C#] public bool ShowGridLines {get; set;}

[C++] public: _property bool get_ShowGridLines( ); public: _property void set_ShowGridLines(bool);

[VB] Public Property ShowGridLines As Boolean

[JScript] public function get_ShowGridLines( ): Boolean; public function set ShowGridLines(Boolean);

Description

Gets or sets a value indicating whether the days on the System.Web.UI.WebControls.Calendar control are separated with grid lines.

Use the System.Web.UI.WebControls.Calendar.ShowGridLines property to specify whether the days on the System.Web.UI.WebControls.Calendar control are separated with grid lines.

ShowNextPrevMonth

ToString

[C#] public bool ShowNextPrevMonth {get; set;}

[C++] public: _property bool get_ShowNextPrevMonth( );public: _property void set_ShowNextPrevMonth (bool);

[VB] Public Property ShowNextPrevMonth As Boolean

[JScript] public function get ShowNextPrevMonth( ): Boolean;public function set ShowNextPrevMonth(Boolean);

Description

Gets or sets a value indicating whether the System.Web.UI.WebControls.Calendar control displays the next and previous month navigation elements in the title section.

Use the System.Web.UI.WebControls.Calendar.ShowNextPrevMonth property to specify whether the next and previous month navigation elements are displayed in the title section.

ShowTitle

ToString

[C#] public bool ShowTitle {get; set;}

[C++] public: _property bool get_ShowTitle( );public: _property void set_ShowTitle(bool);

[VB] Public Property ShowTitle As Boolean

[JScript] public function get_ShowTitle( ): Boolean;public function set ShowTitle(Boolean);

Description

Gets or sets a value indicating whether the title section is displayed.

Use the System.Web.UI.WebControls.Calendar.ShowTitle property to specify whether the title section is displayed.

Site

Style

TabIndex

TagKey

TagName

TemplateSourceDirectory

TitleFormat

ToString

Description

Gets or sets the title format for the title section.

Use the System.Web.UI.WebControls.Calendar.TitleFormat property to specify the format for the title section. This property is set with one of the System.Web.UI.WebControls.TitleFormat enumeration values. You can specify whether the title displays as the month or both the month and the year.

TitleStyle

ToString

[C#] public TableItemStyle TitleStyle {get;}

[C++] public: _property TableItemStyle* get_TitleStyle( );

[VB] Public ReadOnly Property TitleStyle As TableItemStyle

[JScript] public function get TitleStyle( ): TableItemStyle;

Description

Gets the style properties of the title heading for the System.Web.UI.WebControls.Calendar control.

Use this property to specify the style for the title heading of the System.Web.UI.WebControls.Calendar control. For additional information on the different style properties that can be controlled, see System.Web.UI.WebControls.TableItemStyle.

TodayDayStyle

ToString

[C#] public TableItemStyle TodayDayStyle {get;}

[C++] public: _property TableItemStyle* get_TodayDayStyle( );

[VB] Public ReadOnly Property TodayDayStyle As TableItemStyle

[JScript] public function get TodayDayStyle( ): TableItemStyle;

Description

Gets the style properties for today's date on the System.Web.UI.WebControls.Calendar control.

Use this property to specify the style for today's date on the System.Web.UI.WebControls.Calendar control. If the System.Web.UI.WebControls.Calendar.TodayDayStyle property is not set, the style specified in the System.Web.UI.WebControls.Calendar.DayStyle property is used.

TodaysDate

ToString

[C#] public DateTime TodaysDate {get; set;}

[C++] public: _property DateTime get_TodaysDate( );

public: _property void set_TodaysDate(DateTime);

[VB] Public Property TodaysDate As DateTime

[JScript] public function get TodaysDate( ): DateTime;public function set TodaysDate(DateTime);

Description

Gets or sets the value for today's date.

Use the System.Web.UI.WebControls.Calendar.TodaysDate property to determine today's date. You can also use this property to programmatically set the value for today's date on the System.Web.UI.WebControls.Calendar control. This property is set using a System.DateTime object.

ToolTip

UniqueID

ViewState

ViewStateIgnoresCase

Visible

VisibleDate

ToString

Description

Gets or sets the date that specifies the month to display on the System.Web.UI.WebControls.Calendar control.

Use the System.Web.UI.WebControls.Calendar.VisibleDate property to programmatically set the month to display on the System.Web.UI.WebControls.Calendar control. The specified date can be any date in the month you want to display, although it is common to use the first date in the month. This property is set using a System.DateTime object.

WeekendDayStyle

ToString

[C#] public TableItemStyle WeekendDayStyle {get;}

[C++] public: _property TableItemStyle* get_WeekendDayStyle( );

[VB] Public ReadOnly Property WeekendDayStyle As TableItemStyle

[JScript] public function get WeekendDayStyle( ): TableItemStyle;

Description

Gets the style properties for the weekend dates on the System.Web.UI.WebControls.Calendar control.

Use this property to specify the style for the weekend dates on the System.Web.UI.WebControls.Calendar control. If the System.Web.UI.WebControls.Calendar.WeekendDayStyle property is not set, the style specified in the System.Web.UI.WebControls.Calendar.DayStyle property is used.

Width

ToString

Description

Occurs when each day is created in the control hierarchy for the System.Web.UI.WebControls.Calendar control.

This event is raised when each day is created in the control hierarchy for the System.Web.UI.WebControls.Calendar control.

ToString

Description

Occurs when the user selects a day, a week, or an entire month by clicking the date selector controls.

This event is raised when the user selects a day, a week, or an entire month by clicking the date selector controls.

ToString

Description

Occurs when the user clicks on the next or previous month navigation controls on the title heading.

This event is raised when the user clicks on the next or previous month navigation elements on the title heading.

CreateControlCollection

[C#] protected override ControlCollection CreateControlCollection( );

[C++] protected: ControlCollection* CreateControlCollection( );

[VB] Overrides Protected Function CreateControlCollection( ) As ControlCollection

[JScript] protected override function CreateControlCollection( ): ControlCollection;

Description

HasWeekSelectors

[C#] protected bool HasWeekSelectors(CalendarSelectionMode selectionMode);

[C++] protected: bool HasWeekSelectors(CalendarSelectionMode selectionMode);

[VB] Protected Function HasWeekSelectors(ByVal selectionMode As CalendarSelectionMode) As Boolean

[JScript] protected function HasWeekSelectors(selectionMode: CalendarSelectionMode): Boolean;

Description

Determines if a System.Web.UI.WebControls.CalendarSelectionMode contains week selectors.

Return Value: true if the System.Web.UI.WebControls.CalendarSelectionMode contains week selectors; otherwise false.

System.Web.UI.WebControls.CalendarSelectionMode values of DayWeek and DayWeekMonth contains week selectors. One of the System.Web.UI.WebControls.CalendarSelectionMode values.

LoadViewState

[C#] protected override void LoadViewState(object savedState);

[C++] protected: void LoadViewState(Object* savedState);

[VB] Overrides Protected Sub LoadViewState(ByVal savedState As Object)

[JScript] protected override function LoadViewState(savedState: Object);

Description

Loads a saved state of the System.Web.UI.WebControls.Calendar. An System.Object that contains the saved condition of the System.Web.UI.WebControls.Calendar.

OnDayRender

[C#] protected virtual void OnDayRender(TableCell cell, CalendarDay day);

[C++] protected: virtual void OnDayRender(TableCell* cell, CalendarDay* day);

[VB] Overridable Protected Sub OnDayRender(ByVal cell As TableCell, ByVal day As CalendarDay)

[JScript] protected function OnDayRender(cell: TableCell, day: CalendarDay);

Description

Raises the System.Web.UI.WebControls.Calendar.DayRender event of the System.Web.UI.WebControls.Calendar control and allows you to provide a custom handler for the System.Web.UI.WebControls.Calendar.DayRender event.

Although databinding is not supported for the System.Web.UI.WebControls.Calendar control, it is possible modify the content and formatting of the individual date cells. Before the System.Web.UI.WebControls.Calendar control is displayed on the Web page, it creates and assembles the components that make up the control. The System.Web.UI.WebControls.Calendar.DayRender event is raised when each date cell in System.Web.UI.WebControls.Calendar control is created. You can control the contents and formatting of a date cell when it is created by providing code in the event handler for the System.Web.UI.WebControls.Calendar.DayRender event. A System.Web.UI.WebControls.TableCell that contains information about the cell to render. A System.Web.UI.WebControls.CalendarDay that contains information about the day to render.

OnSelectionChanged

[C#] protected virtual void OnSelectionChanged( );

[C++] protected: virtual void OnSelectionChanged( );

[VB] Overridable Protected Sub OnSelectionChanged( )

[JScript] protected function OnSelectionChanged( );

Description

Raises the System.Web.UI.WebControls.Calendar.SelectionChanged event of the System.Web.UI.WebControls.Calendar control and allows you to provide a custom handler for the System.Web.UI.WebControls.Calendar.SelectionChanged event.

The System.Web.UI.WebControls.Calendar.SelectionChanged event is raised when the user selects a day, a week, or an entire month by clicking the date selector controls.

OnVisibleMonthChanged

[C#] protected virtual void OnVisibleMonthChanged(DateTime newDate, DateTime previousDate);

[C++] protected: virtual void OnVisibleMonthChanged(DateTime newDate, DateTime previousDate);

[VB] Overridable Protected Sub OnVisibleMonthChanged (ByVal newDate As DateTime, ByVal previousDate As DateTime)

[JScript] protected function OnVisibleMonthChanged(newDate: DateTime, previousDate: DateTime);

Description

Raises the System.Web.UI.WebControls.Calendar.VisibleMonthChanged event of the System.Web.UI.WebControls.Calendar control and allows you to provide a custom handler for the System.Web.UI.WebControls.Calendar.VisibleMonthChanged event.

The System.Web.UI.WebControls.Calendar.VisibleMonthChanged event is raised when the user clicks on the next or previous month navigation elements on the title section. A System.DateTime object that represents the month currently displayed in the System.Web.UI.WebControls.Calendar control. A System.DateTime object that represents the previous month displayed by the System.Web.UI.WebControls.Calendar control.

Render

[C#] protected override void Render(HtmlTextWriter writer);

[C++] protected: void Render(HtmlTextWriter* writer);

[VB] Overrides Protected Sub Render(ByVal writer As HtmlTextWriter)

[JScript] protected override function Render(writer: HtmlTextWriter);

Description

Displays the System.Web.UI.WebControls.Calendar control on the client. An System.Web.UI.HtmlTextWriter that contains the output stream for rendering on the client.

SaveViewState

[C#] protected override object SaveViewState( );

[C++] protected: Object* SaveViewState( );

[VB] Overrides Protected Function SaveViewState( ) As Object

[JScript] protected override function SaveViewState( ): Object;

Description

Stores the state of the System.Web.UI.WebControls.Calendar.

Return Value: An object that contains the saved state of the System.Web.UI.WebControls.Calendar.

IPostBackEventHandler.RaisePostBackEvent

[C#] void IPostBackEventHandler.RaisePostBackEvent (string eventArgument);

[C++] void IPostBackEventHandler::RaisePostBackEvent (String* eventArgument);

[VB] Sub RaisePostBackEvent(ByVal eventArgument As String) Implements IPostBackEventHandler.RaisePostBackEvent

[JScript] function IPostBackEventHandler.RaisePostBackEvent(eventArgument: String);

TrackViewState

[C#] protected override void TrackViewState( );

[C++] protected: void TrackViewState( );

[VB] Overrides Protected Sub TrackViewState( )

[JScript] protected override function TrackViewState( );

Description

Marks the starting point to begin tracking and saving changes to the control as part of the control viewstate.

CalendarDay class (System.Web.UI.WebControls)

TrackViewState

Description

Represents a date in the System.Web.UI.WebControls.Calendar control.

A System.Web.UI.WebControls.CalendarDay object represents a date in the System.Web.UI.WebControls.Calendar control. You can use this class in the System.Web.UI.WebControls.Calendar.DayRender event handler to programmatically access the properties of a date as it is rendered on the System.Web.UI.WebControls.Calendar control. This allows you to determine the properties of the day (such as whether the date is selectable, selected, today's date, or a weekend date) and programmatically control the appearance or behavior of the day.

CalendarDay

Example Syntax:

TrackViewState

[C#] public CalendarDay(DateTime date, bool isWeekend, bool isToday, bool isSelected, bool isOtherMonth, string dayNumberText);

[C++] public: CalendarDay(DateTime date, bool isWeekend, bool isToday, bool isSelected, bool isOtherMonth, String* dayNumberText);

[VB] Public Sub New(ByVal date As DateTime, ByVal isWeekend As Boolean, ByVal isToday As Boolean, ByVal isSelected As Boolean, ByVal isOtherMonth As Boolean, ByVal dayNumberText As String)

[JScript] public function CalendarDay(date: DateTime, isWeekend: Boolean, isToday: Boolean, isSelected: Boolean, isOtherMonth: Boolean, dayNumberText: String);

Description

Initializes a new instance of the System.Web.UI.WebControls.CalendarDay class.

The following table shows initial property values for an instance of System.Web.UI.WebControls.CalendarDay. A System.DateTime object that contains the date represented by an instance of this class. true to indicate that the date represented by an instance of this class is either a Saturday or a Sunday; otherwise, false. true to indicate that the date represented by an instance of this class is the current date; otherwise, false. true to indicate that the date represented by an instance of this class is selected on the System.Web.UI.WebControls.Calendar control; otherwise, false. true to indicate that the date represented by an instance of this class is in a month other than the displayed month on the System.Web.UI.WebControls.Calendar control; otherwise, false. The day number for the date represented by this class.

Date

TrackViewState

[C#] public DateTime Date {get;}

[C++] public: _property DateTime get_Date( );

[VB] Public ReadOnly Property Date As DateTime

[JScript] public function get Date( ): DateTime;

Description

Gets the date represented by an instance of this class. This property is read-only.

Use the System.Web.UI.WebControls.CalendarDay.Date property to programmatically determine the date represented by an instance of this class.

DayNumberText

TrackViewState

[C#] public string DayNumberText {get;}

[C++] public: _property String* get_DayNumberText( );

[VB] Public ReadOnly Property DayNumberText As String

[JScript] public function get DayNumberText( ): String;

Description

Gets the string equivalent of the day number for the date represented by an instance of the System.Web.UI.WebControls.CalendarDay class. This property is read-only.

Use the System.Web.UI.WebControls.CalendarDay.DayNumberText property to determine the string equivalent of the day number for the date represented by an instance of this class. This allows you to programmatically control the appearance or behavior of the day, based on this value.

IsOtherMonth

TrackViewState

[C#] public bool IsOtherMonth {get;}

[C++] public: _property bool get_IsOtherMonth( );

[VB] Public ReadOnly Property IsOtherMonth As Boolean

[JScript] public function get IsOtherMonth( ): Boolean;

Description

Gets a value that indicates whether the date represented by an instance of this class is in a month other than the month displayed in the System.Web.UI.WebControls.Calendar control. This property is read-only.

Use the System.Web.UI.WebControls.CalendarDay.IsOtherMonth property to programmatically determine whether the date represented by an instance of this class is in a month other than the month displayed in the System.Web.UI.WebControls.Calendar control. This allows you to programmatically control the appearance or behavior of the day based on this value.

IsSelectable

TrackViewState

[C#] public bool IsSelectable {get; set;}

[C++] public: _property bool get_IsSelectable( );

public: _property void set_IsSelectable(bool);

[VB] Public Property IsSelectable As Boolean

[JScript] public function get IsSelectable( ): Boolean;public function set IsSelectable(Boolean);

Description

Gets or sets a value that indicates whether the date represented by an instance of this class can be selected in the System.Web.UI.WebControls.Calendar control.

Use the System.Web.UI.WebControls.CalendarDay.IsSelectable property to specify or determine whether the date represented by an instance of this class can be selected in the System.Web.UI.WebControls.Calendar control. This allows you to programmatically control the appearance behavior of the day, based on this value.

IsSelected

TrackViewState

[C#] public bool IsSelected {get;}

[C++] public: _property bool get_IsSelected( );

[VB] Public ReadOnly Property IsSelected As Boolean

[JScript] public function get IsSelected( ): Boolean;

Description

Gets a value that indicates whether the date represented by an instance of this class is selected in the System.Web.UI.WebControls.Calendar control. This property is read-only.

Use the System.Web.UI.WebControls.CalendarDay.IsSelected property to programmatically determine whether the date represented by an instance of this class is selected in the System.Web.UI.WebControls.Calendar control. This allows you to programmatically control the appearance or behavior of the day, based on this value.

IsToday

TrackViewState

[C#] public bool IsToday {get;}

[C++] public: _property bool get_IsToday( );

[VB] Public ReadOnly Property IsToday As Boolean

[JScript] public function get IsToday( ): Boolean;

Description

Gets a value that indicates whether the date represented by an instance of this class is the same date specified by the System.Web.UI.WebControls.Calendar.TodaysDate property of the System.Web.UI.WebControls.Calendar control. This property is read-only.

Use the System.Web.UI.WebControls.CalendarDay.IsToday property to programmatically determine whether the date represented by an instance of this class is the same date specified by the System.Web.UI.WebControls.Calendar.TodaysDate property of the System.Web.UI.WebControls.Calendar control. This allows you to programmatically control the appearance or behavior of the day, based on this value.

IsWeekend

TrackViewState

[C#] public bool IsWeekend {get;}

[C++] public: _property bool get_IsWeekend( );

[VB] Public ReadOnly Property IsWeekend As Boolean

[JScript] public function get IsWeekend( ): Boolean;

Description

Gets a value that indicates whether the date represented by an instance of this class is a either Saturday or Sunday. This property is read-only.

Use the System.Web.UI.WebControls.CalendarDay.IsWeekend property to programmatically determine whether the date represented by an instance of this class is either a Saturday or a Sunday. This allows you to programmatically control the appearance or behavior of the day, based on this value.

CalendarSelectionMode enumeration (System.Web.UI.WebControls)

ToString

Description

Specifies the date selection mode of the System.Web.UI.WebControls.Calendar control.

The System.Web.UI.WebControls.CalendarSelectionMode enumeration represents the date selection modes of the System.Web.UI.WebControls.Calendar control.

ToString

[C#] public const CalendarSelectionMode Day;

[C++] public: const CalendarSelectionMode Day;

[VB] Public Const Day As CalendarSelectionMode

[JScript] public var Day: CalendarSelectionMode;

Description

A single date can be selected on the System.Web.UI.WebControls.Calendar control.

ToString

[C#] public const CalendarSelectionMode DayWeek;

[C++] public: const CalendarSelectionMode DayWeek;

[VB] Public Const DayWeek As CalendarSelectionMode

[JScript] public var DayWeek: CalendarSelectionMode;

Description

A single day or entire week can be selected on the System.Web.UI.WebControls.Calendar control.

ToString

[C#] public const CalendarSelectionMode DayWeekMonth;

[C++] public: const CalendarSelectionMode DayWeekMonth;

[VB] Public Const DayWeekMonth As CalendarSelectionMode

[JScript] public var DayWeekMonth: CalendarSelectionMode;

Description

A single date, week, or entire month can be selected on the System.Web.UI.WebControls.Calendar control.

ToString

[C#] public const CalendarSelectionMode None;

[C++] public: const CalendarSelectionMode None;

[VB] Public Const None As CalendarSelectionMode

[JScript] public var None: CalendarSelectionMode;

Description

No dates can be selected on the System.Web.UI.WebControls.Calendar control.

TableRow.CellControlCollection class (System.Web.UI.WebControls)

ToString

Description

Count

IsReadOnly

IsSynchronized

Item

Owner

SyncRoot

Add

[C#] public override void Add(Control child);

[C++] public: void Add(Control* child);

[VB] Overrides Public Sub Add(ByVal child As Control)

[JScript] public override function Add(child: Control);

Description

Adds the specified System.Web.UI.Control object to the collection. The new control is added to the end of the array.

AddAt

[C#] public override void AddAt(int index, Control child);

[C++] public: void AddAt(int index, Control* child);

[VB] Overrides Public Sub AddAt(ByVal index As Integer, ByVal child As Control)

[JScript] public override function AddAt(index: int, child: Control);

Description

Adds the specified System.Web.UI.Control object to the collection. The new control is added to the array at the specified index location. The location in the array to add the child control. The Control object to add to the collection.

CheckBox class (System.Web.UI.WebControls)

ToString

Description

Displays a check box that allows the user to select a true or false condition.

Use the System.Web.UI.WebControls.CheckBox control to allow the user to select a true or false state.

CheckBox

Example Syntax:

ToString

[C#] public CheckBox( );

[C++] public: CheckBox( );

[VB] Public Sub New( )

[JScript] public function CheckBox( );

Description

Initializes a new instance of the System.Web.UI.WebControls.CheckBox class.

Use this constructor to create and initialize a new instance of the System.Web.UI.WebControls.CheckBox class.

AccessKey

Attributes

AutoPostBack

ToString

Description

Gets or sets a value indicating whether the System.Web.UI.WebControls.CheckBox state automatically posts back to the server when clicked.

Use this property to specify whether the state of the System.Web.UI.WebControls.CheckBox control is posted back to the server when clicked.

BackColor

BorderColor

BorderStyle

BorderWidth

Checked

ToString

Description

Gets or sets a value indicating whether the System.Web.UI.WebControls.CheckBox control is checked.

Use this property to determine whether the System.Web.UI.WebControls.CheckBox control is checked. This property can also be used to programmatically set the state of the System.Web.UI.WebControls.CheckBox control.

ChildControlsCreated

ClientID

Context

Controls

ControlStyle

ControlStyleCreated

CssClass

Enabled

EnableViewState

Events

Font

ForeColor

HasChildViewState

Height

ID

IsTrackingViewState

NamingContainer

Page

Parent

Site

Style

TabIndex

TagKey

TagName

TemplateSourceDirectory

Text

ToString

Description

Gets or sets the text label associated with the System.Web.UI.WebControls.CheckBox.

Use this property to specify the text label associated with the System.Web.UI.WebControls.CheckBox control. This property can also be used to programmatically get the text label associated with the System.Web.UI.WebControls.CheckBox control.

TextAlign

ToString

[C#] public virtual TextAlign TextAlign {get; set;}

[C++] public: _property virtual TextAlign get_TextAlign( );public: _property virtual void set_TextAlign(TextAlign);

[VB] Overridable Public Property TextAlign As TextAlign

[JScript] public function get TextAlign( ): TextAlign;public function set TextAlign(TextAlign);

Description

Gets or sets the alignment of the text label associated with the System.Web.UI.WebControls.CheckBox control.

Use this property to specify the alignment of the text label associated with the System.Web.UI.WebControls.CheckBox control. You can specify whether the text label appears to the right or left of the check box. Use the System.Web.UI.WebControls.CheckBox.Text property to specify the label text.

ToolTip

UniqueID

ViewState

ViewStateIgnoresCase

Visible

Width

ToString

Description

Occurs when the System.Web.UI.WebControls.CheckBox.Checked property is changed.

The System.Web.UI.WebControls.CheckBox.CheckedChanged event is raised when the System.Web.UI.WebControls.CheckBox.Checked property is changed.

OnCheckedChanged

[C#] protected virtual void OnCheckedChanged(EventArgs e);

[C++] protected: virtual void OnCheckedChanged(EventArgs* e);

[VB] Overridable Protected Sub OnCheckedChanged(ByVal e As EventArgs)

[JScript] protected function OnCheckedChanged(e: EventArgs);

Description

Raises the System.Web.UI.WebControls.CheckBox.CheckedChanged event of the System.Web.UI.WebControls.CheckBox control. This allows you to handle the event directly.

The System.Web.UI.WebControls.CheckBox.CheckedChanged event is raised when the System.Web.UI.WebControls.CheckBox.Checked property is changed. A System.EventArgs that contains the event data.

OnPreRender

[C#] protected override void OnPreRender(EventArgs e);

[C++] protected: void OnPreRender(EventArgs* e);

[VB] Overrides Protected Sub OnPreRender(ByVal e As EventArgs)

[JScript] protected override function OnPreRender(e: EventArgs);

Description

Registers client script for generating postback prior to rendering on the client if System.Web.UI.WebControls.CheckBox.AutoPostBack is true.

Render

[C#] protected override void Render(HtmlTextWriter writer);

[C++] protected: void Render(HtmlTextWriter* writer);

[VB] Overrides Protected Sub Render(ByVal writer As HtmlTextWriter)

[JScript] protected override function Render(writer: HtmlTextWriter);

Description

Displays the System.Web.UI.WebControls.CheckBox on the client. A System.Web.UI.HtmlTextWriter that contains the output stream to render on the client.

IPostBackDataHandler.LoadPostData

[C#] bool IPostBackDataHandler.LoadPostData(string postDataKey, NameValueCollection postCollection);

[C++] bool IPostBackDataHandler::LoadPostData(String* postDataKey, NameValueCollection* postCollection);

[VB] Function LoadPostData(ByVal postDataKey As String, ByVal postCollection As NameValueCollection) As Boolean Implements IPostBackDataHandler.LoadPostData

[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );

[C++] void IPostBackDataHandler::RaisePostDataChangedEvent( );

[VB] Sub RaisePostDataChangedEvent( ) Implements IPostBackDataHandler.RaisePostDataChangedEvent

[JScript] function IPostBackDataHandler.RaisePostDataChangedEvent( );

CheckBoxList class (System.Web.UI.WebControls)

TrackViewState

Description

Creates a multi selection check box group that can be dynamically created by binding the control to a data source.

The System.Web.UI.WebControls.CheckBoxList control provides a multi selection check box group that can be dynamically generated with data binding. It contains an System.Web.UI.WebControls.ListControl.Items collection with members that correspond to individual items in the list. To determine which items are checked, loop through and test the System.Web.UI.WebControls.ListItem.Selected property of each item in the list.

CheckBoxList

Example Syntax:

TrackViewState

[C#] public CheckBoxList( );

[C++] public: CheckBoxList( );

[VB] Public Sub New( )

[JScript] public function CheckBoxList( );

Description

Initializes a new instance of the System.Web.UI.WebControls.CheckBoxList class.

Use this constructor to create and initialize a new instance of the System.Web.UI.WebControls.CheckBoxList class.

AccessKey

Attributes

AutoPostBack

BackColor

BorderColor

BorderStyle

BorderWidth

CellPadding

TrackViewState

Description

Gets or sets the distance (in pixels) between the border and contents of the cell.

Use this property to control the spacing between the contents of a cell and the cell's border in the System.Web.UI.WebControls.CheckBoxList control.

CellSpacing

TrackViewState

[C#] public virtual int CellSpacing {get; set;}

[C++] public: _property virtual int get_CellSpacing( );

public: _property virtual void set_CellSpacing(int);

[VB] Overridable Public Property CellSpacing As Integer

[JScript] public function get CellSpacing( ): int;public function set CellSpacing(int);

Description

Gets or sets the distance (in pixels) between cells.

Use this property to control the spacing between individual cells in the System.Web.UI.WebControls.CheckBoxList control. This property is applied both vertically and horizontally.

ChildControlsCreated

ClientID

Context

Controls

ControlStyle

ControlStyleCreated

CssClass

DataMember

DataSource

DataTextField

DataTextFormatString

DataValueField

Enabled

EnableViewState

Events

Font

ForeColor

HasChildViewState

Height

ID

IsTrackingViewState

Items

NamingContainer

Page

Parent

RepeatColumns

TrackViewState

Description

Gets or sets the number of columns to display in the System.Web.UI.WebControls.CheckBoxList control.

Use this property to specify the number of columns that display items in the System.Web.UI.WebControls.CheckBoxList control. If this property is not set, the System.Web.UI.WebControls.CheckBoxList control displays all list items in a single column.

RepeatDirection

TrackViewState

[C#] public virtual RepeatDirection RepeatDirection {get; set;}

[C++] public: _property virtual RepeatDirection get_RepeatDirection( );public: _property virtual void set_RepeatDirection(RepeatDirection);

[VB] Overridable Public Property RepeatDirection As RepeatDirection

[JScript] public function get RepeatDirection( ): RepeatDirection;public function set RepeatDirection(RepeatDirection);

Description

Gets or sets a value that indicates whether the control displays vertically or horizontally.

Use this property to specify the display direction of the System.Web.UI.WebControls.CheckBoxList control.

RepeatLayout

TrackViewState

[C#] public virtual RepeatLayout RepeatLayout {get; set;}

[C++] public: _property virtual RepeatLayout get_RepeatLayout( );public: _property virtual void set_RepeatLayout (RepeatLayout);

[VB] Overridable Public Property RepeatLayout As RepeatLayout

[JScript] public function get RepeatLayout( ): RepeatLayout; public function set RepeatLayout(RepeatLayout);

Description

Gets or sets the layout of the check boxes.

Use this property to specify whether the items in the System.Web.UI.WebControls.CheckBoxList control are displayed in a table. If this property is set to RepeatLayout.Table, the items in the list are displayed in a table. If this property is set to RepeatLayout.Flow, the items in the list are displayed without a table structure.

SelectedIndex

SelectedItem

Site

Style

TabIndex

TagKey

TagName

TemplateSourceDirectory

TextAlign

TrackViewState

Description

Gets or sets the text alignment for the check boxes within the group.

Use this property to specify whether the text associated with the check boxes appears on the left or right of the check box. If this property is set to TextAlign.Right, the text is displayed to the right of the check box. If this property is set to TextAlign.Left, the text is displayed to the left of the check box.

ToolTip

UniqueID

ViewState

ViewStateIgnoresCase

Visible

Width

CreateControlStyle

[C#] protected override Style CreateControlStyle( );

[C++] protected: Style* CreateControlStyle( );

[VB] Overrides Protected Function CreateControlStyle( ) As Style

[JScript] protected override function CreateControlStyle( ): Style;

Description

Creates a new control style object.

Return Value: A System.Web.UI.WebControls.Style that contains the style properties of a control.

FindControl

[C#] protected override Control FindControl(string id, int pathOffset);

[C++] protected: Control* FindControl(String* id, int pathOffset);

[VB] Overrides Protected Function FindControl(ByVal id As String, ByVal pathOffset As Integer) As Control

[JScript] protected override function FindControl(id: String, pathOffset: int) Control;

Description

Catches post data for each System.Web.UI.WebControls.CheckBox in the list.

OnPreRender

[C#] protected override void OnPreRender(EventArgs e);

[C++] protected: void OnPreRender(EventArgs* e);

[VB] Overrides Protected Sub OnPreRender(ByVal e As EventArgs)

[JScript] protected override function OnPreRender(e: EventArgs);

Description

Configures the System.Web.UI.WebControls.CheckBoxList prior to rendering on the client.

Render

[C#] protected override void Render(HtmlTextWriter writer);

[C++] protected: void Render(HtmlTextWriter* writer);

[VB] Overrides Protected Sub Render(ByVal writer As HtmlTextWriter)

[JScript] protected override function Render(writer: HtmlTextWriter);

Description

Displays the System.Web.UI.WebControls.CheckBoxList on the client. A System.Web.UI.HtmlTextWriter that contains the output stream for rendering on the client.

IPostBackDataHandler.LoadPostData

[C#] bool IPostBackDataHandler.LoadPostData(string postDataKey, NameValueCollection postCollection);

[C++] bool IPostBackDataHandler::LoadPostData(String* postDataKey, NameValueCollection* postCollection);

[VB] Function LoadPostData(ByVal postDataKey As String, ByVal postCollection As NameValueCollection) As Boolean Implements IPostBackDataHandler.LoadPostData

[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );

[C++] void IPostBackDataHandler::RaisePostDataChangedEvent( );

[VB] Sub RaisePostDataChangedEvent( ) Implements IPostBackDataHandler.RaisePostDataChangedEvent

[JScript] function IPostBackDataHandler.RaisePostDataChangedEvent( );

IRepeatInfoUser. GetItemStyle

[C#] Style IRepeatInfoUser.GetItemStyle(ListItemType itemType, int repeatIndex);

[C++] Style* IRepeatInfoUser::GetItemStyle(ListItemType itemType, int repeatIndex);

[VB] Function GetItemStyle(ByVal itemType As ListItemType, ByVal repeatIndex As Integer) As Style Implements IRepeatInfoUser.GetItemStyle

[JScript] function IRepeatInfoUser.GetItemStyle(itemType: ListItemType, repeatIndex: int): Style;

IRepeatInfoUser.RenderItem

[C#] void IRepeatInfoUser.RenderItem(ListItemType itemType, int repeatIndex, RepeatInfo repeatInfo, HtmlTextWriter writer);

[C++] void IRepeatInfoUser::RenderItem(ListItemType itemType, int repeatIndex, RepeatInfo* repeatInfo, HtmlTextWriter* writer);

[VB] Sub RenderItem(ByVal itemType As ListItemType, ByVal repeatIndex As Integer, ByVal repeatInfo As RepeatInfo, ByVal writer As HtmlTextWriter) Implements IRepeatInfoUser.RenderItem

[JScript] function IRepeatInfoUser.RenderItem(itemType: ListItemType, repeatIndex: int, repeatInfo: RepeatInfo, writer: HtmlTextWriter);

CommandEventArgs class (System.Web.UI.WebControls)

TrackViewState

Description

Provides data for the Command event.

The Command event is raised when a System.Web.UI.WebControls.Button or System.Web.UI.WebControls.ImageButton control is clicked.

CommandEventArgs

Example Syntax:

TrackViewState

[C#] public CommandEventArgs(CommandEventArgs e);

[C++] public: CommandEventArgs(CommandEventArgs* e);

[VB] Public Sub New(ByVal e As CommandEventArgs)

[JScript] public function CommandEventArgs(e: CommandEventArgs); Initializes a new instance of the System.Web.UI.WebControls.CommandEventArgs class.

Description

Initializes a new instance of the System.Web.UI.WebControls.CommandEventArgs class with another System.Web.UI.WebControls.CommandEventArgs object.

Use this constructor to create and initialize a new instance of the System.Web.UI.WebControls.CommandEventArgs class using the specified System.Web.UI.WebControls.CommandEventArgs object. A System.Web.UI.WebControls.CommandEventArgs that contains the event data.

CommandEventArgs

Example Syntax:

TrackViewState

[C#] public CommandEventArgs(string commandName, object argument);

[C++] public: CommandEventArgs(String* commandName, Object* argument);

[VB] Public Sub New(ByVal commandName As String, ByVal argument As Object)

[JScript] public function CommandEventArgs(commandName: String, argument: Object);

Description

Initializes a new instance of the System.Web.UI.WebControls.CommandEventArgs class with the specified command name and argument.

Use this constructor to create and initialize a new instance of the System.Web.UI.WebControls.CommandEventArgs class using the specified command name and argument. The name of the command. A System.Object that contains the arguments for the command.

CommandArgument

TrackViewState

[C#] public object CommandArgument {get;}

[C++] public: _property Object* get_CommandArgument( );

[VB] Public ReadOnly Property CommandArgument As Object

[JScript] public function get CommandArgument( ): Object;

Description

Gets the argument for the command.

The System.Web.UI.WebControls.CommandEventArgs.CommandArgument can contain any string set by the programmer. The System.Web.UI.WebControls.CommandEventArgs.CommandArgument property complements the System.Web.UI.WebControls.CommandEventArgs.CommandName property by allowing you to provide any additional information for the command. For example, you can set the System.Web.UI.WebControls.CommandEventArgs.CommandName property to Sort and set the System.Web.UI.WebControls.CommandEventArgs.CommandArgument property to Ascending to specify a command to sort in ascending order.

CommandName

TrackViewState

[C#] public string CommandName {get;}

[C++] public: _property String* get_CommandName( );

[VB] Public ReadOnly Property CommandName As String

[JScript] public function get CommandName( ): String;

Description

Gets the name of the command.

Use the System.Web.UI.WebControls.CommandEventArgs.CommandName property to determine the command to perform. The System.Web.UI.WebControls.CommandEventArgs.CommandName property can contain any string set by the programmer. The programmer can then identify the command name in code and perform the appropriate tasks.

CommandEventHandler delegate (System.Web.UI.WebControls)

ToString

Description

Represents the method that will handle the Command event. The source of the event. A System.Web.UI.WebControls.CommandEventArgs that contains the event data.

The Command event is raised when a System.Web.UI.WebControls.Button or System.Web.UI.WebControls.ImageButton control is clicked.

CompareValidator class (System.Web.UI.WebControls)

ToString

Description

Compares the value entered by the user into an input control with the value entered into another input control or a constant value.

Use the System.Web.UI.WebControls.CompareValidator control to compare the value entered by the user into an input control, such as a System.Web.UI.WebControls.TextBox control, with the value entered into another input control or a constant value. You can also use the System.Web.UI.WebControls.CompareValidator control to indicate whether the value entered into an input control can be converted to the data type specified by the System.Web.UI.WebControls.BaseCompareValidator.Type property.

CompareValidator

Example Syntax:

ToString

[C#] public CompareValidator( );

[C++] public: CompareValidator( );

[VB] Public Sub New( )

[JScript] public function CompareValidator( );

AccessKey

Attributes

BackColor

BorderColor

BorderStyle

BorderWidth

ChildControlsCreated

ClientID

Context

Controls

ControlStyle

ControlStyleCreated

ControlToCompare

ToString

Description

Gets or sets the input control to compare with the input control being validated.

Use the System.Web.UI.WebControls.CompareValidator.ControlToCompare property to specify an input control, such as a System.Web.UI.WebControls.TextBox, to compare with the input control being validated. If the input control specified by this property is not a control on the page, an exception is thrown.

ControlToValidate

CssClass

Display

EnableClientScript

Enabled

EnableViewState

ErrorMessage

Events

Font

ForeColor

HasChildViewState

Height

ID

IsTrackingViewState

IsValid

NamingContainer

Operator

ToString

Description

Gets or sets the comparison operation to perform.

Use the System.Web.UI.WebControls.CompareValidator.Operator property to specify the comparison operation to perform. The following table lists the comparison operations that are possible.

Page

Parent

PropertiesValid

RenderUplevel

Site

Style

TabIndex

TagKey

TagName

TemplateSourceDirectory

Text

ToolTip

Type

UniqueID

ValueToCompare

ToString

Description

Gets or sets a constant value to compare with the value entered by the user into the input control being validated.

Use the System.Web.UI.WebControls.CompareValidator.ValueToCompare property to specify a constant value to compare with the value entered by the user into the input control being validated. If the constant value specified by this property fails to convert to the data type specified by the System.Web.UI.WebControls.BaseCompareValidator.Type property, a exception is thrown.

ViewState

ViewStateIgnoresCase

Visible

Width

AddAttributesToRender

[C#] protected override void AddAttributesToRender(HtmlTextWriter writer);

[C++] protected: void AddAttributes ToRender(HtmlTextWriter* writer);

[VB] Overrides Protected Sub AddAttributesToRender(ByVal writer As HtmlTextWriter)

[JScript] protected override function AddAttributesToRender (writer HtmlTextWriter);

Description

Adds the attributes of this control to the output stream for rendering on the client. A System.Web.UI.HtmlTextWriter that contains the output stream for rendering on the client.

ControlPropertiesValid

[C#] protected override bool ControlPropertiesValid( );

[C++] protected: bool ControlPropertiesValid( );

[VB] Overrides Protected Function ControlPropertiesValid( ) As Boolean

[JScript] protected override function ControlProperties Valid( ): Boolean;

Description

Checks the properties of a the control for valid values.

Return Value: true if the control properties are valid; otherwise false.

EvaluateIsValid

[C#] protected override bool EvaluateIsValid( );

[C++] protected: bool EvaluateIsValid( );

[VB] Overrides Protected Function EvaluateIsValid( ) As Boolean

[JScript] protected override function EvaluateIsValid( ): Boolean;

Description

EvaluateIsValid method EvaluateIsValid method

CustomValidator class (System.Web.UI.WebControls)

Validate

Description

Performs user-defined validation on an input control.

Use the System.Web.UI.WebControls.CustomValidator control to provide a user-defined validation function for an input control. The System.Web.UI.WebControls.CustomValidator control is separated from the input control it validates, which allows you to control where the validation message is displayed.

CustomValidator

Example Syntax:

Validate

[C#] public CustomValidator( );

[C++] public: CustomValidator( );

[VB] Public Sub New( )

[JScript] public function CustomValidator( );

AccessKey
Attributes
BackColor
BorderColor
BorderStyle
BorderWidth
ChildControlsCreated
ClientID
ClientValidationFunction
Validate Description Gets or sets the name of the custom client-side script function used for validation.

Set this property to the name of the function that performs the client-side validation.

Context
Controls
ControlStyle
ControlStyleCreated
ControlToValidate
CssClass
Display
EnableClientScript
Enabled
EnableViewState
ErrorMessage
Events
Font
ForeColor
HasChildViewState
Height
ID
IsTrackingViewState
IsValid
NamingContainer
Page
Parent
PropertiesValid
RenderUplevel
Site
Style
TabIndex
TagKey
TagName
TemplateSourceDirectory
Text
ToolTip
UniqueID
ViewState
ViewStateIgnoresCase
Visible
Width
Validate Description Occurs when validation is performed on the server.

The System.Web.UI.WebControls.CustomValidator.ServerValidate event is raised when validation is performed on the server. This event is used to provide a custom validation routine for an input control, such as a System.Web.UI.WebControls.TextBox control.

AddAttributesToRender

[C#] protected override void AddAttributesToRender(HtmlTextWriter writer);

[C++] protected: void AddAttributesToRender(HtmlTextWriter* writer);

[VB] Overrides Protected Sub AddAttributesToRender(ByVal writer As HtmlTextWriter)

[JScript] protected override function AddAttributesToRender (writer: HtmlTextWriter);

Description

Adds the properties of the System.Web.UI.WebControls.CustomValidator control to the output stream for rendering on the client. A System.Web.UI.HtmlTextWriter that contains the output stream for rendering on the client.

ControlPropertiesValid

[C#] protected override bool ControlPropertiesValid( );

[C++] protected: bool ControlPropertiesValid( );

[VB] Overrides Protected Function ControlPropertiesValid( ) As Boolean

[JScript] protected override function ControlProperties Valid( ): Boolean;

Description

Checks the properties of the control for valid values.

Return Value: true if the control properties are valid; otherwise false.

EvaluateIsValid

[C#] protected override bool EvaluateIsValid( );

[C++] protected: bool EvaluateIsValid( );

[VB] Overrides Protected Function EvaluateIsValid( ) As Boolean

[JScript] protected override function EvaluateIsValid( ): Boolean;

Description

EvaluateIsValid method EvaluateIsValid method

OnServerValidate

[C#] protected virtual bool OnServerValidate(string value);

[C++] protected: virtual bool OnServerValidate(String* value);

[VB] Overridable Protected Function OnServerValidate(ByVal value As String) As Boolean

[JScript] protected function OnServerValidate(value: String): Boolean;

Description

Raises the System.Web.UI.WebControls.CustomValidator.ServerValidate event for the System.Web.UI.WebControls.CustomValidator control.

The System.Web.UI.WebControls.CustomValidator.ServerValidate event is raised when validation is performed on the server. The value to validate.

DataGrid class (System.Web.UI.WebControls)

Validate

Description

A data bound list control that displays the items from data source in a table. The System.Web.UI.WebControls.DataGrid control allows you to select, sort, and edit these items.

Use the System.Web.UI.WebControls.DataGrid control to display the fields of a data source as columns in a table. Each row in the System.Web.UI.WebControls.DataGrid control represents a record in the data source. The System.Web.UI.WebControls.DataGrid control supports selection, editing, deleting, paging, and sorting.

Validate

[C#] public const string CancelCommandName;

[C++] public: const String* CancelCommandName;

[VB] Public Const CancelCommandName As String

[JScript] public var CancelCommandName: String;

Description

Represents the Cancel command name. This field is read-only.

Use the System.Web.UI.WebControls.DataGrid.CancelCommandName field to represent the Cancel command name.

Validate

[C#] public const string DeleteCommandName;

[C++] public: const String* DeleteCommandName;

[VB] Public Const DeleteCommandName As String

[JScript] public var DeleteCommandName: String;

Description

Represents the Delete command name. This field is read-only.

Use the System.Web.UI.WebControls.DataGrid.DeleteCommandName field to represent the Delete command name.

Validate

[C#] public const string EditCommandName;

[C++] public: const String* EditCommandName;

[VB] Public Const EditCommandName As String

[JScript] public var EditCommandName: String;

Description

Represents the Edit command name. This field is read-only.

Use the System.Web.UI.WebControls.DataGrid.EditCommandName field to represent the Edit command name.

Validate

[C#] public const string NextPageCommandArgument;

[C++] public: const String* NextPageCommandArgument;

[VB] Public Const NextPageCommandArgument As String

[JScript] public var NextPageCommandArgument: String;

Description

Represents the Next command argument. This field is read-only.

Use the System.Web.UI.WebControls.DataGrid.NextPageCommandArgument field to represent the Next command argument.

Validate

[C#] public const string PageCommandName;

[C++] public: const String* PageCommandName;

[VB] Public Const PageCommandName As String

[JScript] public var PageCommandName: String;

Description

Represents the Page command name. This field is read-only.

Use the System.Web.UI.WebControls.DataGrid.PageCommandName field to represent the Page command name.

Validate

[C#] public const string PrevPageCommandArgument;

[C++] public: const String* PrevPageCommandArgument;

[VB] Public Const PrevPageCommandArgument As String

[JScript] public var PrevPageCommandArgument: String;

Description

Represents the Prev command argument. This field is read-only.

Use the System.Web.UI.WebControls.DataGrid.PrevPageCommandArgument field to represent the Prev command argument.

Validate

[C#] public const string SelectCommandName;

[C++] public: const String* SelectCommandName;

[VB] Public Const SelectCommandName As String

[JScript] public var SelectCommandName: String;

Description

Represents the Select command name. This field is read-only.

Use the System.Web.UI.WebControls.DataGrid.SelectCommandName field to represent the Select command name.

Validate

[C#] public const string SortCommandName;

[C++] public: const String* SortCommandName;

[VB] Public Const SortCommandName As String

[JScript] public var SortCommandName: String;

Description

Represents the Sort command name. This field is read-only.

Use the System.Web.UI.WebControls.DataGrid.SortCommandName field to represent the Sort command name.

Validate

[C#] public const string UpdateCommandName;

[C++] public: const String* UpdateCommandName;

[VB] Public Const UpdateCommandName As String

[JScript] public var UpdateCommandName: String;

Description

Represents the Update command name. This field is read-only.

Use the System.Web.UI.WebControls.DataGrid.UpdateCommandName field to represent the Update command name.

DataGrid

Example Syntax:

Validate

[C#] public DataGrid( );

[C++] public: DataGrid( );

[VB] Public Sub New( )

[JScript] public function DataGrid( );

Description

Initializes a new instance of the System.Web.UI.WebControls.DataGrid class.

Use this constructor to create and initialize a new instance of the System.Web.UI.WebControls.DataGrid class.

AccessKey

AllowCustomPaging

Validate

Description

Gets or sets a value that indicates whether custom paging is enabled.

Paging allows you to display the contents of the System.Web.UI.WebControls.DataGrid control in page segments. The number of items on a page is determined by the System.Web.UI.WebControls.DataGrid.PageSize property. If no value is specified for the System.Web.UI.WebControls.DataGrid.PageSize property, the System.Web.UI.WebControls.DataGrid will display 10 items on a page.

AllowPaging

Validate

[C#] public virtual bool AllowPaging {get; set;}

[C++] public: _property virtual bool get_AllowPaging( );public: _property virtual void set_AllowPaging(bool);

[VB] Overridable Public Property AllowPaging As Boolean

[JScript] public function get AllowPaging( ): Boolean;public function set AllowPaging(Boolean);

Description

Gets or sets a value that indicates whether paging is enabled.

Paging allows you to display the contents of the System.Web.UI.WebControls.DataGrid control in page segments. The number of items on a page is determined by the System.Web.UI.WebControls.DataGrid.PageSize property. If no value is specified for the System.Web.UI.WebControls.DataGrid.PageSize property, the System.Web.UI.WebControls.DataGrid control will display 10 items on a page.

AllowSorting

Validate

[C#] public virtual bool AllowSorting {get; set;}

[C++] public: _property virtual bool get_AllowSorting( );public: _property virtual void set_AllowSorting(bool);

[VB] Overridable Public Property AllowSorting As Boolean

[JScript] public function get AllowSorting( ): Boolean;public function set AllowSorting(Boolean);

Description

Gets or sets a value that indicates whether sorting is enabled.

When sorting is enabled, System.Web.UI.WebControls.LinkButton controls are rendered in the heading section of each column where the System.Web.UI.WebControls.DataGridColumn.SortExpression property is set. These System.Web.UI.WebControls.LinkButton controls allow you to sort the System.Web.UI.WebControls.DataGrid control by the selected column. The only exception is when you use a System.Web.UI.WebControls.TemplateColumn column type with the System.Web.UI.WebControls.TemplateColumn.HeaderTemplate property set. In this case, you must provide a System.Web.UI.WebControls.Button control in the System.Web.UI.WebControls.TemplateColumn.HeaderTemplate of the column.

AlternatingItemStyle

Validate

[C#] public virtual TableItemStyle AlternatingItemStyle {get;}

[C++] public: _property virtual TableItemStyle* get_AlternatingItemStyle( );

[VB] Overridable Public ReadOnly Property AlternatingItemStyle As TableItemStyle

[JScript] public function get AlternatingItemStyle( ): TableItemStyle;

Description

Gets the style properties for alternating items in the System.Web.UI.WebControls.DataGrid control.

Use the System.Web.UI.WebControls.DataGrid.AlternatingItemStyle property to provide a custom style for the alternating items in the System.Web.UI.WebControls.DataGrid control. Common style attributes that can be adjusted include forecolor, backcolor, font, and content alignment within the cell. Providing a different style enhances the appearance of the System.Web.UI.WebControls.DataGrid control.

Attributes

AutoGenerateColumns

Validate

Description

Gets or sets a value that indicates whether System.Web.UI.WebControls.BoundColumn objects are automatically created and displayed in the System.Web.UI.WebControls.DataGrid control for each field in the data source.

Use this property to automatically create a System.Web.UI.WebControls.BoundColumn object for each field in the data source. Each field is then rendered as a column in the System.Web.UI.WebControls.DataGrid control in the order that the fields appear in the data source.

BackColor

BackImageUrl

Validate

Description

Gets or sets the URL of an image to display in the background of the System.Web.UI.WebControls.DataGrid control.

Use the System.Web.UI.WebControls.DataGrid.BackImageUrl property to to specify an image to display in the background of the System.Web.UI.WebControls.DataGrid control.

BorderColor

BorderStyle

BorderWidth

CellPadding

CellSpacing

ChildControlsCreated

ClientID

Columns

Validate

Description

Gets a collection of objects that represent the columns of the System.Web.UI.WebControls.DataGrid control.

Use this property to programmatically control the collection of columns in the System.Web.UI.WebControls.DataGrid control. The System.Web.UI.WebControls.DataGrid.Columns collection contains explicitly declared columns that get rendered in the System.Web.UI.WebControls.DataGrid control.

Context

Controls

ControlStyle

ControlStyleCreated

CssClass

CurrentPageIndex

Validate

Description

Gets or sets the index of the currently displayed page.

Use this property to determine the currently displayed page in the System.Web.UI.WebControls.DataGrid control when paging is enabled. This property is also used to programmatically control which page is displayed.

DataKeyField

DataKeys

DataKeysArray

DataMember

DataSource

EditItemIndex

Validate

Description

Gets or sets the index of an item in the System.Web.UI.WebControls.DataGrid control to edit.

When the System.Web.UI.WebControls.DataGrid control contains an System.Web.UI.WebControls.EditCommandColumn object, use this property to determine the index of the item selected in the System.Web.UI.WebControls.DataGrid control to edit.

EditItemStyle

Validate

[C#] public virtual TableItemStyle EditItemStyle {get;}

[C++] public: _property virtual TableItemStyle* get_EditItemStyle( );

[VB] Overridable Public ReadOnly Property EditItemStyle As TableItemStyle

[JScript] public function get EditItemStyle( ): TableItemStyle;

Description

Gets the style properties of the item selected for editing in the System.Web.UI.WebControls.DataGrid control.

Use the System.Web.UI.WebControls.DataGrid.EditItemStyle property to provide a custom style for the item selected for editing in the System.Web.UI.WebControls.DataGrid control. Common style attributes that can be adjusted include forecolor, backcolor, font, and content alignment within the cell. Providing a different style enhances the appearance of the System.Web.UI.WebControls.DataGrid control.

Enabled

EnableViewState

Events

Font

FooterStyle

Validate

Description

Gets the style properties of the tooter section in the System.Web.UI.WebControls.DataGrid control.

Use this property to provide a custom style for the tooter of the System.Web.UI.WebControls.DataGrid control. Common style attributes that can be adjusted include forecolor, backcolor, font, and content alignment within the cell. Providing a different style enhances the appearance of the System.Web.UI.WebControls.DataGrid control.

ForeColor

GridLines

HasChildViewState

HeaderStyle

Validate

Description

Gets the style properties of the heading section in the System.Web.UI.WebControls.DataGrid control.

Use this property to provide a custom style for the heading section of the System.Web.UI.WebControls.DataGrid control. Common style attributes that can be adjusted include forecolor, backcolor, font, and content alignment within the cell. Providing a different style enhances the appearance of the System.Web.UI.WebControls.DataGrid control.

Height

HorizontalAlign

ID

IsTrackingViewState

Items

Validate

Description

Gets a collection of System.Web.UI.WebControls.DataGridItem objects that represent the individual items in the System.Web.UI.WebControls.DataGrid control.

Use the System.Web.UI.WebControls.DataGrid.Items collection to programmatically control the items in the System.Web.UI.WebControls.DataGrid control. The System.Web.UI.WebControls.DataGrid.Items collection does not provide any methods to add or remove items to the collection. However, you can control the contents of an item by providing a handler for the System.Web.UI.WebControls.DataGrid.ItemCreated event.

ItemStyle

Validate

[C#] public virtual TableItemStyle ItemStyle {get;}

[C++] public: _property virtual TableItemStyle* get_ItemStyle( );

[VB] Overridable Public ReadOnly Property ItemStyle As TableItemStyle

[JScript] public function get ItemStyle( ): TableItemStyle;

Description

Gets the style properties of the items in the System.Web.UI.WebControls.DataGrid control.

Use this property to provide a custom style for the items of the System.Web.UI.WebControls.DataGrid control. Common style attributes that can be adjusted include forecolor, backcolor, font, and content alignment within the cell. Providing a different style enhances the appearance of the System.Web.UI.WebControls.DataGrid control.

NamingContainer

Page

PageCount

Validate

Description

Gets the total number of pages required to display the items in the System.Web.UI.WebControls.DataGrid control.

Use this property to programmatically determine the number of pages required to display the items in the System.Web.UI.WebControls.DataGrid control. This property is only used when the System.Web.UI.WebControls.DataGrid.AllowPaging property is set to true.

PagerStyle

Validate

[C#] public virtual DataGridPagerStyle PagerStyle {get;}

[C++] public: _property virtual DataGridPagerStyle* get_PagerStyle( );

[VB] Overridable Public ReadOnly Property PagerStyle As DataGridPagerStyle

[JScript] public function get PagerStyle( ): DataGridPagerStyle;

Description

Gets the style properties of the paging section of the System.Web.UI.WebControls.DataGrid control.

Use this property to provide a custom style for the paging section of the System.Web.UI.WebControls.DataGrid control. Common style attributes that can be adjusted include forecolor, backcolor, font, and content alignment within the cell. Providing a different style enhances the appearance of the System.Web.UI.WebControls.DataGrid control.

PageSize

Validate

[C#] public virtual int PageSize {get; set;}

[C++] public: _property virtual int get_PageSize( );public: _property virtual void set_PageSize(int);

[VB] Overridable Public Property PageSize As Integer

[JScript] public function get PageSize( ): int;public function set PageSize(int);

Description

Gets or sets the number of items to display on a single page of the System.Web.UI.WebControls.DataGrid control.

Use this property to specify the number of items to display on a single page of the System.Web.UI.WebControls.DataGrid control. The System.Web.UI.WebControls.DataGrid.AllowPaging property must be set to true for this property have any effect.

Parent
SelectedIndex
Validate

Description

Gets or sets the index of the selected item in the System.Web.UI.WebControls.DataGrid control.

Use the System.Web.UI.WebControls.DataGrid.SelectedIndex property to determine the index of the item selected by the user in the System.Web.UI.WebControls.DataGrid control. You can also use this property to programmatically specify which item is selected in the System.Web.UI.WebControls.DataGrid control.

SelectedItem
Validate

[C#] public virtual DataGridItem SelectedItem {get;}

[C++] public: _property virtual DataGridItem* get_SelectedItem( );

[VB] Overridable Public ReadOnly Property SelectedItem As DataGridItem

[JScript] public function get SelectedItem( ): DataGridItem;

Description

Gets a System.Web.UI.WebControls.DataGridItem object that represents the selected item in the System.Web.UI.WebControls.DataGrid control.

Use the System.Web.UI.WebControls.DataGrid.SelectedIndex property to get a System.Web.UI.WebControls.DataGridItem object that represents the selected item in the System.Web.UI.WebControls.DataGrid control. This object can then be used to access the properties of the selected item.

SelectedItemStyle
Validate

[C#] public virtual TableItemStyle SelectedItemStyle {get;}

[C++] public: _property virtual TableItemStyle* get_SelectedItemStyle( );

[VB] Overridable Public ReadOnly Property SelectedItemStyle As TableItemStyle

[JScript] public function get SelectedItemStyle( ): TableItemStyle;

Description

Gets the style properties of the currently selected item in the System.Web.UI.WebControls.DataGrid control.

Use the System.Web.UI.WebControls.DataGrid.SelectedItemStyle property to provide a custom style for the selected item in the System.Web.UI.WebControls.DataGrid control. Common style attributes that can be adjusted include forecolor, backcolor, font, and content alignment within the cell. Providing a different style enhances the appearance of the System.Web.UI.WebControls.DataGrid control.

ShowFooter
Validate

[C#] public virtual bool ShowFooter {get; set;}

[C++] public: _property virtual bool get_ShowFooter( );public: _property virtual void set_ShowFooter(bool);

[VB] Overridable Public Property ShowFooter As Boolean

[JScript] public function get_ShowFooter( ): Boolean;public function set ShowFooter(Boolean);

Description

Gets or sets a value that indicates whether the footer is displayed in the System.Web.UI.WebControls.DataGrid control.

Set this property to true to display the footer in the System.Web.UI.WebControls.DataGrid control. The appearance of the footer is controlled by using the System.Web.UI.WebControls.DataGrid.FooterStyle property.

ShowHeader
Validate

[C#] public virtual bool ShowHeader {get; set;}

[C++] public: _property virtual bool get_Show Header( );public: _property virtual void set_ShowHeader (bool);

[VB] Overridable Public Property ShowHeader As Boolean

[JScript] public function get_ShowHeader( ): Boolean;public function set ShowHeader(Boolean);

Description

Gets or sets a value that indicates whether the header is displayed in the System.Web.UI.WebControls.DataGrid control.

Set this property to true to display the header in the System.Web.UI.WebControls.DataGrid. The appearance of the header is controlled by using the System.Web.UI.WebControls.DataGrid.HeaderStyle property.

Site
Style
TabIndex
TagKey
TagName
TemplateSourceDirectory
ToolTip
UniqueID
ViewState
ViewStateIgnoresCase
VirtualItemCount
Validate Description Gets or sets the virtual number of items in the System.Web.UI.WebControls.DataGrid control when custom paging is used.

Use this property to specify the virtual number of items in the System.Web.UI.WebControls.DataGrid control when custom paging is used. This property is only used when the System.Web.UI.WebControls.DataGrid.AllowCustomPaging property is set to true.

Visible
Width
Validate

Description

Occurs when the Cancel button is clicked for an item in the System.Web.UI.WebControls.DataGrid control.

The System.Web.UI.WebControls.DataGrid.CancelCommand event is raised when the Cancel button is clicked for an item in the System.Web.UI.WebControls.DataGrid control.

Validate

Description

Occurs when the Delete button is clicked for an item in the System.Web.UI.WebControls.DataGrid control.

The System.Web.UI.WebControls.DataGrid.DeleteCommand event is raised when the Delete button is clicked for an item in the System.Web.UI.WebControls.DataGrid control.

Validate

Description

Occurs when the Edit button is clicked for an item in the System.Web.UI.WebControls.DataGrid control.

The System.Web.UI.WebControls.DataGrid.EditCommand event is raised when the Edit button is clicked for an item in the System.Web.UI.WebControls.DataGrid control.

Validate

Description

Occurs when any button is clicked in the System.Web.UI.WebControls.DataGrid control.

The System.Web.UI.WebControls.DataGrid.ItemCommand event is raised when any button is clicked in the System.Web.UI.WebControls.DataGrid control. This event is commonly used to handle buttons controls with a custom CommandName value in the System.Web.UI.WebControls.DataGrid control.

Validate

[C#] public event DataGridItemEventHandler ItemCreated;

[C++] public: _event DataGridItemEventHandler* ItemCreated;

[VB] Public Event ItemCreated As DataGridItemEventHandler

Description

Occurs on the server when an item in the System.Web.UI.WebControls.DataGrid control is created.

The System.Web.UI.WebControls.DataGrid.ItemCreated event is raised when an item in the System.Web.UI.WebControls.DataGrid control is created, both during round-trips and at data bind time.

Validate

[C#] public event DataGridItemEventHandler ItemDataBound;

[C++] public: _event DataGridItemEventHandler* ItemDataBound;

[VB] Public Event ItemDataBound As DataGridItemEventHandler

Description

Occurs after an item is data bound to the System.Web.UI.WebControls.DataGrid control.

The System.Web.UI.WebControls.DataGrid.ItemDataBound event is raised after an item is data bound to the System.Web.UI.WebControls.DataGrid control. This event provides you with the last opportunity to access the data item before it is displayed on the client. After this event is raised, the data item is nulled out and no longer available.

Validate

Description

Occurs when one of the page selection elements is clicked.

The System.Web.UI.WebControls.DataGrid.PageIndexChanged event is raised when one of the page selection elements is clicked.

Validate

Description

Occurs when a column is sorted.

The System.Web.UI.WebControls.DataGrid.SortCommand event is raised when a column is sorted.

Validate

Description

Occurs when the Update button is clicked for an item in the System.Web.UI.WebControls.DataGrid control.

The System.Web.UI.WebControls.DataGrid.UpdateCommand event is raised when the Update button for an item is clicked.

CreateColumnSet

[C#] protected virtual ArrayList CreateColumnSet(PagedDataSource dataSource, bool useDataSource);

[C++] protected: virtual ArrayList* CreateColumnSet(PagedDataSource* dataSource, bool useDataSource);

[VB] Overridable Protected Function CreateColumnSet(ByVal dataSource As PagedDataSource, ByVal useDataSource As Boolean) As ArrayList

[JScript] protected function CreateColumnSet(dataSource: PagedDataSource, useDataSource: Boolean): ArrayList;

Description

Creates the set of columns to be used to build up the control hierarchy. When AutoGenerateColumns is true, the columns are created to match the datasource and are appended to the set of columns defined in the Columns collection. The datasource being used to create the control hierarchy Whether to use the datasource to generate columns automatically or to use saved state.

CreateControlHierarchy

[C#] protected override void CreateControlHierarchy(bool useDataSource);

[C++] protected: void CreateControlHierarchy(bool useDataSource);

[VB] Overrides Protected Sub CreateControlHierarchy(ByVal useDataSource As Boolean)

[JScript] protected override function CreateControlHierarchy(useDataSource Boolean);

Description

Creates the control hierarchy that is used to render the DataGrid. This is called whenever a control hierarchy is needed and the ChildControlsCreated property is false. The implementation assumes that all the children in the controls collection have already been cleared. Whether to use the datasource to generate columns automatically or to use saved state.

CreateControlStyle

[C#] protected override Style CreateControlStyle( );

[C++] protected: Style* CreateControlStyle( );

[VB] Overrides Protected Function CreateControlStyle( ) As Style

[JScript] protected override function CreateControlStyle( ): Style;

Description

Creates new control style.

Return Value: A System.Web.UI.WebControls.Style the represents the new style.

CreateItem

[C#] protected virtual DataGridItem CreateItem(int itemIndex, int dataSourceIndex, ListItemType itemType);

[C++] protected: virtual DataGridItem* CreateItem(int itemIndex, int dataSourceIndex, ListItemType itemType);

[VB] Overridable Protected Function CreateItem(ByVal itemIndex As Integer, ByVal dataSourceIndex As Integer, ByVal itemType As ListItemType) As DataGridItem

[JScript] protected function CreateItem(itemIndex: int, dataSourceIndex: int, itemType: ListItemType): DataGridItem;

Description

InitializeItem

[C#] protected virtual void InitializeItem(DataGridItem item, DataGridColumn[ ] columns);

[C++] protected: virtual void InitializeItem(DataGridItem* item, DataGridColumn* columns[ ]);

[VB] Overridable Protected Sub InitializeItem(ByVal item As DataGridItem, ByVal columns( ) As DataGridColumn)

[JScript] protected function InitializeItem(item: DataGridItem, columns: DataGridColumn[ ]);

Description

InitializePager

[C#] protected virtual void InitializePager(DataGridItem item, int columnSpan, PagedDataSource pagedDataSource);

[C++] protected: virtual void InitializePager(DataGridItem* item, int columnSpan, PagedDataSource* pagedDataSource);

[VB] Overridable Protected Sub InitializePager(ByVal item As DataGridItem, ByVal columnSpan As Integer, ByVal pagedDataSource As PagedDataSource)

[JScript] protected function InitializePager(item: DataGridItem, columnSpan: int, pagedDataSource: PagedDataSource);

Description

Creates a DataGridItem that contains the paging UI. The paging UI is a navigation bar that is a built into a single TableCell that spans across all columns of the DataGrid.

LoadViewState

[C#] protected override void LoadViewState(object savedState);

[C++] protected: void LoadViewState(Object* savedState);

[VB] Overrides Protected Sub LoadViewState(ByVal savedState As Object)

[JScript] protected override function LoadViewState(savedState: Object);

Description

Loads a saved state of the System.Web.UI.WebControls.DataGrid. A saved state of the System.Web.UI.WebControls.DataGrid.

OnBubbleEvent

[C#] protected override bool OnBubbleEvent(object source, EventArgs e);

[C++] protected: bool OnBubbleEvent(Object* source, EventArgs* e);

[VB] Overrides Protected Function OnBubbleEvent(ByVal source As Object, ByVal e As EventArgs) As Boolean

[JScript] protected override function OnBubbleEvent (source: Object, e: EventArgs): Boolean;

Description

The source of the event. An System.EventArgs that contains event data.

OnCancelCommand

[C#] protected virtual void OnCancelCommand(DataGridCommandEventArgs e);

[C++] protected: virtual void OnCancelCommand(DataGridCommandEventArgs* e);

[VB] Overridable Protected Sub OnCancelCommand(ByVal e As DataGridCommandEventArgs)

[JScript] protected function OnCancelCommand(e: DataGridCommandEventArgs);

Description

Raises the System.Web.UI.WebControls.DataGrid.CancelCommand event. This allows you to provide a custom handler for the event.

Use the System.Web.UI.WebControls.DataGrid.OnCancelCommand(System.Web.UI.WebControls.DataGridCommandEventArgs) method to provide a custom handler for the System.Web.UI.WebControls.DataGrid.CancelCommand event. A System.Web.UI.WebControls.DataGridCommandEventArgs that contains event data.

OnDeleteCommand

[C#] protected virtual void OnDeleteCommand(DataGridCommandEventArgs e);

[C++] protected: virtual void OnDeleteCommand(DataGridCommandEventArgs* e);

[VB] Overridable Protected Sub OnDeleteCommand(ByVal e As DataGridCommandEventArgs)

[JScript] protected function OnDeleteCommand(e: DataGridCommandEventArgs);

Description

Raises the System.Web.UI.WebControls.DataGrid.DeleteCommand event. This allows you to provide a custom handler for the event.

Use the System.Web.UI.WebControls.DataGrid.OnDeleteCommand(System.Web.UI.WebControls.DataGridCommandEventArgs) method to provide a custom handler for the System.Web.UI.WebControls.DataGrid.DeleteCommand event. A System.Web.UI.WebControls.DataGridCommandEventArgs that contains event data.

OnEditCommand

[C#] protected virtual void OnEditCommand(DataGridCommandEventArgs e);

[C++] protected: virtual void OnEditCommand(DataGridCommandEventArgs* e);

[VB] Overridable Protected Sub OnEditCommand(ByVal e As DataGridCommandEventArgs)

[JScript] protected function OnEditCommand(e: DataGridCommandEventArgs);

Description

Raises the System.Web.UI.WebControls.DataGrid.EditCommand event. This allows you to provide a custom handler for the event.

Use the System.Web.UI.WebControls.DataGrid.OnEditCommand(System.Web.UI.WebControls.DataGridCommandEventArgs) method to provide a custom handler for the System.Web.UI.WebControls.DataGrid.EditCommand event. A System.Web.UI.WebControls.DataGridCommandEventArgs that contains event data.

OnItemCommand

[C#] protected virtual void OnItemCommand(DataGridCommandEventArgs e);

[C++] protected: virtual void OnItemCommand(DataGridCommandEventArgs * e);

[VB] Overridable Protected Sub OnItemCommand(ByVal e As DataGridCommandEventArgs)

[JScript] protected function OnItemCommand(e: DataGridCommandEventArgs);

Description

Raises the System.Web.UI.WebControls.DataGrid.ItemCommand event. This allows you to provide a custom handler for the event. This allows you to provide a custom handler for the event.

Use the System.Web.UI.WebControls.DataGrid.OnItemCommand(System.Web.UI.WebControls.DataGridCommandEventArgs) method to provide a custom handler for the System.Web.UI.WebControls.DataGrid.ItemCommand event. A System.Web.UI.WebControls.DataGridCommandEventArgs that contains event data.

OnItemCreated

[C#] protected virtual void OnItemCreated(DataGridItemEventArgs e);

[C++] protected: virtual void OnItemCreated(DataGridItemEventArgs * e);

[VB] Overridable Protected Sub OnItemCreated(ByVal e As DataGridItemEventArgs)

[JScript] protected function OnItemCreated(e: DataGridItemEventArgs);

Description

Raises the System.Web.UI.WebControls.DataGrid.ItemCreated event. This allows you to provide a custom handler for the event.

Use the System.Web.UI.WebControls.DataGrid.ItemCreated(System.Web.UI.WebControls.DataGridItemEventArgs) method to provide a custom handler for the System.Web.UI.WebControls.DataGrid.ItemCreated event. A System.Web.UI.WebControls.DataGridItemEventArgs that contains event data.

OnItemDataBound

[C#] protected virtual void OnItemDataBound(DataGridItemEventArgs e);

[C++] protected: virtual void OnItemDataBound(DataGridItemEventArgs * e);

[VB] Overridable Protected Sub OnItemDataBound(ByVal e As DataGridItemEventArgs)

[JScript] protected function OnItemDataBound(e: DataGridItemEventArgs);

Description

Raises the System.Web.UI.WebControls.DataGrid.ItemDataBound event. This allows you to provide a custom handler for the event.

Use the System.Web.UI.WebControls.DataGrid.ItemDataBound(System.Web.UI.WebControls.DataGridItemEventArgs) method to provide a custom handler for the System.Web.UI.WebControls.DataGrid.ItemDataBound event. A System.Web.UI.WebControls.DataGridItemEventArgs that contains event data.

OnPageIndexChanged

[C#] protected virtual void OnPageIndexChanged(DataGridPageChangedEventArgs e);

[C++] protected: virtual void OnPageIndexChanged(DataGridPageChangedEventArgs* e);

[VB] Overridable Protected Sub OnPageIndexChanged(ByVal e As DataGridPageChangedEventArgs)

[JScript] protected function OnPageIndexChanged(e: DataGridPageChangedEventArgs);

Description

Raises the System.Web.UI.WebControls.DataGrid.PageIndexChanged event. This allows you to provide a custom handler for the event.

Use the System.Web.UI.WebControls.DataGrid.OnPageIndexChanged(System.Web.UI.WebControls.DataGridPageChangedEventArgs) method to provide a custom handler for the System.Web.UI.WebControls.DataGrid.PageIndexChanged event. A System.Web.UI.WebControls.DataGridPageChangedEventArgs that contains event data.

OnSortCommand

[C#] protected virtual void OnSortCommand(DataGridSortCommandEventArgs e);

[C++] protected: virtual void OnSortCommand(DataGridSortCommandEventArgs* e);

[VB] Overridable Protected Sub OnSortCommand(ByVal e As DataGridSortCommandEventArgs)

[JScript] protected function OnSortCommand(e: DataGridSortCommandEventArgs);

Description

Raises the System.Web.UI.WebControls.DataGrid.SortCommand event. This allows you to provide a custom handler for the event.

Use the System.Web.UI.WebControls.DataGrid.OnSortCommand(System.Web.UI.WebControls.DataGridSortCommandEventArgs) method to provide a custom handler for the System.Web.UI.WebControls.DataGrid.SortCommand event. A System.Web.UI.WebControls.DataGridSortCommandEventArgs that contains event data.

OnUpdateCommand

[C#] protected virtual void OnUpdateCommand(DataGridCommandEventArgs e);

[C++] protected: virtual void OnUpdateCommand(DataGridCommandEventArgs * e);

[VB] Overridable Protected Sub OnUpdateCommand(ByVal e As DataGridCommandEventArgs)

[JScript] protected function OnUpdateCommand(e: DataGridCommandEventArgs);

Description

Raises the System.Web.UI.WebControls.DataGrid.UpdateCommand event. This allows you to provide a custom handler for the event.

Use the System.Web.UI.WebControls.DataGrid.OnUpdateCommand(System.Web.UI.WebControls.DataGridCommandEventArgs) method to provide a custom handler for the System.Web.UI.WebControls.DataGrid.UpdateCommand event. A System.Web.UI.WebControls.DataGridCommandEventArgs that contains event data.

PrepareControlHierarchy

[C#] protected override void PrepareControlHierarchy( );

[C++] protected: void PrepareControlHierarchy( );

[VB] Overrides Protected Sub PrepareControlHierarchy( )

[JScript] protected override function PrepareControlHierarchy( );

Description

SaveViewState

[C#] protected override object SaveViewState( );

[C++] protected: Object* SaveViewState( );

[VB] Overrides Protected Function SaveViewState( ) As Object

[JScript] protected override function SaveViewState( ): Object;

Description

Saves the current state of the System.Web.UI.WebControls.DataGrid.

Return Value: The saved state of the System.Web.UI.WebControls.DataGrid.

TrackViewState

[C#] protected override void TrackViewState( );

[C++] protected: void TrackViewState( );

[VB] Overrides Protected Sub TrackViewState( )

[JScript] protected override function TrackViewState( );

Description

Marks the starting point to begin tracking and saving changes to the control as part of the control viewstate.

DataGridColumn class (System.Web.UI.WebControls)

TrackViewState

Description

Serves as the base class for the different column types of the System.Web.UI.WebControls.DataGrid control.

The System.Web.UI.WebControls.DataGridColumn class is the base class for all column types of the System.Web.UI.WebControls.DataGrid control. It defines the properties and methods that are common to all column types. An instance of the System.Web.UI.WebControls.DataGridColumn class is typically not created directly.

DataGridColumn

Example Syntax:

TrackViewState

[C#] public DataGridColumn( );

[C++] public: DataGridColumn( );

[VB] Public Sub New( )

[JScript] public function DataGridColumn( );

Description

Initializes a new instance of the System.Web.UI.WebControls.DataGridColumn class.

Use this constructor to create and initialize an instance of the System.Web.UI.WebControls.DataGridColumn class.

DesignMode

TrackViewState

[C#] protected bool DesignMode {get;}

[C++] protected: _property bool get_DesignMode( );

[VB] Protected ReadOnly Property DesignMode As Boolean

[JScript] protected function get DesignMode( ): Boolean;

Description

Gets a value that indicates whether the column is in design mode.

Use the System.Web.UI.WebControls.DataGridColumn.DesignMode property to programmatically determine whether the column is in design mode FooterStyle TrackViewState

[C#] public virtual TableItemStyle FooterStyle {get;}

[C++] public: _property virtual TableItemStyle* get_FooterStyle( );

[VB] Overridable Public ReadOnly Property FooterStyle As TableItemStyle

[JScript] public function get FooterStyle( ): TableItemStyle;

Description

Gets the style properties for the tooter section of the column.

Use this property to provide a custom style for the tooter section of the column. Common style attributes that can be adjusted, include forecolor, backcolor, font, and content alignment within the cell. Providing a different style enhances the appearance of the column in the System.Web.UI.WebControls.DataGrid control.

FooterText

TrackViewState

[C#] public virtual string FooterText {get; set;}

[C++] public: _property virtual String* get_Footer Text( );public: _property virtual void set_FooterText (String*);

[VB] Overridable Public Property FooterText As String

[JScript] public function get FooterText( ): String;public function set FooterText(String);

Description

Gets or sets the text displayed in the tooter section of the column.

Use the System.Web.UI.WebControls.DataGridColumn.FooterText property to specify or determine the text displayed in the tooter section of the column.

HeaderImageUrl

TrackViewState

[C#] public virtual string HeaderImageUrl {get; set;}

[C++] public: _property virtual String* get_HeaderImageUrl( );public: _property virtual void set_HeaderImageUrl(String*);

[VB] Overridable Public Property HeaderImageUrl As String

[JScript] public function get HeaderImageUrl( ): String;public function set HeaderImageUrl(String);

Description

Gets or sets the location of an image to display in the header section of the column.

Use the System.Web.UI.WebControls.DataGridColumn.HeaderImageUrl property to specify the URL of an image to display in the header section of the column. You can use a relative or an absolute URL. A relative URL relates the location of the image to the location of the Web page without specifying a complete path on the server. The path is relative to the location of the Web page. This makes it easier to move the entire site to another directory on the server without updating the path to the image in code. An absolute URL provides the complete path, so moving the site to another directory requires updating the code.

HeaderStyle

TrackViewState

[C#] public virtual TableItemStyle HeaderStyle {get;}

[C++] public: _property virtual TableItemStyle* get_HeaderStyle( );

[VB] Overridable Public ReadOnly Property HeaderStyle As TableItemStyle

[JScript] public function get HeaderStyle( ): TableItemStyle;

Description

Gets the style properties for the header section of the column.

Use this property to provide a custom style for the header section of the column. Common style attributes that can be adjusted include forecolor, backcolor, font, and content alignment within the cell. Providing a different style enhances the appearance of the column in the System.Web.UI.WebControls.DataGrid control.

HeaderText

TrackViewState

[C#] public virtual string HeaderText {get; set;}

[C++] public: _property virtual String* get_HeaderText( );public: _property virtual void set_HeaderText(String*);

[VB] Overridable Public Property HeaderText As String

[JScript] public function get HeaderText( ): String;public function set HeaderText(String);

Description

Gets or sets the text displayed in the header section of the column.

Use the System.Web.UI.WebControls.DataGridColumn.HeaderText property to specify or determine the text displayed in the tooter section of the column.

IsTrackingViewState

TrackViewState

[C#] protected bool IsTrackingViewState {get;}

[C++] protected: _property bool get_IsTrackingViewState( );

[VB] Protected ReadOnly Property IsTrackingViewState As Boolean

[JScript] protected function get IsTrackingViewState( ): Boolean;

Description

Determines if the System.Web.UI.WebControls.DataGridColumn is marked to save its state.

ItemStyle

TrackViewState

[C#] public virtual TableItemStyle ItemStyle {get;}

[C++] public: _property virtual TableItemStyle* get_ItemStyle( );

[VB] Overridable Public ReadOnly Property ItemStyle As TableItemStyle

[JScript] public function get ItemStyle( ): TableItemStyle;

Description

Gets the style properties for the item cells of the column.

Use this property to provide a custom style for the item cells of the column. Common style attributes that can be adjusted include forecolor, backcolor, font, and content alignment within the cell. Providing a different style enhances the appearance of the column in the System.Web.UI.WebControls.DataGrid control.

Owner

TrackViewState

[C#] protected DataGrid Owner {get;}

[C++] protected: _property DataGrid* get_Owner( );

[VB] Protected ReadOnly Property Owner As DataGrid

[JScript] protected function get Owner( ): DataGrid;

Description

Gets the System.Web.UI.WebControls.DataGrid control that the column is a member of.

Use the System.Web.UI.WebControls.DataGridColumn.Owner property to programmatically determine the System.Web.UI.WebControls.DataGrid control that the column is a member of.

SortExpression

TrackViewState

[C#] public virtual string SortExpression {get; set;}

[C++] public: _property virtual String* get_SortExpression( );public: _property virtual void set_SortExpression(String*);

[VB] Overridable Public Property SortExpression As String

[JScript] public function get SortExpression( ): String;public function set SortExpression(String);

Description

Gets or sets the name of the field to pass to the System.Web.UI.WebControls.DataGrid.OnSortCommand(System.Web.UI.WebControls.DataGridSortCommandEventArgs) method when a column is selected for sorting.

Use the System.Web.UI.WebControls.DataGridColumn.SortExpression property to specify or determine the name of the field to pass to the System.Web.UI.WebControls.DataGrid.OnSortCommand (System.Web.UI.WebControls.DataGridSortCommand EventArgs) method when a column is selected for sorting.

ViewState

TrackViewState

[C#] protected StateBag ViewState {get;}

[C++] protected: _property StateBag* get_ViewState( );

[VB] Protected ReadOnly Property ViewState As StateBag

[JScript] protected function get ViewState( ): StateBag;

Description

Gets the statebag for the System.Web.UI.WebControls.DataGridColumn. This property is read-only.

Visible

TrackViewState

[C#] public bool Visible {get; set;}

[C++] public: _property bool get_Visible( );public: _property void set_Visible(bool);

[VB] Public Property Visible As Boolean

[JScript] public function get Visible( ): Boolean;public function set Visible(Boolean);

Description

Gets or sets a value that indicates whether the column is visible in the System.Web.UI.WebControls.DataGrid control.

Use the System.Web.UI.WebControls.DataGridColumn.Visible property to programmatically control whether the column is visible in the System.Web.UI.WebControls.DataGrid control.

Initialize

[C#] public virtual void Initialize( );

[C++] public: virtual void Initialize( );

[VB] Overridable Public Sub Initialize( )

[JScript] public function Initialize( );

Description

InitializeCell

[C#] public virtual void InitializeCell(TableCell cell, int columnIndex, ListItemType itemType);

[C++] public: virtual void InitializeCell(TableCell* cell, int columnIndex, ListItemType itemType);

[VB] Overridable Public Sub InitializeCell(ByVal cell As TableCell, ByVal columnIndex As Integer, ByVal itemType As ListItemType)

[JScript] public function InitializeCell(cell: TableCell, columnIndex: int, itemType: ListItemType);

Description

Initializes a cell in the System.Web.UI.WebControls.DataGridColumn. A System.Web.UI.WebControls.TableCell that contains information about the cell. The column number of the cell to initialize. One of the System.Web.UI.WebControls.ListItemType values.

LoadViewState

[C#] protected virtual void LoadViewState(object savedState);

[C++] protected: virtual void LoadViewState(Object* savedState);

[VB] Overridable Protected Sub LoadViewState(ByVal savedState As Object)

[JScript] protected function LoadViewState(savedState: Object);

Description

Loads the state of the System.Web.UI.WebControls.DataGridColumn. An System.Object that contains the saved state of the System.Web.UI.WebControls.DataGridColumn.

OnColumnChanged

[C#] protected virtual void OnColumnChanged( );

[C++] protected: virtual void OnColumnChanged( );

[VB] Overridable Protected Sub OnColumnChanged( )

[JScript] protected function OnColumnChanged( );

Description

Raises the ColumnChanged event of a System.Web.UI.WebControls.DataGridColumn object.

SaveViewState

[C#] protected virtual object SaveViewState( );

[C++] protected: virtual Object* SaveViewState( );

[VB] Overridable Protected Function SaveViewState( ) As Object

[JScript] protected function SaveViewState( ): Object;

Description

Saves the current state of the System.Web.UI.WebControls.DataGridColumn. Return Value: An System.Object that contains the saved state of the System.Web.UI.WebControls.DataGridColumn.

IStateManager.LoadViewState

[C#] void IStateManager.LoadViewState(object state);

[C++] void IStateManager::LoadViewState(Object* state);

[VB] Sub LoadViewState(ByVal state As Object) Implements IStateManager.LoadViewState

[JScript] function IStateManager.LoadViewState(state: Object);

IStateManager.SaveViewState

[C#] object IStateManager. SaveViewState( );

[C++] Object* IStateManager::SaveViewState( );

[VB] Function SaveViewState( ) As Object Implements IStateManager.SaveViewState

[JScript] function IStateManager.SaveViewState( ): Object;

IStateManager.TrackViewState

[C#] void IStateManager.TrackViewState( );

[C++] void IStateManager::TrackViewState( );

[VB] Sub TrackViewState( ) Implements IStateManager. TrackViewState

[JScript] function IStateManager.TrackViewState( );

ToString

[C#] public override string ToString( );

[C++] public: String* ToString( );

[VB] Overrides Public Function ToString( ) As String

[JScript] public override function ToString( ): String;

Description

Returns the string representation of the column.

Return Value: Returns System.String.Empty.

Use the System.Web.UI.WebControls.DataGridColumn.ToString method to get the string representation of the column.

TrackViewState

[C#] protected virtual void TrackViewState( );

[C++] protected: virtual void TrackViewState( );

[VB] Overridable Protected Sub TrackViewState( )

[JScript] protected function TrackViewState( );

Description

Marks the starting point to begin tracking and saving changes to the control as part of the control viewstate.

DataGridColumnCollection class (System.Web.UI.WebControls)

TrackViewState

Description

A collection of System.Web.UI.WebControls.DataGridColumn derived column objects that represent the columns in a System.Web.UI.WebControls.DataGrid control. This class cannot be inherited.

Use the System.Web.UI.WebControls.DataGridColumnCollection to programmatically manage a collection of System.Web.UI.WebControls.DataGridColumn derived column objects. These objects represent the columns in a System.Web.UI.WebControls.DataGrid control. You can add, remove, or insert columns into the System.Web.UI.WebControls.DataGridColumnCollection.

DataGridColumnCollection

Example Syntax:

TrackViewState

[C#] public DataGridColumnCollection(DataGrid owner, ArrayList columns);

[C++] public: DataGridColumnCollection(DataGrid* owner, ArrayList* columns);

[VB] Public Sub New(ByVal owner As DataGrid, ByVal columns As ArrayList)

[JScript] public function DataGridColumnCollection(owner: DataGrid, columns: ArrayList);

Description

Initializes a new instance of the System.Web.UI.WebControls.DataGridColumnCollection class.

Use this constructor to create and initialize a new instance of the System.Web.UI.WebControls.DataGridColumnCollection class. The System.Web.UI.WebControls.DataGrid control that corresponds with this collection. A System.Collections.ArrayList object that stores the collection of columns.

Count

TrackViewState

[C#] public int Count {get;}

[C++] public: _property int get_Count( );

[VB] Public ReadOnly Property Count As Integer

[JScript] public function get Count( ): int;

Description

Gets the number of columns in the System.Web.UI.WebControls.DataGridColumnCollection.

Use this property to determine the number of columns in the System.Web.UI.WebControls.DataGridColumnCollection. The System.Web.UI.WebControls.DataGridColumnCollection.Count property is commonly used when iterating through the collection to determine the upper bound of the collection.

IsReadOnly

TrackViewState

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value that indicates whether the columns in the System.Web.UI.WebControls.DataGridColumnCollection can be modified.

This property always returns false to indicate that the System.Web.UI.WebControls.DataGridColumnCollection can be written to in all cases.

IsSynchronized

TrackViewState

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether access to the System.Web.UI.WebControls.DataGridColumnCollection is synchronized (thread-safe).

This property is derived from the System.Collections.ICollection class and overridden to always return false.

Item

TrackViewState

[C#] public DataGridColumn this[int index] {get;}

[C++] public: _property DataGridColumn* get_Item(int index);

[VB] Public Default ReadOnly Property Item(ByVal index As Integer) As DataGridColumn

[JScript] returnValue=DataGridColumnCollectionObject.Item(index);

Description

Gets a System.Web.UI.WebControls.DataGridColumn derived column object from the System.Web.UI.WebControls.DataGridColumnCollection collection at the specified index.

Use this indexer to get a System.Web.UI.WebControls.DataGridColumn derived column object from the System.Web.UI.WebControls.DataGridColumnCollection at the specified index using array notation. The index of the System.Web.UI.WebControls.DataGridColumn derived object in the System.Web.UI.WebControls.DataGridColumnCollection collection to retrieve.

SyncRoot

TrackViewState

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets the object that can be used to synchronize access to the System.Web.UI.WebControls.DataGridColumnCollection.

The object returned in this implementation is the System.Web.UI.WebControls.DataGridColumnCollection object.

Add

[C#] public void Add(DataGridColumn column);

[C++] public: void Add(DataGridColumn* column);

[VB] Public Sub Add(ByVal column As DataGridColumn)

[JScript] public function Add(column: DataGridColumn);

Description

Appends the specified System.Web.UI.WebControls.DataGridColumn derived column object to the end of the System.Web.UI.WebControls.DataGridColumnCollection.

Use this method to add a System.Web.UI.WebControls.DataGridColumn derived column object to the end of a System.Web.UI.WebControls.DataGridColumnCollection. The System.Web.UI.WebControls.DataGridColumn derived column object to append to the System.Web.UI.WebControls.DataGridColumnCollection.

AddAt

[C#] public void AddAt(int index, DataGridColumn column);

[C++] public: void AddAt(int index, DataGridColumn* column);

[VB] Public Sub AddAt(ByVal index As Integer, ByVal column As DataGridColumn)

[JScript] public function AddAt(index: int, column: DataGridColumn);

Description

Inserts a System.Web.UI.WebControls.DataGridColumn derived column object in the System.Web.UI.WebControls.DataGridColumnCollection at the specified index.

Use this method to insert a System.Web.UI.WebControls.DataGridColumn derived column object at the specified index location in the System.Web.UI.WebControls.DataGridColumnCollection. The index location in the System.Web.UI.WebControls.DataGridColumnCollection to insert the System.Web.UI.WebControls.DataGridColumn derived column object. The System.Web.UI.WebControls.DataGridColumn derived column object to insert into the System.Web.UI.WebControls.DataGridColumnCollection.

Clear

[C#] public void Clear( );

[C++] public: void Clear( );

[VB] Public Sub Clear( )

[JScript] public function Clear( );

Description

Removes all System.Web.UI.WebControls.DataGridColumn derived column objects from the System.Web.UI.WebControls.DataGridColumnCollection.

Use this method to remove all System.Web.UI.WebControls.DataGridColumn derived column objects from the System.Web.UI.WebControls.DataGridColumnCollection.

CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies the items from the System.Web.UI.WebControls.DataGridColumnCollection to the specified System.Array object, starting at the specified index in the System.Array object.

Use this method to copy the contents of the System.Web.UI.WebControls.DataGridColumnCollection into the specified System.Array object, starting at the specified index. A zero-based System.Array object that receives the copied items from the System.Web.UI.WebControls.DataGridColumnCollection. The first position in the specified System.Array object to receive the copied contents.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an System.Collections.IEnumerator interface that contains all System.Web.UI.WebControls.DataGridColumn derived column objects in the System.Web.UI.WebControls.DataGridColumnCollection.

Return Value: A System.Collections.IEnumerator interface that contains all System.Web.UI.WebControls.DataGridColumn derived column objects in the System.Web.UI.WebControls.DataGridColumnCollection.

Use this method to create a System.Collections.IEnumerator that can be iterated through easily to get each item in the System.Web.UI.WebControls.DataGridColumnCollection.

IndexOf

[C#] public int IndexOf(DataGridColumn column);

[C++] public: int IndexOf(DataGridColumn* column);

[VB] Public Function IndexOf(ByVal column As DataGridColumn) As Integer

[JScript] public function IndexOf(column: DataGridColumn): int;

Description

Returns the index of the specified System.Web.UI.WebControls.DataGridColumn derived column object from the System.Web.UI.WebControls.DataGridColumnCollection.

Return Value: The index position of the specified System.Web.UI.WebControls.DataGridColumn derived column object in the System.Web.UI.WebControls.DataGridColumnCollection. The default value is −1, which indicates that the specified System.Web.UI.WebControls.DataGridColumn derived object is not found.

Use this method to determine the index number of the specified System.Web.UI.WebControls.DataGridColumn derived column object in the System.Web.UI.WebControls.DataGridColumnCollection. If the specified System.Web.UI.WebControls.DataGridColumn derived column object is not found, an index of −1 is returned. The System.Web.UI. WebControls.DataGridColumn derived column object to search for in the System.Web.UI.WebControls.DataGridColumnCollection.

Remove

[C#] public void Remove(DataGridColumn column);

[C++] public: void Remove(DataGridColumn* column);

[VB] Public Sub Remove(ByVal column As DataGridColumn)

[JScript] public function Remove(column: DataGridColumn);

Description

Removes the specified System.Web.UI.WebControls.DataGridColumn derived column object from the System.Web.UI.WebControls.DataGridColumnCollection.

Use this method to remove the specified System.Web.UI.WebControls.DataGridColumn derived column object from a System.Web.UI.WebControls.DataGridColumnCollection. The System.Web.UI.WebControls.DataGridColumn derived column object to remove from the System.Web.UI.WebControls.DataGridColumnCollection.

RemoveAt

[C#] public void RemoveAt(int index);

[C++] public: void RemoveAt(int index);

[VB] Public Sub RemoveAt(ByVal index As Integer)

[JScript] public function RemoveAt(index: int);

Description

Removes a System.Web.UI.WebControls.DataGridColumn derived column object from the System.Web.UI.WebControls.DataGridColumnCollection at the specified index.

Use this method to remove a System.Web.UI.WebControls.DataGridColumn derived column object from a System.Web.UI.WebControls.DataGridColumnCollection at the specified index. The index of the System.Web.UI.WebControls.DataGridColumn derived column object in the System.Web.UI.WebControls.DataGridColumnCollection to remove.

IStateManager.LoadViewState

[C#] void IStateManager.LoadViewState(object savedState);

[C++] void IStateManager::LoadViewState(Object* savedState);

[VB] Sub LoadViewState(ByVal savedState As Object) Implements IStateManager.LoadViewState

[JScript] function IStateManager.LoadViewState(savedState: Object);

IStateManager. SaveViewState

[C#] object IStateManager.SaveViewState( );

[C++] Object* IStateManager::SaveViewState( );

[VB] Function SaveViewState( ) As Object Implements IStateManager. SaveViewState

[JScript] function IStateManager.SaveViewState( ): Object;

IStateManager.TrackViewState

[C#] void IStateManager.TrackViewState( );

[C++] void IStateManager::TrackViewState( );

[VB] Sub TrackViewState( ) Implements IStateManager. TrackViewState

[JScript] function IStateManager.TrackViewState( );

DataGridCommandEventArgs class (System.Web.UI.WebControls)

ToString

Description

Provides data for the System.Web.UI.WebControls.DataGrid.CancelCommand, System.Web.UI.WebControls.DataGrid.DeleteCommand, System.Web.UI.WebControls.DataGrid.EditCommand, System.Web.UI.WebControls.DataGrid.ItemCommand, and System.Web.UI.WebControls.DataGrid.UpdateCommand events of the System.Web.UI.WebControls.DataGrid control. This class cannot be inherited.

The System.Web.UI.WebControls.DataGrid.CancelCommand event is raised when the Cancel button for an item in the System.Web.UI.WebControls.DataGrid control is clicked.

DataGridCommandEventArgs

Example Syntax:

ToString

[C#] public DataGridCommandEventArgs(DataGridItem item, object commandSource, CommandEventArgs originalArgs);

[C++] public: DataGridCommandEventArgs(DataGridItem* item, Object* commandSource, CommandEventArgs* originalArgs);

[VB] Public Sub New(ByVal item As DataGridItem, ByVal commandSource As Object, ByVal originalArgs As CommandEventArgs)

[JScript] public function DataGridCommandEventArgs (item: DataGridItem, commandSource: Object, originalArgs: CommandEventArgs);

Description

Initializes a new instance of the System.Web.UI.WebControls.DataGridCommandEventArgs class.

Use this constructor to create and initialize a new instance of the System.Web.UI.WebControls.DataGridCommandEventArgs class. A System.Web.UI.WebControls.DataGridItem that represents the selected item in the System.Web.UI.WebControls.DataGrid. The source of the command. A System.Web.UI.WebControls.CommandEventArgs that contains the event data.

CommandArgument

CommandName

CommandSource

ToString

Description

Gets the source of the command.

Use the System.Web.UI.WebControls.DataGridCommandEventArgs.CommandSource property to determine the command source that raised the event. This property is commonly used to determine which command raised the event.

Item

ToString

[C#] public DataGridItem Item {get;}

[C++] public: _property DataGridItem* get_Item( );

[VB] Public ReadOnly Property Item As DataGridItem

[JScript] public function get Item( ): DataGridItem;

Description

Gets the item containing the command source in the System.Web.UI.WebControls.DataGrid control.

The System.Web.UI.WebControls.DataGridCommandEventArgs.Item property is used to access the properties of the selected item in the System.Web.UI.WebControls.DataGrid control.

DataGridCommandEventHandler delegate (System.Web.UI.WebControls)

ToString

Description

Represents the method that will handle the System.Web.UI.WebControls.DataGrid.CancelCommand, System.Web.UI.WebControls.DataGrid.DeleteCommand, System.Web.UI.WebControls.DataGrid.EditCommand, System.Web.UI.WebControls.DataGrid.ItemCommand, and System.Web.UI.WebControls.DataGrid.UpdateCommand events of a System.Web.UI.WebControls.DataGrid. The source of the event. A System.Web.UI.WebControls.DataGridCommandEventArgs that contains the event data.

When you create a System.Web.UI.WebControls.DataGridCommandEventHandler delegate, you identify the method that will handle the event. To associate the event with your event handler, add an instance of the delegate to the event. The event handler is called whenever the event occurs, unless you remove the delegate. For more information about event handler delegates, see.

DataGridItem class (System.Web.UI.WebControls)

ToString

Description

Represents an item (row) in the System.Web.UI.WebControls.DataGrid control.

A System.Web.UI.WebControls.DataGridItem object represents an item (row) in the System.Web.UI.WebControls-.DataGrid control, such as the heading section, the tooter section, or a data row.

DataGridItem

Example Syntax:

ToString

[C#] public DataGridItem(int itemIndex, int dataSetIndex, ListItemType itemType);

[C++] public: DataGridItem(int itemIndex, int dataSetIndex, ListItemType itemType);

[VB] Public Sub New(ByVal itemIndex As Integer, ByVal dataSetIndex As Integer, ByVal itemType As ListItemType)

[JScript] public function DataGridItem(itemIndex: int, dataSetIndex: int, itemType: ListItemType);

Description

Initializes a new instance of the System.Web.UI.WebControls.DataGridItem class.

Use this constructor to create and initialize a new instance of the System.Web.UI.WebControls.DataGridItem class. The index of the item in the System.Web.UI.WebControls.DataGrid control from the System.Web.UI.WebControls.DataGrid.Items collection. The index number of the item, from the bound data source, that appears in the System.Web.UI.WebControls.DataGrid control. One of the System.Web.UI.WebControls.ListItemType values.

AccessKey

Attributes

BackColor

BorderColor

BorderStyle

BorderWidth

Cells

ChildControlsCreated

ClientID

Context

Controls

ControlStyle

ControlStyleCreated

CssClass

DataItem

ToString

Description

Gets or sets the data item represented by the System.Web.UI.WebControls.DataGridItem object in the System.Web.UI.WebControls.DataGrid control.

Use the System.Web.UI.WebControls.DataGridItem property to specify or determine the properties of a data item represented by the System.Web.UI.WebControls.DataGridItem object in the System.Web.UI.WebControls.DataGrid control.

DataSetIndex

ToString

[C#] public virtual int DataSetIndex {get;}

[C++] public: _property virtual int get DataSetIndex( );

[VB] Overridable Public ReadOnly Property DataSetIndex As Integer

[JScript] public function get DataSetIndex( ): int;

Description

Gets the index number the System.Web.UI.WebControls.DataGridItem object from the bound data source.

Use the System.Web.UI.WebControls.DataGridItem.DataSetIndex property to the index number of the System.Web.UI.WebControls.DataGridItem object from the bound data source.

Enabled

EnableViewState

Events

Font

ForeColor

HasChildViewState

Height

HorizontalAlign

ID

IsTrackingViewState

ItemIndex

ToString

Description

Gets the index of the System.Web.UI.WebControls.DataGridItem object from the System.Web.UI.WebControls.DataGrid.Items collection of the System.Web.UI.WebControls.DataGrid control.

Use the System.Web.UI.WebControls.DataGridItem.ItemIndex property to determine the index number of the System.Web.UI.WebControls.DataGridItem object from the System.Web.UI.WebControls.DataGrid.Items collection of the System.Web.UI.WebControls.DataGrid control.

ItemType

ToString

[C#] public virtual ListItemType ItemType {get;}

[C++] public: _property virtual ListItemType get_ItemType( );

[VB] Overridable Public ReadOnly Property ItemType As ListItemType

[JScript] public function get ItemType( ): ListItemType;

Description

Gets the type of the item represented by the System.Web.UI.WebControls.DataGridItem object in the System.Web.UI.WebControls.DataGrid control.

Use the System.Web.UI.WebControls.DataGridItem.ItemType property to determine the type of an item in the System.Web.UI.WebControls.DataGrid control. The following table lists the various item types.

NamingContainer

Page

Parent

Site

Style

TabIndex

TagKey

TagName

TemplateSourceDirectory

ToolTip

UniqueID

VerticalAlign

ViewState

ViewStateIgnoresCase

Visible

Width

OnBubbleEvent

[C#] protected override bool OnBubbleEvent(object source, EventArgs e);

[C++] protected: bool OnBubbleEvent(Object* source, EventArgs* e);

[VB] Overrides Protected Function OnBubbleEvent(ByVal source As Object, ByVal e As EventArgs) As Boolean

[JScript] protected override function OnBubbleEvent (source: Object, e: EventArgs): Boolean;

Description

SetItemType

[C#] protected internal virtual void SetItemType(ListItemType itemType);

[C++] protected public: virtual void SetItemType(ListItemType itemtype);

[VB] Overridable Protected Friend Dim Sub SetItemType (ByVal itemType As ListItemType)

[JScript] package function SetItemType(itemType: ListItemType);

Description

DataGridItemCollection class (System.Web.UI.WebControls)

TrackViewState

Description

Represents a collection of System.Web.UI.WebControls.DataGridItem objects in a System.Web.UI.WebControls.DataGrid control.

The System.Web.UI.WebControls.DataGridItemCollection class represents a collection of System.Web.UI.WebControls.DataGridItem objects, which in turn represent the data items in a System.Web.UI.WebControls.DataGrid control. To programmatically retrieve System.Web.UI.WebControls.DataGridItem objects from a System.Web.UI.WebControls.DataGrid control, use one of following methods: Use the indexer to get a single System.Web.UI.WebControls.DataGridItem object from the collection, using array notation.

DataGridItemCollection

Example Syntax:

TrackViewState

[C#] public DataGridItemCollection(ArrayList items);

[C++] public: DataGridItemCollection(ArrayList* items);

[VB] Public Sub New(ByVal items As ArrayList)

[JScript] public function DataGridItemCollection(items: ArrayList);

Description

Initializes a new instance of the System.Web.UI.WebControls.DataGridItemCollection class.

Use this constructor to create and initialize a new instance of the System.Web.UI.WebControls.DataGridItemCollection class. A System.Collections.ArrayList object that contains the items with which to initialize the collection.

Count

TrackViewState

[C#] public int Count {get;}

[C++] public: _property int get_Count( );

[VB] Public ReadOnly Property Count As Integer

[JScript] public function get Count( ): int;

Description

Gets the number of System.Web.UI.WebControls.DataGridItem objects in the collection.

Use the System.Web.UI.WebControls.DataGridItemCollection.Count property to determine the number of System.Web.UI.WebControls.DataGridItem objects in the System.Web.UI.WebControls.DataGridItemCollection collection. The System.Web.UI.WebControls.DataGridItemCollection.Count property is commonly used when iterating through the collection to determine the upper bound of the collection.

IsReadOnly

TrackViewState

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value that indicates whether the System.Web.UI.WebControls.DataGridItem objects in the System.Web.UI.WebControls.DataGridItemCollection can be modified.

This property always returns false to indicate that the System.Web.UI.WebControls.DataGridItemCollection can be written to in all cases.

IsSynchronized

TrackViewState

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether access to the System.Web.UI.WebControls.DataGridItemCollection is synchronized (thread-safe).

This property is derived from the System.Collections.ICollection class and is overridden to always return false.

Item

TrackViewState

[C#] public DataGridItem this[int index] {get;}

[C++] public: _property DataGridItem* get_Item(int index);

[VB] Public Default ReadOnly Property Item(ByVal index As Integer) As DataGridItem

[JScript] returnValue=DataGridItemCollectionObject.Item (index);

Description

Gets the System.Web.UI.WebControls.DataGridItem object at the specified index in the collection.

Use this indexer to get a System.Web.UI.WebControls.DataGridItem object from the System.Web.UI.WebControls.DataGridItemCollection at the specified index, using array notation. The zero-based index of the System.Web.UI.WebControls.DataGridItem object to retrieve from the collection.

SyncRoot

TrackViewState

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets the object that can be used to synchronize access to the System.Web.UI.WebControls.DataGridItemCollection.

The object returned in this implementation is the System.Web.UI.WebControls.DataGridItemCollection object itself.

CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies all the items from this System.Web.UI.WebControls.DataGridItemCollection to the specified System.Array object, starting at the specified index in the System.Array object.

Use this method to copy the contents of the System.Web.UI.WebControls.DataGridItemCollection collection into the specified System.Array object, starting at the specified index. A zero-based System.Array object that receives the copied items from the System.Web.UI.WebControls.DataGridItemCollection. The first position in the specified System.Array object to receive the copied contents.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ):IEnumerator;

Description

Returns a System.Collections.IEnumerator interface that contains all System.Web.UI.WebControls.DataGridItem objects in the System.Web.UI.WebControls.DataGridItemCollection.

Return Value: A System.Collections.IEnumerator interface that contains all System.Web.UI.WebControls.DataGridItem objects in the System.Web.UI.WebControls.DataGridItemCollection.

Use this method to create a System.Collections.IEnumerator that can be easily iterated through to get each item in the System.Web.UI.WebControls.DataGridItemCollection.

DataGridItemEventArgs class (System.Web.UI.WebControls)

ToString

Description

Provides data for the System.Web.UI.WebControls.DataGrid.ItemCreated and System.Web.UI.WebControls.DataGrid.ItemDataBound events of the System.Web.UI.WebControls.DataGrid control. This class cannot be inherited.

The System.Web.UI.WebControls.DataGrid.ItemCreated event is raised when an item in the System.Web.UI.WebControls.DataGrid control is created.

DataGridItemEventArgs

Example Syntax:

ToString

[C#] public DataGridItemEventArgs(DataGridItem item);

[C++] public: DataGridItemEventArgs(DataGridItem* item);

[VB] Public Sub New(ByVal item As DataGridItem)

[JScript] public function DataGridItemEventArgs(item: DataGridItem);

Description

Initializes a new instance of System.Web.UI.WebControls.DataGridItemEventArgs class.

Use this constructor to create and initialize a new instance of the System.Web.UI.WebControls.DataGridItemEventArgs class. A System.Web.UI.WebControls.DataGridItem that represents an item in the System.Web.UI.WebControls.DataGrid.

Item

ToString

[C#] public DataGridItem Item {get;}

[C++] public: _property DataGridItem* get_Item( );

[VB] Public ReadOnly Property Item As DataGridItem

[JScript] public function get Item( ): DataGridItem;

Description

Gets the referenced item in the System.Web.UI.WebControls.DataGrid control when the event is raised.

Use this property to programmatically access the item referenced in the System.Web.UI.WebControls.DataGrid control when the event is raised.

DataGridItemEventHandler delegate (System.Web.UI.WebControls)

ToString

Description

Represents the method that will handle the System.Web.UI.WebControls.DataGrid.ItemCreated and System.Web.UI.WebControls.DataGrid.ItemDataBound events of a System.Web.UI.WebControls.DataGrid. The source of the event. A System.Web.UI.WebControls.DataGridItemEventArgs than contains the event data.

The System.Web.UI.WebControls.DataGrid.ItemCreated event is raised when an item in the System.Web.UI.WebControls.DataGrid control is created.

DataGridPageChangedEventArgs class (System.Web.UI.WebControls)

ToString

Description

Provides data for the System.Web.UI.WebControls.DataGrid.PageIndexChanged event of the System.Web.UI.WebControls.DataGrid control. This class cannot be inherited.

The System.Web.UI.WebControls.DataGrid.PageIndexChanged event is raised when a button in the page selection element of the System.Web.UI.WebControls.DataGrid control is clicked.

DataGridPageChangedEventArgs

Example Syntax:

ToString

[C#] public DataGridPageChangedEventArgs(object commandSource, int newPageIndex);

[C++] public: DataGridPageChangedEventArgs(Object* commandSource, int newPageIndex);

[VB] Public Sub New(ByVal commandSource As Object, ByVal newPageIndex As Integer)

[JScript] public function DataGridPageChangedEventArgs (commandSource: Object, newPageIndex: int);

Description

Initializes a new instance of the System.Web.UI.WebControls.DataGridPageChangedEventArgs class.

Use this constructor to create and initialize a new instance of the System.Web.UI.WebControls.DataGridPageChangedEventArgs class. The source of the command. The index of the page selected by the user from the page selection element of the System.Web.UI.WebControls.DataGrid control.

CommandSource

ToString

[C#] public object CommandSource {get;}

[C++] public: _property Object* get_CommandSource( );

[VB] Public ReadOnly Property CommandSource As Object

[JScript] public function get CommandSource( ): Object;

Description

Gets the source of the command.

Use the System.Web.UI.WebControls.DataGridPageChangedEventArgs.CommandSource property to determine the source of the command that raised the event.

Because this event is only raised when a button in the page selection element of the System.Web.UI.WebControls.DataGrid control is clicked, the returned source is a System.Web.UI.WebControls.DataGridItem that represents the page selection element.

NewPageIndex

ToString

[C#] public int NewPageIndex {get;}

[C++] public: _property int get_NewPageIndex( );

[VB] Public ReadOnly Property NewPageIndex As Integer

[JScript] public function get NewPageIndex( ): int;

Description

Gets the index of the page selected by the user in the page selection element of the System.Web.UI.WebControls.DataGrid control.

Use the System.Web.UI.WebControls.DataGridPageChangedEventArgs.NewPageIndex property to determine the index of the page selected by the user in the page selection element of the System.Web.UI.WebControls.DataGrid control. This value is often used to set the System.Web.UI.WebControls.DataGrid.CurrentPageIndex property of the System.Web.UI.WebControls.DataGrid control to display the selected page.

DataGridPageChangedEventHandler delegate (System.Web.UI.WebControls)

ToString

Description

Represents the method that will handle the System.Web.UI.WebControls.DataGrid.PageIndexChanged event of the System.Web.UI.WebControls.DataGrid control. The source of the event. A System.Web.UI.WebControls.DataGridPageChangedEventArgs that contains the event data.

The System.Web.UI.WebControls.DataGrid.PageIndexChanged event is raised when a button in the page selection element of the System.Web.UI.WebControls.DataGrid control is clicked.

DataGridPagerStyle class (System.Web.UI.WebControls)

ToString

Description

Specifies the style for the pager of the System.Web.UI.WebControls.DataGrid control. This class cannot be inherited.

The pager is an element on the System.Web.UI.WebControls.DataGrid control that allow you to link to other pages when paging is enabled. The System.Web.UI.WebControls.DataGrid.PagerStyle property of the System.Web.UI.WebControls.DataGrid uses an instance of this class to represent the style properties for the pager.

BackColor

BorderColor

BorderStyle

BorderWidth

Container

CssClass

DesignMode

Events

Font

ForeColor

Height

HorizontalAlign

IsEmpty

IsTrackingViewState

Mode

ToString

Description

Gets or sets a value that specifies whether the pager element displays buttons that link to the next and previous page, or numeric buttons that link directly to a page.

Use the System.Web.UI.WebControls.DataGridPagerStyle.Mode property to specify which set of pager buttons to use on the System.Web.UI.WebControls.DataGrid control. You can specify buttons that link to the next and previous page, or numeric buttons that link directly to a page.

NextPageText

ToString

[C#] public string NextPageText {get; set;}

[C++] public: _property String* get_NextPageText( );
public: _property void set_NextPageText(String*);

[VB] Public Property NextPageText As String

[JScript] public function get NextPageText( ): String;public function set NextPageText(String);

Description

Gets or sets the text displayed for the next page button.

Use the System.Web.UI.WebControls.DataGridPagerStyle.NextPageText property to provide custom text for the next page button. The System.Web.UI.WebControls.DataGridPagerStyle.Mode property must be set to PagerMode.NextPrev for this property to have any effect.

PageButtonCount

ToString

[C#] public int PageButtonCount {get; set;}

[C++] public: _property int get_PageButtonCount( );
public: _property void set_PageButtonCount(int);

[VB] Public Property PageButtonCount As Integer

[JScript] public function get PageButtonCount( ): int;public function set PageButtonCount(int);

Description

Gets or sets the number of numeric buttons to display concurrently in the pager element of the System.Web.UI.WebControls.DataGrid control.

Use the System.Web.UI.WebControls.DataGridPagerStyle.PageButtonCount property to specify the number of numeric buttons to display concurrently in the pager element of the System.Web.UI.WebControls.DataGrid control. The System.Web.UI.WebControls.DataGridPagerStyle.Mode property must be set to PagerMode.NumericPages for this property to have any effect.

Position

ToString

[C#] public PagerPosition Position {get; set;}

[C++] public: _property PagerPosition get_Position( );public: _property void set_Position(PagerPosition);

[VB] Public Property Position As PagerPosition

[JScript] public function get Position( ): PagerPosition;public function set Position(PagerPosition);

Description

Gets or sets the position of the pager element in the System.Web.UI.WebControls.DataGrid control.

Use the System.Web.UI.WebControls.DataGridPagerStyle.Position property to specify the location where the pager element is displayed in the System.Web.UI.WebControls.DataGrid control. The pager element can be displayed at the upper edge, the lower edge, or at both the upper and lower edges of the System.Web.UI.WebControls.DataGrid control.

PrevPageText

ToString

[C#] public string PrevPageText {get; set;}

[C++] public: _property String* get_PrevPageText( );
public: _property void set_PrevPageText(String*);
[VB] Public Property PrevPageText As String
[JScript] public function get PrevPageText( ): String;public function set PrevPageText(String);

Description

Gets or sets the text displayed for the previous page button.

Use the System.Web.UI.WebControls.DataGridPagerStyle.PrevPageText property to provide custom text for the next page button. The System.Web.UI.WebControls.DataGridPagerStyle.Mode property must be set to PagerMode.NextPrev for this property to have any effect.

Site

VerticalAlign

ViewState

Visible

ToString

Description

Gets or sets a value indicating whether the pager is displayed in the System.Web.UI.WebControls.DataGrid control.

Use the System.Web.UI.WebControls.DataGridPagerStyle.Visible property to specify whether the pager is displayed in the System.Web.UI.WebControls.DataGrid control.

Width

Wrap

CopyFrom

[C#] public override void CopyFrom(Style s);
[C++] public: void CopyFrom(Style* s);
[VB] Overrides Public Sub CopyFrom(ByVal s As Style)
[JScript] public override function CopyFrom(s: Style);

Description

Copies the style of the specified System.Web.UI.WebControls.Style object into this instance of the System.Web.UI.WebControls.DataGridPagerStyle class.

Use the System.Web.UI.WebControls.DataGridPagerStyle.CopyFrom(System.Web.UI.WebControls.Style) method to copy the style properties of the specified System.Web.UI.WebControls.Style object into this instance of the System.Web.UI.WebControls.DataGridPagerStyle class. The System.Web.UI.WebControls.Style object to copy from.

MergeWith

[C#] public override void MergeWith(Style s);
[C++] public: void MergeWith(Style* s);
[VB] Overrides Public Sub MergeWith(ByVal s As Style)
[JScript] public override function MergeWith(s: Style);

Description

Merges the style of the specified System.Web.UI.WebControls.Style object with this instance of the System.Web.UI.WebControls.DataGridPagerStyle class.

Use the System.Web.UI.WebControls.DataGridPagerStyle.MergeWith(System.Web.UI.WebControls.Style) method to combine the style properties of the specified System.Web.UI.WebControls.Style object with this instance of the System.Web.UI.WebControls.DataGridPagerStyle class. If a property from this instance is already set to a value, the property is unchanged. If a property is not set, this method sets that property with the value from the corresponding property the System.Web.UI.WebControls.Style object. The System.Web.UI.WebControls.Style object to merge with.

Reset

[C#] public override void Reset( );
[C++] public: void Reset( );
[VB] Overrides Public Sub Reset( )
[JScript] public override function Reset( );

Description

Restores the System.Web.UI.WebControls.DataGridPagerStyle object to its default values.

Use the System.Web.UI.WebControls.DataGridPagerStyle.Reset method to restore the System.Web.UI.WebControls.DataGridPagerStyle object to its default values.

DataGridSortCommandEventArgs class (System.Web.UI.WebControls)

TrackViewState

Description

Provides data for the System.Web.UI.WebControls.DataGrid.SortCommand event of the System.Web.UI.WebControls.DataGrid control. This class cannot be inherited.

When sorting is enabled by setting the System.Web.UI.WebControls.DataGrid.AllowSorting property of the System.Web.UI.WebControls.DataGrid control to true, System.Web.UI.WebControls.LinkButton controls are rendered in the header of each column that has the System.Web.UI.WebControls.DataGridColumn.SortExpression property set. (For automatically generated columns, the System.Web.UI.WebControls.DataGridColumn.SortExpression property contains the same value as the data field.) These links allow you to sort the System.Web.UI.WebControls.DataGrid control by the selected column. The System.Web.UI.WebControls.DataGrid.SortCommand event is raised when a System.Web.UI.WebControls.LinkButton control is clicked.

DataGridSortCommandEventArgs

Example Syntax:

TrackViewState

[C#] public DataGridSortCommandEventArgs(object commandSource, DataGridCommandEventArgs dce);
[C++] public: DataGridSortCommandEventArgs(Object* commandSource, DataGridCommandEventArgs* dce);
[VB] Public Sub New(ByVal commandSource As Object, ByVal dce As DataGridCommandEventArgs)
[JScript] public function DataGridSortCommandEventArgs (commandSource: Object, dce: DataGridCommandEventArgs);

Description

Initializes a new instance of the System.Web.UI.WebControls.DataGridSortCommandEventArgs class.

Use this constructor to create and initialize a new instance of the System.Web.UI.WebControls.DataGridSortCommandEventArgs class. The source of the command. A System.Web.UI.WebControls.DataGridCommandEventArgs that contains the event data.

CommandSource

TrackViewState

[C#] public object CommandSource {get;}
[C++] public: _property Object* get_CommandSource( );
[VB] Public ReadOnly Property CommandSource As Object
[JScript] public function get CommandSource( ): Object;

Description

Gets the source of the command.

Use the System.Web.UI.WebControls.DataGridSortCommandEventArgs.CommandSource property to get the command source that raises the System.Web.UI.WebControls.DataGrid.SortCommand event. Because this event is only raised when a link is clicked in the header of the System.Web.UI.WebControls.DataGrid control, the returned source is a System.Web.UI.WebControls.DataGridItem that represents the header. This property can be used to programmatically control the header.

SortExpression

TrackViewState

[C#] public string SortExpression {get;}

[C++] public: _property String* get_SortExpression( );

[VB] Public ReadOnly Property SortExpression As String

[JScript] public function get SortExpression( ): String;

Description

Gets the expression used to sort the System.Web.UI.WebControls.DataGrid control.

Use the System.Web.UI.WebControls.DataGridSortCommandEventArgs.SortExpression property to determine which column the user selects to sort the System.Web.UI.WebControls.DataGrid control.

DataGridSortCommandEventHandler delegate (System.Web.UI.WebControls)

ToString

Description

Represents the method that will handle the System.Web.UI.WebControls.DataGrid.SortCommand event of the System.Web.UI.WebControls.DataGrid control. The source of the event. A System.Web.UI.WebControls.DataGridSortCommandEventArgs that contains the event data.

When sorting is enabled by setting the System.Web.UI.WebControls.DataGrid.AllowSorting property of the System.Web.UI.WebControls.DataGrid control to true, System.Web.UI.WebControls.LinkButton controls are rendered in the header of each column. These links allow you to sort the System.Web.UI.WebControls.DataGrid control by the selected column. The System.Web.UI.WebControls.DataGrid.SortCommand event is raised when a System.Web.UI.WebControls.LinkButton control is clicked.

DataKeyCollection class (System.Web.UI.WebControls)

ToString

Description

Represents a collection of primary key field names. This class cannot be inherited.

DataKeyCollection

Example Syntax:

ToString

[C#] public DataKeyCollection(ArrayList keys);

[C++] public: DataKeyCollection(ArrayList* keys);

[VB] Public Sub New(ByVal keys As ArrayList)

[JScript] public function DataKeyCollection(keys: ArrayList);

Description

Initializes a new instance of the System.Web.UI.WebControls.DataKeyCollection class. A System.Collections.ArrayList to store the keys.

Count

ToString

[C#] public int Count {get;}

[C++] public: _property int get_Count( );

[VB] Public ReadOnly Property Count As Integer

[JScript] public function get Count( ): int;

Description

Gets the number of objects in the collection. This property is read-only.

IsReadOnly

ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets the value that specifies whether items in the System.Web.UI.WebControls.DataKeyCollection can be modified. This property is read-only.

IsSynchronized

ToString

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value that indicates whether the System.Web.UI.WebControls.DataKeyCollection is thread-safe. This property is read-only.

Item

ToString

[C#] public object this[int index] {get;}

[C++] public: _property Object* get_Item(int index);

[VB] Public Default ReadOnly Property Item(ByVal index As Integer) As Object

[JScript] returnValue=DataKeyCollectionObject.Item(index);

Description

Gets the primary key field name at the specified index in the collection. This property is read-only. The index of the primary key field name in the collection to retrieve.

SyncRoot

ToString

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets the object used to synchronize access to the collection. This property is read-only.

CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies the contents of the entire collection into an System.Array appending at the specified index of the System.Array. The System.Array to copy the contents of the collection into. The index of the System.Array to begin copying the contents of the collection into.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Creates an enumerator for the System.Web.UI.WebControls.DataKeyCollection used to iterate through the collection.

DataList class (System.Web.UI.WebControls)

ToString

Description

A data bound list control that displays items using templates.

Use the System.Web.UI.WebControls.DataList control to display a template-defined data bound list. The System.Web.UI.WebControls.DataList control supports selecting and editing.

ToString

[C#] public const string CancelCommandName;

[C++] public: const String* CancelCommandName;

[VB] Public Const CancelCommandName As String

[JScript] public var CancelCommandName: String;

Description

Represents the Cancel command name. This field is read-only.

Use the System.Web.UI.WebControls.DataList.CancelCommandName field to represent the Cancel command name.

ToString

[C#] public const string DeleteCommandName;

[C++] public: const String* DeleteCommandName;

[VB] Public Const DeleteCommandName As String

[JScript] public var DeleteCommandName: String;

Description

Represents the Delete command name. This field is read-only.

Use the System.Web.UI.WebControls.DataList.DeleteCommandName field to represent the Delete command name.

ToString

[C#] public const string EditCommandName;

[C++] public: const String* EditCommandName;

[VB] Public Const EditCommandName As String

[JScript] public var EditCommandName: String;

Description

Represents the Edit command name. This field is read-only.

Use the System.Web.UI.WebControls.DataList.EditCommandName field to represent the Edit command name.

ToString

[C#] public const string SelectCommandName;

[C++] public: const String* SelectCommandName;

[VB] Public Const SelectCommandName As String

[JScript] public var SelectCommandName: String;

Description

Represents the Select command name. This field is read-only. Use the System.Web.UI.WebControls.DataList.SelectCommandName field to represent the Select command name.

ToString

[C#] public const string UpdateCommandName;

[C++] public: const String* UpdateCommandName;

[VB] Public Const UpdateCommandName As String

[JScript] public var UpdateCommandName: String;

Description

Represents the Update command name. This field is read-only.

Use the System.Web.UI.WebControls.DataList.UpdateCommandName field to represent the Update command name.

DataList

Example Syntax:

ToString

[C#] public DataList( );

[C++] public: DataList( );

[VB] Public Sub New( )

[JScript] public function DataList( );

Description

Initializes a new instance of the System.Web.UI.WebControls.DataList class.

Use this constructor to create and initialize a new instance of the System.Web.UI.WebControls.DataList class.

AccessKey

AlternatingItemStyle

ToString

Description

Gets the style properties for alternating items in the System.Web.UI.WebControls.DataList control.

Use the System.Web.UI.WebControls.DataList.AlternatingItemStyle property to provide a custom style for the alternating items in the System.Web.UI.WebControls.DataList control. Common style attributes that can be adjusted include forecolor, backcolor, font, and content alignment within the cell. Providing a different style enhances the appearance of the System.Web.UI.WebControls.DataList control.

AlternatingItemTemplate

ToString

[C#] public virtual ITemplate AlternatingItemTemplate {get; set;}

[C++] public: _property virtual ITemplate* get_AlternatingItemTemplate( );public: _property virtual void set_AlternatingItemTemplate(ITemplate*);

[VB] Overridable Public Property AlternatingItemTemplate As ITemplate

[JScript] public function get AlternatingItemTemplate( ): ITemplate;public function set AlternatingItemTemplate (ITemplate);

Description

Gets or sets the template for alternating items in the System.Web.UI.WebControls.DataList.

Use the System.Web.UI.WebControls.DataList.AlternatingItemTemplate property to control the contents of alternating items in the System.Web.UI.WebControls.DataList control. The appearance of alternating items is controlled by the System.Web.UI.WebControls.DataList.AlternatingItemStyle property.

Attributes

BackColor

BorderColor

BorderStyle

BorderWidth

CellPadding

CellSpacing

ChildControlsCreated

ClientID

Context

Controls

ControlStyle

ControlStyleCreated

CssClass

DataKeyField

DataKeys

DataKeysArray

DataMember

DataSource

EditItemIndex

ToString

Description

Gets or sets the index number of the selected item in the System.Web.UI.WebControls.DataList control to edit.

Use the System.Web.UI.WebControls.DataList.EditItemIndex property to programmatically specify the item selected for editing. You can also use this property to determine the index of the item selected for editing.

EditItemStyle

ToString

[C#] public virtual TableItemStyle EditItemStyle {get;}

[C++] public: _property virtual TableItemStyle* get_EditItemStyle( );

[VB] Overridable Public ReadOnly Property EditItemStyle As TableItemStyle

[JScript] public function get EditItemStyle( ): TableItemStyle;

Description

Gets the style properties for the item selected for editing in the System.Web.UI.WebControls.DataList control.

Use the System.Web.UI.WebControls.DataList.EditItemStyle property to provide a custom style for the item selected for editing in the System.Web.UI.WebControls.DataList control. Common style attributes that can be adjusted include forecolor, backcolor, font, and content alignment within the cell. Providing a different style enhances the appearance of the System.Web.UI.WebControls.DataList control.

EditItemTemplate

ToString

[C#] public virtual ITemplate EditItemTemplate {get; set;}

[C++] public: _property virtual ITemplate* get_EditItemTemplate( );public: _property virtual void set_EditItemTemplate(ITemplate*);

[VB] Overridable Public Property EditItemTemplate As ITemplate

[JScript] public function get EditItemTemplate( ): ITemplate; public function set EditItemTemplate(ITemplate);

Description

Gets or sets the template for the item selected for editing in the System.Web.UI.WebControls.DataList control.

Use the System.Web.UI.WebControls.DataList.EditItemTemplate property to control the contents of the item selected for editing in the System.Web.UI.WebControls.DataList control. The appearance of the item selected for editing is controlled by the System.Web.UI.WebControls.DataList.EditItemStyle property.

Enabled

EnableViewState

Events

ExtractTemplateRows

ToString

Description

Gets or sets a value that indicates whether the rows of a System.Web.UI.WebControls.Table control, defined in each template of a System.Web.UI.WebControls.DataList control, are extracted and displayed.

The contents of the System.Web.UI.WebControls.DataList control are specified by using templates. Normally, you list controls that you want to display in the templates. You can also place a System.Web.UI.WebControls.Table control in a template and display the rows of the table.

Font

FooterStyle

ToString

Description

Gets the style properties for the tooter section of the System.Web.UI.WebControls.DataList control.

Use this property to provide a custom style for the tooter section of the System.Web.UI.WebControls.DataList control. Common style attributes that can be adjusted include forecolor, backcolor, font, and content alignment within the cell. Providing a different style enhances the appearance of the System.Web.UI.WebControls.DataList control.

FooterTemplate

ToString

[C#] public virtual ITemplate FooterTemplate {get; set;}

[C++] public: _property virtual ITemplate* get_FooterTemplate( );public: _property virtual void set_FooterTemplate (ITemplate*);

[VB] Overridable Public Property FooterTemplate As ITemplate

[JScript] public function get FooterTemplate( ): ITemplate; public function set FooterTemplate(ITemplate);

Description

Gets or sets the template for the tooter section of the System.Web.UI.WebControls.DataList control.

Use the System.Web.UI.WebControls.DataList.FooterTemplate property to control the contents of the tooter section. The appearance of the tooter section is controlled by the System.Web.UI.WebControls.DataList.FooterStyle property.

ForeColor

GridLines

ToString

Description

Gets or sets the grid line style for the System.Web.UI.WebControls.DataList control when the System.Web.UI.WebControls.DataList.RepeatLayout property is set to RepeatLayout.Table.

Use the System.Web.UI.WebControls.DataList.GridLines property to specify the grid line style for the System.Web.UI.WebControls.DataList control. The following table lists the possible styles.

HasChildViewState

HeaderStyle

ToString

Description

Gets the style properties for the heading section of the System.Web.UI.WebControls.DataList control.

Use this property to provide a custom style for the heading of the System.Web.UI.WebControls.DataList control. Common style attributes that can be adjusted include forecolor, backcolor, font, and content alignment within the cell. Providing a different style enhances the appearance of the System.Web.UI.WebControls.DataList control.

HeaderTemplate

ToString

[C#] public virtual ITemplate HeaderTemplate {get; set;}

[C++] public: _property virtual ITemplate* get_HeaderTemplate( );public: _property virtual void set_HeaderTemplate (ITemplate*);

[VB] Overridable Public Property HeaderTemplate As ITemplate

[JScript] public function get HeaderTemplate( ): ITemplate; public function set HeaderTemplate(ITemplate);

Description

Gets or sets the template for the heading section of the System.Web.UI.WebControls.DataList control.

Use the System.Web.UI.WebControls.DataList.HeaderTemplate property to control the contents of the heading section. The appearance of the header section is controlled by the System.Web.UI.WebControls.DataList.HeaderStyle property.

Height

HorizontalAlign

ID

IsTrackingViewState

Items

ToString

Description

Gets a collection of System.Web.UI.WebControls.DataListItem objects representing the individual items within the control.

Use the System.Web.UI.WebControls.DataList.Items collection to programmatically control the items in the System.Web.UI.WebControls.DataList control. The System.Web.UI.WebControls.DataList.Items collection does not provide any methods to add or remove items to the collection. However, you can control the contents of an item by providing a handler for the System.Web.UI.WebControls.DataList.ItemCreated event.

ItemStyle

ToString

[C#] public virtual TableItemStyle ItemStyle {get;}

[C++] public: _property virtual TableItemStyle* get_ItemStyle( );

[VB] Overridable Public ReadOnly Property ItemStyle As TableItemStyle

[JScript] public function get ItemStyle( ): TableItemStyle;

Description

Gets the style properties for the items in the System.Web.UI.WebControls.DataList control.

Use this property to provide a custom style for the items of the System.Web.UI.WebControls.DataList control. Common style attributes that can be adjusted include forecolor, backcolor, font, and content alignment within the cell. Providing a different style enhances the appearance of the System.Web.UI.WebControls.DataList control.

ItemTemplate

ToString

[C#] public virtual ITemplate ItemTemplate {get; set;}

[C++] public: _property virtual ITemplate* get_ItemTemplate( );public: _property virtual void set_ItemTemplate (ITemplate*);

[VB] Overridable Public Property ItemTemplate As ITemplate

[JScript] public function get ItemTemplate( ): ITemplate; public function set ItemTemplate(ITemplate);

Description

Gets or sets the template for the items in the System.Web.UI.WebControls.DataList control.

Use the System.Web.UI.WebControls.DataList.ItemTemplate property to control the contents of the items in the System.Web.UI.WebControls.DataList control. The appearance of the items in the System.Web.UI.WebControls.DataList control is controlled by the System.Web.UI.WebControls.DataList.ItemStyle property.

NamingContainer

Page

Parent

RepeatColumns

ToString

Description

Gets or sets the number of columns to display in the System.Web.UI.WebControls.DataList control.

Use this property to specify the number of columns that display items in the System.Web.UI.WebControls.DataList control. For example, if you set this property to 5, the System.Web.UI.WebControls.DataList control displays its items in five columns.

RepeatDirection

ToString

[C#] public virtual RepeatDirection RepeatDirection {get; set;}

[C++] public: _property virtual RepeatDirection get_RepeatDirection( );public: _property virtual void set_RepeatDirection(RepeatDirection);

[VB] Overridable Public Property RepeatDirection As RepeatDirection

[JScript] public function get RepeatDirection( ): RepeatDirection;public function set RepeatDirection(RepeatDirection);

Description

Gets or sets whether the System.Web.UI.WebControls.DataList control displays vertically or horizontally.

Use the System.Web.UI.WebControls.DataList.RepeatDirection property to specify the display direction of the System.Web.UI.WebControls.DataList control.

RepeatLayout

ToString

[C#] public virtual RepeatLayout RepeatLayout {get; set;}

[C++] public: _property virtual RepeatLayout get_RepeatLayout( );public: _property virtual void set_RepeatLayout (RepeatLayout);

[VB] Overridable Public Property RepeatLayout As RepeatLayout

[JScript] public function get RepeatLayout( ): RepeatLayout; public function set RepeatLayout(RepeatLayout);

Description

Gets or sets whether the control is displayed in a table or flow layout.

Use the System.Web.UI.WebControls.DataList.RepeatLayout property to specify whether the items in the System.Web.UI.WebControls.DataList control are displayed in a table. If this property is set to RepeatLayout.Table, the items in the list are displayed in a table. If this property is set to RepeatLayout.Flow, the items in the list are displayed without a table structure.

SelectedIndex

ToString

[C#] public virtual int SelectedIndex {get; set;}

[C++] public: _property virtual int get_SelectedIndex( );public: _property virtual void set_SelectedIndex(int);

[VB] Overridable Public Property SelectedIndex As Integer

[JScript] public function get SelectedIndex( ): int;public function set SelectedIndex(int);

Description

Gets or sets the index of the selected item in the System.Web.UI.WebControls.DataList control.

Use the System.Web.UI.WebControls.DataList.SelectedIndex property to programmatically specify the selected item in the System.Web.UI.WebControls.DataList control. You can also use this property to determine the index of the selected item.

SelectedItem

ToString

[C#] public virtual DataListItem SelectedItem {get;}

[C++] public: _property virtual DataListItem* get_SelectedItem( );

[VB] Overridable Public ReadOnly Property SelectedItem As DataListItem

[JScript] public function get SelectedItem( ): DataListItem;

Description

Gets the selected item in the System.Web.UI.WebControls.DataList control.

Use the System.Web.UI.WebControls.DataList.SelectedItem property to get a System.Web.UI.WebControls.DataListItem object that represents the selected item in the System.Web.UI.WebControls.DataList control. This object can then be used to access the properties of the selected item.

SelectedItemStyle

ToString

[C#] public virtual TableItemStyle SelectedItemStyle {get;}

[C++] public: _property virtual TableItemStyle* get_SelectedItemStyle( );

[VB] Overridable Public ReadOnly Property SelectedItemStyle As TableItemStyle

[JScript] public function get SelectedItemStyle( ): TableItemStyle;

Description

Gets the style properties for the selected item in the System.Web.UI.WebControls.DataList control.

Use this property to provide a custom style for the selected item in the System.Web.UI.WebControls.DataList control. Common style attributes that can be adjusted include forecolor, backcolor, font, and content alignment within the cell. Providing a different style enhances the appearance of the System.Web.UI.WebControls.DataList control.

SelectedItemTemplate

ToString

[C#] public virtual ITemplate SelectedItemTemplate {get; set;}

[C++] public: _property virtual ITemplate* get_SelectedItemTemplate( );public: _property virtual void set_SelectedItemTemplate(ITemplate*);

[VB] Overridable Public Property SelectedItemTemplate As ITemplate

[JScript] public function get SelectedItemTemplate( ): ITemplate;public function set SelectedItemTemplate(ITemplate);

Description

Gets or sets the template for the selected item in the System.Web.UI.WebControls.DataList control.

Use the System.Web.UI.WebControls.DataList.SelectedItemTemplate property to control the contents of the selected item. The appearance of the selected item is controlled by the System.Web.UI.WebControls.DataList.SelectedItemStyle property.

SeparatorStyle

ToString

[C#] public virtual TableItemStyle SeparatorStyle {get;}

[C++] public: _property virtual TableItemStyle* get_SeparatorStyle( );

[VB] Overridable Public ReadOnly Property SeparatorStyle As TableItemStyle

[JScript] public function get SeparatorStyle( ): TableItemStyle;

Description

Gets the style properties of the separator between each item in the System.Web.UI.WebControls.DataList control.

Use the System.Web.UI.WebControls.DataList.SeparatorStyle property to provide a custom style for the separator between each item in the System.Web.UI.WebControls.DataList control. The separator allows you to place an element with custom content between each item in the System.Web.UI.WebControls.DataList control. Common style attributes that can be adjusted include forecolor, backcolor, font, and content alignment within the cell. Providing a different style enhances the appearance of the System.Web.UI.WebControls.DataList control.

SeparatorTemplate

ToString

[C#] public virtual ITemplate SeparatorTemplate {get; set;}

[C++] public: _property virtual ITemplate* get_SeparatorTemplate( );public: _property virtual void set_SeparatorTemplate(ITemplate*);

[VB] Overridable Public Property SeparatorTemplate As ITemplate

[JScript] public function get SeparatorTemplate( ): ITemplate;public function set SeparatorTemplate(ITemplate);

Description

Gets or sets the template for the separator between the items of the System.Web.UI.WebControls.DataList control.

Use the System.Web.UI.WebControls.DataList.SeparatorTemplate property to control the contents of the separator between the items of the System.Web.UI.WebControls.DataList control. The separator allows you to place an element with custom content between each item in the System.Web.UI.WebControls.DataList control. The appearance of the separator between the items of the System.Web.UI.WebControls.DataList control is controlled by the System.Web.UI.WebControls.DataList.SeparatorStyle property.

ShowFooter

ToString

[C#] public virtual bool ShowFooter {get; set;}

[C++] public: _property virtual bool get_ShowFooter( );public: _property virtual void set_ShowFooter(bool);

[VB] Overridable Public Property ShowFooter As Boolean

[JScript] public function get ShowFooter( ): Boolean;public function set ShowFooter(Boolean);

Description

Gets or sets a value indicating whether the tooter section is displayed in the System.Web.UI.WebControls.DataList control.

Use the System.Web.UI.WebControls.DataList.ShowFooter property to specify whether the tooter section is displayed in the System.Web.UI.WebControls.DataList control.

ShowHeader

ToString

[C#] public virtual bool ShowHeader {get; set;}

[C++] public: _property virtual bool get_Show Header( );public: _property virtual void set_ShowHeader (bool);

[VB] Overridable Public Property ShowHeader As Boolean

[JScript] public function get ShowHeader( ): Boolean;public function set ShowHeader(Boolean);

Description

Gets or sets a value indicating whether the header section is displayed in the System.Web.UI.WebControls.DataList control.

Use the System.Web.UI.WebControls.DataList.ShowHeader property to specify whether the header section is displayed in the System.Web.UI.WebControls.DataList control.

Site
Style
TabIndex
TagKey
TagName
TemplateSourceDirectory
ToolTip
UniqueID
ViewState
ViewStateIgnoresCase
Visible
Width
ToString Description Occurs when the Cancel button is clicked for an item in the System.Web.UI.WebControls.DataList control.

The System.Web.UI.WebControls.DataList.CancelCommand event is raised when the Cancel button is clicked for an item in the System.Web.UI.WebControls.DataList control.

ToString

Description

Occurs when the Delete button is clicked for an item in the System.Web.UI.WebControls.DataList control.

The System.Web.UI.WebControls.DataList.DeleteCommand event is raised when the Delete button is clicked for an item in the System.Web.UI.WebControls.DataList control.

ToString

Description

Occurs when the Edit button is clicked for an item in the System.Web.UI.WebControls.DataList control.

The System.Web.UI.WebControls.DataList.EditCommand event is raised when the Edit button is clicked for an item in the System.Web.UI.WebControls.DataList control.

ToString

Description

Occurs when any button is clicked in the System.Web.UI.WebControls.DataList control.

The System.Web.UI.WebControls.DataList.ItemCommand event is raised when any button is clicked in the System.Web.UI.WebControls.DataList control and is commonly used when you have a button control with a custom CommandName value.

ToString

[C#] public event DataListItemEventHandler ItemCreated;

[C++] public: _event DataListItemEventHandler* ItemCreated;

[VB] Public Event ItemCreated As DataListItemEventHandler

Description

Occurs on the server when an item in the System.Web.UI.WebControls.DataList control is created.

The System.Web.UI.WebControls.DataList.ItemCreated event is raised when an item in the System.Web.UI.WebControls.DataList control is created, both during round-trips and at data bind time.

ToString

[C#] public event DataListItemEventHandler ItemDataBound;

[C++] public: _event DataListItemEventHandler* ItemDataBound;

[VB] Public Event ItemDataBound As DataListItemEventHandler

Description

Occurs when an item is data bound to the System.Web.UI.WebControls.DataList control.

The System.Web.UI.WebControls.DataList.ItemDataBound event is raised after an item is data bound to the System.Web.UI.WebControls.DataList control. This event provides you with the last opportunity to access the data item before it is displayed on the client. After this event is raised, the data item is nulled out and no longer available.

ToString

Description

Occurs when the Update button is clicked for an item in the System.Web.UI.WebControls.DataList control.

The System.Web.UI.WebControls.DataList.UpdateCommand event is raised when the Update button for an item is clicked.

CreateControlHierarchy

[C#] protected override void CreateControlHierarchy(bool useDataSource);

[C++] protected: void CreateControlHierarchy(bool useDataSource);

[VB] Overrides Protected Sub CreateControlHierarchy(ByVal useDataSource As Boolean)

[JScript] protected override function CreateControlHierarchy(useDataSource Boolean);

Description

CreateControlStyle

[C#] protected override Style CreateControlStyle( );

[C++] protected: Style* CreateControlStyle( );

[VB] Overrides Protected Function CreateControlStyle( ) As Style

[JScript] protected override function CreateControlStyle( ): Style;

Description

CreateItem

[C#] protected virtual DataListItem CreateItem(int itemIndex, ListItemType itemType);

[C++] protected: virtual DataListItem* CreateItem(int itemIndex, ListItemType itemType);

[VB] Overridable Protected Function CreateItem(ByVal itemIndex As Integer, ByVal itemType As ListItemType) As DataListItem

[JScript] protected function CreateItem(itemIndex: int, itemType: ListItemType): DataListItem;

Description

InitializeItem

[C#] protected virtual void InitializeItem(DataListItem item);

[C++] protected: virtual void InitializeItem(DataListItem* item);

[VB] Overridable Protected Sub InitializeItem(ByVal item As DataListItem)

[JScript] protected function InitializeItem(item: DataListItem);

LoadViewState

[C#] protected override void LoadViewState(object savedState);

[C++] protected: void LoadViewState(Object* savedState);

[VB] Overrides Protected Sub LoadViewState(ByVal savedState As Object)

[JScript] protected override function LoadViewState(savedState: Object);

Description

OnBubbleEvent

[C#] protected override bool OnBubbleEvent(object source, EventArgs e);

[C++] protected: bool OnBubbleEvent(Object* source, EventArgs* e);

[VB] Overrides Protected Function OnBubbleEvent(ByVal source As Object, ByVal e As EventArgs) As Boolean

[JScript] protected override function OnBubbleEvent (source: Object, e: EventArgs): Boolean;

Description

OnCancelCommand

[C#] protected virtual void OnCancelCommand(DataListCommandEventArgs e);

[C++] protected: virtual void OnCancelCommand(DataListCommandEventArgs* e);

[VB] Overridable Protected Sub OnCancelCommand(ByVal e As DataListCommandEventArgs)

[JScript] protected function OnCancelCommand(e: DataListCommandEventArgs);

Description

Raises the System.Web.UI.WebControls.DataList.CancelCommand event. This allows you to provide a custom handler for the event.

Use the System.Web.UI.WebControls.DataList.OnCancelCommand(System.Web.UI.WebControls.DataListCommandEventArgs) method to provide a custom handler for the System.Web.UI.WebControls.DataList.CancelCommand event. A System.Web.UI.WebControls.DataListCommandEventArgs that contains event data.

OnDeleteCommand

[C#] protected virtual void OnDeleteCommand(DataListCommandEventArgs e);

[C++] protected: virtual void OnDeleteCommand(DataListCommandEventArgs* e);

[VB] Overridable Protected Sub OnDeleteCommand(ByVal e As DataListCommandEventArgs)

[JScript] protected function OnDeleteCommand(e: DataListCommandEventArgs);

Description

Raises the System.Web.UI.WebControls.DataList.DeleteCommand event. This allows you to provide a custom handler for the event.

Use the System.Web.UI.WebControls.DataList.OnDeleteCommand(System.Web.UI.WebControls.DataListCommandEventArgs) method to provide a custom handler for the System.Web.UI.WebControls.DataList.DeleteCommand event. A System.Web.UI.WebControls.DataListCommandEventArgs that contains event data.

OnEditCommand

[C#] protected virtual void OnEditCommand(DataListCommandEventArgs e);

[C++] protected: virtual void OnEditCommand(DataListCommandEventArgs* e);

[VB] Overridable Protected Sub OnEditCommand(ByVal e As DataListCommandEventArgs)

[JScript] protected function OnEditCommand(e: DataListCommandEventArgs);

Description

Raises the System.Web.UI.WebControls.DataList.EditCommand event. This allows you to provide a custom handler for the event.

Use the System.Web.UI.WebControls.DataList.OnEditCommand(System.Web.UI.WebControls.DataListCommandEventArgs) method to provide a custom handler for the System.Web.UI.WebControls.DataList.EditCommand event. A System.Web.UI.WebControls.DataListCommandEventArgs that contains event data.

OnItemCommand

[C#] protected virtual void OnItemCommand(DataListCommandEventArgs e);

[C++] protected: virtual void OnItemCommand(DataListCommandEventArgs* e);

[VB] Overridable Protected Sub OnItemCommand(ByVal e As DataListCommandEventArgs)

[JScript] protected function OnItemCommand(e: DataListCommandEventArgs);

Description

Raises the System.Web.UI.WebControls.DataList.ItemCommand event. This allows you to provide a custom handler for the event.

Use the System.Web.UI.WebControls.DataList.OnItemCommand(System.Web.UI.WebControls.DataListCommandEventArgs) method to provide a custom handler for the System.Web.UI.WebControls.DataList.ItemCommand event. A System.Web.UI.WebControls.DataListCommandEventArgs that contains event data.

OnItemCreated

[C#] protected virtual void OnItemCreated(DataListItemEventArgs e);

[C++] protected: virtual void OnItemCreated(DataListItemEventArgs* e);

[VB] Overridable Protected Sub OnItemCreated(ByVal e As DataListItemEventArgs)

[JScript] protected function OnItemCreated(e: DataListItemEventArgs);

Description

Raises the System.Web.UI.WebControls.DataList.ItemCreated event. This allows you to provide a custom handler for the event.

Use the System.Web.UI.WebControls.DataList.OnItemCreated(System.Web.UI.WebControls.DataListItemEventArgs) method to provide a custom handler for the System.Web.UI.WebControls.DataList.ItemCreated event. A System.Web.UI.WebControls.DataListItemEventArgs that contains event data.

OnItemDataBound

[C#] protected virtual void OnItemDataBound(DataListItemEventArgs e);

[C++] protected: virtual void OnItemDataBound(DataListItemEventArgs* e);

[VB] Overridable Protected Sub OnItemDataBound(ByVal e As DataListItemEventArgs)

[JScript] protected function OnItemDataBound(e: DataListItemEventArgs);

Description

Raises the System.Web.UI.WebControls.DataList.ItemDataBound event. This allows you to provide a custom handler for the event.

Use the System.Web.UI.WebControls.DataList.OnItemDataBound(System.Web.UI.WebControls.DataListItemEventArgs) method to provide a custom handler for the System.Web.UI.WebControls.DataList.ItemDataBound event. A System.Web.UI.WebControls.DataListItemEventArgs that contains event data.

OnUpdateCommand

[C#] protected virtual void OnUpdateCommand(DataListCommandEventArgs e);

[C++] protected: virtual void OnUpdateCommand(DataListCommandEventArgs* e);

[VB] Overridable Protected Sub OnUpdateCommand(ByVal e As DataListCommandEventArgs)
[JScript] protected function OnUpdateCommand(e: DataListCommandEventArgs);

Description

Raises the System.Web.UI.WebControls.DataList.UpdateCommand event. This allows you to provide a custom handler for the event.

Use the System.Web.UI.WebControls.DataList.OnUpdateCommand(System.Web.UI.WebControls.DataListCommandEventArgs) method to provide a custom handler for the System.Web.UI.WebControls.DataList.UpdateCommand event. A System.Web.UI.WebControls.DataListItemEventArgs that contains event data.

PrepareControlHierarchy
[C#] protected override void PrepareControlHierarchy( );
[C++] protected: void PrepareControlHierarchy( );
[VB] Overrides Protected Sub PrepareControlHierarchy( )
[JScript] protected override function PrepareControlHierarchy( );

Description

RenderContents
[C#] protected override void RenderContents(HtmlTextWriter writer);
[C++] protected: void RenderContents (HtmlTextWriter* writer);
[VB] Overrides Protected Sub RenderContents(ByVal writer As HtmlTextWriter)
[JScript] protected override function RenderContents(writer: HtmlTextWriter);

Description

SaveViewState
[C#] protected override object SaveViewState( );
[C++] protected: Object* SaveViewState( );
[VB] Overrides Protected Function SaveViewState( ) As Object
[JScript] protected override function SaveViewState( ): Object;

Description

IRepeatInfoUser.GetItemStyle
[C#] Style IRepeatInfoUser.GetItemStyle(ListItemType itemType, int repeatIndex);
[C++] Style* IRepeatInfoUser::GetItemStyle(ListItemType itemType, int repeatIndex);
[VB] Function GetItemStyle(ByVal itemType As ListItemType, ByVal repeatIndex As Integer) As Style Implements IRepeatInfoUser.GetItemStyle
[JScript] function IRepeatInfoUser.GetItemStyle(itemType: ListItemType, repeatIndex: int): Style;
IRepeatInfoUser.RenderItem
[C#] void IRepeatInfoUser.RenderItem(ListItemType itemType, int repeatIndex, RepeatInfo repeatInfo, HtmlTextWriter writer);
[C++] void IRepeatInfoUser::RenderItem(ListItemType itemType, int repeatIndex, RepeatInfo* repeatInfo, HtmlTextWriter* writer);
[VB] Sub RenderItem(ByVal itemType As ListItemType, ByVal repeatIndex As Integer, ByVal repeatInfo As RepeatInfo, ByVal writer As HtmlTextWriter) Implements IRepeatInfoUser.RenderItem
[JScript] function IRepeatInfoUser.RenderItem(itemType: ListItemType, repeatIndex: int, repeatInfo: RepeatInfo, writer: HtmlTextWriter);
TrackViewState
[C#] protected override void TrackViewState( );
[C++] protected: void TrackViewState( );
[VB] Overrides Protected Sub TrackViewState( )
[JScript] protected override function TrackViewState( );

Description

Marks the starting point to begin tracking and saving changes to the control as part of the control viewstate.

DataListCommandEventArgs class (System.Web.UI.WebControls)

TrackViewState

Description

Provides data for the System.Web.UI.WebControls.DataList.CancelCommand, System.Web.UI.WebControls.DataList.DeleteCommand, System.Web.UI.WebControls.DataList.EditCommand, System.Web.UI.WebControls.DataList.ItemCommand, and System.Web.UI.WebControls.DataList.UpdateCommand events of the System.Web.UI.WebControls.DataList control. This class cannot be inherited.

The System.Web.UI.WebControls.DataList.CancelCommand event is raised when the Cancel button for an item in the System.Web.UI.WebControls.DataList control is clicked.

DataListCommandEventArgs

Example Syntax:

TrackViewState
[C#] public DataListCommandEventArgs(DataListItem item, object commandSource, CommandEventArgs originalArgs);
[C++] public: DataListCommandEventArgs(DataListItem* item, Object* commandSource, CommandEventArgs* originalArgs);
[VB] Public Sub New(ByVal item As DataListItem, ByVal commandSource As Object, ByVal originalArgs As CommandEventArgs)
[JScript] public function DataListCommandEventArgs(item: DataListItem, commandSource: Object, originalArgs: CommandEventArgs);

Description

Initializes a new instance of the System.Web.UI.WebControls.DataListCommandEventArgs class.

Use this constructor to create and initialize a new instance of the System.Web.UI.WebControls.DataListCommandEventArgs class. The selected item from the System.Web.UI.WebControls.DataList. The source of the command. A System.Web.UI.WebControls.CommandEventArgs that contains the original event data.

CommandArgument
CommandName
CommandSource
TrackViewState

Description

Gets the source of the command.

Use the System.Web.UI.WebControls.DataListCommandEventArgs.CommandSource property to determine the command source that raised the event. This property is commonly used to determine which command raises the event. You can then take appropriate action, based on the command.

Item
TrackViewState
[C#] public DataListItem Item {get;}
[C++] public: _property DataListItem* get_Item( );
[VB] Public ReadOnly Property Item As DataListItem
[JScript] public function get_Item( ): DataListItem;

Description

Gets the item containing the command source in the System.Web.UI.WebControls.DataList control.

Use the System.Web.UI.WebControls.DataListCommandEventArgs.Item property to access information about the selected item in the System.Web.UI.WebControls.DataList control.

DataListCommandEventHandler delegate (System.Web.UI.WebControls)

ToString

Description

Represents the method that will handle the System.Web.UI.WebControls.DataList.CancelCommand, System.Web.UI.WebControls.DataList.DeleteCommand, System.Web.UI.WebControls.DataList.EditCommand, System.Web.UI.WebControls.DataList.ItemCommand, and System.Web.UI.WebControls.DataList.UpdateCommand events of a System.Web.UI.WebControls.DataList control. The source of the event. A System.Web.UI.WebControls.DataListCommandEventArgs that contains the event data.

The System.Web.UI.WebControls.DataList.CancelCommand event is raised when the Cancel button for an item in the System.Web.UI.WebControls.DataList control is clicked.

DataListItem class (System.Web.UI.WebControls)

ToString

Description

Represents an item in the System.Web.UI.WebControls.DataList control.

A System.Web.UI.WebControls.DataListItem object represents an item in the System.Web.UI.WebControls.DataList control, such as the heading section, the tooter section, or a data item.

DataListItem

Example Syntax:

ToString

[C#] public DataListItem(int itemIndex, ListItemType itemType);

[C++] public: DataListItem(int itemIndex, ListItemType itemType);

[VB] Public Sub New(ByVal itemIndex As Integer, ByVal itemType As ListItemType)

[JScript] public function DataListItem(itemIndex: int, itemType: ListItemType);

Description

Initializes a new instance of the System.Web.UI.WebControls.DataListItem class.

Use this constructor to create and initialize a new instance of the System.Web.UI.WebControls.DataListItem class. The index of the item in the System.Web.UI.WebControls.DataList control from the System.Web.UI.WebControls.DataList.Items collection. One of the System.Web.UI.WebControls.ListItemType values.

AccessKey

Attributes

BackColor

BorderColor

BorderStyle

BorderWidth

ChildControlsCreated

ClientID

Context

Controls

ControlStyle

ControlStyleCreated

CssClass

DataItem

ToString

Description

Gets or sets a data item associated with the System.Web.UI.WebControls.DataListItem object in the System.Web.UI.WebControls.DataList control.

Use the System.Web.UI.WebControls.DataListItem.DataItem property to specify or determine the properties of a data item associated with the System.Web.UI.WebControls.DataListItem object in the System.Web.UI.WebControls.DataList control.

Enabled

EnableViewState

Events

Font

ForeColor

HasChildViewState

Height

ID

IsTrackingViewState

ItemIndex

ToString

Description

Gets the index of the System.Web.UI.WebControls.DataListItem object from from the System.Web.UI.WebControls.DataList.Items collection of the control.

Use the System.Web.UI.WebControls.DataListItem.ItemIndex property to determine the index number of the System.Web.UI.WebControls.DataListItem object from the System.Web.UI.WebControls.DataList.Items collection.

ItemType

ToString

[C#] public virtual ListItemType ItemType {get;}

[C++] public: _property virtual ListItemType get_ItemType( );

[VB] Overridable Public ReadOnly Property ItemType As ListItemType

[JScript] public function get_ItemType( ): ListItemType;

Description

Gets the type of the item represented by the System.Web.UI.WebControls.DataListItem object in the System.Web.UI.WebControls.DataList control.

Use the System.Web.UI.WebControls.DataListItem.ItemType property to determine the type of the item represented by the System.Web.UI.WebControls.DataGridItem object. The following table lists the various item types.

NamingContainer

Page

Parent

Site

Style

TabIndex

TagKey

TagName

TemplateSourceDirectory

ToolTip

UniqueID

ViewState

ViewStateIgnoresCase

Visible

Width

CreateControlStyle

[C#] protected override Style CreateControlStyle( );

[C++] protected: Style* CreateControlStyle( );
[VB] Overrides Protected Function CreateControlStyle( ) As Style
[JScript] protected override function CreateControlStyle( ): Style;

Description

OnBubbleEvent

[C#] protected override bool OnBubbleEvent(object source, EventArgs e);
[C++] protected: bool OnBubbleEvent(Object* source, EventArgs* e);
[VB] Overrides Protected Function OnBubbleEvent(ByVal source As Object, ByVal e As EventArgs) As Boolean
[JScript] protected override function OnBubbleEvent (source: Object, e: EventArgs): Boolean;

Description

RenderItem

[C#] public virtual void RenderItem(HtmlTextWriter writer, bool extractRows, bool tableLayout);
[C++] public: virtual void RenderItem(HtmlTextWriter* writer, bool extractRows, bool tableLayout);
[VB] Overridable Public Sub RenderItem(ByVal writer As HtmlTextWriter, ByVal extractRows As Boolean, ByVal tableLayout As Boolean)
[JScript] public function RenderItem(writer: HtmlTextWriter, extractRows Boolean, tableLayout: Boolean);

Description

Displays the System.Web.UI.WebControls.DataListItem object on the client.

Use the System.Web.UI.WebControls.DataListItem.RenderItem(System.Web.UI.HtmlTextWriter,System.Boolean,System.Boolean) method to display the System.Web.UI.WebControls.DataListItem object on the client. A System.Web.UI.HtmlTextWriter object that contains the output stream for rendering on the client. true to extract rows; otherwise false. true to display as a table; otherwise false.

SetItemType

[C#] protected internal virtual void SetItemType(ListItemType itemType);
[C++] protected public: virtual void SetItemType(ListItemType itemType);
[VB] Overridable Protected Friend Dim Sub SetItemType (ByVal itemType As ListItemType)
[JScript] package function SetItemType(itemType: ListItemType);

Description

DataListItemCollection class (System.Web.UI.WebControls)

TrackViewState

Description

Represents the collection of System.Web.UI.WebControls.DataListItem objects in the System.Web.UI.WebControls.DataList control. This class cannot be inherited.

The System.Web.UI.WebControls.DataListItemCollection class represents a collection of System.Web.UI.WebControls.DataListItem objects, which in turn represent the data items in a System.Web.UI.WebControls.DataList control. To programmatically retrieve System.Web.UI.WebControls.DataListItem objects from a System.Web.UI.WebControls.DataList control, use one of the following methods: Use the indexer to get a single System.Web.UI.WebControls.DataListItem object from the collection, using array notation.

DataListItemCollection

Example Syntax:

TrackViewState

[C#] public DataListItemCollection(ArrayList items);
[C++] public: DataListItemCollection(ArrayList* items);
[VB] Public Sub New(ByVal items As ArrayList)
[JScript] public function DataListItemCollection(items: ArrayList);

Description

Initializes a new instance of the System.Web.UI.WebControls.DataListItemCollection class.

Use this constructor to create and initialize a new instance of the System.Web.UI.WebControls.DataListItemCollection class. A System.Collections.ArrayList object that contains the items with which to initialize the collection.

Count

TrackViewState

[C#] public int Count {get;}
[C++] public: _property int get_Count( );
[VB] Public ReadOnly Property Count As Integer
[JScript] public function get_Count( ): int;

Description

Gets the number of System.Web.UI.WebControls.DataListItem objects in the collection.

Use the System.Web.UI.WebControls.DataListItemCollection.Count property to determine the number of System.Web.UI.WebControls.DataListItem objects in the System.Web.UI.WebControls.DataListItemCollection collection. The System.Web.UI.WebControls.DataListItemCollection.Count property is commonly used when iterating through the collection to determine the upper bound of the collection.

IsReadOnly

TrackViewState

[C#] public bool IsReadOnly {get;}
[C++] public: _property bool get_IsReadOnly( );
[VB] Public ReadOnly Property IsReadOnly As Boolean
[JScript] public function get_IsReadOnly( ): Boolean;

Description

Gets a value that indicates whether the System.Web.UI.WebControls.DataListItem objects in the System.Web.UI.WebControls.DataListItemCollection can be modified.

This property always returns false to indicate that the System.Web.UI.WebControls.DataListItemCollection can be written to in all cases.

IsSynchronized

TrackViewState

[C#] public bool IsSynchronized {get;}
[C++] public: _property bool get_IsSynchronized( );
[VB] Public ReadOnly Property IsSynchronized As Boolean
[JScript] public function get_IsSynchronized( ): Boolean;

Description

Gets a value indicating whether access to the System.Web.UI.WebControls.DataListItemCollection is synchronized (thread-safe).

This property is derived from the System.Collections.ICollection class and overridden to always return false.

Item

TrackViewState

[C#] public DataListItem this[int index] {get;}
[C++] public: _property DataListItem* get_Item(int index);
[VB] Public Default ReadOnly Property Item(ByVal index As Integer) As DataListItem
[JScript] returnValue=DataListItemCollectionObject.Item (index);

Description

Gets a System.Web.UI.WebControls.DataListItem object at the specified index in the collection.

Use this indexer to get a System.Web.UI.WebControls. DataListItem object from the System.Web.UI.WebControls. DataListItemCollection at the specified index using array notation. The index of the System.Web.UI.WebControls. DataListItem in the collection to retrieve.

SyncRoot

TrackViewState

[C#] public object SyncRoot {get;}

[C++] public: _property Object* get_SyncRoot( );

[VB] Public ReadOnly Property SyncRoot As Object

[JScript] public function get_SyncRoot( ): Object;

Description

Gets the object that can be used to synchronize access to the System.Web.UI.WebControls.DataListItemCollection collection.

The object returned in this implementation is the System-.Web.UI.WebControls.DataListItemCollection object itself.

CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies all the items from this System.Web.UI.WebControls.DataListItemCollection collection to the specified System.Array object, starting at the specified index in the System.Array object.

Use this method to copy the contents of the System.Web.UI.WebControls.DataListItemCollection collection into the specified System.Array object, starting at the specified index. A zero-based System.Array object that receives the copied items from the System.Web.UI.WebControls.DataListItemCollection collection. The first position in the specified System.Array object to receive the copied contents.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns a System.Collections.IEnumerator interface that contains all System.Web.UI.WebControls.DataListItem objects in the System.Web.UI.WebControls.DataListItemCollection.

Return Value: A System.Collections.IEnumerator interface that contains all System.Web.UI.WebControls.DataListItem objects in the System.Web.UI.WebControls.DataListItemCollection.

Use this method to create a System.Collections.IEnumerator that can be easily iterated through to get each item in the System.Web.UI.WebControls.DataListItemCollection collection.

DataListItemEventArgs class (System.Web.UI.WebControls)

ToString

Description

Provides data for the System.Web.UI.WebControls.DataList.ItemCreated and System.Web.UI.WebControls.DataList.ItemDataBound events of a System.Web.UI.WebControls.DataList control. This class cannot be inherited.

The System.Web.UI.WebControls.DataList.ItemCreated event is raised when an item in the System.Web.UI.WebControls.DataList control is created.

DataListItemEventArgs

Example Syntax:

ToString

[C#] public DataListItemEventArgs(DataListItem item);

[C++] public: DataListItemEventArgs(DataListItem* item);

[VB] Public Sub New(ByVal item As DataListItem)

[JScript] public function DataListItemEventArgs(item: DataListItem);

Description

Initializes a new instance of the System.Web.UI.WebControls.DataListItemEventArgs class.

Use this constructor to create and initialize a new instance of the System.Web.UI.WebControls.DataListItemEventArgs class. A System.Web.UI.WebControls.DataListItem object that represents an item in the System.Web.UI.WebControls. DataList control.

Item

ToString

[C#] public DataListItem Item {get;}

[C++] public: _property DataListItem* get_Item( );

[VB] Public ReadOnly Property Item As DataListItem

[JScript] public function get_Item( ): DataListItem;

Description

Gets the referenced item in the System.Web.UI.WebControls.DataList control when the event is raised.

The items in the System.Web.UI.WebControls.DataList control are referenced as each item is created or bound to the control. Use this property to programmatically access the referenced item in the System.Web.UI.WebControls.DataList control when the System.Web.UI.WebControls.DataList.ItemCreated or System.Web.UI.WebControls.DataList.ItemDataBound event is raised.

DataListItemEventHandler delegate (System.Web.UI.WebControls)

ToString

Description

Represents the method that will handle the System.Web.UI.WebControls.DataList.ItemCreated and System.Web.UI.WebControls.DataList.ItemDataBound events of the System.Web.UI.WebControls.DataList control. The source of the event. A System.Web.UI.WebControls.DataListItemEventArgs that contains the event data.

The System.Web.UI.WebControls.DataList.ItemCreated event is raised when an item in the System.Web.UI.WebControls.DataList control is created.

DayNameFormat enumeration (System.Web.UI.WebControls)

ToString

Description

Specifies the display format for the days of the week on a System.Web.UI.WebControls.Calendar control.

The System.Web.UI.WebControls.DayNameFormat enumeration represents the display formats for the days of the week on a System.Web.UI.WebControls.Calendar control.

ToString

[C#] public const DayNameFormat FirstLetter;

[C++] public: const DayNameFormat FirstLetter;

[VB] Public Const FirstLetter As DayNameFormat

[JScript] public var FirstLetter: DayNameFormat;

Description

The days of the week displayed with just the first letter. For example, T.

ToString

[C#] public const DayNameFormat FirstTwoLetters;
[C++] public: const DayNameFormat FirstTwoLetters;
[VB] Public Const FirstTwoLetters As DayNameFormat
[JScript] public var FirstTwoLetters: DayNameFormat;

Description

The days of the week displayed with just the first two letters. For example, Tu.

ToString

[C#] public const DayNameFormat Full;
[C++] public: const DayNameFormat Full;
[VB] Public Const Full As DayNameFormat
[JScript] public var Full: DayNameFormat;

Description

The days of the week displayed in full format. For example, Tuesday.

ToString

[C#] public const DayNameFormat Short;
[C++] public: const DayNameFormat Short;
[VB] Public Const Short As DayNameFormat
[JScript] public var Short: DayNameFormat;

Description

The days of the week displayed in abbreviated format. For example, Tues.

DayRenderEventArgs class (System.Web.UI.WebControls)

ToString

Description

Provides data for the System.Web.UI.WebControls.Calendar.DayRender event of the System.Web.UI.WebControls.Calendar control. This class cannot be inherited.

Although data binding is not supported for the System.Web.UI.WebControls.Calendar control, it is possible to modify the content and formatting of the individual date cells. Before the System.Web.UI.WebControls.Calendar control is displayed on the Web page, it creates and assembles the components that make up the control. The System.Web.UI.WebControls.Calendar.DayRender event is raised when each date cell in System.Web.UI.WebControls.Calendar control is created. You can control the contents and formatting of a date cell when it is created by providing code in the event handler for the System.Web.UI.WebControls.Calendar.DayRender event.

DayRenderEventArgs

Example Syntax:

ToString

[C#] public DayRenderEventArgs(TableCell cell, CalendarDay day);
[C++] public: DayRenderEventArgs(TableCell* cell, CalendarDay* day);
[VB] Public Sub New(ByVal cell As TableCell, ByVal day As CalendarDay)
[JScript] public function DayRenderEventArgs(cell: TableCell, day: CalendarDay);

Description

Initializes a new instance of the System.Web.UI.WebControls.DayRenderEventArgs class.

Use this constructor to create and initialize a new instance of the System.Web.UI.WebControls.DayRenderEventArgs class. A System.Web.UI.WebControls.TableCell object that represents a cell in the System.Web.UI.WebControls.Calendar control. A System.Web.UI.WebControls.CalendarDay object that represents the day to render in the System.Web.UI.WebControls.Calendar control.

Cell

ToString

[C#] public TableCell Cell {get;}
[C++] public: _property TableCell* get_Cell( );
[VB] Public ReadOnly Property Cell As TableCell
[JScript] public function get Cell( ): TableCell;

Description

Gets the System.Web.UI.WebControls.TableCell object that represents the cell being rendered in the System.Web.UI.WebControls.Calendar control.

Use the System.Web.UI.WebControls.DayRenderEventArgs.Cell property to programmatically control the cell being rendered in the System.Web.UI.WebControls.Calendar control.

Day

ToString

[C#] public CalendarDay Day {get;}
[C++] public: _property CalendarDay* get_Day( );
[VB] Public ReadOnly Property Day As CalendarDay
[JScript] public function get Day( ): CalendarDay;

Description

Gets the System.Web.UI.WebControls.CalendarDay that represents the day being rendered in the System.Web.UI.WebControls.Calendar control.

Use the System.Web.UI.WebControls.DayRenderEventArgs.Day property to get information about the day being rendered in the System.Web.UI.WebControls.Calendar control.

DayRenderEventHandler delegate (System.Web.UI.WebControls)

ToString

Description

Represents the method that will handle the System.Web.UI.WebControls.Calendar.DayRender event of the System.Web.UI.WebControls.Calendar control. The source of the event. A System.Web.UI.WebControls.DayRenderEventArgs that contains the event data.

Although data binding is not supported for the System.Web.UI.WebControls.Calendar control, it is possible to modify the content and formatting of the individual date cells. Before the System.Web.UI.WebControls.Calendar control is displayed on the Web page, it creates and assembles the components that make up the control. The System.Web.UI.WebControls.Calendar.DayRender event is raised when each date cell in System.Web.UI.WebControls.Calendar control is created. You can control the contents and formatting of a date cell when it is created by providing code in the event handler for the System.Web.UI.WebControls.Calendar.DayRender event. For additional information on customizing the contents of a date cell, see System.Web.UI.WebControls.Calendar.OnDayRender(System.Web.UI.WebControls.TableCell, System.Web.UI.WebControls.CalendarDay).

DropDownList class (System.Web.UI.WebControls)

ToString

Description

Represents a control that allows the user to select a single item from a drop-down list.

Use the System.Web.UI.WebControls.DropDownList control to create a single selection drop-down list control. You can control the appearance of the System.Web.UI.WebControls.DropDownList control by setting the System.Web.UI.WebControls.DropDownList.BorderColor, System.Web.UI.WebControls.DropDownList.BorderStyle, and System.Web.UI.WebControls.DropDownList.BorderWidth properties.

DropDownList

Example Syntax:

ToString

[C#] public DropDownList( );

[C++] public: DropDownList( );

[VB] Public Sub New( )

[JScript] public function DropDownList( );

Description

Initializes a new instance of the System.Web.UI.WebControls.DropDownList class.

Use this constructor to create and initialize a new instance of the System.Web.UI.WebControls.DropDownList class.

AccessKey

Attributes

AutoPostBack

BackColor

BorderColor

ToString

Description

Gets or sets the border color of the control.

The System.Web.UI.WebControls.DropDownList.BorderColor property is inherited from the System.Web.UI.WebControls.WebControl class and is not applicable to the System.Web.UI.WebControls.DropDownList control.

BorderStyle

ToString

[C#] public override BorderStyle BorderStyle {get; set;}

[C++] public: _property virtual BorderStyle get_BorderStyle( );public: _property virtual void set_BorderStyle (BorderStyle);

[VB] Overrides Public Property BorderStyle As BorderStyle

[JScript] public function get_BorderStyle( ): BorderStyle; public function set BorderStyle(BorderStyle);

Description

Gets or sets the border style of the control.

The System.Web.UI.WebControls.DropDownList.BorderStyle property is inherited from the System.Web.UI.WebControls.WebControl class and is not applicable to the System.Web.UI.WebControls.DropDownList control.

BorderWidth

ToString

[C#] public override Unit BorderWidth {get; set;}

[C++] public: _property virtual Unit get_BorderWidth( );public: _property virtual void set_BorderWidth(Unit);

[VB] Overrides Public Property BorderWidth As Unit

[JScript] public function get_BorderWidth( ): Unit;public function set BorderWidth(Unit);

Description

Gets or sets the border width for the control.

The System.Web.UI.WebControls.DropDownList.BorderWidth property is inherited from the System.Web.UI.WebControls.WebControl class and is not applicable to the System.Web.UI.WebControls.DropDownList control.

ChildControlsCreated

ClientID

Context

Controls

ControlStyle

ControlStyleCreated

CssClass

DataMember

DataSource

DataTextField

DataTextFormatString

DataValueField

Enabled

EnableViewState

Events

Font

ForeColor

HasChildViewState

Height

ID

IsTrackingViewState

Items

NamingContainer

Page

Parent

SelectedIndex

ToString

Description

Gets or sets the index of the selected item in the System.Web.UI.WebControls.DropDownList control.

Use the System.Web.UI.WebControls.DropDownList.SelectedIndex property to programmatically specify or determine the index of the selected item from the System.Web.UI.WebControls.DropDownList control. An item is always selected in the System.Web.UI.WebControls.DropDownList control.

You cannot deselect every item in the list at the same time.

SelectedItem

Site

Style

TabIndex

TagKey

TagName

TemplateSourceDirectory

ToolTip

ToString

Description

Gets or sets the ToolTip text displayed when the mouse pointer rests over the control.

The System.Web.UI.WebControls.DropDownList.ToolTip property is inherited from the System.Web.UI.WebControls.WebControl class and is not applicable to the System.Web.UI.WebControls.DropDownList control.

UniqueID

ViewState

ViewStateIgnoresCase

Visible

Width

AddAttributesToRender

[C#] protected override void AddAttributesToRender(HtmlTextWriter writer);

[C++] protected: void AddAttributesToRender(HtmlTextWriter* writer);

[VB] Overrides Protected Sub AddAttributesToRender(ByVal writer As HtmlTextWriter)

[JScript] protected override function AddAttributesToRender (writer HtmlTextWriter);

Description

Adds the properties of the System.Web.UI.WebControls.DropDownList control to the output stream for rendering on the client. The output stream for rendering on the client.

CreateControlCollection

[C#] protected override ControlCollection CreateControlCollection( );

[C++] protected: ControlCollection* CreateControlCollection( );

[VB] Overrides Protected Function CreateControlCollection( ) As ControlCollection

[JScript] protected override function CreateControlCollection( ) ControlCollection;

Description

RenderContents

[C#] protected override void RenderContents(HtmlTextWriter writer);

[C++] protected: void RenderContents (HtmlTextWriter* writer);

[VB] Overrides Protected Sub RenderContents(ByVal writer As HtmlTextWriter)

[JScript] protected override function RenderContents(writer: HtmlTextWriter);

Description

Displays the System.Web.UI.WebControls.DropDownList control on the client. The output stream for rendering on the client.

IPostBackDataHandler.LoadPostData

[C#] bool IPostBackDataHandler.LoadPostData(string postDataKey, NameValueCollection postCollection);

[C++] bool IPostBackDataHandler::LoadPostData(String* postDataKey, NameValueCollection* postCollection);

[VB] Function LoadPostData(ByVal postDataKey As String, ByVal postCollection As NameValueCollection) As Boolean Implements IPostBackDataHandler.LoadPostData

[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );

[C++] void IPostBackDataHandler::RaisePostDataChangedEvent( );

[VB] Sub RaisePostDataChangedEvent( ) Implements IPostBackDataHandler.RaisePostDataChangedEvent

[JScript] function IPostBackDataHandler.RaisePostDataChangedEvent( );

EditCommandColumn class (System.Web.UI.WebControls)

TrackViewState

Description

A special column type for the System.Web.UI.WebControls.DataGrid control that contains the Edit command buttons for editing data items in each row.

Use the System.Web.UI.WebControls.EditCommandColumn class to create a special column for the System.Web.UI.WebControls.DataGrid control that contains the Edit, Update, and Cancel command buttons for each data row in the grid. These buttons allow you to edit the values of a row in the System.Web.UI.WebControls.DataGrid control.

EditCommandColumn

Example Syntax:

TrackViewState

[C#] public EditCommandColumn( );

[C++] public: EditCommandColumn( );

[VB] Public Sub New( )

[JScript] public function EditCommandColumn( );

Description

Initializes a new instance of the System.Web.UI.WebControls.EditCommandColumn class.

Use this constructor to create and initialize a new instance of the System.Web.UI.WebControls.EditCommandColumn class.

ButtonType

TrackViewState

[C#] public virtual ButtonColumnType ButtonType {get; set;}

[C++] public: _property virtual ButtonColumnType get_ButtonType( );public: _property virtual void set_ButtonType (ButtonColumnType);

[VB] Overridable Public Property ButtonType As ButtonColumnType

[JScript] public function get ButtonType( ): ButtonColumnType;public function set ButtonType(ButtonColumnType);

Description

Gets or sets the button type for the column.

Use the System.Web.UI.WebControls.EditCommandColumn.ButtonType property to specify whether the buttons in the column display as push buttons or hyperlinks.

CancelText

TrackViewState

[C#] public virtual string CancelText {get; set;}

[C++] public: _property virtual String* get_CancelText( );public: _property virtual void set_CancelText(String*);

[VB] Overridable Public Property CancelText As String

[JScript] public function get_CancelText( ): String;public function set CancelText(String);

Description

Gets or sets the text to display for the Cancel command button in the System.Web.UI.WebControls.EditCommandColumn.

Use the System.Web.UI.WebControls.EditCommandColumn.CancelText property to specify the text to display for the Cancel command button in the System.Web.UI.WebControls.EditCommandColumn.

DesignMode

EditText

TrackViewState

Description

Gets or sets the text to display for the Edit command button in the System.Web.UI.WebControls.EditCommandColumn.

Use the System.Web.UI.WebControls.EditCommandColumn.EditText property to specify the text to display for the Edit command button in the System.Web.UI.WebControls.EditCommandColumn.

FooterStyle

FooterText

HeaderImageUrl

HeaderStyle

HeaderText

IsTrackingViewState

ItemStyle

Owner

SortExpression

UpdateText

TrackViewState

Description

Gets or sets the text to display for the Update command button in the System.Web.UI.WebControls.EditCommandColumn.

Use the System.Web.UI.WebControls.EditCommandColumn.UpdateText property to specify the text to display for the Update command button in the System.Web.UI.WebControls.EditCommandColumn.

ViewState

Visible

InitializeCell

[C#] public override void InitializeCell(TableCell cell, int columnIndex, ListItemType itemType);

[C++] public: void InitializeCell(TableCell* cell, int columnIndex, ListItemType itemType);

[VB] Overrides Public Sub InitializeCell(ByVal cell As TableCell, ByVal columnIndex As Integer, ByVal itemType As ListItemType)

[JScript] public override function InitializeCell(cell: TableCell, columnIndex: int, itemType: ListItemType);

Description

Initializes a cell within the column. A System.Web.UI.WebControls.TableCell that contains information about the cell to initialize. The column number where the cell is located. One of the System.Web.UI.WebControls.ListItemType values.

FirstDayOfWeek enumeration (System.Web.UI.WebControls)

TrackViewState

Description

Specifies the day to display as the first day of the week on the System.Web.UI.WebControls.Calendar control.

The System.Web.UI.WebControls.FirstDayOfWeek enumeration represents the values that specify which day to display as the first day of the week on the System.Web.UI.WebControls.Calendar control.

TrackViewState

[C#] public const FirstDayOfWeek Default;

[C++] public: const FirstDayOfWeek Default;

[VB] Public Const Default As FirstDayOfWeek

[JScript] public var Default: FirstDayOfWeek;

Description

The first day of the week is specified by the system settings.

TrackViewState

[C#] public const FirstDayOfWeek Friday;

[C++] public: const FirstDayOfWeek Friday;

[VB] Public Const Friday As FirstDayOfWeek

[JScript] public var Friday: FirstDayOfWeek;

Description

The first day of the week is Friday.

TrackViewState

[C#] public const FirstDayOfWeek Monday;

[C++] public: const FirstDayOfWeek Monday;

[VB] Public Const Monday As FirstDayOfWeek

[JScript] public var Monday: FirstDayOfWeek;

Description

The first day of the week is Monday.

TrackViewState

[C#] public const FirstDayOfWeek Saturday;

[C++] public: const FirstDayOfWeek Saturday;

[VB] Public Const Saturday As FirstDayOfWeek

[JScript] public var Saturday: FirstDayOfWeek;

Description

The first day of the week is Saturday.

TrackViewState

[C#] public const FirstDayOfWeek Sunday;

[C++] public: const FirstDayOfWeek Sunday;

[VB] Public Const Sunday As FirstDayOfWeek

[JScript] public var Sunday: FirstDayOfWeek;

Description

The first day of the week is Sunday.

TrackViewState

[C#] public const FirstDayOfWeek Thursday;

[C++] public: const FirstDayOfWeek Thursday;

[VB] Public Const Thursday As FirstDayOfWeek

[JScript] public var Thursday: FirstDayOfWeek;

Description

The first day of the week is Thursday.

TrackViewState

[C#] public const FirstDayOfWeek Tuesday;

[C++] public: const FirstDayOfWeek Tuesday;

[VB] Public Const Tuesday As FirstDayOfWeek

[JScript] public var Tuesday: FirstDayOfWeek;

Description

The first day of the week is Tuesday.

TrackViewState

[C#] public const FirstDayOfWeek Wednesday;

[C++] public: const FirstDayOfWeek Wednesday;

[VB] Public Const Wednesday As FirstDayOfWeek

[JScript] public var Wednesday: FirstDayOfWeek;

Description

The first day of the week is Wednesday.

FontInfo class (System.Web.UI.WebControls)

ToString

Description

Encapsulates the font properties of text. This class cannot be inherited.

Use the System.Web.UI.WebControls.FontInfo class to encapsulate the font properties of text. You can specify the font name and the font size. You can also specify whether the style of the font is bold, italic, overlined, strikethrough, or underlined.

Bold

ToString

[C#] public bool Bold {get; set;}

[C++] public: _property bool get_Bold( );public: _property void set_Bold(bool);

[VB] Public Property Bold As Boolean

[JScript] public function get Bold( ): Boolean;public function set Bold(Boolean);

Description

Gets or sets a value that indicates whether the font is bold.

Use the System.Web.UI.WebControls.FontInfo.Bold property to specify or determine whether the font is bold.

Italic

ToString

[C#] public bool Italic {get; set;}

[C++] public: _property bool get_Italic( );public: _property void set_Italic(bool);

[VB] Public Property Italic As Boolean

[JScript] public function get Italic( ): Boolean;public function set Italic(Boolean);

Description

Gets or sets a value that indicates whether the font is italic.

Use the System.Web.UI.WebControls.FontInfo.Italic property to specify or determine whether the font is italic.

Name

ToString

[C#] public string Name {get; set;}

[C++] public: _property String* get_Name( );public: _property void set_Name(String*);

[VB] Public Property Name As String
[JScript] public function get Name( ): String;public function set Name(String);

Description

Gets or sets the primary font name.

Use the System.Web.UI.WebControls.FontInfo.Name property to specify or determine the primary font name. The primary font name determines the font that is used to display text in the control associated with the System.Web.UI.WebControls.FontInfo.

Names

ToString

[C#] public string[ ] Names {get; set;}
[C++] public: _property String* get_Names( );public: _property void set_Names(String*_gc[ ]);
[VB] Public Property Names As String ( )
[JScript] public function get Names( ): String[ ];public function set Names(String[ ]);

Description

Gets or sets an ordered array of font names.

Use the System.Web.UI.WebControls.FontInfo.Names property to specify or determine an ordered array of font names for a System.Web.UI.WebControls.FontInfo. The System.Web.UI.WebControls.FontInfo.Names property is commonly used to store a list of available font names.

Overline

ToString

[C#] public bool Overline {get; set;}
[C++] public: _property bool get_Overline( );public: _property void set_Overline(bool);
[VB] Public Property Overline As Boolean
[JScript] public function get_Overline( ): Boolean;public function set Overline(Boolean);

Description

Gets or sets a value that indicates whether the font is overlined.

Use the System.Web.UI.WebControls.FontInfo.Overline property to specify or determine whether the font contains a line above the text.

Size

ToString

[C#] public FontUnit Size {get; set;}
[C++] public: _property FontUnit get_Size( );public: _property void set_Size(FontUnit);
[VB] Public Property Size As FontUnit
[JScript] public function get Size( ): FontUnit;public function set Size(FontUnit);

Description

Gets or sets the font size.

Use the System.Web.UI.WebControls.FontInfo.Size property to specify the size of the font.

Strikeout

ToString

[C#] public bool Strikeout {get; set;}
[C++] public: _property bool get_Strikeout( );public: _property void set_Strikeout(bool);
[VB] Public Property Strikeout As Boolean
[JScript] public function get Strikeout( ): Boolean;public function set Strikeout(Boolean);

Description

Gets or sets a value that indicates whether the font is strikethrough.

Use the System.Web.UI.WebControls.FontInfo.Strikeout property to specify or determine whether the font contains a line through the text.

Underline

ToString

[C#] public bool Underline {get; set;}
[C++] public: _property bool get_Underline( );public: _property void set_Underline(bool);
[VB] Public Property Underline As Boolean
[JScript] public function get Underline( ): Boolean;public function set Underline(Boolean);

Description

Gets or sets a value that indicates whether the font is underlined.

Use the System.Web.UI.WebControls.FontInfo.Underline property to specify or determine whether the font contains a line under the text.

CopyFrom

[C#] public void CopyFrom(FontInfo f);
[C++] public: void CopyFrom(FontInfo* f);
[VB] Public Sub CopyFrom(ByVal f As FontInfo)
[JScript] public function CopyFrom(f: FontInfo);

Description

Duplicates the font properties of the specified System.Web.UI.WebControls.FontInfo into the current instance of the System.Web.UI.WebControls.FontInfo class.

Use the System.Web.UI.WebControls.FontInfo.CopyFrom(System.Web.UI.WebControls.FontInfo) method to duplicate the font properties of the specified System.Web.UI.WebControls.FontInfo into the current instance of the System.Web.UI.WebControls.FontInfo class. A System.Web.UI.WebControls.FontInfo that contains the font properties to duplicate.

MergeWith

[C#] public void MergeWith(FontInfo f);
[C++] public: void MergeWith(FontInfo* f);
[VB] Public Sub MergeWith(ByVal f As FontInfo)
[JScript] public function MergeWith(f: FontInfo);

Description

Combines the font properties of the specified System.Web.UI.WebControls.FontInfo with the current instance of the System.Web.UI.WebControls.FontInfo class.

Use the System.Web.UI.WebControls.FontInfo.MergeWith(System.Web.UI.WebControls.FontInfo) method to combine the font properties of the specified System.Web.UI.WebControls.FontInfo with the current instance of the System.Web.UI.WebControls.FontInfo class. A System.Web.UI.WebControls.FontInfo that contains the font properties to combine.

ShouldSerializeNames

[C#] public bool ShouldSerializeNames( );
[C++] public: bool ShouldSerializeNames( );
[VB] Public Function ShouldSerializeNames( ) As Boolean
[JScript] public function ShouldSerializeNames( ): Boolean;

Description

Determines whether the System.Web.UI.WebControls.FontInfo.Names property contains enough entries to serialize.

Return Value: true if the System.Web.UI.WebControls.FontInfo.Names property contains enough entries to serialize; otherwise, false.

Use the System.Web.UI.WebControls.FontInfo.ShouldSerializeNames method to determine whether the System.Web.UI.WebControls.FontInfo.Names property contains enough entries to serialize.

ToString

[C#] public override string ToString( );

[C++] public: String* ToString( );

[VB] Overrides Public Function ToString( ) As String

[JScript] public override function ToString( ): String;

Description

Returns a string that contains the font name and size for an instance of the System.Web.UI.WebControls.FontInfo class.

Return Value: A string that contains the font name and size for an instance of the System.Web.UI.WebControls.FontInfo class.

Use the System.Web.UI.WebControls.FontInfo.ToString method to create a string that contains the font name and size, separated by a comma, for an instance of the System.Web.UI-.WebControls.FontInfo class.

FontNamesConverter class (System.Web.UI.WebControls)

ToString

Description

Converts a string containing a list of font names to an array of strings containing the individual names. It also performs the reverse function.

Use the System.Web.UI.WebControls.FontNamesConverter.ConvertFrom(System.ComponentModel.ITypeDescriptorContext,System.Globalization.CultureInfo, System. Object) method of this class to convert a single string containing a list of font names to an array of strings containing the individual names. Each font name in the string must be separated by a comma. For example, the string, "arial, times new roman, verdana", converts to an array that contains the strings "arial", "times new roman", and "verdana". Notice the commas are removed along with any white space at the beginning or end of the font name. White space in the middle of a font name is not removed.

FontNamesConverter

Example Syntax:

ToString

[C#] public FontNamesConverter( );

[C++] public: FontNamesConverter( );

[VB] Public Sub New( )

[JScript] public function FontNamesConverter( );

CanConvertFrom

[C#] public override bool CanConvertFrom(ITypeDescriptorContext context, Type sourceType);

[C++] public: bool CanConvertFrom(ITypeDescriptorContext* context, Type* sourceType);

[VB] Overrides Public Function CanConvertFrom(ByVal context As ITypeDescriptorContext, ByVal sourceType As Type) As Boolean

[JScript] public override function CanConvertFrom(context: ITypeDescriptorContext, sourceType: Type): Boolean;

Description

Determines whether this converter can convert an object of the specified data type to an array of strings containing individual font names.

Return Value: true if the type can be converted; otherwise, false.

Use the System.Web.UI.WebControls.FontNamesConverter.CanConvertFrom(System.ComponentModel.ITypeDescriptorContext,System.Type) method to determine whether the specified data type can be converted to an array of strings containing individual font names. A System.ComponentModel.ITypeDescriptorContext that provides information about the context of a type converter. You can optionally pass in null for this parameter. A System.Type that represents the data type to convert from. This parameter must be set to the string data type.

ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: ITypeDescriptorContext, culture: CultureInfo, value: Object): Object;

Description

Converts a string that represents a list of font names into an array of strings containing individual font names.

Return Value: A System.Object that represents the array of strings containing the individual font names.

Use the System.Web.UI.WebControls.FontNamesConverter.ConvertFrom(System.ComponentModel.ITypeDescriptorContext,System.Globalization.CultureInfo, System. Object) method to convert a single string containing a list of font names to an array of strings containing the individual names. Each font name in the string must be separated by a comma. For example, the string, "arial, times new roman, verdana", converts to an array that contains the strings "arial", "times new roman", and "verdana". Notice that the commas are removed along with any white space at the beginning or end of the font name. White space in the middle of a font name is not removed. A System.ComponentModel.ITypeDescriptorContext that provides information about the context of a type converter. This parameter is not used in this method. It is reserved for future versions of this method. You can optionally pass in null for this parameter. A System.Globalization.CultureInfo object that represents information about a culture such as language, calendar system, and so on. This parameter is not used in this method. It is reserved for future versions of this method. You can optionally pass in null for this parameter. A System.Object that represents the source string to convert from.

ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object;

Description

Creates a string that represents a list of font names from an array of strings containing individual font names.

Return Value: A System.Object that represents a string containing a list of font names.

Use the System.Web.UI.WebControls.FontNamesConverter.ConvertTo(System.ComponentModel.ITypeDescriptorContext,System.Globalization.CultureInfo, System. Object,System.Type) method to convert an array of strings containing the individual font names to a single string containing a list of the names. For example, an array that contains the strings "arial", "times new roman", and "verdana" converts to the string, "arial,times new roman,verdana". Notice that commas are automatically inserted between the font names without any white space. A System. ComponentModel.ITypeDescriptorContext object that provides information about the context of a type converter. This parameter is not used in this method. It is reserved for future versions of this method. You can optionally pass in null for this parameter. A System.Globalization.CultureInfo object that represents information about a culture such as language, calendar system, and so on. This parameter is not used in this method. It is reserved for future versions of this method. You can optionally pass in null for this parameter. A System.Object that represents the source array of strings to convert from. A System.Type object that represents the data type to convert to. This parameter must be set to the string data type.

FontSize enumeration (System.Web.UI.WebControls)

ToString

Description

Specifies the font sizes defined by HTML 4.0.

The System.Web.UI.WebControls.FontSize enumeration represents the font sizes defined by HTML 4.0. The font size can be an absolute or relative size.

ToString

[C#] public const FontSize AsUnit;
[C++] public: const FontSize AsUnit;
[VB] Public Const AsUnit As FontSize
[JScript] public var AsUnit: FontSize;

Description

The font size is specified by a point value.

ToString

[C#] public const FontSize Large;
[C++] public: const FontSize Large;
[VB] Public Const Large As FontSize
[JScript] public var Large: FontSize;

Description

The font size is two sizes larger than the base font size.

ToString

[C#] public const FontSize Larger;
[C++] public: const FontSize Larger;
[VB] Public Const Larger As FontSize
[JScript] public var Larger: FontSize;

Description

The font size is one size larger than the parent element.

ToString

[C#] public const FontSize Medium;
[C++] public: const FontSize Medium;
[VB] Public Const Medium As FontSize
[JScript] public var Medium: FontSize;

Description

The font size is one size larger than the default font size.

ToString

[C#] public const FontSize NotSet;
[C++] public: const FontSize NotSet;
[VB] Public Const NotSet As FontSize
[JScript] public var NotSet: FontSize;

Description

The font size is not set.

ToString

[C#] public const FontSize Small;
[C++] public: const FontSize Small;
[VB] Public Const Small As FontSize
[JScript] public var Small: FontSize;

Description

The base font size determined by the browser.

ToString

[C#] public const FontSize Smaller;
[C++] public: const FontSize Smaller;
[VB] Public Const Smaller As FontSize
[JScript] public var Smaller: FontSize;

Description

The font size is one size smaller than the parent element.

ToString

[C#] public const FontSize XLarge;
[C++] public: const FontSize XLarge;
[VB] Public Const XLarge As FontSize
[JScript] public var XLarge: FontSize;

Description

The font size is three sizes larger than the base font size.

ToString

[C#] public const FontSize XSmall;
[C++] public: const FontSize XSmall;
[VB] Public Const XSmall As FontSize
[JScript] public var XSmall: FontSize;

Description

The font size is one size smaller than the base font size.

ToString

[C#] public const FontSize XXLarge;
[C++] public: const FontSize XXLarge;
[VB] Public Const XXLarge As FontSize
[JScript] public var XXLarge: FontSize;

Description

The font size is four sizes larger than the base font size.

ToString

[C#] public const FontSize XXSmall;
[C++] public: const FontSize XXSmall;
[VB] Public Const XXSmall As FontSize
[JScript] public var XXSmall: FontSize;

Description

The font size is two sizes smaller than the base font size.

FontUnit structure (System.Web.UI.WebControls)

ToString

Description

Represents the size of a font.

For a list of initial property values for an instance of System.Web.UI.WebControls.FontUnit, see the System.Web.UI.WebControls.FontUnit.#ctor constructor.

ToString

[C#] public static readonly FontUnit Empty;
[C++] public: static FontUnit Empty;
[VB] Public Shared ReadOnly Empty As FontUnit
[JScript] public static var Empty: FontUnit;

Description

Represents an empty System.Web.UI.WebControls.FontUnit object. This field is read only.

Use the System.Web.UI.WebControls.FontUnit.Empty field to represent an empty System.Web.UI.WebControls.FontUnit object. No HTML rendered output is created when this field is used.

ToString

[C#] public static readonly FontUnit Large;
[C++] public: static FontUnit Large;
[VB] Public Shared ReadOnly Large As FontUnit
[JScript] public static var Large: FontUnit;

Description

Represents a System.Web.UI.WebControls.FontUnit object with the System.Web.UI.WebControls.FontUnit.Type property set to FontSize.Large font. This field is read only.

Use the System.Web.UI.WebControls.FontUnit.Large field to represent a System.Web.UI.WebControls.FontUnit object with the System.Web.UI.WebControls.FontUnit.Type property set to FontSize.Large.

ToString

[C#] public static readonly FontUnit Larger;

[C++] public: static FontUnit Larger;

[VB] Public Shared ReadOnly Larger As FontUnit

[JScript] public static var Larger: FontUnit;

Description

Represents a System.Web.UI.WebControls.FontUnit object with the System.Web.UI.WebControls.FontUnit.Type property set to FontSize.Larger font. This field is read only.

Use the System.Web.UI.WebControls.FontUnit.Larger field to represent a System.Web.UI.WebControls.FontUnit object with the System.Web.UI.WebControls.FontUnit.Type property set to FontSize.Larger.

ToString

[C#] public static readonly FontUnit Medium;

[C++] public: static FontUnit Medium;

[VB] Public Shared ReadOnly Medium As FontUnit

[JScript] public static var Medium: FontUnit;

Description

Represents a System.Web.UI.WebControls.FontUnit object with the System.Web.UI.WebControls.FontUnit.Type property set to FontSize.Medium font. This field is read only.

Use the System.Web.UI.WebControls.FontUnit.Medium field to represent a System.Web.UI.WebControls.FontUnit object with the System.Web.UI.WebControls.FontUnit.Type property set to FontSize.Medium ToString

[C#] public static readonly FontUnit Small;

[C++] public: static FontUnit Small;

[VB] Public Shared ReadOnly Small As FontUnit

[JScript] public static var Small: FontUnit;

Description

Represents a System.Web.UI.WebControls.FontUnit object with the System.Web.UI.WebControls.FontUnit.Type property set to FontSize.Small font. This field is read only.

Use the System.Web.UI.WebControls.FontUnit.Small field to represent a System.Web.UI.WebControls.FontUnit object with the System.Web.UI.WebControls.FontUnit.Type property set to FontSize.Small.

ToString

[C#] public static readonly FontUnit Smaller;

[C++] public: static FontUnit Smaller;

[VB] Public Shared ReadOnly Smaller As FontUnit

[JScript] public static var Smaller: FontUnit;

Description

Represents a System.Web.UI.WebControls.FontUnit object with the System.Web.UI.WebControls.FontUnit.Type property set to FontSize.Smaller font. This field is read only.

Use the System.Web.UI.WebControls.FontUnit.Smaller field to represent a System.Web.UI.WebControls.FontUnit object with the System.Web.UI.WebControls.FontUnit.Type property set to FontSize.Smaller ToString

[C#] public static readonly FontUnit XLarge;

[C++] public: static FontUnit XLarge;

[VB] Public Shared ReadOnly XLarge As FontUnit

[JScript] public static var XLarge: FontUnit;

Description

Represents a System.Web.UI.WebControls.FontUnit object with the System.Web.UI.WebControls.FontUnit.Type property set to FontSize.XLarge font. This field is read only.

Use the System.Web.UI.WebControls.FontUnit.XLarge field to represent a System.Web.UI.WebControls.FontUnit object with the System.Web.UI.WebControls.FontUnit.Type property set to FontSize.XLarge.

ToString

[C#] public static readonly FontUnit XSmall;

[C++] public: static FontUnit XSmall;

[VB] Public Shared ReadOnly XSmall As FontUnit

[JScript] public static var XSmall: FontUnit;

Description

Represents a System.Web.UI.WebControls.FontUnit object with the System.Web.UI.WebControls.FontUnit.Type property set to FontSize.XSmall font. This field is read only.

Use the System.Web.UI.WebControls.FontUnit.XSmall field to represent a System.Web.UI.WebControls.FontUnit object with the System.Web.UI.WebControls.FontUnit.Type property set to FontSize.XSmall.

ToString

[C#] public static readonly FontUnit XXLarge;

[C++] public: static FontUnit XXLarge;

[VB] Public Shared ReadOnly XXLarge As FontUnit

[JScript] public static var XXLarge: FontUnit;

Description

Represents a System.Web.UI.WebControls.FontUnit object with the System.Web.UI.WebControls.FontUnit.Type property set to FontSize.XXLarge font. This field is read only.

Use the System.Web.UI.WebControls.FontUnit.XXLarge field to represent a System.Web.UI.WebControls.FontUnit object with the System.Web.UI.WebControls.FontUnit.Type property set to FontSize.XXLarge.

ToString

[C#] public static readonly FontUnit XXSmall;

[C++] public: static FontUnit XXSmall;

[VB] Public Shared ReadOnly XXSmall As FontUnit

[JScript] public static var XXSmall: FontUnit;

Description

Represents a System.Web.UI.WebControls.FontUnit object with the System.Web.UI.WebControls.FontUnit.Type property set to FontSize.XXSmall font. This field is read only.

Use the System.Web.UI.WebControls.FontUnit.XXSmall field to represent a System.Web.UI.WebControls.FontUnit object with the System.Web.UI.WebControls.FontUnit.Type property set to FontSize.XXSmall.

FontUnit

Example Syntax:

ToString

[C#] public FontUnit(FontSize type);

[C++] public: FontUnit(FontSize type);

[VB] Public Sub New(ByVal type As FontSize)

[JScript] public function FontUnit(type: FontSize); Initializes a new instance of the System.Web.UI.WebControls.FontUnit class.

Description

Initializes a new instance of the System.Web.UI.WebControls.FontUnit class with the specified System.Web.UI.WebControls.FontSize object.

Use this constructor to create and initialize an instance of the System.Web.UI.WebControls.FontUnit class using the specified System.Web.UI.WebControls.FontSize object. One of the System.Web.UI.WebControls.FontSize values.

FontUnit

Example Syntax:

ToString

[C#] public FontUnit(int value);

[C++] public: FontUnit(int value);

[VB] Public Sub New(ByVal value As Integer)

[JScript] public function FontUnit(value: int);

Description

Initializes a new instance of the System.Web.UI.WebControls.FontUnit class with the specified font size.

Use this constructor to create and initialize an instance of the System.Web.UI.WebControls.FontUnit class using the specified font size. An integer that represents the size of the font.

FontUnit

Example Syntax:

ToString

[C#] public FontUnit(string value);

[C++] public: FontUnit(String* value);

[VB] Public Sub New(ByVal value As String)

[JScript] public function FontUnit(value: String);

Description

Initializes a new instance of the System.Web.UI.WebControls.FontUnit class with the specified font value.

Use this constructor to create and initialize an instance of the System.Web.UI.WebControls.FontUnit class using the specified font value. A string representation of one of the System.Web.UI.WebControls.FontSize value.

FontUnit Example Syntax:

ToString

[C#] public FontUnit(Unit value);

[C++] public: FontUnit(Unit value);

[VB] Public Sub New(ByVal value As Unit)

[JScript] public function FontUnit(value: Unit);

Description

Initializes a new instance of the System.Web.UI.WebControls.FontUnit class with the specified System.Web.UI.WebControls.Unit object.

Use this constructor to create and initialize an instance of the System.Web.UI.WebControls.FontUnit class using the specified System.Web.UI.WebControls.Unit object. A System.Web.UI.WebControls.Unit object that specifies the font size.

FontUnit

Example Syntax:

ToString

[C#] public FontUnit(string value, CultureInfo culture);

[C++] public: FontUnit(String* value, CultureInfo* culture);

[VB] Public Sub New(ByVal value As String, ByVal culture As CultureInfo)

[JScript] public function FontUnit(value: String, culture: CultureInfo);

Description

Initializes a new instance of the System.Web.UI.WebControls.FontUnit class with the specified font value and System.Globalization.CultureInfo object.

Use this constructor to create and initialize an instance of the System.Web.UI.WebControls.FontUnit class using the specified font value and System.Globalization.CultureInfo object. A string representation of one of the System.Web.UI.WebControls.FontSize value. A System.Globalization.CultureInfo object that represents the culture to create the System.Web.UI.WebControls.FontUnit object for.

IsEmpty

ToString

[C#] public bool IsEmpty {get;}

[C++] public: _property bool get_IsEmpty( );

[VB] Public ReadOnly Property IsEmpty As Boolean

[JScript] public function get_IsEmpty( ): Boolean;

Description

Gets a value that indicates whether the font size has been set.

The System.Web.UI.WebControls.FontUnit.IsEmpty property is commonly used to determine whether the font size has been set.

Type

ToString

[C#] public FontSize Type {get;}

[C++] public: _property FontSize get_Type( );

[VB] Public ReadOnly Property Type As FontSize

[JScript] public function get Type( ): FontSize;

Description

Gets a System.Web.UI.WebControls.FontSize object that represents the font size.

Use the System.Web.UI.WebControls.FontUnit.Type property to determine the font size.

Unit

ToString

[C#] public Unit Unit {get;}

[C++] public: _property Unit get_Unit( );

[VB] Public ReadOnly Property Unit As Unit

[JScript] public function get Unit( ): Unit;

Description

Gets a System.Web.UI.WebControls.Unit object that represents the font size.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Determines whether the specified System.Object is equivilent to this instance of the System.Web.UI.WebControls.FontUnit class.

Return Value: true if the specified System.Object is equivilent to this instance of the System.Web.UI.WebControls.FontUnit class; otherwise, false. A System.Object that contains the object to compare to this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

op_Equality

[C#] public static bool operator==(FontUnit left, FontUnit right);

[C++] public: static bool op_Equality(FontUnit left, FontUnit right);

[VB] returnValue=FontUnit.op_Equality(left, right)

[JScript] returnValue=left==right;

Description

Compares two System.Web.UI.WebControls.FontUnit objects for equality.

Return Value: true if both System.Web.UI.WebControls.FontUnit objects are equal; otherwise, false. A System.Web.UI.WebControls.FontUnit object that contains font properties on the left of the operator. A System.Web.UI.WebControls. FontUnit object that contains font properties on the right of the operator.

op_Implicit

[C#] public static implicit operator FontUnit(int n);

[C++] public: static FontUnit op_Implicit(int n);

[VB] returnValue=FontUnit.op_Implicit(n)

[JScript] returnValue=n;

Description

Implicitly creates a System.Web.UI.WebControls.FontUnit of type System.Drawing.Point from an integer value. An integer representing the System.Drawing.Point value to convert into a System.Web.UI.WebControls.FontUnit.

op_Inequality

[C#] public static bool operator !=(FontUnit left, FontUnit right);

[C++] public: static bool op_Inequality(FontUnit left, FontUnit right);

[VB] returnValue=FontUnit.op_Inequality(left, right)

[JScript] returnValue=left !=right;

Description

Compares two System.Web.UI.WebControls.FontUnit objects for inequality.

Return Value: true if both System.Web.UI.WebControls.FontUnit objects are not equal; otherwise, false. A System.Web.UI.WebControls.FontUnit that contains font properties on the left of the operator. A System.Web.UI.WebControls.FontUnit that contains font properties on the right of the operator.

Parse

[C#] public static FontUnit Parse(string s);

[C++] public: static FontUnit Parse(String* s);

[VB] Public Shared Function Parse(ByVal s As String) As FontUnit

[JScript] public static function Parse(s: String): FontUnit; Converts the specified string to its System.Web.UI.WebControls.FontUnit equivalent.

Description

Converts the specified string to its default System.Web.UI.WebControls.FontUnit equivalent. A string representation of one of the System.Web.UI.WebControls.FontSize value.

Parse

[C#] public static FontUnit Parse(string s, CultureInfo culture);

[C++] public: static FontUnit Parse(String* s, CultureInfo* culture);

[VB] Public Shared Function Parse(ByVal s As String, ByVal culture As CultureInfo) As FontUnit

[JScript] public static function Parse(s: String, culture: CultureInfo): FontUnit;

Description

Converts the specified string to its System.Web.UI.WebControls.FontUnit equivalent in the specified culture. A string representation of one of the System.Web.UI.WebControls.FontSize value. A System.Globalization.CultureInfo object that represents the culture of the System.Web.UI.WebControls.FontUnit object.

Point

[C#] public static FontUnit Point(int n);

[C++] public: static FontUnit Point(int n);

[VB] Public Shared Function Point(ByVal n As Integer) As FontUnit

[JScript] public static function Point(n: int): FontUnit;

Description

Creates a System.Web.UI.WebControls.FontUnit of type System.Drawing.Point from an integer value.

Return Value: A System.Web.UI.WebControls.FontUnit that represents the new font size. An integer representing the System.Drawing.Point value to convert into a System.Web.UI.WebControls.FontUnit.

ToString

[C#] public override string ToString( );

[C++] public: String* ToString( );

[VB] Overrides Public Function ToString( ) As String

[JScript] public override function ToString( ): String; Converts the System.Web.UI.WebControls.FontUnit object to a string representation.

Description

Converts the System.Web.UI.WebControls.FontUnit object to the default string representation.

Return Value: A string representation of the System.Web.UI.WebControls.FontUnit object.

ToString

[C#] public string ToString(CultureInfo culture);

[C++] public: String* ToString(CultureInfo* culture);

[VB] Public Function ToString(ByVal culture As CultureInfo) As String

[JScript] public function ToString(culture: CultureInfo): String;

Description

Converts the System.Web.UI.WebControls.FontUnit object to a string representation using the specified System.Globalization.CultureInfo object. A System.Globalization.CultureInfo object that contains the culture.

FontUnitConverter class (System.Web.UI.WebControls)

ToString

Description

Converts a System.Web.UI.WebControls.FontUnit to and from a specified data type.

FontUnitConverter

Example Syntax:

ToString

[C#] public FontUnitConverter( );

[C++] public: FontUnitConverter( );

[VB] Public Sub New( )

[JScript] public function FontUnitConverter( );

CanConvertFrom

[C#] public override bool CanConvertFrom(ITypeDescriptorContext context, Type sourceType);

[C++] public: bool CanConvertFrom(ITypeDescriptorContext* context, Type* sourceType);

[VB] Overrides Public Function CanConvertFrom(ByVal context As ITypeDescriptorContext, ByVal sourceType As Type) As Boolean

[JScript] public override function CanConvertFrom(context: ITypeDescriptorContext, sourceType: Type): Boolean;

Description

Determines if the specified data type can be converted to a System.Web.UI.WebControls.FontUnit.

Return Value: true if the type can be converted; otherwise false. An System.ComponentModel.ITypeDescriptorContext that provides information about the context of a type converter. A System.Type that represents the data type to check.

ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: ITypeDescriptorContext, culture: CultureInfo, value: Object): Object;

Description

Converts the specified System.Object into a System.Web.UI.WebControls.FontUnit. An System.ComponentModel.ITypeDescriptorContext that provides information about the context of a type converter. A System.Globalization.CultureInfo object that represents information about a culture such as language, calendar system, and so on. This parameter is not used in this method. It is reserved for future versions of this method. You can optionally pass in null for this parameter. The System.Object to convert to a System.Web.UI.WebControls.FontUnit.

ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object;

Description

Converts the specified System.Web.UI.WebControls.FontUnit into the specified System.Type. An System.ComponentModel.ITypeDescriptorContext that provides information about the context of a type converter. A System.Globalization.CultureInfo object that represents information about a culture such as language, calendar system, and so on. This parameter is not used in this method. It is reserved for future versions of this method. You can optionally pass in null for this parameter. A System.Object that represents the source array of strings to convert from. A System.Type that represents the data type to convert to.

GetStandardValues

[C#] public override StandardValuesCollection GetStandardValues(ITypeDescriptorContext context);

[C++] public: StandardValuesCollection* GetStandardValues(ITypeDescriptorContext* context);

[VB] Overrides Public Function GetStandardValues(ByVal context As ITypeDescriptorContext) As StandardValuesCollection

[JScript] public override function GetStandardValues(context: ITypeDescriptorContext): StandardValuesCollection;

Description

Returns a System.ComponentModel.TypeConverter.StandardValuesCollection containing standard System.Web.UI.WebControls.FontUnit values.

Return Value: A System.ComponentModel.TypeConverter.StandardValuesCollection containing System.Web.UI.WebControls.FontUnit values. An System.ComponentModel.ITypeDescriptorContext that provides information about the context of a type converter.

GetStandardValuesExclusive

[C#] public override bool GetStandardValuesExclusive(ITypeDescriptorContext context);

[C++] public: bool GetStandardValuesExclusive(ITypeDescriptorContext* context);

[VB] Overrides Public Function GetStandardValuesExclusive(ByVal context As ITypeDescriptorContext) As Boolean

[JScript] public override function GetStandardValuesExclusive(context: ITypeDescriptorContext): Boolean;

Description

Indicates whether the specified context contains exclusive standard values.

Return Value: false for all cases. An System.ComponentModel.ITypeDescriptorContext that provides information about the context of a type converter.

GetStandardValuesSupported

[C#] public override bool GetStandardValuesSupported(ITypeDescriptorContext context);

[C++] public: bool GetStandardValuesSupported(ITypeDescriptorContext* context);

[VB] Overrides Public Function GetStandardValuesSupported(ByVal context As ITypeDescriptorContext) As Boolean

[JScript] public override function GetStandardValuesSupported(context: ITypeDescriptorContext): Boolean;

Description

Indicates whether the specified context contains suppurted standard values.

Return Value: true for all cases. An System.ComponentModel.ITypeDescriptorContext that provides information about the context of a type converter.

GridLines enumeration (System.Web.UI.WebControls)

ToString

Description

Specifies the grid line styles for controls displaying items in a table structure.

The System.Web.UI.WebControls.GridLines enumeration represents the grid line styles for controls displaying items in a table structure.

ToString

[C#] public const GridLines Both;

[C++] public: const GridLines Both;

[VB] Public Const Both As GridLines

[JScript] public var Both: GridLines;

Description

Both horizontal and vertical grid lines rendered.

ToString

[C#] public const GridLines Horizontal;

[C++] public: const GridLines Horizontal;

[VB] Public Const Horizontal As GridLines

[JScript] public var Horizontal: GridLines;

Description

Only horizontal grid lines rendered.

ToString

[C#] public const GridLines None;

[C++] public: const GridLines None;

[VB] Public Const None As GridLines

[JScript] public var None: GridLines;

Description

No grid lines rendered.

ToString

[C#] public const GridLines Vertical;
[C++] public: const GridLines Vertical;
[VB] Public Const Vertical As GridLines
[JScript] public var Vertical: GridLines;

Description

Only vertical grid lines rendered.

HorizontalAlign enumeration (System.Web.UI.WebControls)

ToString

Description

Specifies the horizonal alignment of items within a container.

The System.Web.UI.WebControls.HorizontaAlign enumeration represents the horizontal alignment options for items within a container, such as a System.Web.UI.WebControls.TableCell.

ToString

[C#] public const HorizontalAlign Center;
[C++] public: const HorizontalAlign Center;
[VB] Public Const Center As HorizontalAlign
[JScript] public var Center: HorizontalAlign;

Description

The contents of a container are centered.

ToString

[C#] public const HorizontalAlign Justify;
[C++] public: const HorizontalAlign Justify;
[VB] Public Const Justify As HorizontalAlign
[JScript] public var Justify: HorizontalAlign;

Description

The contents of a container are uniformly spread out and aligned with both the left and right margins.

ToString

[C#] public const HorizontalAlign Left;
[C++] public: const HorizontalAlign Left;
[VB] Public Const Left As HorizontalAlign
[JScript] public var Left: HorizontalAlign;

Description

The contents of a container are left justified.

ToString

[C#] public const HorizontalAlign NotSet;
[C++] public: const HorizontalAlign NotSet;
[VB] Public Const NotSet As HorizontalAlign
[JScript] public var NotSet: HorizontalAlign;

Description

The horizontal alignment is not set.

ToString

[C#] public const HorizontalAlign Right;
[C++] public: const HorizontalAlign Right;
[VB] Public Const Right As HorizontalAlign
[JScript] public var Right: HorizontalAlign;

Description

The contents of a container are right justified.

HyperLink class (System.Web.UI.WebControls)

ToString

Description

A control that displays a link to another Web page.

Use the System.Web.UI.WebControls.HyperLink control to create a link to another Web page. The System.Web.UI-.WebControls.HyperLink control is typically displayed as text specified by the System.Web.UI.WebControls.HyperLink.Text property. It can also be displayed as an image specified by the System.Web.UI.WebControls.HyperLink.ImageUrl property.

HyperLink

Example Syntax:

ToString

[C#] public HyperLink( );
[C++] public: HyperLink( );
[VB] Public Sub New( )
[JScript] public function HyperLink( );

Description

Initializes a new instance of the System.Web.UI.WebControls.HyperLink class.

Use this constructor to create and initialize a new instance of the System.Web.UI.WebControls.HyperLink control.

AccessKey

Attributes

BackColor

BorderColor

BorderStyle

BorderWidth

ChildControlsCreated

ClientID

Context

Controls

ControlStyle

ControlStyleCreated

CssClass

Enabled

EnableViewState

Events

Font

ForeColor

HasChildViewState

Height

ID

ImageUrl

ToString

Description

Gets or sets the path to an image to display for the System.Web.UI.WebControls.HyperLink control.

The System.Web.UI.WebControls.HyperLink control can be displayed as text or an image. Use the System.Web.UI.WebControls.HyperLink.ImageUrl property to specify an image to display for the System.Web.UI.WebControls.HyperLink control.

IsTrackingViewState

NamingContainer

NavigateUrl

ToString

Description

Gets or sets the URL to link to when the System.Web.UI.WebControls.HyperLink control is clicked.

Use the System.Web.UI.WebControls.HyperLink.NavigateUrl property to specify the URL to navigate to when the System.Web.UI.WebControls.HyperLink control is clicked.

Page

Parent

Site

Style

TabIndex

TagKey

TagName
Target
ToString

Description

Gets or sets the target window or frame to display the Web page content linked to when the System.Web.UI.WebControls.HyperLink control is clicked.

Use the System.Web.UI.WebControls.HyperLink.Target property to specify the frame or window that displays the Web page linked to when the System.Web.UI.WebControls.HyperLink control is clicked. The Web page is specified by setting the System.Web.UI.WebControls.HyperLink.NavigateUrl property.

TemplateSourceDirectory
Text
ToString

Description

Gets or sets the text caption for the System.Web.UI.WebControls.HyperLink control.

The System.Web.UI.WebControls.HyperLink control can be displayed as text or an image. Use the System.Web.UI.WebControls.HyperLink.Text property to specify the text to display for the System.Web.UI.WebControls.HyperLink control.

ToolTip
UniqueID
ViewState
ViewStateIgnoresCase
Visible
Width
AddAttributesToRender

[C#] protected override void AddAttributesToRender(HtmlTextWriter writer);

[C++] protected: void AddAttributes ToRender(HtmlTextWriter* writer);

[VB] Overrides Protected Sub AddAttributesToRender(ByVal writer As HtmlTextWriter)

[JScript] protected override function AddAttributesToRender (writer HtmlTextWriter);

Description

Adds the attribututes of the a System.Web.UI.WebControls.HyperLink to the output stream for rendering. The output stream to render on the client.

AddParsedSubObject

[C#] protected override void AddParsedSubObject(object obj);

[C++] protected: void Add Parsed SubObject(Object* obj);

[VB] Overrides Protected Sub AddParsedSubObject(ByVal obj As Object)

[JScript] protected override function AddParsedSubObject (obj: Object);

LoadViewState

[C#] protected override void LoadViewState(object savedState);

[C++] protected: void LoadViewState(Object* savedState);

[VB] Overrides Protected Sub LoadViewState(ByVal savedState As Object)

[JScript] protected override function LoadViewState(savedState: Object);

Description

Load previously saved state. Overridden to synchronize Text property with LiteralContent.

RenderContents

[C#] protected override void RenderContents(HtmlTextWriter writer);

[C++] protected: void RenderContents (HtmlTextWriter* writer);

[VB] Overrides Protected Sub RenderContents(ByVal writer As HtmlTextWriter)

[JScript] protected override function RenderContents(writer: HtmlTextWriter);

Description

Displays the System.Web.UI.WebControls.HyperLink on a page. The output stream to render on the client.

HyperLinkColumn class (System.Web.UI.WebControls)
TrackViewState

Description

A column type for the System.Web.UI.WebControls.DataGrid control that contains a hyperlink for each item in the column.

Use the System.Web.UI.WebControls.HyperLinkColumn column type in a System.Web.UI.WebControls.DataGrid control to create a hyperlink for each row in the System.Web.UI.WebControls.DataGrid control. Set the System.Web.UI.WebControls.HyperLinkColumn.Text property to specify the caption text for the hyperlink. To specify the URL to navigate to when the hyperlink is clicked, set the System.Web.UI.WebControls.HyperLinkColumn.NavigateUrl property.

HyperLinkColumn
Example Syntax:
TrackViewState

[C#] public HyperLinkColumn( );

[C++] public: HyperLinkColumn( );

[VB] Public Sub New( )

[JScript] public function HyperLinkColumn( );

Description

Initializes a new instance of the System.Web.UI.WebControls.HyperLinkColumn class.

Use this constructor to create and initialize a new instance of the System.Web.UI.WebControls.HyperLinkColumn class.

DataNavigateUrlField
TrackViewState

[C#] public virtual string DataNavigateUrlField {get; set;}

[C++] public: _property virtual String* get_DataNavigateUrlField( );public: _property virtual void set_DataNavigateUrlField(String*);

[VB] Overridable Public Property DataNavigateUrlField As String

[JScript] public function get DataNavigateUrlField( ): String; public function set DataNavigateUrlField(String);

Description

Gets or sets the field name from a data source to bind to the URL of the hyperlinks in System.Web.UI.WebControls.HyperLinkColumn column.

DataNavigateUrlFormatString
TrackViewState

[C#] public virtual string DataNavigateUrlFormatString {get; set;}

[C++] public: _property virtual String* get_DataNavigateUrlFormatString( );public: _property virtual void set_DataNavigateUrlFormatString(String*);

[VB] Overridable Public Property DataNavigateUrlFormatString As String

[JScript] public function get DataNavigateUrlFormat String( ): String;public function set DataNavigateUrlFormatString(String);

Description

Gets or sets the string that specifies the display format for the URL of the hyperlinks in the System.Web.UI.WebControls.HyperLinkColumn column.

Use the System.Web.UI.WebControls.HyperLinkColumn.DataNavigateUrlFormatString property to provide a custom format for the URL of the hyperlinks in the System.Web.UI.WebControls.HyperLinkColumn column.

DataTextField

TrackViewState

[C#] public virtual string DataTextField {get; set;}

[C++] public: _property virtual String* get_DataTextField( );public: _property virtual void set_DataTextField (String*);

[VB] Overridable Public Property DataTextField As String

[JScript] public function get DataTextField( ): String;public function set DataTextField(String);

Description

Gets or sets the field name from a data source to bind to the text caption of the hyperlinks in System.Web.UI.WebControls.HyperLinkColumn column.

DataTextFormatString

TrackViewState

[C#] public virtual string DataTextFormatString {get; set;}

[C++] public: _property virtual String* get_DataTextFormatString( );public: _property virtual void set_DataTextFormatString(String*);

[VB] Overridable Public Property DataTextFormatString As String

[JScript] public function get DataTextFormatString( ): String;public function set DataTextFormatString(String);

Description

Gets or sets the string that specifies the display format for the text caption of the hyperlinks in the System.Web.UI.WebControls.HyperLinkColumn column.

Use the System.Web.UI.WebControls.HyperLinkColumn.DataTextFormatString property to provide a custom format for the items in the column.

DesignMode

FooterStyle

FooterText

HeaderImageUrl

HeaderStyle

HeaderText

IsTrackingViewState

ItemStyle

NavigateUrl

TrackViewState

Description

Gets or sets the URL to link to when a hyperlink in the column is clicked.

Use the System.Web.UI.WebControls.HyperLinkColumn.NavigateUrl property to specify the URL to navigate to when a hyperlink in the column is clicked.

Owner

SortExpression

Target

TrackViewState

Description

Gets or sets the target window or frame to display the Web page content linked to when the hyperlink in the column is clicked.

Use the System.Web.UI.WebControls.HyperLinkColumn.Target property to specify the frame or window that displays the Web page linked to when a hyperlink in the column is clicked.

Text

TrackViewState

[C#] public virtual string Text {get; set;}

[C++] public: _property virtual String* get_Text( );public: _property virtual void set_Text(String*);

[VB] Overridable Public Property Text As String

[JScript] public function get Text( ): String;public function set Text(String);

Description

Gets or sets the text caption to display for the hyperlinks in the column.

Use the System.Web.UI.WebControls.HyperLinkColumn.Text property to specify the text caption to display for the hyperlinks in the column.

ViewState

Visible

FormatDataNavigateUrlValue

[C#] protected virtual string FormatDataNavigateUrlValue (object dataUrlValue);

[C++] protected: virtual String* FormatDataNavigateUrlValue(Object* dataUrlValue);

[VB] Overridable Protected Function FormatDataNavigateUrlValue(ByVal dataUrlValue As Object) As String

[JScript] protected function FormatDataNavigateUrlValue (dataUrlValue: Object) String;

Description

FormatDataTextValue

[C#] protected virtual string FormatDataTextValue(object dataTextValue);

[C++] protected: virtual String* FormatDataTextValue(Object* dataTextValue);

[VB] Overridable Protected Function FormatDataTextValue (ByVal dataTextValue As Object) As String

[JScript] protected function FormatDataTextValue(dataTextValue: Object) String;

Description

Initialize

[C#] public override void Initialize( );

[C++] public: void Initialize( );

[VB] Overrides Public Sub Initialize( )

[JScript] public override function Initialize( );

Description

InitializeCell

[C#] public override void InitializeCell(TableCell cell, int columnIndex, ListItemType itemType);

[C++] public: void InitializeCell(TableCell* cell, int columnIndex, ListItemType itemType);

[VB] Overrides Public Sub InitializeCell(ByVal cell As TableCell, ByVal columnIndex As Integer, ByVal itemType As ListItemType)

[JScript] public override function InitializeCell(cell: TableCell, columnIndex: int, itemType: ListItemType);

Description

Initializes the cell representing this column with the contained hyperlink.

HyperLinks are created for all items in the DataGrid except the Header and Footer items. The cell to be initialized. The index of the column that contains the cell. The type of item that the cell is part of.

HyperLinkControlBuilder class (System.Web.UI.WebControls)

TrackViewState

Description

Interacts with the parser to build a System.Web.UI.WebControls.HyperLink control.

To create a custom control builder for a System.Web.UI.WebControls.HyperLink derived control, you need to inherit from this class.

HyperLinkControlBuilder

Example Syntax:

TrackViewState

[C#] public HyperLinkControlBuilder( );

[C++] public: HyperLinkControlBuilder( );

[VB] Public Sub New( )

[JScript] public function HyperLinkControlBuilder( );

ControlType

FChildrenAsProperties

FIsNonParserAccessor

HasAspCode

ID

InDesigner

NamingContainerType

Parser

TagName

AllowWhitespaceLiterals

[C#] public override bool AllowWhitespaceLiterals( );

[C++] public: bool AllowWhitespaceLiterals( );

[VB] Overrides Public Function AllowWhitespaceLiterals( ) As Boolean

[JScript] public override function AllowWhitespace Literals( ): Boolean;

Description

Gets a value that indicates whether white spaces are allowed in literals for this control.

Return Value: Overloaded to always returns false to indicate that white spaces are not allowed.

This method overrides the System.Web.UI.ControlBuilder.AllowWhitespaceLiterals property to ignore white space in the System.Web.UI.WebControls.HyperLink control.

Image class (System.Web.UI.WebControls)

ToString

Description

Displays an image on a Web page.

Use the System.Web.UI.WebControls.Image control to display an image on the Web page. The path to the displayed image is specified by setting the System.Web.UI.WebControls.Image.ImageUrl property. You can specify the text to display in place of image when the image is not available by setting the System.Web.UI.WebControls.Image.AlternateText property. The alignment of the image in relation to other elements on the Web page is specified by setting System.Web.UI.WebControls.Image.ImageAlign property.

Image

Example Syntax:

ToString

[C#] public Image( );

[C++] public: Image( );

[VB] Public Sub New( )

[JScript] public function Image( );

Description

Initializes a new instance of the System.Web.UI.WebControls.Image class.

Use this constructor to create and initialize a new instance of the System.Web.UI.WebControls.Image class.

AccessKey

AlternateText

ToString

Description

Gets or sets the alternate text displayed in the System.Web.UI.WebControls.Image control when the image is unavailable. Browsers that support the ToolTips feature display this text as a ToolTip.

Use this property to specify the text to display if the image specified in the System.Web.UI.WebControls.Image.ImageUrl property is not available. In browsers that support the ToolTips feature, this text also displays as a ToolTip.

Attributes

BackColor

BorderColor

BorderStyle

BorderWidth

ChildControlsCreated

ClientID

Context

Controls

ControlStyle

ControlStyleCreated

CssClass

Enabled

ToString

Description

Gets or sets a value indicating whether the control is enabled.

This property is inherited from the System.Web.UI.WebControls.WebControl class and is not applicable to the System.Web.UI.WebControls.Image control.

EnableViewState

Events

Font

ToString

Description

Gets the font properties for the text associated with the control.

This property is inherited from the System.Web.UI.WebControls.WebControl class and is not applicable to the System.Web.UI.WebControls.Image control.

ForeColor

HasChildViewState

Height

ID

ImageAlign

ToString

Description

Gets or sets the alignment of the System.Web.UI.WebControls.Image control in relation to other elements on the Web page.

Use the System.Web.UI.WebControls.Image.ImageAlign property to specify or determine the alignment of the image in relation to other elements on the Web page. The following table lists the possible alignments.

ImageUrl

ToString

[C#] public virtual string ImageUrl {get; set;}

[C++] public: _property virtual String* get_ImageUrl( );public: _property virtual void set_ImageUrl(String*);

[VB] Overridable Public Property ImageUrl As String

[JScript] public function get ImageUrl( ): String;public function set ImageUrl(String);

Description

Gets or sets the location of an image to display in the System.Web.UI.WebControls.Image control.

Use the System.Web.UI.WebControls.Image.ImageUrl property to specify the URL of an image to display in the System.Web.UI.WebControls.Image control. You can use a relative or an absolute URL. A relative URL relates the location of the image to the location of the Web page without specifying a complete path on the server. The path is relative to the location of the Web page. This makes it easier to move the entire site to another directory on the server without updating the code. An absolute URL provides the complete path, so moving the site to another directory requires that you update the code.

IsTrackingViewState

NamingContainer

Page

Parent

Site

Style

TabIndex

TagKey

TagName

TemplateSourceDirectory

ToolTip

UniqueID

ViewState

ViewStateIgnoresCase

Visible

Width

AddAttributesToRender

[C#] protected override void AddAttributesToRender(HtmlTextWriter writer);

[C++] protected: void AddAttributesToRender(HtmlTextWriter* writer);

[VB] Overrides Protected Sub AddAttributesToRender(ByVal writer As HtmlTextWriter)

[JScript] protected override function AddAttributesToRender (writer HtmlTextWriter);

Description

Adds the attributes of an System.Web.UI.WebControls.Image to the output stream for rendering on the client. A System.Web.UI.HtmlTextWriter that contains the output stream to render on the client browser.

RenderContents

[C#] protected override void RenderContents(HtmlTextWriter writer);

[C++] protected: void RenderContents (HtmlTextWriter* writer);

[VB] Overrides Protected Sub RenderContents(ByVal writer As HtmlTextWriter)

[JScript] protected override function RenderContents(writer: HtmlTextWriter);

Description

ImageAlign enumeration (System.Web.UI.WebControls)

TrackViewState

Description

Specifies the alignment of an image in relation to the text of a Web page.

The System.Web.UI.WebControls.ImageAlign enumeration represents the alignment options for an image relative to the text of a Web page.

TrackViewState

[C#] public const ImageAlign AbsBottom;

[C++] public: const ImageAlign AbsBottom;

[VB] Public Const AbsBottom As ImageAlign

[JScript] public var AbsBottom: ImageAlign;

Description

The lower edge of the image is aligned with the lower edge of the largest element on the same line.

TrackViewState

[C#] public const ImageAlign AbsMiddle;

[C++] public: const ImageAlign AbsMiddle;

[VB] Public Const AbsMiddle As ImageAlign

[JScript] public var AbsMiddle: ImageAlign;

Description

The middle of the image is aligned with the middle of the largest element on the same line.

TrackViewState

[C#] public const ImageAlign Baseline;

[C++] public: const ImageAlign Baseline;

[VB] Public Const Baseline As ImageAlign

[JScript] public var Baseline: ImageAlign;

Description

The lower edge of the image is aligned with the lower edge of the first line of text.

TrackViewState

[C#] public const ImageAlign Bottom;

[C++] public: const ImageAlign Bottom;

[VB] Public Const Bottom As ImageAlign

[JScript] public var Bottom: ImageAlign;

Description

The lower edge of the image is aligned with the lower edge of the first line of text.

TrackViewState

[C#] public const ImageAlign Left;

[C++] public: const ImageAlign Left;

[VB] Public Const Left As ImageAlign

[JScript] public var Left: ImageAlign;

Description

The image is aligned on the left edge of the Web page with text wrapping on the right.

TrackViewState

[C#] public const ImageAlign Middle;

[C++] public: const ImageAlign Middle;

[VB] Public Const Middle As ImageAlign

[JScript] public var Middle: ImageAlign;

Description

The middle of the image is aligned with the lower edge of the first line of text.

TrackViewState

[C#] public const ImageAlign NotSet;

[C++] public: const ImageAlign NotSet;

[VB] Public Const NotSet As ImageAlign

[JScript] public var NotSet: ImageAlign;

Description

The alignment is not set.

TrackViewState

[C#] public const ImageAlign Right;

[C++] public: const ImageAlign Right;

[VB] Public Const Right As ImageAlign

[JScript] public var Right: ImageAlign;

Description

The image is aligned on the right edge of the Web page with text wrapping on the left.

TrackViewState

[C#] public const ImageAlign TextTop;

[C++] public: const ImageAlign TextTop;

[VB] Public Const TextTop As ImageAlign

[JScript] public var TextTop: ImageAlign;

Description

The upper edge of the image is aligned with the upper edge of the highest text on the same line.

TrackViewState

[C#] public const ImageAlign Top;

[C++] public: const ImageAlign Top;

[VB] Public Const Top As ImageAlign

[JScript] public var Top: ImageAlign;

Description

The upper edge of the image is aligned with the upper edge of the highest element on the same line.

ImageButton class (System.Web.UI.WebControls)

ToString

Description

A control that displays an image and responds to mouse clicks on the image.

Use the System.Web.UI.WebControls.ImageButton control to display an image that responds to mouse clicks.

ImageButton

Example Syntax:

ToString

[C#] public ImageButton( );

[C++] public: ImageButton( );

[VB] Public Sub New( )

[JScript] public function ImageButton( );

Description

Initializes a new instance of the System.Web.UI.WebControls.ImageButton class.

Use this constructor to create and initialize a new instance of the System.Web.UI.WebControls.ImageButton class.

AccessKey

AlternateText

Attributes

BackColor

BorderColor

BorderStyle

BorderWidth

CausesValidation

ToString

Description

Gets or sets a value indicating whether validation is performed when the System.Web.UI.WebControls.ImageButton control is clicked.

By default, page validation is performed when a System.Web.UI.WebControls.ImageButton control is clicked. Page validation determines whether the input controls associated with a validation control on the page all pass the validation rules specified by the validation control.

ChildControlsCreated

ClientID

CommandArgument

ToString

Description

Gets or sets an optional argument that provides additional information about the System.Web.UI.WebControls.ImageButton.CommandName property.

Sometimes, multiple System.Web.UI.WebControls.ImageButton controls are related and share the same value for the System.Web.UI.WebControls.ImageButton.CommandName property, such as Sort. Use this property to supplement the System.Web.UI.WebControls.ImageButton.CommandName property with additional information about the command to perform, such as Ascending. The values of the System.Web.UI.WebControls.ImageButton.CommandName and System.Web.UI.WebControls.ImageButton.CommandArgument properties are typically used in the System.Web.UI.WebControls.ImageButton.OnCommand(System.Web.UI.WebControls.CommandEventArgs) event handler to determine the action to perform when the System.Web.UI.WebControls.ImageButton control is clicked.

CommandName

ToString

[C#] public string CommandName {get; set;}

[C++] public: _property String* get_CommandName( );public: _property void set_CommandName(String*);

[VB] Public Property CommandName As String

[JScript] public function get CommandName( ): String;public function set CommandName(String);

Description

Gets or sets the command name associated with the System.Web.UI.WebControls.ImageButton control.

Use this property to specify the command to perform when the System.Web.UI.WebControls.ImageButton control is clicked, such as Sort, Cancel, and Edit. This allows multiple System.Web.UI.WebControls.ImageButton controls to be placed on the same Web page. The value in this property can then be programmatically identified in the System.Web.UI.WebControls.ImageButton.OnCommand(System.Web.UI.WebControls.CommandEventArgs) event handler to determine the appropriate action to perform when each System.Web.UI.WebControls.ImageButton control is clicked.

Context

Controls

ControlStyle

ControlStyleCreated

CssClass

Enabled

EnableViewState

Events

Font

ForeColor

HasChildViewState

Height

ID

ImageAlign

ImageUrl

IsTrackingViewState

NamingContainer

Page

Parent

Site

Style

TabIndex

TagKey

ToString

Description

Gets a value that represents the tag HtmlTextWriterTag.Input. This property is read-only.

Overrides the base implementation and returns the tag HtmlTextWriterTag.Input instead of the default HtmlTextWriterTag.Img Gets a value that represents the tag HtmlTextWriterTag.Input. This property is read-only.

TagName

TemplateSourceDirectory

ToolTip
UniqueID
ViewState
ViewStateIgnoresCase
Visible
Width
ToString

Description

Occurs when the System.Web.UI.WebControls.ImageButton is clicked.

The System.Web.UI.WebControls.ImageButton.Click event is raised when the System.Web.UI.WebControls.ImageButton control is clicked.

ToString

[C#] public event CommandEventHandler Command;

[C++] public: _event CommandEventHandler* Command;

[VB] Public Event Command As CommandEventHandler

Description

Occurs when the System.Web.UI.WebControls.ImageButton is clicked.

The System.Web.UI.WebControls.ImageButton.Command event is raised when an System.Web.UI.WebControls.ImageButton control is clicked.

AddAttributesToRender

[C#] protected override void AddAttributesToRender(HtmlTextWriter writer);

[C++] protected: void AddAttributes ToRender(HtmlTextWriter* writer);

[VB] Overrides Protected Sub AddAttributesToRender(ByVal writer As HtmlTextWriter)

[JScript] protected override function AddAttributesToRender (writer HtmlTextWriter);

Description

Adds the attributes of an System.Web.UI.WebControls.ImageButton to the output stream for rendering on the client. The output stream to render on the client.

OnClick

[C#] protected virtual void OnClick(ImageClickEventArgs e);

[C++] protected: virtual void OnClick(ImageClickEventArgs* e);

[VB] Overridable Protected Sub OnClick(ByVal e As ImageClickEventArgs)

[JScript] protected function OnClick(e: ImageClickEventArgs);

Description

Raises the System.Web.UI.WebControls.ImageButton.Click event and allows you to handle the System.Web.UI.WebControls.ImageButton.Click event directly.

The System.Web.UI.WebControls.ImageButton.Click event is raised when the System.Web.UI.WebControls.ImageButton control is clicked. By using the System.Web.UI.WebControls.ImageButton.OnClick(System.Web.UI.ImageClickEventArgs) event handler, you can programmatically determine the coordinates where the image is clicked. You can then code a response, based on the values of these coordinates. Note the origin (0, 0) is located at the upper left corner of the image. A System.Web.UI.ImageClickEventArgs that contains the event data.

OnCommand

[C#] protected virtual void OnCommand(CommandEventArgs e);

[C++] protected: virtual void OnCommand(CommandEventArgs* e);

[VB] Overridable Protected Sub OnCommand(ByVal e As CommandEventArgs)

[JScript] protected function OnCommand(e: CommandEventArgs);

Description

Raises the System.Web.UI.WebControls.ImageButton.Command event and allows you to handle the System.Web.UI.WebControls.ImageButton.Command event directly.

The System.Web.UI.WebControls.ImageButton.Command event is raised when the System.Web.UI.WebControls.ImageButton control is clicked. The System.Web.UI.WebControls.ImageButton.OnCommand(System.Web.UI.WebControls.CommandEventArgs) event handler is used to make the System.Web.UI.WebControls.ImageButton control behave like a command button. A command name can be associated with the control by using the System.Web.UI.WebControls.ImageButton.CommandName property. This allows multiple System.Web.UI.WebControls.ImageButton controls to be placed on the Web page. The value in this property can then be programmatically identified in the System.Web.UI.WebControls.ImageButton.OnCommand(System.Web.UI.WebControls.CommandEventArgs) event handler to determine the appropriate action to perform when each System.Web.UI. WebControls.ImageButton control is clicked. The System. Web.UI.WebControls.ImageButton.CommandArgument property can also be used to pass additional information about the command, such as specifying ascending order. A System. Web.UI.WebControls.CommandEventArgs that contains the event data.

OnPreRender

[C#] protected override void OnPreRender(EventArgs e);

[C++] protected: void OnPreRender(EventArgs* e);

[VB] Overrides Protected Sub OnPreRender(ByVal e As EventArgs)

[JScript] protected override function OnPreRender(e: EventArgs);

Description

Determine if the image has been clicked prior to rendering on the client.

IPostBackDataHandler.LoadPostData

[C#] bool IPostBackDataHandler.LoadPostData(string postDataKey, NameValueCollection postCollection);

[C++] bool IPostBackDataHandler::LoadPostData(String* postDataKey, NameValueCollection* postCollection);

[VB] Function LoadPostData(ByVal postDataKey As String, ByVal postCollection As NameValueCollection) As Boolean Implements IPostBackDataHandler.LoadPostData

[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );

[C++] void IPostBackDataHandler::RaisePostDataChangedEvent( );

[VB] Sub RaisePostDataChangedEvent( ) Implements IPostBackDataHandler.RaisePostDataChangedEvent

[JScript] function IPostBackDataHandler.RaisePostDataChangedEvent( );

IPostBackEventHandler.RaisePostBackEvent

[C#] void IPostBackEventHandler.RaisePostBackEvent (string eventArgument);

[C++] void IPostBackEventHandler::RaisePostBackEvent (String* eventArgument);

[VB] Sub RaisePostBackEvent(ByVal eventArgument As String) Implements IPostBackEventHandler.RaisePostBackEvent

[JScript] function IPostBackEventHandler.RaisePostBackEvent(eventArgument: String);

IRepeatInfoUser interface (System.Web.UI.WebControls)

TrackViewState

Description

Specifies a contract for implementing System.Web.UI.WebControls.Repeater objects in list controls.

HasFooter

TrackViewState

[C#] bool HasFooter {get;}

[C++] bool get_HasFooter( );

[VB] ReadOnly Property HasFooter As Boolean

[JScript] abstract function get HasFooter( ): Boolean;

Description

Indicates whether the Repeater contains a tooter item.

HasHeader

TrackViewState

[C#] bool HasHeader {get;}

[C++] bool get HasHeader( );

[VB] ReadOnly Property HasHeader As Boolean

[JScript] abstract function get HasHeader( ): Boolean;

Description

Indicates whether the System.Web.UI.WebControls.Repeater contains a header item.

HasSeparators

TrackViewState

[C#] bool HasSeparators {get;}

[C++] bool get HasSeparators( );

[VB] ReadOnly Property HasSeparators As Boolean

[JScript] abstract function get HasSeparators( ): Boolean;

Description

Indicates whether the Repeater contains separator items.

RepeatedItemCount

TrackViewState

[C#] int RepeatedItemCount {get;}

[C++] int get RepeatedItemCount( );

[VB] ReadOnly Property RepeatedItemCount As Integer

[JScript] abstract function get RepeatedItemCount( ): int;

Description

Specifies the item count of the Repeater.

GetItemStyle

[C#] Style GetItemStyle(ListItemType itemType, int repeatIndex);

[C++] Style* GetItemStyle(ListItemType itemtype, int repeatIndex);

[VB] Function GetItemStyle(ByVal itemType As ListItemType, ByVal repeatIndex As Integer) As Style

[JScript] function GetItemStyle(itemType: ListItemType, repeatIndex: int) Style;

Description

Retrieves the item style with the specified item type and location within the System.Web.UI.WebControls.Repeater.

Return Value: A System.Web.UI.WebControls.Style that represents the Repeater item style. A System.Web.UI.WebControls.ListItemType that represents the specified type of the System.Web.UI.WebControls.Repeater item. An ordinal index that specifies the location of the item within the System.Web.UI.WebControls.Repeater.

RenderItem

[C#] void RenderItem(ListItemType itemType, int repeatIndex, RepeatInfo repeatInfo, HtmlTextWriter writer);

[C++] void RenderItem(ListItemType itemType, int repeatIndex, RepeatInfo* repeatInfo, HtmlTextWriter* writer);

[VB] Sub RenderItem(ByVal itemType As ListItemType, ByVal repeatIndex As Integer, ByVal repeatInfo As RepeatInfo, ByVal writer As HtmlTextWriter)

[JScript] function RenderItem(itemType: ListItemType, repeatIndex: int, repeatInfo: RepeatInfo, writer: HtmlTextWriter);

Description

Renders the System.Web.UI.WebControls.Repeater item with the specified information. A System.Web.UI.WebControls.ListItemType that represents the specified type of the System.Web.UI.WebControls.Repeater item. An ordinal index that specifies the location of the item within the System.Web.UI.WebControls.Repeater. A System.Web.UI.WebControls.RepeatInfo that represents the information used to render items using a System.Web.UI.WebControls.Repeater. The output stream that renders HTML content to the client.

Label class (System.Web.UI.WebControls)

RenderItem

Description

Represents a label control, which displays text on a Web page.

Use the System.Web.UI.WebControls.Label control to display text in a set location on the page. Unlike static text, you can customize the displayed text through the System.Web.UI.WebControls.Label.Text property.

Label

Example Syntax:

RenderItem

[C#] public Label( );

[C++] public: Label( );

[VB] Public Sub New( )

[JScript] public function Label( ); Initializes a new instance of the System.Web.UI.WebControls.Label class.

Description

Initializes a new instance of the System.Web.UI.WebControls.Label class.

Use this constructor to create and initialize a new instance of the System.Web.UI.WebControls.Label class.

AccessKey

Attributes

BackColor

BorderColor

BorderStyle

BorderWidth

ChildControlsCreated

ClientID

Context

Controls

ControlStyle

ControlStyleCreated

CssClass

Enabled

EnableViewState

Events

Font

ForeColor

HasChildViewState

Height

ID

IsTrackingViewState

NamingContainer
Page
Parent
Site
Style
TabIndex
TagKey
TagName
TemplateSourceDirectory
Text
RenderItem Description Gets or sets the text content of the System.Web.UI.WebControls.Label control.

Use the System.Web.UI.WebControls.Label.Text property to specify or determine the text content of the System.Web.UI.WebControls.Label control. This property is commonly used to programmatically customize the text that is displayed in the System.Web.UI.WebControls.Label control.

ToolTip
UniqueID
ViewState
ViewStateIgnoresCase
Visible
Width
AddParsedSubObject

[C#] protected override void AddParsedSubObject(object obj);
[C++] protected: void AddParsedSubObject(Object* obj);
[VB] Overrides Protected Sub AddParsedSubObject(ByVal obj As Object)
[JScript] protected override function AddParsedSubObject (obj: Object);

Description

LoadViewState

[C#] protected override void LoadViewState(object savedState);
[C++] protected: void LoadViewState(Object* savedState);
[VB] Overrides Protected Sub LoadViewState(ByVal savedState As Object)
[JScript] protected override function LoadViewState(savedState: Object);

Description

Load previously saved state. Overridden to synchronize Text property with LiteralContent. Represents the previously saved state.

RenderContents

[C#] protected override void RenderContents(HtmlTextWriter writer);
[C++] protected: void RenderContents (HtmlTextWriter* writer);
[VB] Overrides Protected Sub RenderContents(ByVal writer As HtmlTextWriter)
[JScript] protected override function RenderContents(writer: HtmlTextWriter);

Description

Renders the contents of the System.Web.UI.WebControls.Label into the specified writer. The output stream that renders HTML content to the client.

LabelControlBuilder class (System.Web.UI.WebControls)

TrackViewState

Description

Interacts with the parser to build a System.Web.UI.WebControls.Label control.

To create a custom control builder for a System.Web.UI.WebControls.Label derived control, you need to inherit from this class.

LabelControlBuilder
Example Syntax:
TrackViewState

[C#] public LabelControlBuilder( );
[C++] public: LabelControlBuilder( );
[VB] Public Sub New( )
[JScript] public function LabelControlBuilder( );

ControlType
FChildrenAsProperties
FIsNonParserAccessor
HasAspCode
ID
InDesigner
NamingContainerType
Parser
TagName
AllowWhitespaceLiterals

[C#] public override bool AllowWhitespaceLiterals( );
[C++] public: bool AllowWhitespaceLiterals( );
[VB] Overrides Public Function AllowWhitespaceLiterals( ) As Boolean
[JScript] public override function AllowWhitespace Literals( ): Boolean;

Description

Specifies whether white space literals are allowed.

Return Value: false for all cases.

This method overrides the System.Web.UI.ControlBuilder.AllowWhitespaceLiterals property to ignore white space in the System.Web.UI.WebControls.Label control.

LinkButton class (System.Web.UI.WebControls)

ToString

Description

Displays a hyperlink style button control on a Web page.

Use the System.Web.UI.WebControls.LinkButton control to create a hyperlink style button on the Web page. You can create either a submit button or a command button.

LinkButton
Example Syntax:
ToString

[C#] public LinkButton( );
[C++] public: LinkButton( );
[VB] Public Sub New( )
[JScript] public function LinkButton( );

Description

Initializes a new instance of the System.Web.UI.WebControls.LinkButton class.

Use this constructor to create and initialize a new instance of the System.Web.UI.WebControls.LinkButton control.

AccessKey
Attributes
BackColor
BorderColor
BorderStyle
BorderWidth
CausesValidation
ToString Description Gets or sets a value indicating whether validation is performed when the System.Web.UI.WebControls.LinkButton control is clicked.

By default, page validation is performed when a System.Web.UI.WebControls.LinkButton control is clicked. Page validation determines whether the input controls associated with a validation control on the page all pass the validation rules specified by the validation control.

ChildControlsCreated

ClientID

CommandArgument

ToString

Description

Gets or sets an optional argument passed to the System.Web.UI.WebControls.LinkButton.Command event handler along with the associated System.Web.UI.WebControls.LinkButton.CommandName property.

Use the System.Web.UI.WebControls.LinkButton.CommandArgument property to specify an argument that complements the System.Web.UI.WebControls.LinkButton.CommandName property.

CommandName

ToString

[C#] public string CommandName {get; set;}

[C++] public: _property String* get_CommandName( );public: _property void set_CommandName(String*);

[VB] Public Property CommandName As String

[JScript] public function get CommandName( ): String;public function set CommandName(String);

Description

Gets or sets the command name associated with the System.Web.UI.WebControls.LinkButton control. This value is passed to the System.Web.UI.WebControls.LinkButton.Command event handler along with the System.Web.UI.WebControls.LinkButton.CommandArgument property.

When you have multiple System.Web.UI.WebControls.LinkButton controls on a Web page, use the System.Web.UI.WebControls.LinkButton.CommandName property to specify or determine the command name associated with the System.Web.UI.WebControls.LinkButton control clicked. You can set the System.Web.UI.WebControls.LinkButton.CommandName property with any string that identifies the command to perform. You can then programmatically determine the command name of the System.Web.UI.WebControls.LinkButton control and perform the appropriate actions.

Context

Controls

ControlStyle

ControlStyleCreated

CssClass

Enabled

EnableViewState

Events

Font

ForeColor

HasChildViewState

Height

ID

IsTrackingViewState

NamingContainer

Page

Parent

Site

Style

TabIndex

TagKey

TagName

TemplateSourceDirectory

Text

ToString

Description

Gets or sets the text caption displayed on the System.Web.UI.WebControls.LinkButton control.

Use the System.Web.UI.WebControls.LinkButton.Text property to specify or determine the caption to display on the System.Web.UI.WebControls.LinkButton control.

ToolTip

UniqueID

ViewState

ViewStateIgnoresCase

Visible

Width

ToString

Description

Occurs when the System.Web.UI.WebControls.LinkButton control is clicked.

The System.Web.UI.WebControls.LinkButton.Click event is raised when the System.Web.UI.WebControls.LinkButton control is clicked. This event is commonly used when no command name is associated with the System.Web.UI.WebControls.LinkButton control, such as a submit button.

ToString

[C#] public event CommandEventHandler Command;

[C++] public: _event CommandEventHandler* Command;

[VB] Public Event Command As CommandEventHandler

Description

Occurs when the System.Web.UI.WebControls.Button control is clicked.

The System.Web.UI.WebControls.LinkButton.Command event is raised when the System.Web.UI.WebControls.LinkButton control is clicked. This event is commonly used when a command name, such as Sort, is associated with the System.Web.UI.WebControls.LinkButton control. This allows you to create multiple System.Web.UI.WebControls.LinkButton controls on a Web page and programmatically determine which System.Web.UI.WebControls.LinkButton control is clicked.

AddAttributesToRender

[C#] protected override void AddAttributesToRender(HtmlTextWriter writer);

[C++] protected: void AddAttributes ToRender(HtmlTextWriter* writer);

[VB] Overrides Protected Sub AddAttributesToRender(ByVal writer As HtmlTextWriter)

[JScript] protected override function AddAttributesToRender (writer HtmlTextWriter);

Description

Render the attributes on the begin tag.

AddParsedSubObject

[C#] protected override void AddParsedSubObject(object obj);

[C++] protected: void AddParsedSubObject(Object* obj);

[VB] Overrides Protected Sub AddParsedSubObject(ByVal obj As Object)

[JScript] protected override function AddParsedSubObject (obj: Object);

Description

LoadViewState

[C#] protected override void LoadViewState(object savedState);

[C++] protected: void LoadViewState(Object* savedState);

[VB] Overrides Protected Sub LoadViewState(ByVal savedState As Object)

[JScript] protected override function LoadViewState(savedState: Object);

Description

Load previously saved state. Overridden to synchronize Text property with LiteralContent.

OnClick

[C#] protected virtual void OnClick(EventArgs e);

[C++] protected: virtual void OnClick(EventArgs* e);

[VB] Overridable Protected Sub OnClick(ByVal e As EventArgs)

[JScript] protected function OnClick(e: EventArgs);

Description

Raises the System.Web.UI.WebControls.LinkButton.Click event of the System.Web.UI.WebControls.LinkButton control.

The System.Web.UI.WebControls.LinkButton.Click event is raised when the System.Web.UI.WebControls.LinkButton control is clicked. This event is commonly used when no command name is associated with the System.Web.UI.WebControls.LinkButton control, such as a submit button. A System.EventArgs that contains the event data.

OnCommand

[C#] protected virtual void OnCommand(CommandEventArgs e);

[C++] protected: virtual void OnCommand(CommandEventArgs* e);

[VB] Overridable Protected Sub OnCommand(ByVal e As CommandEventArgs)

[JScript] protected function OnCommand(e: CommandEventArgs);

Description

Raises the System.Web.UI.WebControls.LinkButton.Command event of the System.Web.UI.WebControls.LinkButton control.

The System.Web.UI.WebControls.LinkButton.Command event is raised when the System.Web.UI.WebControls.LinkButton control is clicked. This event is commonly used when a command name, such as Sort, is associated with the System.Web.UI.WebControls.LinkButton control. This allows you to create multiple System.Web.UI.WebControls.LinkButton controls on a Web page and programmatically determine which System.Web.UI.WebControls.LinkButton control is clicked. A System.Web.UI.WebControls.CommandEventArgs that contains the event data.

RenderContents

[C#] protected override void RenderContents(HtmlTextWriter writer);

[C++] protected: void RenderContents (HtmlTextWriter* writer);

[VB] Overrides Protected Sub RenderContents(ByVal writer As HtmlTextWriter)

[JScript] protected override function RenderContents(writer: HtmlTextWriter);

Description

The output stream that renders HTML content to the client.

IPostBackEventHandler.RaisePostBackEvent

[C#] void IPostBackEventHandler.RaisePostBackEvent (string eventArgument);

[C++] void IPostBackEventHandler::RaisePostBackEvent (String* eventArgument);

[VB] Sub RaisePostBackEvent(ByVal eventArgument As String) Implements IPostBackEventHandler.RaisePostBackEvent

[JScript] function IPostBackEventHandler.RaisePostBackEvent(eventArgument: String);

LinkButtonControlBuilder class (System.Web.UI.WebControls)

TrackViewState

Description

Interacts with the parser to build a System.Web.UI.WebControls.LinkButton control.

To create a custom control builder for a System.Web.UI.WebControls.LinkButton derived control, you need to inherit from this class.

LinkButtonControlBuilder

Example Syntax:

TrackViewState

[C#] public LinkButtonControlBuilder( );

[C++] public: LinkButtonControlBuilder( );

[VB] Public Sub New( )

[JScript] public function LinkButtonControlBuilder( );

ControlType

FChildrenAsProperties

FIsNonParserAccessor

HasAspCode

ID

InDesigner

NamingContainerType

Parser

TagName

AllowWhitespaceLiterals

[C#] public override bool AllowWhitespaceLiterals( );

[C++] public: bool AllowWhitespaceLiterals( );

[VB] Overrides Public Function AllowWhitespaceLiterals( ) As Boolean

[JScript] public override function AllowWhitespace Literals( ): Boolean;

Description

Specifies whether white space literals are allowed.

Return Value: false for all cases.

This method overrides System.Web.UI.ControlBuilder.AllowWhitespaceLiterals to ignore white space in the System.Web.UI.WebControls.LinkButton control.

ListBox class (System.Web.UI.WebControls)

ToString

Description

Represents a list box control that allows single or multiple item selection.

Use the System.Web.UI.WebControls.ListBox control to create a list control that allows single or multiple item selection. Use the System.Web.UI.WebControls.ListBox.Rows property to specify the height of the control. To enable multiple item selection, set the System.Web.UI.WebControls.ListBox.SelectionMode property to ListSelectionMode.Multiple.

ListBox

Example Syntax:

ToString

[C#] public ListBox( );

[C++] public: ListBox( );

[VB] Public Sub New( )
[JScript] public function ListBox( );

Description

Initializes a new instance of the System.Web.UI.WebControls.ListBox class.

Use this constructor to create and initialize a new instance of the System.Web.UI.WebControls.ListBox class.

AccessKey
Attributes
AutoPostBack
BackColor
BorderColor
ToString

Description

Gets or sets the border color of the control.

The System.Web.UI.WebControls.ListBox.BorderColor property is inherited from the System.Web.UI.WebControls.WebControl class and is not applicable to the System.Web.UI.WebControls.ListBox control.

BorderStyle
ToString

[C#] public override BorderStyle BorderStyle {get; set;}
[C++] public: _property virtual BorderStyle get_BorderStyle( );public: _property virtual void set_BorderStyle (BorderStyle);
[VB] Overrides Public Property BorderStyle As BorderStyle
[JScript] public function get_BorderStyle( ): BorderStyle; public function set BorderStyle(BorderStyle);

Description

Gets or sets the border style of the control.

The System.Web.UI.WebControls.ListBox.BorderStyle property is inherited from the System.Web.UI.WebControls.WebControl class and is not applicable to the System.Web.UI.WebControls.ListBox control.

BorderWidth
ToString

[C#] public override Unit BorderWidth {get; set;}
[C++] public: _property virtual Unit get_BorderWidth( );public: _property virtual void set_BorderWidth (Unit);
[VB] Overrides Public Property BorderWidth As Unit
[JScript] public function get_BorderWidth( ): Unit;public function set BorderWidth(Unit);

Description

Gets or sets the border width for the control.

The System.Web.UI.WebControls.ListBox.BorderWidth property is inherited from the System.Web.UI.WebControls.WebControl class and is not applicable to the System.Web.UI.WebControls.ListBox control.

ChildControlsCreated
ClientID
Context
Controls
ControlStyle
ControlStyleCreated
CssClass
DataMember
DataSource
DataTextField
DataTextFormatString
DataValueField
Enabled
EnableViewState
Events
Font
ForeColor
HasChildViewState
Height
ID
IsTrackingViewState
Items
NamingContainer
Page
Parent
Rows
ToString Description Gets or sets the number of rows displayed in the System.Web.UI.WebControls.ListBox control.

Use the System.Web.UI.WebControls.ListBox.Rows property to specify the number of rows to display in the System.Web.UI.WebControls.ListBox control.

SelectedIndex
SelectedItem
SelectionMode
ToString

Description

Gets or sets the selection mode of the System.Web.UI.WebControls.ListBox control.

Use the System.Web.UI.WebControls.ListBox.SelectionMode property to specify the mode behavior of the System.Web.UI.WebControls.ListBox control. Setting this property to ListSelectionMode.Single indicates only a single item can be selected from the System.Web.UI.WebControls.ListBox control, while ListSelectionMode.Multiple specifies multiple items can be selected.

Site
Style
TabIndex
TagKey
TagName
TemplateSourceDirectory
ToolTip
ToString

Description

Gets or sets the ToolTip text displayed when the mouse pointer rests over the control.

The System.Web.UI.WebControls.ListBox.ToolTip property is inherited from the System.Web.UI.WebControls.WebControl class and is not applicable to the System.Web.UI.WebControls.ListBox control.

UniqueID
ViewState
ViewStateIgnoresCase
Visible
Width
AddAttributesToRender

[C#] protected override void AddAttributesToRender(HtmlTextWriter writer);
[C++] protected: void AddAttributesToRender(HtmlTextWriter* writer);
[VB] Overrides Protected Sub AddAttributesToRender(ByVal writer As HtmlTextWriter)
[JScript] protected override function AddAttributesToRender (writer HtmlTextWriter);

Description

Adds name, size, multiple, and onchange to list of attributes to render. The output stream that renders HTML content to the client.

OnPreRender

[C#] protected override void OnPreRender(EventArgs e);

[C++] protected: void OnPreRender(EventArgs* e);

[VB] Overrides Protected Sub OnPreRender(ByVal e As EventArgs)

[JScript] protected override function OnPreRender(e: EventArgs);

Description

RenderContents

[C#] protected override void RenderContents(HtmlTextWriter writer);

[C++] protected: void RenderContents (HtmlTextWriter* writer);

[VB] Overrides Protected Sub RenderContents(ByVal writer As HtmlTextWriter)

[JScript] protected override function RenderContents(writer: HtmlTextWriter);

Description

IPostBackDataHandler.LoadPostData

[C#] bool IPostBackDataHandler.LoadPostData(string postDataKey, NameValueCollection postCollection);

[C++] bool IPostBackDataHandler::LoadPostData(String* postDataKey, NameValueCollection* postCollection);

[VB] Function LoadPostData(ByVal postDataKey As String, ByVal postCollection As NameValueCollection) As Boolean Implements IPostBackDataHandler.LoadPostData

[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );

[C++] void IPostBackDataHandler::RaisePostDataChangedEvent( );

[VB] Sub RaisePostDataChangedEvent( ) Implements IPostBackDataHandler.RaisePostDataChangedEvent

[JScript] function IPostBackDataHandler.RaisePostDataChangedEvent( );

ListControl class (System.Web.UI.WebControls)

TrackViewState

Description

Serves as the abstract base class that defines the properties, methods, and events common for all list-type controls.

The System.Web.UI.WebControls.ListControl class is typically not instantiated. Instead, to provide common basic functionality, this class is inherited by others, such as the System.Web.UI.WebControls.CheckBoxList, System.Web.UI.WebControls.DropDownList, System.Web.UI.WebControls.ListBox, and System.Web.UI.WebControls.RadioButtonList.

ListControl

Example Syntax:

TrackViewState

[C#] public ListControl( );

[C++] public: ListControl( );

[VB] Public Sub New( )

[JScript] public function ListControl( );

Description

Initializes a new instance of the System.Web.UI.WebControls.ListControl class.

AccessKey

Attributes

AutoPostBack

TrackViewState

Description Gets or sets a value indicating whether a postback to the server automatically occurs when the user changes the list selection.

Set this property to true if the server needs to capture the selection as soon as it is made. For example, other controls on the Web page can be automatically filled depending on the user's selection from a list control.

BackColor

BorderColor

BorderStyle

BorderWidth

ChildControlsCreated

ClientID

Context

Controls

ControlStyle

ControlStyleCreated

CssClass

DataMember

TrackViewState

Description

Gets or sets the specific table in the System.Web.UI.WebControls.ListControl.DataSource to bind to the control.

If the System.Web.UI.WebControls.ListControl.DataSource contains more than one table, use this property to specify the exact table to bind to the control.

DataSource

TrackViewState

[C#] public virtual object DataSource {get; set;}

[C++] public: _property virtual Object* get_DataSource( );public: _property virtual void set_DataSource (Object*);

[VB] Overridable Public Property DataSource As Object

[JScript] public function get DataSource( ): Object;public function set DataSource(Object);

Description

Gets or sets the data source that populates the items of the list control.

Use this property to specify a source of data to populate a list control.

DataTextField

TrackViewState

[C#] public virtual string DataTextField {get; set;}

[C++] public: _property virtual String* get_DataTextField( );public: _property virtual void set_DataTextField (String*);

[VB] Overridable Public Property DataTextField As String

[JScript] public function get DataTextField( ): String;public function set DataTextField(String);

Description

Gets or sets the field of the data source that provides the text content of the list items.

Use this property to specify a field in the System.Web.UI.WebControls.ListControl.DataSource to display as the items of the list in a list control.

DataTextFormatString

TrackViewState

[C#] public virtual string DataTextFormatString {get; set;}

[C++] public: _property virtual String* get_DataTextFormatString( );public: _property virtual void set_DataTextFormatString(String*);

[VB] Overridable Public Property DataTextFormatString As String

[JScript] public function get DataTextFormatString( ): String;public function set DataTextFormatString(String);

Description

Gets or sets the formatting string used to control how data bound to the list control is displayed.

Use this property to provide a custom display format for the items in the list control.

DataValueField

TrackViewState

[C#] public virtual string DataValueField {get; set;}

[C++] public: _property virtual String* get_DataValue Field( );public: _property virtual void set_DataValueField (String*);

[VB] Overridable Public Property DataValueField As String

[JScript] public function get DataValueField( ): String;public function set DataValueField(String);

Description

Gets or sets the field of the data source that provides the value of each list item.

Use this property to specify the field that contains the value of each item in a list control.

Enabled

EnableViewState

Events

Font

ForeColor

HasChildViewState

Height

ID

IsTrackingViewState

Items

TrackViewState

Description

Gets the collection of items in the list control.

Use this property to get the properties of items in the list control. This property can be used to determine the selected items in the list control.

NamingContainer

Page

Parent

SelectedIndex

TrackViewState

Description

Gets or sets the lowest ordinal index of the selected items in the list.

Use this property to determine the index of the currently selected item in the list if the list control allows only one selection. If the list control supports multiple selections, use this property to determine the lowest index of the selected items.

SelectedItem

TrackViewState

[C#] public virtual ListItem SelectedItem {get;}

[C++] public: _property virtual ListItem* get_Selected Item( );

[VB] Overridable Public ReadOnly Property SelectedItem As ListItem

[JScript] public function get SelectedItem( ): ListItem;

Description

Gets the selected item with the lowest index in the list control.

If the list control allows only a single selection, use this property to get the individual properties of the selected item. If the list control allows multiple selections, use this property to get the properties of the lowest indexed item selected from the list control.

Site

Style

TabIndex

TagKey

TagName

TemplateSourceDirectory

ToolTip

UniqueID

ViewState

ViewStateIgnoresCase

Visible

Width

TrackViewState

Description

Occurs when the selection on the list changes and is posted back to the server.

This event is raised when the selection from the list changes and is posted back to the server.

ClearSelection

[C#] public virtual void ClearSelection( );

[C++] public: virtual void ClearSelection( );

[VB] Overridable Public Sub ClearSelection( )

[JScript] public function ClearSelection( );

Description

Clears out the list selection and sets the System.Web.UI.WebControls.ListItem.Selected property of all items to false.

LoadViewState

[C#] protected override void LoadViewState(object savedState);

[C++] protected: void LoadViewState(Object* savedState);

[VB] Overrides Protected Sub LoadViewState(ByVal savedState As Object)

[JScript] protected override function LoadViewState(savedState: Object);

Description

Load previously saved state. Overridden to restore selection.

OnDataBinding

[C#] protected override void OnDataBinding(EventArgs e);

[VB] Overrides Protected Sub OnDataBinding(ByVal e As EventArgs)

[JScript] protected override function OnDataBinding(e: EventArgs);

Description

OnSelectedIndexChanged

[C#] protected virtual void OnSelectedIndexChanged(EventArgs e);

[C++] protected: virtual void OnSelectedIndexChanged(EventArgs* e);

[VB] Overridable Protected Sub OnSelectedIndexChanged (ByVal e As EventArgs)

[JScript] protected function OnSelectedIndexChanged(e: EventArgs);

Description

Raises the System.Web.UI.WebControls.ListControl.SelectedIndexChanged event.

Raising an event invokes the event handler through a delegate. For more information, see. An System.EventArgs that contains the event data.

SaveViewState

[C#] protected override object SaveViewState( );

[C++] protected: Object* SaveViewState( );

[VB] Overrides Protected Function SaveViewState( ) As Object

[JScript] protected override function SaveViewState( ): Object;

Description

TrackViewState

[C#] protected override void TrackViewState( );

[C++] protected: void TrackViewState( );

[VB] Overrides Protected Sub TrackViewState( )

[JScript] protected override function TrackViewState( );

Description

ListItem class (System.Web.UI.WebControls)

TrackViewState

Description

Represents a data item in a databound list control. This class cannot be inherited.

A System.Web.UI.WebControls.ListItem control represents an individual data item within a databound list control, such as a System.Web.UI.WebControls.ListBox or a System.Web.UI.WebControls.RadioButtonList control.

ListItem

Example Syntax:

TrackViewState

[C#] public ListItem( );

[C++] public: ListItem( );

[VB] Public Sub New( )

[JScript] public function ListItem( ); Initializes a new instance of the System.Web.UI.WebControls.ListItem class.

Description

Initializes a new instance of the System.Web.UI.WebControls.ListItem class.

ListItem

Example Syntax:

TrackViewState

[C#] public ListItem(string text);

[C++] public: ListItem(String* text);

[VB] Public Sub New(ByVal text As String)

[JScript] public function ListItem(text: String);

Description

Initializes a new instance of the System.Web.UI.WebControls.ListItem class with the specified text data. The text data to initialize the list item with.

ListItem

Example Syntax:

TrackViewState

[C#] public ListItem(string text, string value);

[C++] public: ListItem(String* text, String* value);

[VB] Public Sub New(ByVal text As String, ByVal value As String)

[JScript] public function ListItem(text: String, value: String);

Description

Initializes a new instance of the System.Web.UI.WebControls.ListItem class with the specified text and value data.

The following table shows initial property values for an instance of System.Web.UI.WebControls.ListItem. The text data to initialize the list item with. The value data to initialize the list item with.

Attributes

TrackViewState

[C#] public AttributeCollection Attributes {get;}

[C++] public: _property AttributeCollection* get_Attributes( );

[VB] Public ReadOnly Property Attributes As AttributeCollection

[JScript] public function get Attributes( ): AttributeCollection;

Description

Gets the collection of attribute name/value pairs expressed on the list item control but not supported by the control's strongly typed properties.

Selected

TrackViewState

[C#] public bool Selected {get; set;}

[C++] public: _property bool get_Selected( );public: _property void set_Selected(bool);

[VB] Public Property Selected As Boolean

[JScript] public function get Selected( ): Boolean;public function set Selected(Boolean);

Description

Specifies a value indicating whether the item is selected.

Text

TrackViewState

[C#] public string Text {get; set;}

[C++] public: _property String* get_Text( );public: _property void set_Text(String*);

[VB] Public Property Text As String

[JScript] public function get Text( ): String;public function set Text(String);

Description

Gets or sets the text displayed in the list control for the item represented by the System.Web.UI.WebControls.ListItem control.

If the list item control has no text content, then gets its value content, if exists, instead.

Value

TrackViewState

[C#] public string Value {get; set;}

[C++] public: _property String* get_Value( );public: _property void set_Value(String*);

[VB] Public Property Value As String

[JScript] public function get Value( ): String;public function set Value(String);

Description

Gets or sets the value content of the list item control.

If the list item control has no value content, then gets its text content, if exists, instead.

Equals

[C#] public override bool Equals(object o);

[C++] public: bool Equals(Object* o);

[VB] Overrides Public Function Equals(ByVal o As Object) As Boolean

[JScript] public override function Equals(o: Object): Boolean;

Description

FromString

[C#] public static ListItem FromString(string s);

[C++] public: static ListItem* FromString(String* s);

[VB] Public Shared Function FromString(ByVal s As String) As ListItem

[JScript] public static function FromString(s: String): ListItem;

Description

Creates a System.Web.UI.WebControls.ListItem from the specified string. The specified string for creating a System.Web.UI.WebControls.ListItem.

GetHashCode

[C#] public override int GetHashCode( );

[C++] public: int GetHashCode( );

[VB] Overrides Public Function GetHashCode( ) As Integer
[JScript] public override function GetHashCode( ): int;

Description

IAttributeAccessor. GetAttribute
[C#] string IAttributeAccessor.GetAttribute(string name);
[C++] String* IAttributeAccessor::GetAttribute(String* name);
[VB] Function GetAttribute(ByVal name As String) As String Implements IAttributeAccessor.GetAttribute
[JScript] function IAttributeAccessor.GetAttribute(name: String): String;
IAttributeAccessor. SetAttribute
[C#] void IAttributeAccessor.SetAttribute(string name, string value);
[C++] void IAttributeAccessor::SetAttribute(String* name, String* value);
[VB] Sub SetAttribute(ByVal name As String, ByVal value As String) Implements IAttributeAccessor.SetAttribute
[JScript] function IAttributeAccessor.SetAttribute(name: String, value: String);
IParserAccessor.AddParsedSubObject
[C#] void IParserAccessor.AddParsedSubObject(object obj);
[C++] void IParserAccessor::AddParsedSubObject(Object* obj);
[VB] Sub AddParsedSubObject(ByVal obj As Object) Implements IParserAccessor.AddParsedSubObject
[JScript] function IParserAccessor.AddParsedSubObject (obj: Object);
IStateManager.LoadViewState
[C#] void IStateManager.LoadViewState(object state);
[C++] void IStateManager::LoadViewState(Object* state);
[VB] Sub LoadViewState(ByVal state As Object) Implements IStateManager.LoadViewState
[JScript] function IStateManager.LoadViewState(state: Object);
IStateManager.SaveViewState
[C#] object IStateManager.SaveViewState( );
[C++] Object* IStateManager::SaveViewState( );
[VB] Function SaveViewState( ) As Object Implements IStateManager.SaveViewState
[JScript] function IStateManager.SaveViewState( ): Object;
IStateManager.TrackViewState
[C#] void IStateManager.TrackViewState( );
[C++] void IStateManager::TrackViewState( );
[VB] Sub TrackViewState( ) Implements IStateManager. TrackViewState
[JScript] function IStateManager.TrackViewState( );
ToString
[C#] public override string ToString( );
[C++] public: String* ToString( );
[VB] Overrides Public Function ToString( ) As String
[JScript] public override function ToString( ): String;

Description

ListItemCollection class (System.Web.UI.WebControls)
ToString

Description

Encapsulates the System.Web.UI.WebControls.ListItem controls within a System.Web.UI.WebControls.ListControl. This class cannot be inherited.

ListItemCollection
Example Syntax:
ToString
[C#] public ListItemCollection( );
[C++] public: ListItemCollection( );
[VB] Public Sub New( )
[JScript] public function ListItemCollection( );

Description

Initializes a new instance of the System.Web.UI.WebControls.ListItemCollection class.

Capacity
ToString
[C#] public int Capacity {get; set;}
[C++] public: _property int get_Capacity( );public: _property void set_Capacity(int);
[VB] Public Property Capacity As Integer
[JScript] public function get Capacity( ): int;public function set Capacity(int);
Count
ToString
[C#] public int Count {get;}
[C++] public: _property int get_Count( );
[VB] Public ReadOnly Property Count As Integer
[JScript] public function get_Count( ): int;

Description

Gets the item count of the collection.

IsReadOnly
ToString
[C#] public bool IsReadOnly {get;}
[C++] public: _property bool get_IsReadOnly( );
[VB] Public ReadOnly Property IsReadOnly As Boolean
[JScript] public function get_IsReadOnly( ): Boolean;

Description

Gets a value indicating whether the collection is read-only.

IsSynchronized
ToString
[C#] public bool IsSynchronized {get;}
[C++] public: _property bool get_IsSynchronized( );
[VB] Public ReadOnly Property IsSynchronized As Boolean
[JScript] public function get_IsSynchronized( ): Boolean;

Description

Gets a value indicating whether access to the collection is synchronized (thread-safe).

Item
ToString
[C#] public ListItem this[int index] {get;}
[C++] public: _property ListItem* get_Item(int index);
[VB] Public Default ReadOnly Property Item(ByVal index As Integer) As ListItem
[JScript] returnValue=ListItemCollectionObject.Item(index);

Description

Gets a System.Web.UI.WebControls.ListItem referenced by the specified ordinal index value. An ordinal index value that specifies which System.Web.UI.WebControls.ListItem to return.

SyncRoot
ToString
[C#] public object SyncRoot {get;}
[C++] public: _property Object* get_SyncRoot( );
[VB] Public ReadOnly Property SyncRoot As Object
[JScript] public function get_SyncRoot( ): Object;

Description

Gets the object that can be used to synchronize access to the collection. In this case, it is the collection itself.

Add
[C#] public void Add(ListItem item);

[C++] public: void Add(ListItem* item);

[VB] Public Sub Add(ByVal item As ListItem)

[JScript] public function Add(item: ListItem);

Description

Adds the specified System.Web.UI.WebControls.ListItem to the end of the collection. The System.Web.UI.WebControls.ListItem to add to the collection.

Add

[C#] public void Add(string item);

[C++] public: void Add(String* item);

[VB] Public Sub Add(ByVal item As String)

[JScript] public function Add(item: String); Adds the specified item to the end of the collection.

Description

Adds the specified item to the end of the collection. A System.String that specifies the item to add.

AddRange

[C#] public void AddRange(ListItem[ ] items);

[C++] public: void AddRange(ListItem* items[ ]);

[VB] Public Sub AddRange(ByVal items( ) As ListItem)

[JScript] public function AddRange(items: ListItem[ ]);

Clear

[C#] public void Clear( );

[C++] public: _sealed void Clear( );

[VB] NotOverridable Public Sub Clear( )

[JScript] public function Clear( );

Description

Removes all System.Web.UI.WebControls.ListItem controls from the collection.

Contains

[C#] public bool Contains(ListItem item);

[C++] public: bool Contains(ListItem* item);

[VB] Public Function Contains(ByVal item As ListItem) As Boolean

[JScript] public function Contains(item: ListItem): Boolean;

Description

Returns a value indicating whether the collection contains the specified item.

Return Value: true if the collection contains the specified item; otherwise, false. A System.Web.UI.WebControls.ListItem to search for in the collection.

CopyTo

[C#] public void CopyTo(Array array, int index);

[C++] public: sealed void CopyTo(Array* array, int index);

[VB] NotOverridable Public Sub CopyTo(ByVal array As Array, ByVal index As Integer)

[JScript] public function CopyTo(array: Array, index: int);

Description

Copies contents from the collection to a specified System.Array with a specified starting index. The specified System.Array that receives copied contents from the collection. The starting position in the specified System.Array to receive copied contents.

FindByText

[C#] public ListItem FindByText(string text);

[C++] public: ListItem* FindByText(String* text);

[VB] Public Function FindByText(ByVal text As String) As ListItem

[JScript] public function FindByText(text: String): ListItem;

FindByValue

[C#] public ListItem FindByValue(string value);

[C++] public: ListItem* FindByValue(String* value);

[VB] Public Function FindByValue(ByVal value As String) As ListItem

[JScript] public function FindByValue(value: String): ListItem;

GetEnumerator

[C#] public IEnumerator GetEnumerator( );

[C++] public: _sealed Enumerator* GetEnumerator( );

[VB] NotOverridable Public Function GetEnumerator( ) As IEnumerator

[JScript] public function GetEnumerator( ): IEnumerator;

Description

Returns an enumerator of all System.Web.UI.WebControls.ListItem controls within the collection.

Return Value: An enumerator that enumerates over all System.Web.UI.WebControls.ListItem controls within the collection.

IndexOf

[C#] public int IndexOf(ListItem item);

[C++] public: int IndexOf(ListItem* item);

[VB] Public Function IndexOf(ByVal item As ListItem) As Integer

[JScript] public function IndexOf(item: ListItem): int;

Description

Returns an ordinal index value that represents the position of the specified System.Web.UI.WebControls.ListItem within the collection.

Return Value: The ordinal index position of the specified System.Web.UI.WebControls.ListItem within the collection. The specified System.Web.UI.WebControls.ListItem to search for in the collection.

Insert

[C#] public void Insert(int index, ListItem item);

[C++] public: void Insert(int index, ListItem* item);

[VB] Public Sub Insert(ByVal index As Integer, ByVal item As ListItem)

[JScript] public function Insert(index: int, item: ListItem);

Description

Inserts the specified System.Web.UI.WebControls.ListItem to the collection at the specified index location. The location in the collection to add the System.Web.UI.WebControls.ListItem. The System.Web.UI.WebControls.ListItem to add to the collection.

Insert

[C#] public void Insert(int index, string item);

[C++] public: void Insert(int index, String* item);

[VB] Public Sub Insert(ByVal index As Integer, ByVal item As String)

[JScript] public function Insert(index: int, item: String); Inserts the specified item to the collection at the specified index location.

Description

Adds the specified item to the collection at the specified index location. The location in the collection to add the System.Web.UI.WebControls.ListItem. The item to add to the collection.

Remove

[C#] public void Remove(ListItem item);

[C++] public: void Remove(ListItem* item);

[VB] Public Sub Remove(ByVal item As ListItem)

[JScript] public function Remove(item: ListItem);

Description

Removes the specified System.Web.UI.WebControls.ListItem from the collection. The System.Web.UI.WebControls.ListItem to remove from the collection.

Remove
[C#] public void Remove(string item);
[C++] public: void Remove(String* item);
[VB] Public Sub Remove(ByVal item As String)
[JScript] public function Remove(item: String); Removes the specified item from the collection.

Description

Removes the specified item from the collection. The item to remove from the collection.

RemoveAt
[C#] public void RemoveAt(int index);
[C++] public: _sealed void RemoveAt(int index);
[VB] NotOverridable Public Sub RemoveAt(ByVal index As Integer)
[JScript] public function RemoveAt(index: int);

Description

Removes the System.Web.UI.WebControls.ListItem from the collection at the specified index location. The location in the collection to remove the System.Web.UI.WebControls.ListItem.

IList.Add
[C#] int IList.Add(object item);
[C++] int IList::Add(Object* item);
[VB] Function Add(ByVal item As Object) As Integer Implements IList.Add
[JScript] function IList.Add(item: Object): int;
IList.Contains
[C#] bool IList.Contains(object item);
[C++] bool IList::Contains(Object* item);
[VB] Function Contains(ByVal item As Object) As Boolean Implements IList.Contains
[JScript] function IList.Contains(item: Object): Boolean;
IList.IndexOf
[C#] int IList.IndexOf(object item);
[C++] int IList::IndexOf(Object* item);
[VB] Function IndexOf(ByVal item As Object) As Integer Implements IList.IndexOf
[JScript] function IList.IndexOf(item: Object): int;
IList.Insert
[C#] void IList.Insert(int index, object item);
[C++] void IList::Insert(int index, Object* item);
[VB] Sub Insert(ByVal index As Integer, ByVal item As Object) Implements IList.Insert
[JScript] function IList.Insert(index: int, item: Object);
IList.Remove
[C#] void IList.Remove(object item);
[C++] void IList::Remove(Object* item);
[VB] Sub Remove(ByVal item As Object) Implements IList.Remove
[JScript] function IList.Remove(item: Object);
IStateManager.LoadViewState
[C#] void IStateManager.LoadViewState(object state);
[C++] void IStateManager::LoadViewState(Object* state);
[VB] Sub LoadViewState(ByVal state As Object) Implements IStateManager.LoadViewState
[JScript] function IStateManager.LoadViewState(state: Object);
IStateManager.SaveViewState
[C#] object IStateManager.SaveViewState( );
[C++] Object* IStateManager::SaveViewState( );
[VB] Function SaveViewState( ) As Object Implements IStateManager. SaveViewState
[JScript] function IStateManager.SaveViewState( ): Object;
IStateManager.TrackViewState
[C#] void IStateManager.TrackViewState( );
[C++] void IStateManager::TrackViewState( );
[VB] Sub TrackViewState( ) Implements IStateManager.TrackViewState
[JScript] function IStateManager.TrackViewState( );

ListItemControlBuilder class (System.Web.UI.WebControls)

ToString

Description

Interacts with the parser to build a System.Web.UI.WebControls.ListItem control.

ListItemControlBuilder
Example Syntax:
ToString
[C#] public ListItemControlBuilder( );
[C++] public: ListItemControlBuilder( );
[VB] Public Sub New( )
[JScript] public function ListItemControlBuilder( );
ControlType
FChildrenAsProperties
FIsNonParserAccessor
HasAspCode
ID
InDesigner
NamingContainerType
Parser
TagName
AllowWhitespaceLiterals
[C#] public override bool AllowWhitespaceLiterals( );
[C++] public: bool AllowWhitespaceLiterals( );
[VB] Overrides Public Function AllowWhitespaceLiterals( ) As Boolean
[JScript] public override function AllowWhitespaceLiterals( ): Boolean;

Description

HtmlDecodeLiterals
[C#] public override bool HtmlDecodeLiterals( );
[C++] public: bool HtmlDecodeLiterals( );
[VB] Overrides Public Function HtmlDecodeLiterals( ) As Boolean
[JScript] public override function HtmlDecodeLiterals( ): Boolean;

Description

ListItemType enumeration (System.Web.UI.WebControls)

ToString

Description

Specifies the type of an item in a list control.

The System.Web.UI.WebControls.ListItemType enumeration represents the different items that can be included in a list control, such as System.Web.UI.WebControls.DataGrid, System.Web.UI.WebControls.DataList, and the System.Web.UI.WebControls.Repeater. A typical list control consists of cells that contain elements represented by this enumeration.

ToString
[C#] public const ListItemType AlternatingItem;
[C++] public: const ListItemType AlternatingItem;
[VB] Public Const AlternatingItem As ListItemType
[JScript] public var AlternatingItem: ListItemType;

Description

An item in alternating (zero-based even-indexed) cells. It is databound.

ToString
[C#] public const ListItemType EditItem;
[C++] public: const ListItemType EditItem;

[VB] Public Const EditItem As ListItemType
[JScript] public var EditItem: ListItemType;

Description
An item in a list control currently in edit mode. It is databound.
ToString
[C#] public const ListItemType Footer;
[C++] public: const ListItemType Footer;
[VB] Public Const Footer As ListItemType
[JScript] public var Footer: ListItemType;

Description
A tooter for the list control. It is not databound.
ToString
[C#] public const ListItemType Header;
[C++] public: const ListItemType Header;
[VB] Public Const Header As ListItemType
[JScript] public var Header: ListItemType;

Description
A header for the list control. It is not databound.
ToString
[C#] public const ListItemType Item;
[C++] public: const ListItemType Item;
[VB] Public Const Item As ListItemType
[JScript] public var Item: ListItemType;

Description An item in the list control. It is databound.
ToString
[C#] public const ListItemType Pager;
[C++] public: const ListItemType Pager;
[VB] Public Const Pager As ListItemType
[JScript] public var Pager: ListItemType;

Description
A pager that displays the controls to navigate to different pages associated with the System.Web.UI.WebControls.DataGrid control. It is not databound.
ToString
[C#] public const ListItemType SelectedItem;
[C++] public: const ListItemType SelectedItem;
[VB] Public Const SelectedItem As ListItemType
[JScript] public var SelectedItem: ListItemType;

Description
A selected item in the list control. It is databound.
ToString
[C#] public const ListItemType Separator;
[C++] public: const ListItemType Separator;
[VB] Public Const Separator As ListItemType
[JScript] public var Separator: ListItemType;

Description
A separator between items in a list control. It is not databound.
ListSelectionMode enumeration (System.Web.UI.WebControls)
ToString Description
Specifies the selection mode of the System.Web.UI.WebControls.ListBox control.
The System.Web.UI.WebControls.ListSelectionMode enumeration represents the selection mode of the System.Web.UI.WebControls.ListBox control that determines whether a user can select multiple items or just a single item.
ToString
[C#] public const ListSelectionMode Multiple;
[C++] public: const ListSelectionMode Multiple;
[VB] Public Const Multiple As ListSelectionMode
[JScript] public var Multiple: ListSelectionMode;

Description
Multiple item selection mode.
ToString
[C#] public const ListSelectionMode Single;
[C++] public: const ListSelectionMode Single;
[VB] Public Const Single As ListSelectionMode
[JScript] public var Single: ListSelectionMode;

Description
Single item selection mode.
Literal class (System.Web.UI.WebControls)
ToString Description
Literal
Example Syntax:
ToString
[C#] public Literal( );
[C++] public: Literal( );
[VB] Public Sub New( )
[JScript] public function Literal( );
ChildControlsCreated
ClientID
Context
Controls
EnableViewState
Events
HasChildViewState
ID
IsTrackingViewState
NamingContainer
Page
Parent
Site
TemplateSourceDirectory
Text
ToString
UniqueID
ViewState
ViewStateIgnoresCase
Visible
AddParsedSubObject
[C#] protected override void AddParsedSubObject(object obj);
[C++] protected: void AddParsedSubObject(Object* obj);
[VB] Overrides Protected Sub AddParsedSubObject(ByVal obj As Object)
[JScript] protected override function AddParsedSubObject (obj: Object);
CreateControlCollection
[C#] protected override ControlCollection CreateControlCollection( );
[C++] protected: ControlCollection* CreateControlCollection( );
[VB] Overrides Protected Function CreateControlCollection( ) As ControlCollection
[JScript] protected override function CreateControlCollection( ) ControlCollection;
Render
[C#] protected override void Render(HtmlTextWriter output);
[C++] protected: void Render(HtmlTextWriter* output);
[VB] Overrides Protected Sub Render(ByVal output As HtmlTextWriter)
[JScript] protected override function Render(output: HtmlTextWriter);

LiteralControlBuilder class (System.Web.UI.WebControls)

TrackViewState

LiteralControlBuilder

Example Syntax:

TrackViewState

ControlType

FChildrenAsProperties

FIsNonParserAccessor

HasAspCode

ID

InDesigner

NamingContainerType

Parser

TagName

AllowWhitespaceLiterals

[C#] public override bool AllowWhitespaceLiterals( );

[C++] public: bool AllowWhitespaceLiterals( );

[VB] Overrides Public Function AllowWhitespaceLiterals( ) As Boolean

[JScript] public override function AllowWhitespace Literals( ): Boolean;

AppendSubBuilder

[C#] public override void AppendSubBuilder (ControlBuilder subBuilder);

[C++] public: void AppendSubBuilder(ControlBuilder* subBuilder);

[VB] Overrides Public Sub AppendSubBuilder(ByVal subBuilder As ControlBuilder)

[JScript] public override function AppendSubBuilder(subBuilder: ControlBuilder);

MonthChangedEventArgs class (System.Web.UI.WebControls)

ToString

Description

Provides data for the System.Web.UI.WebControls.Calendar.VisibleMonthChanged event of a System.Web.UI.WebControls.Calendar. This class cannot be inherited.

The System.Web.UI.WebControls.Calendar.VisibleMonthChanged event is raised when the user clicks on the System.Web.UI.WebControls.Calendar navigation controls to display the next or previous month.

MonthChangedEventArgs

Example Syntax:

ToString

[C#] public MonthChangedEventArgs(DateTime newDate, DateTime previousDate);

[C++] public: MonthChangedEventArgs(DateTime newDate, DateTime previousDate);

[VB] Public Sub New(ByVal newDate As DateTime, ByVal previousDate As DateTime)

[JScript] public function MonthChangedEventArgs(newDate: DateTime, previousDate: DateTime);

Description

Initializes a new instance of the System.Web.UI.WebControls.MonthChangedEventArgs class.

The following table shows initial property values for an instance of System.Web.UI.WebControls.MonthChangedEventArgs. The date that determines the month currently displayed by the System.Web.UI.WebControls.Calendar. The date that determines the month previously displayed by the System.Web.UI.WebControls.Calendar.

NewDate

ToString

[C#] public DateTime NewDate {get;}

[C++] public: _property DateTime get_NewDate( );

[VB] Public ReadOnly Property NewDate As DateTime

[JScript] public function get NewDate( ): DateTime;

Description

Gets the date that determines the currently displayed month in the System.Web.UI.WebControls.Calendar.

Use this property to get the month currently displayed by the System.Web.UI.WebControls.Calendar and to compare the currently displayed month with another month. For example, you can use this property to calculate the number of months until or since a certain date.

PreviousDate

ToString

[C#] public DateTime PreviousDate {get;}

[C++] public: _property DateTime get_PreviousDate( );

[VB] Public ReadOnly Property PreviousDate As DateTime

[JScript] public function get PreviousDate( ): DateTime;

Description

Gets the date that determined the previously displayed month in the System.Web.UI.WebControls.Calendar.

Use this property to determine the previously displayed month on the System.Web.UI.WebControls.Calendar. This date can be used to restore the System.Web.UI.WebControls.Calendar back to the previously displayed month by setting the System.Web.UI.WebControls.Calendar.VisibleDate property to System.Web.UI.WebControls.MonthChangedEventArgs.PreviousDate.

MonthChangedEventHandler delegate (System.Web.UI.WebControls)

ToString

Description Represents the method that handles the System.Web.UI.WebControls.Calendar.VisibleMonthChanged event of a System.Web.UI.WebControls.Calendar. The source of the event. A System.Web.UI.WebControls.MonthChangedEventArgs that contains the event data.

The System.Web.UI.WebControls.Calendar.VisibleMonthChanged event is raised when the user clicks on the navigation controls for the System.Web.UI.WebControls.Calendar to display the next or previous month.

NextPrevFormat enumeration (System.Web.UI.WebControls)

ToString

Description

Represents the display format for the previous and next month navigation controls within the System.Web.UI.WebControls.Calendar.

The System.Web.UI.WebControls.NextPrevFormat enumeration represents the different styles for the next and previous month buttons on the System.Web.UI.WebControls.Calendar.

ToString

[C#] public const NextPrevFormat CustomText;

[C++] public: const NextPrevFormat CustomText;

[VB] Public Const CustomText As NextPrevFormat

[JScript] public var CustomText: NextPrevFormat;

Description

Custom text format for the month navigation controls on the System.Web.UI.WebControls.Calendar.

ToString

[C#] public const NextPrevFormat FullMonth;

[C++] public: const NextPrevFormat FullMonth;

[VB] Public Const FullMonth As NextPrevFormat

[JScript] public var FullMonth: NextPrevFormat;

Description

Full month name format for the month navigation controls on the System.Web.UI.WebControls.Calendar. For example, “January”.

ToString

[C#] public const NextPrevFormat ShortMonth;

[C++] public: const NextPrevFormat ShortMonth;

[VB] Public Const ShortMonth As NextPrevFormat

[JScript] public var ShortMonth: NextPrevFormat;

Description

Abbreviated month name format for the month navigation controls on the System.Web.UI.WebControls.Calendar. For example, “Jan”.

PagedDataSource class (System.Web.UI.WebControls)

ToString

Description

Provides a wrapper over an System.Collections.ICollection data source to implement paging semantics or ‘paged views’ on top of the underlying datasource. This class cannot be inherited.

This class uses the best available interface to enumerate over the data belonging to the current page. If the underlying data source supports indexed access (like System.Array and System.Collections.IList ), this wrapper uses it. Otherwise it falls back on System.Collections.IEnumerable.

PagedDataSource

Example Syntax:

ToString

[C#] public PagedDataSource( );

[C++] public: PagedDataSource( );

[VB] Public Sub New( )

[JScript] public function PagedDataSource( );

Description

Initializes a new instance of the System.Web.UI.WebControls.PagedDataSource class.

The following table shows initial property values for an instance of System.Web.UI.WebControls.PagedDataSource.

AllowCustomPaging

ToString

[C#] public bool AllowCustomPaging {get; set;}

[C++] public: property bool get_AllowCustomPaging( );public: _property void set_AllowCustomPaging(bool);

[VB] Public Property AllowCustomPaging As Boolean

[JScript] public function get AllowCustomPaging( ): Boolean;public function set AllowCustomPaging(Boolean);

Description

Gets or sets a value indicating whether to assume the underlying data source contains data for just the current page.

This is only applicable if AllowPaging is true. In this scenario, the developer can fetch just the right number of items from the DataSet to fill up a single page, which may be more efficient based on the source of the data.

AllowPaging

ToString

[C#] public bool AllowPaging {get; set;}

[C++] public: property bool get_AllowPaging( );public: _property void set_AllowPaging(bool);

[VB] Public Property AllowPaging As Boolean

[JScript] public function get AllowPaging( ): Boolean;public function set AllowPaging(Boolean);

Description

Gets or sets a value indicating whether to implement page semantics on top of the underlying datasource.

Count

ToString

[C#] public int Count {get;}

[C++] public: property int get Count( );

[VB] Public ReadOnly Property Count As Integer

[JScript] public function get Count( ): int;

Description

Gets the number of items to be used from the datasource. This takes into account several factors such as paged/non-paged modes, custom paging, and last page.

CurrentPageIndex

ToString

[C#] public int CurrentPageIndex {get; set;}

[C++] public: _property int get_CurrentPageIndex( ) public: _ property void set_CurrentPageIndex(int);

[VB] Public Property CurrentPageIndex As Integer

[JScript] public function get CurrentPageIndex( ): int;public function set CurrentPageIndex(int);

Description

Gets or sets a value indicating the index of the current page.

DataSource

ToString

[C#] public IEnumerable DataSource {get; set;}

[C++] public: _property IEnumerable* get_DataSource( );public: _property void set_DataSource(IEnumerable*);

[VB] Public Property DataSource As IEnumerable

[JScript] public function get DataSource( ): IEnumerable; public function set DataSource(IEnumerable);

Description

Gets or sets the data source.

DataSourceCount

ToString

[C#] public int DataSourceCount {get;}

[C++] public: _property int get_DataSourceCount( );

[VB] Public ReadOnly Property DataSourceCount As Integer

[JScript] public function get DataSourceCount( ): int;

Description

Gets the item count of the data source.

FirstIndexInPage

ToString

[C#] public int FirstIndexInPage {get;}

[C++] public: _property int get_FirstIndexInPage( );

[VB] Public ReadOnly Property FirstIndexInPage As Integer

[JScript] public function get FirstIndexInPage( ): int;

Description

Gets the first index in the page.

IsCustomPagingEnabled

ToString

[C#] public bool IsCustomPagingEnabled {get;}

[C++] public: _property bool get_IsCustomPagingEnabled( );

[VB] Public ReadOnly Property IsCustomPagingEnabled As Boolean

[JScript] public function get IsCustomPagingEnabled( ): Boolean;

Description

Gets a value indicating whether custom paging is enabled.

IsFirstPage

ToString

[C#] public bool IsFirstPage {get;}

[C++] public: _property bool get_IsFirstPage( );

[VB] Public ReadOnly Property IsFirstPage As Boolean

[JScript] public function get IsFirstPage( ): Boolean;

Description

Gets a value indicating if the current page is the first page.

IsLastPage

ToString

[C#] public bool IsLastPage {get;}

[C++] public: _property bool get_IsLastPage( );

[VB] Public ReadOnly Property IsLastPage As Boolean

[JScript] public function get IsLastPage( ): Boolean;

Description

Gets a value indicating if the current page is the last page.

IsPagingEnabled

ToString

[C#] public bool IsPagingEnabled {get;}

[C++] public: _property bool get_IsPagingEnabled( );

[VB] Public ReadOnly Property IsPagingEnabled As Boolean

[JScript] public function get IsPagingEnabled( ): Boolean;

Description

Gets a value indicating whether paging is enabled.

IsReadOnly

ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the data source is read-only.

IsSynchronized

ToString

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether access to the data source is synchronized (thread-safe).

PageCount

ToString

[C#] public int PageCount {get;}

[C++] public: _property int get_PageCount( );

[VB] Public ReadOnly Property PageCount As Integer

[JScript] public function get PageCount( ): int;

Description

Gets the page count.

PageSize

ToString

[C#] public int PageSize {get; set;}

[C++] public: _property int get_PageSize( );public: _property void set_PageSize(int);

[VB] Public Property PageSize As Integer

[JScript] public function get PageSize( ): int;public function set PageSize(int);

Description

Gets or sets the page size.

SyncRoot

ToString

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets the object that can be used to synchronize access to the collection. In this case, it is the collection itself.

VirtualCount

ToString

[C#] public int VirtualCount {get; set;}

[C++] public: _property int get_VirtualCount( );public: _property void set_VirtualCount(int);

[VB] Public Property VirtualCount As Integer

[JScript] public function get VirtualCount( ): int;public function set VirtualCount(int);

Description

Gets or sets the virtual count.

CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies contents from the data source to the specified System.Array with the specified starting index. The specified System.Array that receives copied contents from the data source. The starting position in the specified System.Array to receive copied contents.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator of all items within the data source.

Return Value: An enumerator that enumerates over all items within the data source.

GetItemProperties

[C#] public PropertyDescriptorCollection GetItemProperties (PropertyDescriptor[ ] listAccessors);

[C++] public: _sealed PropertyDescriptorCollection* GetItemProperties(PropertyDescriptor* listAccessors[ ]);

[VB] NotOverridable Public Function GetItemProperties (ByVal listAccessors( ) As PropertyDescriptor) As PropertyDescriptorCollection

[JScript] public function GetItemProperties(listAccessors: PropertyDescriptor[ ]) PropertyDescriptorCollection;

GetListName

[C#] public string GetListName(PropertyDescriptor[ ] listAccessors);

[C++] public: _sealed String* GetListName(PropertyDescriptor* listAccessors[ ]);

[VB] NotOverridable Public Function GetListName(ByVal listAccessors( ) As PropertyDescriptor) As String

[JScript] public function GetListName(listAccessors: PropertyDescriptor[ ]) String;

PagerMode enumeration (System.Web.UI.WebControls)

ToString

Description

Represents the mode of the pager for accessing various pages within the System.Web.UI.WebControls.DataGrid control.

The System.Web.UI.WebControls.PagerMode enumeration represents the different display modes for the pager of a System.Web.UI.WebControls.DataGrid control.

ToString

[C#] public const PagerMode NextPrev;

[C++] public: const PagerMode NextPrev;

[VB] Public Const NextPrev As PagerMode

[JScript] public var NextPrev: PagerMode;

Description

A pager with Previous and Next buttons to access the next and previous pages.

ToString

[C#] public const PagerMode NumericPages;

[C++] public: const PagerMode NumericPages;

[VB] Public Const NumericPages As PagerMode

[JScript] public var NumericPages: PagerMode;

Description

A pager with numbered buttons to access pages directly.

PagerPosition enumeration (System.Web.UI.WebControls)

ToString

Description

Specifies the position of the pager for accessing various pages within the System.Web.UI.WebControls.DataGrid control.

The System.Web.UI.WebControls.PagerPosition enumeration represents the different locations where the pager can be displayed.

ToString

[C#] public const PagerPosition Bottom;

[C++] public: const PagerPosition Bottom;

[VB] Public Const Bottom As PagerPosition

[JScript] public var Bottom: PagerPosition;

Description

A pager positioned at the bottom of the System.Web.UI.WebControls.DataGrid.

ToString

[C#] public const PagerPosition Top;

[C++] public: const PagerPosition Top;

[VB] Public Const Top As PagerPosition

[JScript] public var Top: PagerPosition;

Description

A pager positioned at the top of the System.Web.UI.WebControls.DataGrid.

ToString

[C#] public const PagerPosition TopAndBottom;

[C++] public: const PagerPosition TopAndBottom;

[VB] Public Const TopAndBottom As PagerPosition

[JScript] public var TopAndBottom: PagerPosition;

Description

Pagers positioned at both the top and the bottom of the System.Web.UI.WebControls.DataGrid.

Panel class (System.Web.UI.WebControls)

ToString

Description

Represents a control that acts as a container for other controls.

The System.Web.UI.WebControls.Panel control is a container for other controls. It is especially useful when you want to generate controls programmatically or hide/show a group of controls.

Panel

Example Syntax:

ToString

[C#] public Panel( );

[C++] public: Panel( );

[VB] Public Sub New( )

[JScript] public function Panel( );

Description

Initializes a new instance of the System.Web.UI.WebControls.Panel class.

AccessKey

Attributes

BackColor

BackImageUrl

ToString

Description

Gets or sets the URL of the background image for the panel control.

Use this property to display a custom image for the System.Web.UI.WebControls.Panel control.

BorderColor

BorderStyle

BorderWidth

ChildControlsCreated

ClientID

Context

Controls

ControlStyle

ControlStyleCreated

CssClass

Enabled

EnableViewState

Events

Font

ForeColor

HasChildViewState

Height

HorizontalAlign

ToString

Description

Gets or sets the horizontal alignment of the contents within the panel.

Use this property to specify the alignment of the elements in the System.Web.UI.WebControls.Panel.

ID

IsTrackingViewState

NamingContainer

Page

Parent

Site

Style

TabIndex

TagKey

TagName

TemplateSourceDirectory

ToolTip

UniqueID

ViewState

ViewStateIgnoresCase

Visible

Width

Wrap

ToString

Description

Gets or sets a value indicating whether the content wraps within the panel.

Use this property to wrap the contents of the System.Web.UI.WebControls.Panel.

AddAttributesToRender

[C#] protected override void AddAttributesToRender(HtmlTextWriter writer);

[C++] protected: void AddAttributes ToRender(HtmlTextWriter* writer);

[VB] Overrides Protected Sub AddAttributesToRender(ByVal writer As HtmlTextWriter)

[JScript] protected override function AddAttributesToRender (writer: HtmlTextWriter);

Description

Add background-image to list of style attributes to render. Add align and nowrap to list of attributes to render.

PlaceHolder class (System.Web.UI.WebControls)

TrackViewState

Description

A container to store dynamically added server controls on the Web page.

Use the System.Web.UI.WebControls.PlaceHolder control as a container to store dynamically added server controls to the Web page. The System.Web.UI.WebControls.PlaceHolder control does not produce any visible output and is only used as a container for other controls on the Web page. You can use the System.Web.UI.Control.Controls collection to add, insert, or remove a control from the System.Web.UI.WebControls.PlaceHolder control.

PlaceHolder

Example Syntax:

TrackViewState

[C#] public PlaceHolder( );

[C++] public: PlaceHolder( );

[VB] Public Sub New( )

[JScript] public function PlaceHolder( );

ChildControlsCreated

ClientID

Context

Controls

EnableViewState

Events

HasChildViewState

ID

IsTrackingViewState

NamingContainer

Page

Parent

Site

TemplateSourceDirectory

UniqueID

ViewState

ViewStateIgnoresCase

Visible

PlaceHolderControlBuilder class (System.Web.UI.WebControls)

TrackViewState

System.Web.UI.WebControls.PlaceHolder

PlaceHolderControlBuilder

Example Syntax:

TrackViewState

ControlType

FChildrenAsProperties

FIsNonParserAccessor

HasAspCode

ID

InDesigner

NamingContainerType

Parser

TagName

AllowWhitespaceLiterals

[C#] public override bool AllowWhitespaceLiterals( );

[C++] public: bool AllowWhitespaceLiterals( );

[VB] Overrides Public Function AllowWhitespaceLiterals( ) As Boolean

[JScript] public override function AllowWhitespace Literals( ): Boolean; Specifies whether white space literals are allowed.

RadioButton class (System.Web.UI.WebControls)

ToString

Description

Represents a radio button control.

The System.Web.UI.WebControls.RadioButton server control permits you to intersperse the radio buttons in a group with other content in the page. The buttons are grouped logically because they all share the same System.Web.UI.WebControls.RadioButton.GroupName.

RadioButton

Example Syntax:

ToString

[C#] public RadioButton( );

[C++] public: RadioButton( );

[VB] Public Sub New( )

[JScript] public function RadioButton( );

Description

Initializes a new instance of the System.Web.UI.WebControls.RadioButton class.

AccessKey

Attributes

AutoPostBack

BackColor

BorderColor

BorderStyle

BorderWidth

Checked

ChildControlsCreated

ClientID

Context

Controls

ControlStyle

ControlStyleCreated

CssClass

Enabled

EnableViewState

Events

Font

ForeColor

GroupName

ToString

Description

Gets or sets the name of the group that the radio button belongs to.

Use this property to specify a grouping of radio buttons to create a mutually exclusive set of controls. The property can be used when only one selection is possible from a list of available options, as in the case of gender.

HasChildViewState

Height

ID

IsTrackingViewState

NamingContainer

Page

Parent

Site

Style

TabIndex
TagKey
TagName
TemplateSourceDirectory
Text
TextAlign
ToolTip
UniqueID
ViewState
ViewStateIgnoresCase
Visible
Width
OnPreRender

[C#] protected override void OnPreRender(EventArgs e);
[C++] protected: void OnPreRender(EventArgs* e);
[VB] Overrides Protected Sub OnPreRender(ByVal e As EventArgs)
[JScript] protected override function OnPreRender(e: EventArgs);

Description

This method is invoked just prior to rendering. Register client script for handling postback if onChangeHandler is set.

IPostBackDataHandler.LoadPostData

[C#] bool IPostBackDataHandler.LoadPostData(string postDataKey, NameValueCollection postCollection);
[C++] bool IPostBackDataHandler::LoadPostData(String* postDataKey, NameValueCollection* postCollection);
[VB] Function LoadPostData(ByVal postDataKey As String, ByVal postCollection As NameValueCollection) As Boolean Implements IPostBackDataHandler.LoadPostData
[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );
[C++] void IPostBackDataHandler::RaisePostDataChangedEvent( );
[VB] Sub RaisePostDataChangedEvent( ) Implements IPostBackDataHandler.RaisePostDataChangedEvent
[JScript] function IPostBackDataHandler.RaisePostDataChangedEvent( );

RadioButtonList class (System.Web.UI.WebControls)
TrackViewState

Description

Represents a list control that encapsulates a group of radio button controls.

The System.Web.UI.WebControls.RadioButtonList control provides page developers with a single-selection radio button group that can be dynamically generated via data binding. It contains an System.Web.UI.WebControls.ListControl.Items collection with members that correspond to individual items on the list. To determine which item is selected, test the System.Web.UI.WebControls.ListControl.SelectedItem property of the list.

RadioButtonList
Example Syntax:
TrackViewState

[C#] public RadioButtonList( );
[C++] public: RadioButtonList( );
[VB] Public Sub New( )
[JScript] public function RadioButtonList( );

Description

Initializes a new instance of a System.Web.UI.WebControls.RadioButtonList class.

Use this constructor to create and initialize a new instance of the System.Web.UI.WebControls.RadioButtonList class.

AccessKey
Attributes
AutoPostBack
BackColor
BorderColor
BorderStyle
BorderWidth
CellPadding
TrackViewState Description Gets or sets the distance (in pixels) between the border and the contents of the table cell.

This property only applies when the System.Web.UI.WebControls.RadioButtonList.RepeatLayout property is set to RepeatLayout.Table.

CellSpacing
TrackViewState

[C#] public virtual int CellSpacing {get; set;}
[C++] public: _property virtual int get_CellSpacing( );
public: _ property virtual void set_CellSpacing(int);
[VB] Overridable Public Property CellSpacing As Integer
[JScript] public function get CellSpacing( ): int;public function set CellSpacing(int);

Description

Gets or sets the distance (in pixels) between adjacent table cells.

This property only applies when the System.Web.UI.WebControls.RadioButtonList.RepeatLayout property is set to RepeatLayout.Table.

ChildControlsCreated
ClientID
Context
Controls
ControlStyle
ControlStyleCreated
CssClass
DataMember
DataSource
DataTextField
DataTextFormatString
DataValueField
Enabled
EnableViewState
Events
Font
ForeColor
HasChildViewState
Height
ID
IsTrackingViewState
Items
NamingContainer
Page
Parent
RepeatColumns
TrackViewState Description Gets or sets the number of columns to display in the System.Web.UI.WebControls.RadioButtonList control.

Use this property to specify the number of columns that display items in the System.Web.UI.WebControls.RadioButtonList control. If this property is not set, the System.

Web.UI.WebControls.RadioButtonList control will display all items in the list in a single column.

RepeatDirection

TrackViewState

[C#] public virtual RepeatDirection RepeatDirection {get; set;}

[C++] public: _property virtual RepeatDirection get_RepeatDirection( );public: _property virtual void set_RepeatDirection(RepeatDirection);

[VB] Overridable Public Property RepeatDirection As RepeatDirection

[JScript] public function get RepeatDirection( ): RepeatDirection;public function set RepeatDirection(RepeatDirection);

Description

Gets or sets the direction that the radio buttons within the group are displayed.

Use this property to specify the display direction of the System.Web.UI.WebControls.RadioButtonList control.

RepeatLayout

TrackViewState

[C#] public virtual RepeatLayout RepeatLayout {get; set;}

[C++] public: _property virtual RepeatLayout get_RepeatLayout( );public: _property virtual void set_RepeatLayout (RepeatLayout);

[VB] Overridable Public Property RepeatLayout As RepeatLayout

[JScript] public function get RepeatLayout( ): RepeatLayout; public function set RepeatLayout(RepeatLayout);

Description

Gets or sets the layout of radio buttons within the group.

Use this property to specify whether the items in the System.Web.UI.WebControls.RadioButtonList control are displayed in a table. If this property is set to RepeatLayout.Table, the items in the list are displayed in a table. If this property is set to RepeatLayout.Flow, the items in the list are displayed without a table structure.

SelectedIndex

SelectedItem

Site

Style

TabIndex

TagKey

TagName

TemplateSourceDirectory

TextAlign

TrackViewState

Description

Gets or sets the text alignment for the radio buttons within the group.

Use this property to specify whether the text associated with the radio buttons appears on the left or right. If this property is set to TextAlign.Right, the text is displayed to the right of the radio button. If this property is set to TextAlign.Left, the text is displayed to the left of the radio button.

ToolTip

UniqueID

ViewState

ViewStateIgnoresCase

Visible

Width

CreateControlStyle

[C#] protected override Style CreateControlStyle( );

[C++] protected: Style* CreateControlStyle( );

[VB] Overrides Protected Function CreateControlStyle( ) As Style

[JScript] protected override function CreateControlStyle( ): Style;

Description

Render

[C#] protected override void Render(HtmlTextWriter writer);

[C++] protected: void Render(HtmlTextWriter* writer);

[VB] Overrides Protected Sub Render(ByVal writer As HtmlTextWriter)

[JScript] protected override function Render(writer: HtmlTextWriter);

Description

IPostBackDataHandler.LoadPostData

[C#] bool IPostBackDataHandler.LoadPostData(string postDataKey, NameValueCollection postCollection);

[C++] bool IPostBackDataHandler::LoadPostData(String* postDataKey, NameValueCollection* postCollection);

[VB] Function LoadPostData(ByVal postDataKey As String, ByVal postCollection As NameValueCollection) As Boolean Implements IPostBackDataHandler.LoadPostData

[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );

[C++] void IPostBackDataHandler::RaisePostDataChangedEvent( );

[VB] Sub RaisePostDataChangedEvent( ) Implements IPostBackDataHandler.RaisePostDataChangedEvent

[JScript] function IPostBackDataHandler.RaisePostDataChangedEvent( );

IRepeatInfoUser.GetItemStyle

[C#] Style IRepeatInfoUser.GetItemStyle(ListItemType itemType, int repeatIndex);

[C++] Style* IRepeatInfoUser::GetItemStyle(ListItemType itemType, int repeatIndex);

[VB] Function GetItemStyle(ByVal itemType As ListItemType, ByVal repeatIndex As Integer) As Style Implements IRepeatInfoUser.GetItemStyle

[JScript] function IRepeatInfoUser.GetItemStyle(itemType: ListItemType, repeatIndex: int): Style;

IRepeatInfoUser.RenderItem

[C#] void IRepeatInfoUser.RenderItem(ListItemType itemType, int repeatIndex, RepeatInfo repeatInfo, HtmlTextWriter writer);

[C++] void IRepeatInfoUser::RenderItem(ListItemType itemType, int repeatIndex, RepeatInfo* repeatInfo, HtmlTextWriter* writer);

[VB] Sub RenderItem(ByVal itemType As ListItemType, ByVal repeatIndex As Integer, ByVal repeatInfo As RepeatInfo, ByVal writer As HtmlTextWriter) Implements IRepeatInfoUser.RenderItem

[JScript] function IRepeatInfoUser.RenderItem(itemType: ListItemType, repeatIndex: int, repeatInfo: RepeatInfo, writer: HtmlTextWriter);

RangeValidator class (System.Web.UI.WebControls)

TrackViewState

Description

Checks whether the value of an input control is within a specified range of values.

The System.Web.UI.WebControls.RangeValidator control tests whether the value of an input control is within a specified range.

RangeValidator

Example Syntax:

TrackViewState

[C#] public RangeValidator( );

[C++] public: RangeValidator( );

[VB] Public Sub New( )

[JScript] public function RangeValidator( );

AccessKey

Attributes

BackColor

BorderColor

BorderStyle

BorderWidth

ChildControlsCreated

ClientID

Context

Controls

ControlStyle

ControlStyleCreated

ControlToValidate

CssClass

Display

EnableClientScript

Enabled

EnableViewState

ErrorMessage

Events

Font

ForeColor

HasChildViewState

Height

ID

IsTrackingViewState

IsValid

MaximumValue

TrackViewState

Description

Gets or sets the maximum value of the validation range.

Use the System.Web.UI.WebControls.RangeValidator.Maximumvalue property to specify the maximum value of the validation range. If the value specified by this property fails to convert to the data type specified by the System.Web.UI.WebControls.BaseCompareValidator.Type property, an exception is thrown.

MinimumValue

TrackViewState

[C#] public string MinimumValue {get; set;}

[C++] public: _property String* get MinimumValue( );public: _property void set_MinimumValue(String*);

[VB] Public Property MinimumValue As String

[JScript] public function get MinimumValue( ): String;public function set MinimumValue(String);

Description

Gets or sets the minimum value of the validation range.

Use the System.Web.UI.WebControls.RangeValidator.MinimumValue property to specify the minimum value of the validation range. If the value specified by this property fails to convert to the data type specified by the System.Web.UI.WebControls.BaseCompareValidator.Type property, a trace debug message is generated, the System.Web.UI.WebControls.BaseValidator.IsValid property is set to true, and no additional processing is performed.

NamingContainer

Page

Parent

PropertiesValid

RenderUplevel

Site

Style

TabIndex

TagKey

TagName

TemplateSourceDirectory

Text

ToolTip

Type

UniqueID

ViewState

ViewStateIgnoresCase

Visible

Width

AddAttributesToRender

[C#] protected override void AddAttributesToRender(HtmlTextWriter writer);

[C++] protected: void AddAttributes ToRender(HtmlTextWriter* writer);

[VB] Overrides Protected Sub AddAttributesToRender(ByVal writer As HtmlTextWriter)

[JScript] protected override function AddAttributesToRender (writer: HtmlTextWriter);

Description

AddAttributesToRender method AddAttributesToRender method

ControlPropertiesValid

[C#] protected override bool ControlPropertiesValid( );

[C++] protected: bool ControlPropertiesValid( );

[VB] Overrides Protected Function ControlPropertiesValid( ) As Boolean

[JScript] protected override function ControlProperties Valid( ): Boolean;

Description

This is a check of properties to determine any errors made by the developer This is a check of properties to determine any errors made by the developer EvaluateIsValid

[C#] protected override bool EvaluateIsValid( );

[C++] protected: bool EvaluateIsValid( );

[VB] Overrides Protected Function EvaluateIsValid( ) As Boolean

[JScript] protected override function EvaluateIsValid( ): Boolean;

Description

EvaluateIsValid method EvaluateIsValid method

RegularExpressionValidator class (System.Web.UI.WebControls)

Validate

Description

Validates whether the value of an associated input control matches the pattern specified by a regular expression.

The System.Web.UI.WebControls.RegularExpressionValidator control checks whether the value of an input control matches a pattern defined by a regular expression. This type of validation allows you to check for predictable sequences of characters, such as those in social security numbers, e-mail addresses, telephone numbers, and postal codes.

RegularExpressionValidator

Example Syntax:

Validate

[C#] public RegularExpressionValidator( );

[C++] public: RegularExpressionValidator( );

[VB] Public Sub New( )
[JScript] public function RegularExpressionValidator( );
AccessKey
Attributes
BackColor
BorderColor
BorderStyle
BorderWidth
ChildControlsCreated
ClientID
Context
Controls
ControlStyle
ControlStyleCreated
ControlToValidate
CssClass
Display
EnableClientScript
Enabled
EnableViewState
ErrorMessage
Events
Font
ForeColor
HasChildViewState
Height
ID
IsTrackingViewState
IsValid
NamingContainer
Page
Parent
PropertiesValid
RenderUplevel
Site
Style
TabIndex
TagKey
TagName
TemplateSourceDirectory
Text
ToolTip
UniqueID
ValidationExpression
Validate Description Gets or sets the regular expression that determines the pattern used to validate a field.

Use this property to specify the pattern used to check for predictable sequences of characters, such as those in social security numbers, e-mail addresses, telephone numbers, and postal codes.

ViewState
ViewStateIgnoresCase
Visible
Width
AddAttributesToRender
[C#] protected override void AddAttributesToRender(HtmlTextWriter writer);
[C++] protected: void AddAttributes ToRender(HtmlTextWriter* writer);
[VB] Overrides Protected Sub AddAttributesToRender(ByVal writer As HtmlTextWriter)
[JScript] protected override function AddAttributesToRender (writer: HtmlTextWriter);

Description

AddAttributesToRender method AddAttributesToRender method

EvaluateIsValid
[C#] protected override bool EvaluateIsValid( );
[C++] protected: bool EvaluateIsValid( );
[VB] Overrides Protected Function EvaluateIsValid( ) As Boolean
[JScript] protected override function EvaluateIsValid( ): Boolean;

Description

EvaluateIsValid method EvaluateIsValid method

RepeatDirection enumeration (System.Web.UI.WebControls)

Validate

Description

Specifies the direction in which items of a list control are displayed.

The System.Web.UI.WebControls.RepeatDirection enumeration represents the different directions in which the items of a list control can be displayed.

Validate
[C#] public const RepeatDirection Horizontal;
[C++] public: const RepeatDirection Horizontal;
[VB] Public Const Horizontal As RepeatDirection
[JScript] public var Horizontal: RepeatDirection;

Description

Items of a list are displayed horizontally in rows from left to right, then top to bottom, until all items are rendered.

Validate
[C#] public const RepeatDirection Vertical;
[C++] public: const RepeatDirection Vertical;
[VB] Public Const Vertical As RepeatDirection
[JScript] public var Vertical: RepeatDirection;

Description

Items of a list are displayed vertically in columns from top to bottom, and then left to right, until all items are rendered.

Repeater class (System.Web.UI.WebControls)

ToString

Description

A databound list control that allows custom layout by repeating a specified template for each item displayed in the list.

The System.Web.UI.WebControls.Repeater is a basic templated databound list. It has no built-in layout or styles, so you must explicitly declare all HTML layout, formatting, and style tags within the control's templates.

Repeater
Example Syntax:
ToString
[C#] public Repeater( );
[C++] public: Repeater( );
[VB] Public Sub New( )
[JScript] public function Repeater( );

Description

Initializes a new instance of the System.Web.UI.WebControls.Repeater class.

AlternatingItemTemplate
ToString
[C#] public virtual ITemplate AlternatingItemTemplate {get; set;}
[C++] public: property virtual ITemplate* get_AlternatingItemTemplate( );public: _property virtual void set_AlternatingItemTemplate(ITemplate*);

[VB] Overridable Public Property AlternatingItemTemplate As ITemplate
[JScript] public function get AlternatingItemTemplate( ): ITemplate;public function set AlternatingItemTemplate (ITemplate);

Description

Gets or sets the System.Web.UI.ITemplate that defines how alternating (zero-based odd-indexed) items are rendered.

Use this property to provide a different appearance from the System.Web.UI.WebControls.Repeater.ItemTemplate for alternating items in the System.Web.UI.WebControls.Repeater.

ChildControlsCreated
ClientID
Context
Controls
ToString
DataMember
ToString

Description

Gets or sets the specific table in the System.Web.UI.WebControls.Repeater.DataSource to bind to the control.

If the System.Web.UI.WebControls.Repeater.DataSource contains multiple tables, use this property to specify the table to bind to the System.Web.UI.WebControls.Repeater.

DataSource
ToString
[C#] public virtual object DataSource {get; set;}
[C++] public: _property virtual Object* get_DataSource( );public: _property virtual void set_DataSource (Object*);
[VB] Overridable Public Property DataSource As Object
[JScript] public function get DataSource( ): Object;public function set DataSource(Object);

Description

Gets or sets the data source that provides data for populating the list.

Use this property to specify the source of data to populate the System.Web.UI.WebControls.Repeater control. The System.Web.UI.WebControls.Repeater.DataSource can be any System.Collections.IEnumerable derived object such as a System.Data.DataView for accessing databases, an System.Collections.ArrayList, a System.Collections.Hashtable, or an array.

EnableViewState
Events
FooterTemplate
ToString

Description

Gets or sets the System.Web.UI.ITemplate that defines how the control footer is rendered.

Use this property to create a template that controls how the tooter of a System.Web.UI.WebControls.Repeater control is displayed.

HasChildViewState
HeaderTemplate
ToString

Description

Gets or sets the System.Web.UI.ITemplate that defines how the control header is rendered.

Use this property to create a template that controls how the header of a System.Web.UI.WebControls.Repeater control is displayed.

ID
IsTrackingViewState
Items
ToString

Description

Gets a collection of System.Web.UI.WebControls.RepeaterItem objects in the System.Web.UI.WebControls.Repeater.

The System.Web.UI.WebControls.Repeater populates the System.Web.UI.WebControls.Repeater.Items collection by enumerating every object in its System.Web.UI.WebControls.Repeater.DataSource. The System.Web.UI.WebControls.Repeater.Items collection is then used by the System.Web.UI.WebControls.Repeater to render each item in the control.

ItemTemplate
ToString
[C#] public virtual ITemplate ItemTemplate {get; set;}
[C++] public: _property virtual ITemplate* get_ItemTemplate( );public: _property virtual void set_ItemTemplate (ITemplate*);
[VB] Overridable Public Property ItemTemplate As ITemplate
[JScript] public function get ItemTemplate( ): ITemplate; public function set ItemTemplate(ITemplate);

Description

Gets or sets the System.Web.UI.ITemplate that defines how items are rendered.

Use this property to create a template that controls how individual items in the System.Web.UI.WebControls.Repeater are displayed.

NamingContainer
Page
Parent
SeparatorTemplate
ToString

Description

Gets or sets the System.Web.UI.ITemplate that defines how separators between items are rendered.

Use this property to create a template that controls how separators between items are displayed.

Site
TemplateSourceDirectory
UniqueID
ViewState
ViewStateIgnoresCase
Visible
ToString Description Occurs when a button is clicked in the System.Web.UI.WebControls.Repeater control.

This event is raised when a button in the System.Web.UI.WebControls.Repeater is clicked.

ToString
[C#] public event RepeaterItemEventHandler ItemCreated;
[C++] public: _event RepeaterItemEventHandler* ItemCreated;
[VB] Public Event ItemCreated As RepeaterItemEventHandler Description Occurs when an item is created in the System.Web.UI.WebControls.Repeater control.

This event is raised when an item is created in the System.Web.UI.WebControls.Repeater.

ToString
[C#] public event RepeaterItemEventHandler ItemDataBound;

[C++] public: _event RepeaterItemEventHandler* ItemDataBound;

[VB] Public Event ItemDataBound As RepeaterItemEventHandler

Description

Occurs after an item in the System.Web.UI.WebControls.Repeater is databound but before it is rendered on the page.

This event is raised when an item in the System.Web.UI.WebControls.Repeater is databound.

CreateChildControls

[C#] protected override void CreateChildControls( );

[C++] protected: void CreateChildControls( );

[VB] Overrides Protected Sub CreateChildControls( )

[JScript] protected override function CreateChildControls( );

Description

CreateControlHierarchy

[C#] protected virtual void CreateControlHierarchy(bool useDataSource);

[C++] protected: virtual void CreateControlHierarchy(bool useDataSource);

[VB] Overridable Protected Sub CreateControlHierarchy (ByVal useDataSource As Boolean)

[JScript] protected function CreateControlHierarchy(useDataSource: Boolean);

Description

A protected method. Creates a control hierarchy, with or without the data source as specified. Indicates whether to use the data source or not.

CreateItem

[C#] protected virtual RepeaterItem CreateItem(int itemIndex, ListItemType itemType);

[C++] protected: virtual RepeaterItem* CreateItem(int itemIndex, ListItemType itemType);

[VB] Overridable Protected Function CreateItem(ByVal itemIndex As Integer, ByVal itemType As ListItemType) As RepeaterItem

[JScript] protected function CreateItem(itemIndex: int, itemType: ListItemType) : RepeaterItem;

Description

A protected method. Creates a System.Web.UI.WebControls.RepeaterItem with the specified item type and location within the System.Web.UI.WebControls.Repeater. The specified location within the System.Web.UI.WebControls.Repeater to place the created item. A System.Web.UI.WebControls.ListItemType that represents the specified type of the System.Web.UI.WebControls.Repeater item to create.

DataBind

[C#] public override void DataBind( );

[C++] public: void DataBind( );

[VB] Overrides Public Sub DataBind( )

[JScript] public override function DataBind( );

Description

InitializeItem

[C#] protected virtual void InitializeItem(RepeaterItem item);

[C++] protected: virtual void InitializeItem(RepeaterItem* item);

[VB] Overridable Protected Sub InitializeItem(ByVal item As RepeaterItem)

[JScript] protected function InitializeItem(item: RepeaterItem);

Description

A protected method. Populates iteratively the specified System.Web.UI.WebControls.RepeaterItem with a sub-hierarchy of child controls. The control to be initialized from an inline template.

OnBubbleEvent

[C#] protected override bool OnBubbleEvent(object sender, EventArgs e);

[C++] protected: bool OnBubbleEvent(Object* sender, EventArgs* e);

[VB] Overrides Protected Function OnBubbleEvent(ByVal sender As Object, ByVal e As EventArgs) As Boolean

[JScript] protected override function OnBubbleEvent (sender: Object, e: EventArgs): Boolean;

Description

OnDataBinding

[C#] protected override void OnDataBinding(EventArgs e);

[C++] protected: void OnDataBinding(EventArgs* e);

[VB] Overrides Protected Sub OnDataBinding(ByVal e As EventArgs)

[JScript] protected override function OnDataBinding(e: EventArgs);

Description

A protected method. Raises the DataBinding event.

OnItemCommand

[C#] protected virtual void OnItemCommand(RepeaterCommandEventArgs e);

[C++] protected: virtual void OnItemCommand(RepeaterCommandEventArgs * e);

[VB] Overridable Protected Sub OnItemCommand(ByVal e As RepeaterCommandEventArgs)

[JScript] protected function OnItemCommand(e: RepeaterCommandEventArgs);

Description

Raises the System.Web.UI.WebControls.Repeater.ItemCommand event.

Raising an event invokes the event handler through a delegate. For more information, see. The System.Web.UI.WebControls.RepeaterCommandEventArgs that contains the event data.

OnItemCreated

[C#] protected virtual void OnItemCreated(RepeaterItemEventArgs e);

[C++] protected: virtual void OnItemCreated(RepeaterItemEventArgs * e);

[VB] Overridable Protected Sub OnItemCreated(ByVal e As RepeaterItemEventArgs)

[JScript] protected function OnItemCreated(e: RepeaterItemEventArgs);

Description

Raises the System.Web.UI.WebControls.Repeater.ItemCreated event.

Raising an event invokes the event handler through a delegate. For more information, see. The System.Web.UI.WebControls.RepeaterItemEventArgs that contains the event data.

OnItemDataBound

[C#] protected virtual void OnItemDataBound(RepeaterItemEventArgs e);

[C++] protected: virtual void OnItemDataBound(RepeaterItemEventArgs * e);

[VB] Overridable Protected Sub OnItemDataBound(ByVal e As RepeaterItemEventArgs)

[JScript] protected function OnItemDataBound(e: RepeaterItemEventArgs);

Description

Raises the System.Web.UI.WebControls.Repeater.ItemDataBound event.

Raising an event invokes the event handler through a delegate. For more information, see. The System.Web.UI.WebControls.RepeaterItemEventArgs that contains the event data.

RepeaterCommandEventArgs class (System.Web.UI.WebControls)

TrackViewState

Description

Provides data for the System.Web.UI.WebControls.Repeater.ItemCommand event of a System.Web.UI.WebControls.Repeater. This class cannot be inherited.

For a list of initial property values for an instance of System.Web.UI.WebControls.RepeaterCommandEventArgs, see the System.Web.UI.WebControls.RepeaterCommandEvent Args.#ctor constructor. For more information about handling events, see.

RepeaterCommandEventArgs

Example Syntax:

TrackViewState

[C#] public RepeaterCommandEventArgs(RepeaterItem item, object commandSource, CommandEventArgs originalArgs);

[C++] public: RepeaterCommandEventArgs(RepeaterItem* item, Object* commandSource, CommandEventArgs* originalArgs);

[VB] Public Sub New(ByVal item As RepeaterItem, ByVal commandSource As Object, ByVal originalArgs As CommandEventArgs)

[JScript] public function RepeaterCommandEventArgs (item: RepeaterItem, commandSource: Object, originalArgs: CommandEventArgs);

Description

Initializes a new instance of the System.Web.UI.WebControls.RepeaterCommandEventArgs class.

The following table shows initial property values for an instance of System.Web.UI.WebControls.RepeaterCommandEventArgs. A System.Web.UI.WebControls.RepeaterItem that represents an item in the System.Web.UI.WebControls.Repeater. The System.Web.UI.WebControls.RepeaterCommandEventArgs.Item property is set to this value. The command source. The System.Web.UI.WebControls.RepeaterCommandEventArgs.CommandSource property is set to this value. The original event arguments.

CommandArgument

CommandName

CommandSource

TrackViewState

Description

Gets the source of the command.

Use this property to determine the source of the command.

Item

TrackViewState

[C#] public RepeaterItem Item {get;}

[C++] public: _property RepeaterItem* get_Item( );

[VB] Public ReadOnly Property Item As RepeaterItem

[JScript] public function get Item( ): RepeaterItem;

Description

Gets the System.Web.UI.WebControls.RepeaterItem associated with the event.

Use this property to access the properties of the System.Web.UI.WebControls.RepeaterItem associated with this event.

RepeaterCommandEventHandler delegate (System.Web.UI.WebControls)

ToString

Description

Represents the method that will handle the System.Web.UI.WebControls.Repeater.ItemCommand event of a System.Web.UI.WebControls.Repeater. The source of the event. A System.Web.UI.WebControls.RepeaterCommandEventArgs that contains the event data.

When you create a System.Web.UI.WebControls.RepeaterCommandEventHandler delegate, you identify the method that will handle the event. To associate the event with your event handler, add an instance of the delegate to the event. The event handler is called whenever the event occurs, unless you remove the delegate. For more information about event handler delegates, see.

RepeaterItem class (System.Web.UI.WebControls)

ToString

Description

Represents an item in the System.Web.UI.WebControls.Repeater control.

A System.Web.UI.WebControls.RepeaterItem object represents an item in the System.Web.UI.WebControls.Repeater control, such as the heading section, footer section, or a data item.

RepeaterItem

Example Syntax:

ToString

[C#] public RepeaterItem(int itemIndex, ListItemType itemType);

[C++] public: RepeaterItem(int itemIndex, ListItemType itemType);

[VB] Public Sub New(ByVal itemIndex As Integer, ByVal itemType As ListItemType)

[JScript] public function RepeaterItem(itemIndex: int, itemType: ListItemType);

Description

Initializes a new instance of the System.Web.UI.WebControls.RepeaterItem class.

Use this constructor to create and initialize a new instance of the System.Web.UI.WebControls.RepeaterItem class. The index of the item in the System.Web.UI.WebControls.Repeater control from the System.Web.UI.WebControls.Repeater.Items collection of the control. One of the System.Web.UI.WebControls.ListItemType values.

ChildControlsCreated

ClientID

Context

Controls

DataItem

ToString

Description

Gets or sets a data item associated with the System.Web.UI.WebControls.RepeaterItem object in the System.Web.UI.WebControls.Repeater control.

Use the System.Web.UI.WebControls.RepeaterItem.DataItem property to specify or determine the properties of a data item associated with the System.Web.UI.WebControls.RepeaterItem object in the System.Web.UI.WebControls.Repeater control.

EnableViewState

Events

HasChildViewState
ID
IsTrackingViewState
ItemIndex
ToString

Description

Gets the index of the item in the System.Web.UI.WebControls.Repeater control from the System.Web.UI.WebControls.Repeater.Items collection of the control.

Use the System.Web.UI.WebControls.RepeaterItem.ItemIndex property to determine the index number of the item in the System.Web.UI.WebControls.Repeater control from the System.Web.UI.WebControls.Repeater.Items collection of the control.

ItemType
ToString

[C#] public virtual ListItemType ItemType {get;}
[C++] public: _property virtual ListItemType get_ItemType( );
[VB] Overridable Public ReadOnly Property ItemType As ListItemType
[JScript] public function get ItemType( ): ListItemType;

Description

Gets the type of the item in the System.Web.UI.WebControls.Repeater control.

Use the System.Web.UI.WebControls.RepeaterItem.ItemType property to determine the type of an item in the System.Web.UI.WebControls.Repeater control. The following table lists the different item types.

NamingContainer
Page
Parent
Site
TemplateSourceDirectory
UniqueID
ViewState
ViewStateIgnoresCase
Visible
OnBubbleEvent

[C#] protected override bool OnBubbleEvent(object source, EventArgs e);
[C++] protected: bool OnBubbleEvent(Object* source, EventArgs* e);
[VB] Overrides Protected Function OnBubbleEvent(ByVal source As Object, ByVal e As EventArgs) As Boolean
[JScript] protected override function OnBubbleEvent (source: Object, e: EventArgs): Boolean;

Description

RepeaterItemCollection class (System.Web.UI.WebControls)

TrackViewState

Description

Represents a collection of System.Web.UI.WebControls.RepeaterItem objects in the System.Web.UI.WebControls.Repeater control. This class cannot be inherited.

The System.Web.UI.WebControls.RepeaterItemCollection class represents a collection of System.Web.UI.WebControls.RepeaterItem objects, which in turn represent the data items in a System.Web.UI.WebControls.Repeater control. To programmatically retrieve System.Web.UI.WebControls.RepeaterItem objects from a System.Web.UI.WebControls.Repeater control, use one of the following methods: Use the indexer to get a single System.Web.UI.WebControls.RepeaterItem object from the collection using array notation.

RepeaterItemCollection
Example Syntax:
TrackViewState

[C#] public RepeaterItemCollection(ArrayList items);
[C++] public: RepeaterItemCollection(ArrayList* items);
[VB] Public Sub New(ByVal items As ArrayList)
[JScript] public function RepeaterItemCollection(items: ArrayList);

Description

Initializes a new instance of the System.Web.UI.WebControls.RepeaterItemCollection class.

Use this constructor to create and initialize a new instance of the System.Web.UI.WebControls.RepeaterItemCollection class. A System.Collections.ArrayList object that contains the items with which to initialize the collection.

Count
TrackViewState

[C#] public int Count {get;}
[C++] public: _property int get_Count( );
[VB] Public ReadOnly Property Count As Integer
[JScript] public function get Count( ): int;

Description

Gets the number of System.Web.UI.WebControls.RepeaterItem objects in the collection.

Use the System.Web.UI.WebControls.RepeaterItemCollection.Count property to determine the number of System.Web.UI.WebControls.RepeaterItem objects in the System.Web.UI.WebControls.RepeaterItemCollection collection. The System.Web.UI.WebControls.RepeaterItemCollection.Count property is commonly used when iterating through the collection to determine the upper bound of the collection.

IsReadOnly
TrackViewState

[C#] public bool IsReadOnly {get;}
[C++] public: _property bool get_IsReadOnly( );
[VB] Public ReadOnly Property IsReadOnly As Boolean
[JScript] public function get IsReadOnly( ): Boolean;

Description

Gets a value that indicates whether the System.Web.UI.WebControls.RepeaterItem objects in the System.Web.UI.WebControls.RepeaterItemCollection can be modified.

This property always returns false to indicate that the System.Web.UI.WebControls.RepeaterItemCollection can be written to in all cases.

IsSynchronized
TrackViewState

[C#] public bool IsSynchronized {get;}
[C++] public: _property bool get_IsSynchronized( );
[VB] Public ReadOnly Property IsSynchronized As Boolean
[JScript] public function get IsSynchronized( ): Boolean;

Description

Gets a value indicating whether access to the System.Web.UI.WebControls.RepeaterItemCollection is synchronized (thread-safe).

This property is derived from the System.Collections.ICollection class and is overridden to always return false.

Item
TrackViewState

[C#] public RepeaterItem this[int index] {get;}
[C++] public: _property RepeaterItem* get_Item(int index);
[VB] Public Default ReadOnly Property Item(ByVal index As Integer) As RepeaterItem
[JScript] returnValue=RepeaterItemCollectionObject.Item (index);

Description

Gets the System.Web.UI.WebControls.RepeaterItem object at the specified index in the collection.

Use this indexer to get a System.Web.UI.WebControls.RepeaterItem object from the System.Web.UI.WebControls.RepeaterItemCollection at the specified index, using array notation. The zero-based index of the System.Web.UI.WebControls.RepeaterItem object to retrieve in the collection.

SyncRoot

TrackViewState

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets the object that can be used to synchronize access to the System.Web.UI.WebControls.RepeaterItemCollection collection.

The object returned in this implementation is the System.Web.UI.WebControls.RepeaterItemCollection object itself.

CopyTo

[C#] public void CopyTo(Array array, mnt index);

[C++] public: _sealed void CopyTo(Array* array, mnt index);

[VB] NotOverridable Public Sub CopyTo(ByVal array As Array, ByVal index As Integer)

[JScript] public function CopyTo(array: Array, index: int);

Description

Copies all the items from this System.Web.UI.WebControls.RepeaterItemCollection to the specified System.Array object, starting at the specified index in the System.Array object.

Use this method to copy the contents of the System.Web.UI.WebControls.RepeaterItemCollection into the specified System.Array object, starting at the specified index. A zero-based System.Array object that receives the copied items from the System.Web.UI.WebControls.RepeaterItemCollection. The first position in the specified System.Array object to receive the copied contents.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns a System.Collections.IEnumerator interface that contains all System.Web.UI.WebControls.RepeaterItem objects in the System.Web.UI.WebControls.RepeaterItemCollection.

Return Value: A System.Collections.IEnumerator interface that contains all System.Web.UI.WebControls.RepeaterItem objects in the System.Web.UI.WebControls.RepeaterItemCollection.

Use this method to create a System.Collections.IEnumerator that can be easily iterated through to get each item in the System.Web.UI.WebControls.RepeaterItemCollection.

RepeaterItemEventArgs class (System.Web.UI.WebControls)

ToString

Description

Provides data for the System.Web.UI.WebControls.Repeater.ItemCreated and System.Web.UI.WebControls.Repeater.ItemDataBound events of a System.Web.UI.WebControls.Repeater.

For a list of initial property values for an instance of System.Web.UI.WebControls.RepeaterItemEventArgs, see the System.Web.UI.WebControls.RepeaterItemEventArgs.#ctor constructor.

RepeaterItemEventArgs

Example Syntax:

ToString

[C#] public RepeaterItemEventArgs(RepeaterItem item);

[C++] public: RepeaterItemEventArgs(RepeaterItem* item);

[VB] Public Sub New(ByVal item As RepeaterItem)

[JScript] public function RepeaterItemEventArgs(item: Repeaterntem);

Description

Initializes a new instance of the System.Web.UI.WebControls.RepeaterItemEventArgs class.

The following table shows initial property values for an instance of System.Web.UI.WebControls.RepeaterItemEventArgs. The System.Web.UI.WebControls.RepeaterItem associated with the event. The System.Web.UI.WebControls.RepeaterItemEventArgs.Item property is set to this value.

Item

ToString

[C#] public RepeaterItem Item {get;}

[C++] public: _property RepeaterItem* get_Item( );

[VB] Public ReadOnly Property Item As RepeaterItem

[JScript] public function get Item( ): RepeaterItem;

Description

Gets the System.Web.UI.WebControls.RepeaterItem associated with the event.

Use this property to access the properties of the System.Web.UI.WebControls.RepeaterItem associated with this event.

RepeaterItemEventHandler delegate (System.Web.UI.WebControls)

ToString

Description

Represents the method that will handle the System.Web.UI.WebControls.Repeater.ItemCreated and System.Web.UI.WebControls.Repeater.ItemDataBound events of a System.Web.UI.WebControls.Repeater. The source of the event. A System.Web.UI.WebControls.RepeaterItemEventArgs that contains the event data.

When you create a System.Web.UI.WebControls.RepeaterItemEventHandler delegate, you identify the method that will handle the event. To associate the event with your event handler, add an instance of the delegate to the event. The event handler is called whenever the event occurs, unless you remove the delegate. For more information about event handler delegates, see.

RepeatInfo class (System.Web.UI.WebControls)

ToString

Description

Defines the information used to render a list of items using a System.Web.UI.WebControls.Repeater.

RepeatInfo
Example Syntax:
ToString
[C#] public RepeatInfo( );
[C++] public: RepeatInfo( );
[VB] Public Sub New( )
[JScript] public function RepeatInfo( );

Description
Initializes a new instance of the System.Web.UI.WebControls.RepeatInfo class. This class is not inheritable.
OuterTableImplied
ToString
[C#] public bool OuterTableImplied {get; set;}
[C++] public: _property bool get_OuterTableImplied( );public: _property void set_OuterTableImplied(bool);
[VB] Public Property OuterTableImplied As Boolean
[JScript] public function get OuterTableImplied( ): Boolean; public function set OuterTableImplied(Boolean);

Description
Indicates whether an outer table is implied for the items.
RepeatColumns
ToString
[C#] public int RepeatColumns {get; set;}
[C++] public: _property int get_RepeatColumns( );public: _property void set_RepeatColumns(int);
[VB] Public Property RepeatColumns As Integer
[JScript] public function get RepeatColumns( ): int;public function set RepeatColumns(int);

Description
Indicates the column count of items.
RepeatDirection
ToString
[C#] public RepeatDirection RepeatDirection {get; set;}
[C++] public: _property RepeatDirection get_RepeatDirection( );public: _property void set_RepeatDirection(RepeatDirection);
[VB] Public Property RepeatDirection As RepeatDirection
[JScript] public function get RepeatDirection( ): RepeatDirection;public function set RepeatDirection(RepeatDirection);

Description
Indicates the direction of flow of items.
RepeatLayout
ToString
[C#] public RepeatLayout RepeatLayout {get; set;}
[C++] public: _property RepeatLayout get_Repeat Layout( );public: _property void set_RepeatLayout(RepeatLayout);
[VB] Public Property RepeatLayout As RepeatLayout
[JScript] public function get RepeatLayout( ): RepeatLayout; public function set RepeatLayout(RepeatLayout);

Description
Indicates the layout of items.
RenderRepeater
[C#] public void RenderRepeater(HtmlTextWriter writer, IRepeatInfoUser user, Style controlStyle, WebControl baseControl);
[C++] public: void RenderRepeater(HtmlTextWriter* writer, IRepeatInfoUser* user, Style* controlStyle, WebControl* baseControl);
[VB] Public Sub RenderRepeater(ByVal writer As HtmlTextWriter, ByVal user As IRepeatInfoUser, ByVal controlStyle As Style, ByVal baseControl As WebControl)
[JScript] public function RenderRepeater(writer: HtmlTextWriter, user: IRepeatInfoUser, controlStyle: Style, baseControl: WebControl);

Description
Renders the Repeater with the specified information. The output stream that renders HTML content to the client. The control style to copy. The control to copy base attributes from.
RepeatLayout enumeration (System.Web.UI.WebControls)
ToString Description
Specifies the layout of items in a list control.
The System.Web.UI.WebControls.RepeatLayout enumeration represents the different layout options for a list control.
ToString
[C#] public const RepeatLayout Flow;
[C++] public: const RepeatLayout Flow;
[VB] Public Const Flow As RepeatLayout
[JScript] public var Flow: RepeatLayout;

Description
Items are displayed without a table structure.
ToString
[C#] public const RepeatLayout Table;
[C++] public: const RepeatLayout Table;
[VB] Public Const Table As RepeatLayout
[JScript] public var Table: RepeatLayout;

Description
Items are displayed in a table.
RequiredFieldValidator class (System.Web.UI.WebControls)
ToString Description
Makes the associated input control a required field.
Use this control to make an input control a required field. The input control faills validation if its value does not change from the System.Web.UI.WebControls.RequiredFieldValidator.InitialValue property upon losing focus.
RequiredFieldValidator
Example Syntax:
ToString
[C#] public RequiredFieldValidator( );
[C++] public: RequiredFieldValidator( );
[VB] Public Sub New( )
[JScript] public function RequiredFieldValidator( );
AccessKey
Attributes
BackColor
BorderColor
BorderStyle
BorderWidth
ChildControlsCreated
ClientID
Context
Controls
ControlStyle
ControlStyleCreated
ControlToValidate
CssClass
Display
EnableClientScript
Enabled
EnableViewState
ErrorMessage Events
Font
ForeColor
HasChildViewState
Height
ID
InitialValue
ToString Description Gets or sets the initial value of the associated input control.

Use this property to specify the initial value of the input control.

IsTrackingViewState
IsValid
NamingContainer
Page
Parent
PropertiesValid
RenderUplevel
Site
Style
TabIndex
TagKey
TagName
TemplateSourceDirectory
Text
ToolTip
UniqueID
ViewState
ViewStateIgnoresCase
Visible
Width
AddAttributesToRender

[C#] protected override void AddAttributesToRender(HtmlTextWriter writer);

[C++] protected: void AddAttributes ToRender(HtmlTextWriter* writer);

[VB] Overrides Protected Sub AddAttributesToRender(ByVal writer As HtmlTextWriter)

[JScript] protected override function AddAttributesToRender (writer: HtmlTextWriter);

Description

AddAttributesToRender method AddAttributesToRender method

EvaluateIsValid

[C#] protected override bool EvaluateIsValid( );

[C++] protected: bool EvaluateIsValid( );

[VB] Overrides Protected Function EvaluateIsValid( ) As Boolean

[JScript] protected override function EvaluateIsValid( ): Boolean;

Description

EvaluateIsValid method EvaluateIsValid method

Table.RowControlCollection class (System.Web.UI.WebControls)

Validate

Description

Count
IsReadOnly
IsSynchronized
Item
Owner
SyncRoot
Add

[C#] public override void Add(Control child);

[C++] public: void Add(Control* child);

[VB] Overrides Public Sub Add(ByVal child As Control)

[JScript] public override function Add(child: Control);

Description

Adds the specified System.Web.UI.Control object to the collection. The new control is added to the end of the array.

AddAt

[C#] public override void AddAt(int index, Control child);

[C++] public: void AddAt(int index, Control* child);

[VB] Overrides Public Sub AddAt(ByVal index As Integer, ByVal child As Control)

[JScript] public override function AddAt(index: int, child: Control);

Description

Adds the specified System.Web.UI.Control object to the collection. The new control is added to the array at the specified index location. The location in the array to add the child control. The Control object to add to the collection.

SelectedDatesCollection class (System.Web.UI.WebControls)

ToString

Description

Encapsulates a collection of System.DateTime objects that represent the selected dates in a System.Web.UI.WebControls.Calendar control. This class cannot be inherited.

Use this class to programmatically manage a collection of System.DateTime objects that represent the selected dates in a System.Web.UI.WebControls.Calendar control. This class is commonly used to add or remove dates.

SelectedDatesCollection

Example Syntax:

ToString

[C#] public SelectedDatesCollection(ArrayList dateList);

[C++] public: SelectedDatesCollection(ArrayList* dateList);

[VB] Public Sub New(ByVal dateList As ArrayList)

[JScript] public function SelectedDatesCollection(dateList: ArrayList);

Description

Initializes a new instance of the System.Web.UI.WebControls.SelectedDatesCollection class with the specified date list.

Use this constructor to create a new instance of the System.Web.UI.WebControls.SelectedDatesCollection class. A System.Collections.ArrayList that represents a collection of dates.

Count

ToString

[C#] public int Count {get;}

[C++] public: _property int get_Count( );

[VB] Public ReadOnly Property Count As Integer

[JScript] public function get Count( ): int;

Description

Gets the number of System.DateTime objects in the System.Web.UI.WebControls.SelectedDatesCollection.

Use this property to determine the number of dates in the System.Web.UI.WebControls.SelectedDatesCollection. The System.Web.UI.WebControls.SelectedDatesCollection.Count property is often used when iterating through the collection to determine the upper bound.

IsReadOnly

ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the System.Web.UI.WebControls.SelectedDatesCollection is read-only.

This property always returns false to indicate that the System.Web.UI.WebControls.SelectedDatesCollection can be written to in all cases.

IsSynchronized

ToString

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether access to the System.Web.UI.WebControls.SelectedDatesCollection is synchronized (thread-safe).

This property is derived from System.Collections.ICollection and is overridden to always return false.

Item

ToString

[C#] public DateTime this[int index] {get;}

[C++] public: _property DateTime get_Item(int index);

[VB] Public Default ReadOnly Property Item(ByVal index As Integer) As DateTime

[JScript] returnValue=SelectedDatesCollectionObject.Item (index);

Description

Gets a System.DateTime at the specified index in the System.Web.UI.WebControls.SelectedDatesCollection.

Use this indexer to get an individual System.DateTime in the System.Web.UI.WebControls.SelectedDatesCollection at the specified index using simple array notation. An ordinal index value that specifies which System.DateTime to return.

SyncRoot

ToString

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets the object that can be used to synchronize access to the System.Web.UI.WebControls.SelectedDatesCollection.

The object returned in this implementation is the System.Web.UI.WebControls.SelectedDatesCollection object itself.

Add

[C#] public void Add(DateTime date);

[C++] public: void Add(DateTime date);

[VB] Public Sub Add(ByVal date As DateTime)

[JScript] public function Add(date: DateTime);

Description

Appends the specified System.DateTime to the end of the System.Web.UI.WebControls.SelectedDatesCollection.

Use this method to add the specified System.DateTime to the end of the System.Web.UI.WebControls.SelectedDatesCollection. The System.DateTime to add to the collection.

Clear

[C#] public void Clear( );

[C++] public: void Clear( );

[VB] Public Sub Clear( )

[JScript] public function Clear( );

Description

Removes all System.DateTime controls from the collection.

Use this method to remove all System.DateTime objects from the System.Web.UI.WebControls.SelectedDatesCollection and set the System.Web.UI.WebControls.SelectedDatesCollection.Count property to 0.

Contains

[C#] public bool Contains(DateTime date);

[C++] public: bool Contains(DateTime date);

[VB] Public Function Contains(ByVal date As DateTime) As Boolean

[JScript] public function Contains(date: DateTime): Boolean;

Description

Returns a value indicating whether the System.Web.UI.WebControls.SelectedDatesCollection contains the specified System.DateTime object.

Return Value: true if the System.Web.UI.WebControls.SelectedDatesCollection contains the specified System.DateTime; otherwise, false.

Use this method to determine whether the System.Web.UI.WebControls.SelectedDatesCollection contains the specified System.DateTime. The System.DateTime object to search for in the System.Web.UI.WebControls.SelectedDatesCollection.

CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies the items from the System.Web.UI.WebControls.SelectedDatesCollection to the specified System.Array, starting with the specified index.

Use this method to copy the contents of the System.Web.UI.WebControls.SelectedDatesCollection into the specified System.Array, starting at the specified index. A zero-based System.Array that receives the copied items from the System.Web.UI.WebControls.SelectedDatesCollection. The first index in the specified System.Array to receive the items.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns a System.Collections.IEnumerator that contains all System.DateTime objects within the System.Web.UI.WebControls.SelectedDatesCollection.

Return Value: A System.Collections.IEnumerator that contains all System.DateTime objects within the System.Web.UI.WebControls.SelectedDatesCollection.

Use this method to create a System.Collections.IEnumerator that can be easily iterated through to get each item in the System.Web.UI.WebControls.SelectedDatesCollection.

Remove

[C#] public void Remove(DateTime date);

[C++] public: void Remove(DateTime date);

[VB] Public Sub Remove(ByVal date As DateTime)

[JScript] public function Remove(date: DateTime);

Description

Removes the specified System.DateTime object from the System.Web.UI.WebControls.SelectedDatesCollection.

Use this method to remove the specified System.DateTime from the System.Web.UI.WebControls.SelectedDatesCollection. The System.DateTime object to remove from the System.Web.UI.WebControls.SelectedDatesCollection.

SelectRange

[C#] public void SelectRange(DateTime fromDate, DateTime toDate);

[C++] public: void SelectRange(DateTime fromdate, DateTime toDate);

[VB] Public Sub SelectRange(ByVal fromDate As DateTime, ByVal toDate As DateTime)

[JScript] public function SelectRange(fromDate: DateTime, toDate: DateTime);

Description

Adds the specified range of dates to the System.Web.UI.WebControls.SelectedDatesCollection.

Use this method to add the specified range of dates to the System.Web.UI.WebControls.SelectedDatesCollection. A System.DateTime object that specifies the initial date to add to the System.Web.UI.WebControls.SelectedDatesCollection. A System.DateTime object that specifies the end date to add to the System.Web.UI.WebControls.SelectedDatesCollection.

ServerValidateEventArgs class (System.Web.UI.WebControls)

ToString

Description

Provides data for the System.Web.UI.WebControls.CustomValidator.ServerValidate event of the System.Web.UI.WebControls.CustomValidator control. This class cannot be inherited.

A System.Web.UI.WebControls.ServerValidateEventArgs object is passed to the System.Web.UI.WebControls.CustomValidator.ServerValidate event handler to provide event data to the handler. The System.Web.UI.WebControls.CustomValidator.ServerValidate event is raised when validation is performed on the server. This allows you to perform a custom server-side validation routine on the value of an input control (with a System.Web.UI.WebControls.CustomValidator control associated with it) in the event handler.

ServerValidateEventArgs

Example Syntax:

ToString

[C#] public ServerValidateEventArgs(string value, bool isvalid);

[C++] public: ServerValidateEventArgs(String* value, bool isvalid);

[VB] Public Sub New(ByVal value As String, ByVal isValid As Boolean)

[JScript] public function ServerValidateEventArgs(value: String, isValid: Boolean);

Description

Initializes a new instance of the System.Web.UI.WebControls.ServerValidateEventArgs class.

Use this constructor to create and initialize a new instance of the System.Web.UI.WebControls.ServerValidateEventArgs class. The value to validate. true to indicate that the value passes validation; otherwise, false.

IsValid

ToString

[C#] public bool IsValid {get; set;}

[C++] public: _property bool get_IsValid( );public: _property void set_IsValid(bool);

[VB] Public Property IsValid As Boolean

[JScript] public function get IsValid( ): Boolean;public function set IsValid(Boolean);

Description

Gets or sets whether the value specified by the System.Web.UI.WebControls.ServerValidateEventArgs.Value property passes validation.

Once your validation routine finishes, use the System.Web.UI.WebControls.ServerValidateEventArgs.IsValid property to indicate whether the value specified by the System.Web.UI.WebControls.ServerValidateEventArgs.Value property passes validation. This value determines whether input control associated with the System.Web.UI.WebControls.CustomValidator control passes validation.

Value

ToString

[C#] public string Value {get;}

[C++] public: _property String* get_Value( );

[VB] Public ReadOnly Property Value As String

[JScript] public function get Value( ): String;

Description

Gets the value to validate in the custom event handler for the System.Web.UI.WebControls.CustomValidator.ServerValidate event.

Use the System.Web.UI.WebControls.ServerValidateEventArgs.Value property determine the value to validate in the custom event handler for the System.Web.UI.WebControls.CustomValidator.ServerValidate event. Notice that you cannot programmatically change this value.

ServerValidateEventHandler delegate (System.Web.UI.WebControls)

ToString

Description

Represents the method that will handle the System.Web.UI.WebControls.CustomValidator.ServerValidate event of a System.Web.UI.WebControls.CustomValidator control. The source of the event. A System.Web.UI.WebControls.ServerValidateEventArgs that contains the event data.

Use this delegate to provide custom code that performs validation on the server. Your code needs to validate the System.Web.UI.WebControls.ServerValidateEventArgs.Value property of the args parameter passed to the delegate. Store the result of the validation in the System.Web.UI.WebControls.ServerValidateEventArgs.IsValid property of the args parameter.

Style class (System.Web.UI.WebControls)

ToString

Description

Represents attributes that define the style of a Web Forms control and provides methods to manage the style.

Style

Example Syntax:

ToString

[C#] public Style( );

[C++] public: Style( );

[VB] Public Sub New( )

[JScript] public function Style( ); Initializes a new instance of the System.Web.UI.WebControls.Style class without a specified state bag.

Description

Initializes a new instance of the System.Web.UI.WebControls.Style class.

Style

Example Syntax:

ToString

[C#] public Style(StateBag bag);

[C++] public: Style(StateBag* bag);

[VB] Public Sub New(ByVal bag As StateBag)

[JScript] public function Style(bag: StateBag);

Description

Initializes a new instance of the System.Web.UI.WebControls.Style class with the specified state bag information. Contains the specified state bag information.

BackColor

ToString

[C#] public Color BackColor {get; set;}

[C++] public: _property Color get_BackColor( );public: _property void set_BackColor(Color);

[VB] Public Property BackColor As Color

[JScript] public function get BackColor( ): Color;public function set BackColor(Color);

Description

Gets or sets the background color property of the System.Web.UI.WebControls.Style class.

BorderColor

ToString

[C#] public Color BorderColor {get; set;}

[C++] public: _property Color get_BorderColor( );public: _property void set_BorderColor(Color);

[VB] Public Property BorderColor As Color

[JScript] public function get BorderColor( ): Color;public function set BorderColor(Color);

Description

Gets or sets the border color property of the System.Web.UI.WebControls.Style class.

BorderStyle

ToString

[C#] public BorderStyle BorderStyle {get; set;}

[C++] public: _property BorderStyle get_BorderStyle( );public: _property void set_BorderStyle(BorderStyle);

[VB] Public Property BorderStyle As BorderStyle

[JScript] public function get BorderStyle( ): BorderStyle; public function set BorderStyle(BorderStyle);

Description

Gets or sets the border style property of the System.Web.UI.WebControls.Style class.

BorderWidth

ToString

[C#] public Unit BorderWidth {get; set;}

[C++] public: _property Unit get_BorderWidth( );public: _property void set_BorderWidth(Unit);

[VB] Public Property BorderWidth As Unit

[JScript] public function get BorderWidth( ): Unit;public function set BorderWidth(Unit);

Description

Gets or sets the border width property of the System.Web.UI.WebControls.Style class.

Container

CssClass

ToString

Description

Gets or sets the CSS class property of the System.Web.UI.WebControls.Style class.

DesignMode

Events

Font

ToString

Description

Gets a System.Web.UI.WebControls.FontInfo object that contains the font properties for the System.Web.UI.WebControls.Style class.

ForeColor

ToString

[C#] public Color ForeColor {get; set;}

[C++] public: _property Color get_ForeColor( );public: _property void set_ForeColor(Color);

[VB] Public Property ForeColor As Color

[JScript] public function get ForeColor( ): Color;public function set ForeColor(Color);

Description

Gets or sets the foreground color (typically the color of the text) property of the System.Web.UI.WebControls.Style class.

Height

ToString

[C#] public Unit Height {get; set;}

[C++] public: _property Unit get_Height( );public: _property void set_Height(Unit);

[VB] Public Property Height As Unit

[JScript] public function get Height( ): Unit;public function set Height(Unit);

Description

Gets or sets the height property of the System.Web.UI.WebControls.Style class.

IsEmpty

ToString

[C#] protected internal virtual bool IsEmpty {get;}

[C++] internal: _property virtual bool get_IsEmpty( );

[VB] Overridable Protected Friend ReadOnly Property IsEmpty As Boolean

[JScript] package function get IsEmpty( ): Boolean;

Description

A protected property. Gets a value indicating whether any style elements have been defined in the state bag.

IsTrackingViewState

ToString

[C#] protected bool IsTrackingViewState {get;}

[C++] protected: _property bool get_IsTrackingViewState( );

[VB] Protected ReadOnly Property IsTrackingViewState As Boolean

[JScript] protected function get IsTrackingViewState( ): Boolean;

Description

A protected method. Returns a value indicating whether any style elements have been defined in the state bag.

Return Value: true if there are style elements defined in the state bag; otherwise, false.

Site

ViewState

ToString

Description

Gets the state bag that holds the style elements.

The private field name for the state bag is case sensitive.

Width

ToString

[C#] public Unit Width {get; set;}

[C++] public: _property Unit get_Width( );public: _property void set_Width(Unit);

[VB] Public Property Width As Unit

[JScript] public function get Widtho: Unit;public function set Width(Unit);

Description

Gets or sets the width property of the System.Web.UI.WebControls.Style class.

AddAttributesToRender

[C#] public void AddAttributesToRender(HtmlTextWriter writer);

[C++] public: void AddAttributes ToRender(HtmlTextWriter* writer);

[VB] Public Sub AddAttributesToRender(ByVal writer As HtmlTextWriter)

[JScript] public function AddAttributesToRender(writer: HtmlTextWriter);

Description

Adds all non-blank style attributes to the HTML output stream to be rendered to the client. The output stream that renders HTML content to the client.

AddAttributesToRender

[C#] public virtual void AddAttributesToRender(HtmlTextWriter writer, WebControl owner);

[C++] public: virtual void AddAttributesToRender(HtmlTextWriter* writer, WebControl* owner);

[VB] Overridable Public Sub AddAttributesToRender(ByVal writer As HtmlTextWriter, ByVal owner As WebControl)

[JScript] public function AddAttributesToRender(writer: HtmlTextWriter, owner : WebControl);

Description

Adds all non-blank style attributes to the HTML output stream to be rendered to the client.

CopyFrom

[C#] public virtual void CopyFrom(Style s);

[C++] public: virtual void CopyFrom(Style* s);

[VB] Overridable Public Sub CopyFrom(ByVal s As Style)

[JScript] public function CopyFrom(s: Style);

Description

Copies non-blank elements from the specified style, overwriting existing style elements if necessary. The style to be copied.

LoadViewState

[C#] protected internal void LoadViewState(object state);

[C++] protected public: void LoadViewState(Object* state);

[VB] Protected Friend Dim Sub LoadViewState(ByVal state As Object)

[JScript] package function LoadViewState(state: Object);

Description

A protected method. Load the previously saved state. The previously saved state.

MergeWith

[C#] public virtual void MergeWith(Style s);

[C++] public: virtual void MergeWith(Style* s);

[VB] Overridable Public Sub MergeWith(ByVal s As Style)

[JScript] public function MergeWith(s: Style);

Description

Copies non-blank elements from the specified style, but will not overwrite any existing style elements. The style to be copied.

Reset

[C#] public virtual void Reset( );

[C++] public: virtual void Reset( );

[VB] Overridable Public Sub Reset( )

[JScript] public function Reset( );

Description

Clears out any defined style elements from the state bag.

SaveViewState

[C#] protected internal virtual object SaveViewState( );

[C++] protected public: virtual Object* SaveViewState( );

[VB] Overridable Protected Friend Dim Function SaveViewState( ) As Object

[JScript] package function SaveViewState( ): Object;

Description

A protected method. Saves any state that has been modified after the System.Web.UI.WebControls.Style. TrackViewState method was invoked.

Return Value: An object that represents the saved state. The default is null.

SetBit

[C#] protected internal virtual void SetBit(int bit);

[C++] protected public: virtual void SetBit(int bit);

[VB] Overridable Protected Friend Dim Sub SetBit(ByVal bit As Integer)

[JScript] package function SetBit(bit: int);

Description

A protected internal method.

IStateManager.LoadViewState

[C#] void IStateManager.LoadViewState(object state);

[C++] void IStateManager::LoadViewState(Object* state);

[VB] Sub LoadViewState(ByVal state As Object) Implements IStateManager.LoadViewState

[JScript] function IStateManager.LoadViewState(state: Object);

IStateManager.SaveViewState

[C#] object IStateManager.:SaveViewState( );

[C++] Object* IStateManager::SaveViewState( );

[VB] Function SaveViewState( ) As Object Implements IStateManager.SaveViewState

[JScript] function IStateManager.SaveViewState( ): Object;

IStateManager.TrackViewState

[C#] void IStateManager.TrackViewState( );

[C++] void IStateManager::TrackViewState( );

[VB] Sub TrackViewState( ) Implements IStateManager. TrackViewState

[JScript] function IStateManager.TrackViewState( );

ToString

[C#] public override string ToString( );

[C++] public: String* ToString( );

[VB] Overrides Public Function ToString( ) As String

[JScript] public override function ToString( ): String;

Description

Overrides the ToString method to return System. String.Empty.

Return Value: System.String.Empty for all cases.

TrackViewState

[C#] protected internal virtual void TrackViewState( );

[C++] protected public: virtual void TrackViewState( );

[VB] Overridable Protected Friend Dim Sub TrackViewState( )

[JScript] package function TrackViewState( );

Description

A protected method. Marks the beginning for tracking state changes on the control. Any changes made after "mark" will be tracked and saved as part of the control viewstate.

Table class (System.Web.UI.WebControls)

TrackViewState

Description

Constructs a table and defines its properties.

The System.Web.UI.WebControls.Table class allows you to build an HTML table and specify its characteristics in a straightforward manner, using the same abstract object model for building any other Web controls. A table can be built at design time given some static contents, but the power of a System.Web.UI.WebControls.Table Web control is often realized when the table is built programmatically with dynamic contents. In addition, as for other Web controls, the same code to render a table yields appropriate output accordingly for both downleveling and upleveling browsers.

Table

Example Syntax:

TrackViewState

[C#] public Table( );

[C++] public: Table( );

[VB] Public Sub New( )

[JScript] public function Table( );

Description

Initializes a new instance of the System.Web.UI.WebControls.Table class.

AccessKey

Attributes

BackColor

BackImageUrl

TrackViewState

Description

Indicates the URL of the background image to display behind the table. The image will be tiled if it is smaller than the table.

BorderColor

BorderStyle

BorderWidth

CellPadding

TrackViewState

Description

Gets or sets the distance (in pixels) between the border and the contents of the table cell.

CellSpacing

TrackViewState

[C#] public virtual int CellSpacing {get; set;}

[C++] public: _property virtual int get_CellSpacing( ); public: _property virtual void set_CellSpacing(int);

[VB] Overridable Public Property CellSpacing As Integer

[JScript] public function get CellSpacing( ): int;public function set CellSpacing(int);

Description

Gets or sets the distance (in pixels) between table cells.

ChildControlsCreated

ClientID

Context

Controls

ControlStyle

ControlStyleCreated

CssClass

Enabled

EnableViewState

Events

Font

ForeColor

GridLines

TrackViewState

Description

Gets or sets the gridlines property of the System.Web.UI.WebControls.Table class.

HasChildViewState

Height

HorizontalAlign

TrackViewState

Description

Gets or sets the horizontal alignment of the table within the page.

ID

IsTrackingViewState

NamingContainer

Page

Parent

Rows

TrackViewState

Description

Gets the collection of rows within the table.

This property is only used when building tables programmatically. At design time, the property is set by declaring TableRow Web controls.

Site

Style

TabIndex

TagKey

TagName

TemplateSourceDirectory

ToolTip

UniqueID

ViewState

ViewStateIgnoresCase

Visible

Width

AddAttributesToRender

[C#] protected override void AddAttributesToRender(HtmlTextWriter writer);

[C++] protected: void AddAttributesToRender(HtmlTextWriter* writer);

[VB] Overrides Protected Sub AddAttributesToRender(ByVal writer As HtmlTextWriter)

[JScript] protected override function AddAttributesToRender (writer HtmlTextWriter);

Description

A protected method. Adds information about the border color and border width HTML attributes to the list of attributes to render. The output stream that renders HTML content to the client.

CreateControlCollection

[C#] protected override ControlCollection CreateControlCollection( );

[C++] protected: ControlCollection* CreateControlCollection( );

[VB] Overrides Protected Function CreateControlCollection( ) As ControlCollection

[JScript] protected override function CreateControlCollection( ) ControlCollection;

Description

CreateControlStyle

[C#] protected override Style CreateControlStyle( );

[C++] protected: Style* CreateControlStyle( );

[VB] Overrides Protected Function CreateControlStyle( ) As Style

[JScript] protected override function CreateControlStyle( ): Style;

Description

A protected method. Creates a table control style.

Return Value: A System.Web.UI.WebControls.Style that specifies the table control style.

RenderContents

[C#] protected override void RenderContents(HtmlTextWriter writer);

[C++] protected: void RenderContents (HtmlTextWriter* writer);

[VB] Overrides Protected Sub RenderContents(ByVal writer As HtmlTextWriter)

[JScript] protected override function RenderContents(writer: HtmlTextWriter);

Description

A protected method. The output stream that renders HTML content to the client.

TableCell class (System.Web.UI.WebControls)

TrackViewState

Description

Represents a cell in a System.Web.UI.WebControls.Table control.

The System.Web.UI.WebControls.TableCell class represents a cell in a System.Web.UI.WebControls.Table control. You can use the System.Web.UI.WebControls.TableCell.Text property to specify or determine the contents of the cell.

TableCell

Example Syntax:

TrackViewState

[C#] public TableCell( );

[C++] public: TableCell( );

[VB] Public Sub New( )

[JScript] public function TableCell( );

Description

Initializes a new instance of the System.Web.UI.WebControls.TableCell class.

Use this constructor to create and initialize a new instance of the System.Web.UI.WebControls.TableCell class.

AccessKey

Attributes

BackColor

BorderColor

BorderStyle

BorderWidth

ChildControlsCreated

ClientID

ColumnSpan

TrackViewState

Description

Gets or sets the number of columns in the System.Web.UI.WebControls.Table control that the cell spans.

Use the System.Web.UI.WebControls.TableCell.ColumnSpan property to specify or determine the number of columns in the rendered table that the cell spans. For example, if you set this property to 2 , the cell takes up two columns in the System.Web.UI.WebControls.Table control.

Context

Controls

ControlStyle

ControlStyleCreated

CssClass

Enabled

EnableViewState

Events

Font

ForeColor

HasChildViewState

Height

HorizontalAlign

TrackViewState

Description

Gets or sets the horizontal alignment of the contents in the cell.

Use the System.Web.UI.WebControls.TableCell.HorizontalAlign property to specify the horizontal alignment of the contents of the cell. The following table lists the possible values.

ID

IsTrackingViewState

NamingContainer

Page

Parent

RowSpan

TrackViewState

Description

Gets or sets the number of rows in the System.Web.UI.WebControls.Table control that the cell spans.

Use the System.Web.UI.WebControls.TableCell.RowSpan property to specify or determine the number of rows in the rendered table that the cell spans. For example, if you set this property to 2 , the cell takes up two rows in the System.Web.UI.WebControls.Table control.

Site

Style

TabIndex

TagKey

TagName

TemplateSourceDirectory

Text

TrackViewState

Description

Gets or sets the text contents of the cell.

Use the System.Web.UI.WebControls.TableCell.Text property to specify or determine the text contents of the cell. This property is commonly used to programmatically update the contents of a cell.

ToolTip

UniqueID

VerticalAlign

TrackViewState

Description

Gets or sets the vertical alignment of the contents in the cell.

Use the System.Web.UI.WebControls.TableCell.VerticalAlign property to specify the vertical alignment of the contents of the cell. The following table lists the possible values.

ViewState

ViewStateIgnoresCase

Visible

Width

Wrap
TrackViewState

Description

Gets or sets a value that indicates whether the content of the cell wrap in the cell.

Use the System.Web.UI.WebControls.TableCell.Wrap property to specify or determine whether the content of the cell wrap in the cell.

AddAttributesToRender

[C#] protected override void AddAttributesToRender(HtmlTextWriter writer);

[C++] protected: void AddAttributes ToRender(HtmlTextWriter* writer);

[VB] Overrides Protected Sub AddAttributesToRender(ByVal writer As HtmlTextWriter)

[JScript] protected override function AddAttributesToRender (writer: HtmlTextWriter);

Description

A protected method. Adds information about the column span and row span to the list of attributes to render. The output stream that renders HTML content to the client.

AddParsedSubObject

[C#] protected override void AddParsedSubObject(object obj);

[C++] protected: void AddParsedSubObject(Object* obj);

[VB] Overrides Protected Sub AddParsedSubObject(ByVal obj As Object)

[JScript] protected override function AddParsedSubObject (obj: Object);

CreateControlStyle

[C#] protected override Style CreateControlStyle( );

[C++] protected: Style* CreateControlStyle( );

[VB] Overrides Protected Function CreateControlStyle( ) As Style

[JScript] protected override function CreateControlStyle( ): Style;

Description

A protected method. Creates a table item control style.

Return Value: A System.Web.UI.WebControls.Style that specifies the table item control style.

RenderContents

[C#] protected override void RenderContents(HtmlTextWriter writer);

[C++] protected: void RenderContents (HtmlTextWriter* writer);

[VB] Overrides Protected Sub RenderContents(ByVal writer As HtmlTextWriter)

[JScript] protected override function RenderContents(writer: HtmlTextWriter);

Description

A protected method. The output stream that renders HTML content to the client.

TableCellCollection class (System.Web.UI.WebControls)
TrackViewState

Description

Encapsulates a collection of System.Web.UI.WebControls.TableHeaderCell and System.Web.UI.WebControls.TableCell objects that make up a row in a System.Web.UI.WebControls.Table control. This class cannot be inherited.

Use this class to programmatically manage a collection of System.Web.UI.WebControls.TableCell objects that make up a row in a System.Web.UI.WebControls.Table control. This class is commonly used to add or remove cells from a row in a System.Web.UI.WebControls.Table control.

Count
TrackViewState

[C#] public int Count {get;}

[C++] public: _property int get_Count( );

[VB] Public ReadOnly Property Count As Integer

[JScript] public function get Count( ): int;

Description

Gets the number of System.Web.UI.WebControls.TableCell objects in the System.Web.UI.WebControls.TableCellCollection.

Use this property to determine the number of cells in the System.Web.UI.WebControls.TableCellCollection. The System.Web.UI.WebControls.TableCellCollection.Count property is often used when iterating through the collection to determine the upper bound.

IsReadOnly
TrackViewState

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the System.Web.UI.WebControls.TableCellCollection is read-only.

This property always returns false to indicate that the System.Web.UI.WebControls.TableCellCollection can be written to in all cases.

IsSynchronized
TrackViewState

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether access to the System.Web.UI.WebControls.TableCellCollection is synchronized (thread-safe).

This property is derived from System.Collections.ICollection and is overridden to always return false.

Item
TrackViewState

[C#] public TableCell this[int index] {get;}

[C++] public: _property TableCell* get_Item(int index);

[VB] Public Default ReadOnly Property Item(ByVal index As Integer) As TableCell

[JScript] returnValue=TableCellCollectionObject.Item(index);

Description

Gets a System.Web.UI.WebControls.TableCell from the System.Web.UI.WebControls.TableCellCollection at the specified index.

Use this indexer to get an individual System.Web.UI.WebControls.TableCell in the System.Web.UI.WebControls.TableCellCollection at the specified index using simple array notation. An ordinal index value that specifies the System.Web.UI.WebControls.TableCell to return.

SyncRoot
TrackViewState

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets the object that can be used to synchronize access to the System.Web.UI.WebControls.TableCellCollection.

The object returned in this implementation is the System.Web.UI.WebControls.TableCellCollection object.

Add

[C#] public int Add(TableCell cell);

[C++] public: mnt Add(TableCell* cell);

[VB] Public Function Add(ByVal cell As TableCell) As Integer

[JScript] public function Add(cell: TableCell): int;

Description

Appends the specified System.Web.UI.WebControls.TableCell to the end of the System.Web.UI.WebControls.TableCellCollection.

Use this method to add the specified System.Web.UI.WebControls.TableCell to the end of a System.Web.UI.WebControls.TableCellCollection. The System.Web.UI.WebControls.TableCell to add to the collection.

AddAt

[C#] public void AddAt(int index, TableCell cell);

[C++] public: void AddAt(int index, TableCell* cell);

[VB] Public Sub AddAt(ByVal index As Integer, ByVal cell As TableCell)

[JScript] public function AddAt(index: int, cell: TableCell);

Description

Adds the specified System.Web.UI.WebControls.TableCell to the System.Web.UI.WebControls.TableCellCollection at the specified index location.

Use this method to insert the specified System.Web.UI.WebControls.TableCell in a System.Web.UI.WebControls.TableCellCollection at the specified index. The location in the System.Web.UI.WebControls.TableCellCollection at which to add the System.Web.UI.WebControls.TableCell. The System.Web.UI.WebControls.TableCell to add to the System.Web.UI.WebControls.TableCellCollection.

AddRange

[C#] public void AddRange(TableCell[ ] cells);

[C++] public: void AddRange(TableCell* cells[ ]);

[VB] Public Sub AddRange(ByVal cells( ) As TableCell)

[JScript] public function AddRange(cells: TableCell[ ]);

Description

Clear

[C#] public void Clear( );

[C++] public: _sealed void Clear( );

[VB] NotOverridable Public Sub Clear( )

[JScript] public function Clear( ); Removes all System.Web.UI.WebControls.TableCell objects from the System.Web.UI.WebControls.TableCellCollection.

Description

Removes all System.Web.UI.WebControls.TableCell objects from the System.Web.UI.WebControls.TableCellCollection.

Use this method to remove all System.Web.UI.WebControls.TableCell objects from the System.Web.UI.WebControls.TableCellCollection and set the System.Web.UI.WebControls.TableCellCollection.Count property to 0.

CopyTo

[C#] public void CopyTo( Array array, mnt index);

[C++] public: _sealed void CopyTo(Array* array, mnt index);

[VB] NotOverridable Public Sub CopyTo(ByVal array As Array, ByVal index As Integer)

[JScript] public function CopyTo(array: Array, index: int);

Description

Copies the items from the System.Web.UI.WebControls.TableCellCollection to the specified System.Array, starting with the specified index in the System.Array.

Use this method to copy the contents of the System.Web.UI.WebControls.TableCellCollection into the specified System.Array starting at the specified index. A zero-based System.Array that receives the copied items from the System.Web.UI.WebControls.TableCellCollection. The first index in the specified System.Array to receive the items.

GetCellIndex

[C#] public int GetCellIndex(TableCell cell);

[C++] public: int GetCellIndex(TableCell* cell);

[VB] Public Function GetCellIndex(ByVal cell As TableCell) As Integer

[JScript] public function GetCellIndex(cell: TableCell): int;

Description

Returns a value that represents the index of the specified System.Web.UI.WebControls.TableCell from the System.Web.UI.WebControls.TableCellCollection.

Return Value: The index of the specified System.Web.UI.WebControls.TableCell within the System.Web.UI.WebControls.TableCellCollection. The default is −1, which indicates that a match has not been found.

Use this method to determine the index of the specified System.Web.UI.WebControls.TableCell in the System.Web.UI.WebControls.TableCellCollection. If the specified System.Web.UI.WebControls.TableCell is not found, an index of −1 is returned. The System.Web.UI.WebControls.TableCell to get the index of in the System.Web.UI.WebControls.TableCellCollection.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns a System.Collections.IEnumerator that contains all System.Web.UI.WebControls.TableCell objects in the System.Web.UI.WebControls.TableCellCollection.

Return Value: A System.Collections.IEnumerator that contains all System.Web.UI.WebControls.TableCell objects within the System.Web.UI.WebControls.TableCellCollection.

Use this method to create a System.Collections.IEnumerator that can be iterated through easily to get each item in the System.Web.UI.WebControls.TableCellCollection.

Remove

[C#] public void Remove(TableCell cell);

[C++] public: void Remove(TableCell* cell);

[VB] Public Sub Remove(ByVal cell As TableCell)

[JScript] public function Remove(cell: TableCell);

Description

Removes the specified System.Web.UI.WebControls.TableCell from the System.Web.UI.WebControls.TableCellCollection.

Use this method to remove the specified System.Web.UI.WebControls.TableCell from a System.Web.UI.WebControls.TableCellCollection. The System.Web.UI.WebControls.TableCell to remove from the System.Web.UI.WebControls.TableCellCollection.

RemoveAt

[C#] public void RemoveAt(int index);

[C++] public: _sealed void RemoveAt(int index);

[VB] NotOverridable Public Sub RemoveAt(ByVal index As Integer)

[JScript] public function RemoveAt(index: int);

Description

Removes a System.Web.UI.WebControls.TableCell from the System.Web.UI.WebControls.TableCellCollection at the specified index.

Use this method to remove a System.Web.UI.WebControls.TableCell from a System.Web.UI.WebControls.TableCellCollection at the specified index. The index of the System.Web.UI.WebControls.TableCell to remove from the System.Web.UI.WebControls.TableCellCollection.

IList.Add

[C#] int IList.Add(object o);

[C++] int IList::Add(Object* o);

[VB] Function Add(ByVal o As Object) As Integer Implements IList.Add

[JScript] function IList.Add(o: Object): int;

IList.Contains

[C#] bool IList.Contains(object o);

[C++] bool IList::Contains(Object* o);

[VB] Function Contains(ByVal o As Object) As Boolean Implements IList.Contains

[JScript] function IList.Contains(o: Object): Boolean;

IList.IndexOf

[C#] int IList.IndexOf(object o);

[C++] int IList::IndexOf(Object* o);

[VB] Function IndexOf(ByVal o As Object) As Integer Implements IList.IndexOf

[JScript] function IList.IndexOf(o: Object): int;

IList.Insert

[C#] void IList.Insert(int index, object o);

[C++] void IList::Insert(int index, Object* o);

[VB] Sub Insert(ByVal index As Integer, ByVal o As Object) Implements IList.Insert

[JScript] function IList.Insert(index: int, o: Object);

IList.Remove

[C#] void IList.Remove(object o);

[C++] void IList::Remnove(Object* o);

[VB] Sub Remove(ByVal o As Object) Implements IList.Remove

[JScript] function IList.Remove(o: Object);

TableCellControlBuilder class (System.Web.UI.WebControls)

ToString

Description

Interacts with the parser to build a System.Web.UI.WebControls.TableCell control.

To create a custom control builder for a System.Web.UI.WebControls.TableCell derived control, you need to inherit from this class.

TableCellControlBuilder

Example Syntax:

ToString

[C#] public TableCellControlBuilder( );

[C++] public: TableCellControlBuilder( );

[VB] Public Sub New( )

[JScript] public function TableCellControlBuilder( );

ControlType

FChildrenAsProperties

FIsNonParserAccessor

HasAspCode

ID

InDesigner

NamingContainerType

Parser

TagName

AllowWhitespaceLiterals

[C#] public override bool AllowWhitespaceLiterals( );

[C++] public: bool AllowWhitespaceLiterals( );

[VB] Overrides Public Function AllowWhitespaceLiterals( ) As Boolean

[JScript] public override function AllowWhitespace Literals( ): Boolean;

Description

Specifies whether white space literals are allowed.

Return Value: false for all cases.

This method overrides System.Web.UI.ControlBuilder.AllowWhitespaceLiterals to ignore white space in the System.Web.UI.WebControls.TableCell control.

TableHeaderCell class (System.Web.UI.WebControls)

ToString

Description

Represents a heading cell within a System.Web.UI.WebControls.Table control.

The System.Web.UI.WebControls.TableHeaderCell class represents a heading cell in a System.Web.UI.WebControls.Table control. You can use the System.Web.UI.WebControls.TableCell.Text property to specify or determine the contents of the heading cell.

TableHeaderCell

Example Syntax:

ToString

[C#] public TableHeaderCell( );

[C++] public: TableHeaderCell( );

[VB] Public Sub New( )

[JScript] public function TableHeaderCell( );

Description

Initializes a new instance of the System.Web.UI.WebControls.TableHeaderCell class.

Use this contructor to create and initialize a new instance of the System.Web.UI.WebControls.TableHeaderCell class.

AccessKey

Attributes

BackColor

BorderColor

BorderStyle

BorderWidth

ChildControlsCreated

ClientID

ColumnSpan

Context

Controls

ControlStyle

ControlStyleCreated

CssClass

Enabled

EnableViewState

Events

Font

ForeColor

HasChildViewState

Height

HorizontalAlign

ID

IsTrackingViewState

NamingContainer

Page

Parent

RowSpan

Site
Style
TabIndex
TagKey
TagName
TemplateSourceDirectory
Text
ToolTip
UniqueID
VerticalAlign
ViewState
ViewStateIgnoresCase
Visible
Width
Wrap
TableItemStyle class (System.Web.UI.WebControls)
TrackViewState Description Specifies the style for an item in a table control.

The System.Web.UI.WebControls.TableItemStyle class represents the style properties for an item in the System.Web.UI.WebControls.Table control. You can control the a Specifies the style of the table item.

TableItemStyle
Example Syntax:
TrackViewState

[C#] public TableItemStyle( );
[C++] public: TableItemStyle( );
[VB] Public Sub New( )
[JScript] public function TableItemStyle( ); Creates a new instance of the System.Web.UI.WebControls.TableItemStyle class.

Description

Creates a new instance of the System.Web.UI.WebControls.TableItemStyle class.

TableItemStyle
Example Syntax:
TrackViewState

[C#] public TableItemStyle(StateBag bag);
[C++] public: TableItemStyle(StateBag* bag);
[VB] Public Sub New(ByVal bag As StateBag)
[JScript] public function TableItemStyle(bag: StateBag);

Description

Creates a new instance of the System.Web.UI.WebControls.TableItemStyle class with the specified state bag. The specified state bag.

BackColor
BorderColor
BorderStyle
BorderWidth
Container
CssClass
DesignMode
Events
Font
ForeColor
Height
HorizontalAlign
TrackViewState Description Gets or sets the horizontal alignment of the cell content.

IsEmpty
IsTrackingViewState
Site
VerticalAlign
TrackViewState

Description

Gets or sets the vertical alignment of the cell content.

ViewState
Width
Wrap
TrackViewState

Description

Gets or sets a value indicating whether the cell content wraps within the cell.

AddAttributesToRender

[C#] public override void AddAttributesToRender(HtmlTextWriter writer, WebControl owner);
[C++] public: void AddAttributesToRender(HtmlTextWriter* writer, WebControl* owner);
[VB] Overrides Public Sub AddAttributesToRender(ByVal writer As HtmlTextWriter, ByVal owner As WebControl)
[JScript] public override function AddAttributesToRender (writer: HtmlTextWriter, owner: WebControl);

Description

Adds information about horizontal alignment, vertical alignment, and wrap to the list of attributes to render. The output stream that renders HTML content to the client. The control that the style refers to.

CopyFrom

[C#] public override void CopyFrom(Style s);
[C++] public: void CopyFrom(Style* s);
[VB] Overrides Public Sub CopyFrom(ByVal s As Style)
[JScript] public override function CopyFrom(s: Style);

Description

Copies non-blank elements from the specified style, overwriting existing style elements if necessary. The style to copy.

MergeWith

[C#] public override void MergeWith(Style s);
[C++] public: void MergeWith(Style* s);
[VB] Overrides Public Sub MergeWith(ByVal s As Style)
[JScript] public override function MergeWith(s: Style);

Description

Copies non-blank elements from the specified style, but will not overwrite any existing style elements. The style to copy.

Reset

[C#] public override void Reset( );
[C++] public: void Reset( );
[VB] Overrides Public Sub Reset( )
[JScript] public override function Reset( );

Description

Clears out any defined style elements from the state bag.

TableRow class (System.Web.UI.WebControls)
TrackViewState

Description

Represents a row in a System.Web.UI.WebControls.Table control.

The System.Web.UI.WebControls.TableRow class represents a row in a System.Web.UI.WebControls.Table control.

TableRow
Example Syntax:
TrackViewState

[C#] public TableRow( );
[C++] public: TableRow( );
[VB] Public Sub New( )
[JScript] public function TableRow( );

Description

Initializes a new instance of the System.Web.UI.WebControls.TableRow class.

Use this constructor to create and initialize a new instance of the System.Web.UI.WebControls.TableRow class.

AccessKey

Attributes

BackColor

BorderColor

BorderStyle

BorderWidth

Cells

TrackViewState

Description

Gets a collection of System.Web.UI.WebControls.TableCell objects that represent the cells of a row in a System.Web.UI.WebControls.Table control.

Use this property to programmatically control a collection of System.Web.UI.WebControls.TableCell objects that represent the cells from a row of the System.Web.UI.WebControls.Table control. You can programmatically add, insert, or remove a System.Web.UI.WebControls.TableCell object from the collection.

ChildControlsCreated

ClientID

Context

Controls

ControlStyle

ControlStyleCreated

CssClass

Enabled

EnableViewState

Events

Font

ForeColor

HasChildViewState

Height

HorizontalAlign

TrackViewState

Description

Gets or sets the horizontal alignment of the contents in the row.

Use the System.Web.UI.WebControls.TableRow.HorizontatAlign property to specify the horizontal alignment of the contents of the row. The following table lists the possible values.

ID

IsTrackingViewState

NamingContainer

Page

Parent

Site

Style

TabIndex

TagKey

TagName

TemplateSourceDirectory

ToolTip

UniqueID

VerticalAlign

TrackViewState

Description

Gets or sets the vertical alignment of the contents in the row.

Use the System.Web.UI.WebControls.TableRow.VerticalAlign property to specify the vertical alignment of the contents of the row. The following table lists the possible values.

ViewState

ViewStateIgnoresCase

Visible

Width

CreateControlCollection

[C#] protected override ControlCollection CreateControlCollection( );

[C++] protected: ControlCollection* CreateControlCollection( );

[VB] Overrides Protected Function CreateControlCollection( ) As ControlCollection

[JScript] protected override function CreateControlCollection( ) ControlCollection;

Description

CreateControlStyle

[C#] protected override Style CreateControlStyle( );

[C++] protected: Style* CreateControlStyle( );

[VB] Overrides Protected Function CreateControlStyle( ) As Style

[JScript] protected override function CreateControlStyle( ): Style;

Description

A protected method. Creates a table item control style.

Return Value: A System.Web.UI.WebControls.Style that specifies the table item control style.

TableRowCollection class (System.Web.UI.WebControls)

TrackViewState

Description

Encapsulates a collection of System.Web.UI.WebControls.TableRow objects that represent a single row in a System.Web.UI.WebControls.Table control. This class cannot be inherited.

Use this class to programmatically manage a collection of System.Web.UI.WebControls.TableRow objects. This class is commonly used to add or remove rows from a System.Web.UI.WebControls.Table control.

Count

TrackViewState

[C#] public int Count {get;}

[C++] public: _property int get_Count( );

[VB] Public ReadOnly Property Count As Integer

[JScript] public function get Count( ): int;

Description

Gets the number of System.Web.UI.WebControls.TableRow objects in the System.Web.UI.WebControls.TableRowCollection.

Use this property to determine the number of rows in the System.Web.UI.WebControls.TableRowCollection. The System.Web.UI.WebControls.TableRowCollection.Count property is often used when iterating through the collection to determine the upper bound.

IsReadOnly

TrackViewState

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the System.Web.UI.WebControls.TableRowCollection is read-only.

This property always returns false to indicate that the System.Web.UI.WebControls.TableRowCollection can be written to in all cases.

IsSynchronized

TrackViewState

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether access to the System.Web.UI.WebControls.TableRowCollection is synchronized (thread-safe).

This property is derived from System.Collections.ICollection and is overridden to always return false Item TrackViewState

[C#] public TableRow this[int index] {get;}

[C++] public: _property TableRow* get_Item(int index);

[VB] Public Default ReadOnly Property Item(ByVal index As Integer) As TableRow

[JScript] returnValue=TableRowCollectionObject.Item(index);

Description

Gets a System.Web.UI.WebControls.TableRow from the System.Web.UI.WebControls.TableRowCollection at the specified index.

Use this indexer to get an individual System.Web.UI.WebControls.TableRow from the System.Web.UI.WebControls.TableRowCollection at the specified index using simple array notation. An ordinal index value that specifies which System.Web.UI.WebControls.TableRow to return.

SyncRoot

TrackViewState

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets the object that can be used to synchronize access to the System.Web.UI.WebControls.TableRowCollection.

The object returned in this implementation is the System.Web.UI.WebControls.TableRowCollection object itself.

Add

[C#] public int Add(TableRow row);

[C++] public: int Add(TableRow* row);

[VB] Public Function Add(ByVal row As TableRow) As Integer

[JScript] public function Add(row: TableRow): int;

Description

Appends the specified System.Web.UI.WebControls.TableRow to the end of the System.Web.UI.WebControls.TableRowCollection.

Use this method to add a System.Web.UI.WebControls.TableRow to the end of a System.Web.UI.WebControls.TableRowCollection. The System.Web.UI.WebControls.TableRow to add to the System.Web.UI.WebControls.TableRowCollection.

AddAt

[C#] public void AddAt(int index, TableRow row);

[C++] public: void AddAt(int index, TableRow* row);

[VB] Public Sub AddAt(ByVal index As Integer, ByVal row As TableRow)

[JScript] public function AddAt(index: int, row: TableRow);

Description

Adds the specified System.Web.UI.WebControls.TableRow to the System.Web.UI.WebControls.TableRowCollection at the specified index location.

Use this method to insert the specified System.Web.UI.WebControls.TableRow in a System.Web.UI.WebControls.TableRowCollection at the specified index. The location in the System.Web.UI.WebControls.TableRowCollection at which to add the System.Web.UI.WebControls.TableRow. The System.Web.UI.WebControls.TableRow to add to the System.Web.UI.WebControls.TableRowCollection.

AddRange

[C#] public void AddRange(TableRow[ ] rows);

[C++] public: void AddRange(TableRow* rows[ ]);

[VB] Public Sub AddRange(ByVal rows( ) As TableRow)

[JScript] public function AddRange(rows: TableRow[ ]);

Description

Clear

[C#] public void Clear( );

[C++] public: _sealed void Clear( );

[VB] NotOverridable Public Sub Clear( )

[JScript] public function Clear( );

Description

Removes all System.Web.UI.WebControls.TableRow controls from the System.Web.UI.WebControls.TableRowCollection.

Use this method to remove all System.Web.UI.WebControls.TableRow objects from the System.Web.UI.WebControls.TableRowCollection and set the System.Web.UI.WebControls.TableRowCollection.Count property to 0.

CopyTo

[C#] public void CopyTo( Array array, mnt index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies the items from the System.Web.UI.WebControls.TableRowCollection to the specified System.Array, starting with the specified index in the System.Array.

Use this method to copy the contents of the System.Web.UI.WebControls.TableRowCollection into the specified System.Array, starting at the specified index. A zero-based System.Array that receives the copied items from the System.Web.UI.WebControls.TableRowCollection. The first position in the specified System.Array to receive copied contents.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an System.Collections.IEnumerator that contains all System.Web.UI.WebControls.TableRow objects within the System.Web.UI.WebControls.TableRowCollection.

Return Value: A System.Collections.IEnumerator that contains all System.Web.UI.WebControls.TableRow objects within the System.Web.UI.WebControls.TableRowCollection.

Use this method to create a System.Collections.IEnumerator that can be iterated through easily to get each item in the System.Web.UI.WebControls.TableRowCollection.

GetRowIndex

[C#] public int GetRowIndex(TableRow row);

[C++] public: mnt GetRowIndex(TableRow* row);

[VB] Public Function GetRowIndex(ByVal row As TableRow) As Integer

[JScript] public function GetRowIndex(row: TableRow): int;

Description

Returns a value that represents the index of the specified System.Web.UI.WebControls.TableRow from the System.Web.UI.WebControls.TableRowCollection.

Return Value: The ordinal index position of the specified System.Web.UI.WebControls.TableRow within the collection. The default is −1, which indicates that the specified System.Web.UI.WebControls.TableRow has not been found.

Use this method to determine the index of the specified System.Web.UI.WebControls.TableRow in the System.Web.UI.WebControls.TableRowCollection. If the specified System.Web.UI.WebControls.TableRow is not found, an index of −1 is returned. The System.Web.UI.WebControls.TableRow to search for in the System.Web.UI.WebControls.TableRowCollection.

Remove

[C#] public void Remove(TableRow row);

[C++] public: void Remove(TableRow* row);

[VB] Public Sub Remove(ByVal row As TableRow)

[JScript] public function Remove(row: TableRow);

Description

Removes the specified System.Web.UI.WebControls.TableRow from the System.Web.UI.WebControls.TableRowCollection.

Use this method to remove the specified System.Web.UI.WebControls.TableRow from a System.Web.UI.WebControls.TableRowCollection. The System.Web.UI.WebControls.TableRow to remove from the System.Web.UI.WebControls.TableRowCollection.

RemoveAt

[C#] public void RemoveAt(int index);

[C++] public: _sealed void RemoveAt(int index);

[VB] NotOverridable Public Sub RemoveAt(ByVal index As Integer)

[JScript] public function RemoveAt(index: int);

Description

Removes a System.Web.UI.WebControls.TableRow from the System.Web.UI.WebControls.TableRowCollection at the specified index.

Use this method to remove a System.Web.UI.WebControls.TableRow from the System.Web.UI.WebControls.TableRowCollection at the specified index. The index of the System.Web.UI.WebControls.TableRow to remove from the System.Web.UI.WebControls.TableRowCollection.

IList.Add

[C#] int IList.Add(object o);

[C++] mnt IList::Add(Object* o);

[VB] Function Add(ByVal o As Object) As Integer Implements IList.Add

[JScript] function IList.Add(o: Object): int;

IList.Contains

[C#] bool IList.Contains(object o);

[C++] bool IList::Contains(Object* o);

[VB] Function Contains(ByVal o As Object) As Boolean Implements IList.Contains

[JScript] function IList.Contains(o: Object): Boolean;

IList.IndexOf

[C#] int IList.IndexOf(object o);

[C++] int IList::IndexOf(Object* o);

[VB] Function IndexOf(ByVal o As Object) As Integer Implements IList.IndexOf

[JScript] function IList.IndexOf(o: Object): int;

IList.Insert

[C#] void IList.Insert(int index, object o);

[C++] void IList::Insert(int index, Object* o);

[VB] Sub Insert(ByVal index As Integer, ByVal o As Object) Implements IList.Insert

[JScript] function IList.Insert(index: int, o: Object);

IList.Remove

[C#] void IList.Remove(object o);

[C++] void IList::Remove(Object* o);

[VB] Sub Remove(ByVal o As Object) Implements IList.Remove

[JScript] function IList.Remove(o: Object);

TableStyle class (System.Web.UI.WebControls)

ToString

Description

Specifies the style for a table control.

This is used primarily by control developers.

TableStyle

Example Syntax:

ToString

[C#] public TableStyle( );

[C++] public: TableStyle( );

[VB] Public Sub New( )

[JScript] public function TableStyle( ); Initializes a new instance of the System.Web.UI.WebControls.TableStyle class.

Description

Initializes a new instance of the System.Web.UI.WebControls.TableStyle class using default values.

TableStyle

Example Syntax:

ToString

[C#] public TableStyle(StateBag bag);

[C++] public: TableStyle(StateBag* bag);

[VB] Public Sub New(ByVal bag As StateBag)

[JScript] public function TableStyle(bag: StateBag);

Description

Initializes a new instance of the System.Web.UI.WebControls.TableStyle class with the specified state bag information.

BackColor

BackImageUrl

ToString

Description

Gets or sets the URL of an image to display in the background of a table control.

The image will be tiled if it is smaller than the table.

BorderColor

BorderStyle

BorderWidth

CellPadding

ToString

Description

Gets or sets the distance between the border and the contents of the table cell.

CellSpacing

ToString

[C#] public virtual int CellSpacing {get; set;}

[C++] public: _property virtual int get_CellSpacing( );
public: _property virtual void set_CellSpacing(int);

[VB] Overridable Public Property CellSpacing As Integer

[JScript] public function get CellSpacing( ): int;public function set CellSpacing(int);

Description

Gets or sets the distance between table cells.

Container

CssClass

DesignMode

Events

Font

ForeColor

GridLines

ToString

Description

Gets or sets the gridlines property of the table.

Height

HorizontalAlign

ToString

Description

Gets or sets the horizontal alignment of the table within the page.

IsEmpty

IsTrackingViewState

Site

ViewState

Width

AddAttributesToRender

[C#] public override void AddAttributesToRender(HtmlTextWriter writer, WebControl owner);

[C++] public: void AddAttributesToRender(HtmlTextWriter* writer, WebControl* owner);

[VB] Overrides Public Sub AddAttributesToRender(ByVal writer As HtmlTextWriter, ByVal owner As WebControl)

[JScript] public override function AddAttributesToRender (writer: HtmlTextWriter, owner: WebControl);

Description

Adds information about the background image, callspacing, cellpadding, gridlines, and alignment to the list of attributes to render. The output stream that renders HTML content to the client. The control associated with the style.

CopyFrom

[C#] public override void CopyFrom(Style s);

[C++] public: void CopyFrom(Style* s);

[VB] Overrides Public Sub CopyFrom(ByVal s As Style)

[JScript] public override function CopyFrom(s: Style);

Description

Copies non-blank elements from the specified style, overwriting existing style elements if necessary. The style to copy.

MergeWith

[C#] public override void MergeWith(Style s);

[C++] public: void MergeWith(Style* s);

[VB] Overrides Public Sub MergeWith(ByVal s As Style)

[JScript] public override function MergeWith(s: Style);

Description

Copies non-blank elements from the specified style, but will not overwrite any existing style elements. The style to copy.

Reset

[C#] public override void Reset( );

[C++] public: void Reset( );

[VB] Overrides Public Sub Reset( )

[JScript] public override function Reset( );

Description

Clears out any defined style elements from the state bag.

TargetConverter class (System.Web.UT.WebControls)

TrackViewState

Description

TargetConverter

Example Syntax:

TrackViewState

[C#] public TargetConverter( );

[C++] public: TargetConverter( );

[VB] Public Sub New( )

[JScript] public function TargetConverter( );

GetStandardValues

[C#] public override StandardValuesCollection GetStandardValues(ITypeDescriptorContext context);

[C++] public: StandardValuesCollection* GetStandardValues(ITypeDescriptorContext* context);

[VB] Overrides Public Function GetStandardValues(ByVal context As ITypeDescriptorContext) As StandardValuesCollection

[JScript] public override function GetStandardValues(context: ITypeDescriptorContext): StandardValuesCollection;

Description

GetStandardValuesExclusive

[C#] public override bool GetStandardValuesExclusive(ITypeDescriptorContext context);

[C++] public: bool GetStandardValuesExclusive(ITypeDescriptorContext* context);

[VB] Overrides Public Function GetStandardValuesExclusive(ByVal context As ITypeDescriptorContext) As Boolean

[JScript] public override function GetStandardValuesExclusive(context: ITypeDescriptorContext): Boolean;

Description

GetStandardValuesSupported

[C#] public override bool GetStandardValuesSupported(ITypeDescriptorContext context);

[C++] public: bool GetStandardValuesSupported(ITypeDescriptorContext* context);

[VB] Overrides Public Function GetStandardValuesSupported(ByVal context As ITypeDescriptorContext) As Boolean

[JScript] public override function GetStandardValuesSupported(context: ITypeDescriptorContext): Boolean;

Description

TemplateColumn class (System.Web.UI.WebControls)

ToString

Description

A column type for the System.Web.UI.WebControls.DataGrid control that allows you to customize the layout of controls in the column.

Use the System.Web.UI.WebControls.TemplateColumn column type in a System.Web.UI.WebControls.DataGrid control to create a column with a customized control layout.

TemplateColumn

Example Syntax:

ToString

[C#] public TemplateColumn( );

[C++] public: TemplateColumn( );

[VB] Public Sub New( )

[JScript] public function TemplateColumn( );

Description

Initializes a new instance of the System.Web.UI.WebControls.TemplateColumn class.

Use this constructor to create and initializes a new instance of the System.Web.UI.WebControls.TemplateColumn class.

DesignMode

EditItemTemplate

ToString

Description

Gets or sets the template for this column for the item selected for editing in the System.Web.UI.WebControls.DataGrid control.

Use the System.Web.UI.WebControls.TemplateColumn.EditItemTemplate property to control the contents of the item selected for editing in the column of the System.Web.UI.WebControls.DataGrid control.

FooterStyle

FooterTemplate

ToString

Description

Gets or sets the template for the tooter section of this column in the System.Web.UI.WebControls.DataGrid control.

Use the System.Web.UI.WebControls.DataList.FooterTemplate property to control the contents of the tooter section.

FooterText

HeaderImageUrl

HeaderStyle

HeaderTemplate

ToString

Description

Gets or sets the template for the heading section of this column in the System.Web.UI.WebControls.DataGrid control.

Use the System.Web.UI.WebControls.DataList.HeaderTemplate property to control the contents of the heading section. The appearance of the header section is controlled by the System.Web.UI.WebControls.DataList.HeaderStyle property.

HeaderText

IsTrackingViewState

ItemStyle

ItemTemplate

ToString

Description

Gets or sets the template for the items in this column of the System.Web.UI.WebControls.DataGrid control.

Use the System.Web.UI.WebControls.TemplateColumn.ItemTemplate property to control the contents of the items in the System.Web.UI.WebControls.DataList control.

Owner

SortExpression

ViewState

Visible

InitializeCell

[C#] public override void InitializeCell(TableCell cell, int columnIndex, ListItemType itemType);

[C++] public: void InitializeCell(TableCell* cell, int columnIndex, ListItemType itemType);

[VB] Overrides Public Sub InitializeCell(ByVal cell As TableCell, ByVal columnIndex As Integer, ByVal itemType As ListItemType)

[JScript] public override function InitializeCell(cell: TableCell, columnIndex: int, itemType: ListItemType);

Description

TextAlign enumeration (System.Web.UI.WebControls)

TrackViewState

Description

Specifies whether the text associated with a checkbox or radio button control appears to the left or to the right of the control.

The System.Web.UI.WebControls.TextAlign enumeration represents the different text alignment options for checkbox and radio button controls.

TrackViewState

[C#] public const TextAlign Left;

[C++] public: const TextAlign Left;

[VB] Public Const Left As TextAlign

[JScript] public var Left: TextAlign;

Description

Text associated with a checkbox or radio button control appears to the left of the control.

TrackViewState

[C#] public const TextAlign Right;

[C++] public: const TextAlign Right;

[VB] Public Const Right As TextAlign

[JScript] public var Right: TextAlign;

Description

Text associated with a checkbox or radio button control appears to the right of the control.

TextBox class (System.Web.UI.WebControls)

ToString

Description

Constructs a text box and defines its properties.

The System.Web.UI.WebControls.TextBox server control is an input control that lets the user enter text. By default, the System.Web.UI.WebControls.TextBox.TextMode of the text box is SingleLine, but it can be modified to be MultiLine or Password.

TextBox

Example Syntax:

ToString

[C#] public TextBox( );

[C++] public: TextBox( );

[VB] Public Sub New( )

[JScript] public function TextBox( );

Description

Initializes a new instance of the System.Web.UI.WebControls.TextBox class.

AccessKey

Attributes

AutoPostBack

ToString

Description

Gets or sets a value indicating whether an automatic postback to the server will occur whenever the user changes the content of the text box.

BackColor

BorderColor

BorderStyle

BorderWidth

ChildControlsCreated

ClientID

Columns

ToString

Description
Gets or sets the display width of the text box in characters.
Context
Controls
ControlStyle
ControlStyleCreated
CssClass
Enabled
EnableViewState
Events
Font
ForeColor
HasChildViewState
Height
ID
IsTrackingViewState
MaxLength
ToString Description
Gets or sets the maximum number of characters allowed in the text box.
This property is not applicable when the System.Web.UI.WebControls.TextBox.TextMode property is set to TextBoxMode.MultiLine.
NamingContainer
Page
Parent
ReadOnly
ToString Description
Whether the textbox is in read-only mode.
Rows
ToString
[C#] public virtual int Rows {get; set;}
[C++] public: _property virtual int get_Rows( );public: _property virtual void set_Rows(int);
[VB] Overridable Public Property Rows As Integer
[JScript] public function get Rows( ): int;public function set Rows(int);

Description
Gets or sets the display height of a multiline text box.
This property is only applicable when the System.Web.UI.WebControls.TextBox.TextMode property is set to TextBoxMode.MultiLine.
Site
Style
TabIndex
TagKey
ToString Description
A protected property. Gets the HTML tag for the text box control.
TagName
TemplateSourceDirectory
Text
ToString Description
Gets or sets the text content of the text box.
TextMode
ToString
[C#] public virtual TextBoxMode TextMode {get; set;}
[C++] public: _property virtual TextBoxMode get_TextMode( );public: _property virtual void set_TextMode (TextBoxMode);
[VB] Overridable Public Property TextMode As TextBoxMode
[JScript] public function get TextMode( ): TextBoxMode; public function set TextMode(TextBoxMode);

Description
Gets or sets the behavior mode of the text box.
ToolTip
UniqueID
ViewState
ViewStateIgnoresCase
Visible
Width
Wrap
ToString Description
Gets or sets a value indicating whether the text content wraps within the text box.
This property is only applicable when the System.Web.UI.WebControls.TextBox.TextMode property is set to TextBoxMode.MultiLine.
ToString Description
Occurs when the content of the text box is changed upon server postback.
AddAttributesToRender
[C#] protected override void AddAttributesToRender(HtmlTextWriter writer);
[C++] protected: void AddAttributes ToRender(HtmlTextWriter* writer);
[VB] Overrides Protected Sub AddAttributesToRender(ByVal writer As HtmlTextWriter)
[JScript] protected override function AddAttributesToRender (writer HtmlTextWriter);

Description
AddParsedSubObject
[C#] protected override void AddParsedSubObject(object obj);
[C++] protected: void AddParsedSubObject(Object* obj);
[VB] Overrides Protected Sub AddParsedSubObject(ByVal obj As Object)
[JScript] protected override function AddParsedSubObject (obj: Object);

Description
Overridden to only allow literal controls to be added as Text property.
OnPreRender
[C#] protected override void OnPreRender(EventArgs e);
[C++] protected: void OnPreRender(EventArgs* e);
[VB] Overrides Protected Sub OnPreRender(ByVal e As EventArgs)
[JScript] protected override function OnPreRender(e: EventArgs);

Description
OnTextChanged
[C#] protected virtual void OnTextChanged(EventArgs e);
[C++] protected: virtual void OnTextChanged(EventArgs* e);
[VB] Overridable Protected Sub OnTextChanged(ByVal e As EventArgs)
[JScript] protected function OnTextChanged(e: EventArgs);

Description
Raises the TextChanged event.
Render

[C#] protected override void Render(HtmlTextWriter writer);

[C++] protected: void Render(HtmlTextWriter* writer);

[VB] Overrides Protected Sub Render(ByVal writer As HtmlTextWriter)

[JScript] protected override function Render(writer: HtmlTextWriter);

Description

IPostBackDataHandler.LoadPostData

[C#] bool IPostBackDataHandler.LoadPostData(string postDataKey, NameValueCollection postCollection);

[C++] bool IPostBackDataHandler::LoadPostData(String* postDataKey, NameValueCollection* postCollection);

[VB] Function LoadPostData(ByVal postDataKey As String, ByVal postCollection As NameValueCollection) As Boolean Implements IPostBackDataHandler.LoadPostData

[JScript] function IPostBackDataHandler.LoadPostData (postDataKey: String, postCollection: NameValueCollection): Boolean;

IPostBackDataHandler.RaisePostDataChangedEvent

[C#] void IPostBackDataHandler.RaisePostDataChangedEvent( );

[C++] void IPostBackDataHandler::RaisePostDataChangedEvento);

[VB] Sub RaisePostDataChangedEvent( ) Implements IPostBackDataHandler.RaisePostDataChangedEvent

[JScript] function IPostBackDataHandler.RaisePostDataChangedEvent( );

TextBoxControlBuilder class (System.Web.UI.WebControls)

TrackViewState

Description

Interacts with the parser to build a System.Web.UI.WebControls.TextBox control.

To create a custom control builder for a System.Web.UI-.WebControls.TextBox derived control, you need to inherit from this class.

TextBoxControlBuilder

Example Syntax:

TrackViewState

[C#] public TextBoxControlBuilder( );

[C++] public: TextBoxControlBuilder( );

[VB] Public Sub New( )

[JScript] public function TextBoxControlBuilder( );

ControlType

FChildrenAsProperties

FIsNonParserAccessor

HasAspCode

ID

InDesigner

NamingContainerType

Parser

TagName

AllowWhitespaceLiterals

[C#] public override bool AllowWhitespaceLiterals( );

[C++] public: bool AllowWhitespaceLiterals( );

[VB] Overrides Public Function AllowWhitespaceLiterals( ) As Boolean

[JScript] public override function AllowWhitespace Literals( ): Boolean;

Description

Specifies whether white space literals are allowed.

Return Value: false for all cases.

This method overrides System.Web.UI.ControlBuilder. AllowWhitespaceLiterals to ignore white space in the System.Web.UI.WebControls.TextBox control.

HtmlDecodeLiterals

[C#] public override bool HtmlDecodeLiterals( );

[C++] public: bool HtmlDecodeLiterals( );

[VB] Overrides Public Function HtmlDecodeLiterals( ) As Boolean

[JScript] public override function HtmlDecodeLiterals( ): Boolean;

Description

TextBoxMode enumeration (System.Web.UI.WebControls)

ToString

Description

Specifies the behavior mode of the text box.

The System.Web.UI.WebControls.TextBoxMode enumeration represents the different display options for System.Web.UI.WebControls.TextBox controls.

ToString

[C#] public const TextBoxMode MultiLine;

[C++] public: const TextBoxMode MultiLine;

[VB] Public Const MultiLine As TextBoxMode

[JScript] public var MultiLine: TextBoxMode;

Description

Multi line entry mode.

ToString

[C#] public const TextBoxMode Password;

[C++] public: const TextBoxMode Password;

[VB] Public Const Password As TextBoxMode

[JScript] public var Password: TextBoxMode;

Description

Password entry mode.

ToString

[C#] public const TextBoxMode SingleLine;

[C++] public: const TextBoxMode SingleLine;

[VB] Public Const SingleLine As TextBoxMode

[JScript] public var SingleLine: TextBoxMode;

Description

Single-line entry mode.

TitleFormat enumeration (System.Web.UI.WebControls)

ToString

Description

Specifies the title format for the displayed month in the System.Web.UI.WebControls.Calendar control.

The System.Web.UI.WebControls.TitleFormat enumeration represents the different title formats for the System.Web.UI.WebControls.Calendar control.

ToString

[C#] public const TitleFormat Month;

[C++] public: const TitleFormat Month;

[VB] Public Const Month As TitleFormat

[JScript] public var Month: TitleFormat;

Description

Title displayed with only the month but not the year. For example, “January”.

ToString

[C#] public const TitleFormat MonthYear;

[C++] public: const TitleFormat MonthYear;

[VB] Public Const MonthYear As TitleFormat

[JScript] public var MonthYear: TitleFormat;

Description

Title displayed with both the month and the year. For example, “January 2000”.

Unit structure (System.Web.UI.WebControls)

ToString

Description

Defines the fields, properties, and methods of the System.Web.UI.WebControls.Unit structure.

ToString

[C#] public static readonly Unit Empty;

[C++] public: static Unit Empty;

[VB] Public Shared ReadOnly Empty As Unit

[JScript] public static var Empty: Unit;

Description

Specifies an empty unit. This field is read-only.

Unit

Example Syntax:

ToString

[C#] public Unit(double value);

[C++] public: Unit(double value);

[VB] Public Sub New(ByVal value As Double)

[JScript] public function Unit(value: double);

Description

Initializes a new instance of the System.Web.UI.WebControls.Unit structure with the specified double-precision floating point number as the unit value and Pixel as the (default) unit type. Represents the specified unit value.

Unit

Example Syntax:

ToString

[C#] public Unit(int value);

[C++] public: Unit(int value);

[VB] Public Sub New(ByVal value As Integer)

[JScript] public function Unit(value: int); Initializes a new instance of the System.Web.UI.WebControls.Unit structure.

Description

Initializes a new instance of the System.Web.UI.WebControls.Unit structure with the specified 32-bit signed integer as the unit value and Pixel as the (default) unit type. Represents the specified unit value.

Unit

Example Syntax:

ToString

[C#] public Unit(string value);

[C++] public: Unit(String* value);

[VB] Public Sub New(ByVal value As String)

[JScript] public function Unit(value: String);

Description

Initializes a new instance of the System.Web.UI.WebControls.Unit structure with the specified text string that contains the unit value and unit type. If the unit type is not specified, the default is Pixel . The specified text string that contains the unit value and unit type.

Unit

Example Syntax:

ToString

[C#] public Unit(double value, UnitType type);

[C++] public: Unit(double value, UnitType type);

[VB] Public Sub New(ByVal value As Double, ByVal type As UnitType)

[JScript] public function Unit(value: double, type: UnitType);

Description

Initializes a new instance of the System.Web.UI.WebControls.Unit structure with the specified double-precision floating point number as the unit value and the specified System.Web.UI.WebControls.UnitType as the unit type. Represents the specified unit value. Represents the specified unit type.

Unit

Example Syntax:

ToString

[C#] public Unit(string value, CultureInfo culture);

[C++] public: Unit(String* value, CultureInfo* culture);

[VB] Public Sub New(ByVal value As String, ByVal culture As CultureInfo)

[JScript] public function Unit(value: String, culture: CultureInfo);

Description

IsEmpty

ToString

[C#] public bool IsEmpty {get;}

[C++] public: _property bool get_IsEmpty( );

[VB] Public ReadOnly Property IsEmpty As Boolean

[JScript] public function get IsEmpty( ): Boolean;

Description

Gets a value indicating whether the System.Web.UI.WebControls.Unit is empty.

Type

ToString

[C#] public UnitType Type {get;}

[C++] public: _property UnitType get_Type( );

[VB] Public ReadOnly Property Type As UnitType

[JScript] public function get Type( ): UnitType;

Description

Gets or sets the type of the System.Web.UI.WebControls.Unit.

Value

ToString

[C#] public double Value {get;}

[C++] public: _property double get_Value( );

[VB] Public ReadOnly Property Value As Double

[JScript] public function get Value( ): double;

Description

Gets the value of the System.Web.UI.WebControls.Unit.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Compares this System.Web.UI.WebControls.Unit with the specified object.

Return Value: true if this System.Web.UI.WebControls.Unit has the same value and type as the specified object; otherwise, false . The specified object for comparison.

GetHashCode

[C#] public override int GetHashCode( );

[C++] public: int GetHashCode( );

[VB] Overrides Public Function GetHashCode( ) As Integer

[JScript] public override function GetHashCode( ): int;

Description op_Equality

[C#] public static bool operator=(Unit left, Unit right);

[C++] public: static bool op_Equality(Unit left, Unit right);

[VB] returnValue=Unit.op_Equality(left, right)

[JScript] returnValue=left=right;

Description

Compares two units to find out if they have the same value and type.

Return Value: true if both units have the same value and type; otherwise, false . One of the two units being compared. The other of the two units being compared.

op_Implicit

[C#] public static implicit operator Unit(int n);

[C++] public: static Unit op_Implicit(int n);

[VB] returnValue=Unit.op_Implicit(n)

[JScript] returnValue=n;

Description

Implicitly creates a System.Web.UI.WebControls.Unit of type Pixel from the specified 32-bit unsigned integer. The specified 32-bit unsigned integer for creating a Unit.

op_Inequality

[C#] public static bool operator!=(Unit left, Unit right);

[C++] public: static bool op_Inequality(Unit left, Unit right);

[VB] returnValue=Unit.op_Inequality(left, right)

[JScript] returnValue=left!=right;

Description

Compares two units to find out if they have different values and/or types.

Return Value: true if both units have different values or different types; otherwise, false. One of the two units being compared. The other of the two units being compared.

Parse

[C#] public static Unit Parse(string s);

[C++] public: static Unit Parse(String* s);

[VB] Public Shared Function Parse(ByVal s As String) As Unit

[JScript] public static function Parse(s: String): Unit;

Description

Parse

[C#] public static Unit Parse(string s, CultureInfo culture);

[C++] public: static Unit Parse(String* s, CultureInfo* culture);

[VB] Public Shared Function Parse(ByVal s As String, ByVal culture As CultureInfo) As Unit

[JScript] public static function Parse(s: String, culture: CultureInfo): Unit;

Description

Percentage

[C#] public static Unit Percentage(double n);

[C++] public: static Unit Percentage(double n);

[VB] Public Shared Function Percentage(ByVal n As Double) As Unit

[JScript] public static function Percentage(n: double): Unit;

Description

Creates a System.Web.UI.WebControls.Unit of type Percentage from the specified 32-bit signed integer.

Return Value: A System.Web.UI.WebControls.Unit that represents the unit created. The specified double precision floating point number for creating a unit.

Pixel

[C#] public static Unit Pixel(int n);

[C++] public: static Unit Pixel(int n);

[VB] Public Shared Function Pixel(ByVal n As Integer) As Unit

[JScript] public static function Pixel(n: int): Unit;

Description

Creates a System.Web.UI.WebControls.Unit of type Pixel from the specified 32-bit signed integer.

Return Value: A System.Web.UI.WebControls.Unit that represents the unit created. The specified 32-bit signed integer for creating a unit.

Point

[C#] public static Unit Point(int n);

[C++] public: static Unit Point(int n);

[VB] Public Shared Function Point(ByVal n As Integer) As Unit

[JScript] public static function Point(n: int): Unit;

Description

Creates a System.Web.UI.WebControls.Unit of type Point from the specified 32-bit signed integer.

Return Value: A System.Web.UI.WebControls.Unit that represents the unit created. The specified 32-bit signed integer for creating a unit.

ToString

[C#] public override string ToString( );

[C++] public: String* ToString( );

[VB] Overrides Public Function ToString( ) As String

[JScript] public override function ToString( ): String;

Description

Converts a System.Web.UI.WebControls.Unit to a System.String.

Return Value: A System.String represents this System.Web.UI.WebControls.Unit.

ToString

[C#] public string ToString(CultureInfo culture);

[C++] public: String* ToString(CultureInfo* culture);

[VB] Public Function ToString(ByVal culture As CultureInfo) As String

[JScript] public function ToString(culture: CultureInfo): String;

Description

UnitConverter class (System.Web.UI.WebControls)

ToString

Description

Specifies an interface to be overridden to provide unit conversion services. The base unit converter class.

UnitConverter

Example Syntax:

ToString

[C#] public UnitConverter( );

[C++] public: UnitConverter( );

[VB] Public Sub New( )

[JScript] public function UnitConverter( );

CanConvertFrom

[C#] public override bool CanConvertFrom(ITypeDescriptorContext context, Type sourceType);

[C++] public: bool CanConvertFrom(ITypeDescriptorContext* context, Type* sourceType);

[VB] Overrides Public Function CanConvertFrom(ByVal context As ITypeDescriptorContext, ByVal sourceType As Type) As Boolean

[JScript] public override function CanConvertFrom(context: ITypeDescriptorContext, sourceType: Type): Boolean;

Description

Returns a value indicating whether the unit converter can convert from the specified source type.

Return Value: true if the source type can be converted from; otherwise, false . An System.ComponentModel.ITypeDescriptorContext that specifies the context of the object to convert. The type of the source.

ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: ITypeDescriptorContext, culture: CultureInfo, value: Object): Object;

Description

Performs type conversion from the specified context, object and argument list.

Return Value: The object resulting from conversion. An System.ComponentModel.ITypeDescriptorContext that indicates the context of the object to convert. A System.Globalization.CultureInfo object that represents information about a culture such as language, calendar system, and so on. This parameter is not used in this method. It is reserved for future versions of this method. You can optionally pass in null for this parameter. The object to convert.

ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object;

Description

Performs type conversion to the specified destination type given the specified context, object and argument list.

Return Value: The object resulting from conversion. An System.ComponentModel.ITypeDescriptorContext that indicates the context of the object to convert. A System.Globalization.CultureInfo object that represents information about a culture such as language, calendar system, and so on. This parameter is not used in this method. It is reserved for future versions of this method. You can optionally pass in null for this parameter. The object to convert. The type to convert to.

UnitType enumeration (System.Web.UI.WebControls)

ToString

Description

Specifies the unit of measurement.

The System.Web.UI.WebControls.UnitType enumeration represents the different supported measurement units. Measurements can be represented in pixels, points, picas, inches, millimeters, centimeters, percentages, em, or ex.

ToString

[C#] public const UnitType Cm;

[C++] public: const UnitType Cm;

[VB] Public Const Cm As UnitType

[JScript] public var Cm: UnitType;

Description

Measurement is in centimeters.

ToString

[C#] public const UnitType Em;

[C++] public: const UnitType Em;

[VB] Public Const Em As UnitType

[JScript] public var Em: UnitType;

Description

Measurement is relative to the height of the parent element's font.

ToString

[C#] public const UnitType Ex;

[C++] public: const UnitType Ex;

[VB] Public Const Ex As UnitType

[JScript] public var Ex: UnitType;

Description

Measurement is relative to the height of the lowercase letter x of the parent element's font.

ToString

[C#] public const UnitType Inch;

[C++] public: const UnitType Inch;

[VB] Public Const Inch As UnitType

[JScript] public var Inch: UnitType;

Description

Measurement is in inches.

ToString

[C#] public const UnitType Mm;

[C++] public: const UnitType Mm;

[VB] Public Const Mm As UnitType

[JScript] public var Mm: UnitType;

Description

Measurement is in millimeters.

ToString

[C#] public const UnitType Percentage;

[C++] public: const UnitType Percentage;

[VB] Public Const Percentage As UnitType

[JScript] public var Percentage: UnitType;

Description

Measurement is a percentage relative to the parent element.

ToString

[C#] public const UnitType Pica;

[C++] public: const UnitType Pica;

[VB] Public Const Pica As UnitType

[JScript] public var Pica: UnitType;

Description

Measurement is in picas. A pica represents 12 points.

ToString

[C#] public const UnitType Pixel;

[C++] public: const UnitType Pixel;

[VB] Public Const Pixel As UnitType

[JScript] public var Pixel: UnitType;

Description

Measurement is in pixels.

ToString

[C#] public const UnitType Point;

[C++] public: const UnitType Point;

[VB] Public Const Point As UnitType

[JScript] public var Point: UnitType;

Description

Measurement is in points. A point represents 1/72 of an inch.

ValidatedControlConverter class (System.Web.UI.WebControls)

ToString

Description

Shows a list of validatable controls in the Properties window.

GetStandardValues

[C#] public override StandardValuesCollection GetStandardValues(ITypeDescriptorContext context);

[C++] public: StandardValuesCollection* GetStandardValues(ITypeDescriptorContext* context);

[VB] Overrides Public Function GetStandardValues(ByVal context As ITypeDescriptorContext) As StandardValuesCollection

[JScript] public override function GetStandardValues(context: ITypeDescriptorContext): StandardValuesCollection;

Description

Returns a collection of standard values retrieved from the context specified by the specified type descriptor.

Return Value: A StandardValuesCollection that represents the standard values collected from the specified context. A type descriptor that specifies the location of the context to convert from.

GetStandardValuesExclusive

[C#] public override bool GetStandardValuesExclusive(ITypeDescriptorContext context);

[C++] public: bool GetStandardValuesExclusive(ITypeDescriptorContext* context);

[VB] Overrides Public Function GetStandardValuesExclusive(ByVal context As ITypeDescriptorContext) As Boolean

[JScript] public override function GetStandardValuesExclusive(context: ITypeDescriptorContext): Boolean;

Description

Gets whether or not the context specified contains exclusive standard values.

Return Value: true if the specified context contains exclusive standard values, otherwise false. A type descriptor that indicates the context to convert from.

GetStandardValuesSupported

[C#] public override bool GetStandardValuesSupported(ITypeDescriptorContext context);

[C++] public: bool GetStandardValuesSupported(ITypeDescriptorContext* context);

[VB] Overrides Public Function GetStandardValuesSupported(ByVal context As ITypeDescriptorContext) As Boolean

[JScript] public override function GetStandardValuesSupported(context: ITypeDescriptorContext): Boolean;

Description

Gets whether or not the specified context contains supported standard values.

Return Value: true if the specified context conatins supported standard values, otherwise false. A type descriptor that indicates the context to convert from.

ValidationCompareOperator enumeration (System.Web.UI.WebControls)

ToString

Description

Specifies the validation comparison operators used by the System.Web.UI.WebControls.CompareValidator control.

The System.Web.UI.WebControls.ValidationCompareOperator enumeration represents the comparison operations that can be performed by the System.Web.UI.WebControls.CompareValidator control.

ToString

[C#] public const ValidationCompareOperator DataTypeCheck;

[C++] public: const ValidationCompareOperator DataTypeCheck;

[VB] Public Const DataTypeCheck As ValidationCompareOperator

[JScript] public var DataTypeCheck: ValidationCompareOperator;

Description

A comparison for data type only.

ToString

[C#] public const ValidationCompareOperator Equal;

[C++] public: const ValidationCompareOperator Equal;

[VB] Public Const Equal As ValidationCompareOperator

[JScript] public var Equal: ValidationCompareOperator;

Description

A comparison for equality.

ToString

[C#] public const ValidationCompareOperator GreaterThan;

[C++] public: const ValidationCompareOperator GreaterThan;

[VB] Public Const GreaterThan As ValidationCompareOperator

[JScript] public var GreaterThan: ValidationCompareOperator;

Description

A comparison for greater than.

ToString

[C#] public const ValidationCompareOperator GreaterThanEqual;

[C++] public: const ValidationCompareOperator GreaterThanEqual;

[VB] Public Const GreaterThanEqual As ValidationCompareOperator

[JScript] public var GreaterThanEqual: ValidationCompareOperator;

Description

A comparison for greater than or equal to.

ToString

[C#] public const ValidationCompareOperator LessThan;

[C++] public: const ValidationCompareOperator LessThan;

[VB] Public Const LessThan As ValidationCompareOperator

[JScript] public var LessThan: ValidationCompareOperator;

Description

A comparison for less than.

ToString

[C#] public const ValidationCompareOperator LessThanEqual;

[C++] public: const ValidationCompareOperator LessThanEqual;

[VB] Public Const LessThanEqual As ValidationCompareOperator

[JScript] public var LessThanEqual: ValidationCompareOperator;

Description

A comparison for less than or equal to.

ToString

[C#] public const ValidationCompareOperator NotEqual;

[C++] public: const ValidationCompareOperator NotEqual;

[VB] Public Const NotEqual As ValidationCompareOperator

[JScript] public var NotEqual: ValidationCompareOperator;

Description

A comparison for inequality.

ValidationDataType enumeration (System.Web.UI.WebControls)

ToString

Description

Specifies the validation data types used by the System.Web.UI.WebControls.CompareValidator and System.Web.UI.WebControls.RangeValidator controls.

The System.Web.UI.WebControls.ValidationDataType enumeration represents the different data types that the System.Web.UI.WebControls.CompareValidator and System.Web.UI.WebControls.RangeValidator controls can validate.

ToString

[C#] public const ValidationDataType Currency;

[C++] public: const ValidationDataType Currency;

[VB] Public Const Currency As ValidationDataType

[JScript] public var Currency: ValidationDataType;

Description

A currency data type.

ToString

[C#] public const ValidationDataType Date;

[C++] public: const ValidationDataType Date;

[VB] Public Const Date As ValidationDataType

[JScript] public var Date: ValidationDataType;

Description

A date data type.

ToString

[C#] public const ValidationDataType Double;

[C++] public: const ValidationDataType Double;

[VB] Public Const Double As ValidationDataType

[JScript] public var Double: ValidationDataType;

Description

A double data type.

ToString

[C#] public const ValidationDataType Integer;

[C++] public: const ValidationDataType Integer;

[VB] Public Const Integer As ValidationDataType

[JScript] public var Integer: ValidationDataType;

Description

An integer data type.

ToString

[C#] public const ValidationDataType String;

[C++] public: const ValidationDataType String;

[VB] Public Const String As ValidationDataType

[JScript] public var String: ValidationDataType;

Description

A string data type.

ValidationSummary class (System.Web.UI.WebControls)

ToString

Description

Displays a summary of all validation errors inline on a Web page, in a message box, or both.

The System.Web.UI.WebControls.ValidationSummary class is used to summarize the error messages from all validators on a Web page, in a single location. The summary can be displayed as a list, as a bulleted list, or as a single paragraph based on the System.Web.UI.WebControls.ValidationSummary.DisplayMode property.

ValidationSummary

Example Syntax:

ToString

[C#] public ValidationSummary( );

[C++] public: ValidationSummary( );

[VB] Public Sub New( )

[JScript] public function ValidationSummary( );

Description

Initializes a new instance of the System.Web.UI.WebControls.ValidationSummary class.

The following table shows the initial property value for an instance of System.Web.UI.WebControls.ValidationSummary.

AccessKey

Attributes

BackColor

BorderColor

BorderStyle

BorderWidth

ChildControlsCreated

ClientID

Context

Controls

ControlStyle

ControlStyleCreated

CssClass

DisplayMode

ToString

Description

Gets or sets the display mode of the validation summary.

Use this property to specify the display format of a System.Web.UI.WebControls.ValidationSummary control. The summary may be displayed as a list, as a bulleted list, or as a single paragraph.

EnableClientScript

ToString

[C#] public bool EnableClientScript {get; set;}

[C++] public: _property bool get_EnableClientScript( );public: _property void set_EnableClientScript(bool);

[VB] Public Property EnableClientScript As Boolean

[JScript] public function get EnableClientScript( ): Boolean; public function set EnableClientScript(Boolean);

Description

Gets or sets a value indicating whether client-side validation is attempted on the browser.

Use this property to enable or disable client-side validation on the browser. When set to true, client-side validation is performed on the browser if the browser supports that feature. When set to false, no client-side validation is attempted, the System.Web.UI.WebControls.ValidationSummary control only updates itself on round-trips to the server, and the System.Web.UI.WebControls.ValidationSummary.ShowMessageBox property has no effect.

Enabled

EnableViewState

Events

Font

ForeColor

ToString

Description

Gets or sets the fore color of the control.

Use this property to specify the color that error messages from validation controls are displayed.

HasChildViewState

HeaderText

ToString

Description
Gets or sets the header text displayed at the top of the summary.
Use this property to display a title for the System.Web.UI.WebControls.ValidationSummary control.
Height
ID
IsTrackingViewState
NamingContainer
Page
Parent
ShowMessageBox
ToString Description
Gets or sets a value indicating whether the validation summary is displayed in a message box.
This property can be used in addition to the System.Web.UI.WebControls.ValidationSummary.ShowSummary property to control where the validation summary is displayed. If this property and System.Web.UI.WebControls.ValidationSummary.EnableClientScript are both set to true, the validation summary is displayed in a message box. If System.Web.UI.WebControls.ValidationSummary.EnableClientScript is set to false, this property has no effect.
ShowSummary
ToString
[C#] public bool ShowSummary {get; set;}
[C++] public: _property bool get_ShowSummary( );public: _property void set_ShowSummary(bool);
[VB] Public Property ShowSummary As Boolean
[JScript] public function get ShowSummary( ): Boolean;public function set ShowSummary(Boolean);

Description
Gets or sets a value indicating whether the validation summary is displayed inline.
This property can be used in addition to the System.Web.UI.WebControls.ValidationSummary.ShowMessageBox property to control where the validation summary is displayed. If this property is set to true, the validation summary is displayed on the Web page.
Site
Style
TabIndex
TagKey
TagName
TemplateSourceDirectory
ToolTip
UniqueID
ViewState
ViewStateIgnoresCase
Visible
Width
AddAttributesToRender
[C#] protected override void AddAttributesToRender(HtmlTextWriter writer);
[C++] protected: void AddAttributesToRender(HtmlTextWriter* writer);
[VB] Overrides Protected Sub AddAttributesToRender(ByVal writer As HtmlTextWriter)
[JScript] protected override function AddAttributesToRender (writer HtmlTextWriter);

Description
AddAttributesToRender method.
OnPreRender
[C#] protected override void OnPreRender(EventArgs e);
[C++] protected: void OnPreRender(EventArgs* e);
[VB] Overrides Protected Sub OnPreRender(ByVal e As EventArgs)
[JScript] protected override function OnPreRender(e: EventArgs);

Description
PreRender method.
Render
[C#] protected override void Render(HtmlTextWriter writer);
[C++] protected: void Render(HtmlTextWriter* writer);
[VB] Overrides Protected Sub Render(ByVal writer As HtmlTextWriter)
[JScript] protected override function Render(writer: HtmlTextWriter);

Description
Render method.
ValidationSummaryDisplayMode enumeration (System.Web.UI.WebControls)
TrackViewState Description
Specifies the validation summary display mode used by the System.Web.UI.WebControls.ValidationSummary control.
The System.Web.UI.WebControls.ValidationSummaryDisplayMode enumeration represents the different display formats of a System.Web.UI.WebControls.ValidationSummary control.
TrackViewState
[C#] public const ValidationSummaryDisplayMode BulletList;
[C++] public: const ValidationSummaryDisplayMode BulletList;
[VB] Public Const BulletList As ValidationSummaryDisplayMode
[JScript] public var BulletList: ValidationSummaryDisplayMode;

Description
Validation summary displayed in a bulleted list.
TrackViewState
[C#] public const ValidationSummaryDisplayMode List;
[C++] public: const ValidationSummaryDisplayMode List;
[VB] Public Const List As ValidationSummaryDisplayMode
[JScript] public var List: ValidationSummaryDisplayMode;

Description
Validation summary displayed in a list.
TrackViewState
[C#] public const ValidationSummaryDisplayMode SingleParagraph;
[C++] public: const ValidationSummaryDisplayMode SingleParagraph;
[VB] Public Const SingleParagraph As ValidationSummaryDisplayMode
[JScript] public var SingleParagraph: ValidationSummaryDisplayMode;

Description
Validation summary displayed in a single paragraph.
ValidatorDisplay enumeration (System.Web.UI.WebControls)
ToString Description
Specifies the display behavior of error messages in validation controls.

The ValidatorDisplaySystem.Web.UI.WebControls enumeration represents the different display behaviors of error messages in validation controls.

ToString

[C#] public const ValidatorDisplay Dynamic;

[C++] public: const ValidatorDisplay Dynamic;

[VB] Public Const Dynamic As ValidatorDisplay

[JScript] public var Dynamic: ValidatorDisplay;

Description

Validator content dynamically added to the page when validation faills.

ToString

[C#] public const ValidatorDisplay None;

[C++] public: const ValidatorDisplay None;

[VB] Public Const None As ValidatorDisplay

[JScript] public var None: ValidatorDisplay;

Description

Validator content never displayed inline.

ToString

[C#] public const ValidatorDisplay Static;

[C++] public: const ValidatorDisplay Static;

[VB] Public Const Static As ValidatorDisplay

[JScript] public var Static: ValidatorDisplay;

Description

Validator content physically part of the page layout.

VerticalAlign enumeration (System.Web.UI.WebControls)

ToString

Description

Specifies the vertical alignment of an object or text in a control.

The System.Web.UI.WebControls.VerticalAlign enumeration represents the different vertical alignment options for an object or text in a control.

ToString

[C#] public const VerticalAlign Bottom;

[C++] public: const VerticalAlign Bottom;

[VB] Public Const Bottom As VerticalAlign

[JScript] public var Bottom: VerticalAlign;

Description

Text or object is aligned with the bottom of the enclosing control.

ToString

[C#] public const VerticalAlign Middle;

[C++] public: const VerticalAlign Middle;

[VB] Public Const Middle As VerticalAlign

[JScript] public var Middle: VerticalAlign;

Description

Text or object is aligned with the center of the enclosing control.

ToString

[C#] public const VerticalAlign NotSet;

[C++] public: const VerticalAlign NotSet;

[VB] Public Const NotSet As VerticalAlign

[JScript] public var NotSet: VerticalAlign;

Description

Vertical alignment is not set.

ToString

[C#] public const VerticalAlign Top;

[C++] public: const VerticalAlign Top;

[VB] Public Const Top As VerticalAlign

[JScript] public var Top: VerticalAlign;

Description

Text or object is aligned with the top of the enclosing control.

WebColorConverter class (System.Web.UT.WebControls)

ToString

Description

WebColorConverter

Example Syntax:

ToString

[C#] public WebColorConverter( );

[C++] public: WebColorConverter( );

[VB] Public Sub New( )

[JScript] public function WebColorConverter( );

ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: ITypeDescriptorContext, culture: CultureInfo, value: Object): Object;

Description

ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object;

Description

WebControl class (System.Web.UI.WebControls)

ToString

Description

Serves as the base class that defines the methods, properties and events common to all controls in the System.Web.UI.WebControls namespace.

Certain properties of the base control may not render on downlevel browsers for some or all controls. For example, the System.Web.UI.WebControls.WebControl.AccessKey property will not render on downlevel browsers for any controls. See specific property for more details.

WebControl

Example Syntax:

ToString

[C#] protected WebControl( );

[C++] protected: WebControl( );

[VB] Protected Sub New( )

[JScript] protected function WebControl( ); Initializes a new instance of the System.Web.UI.WebControls.WebControl class.

Description

Initializes a new instance of the System.Web.UI.WebControls.WebControl class with a Span HTML tag.

WebControl

Example Syntax:

ToString

[C#] public WebControl(HtmlTextWriterTag tag);

[C++] public: WebControl(HtmlTextWriterTag tag);

[VB] Public Sub New(ByVal tag As HtmlTextWriterTag)

[JScript] public function WebControl(tag: HtmlTextWriter-Tag);

Description

Initializes a new instance of the System.Web.UI.WebControls.WebControl class using the specified HTML tag. One of the System.Web.UI.HtmlTextWriteTag values.

WebControl

Example Syntax:

ToString

[C#] protected WebControl(string tag);

[C++] protected: WebControl(String* tag);

[VB] Protected Sub New(ByVal tag As String)

[JScript] protected function WebControl(tag: String);

Description

Initializes a new instance of the System.Web.UI.WebControls.WebControl class with the specified HTML tag. An HTML tag.

AccessKey

ToString

[C#] public virtual string AccessKey {get; set;}

[C++] public: _property virtual String* get_AccessKey( );public: _property virtual void set_AccessKey(String*);

[VB] Overridable Public Property AccessKey As String

[JScript] public function get AccessKey( ): String;public function set AccessKey(String);

Description

Gets or sets the keyboard shortcut key (AccessKey) for setting focus to the Web control.

This property will not render on downlevel browsers for any controls. It is not HTML 4.0 and will only work in IE 4 or higher.

Attributes

ToString

[C#] public AttributeCollection Attributes {get;}

[C++] public: _property AttributeCollection* get_Attributes( );

[VB] Public ReadOnly Property Attributes As AttributeCollection

[JScript] public function get Attributes( ): AttributeCollection;

Description

Gets the collection of arbitrary attributes (for rendering only) that do not correspond to properties on the control.

This property will render on downlevel browsers for all controls.

BackColor

ToString

[C#] public virtual Color BackColor {get; set;}

[C++] public: _property virtual Color get_BackColor( );public: _property virtual void set_BackColor(Color);

[VB] Overridable Public Property BackColor As Color

[JScript] public function get BackColor( ): Color;public function set BackColor(Color);

Description

Gets or sets the background color of the Web control.

This property will render on downlevel browsers for some controls only. For example, System.Web.UI.WebControls.Table, System.Web.UI.WebControls.Panel, System.Web.UI.WebControls.DataGrid, System.Web.UI.WebControls.Calendar, and System.Web.UI.WebControls.ValidationSummary. It will also work for System.Web.UI.WebControls.CheckBoxList, System.Web.UI.WebControls.RadioButtonList and System.Web.UI.WebControls.DataList if their RepeatLayout property is Table and not Flow.

BorderColor

ToString

[C#] public virtual Color BorderColor {get; set;}

[C++] public: _property virtual Color get_BorderColor( );public: _property virtual void set_BorderColor(Color);

[VB] Overridable Public Property BorderColor As Color

[JScript] public function get BorderColor( ): Color;public function set BorderColor(Color);

Description

Gets or sets the border color of the Web control.

The property will render downlevel only for the same table-based controls like the System.Web.UI.WebControls.WebControl.BackColor property. However, it is output as the "bordercolor" attribute which is not part of the HTML 3.2 standard. It works for Navigaor 4 and higher, and IE 3 and higher, but not most other browsers.

BorderStyle

ToString

[C#] public virtual BorderStyle BorderStyle {get; set;}

[C++] public: _property virtual BorderStyle get_BorderStyle( );public: _property virtual void set_BorderStyle(BorderStyle);

[VB] Overridable Public Property BorderStyle As BorderStyle

[JScript] public function get BorderStyleo): BorderStyle; public function set BorderStyle(BorderStyle);

Description

Gets or sets the border style of the Web control.

This property will not render on downlevel browsers for any controls.

BorderWidth

ToString

[C#] public virtual Unit BorderWidth {get; set;}

[C++] public: _property virtual Unit get_BorderWidth( );public: _property virtual void set_BorderWidth(Unit);

[VB] Overridable Public Property BorderWidth As Unit

[JScript] public function get BorderWidth( ): Unit;public function set BorderWidth(Unit);

Description

Gets or sets the border width of the Web control.

Use the System.Web.UI.WebControls.WebControl.BorderWidth property to specify a border width for a control.

ChildControlsCreated

ClientID

Context

Controls

ControlStyle

ToString

Description

Gets the style of the Web control. This property is primarily used by control developers.

ControlStyleCreated

ToString

[C#] public bool ControlStyleCreated {get;}

[C++] public: _property bool get_ControlStyleCreated( );

[VB] Public ReadOnly Property ControlStyleCreated As Boolean

[JScript] public function get ControlStyleCreated( ): Boolean;

Description

CssClass

ToString

[C#] public virtual string CssClass {get; set;}

[C++] public: _property virtual String* get_CssClass( );public: _property virtual void set_CssClass(String*);

[VB] Overridable Public Property CssClass As String

[JScript] public function get CssClass( ): String;public function set CssClass(String);

Description

Gets or sets the CSS class rendered by the Web control.

This property will render on downlevel browsers for all controls.

Enabled

ToString

[C#] public virtual bool Enabled {get; set;}

[C++] public: _property virtual bool get_Enabled( );public: _property virtual void set_Enabled(bool);

[VB] Overridable Public Property Enabled As Boolean

[JScript] public function get Enabled( ): Boolean;public function set Enabled(Boolean);

Description

Gets or sets a value indicating whether the Web control is enabled.

This property will render on downlevel browsers for some controls only.

EnableViewState

Events

Font

ToString

Description

Gets font information of the Web control.

This property includes subproperties that can be accessed declaratively in the form of "Font-Bold" or programmatically in the form of "Font.Bold".

ForeColor

ToString

[C#] public virtual Color ForeColor {get; set;}

[C++] public: _property virtual Color get_ForeColor( );public: _property virtual void set_ForeColor(Color);

[VB] Overridable Public Property ForeColor As Color

[JScript] public function get ForeColor( ): Color;public function set ForeColor(Color);

Description

Gets or sets the foreground color (typically the color of the text) of the Web control.

This property will render on downlevel browsers for almost all controls, except the System.Web.UI.WebControls.Image, System.Web.UI.WebControls.AdRotator, System.Web.UI.WebControls.HyperLink and System.Web.UI.WebControls.LinkButton controls. In addition, it will be rendered as tags on downlevel browsers.

HasChildViewState

Height

ToString

Description

Gets or sets the height of the Web control.

This property will render on downlevel browsers for some controls only. It will not render downlevel for System.Web.UI.WebControls.Label, System.Web.UI.WebControls.HyperLink, System.Web.UI.WebControls.LinkButton, any validator controls, or for System.Web.UI.WebControls.CheckBoxList, System.Web.UI.WebControls.RadioButtonList and System.Web.UI.WebControls.DataList when their RepeatLayout property is Flow. Furthermore, only unit types of Pixel and percentage will work.

ID

IsTrackingViewState

NamingContainer

Page

Parent

Site

Style

ToString

Description

Gets a collection of text attributes that will be rendered as a style attribute on the outer tag of the Web control.

This property will render on downlevel browsers for all controls.

TabIndex

ToString

[C#] public virtual short TabIndex {get; set;}

[C++] public: _property virtual short get_TabIndex( );public: _ property virtual void set_TabIndex(short);

[VB] Overridable Public Property TabIndex As Short

[JScript] public function get TabIndex( ): Int16;public function set TabIndex(Int16);

Description

Gets or sets the tab index of the Web control.

Use the System.Web.UI.WebControls.WebControl.TabIndex property to specify or determine the tab index of a control on the Web Page.

TagKey

ToString

[C#] protected virtual HtmlTextWriterTag TagKey {get;}

[C++] protected: _property virtual HtmlTextWriterTag get_TagKey( );

[VB] Overridable Protected ReadOnly Property TagKey As HtmlTextWriterTag

[JScript] protected function get TagKey( ): HtmlTextWriterTag;

Description

TagName

ToString

[C#] protected virtual string TagName {get;}

[C++] protected: _property virtual String* get_TagName( );

[VB] Overridable Protected ReadOnly Property TagName As String

[JScript] protected function get TagName( ): String;

Description

A protected property. Gets the name of the control tag. This property is primarily used by control developers.

TemplateSourceDirectory

ToolTip

ToString

Description

Gets or sets the tool tip for the Web control to be displayed when the mouse cursor is over the control.

This property will not render on downlevel browsers for any controls.

UniqueID

ViewState

ViewStateIgnoresCase

Visible
Width
ToString

Description

Gets or sets the width of the Web control.

This property will render on downlevel browsers for some controls only. It will not render downlevel for System.Web.UI.WebControls.Label, System.Web.UI.WebControls.HyperLink, System.Web.UI.WebControls.LinkButton, any validator controls, or for System.Web.UI.WebControls.CheckBoxList, System.Web.UI.WebControls.RadioButtonList and System.Web.UI.WebControls.DataList when their RepeatLayout property is Flow. Furthermore, only unit types of Pixel and Percentage will work.

AddAttributesToRender

[C#] protected virtual void AddAttributesToRender(HtmlTextWriter writer);

[C++] protected: virtual void AddAttributes ToRender(HtmTextWriter* writer);

[VB] Overridable Protected Sub AddAttributesToRender (ByVal writer As HtmlTextWriter)

[JScript] protected function AddAttributesToRender(writer: HtmlTextWriter);

Description

Adds to the specified writer those HTML attributes and styles that need to be rendered. This method is primarily used by control developers. The output stream that renders HTML content to the client.

ApplyStyle

[C#] public void ApplyStyle(Style s);

[C++] public: void ApplyStyle(Style* s);

[VB] Public Sub ApplyStyle(ByVal s As Style)

[JScript] public function ApplyStyle(s: Style);

Description

Copies any non-blank elements of the specified style to the Web control, overwriting any existing style elements of the control. This method is primarily used by control developers. The style to be copied.

CopyBaseAttributes

[C#] public void CopyBaseAttributes(WebControl controlSrc);

[C++] public: void CopyBaseAttributes(WebControl* controlSrc);

[VB] Public Sub CopyBaseAttributes(ByVal controlSrc As WebControl)

[JScript] public function CopyBaseAttributes(controlSrc: WebControl);

Description

Copies the System.Web.UI.WebControls.WebControl.AccessKey, System.Web.UI.WebControls.WebControl.Enabled, System.Web.UI.WebControls.WebControl.ToolTip, System.Web.UI.WebControls.WebControl.TabIndex, and System.Web.UI.WebControls.WebControl.Attributes properties onto the Web control from the specified source control. The source control with properties to be copied onto the Web control.

CreateControlStyle

[C#] protected virtual Style CreateControlStyle( );

[C++] protected: virtual Style* CreateControlStyle( );

[VB] Overridable Protected Function CreateControlStyle( ) As Style

[JScript] protected function CreateControlStyle( ): Style;

Description

A protected method. Creates the style object that is used internally to implement all style-related properties. Controls may override to create an appropriately typed style.

Return Value: A System.Web.UI.WebControls.Style that is used to implement all style-related properties of the control.

LoadViewState

[C#] protected override void LoadViewState(object savedState);

[C++] protected: void LoadViewState(Object* savedState);

[VB] Overrides Protected Sub LoadViewState(ByVal savedState As Object)

[JScript] protected override function LoadViewState(savedState: Object);

Description

Loads previously saved state. Overridden to handle ViewState, Style, and Attributes. Previously saved state.

MergeStyle

[C#] public void MergeStyle(Style s);

[C++] public: void MergeStyle(Style* s);

[VB] Public Sub MergeStyle(ByVal s As Style)

[JScript] public function MergeStyle(s: Style);

Description

Copies any non-blank elements of the specified style to the Web control, but will not overwrite any existing style elements of the control. This method is primarily used by control developers. The style to be copied.

Render

[C#] protected override void Render(HtmlTextWriter writer);

[C++] protected: void Render(HtmlTextWriter* writer);

[VB] Overrides Protected Sub Render(ByVal writer As HtmlTextWriter)

[JScript] protected override function Render(writer: HtmlTextWriter);

Description

Renders the control into the specified writer. The output stream that renders HTML content to the client.

RenderBeginTag

[C#] public virtual void RenderBeginTag(HtmlTextWriter writer);

[C++] public: virtual void RenderB eginTag(HtmlTextWriter* writer);

[VB] Overridable Public Sub RenderBeginTag(ByVal writer As HtmlTextWriter)

[JScript] public function RenderBeginTag(writer: HtmlTextWriter);

Description

Renders the HTML begin tag of the control into the specified writer. This method is primarily used by control developers.

This is made public so other controls can render multiple controls in between the begin tag and the end tag. The output stream that renders HTML content to the client.

RenderContents

[C#] protected virtual void RenderContents(HtmlTextWriter writer);

[C++] protected: virtual void RenderContents (HtmlTextWriter* writer);

[VB] Overridable Protected Sub RenderContents(ByVal writer As HtmlTextWriter)

[JScript] protected function RenderContents(writer: HtmlTextWriter);

Description

Renders the contents of the control into the specified writer. This method is primarily used by control developers. The output stream that renders HTML content to the client.

RenderEndTag

[C#] public virtual void RenderEndTag(HtmlTextWriter writer);

[C++] public: virtual void RenderEndTag(HtmlTextWriter* writer);

[VB] Overridable Public Sub RenderEndTag(ByVal writer As HtmlTextWriter)

[JScript] public function RenderEndTag(writer: HtmlTextWriter);

Description

Renders the HTML end tag of the control into the specified writer. This method is primarily used by control developers.

This is made public so other controls can render multiple controls in between the begin tag and the end tag. The output stream that renders HTML content to the client.

SaveViewState

[C#] protected override object SaveViewState( );

[C++] protected: Object* SaveViewState( );

[VB] Overrides Protected Function SaveViewState( ) As Object

[JScript] protected override function SaveViewState( ): Object;

Description

A protected method. Saves any state that was modified after the System.Web.UI.WebControls.Style. TrackViewState method was invoked.

IAttributeAccessor.GetAttribute

[C#] string IAttributeAccessor.GetAttribute(string name);

[C++] String* IAttributeAccessor::GetAttribute(String* name);

[VB] Function GetAttribute(ByVal name As String) As String Implements IAttributeAccessor. GetAttribute

[JScript] function IAttributeAccessor.GetAttribute(name: String): String;

IAttributeAccessor.SetAttribute

[C#] void IAttributeAccessor.SetAttribute(string name, string value);

[C++] void IAttributeAccessor::SetAttribute(String* name, String* value);

[VB] Sub SetAttribute(ByVal name As String, ByVal value As String) Implements IAttributeAccessor.SetAttribute

[JScript] function IAttributeAccessor.SetAttribute(name: String, value: String);

TrackViewState

[C#] protected override void TrackViewState( );

[C++] protected: void TrackViewState( );

[VB] Overrides Protected Sub TrackViewState( )

[JScript] protected override function TrackViewState( );

Description

Marks the beginning for tracking state changes on the control. Any changes made after "mark" will be tracked and saved as part of the control viewstate.

Xml class (System.Web.UI.WebControls)

TrackViewState

Description

Displays the contents of an XML document or the results of an XSL Transform.

Use the System.Web.UI.WebControls.Xml control to display the contents of an XML document or the results of an XSL Transform.

Xml

Example Syntax:

TrackViewState

[C#] public Xml( );

[C++] public: Xml( );

[VB] Public Sub New( )

[JScript] public function Xml( );

ChildControlsCreated

ClientID

Context

Controls

Document

TrackViewState

Description

Gets or sets the System.Xml.XmlDocument object to display.

DocumentContent

TrackViewState

[C#] public string DocumentContent {get; set;}

[C++] public: _property String* get_DocumentContent( );public: _property void set_DocumentContent(String*);

[VB] Public Property DocumentContent As String

[JScript] public function get DocumentContent( ): String; public function set DocumentContent(String);

Description

Gets or sets a string that contains the XML document to display in the System.Web.UI.WebControls.Xml control.

DocumentSource

TrackViewState

[C#] public string DocumentSource {get; set;}

[C++] public: _property String* get_DocumentSource( );public: _property void set_DocumentSource(String*);

[VB] Public Property DocumentSource As String

[JScript] public function get DocumentSource( ): String;public function set DocumentSource(String);

Description

Gets or sets the URL to an XML document to display in the System.Web.UI.WebControls.Xml control.

EnableViewState

Events

HasChildViewState

ID

IsTrackingViewState

NamingContainer

Page

Parent

Site

TemplateSourceDirectory

Transform

TrackViewState

Description

Gets or sets the System.Xml.Xsl.XslTransform object that formats the XML document before it is written to the output stream.

TransformArgumentList

TrackViewState

[C#] public XsltArgumentList TransformArgumentList {get; set;}

[C++] public: _property XsltArgumentList* get_TransformArgumentList( );public: _property void set_TransformArgumentList(XsltArgumentList*);

[VB] Public Property TransformArgumentList As XsltArgumentList

[JScript] public function get TransformArgumentList( ): XsltArgumentList;public function set TransformArgumentList(XsltArgumentList);

Description

TransformSource

TrackViewState

[C#] public string TransformSource {get; set;}

[C++] public: _property String* get_Transform Source( );public: _property void set_TransformSource(String*);

[VB] Public Property TransformSource As String

[JScript] public function get TransformSource( ): String;public function set TransformSource(String);

Description

Gets or sets the URL to an XSL Transform document that formats the XML document before it is written to the output stream.

UniqueID

ViewState

ViewStateIgnoresCase

Visible

AddParsedSubObject

[C#] protected override void AddParsedSubObject(object obj);

[C++] protected: void AddParsedSubObject(Object* obj);

[VB] Overrides Protected Sub AddParsedSubObject(ByVal obj As Object)

[JScript] protected override function AddParsedSubObject (obj: Object);

Description

Render

[C#] protected override void Render(HtmlTextWriter output);

[C++] protected: void Render(HtmlTextWriter* output);

[VB] Overrides Protected Sub Render(ByVal output As HtmlTextWriter)

[JScript] protected override function Render(output: HtmlTextWriter);

Description

Renders the results to the o

Exemplary Computing System and Environment

Figure 4:
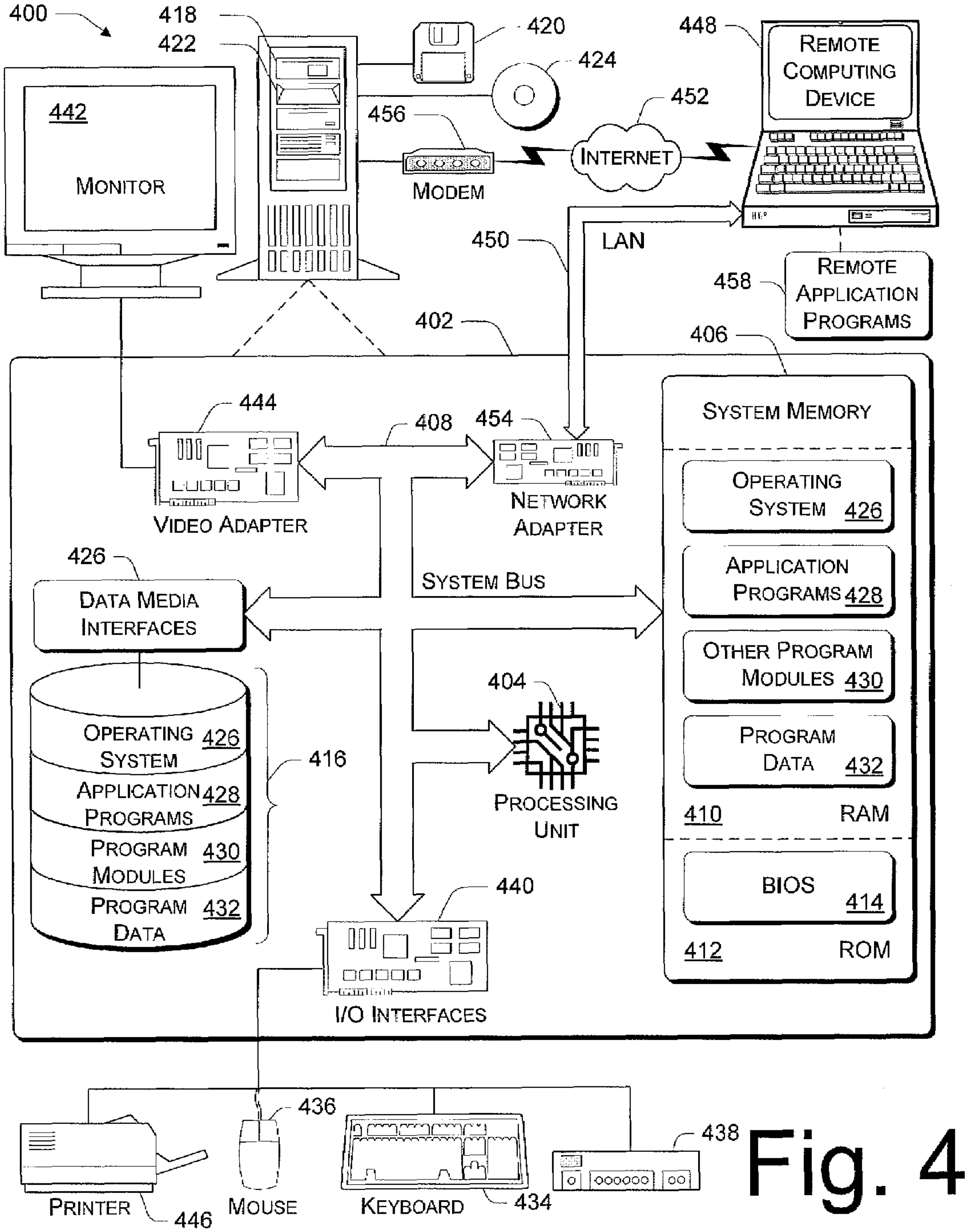
FIG. 4 is a block diagram of an exemplary computer that may execute all or part of the software architecture.

FIG. 4 illustrates an example of a suitable computing environment 400 within which the programming framework 132 may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The framework 132 may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as cellular phones, personal digital assistants, handheld computers, or other communication/computing devices.

The framework 132 may be described in the general context of computer-executable instructions, such as program modules, being executed by one or more computers or other devices. Generally, program modules include routines, programs, objects, components, data structures, etc. that perform particular tasks or implement particular abstract data types. The framework 132 may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 can include, by are not limited to, one or more processors or processing units 404, a system memory 406, and a system bus 408 that couples various system components including the processor 404 to the system memory 406.

The system bus 408 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of the operating system 426, one or more application programs 428, other program modules 430, and program data 432 (or some combination thereof) may include elements of the programming framework 132.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and so on. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

An implementation of the framework 132, and particularly, the API 142 or calls made to the API 142, may be stored on some form of computer readable media. Computer readable media can be any available media that can be accessed by a computer. By way of example, and not limitation, computer readable media may comprise "computer storage media-""Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. An application program interface embodied in one or more computer storage media, comprising:

HTML controls that allow a user to create HTML server controls on a web page, wherein the HTML server controls are executed on a server and map to standard HTML tags;

a first class configured to provide information regarding an HTTP request;

a second class configured to manage HTTP output to a client, wherein the second class is further configured to obtain information regarding capabilities of the client;

a third class configured to facilitate the creation and usage of web services;

a fourth class configured to facilitate sharing of global information across multiple sessions associated with an application;

a fifth class configured to facilitate caching of frequently used resources;

a sixth class configured to facilitate obtaining information regarding a platform type associated with a client; and an object configured to provide access to server-side utilities and processes.

2. An application program interface as recited in claim 1, further comprising a seventh class configured to manipulate at least one cookie.

3. An application program interface as recited in claim 1, further comprising a seventh class configured to handle file transfers.

4. An application program interface as recited in claim 1, further comprising a seventh class configured to provide exception information.

5. An application program interface as recited in claim 1, further comprising a seventh class configured to control operation of an output cache.

6. An application program interface as recited in claim 1, further comprising a set of classes that enable building and using web services.

7. An application program interface as recited in claim 1, further comprising a web service class configured to define a base class for web services.

8. An application program interface as recited in claim 1, further comprising a web method attribute class configured to expose a method over the web.

9. An application program interface as recited in claim 1, further comprising a set of classes that allow a user to create controls and pages that represent a user interface on a web page.

10. An application program interface as recited in claim 1, wherein the first class provides HTTP values sent by a client during a web request.

11. An application program interface as recited in claim 1, wherein the second class manages a stream of data output to the client.

12. A network software architecture implemented on a computing device comprising the application program interface as recited in claim 1.

13. An application program interface embodied in one or more computer storage media, comprising:

a first group of services related to information associated with a HTTP request;

a second group of services related to managing HTTP output to a client, wherein the second group of services is further related to obtaining information regarding capabilities of a browser application running in the client;

a third group of services related to accessing server-based utilities; and a fourth group of services related to creating web services;

a fifth group of services that provide for the creation of a user interface on a web page, wherein the fifth group of services comprises a one or more classes each class being selected from at least one of:

a set of classes that allow a user to create server controls on a web page;

a set of classes that allow a user to create HTML server controls on a web page; and a set of classes that allow a user to create web server controls on a web page;

a sixth group of services related to sharing global information across multiple sessions associated with an application; and a seventh group of services related to caching frequently used resources.

14. An application program interface as recited in claim 13, wherein the fourth group of services includes:

a web service class that defines a base class for web services; and a web method attribute class that allows a user to expose a method over the web.

15. A network software architecture implemented on a computing device comprising the application program interface as recited in claim 13.

16. A method of creating an application program interface, the method comprising:

creating an HTTP request class configured to provide information regarding a HTTP request;

creating an HTTP response class configured to manage an HTTP output stream to a client, wherein the HTTP response class is further configured to manage information regarding capabilities of the client; and creating an HTTP server utility object configured to provide access to server-based utilities;

creating control classes configured to enable the creation of HTML server controls that are executed on a server and map to standard HTML tags;

creating a class configured to facilitate the creation and usage of web services;

creating a class configured to facilitate caching of frequently used resources;

creating a class configured to facilitate obtaining information regarding a platform type associated with a client; and creating at least one class configured to facilitate sharing of global information across multiple sessions and requests within an application, whereby the method facilitates the creating of the application program interface.

17. A method as recited in claim 16, further comprising creating a class configured to manipulate cookies.

18. A method as recited in claim 16, further comprising creating a class configured to handle file transfers.

19. An application program interface embodied in one or more computer storage media, comprising:

web controls that allow a user to create web server controls on a web page, wherein the web server controls are executed on a web server and include form controls;

a first class configured to provide information regarding an HTTP request;

a second class configured to manage HTTP output to a client, wherein the second class is further configured to obtain information regarding capabilities of the client;

a third class configured to facilitate sharing of global information across multiple sessions associated with an application;

a fourth class configured to facilitate sharing of global information across multiple sessions associated with an application;

a fifth class configured to facilitate caching of frequently used resources;

a sixth class configured to facilitate obtaining information regarding a platform type associated with a client;

and an object configured to provide access to server-side utilities and processes.

20. An application program interface as recited in claim 19, further comprising a third class configured to manipulate at least one cookie.

21. An application program interface as recited in claim 19, further comprising an third class configured to handle file transfers.

22. An application program interface as recited in claim 19, further comprising a third class configured to provide exception information.

23. An application program interface as recited in claim 19, further comprising a third class configured to control operation of an output cache.

24. An application program interface as recited in claim 19, further comprising a set of classes that enable building and using web services.

25. An application program interface as recited in claim 19, further comprising a web service class configured to define a base class for web services.

26. An application program interface as recited in claim 19, further comprising a web method attribute class configured to expose a method over the web.

27. An application program interface as recited in claim 19, further comprising a set of classes that allow a user to create controls and pages that represent a user interface on a web page.

28. An application program interface as recited in claim 19, wherein the first class provides HTTP values sent by a client during a web request.

29. An application program interface as recited in claim 19, wherein the second class manages a stream of data output to the client.

30. A network software architecture implemented on a computing device comprising the application program interface as recited in claim 19.

* * * * *